US007054296B1

(12) United States Patent
Sorrells et al.

(10) Patent No.: US 7,054,296 B1
(45) Date of Patent: May 30, 2006

(54) WIRELESS LOCAL AREA NETWORK (WLAN) TECHNOLOGY AND APPLICATIONS INCLUDING TECHNIQUES OF UNIVERSAL FREQUENCY TRANSLATION

(75) Inventors: David F. Sorrells, Middleburg, FL (US); Michael J. Bultman, Jacksonville, FL (US); Robert W. Cook, Switzerland, FL (US); Richard C. Looke, Jacksonville, FL (US); Charley D. Moses, Jr., Jacksonville, FL (US); Gregory S. Rawlins, Lake Mary, FL (US); Michael W. Rawlins, Lake Mary, FL (US)

(73) Assignee: ParkerVision, Inc., Jacksonville, FL (US)

( * ) Notice: Subject to any disclaimer, the term of this patent is extended or adjusted under 35 U.S.C. 154(b) by 908 days.

(21) Appl. No.: 09/632,857

(22) Filed: Aug. 4, 2000

Related U.S. Application Data

(60) Provisional application No. 60/147,129, filed on Aug. 4, 1999.

(51) Int. Cl.
*H04Q 7/24* (2006.01)

(52) U.S. Cl. ....................... 370/338; 370/480; 375/222

(58) Field of Classification Search ................ 375/222, 375/219, 316, 295; 370/338, 401, 431, 436, 370/465, 480, 481, 516
See application file for complete search history.

(56) References Cited

U.S. PATENT DOCUMENTS

| | | | | |
|---|---|---|---|---|
| 2,057,613 | A | 10/1936 | Gardner | 250/8 |
| 2,241,078 | A | 5/1941 | Vreeland | 179/15 |
| 2,270,385 | A | 1/1942 | Skillman | 179/15 |
| 2,283,575 | A | 5/1942 | Roberts | 250/6 |
| 2,358,152 | A | 9/1944 | Earp | 179/171.5 |
| 2,410,350 | A | 10/1946 | Labin et al. | 179/15 |
| 2,451,430 | A | 10/1948 | Barone | 250/8 |
| 2,462,069 | A | 2/1949 | Chatterjea et al. | 250/17 |
| 2,462,181 | A | 2/1949 | Grosselfinger | 250/17 |
| 2,472,798 | A | 6/1949 | Fredendall | 178/44 |
| 2,497,859 | A | 2/1950 | Boughtwood et al. | 250/8 |
| 2,499,279 | A | 2/1950 | Peterson | 332/41 |
| 2,802,208 | A | 8/1957 | Hobbs | 343/176 |
| 2,985,875 | A | 5/1961 | Grisdale et al. | 343/100 |
| 3,023,309 | A | 2/1962 | Foulkes | 250/17 |
| 3,069,679 | A | 12/1962 | Sweeney et al. | 343/200 |
| 3,104,393 | A | 9/1963 | Vogelman | 343/200 |
| 3,114,106 | A | 12/1963 | McManus | 325/56 |
| 3,118,117 | A | 1/1964 | King et al. | 332/22 |

(Continued)

FOREIGN PATENT DOCUMENTS

| | | | |
|---|---|---|---|
| DE | 35 41 031 | A1 | 5/1986 |

(Continued)

OTHER PUBLICATIONS

Translation of Japanese Patent Publication No. 60-130203, 3 pages (Jul. 11, 1985- Date of publication of application).

(Continued)

*Primary Examiner*—Ajit Patel
*Assistant Examiner*—Chirag Shah
(74) *Attorney, Agent, or Firm*—Sterne, Kessler, Goldstein & Fox, PLLC

(57) ABSTRACT

Frequency translation and applications of same are described herein, including wireless local area network (WLAN) applications such as IEEE Standard 802.11 WLANs. Such applications include, but are not limited to, frequency down-conversion, frequency up-conversion, enhanced signal reception, unified down-conversion and filtering, and combinations and applications of same.

57 Claims, 371 Drawing Sheets

U.S. PATENT DOCUMENTS

| | | | | |
|---|---|---|---|---|
| 3,226,643 | A | 12/1965 | McNair | 325/40 |
| 3,246,084 | A | 4/1966 | Kryter | |
| 3,258,694 | A | 6/1966 | Shepherd | 325/145 |
| 3,383,598 | A | 5/1968 | Sanders | 325/163 |
| 3,384,822 | A | 5/1968 | Miyagi | 325/30 |
| 3,454,718 | A | 7/1969 | Perreault | 178/66 |
| 3,523,291 | A | 8/1970 | Pierret | 340/347 |
| 3,548,342 | A | 12/1970 | Maxey | 332/9 |
| 3,555,428 | A | 1/1971 | Perreault | 325/320 |
| 3,614,627 | A | 10/1971 | Runyan et al. | |
| 3,614,630 | A | 10/1971 | Rorden | |
| 3,617,892 | A | 11/1971 | Hawley et al. | 325/145 |
| 3,621,402 | A | 11/1971 | Gardner | 328/37 |
| 3,622,885 | A | 11/1971 | Oberdorf et al. | 325/40 |
| 3,623,160 | A | 11/1971 | Giles et al. | 340/347 DA |
| 3,626,417 | A | 12/1971 | Gilbert | 343/203 |
| 3,629,696 | A | 12/1971 | Bartelink | 324/57 R |
| 3,662,268 | A | 5/1972 | Gans et al. | 325/56 |
| 3,689,841 | A | 9/1972 | Bello et al. | 325/39 |
| 3,702,440 | A | 11/1972 | Moore | |
| 3,714,577 | A | 1/1973 | Hayes | 325/145 |
| 3,716,730 | A | 2/1973 | Cerny, Jr. | 307/295 |
| 3,717,844 | A | 2/1973 | Barret et al. | 340/5 R |
| 3,735,048 | A | 5/1973 | Tomsa et al. | 179/15 BM |
| 3,736,513 | A | 5/1973 | Wilson | |
| 3,767,984 | A | 10/1973 | Shinoda et al. | |
| 3,806,811 | A | 4/1974 | Thompson | 325/146 |
| 3,852,530 | A | 12/1974 | Shen | |
| 3,868,601 | A | 2/1975 | MacAfee | 332/45 |
| 3,940,697 | A | 2/1976 | Morgan | |
| 3,949,300 | A | 4/1976 | Sadler | 325/31 |
| 3,967,202 | A | 6/1976 | Batz | 325/31 |
| 3,980,945 | A | 9/1976 | Bickford | 325/30 |
| 3,987,280 | A | 10/1976 | Bauer | 235/150.63 |
| 3,991,277 | A | 11/1976 | Hirata | 179/15 FD |
| 4,003,002 | A | 1/1977 | Snijders et al. | 322/10 |
| 4,013,966 | A | 3/1977 | Campbell | 325/363 |
| 4,016,366 | A | 4/1977 | Kurata | |
| 4,017,798 | A | 4/1977 | Gordy et al. | 325/42 |
| 4,019,140 | A | 4/1977 | Swerdlow | 322/65 |
| 4,032,847 | A | 6/1977 | Unkauf | 325/323 |
| 4,035,732 | A | 7/1977 | Lohrmann | 325/446 |
| 4,045,740 | A | 8/1977 | Baker | |
| 4,047,121 | A | 9/1977 | Campbell | 331/76 |
| 4,051,475 | A | 9/1977 | Campbell | 343/180 |
| 4,066,841 | A | 1/1978 | Young | 178/66 R |
| 4,066,919 | A | 1/1978 | Huntington | 307/353 |
| 4,080,573 | A | 3/1978 | Howell | 325/439 |
| 4,081,748 | A | 3/1978 | Batz | 325/56 |
| 4,115,737 | A | 9/1978 | Hongu et al. | |
| 4,130,765 | A | 12/1978 | Arakelian et al. | 307/220 R |
| 4,130,806 | A | 12/1978 | Van Gerwen et al. | 325/487 |
| 4,132,952 | A | 1/1979 | Hongu et al. | |
| 4,142,155 | A | 2/1979 | Adachi | 325/47 |
| 4,170,764 | A | 10/1979 | Salz et al. | 332/17 |
| 4,204,171 | A | 5/1980 | Sutphin, Jr. | 328/167 |
| 4,210,872 | A | 7/1980 | Gregorian | 330/9 |
| 4,220,977 | A | 9/1980 | Yamanaka | |
| 4,245,355 | A | 1/1981 | Pascoe et al. | 455/326 |
| 4,250,458 | A | 2/1981 | Richmond et al. | |
| 4,253,066 | A | 2/1981 | Fisher et al. | 329/50 |
| 4,253,067 | A | 2/1981 | Caples et al. | 329/110 |
| 4,253,069 | A | 2/1981 | Nossek | 330/107 |
| 4,308,614 | A | 12/1981 | Fisher et al. | 370/119 |
| 4,320,361 | A | 3/1982 | Kikkert | 332/16 R |
| 4,320,536 | A | 3/1982 | Dietrich | 455/325 |
| 4,334,324 | A | 6/1982 | Hoover | 455/333 |
| 4,346,477 | A | 8/1982 | Gordy | 455/257 |
| 4,355,401 | A | 10/1982 | Ikoma et al. | 375/5 |
| 4,356,558 | A | 10/1982 | Owen et al. | 364/724 |
| 4,360,867 | A | 11/1982 | Gonda | 363/158 |
| 4,363,132 | A | 12/1982 | Collin | 455/52 |
| 4,365,217 | A | 12/1982 | Berger et al. | 333/165 |
| 4,369,522 | A | 1/1983 | Cerny, Jr. et al. | 455/333 |
| 4,370,572 | A | 1/1983 | Cosand et al. | 307/353 |
| 4,384,357 | A | 5/1983 | deBuda et al. | |
| 4,389,579 | A | 6/1983 | Stein | 307/353 |
| 4,392,255 | A | 7/1983 | Del Giudice | 455/328 |
| 4,393,395 | A | 7/1983 | Hacke et al. | 358/23 |
| 4,430,629 | A | 2/1984 | Betzl et al. | 333/165 |
| 4,441,080 | A | 4/1984 | Saari | |
| 4,446,438 | A | 5/1984 | Chang et al. | 328/127 |
| 4,456,990 | A | 6/1984 | Fisher et al. | 370/119 |
| 4,470,145 | A | 9/1984 | Williams | |
| 4,472,785 | A | 9/1984 | Kasuga | 364/718 |
| 4,479,226 | A | 10/1984 | Prabhu et al. | 375/1 |
| 4,481,490 | A | 11/1984 | Huntley | 332/41 |
| 4,481,642 | A | 11/1984 | Hanson | 375/9 |
| 4,483,017 | A | 11/1984 | Hampel et al. | 382/17 |
| 4,484,143 | A | 11/1984 | French et al. | 329/50 |
| 4,485,488 | A | 11/1984 | Houdart | 455/327 |
| 4,488,119 | A | 12/1984 | Marshall | |
| 4,504,803 | A | 3/1985 | Lee et al. | 332/31 R |
| 4,510,467 | A | 4/1985 | Chang et al. | |
| 4,517,519 | A | 5/1985 | Mukaiyama | 329/126 |
| 4,517,520 | A | 5/1985 | Ogawa | 329/145 |
| 4,518,935 | A | 5/1985 | van Roermund | 333/173 |
| 4,521,892 | A | 6/1985 | Vance et al. | 375/88 |
| 4,563,773 | A | 1/1986 | Dixon, Jr. et al. | 455/327 |
| 4,577,157 | A | 3/1986 | Reed | 329/50 |
| 4,583,239 | A | 4/1986 | Vance | 375/94 |
| 4,591,736 | A | 5/1986 | Hirao et al. | 307/267 |
| 4,602,220 | A | 7/1986 | Kurihara | 331/19 |
| 4,603,300 | A | 7/1986 | Welles, II et al. | 329/50 |
| 4,612,464 | A | 9/1986 | Ishikawa et al. | 307/496 |
| 4,612,518 | A | 9/1986 | Gans et al. | 332/21 |
| 4,616,191 | A | 10/1986 | Galani et al. | 331/4 |
| 4,621,217 | A | 11/1986 | Saxe et al. | 315/1 |
| 4,628,517 | A | 12/1986 | Schwarz et al. | 376/40 |
| 4,633,510 | A | 12/1986 | Suzuki et al. | |
| 4,634,998 | A | 1/1987 | Crawford | 331/1 A |
| 4,648,021 | A | 3/1987 | Alberkrack | 363/157 |
| 4,651,034 | A | 3/1987 | Sato | 307/556 |
| 4,653,117 | A | 3/1987 | Heck | 455/209 |
| 4,660,164 | A | 4/1987 | Leibowitz | |
| 4,675,882 | A | 6/1987 | Lillie et al. | 375/80 |
| 4,688,253 | A | 8/1987 | Gumm | 381/7 |
| 4,716,376 | A | 12/1987 | Daudelin | 329/107 |
| 4,716,388 | A | 12/1987 | Jacobs | 333/173 |
| 4,718,113 | A | 1/1988 | Rother et al. | 455/209 |
| 4,726,041 | A | 2/1988 | Prohaska et al. | 375/91 |
| 4,733,403 | A | 3/1988 | Simone | 375/103 |
| 4,734,591 | A | 3/1988 | Ichitsubo | 307/219.1 |
| 4,737,969 | A | 4/1988 | Steel et al. | 375/67 |
| 4,740,675 | A | 4/1988 | Brosnan et al. | |
| 4,743,858 | A | 5/1988 | Everard | 330/10 |
| 4,745,463 | A | 5/1988 | Lu | 358/23 |
| 4,751,468 | A | 6/1988 | Agoston | 328/133 |
| 4,757,538 | A | 7/1988 | Zink | 381/7 |
| 4,761,798 | A | 8/1988 | Griswold, Jr. et al. | |
| 4,768,187 | A | 8/1988 | Marshall | 370/69.1 |
| 4,769,612 | A | 9/1988 | Tamakoshi et al. | 328/167 |
| 4,772,853 | A | 9/1988 | Hart | |
| 4,785,463 | A | 11/1988 | Janc et al. | 375/1 |
| 4,789,837 | A | 12/1988 | Ridgers | |
| 4,791,584 | A | 12/1988 | Greivenkamp, Jr. | 364/525 |
| 4,801,823 | A | 1/1989 | Yokoyama | 307/353 |
| 4,806,790 | A | 2/1989 | Sone | 307/353 |
| 4,810,904 | A | 3/1989 | Crawford | 307/353 |
| 4,810,976 | A | 3/1989 | Cowley et al. | 331/117 R |
| 4,811,362 | A | 3/1989 | Yester, Jr. et al. | 375/75 |
| 4,816,704 | A | 3/1989 | Fiori, Jr. | 307/519 |
| 4,819,252 | A | 4/1989 | Christopher | 375/122 |
| 4,833,445 | A | 5/1989 | Buchele | 341/116 |

| | | | | |
|---|---|---|---|---|
| 4,841,265 | A | 6/1989 | Watanabe et al. | 333/194 |
| 4,855,894 | A | 8/1989 | Asahi et al. | 363/157 |
| 4,857,928 | A | 8/1989 | Gailus et al. | |
| 4,862,121 | A | 8/1989 | Hochschild et al. | 333/173 |
| 4,868,654 | A | 9/1989 | Juri et al. | 358/133 |
| 4,870,659 | A | 9/1989 | Oishi et al. | 375/82 |
| 4,871,987 | A | 10/1989 | Kawase | 332/100 |
| 4,873,492 | A | 10/1989 | Myer | |
| 4,885,587 | A | 12/1989 | Wiegand et al. | 42/14 |
| 4,885,756 | A | 12/1989 | Fontanes et al. | 375/82 |
| 4,888,557 | A | 12/1989 | Puckette, IV et al. | 329/341 |
| 4,890,302 | A | 12/1989 | Muilwijk | 375/80 |
| 4,893,316 | A | 1/1990 | Janc et al. | 375/44 |
| 4,893,341 | A | 1/1990 | Gehring | 381/7 |
| 4,894,766 | A | 1/1990 | De Agro | 363/159 |
| 4,896,152 | A | 1/1990 | Tiemann | 340/853 |
| 4,902,979 | A | 2/1990 | Puckette, IV | 329/343 |
| 4,908,579 | A | 3/1990 | Tawfik et al. | 328/167 |
| 4,910,752 | A | 3/1990 | Yester, Jr. et al. | 375/75 |
| 4,914,405 | A | 4/1990 | Wells | 331/25 |
| 4,920,510 | A | 4/1990 | Senderowicz et al. | 364/825 |
| 4,922,452 | A | 5/1990 | Larsen et al. | 365/45 |
| 4,931,921 | A | 6/1990 | Anderson | 363/163 |
| 4,943,974 | A | 7/1990 | Motamedi | 375/1 |
| 4,944,025 | A | 7/1990 | Gehring et al. | 455/207 |
| 4,955,079 | A | 9/1990 | Connerney et al. | 455/325 |
| 4,965,467 | A | 10/1990 | Bilterijst | 307/352 |
| 4,967,160 | A | 10/1990 | Quievy et al. | 328/16 |
| 4,970,703 | A | 11/1990 | Hariharan et al. | 367/138 |
| 4,972,436 | A | 11/1990 | Halim et al. | |
| 4,982,353 | A | 1/1991 | Jacob et al. | 364/724.1 |
| 4,984,077 | A | 1/1991 | Uchida | 358/140 |
| 4,995,055 | A | 2/1991 | Weinberger et al. | 375/5 |
| 5,003,621 | A | 3/1991 | Gailus | 455/209 |
| 5,005,169 | A | 4/1991 | Bronder et al. | 370/76 |
| 5,006,810 | A | 4/1991 | Popescu | 328/167 |
| 5,010,585 | A | 4/1991 | Garcia | 455/118 |
| 5,012,245 | A | 4/1991 | Scott et al. | |
| 5,014,304 | A | 5/1991 | Nicollini et al. | 379/399 |
| 5,015,963 | A | 5/1991 | Sutton | 329/361 |
| 5,016,242 | A | 5/1991 | Tang | |
| 5,017,924 | A | 5/1991 | Guiberteau et al. | 342/195 |
| 5,020,149 | A | 5/1991 | Hemmie | 455/325 |
| 5,020,154 | A | 5/1991 | Zierhut | 455/608 |
| 5,052,050 | A | 9/1991 | Collier et al. | 455/296 |
| 5,058,107 | A | 10/1991 | Stone et al. | |
| 5,065,409 | A | 11/1991 | Hughes et al. | 375/91 |
| 5,083,050 | A | 1/1992 | Vasile | 307/529 |
| 5,091,921 | A | 2/1992 | Minami | 375/88 |
| 5,095,533 | A | 3/1992 | Loper et al. | 455/245 |
| 5,096,536 | A | 3/1992 | Loper | 455/324 |
| 5,111,152 | A | 5/1992 | Makino | 329/300 |
| 5,113,094 | A | 5/1992 | Grace et al. | 307/529 |
| 5,113,129 | A | 5/1992 | Hughes | 323/316 |
| 5,115,409 | A | 5/1992 | Stepp | 364/841 |
| 5,122,765 | A | 6/1992 | Pataut | 332/105 |
| 5,124,592 | A | 6/1992 | Hagino | 307/520 |
| 5,126,682 | A | 6/1992 | Weinberg et al. | 329/304 |
| 5,136,267 | A | 8/1992 | Cabot | 333/174 |
| 5,140,705 | A | 8/1992 | Kosuga | 455/318 |
| 5,150,124 | A | 9/1992 | Moore et al. | 342/68 |
| 5,151,661 | A | 9/1992 | Caldwell et al. | 328/14 |
| 5,157,687 | A | 10/1992 | Tymes | 375/1 |
| 5,159,710 | A | 10/1992 | Cusdin | 455/304 |
| 5,170,414 | A | 12/1992 | Silvian | 375/59 |
| 5,172,070 | A | 12/1992 | Hiraiwa et al. | 329/304 |
| 5,179,731 | A | 1/1993 | Tränkle et al. | |
| 5,191,459 | A | 3/1993 | Thompson et al. | 359/133 |
| 5,204,642 | A | 4/1993 | Asghar et al. | 331/135 |
| 5,212,827 | A | 5/1993 | Meszko et al. | 455/219 |
| 5,214,787 | A | 5/1993 | Karkota, Jr. | 455/3.2 |
| 5,218,562 | A | 6/1993 | Basehore et al. | |
| 5,220,583 | A | 6/1993 | Solomon | 375/82 |
| 5,220,680 | A | 6/1993 | Lee | 455/102 |
| 5,222,144 | A | 6/1993 | Whikehart | 381/15 |
| 5,230,097 | A | 7/1993 | Currie et al. | 455/226.1 |
| 5,239,496 | A | 8/1993 | Vancraeynest | |
| 5,239,686 | A | 8/1993 | Downey | 455/78 |
| 5,241,561 | A | 8/1993 | Barnard | 375/1 |
| 5,249,203 | A | 9/1993 | Loper | 375/97 |
| 5,251,218 | A | 10/1993 | Stone et al. | 370/120 |
| 5,251,232 | A | 10/1993 | Nonami | 375/5 |
| 5,260,970 | A | 11/1993 | Henry et al. | 375/10 |
| 5,260,973 | A | 11/1993 | Watanabe | |
| 5,263,194 | A | 11/1993 | Ragan | 455/316 |
| 5,263,196 | A | 11/1993 | Jasper | 455/324 |
| 5,267,023 | A | 11/1993 | Kawasaki | 358/23 |
| 5,278,826 | A | 1/1994 | Murphy et al. | 370/76 |
| 5,282,023 | A | 1/1994 | Scarpa | 358/36 |
| 5,282,222 | A | 1/1994 | Fattouche et al. | |
| 5,287,516 | A | 2/1994 | Schaub | 375/88 |
| 5,293,398 | A | 3/1994 | Hamao et al. | 375/1 |
| 5,303,417 | A | 4/1994 | Laws | 455/314 |
| 5,307,517 | A | 4/1994 | Rich | 455/306 |
| 5,315,583 | A | 5/1994 | Murphy et al. | 370/18 |
| 5,319,799 | A | 6/1994 | Morita | 455/78 |
| 5,321,852 | A | 6/1994 | Seong | 455/182.1 |
| 5,325,204 | A | 6/1994 | Scarpa | 348/607 |
| 5,337,014 | A | 8/1994 | Najle et al. | 324/613 |
| 5,339,054 | A | 8/1994 | Taguchi | 332/100 |
| 5,339,459 | A | 8/1994 | Schiltz et al. | 455/333 |
| 5,345,239 | A | 9/1994 | Madni et al. | |
| 5,353,306 | A | 10/1994 | Yamamoto | 375/14 |
| 5,355,114 | A | 10/1994 | Sutterlin et al. | 340/310 A |
| 5,361,408 | A | 11/1994 | Watanabe et al. | 455/324 |
| 5,369,404 | A | 11/1994 | Galton | 341/143 |
| 5,369,789 | A | 11/1994 | Kosugi et al. | |
| 5,369,800 | A | 11/1994 | Takagi et al. | 455/59 |
| 5,375,146 | A | 12/1994 | Chalmers | 375/103 |
| 5,379,040 | A | 1/1995 | Mizomoto et al. | 341/143 |
| 5,379,141 | A | 1/1995 | Thompson et al. | 359/125 |
| 5,388,063 | A | 2/1995 | Takatori et al. | 364/724.17 |
| 5,389,839 | A | 2/1995 | Heck | |
| 5,390,364 | A | 2/1995 | Webster et al. | 455/52.3 |
| 5,400,084 | A | 3/1995 | Scarpa | 348/624 |
| 5,404,127 | A | 4/1995 | Lee et al. | 340/310.02 |
| 5,410,270 | A | 4/1995 | Rybicki et al. | |
| 5,410,326 | A | 4/1995 | Goldstein | |
| 5,410,541 | A | 4/1995 | Hotto | 370/76 |
| 5,410,743 | A | 4/1995 | Seely et al. | 455/326 |
| 5,412,352 | A | 5/1995 | Graham | 332/103 |
| 5,416,449 | A | 5/1995 | Joshi | |
| 5,416,803 | A | 5/1995 | Janer | 375/324 |
| 5,422,909 | A | 6/1995 | Love et al. | |
| 5,422,913 | A | 6/1995 | Wilkinson | 376/347 |
| 5,423,082 | A | 6/1995 | Cygan et al. | 455/126 |
| 5,428,638 | A | 6/1995 | Cioffi et al. | 375/224 |
| 5,428,640 | A | 6/1995 | Townley | 375/257 |
| 5,434,546 | A | 7/1995 | Palmer | 332/151 |
| 5,438,329 | A | 8/1995 | Gastouniotis et al. | |
| 5,438,692 | A | 8/1995 | Mohindra | 455/324 |
| 5,440,311 | A | 8/1995 | Gallagher et al. | |
| 5,444,415 | A | 8/1995 | Dent et al. | 329/302 |
| 5,444,416 | A | 8/1995 | Ishikawa et al. | 329/341 |
| 5,444,865 | A | 8/1995 | Heck et al. | 455/86 |
| 5,446,421 | A | 8/1995 | Kechkaylo | 332/100 |
| 5,446,422 | A | 8/1995 | Mattila et al. | 332/103 |
| 5,448,602 | A | 9/1995 | Ohmori et al. | 375/347 |
| 5,451,899 | A | 9/1995 | Lawton | 329/302 |
| 5,454,007 | A | 9/1995 | Dutta | 375/322 |
| 5,454,009 | A | 9/1995 | Fruit et al. | 372/202 |
| 5,463,356 | A | 10/1995 | Palmer | 332/117 |
| 5,463,357 | A | 10/1995 | Hobden | 332/151 |
| 5,465,071 | A | 11/1995 | Kobayashi et al. | 329/315 |
| 5,465,410 | A | 11/1995 | Hiben et al. | 455/266 |
| 5,465,415 | A | 11/1995 | Bien | 455/326 |

5,465,418 A 11/1995 Zhou et al. ................. 455/332
5,471,162 A 11/1995 McEwan ..................... 327/92
5,471,665 A 11/1995 Pace et al.
5,479,120 A 12/1995 McEwan ..................... 327/91
5,479,447 A 12/1995 Chow et al. ................ 375/260
5,481,570 A 1/1996 Winters
5,483,193 A 1/1996 Kennedy et al. ............ 329/300
5,483,549 A 1/1996 Weinberg et al. ........... 375/200
5,483,600 A 1/1996 Werrbach
5,483,691 A 1/1996 Heck et al. .............. 455/234.2
5,483,695 A 1/1996 Pardoen
5,490,173 A 2/1996 Whikehart et al. ......... 375/316
5,490,176 A 2/1996 Peltier
5,493,581 A 2/1996 Young et al. ............... 375/350
5,493,721 A 2/1996 Reis ........................... 455/339
5,495,200 A 2/1996 Kwan et al. ................ 327/554
5,495,202 A 2/1996 Hsu ........................... 327/113
5,495,500 A 2/1996 Jovanovich et al. ........ 375/206
5,499,267 A 3/1996 Ohe et al. ................... 375/206
5,500,758 A 3/1996 Thompson et al. ......... 359/189
5,513,389 A 4/1996 Reeser et al. ............... 455/311
5,515,014 A 5/1996 Troutman ................... 332/178
5,517,688 A 5/1996 Fajen et al. ................. 455/333
5,519,890 A 5/1996 Pinckley ..................... 455/307
5,523,719 A 6/1996 Longo et al. ............... 327/557
5,523,726 A 6/1996 Kroeger et al. ............. 332/103
5,523,760 A 6/1996 McEwan ..................... 342/89
5,539,770 A 7/1996 Ishigaki ...................... 375/206
5,555,453 A 9/1996 Kajimoto et al. ........... 455/266
5,557,641 A 9/1996 Weinberg .................. 375/295
5,557,642 A 9/1996 Williams .................... 375/316
5,563,550 A 10/1996 Toth ........................... 329/347
5,564,097 A 10/1996 Swanke
5,574,755 A 11/1996 Persico ....................... 375/295
5,579,341 A 11/1996 Smith et al. ................ 375/267
5,579,347 A 11/1996 Lindquist et al. ........... 375/346
5,584,068 A 12/1996 Mohindra ................... 455/324
5,589,793 A 12/1996 Kassapian
5,592,131 A 1/1997 Labreche et al. ........... 332/103
5,600,680 A 2/1997 Mishima et al.
5,602,847 A 2/1997 Pagano et al. .............. 370/484
5,602,868 A 2/1997 Wilson ....................... 375/219
5,604,592 A 2/1997 Kotidis et al. .............. 356/357
5,604,732 A 2/1997 Kim et al. .................. 370/342
5,606,731 A 2/1997 Pace et al.
5,608,531 A 3/1997 Honda et al. .................. 386/1
5,610,946 A 3/1997 Tanaka et al. .............. 375/269
RE35,494 E 4/1997 Nicollini ..................... 327/554
5,617,451 A 4/1997 Mimura et al. ............. 375/340
5,619,538 A 4/1997 Sempel et al. .............. 375/328
5,621,455 A 4/1997 Rogers et al. ................. 348/6
5,628,055 A 5/1997 Stein .......................... 455/89
5,630,227 A 5/1997 Bella et al. ................. 455/324
5,633,815 A 5/1997 Young
5,634,207 A 5/1997 Yamaji et al.
5,636,140 A * 6/1997 Lee et al. .................. 370/469
5,638,396 A 6/1997 Klimek ........................ 375/92
5,640,415 A 6/1997 Pandula ...................... 375/202
5,640,424 A 6/1997 Banavong et al. .......... 375/316
5,640,428 A 6/1997 Abe et al. ................... 375/334
5,640,698 A 6/1997 Shen et al. ................. 455/323
5,642,071 A 6/1997 Sevenhans et al.
5,648,985 A 7/1997 Bjerede et al. ............. 375/219
5,650,785 A 7/1997 Rodal ......................... 342/357
5,661,424 A 8/1997 Tang .......................... 327/105
5,663,878 A 9/1997 Walker ....................... 363/159
5,663,986 A 9/1997 Striffler ...................... 375/260
5,668,836 A 9/1997 Smith et al. ................ 375/316
5,675,392 A 10/1997 Nayebi et al. .............. 348/584
5,678,220 A 10/1997 Fournier ..................... 455/302
5,678,226 A 10/1997 Li et al.
5,680,078 A 10/1997 Ariie .......................... 332/178
5,680,418 A 10/1997 Croft et al. ................. 375/346
5,682,099 A 10/1997 Thompson et al.
5,689,413 A 11/1997 Jaramillo et al. ........... 363/146
5,694,096 A 12/1997 Ushiroku et al. ........... 333/195
5,697,074 A 12/1997 Makikallio et al.
5,699,006 A 12/1997 Zele et al. .................. 327/341
5,705,949 A 1/1998 Alelyunas et al. .......... 329/304
5,705,955 A 1/1998 Freeburg et al. .............. 331/14
5,710,992 A 1/1998 Sawada et al.
5,710,998 A 1/1998 Opas .......................... 455/324
5,714,910 A 2/1998 Skoczen et al. ............... 331/3
5,715,281 A 2/1998 Bly et al. ................... 375/344
5,721,514 A 2/1998 Crockett et al. ............... 331/3
5,724,002 A 3/1998 Hulick ....................... 329/361
5,724,653 A 3/1998 Baker et al. ................ 455/296
5,729,577 A 3/1998 Chen .......................... 375/334
5,729,829 A 3/1998 Talwar et al. ................. 455/63
5,732,333 A 3/1998 Cox et al. .................. 455/126
5,736,895 A 4/1998 Yu et al. ..................... 327/554
5,737,035 A 4/1998 Rotzoll ....................... 348/725
5,742,189 A 4/1998 Yoshida et al. ............. 327/113
5,745,846 A 4/1998 Myer et al.
5,748,683 A 5/1998 Smith et al. ................ 375/347
5,751,154 A 5/1998 Tsugai
5,757,858 A 5/1998 Black et al.
5,757,870 A 5/1998 Miya et al. ................. 375/367
RE35,829 E 6/1998 Sanderford, Jr. ............ 375/200
5,760,629 A 6/1998 Urabe et al.
5,760,632 A 6/1998 Kawakami et al.
5,760,645 A 6/1998 Comte et al. ............... 329/304
5,764,087 A 6/1998 Clark ........................ 327/105
5,767,726 A 6/1998 Wang ......................... 327/356
5,768,118 A 6/1998 Faulk et al. .................. 363/72
5,768,323 A 6/1998 Kroeger et al. ............. 375/355
5,770,985 A 6/1998 Ushiroku et al. ........... 333/193
5,771,442 A 6/1998 Wang et al. .................. 455/93
5,777,692 A 7/1998 Ghosh ........................ 348/725
5,777,771 A 7/1998 Smith ......................... 359/180
5,778,022 A 7/1998 Walley ....................... 375/206
5,784,689 A 7/1998 Kobayashi
5,786,844 A 7/1998 Rogers et al. ................. 348/6
5,790,587 A 8/1998 Smith et al.
5,793,801 A 8/1998 Fertner ....................... 375/219
5,793,817 A 8/1998 Wilson
5,793,818 A 8/1998 Claydon et al. ............ 375/326
5,801,654 A 9/1998 Traylor ....................... 341/144
5,802,463 A 9/1998 Zuckerman ................. 455/208
5,809,060 A 9/1998 Cafarella et al. ........... 375/206
5,812,546 A 9/1998 Zhou et al. ................. 370/342
5,818,582 A 10/1998 Fernandez et al. .......... 356/318
5,818,869 A 10/1998 Miya et al. ................. 375/206
5,825,254 A 10/1998 Lee ............................ 331/25
5,834,979 A 11/1998 Yatsuka
5,834,985 A 11/1998 Sundeg.ang.rd ............. 332/100
5,841,324 A 11/1998 Williams ..................... 331/17
5,841,811 A 11/1998 Song .......................... 375/235
5,844,449 A 12/1998 Abeno et al. ............... 332/105
5,844,868 A 12/1998 Takahashi et al.
5,859,878 A 1/1999 Phillips et al. .............. 375/316
5,864,754 A 1/1999 Hotto ......................... 455/280
5,870,670 A 2/1999 Ripley et al.
5,872,446 A 2/1999 Cranford, Jr. et al. ...... 323/315
5,881,375 A 3/1999 Bonds ........................ 455/118
5,883,548 A 3/1999 Assard et al. ............... 329/306
5,892,380 A 4/1999 Quist ......................... 327/172
5,894,239 A 4/1999 Bonaccio et al. ........... 327/176
5,894,496 A 4/1999 Jones ......................... 455/126
5,896,304 A 4/1999 Tiemann et al.
5,896,562 A 4/1999 Heinonen .................... 455/76
5,898,912 A 4/1999 Heck et al.
5,900,747 A 5/1999 Brauns .......................... 327/9
5,901,054 A 5/1999 Leu et al. ..................... 383/41
5,901,187 A 5/1999 Iinuma ....................... 375/347
5,901,344 A 5/1999 Opas ........................... 455/76

5,901,347 A 5/1999 Chambers et al. ....... 455/234.1
5,901,348 A 5/1999 Bang et al. ................. 455/254
5,901,349 A 5/1999 Guegnaud et al. .......... 455/302
5,903,178 A 5/1999 Miyatsuji et al. ........... 327/308
5,903,187 A 5/1999 Claverie et al. ............ 329/342
5,903,196 A 5/1999 Salvi et al. ................... 331/16
5,903,421 A 5/1999 Furutani et al. .............. 361/58
5,903,553 A 5/1999 Sakamoto et al. .......... 370/338
5,903,595 A 5/1999 Suzuki ........................ 375/207
5,903,609 A 5/1999 Kool et al. ................. 375/261
5,903,827 A 5/1999 Kennan et al. ............. 455/326
5,903,854 A 5/1999 Abe et al. ................... 455/575
5,905,449 A 5/1999 Tsubouchi et al. ..... 340/925.69
5,907,149 A 5/1999 Marckini .................... 235/487
5,907,197 A 5/1999 Faulk ......................... 307/119
5,909,447 A 6/1999 Cox et al. ................... 370/508
5,911,116 A 6/1999 Nosswitz ..................... 455/83
5,911,123 A 6/1999 Shaffer et al. .............. 455/554
5,914,622 A 6/1999 Inoue ......................... 327/172
5,915,278 A 6/1999 Mallick ....................... 73/658
5,920,199 A 7/1999 Sauer ......................... 324/678
5,926,065 A 7/1999 Wakai et al. ............... 329/304
5,926,513 A 7/1999 Suominen et al.
5,933,467 A 8/1999 Sehier et al. ............... 375/350
5,937,013 A * 8/1999 Lam et al. .................. 375/340
5,943,370 A 8/1999 Smith ......................... 375/334
5,945,660 A 8/1999 Nakasuji et al. ....... 235/462.46
5,949,827 A 9/1999 DeLuca et al.
5,952,895 A 9/1999 McCune, Jr. et al. ....... 332/126
5,953,642 A 9/1999 Feldtkeller et al. ...... 455/195.1
5,955,992 A 9/1999 Shattil
5,956,025 A 9/1999 Goulden et al.
5,959,850 A 9/1999 Lim ............................ 363/17
5,960,033 A 9/1999 Shibano et al. ............ 375/207
5,970,053 A 10/1999 Schick et al.
5,982,315 A 11/1999 Bazarjani et al.
5,982,329 A 11/1999 Pittman et al.
5,994,689 A 11/1999 Charrier
5,995,030 A 11/1999 Cabler
5,999,561 A 12/1999 Naden et al.
6,005,903 A 12/1999 Mendelovicz
6,011,435 A 1/2000 Takeyabu et al.
6,014,176 A 1/2000 Nayebi et al.
6,014,551 A * 1/2000 Pesola et al. ................. 455/86
6,018,262 A 1/2000 Noro et al.
6,018,553 A 1/2000 Sanielevici et al.
6,026,286 A 2/2000 Long
6,028,887 A 2/2000 Harrison et al. ............ 375/206
6,031,217 A 2/2000 Aswell et al.
6,041,073 A 3/2000 Davidovici et al. ......... 375/148
6,047,026 A 4/2000 Chao et al.
6,049,573 A 4/2000 Song
6,049,706 A 4/2000 Cook et al. ................. 455/313
6,054,889 A 4/2000 Kobayashi .................. 327/357
6,057,714 A 5/2000 Andrys et al.
6,061,551 A 5/2000 Sorrells et al. ............. 455/118
6,061,555 A 5/2000 Bultman et al. ............ 455/313
6,064,054 A 5/2000 Waczynski et al.
6,067,329 A 5/2000 Kato et al.
6,073,001 A * 6/2000 Sokoler ...................... 455/323
6,076,015 A 6/2000 Hartley et al.
6,078,630 A 6/2000 Prasanna
6,081,691 A 6/2000 Renard et al. ............. 455/12.1
6,084,465 A 7/2000 Dasgupta
6,084,922 A 7/2000 Zhou et al. ................. 375/316
6,085,073 A * 7/2000 Palermo et al. ............. 455/205
6,091,289 A 7/2000 Song et al.
6,091,939 A 7/2000 Banh .......................... 455/102
6,091,940 A 7/2000 Sorrells et al. ............. 455/118
6,091,941 A 7/2000 Moriyama et al. .......... 455/126
6,094,084 A 7/2000 Abou-Allam et al.
6,098,046 A 8/2000 Cooper et al.
6,098,886 A 8/2000 Swift et al. ............ 235/472.01
6,121,819 A 9/2000 Traylor ....................... 327/359
6,125,271 A 9/2000 Rowland et al. ............ 455/313
6,127,941 A 10/2000 Van Ryzin
6,144,236 A 11/2000 Vice et al. .................. 327/113
6,144,331 A 11/2000 Jiang
6,144,846 A 11/2000 Durec ........................ 455/323
6,147,340 A 11/2000 Levy ...................... 250/214 R
6,147,763 A 11/2000 Steinlechner ............... 356/484
6,150,890 A 11/2000 Damgaard et al. ............ 331/14
6,151,354 A 11/2000 Abbey
6,160,280 A 12/2000 Bonn et al.
6,169,733 B1 1/2001 Lee
6,175,728 B1 1/2001 Mitama ...................... 455/323
6,178,319 B1 1/2001 Kashima
6,204,789 B1 3/2001 Nagata
6,208,636 B1 3/2001 Tawil et al.
6,211,718 B1 4/2001 Souetinov
6,212,369 B1 4/2001 Avasarala
6,215,475 B1 4/2001 Meyerson et al. .......... 345/173
6,225,848 B1 5/2001 Tilley et al.
6,230,000 B1 5/2001 Tayloe
6,266,518 B1 7/2001 Sorrells et al. ............. 455/118
6,307,894 B1 10/2001 Eidson et al.
6,308,058 B1 10/2001 Souetinov et al.
6,313,685 B1 11/2001 Rabii
6,314,279 B1 * 11/2001 Mohindra ................... 455/304
6,317,589 B1 11/2001 Nash
6,321,073 B1 11/2001 Luz et al.
6,327,313 B1 12/2001 Traylor et al.
6,330,244 B1 12/2001 Swartz et al.
6,335,656 B1 1/2002 Goldfarb et al.
6,353,735 B1 3/2002 Sorrells et al. ............. 455/118
6,363,262 B1 3/2002 McNicol
6,366,622 B1 * 4/2002 Brown et al. ............... 375/322
6,370,371 B1 4/2002 Sorrells et al. ............. 455/323
6,385,439 B1 5/2002 Hellberg
6,400,963 B1 6/2002 Glöckler et al.
6,421,534 B1 7/2002 Cook et al.
6,437,639 B1 8/2002 Nguyen et al.
6,459,721 B1 10/2002 Mochizuki et al.
6,509,777 B1 1/2003 Razavi et al.
6,512,544 B1 1/2003 Merrill et al.
6,516,185 B1 2/2003 MacNally
6,531,979 B1 3/2003 Hynes
6,542,722 B1 4/2003 Sorrells et al.
6,560,301 B1 5/2003 Cook et al.
6,580,902 B1 6/2003 Sorrells et al.
6,600,795 B1 * 7/2003 Ohta et al. .................. 375/343
6,600,911 B1 7/2003 Morishige et al.
6,608,647 B1 8/2003 King
6,611,569 B1 8/2003 Schier et al.
6,628,328 B1 9/2003 Yokouchi et al.
6,633,194 B1 10/2003 Arnborg et al.
6,634,555 B1 10/2003 Sorrells et al.
6,647,250 B1 11/2003 Bultman et al.
6,686,879 B1 2/2004 Shattil
6,690,232 B1 2/2004 Ueno et al.
6,694,128 B1 2/2004 Sorrells et al.
6,697,603 B1 2/2004 Lovinggood et al.
6,704,549 B1 3/2004 Sorrells et al.
6,704,558 B1 3/2004 Sorrells et al.
6,741,139 B1 5/2004 Pleasant et al.
6,798,351 B1 9/2004 Sorrells et al.
6,801,253 B1 10/2004 Yonemoto et al.
6,813,485 B1 11/2004 Sorrells et al.
6,823,178 B1 11/2004 Pleasant et al.
6,836,650 B1 12/2004 Sorrells et al.
6,850,742 B1 2/2005 Fayyaz
6,853,690 B1 2/2005 Sorrells et al.
2001/0036818 A1 11/2001 Dobrovolny
2002/0037706 A1 3/2002 Ichara
2003/0081781 A1 5/2003 Jensen et al.

FOREIGN PATENT DOCUMENTS

| | | | |
|---|---|---|---|
| DE | 42 37 692 | C1 | 3/1994 |
| DE | 196 27 640 | A1 | 1/1997 |
| DE | 196 48 915 | A1 | 6/1998 |
| DE | 197 35 798 | C1 | 7/1998 |
| EP | 0 099 265 | A1 | 1/1964 |
| EP | 0 035 166 | A1 | 9/1981 |
| EP | 0 087 336 | A1 | 8/1983 |
| EP | 0 087 336 | B1 | 7/1986 |
| EP | 0 254 844 | A2 | 2/1988 |
| EP | 0 273 130 | A3 | 7/1988 |
| EP | 0 276 130 | A2 | 7/1988 |
| EP | 0 193 899 | B1 | 6/1990 |
| EP | 0 360 351 | A2 | 8/1990 |
| EP | 0 380 351 | A3 | 2/1991 |
| EP | 0 411 840 | A2 | 2/1991 |
| EP | 0 423 718 | A2 | 4/1991 |
| EP | 0 411 840 | A3 | 7/1991 |
| EP | 0 486 095 | A1 | 5/1992 |
| EP | 0 423 718 | A3 | 8/1992 |
| EP | 0 512 748 | A2 | 11/1992 |
| EP | 0 529 836 | A1 | 3/1993 |
| EP | 0 548 542 | A1 | 6/1993 |
| EP | 0 512 748 | A3 | 7/1993 |
| EP | 0 560 228 | A1 | 9/1993 |
| EP | 0 632 288 | A2 | 1/1995 |
| EP | 0 632 577 | A1 | 1/1995 |
| EP | 0 643 447 | A2 | 3/1995 |
| EP | 0 643 477 | A3 | 3/1995 |
| EP | 0 411 840 | B1 | 10/1995 |
| EP | 0 696 854 | A1 | 2/1996 |
| EP | 0 632 288 | A3 | 7/1996 |
| EP | 0 732 803 | A1 | 9/1996 |
| EP | 0 486 095 | B1 | 2/1997 |
| EP | 0 782 275 | A2 | 7/1997 |
| EP | 0 785 635 | A1 | 7/1997 |
| EP | 0 789 449 | A2 | 8/1997 |
| EP | 0 789 449 | A3 | 8/1997 |
| EP | 0 795 955 | A2 | 9/1997 |
| EP | 0 795 978 | A2 | 9/1997 |
| EP | 0 817 369 | A2 | 1/1998 |
| EP | 0 817 369 | A3 | 1/1998 |
| EP | 0 837 565 | A1 | 4/1998 |
| EP | 0 862 274 | A1 | 9/1998 |
| EP | 0 874 499 | A2 | 10/1998 |
| EP | 0 512 748 | B1 | 11/1998 |
| EP | 0 877 476 | A1 | 11/1998 |
| EP | 0 977 351 | A1 | 2/2000 |
| FR | 2 245 130 | | 4/1975 |
| FR | 2 669 787 | A1 | 5/1992 |
| FR | 2 743 231 | A1 | 7/1997 |
| GB | 2 161 344 | A | 1/1986 |
| GB | 2 215 945 | A | 9/1989 |
| GB | 2 324 919 | A | 11/1998 |
| JP | 47-2314 | | 2/1972 |
| JP | 55-66057 | | 5/1980 |
| JP | 58-114451 | | 9/1981 |
| JP | 58-7903 | | 1/1983 |
| JP | 58-133004 | | 8/1983 |
| JP | 59-144249 | | 8/1984 |
| JP | 60-58705 | | 4/1985 |
| JP | 60-130203 | | 7/1985 |
| JP | 61-30821 | | 2/1986 |
| JP | 63-54002 | | 3/1988 |
| JP | 63-65587 | | 3/1988 |
| JP | 63-153691 | | 6/1988 |
| JP | 2-39632 | | 2/1990 |
| JP | 2-131629 | | 5/1990 |
| JP | 2-276351 | | 11/1990 |
| JP | 4-123614 | | 4/1992 |
| JP | 4-127601 | | 4/1992 |
| JP | 5-175730 | | 7/1993 |
| JP | 5-175734 | | 7/1993 |
| JP | 5-327356 | | 12/1993 |
| JP | 6-237276 | | 8/1994 |
| JP | 7-154344 | | 6/1995 |
| JP | 7-307620 | | 11/1995 |
| JP | 8-23359 | | 1/1996 |
| JP | 8-32556 | | 2/1996 |
| JP | 8-139524 | | 5/1996 |
| JP | 9-36664 | | 2/1997 |
| WO | WO 80-01633 | A1 | 8/1980 |
| WO | WO 91/18445 | A1 | 11/1991 |
| WO | WO 91/23755 | A1 | 11/1991 |
| WO | WO 94/05077 | A1 | 3/1994 |
| WO | WO 95/01006 | A1 | 1/1995 |
| WO | WO96/02977 | A1 | 2/1996 |
| WO | WO 96/08078 | A1 | 3/1996 |
| WO | WO 96/39750 | A1 | 12/1996 |
| WO | WO 97/08839 | A2 | 3/1997 |
| WO | WO 97/08839 | A3 | 3/1997 |
| WO | 0 795 955 | A3 | 9/1997 |
| WO | WO 97/38490 | A1 | 10/1997 |
| WO | WO 98/00953 | A1 | 1/1998 |
| WO | WO 98/24201 | A1 | 6/1998 |
| WO | WO 98/40968 | A2 | 9/1998 |
| WO | WO 98/40968 | A3 | 9/1998 |
| WO | WO 99/23755 | A1 | 5/1999 |
| WO | WO 00/31659 | A1 | 6/2000 |

OTHER PUBLICATIONS

Razavi, B., "A 900-MHz/1.8-Ghz CMOS Transmitter for Dual-Band Applications," *Symposium on VLSI Circuits Digest of Technical Papers*, IEEE, pp. 128-131 (1998).

Ritter, G.M., "SDA, A New Solution for Transceivers," *16th European Microwave Conference*, Microwave Exhibitions and Publishers, pp. 729-733 (Sep. 8, 1986).

DIALOG File 351 (Derwent WPI) English Language Patent Abstract for FR 2 669 787, 1 page (May 29, 1992- Date of publication of application).

Akos, D.M. et al., "Direct Bandpass Sampling of Multiple Distinct RF Signals," *IEEE Transactions on Communications*, IEEE, Vol. 47, No. 7, pp. 983-988 (Jul. 1999).

Patel, M. et al., "Bandpass Sampling for Software Radio Receivers, and the Effect of Oversampling on Aperture Jitter," *VTC 2002*, IEEE, pp. 1901-1905 (2002).

English-language Abstract of Japanese Patent Publication No. 61-030821, 1 Page (Feb. 13, 1986- Date of publication of application).

English-language Abstract of Japanese Patent Publication No. 05-327356, 1 Page (Dec. 10, 1993—Date of publication of application).

Tayloe, D., "Low-noise, High-performance Zero IF Quadrature Detector/Preamplifier," *RF Design*, Primedia Business Magazines & Media, Inc., pp. 58, 60, 62 and 69 (Mar. 2003).

Dines, J.A.B., "Smart Pixel Optoelectronic Receiver Based on a Charge Sensitive Amplifier Design," *IEEE Journal of Selected Topics in Quantum Electronics*, IEEE, vol. 2, No. 1, pp. 117-120 (Apr. 1996).

Simoni, A. et al., "A Digital Camera for Machine Vision," *20th International Conference on Industrial Electronics, Control and Instrumentation*, IEEE, pp. 879-883 (Sep. 1994).

Stewart, R.W. and Pfann, E., "Oversampling and sigma-delta strategies for data conversion," *Electronics & Communication Engineering Journal*, IEEE, pp. 37-47 (Feb. 1998).

Rudell, J.C. et al., "A 1.9-Ghz Wide-Band IF Double Conversion CMOS Receiver for Cordless Telephone Applications," *IEEE Journal of Solid-State Circuits*, IEEE, vol. 32, No. 12, pp. 2071-2088 (Dec. 1997).
English-language Abstract of Japanese Patent Publication No. 09-036664, from http://www1.ipdl.jpo.go.jp, 2 Pages (Feb. 7, 1997—Date of publication of application).
Simoni, A. et al., "A Single-Chip Optical Sensor with Analog Memory for Motion Detection," *IEEE Journal of Solid-State Circtuits*, IEEE, vol. 30, No. 7, pp. 800-806 (Jul. 1995).
English Translation of German Patent Publication No. DE 196 48 915 A1, 10 pages.
Deboo, Gordon J., *Integrated Circuits and Semiconductor Devices,* 2nd Edition, McGraw-Hill, Inc., pp. 41-45 (1977).
Hellwarth, G.A. and Jones, G.D, "Automatic Conditioning of Speech Signals," *IEEE Transactions on Audio and Electroacoustics*, vol. AU-16, No. 2, pp. 169-179 (Jun. 1968).
Aghvami, H. et al., "Land Mobile Satellites Using the Highly Elliptic Orbits- The UK T-SAT Mobile Payload," *Fourth International Conference on Satellite Systems for Mobile Communications and Navigation*, IEE, pp. 147-156 (Oct. 17-19, 1988).
Akers, N.P. et al., "RF Sampling Gates: a Brief Review," *IEE Proceedings*, IEE, vol. 133, Part A, No. 1, pp. 45-49 (Jan. 1986).
Al-Ahmad, H.A.M. et al., "Doppler Frequency Correction for a Non-Geostationary Communications Satellite. Techniques for CERS and T-SAT," *Electronics Division Colloquium on Low Noise Oscillators and Synthesizers*, IEE, pp. 4/1-4/5 (Jan. 23, 1986).
All, I. et al., "Doppler Characterization for LEO Satellites," *IEEE Transactions on Communications*, IEEE, vol. 46, No. 3, pp. 309-313 (Mar. 1998).
Allan, D.W., "Statistics of Atomic Frequency Standards," *Proceedings Of The IEEE Special Issue on Frequency Stability*, IEEE, pp. 221-230 (Feb. 1966).
Allstot, D.J. et al., "MOS Switched Capacitor Ladder Filters," *IEEE Journal of Solid-State Circuits*, IEEE, vol. SC-13, No. 6, pp. 806-814 (Dec. 1978).
Allstot, D.J. and Black Jr. W.C., "Technological Design Considerations for Monolithic MOS Switched-Capacitor Filtering Systems," *Proceedings of the IEEE*, IEEE, vol. 71, No. 8, pp. 967-986 (Aug. 1983).
Alouini, M. et al., "Channel Characterization and Modeling for Ka-Band Very Small Aperture Terminals," *Proceedings Of the IEEE*, IEEE, vol. 85, No. 6, pp. 981-997 (Jun., 1997).
Andreyev, G.A. and Ogarev, S.A., "Phase Distortions of Keyed Millimeter-Wave Signals in the Case of Propagation in a Turbulent Atmosphere," *Telecommunications and Radio Engineering, Scripta Technica*, vol. 43, No. 12, pp. 87-90 (Dec. 1988).
Antonetti, A. et al., "Optoelectronic Sampling in the Picosecond Range," *Optics Communications*, North-Holland Publishing Company, vol. 21, No. 2, pp. 211-214 (May 1977).
Austin, J. et al., "Doppler Correction of the Telecommunication Payload Oscillators in the UK T-SAT," *18th European Microwave Conference*, Microwave Exhibitions and Publishers Ltd., pp. 851-857 (Sep, 12-15, 1988).
Auston, D.H., "Picosecond optoelectronic switching and gating in silicon," *Applied Physics Letters*, American Institute of Physics, vol. 26, No. 3, pp. 101-103 (Feb. 1, 1975).
Baher, H., "Transfer Functions for Switched-Capacitor and Wave Digital Filters," *IEEE Transactions on Circuits and Systems*, IEEE Circuits and Systems Society, vol. CAS-33, No. 11, pp. 1138-1142 (Nov. 1986).
Baines, R., "The DSP Bottleneck," *IEEE Communications Magazine*, IEEE Communications Society, pp. 46-54 (May 1995).
Banjo, O.P. and Vilar, E., "Binary Error Probabilities on Earth-Space Links Subject to Scintillation Fading," *Electronics Letters*, IEE, vol. 21, No. 7, pp. 296-297 (Mar. 28, 1985).
Banjo, O.P. and Vilar, E., "The Dependence of Slant Path Amplitude Scintillations on Various Meteorological Parameters," *Fifth International Conference on Antennas and Propagation* (*ICAP 87*) *Part 2: Propagation*, IEE, pp. 277-280 (Mar. 30-Apr. 2, 1987).
Banjo, O.P. and Vilar, E. "Measurement and Modeling of Amplitude Scintillations on Low-Elevation Earth-Space Paths and Impact on Communication Systems," *IEEE Transactions on Communications*, IEEE Communications Society, vol. COM-34, No. 8, pp. 774-780 (Aug. 1986).
Banjo, O.P. et al., "Tropospheric Amplitude Spectra Due to Absorption and Scattering In Earth-Space Paths," *Fourth International Conference on Antennas and Propagation* (*ICAP 85*), IEE, pp. 77-82 (Apr. 16-19, 1985).
Baslli,P. et al., "Case Study of Intense Scintillation Events on the OTS Path," *IEEE Transactions on Antennas and Propagation*, IEEE, vol. 38, No. 1, pp. 107-113 (Jan. 1990).
Baslli, P. et al., "Observation of High $C^2$ and Turbulent Path Length on OTS Space-Earth Link," *Electronics Letters*, IEE, vol. 24, No. 17, pp. 1114-1116 (Aug. 18, 1988).
Blakey, J.R. et al., "Measurement of Atmospheric Millimetre-Wave Phase Scintillations in an Absorption Region," *Electronics Letters*, IEE, vol. 21, No. 11, pp. 486-487 (May 23, 1985).
Burgueño, A. et al., "Influence of rain gauge integration time on the rain rate statistics used in microwave communications," *annales des tèlècommunications*, International Union of Radio Science, pp. 522-527 (Sep./Oct. 1988).
Burgueño, A. et al., "Long-Term Joint Statistical Analysis of Duration and Intensity of Rainfall Rate with Application to Microwave Communications," *Fifth International Conference on Antennas and Propagation* (*ICAP 87*) *Part 2: Propagation*, IEE, pp. 198-201 (Mar. 30-Apr. 2, 1987).
Burgueño, A. et al., "Long-Term Statistics of Precipitation Rate Return Periods in the Context of Microwave Communications," *Sixth International Conference on Antennas and Propagation* (*ICAP 89*) *Part 2: Propagation*, IEE, pp. 297-301 (Apr. 4-7, 1989).
Burgueño, A. et al., "Spectral Analysis of 49 Years of Rainfall Rate and Relation to Fade Dynamics," *IEEE Transactions on Communications*, IEEE Communications Society, vol. 38, No. 9, pp. 1359-1366 (Sep. 1990).
Cataian, C. and Vilar, E., "Approach for satellite slant path remote sensing," *Electronics Letters*, IEE, vol. 34, No. 12, pp. 1238-1240 (Jun. 11, 1998).
Chan, P. et al., "A Highly Linear 1-GHz CMOS Downconversion Mixer," *European Solid State Circuits Conference*, IEEE Communication Society, pp. 210-213 (Sep. 22-24, 1993).
Michael J. Buttman filed in U.S. Appl. No. 09/176,022, which is directed to related subject matter, 2 pages.
Robert W. Cook filed in U.S. Appl. No. 09/176,022, which is directed to related subject matter, 2 pages.
Alex Holtz filed in U.S. Appl. No. 09/176,022, which is directed to related subject matter, 3 pages.
Richard C. Looke filed in U.S. Appl. No. 09/176,022, which is directed to related subject matter, 2 pages.

Charley D. Moses, Jr. filed in U.S. Appl. No. 09/176,022, which is directed to related subject matter, 2 pages.
Jeffrey L. Parker and David F. Sorrells, with attachment Exhibit 1, filed in U.S. Appl. No. 09/176,022, which is directed to related subject matter, 130 pages.
Dewey, R.J. and Collier, C.J., "Multi-Mode Radio Receiver," *Electronics Division Colloquium on Digitally Implemented Radios*, IEE, pp. 3/1-3/5 (Oct. 18, 1985).
DIALOG File 347 (JAPIO) English Language Patent Abstract for JP 2-276351, 1 page (Nov. 13, 1990—Date of publication of application).
DIALOG File 347 (JAPIO) English Language Patent Abstract for JP 2-131629, 1 page (May 21, 1990—Date of publication of application).
DIALOG File 347 (JAPIO) English Language Patent Abstract for JP 2-39632, 1 page (Feb. 6, 1990—Date of publication of application).
DIALOG File 348 (European Patents) English Language Patent Abstract for EP 0 785 635 A1, 3 pages (Dec. 26, 1996—Date of publication of application).
DIALOG File 348 (European Patents) English Language Patent Abstract for EP 35166 A1, 2 pages (Feb. 18, 1981—Date of publication of application).
"DSO takes sampling rate to 1 Ghz," *Electronic Engineering*, Morgan Grampian Publishers, vol. 59, No. 723, pp. 77 and 79 (Mar. 1987).
Erdi, G. and Henneuse, P.R., "A Precision FET-Less Sample-and-Hold with High Charge-to-Droop Current Ratio," *IEEE Journal of Solid-State Circuits*, IEEE, vol. SC-13, No. 6, pp. 864-873 (Dec. 1978).
Faulkner, N.D. and Vilar, E., "Subharmonic Sampling for the Measurement of Short Term Stability of Microwave Oscillators," *IEEE Transactions on Instrumentation and Measurement*, IEEE, vol. IM-32, No. 1, pp. 208-213 (Mar. 1983).
Faulkner, N.D. et al., "Sub-Harmonic Sampling for the Accurate Measurement of Frequency Stability of Microwave Oscillators," *CPEM 82 Digest: Conference on Precision Electromagnetic Measurements*, IEEE, pp. M-10 and M-11 (1982).
Faulkner, N.D. and Vilar, E., "Time Domain Analysis of Frequency Stability Using Non-Zero Dead-Time Counter Techniques," *CPEM 84 Digest Conference on Precision Electromagnetic Measurements*, IEEE, pp. 81-82 (1984).
Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958-1965 (Nov. 1990).
Fukahori, K., "A CMOS Narrow-Band Signaling Filter with Q Reduction," *IEEE Journal of Solid-State Circuits*, IEEE, vol. SC-19, No. 6, pp. 926-932 (Dec. 1984).
Fukuchi, H. and Otsu, Y., "Available time statistics of rain attenuation on earth-space path," *IEE Proceedings-H: Microwaves, Antennas and Propagation*, IEE, vol. 135, Pt. H, No. 6, pp. 387-390 (Dec. 1988).
Gibbins, C.J. and Chadha, R., "Millimetre-wave propagation through hydrocarbon flame," *IEE Proceedings*, IEE, vol. 134, Pt. H, No. 2, pp. 169-173 (Apr. 1987).
Gilchrist, B. et al., "Sampling hikes performance of frequency synthesizers," *Microwaves & RF*, Hayden Publishing, vol. 23, No. 1, pp. 93-94 and 110 (Jan. 1984).
Gossard, E.E., "Clear weather meteorological effects on propagation at frequencies above 1 Ghz," *Radio Science*, American Geophysical Union, vol. 16, No. 5, pp. 589-608 (Sep.-Oct. 1981).
Gregorian, R. et al., "Switched-Capacitor Circuit Design," *Proceedings of the IEEE*, IEEE, vol. 71, No. 8, pp. 941-966 (Aug. 1983).
Groshong et al., "Undersampling Techniques Simplify Digital Radio," *Electronic Design*, Penton Publishing, pp. 67-68, 70, 73-75 and 78 (May 23, 1991).
Grove, W.M., "Sampling for Oscilloscopes and Other RF Systems: Dc through X-Band," *IEEE Transactions on Microwave Theory and Techniques*, IEEE, pp. 629-635 (Dec. 1988).
Haddon, J. et al., "Measurement of Microwave Scintillations on a Satellite Down-Link at X-Band," *Antennas and Propagation*, IEE, pp. 113-117 (1981).
Haddon, J. and Vilar, E., "Scattering Induced Microwave Scintillations from Clear Air and Rain on Earth Space Paths and the Influence of Antenna Aperture," *IEEE Transactions on Antennas and Propagation*, IEEE, vol. AP-34, No. 5, pp. 645-657 (May 1986).
Hafdaliah, H. et al., "2-4 Ghz MESFET Sampler," *Electronics Letters*, IEE, vol. 24, No. 3, pp. 151-153 (Feb. 4, 1988).
Herben, M.H.A.J., "Amplitude and Phase Scintillation Measurements on 8-2 km Line-Of-Sight Path at 30 Ghz," *Electronics Letters*, IEE, vol. 18, No. 7, pp. 287-289 (Apr. 1, 1982).
Hewitt, A. et al., "An 18 Ghz Wideband LOS Multipath Experiment," *International Conference on Measurements for Telecommunication Transmission Systems—MTTS 85*, IEE, pp. 112-116 (Nov. 27-28, 1985).
Hewitt, A. et al., "An Autoregressive Approach to the Identification of Multipath Ray Parameters from Field Measurements," *IEEE Transactions on Communications*, IEEE Communications Society, vol.,37, No. 11, pp. 1136-1143 (Nov. 1989).
Hewitt, A. and Vilar, E., "Selective fading on LOS Microwave Links: Classical and Spread-Spectrum Measurement Techniques," *IEEE Transactions on Communications*, IEEE Communications Society, vol. 36, No. 7, pp. 789-796 (Jul. 1988).
Hospitalier, E., "Instruments for Recording and Observing Rapidly Varying Phenomena," *Science Abstracts*, IEE, vol. VII, pp. 22-23 (1904).
Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115-121 (Sep. 18-20, 1990).
Hu, X., *A Switched-Current Sample-and-Hold Amplifier for FM Demodulation*, Thesis for Master of Applied Science, Dept. of Electrical and Computer Engineering, University of Toronto, UMI Dissertation Services, pp. 1-64 (1995).
Hung, H-L. A. et al., "Characterization of Microwave Integrated Circuits Using An Optical Phase-Locking and Sampling System," *IEEE MTT-S Digest*, IEEE, pp. 507-510 (1991).
Hurst, P.J., "Shifting the Frequency Response of Switched-Capacitor Filters by Nonuniform Sampling," *IEEE Transactions on Circuits and Systems*, IEEE Circuits and Systems Society, vol. 38, No. 1, pp. 12-19 (Jan. 1991).
Itakura, T., "Effects of the sampling pulse width on the frequency characteristics of a sample-and-hold circuit," *IEE Proceedings Circuits, Devices and Systems*, IEE, vol. 141, No. 4, pp. 328-336 (Aug. 1994).

Janssen, J.M.L., "An Experimental 'Stroboscopic' Oscilloscope for Frequencies up to about 50 Mc/s: I. Fundamentals," *Philips Technical Review*, Philips Research Laboratories, vol. 12, No. 2, pp. 52-59 (Aug. 1950).
Janssen, J.M.L. and Michels, A.J., "An Experimental 'Stroboscopic' Oscilloscope for Frequencies up to about 50 Mc/s: II. Electrical Build-Up," *Philips Technical Review*, Philips Research Laboratories, vol. 12, No. 3, pp. 73-82 (Sep. 1950).
Jondral, V.F. et al., "Doppler Profiles for Communication Satellites," *Frequenz*, Herausberger, pp. 111-116 (May-Jun. 1996).
Kaleh, G.K., "A Frequency Diversity Spread Spectrum System for Communication in the Presence of In-band Interference," *1995 IEEE Globecom*, IEEE Communications Society, pp. 66-70 (1995).
Karasawa, Y. et al., "A New Prediction Method for Tropospheric Scintillation on Earth-Space Paths," *IEEE Transactions on Antennas and Propagation*, IEEE Antennas and Propagation Society, vol. 36, No. 11, pp. 1608-1614 (Nov. 1988).
Kirsten, J. and Fleming, J., "Undersampling reduces data-acquisition costs for select applications," *EDN*, Cahners Publishing, vol. 35, No. 13, pp. 217-222, 224, 226-228 (Jun. 21, 1990).
Lam, W.K, et al., "Measurement of the Phase Noise Characteristics of an Unlocked Communications Channel Identifier," *Proceedings Of the 1993 IEEE International Frequency Control Symposium*, IEEE, pp. 283-288 (Jun. 2-4, 1993).
Lam, W.K. et al., "Wideband sounding of 11.6 Ghz transhorizon channel," *Electronics Letters*, IEE, vol. 30, No. 9, pp. 738-739 (Apr. 28, 1994).
Larkin, K.G., "Efficient demodulator for bandpass sampled AM signals," *Electronics Letters*, IEE, vol. 32, No. 2, pp. 101-102 (Jan. 18, 1996).
Lau, W.H. et al., "Analysis of the Time Variant Structure of Microwave Line-of-sight Multipath Phenomena," *IEEE Global Telecommunications Conference & Exhibition*, IEEE, pp. 1707-1711 (Nov. 28-Dec. 1, 1988).
Lau, W.H. et al., "Improved Prony Algorithm to Identify Multipath Components," *Electronics Letters*, IEE, vol. 23, No. 20, pp. 1059-1060 (Sep. 24, 1987).
Lesage, P. and Audoin, C., "Effect of Dead-Time on the Estimation of the Two-Sample Variance," *IEEE Transactions on Instrumentation and Measurement*, IEEE Instrumentation and Measurement Society, vol. IM-28, No. 1, pp. 6-10 (Mar. 1979).
Liechti, C.A., "Performance of Dual-gate GaAs MESFET's as Gain-Controlled Low-Noise Amplifiers and High-Speed Modulators," *IEEE Transactions on Microwave Theory and Techniques*, IEEE Microwave Theory and Techniques Society, vol. MTT-23, No. 6, pp. 461-469 (Jun. 1975).
Linnenbrink, T.E. et al., "A One Gigasample Per Second Transient Recorder," *IEEE Transactions on Nuclear Science*, IEEE Nuclear and Plasma Sciences Society, vol. NS-26, No. 4, pp. 4443-4449 (Aug. 1979).
Liou, M.L., "A Tutorial on Computer-Aided Analysis of Switched-Capacitor Circuits," *Proceedings of the IEEE*, IEEE, vol. 71, No. 8, pp. 987-1005 (Aug. 1983).
Lo, P. et al., "Coherent Automatic Gain Control," *IEE Colloquium on Phase Locked Techniques*, IEE, pp. 2/1-2/6 (Mar. 26, 1980).
Lo, P. et al., "Computation of Rain Induced Scintillations on Satellite Down-Links at Microwave Frequencies," *Third International Conference on Antennas and Propagation (ICAP 83)*, pp. 127-131 (Apr. 12-15, 1983).
Lo, P.S.L.O. et al., "Observations of Amplitude Scintillations on a Low-Elevation Earth-Space Path," *Electronics Letters*, IEE, vol. 20, No. 7, pp. 307-308 (Mar. 29, 1984).
Madanl, K. and Althison, C.S., "A 20 Ghz Microwave Sampler," *IEEE Transactions on Microwave Theory and Techniques*, IEEE Microwave Theory and Techniques Society, vol. 40, No. 10, pp. 1960-1963 (Oct. 1992).
Marsland, R.A. et al., "130 Ghz GaAs monolithic integrated circuit sampling head," *Appl. Phys. Lett.*, American Institute of Physics, vol. 55, No. 6, pp. 592-594 (Aug. 7, 1989).
Martin, K. and Sedra, A.S., "Switched-Capacitor Building Blocks for Adaptive Systems," *IEEE Transactions on Circuits and Systems*, IEEE Circuits and Systems Society, vol. CAS-28, No. 6, pp. 576-584 (Jun. 1981).
Marzano, F.S. and d'Auria, G., "Model-based Prediction of Amplitude Scintillation variance due to Clear-Air Tropospheric Turbulence on Earth-Satellite Microwave Links," *IEEE Transactions on Antennas and Propagation*, IEEE Antennas and Propagation Society, vol. 46, No. 10, pp. 1506-1518 (Oct. 1998).
Matricclanl, E., "Prediction of fade durations due to rain in satellite communication systems," *Radio Science*, American Geophysical Union, vol. 32, No. 3, pp. 935-941 (May-Jun. 1997).
McQueen, J.G., "The Monitoring of High-Speed Waveforms," *Electronic Engineering*, Morgan Brothers Limited, vol. XXIV, No. 296, pp. 436-441 (Oct., 1952).
Merkelo, J. and Hall, R.D., "Broad-Band Thin-Film Signal Sampler," *IEEE Journal of Solid-State Circuits*, IEEE, vol. SC-7, No. 1, pp. 50-54 (Feb. 1972).
Merlo, U. et al., "Amplitude Scintillation Cycles in a Sirlo Satellite-Earth Link," *Electronics Letters*, IEE, vol. 21, No. 23, pp. 1094-1096 (Nov. 7, 1985).
Morris, D., "Radio-holographic reflector measurement of the 30-m millimeter radio telescope at 22 Ghz with a cosmic signal source," *Astronomy and Astrophysics*, Springer-Verlag, vol. 203, No. 2, pp. 399-406 (Sep. (II) 1988).
Moulsley, T.J. et al., "The efficient acquisition and processing of propagation statistics," *Journal of the Institution of Electronic and Radio Engineers*, IERE, vol. 55, No. 3, pp. 97-103 (Mar. 1985).
Ndzl, D. et al., "Wide-Band Statistical Characterization of an Over-the-Sea Experimental Transhorizon Link," *IEE Colloquium on Radio Communications at Microwave and Millimetre Wave Frequencies*, IEE, pp. 1/1-1/16 (Dec. 16, 1996).
Ndzi, D. et al., "Wideband Statistics of Signal Levels and Doppler Spread on an Over-The-Sea Transhorizon Link," *IEE Colloquium on Propagation Characteristics and Related System Techniques for Beyond Line-of-Sight Radio*, IEE, pp. 9/1-9/6 (Nov. 24, 1997).
"New zero IF chipset from Philips," *Electronic Engineering*, United News & Media, vol. 67, No. 825, p. 10 (Sep. 1995).
Ohara, H. et al., "First monolithic PCM filter cuts cost of telecomm systems," *Electronic Design*, Hayden Publishing Company, vol. 27, No. 6, pp. 130-135 (Apr. 12, 1979).
Oppenhelm, A.V. et al., *Signals and Systems*, Prentice-Hall, pp. 527-531 and 561-562 (1983).
Ortgies, G., "Experimental Parameters Affecting Amplitude Scintillation Measurements on Satellite Links," *Electronics Letters*, IEE, vol. 21, No. 17, pp. 771-772 (Aug. 15, 1985).
Pärssinen et al., "A 2-GHz Subharmonic Sampler for Signal Downconversion," *IEEE Transactions on Microwave*

*Theory and Techniques*, IEEE, vol. 45, No. 12, 7 pages (Dec. 1997).
Peeters, G. et al., "Evaluation of Statistical Models for Clear-Air Scintillation Prediction Using Olympus Satellite Measurements," *International Journal of Satellite Communications*, John Wiley and Sons, vol. 15, No. 2, pp. 73-88 (Mar.-Apr. 1997).
Perrey, A.G. and Schoenwatter, H.K., *NBS Technical Note 1121: A Schottky Diode Bridge Sampling Gate, U.S. Dept. of Commerce*, pp. 1-14 (May 1980).
Poulton, K. et al., "A 1-Ghz 6-bit ADC System," *IEEE Journal of Solid-State Circuits*, IEEE, vol. SC-22, No. 6, pp. 962-969 (Dec. 1987).
Press Release, "Parkervision, Inc. Announces Fiscal 1993 Results," Lippert/Heilshorn and Associates, 2 Pages (Apr. 6, 1994).
Press Release, "Parkervision, Inc. Announces the Appointment of Michael Baker to the New Position of National Sales Manager," Lippert/Heilshom and Associates, 1 Page (Apr. 7, 1994).
Press Release, "Parkervision's Cameraman Well-Received By Distance Learning Market," Lippert/Heilshom and Associates, 2 Pages (Apr. 8, 1994).
Press Release, "Parkervision, Inc. Announces First Quarter Financial Results," Lippert/Heilshom and Associates, 2 Pages (Apr. 26, 1994).
Press Release, "Parkervision, Inc. Announces the Retirement of William H. Fletcher, Chief Financial Officer," Lippert/Heilshom and Associates, 1 Page (May 11, 1994).
Press Release, "Parkervision, Inc. Announces New Cameraman System II™ At Infocomm Trade Show," Lippert/Heilshom and Associates, 3 Pages (Jun. 9, 1994).
Press Release, "Parkervision, Inc. Announces Appointments to its National Sales Force," Lippert/Heilshom and Associates, 2 Pages (Jun. 17, 1994).
Press Release, "Parkervision, Inc. Announces Second Quarter and Six Months Financial Results," Lippert/Heilshom and Associates, 3 Pages (Aug. 9, 1994).
Press Release, "Parkervision, Inc. Announces Third Quarter and Nine Months Financial Results," Lippert/Heilshom and Associates, 3 Pages (Oct. 28, 1994).
Press Release, "Parkervision, Inc. Announces First Significant Dealer Sale of its *Cameraman*® System II," Lippert/Heilshom and Associates, 2 Pages (Nov. 7, 1994).
Press Release, "Parkervision, Inc. Announces Fourth Quarter and Year End Results," Lippert/Heilshom and Associates, 2 Pages (Mar. 1, 1995).
Press Release, "Parkervision, Inc. Announces Joint Product Developments With VTEL," Lippert/Heilshom and Associates, 2 Pages (Mar. 21, 1995).
Press Release, "Parkervision, Inc. Announces First Quarter Financial Results," Lippert/Heilshom and Associates, 3 Pages (Apr. 28, 1995).
Press Release, "Parkervision Wins Top 100 Product Districts' Choice Award," Parkervision Marketing and Manufacturing Headquarters, 1 Page (Jun. 29, 1995).
Press Release, "Parkervision National Sales Manager Next President of USDLA," Parkervision Marketing and Manufacturing Headquarters, 1 Page (Jul. 6, 1995).
Press Release, "Parkervision Granted New Patent," Parkervision Marketing and Manufacturing Headquarters, 1 Page (Jul. 21, 1995).
Press Release, "Parkervision, Inc. Announces Second Quarter and Six Months Financial Results," Parkervision Marketing and Manufacturing Headquarters, 2 Pages (Jul. 31, 1995).
Press Release, "Parkervision, Inc. Expands Its Cameraman System II Product Line," Parkervision Marketing and Manufacturing Headquarters, 2 Pages (Sep. 22, 1995).
Press Release, "Parkervision Announces New Camera Control Technology," Parkervision Marketing and Manufacturing Headquarters, 2 Pages (Oct. 25, 1995).
Press Release, "Parkervision, Inc. Announces Completion of VTEL/Parkervision Joint Product Line," Parkervision Marketing and Manufacturing Headquarters, 2 Pages (Oct. 30, 1995).
Press Release, "Parkervision, Inc. Announces Third Quarter and Nine Months Financial Results," Parkervision Marketing and Manufacturing Headquarters, 2 Pages (Oct. 30, 1995).
Press Release, "Parkervision's Cameraman Personal Locator Camera System Wins Telecon XV Award," Parkervision Marketing and Manufacturing Headquarters, 2 Pages (Nov. 1, 1995).
Press Release, "Parkervision, Inc. Announces Purchase Commitment From VTEL Corporation," Parkervision Marketing and Manufacturing Headquarters, 1 Page (Feb. 26, 1996).
Press Release, "ParkerVision, Inc. Announces Fourth Quarter and Year End Results," Parkervision Marketing and Manufacturing Headquarters, 2 Pages (Feb. 27, 1996).
Press Release, "ParkerVision, Inc. Expands its Product Line," Parkervision Marketing and Manufacturing Headquarters, 2 Pages (Mar. 7, 1996).
Press Release, "ParkerVision Files Patents for its Research of Wireless Technology" Parkervision Marketing and Manufacturing Headquarters, 1 Page (Mar. 28, 1996).
Press Release, "Parkervision, Inc. Announces First Significant Sale of its Camerman© Three-Chip System," Parkervision Marketing and Manufacturing Headquarters, 2 Pages (Apr. 12, 1996).
Press Release, "Parkervision, Inc. Introduces New Product Line For Studio Production Market," Parkervision Marketing and Manufacturing Headquarters, 2 Pages (Apr. 15, 1996).
Press Release, "Parkervision, Inc. Announces Private Placement of 800,000 Shares," Parkervision Marketing and Manufacturing Headquarters, 1 Page (Apr. 15, 1996).
Press Release, "Parkervision, Inc. Announces First Quarter Financial Results," Parkervision Marketing and Manufacturing Headquarters, 3 Pages (Apr. 30, 1996).
Press Release, "ParkerVision's New Studio Product Wins Award," Parkervision Marketing and Manufacturing Headquarters, 2 Pages (Jun. 5, 1996).
Press Release, "Parkervision, Inc. Announces Second Quarter and Six Months Financial Results," Parkervision Marketing and Manufacturing Headquarters, 3 Pages (Aug. 1, 1996).
Press Release, "Parkervision, Inc. Announces Third Quarter and Nine Months Financial Results," Parkervision Marketing and Manufacturing Headquarters, 2 Pages (Oct. 29, 1996).
Press Release, "PictureTel and ParkerVision Sign Reseller Agreement ," Parkervision Marketing and Manufacturing Headquarters, 2 Pages (Oct. 30, 1996).
Press Release, "CLI and ParkerVision Bring Enhanced Ease-of-Use to Videoconferencing ," CLI/Parkervision, 2 Pages (Jan. 20, 1997).

Press Release, "Parkervision, Inc. Announces Fourth Quarter and Year End Results," Parkervision Marketing and Manufacturing Headquarters, 3 Pages (Feb. 27, 1997).
Press Release, "Parkervision, Inc. Announces First Quarter Financial Results," Parkervision Marketing and Manufacturing Headquarters, 3 Pages (Apr. 29, 1997).
Press Release, "NEC and Parkervision Make Distance Learning Closer," NEC America, 2 Pages (Jun. 16, 1997).
Press Release, "Parkervision Supplies JPL With Robotic Cameras, Cameraman Shot Director for Mars Mission ," Parkervision Marketing and Manufacturing Headquarters, 2 Pages (Jul. 8, 1997).
Press Release, "ParkerVision and IBM Join Forces to Create Wireless Computer Peripherals," Parkervision Marketing and Manufacturing Headquarters, 2 Pages (Jul. 23, 1997).
Press Release, "ParkerVision, Inc. Announces Second Quarter and Six Months Financial Results," Parkervision Marketing and Manufacturing Headquarters, 3 Pages (Jul. 31, 1997).
Press Release, "Parkervision, Inc. Announces Private Placement of 990,000 Shares," Parkervision Marketing and Manufacturing Headquarters, 2 Pages (Sep. 8, 1997).
Press Release, "Wal-Mart Chooses Parkervision for Broadcast Production," Parkervision Marketing and Manufacturing Headquarters, 2 Pages (Oct. 24, 1997).
Press Release, "Parkervision, Inc. Announces Third Quarter Financial Results," Parkervision Marketing and Manufacturing Headquarters, 3 Pages (Oct. 30, 1997).
Press Release, "ParkerVision Announces Breakthrough in Wireless Radio Frequency Technology." Parkervision Marketing and Manufacturing Headquarters, 3 Pages (Dec. 10, 1997).
Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).
Press Release, "Parkervision Announces Existing Agreement with IBM Terminates- Company Continues with Strategic Focus Announced in December," Parkervision Marketing and Manufacturing Headquarters, 2 Pages (Jan. 27, 1998).
Press Release, "Laboratory Tests Verify Parkervision Wireless Technology," Parkervision Marketing and Manufacturing Headquarters, 2 Pages (Mar. 3, 1998).
Press Release, "Parkervision, Inc. Announces Fourth Quarter and Year End Financial Results," Parkervision Marketing and Manufacturing Headquarters, 3 Pages (Mar. 5, 1998).
Press Release, "Parkervision Awarded Editors' Pick of Show for NAB 98," Parkervision Marketing and Manufacturing Headquarters, 2 Pages (Apr. 15, 1998).
Press Release, "Parkervision, Inc. Announces First Quarter Financial Results," Parkervision Marketing and Manufacturing Headquarters, 3 Pages (May 4, 1998).
Press Release, "Parkervision 'DIRECT2DATA' Introduced in Response to Market Demand," Parkervision Marketing and Manufacturing Headquarters, 3 Pages (Jul. 29, 1998).
Press Release, "Parkervision Expands Senior Management Team," Parkervision Marketing and Manufacturing Headquarters, 2 Pages (Jul. 29, 1998).
Press Release, "Parkervision Announces Second Quarter and Six Month Financial Results," Parkervision Marketing and Manufacturing Headquarters, 4 Pages (Jul. 30, 1998).
Press Release, "Parkervision Announces Third Quarter and Nine Month Financial Results," Parkervision Marketing and Manufacturing Headquarters, 3 Pages (Oct. 30, 1998).
Press Release, "Questar Infocomm, Inc. Invests $5 Million in Parkervision Common Stock" Parkervision Marketing and Manufacturing Headquarters, 3 Pages (Dec. 2, 1998).
Press Release, "Parkervision Adds Two New Directors," Parkervision Marketing and Manufacturing Headquarters, 2 Pages (Mar. 5, 1999).
Press Release, "Parkervision Announces Fourth Quarter and Year End Financial Results," Parkervision Marketing and Manufacturing Headquarters, 3 Pages (Mar. 5, 1999).
Press Release, "Joint Marketing Agreement Offers New Automated Production Solution," Parkervision Marketing and Manufacturing Headquarters, 2 Pages (Apr. 13, 1999).
"Project COST 205: Scintillations In Earth-satellite Links," *Alta Frequenza: Scientific Review in Electronics*, AEI, vol. LIV, No. 3, pp. 209-211 (May-Jun., 1985).
Razavi, B., *RF Microelectronics*, Prentice-Hall, pp. 147-149 (1998).
Reeves, R.J.D., "The Recording and Collocation of Waveforms (Part 1)," *Electronic Engineering, Morgan Brothers Limited*, vol. 31, No. 373, pp. 130-137 (Mar. 1959).
Reeves, R.J.D., "The Recording and Collocation of Waveforms (Part 2)," *Electronic Engineering, Morgan Brothers Limited*, vol. 31, No. 374, pp. 204-212 (Apr. 1959).
Rein, H.M. and Zahn, M., "Subnanosecond-Pulse Generator with Variable Pulsewidth Using Avalanche Transistors," *Electronics Letters*, IEE, vol. 11, No. 1. pp. 21-23 (Jan. 9, 1975).
Riad, S.M. and Nahman, N.S., "Modeling of the Feed-through Wideband (DC to 12.4 Ghz) Sampling-Head," *IEEE MTT-S International Microwave Symposium Digest*, IEEE, pp. 267-269 (Jun. 27-29, 1978).
Rizzoll, V. et al., "Computer-Aided Noise Analysis of MESFET and HEMT Mixers," *IEEE Transactions on Microwave Theory and Techniques*, IEEE, vol. 37, No. 9, pp. 1401-1410 (Sep. 1989).
Rowe, H.E., *Signals and Noise In Communication Systems*, D. Van Nostrand Company, Inc., Princeton, New Jersey, including, for example, Chapter V, Pulse Modulation Systems (1965).
Rücker, F. and Dintelmann, F., "Effect of Antenna Size on OTS Signal Scintillations and Their Seasonal Dependence," *Electronics Letters*, IEE, vol. 19, No. 24, pp. 1032-1034 (Nov. 24, 1983).
Russell, R. and Hoare, L, "Millimeter Wave Phase Locked Oscillators," *Military Microwaves 78 Conference Proceedings*, Microwave Exhibitions and Publishers, pp. 238-242 (Oct. 25-27, 1978).)
Sabel, L.P., "A DSP Implementation of a Robust Flexible Receiver/Demultiplexer for Broadcast Data Satellite Communications," *The Institution of Engineers Australia Communications Conference*, Institution of Engineers, Australia, pp. 218-223 (Oct. 16-18, 1990).
Salous, S., "IF digital generation of FMCW waveforms for wideband channel characterization," *IEE Proceedings-I*, IEE, vol. 139, No. 3, pp. 281-288 (Jun. 1992).
"Sampling Loops Lock Sources to 23 Ghz," *Microwaves & RF*, Penton Publishing, p. 212 (Sep. 1990).
Sasikumar, M. et al., "Active Compensation in the Switched-Capacitor Biquad," *Proceedings of the IEEE*, IEEE, vol. 71, No. 8, pp. 1008-1009 (Aug. 1983).
Saul, P.H., "A GaAs MESFET Sample and Hold Switch," *Fifth European Solid State Circuits Conference-ESSCIRC 79*, IEE, pp. 5-7 (1979).
Shen, D.H. et al., "A 900-MHZ RF Front-End with Integrated Discrete-Time Filtering," *IEEE Journal of Solid-*

*State Circuits*, IEEE Solid-State Circuits Council, vol. 31, No. 12, pp. 1945-1954 (Dec. 1996).
Shen, X.D. and Vilar, E., "anomalous transhorizon propagation and meteorological processes of a multilink path," *Radio Science*, American Geophysical Union, vol. 30, No. 5, pp. 1467-1979 (Sep.-Oct. 1995).
Shen, X. and Tawfik, A.N., "Dynamic Behaviour of Radio Channels Due to Trans-Horizon Propagation Mechanisms," *Electronics Letters*, IEE, vol. 29, No. 17, pp. 1582-1583 (Aug. 19, 1993).
Shen, X. et al., "Modeling Enhanced Spherical Diffraction and Troposcattering on a Transhorizon Path with aid of the parabolic Equation and Ray Tracing Methods," *IEE Colloquium on Common modeling techniques for electromagnetic wave and acoustic wave propagation*, IEE. pp. 4/1-4/7 (Mar. 8, 1996).
Shen, X. and Vilar, E., "Path loss statistics and mechanisms of transhorizon propagation over a sea path," *Electronics Letters*, IEE, vol. 32, No. 3, pp. 259-261 (Feb. 1, 1996).
Shen, D. et al., "A 900 MHZ Integrated Discrete-Time Filtering RF Front-End," *IEEE International Solid State Circuits Conference*, IEEE, vol. 39, pp. 54-55 and 417 (Feb. 1996).
Spillard, C. et al., "X-Band Tropospheric Transhorizon Propagation Under Differing Meteorological Conditions," *Sixth International Conference on Antennas and Propagation* (*ICAP 89*) *Part 2: Propagation*, IEE, pp. 451-455 (Apr. 4-7, 1989).
Stafford, K.R. et al., "A Complete Monolithic Sample/Hold Amplifier," *IEEE Journal of Solid-State Circuits*, IEEE, vol. SC-9, No. 6, pp. 381-387 (Dec. 1974).
Staruk, W. Jr. et al., "Pushing HF Data Rates," *Defense Electronics*, EW Communications, vol. 17, No. 5, pp. 211, 213, 215, 217, 220 and 222 (May 1985).
Stephenson, A.G., "Digitizing multiple RF signals requires an optimum sampling rate," *Electronics*, McGraw-Hill, pp. 106-110 (Mar. 27, 1972).
Sugarman, R., "Sampling Oscilloscope for Statistically Varying Pulses," *The Review of Scientific Instruments*, American Institute of Physics, vol. 28, No. 11, pp. 933-938 (Nov. 1957).
Sylvain, M., "Experimental probing of multipath microwave channels," *Radio Science*, American Geophysical Union, vol. 24, No. 2, pp. 160-178 (Mar.-Apr. 1989).
Takano, T., "NOVEL GaAs Pet Phase Detector Operable To Ka Band," *IEEE MT-S Digest*, IEEE, pp. 381-383 (1984).
Tan, M.A., "Biquadratic Transconductance Switched-Capacitor Filters," *IEEE Transactions on Circuits and Systems-1: Fundamental Theory and Applications*, IEEE Circuits and Systems Society, vol. 40, No. 4, pp. 272-275 (Apr. 1993).
Tanaka, K. et al., "Single Chip Multisystem AM Stereo Decoder IC," *IEEE Transactions on Consumer Electronics*, IEEE Consumer Electronics Society, vol. CE-32, No. 3, pp. 482-496 (Aug. 1986).
Tawfik, A.N., "Amplitude, Duration and Predictability of Long Hop Trans-Horizon X-band Signals Over the Sea," *Electronics Letters*, IEE, vol. 28, No. 6, pp. 571-572 (Mar. 12, 1992).
Tawfik, A.N. and Vilar, E., "Correlation of Transhorizon Signal Level Strength with Localized Surface Meteorological Parameters," *Eighth International Conference on Antennas and Propagation*, Electronics Division of the IEE, pp. 335-339 (Mar. 30-Apr. 2, 1993).
Tawfik, A.N. and Vilar, E., "Dynamic Structure of a Transhorizon Signal at X-band Over a Sea Path," *Sixth International Conference on Antennas and Propagation* (*ICAP 89*) *Part 2: Propagation*, IEE, pp. 446-450 (Apr. 4-7, 1989).
Tawfik, A.N. and Vilar, E., "Statistics of Duration and Intensity of Path Loss in a Microwave Transhorizon Sea-Path," *Electronics Letters*, IEE, vol. 26, No. 7, pp. 474-476 (Mar. 29, 1990).
Tawfik, A.N. and Vilar, E., "X-Band Transhorizon Measurements of CW Transmissions Over the Sea- Part 1: Path Loss, Duration of Events, and Their Modeling," *IEEE Transactions on Antennas and Propagation*, IEEE Antennas and Propagation Society, vol. 41, No. 11, pp. 1491-1500 (Nov. 1993).
Temes, G.C. and Talvidls, T., "The Special Section on Switched-Capacitor Circuits," *Proceedings of the IEEE*, IEEE, vol. 71, No. 8, pp. 915-916 (Aug. 1983).
Thomas, G.B., *Calculus and Analytic Geometry*, Third Edition, Addison-Wesley Publishing, pp. 119-133 (1960).
Tomassetti, Q., "An Unusual Microwave Mixer," *18th European Microwave Conference*, Microwave Exhibitions and Publishers, pp. 754-759 (Sep. 8-12, 1986).
Tortoli, P. et al., "Bidirectional Doppler Signal Analysis Based on a Single RF Sampling Channel," *IEEE Transactions on Ultrasonics, Ferroelectrics, and Frequency Control*, IEEE Ultrasonics, Ferroelectrics, and Frequency Control Society, vol. 41, No. 1, pp. 1-3 (Jan. 1984).
Tsividis, Y. and Antognetti, P. (Ed.), *Design of MOS VLSI Circuits for Telecommunications*, Prentice-Hall, p. 304 (1985).
Tsividis, Y., "Principles of Operation and Analysis of Switched-Capacitor Circuits," *Proceedings of the IEEE*, IEEE vol. 71, No. 8, pp. 926-940 (Aug. 1983).
Tsurumi, H. and Maeda, T., "Design Study on a Direct Conversion Receiver Front-End for 280 MHZ, 900 MHZ, and 2.6 Ghz Band Radio Communication Systems," *41st IEEE Vehicular Technology Conference*, IEEE Vehicular Technology Society, pp. 457-462 (May 19-22, 1991).
Valdmanis, J.A. et al., "Picosecond and Subpicosend Optoelectronics for Measurements of Future High Speed Electronics Devices," *IEDM Technical Digest*, IEEE, pp. 597-600 (Dec. 5-7, 1983).
van de Kamp, M.M.J.L., "Asymmetric signal level distribution due to tropospheric scintillation," *Electronics Letters*, IEE, vol. 34, No. 11, pp. 1145-1146 (May 28, 1998).
Vasseur, H. and Vanhoenacker, D., "Characterization of tropospheric turbulent layers from radiosonde date," *Electronics Letters*, IEE, vol. 34, No. 4, pp. 318-319 (Feb. 19, 1998).
Verdone, R., "Outage Probability Analysis for Short-Range Communication Systems at 60 Ghz in ATT Urban Environments," *IEEE Transactions on Vehicular Technology*, IEEE Vehicular Technology Society, vol. 46, No. 4, pp. 1027-1039 (Nov. 1997).
Vierira-Ribeiro, S.A., *Single-IF DECT Receiver Architecture using a Quadrature Sub-Sampling Band-Pass Sigma-Delta Modulator*, Thesis for Degree of Master's of Engineering, Carleton University, UMI Dissertation Services, pp. 1-180 (Apr. 1995).
Vilar, E. et al., "A Comprehensive/Selective MM-Wave Satellite Downlink Experiment on Fade Dynamics," *Tenth International Conference on Antennas and Propagation*, Electronics Division of the IEE, pp. 2.98-2,101 (Apr. 14-17, 1997).
Vilar, E. et al., "A System to Measure LOS Atmospheric Transmittance at 19 Ghz," *AGARD Conference Proceedings*

*No. 346: Characteristics of the Lower Atmosphere Influencing Radio Wave Propagation*, AGARD, pp. 8-1-8-16 (Oct. 4-7, 1983).
Vilar, E. and Smith, H., "A Theoretical and Experimental Study of Angular Scintillations in Earth Space Paths," *IEEE Transactions on Antennas and Propagation*, IEEE, vol. AP-34, No. 1, pp. 2-10 (Jan. 1986).
Vilar, E. et al., "A Wide Band Transhorizon Experiment at 11.6 Ghz," *Eighth International Conference on Antennas and Propagation*, Electronics Division of the IEE, pp. 441-445 (Mar. 30-Apr. 2, 1993).
Vilar, E. and Matthews, P.A., "Amplitude Dependence of Frequency in Oscillators," *Electronics Letters*, IEE, vol. 8, No. 20, pp. 509-511 (Oct. 5, 1972).
Vilar, E. et al., "An experimental mm-wave receiver system for measuring phase noise due to atmospheric turbulence," *Proceedings of the 25th European Microwave Conference*, Nexus House, pp. 114-119 (1995).
Vilar, E. and Burgueflo, A., "Analysis and Modeling of Time Intervals Between Rain Rate Exceedances in the Context of Fade Dynamics," *IEEE Transactions on Communications*, IEEE Communications Society, vol. 39, No. 9, pp. 1306-1312 (Sep. 1991).
Vilar, E. et al., "Angle of Arrival Fluctuations in High and Low Elevation Earth Space Paths," *Fourth International Conference on Antennas and Propagation (ICAP 85)*, Electronics Division of the IEE, pp. 83-88 (Apr. 16-19, 1985).
Vilar, E., "Antennas and Propagation: A Telecommunications Systems Subject," *Electronics Division Colloquium on Teaching Antennas and Propagation to Undergraduates*, IEE, pp. 7/1-7/6 (Mar. 8, 1988).
Vilar, E. et al., "CERS*, Millimetre-Wave Beacon Package and Related Payload Doppler Correction Strategies," *Electronics Division Colloquium on CERS- Communications Engineering Research Satellite*, IEE, pp. 210/1-10/10 (Apr. 10, 1984).
Vilar, E. and Moulsley, T.J., "Comment and Reply: Probability Density Function of Amplitude Scintillations," *Electronics Letters*, IEE, vol. 21, No. 14, pp. 620-622 (Jul. 4, 1985).
Vilar, E. et al., "Comparison of Rainfall Rate Duration Distributions for ILE-IFE and Barcelona," *Electronics Letters*, IEE, vol. 28, No. 20, pp. 1922-1924 (Sep. 24, 1992).
Vilar, E., "Depolarization and Field Transmittances in Indoor Communications," *Electronics Letters*, IEE, vol. 27, No. 9, pp. 732-733 (Apr. 25, 1991).
Vilar, E. and Larsen, J.R., "Elevation Dependence of Amplitude Scintillations on Low Elevation Earth Space Paths," *Sixth International Conference on Antennas and Propagation (ICAP 89) Part 2: Propagation*, IEE, pp. 150-154 (Apr. 4-7, 1989).
Vilar, E. et al., "Experimental System and Measurements of Transhorizon Signal Levels at 11 Ghz," *18th European Microwave Conference*, Microwave Exhibitions and Publishers Ltd., pp. 429-435 (Sep. 12-15, 1988).
Vilar, E. and Matthews, P.A., "Importance of Amplitude Scintillations in Millimetric Radio Links," *Proceedings of the 4th European Microwave Conference*, Microwave Exhibitions and Publishers, pp. 202-206 (Sep. 10-13, 1974).
Vilar, E. and Haddon, J., "Measurement and Modeling of Scintillation Intensity to Estimate Turbulence Parameters in an Earth-Space Path," *IEEE Transactions on Antennas and Propagations*, IEE Antennas and Propagation Society, vol. AP-32 , No. 4, pp. 340-346 (Apr, 1984).
Vilar, E. and Matthews, P.A., "Measurement of Phase Fluctuations on Millimetric Radiowave Propagation ," *Electronics Letters*, IEE vol. 7, No. 18, pp. 566-568 (Sep. 9, 1971).
Vilar, E. and Wan, K.W., "Narrow and Wide Band Estimates of Field Strength for Indoor Communications in the Millimetre Band," *Electronics Division Colloquium on Radiocommunications in the Range 30-60 Ghz*, IEE, pp. 5/1-5/8 (Jan. 17, 1991).
Vilar, E. and Faulkner, N.D., "Phase Noise and Frequency Stability Measurements. Numerical Techniques and Limitations," *Electronics Division Colloquium on Low Noise Oscillators and Synthesizer*, IEE, 5 pages (Jan. 23, 1986).
Vilar, E. and Senin, S., "Propagation phase noise identified using 40 Ghz satellite downlink," *Electronics Letters*, IEE, vol. 33, No. 22, pp. 1901-1902 (Oct. 23, 1997).
Vilar, E. et al., "Scattering and Extinction: Dependence Upon Raindrop Size Distribution in Temperate (Bqarcelona) and Tropical (Balem) Regions," *Tenth International Conference on Antennas and Propagation, Electronics Division of the IEE*, pp. 2.230-2.233 (Apr. 14-17, 1997).
Vilar, E. and Haddon, J., "Scintillation Modeling and Measurement—A Tool for Remote-Sensing Slant Paths," *AGARD Conference Proceedings No. 332: Propagation Aspects of Frequency Sharing, Interference and System Diversity*, AGARD, pp. 27-1-27-13 (Oct. 18-22, 1982).
Vilar, E., "Some Limitations on Digital Transmission Through Turbulent Atmosphere," *International Confrence on Satellite Communication Systems Technology*, Electronics Division of the IEE, pp. 169-187 (Apr. 7-10, 1975).
Vilar, E. and Matthews, P.A., "Summary of Scintillation Observations in a 38 Ghz Link Across London," *International Conference on Antennas and Propagation Part 2: Propagation*, IEE, pp 36-40 (Nov. 28-30, 1978).
Vilar, E. et al., "Wideband Characterization of Scattering Channels," *Tenth International Conference on Antennas and Propagation*, Electronics Division of the IEE, pp. 2.353-2.358 (Apr. 14-17, 1997).
Vollmer, A., "Complete GPS Receiver Fits on Two Chips," *Electronic Design*, Penton Publishing, pp. 50, 52, 54 and 56 (Jul. 6, 1998).
*Voltage and Time Resolution in Digitizing Oscilloscopes: Application Note 348*, Hewlett Packard, pp. 1-11 (Nov. 1986).
Wan, K.W. et al., "A Novel Approach to the Simultaneous Measurement of Phase and Amplitude Noises in Oscillator," *Proceedings of the 19th European Microwave Conference*, Microwave Exhibitions and Publishers Ltd., pp. 809-813 (Sep. 4-7, 1989).
Wan, K.W. et al., "Extended Variances and Autoregressive/Moving Average Algorithm for the Measurement and Synthesis of Oscillator Phase Noise," *Proceedings Of the 43rd Annual Symposium on Frequency Control*, IEEE, pp. 331-335 (1989).
U.S. Appl. No. 09/525,615, filed Mar. 14, 2000, Sorrells et al.
U.S. Appl. No. 09/632,855, filed Aug. 14, 2000, Sorrells et al.
U.S. Appl. No. 09/632,856, filed Aug. 14, 2000, Sorrells et al.
Wan, K.W. et al., "Wideband Transhorizon Channel Sounder at 11 Ghz," *Electronics Division Colloquium on High Bit Rate UHF/SHF Channel Sounders—Technology and Measurement*, IEE, pp. 3/1-3/5 (Dec. 3, 1993).

Wang, H., "A 1-V Multigigahertz RF Mixer Core in 0.5—μm CMOS," *IEEE Journal of Solid-State Circuits*, IEEE Solid-State Circuits Society, vol. 33, No. 12, pp. 2265-2267 (Dec. 1998).
Watson, A.W.D. et al., "Digital Conversion and Signal Processing for High Performance Communications Receivers," *Digital Processing of Signals in Communications*, Institution of Electronic and Radio Engineers, pp. 367-373 (Apr. 22nd-26th, 1985).
Weast, R.C. et al. (Ed.), *Handbook of Mathematical Tables*, Second Edition, The Chemical Rubber Co., pp. 480-485 (1964).
Wiley, R.G., "Approximate FM Demodulation Using Zero Crossings," *IEEE Transactions on Communications*, IEEE, vol. COM-29, No. 7, pp. 1061-1065 (Jul. 1981).
Worthman, W., "Convergence . . . Again," *RF Design*, Primedia, p. 102 (Mar. 1999).
Young, I.A. and Hodges, D.A., "MOS Switched-Capacitor Analog Sampled-Data Direct-Form Recursive Filters," *IEEE Journal of Solid-State Circuits*, IEEE, vol. SC-14, No. 6, pp. 1020-1033 (Dec. 1979).
Translation of Specification and Claims of FR Patent No. 2245130, 3 pages.
Fest, Jean-Pierre, "Le Convertisseur A/N Revolutionne Le Recepteur Radio," *Electronique*, JMJ (Publisher), No. 54, pp. 40-42 (Dec. 1995).
Translation of DE Patent No., 35 41 031 A1, 22 pages.
Translation of EP Patent No. 0 732 803 A1, 9 pages.
Fest, Jean-Pierre, "The A/D Converter Revolutionizes the Radio Receiver," *Electronique*, JMJ (Publisher), No. 54. 3 pages (Dec. 1995). (Translation of Doc AQ50).
Translation of German Patent No. DE 197 35 798 C1, 8 pages.
Miki, S. and Nagahama, R., *Modulation System II*, Common Edition 7, Kyoritau Publishing Co., Ltd., pp. 146-154 (Apr. 30, 1956).
Miki, S. and Nagahama, R., *Modulation System II*, Common Edition 7, Kyoritau Publishing Co., Ltd., pp. 146-149 (Apr. 30, 1956). (Partial Translation of Doc. AQ51).
Rabiner, L.R. and Gold, B., *Theory And Application Of Digital Signal Processing*, Prentice-Hall, Inc., pp. xiii-xii and 40-46 (1975).
English-language Abstract of Japanese Patent Publication No. 08-032556, from http://www1.ipdl.jpo.go.jp, 2 Pages (Feb. 2, 1996—Date of publication of application).
English-language Abstract of Japanese Patent Publication No. 08-139524, from http://www1.ipdl.jpo.go.jp, 2 Pages (May 31, 1996—Date of publication of application).
English-language Abstract of Japanese Patent Publication No. 59-144249, from http://www1.ipdl.jpo.go.jp, 2 Pages (Aug. 18, 1984—Date of publication of application).
English-language Abstract of Japanese Patent Publication No. 63-054002, from http://www1.ipdl.jpo.go.jp, 2 Pages (Mar. 8, 1988—Date of publication of application).
English-language Abstract of Japanese Patent Publication No. 06-237276, from http://www1.ipdl.jpo.go.jp, 2 Pages (Aug. 23, 1994—Date of publication of application).
English-language Abstract of Japanese Patent Publication No. 08-023359, from http://www1.ipdl.jpo.go.jp, 2 Pages (Jan. 23, 1996—Date of publication of application).
Translation of Japanese Patent Publication No. 47-2314, 7 pages.
Partial Translation of Japanese Patent Publication No. 58-7903, 3 pages.
English-language Abstract of Japanese Patent Publication No. 58-133004, from http://www1.ipdl.jpo.go.jp, 2 Pages (Aug. 8, 1993—Date of publication of application).
English-language Abstract of Japanese Patent Publication No. 60-058705, from http://www1.ipdl.jpo.go.jp, 2 Pages (Apr. 4, 1985—Date of publication of application).
English-language Abstract of Japanese Patent Publication No. 04-123614, from http://www1.ipdl.jpo.go.jp, 2 Pages (Apr. 23, 1992—Date of publication of application).
English-language Abstract of Japanese Patent Publication No. 04-127601, from http://www1.ipdl.jpo.go.jp, 2 Pages (Apr. 28, 1992—Date of publication of application).
English-language Abstract of Japanese Patent Publication No. 05-175730, from http://www1.ipdl.jpo.go.jp, 2 Pages (Jul. 13, 1993—Date of publication of application).
English-language Abstract of Japanese Patent Publication No. 05-175734, from http://www1.ipdl.jpo.go.jp, 2 Pages (Jul. 13, 1993—Date of publication of application).
English-language Abstract of Japanese Patent Publication No. 07-154344, from http://www1.ipdl.jpo.go.jp, 2 Pages (Jun. 16, 1995—Date of publication of application).
English-language Abstract of Japanese Patent Publication No. 07-307620, from http://www1.ipdl.jpo.go.jp, 2 Pages (Nov. 21, 1995—Date of publication of application).
Oppenheim, A.V. and Schafer, R.w., *Digital Signal Processing*, Prentice-Hall, pp. vii-x, 6-35, 45-78, 87-121 and 136-165 (1975).
English-language Abstract of Japanese Patent Publication No. 55-066057, from http://www1.ipdl.jpo.go.jp, 1 Page (May 19, 1980—Date of publication of application).
English-language Abstract of Japanese Patent Publication No. 63-065587, from http://www1.ipdl.jpo.go.jp, 1 Page (Mar. 24, 1988—Date of publication of application).
English-language Abstract of Japanese Patent Publication No. 63-153691, from http://www1.ipdl.jpo.go.jp, 1 Page June 27, 1988—Date of publication of application).

* cited by examiner

1802

| TIME / NODE | t−1 (RISING EDGE OF $\phi_1$) | t−1 (RISING EDGE OF $\phi_2$) | t (RISING EDGE OF $\phi_1$) | t (RISING EDGE OF $\phi_2$) | t+1 (RISING EDGE OF $\phi_1$) |
|---|---|---|---|---|---|
| 1902 | $VI_{t-1}$ 1804 | $VI_{t-1}$ 1808 | $VI_t$ 1816 | $VI_t$ 1826 | $VI_{t+1}$ 1838 |
| 1904 | — | $VI_{t-1}$ 1810 | $VI_{t-1}$ 1818 | $VI_t$ 1828 | $VI_t$ 1840 |
| 1906 | $VO_{t-1}$ 1806 | $VO_{t-1}$ 1812 | $VO_t$ 1820 | $VO_t$ 1830 | $VO_{t+1}$ 1842 |
| 1908 | — | $VO_{t-1}$ 1814 | $VO_{t-1}$ 1822 | $VO_t$ 1832 | $VO_t$ 1844 |
| 1910 | — 1807 | — | $VO_{t-1}$ 1824 | $VO_{t-1}$ 1834 | $VO_t$ 1846 |
| 1912 | — | — 1815 | — | $VO_{t-1}$ 1836 | $VO_{t-1}$ 1848 |
| 1918 | — | — | — | — | $VI_t$ − 0.1 * $VO_t$ − 0.8 * $VO_{t-1}$ 1850 |

FIG. 18

| Item | Quantity | Reference | Part Description | Part Number | Manufacturer |
|---|---|---|---|---|---|
| 1 | 1 | C123 | 10uF CAP 6032, TANTALUM,20% | TAJT106K010R | KEMET |
| 2 | 3 | C263, C273, C275, C282 | 4.7uF CAP 6032, TANTALUM,20% | T491A475M006AS | KEMET |
| 3 | 25 | C120, C125, C126, C127, C128, C136, C137, C138, C139, C140, C141, C142, C143, C144, C145, C147, C148, C149, C264, C272, C274, C279, C280, C281, C283 | 0.1uF CAP 0603,X7R,10% | GRM39X7R104K050AD | MURATA |
| 4 | 3 | C146, C269, C276 | .01uF CAP 0603,X7R,10% | GRM39X7R103K050AD | MURATA |
| 5 | 5 | C124, C132, C133, C271, C278 | 100pF CAP 0603,X7R,10% | GRM39C0G101K050AD | MURATA |
| 6 | 1 | C129 | 47pF CAP 0603,X7R,10% | GRM39C0G470J100AD | MURATA |
| 7 | 2 | C270, C277 | 27pF CAP 0603,X7R,10% | GRM39C0G270K050AD | MURATA |
| 8 | 1 | C130 | 22pF CAP 0603,X7R,10% | GRM39C0G220K050AD | MURATA |
| 9 | 1 | C131 | 10pF CAP 0603,X7R,10% | GMR39C0G100D050AD | MURATA |
| 10 | 1 | DS1 | LED GREEN | 597-3311-420 | DIALIGHT |
| 11 | 1 | DS2 | LED YELLOW | 597-3401-420 | DIALIGHT |
| 12 | 1 | DS3 | LED RED | 597-3111-420 | DIALIGHT |
| 13 | 6 | JP12, JP13, JP14, JP15, JP16, JP17 | CONNECTOR HEADER 2PIN | 2MS-19-33-01 | SPECIALITY ELECTRONICS |
| 14 | 1 | JP11 | CONNECTOR HEADER 4PIN | 100/VH/TM1SQ/W.100/4 | BLKCON |

FIG.46A

| | | | | | |
|---|---|---|---|---|---|
| 15 | 7 | J16, J20, J21, J22, J23, J24, J25 | CONNECTOR 82MMCX | 82MMCX-50-0-1 | HUBER/SHUNER |
| 16 | 1 | J18 | CONNECTOR HEADER 10 | TMS-110-01-G-S | SAMTEC |
| 17 | 1 | J19 | CONNECTOR WITH EJECTOR | EHT-1-10-01-S-D | SAMTEC |
| 18 | 1 | P1 | CONNECTOR 34X2PCMCIA | DICMJ-68S-SPC-M08 | ITT CANON |
| 19 | 7 | L59, L60, L61, L63, L64, L65, L66 | FERRITE BEAD | BLM11A121S | MURATA |
| 20 | | | | | |
| 21 | 1 | R112 | 10M, RESISTOR,0603,5% | | |
| 22 | 1 | R114 | 390K, RESISTOR,0603,5% | ERJ-3GSYJ394V | PANASONIC |
| 23 | 1 | R105 | 100K, RESISTOR,0603,5% | ERJ-3GSYJ104V | PANASONIC |
| 24 | 4 | R106, R107,R108, R111 | 15K, RESISTOR, 0603,5% | ERJ-3GSYJ153V | PANASONIC |
| 25 | 1 | R116 | 9.1K, RESISTOR, 0603,5% | ERJ-3GSYJ912V | PANASONIC |
| 26 | 1 | R115 | 8.2K, RESISTOR, 0603,5% | ERJ-3GSYJ822V | PANASONIC |
| 27 | 1 | R113 | 3.9K, RESISTOR, 0603,5% | ERJ-3GSYJ392V | PANASONIC |
| 28 | 1 | R101 | 750, RESISTOR, 0630,5% | ERJ-3GSYJ751V | PANASONIC |
| 29 | 1 | R110 | 560, RESISTOR, 0603,5% | ERJ-3GSYJ561V | PANASONIC |
| 30 | 2 | R99, R100 | 330, RESISTOR, 0603,5% | ERJ-3GSYJ331V | PANASONIC |
| 31 | 1 | R119 | 50, RESISTOR, 0603,5% | ERJ-3GSYJ500V | PANASONIC |
| 32 | 2 | R128, R129 | 10, RESISTOR, 0603,5% | ERJ-3GSYJ100V | PANASONIC |
| 33 | 8 | R102, R103, R104, R109, R117, R118, R120, R127, | 0, RESISTOR, 0603,5% | RM732Z1J000ZT 3GSYJ000V | ERJ KOA PANASONIC |
| 34 | 6 | R121, R122, R123, R124, R125, R126 | TBD, RESISTOR, 0603,5% | R | PANASONIC |
| 35 | 1 | U10 | SRAM | KM62256DLTG-5L<br>M5M5256CVP-55LL | SAMSUNG<br>MITSUBUSHI |
| 36 | 1 | U12 | MAC | AM79C930 | AMD |

FIG.46B

| | | | | | |
|---|---|---|---|---|---|
| 37 | 1 | U13 | BASEBAND PROCESSOR | HFA3842A1 | HARRIS |
| 38 | 1 | U14 | FLASH RAM | AM29F010-55EC | AMD |
| 39 | 1 | U15 | 32 KHz CRYSTAL | CX-6V-SM2-32.768KHzC/1 | STATEK |
| 40 | 2 | U45 | BUS BUFFER | DS3862 | NATIONAL |
| 41 | 1 | U48 | REGULATOR 3.5 V | TK11235BMC | TOKO |
| 42 | 1 | U49 | 22MHz OSCILLATOR | FOX F3346-22MHz | FOX |
| 43 | 1 | U50 | 2 VOLT REFERENCE | TK11220BMC | TOKO |
| 44 | 1 | U51 | 40MHz OSCILLATOR | CXO-M-10N-40MHz A/1 | STATEK |

FIG.46C

| ITEM | QUANT. | REFERENCE | PART | PART NUMBER | MANUFACTURER |
|---|---|---|---|---|---|
| | | | | | |
| 1 | 4 | C3,C52,C108,C110 | 4.7uF | T491A475K006AS | KEMET |
| 2 | 26 | C51,C54,C57,C58,C60,C61, | 0.1uF | GRM39Y5V104Z016 | MURATA |
| | | C67,C68,C69,C77,C79,C80, | | | |
| | | C81,C83,C89,C90,C91,C111, | | | |
| | | C112,C113,C114,C115,C116, | | | |
| | | C117,C118,C119 | | | |
| 3 | 1 | C55 | DNP | T491A475K006AS | KEMET |
| 4 | 8 | C56,C59,C78,C82,C99,C101, | 0.01uF | GRM39X7R103K050 | MURATA |
| | | C103,C104 | | | |
| 5 | 8 | C62,C63,C66,C73,C84,C85, | 1uF | GRM40Y5V105Z016 | MURATA |
| | | C88,C95 | | | |
| 6 | 4 | C64,C75,C86,C97 | 120pF | GRM39COG121J050 | MURATA |
| 7 | 2 | C65,C87 | 180pF | GRM39COG181J050 | MURATA |
| 8 | 2 | C70,C92 | 390pF | GRM39COG391J050 | MURATA |
| 9 | 2 | C71,C93 | 470pF | GRM39COG471J050 | MURATA |
| 10 | 2 | C72,C94 | DNP | GRM40Y5V105Z016 | MURATA |
| 11 | 2 | C74,C96 | 82pF | GRM39COG820J050 | MURATA |
| 12 | 2 | C100,C106 | DNP | DNP | MURATA |
| 13 | 2 | C105,C102 | 1000pF | GRM39COG102K050 | MURATA |
| 14 | 2 | D3,D1 | BAW56WT1 | BAW56WT1 | MOTOROLA |
| 15 | 2 | D4,D2 | BAV70LT1 | BAV70LT1 | MOTOROLA |
| 16 | 1 | JP1 | HEADER 7X2 | FTSH-107-02-L-D | SAMTEC |
| 17 | 9 | J1,J3,J5,J7,J9,J10,J11, | 82MMCX | 82MMCX-50-0-1 | SUHNER |
| | | J12,J13 | | | |
| 18 | 1 | L1 | BLM11A121S | BLM11A121S | MURATA |
| 19 | 2 | L23,L28 | 2.2uH | LQG21N2R2K10 | MURATA |
| 20 | 2 | L29,L24 | 1uH | LQG21N1R0K10 | MURATA |
| 21 | 2 | L30,L25 | 680nH | LQG21NR68K10 | MURATA |

FIG.49A

| | | | | | |
|---|---|---|---|---|---|
| 22 | 2 | L26,L31 | 1.8uH | LQG21N1R8K10 | MURATA |
| 23 | 2 | L32,L27 | 390nH | LQG21NR39K10 | MURATA |
| 24 | 4 | Q1,Q5,Q10,Q14 | SD404CY | SD404CY | CALOGIC |
| 25 | 4 | Q2,Q4,Q12,Q13 | BFM505 | BFM505 | PHILIPS |
| 26 | 4 | Q3,Q7,Q11,Q16 | SD213 | SD213 | CALOGIC |
| 27 | 2 | Q17,Q8 | BFR520 | BFR520 | PHILIPS |
| 28 | 4 | R19,R20,R21,R83 | 0 | ERJ3GSY0R00 | PANASONIC |
| 29 | 8 | R23,R26,R34,R45,R52,R57, | 33K | ERJ3GSYJ333 | PANASONIC |
| | | R63,R74 | | | |
| 30 | 4 | R24,R27,R53,R58 | 475 | ERJ3EKF4750 | PANASONIC |
| 31 | 6 | R25,R28,R47,R54,R59,R76 | 402 | ERJ3EKF4020 | PANASONIC |
| 32 | 4 | R29,R30,R55,R56 | 221 | ERJ3EKF2210 | PANASONIC |
| 33 | 2 | R32,R61 | 200 | ERJ3GSYJ201 | PANASONIC |
| 34 | 2 | R33,R62 | 33.2K | ERJ3GSYJ333 | PANASONIC |
| 35 | 4 | R35,R46,R64,R75 | 68.1 | ERJ3EKF68R1 | PANASONIC |
| 36 | 2 | R36,R65 | 200 | ERJ3EKF2000 | PANASONIC |
| 37 | 6 | R37,R44,R66,R73,R171, | 49.9 | ERJ3EKF49R9 | PANASONIC |
| | | R173 | | | |
| 38 | 6 | R40,R68,R78,R79,R80,R89 | 1K | ERJ3EKF1001 | PANASONIC |
| 39 | 2 | R42,R71 | 62 | ERJEGSYJ620 | PANASONIC |
| 40 | 2 | R43,R72 | 162 | ERJ3EKF1620 | PANASONIC |
| 41 | 2 | R77,R48 | DNP | ERJ3GSYJ330 | PANASONIC |
| 42 | 4 | R81,R82,R85,R87 | 2K | ERJ3EKF2001 | PANASONIC |
| 43 | 1 | R84 | 909 | ERJ3EKF9090 | PANASONIC |
| 44 | 1 | R88 | 15K | ERJ3EJF1502 | PANASONIC |
| 45 | 1 | R90 | 10K | ERJ3EKF1002 | PANASONIC |
| 46 | 2 | R91,R92 | 100 | ERJ3EKF1000 | PANASONIC |
| 47 | 6 | R164,R165,R166,R167,R168, | TBD | | PANASONIC |
| | | R169 | | | |
| 48 | 2 | R170,R172 | OPEN | | PANASONIC |

FIG.49B

| | | | | | |
|---|---|---|---|---|---|
| 49 | 6 | TP1,TP2,TP3,TP4,TP5,TP6 | TP-105-01-00 | | |
| 50 | 2 | U42,U6 | NC7S04M5 | NC7S04M5 | NATIONAL SEMICONDUCTOR |
| 51 | 1 | U7 | AD8052AR | AD8052AR | ANALOG DEVICES |
| 52 | 1 | U8 | AD1582 | AD1582 | ANALOG DEVICES |
| 53 | 1 | U9 | AD605AR | AD605AR | ANALOG DEVICES |
| 54 | 1 | U43 | TK11235AMTL | TK11235BM | TOKO |
| 55 | 1 | | BOARD | 8500.541.003.V13.01 | |

FIG.49C

| ITEM | QTY | REFERENCE | PART | PART NUMBER | MANUFACTURER |
|---|---|---|---|---|---|
| | | | | | |
| 1 | 3 | C3,C52,C55 | 4.7uF | T491A475K006AS | KEMET |
| 2 | 26 | C51,C54,C57,C58,C60,C61, | 0.1uF | GRM39Y5V104Z016 | MURATA |
| | | C67,C68,C69,C77,C79,C80, | | | |
| | | C81,C83,C89,C90,C91,C111, | | | |
| | | C112,C113,C114,C115,C116, | | | |
| | | C117,C118,C119 | | | |
| 3 | 8 | C56,C59,C78,C82,C99,C101, | 0.01uF | GRM39X7R103K050 | MURATA |
| | | C103,C104 | | | |
| 4 | 10 | C62,C63,C66,C72,C73,C84, | 1uf | GRM40Y5V105Z016 | MURATA |
| | | C85,C88,C94,C95 | | | |
| 5 | 4 | C64,C75,C86,C97 | 120pF | GRM39COG121J050 | MURATA |
| 6 | 2 | C87,C65 | 180pF | GRM39COG181J050 | MURATA |
| 7 | 2 | C70,C92 | 390pF | GRM39COG391J050 | MURATA |
| 8 | 2 | C71,C93 | 470pF | GRM39COG471J050 | MURATA |
| 9 | 2 | C96,C74 | 82pF | GRM39COG820J050 | MURATA |
| 10 | 5 | C100,C102,C105,C106,C107 | 100pF | GRM39COG101K050 | MURATA |
| 11 | 1 | C108 | 1uF | | |
| 12 | 1 | C110 | 4.7uF | | |
| 13 | 2 | D3,D1 | BAW56WT1 | BAW56WT1 | MOTOROLA |
| 14 | 2 | D4,D2 | BAV70LT1 | BAV70LT1 | MOTOROLA |
| 15 | 2 | JP2,JP1 | HEADER 7X2 | | |
| 16 | 6 | J1,J3,J5,J7,J10,J11 | 82MMCX | 142-0701-231 | JOHNSON |
| 17 | 1 | J9 | 82MMCX | 82MMCX-50-0-1 | SUHNER |
| 18 | 1 | L1 | BLM11A121S | BLM11A121S | MURATA |
| 19 | 2 | L28,L23 | 2.2uH | LQG21N2R2K10 | MURATA |
| 20 | 2 | L24,L29 | 1uH | LQG21N1R0K10 | MURATA |
| 21 | 2 | L30,L25 | 680nH | LQG21NR68K10 | MURATA |
| 22 | 2 | L26,L31 | 1.8uH | LQG21N1R8K10 | MURATA |

FIG.52A

| | | | | | |
|---|---|---|---|---|---|
| 23 | 2 | L27,L32 | 390nH | LQG21NR39K10 | MURATA |
| 24 | 4 | Q1,Q5,Q10,Q14 | SD404CY | SD404CY | CALOGIC |
| 25 | 4 | Q2,Q4,Q12,Q13 | BFM505 | BFM505 | PHILIPS |
| 26 | 4 | Q3,Q7,Q11,Q16 | SD213 | SD213 | CALOGIC |
| 27 | 2 | Q17,Q8 | BFR520 | BFR505 | PHILIPS |
| 28 | 5 | R19,R20,R21,R171,R173 | 0 | | |
| 29 | 8 | R23,R26,R34,R45,R52,R57, | 33K | ERJ3GSY333 | PANASONIC |
| | | R63,R74 | | | |
| 30 | 4 | R24,R27,R53,R58 | 475 | ERJ3EKF4750 | PANASONIC |
| 31 | 6 | R25,R28,R47,R54,R59,R76 | 402 | ERJ3EKF4020 | PANASONIC |
| 32 | 4 | R29,R30,R55,R56 | 221 | ERF3EKF2210 | PANASONIC |
| 33 | 2 | R32,R61 | 200 | ERJ3GSYJ201 | PANASONIC |
| 34 | 2 | R33,R62 | 33.2K | ERJ3GSYJ333 | PANASONIC |
| 35 | 4 | R35,R46,R64,R75 | 68.1 | ERJ3EKF68R1 | PANASONIC |
| 36 | 2 | R36,R65 | 200 | ERJ3EKF2000 | PANASONIC |
| 37 | 2 | R66,R37 | 49.9 | ERJ3EKF49R9 | PANASONIC |
| 38 | 6 | R40,R68,R78,R79,R80,R89 | 1K | ERJ3EKF1001 | PANASONIC |
| 39 | 2 | R42,R71 | 62 | ERJ3GSYJ620 | PANASONIC |
| 40 | 2 | R43,R72 | 162 | ERJ3EKF6810 | PANASONIC |
| 41 | 2 | R44,R73 | 49.9 | ERJ3EKF1001 | PANASONIC |
| 42 | 2 | R77,R48 | 33 | ERJ3GSYJ330 | PANASONIC |
| 43 | 4 | R81,R82,R85,R87 | 2K | ERJ3EKF2001 | PANASONIC |
| 44 | 1 | R83 | 0 | ERJGSY0R00 | PANASONIC |
| 45 | 1 | R84 | 1.1K | ERJ3EKF2001 | PANASONIC |
| 46 | 1 | R88 | 15K | ERJ3EKF1502 | PANASONIC |
| 47 | 1 | R90 | 10K | ERJ3EKF1002 | PANASONIC |
| 48 | 2 | R91,R92 | 100 | ERJ3EKF1000 | PANASONIC |
| 49 | 6 | R164,R165,R166,R167,R168, | TBD | | |
| | | R169 | | | |
| 50 | 2 | R170,R172 | OPEN | | |
| 51 | 0 | TP1,TP2,TP3,TP4,TP5,TP6 | TP-105-01-00 | | |
| 52 | 2 | U42,U6 | NC7S04M5 | | NATIONAL SEMICONDUCTOR |
| 53 | 1 | U7 | AD8032AR | AD8032AR | ANALOG DEVICES |
| 54 | 1 | U8 | AD1582 | AD1582 | ANALOG DEVICES |
| 55 | 1 | U9 | AD605AR | AD605AR | ANALOG DEVICES |
| 56 | 1 | U43 | TK11235AMTL | TK11235AMTL | TOKO |

FIG.52B

| ITEM | QTY | REFERENCE | PART | PART NIMBER | MANUFACTURER |
|---|---|---|---|---|---|
| | | | | | |
| 1 | 10 | C/R7,C/R15,C16,C17,C18 | 0.1uF | GRM39Y5V104Z016 | MURATA |
| | | C19,C21,C22,C23,C24 | | | |
| 2 | 6 | C1,C3,C6,C8,C9,C12 | 22pF | GRM39COG220J050 | MURATA |
| 3 | 3 | C2,C4,C11 | 0.1uF | GRM39X7R104K016 | MURATA |
| 4 | 2 | C5,C15 | 47pF | GRM39COG470J050 | MURATA |
| 5 | 2 | C10,C7 | 1000pF | GRM39X7R102K050 | MURATA |
| 6 | 1 | C13 | 100pF | GRM39X7R101J050 | MURATA |
| 7 | 1 | C14 | 3pF | GRM40COG030B50V | MURATA |
| 8 | 2 | C20,C25 | 1uF | GRM40Y5V105Z016 | MURATA |
| 9 | 1 | JP1 | 69190-403 | 69190-403 | BERG |
| 10 | 1 | JP2 | 69190-402 | 69190-402 | BERG |
| 11 | 4 | J1,J2,J3,J4 | 82MMCX-50-0-1 | 82MMCX-50-0-1 | SUHNER |
| 12 | 2 | L3,L1 | DNP | L | TOKO |
| 13 | 2 | L4,L2 | 4.7nH | LL1608-F4N7K | TOKO |
| 14 | 1 | L5 | 15nH | LL2012FH15NJ | TOKO |
| 15 | 1 | L6 | DNP | DNP | TOKO |
| 16 | 2 | Q1,Q2 | BFR520 | BFR520 | PHILIPS |
| 17 | 2 | R1,R3 | 2K | ERJ3GSYJ202 | PANASONIC |
| 18 | 1 | R2 | 51 | ERJ3GSYJ510 | PANASONIC |
| 19 | 2 | R4,R12 | 221 | ERJ3EKF2210 | PANASONIC |
| 20 | 6 | R5,R6,R8,R13,R14,R16 | 33.2K | ERJ3EKF3322 | PANASONIC |
| 21 | 2 | R9,R17 | DNP | ERJ3EKF1001 | PANASONIC |
| 22 | 2 | R10,R18 | 249 | ERJ3EKF2490 | PANASONIC |
| 23 | 2 | R11,R19 | 10 | ERJ3GSYJ100 | PANASONIC |
| 24 | 1 | U1 | D2D_V4 | D2D_V4 | PARKER VISION |
| 25 | 1 | U2 | 1X603 | 1X603 | ANAREN |
| 26 | 1 | U3 | AD8032AR | AD8032AR | ANALOG DEVICES |
| 27 | 1 | | BOARD | STB500.641.001 V03.00 | |

FIG.54

| ITEM | QTY | REFERENCE | PART | DESCRIPTION | PART NUMBER | MANUFACT. |
|---|---|---|---|---|---|---|
| | | | | | | |
| 1 | 1 | CR1 | BBY51-E6327 | DIODE, VARACTOR | BBY51-E6327 | SIEMENS |
| 2 | 6 | C1,C3,C5,C7,C9,C10 | 100pF | CAPACITOR,CERAMIC,100pF,10%,COG,0603 | GRM39COG101K050 | MURATA |
| 3 | 2 | C29,C2 | 0.1uF | CAPACITOR,CERAMIC,.1uF,10%,X7R,0603 | GRM39X7R104K016AD | MURATA |
| 4 | 3 | C4,C8,C17 | .01uF | CAPACITOR,CERAMIC,.01uF,10%,X7R,0603 | GRM39X7R103K050 | MURATA |
| 5 | 1 | C6 | 220pF | CAPACITOR,CERAMIC,220pF,5%,COG,0603 | GRM39COG221J025 | MURATA |
| 6 | 1 | C11 | 3.3pF | CAPACITOR,CERAMIC,3.3pF,5%,COG,0603 | GRM39COG3R3B100V | MURATA |
| 7 | 1 | C12 | 6.8pF | CAPACITOR,CERAMIC,6.8pF,+/-.25pF,COG,0603 | GRM39COG6R8C100V | MURATA |
| 8 | 4 | C13,C35,C36,C37 | 1000pF | CAPACITOR,CERAMIC,1000pF,10%,X7R,0603 | GRM39X7R102K016 | MURATA |
| 9 | 1 | C14 | 1500pF | CAPACITOR,CERAMIC,1500Pf,10%,X7R,0603 | GRM39X7R152K016 | MURATA |
| 10 | 1 | C15 | 12pF | CAPACITOR,CERAMIC,12pF,5%,COG,0603 | GRM39COG150J050 | MURATA |
| 11 | 1 | C16 | 4700pF | CAPACITOR,CERAMIC,4700pF,10%,0603 | GRM39X7R472K016 | MURATA |
| 12 | 2 | C20,C18 | 22pF | CAPACITOR,CERAMIC,22pF,10%,COG,0603 | GRM36COG220K050 | MURATA |
| 13 | 4 | C22,C32,C33,C34 | DNP | CAPACITOR,CERAMIC,,,,0603 | | MURATA |
| 14 | 3 | C23,C24,C27 | 4.7uF | CAPACITOR,TANTALUM,4.7uF,10%,3216 | T491A475K006AS | KEMET |
| 15 | 3 | R16,C31,R17 | 0 OHM | RESISTOR,ZERO OHM,0603 | ERJ3GSY0R00 | PANASONIC |
| 16 | 1 | JP1 | FTSH-110-02-F-D | HEADER,DUAL ROW 10X2,.050X.050 | FTSH-110-02-F-D | SAMTEC |
| 17 | 1 | JP2 | FTSH-105-02-F-D | HEADER,DUAL ROW 5X2,.050X.050 | FTSH-105-02-F-D | SAMTEC |
| 18 | 1 | JP3 | TSW-104-08-T-S | HEADER, SINGLE ROW 4 PIN, .100" | TSW-104-08-T-S | BERG |
| 19 | 2 | J5,J6 | 82MMCX | RF CONNECTOR | 82MMCX-50-0-1 | SUHNER |
| 20 | 1 | L1 | 18nH | INDUCTOR,18nH,10%, 0805 | 0805CS-180XJBC | COILCRAFT |
| 21 | 1 | L3 | 0 OHM | ZERO OHM JUMPER | RM73ZIJT | KOA |
| 22 | 6 | L4,L6,L9,L10,L11,L12 | BLM11A121S | FERRITE BEAD, 0603 | BLM11A121S | MURATA |
| 23 | 1 | L14 | 82nH | INDUCTOR, 82nH,10%,0805 | LL2012-F82NK | TOKO |
| 24 | 1 | Q1 | BFR520 | TRANSISTOR, NPN | BFR520 | PHILIPS |
| 25 | 5 | R1,R2,R3,R11,R30 | 1K | RESISTOR, 1K,5%,0603 | ERF3GSYJ102 | PANASONIC |
| 26 | 1 | R4 | 10 | RESISTOR, 10 OHM,5%,0603 | ERJ3GSYJ1R0 | PANASONIC |

FIG.56A

| | | | | | | |
|---|---|---|---|---|---|---|
| 27 | 1 | R8 | 2K | RESISTOR, 2K,5%,0603 | ERJ3GSYJ202 | PANASONIC |
| 28 | 1 | R9 | 75 | RESISTOR, 75 OHM,5%,0603 | ERJ3GSYJ750 | PANASONIC |
| 29 | 1 | R10 | 3300 | RESISTOR, 3.3K,5%,0603 | ERJ3GSYJ332 | PANASONIC |
| 30 | 1 | R12 | 13K | RESISTOR, 13K,5%,0603 | ERJ3GSYJ133 | PANASONIC |
| 31 | 1 | R13 | 1.5K | RESISTOR, 1.5K,5%,0603 | ERJ3GSYJ152 | PANASONIC |
| 32 | 1 | R14 | 220 | RESISTOR, 220 OHM,5%,0603 | ERJ3GSYJ221 | PANASONIC |
| 33 | 1 | R15 | DNP | RESISTOR, ZERO OHM,0603 | ERJ3GSY0R00 | PANASONIC |
| 34 | 2 | R18,R19 | DNP | RESISTOR, 91 OHM,5%,0603 | ERJ3GSYJ910 | PANASONIC |
| 35 | 1 | R36 | TBD | RESISTOR, ZERO OHM,0603 | ERJ3GSY0R00 | PANASONIC |
| 36 | 1 | R37 | DNP | RESISTOR,,,0603 | | PANASONIC |
| 37 | 1 | TP1 | TEST POINT | | | |
| 38 | 1 | U1 | PE3282A | IC,SYNTHESIZER | PE3282A | PEREGRINE |
| 39 | 1 | U2 | CXO-3M-10N-40MHz | XTAL OSC,40MHz | CXO-3M-10N-40MHZ A/I | STATEK |
| 40 | 1 | U4 | TK11233AMTL | VOLTAGE REGULATOR,3.5V | TK11235BM | TOKO |
| 41 | 1 | U5 | 74125 | IC,BUFFER | MC74LCX125DT | MOTOROLA |
| 42 | 1 | U6 | UPC1678GV | IC,RF AMPLIFIER | UPC1678GV | NEC |
| 43 | 1 | | STB500.641.008 V02.00 | BOARD | | |

FIG.56B

| ITEM | QTY | REFERENCE | PART | PART NUMBER | MANUFACTURER |
|---|---|---|---|---|---|
| | | | | | |
| 1 | 21 | C3,C6,C8,C10,C14,C38,C44, | 0.1uF | GRM39X7R104K016 | MURATA |
| | | C46,C51,C71,C72,C77,C78, | | | |
| | | C79,C84,C85,C86,C93,C95, | | | |
| | | C96,C98 | | | |
| 2 | 6 | C5,C7,C15,C43,C52,C75 | 22pF | GRM39C0G220J050 | MURATA |
| 3 | 5 | C9,C16,C45,C53,C89 | 1uF | GRM40Y5V105Z016 | MURATA |
| 4 | 8 | C11,C23,C25,C47,C61,C63 | 1000pF | GRM39X7R102K050 | MURATA |
| | | C80,C87 | | | |
| 5 | 2 | C58,C21 | 1pF | GRM39C0G010B50V | MURATA |
| 6 | 2 | C82,C33 | 4.7uF | T491A475K006AS | KEMET |
| 7 | 2 | C59,C35 | 0 ohm | GRM39C0Gxxxx50V | MURATA |
| 8 | 1 | C73 | 470pF | GRM39C0G471J050 | MURATA |
| 9 | 1 | C83 | 1uF | T491A105M016AS | KEMET |
| 10 | 3 | C90,C91,C92 | 100pF | ECU-V1H101JCV | |
| 11 | 2 | C94,C97 | 0.01uF | GRM39X7R103K016 | MURATA |
| 12 | 1 | FL1 | MDR642E | MDR642E | SOSHIN |
| 13 | 1 | JP1 | Shunt | 69190-402 | BERG |
| 14 | 1 | JP2 | 69190-403 | 69190-403 | BERG |
| 15 | 4 | J7,J8,J9,J10 | 82MMCX-50-0-1 | 82MMCX-50-0-1 | SUHNER |
| 16 | 1 | L10 | 22nH | LL1608-F22NK | COILCRAFT |
| 17 | 1 | L12 | BLM11A121S | BLM11A121S | MURATA |
| 18 | 1 | L13 | 330nH | LL2012-FR33K | |
| 19 | 10 | R5,R6,R12,R13,R32,R33, | 10K | ERJ3EKF1002 | PANASONIC |
| | | R39,R40,R95,R100 | | | |
| 20 | 2 | R34,R7 | 6.04K | ERJ3EKF6041 | PANASONIC |
| 21 | 4 | R8,R10,R35,R37 | 1K | 3224W-1-102 | BOUMS |
| 22 | 4 | R9,R36,R90,R103 | 2K | ERJ3EKF2001 | PANASONIC |
| 23 | 2 | R38,R11 | 1.5K | ERJ3EKF1501 | PANASONIC |
| 24 | 3 | R56,R94,R99 | 0 ohm | ERJ3GSY0R00 | PANASONIC |

FIG.61A

| | | | | | |
|---|---|---|---|---|---|
| 25 | 1 | R59 | 51 | ERJ3GSYJ510 | PANASONIC |
| 26 | 7 | R60,R61,R62,R84,R85,R86, | 0 | ERJ3GSY0R00 | PANASONIC |
| | | R87 | | | |
| 27 | 6 | R63,R64,R66,R69,R70,R72 | 1K | ERJ3EKF1001 | PANASONIC |
| 28 | 2 | R71,R65 | 1.1K | ERJ3EKF1101 | PANASONIC |
| 29 | 2 | R80,R79 | RESISTOR | | |
| 30 | 3 | R81,R82,R83 | R | | |
| 31 | 4 | R88,R91,R96,R101 | 1.33K | ERJ3EKF1331 | PANASONIC |
| 32 | 2 | R102,R89 | 4.02K | ERJ3EKF4021 | PANASONIC |
| 33 | 2 | R92,R97 | 499 | ERJ3EKF4990 | PANASONIC |
| 34 | 19 | TP1,TP2,TP3,TP4,TP5,TP6, | TP–105–01–00 | | |
| | | TP8,TP9,TP11,TP12,TP13, | | | |
| | | TP14,TP15,TP16,TP18,TP19, | | | |
| | | TP20,TP21,TP22 | | | |
| 35 | 3 | U1,U6,U19 | AD8052AR | AD8052AR | ANALOG DEVICES |
| 36 | 2 | U7,U2 | D2D_V11 | D2D_V11 | PARKER VISION |
| 37 | 1 | U11 | MAAM22010 | MAAM22010 | MACOM |
| 38 | 1 | U12 | 1X603 | 1X603 | ANAREN |
| 39 | 1 | U14 | AD1582 | AD1582 | ANALOG DEVICES |
| 40 | 1 | U15 | UPG1678 | UPG1678GV | NEC |
| 41 | 1 | U16 | ADP–2–10–75 | ADP–2–10–75 | MINI–CIRCUITS |
| 42 | 1 | | BOARD | 8500.641.021 | V05.10 |

FIG.61B

| ITEM | QTY | REFERENCE | PART | DESCRIPTION | PART NUMBER | VENDOR |
|---|---|---|---|---|---|---|
| | | | | | | |
| 1 | 4 | C1,C6,C7,C10 | 1uF | Cap, 1uF, +80-20%,0805 | GRM40Y5V105Z016AD | MURATA |
| 2 | 6 | C2,C3,C4,C8,C11,C12 | 100pF | Cap, 100pF, 5%, COG, 0603 | ECU-V1H101JCV | PANASONIC |
| 3 | 2 | C5,C9 | .1uF | Cap, .1uF, +80-20%, Y5V, 0603 | | MURATA |
| 4 | 3 | C13,C14,C19 | 22uF | Cap, Tant, 22uF, 20%, 20V | T491D226M020AS | KEMET |
| 5 | 4 | C15,C16,C17,C18 | 4.7uF | Cap, Tant, 4.7uF, 20%, 20V | T491C475M020AS | KEMET |
| 6 | 2 | JP2,JP6 | HEADER 7X2 | Receptacle, 7x2pin, .050 | SFMC-107-L1-S-D | SAMTEK |
| 7 | 9 | JP4, J4, J5, J6, J7, JP9, J9, | CON3 | Header, 3pin, .100'' | 69190-403 | BERG |
| | | J10, JP11 | | | | |
| 8 | 1 | JP7 | HEADER 10X2 | Receptacle, 10X2pin, .050 | SFMC-110-L1-S-D | SAMTEK |
| 9 | 1 | JP8 | HEADER 5X2 | Receptacle, 5X2pin, .050 | SFMC-105-L1-S-D | SAMTEK |
| 10 | 1 | J2 | EHT-1-10-01-S-D | Header, ribbon, 10X2pin, 2mm | EHT-1-10-01-S-D | SAMTEK |
| 11 | 3 | J8,J11,J12 | 82MMCX-50-0-1 | Connector,RF | 82MMCX-50-0-1 | SUHNER |
| 12 | 2 | L3,L1 | Ferrite Bead | Ferrite Bead, 0805 | BLM21A121S | MURATA |
| 13 | 2 | L4,L2 | 330nH | Ind, 330nH, 10%, 0805 | LL2012-FR33K | TOKO |
| 14 | 1 | R1 | DNP | Res, 0603 | | PANASONIC |
| 15 | 2 | R9,R2 | 91 | Res, 91 Ohn, 5%, 0603 | ERJ-3GSYJ910 | PANASONIC |
| 16 | 2 | R7,R3 | 240 | Res, 240 Ohm, 5%, 0603 | ERJ-3GSYJ241 | PANASONIC |
| 17 | 4 | R4,R5,R10,R11 | 82 | Res, 82 Ohm, 5%, 0603 | ERJ-3GSYJ820 | PANASONIC |
| 18 | 2 | R8,R6 | 5K | Var Res, 5K, 10% | 3296W001502 | BOUMS |
| 19 | 10 | R12, R13, R14, R15, R16, | 180 | Res, 180 Ohm, 5%, 0603 | ERJ-3GSYJ181 | PANASONIC |
| | | R17, R18, R19, R20, R21 | | | | |
| 20 | 10 | R22, R23, R24, R25, R26, | 390 | Res, 390 Ohm, 5%, 0603 | ERJ-3GSYJ391 | PANASONIC |
| | | R27, R28, R29, R30, R31 | | | | |
| 21 | 2 | U5,U1 | UPG1678 | IC, RF Buffer | UPG1678GV | NEC |
| 22 | 2 | U4,U2 | LM317 | IC, Voltage Regulator | LM317T | NATIONAL |
| 23 | 1 | U3 | ADP-2-10-75 | RF Splitter | ADP-2-10-75 | MINICIRCUITS |
| 24 | 1 | U6 | DS3862 | IC, Buffer | DS3862WM | NATIONAL |
| 25 | 1 | | | BOARD | ST8500.641.023V0L01 | |

FIG.63

| ITEM | QTY | REFERENCE | PART | MANUFACT. | PART DESCRIPTION | PART NUMBER |
|---|---|---|---|---|---|---|
| | | | | | | |
| 1 | 24 | C1,C2,C3,C5,C6,C17,C18, | 0.1uF | MURATA | .1uF,0603,X7R,20%,16V | GRM39X7R104M016 |
| | | C19,C20,C28,C35,C36,C37, | | | | |
| | | C38,C40,C41,C44,C48,C55, | | | | |
| | | C56,C57,C59,C60,C62 | | | | |
| 2 | 1 | C4 | 330pF | MURATA | 330pF,0603,COG,10%,50 | GRM39COG331K050 |
| 3 | 2 | C10,C7 | 22pF | MURATA | 22pF,0603,COG,10%,50 | GRM30COG220K050 |
| 4 | 4 | C8,C9,C23,C24 | 470pF | MURATA | 470pF,0603,COG,10%,50 | GRM39COG471K050 |
| 5 | 6 | C11,C13,C25,C26,C27,C46 | 10pF | MURATA | 10pF,0603,COG,10%,50 | GRM39COG100K050 |
| 6 | 1 | C12 | 8pF | MURATA | 8pF,0603,COG,10%,50 | GRM39COG080K050 |
| 7 | 8 | C15,C16,C21,C22,C50,C54 | 100pF | MURATA | 100pF,0603,COG,10%,50 | GRM39COG101K050 |
| | | C58,C61 | | | | |
| 8 | 3 | C39,C43,C47 | 4.7uF | PANASONIC | 4.7uF TANTALUM,16V | ECS-T1CY475R |
| 9 | 1 | C52 | 33pF | MURATA | 330pF,0603,COG,10%,50 | GRM3COG330K050 |
| 10 | 2 | FL1,FL2 | MDR642E | SOSHIN | 2.4-2.5GHz BPF | MDR642E |
| 11 | 1 | JP1 | HEADER 7X2 | SAMTEC | DUAL ROW, 7 PINS PER ROW | FTSH-107-01-F-D |
| 12 | 3 | J1,J2,J3 | 82MMCX-50-0-1 | SUHNER | RF CONNECTOR | 82MMCX-50-0-1 |
| 13 | 6 | J4,J5,J6,J7,J9,J10 | CON3 | BERG | 3 PIN HEADER W RETENTIVE LEG | 69190-403H |
| 14 | 2 | L10,L1 | BLM21A601R | MURATA | 600 OHMS@100MHz,500mA FERRITE BEAD | BLM21A601R |
| 15 | 4 | L2,L3,L5,L6 | 22nH | COILCRAFT | 22nH,0805CS (2012),5% | 0805CS-220X-BC |
| 16 | 9 | L7,L8,L9,L11,L12,L13,L14, | BLM11A121S | MURATA | RF BEAD | BLM11A121S |
| | | L15,L16 | | | | |
| 17 | 4 | Q1,Q2,Q3,Q4 | NDS336P | NATIONAL | P-CHANNEL FET | NDS336P |
| 18 | 12 | R1,R2,R5,R6,R7,R9,R11, | R | PANASONIC | | |
| | | R13,R16,R17,R18,R19 | | | | |
| 19 | 2 | R3,R4 | 100 | PANASONIC | 0603,100,5%,1/16W | ERJ-3GSY-J-101 |
| 20 | 5 | R10,R12,R15,R20,R21 | 4.7K | PANASONIC | 0603,4.7K,5%,1/16W | ERJ-3GSY-J-472 |

FIG.66A

| | | | | | | |
|---|---|---|---|---|---|---|
| 21 | 1 | R14 | 3.6K | PANASONIC | 0603,3.6K,5%,1/16W | ERJ-3GSY-J-362 |
| 22 | 1 | T1 | 80 OHM,L=100 MIL,W=20 MIL | | 80 OHM,L=100 MIL,W=20 MIL | |
| 23 | 1 | T2 | 50 OHM,L=100 MIL,W=54 MIL | | 50 OHM,L=100 MIL,W=54 MIL | |
| 24 | 1 | T3 | 102 OHM,L=220 MIL,W=10 MIL | | 102 OHM,L=220 MIL,W=10 MIL | |
| 25 | 1 | T4 | 67 OHM,L=200 MIL,W=30.7 MIL | | 67 OHM,L=200 MIL,W=30.7 MIL | |
| 26 | 1 | T5 | 100 OHM,L=200 MIL,W=10.7MIL | | 100 OHM,L=200 MIL,W=10.7 MIL | |
| 27 | 4 | U2,U3,U6,U7 | MAAM22010 | MACOM | 2.4-2.5 GHz LNA | MAAM22010 |
| 28 | 1 | U4 | UPG152TA | NEC | RF SWITCH | UPG152TA |
| 29 | 5 | U11,U12,U16,U18,U19 | NC7S04M5 | NATIONAL | INVERTER | NC7S04M5 |
| 30 | 1 | U14 | TKN11230B | TOKO | VOLTAGE REGULATOR | TK11230B |
| 31 | 1 | U17 | RF2128P | RFMD | MEDIUM POWER LINEAR AMPLIFIER | RF2128P |
| 32 | 1 | | | | BOARD | B500.641.024 VOL. |

FIG.66B $$\text{PATH LOSS (dB)} = 20\ \text{LOG}_{10}(4 \times \text{PI} \times \text{D/LAMBDA})$$

WHERE:

r = D IS THE RADIUS OF THE WLAN CELL

LAMBDA = c/f WHERE: c = SPEED OF LIGHT ($3 \times 10^8 ms^{-1}$)

f = SIGNAL FREQUENCY IN Hz

OP AMP

THRESHOLD CURRENT SOURCE

OP AMP

WIRELESS LOCAL AREA NETWORK (WLAN) TECHNOLOGY AND APPLICATIONS INCLUDING TECHNIQUES OF UNIVERSAL FREQUENCY TRANSLATION

This application claims priority to U.S. Provisional Application No. 60/147,129, filed Aug. 4, 1999, which is incorporated by reference herein in its entirety.

CROSS-REFERENCE TO OTHER APPLICATIONS

The following applications of common assignee are related to the present application, and are herein incorporated by reference in their entireties:

"Method and System for Down-Converting Electromagnetic Signals," Ser. No. 09/176,022, filed Oct. 21, 1998, now U.S. Pat. No. 6,061,551.

"Method and System for Down-Converting Electromagnetic Signals having Optimized Switch Structures," Ser. No. 09/293,095, filed Apr. 16, 1999, now U.S. Pat. No 6,580, 902.

"Method and System for Down-Converting Electromagnetic. Signals Including Resonant Structures for Enhanced Energy Transfer," Ser. No. 09/293,342, filed Apr. 16, 1999, now U.S. Pat. No. 6,687,493.

"Method and System for Frequency Up-Conversion," Ser. No. 09/176,154, filed Oct. 21, 1998, now U.S. Pat. No. 6,091,940.

"Method and System for Frequency Up-Conversion with a Variety of Transmitter Configurations," Ser. No. 09/293, 580, filed Apr. 16, 1999, now U.S. Pat. No. 6,542,722.

"Method and System for Ensuring Reception of a Communications Signal," Ser. No. 09/176,415, filed Oct. 21, 1998, now U.S. Pat. No. 6,061,555.

"Integrated Frequency Translation And Selectivity," Ser. No. 09/175,966, filed Oct. 21, 1998, now U.S. Pat. No. 6,049,706.

"Integrated Frequency Translation and Selectivity with a Variety of Filter Embodiments," Ser. No. 09/293,283, filed Apr. 16, 1999, now U.S. Pat. No. 6,560,301.

"Applications of Universal Frequency Translation," Ser. No. 09/261,129, filed Mar. 3, 1999, now U.S. Pat. No. 6,370,371.

"Method, System, and Apparatus for Balanced Frequency Up-Conversion of a Baseband Signal," Ser. No. 09/525,615, filed Mar. 14, 2000, now U.S. Pat. No. 6,853,690.

"DC Offset, Re-radiation, and I/Q Solutions Using Universal Frequency Translation Technology," Ser. No. 09/526, 041, filed Mar. 14, 2000, now U.S. Pat. No. 6,879,817.

"Method and System for Down-converting an Electromagnetic Signal, and Transforms for Same, and Aperture Relationships," Ser. No. 09/550,644, filed Apr. 14, 2000.

"Wireless Local Area Network (WLAN) Using Universal Frequency Translation," Serial No. 09/632,855, filed Aug. 4, 2000.

BACKGROUND OF THE INVENTION

1. Field of the Invention

The present invention is generally related to frequency translation, and applications of same, such as, but not limited to wireless local area networks (WLANs).

2. Related Art

Various communication components exist for performing frequency down-conversion, frequency up-conversion, and filtering in the area of wireless local area networks (WLANs). Also, schemes exist for signal reception in the face of potential jamming signals.

SUMMARY OF THE INVENTION

The present invention is related to frequency translation, and applications of same. Such applications include, but are not limited to, frequency down-conversion, frequency up-conversion, enhanced signal reception, unified down-conversion and filtering, and combinations and applications of same.

Further features and advantages of the invention, as well as the structure and operation of various embodiments of the invention, are described in detail below with reference to the accompanying drawings. The drawing in which an element first appears is typically indicated by the leftmost character(s) and/or digit(s) in the corresponding reference number.

BRIEF DESCRIPTION OF THE FIGURES

The present invention will be described with reference to the accompanying drawings, wherein:

FIG. 18 is a table of example values at nodes in the UDF module of FIG. 17.

FIG. 42 includes FIGS. 42A and 42B which should be referred to for references to FIG. 42 in the specification. FIG. 43 includes FIGS. 43A and 43B which should be referred to for references to FIG. 43 in the specification. FIG. 44 includes FIGS. 44A and 44B which should be referred to for references to FIG. 44 in the specification.

FIGS. 45 and 46A–C relate to an example MAC interface for an example WLAN interface embodiment.

FIGS. 47, 48, and 49A–C relate to an example demodulator/modulator facilitation module for an example WLAN interface embodiment. FIG. 47 includes FIGS. 47A–D which should be referred to for references to FIG. 47 in the specification. FIG. 48 includes FIGS. 48A–B which should be referred to for references to FIG. 48 in the specification.

FIGS. 50, 51, 52A, and 52B relate to an example alternate demodulator/modulator facilitation module for an example WLAN interface embodiment. FIG. 50 includes FIGS. 50 and 50A–D which should be referred to for references to FIG. 50 in the specification. FIG. 51 inlcudes FIGS. 51A–B which should be referred to for references to FIG. 51 in the specification.

FIGS. 53 and 54 relate to an example receiver for an example WLAN interface embodiment. FIG. 53 includes FIGS. 53A–C which should be referred to for references to FIG. 53 in the specification.

FIGS. 55, 56A, and 56B relate to an example synthesizer for an example WLAN interface embodiment. FIG. 55 inlcudes FIGS. 55A–C which should be referred to for references to FIG. 55 in the specification.

FIGS. 57, 58, 59, 60, 61A, and 61B relate to an example transmitter for an example WLAN interface embodiment. FIG. 57 includes FIGS. 57A–D which should be referred to for references to FIG. 57 in the specification. FIG. 60 includes FIGS. 60A–D which should be referred to for references to FIG. 60 in the specification.

FIGS. 62 and 63 relate to an example motherboard for an example WLAN interface embodiment. FIG. 62 includes FIGS. 62A–I which should be referred to for references to FIG. 62 in the specification.

FIGS. 64, 65, and 66 relate to example LNAs for an example WLAN interface embodiment. FIG. 64 includes FIGS. 64A–C which should be referred to for references to FIG. 64 in the specification. FIG. 65 includes FIGS. 65A–E which should be referred to for references to FIG. 65 in the specification. FIG. 66 includes FIGS. 66A–B which should be referred to for references to FIG. 66 in the specification.

FIG. 127 illustrates a station moving between APs.

FIG. 128A illustrates an OSI model including a PHY layer.

FIGS. 128B–128D illustrate exemplary block diagrams of PMD sublayers incorporating universal frequency translation technology, according to embodiments of the present invention.

FIG. 129A illustrates an exemplary DSSS PMD transmitter.

FIG. 129B illustrates an exemplary DSSS PMD receiver.

FIG. 129C illustrates an exemplary block diagrams of a DPSK modulation mode transmitter, according to an embodiment of the present invention.

FIGS. 129D–129F illustrate exemplary block diagrams related to DBPSK modulation mode transmitters, according to embodiments of the present invention.

FIGS. 129G–129I illustrate exemplary block diagrams related to DQPSK modulation mode transmitters, according to embodiments of the present invention.

FIG. 129J illustrates an exemplary block diagrams of a DBPSK/DQPSK modulation mode receiver, according to an embodiment of the present invention.

FIG. 129K illustrates an exemplary block diagram of a de-spread correlator and a DBPSK/DQPSK demodulator sharing components, according to embodiments of the present invention.

FIG. 129L illustrates an exemplary block diagram of a receiver DSSS PMD, according to an embodiment of the present invention.

FIGS. 129M–129P illustrate exemplary block diagrams related to DBPSK modulation mode receivers, according to embodiments of the present invention.

Figure 129A:
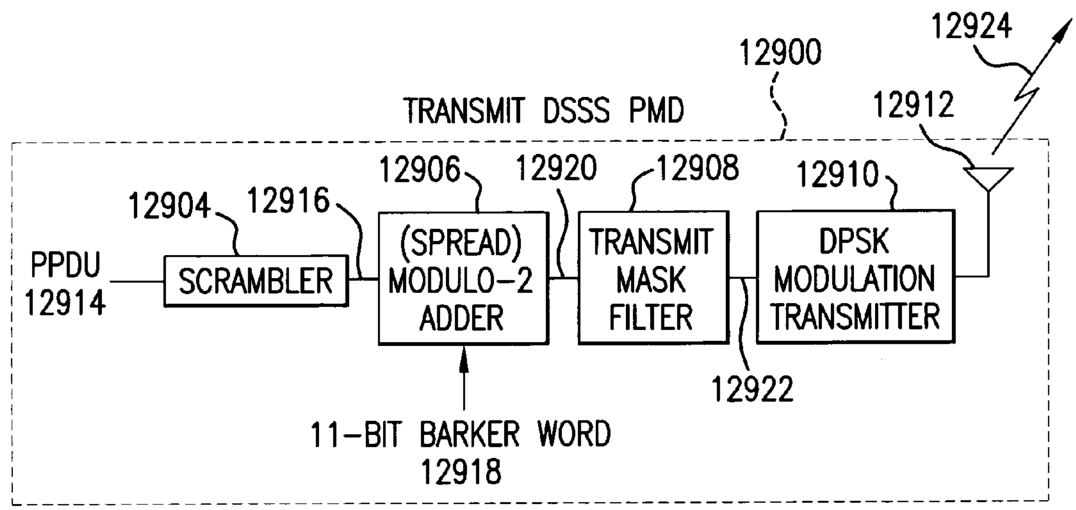
Figure 129B:
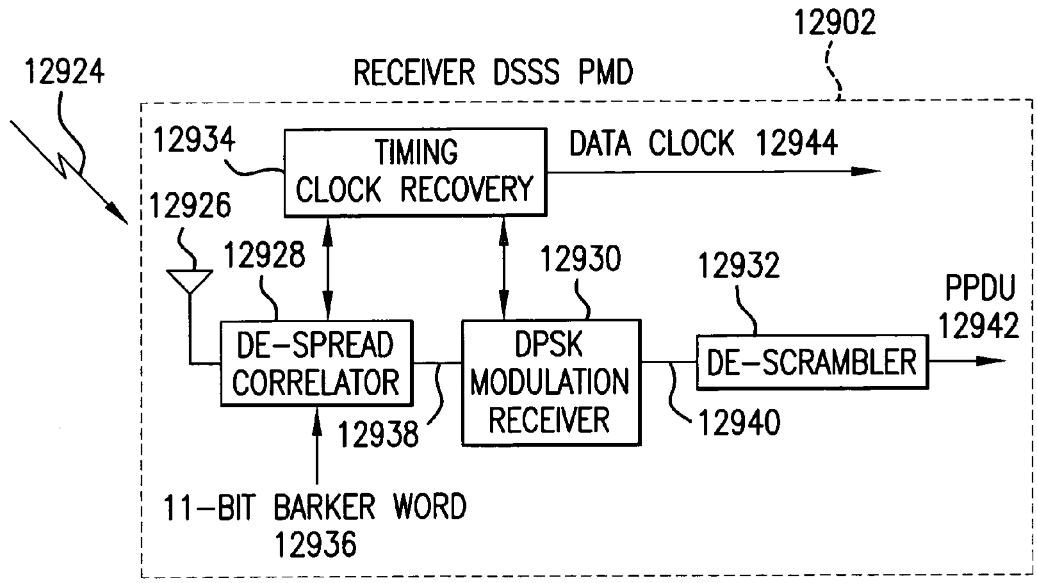
Figure 129C:
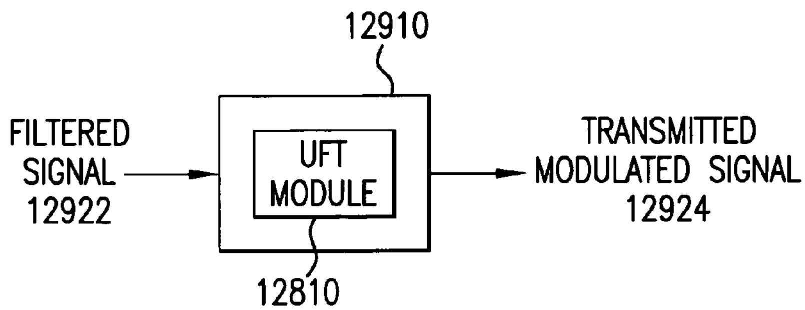
Figure 129D:
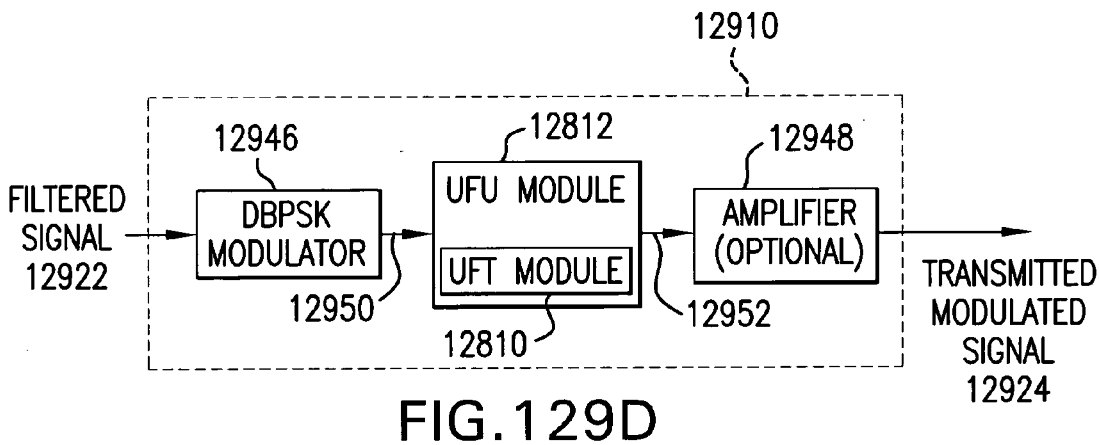
Figure 129E:
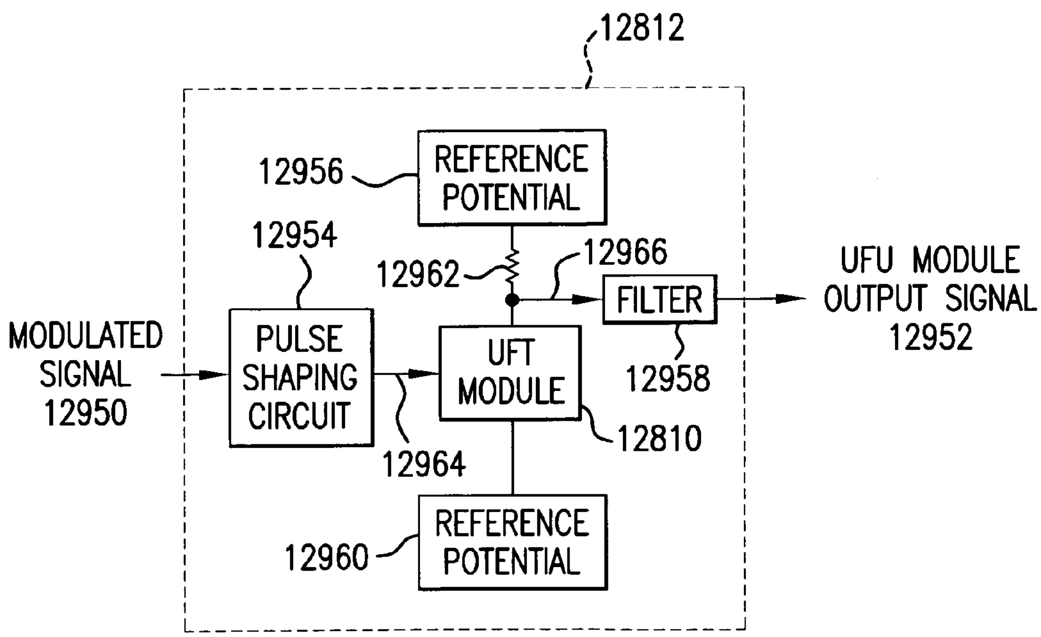
Figure 129F:
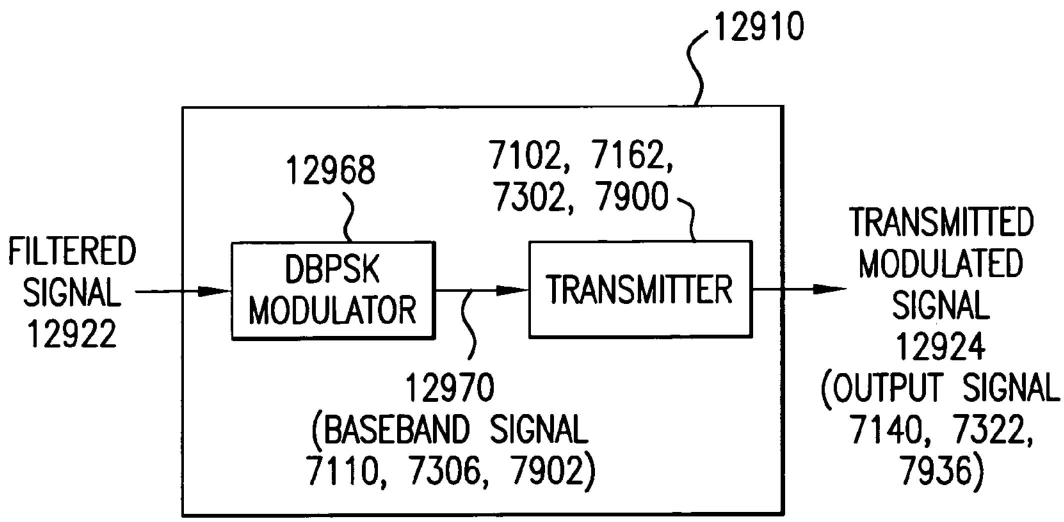
Figure 129G:
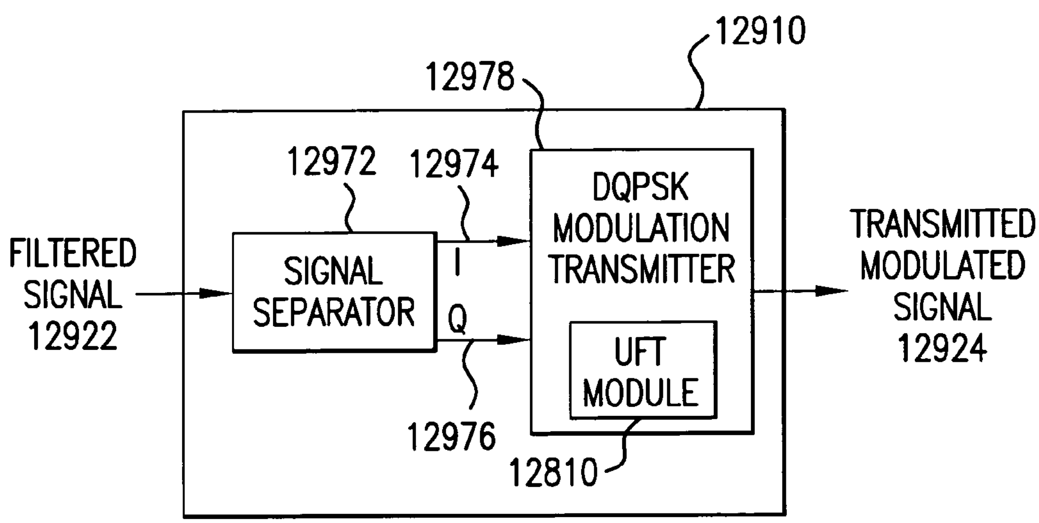
Figure 129H:
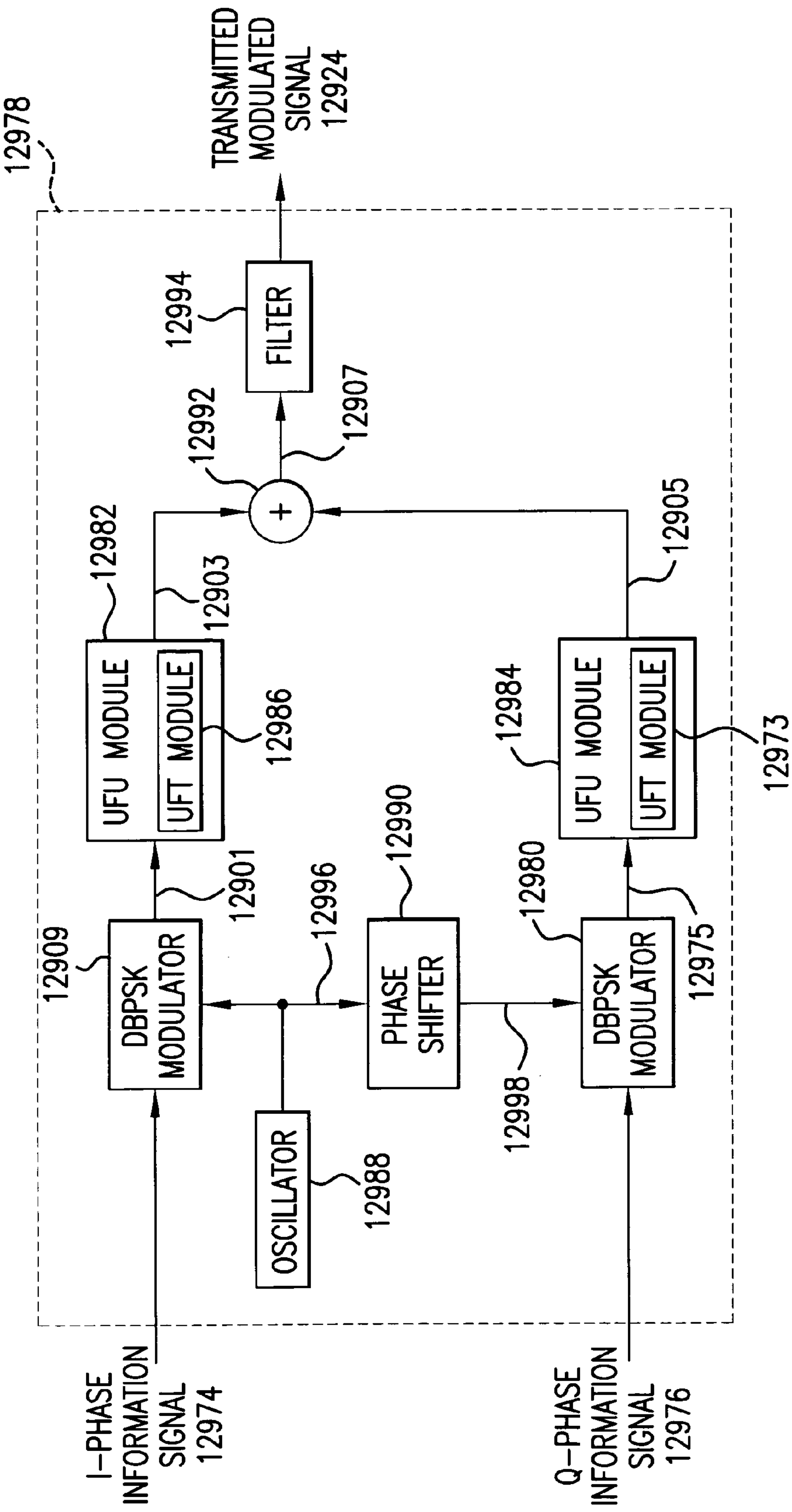
Figure 129I:
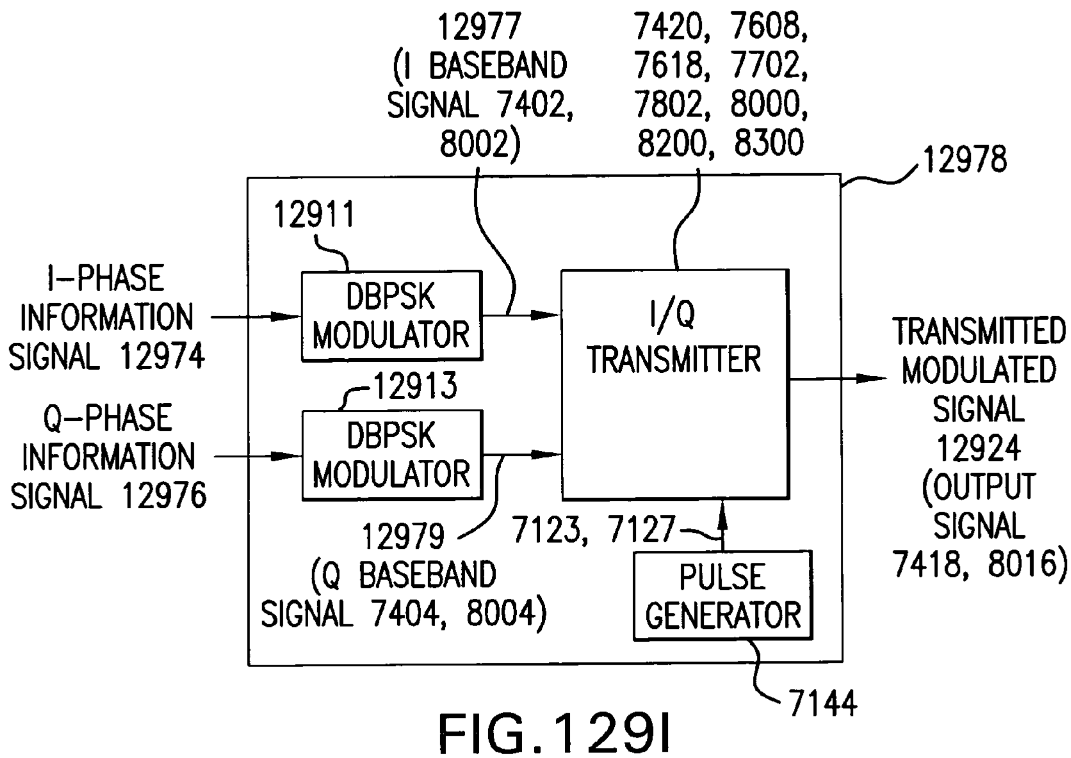
Figure 129J:
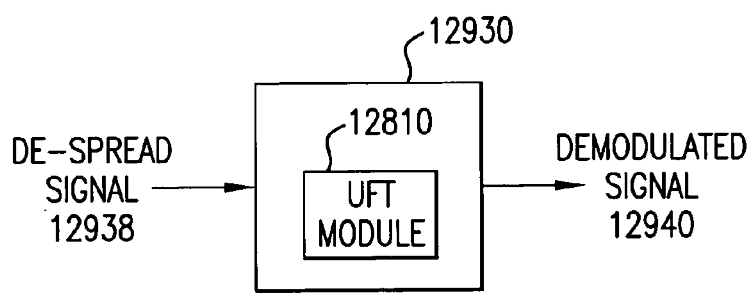
Figure 129K:
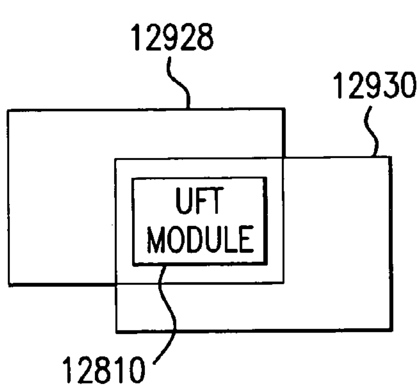
Figure 129L:
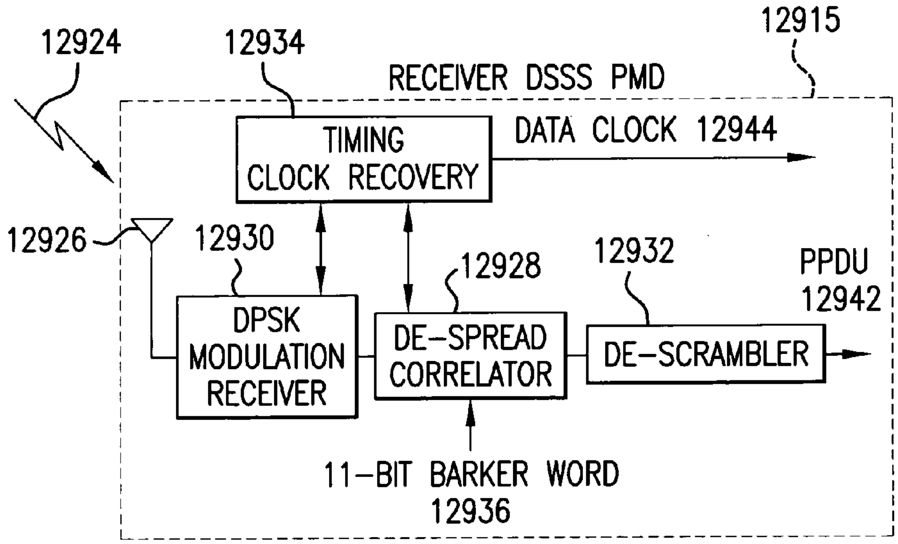
Figure 129M:
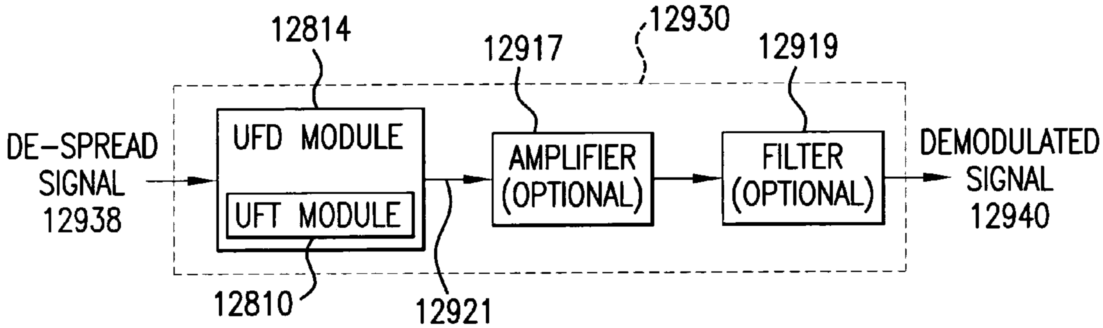
Figure 129N:
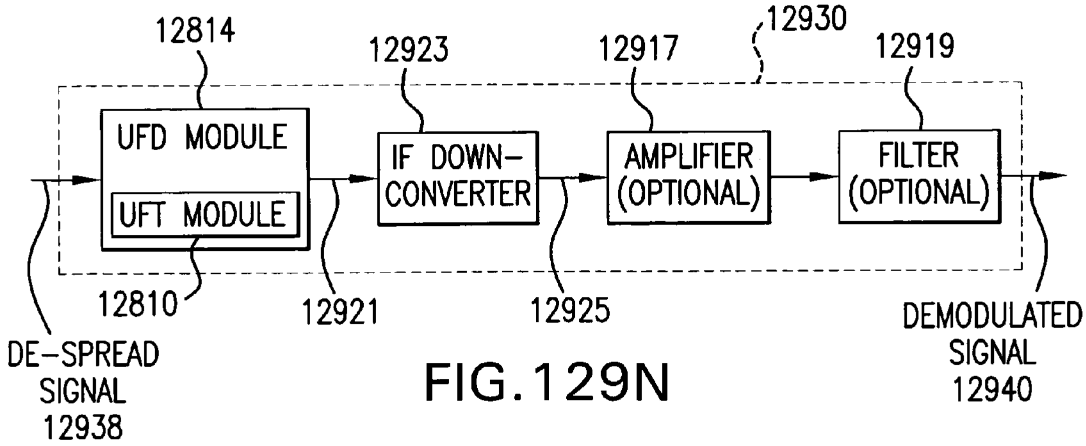
Figure 129O:
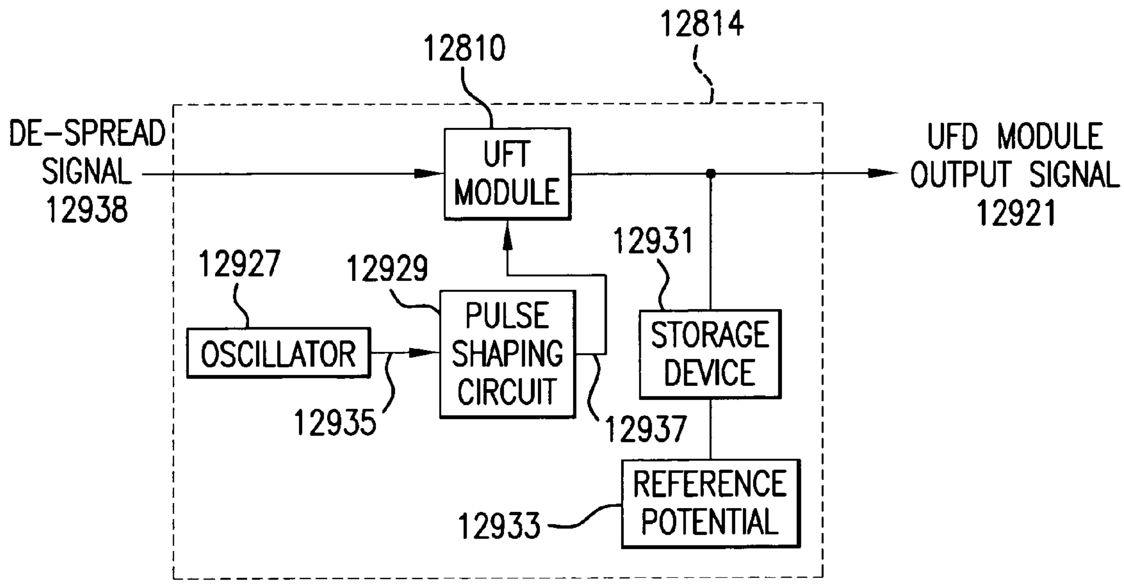
Figure 129P:
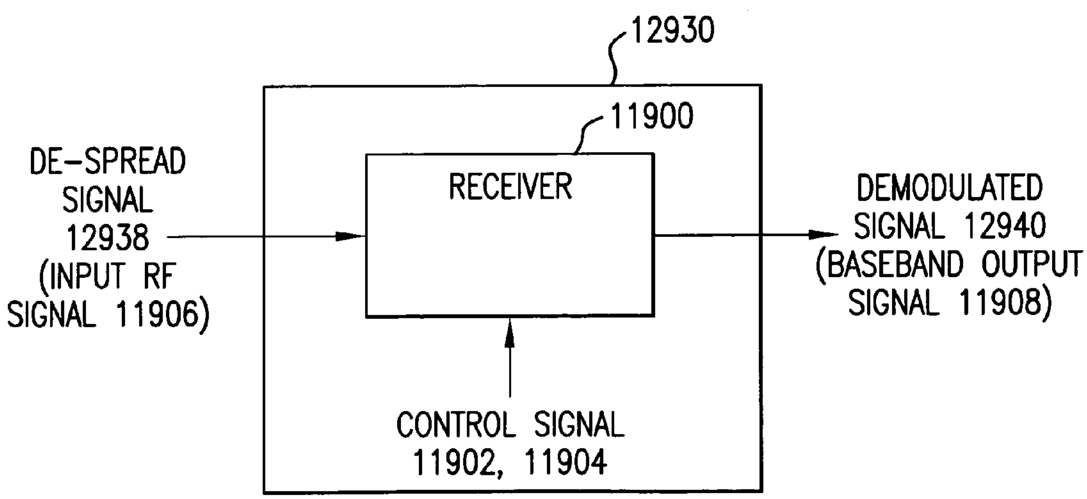
Figure 129Q:
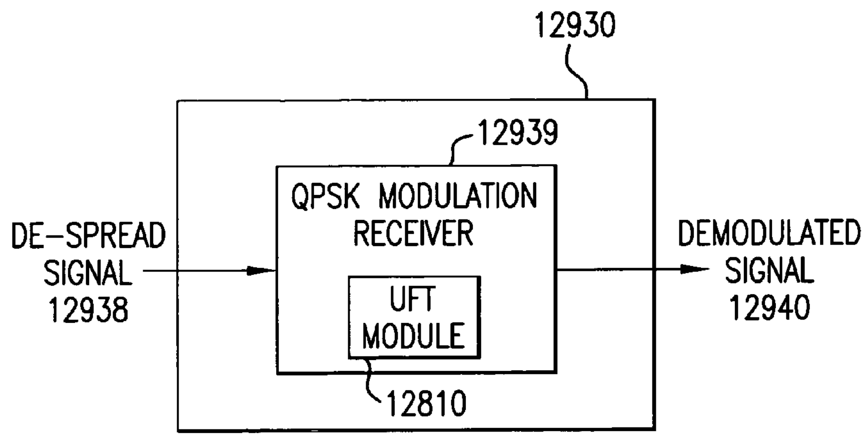
Figure 129R:
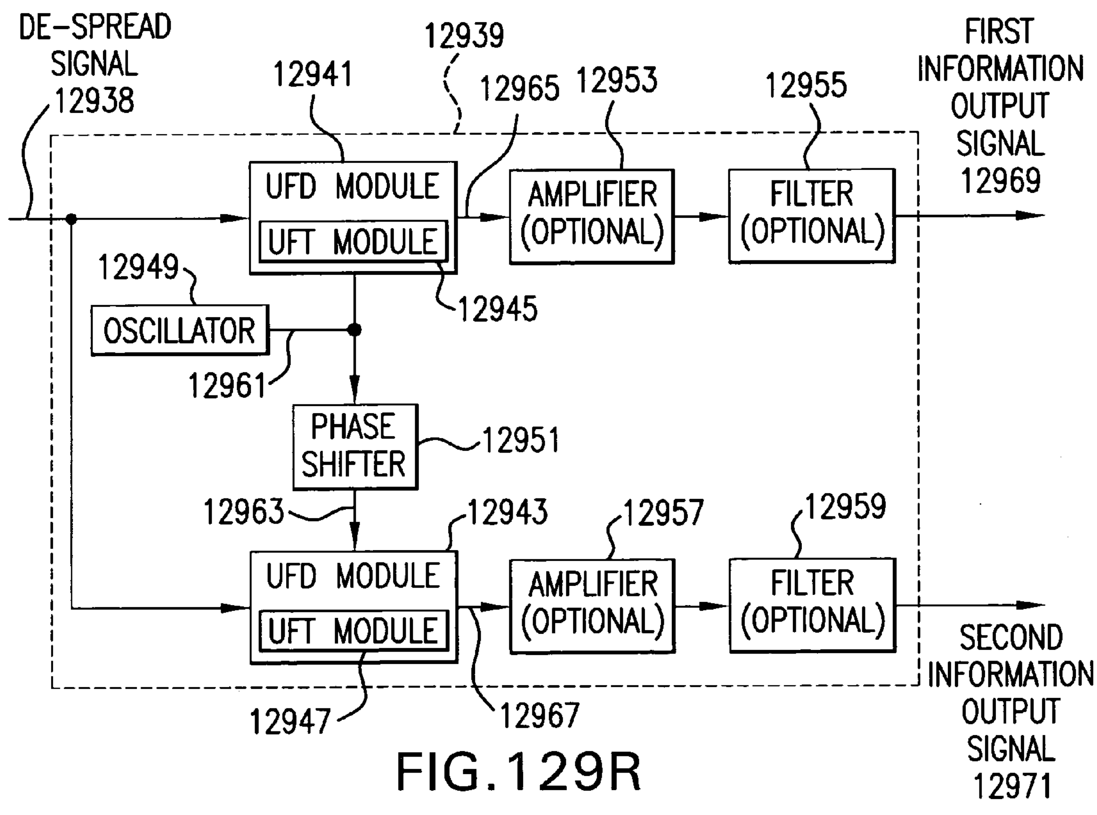
Figure 129S:
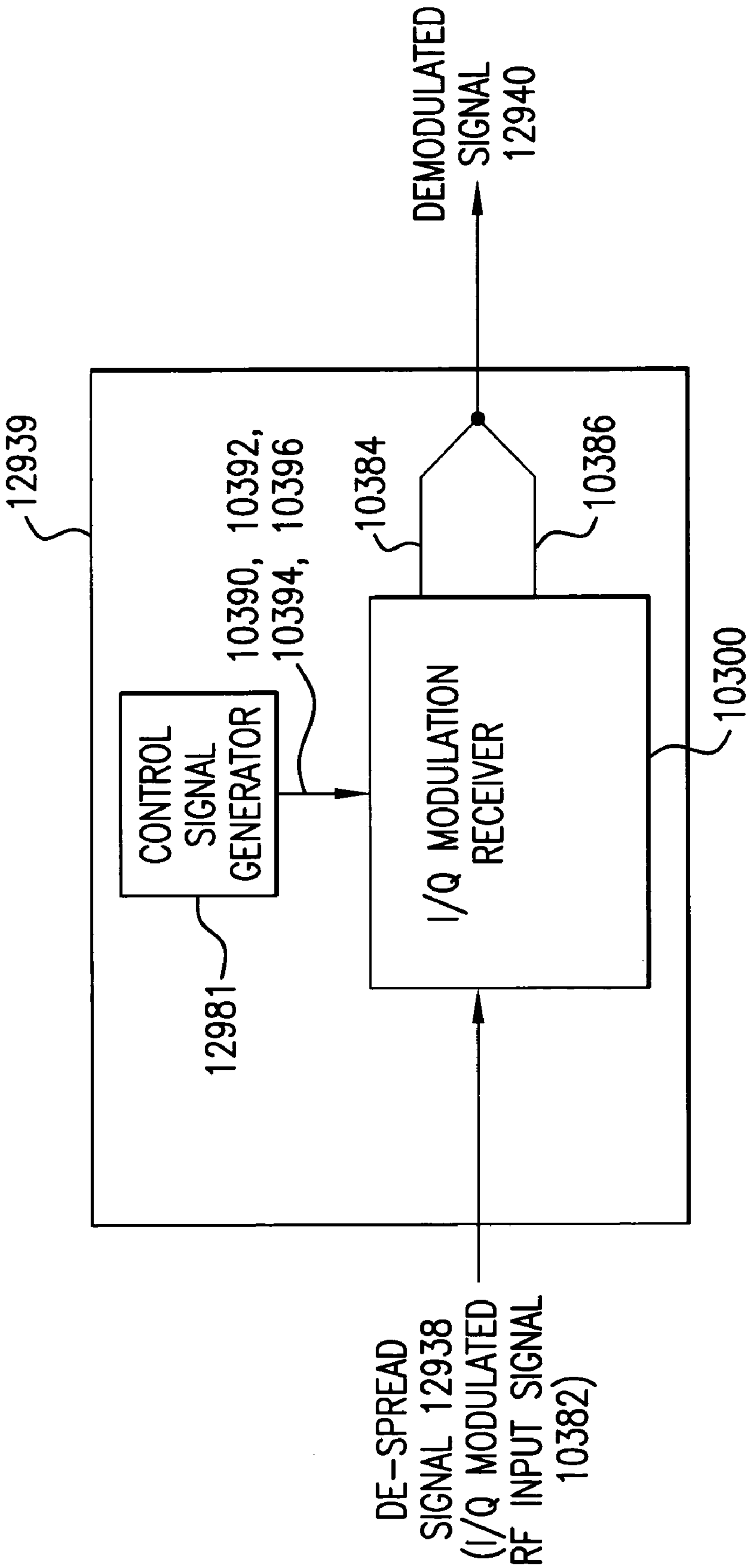

FIGS. 129Q–129S illustrate exemplary block diagrams related to DQPSK modulation mode transmitters, according to embodiments of the present invention.

Figure 130:
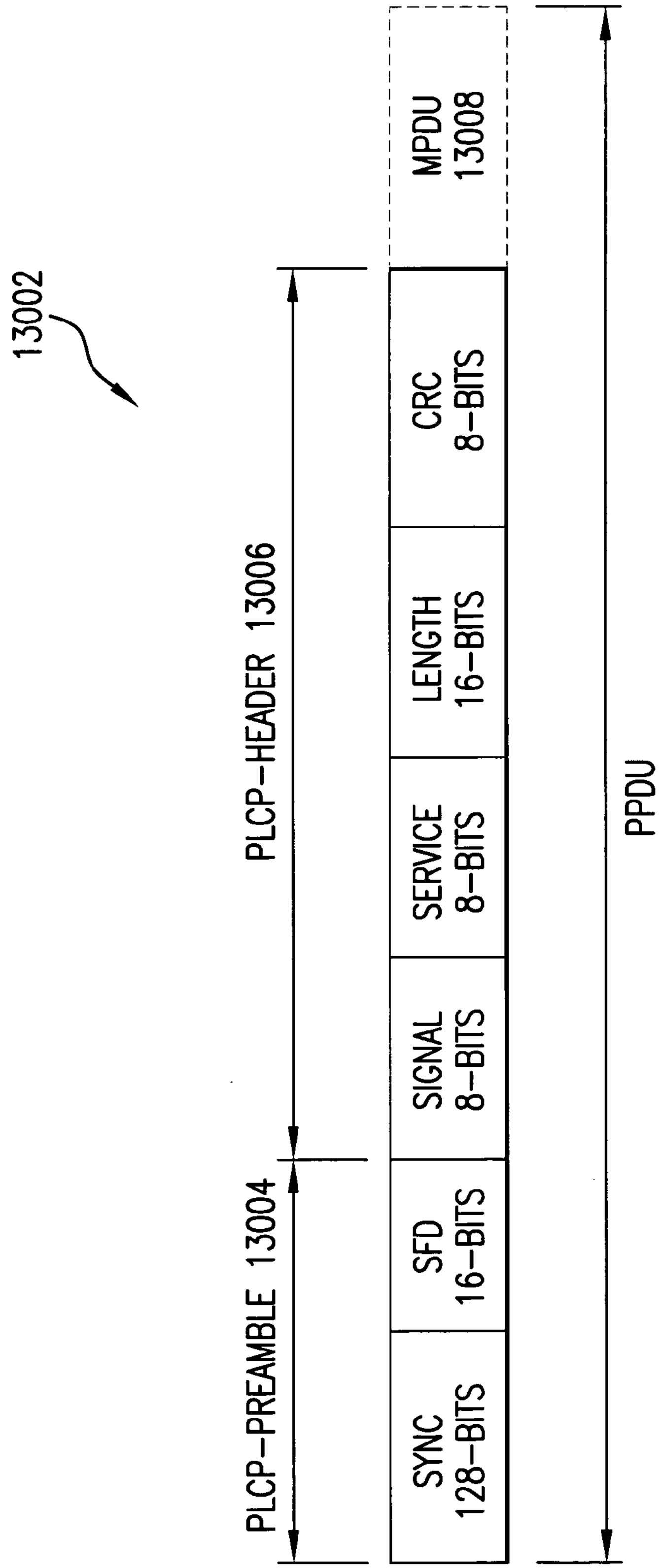

FIG. 130 illustrates a PPDU frame.

Figure 131:
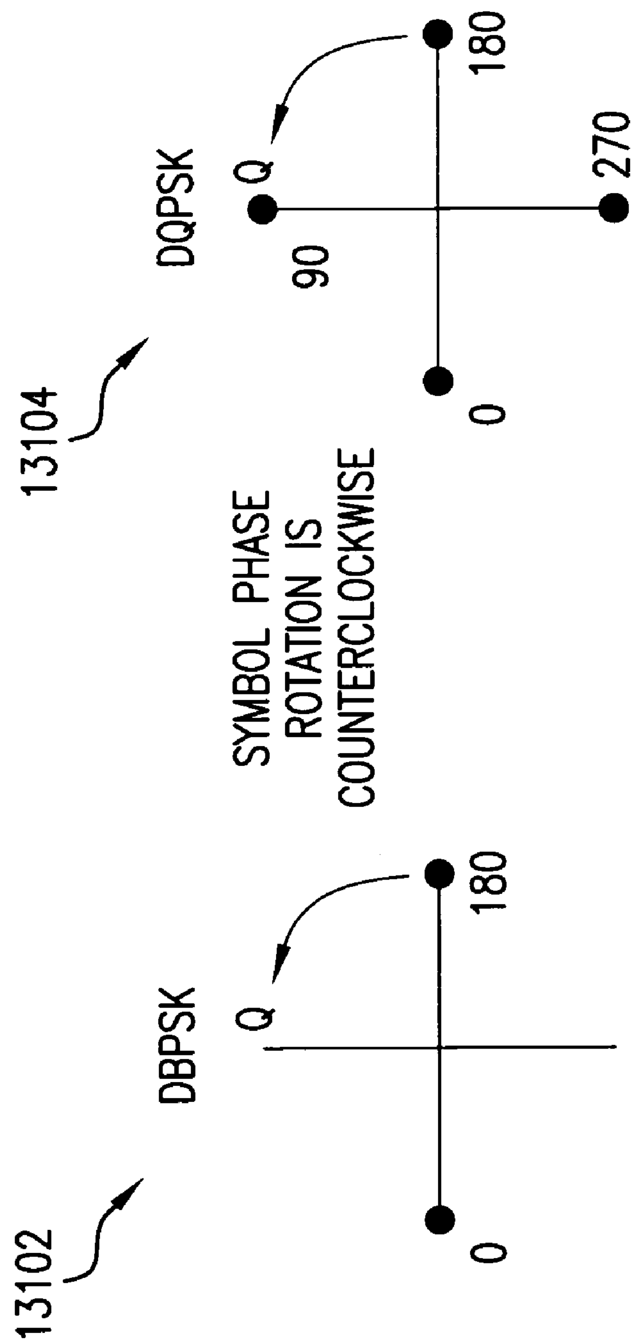

FIG. 131 illustrates constellation patterns related to DBPSK and DQPSK modulation.

Figure 132A:
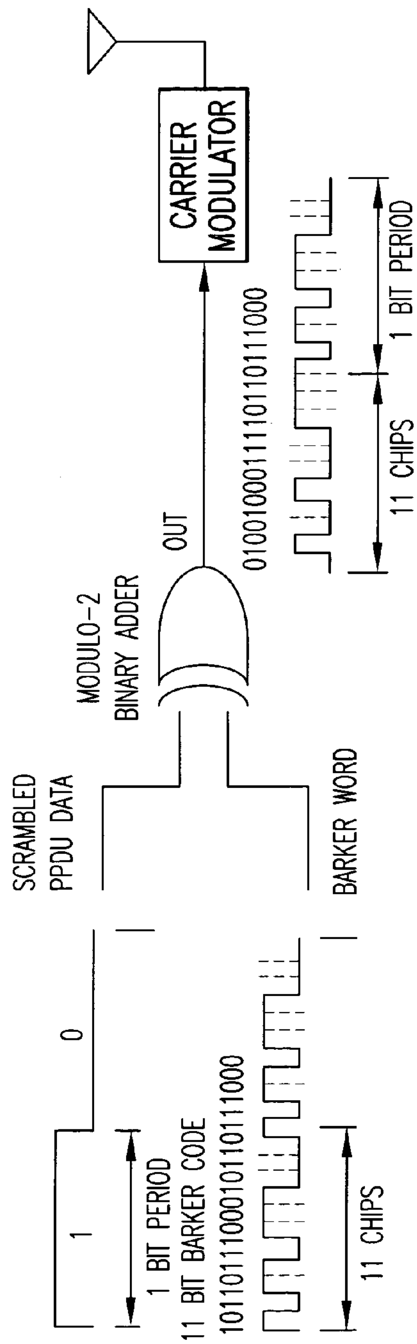

FIG. 132A illustrates application of an 11-bit Barker word and information bits to a modulo-2 adder (XOR function).

FIGS. 132B–132E illustrate transmitter and receiver signals before and after spreading.

Figure 133:
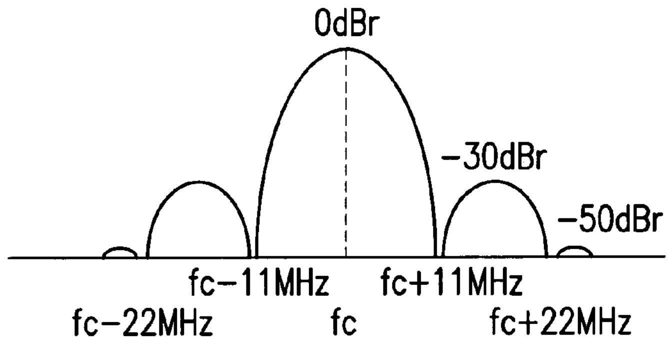

FIG. 133 illustrates a filtered SinX/X function.

Figure 134:
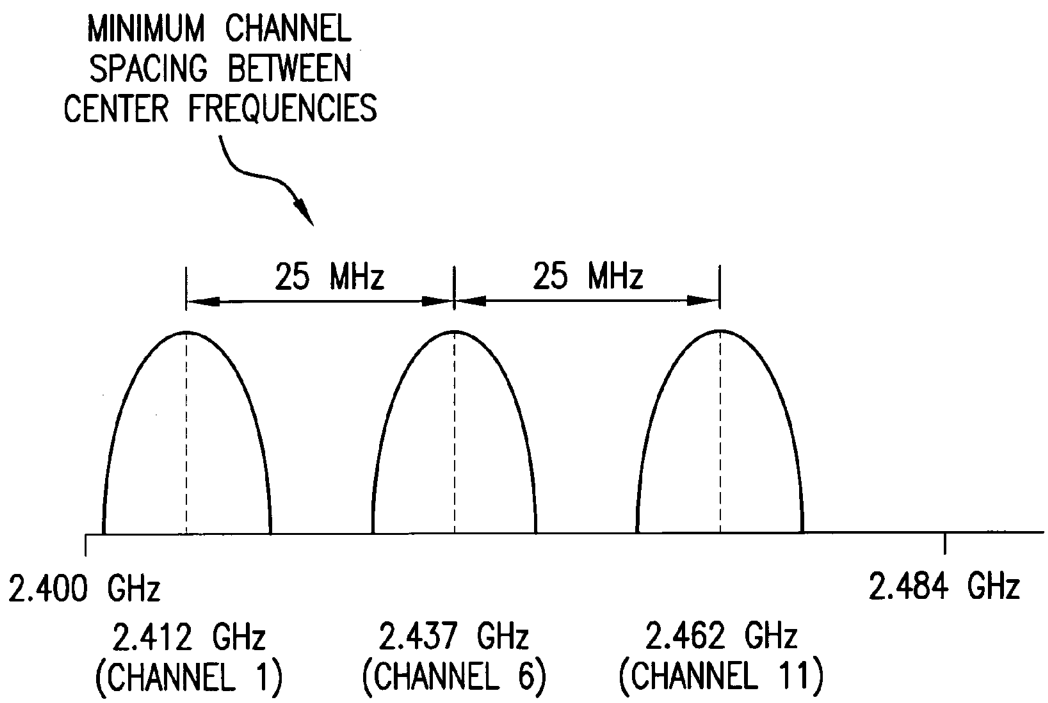

FIG. 134 illustrates a DSSS channel arrangement for North America.

Figure 135A:
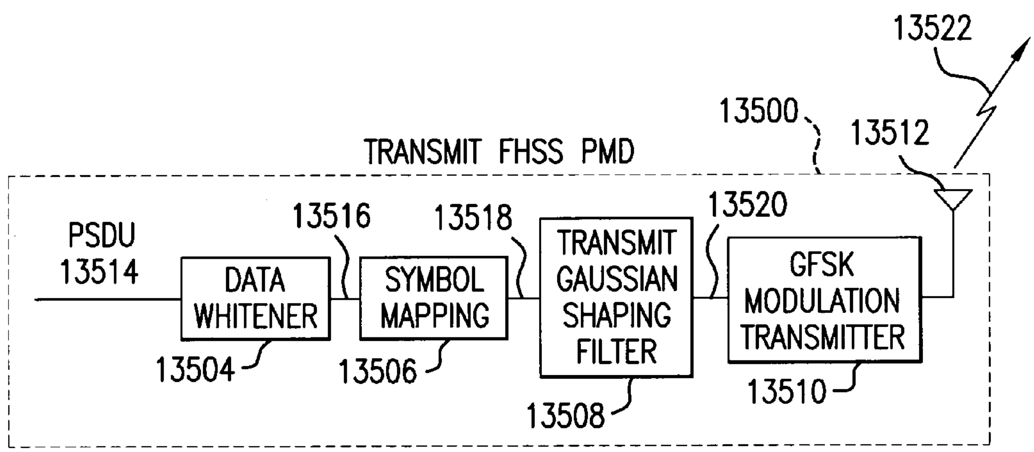
Figure 135B:
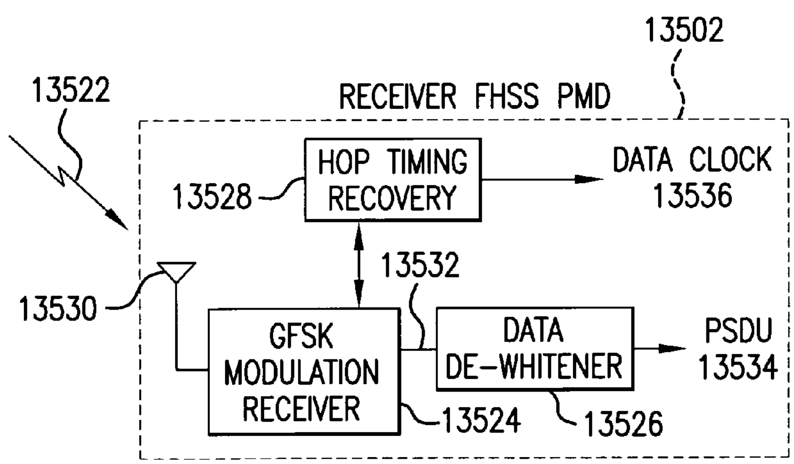

FIGS. 135A and 135B illustrate block diagrams showing elements of the FHSS PMD transmitter and receiver, respectively.

Figure 135C:
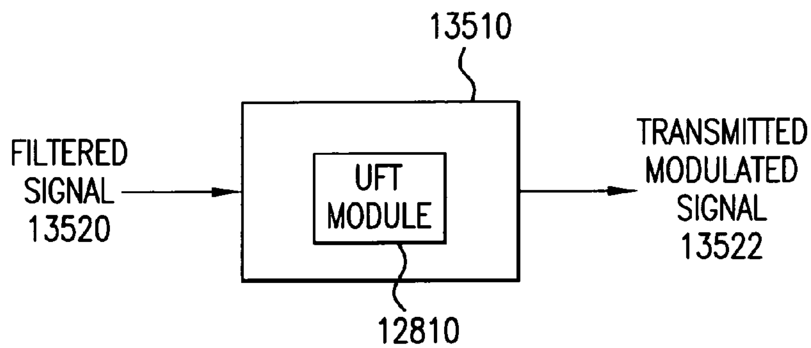

FIG. 135C illustrates an exemplary block diagram of a 2-level/4-level GFSK modulator, according to an embodiment of the present invention.

Figure 135D:
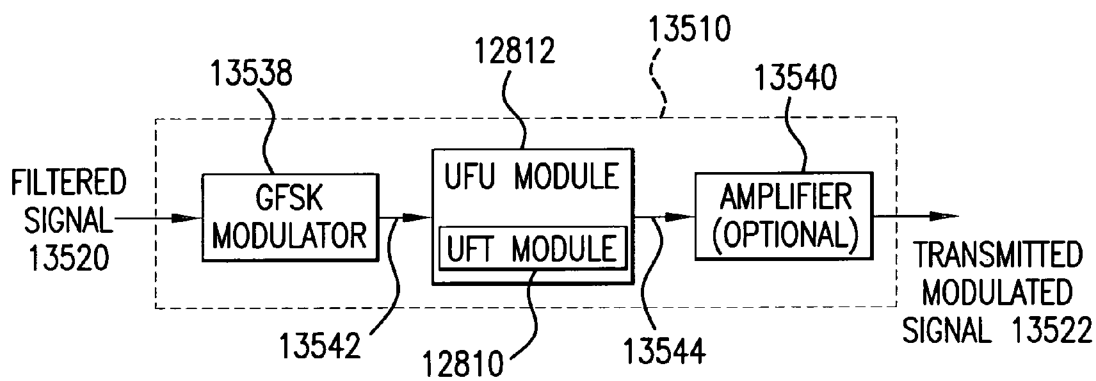
Figure 135E:
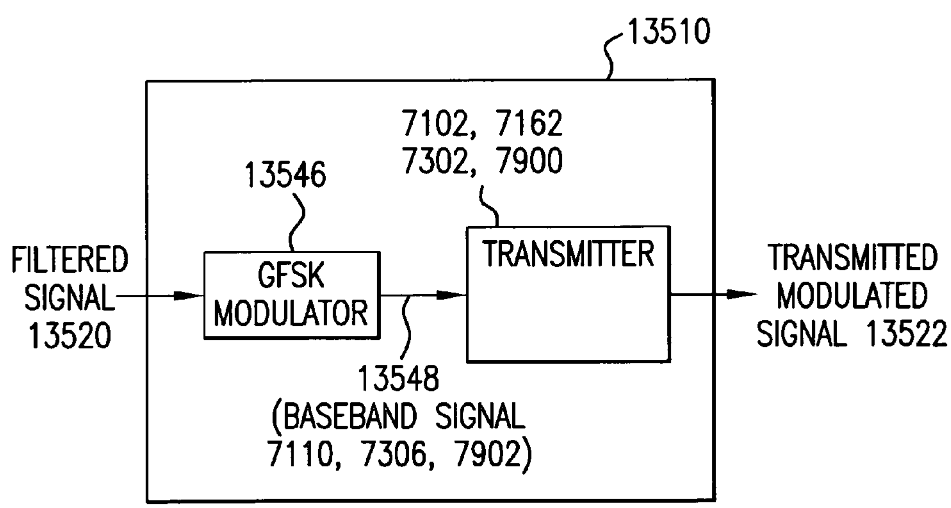

FIGS. 135D–135E illustrate exemplary block diagrams related to the 2-level/4-level GFSK modulator of FIG. 135C, according to embodiments of the present invention.

Figure 135F:
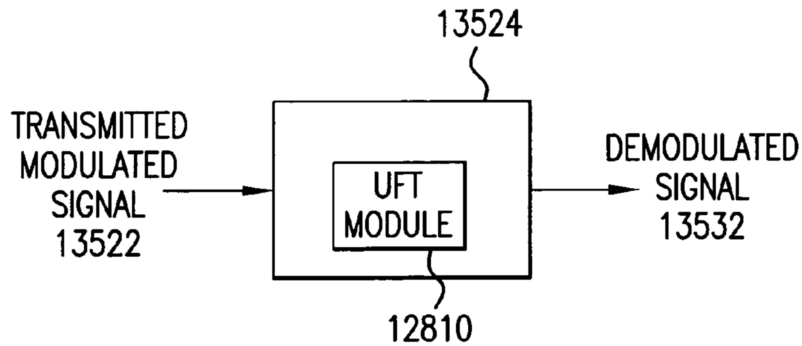

FIG. 135F illustrates an exemplary block diagram of a 2-level/4-level GFSK demodulator, according to an embodiment of the present invention.

Figure 135G:
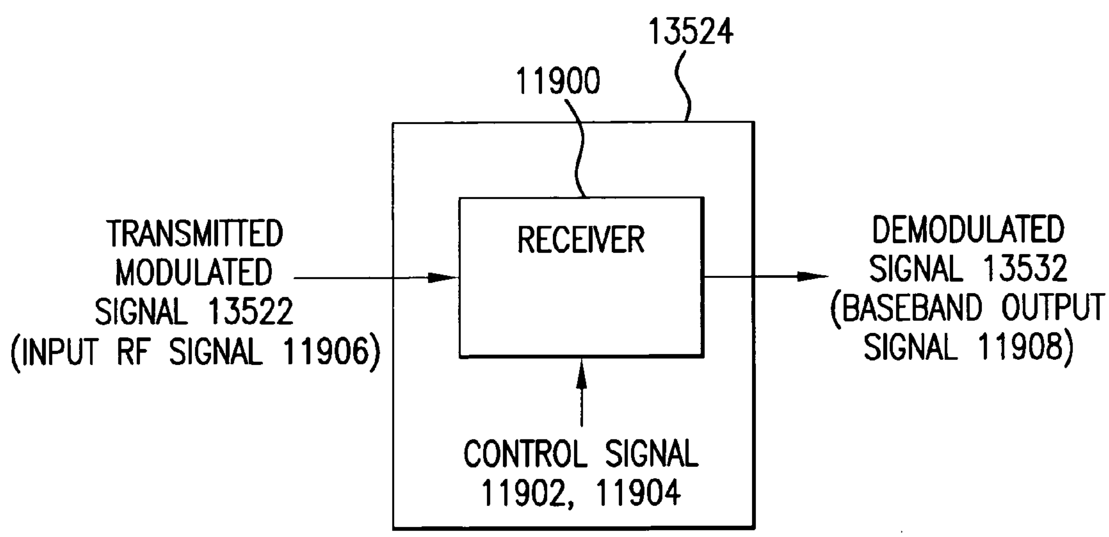

FIG. 135G illustrates an exemplary block diagrams related to the 2-level/4-level GFSK modulator of FIG. 135F, according to an embodiment of the present invention.

Figure 136:
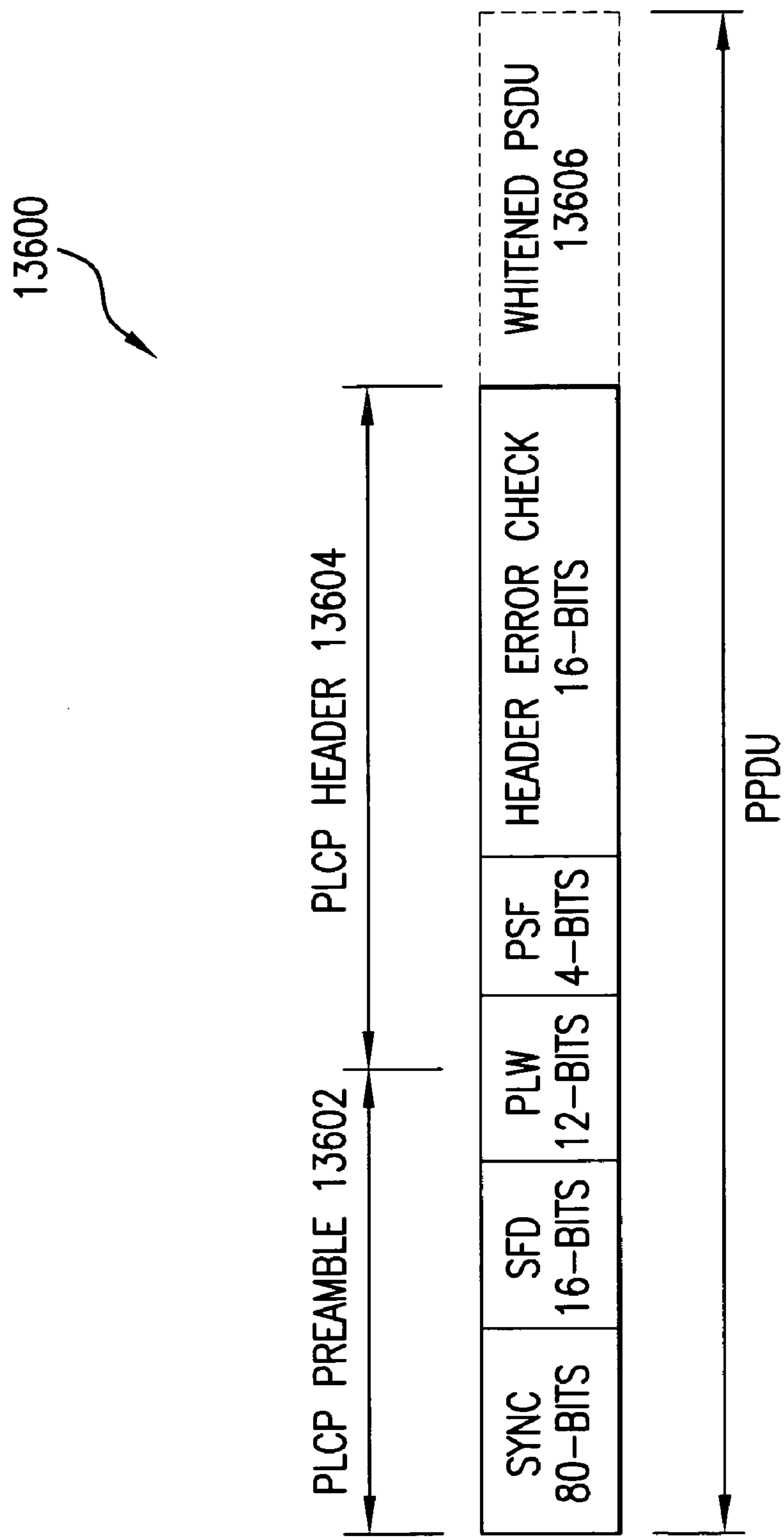

FIG. 136 illustrates a PLCP protocol data unit (PPDU) related to a DSSS PHY.

Figure 137:
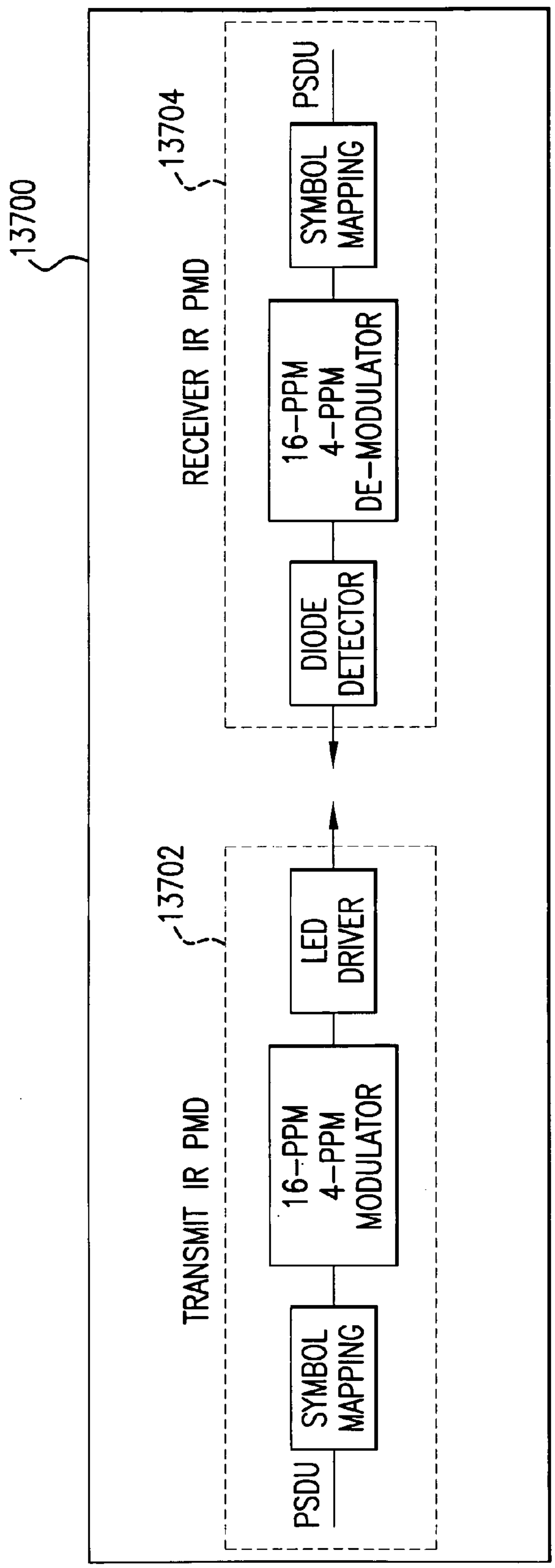

FIG. 137 illustrates a block diagram of an exemplary IR PMD sublayer.

Figure 138:
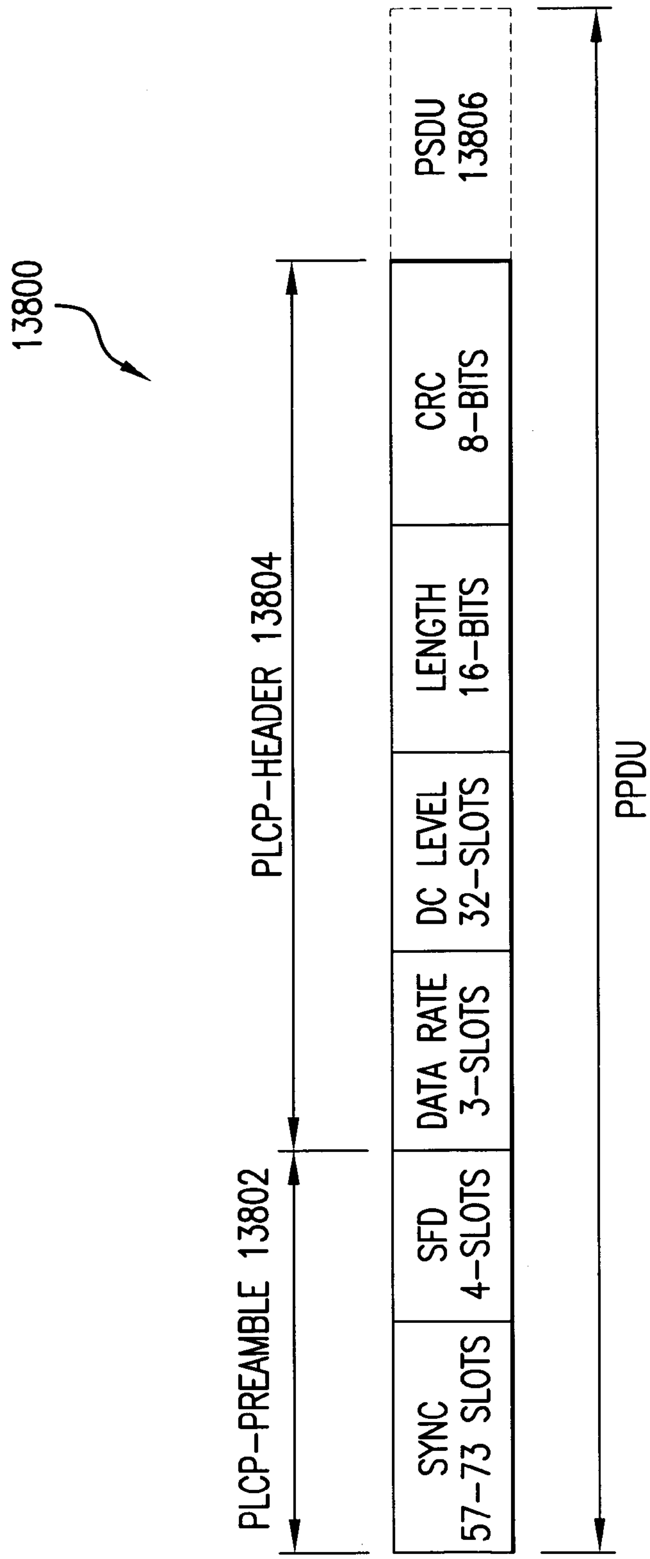

FIG. 138 illustrates a PPDU related to an IR PHY.

Figure 139:
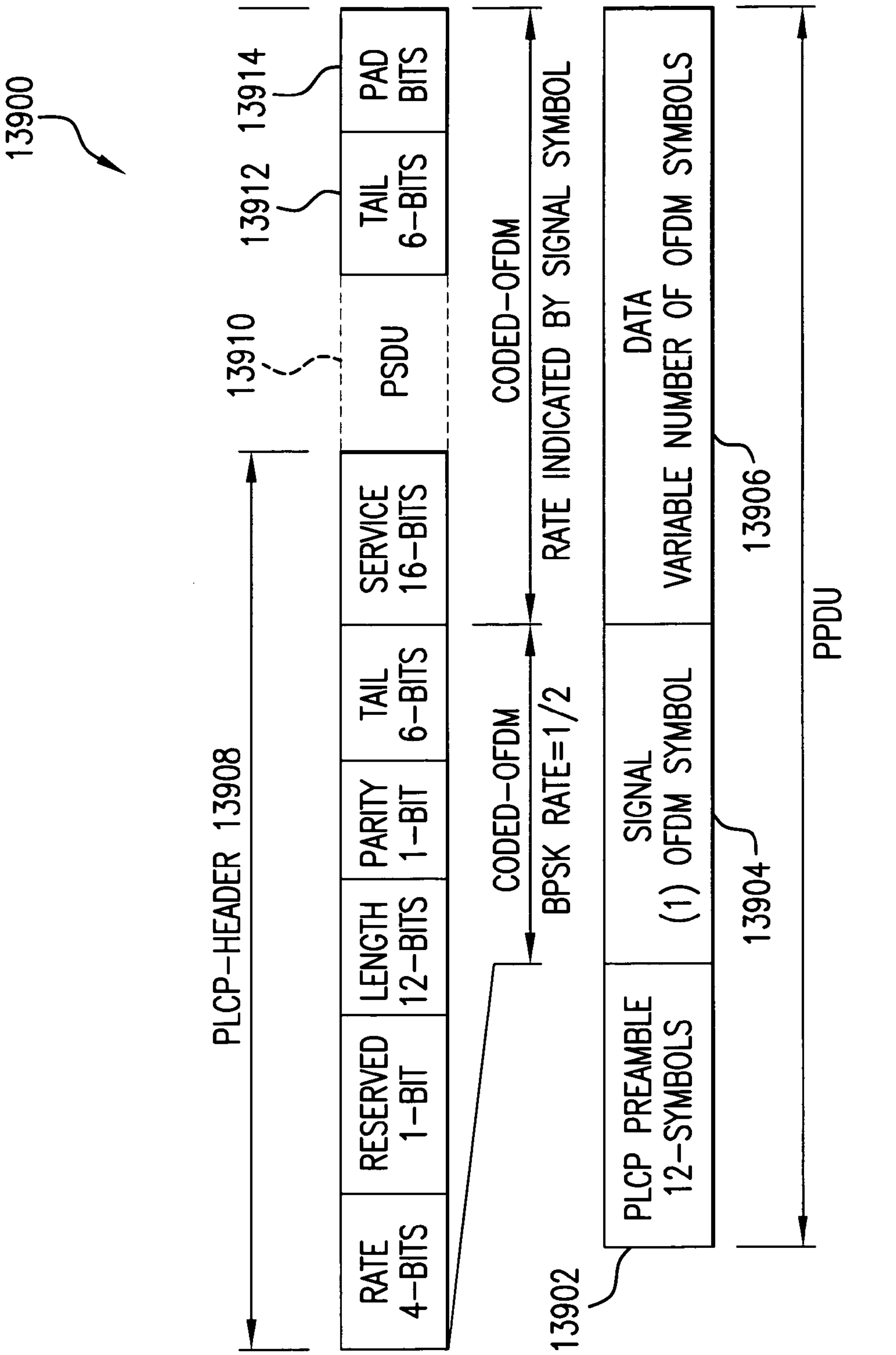

FIG. 139 illustrates a PPDU related to an OFDM PHY.

Figure 140A:
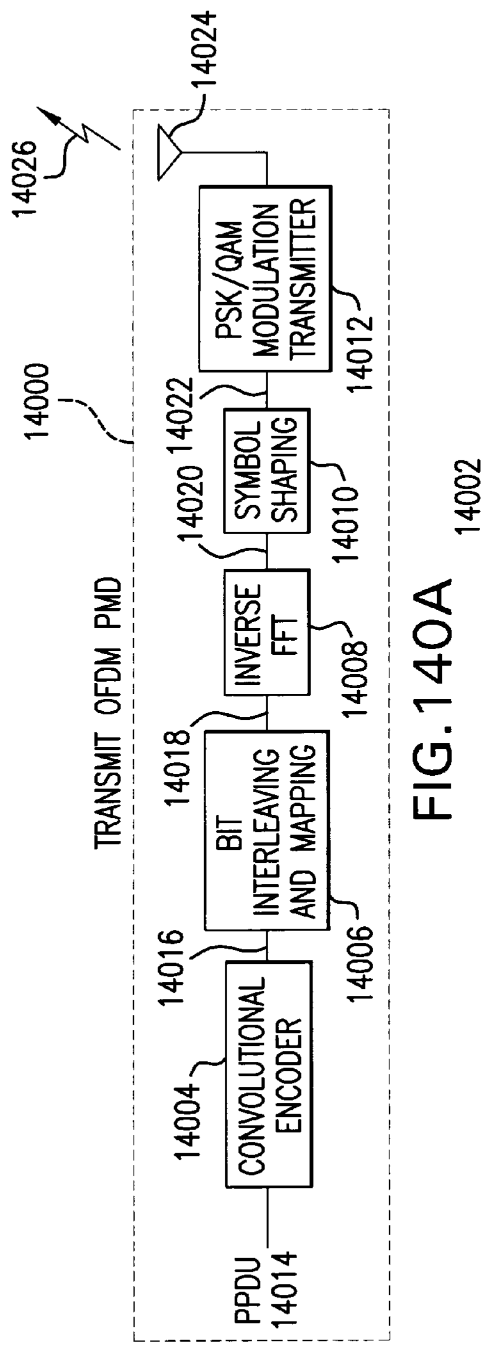
Figure 140B:
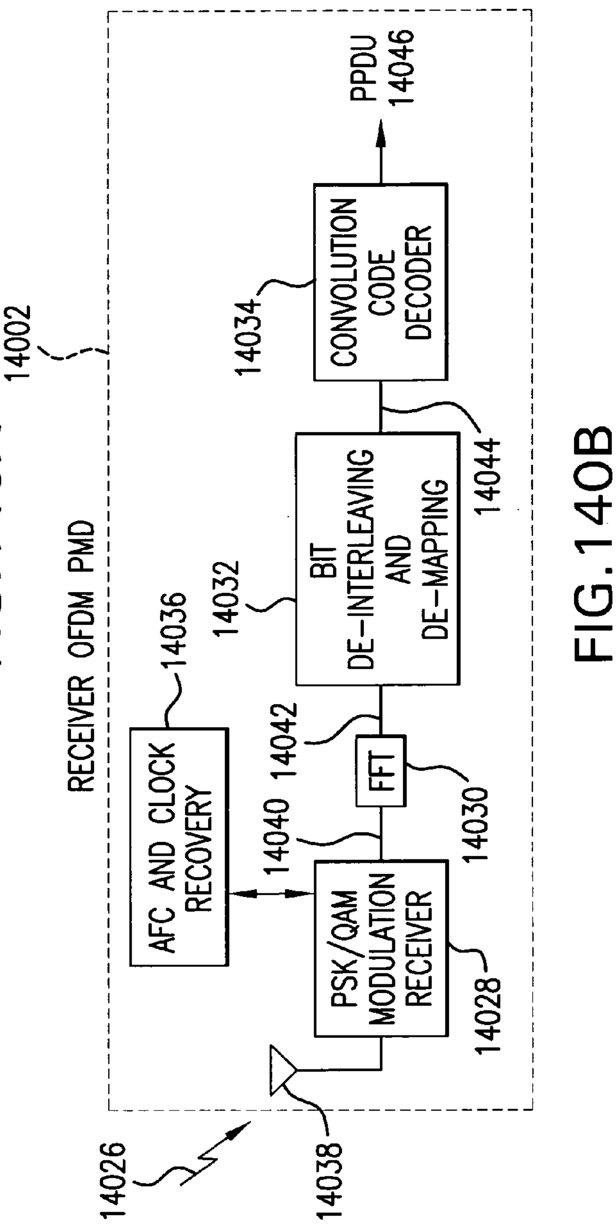

FIGS. 140A and 140B illustrate exemplary block diagrams of an IEEE 802.11a OFDM PMD transmitter and receiver, respectively.

Figure 140C:
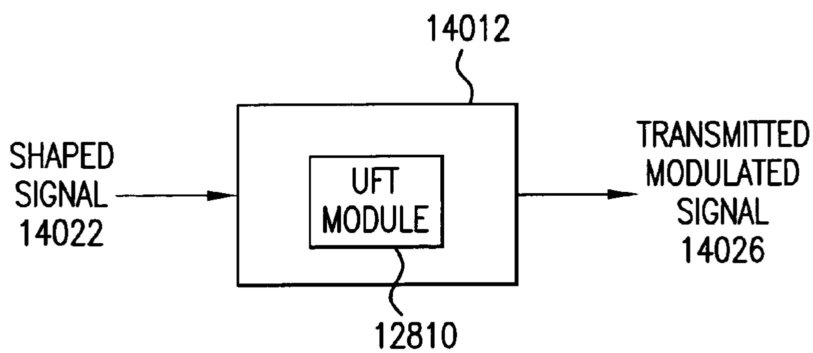

FIGS. 140C illustrates an exemplary PSK/QAM modulator, according to an embodiment of the present invention.

Figure 140D:
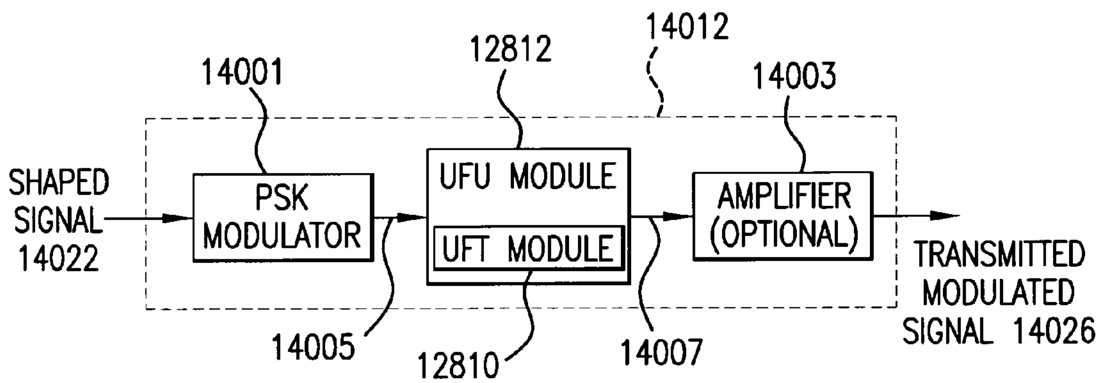
Figure 140E:
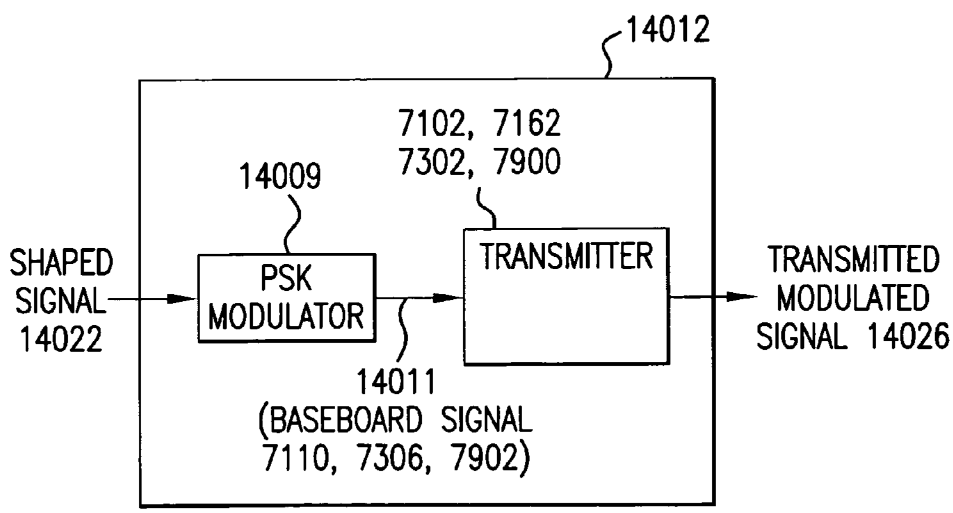

FIGS. 140D–140E illustrate exemplary block diagrams for transmitting BPSK modulated signals related to the PSK/QAM modulator of FIG. 140C, according to embodiments of the present invention.

Figure 140F:
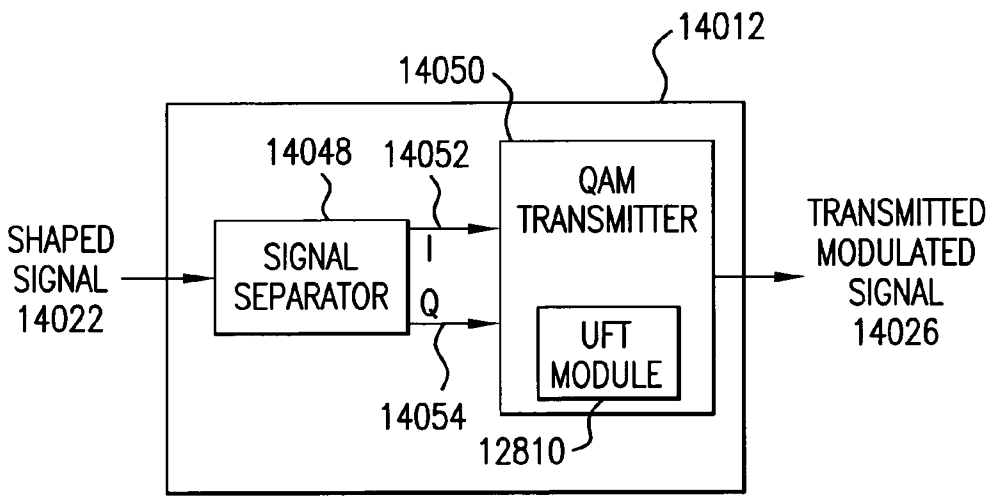
Figure 140G:
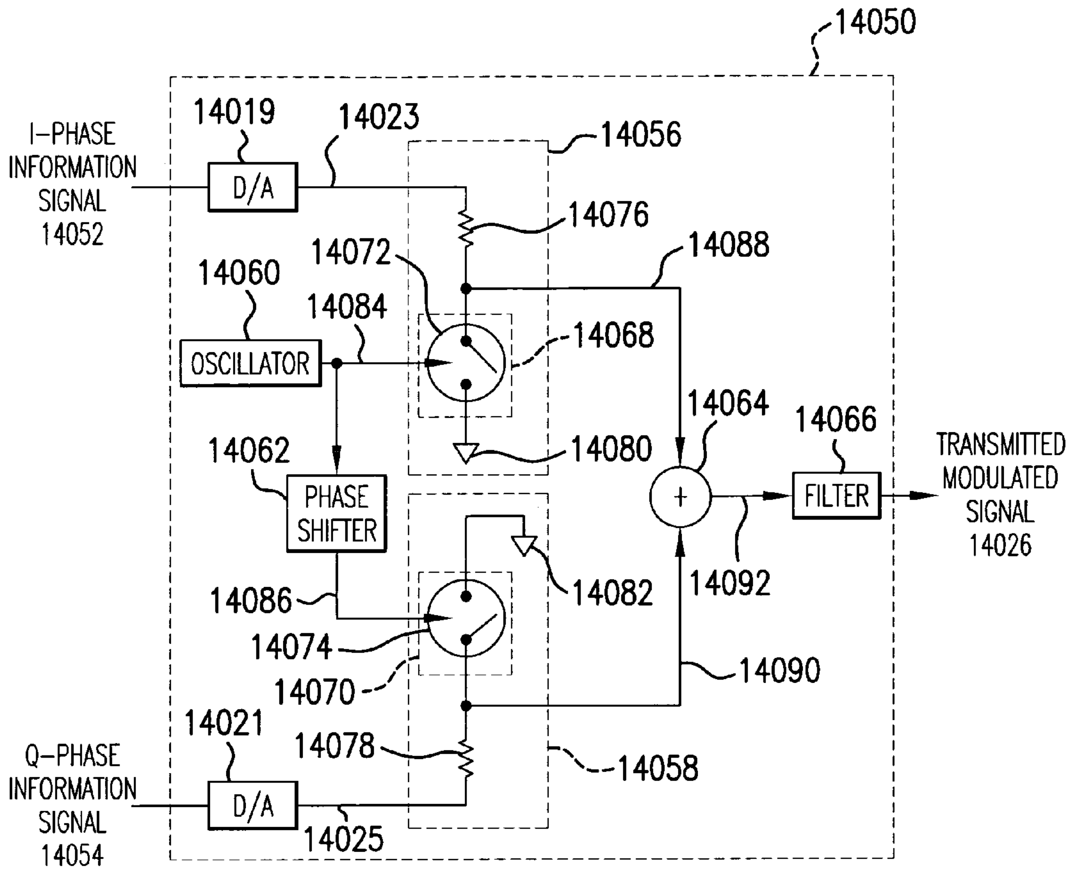
Figure 140H:
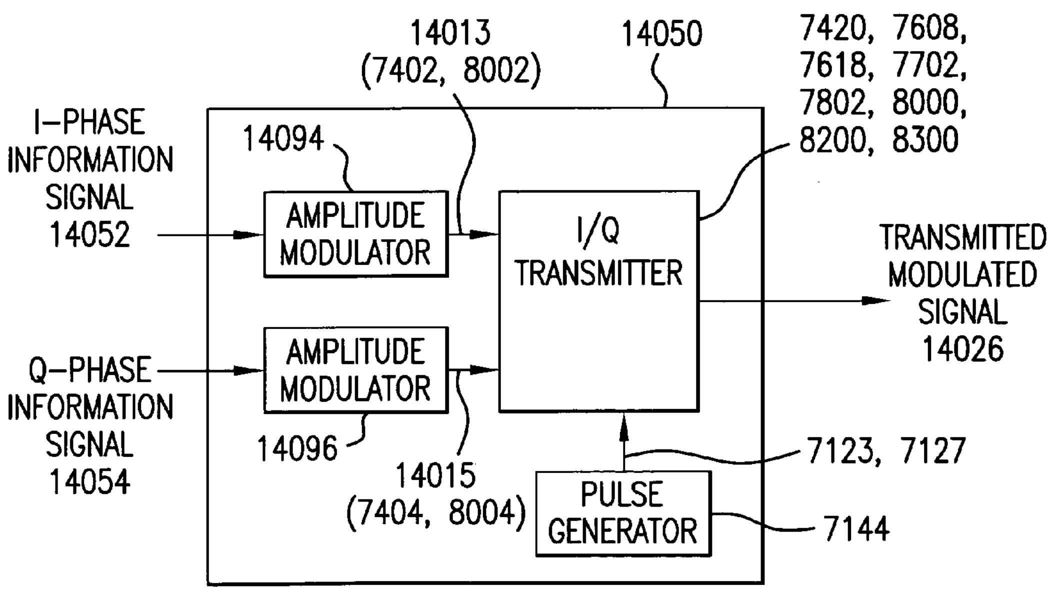

FIGS. 140F–140H illustrate exemplary block diagrams for transmitting QAM modulated signals related to the PSK/QAM modulator of FIG. 140C, according to embodiments of the present invention.

Figure 140I:
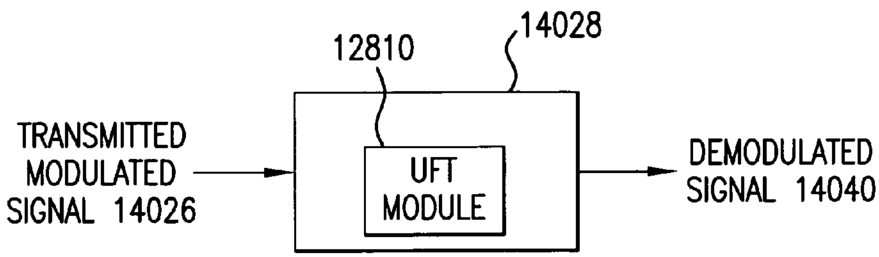

FIG. 140I illustrates an exemplary PSK/QAM demodulator, according to an embodiment of the present invention.

Figure 140J:
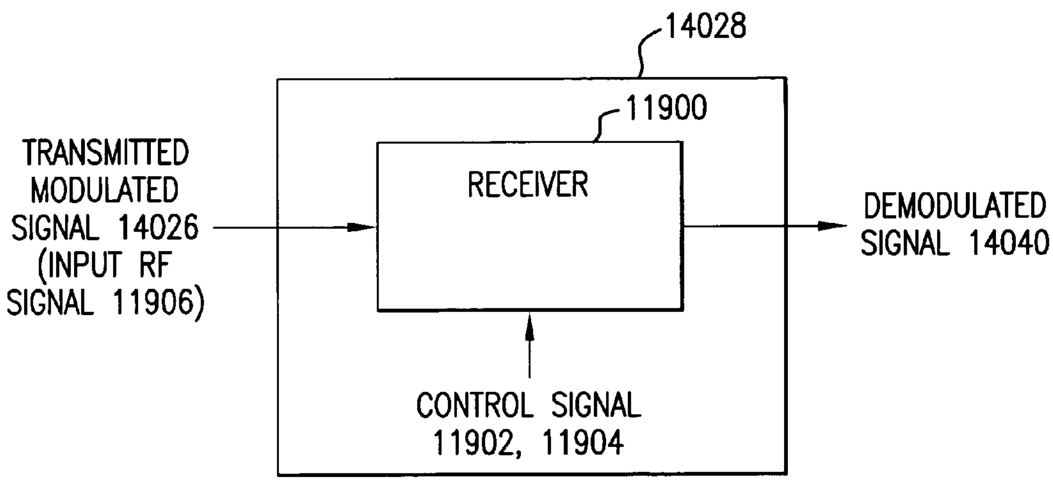

FIG. 140J illustrates an exemplary block diagram for receiving BPSK modulated signals related to the PSK/QAM demodulator of FIG. 140I, according to an embodiment of the present invention.

Figure 140K:
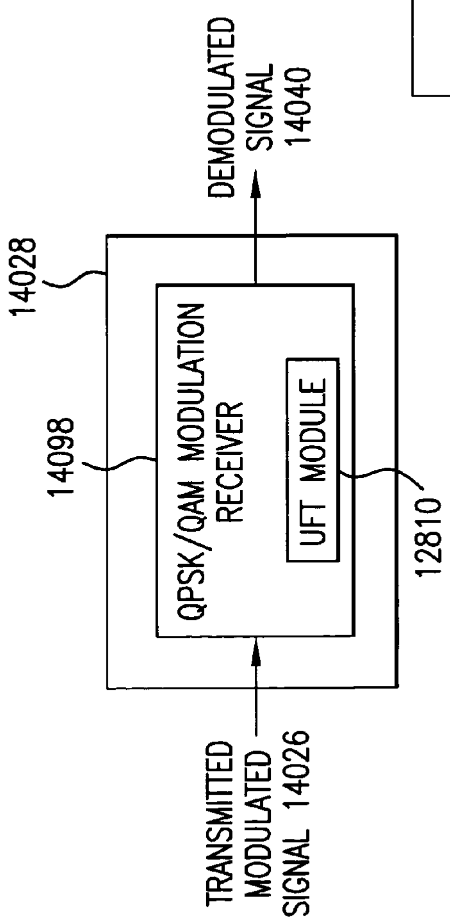
Figure 140L:
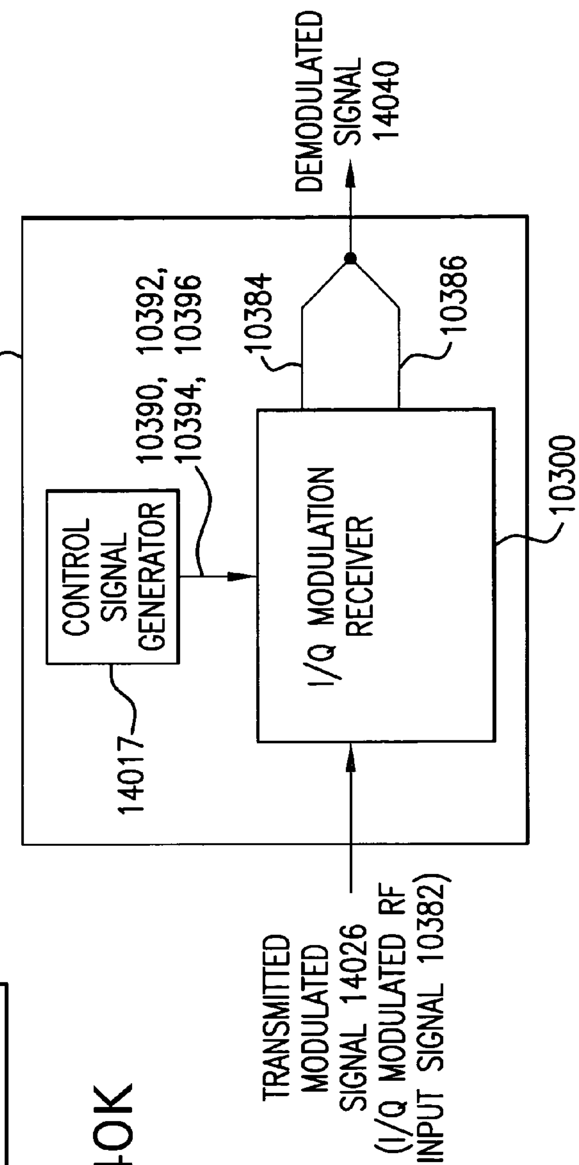

FIGS. 140K–140L illustrate exemplary block diagrams for receiving QPSK/QAM modulated signals related to the PSK/QAM demodulator of FIG. 1401, according to embodiments of the present invention.

Figure 141A:
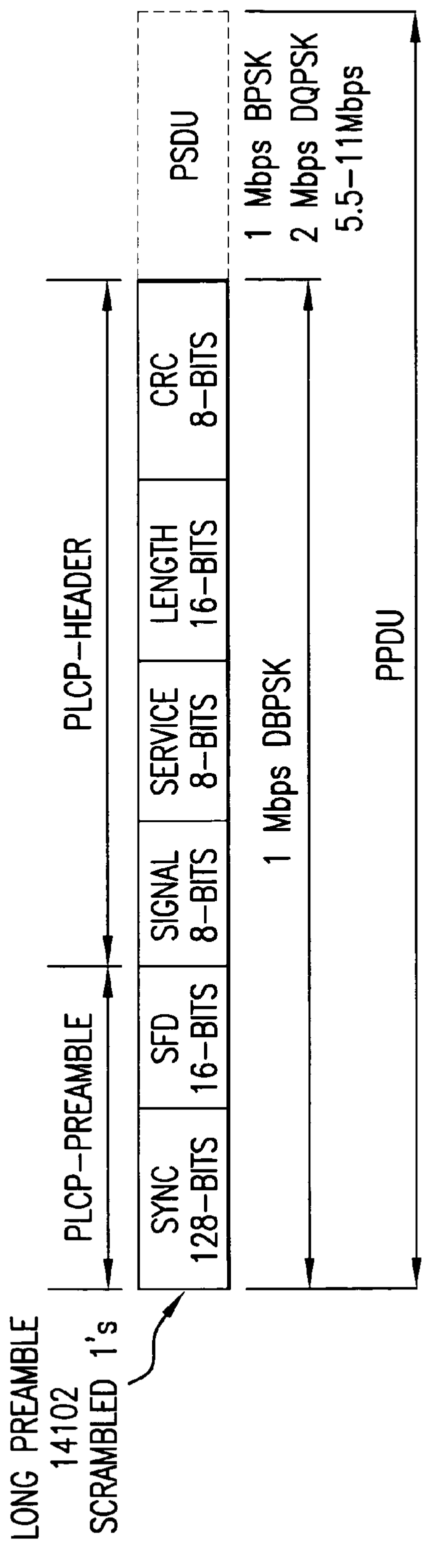

FIG. 141A illustrates a PPDU with a long PLCP preamble.

Figure 141B:
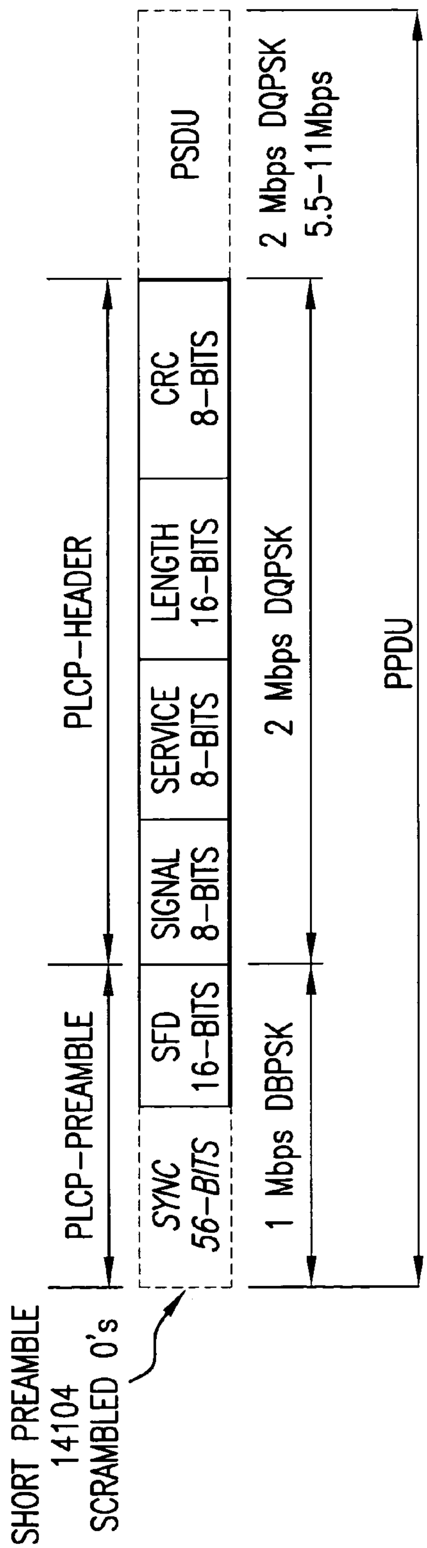

FIG. 141B illustrates a PPDU with a short preamble.

Figure 142:
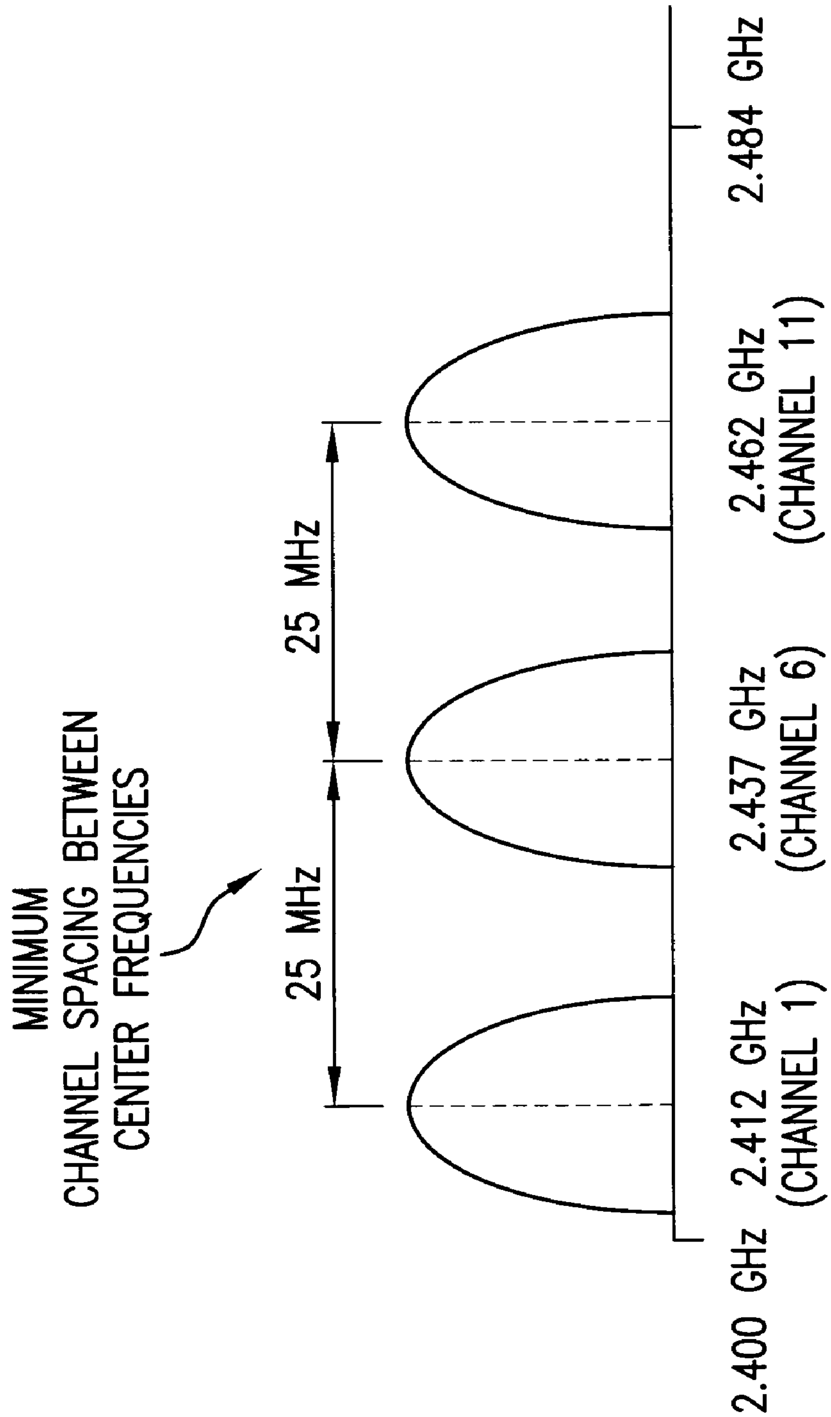

FIG. 142 illustrates an example of a typical HR/DSSS channel arrangement for non-interfering channels for North America.

Figure 143A:
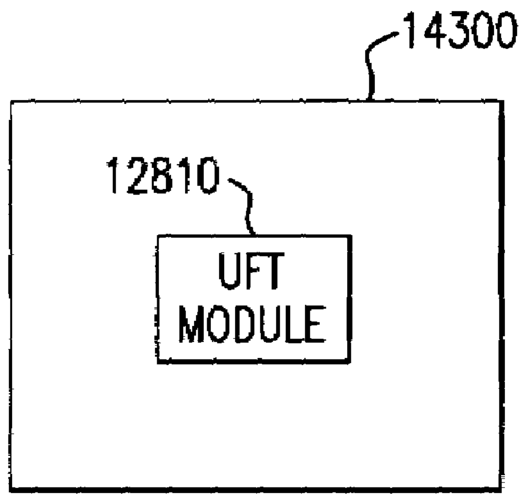

FIG. 143A illustrates an exemplary transmit HR/DSSS PMD, according to an embodiment of the present invention.

Figure 143B:
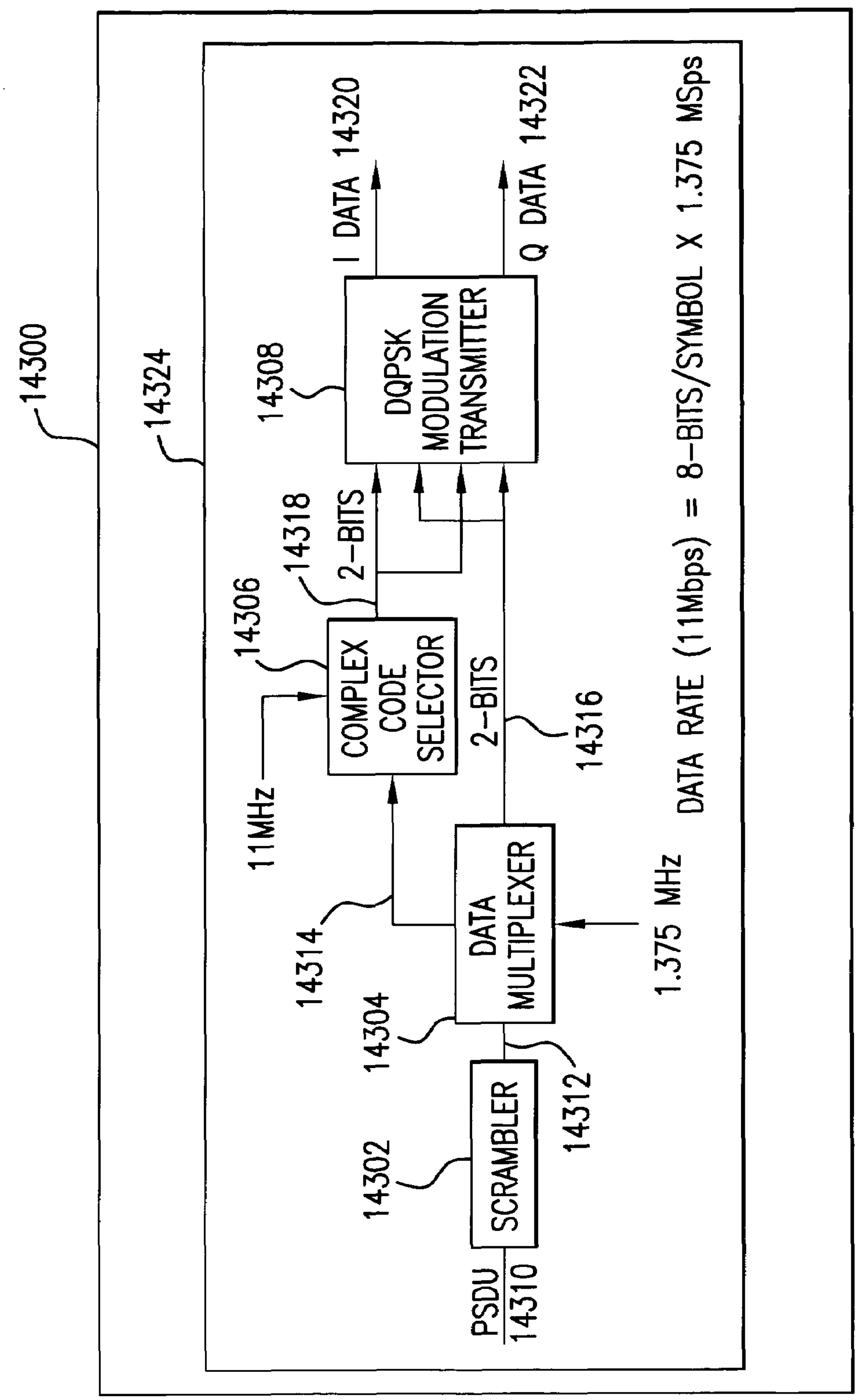

FIG. 143B illustrates an exemplary block diagram for a CCK modulator.

Figure 144B:
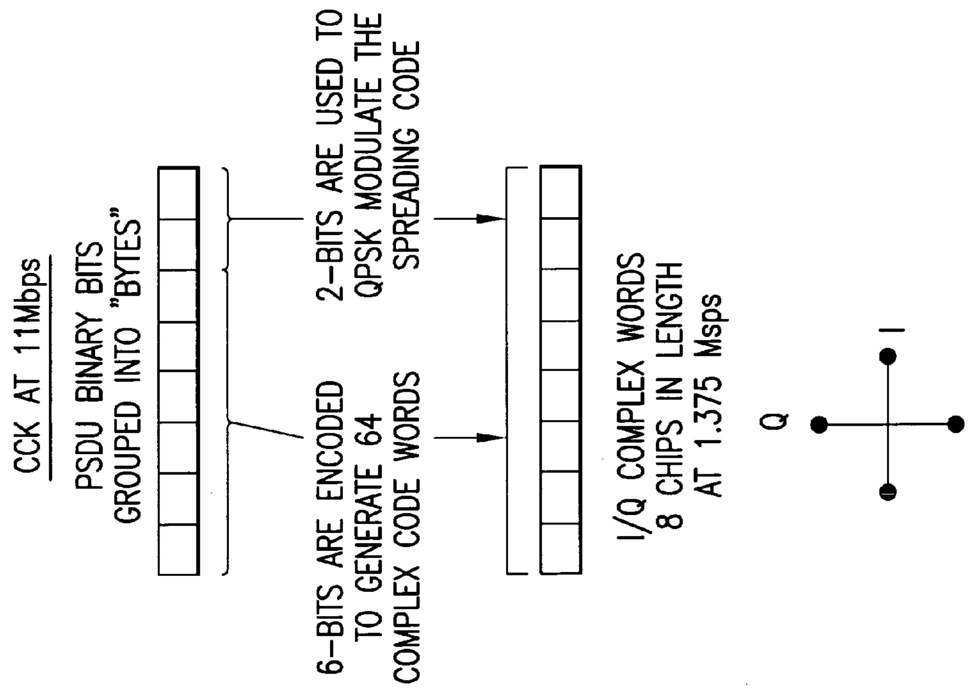
Figure 144A:
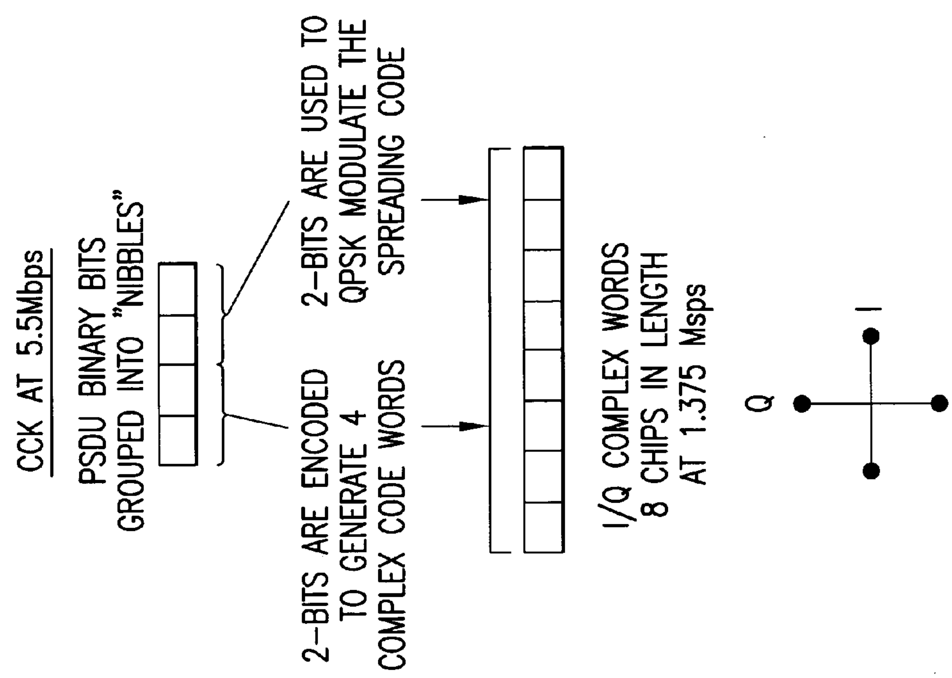

FIGS. 144A and 144B illustrate use of scrambled binary bits of the PSDU for 5.5 Mbps and 11 Mbps operation.

Figure 145A:
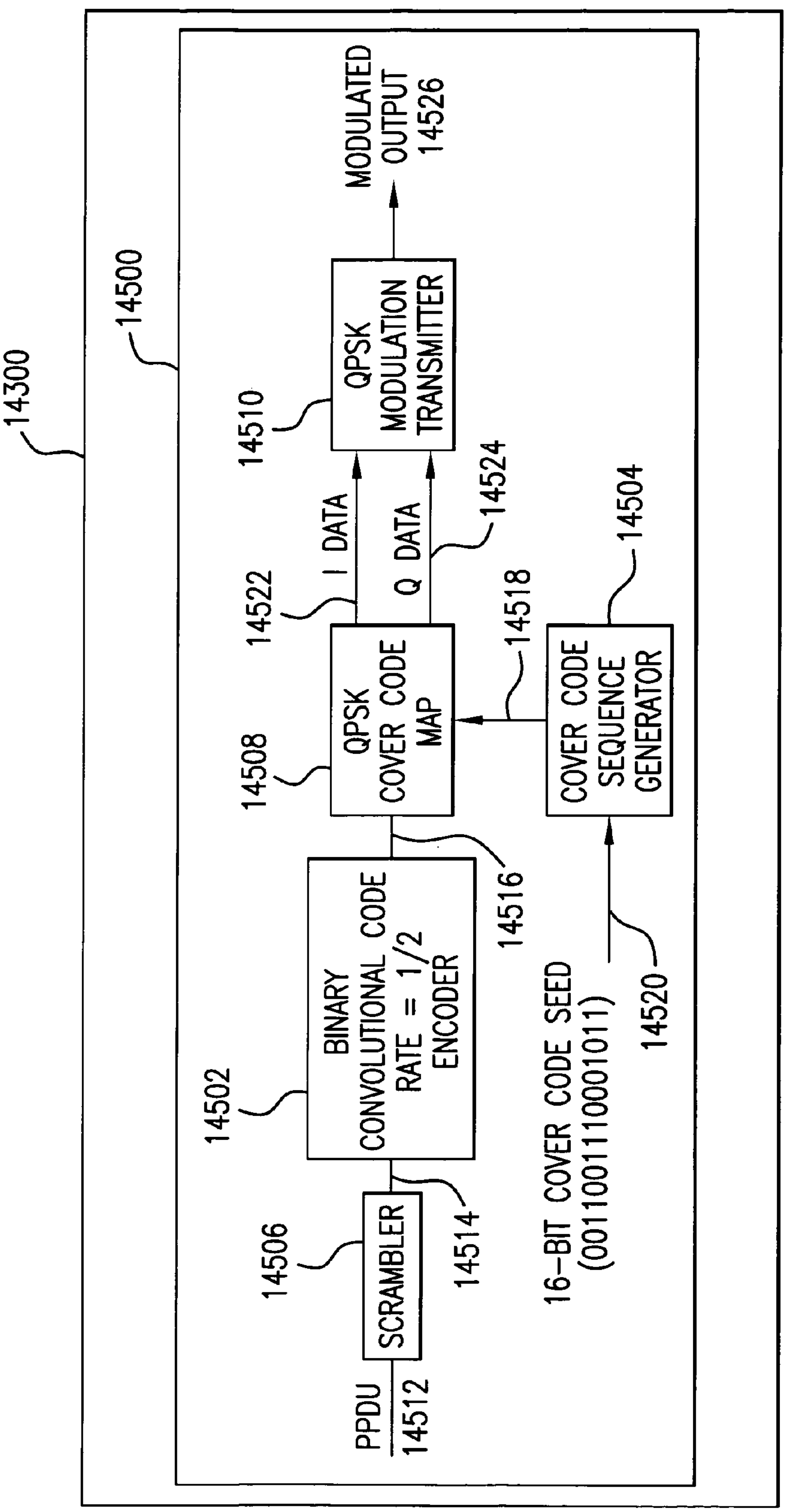

FIG. 145A illustrates an exemplary PBCC modulator.

Figure 145B:
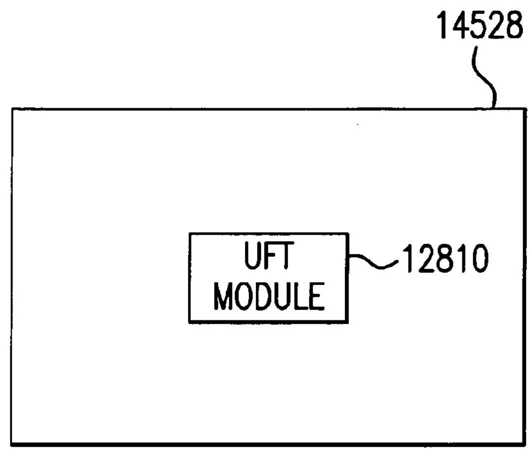

FIG. 145B illustrates a receiver HR/DSSS PMD, according to an embodiment of the present invention.

Figure 145C:
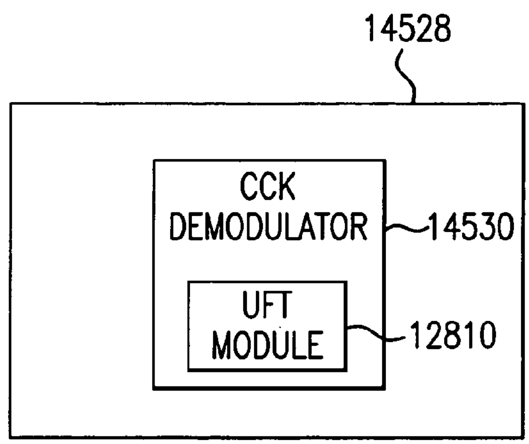

FIG. 145C illustrates a receiver HR/DSSS PMD that includes a CCK demodulator, according to an embodiment of the present invention.

Figure 145D:
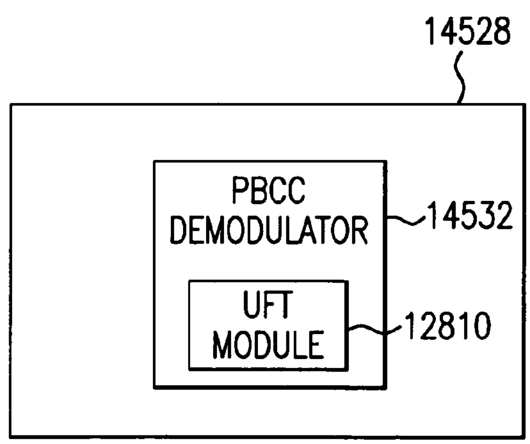

FIG. 145D illustrates a receiver HR/DSSS PMD that includes a PBCC demodulator, according to an embodiment of the present invention.

Figure 146:
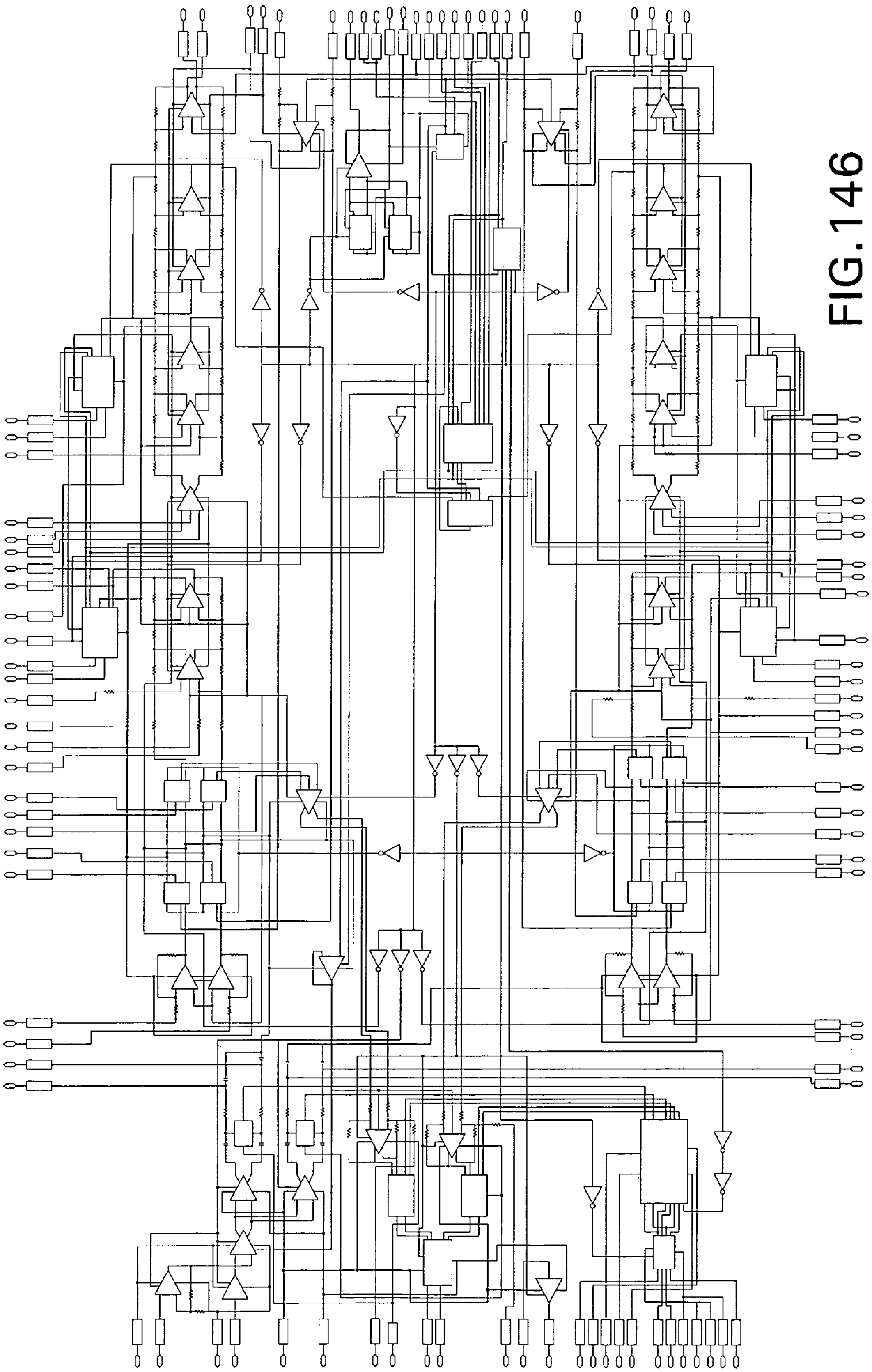
Figure 147:
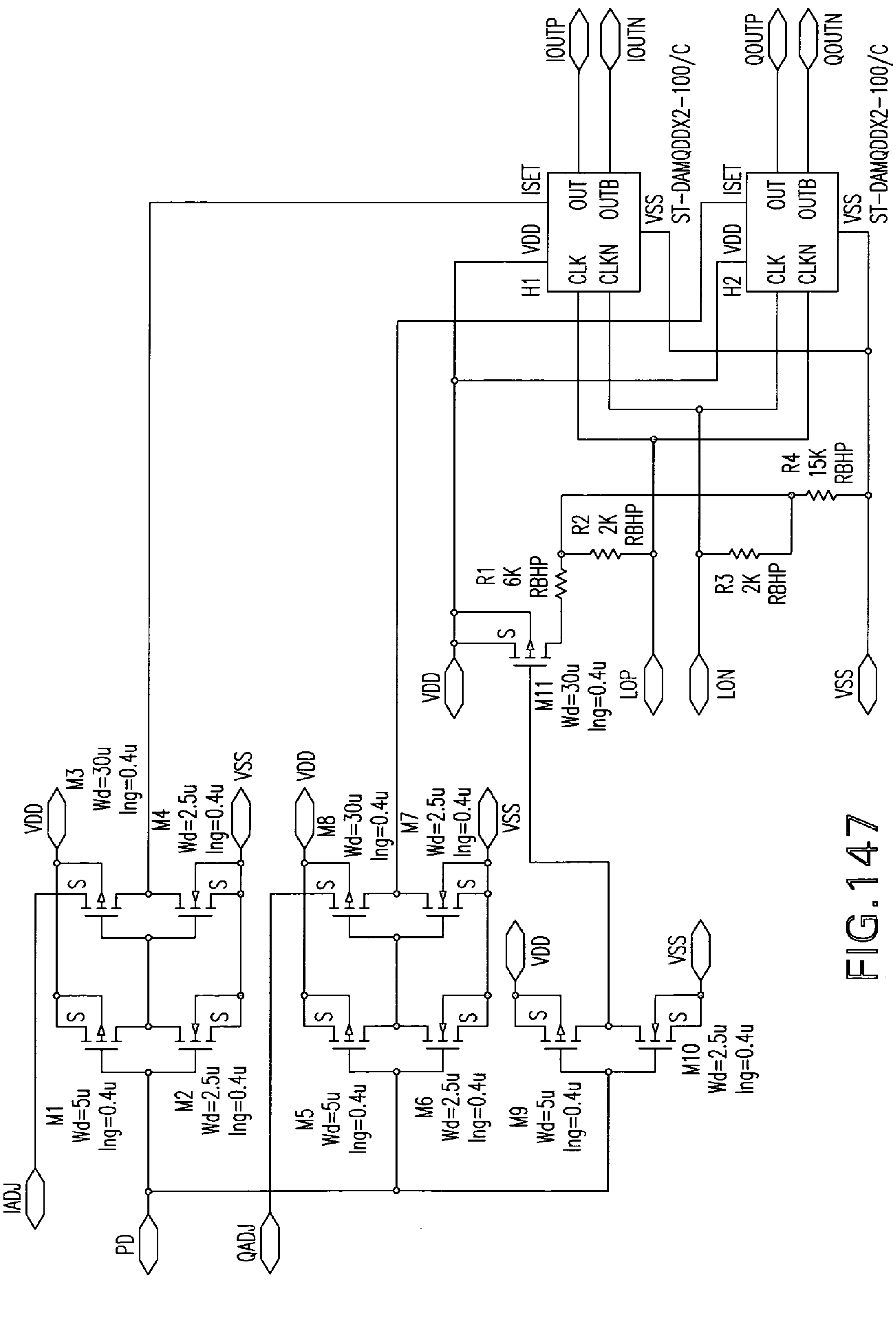
Figure 148A:
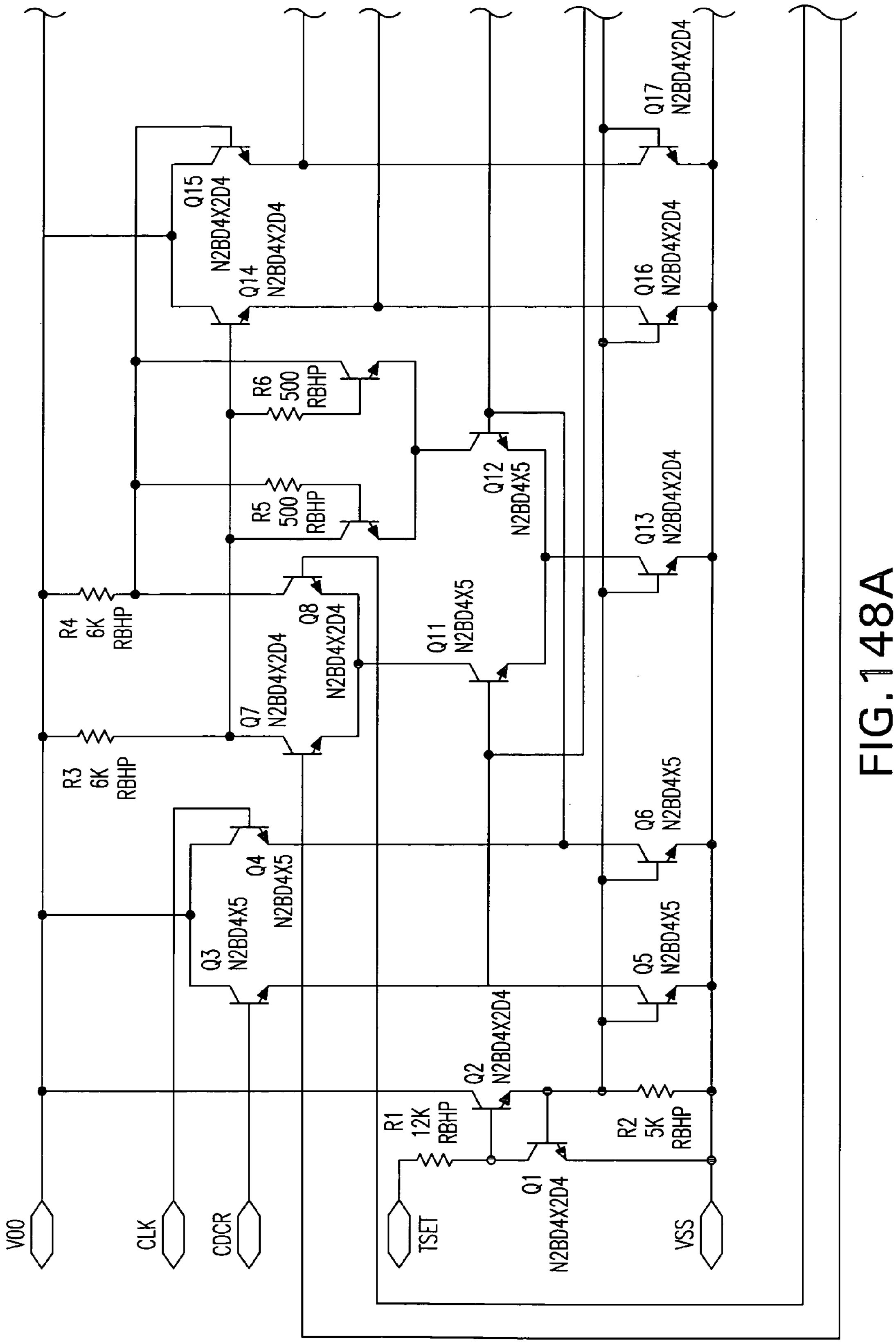
Figure 148B:
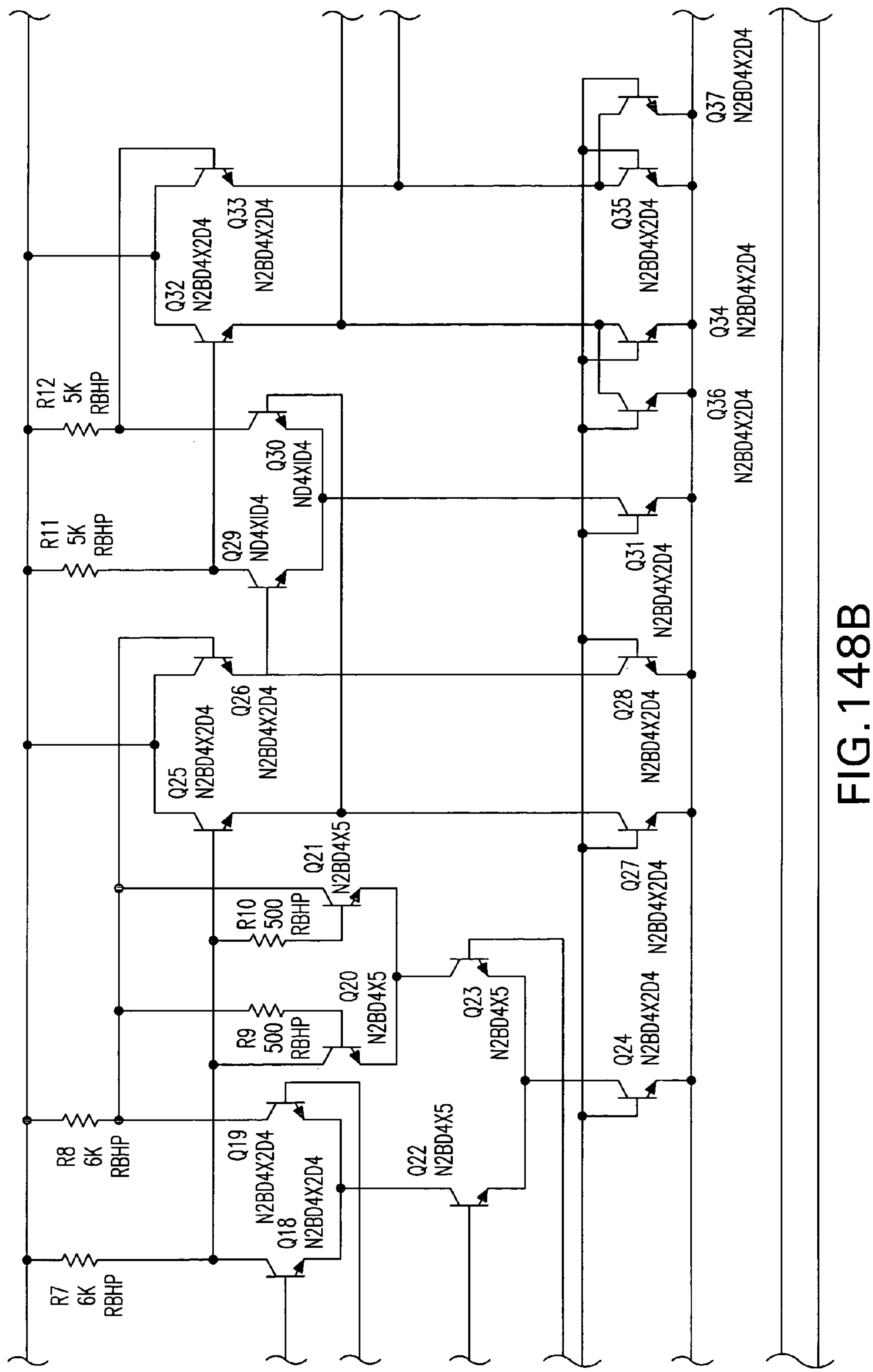
Figure 148C:
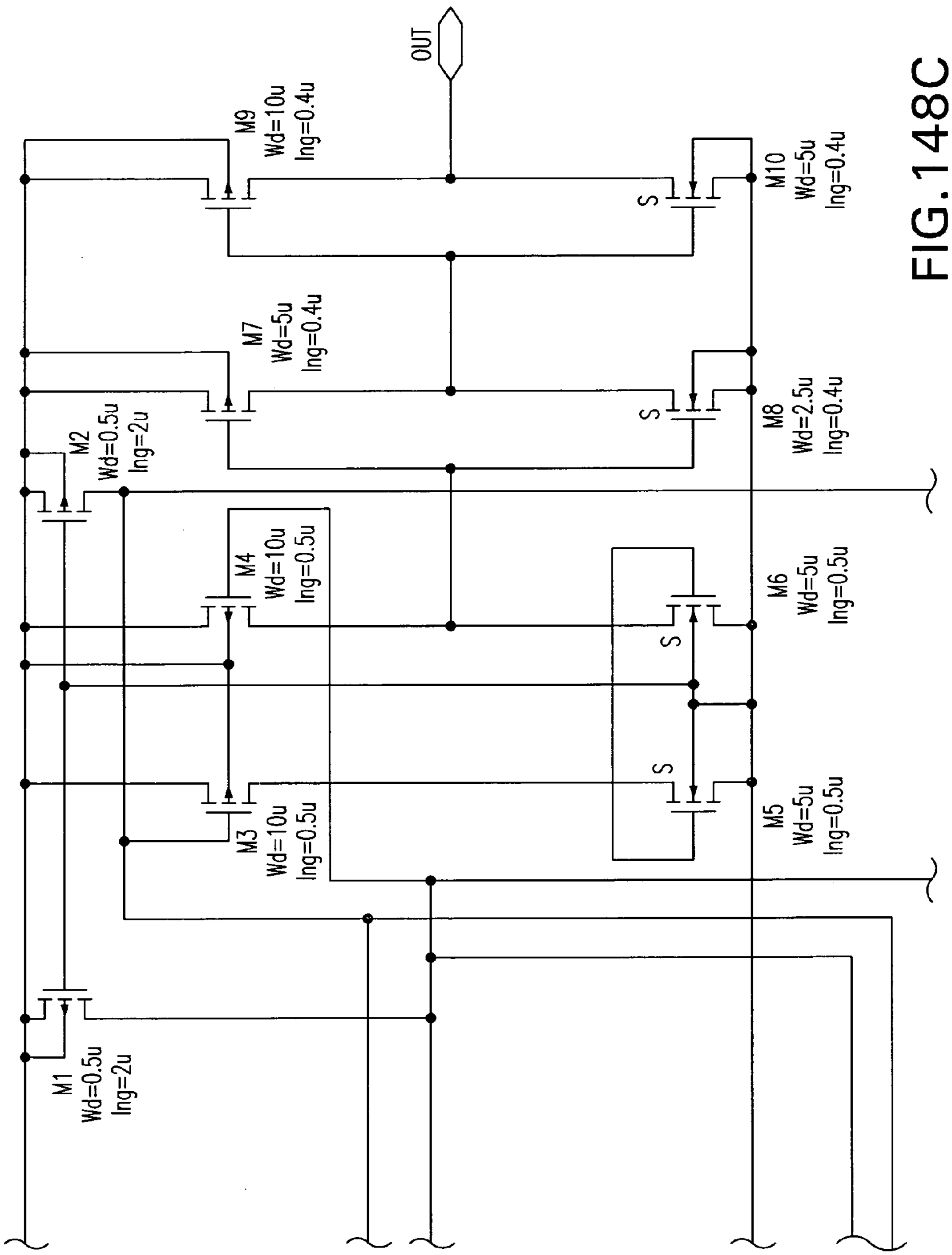
Figure 148D:
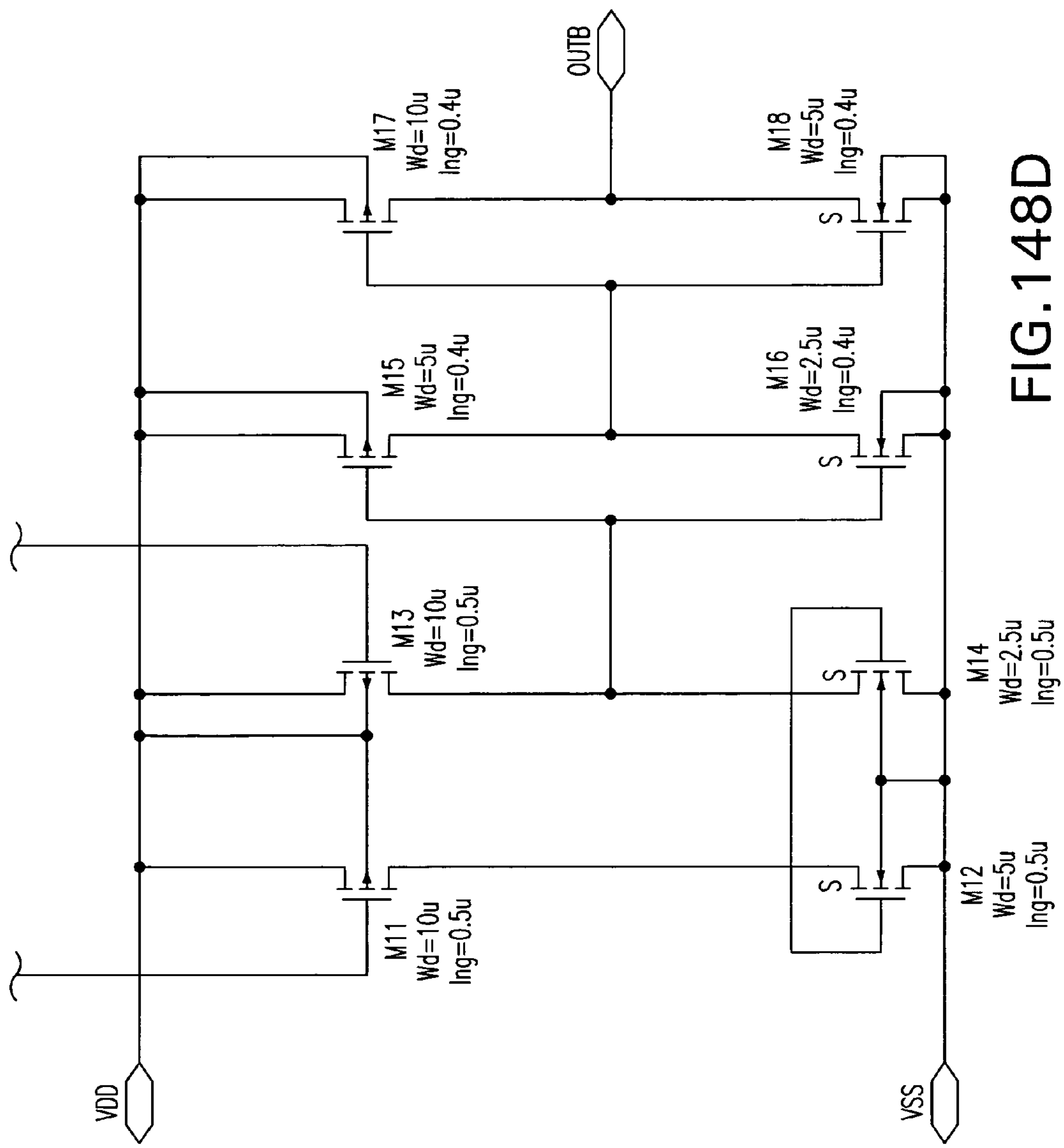
Figure 149:
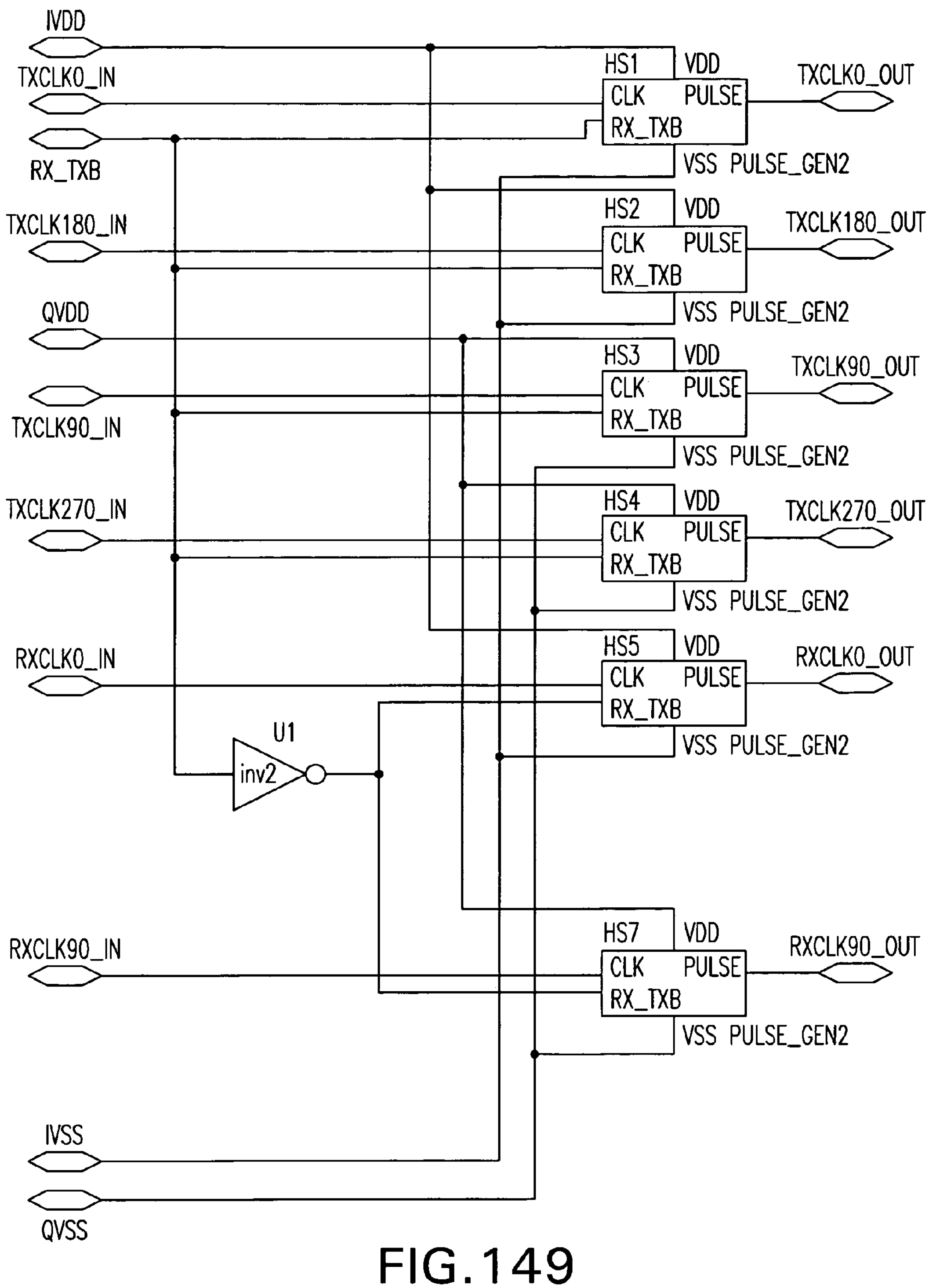
Figure 150:
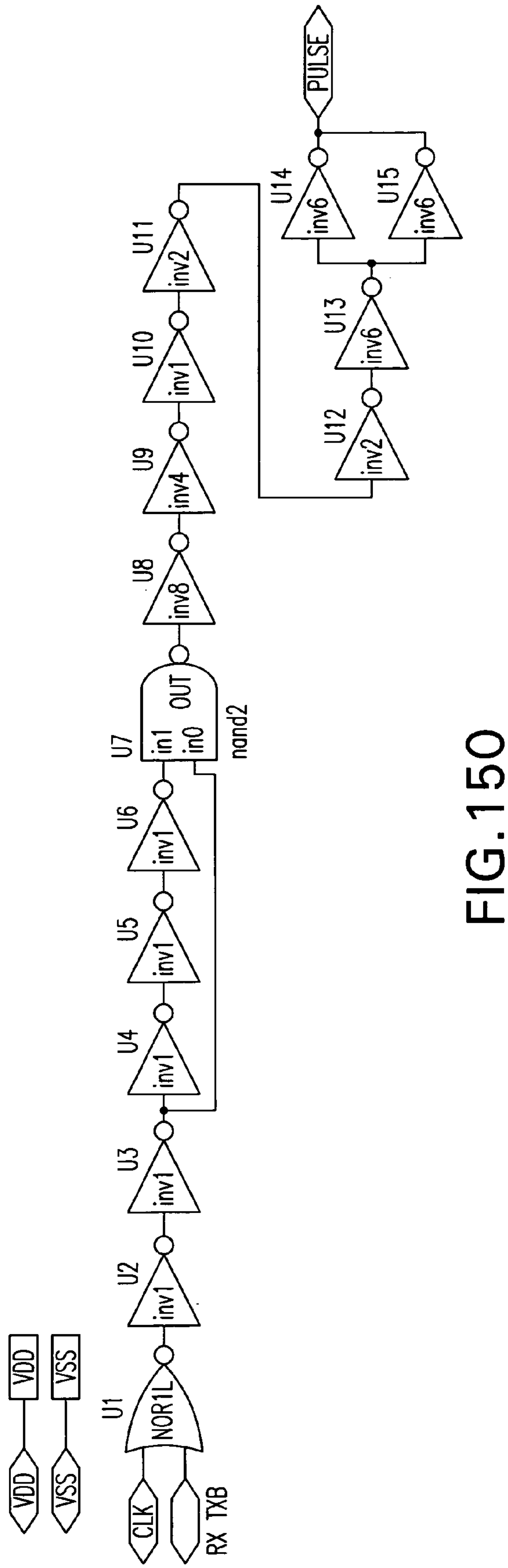
Figure 151:
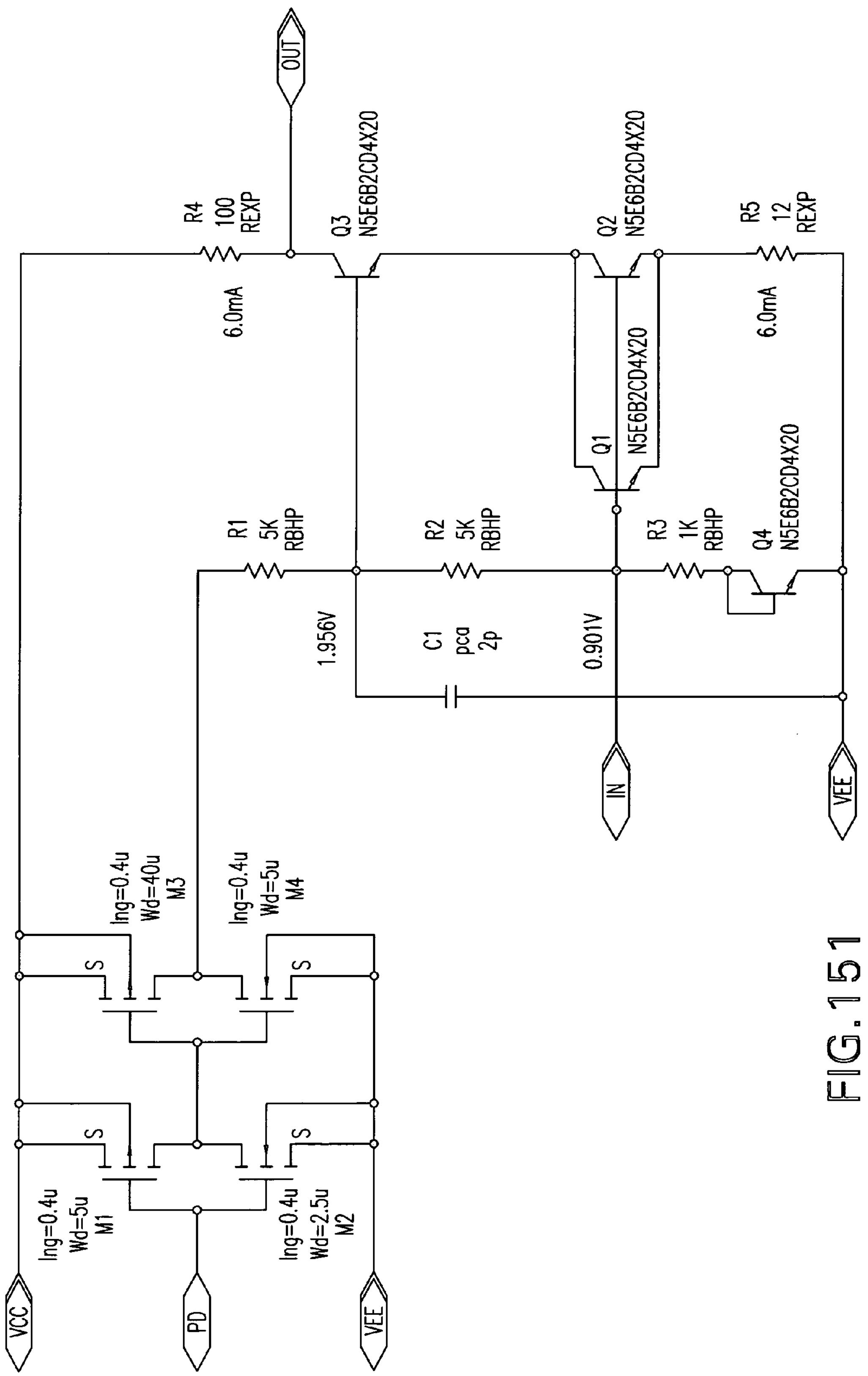
Figure 152:
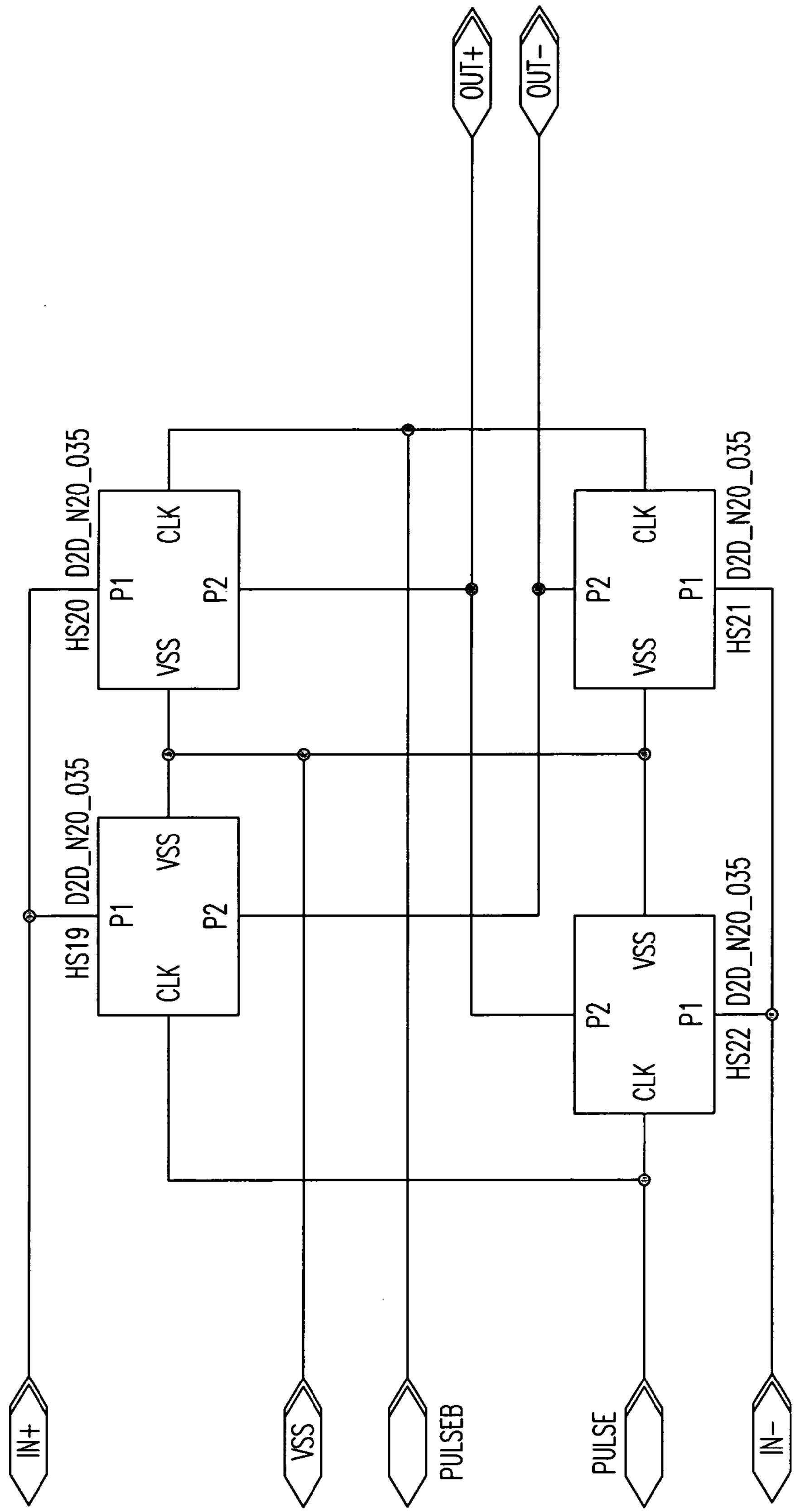
Figure 153:
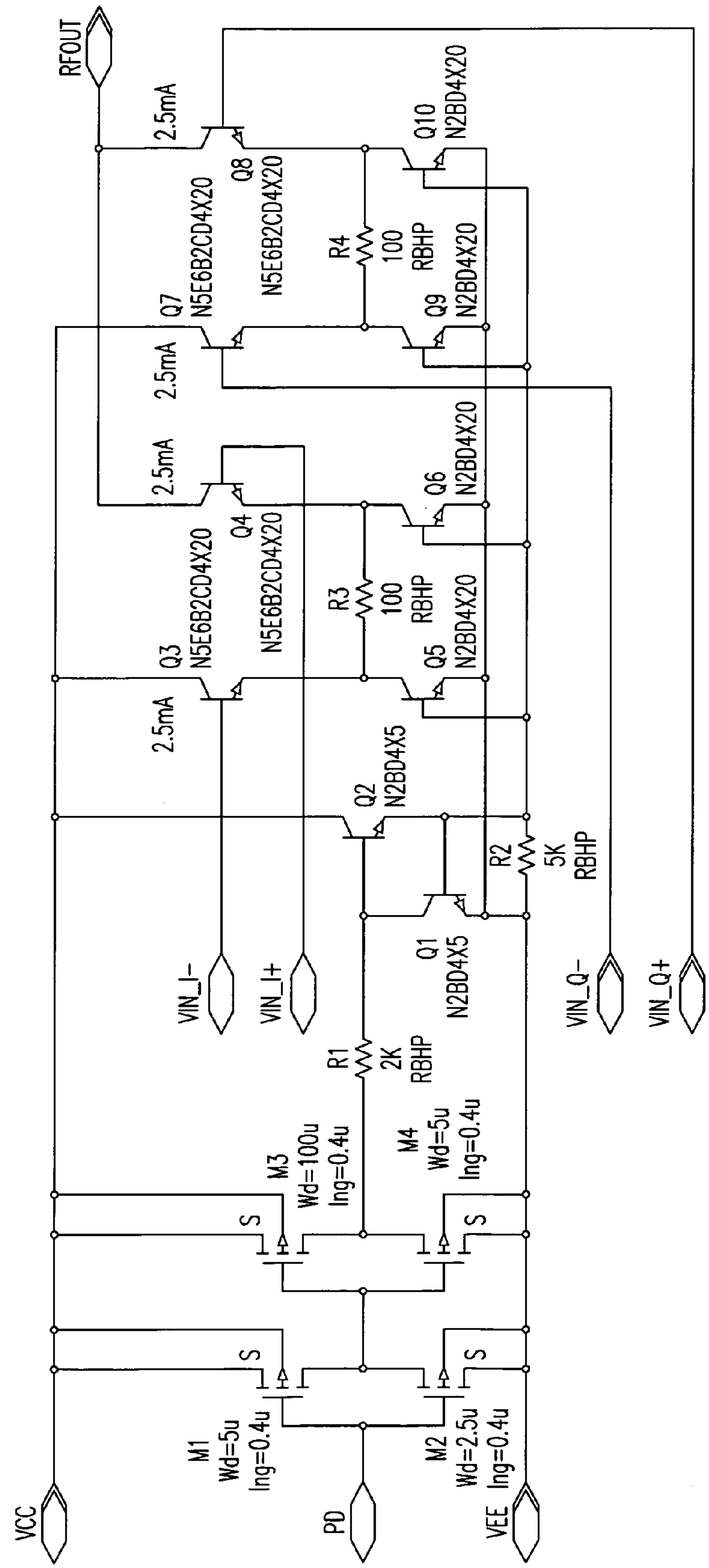
Figure 154:
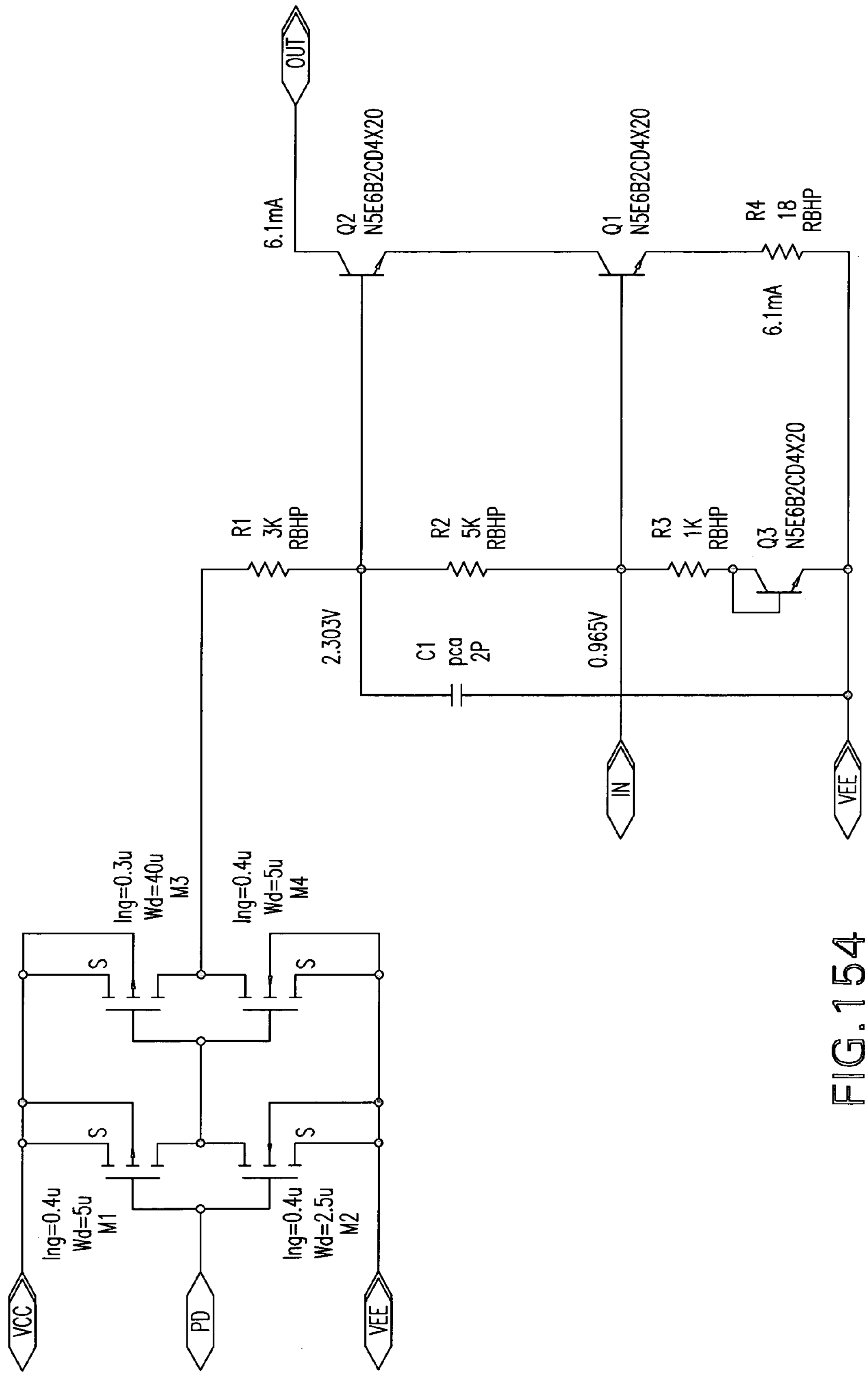
Figure 155:
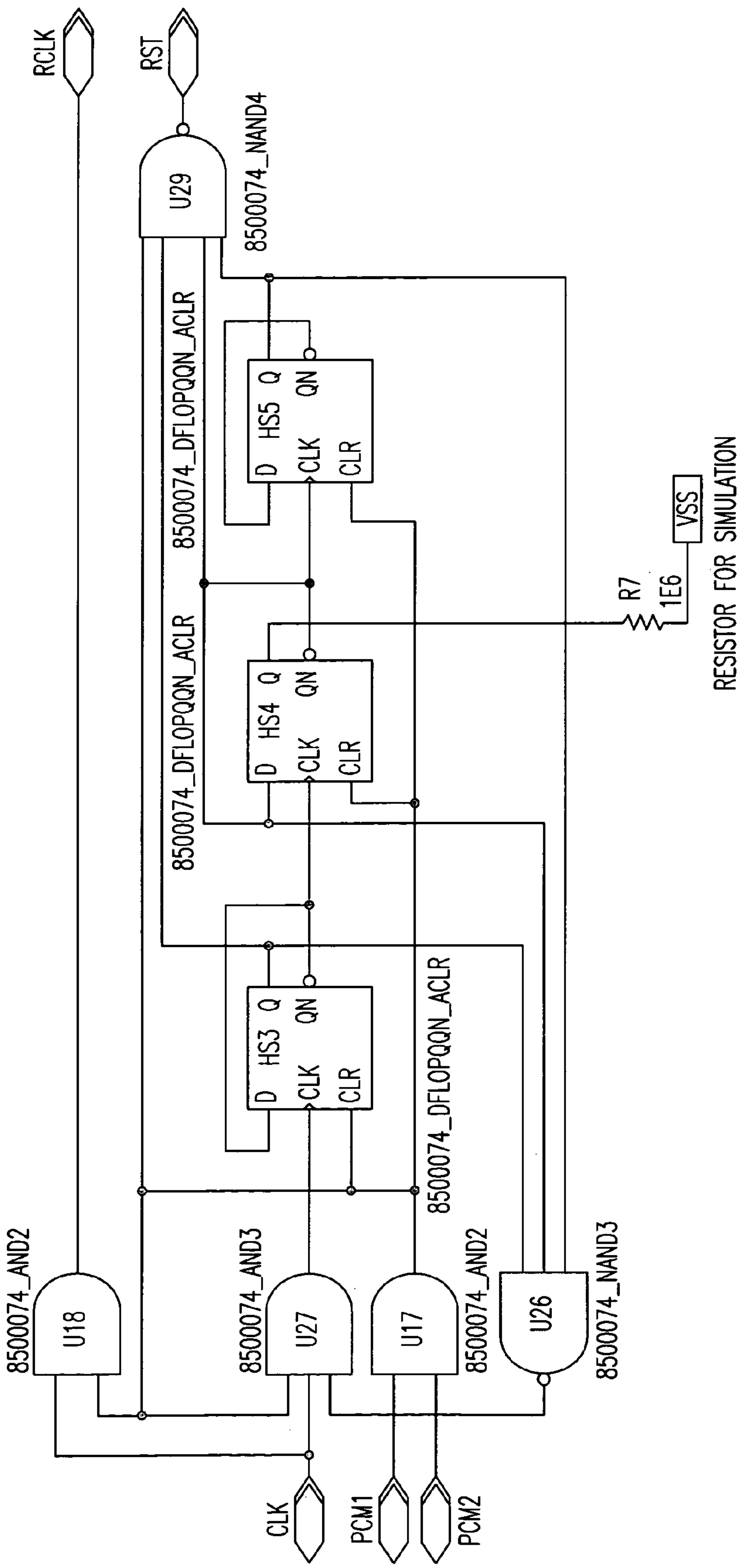
Figure 156:
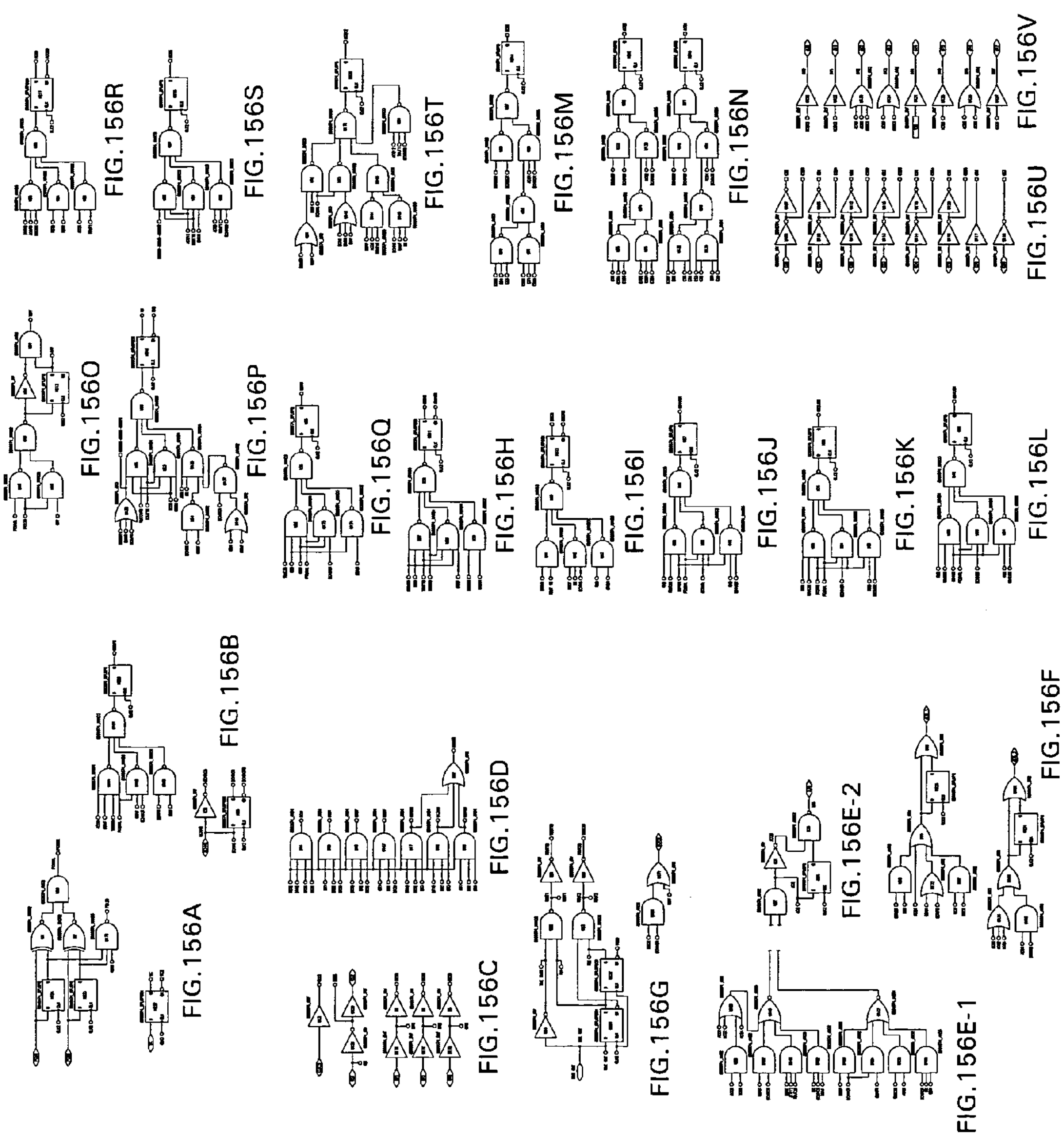
Figure 156A:
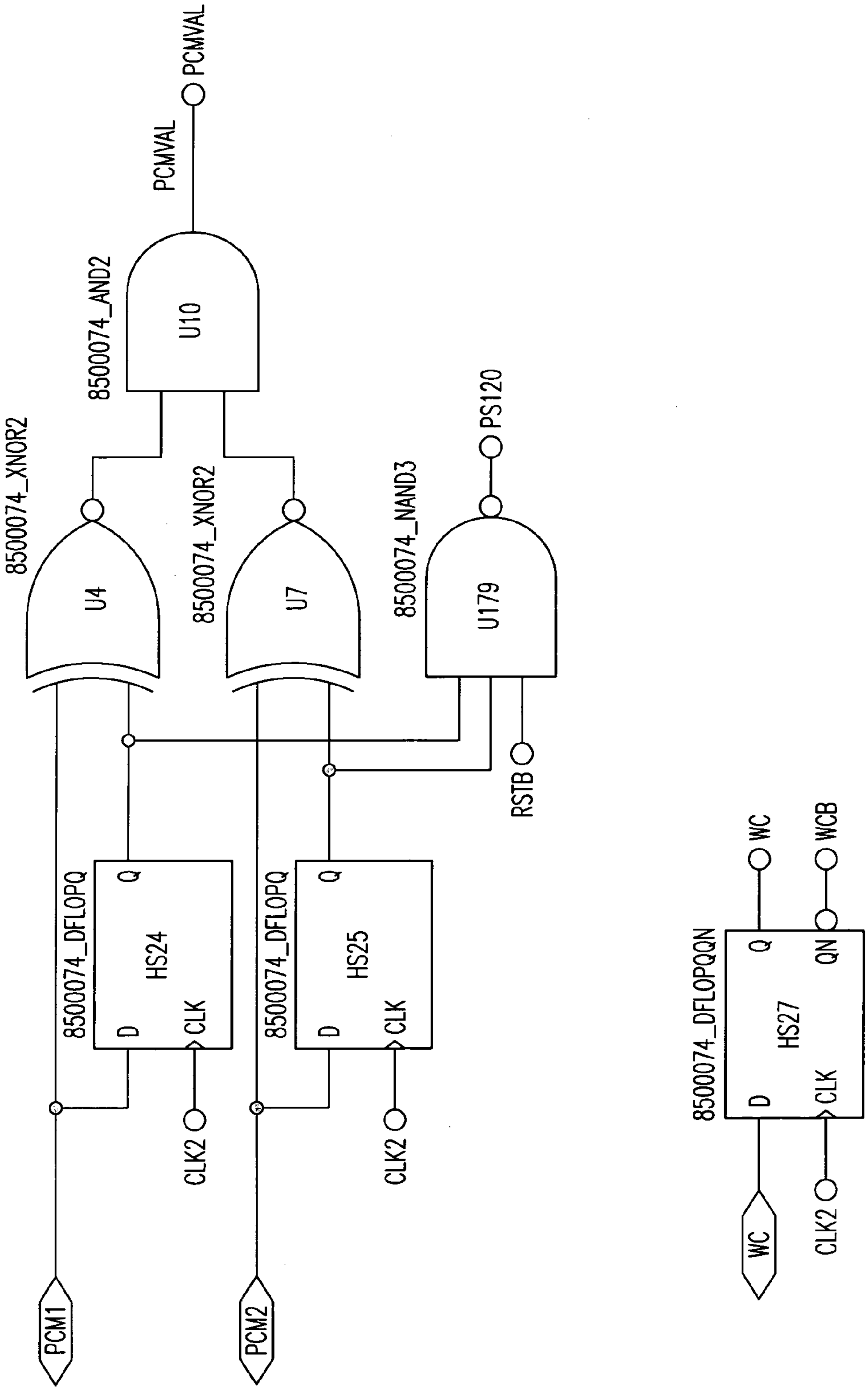
Figure 156B:
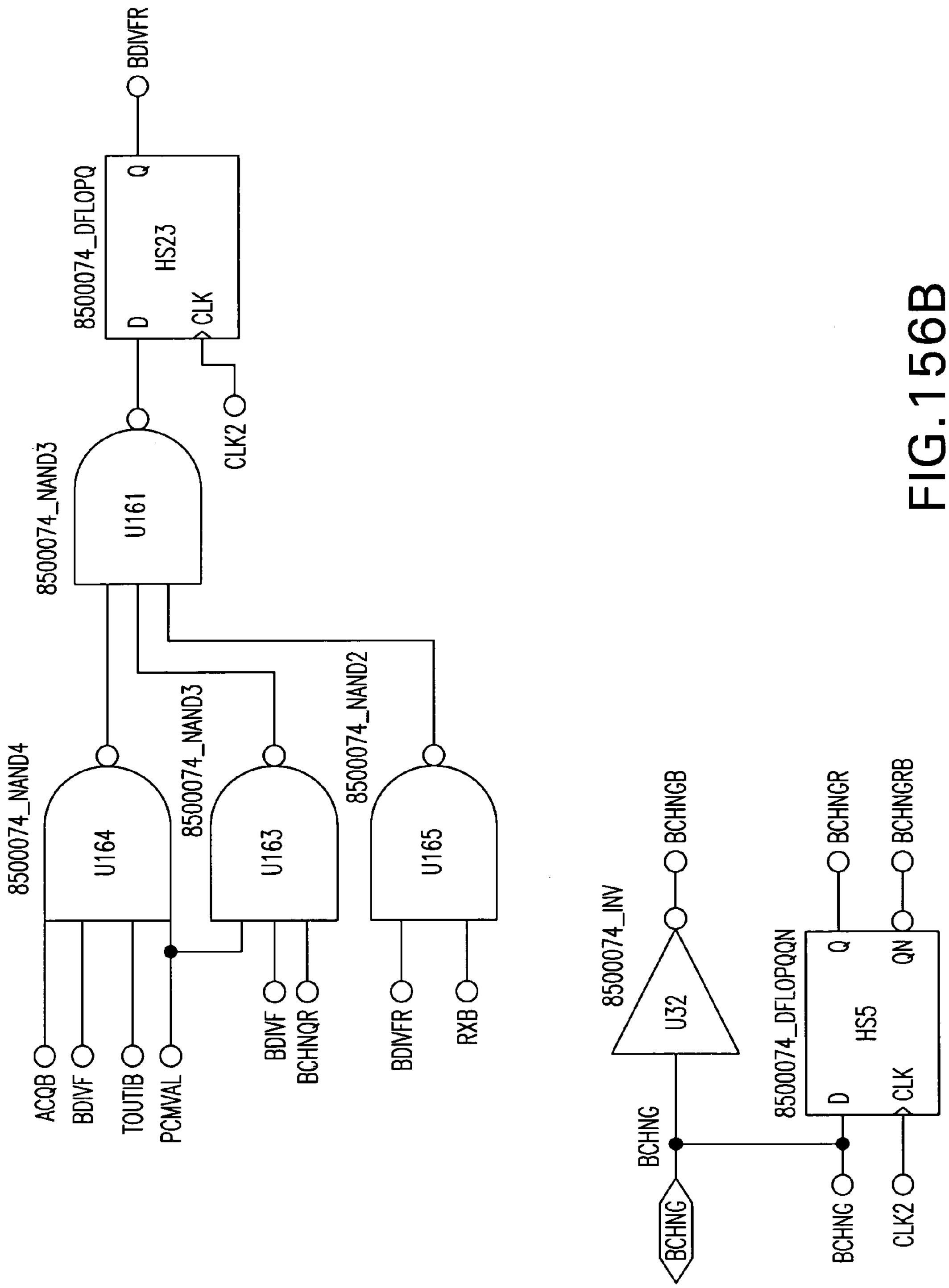
Figure 156C:
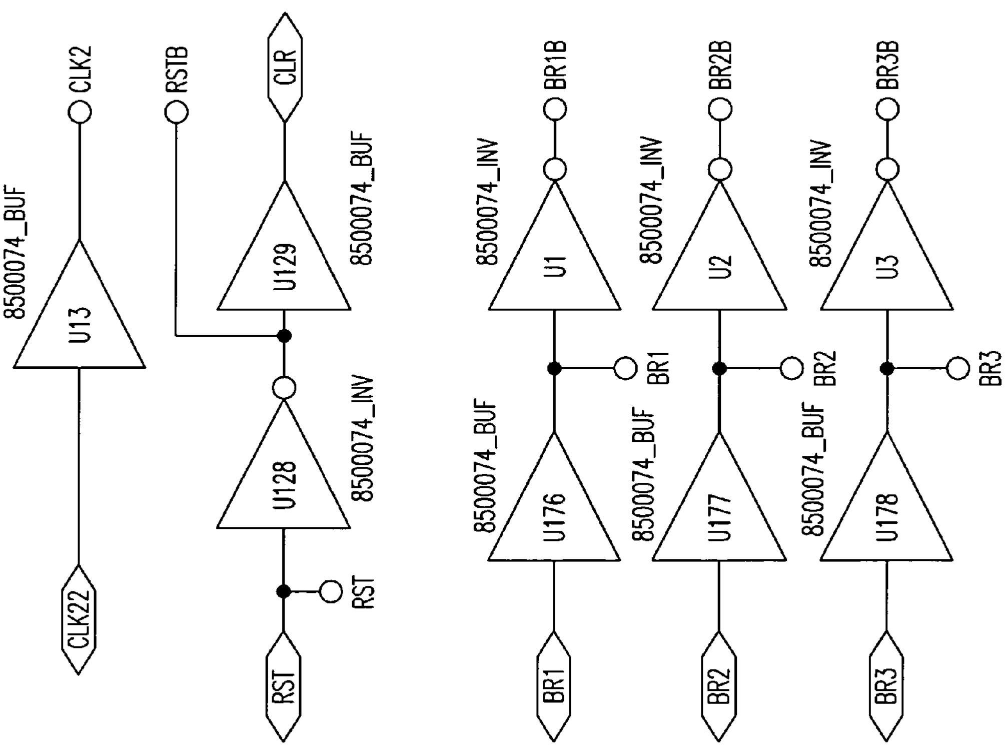
Figure 156D:
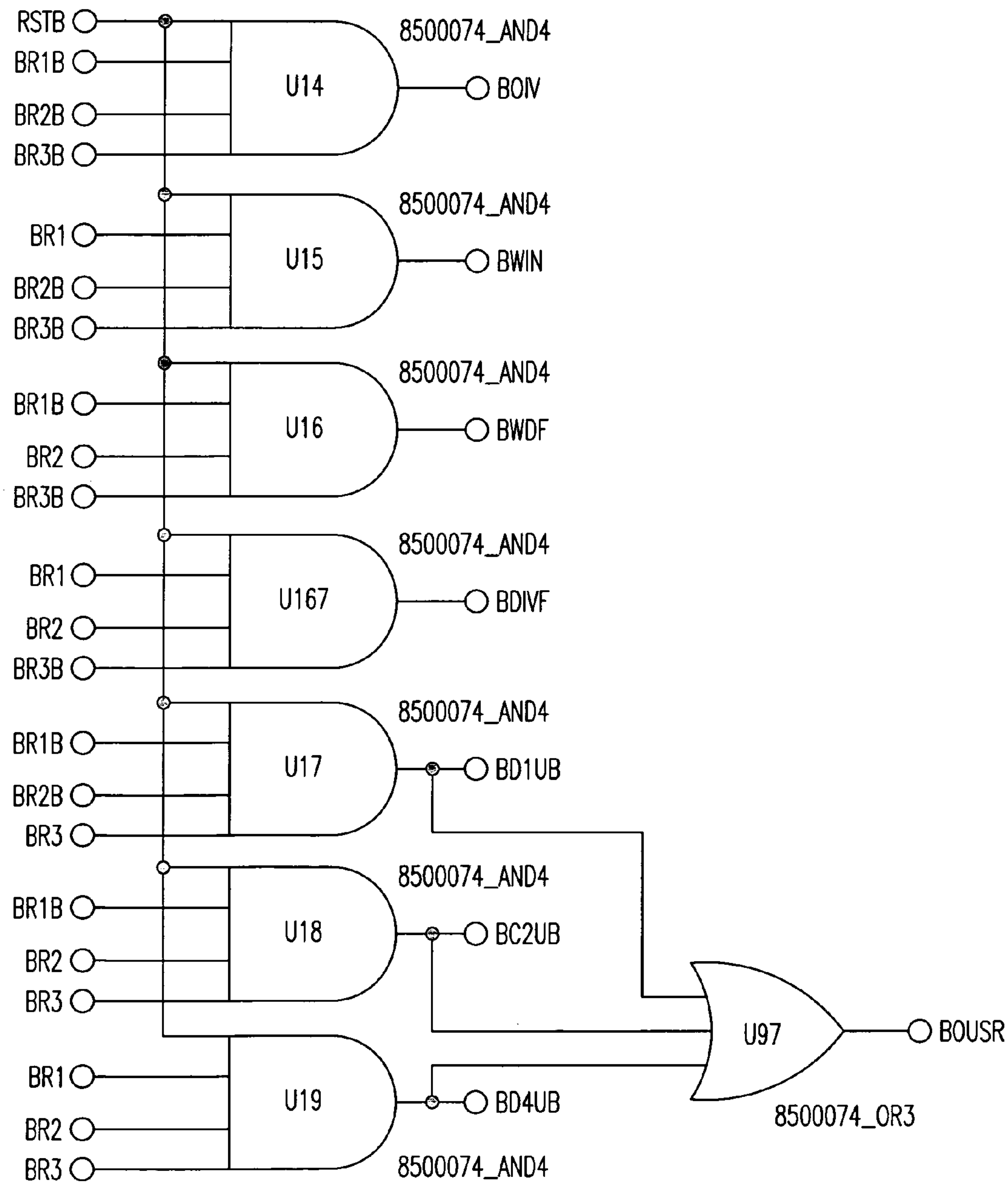
Figures 1, 156E:
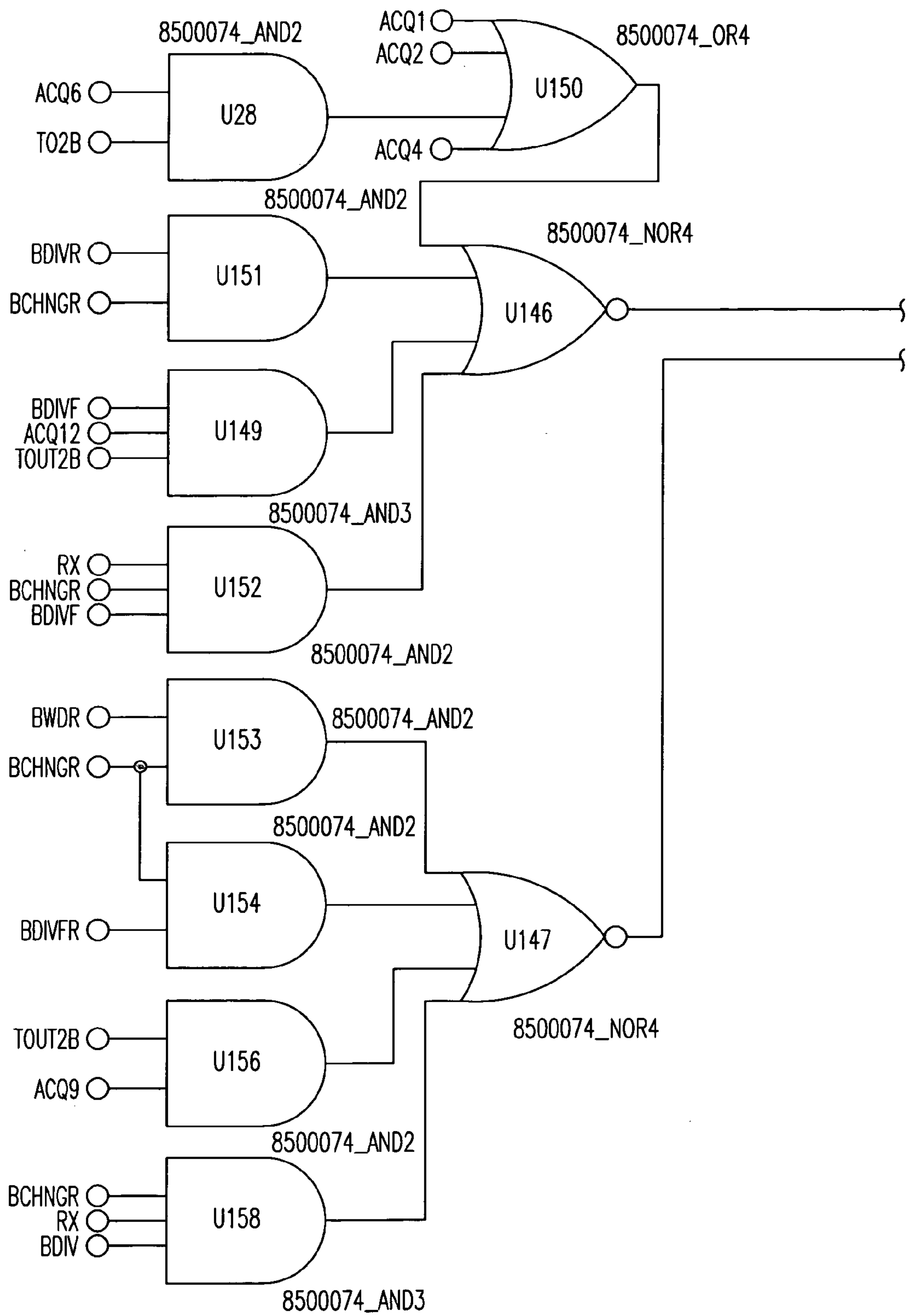
Figures 2, 156E:
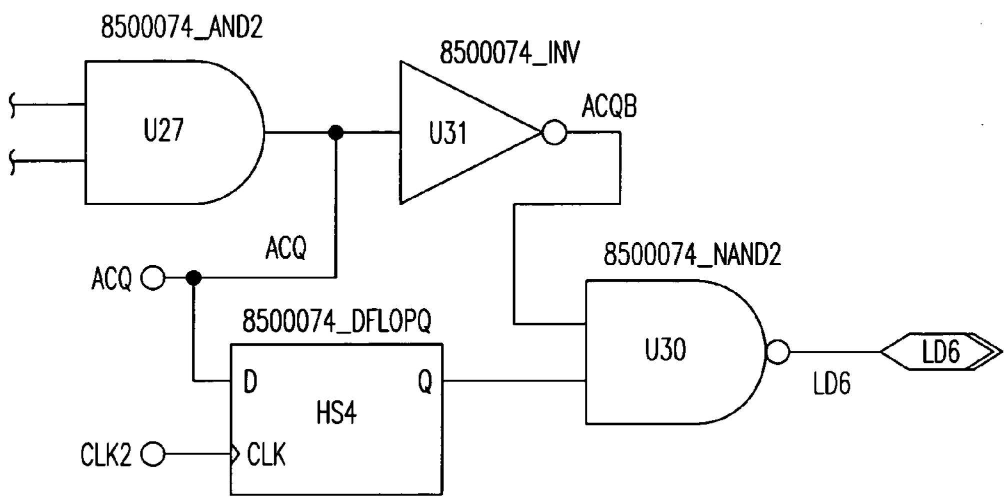
Figure 156F:
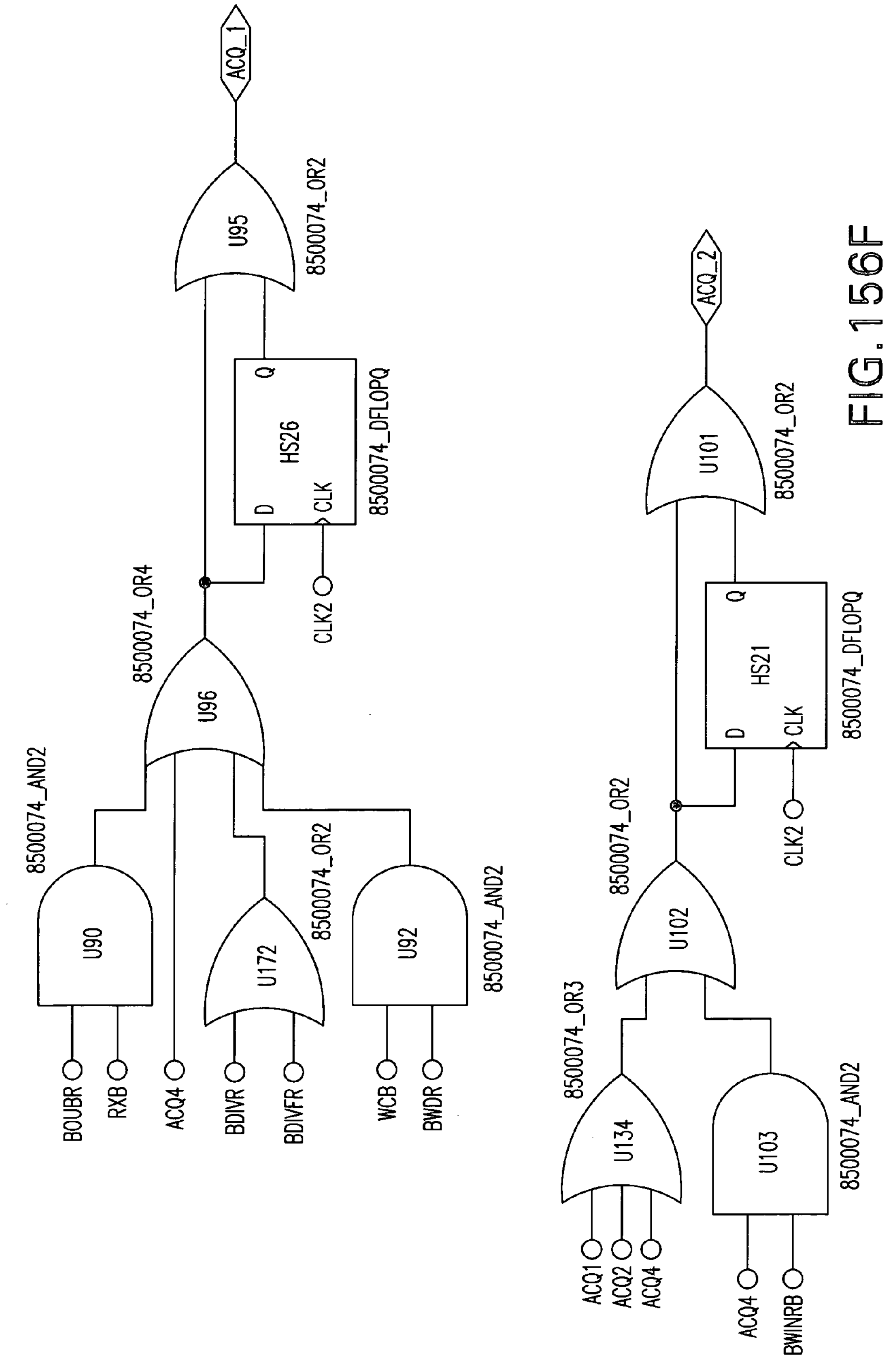
Figure 156G:
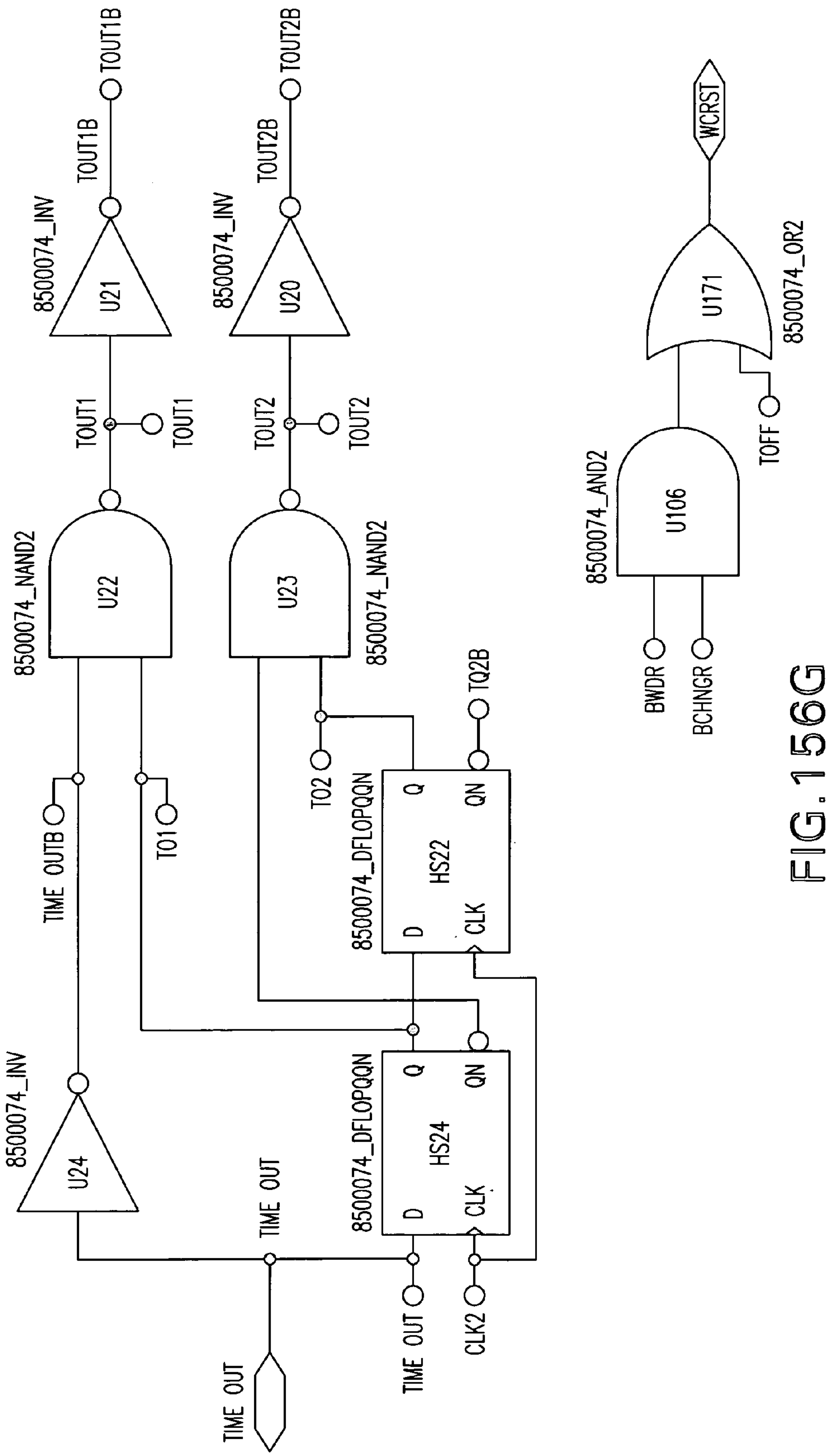
Figure 156H:
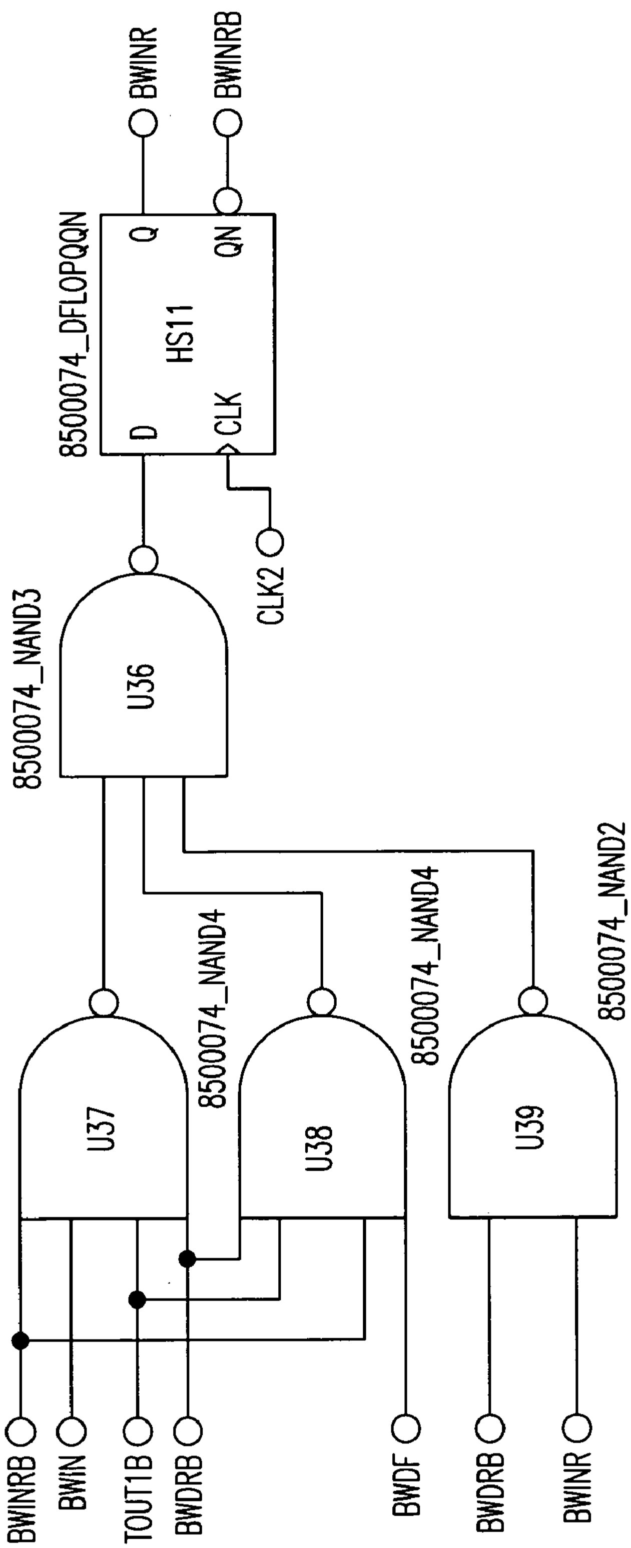
Figure 156I:
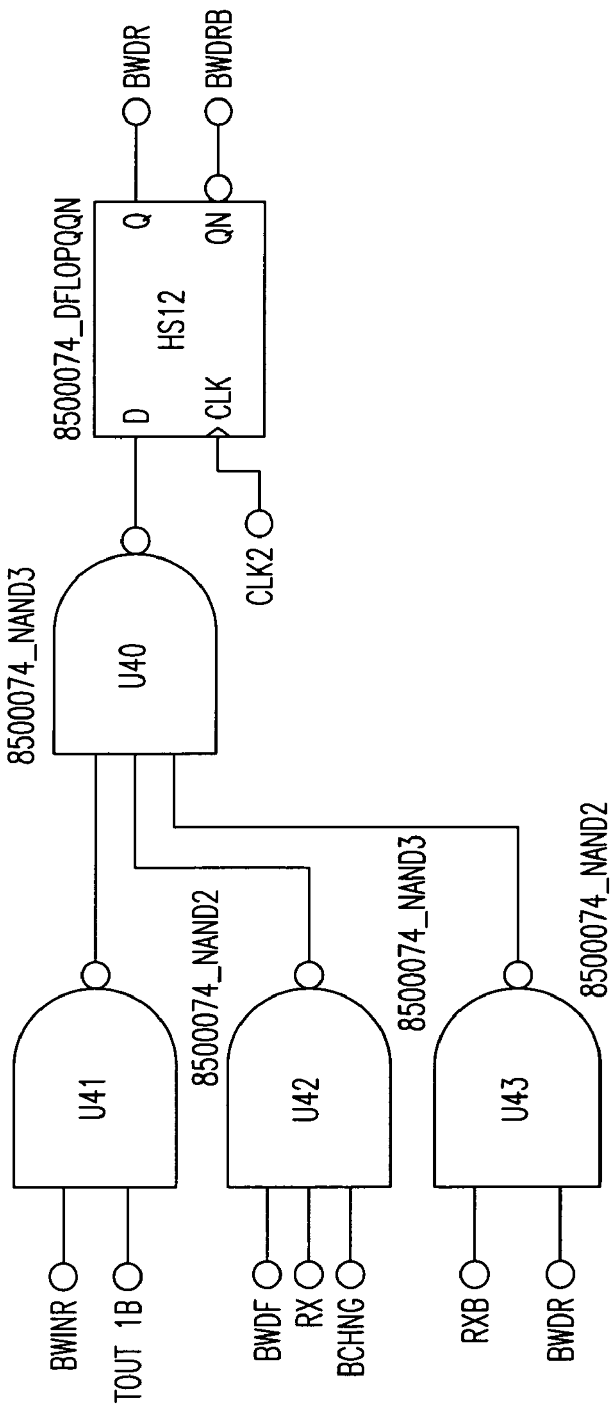
Figure 156J:
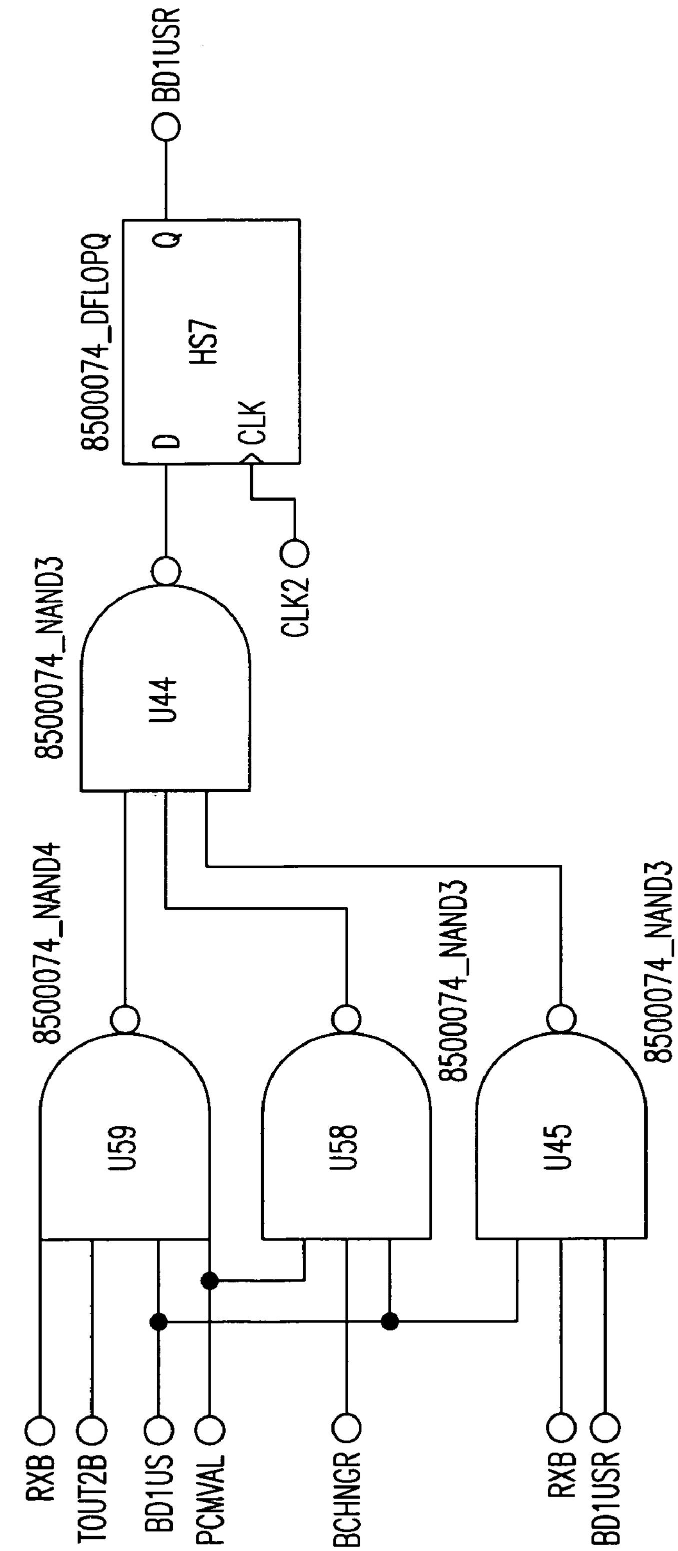
Figure 156K:
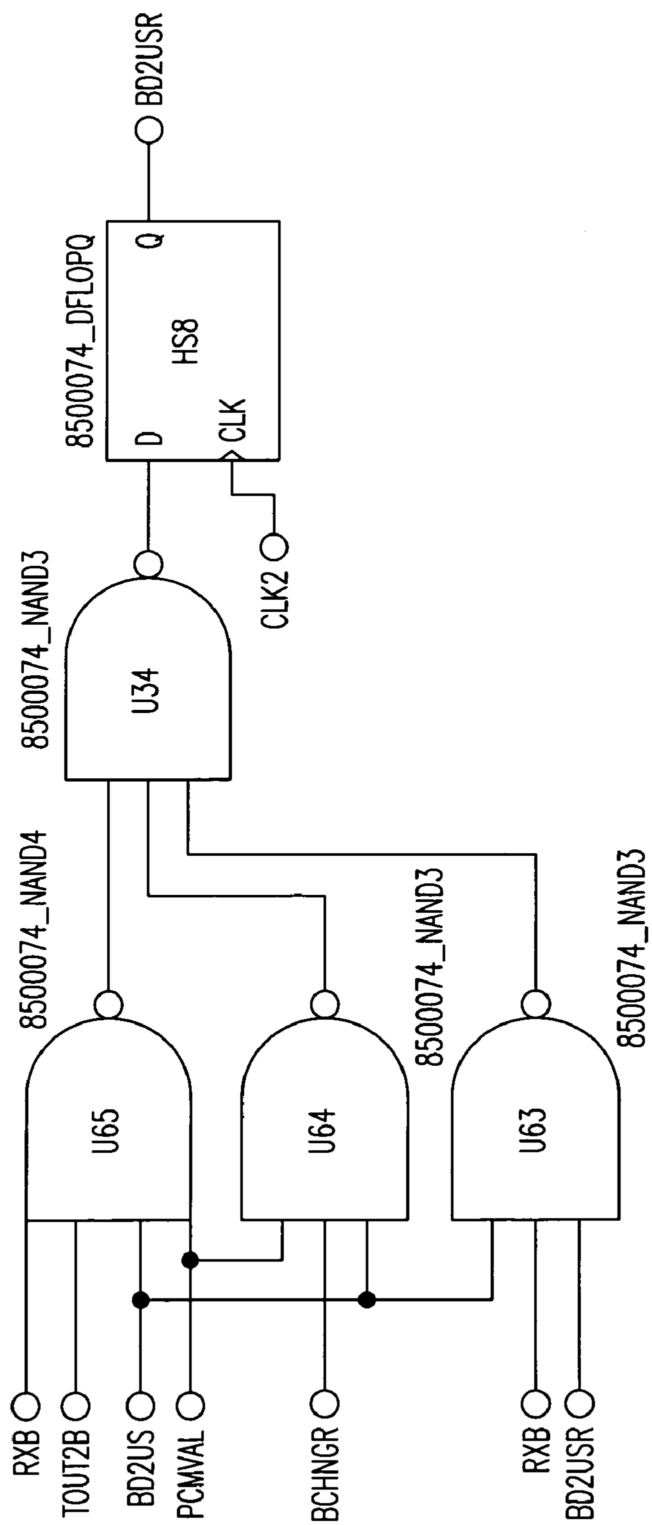
Figure 156L:
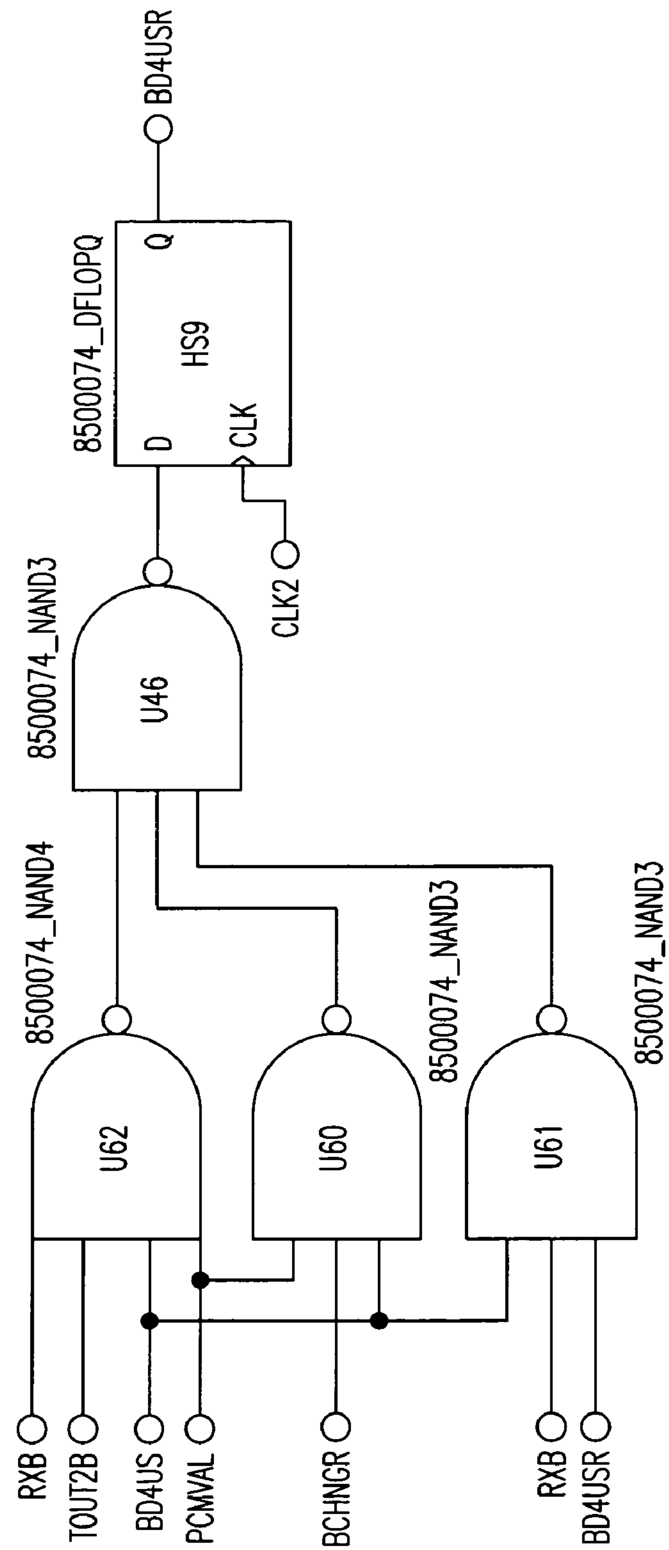
Figure 156M:
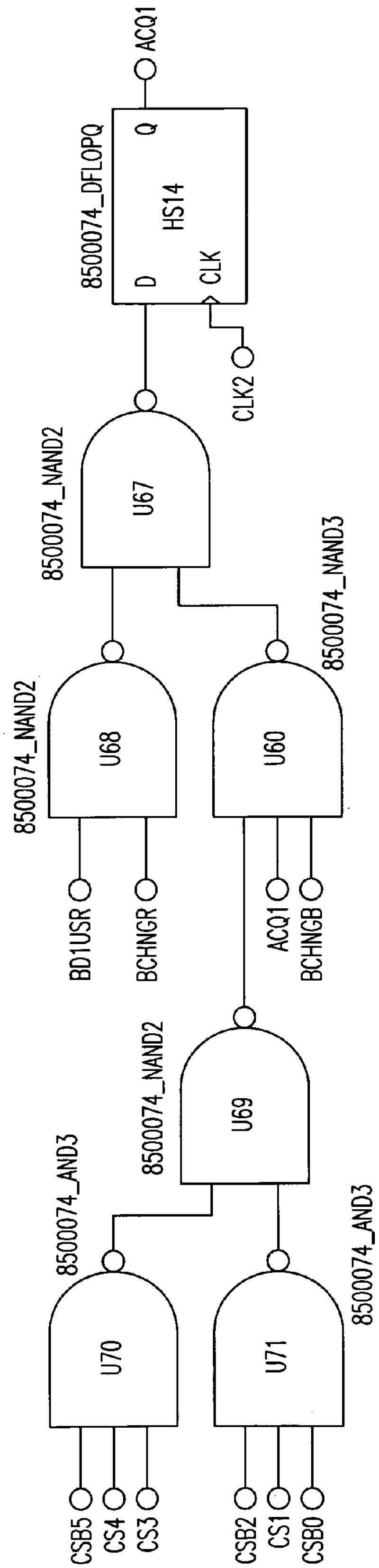
Figure 156N:
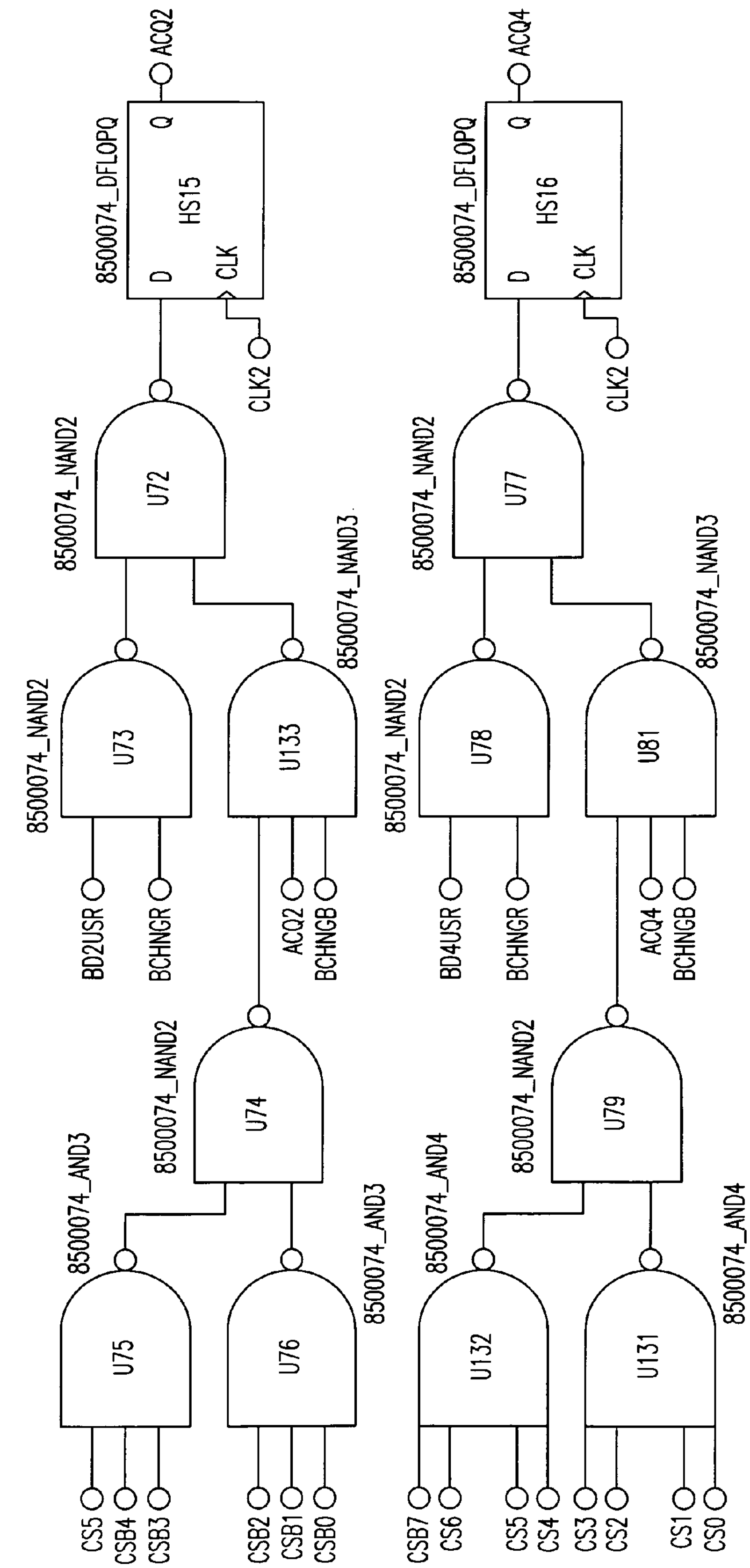
Figure 156O:
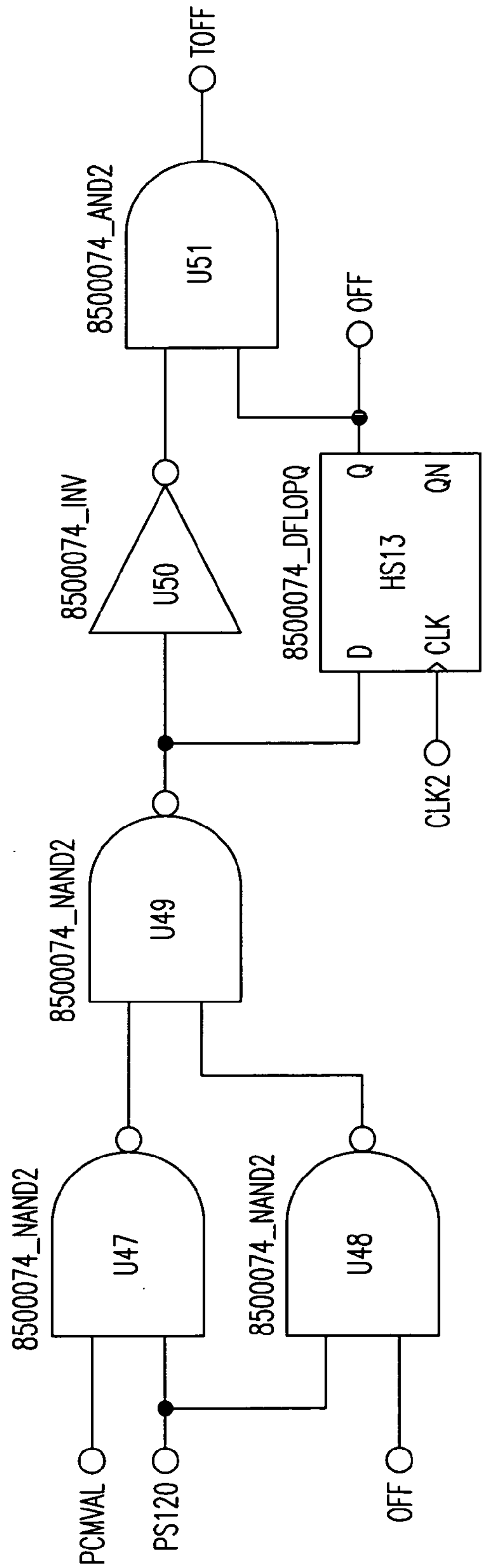
Figure 156P:
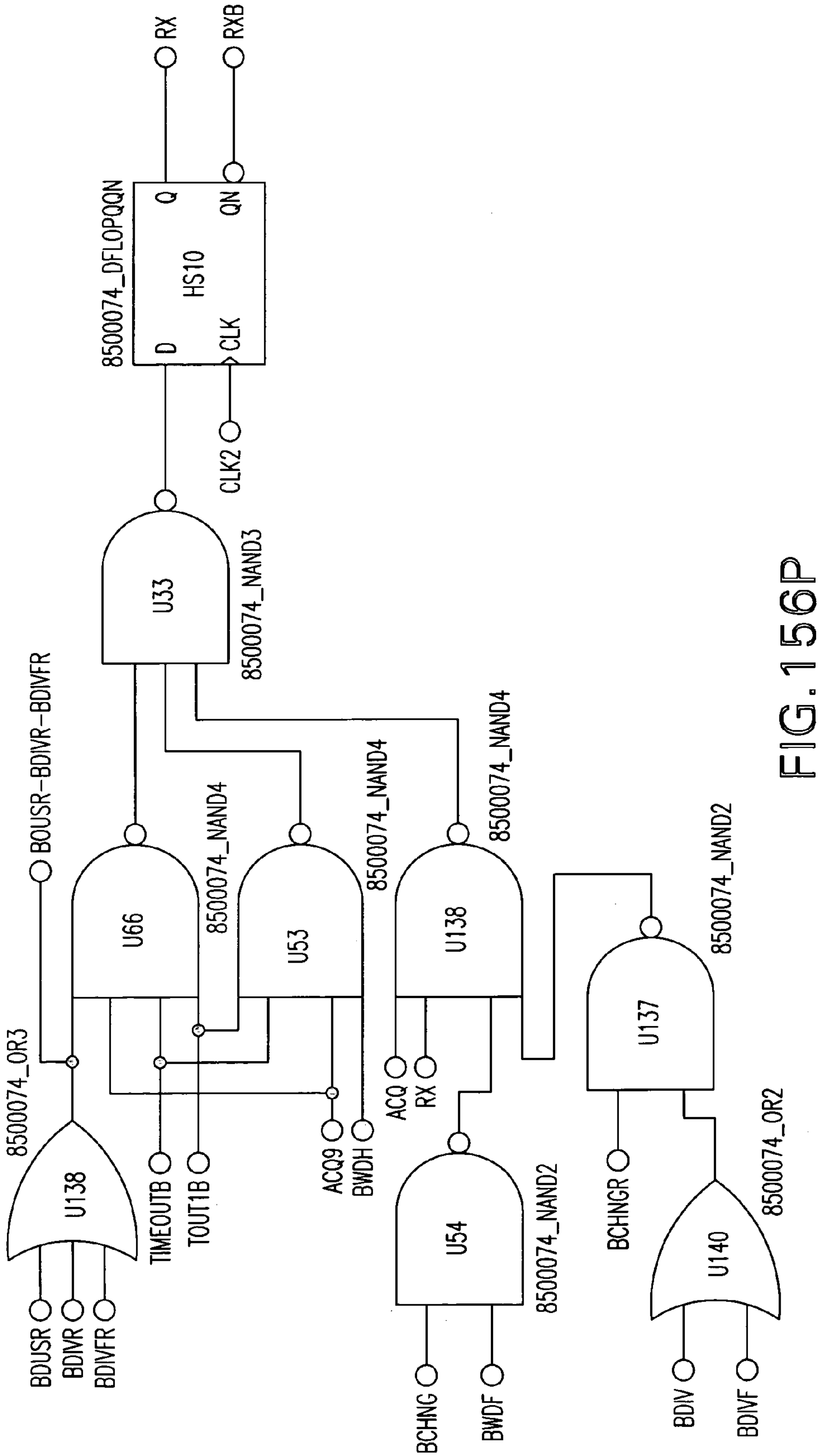
Figure 156Q:
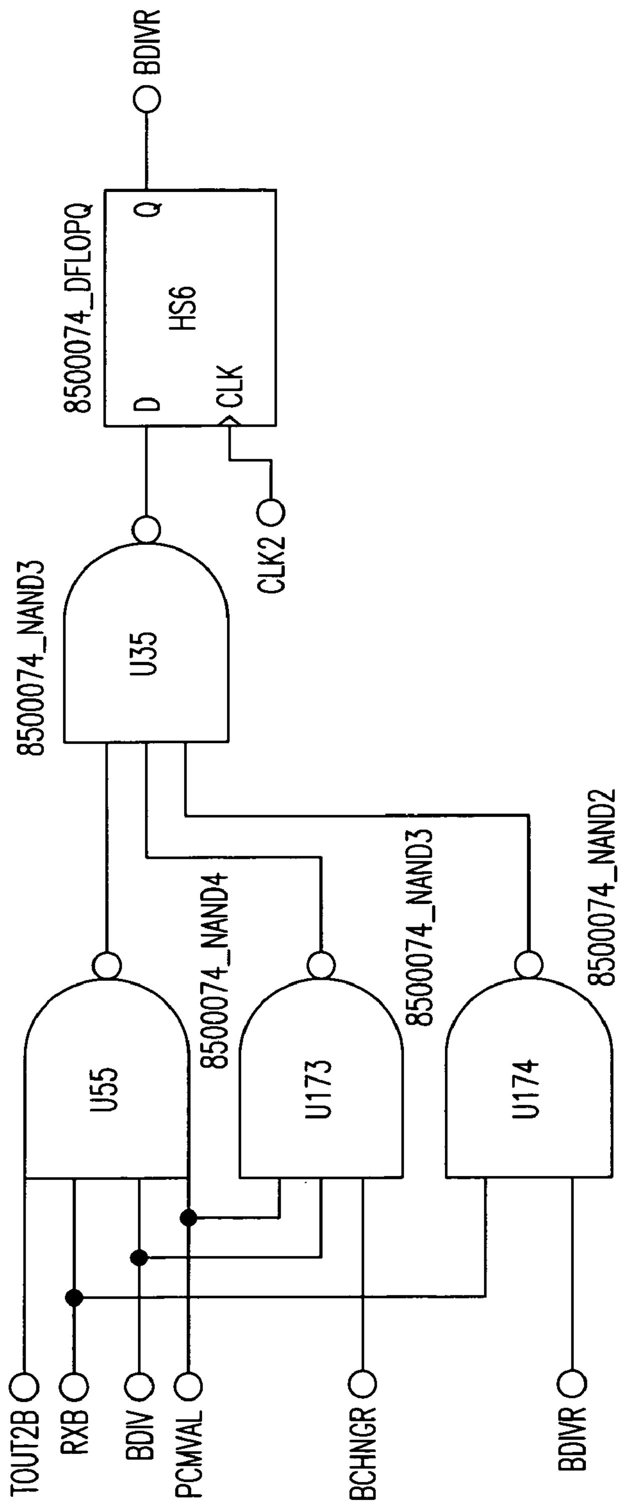
Figure 156R:
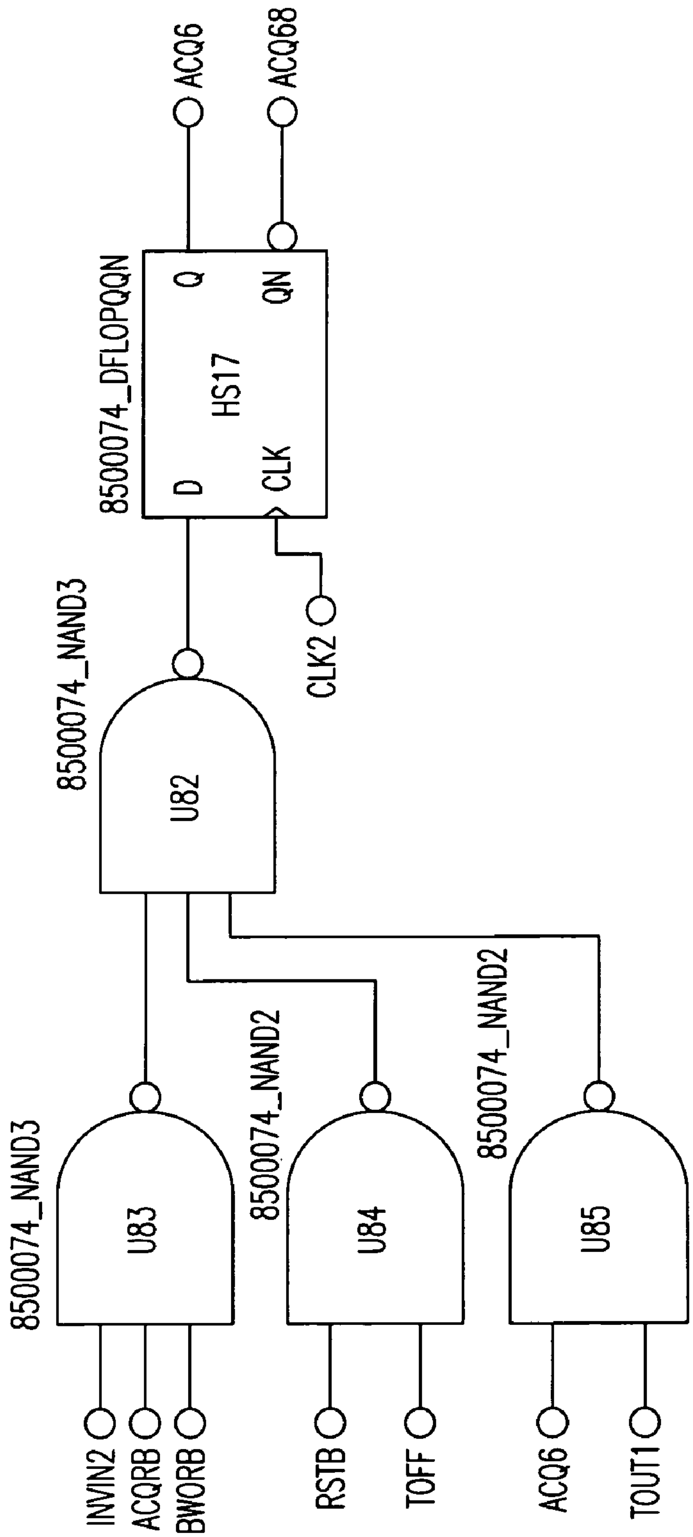
Figure 156S:
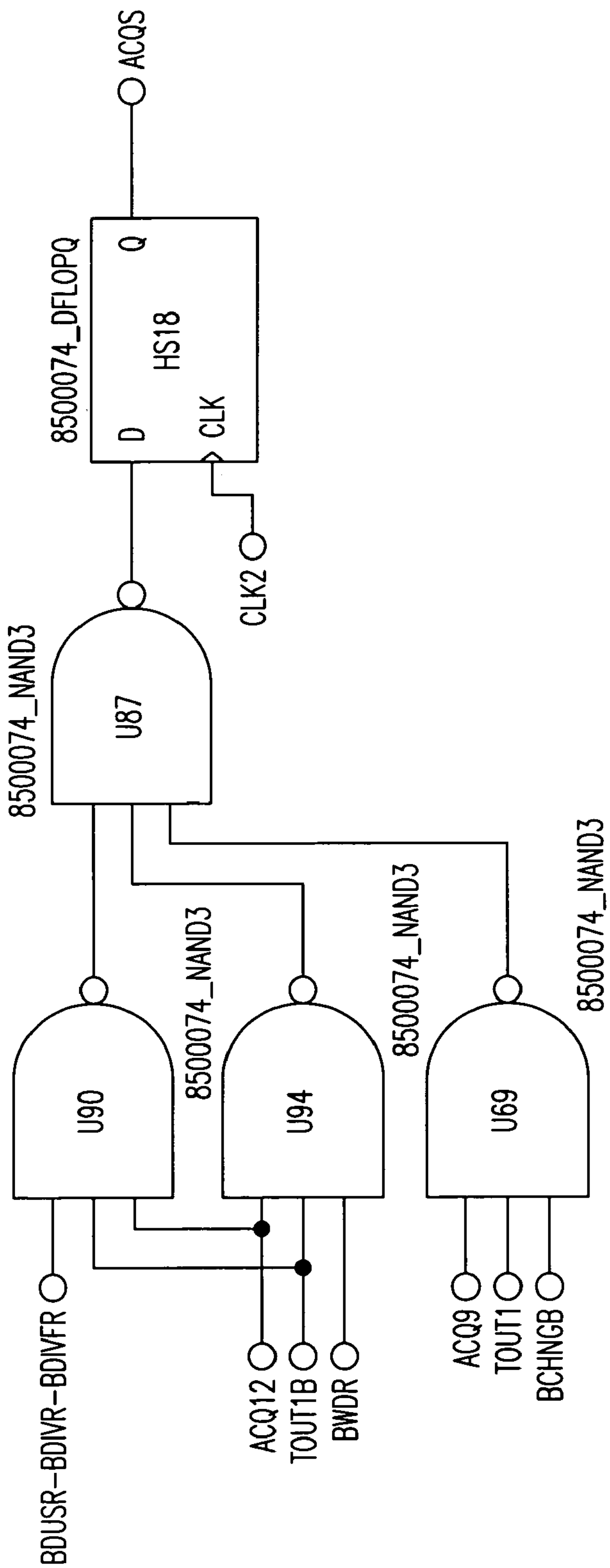
Figure 156T:
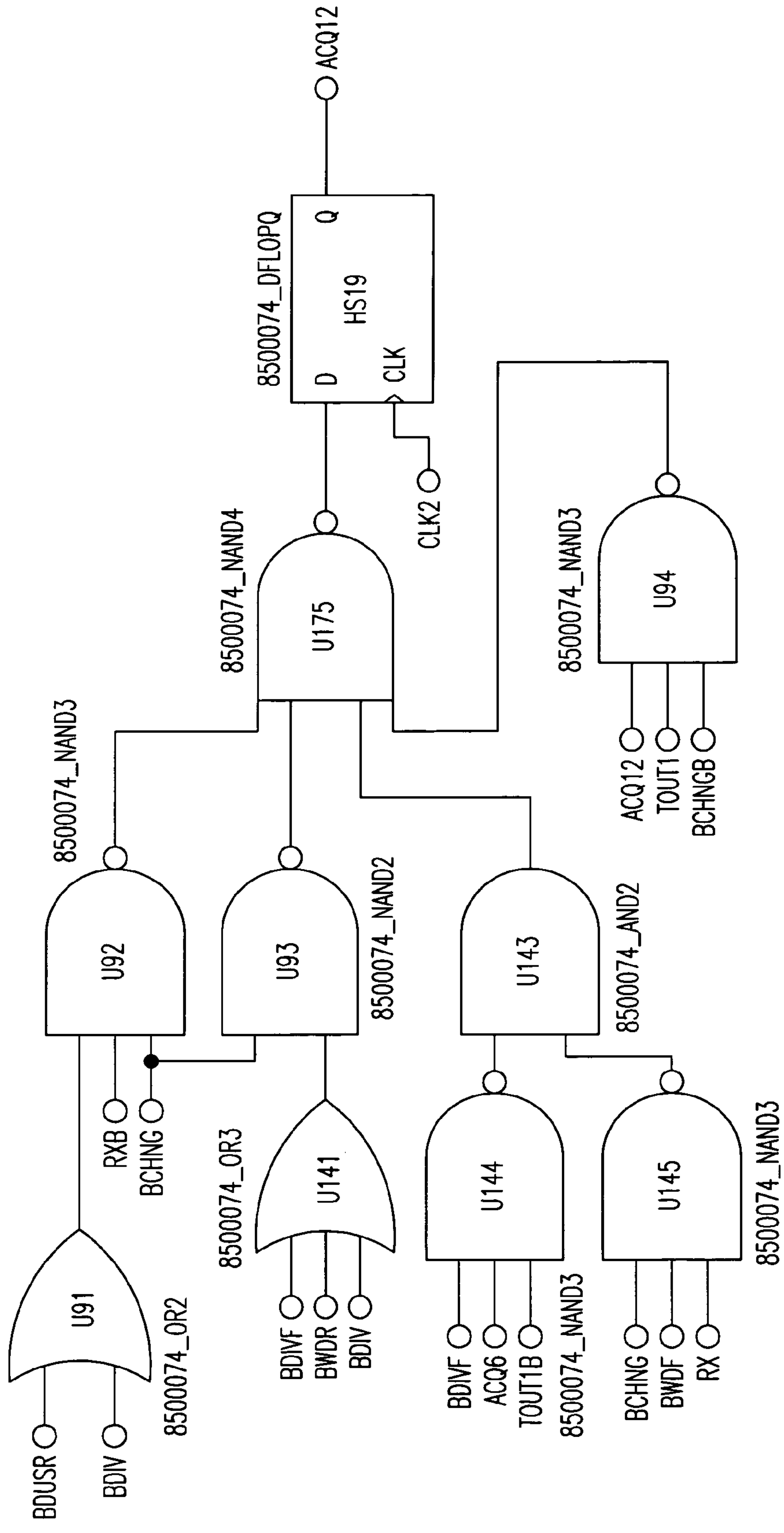
Figure 156U:
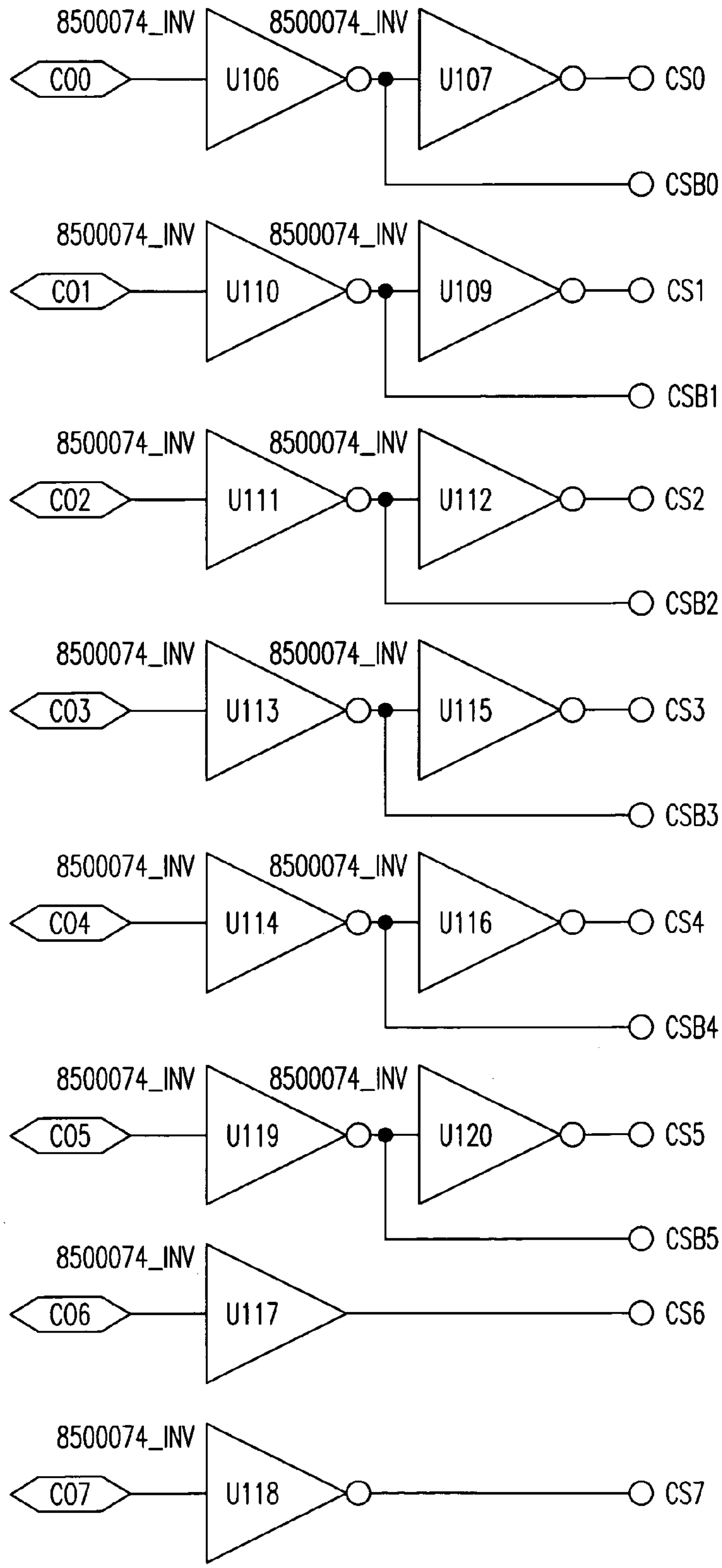
Figure 156V:
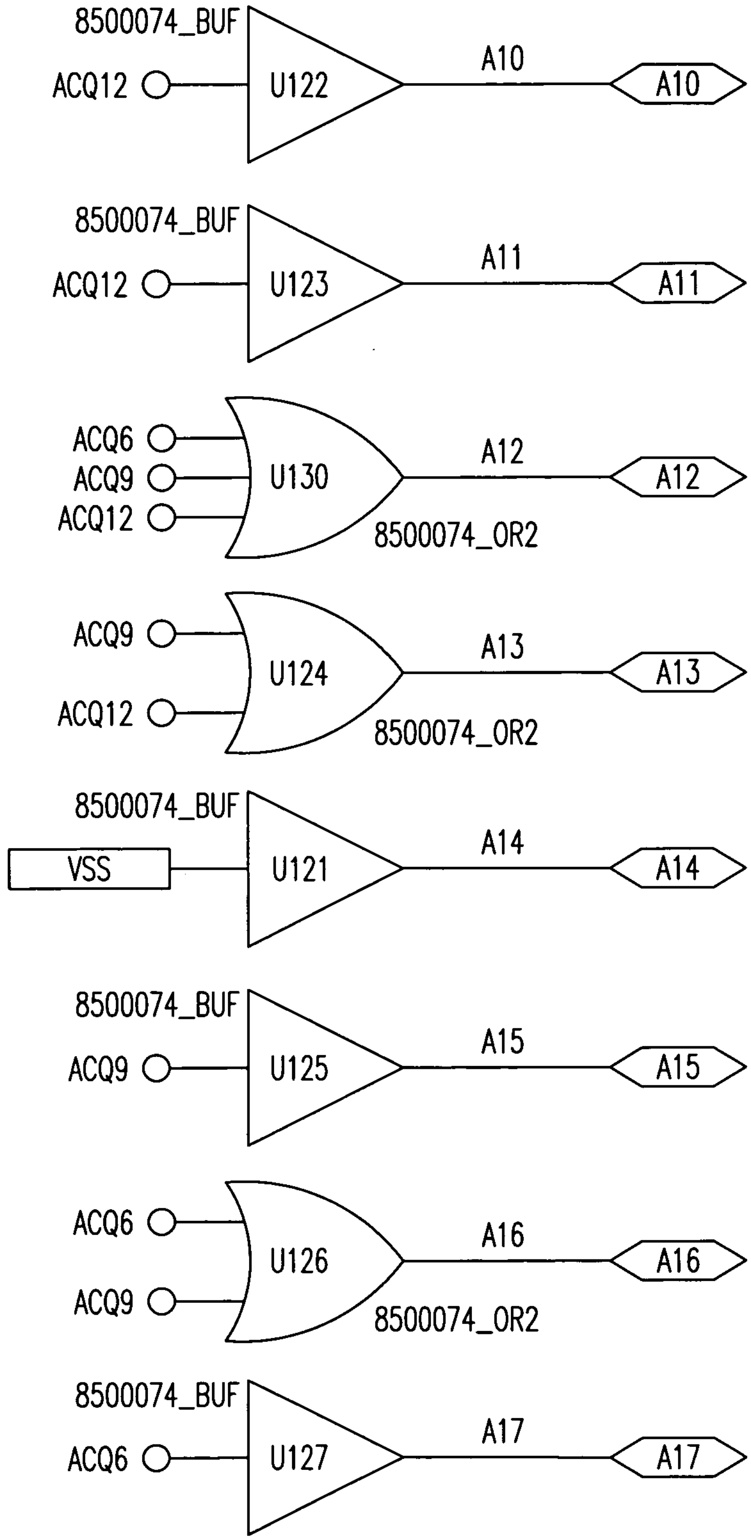
Figure 157A:
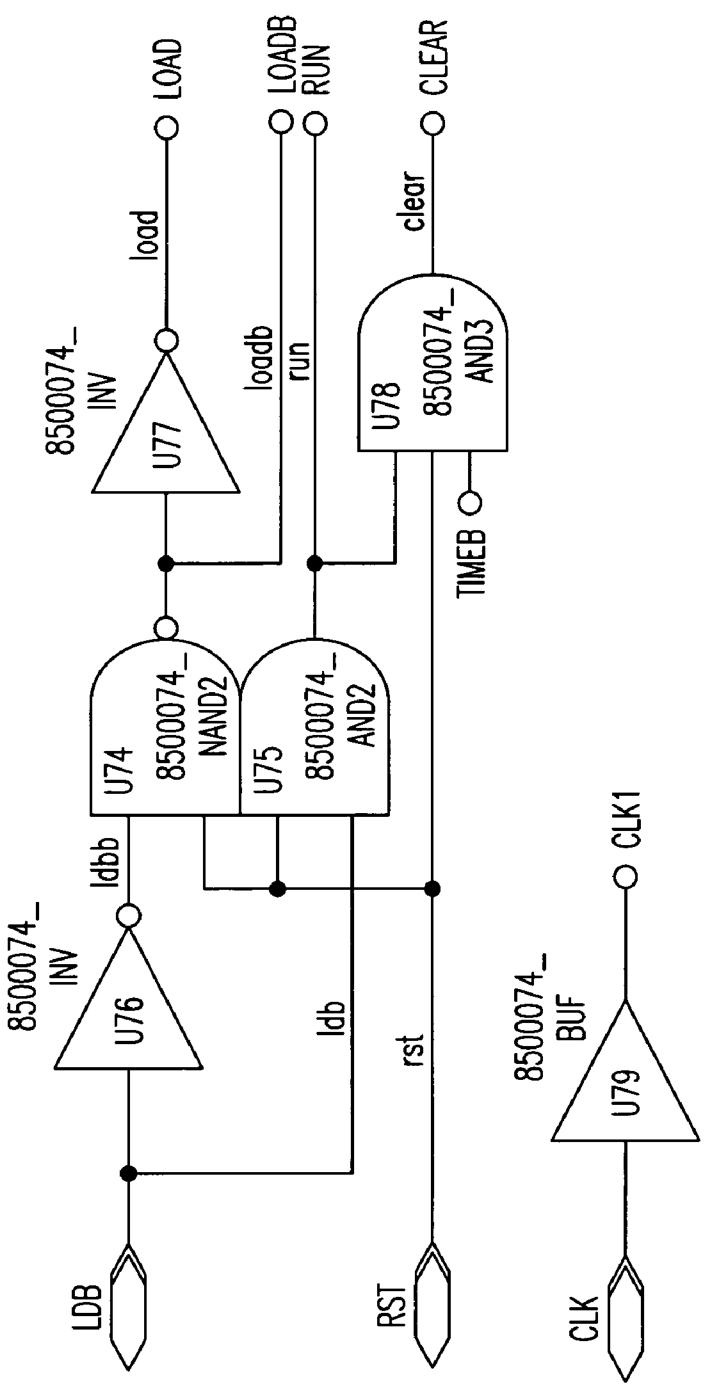
Figure 157B:
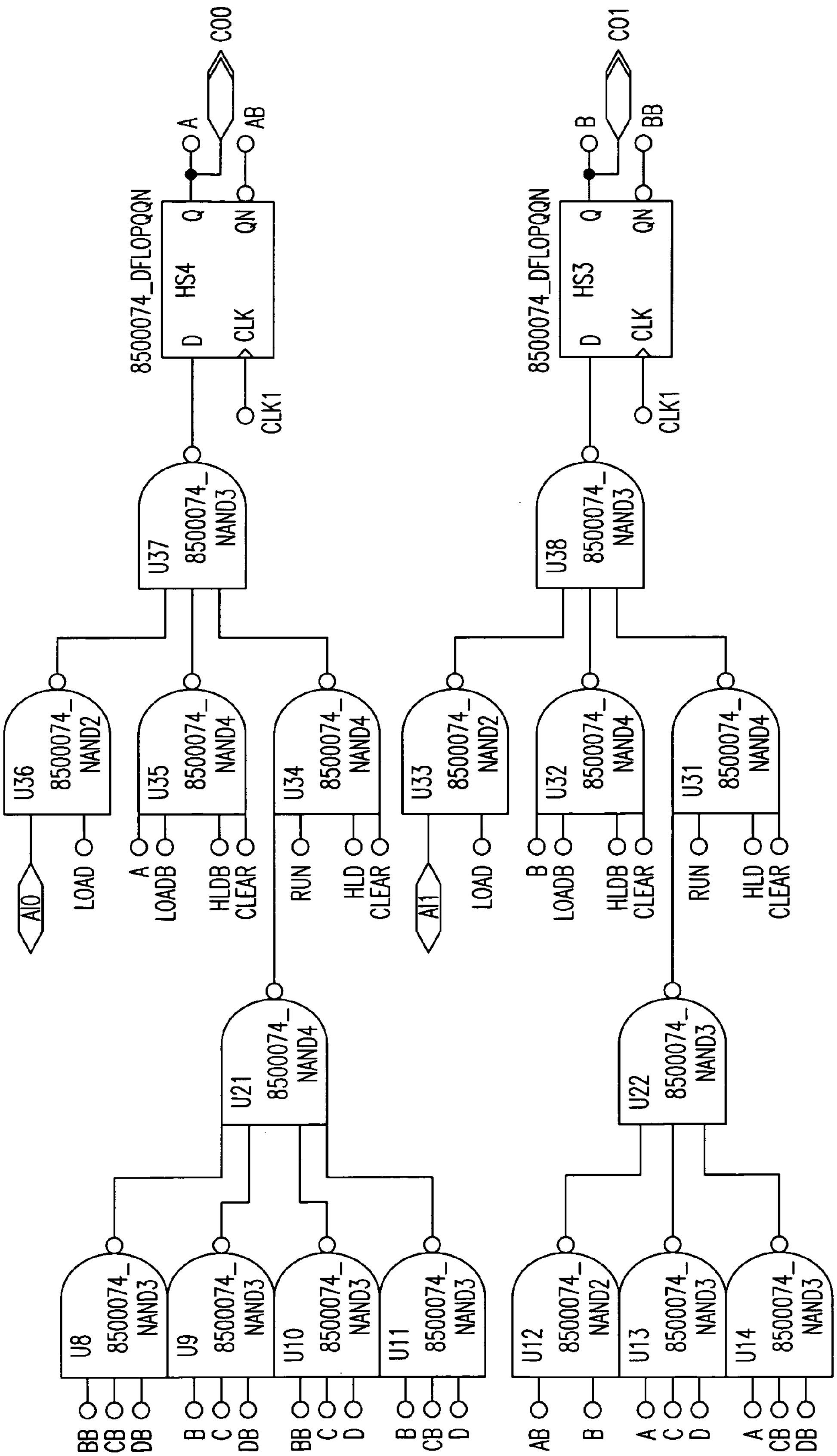
Figure 157C:
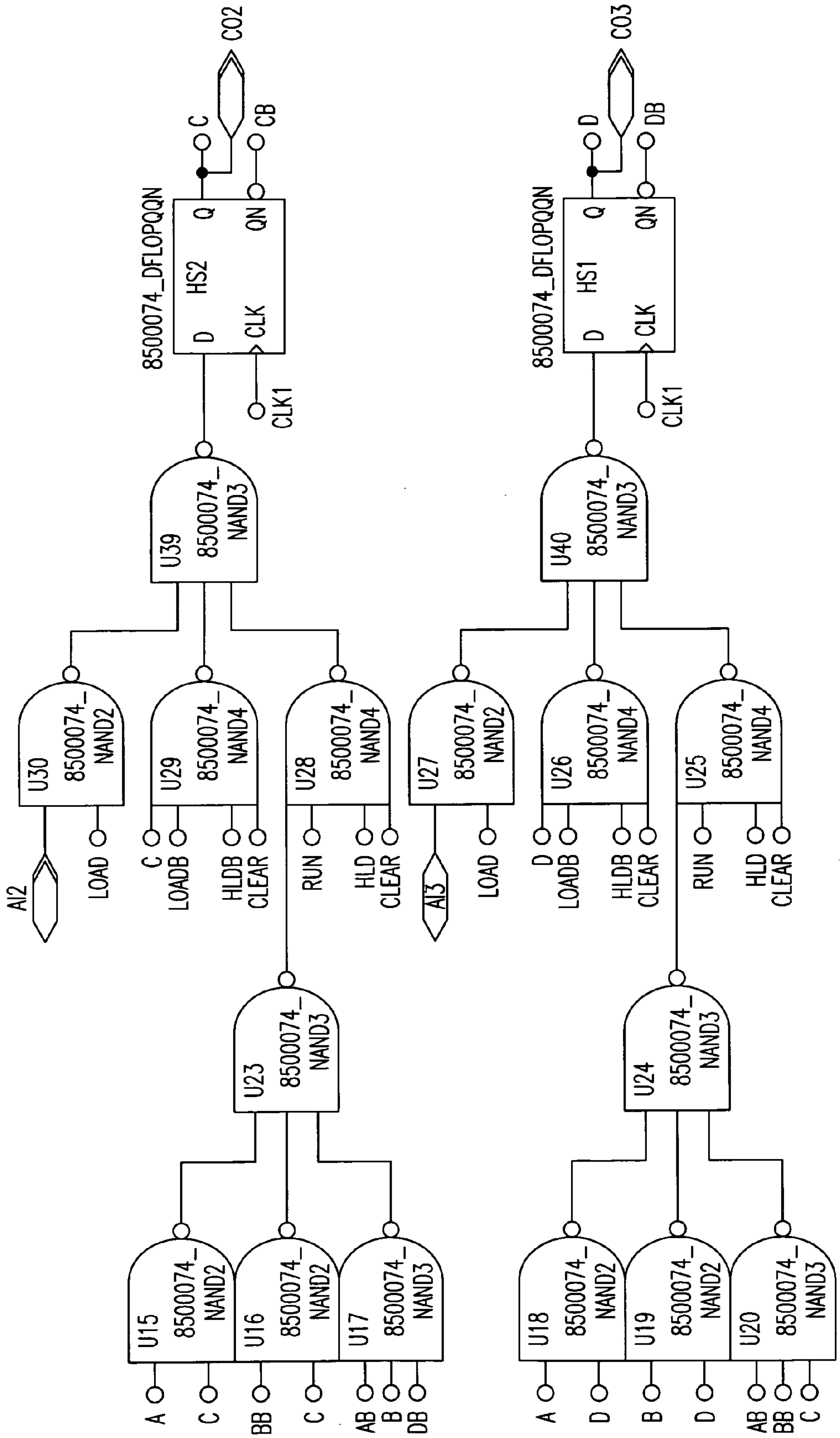
Figure 157D:
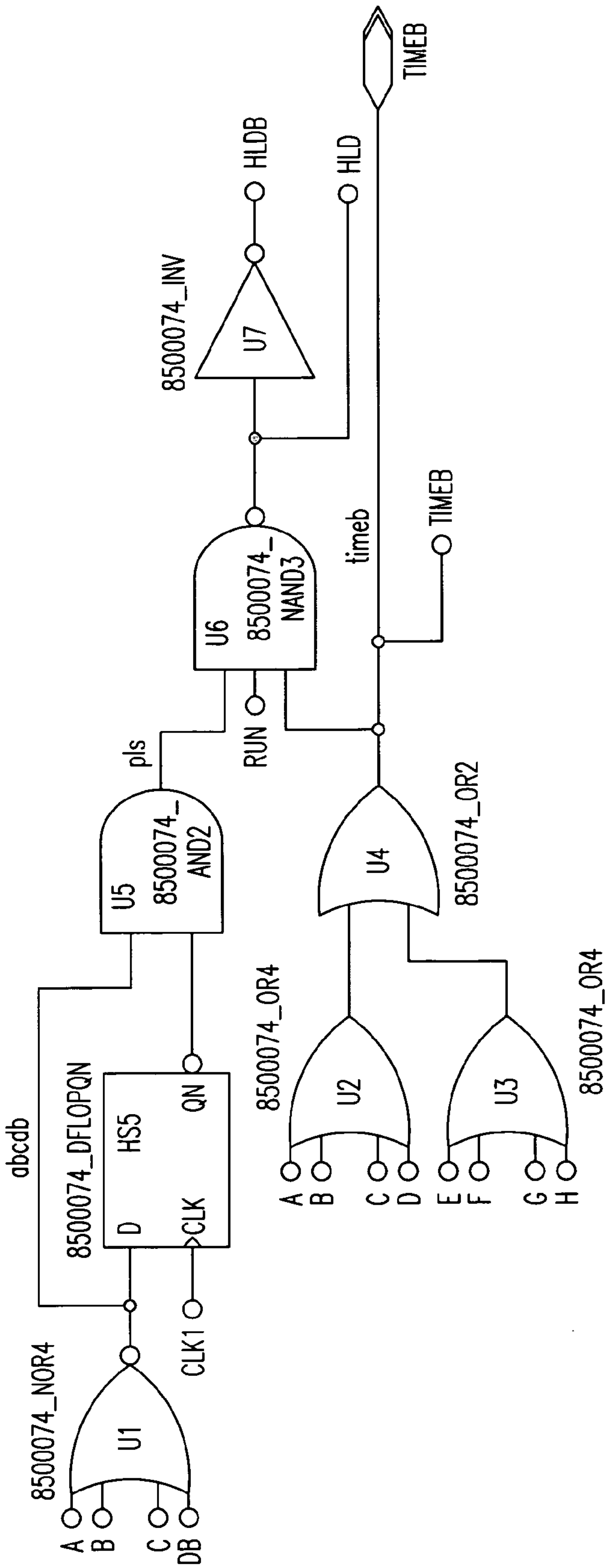
Figure 157E:
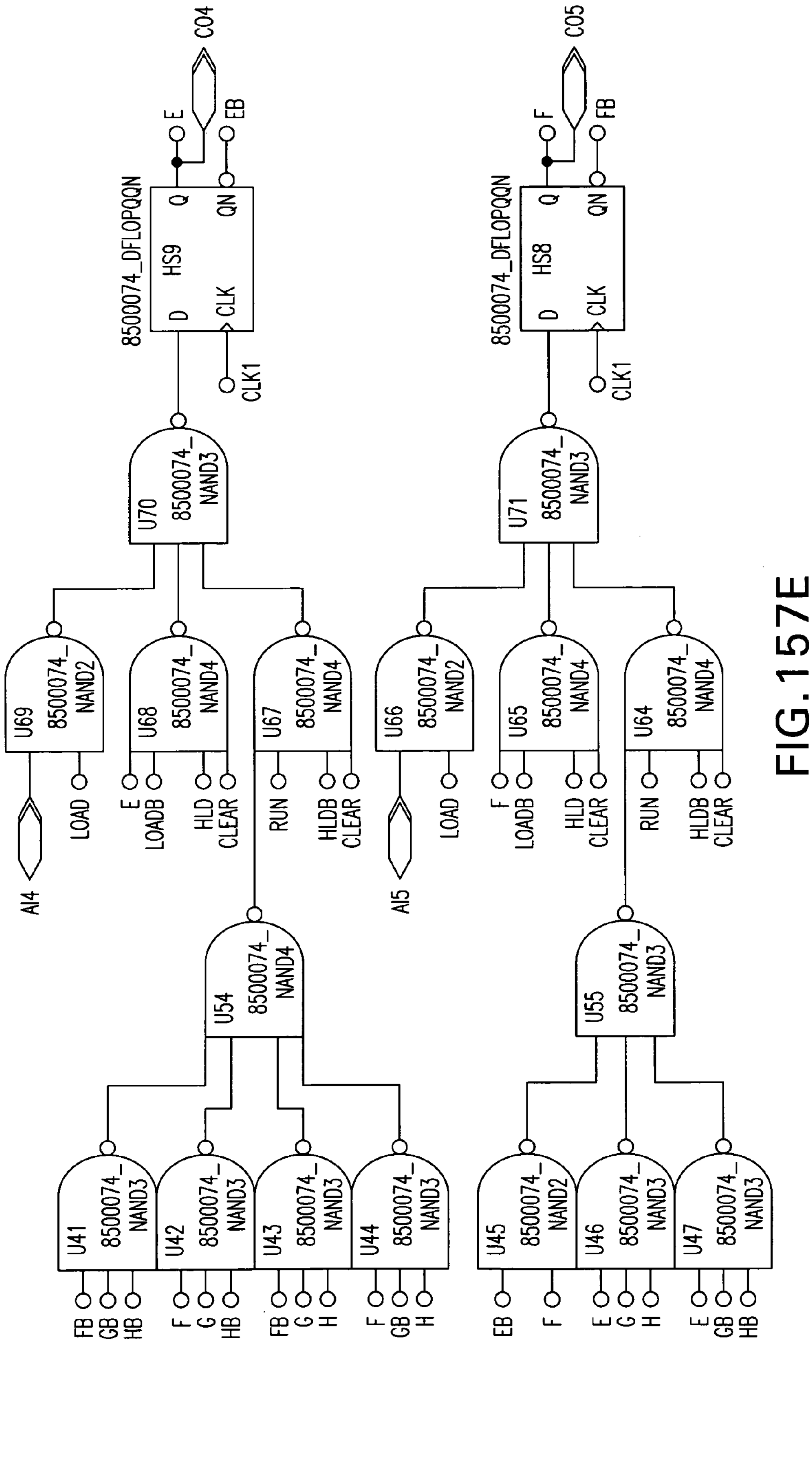
Figure 157F:
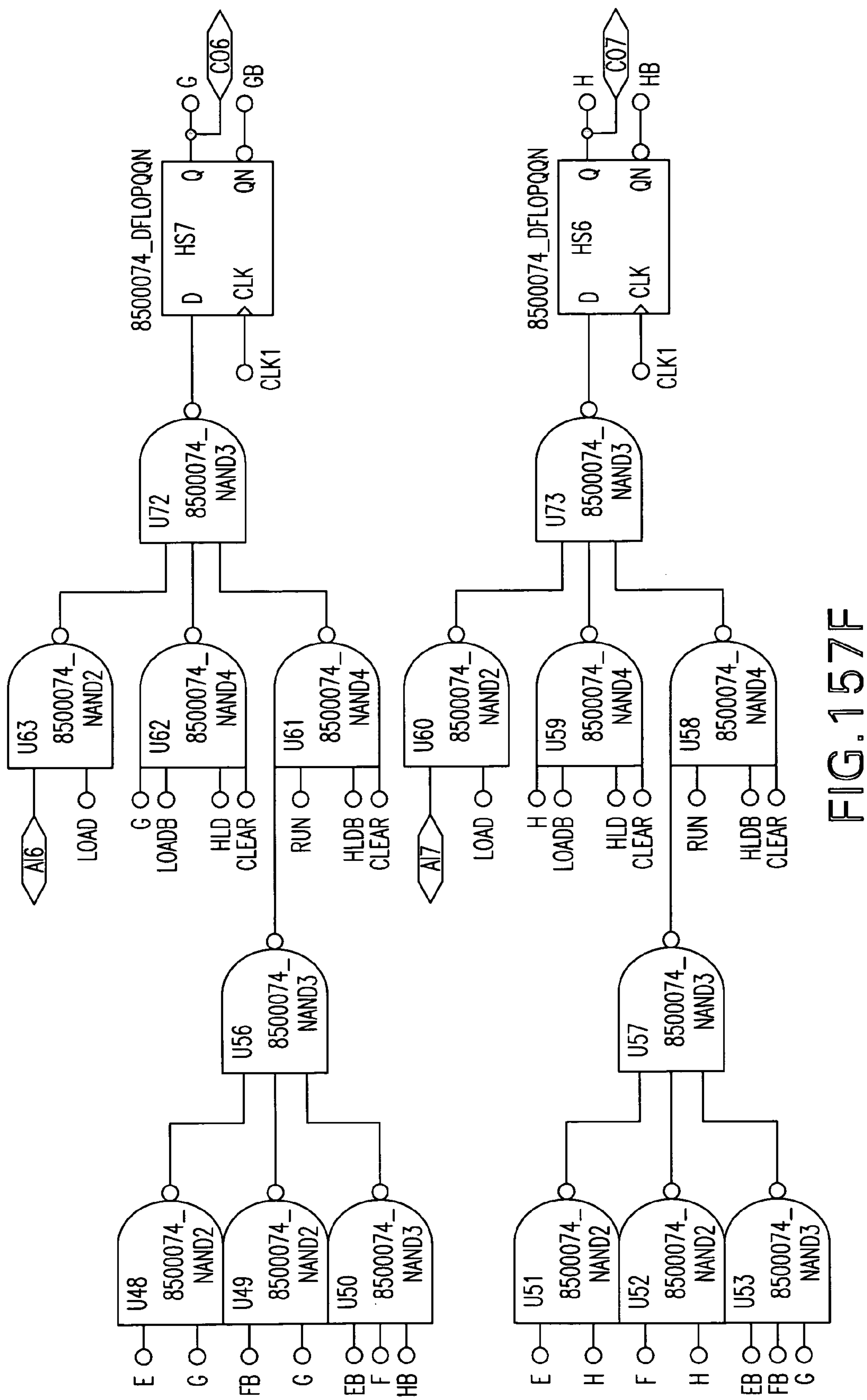
Figure 158A:
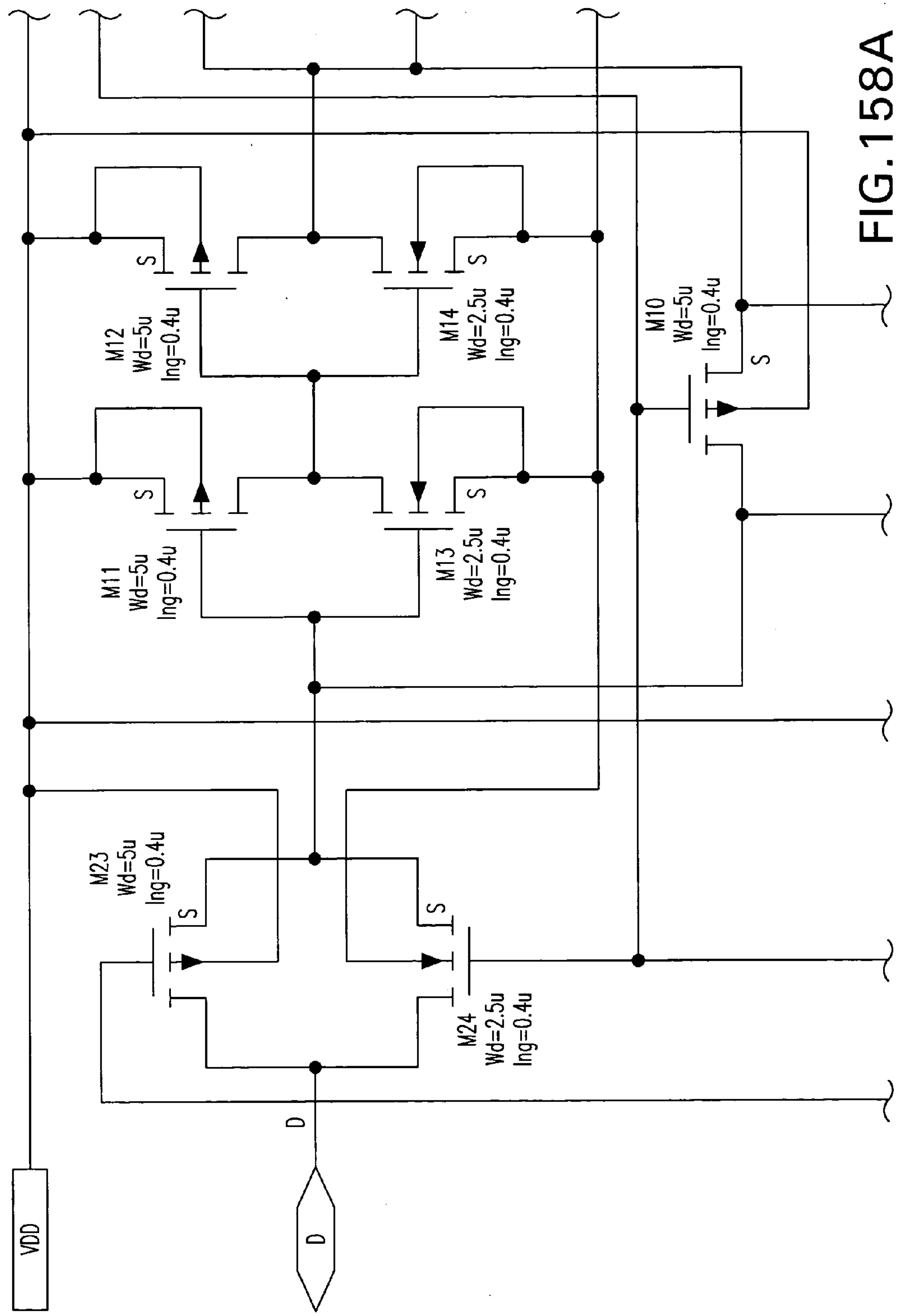
Figure 158B:
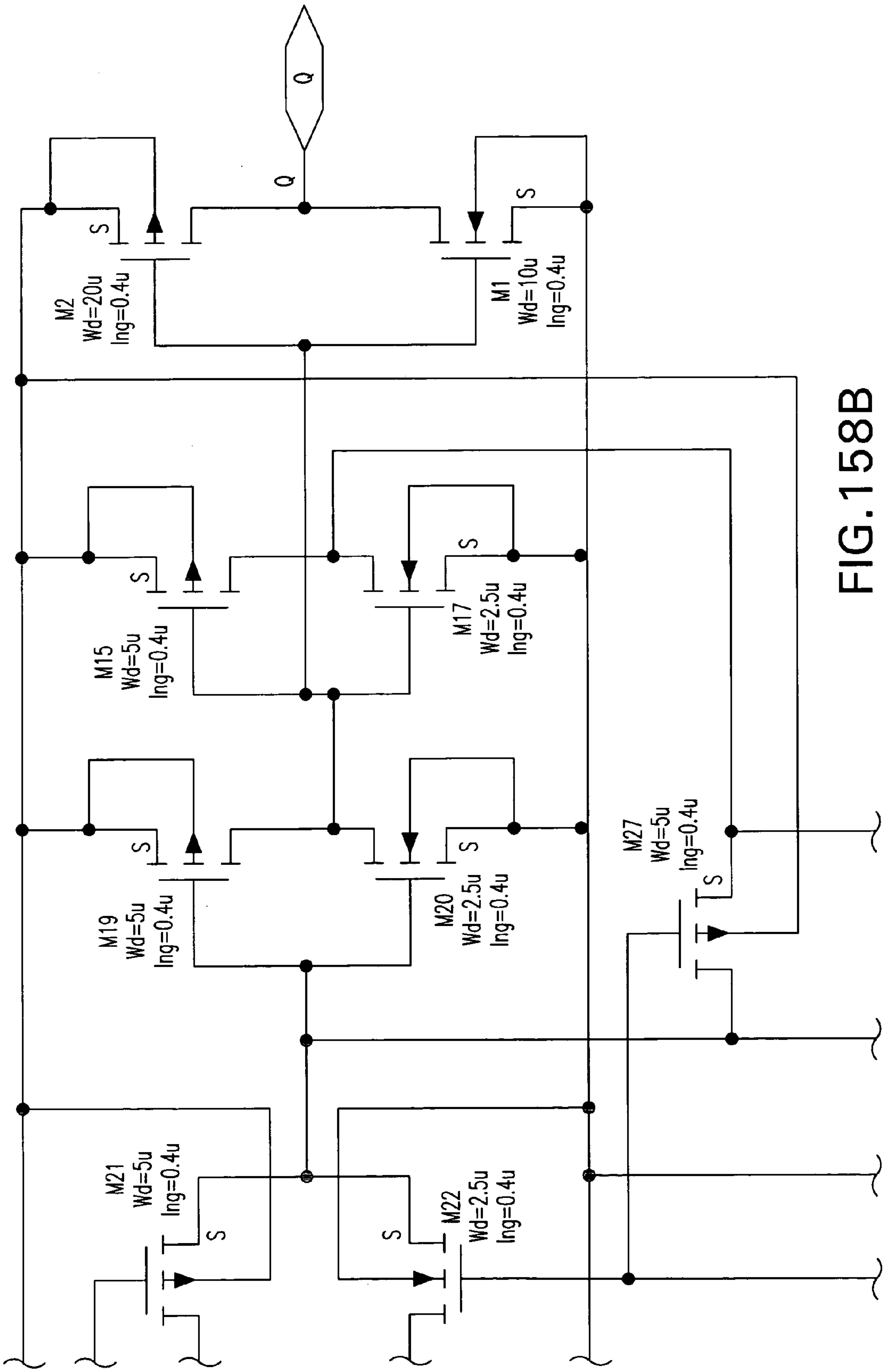
Figure 158C:
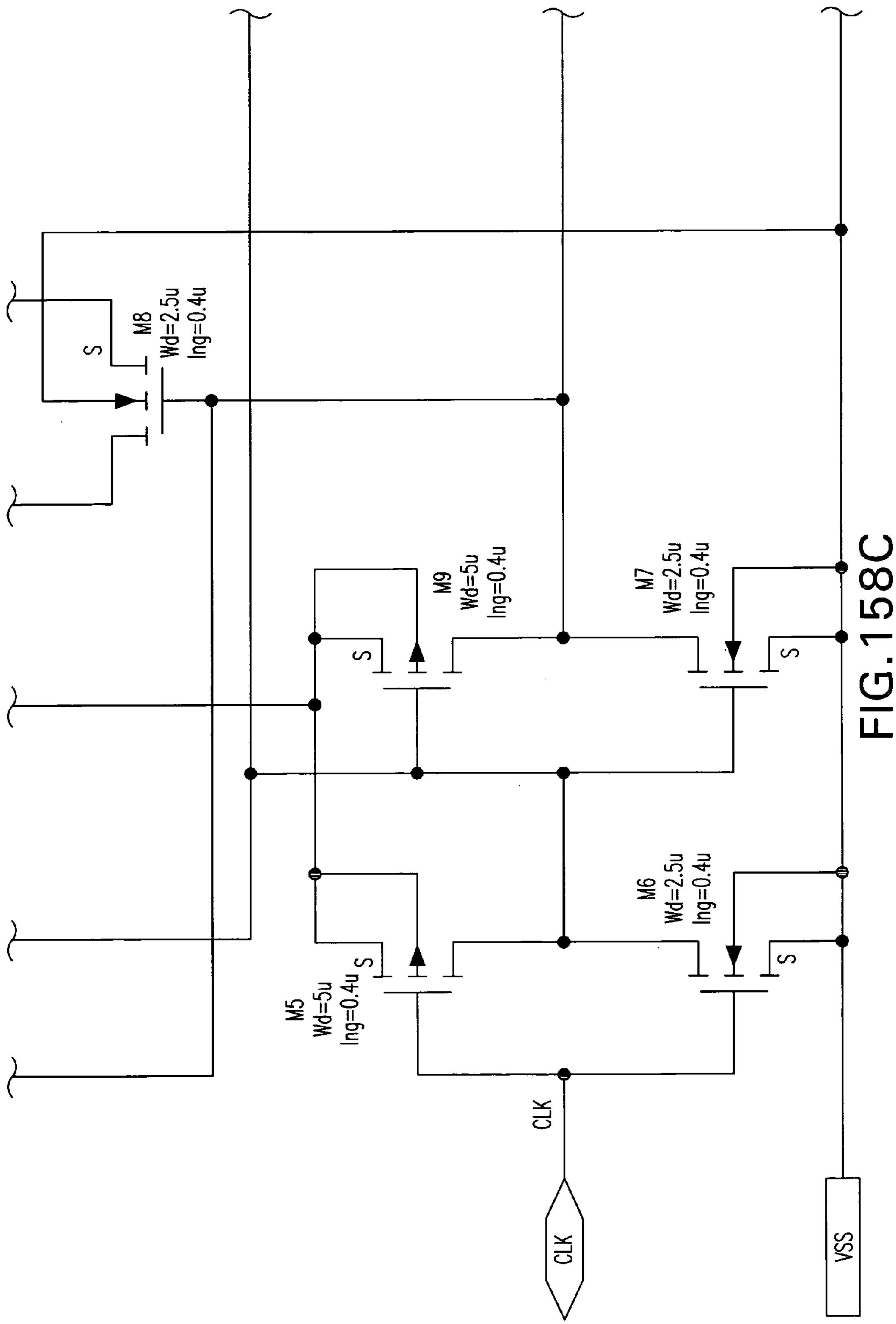
Figure 158D:
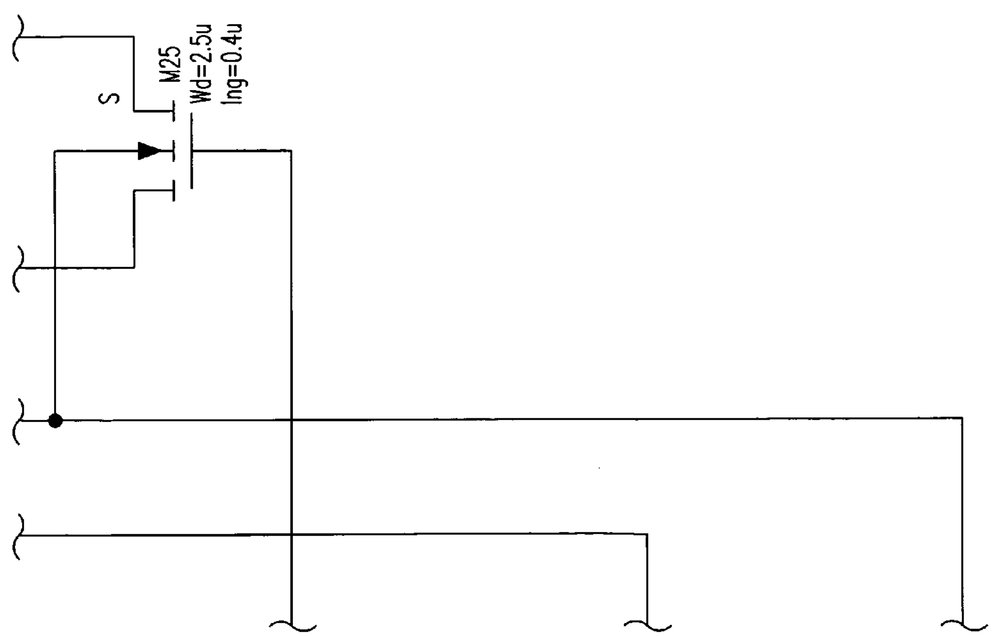
Figure 159:
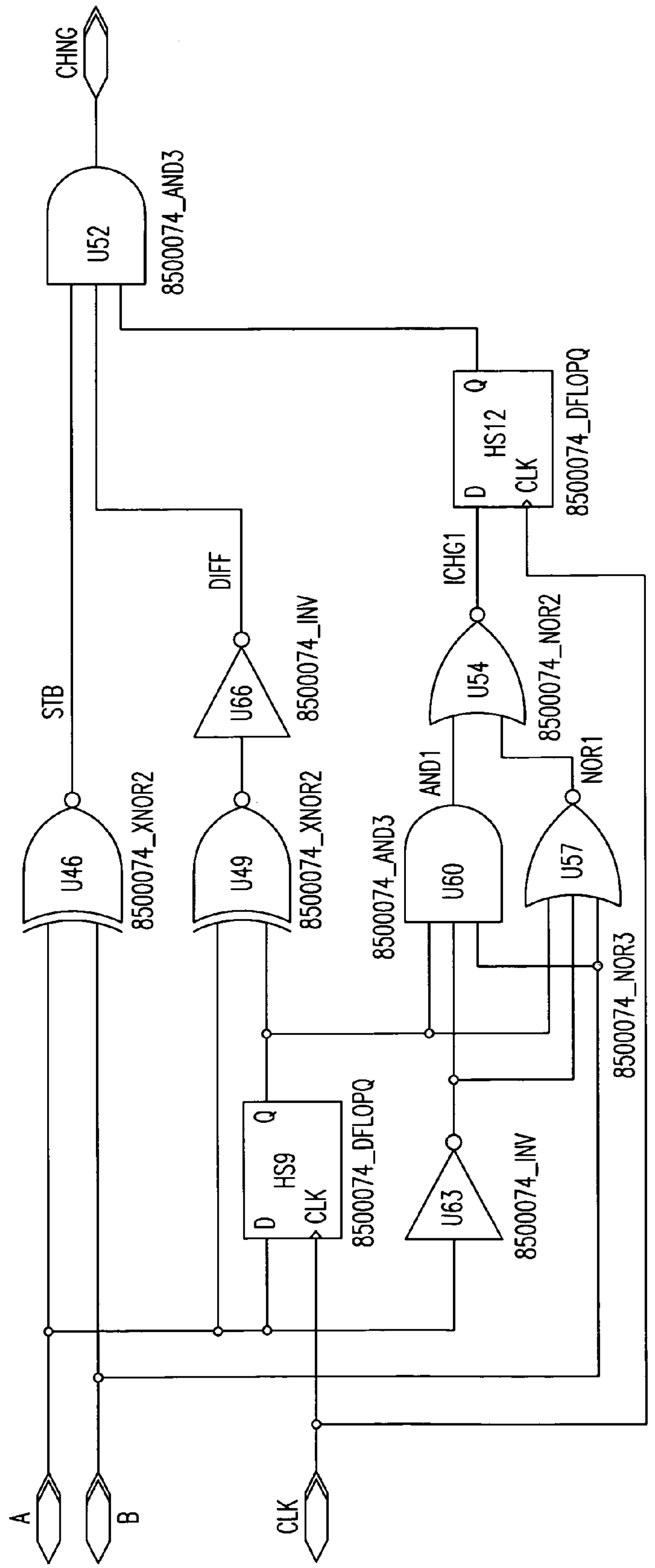
Figure 160A:
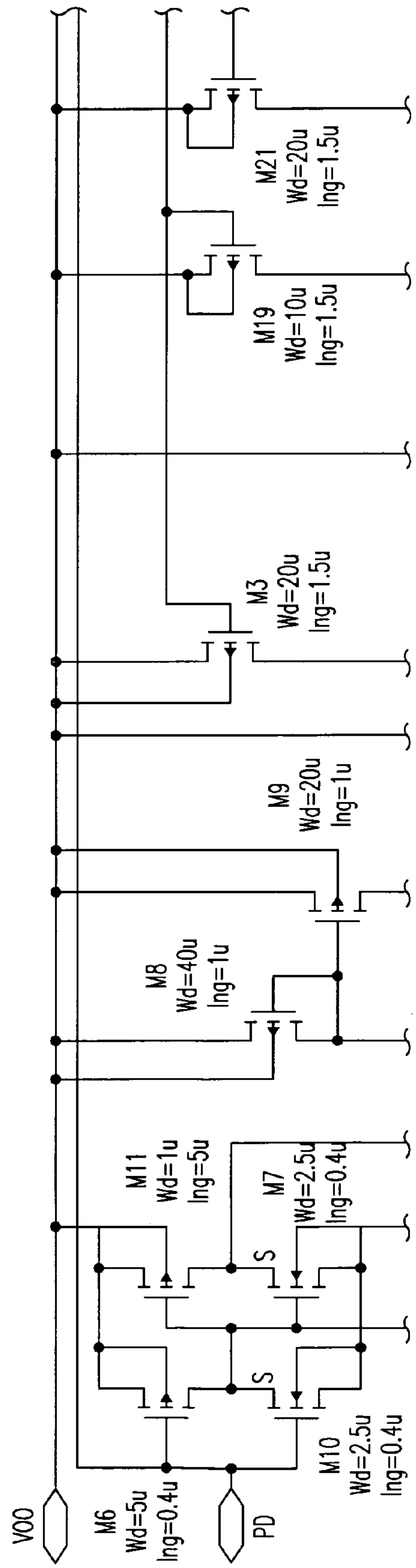
Figure 160B:
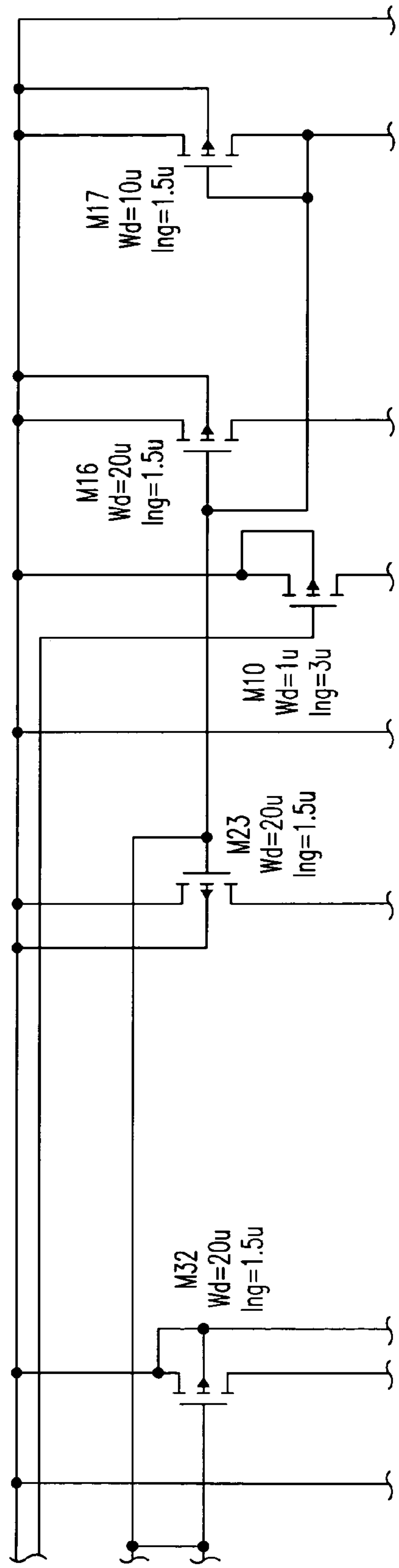
Figure 160C:
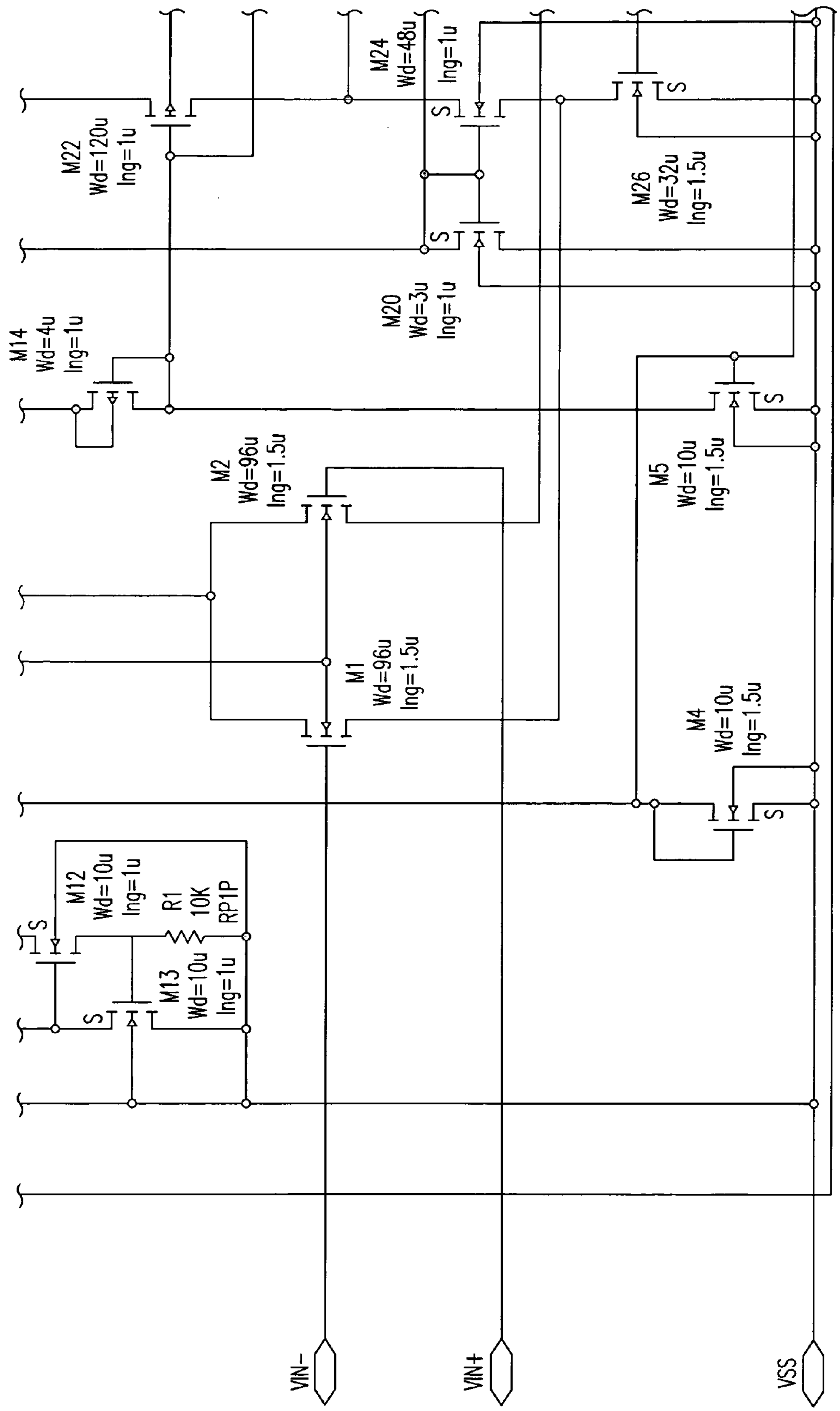
Figure 160D:
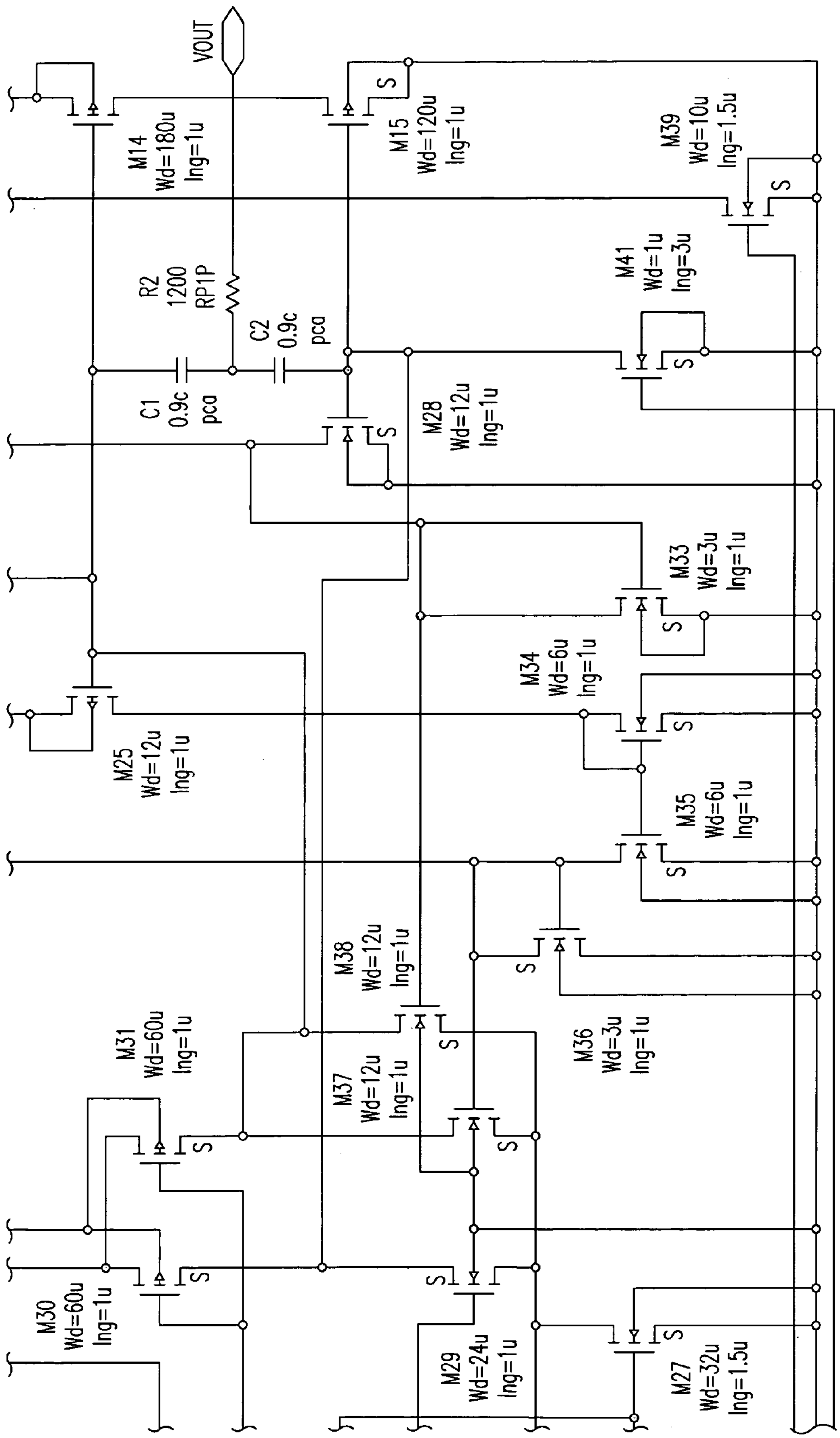
Figure 161A:
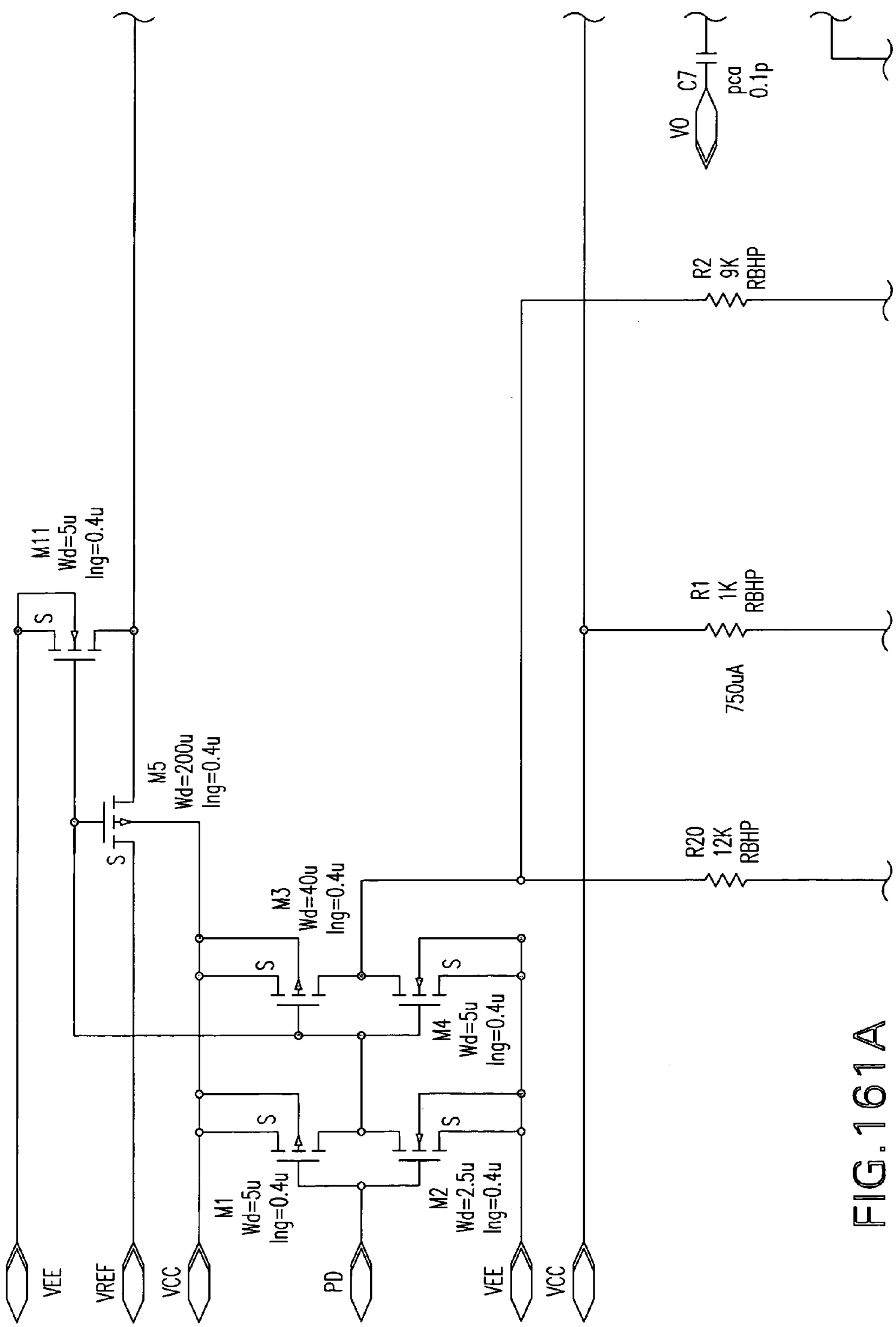
Figure 161B:
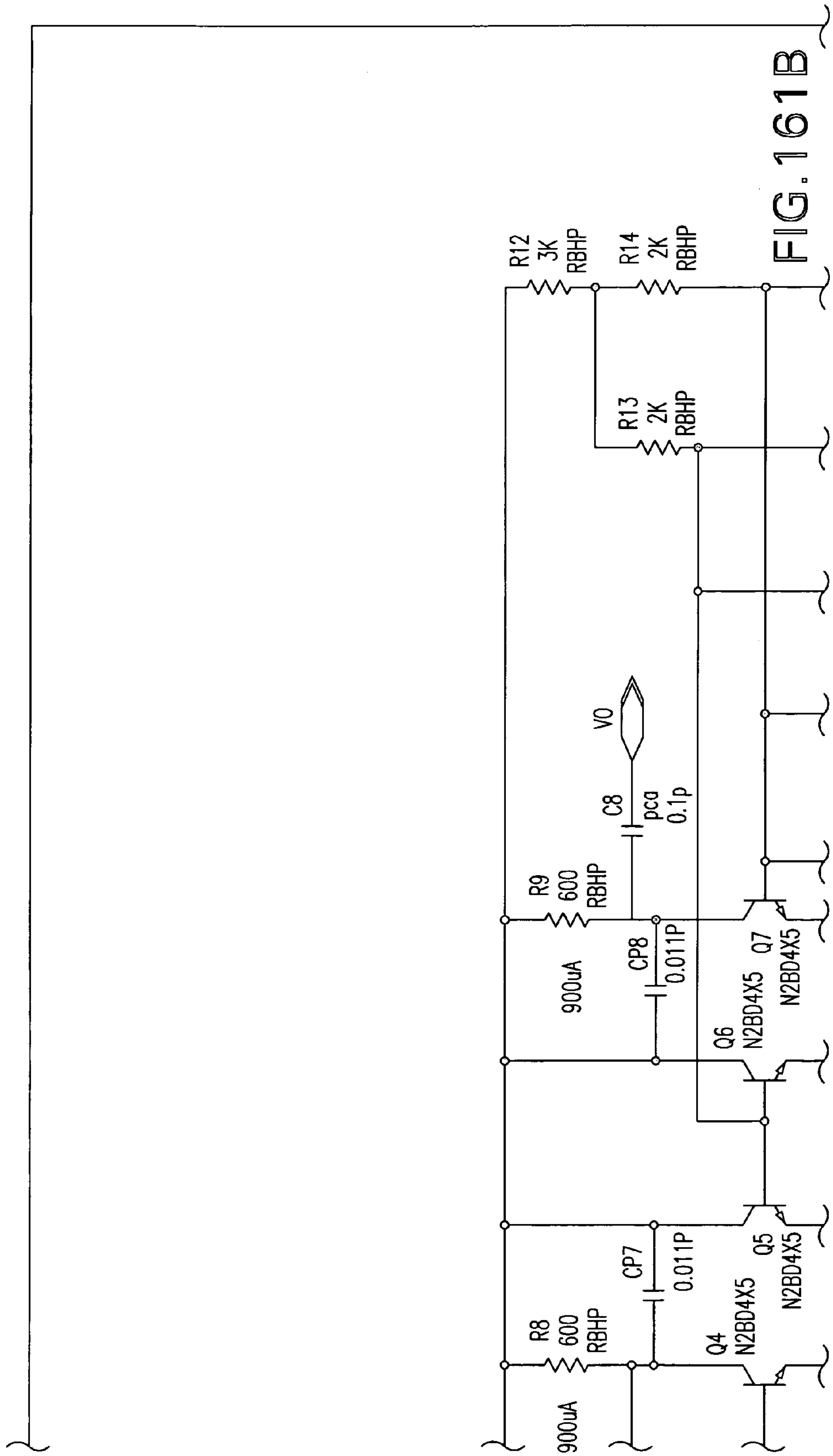
Figure 161C:
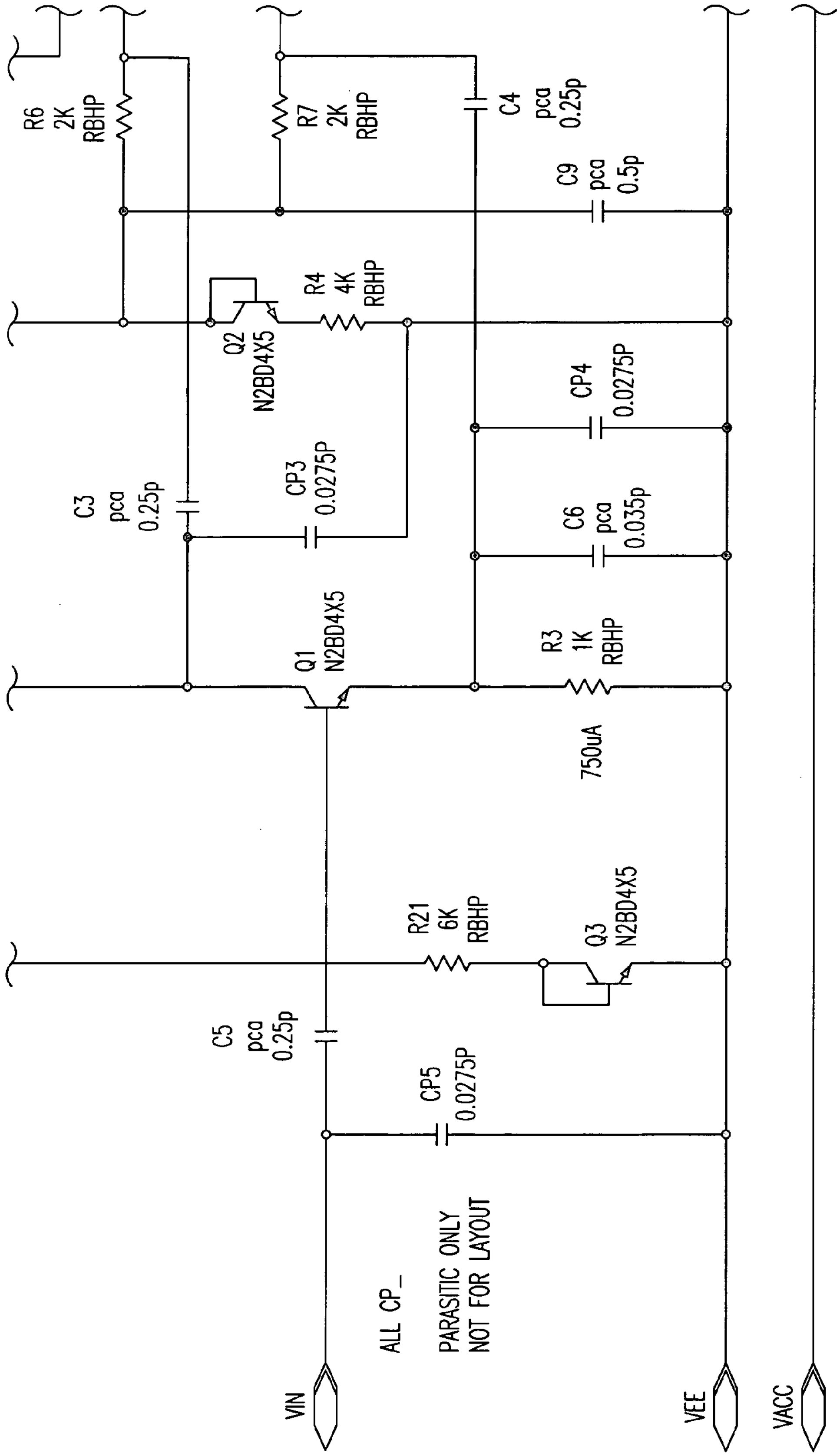
Figure 161D:
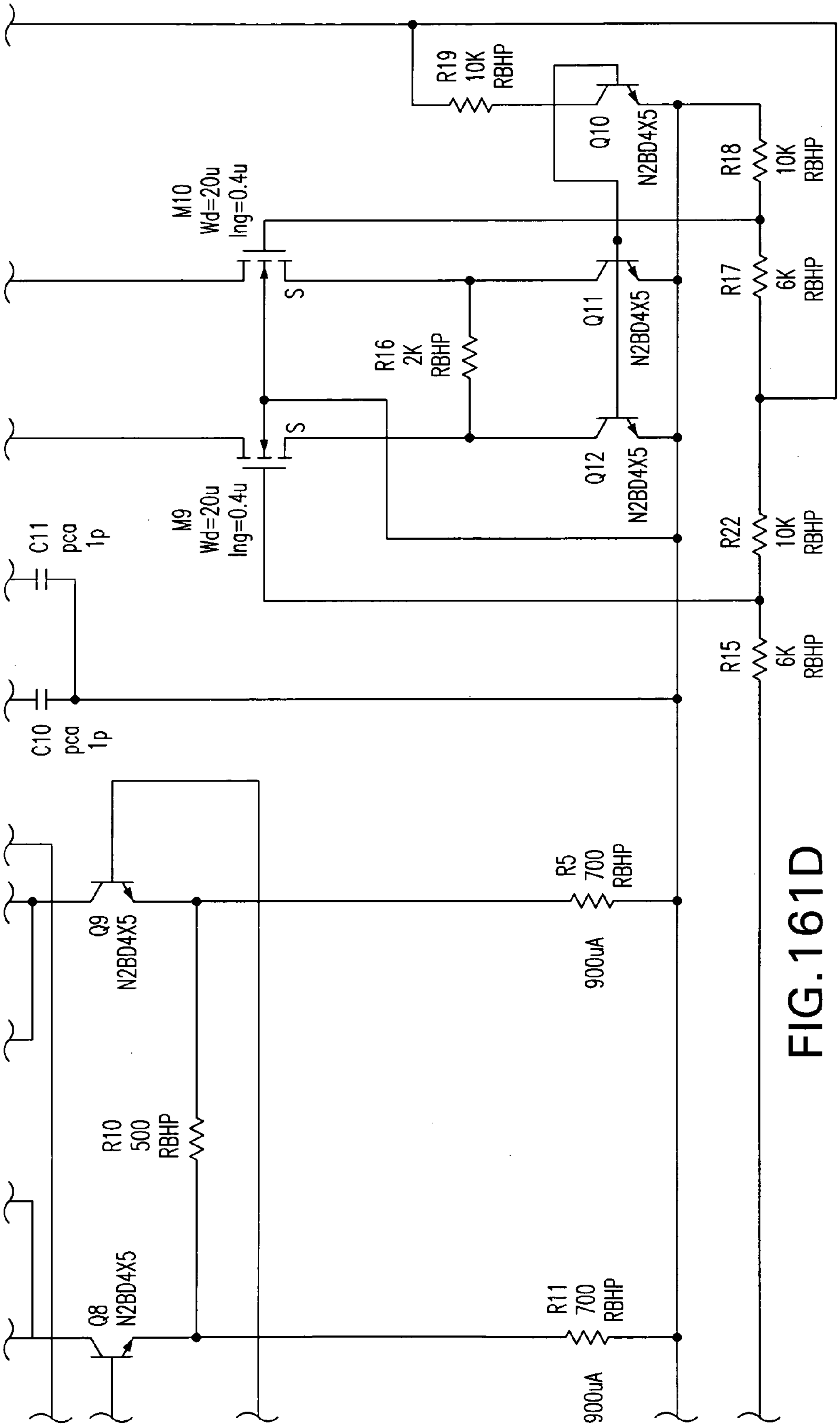
Figure 162:
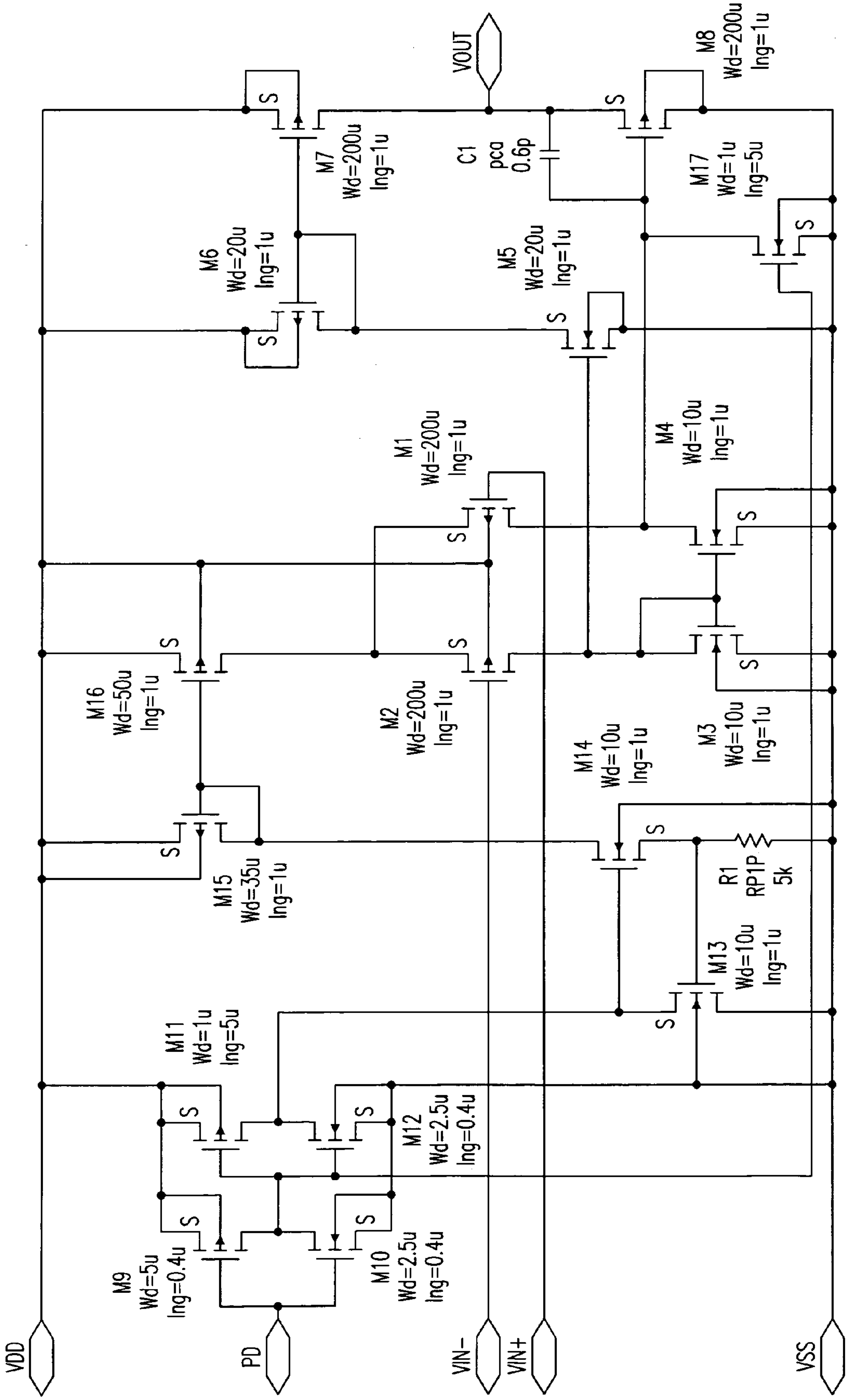
Figure 163A:
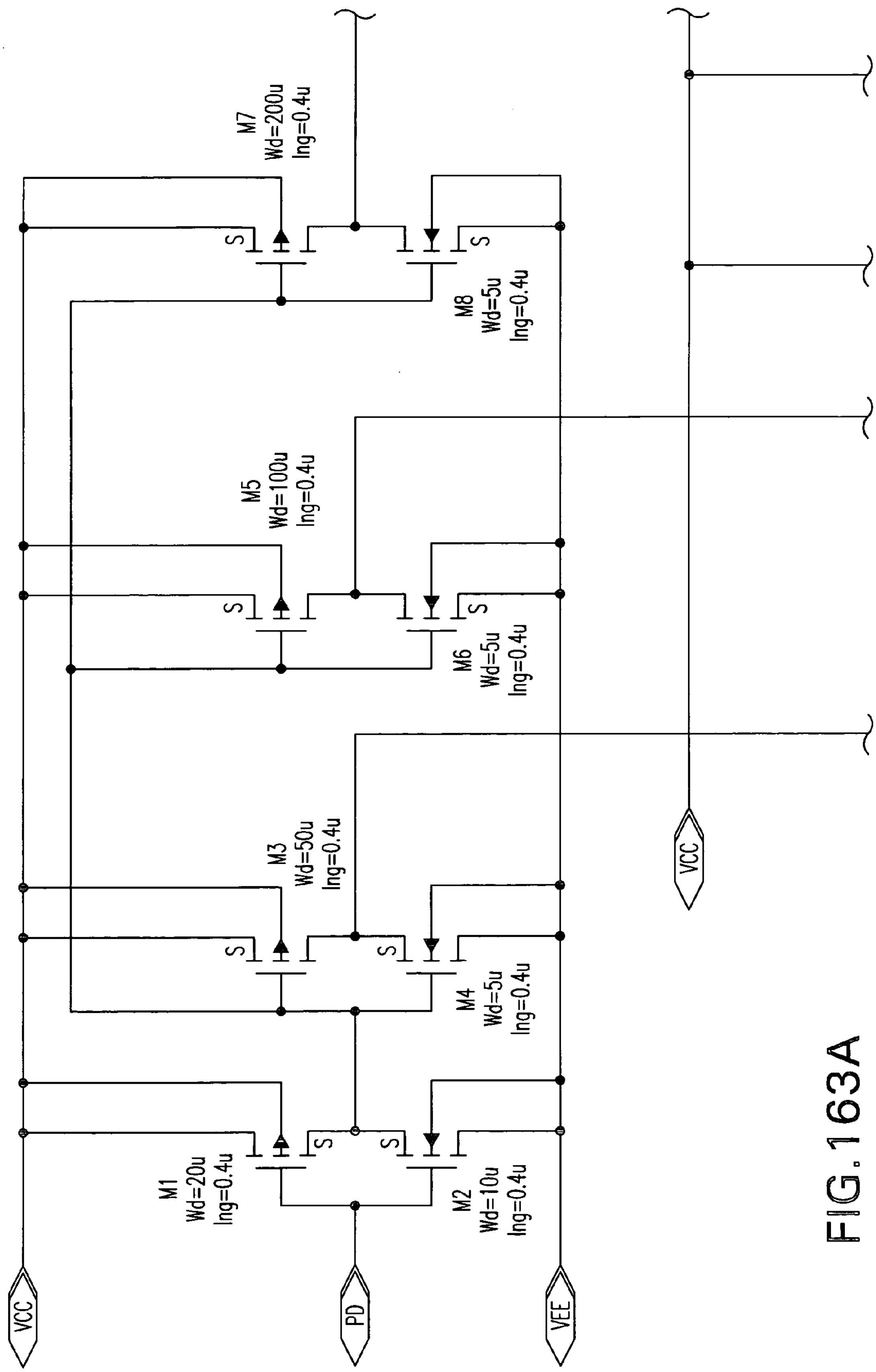
Figure 163B:
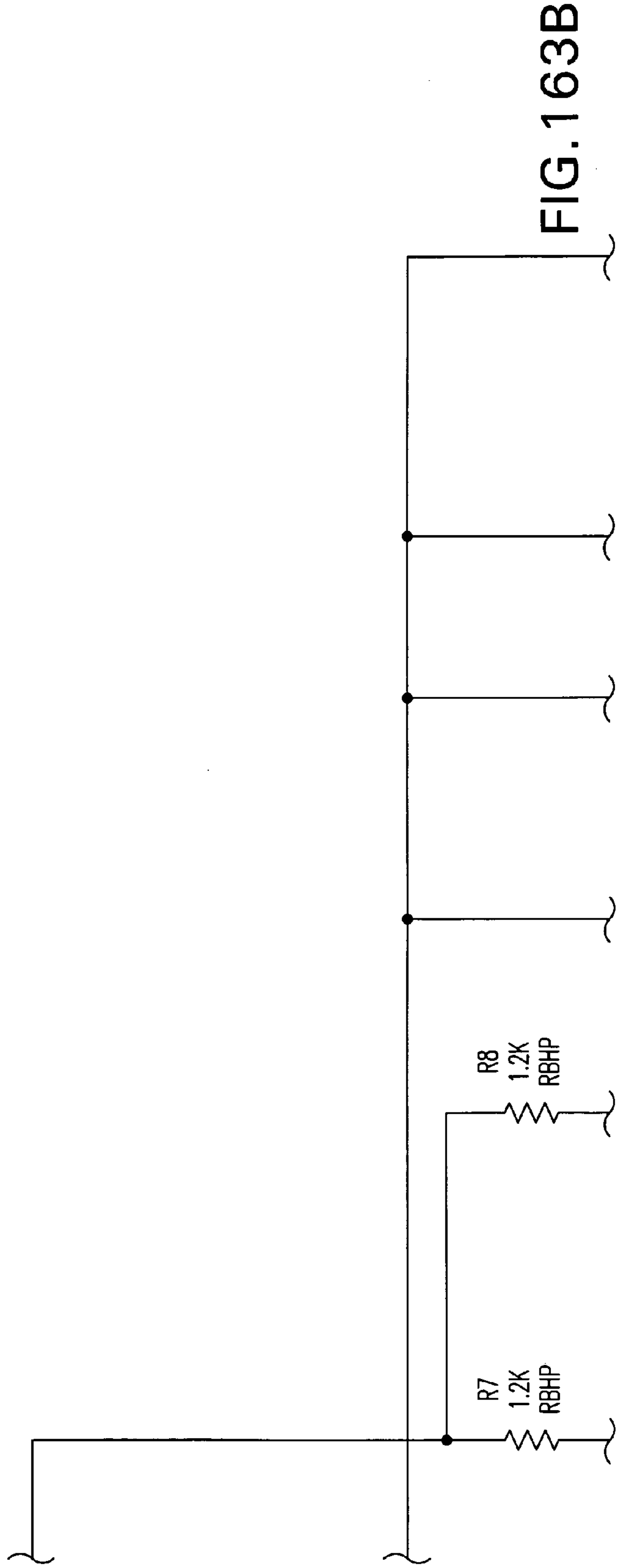
Figure 163C:
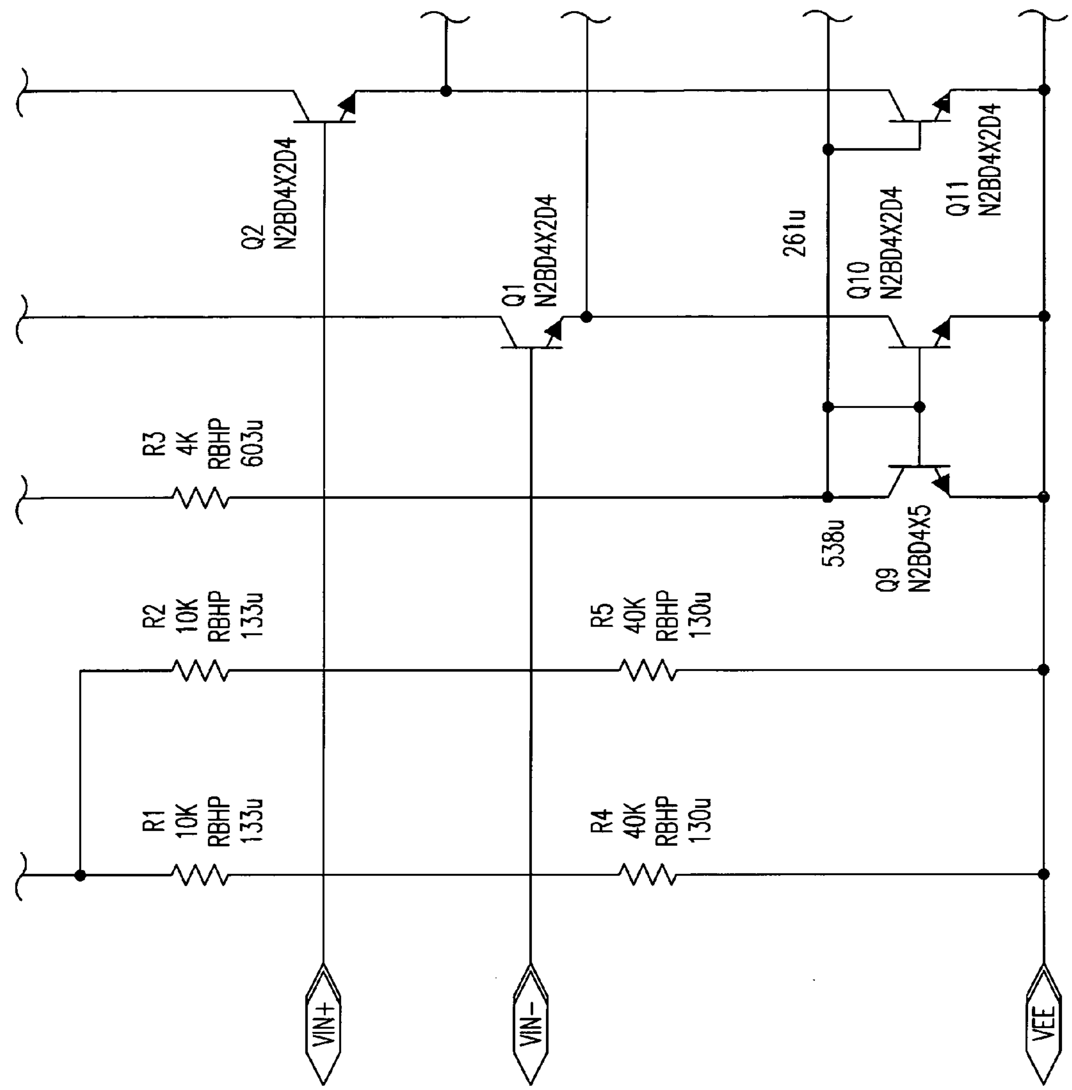
Figure 163D:
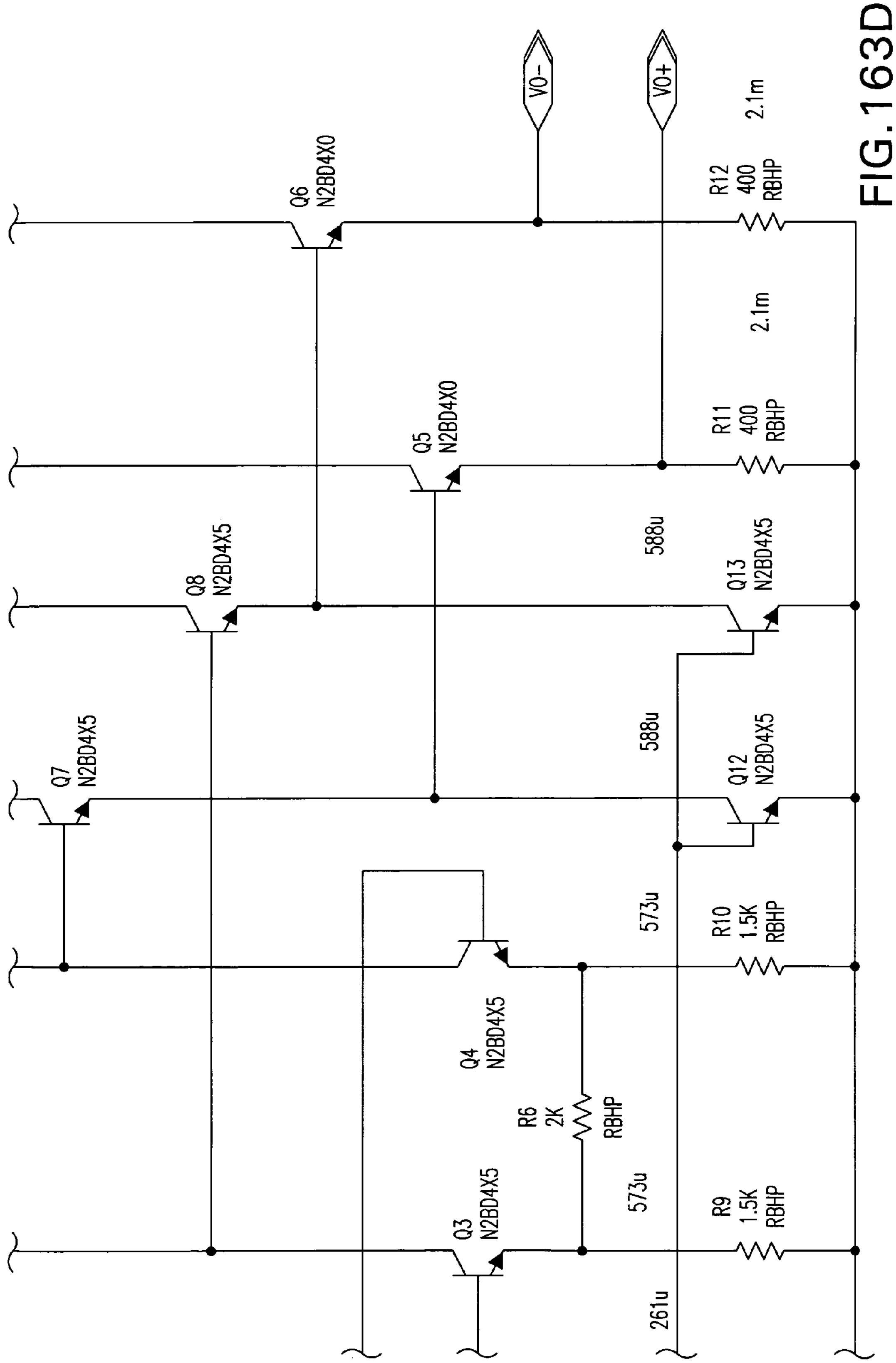
Figure 164A:
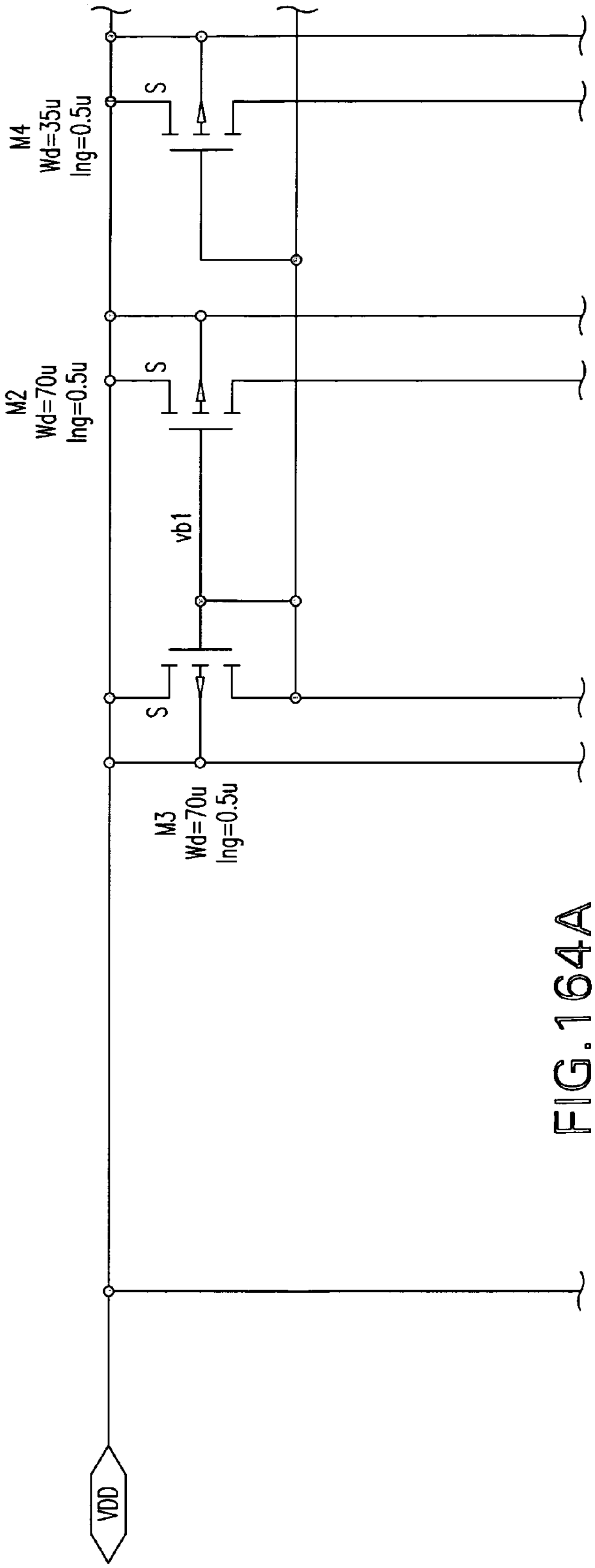
Figure 164B:
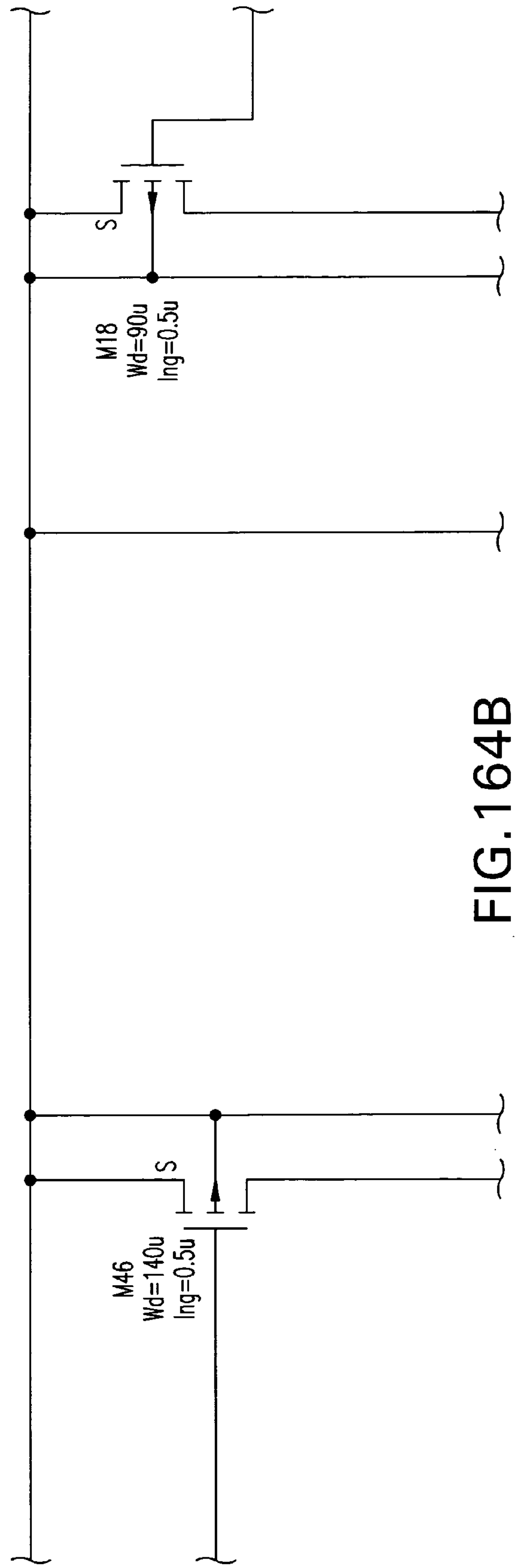
Figure 164C:
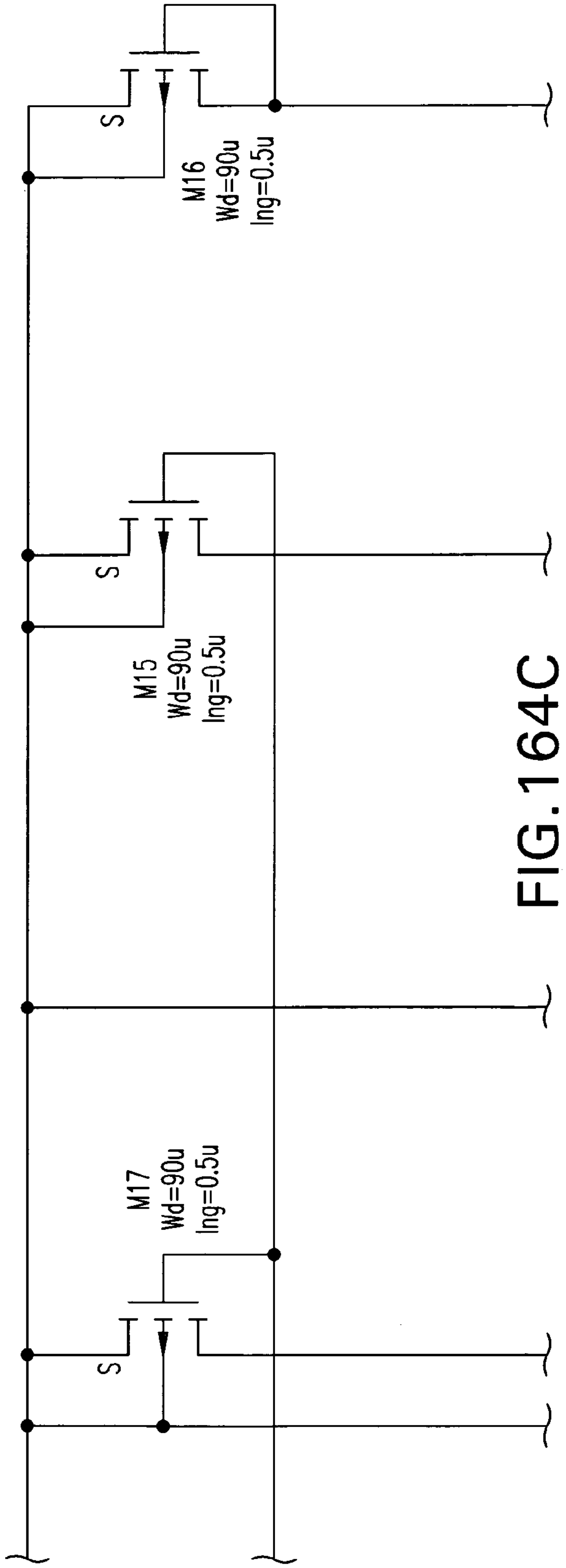
Figure 164D:
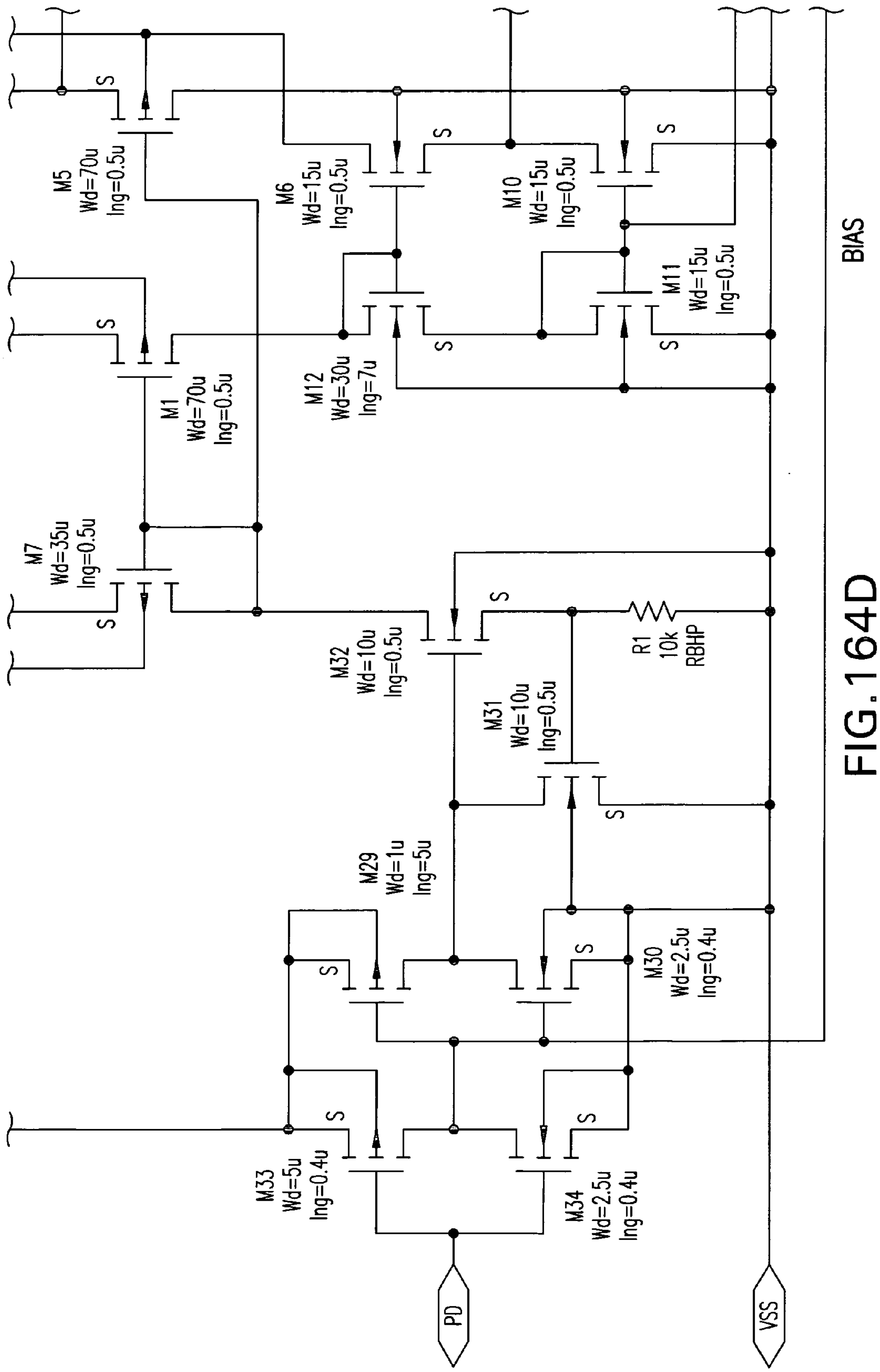
Figure 164E:
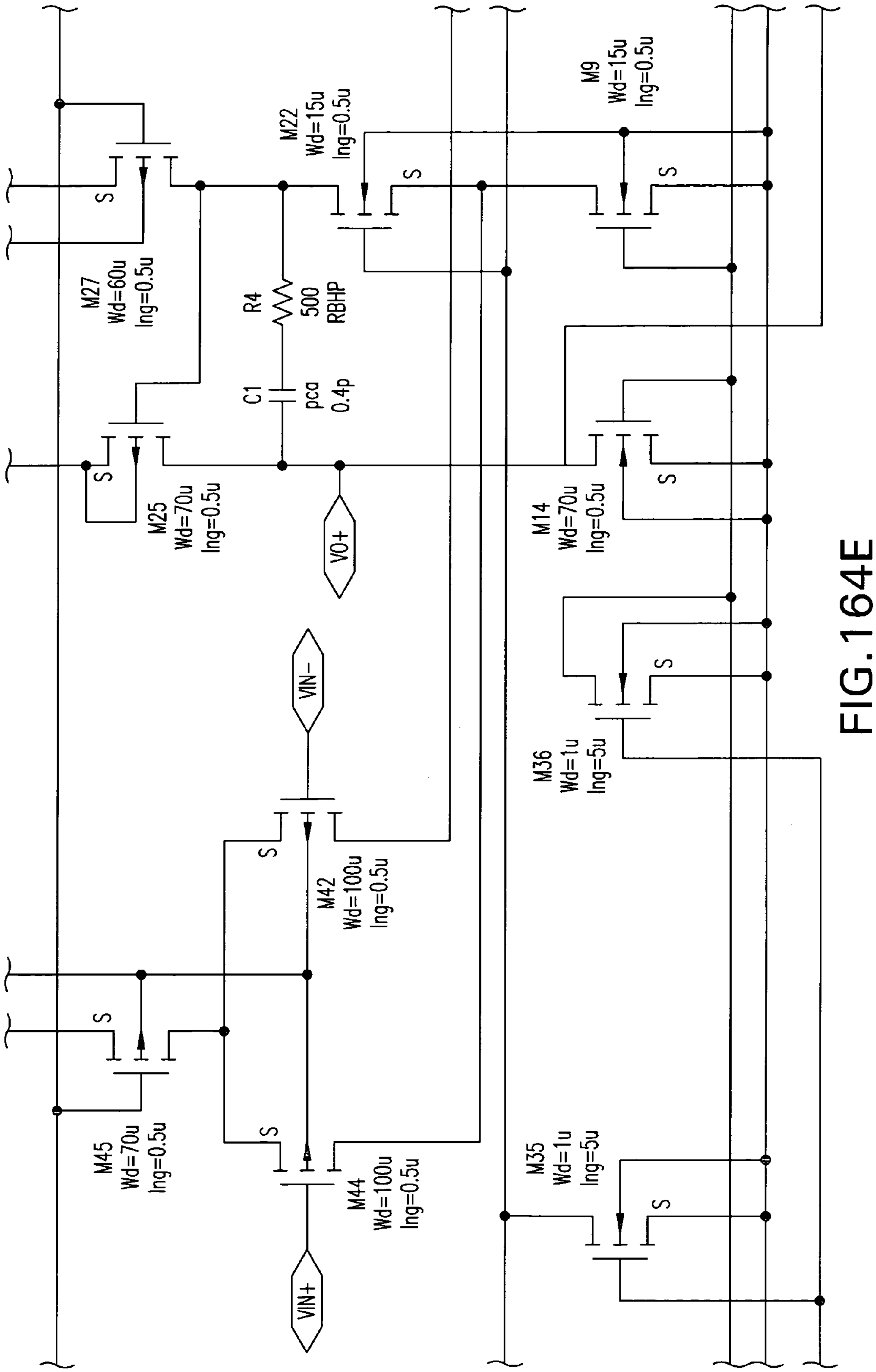
Figure 164F:
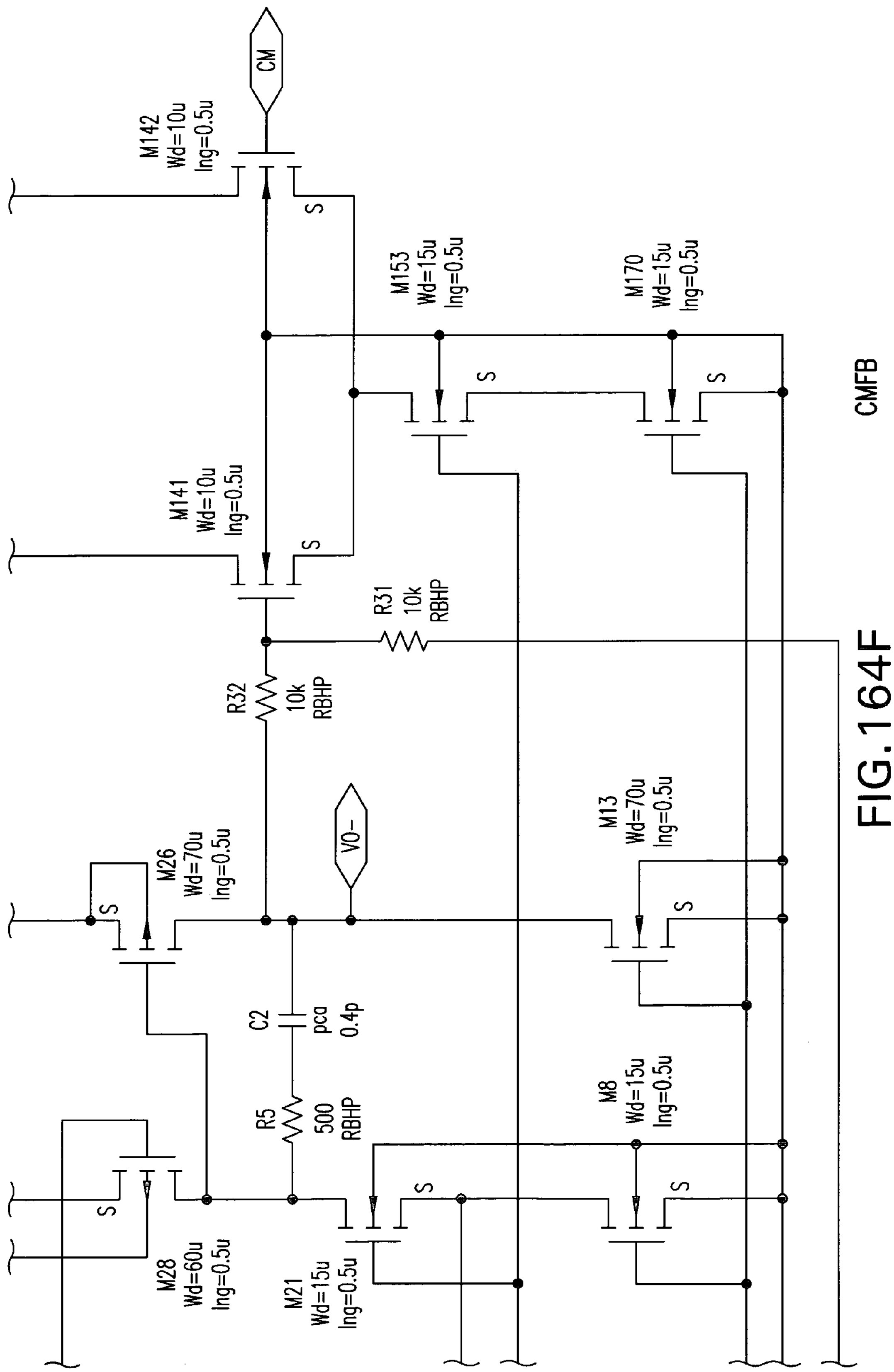
Figure 165:
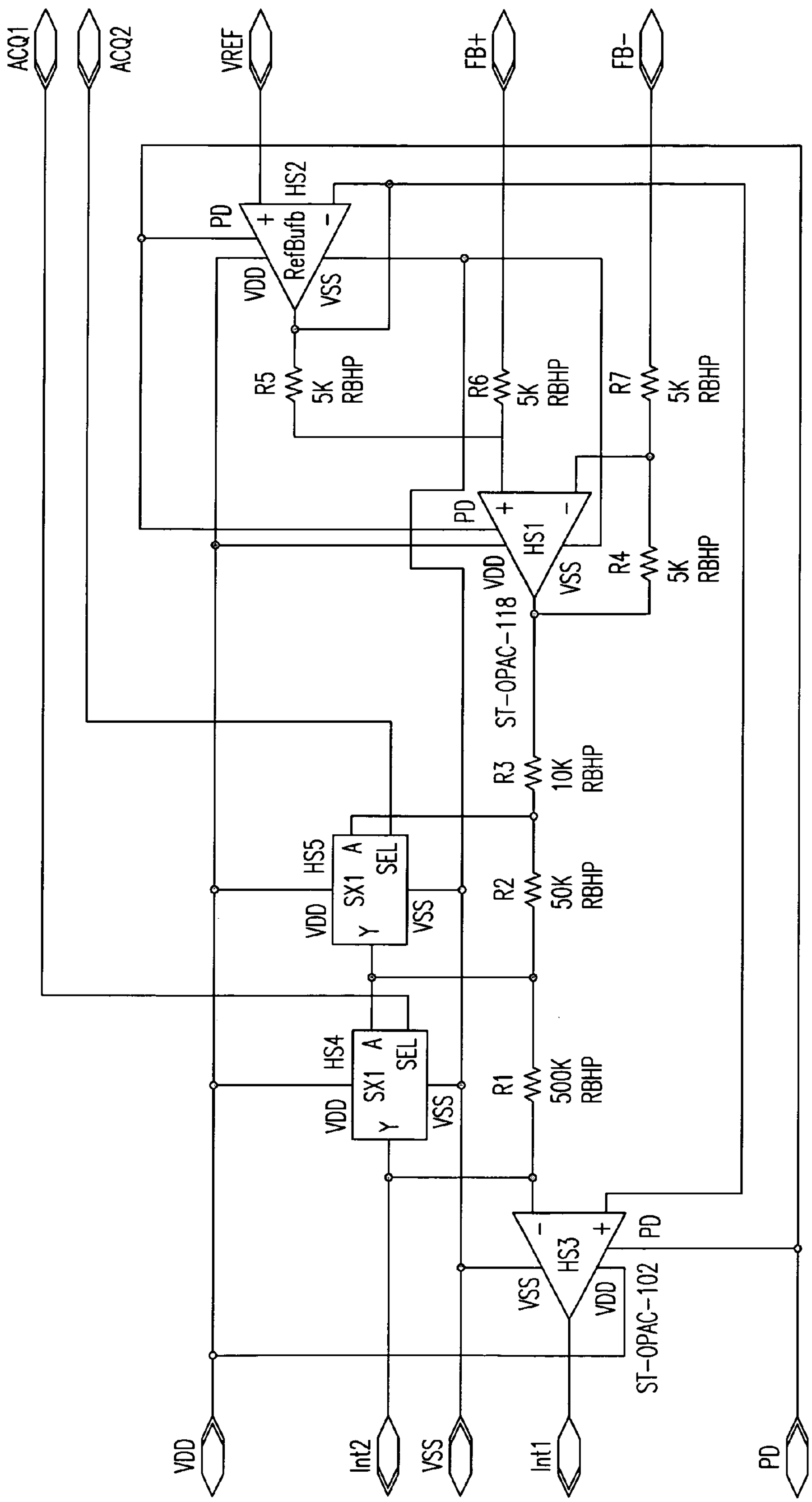
Figure 166A:
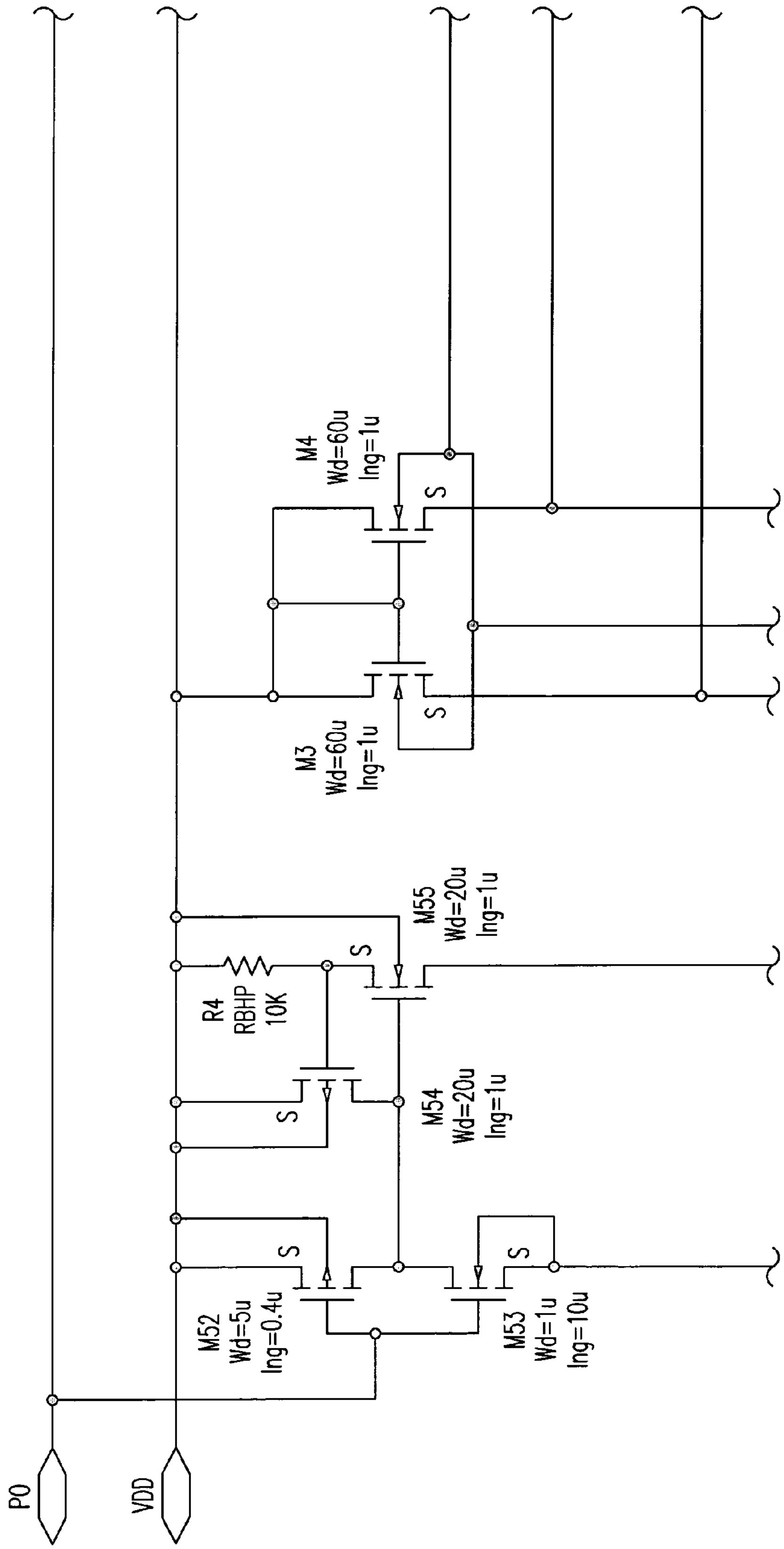
Figure 166B:
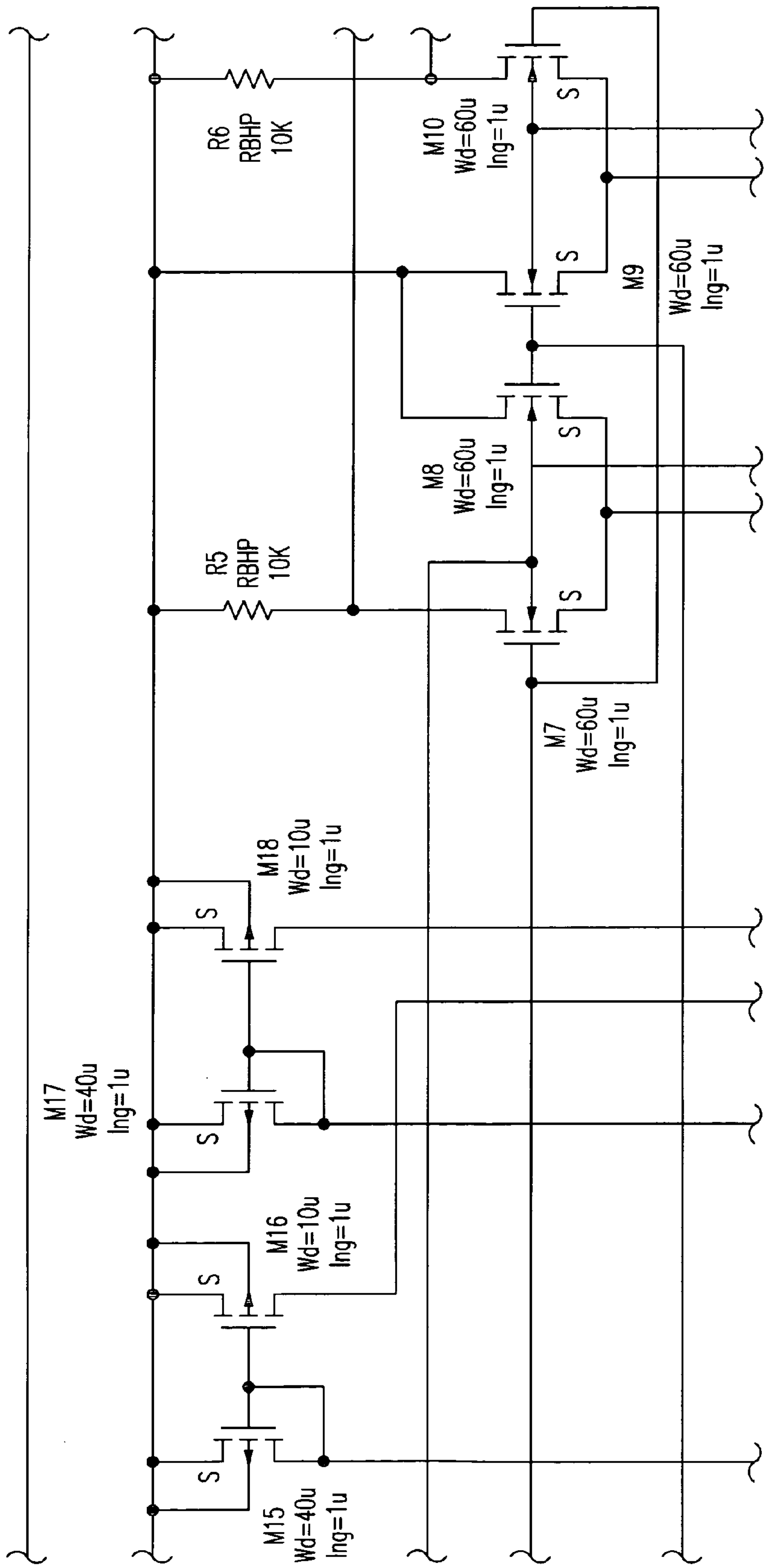
Figure 166C:
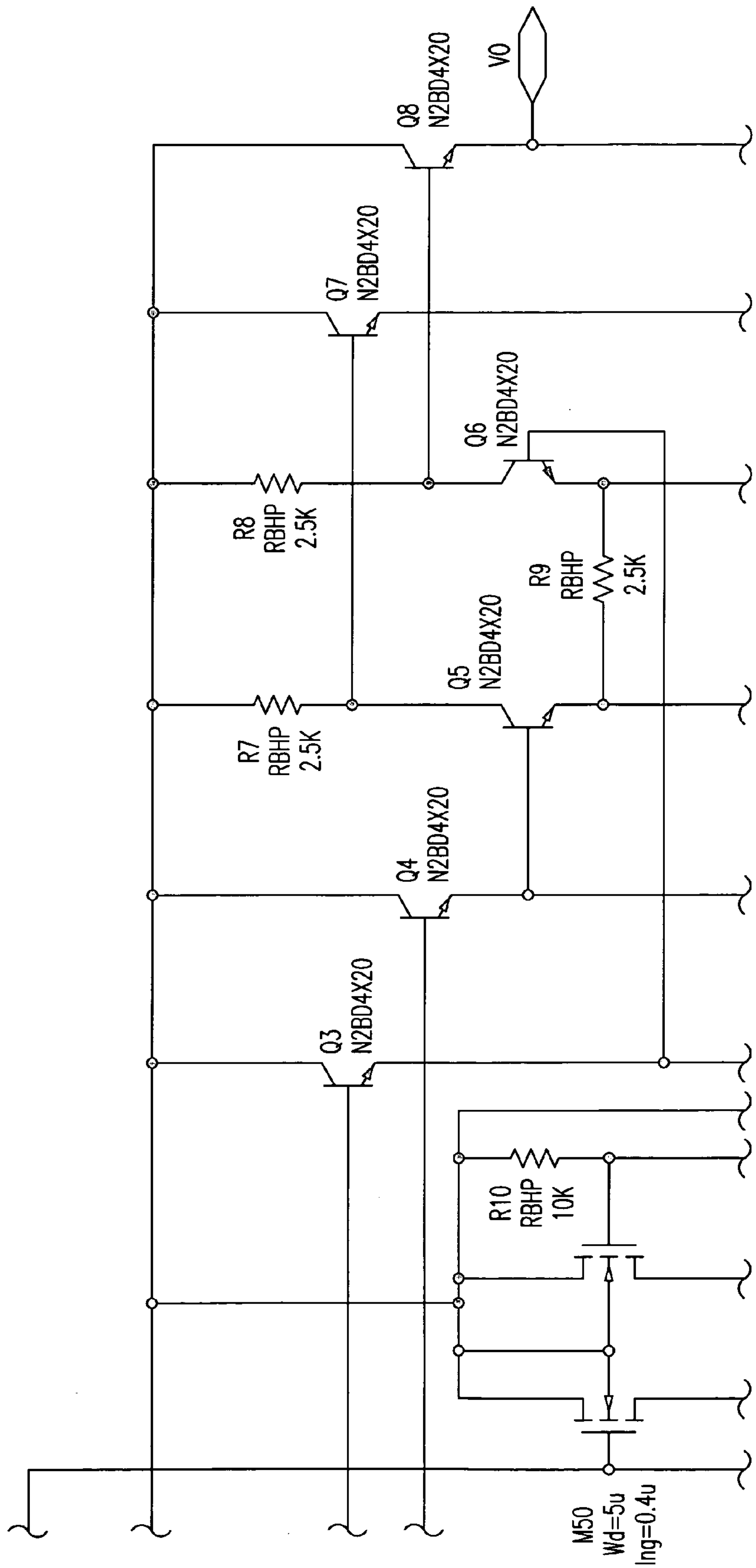
Figure 166D:
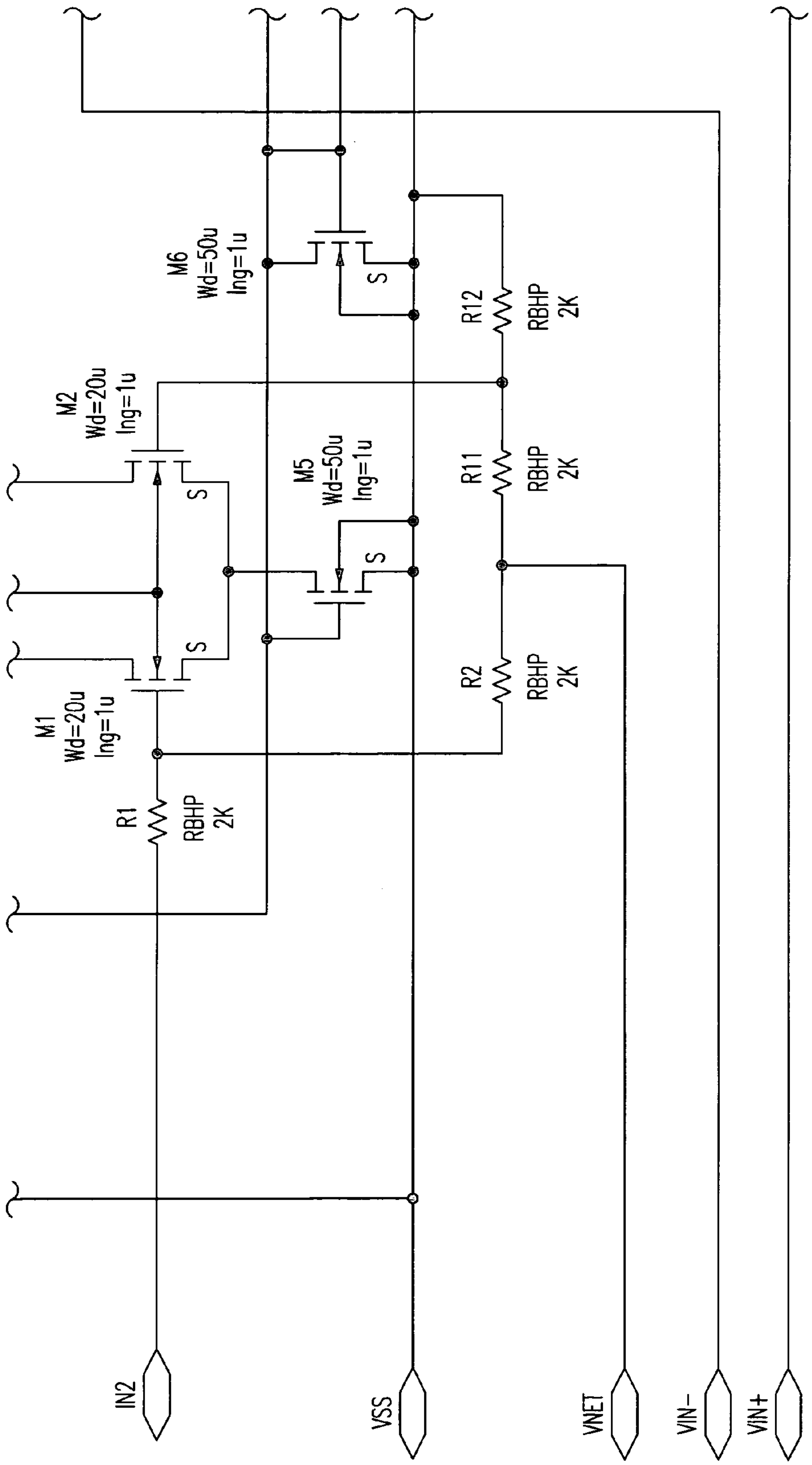
Figure 166E:
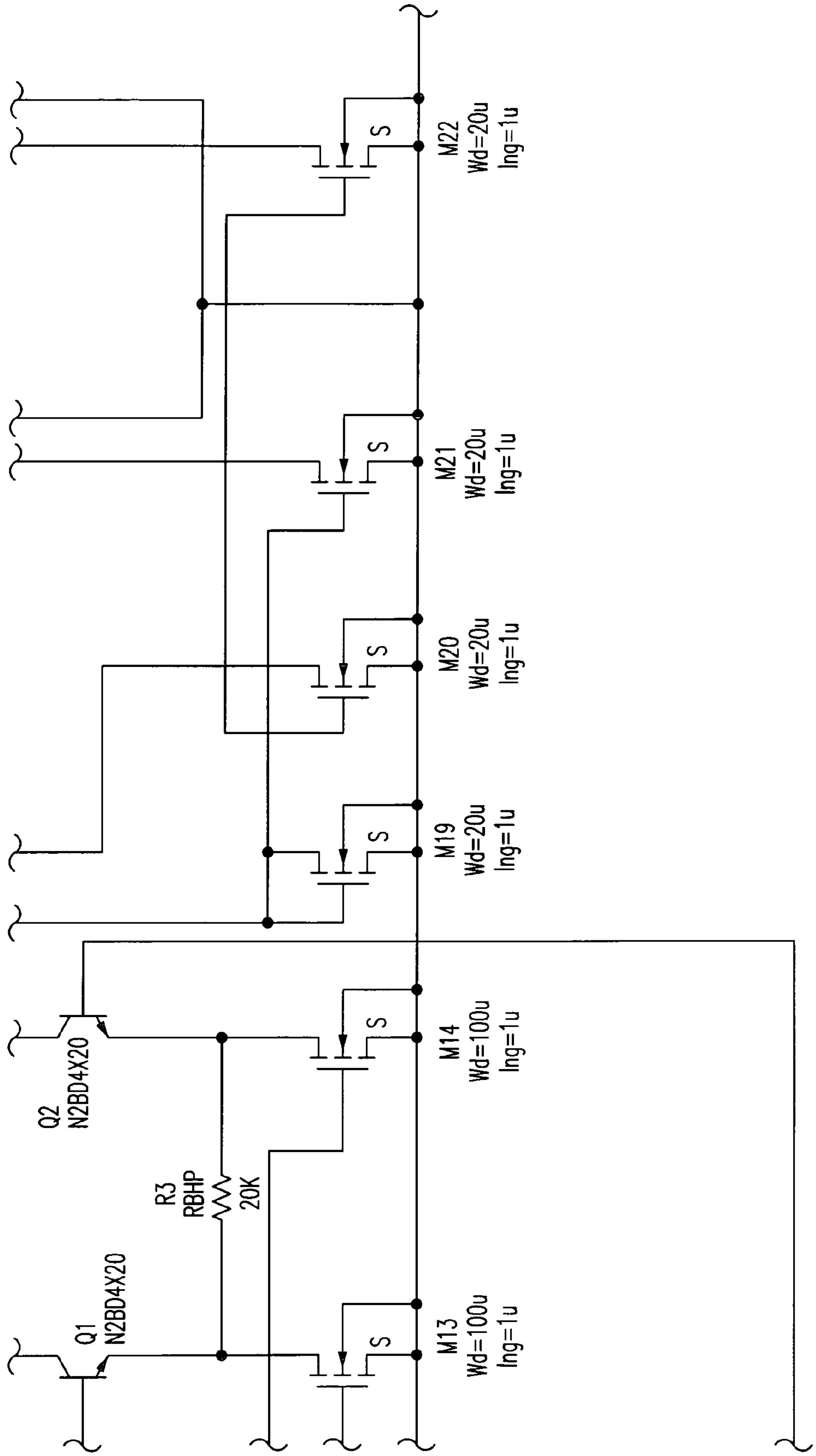
Figure 166F:
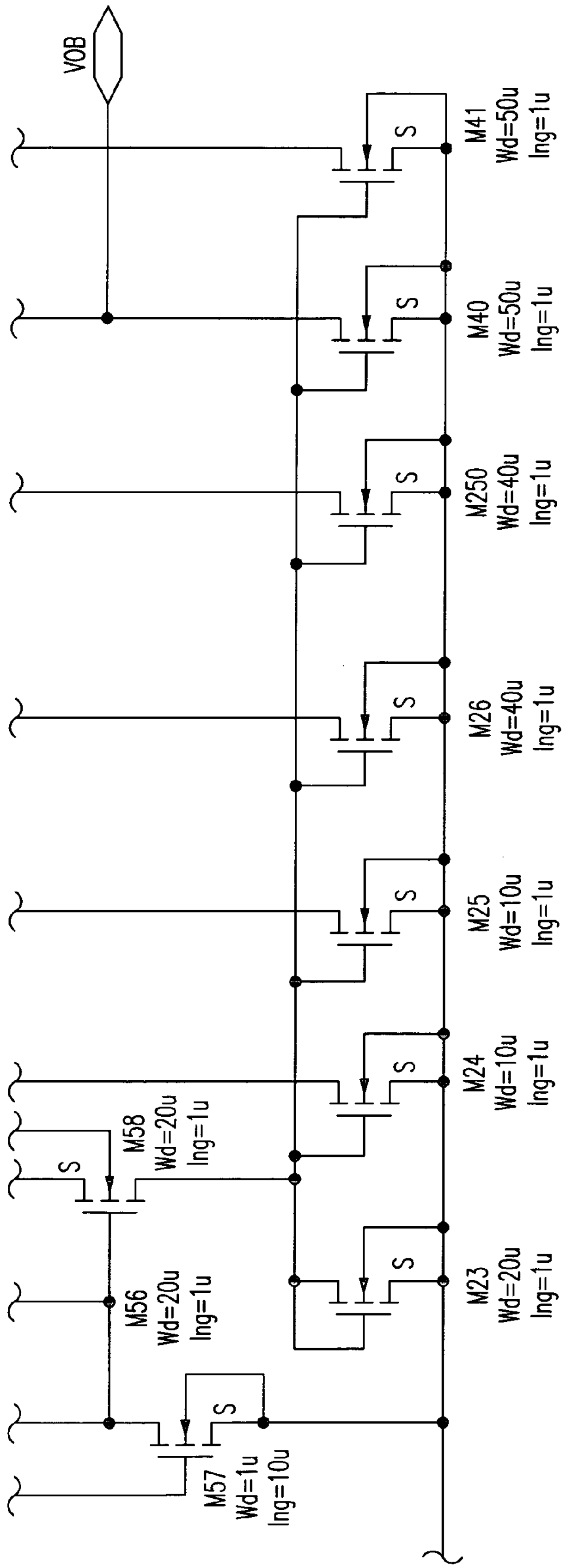
Figure 167:
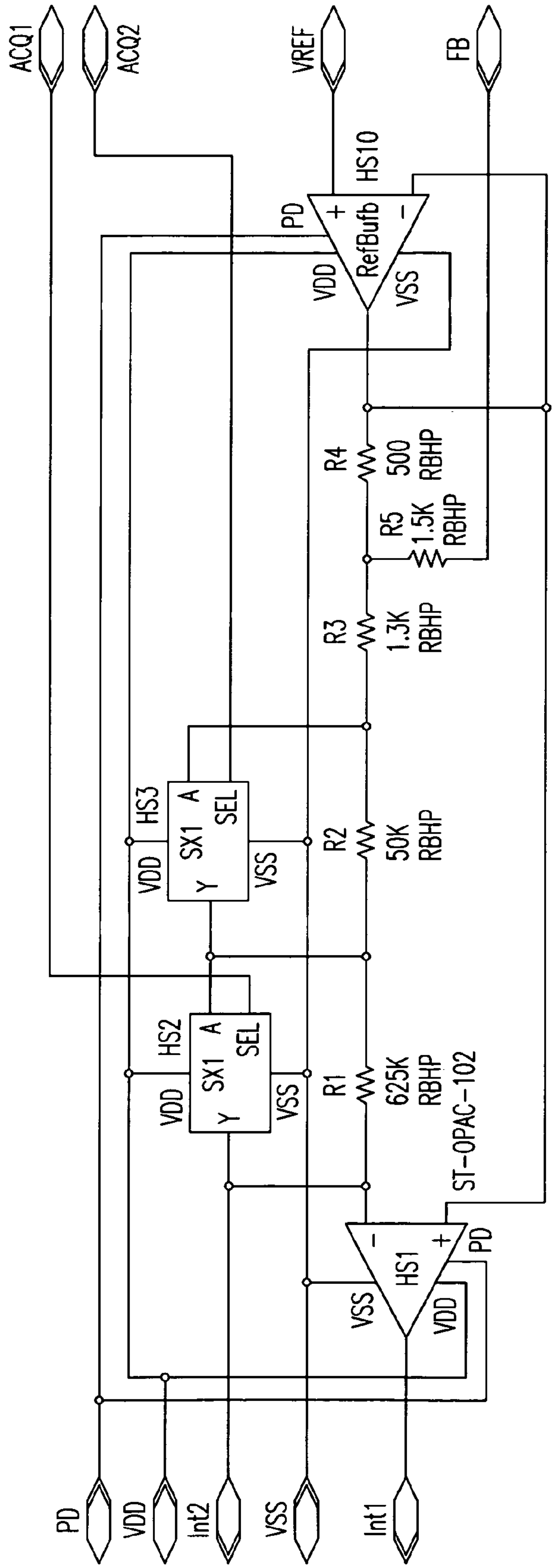
Figure 168:
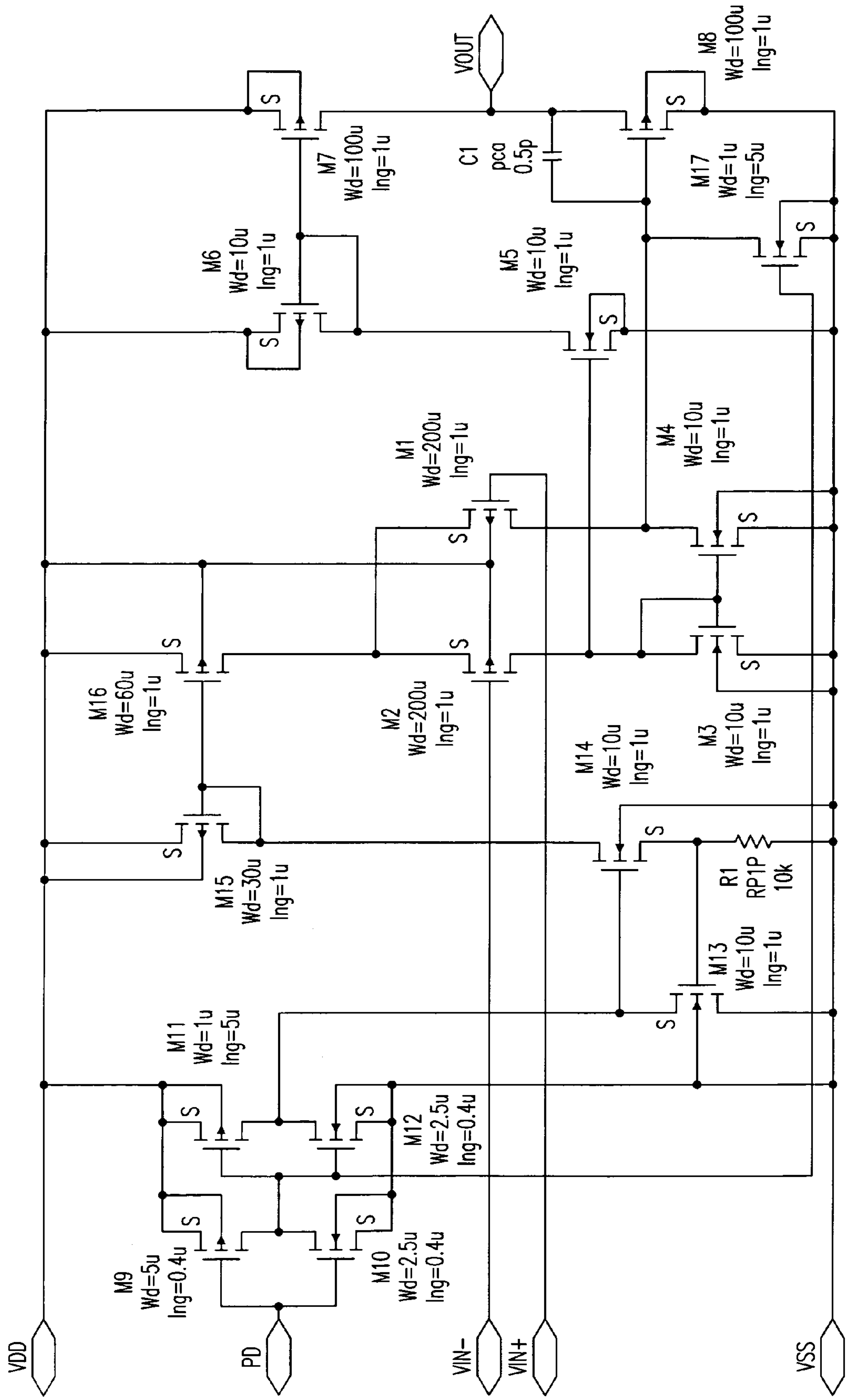
Figure 169A:
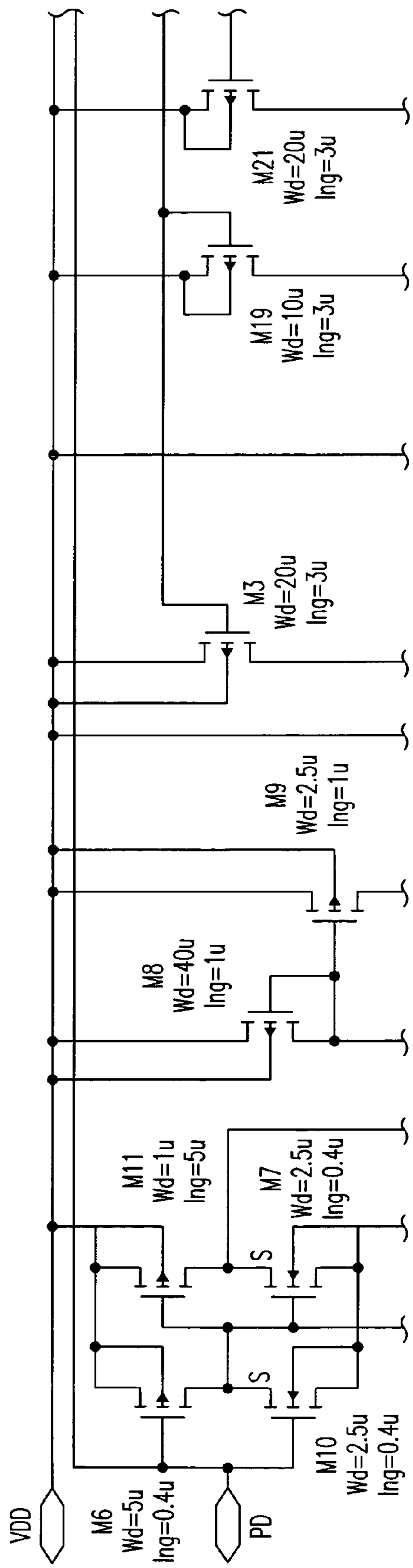
Figure 169B:
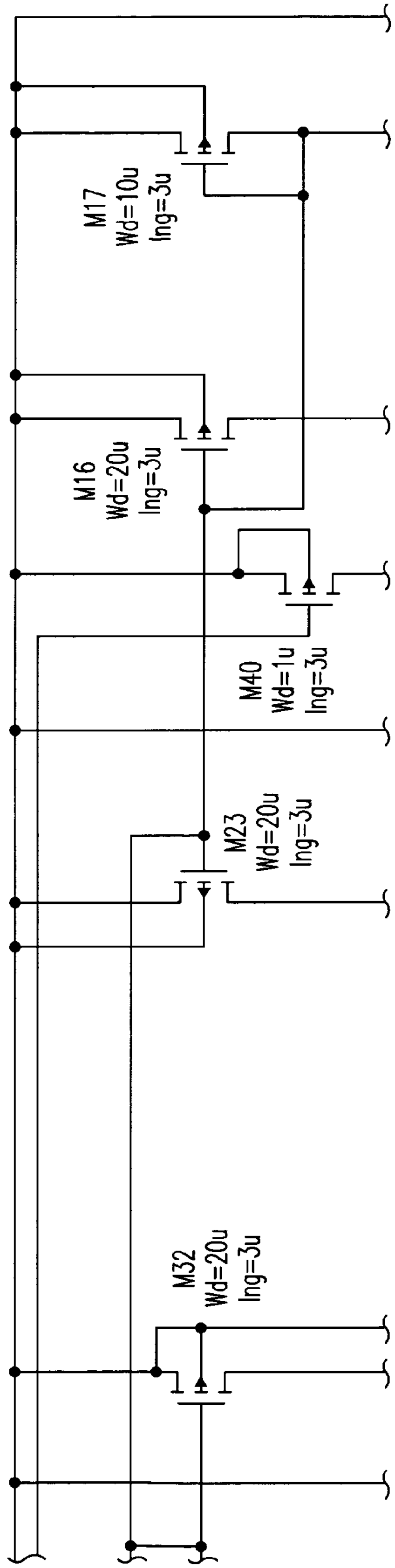
Figure 169C:
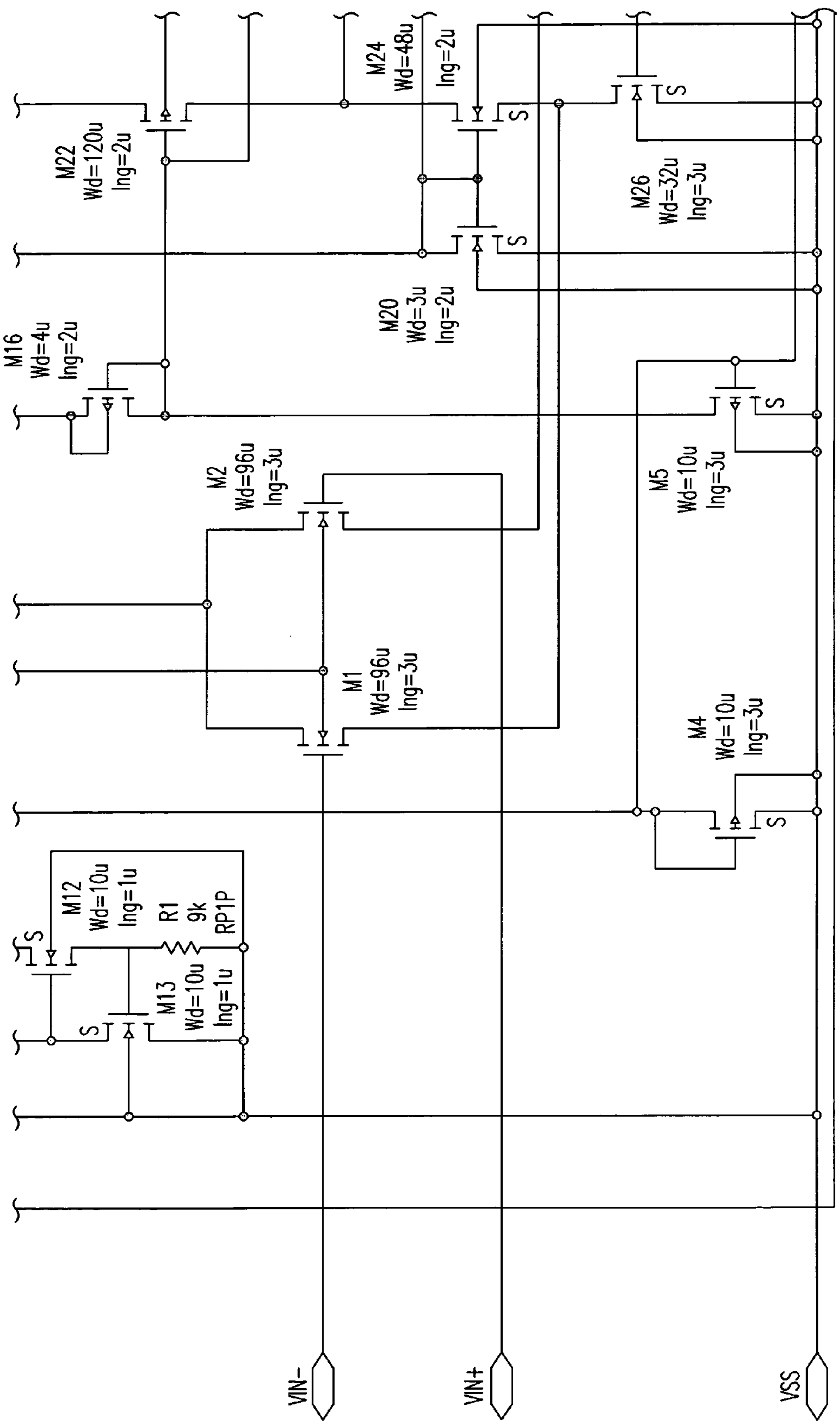
Figure 169D:
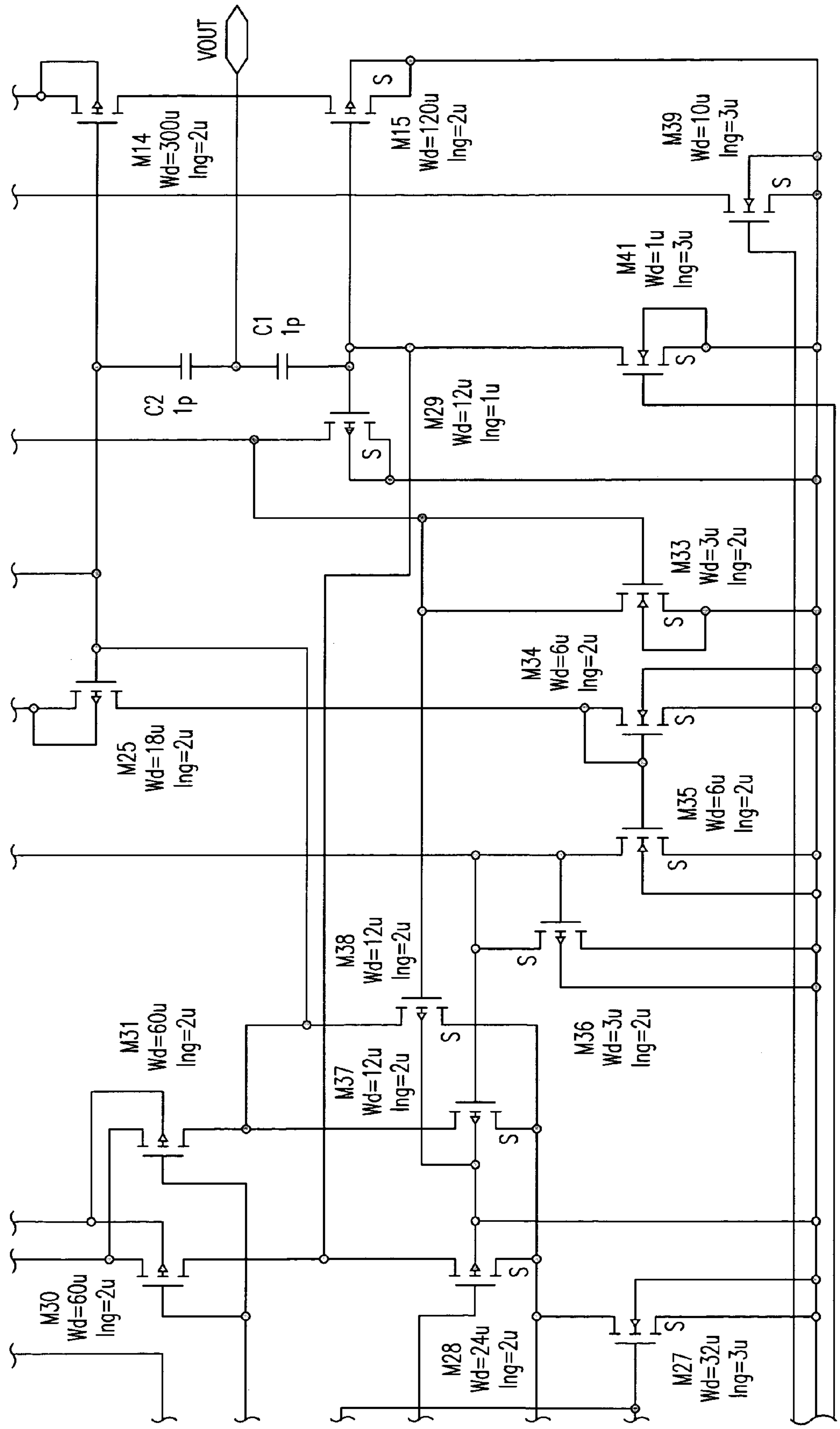
Figure 170:
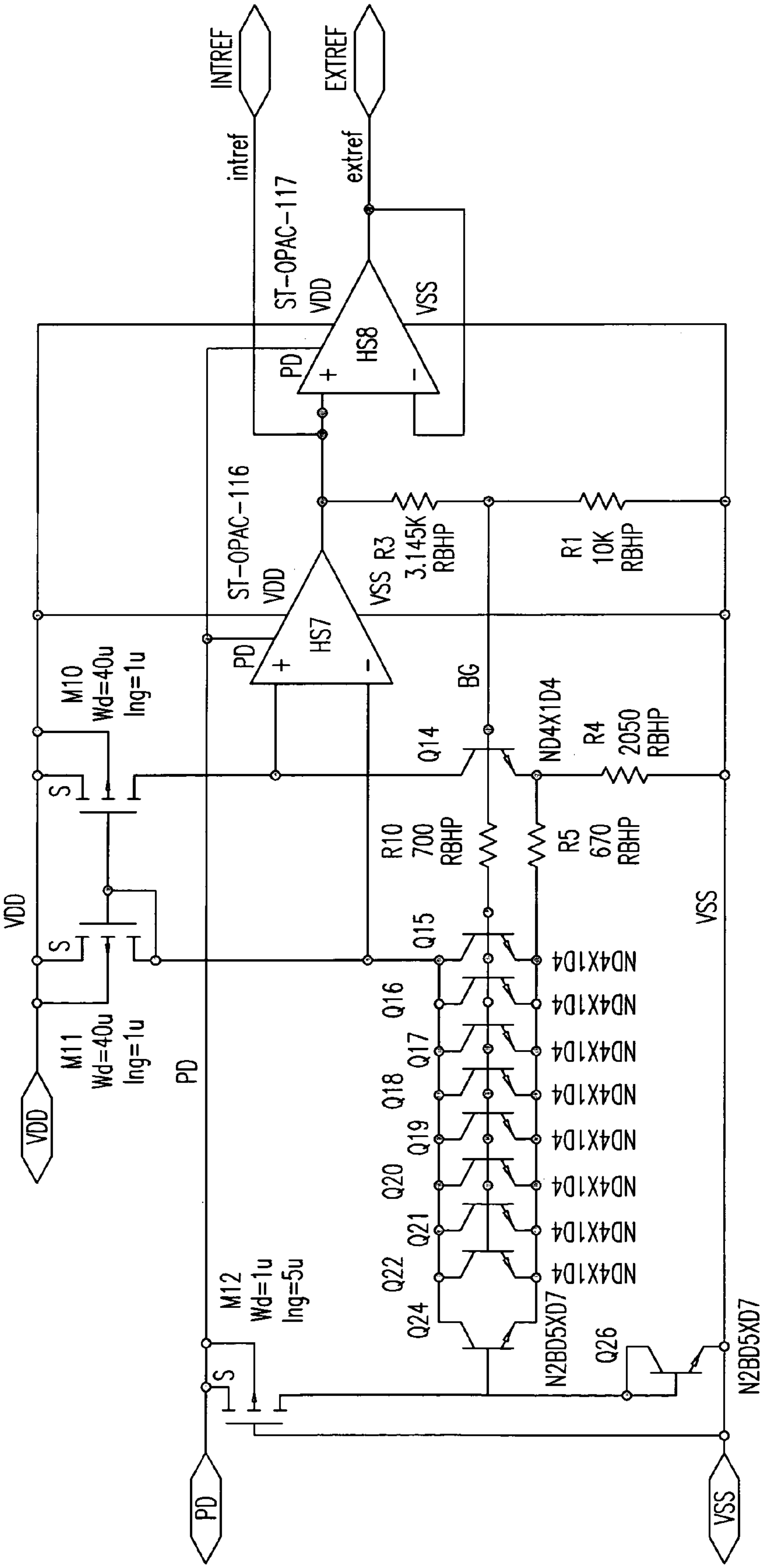
Figure 171:
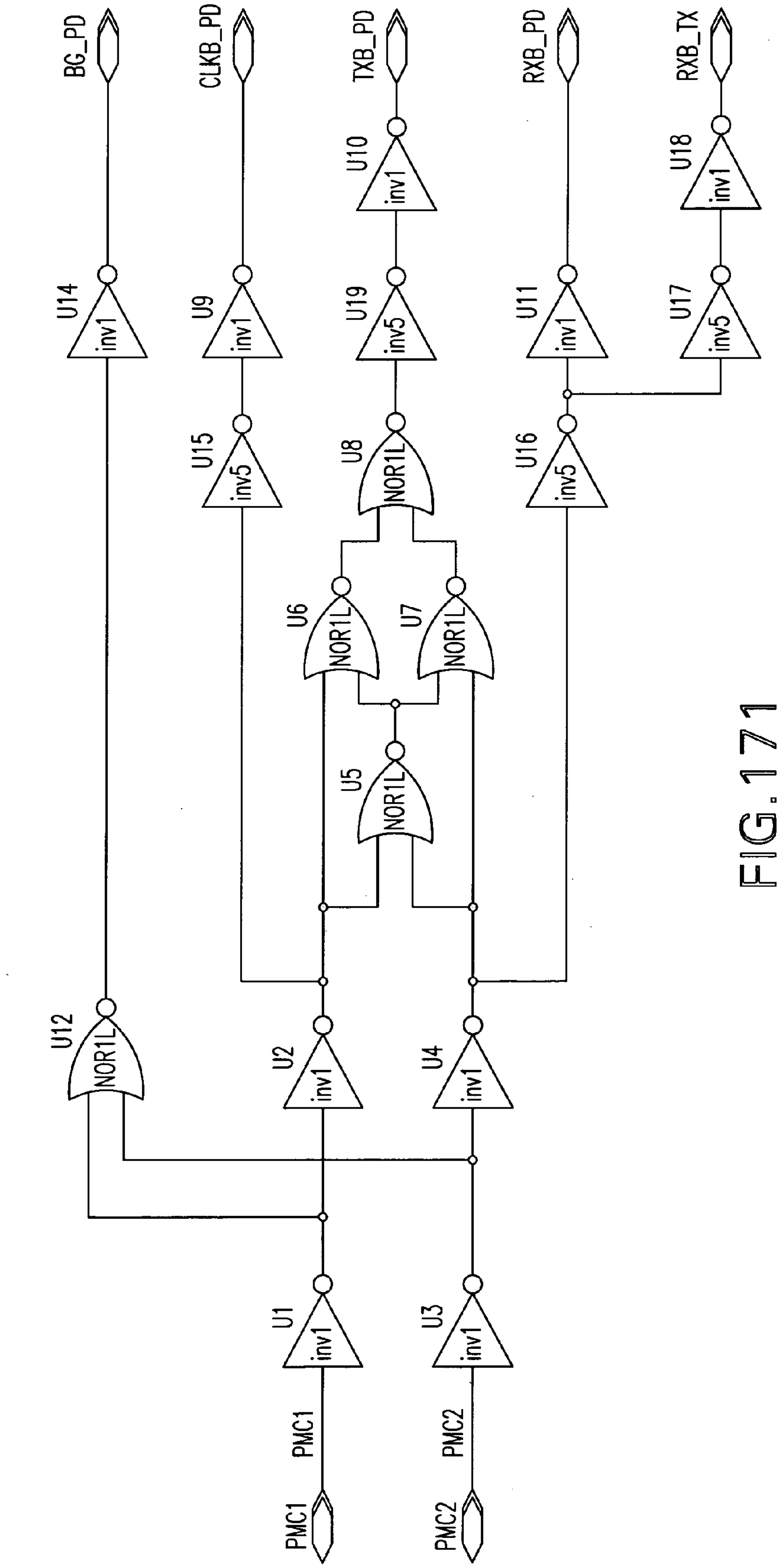
Figure 172:
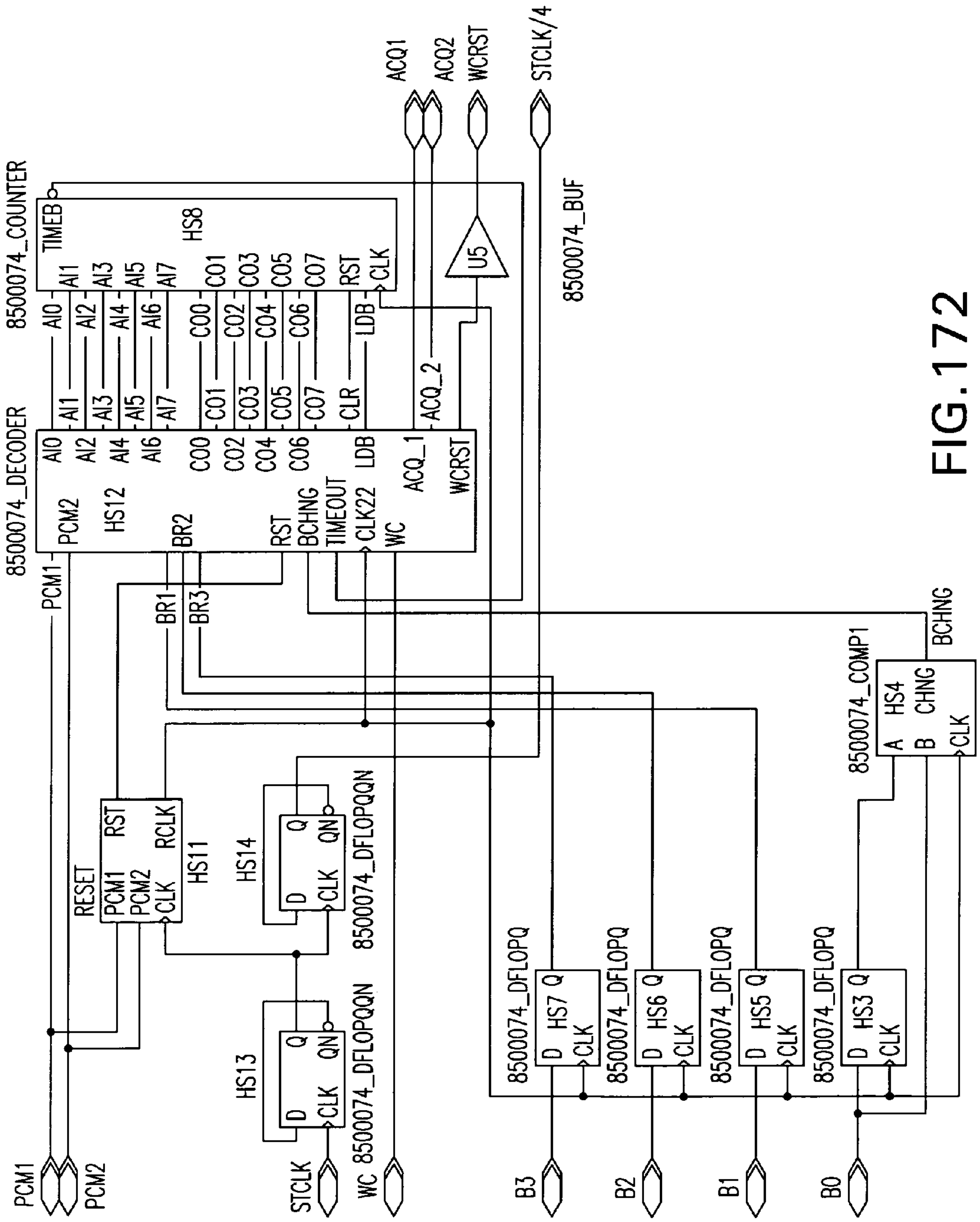
Figure 173:
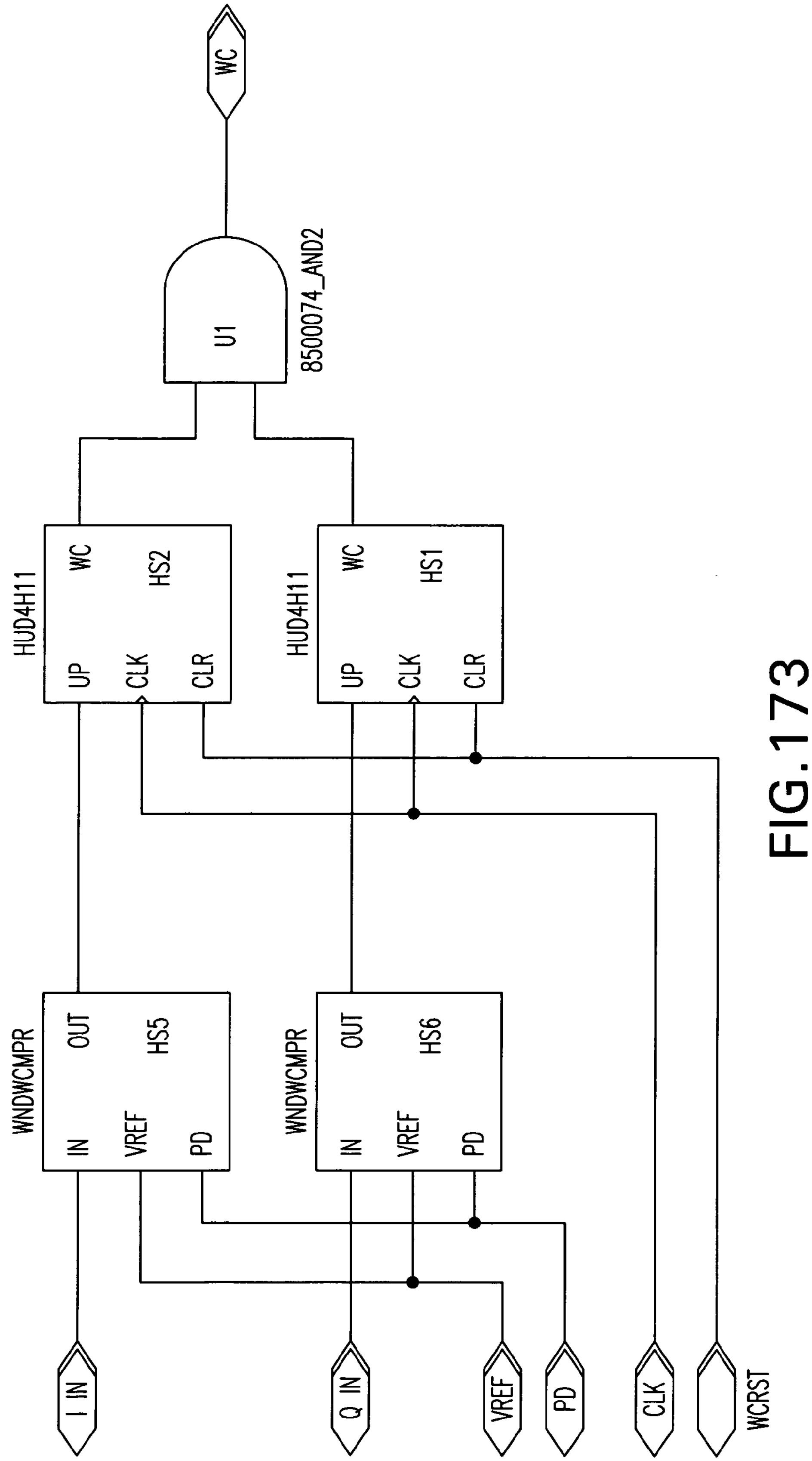
Figure 174A:
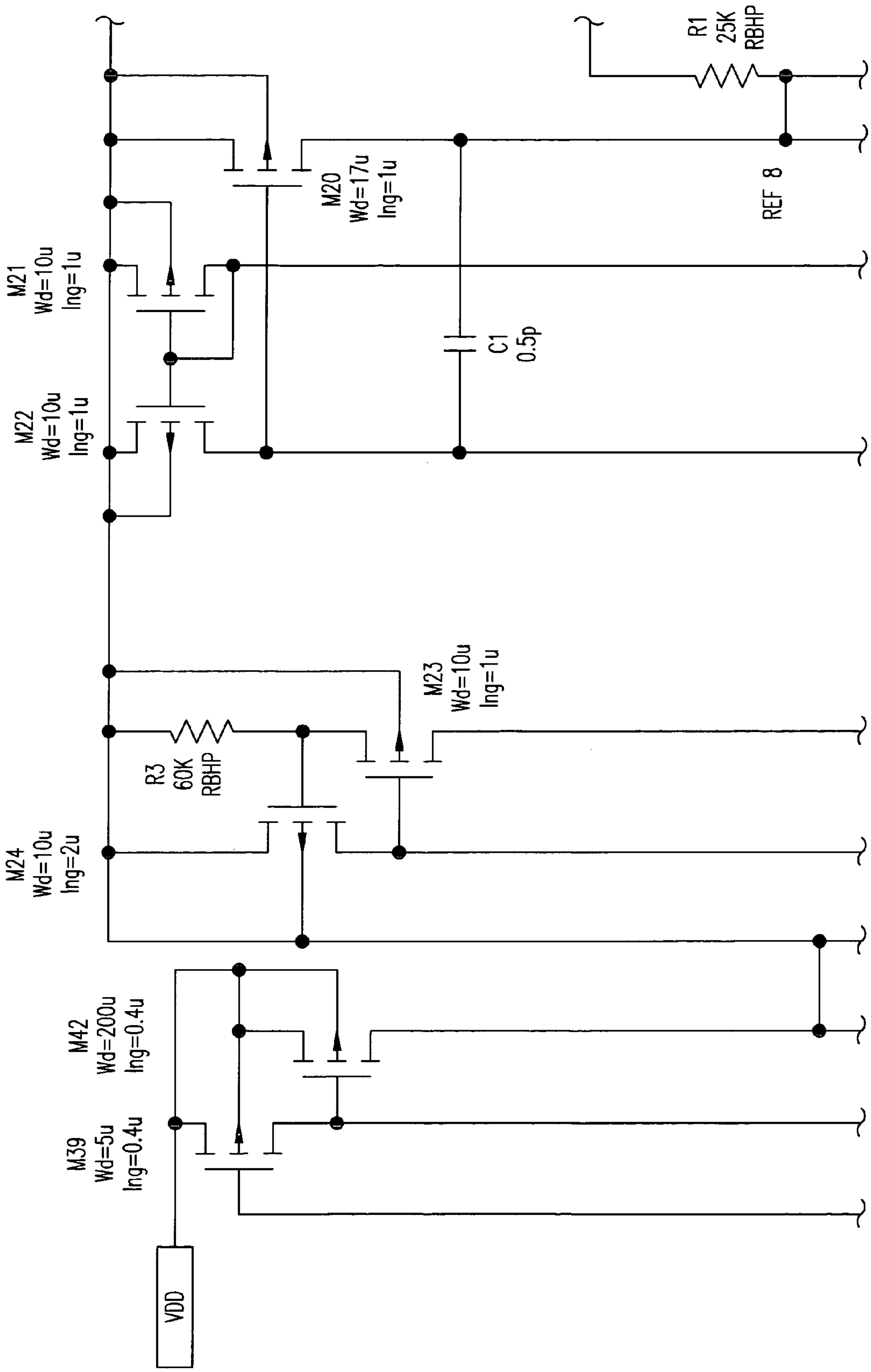
Figure 174B:
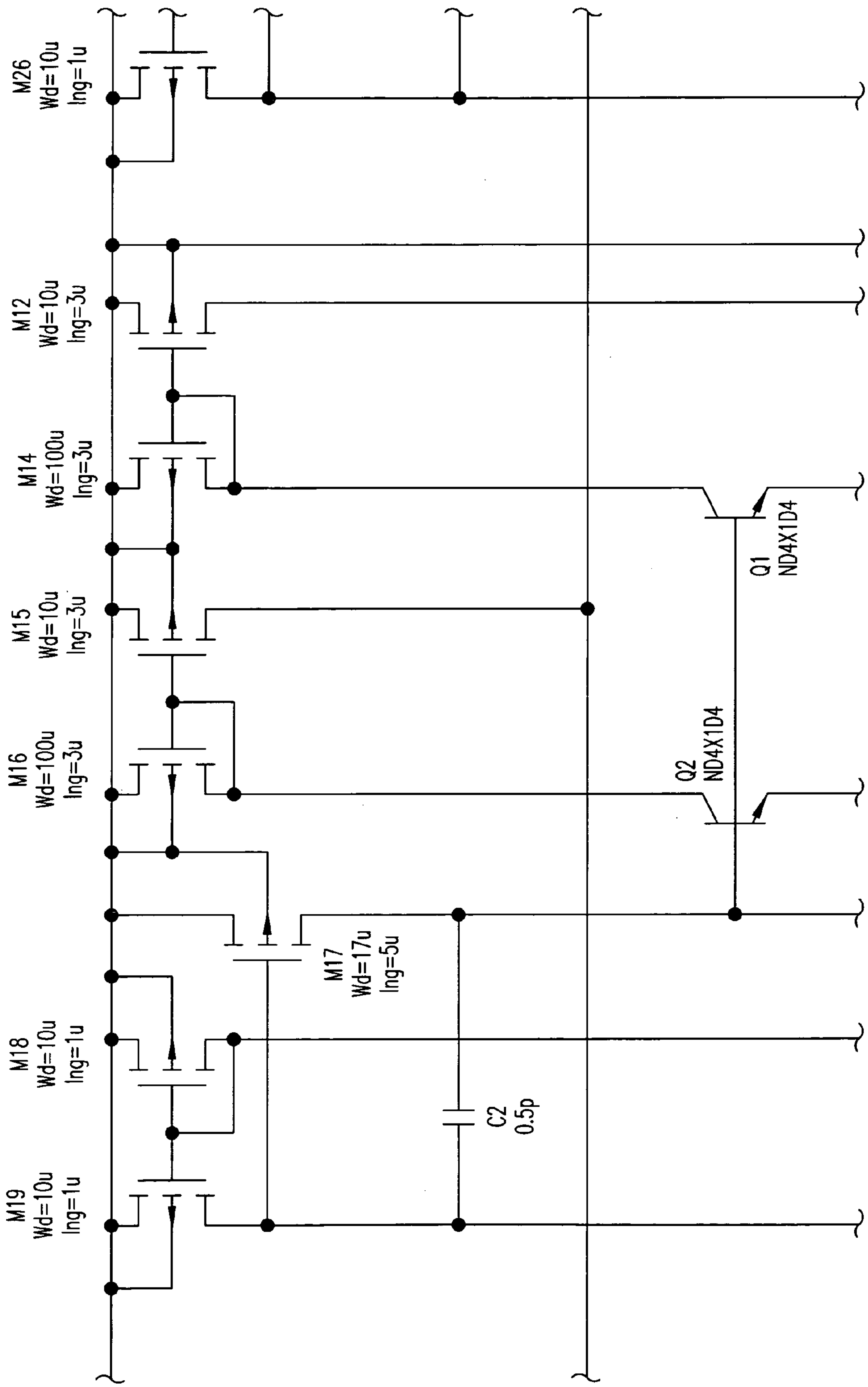
Figure 174C:
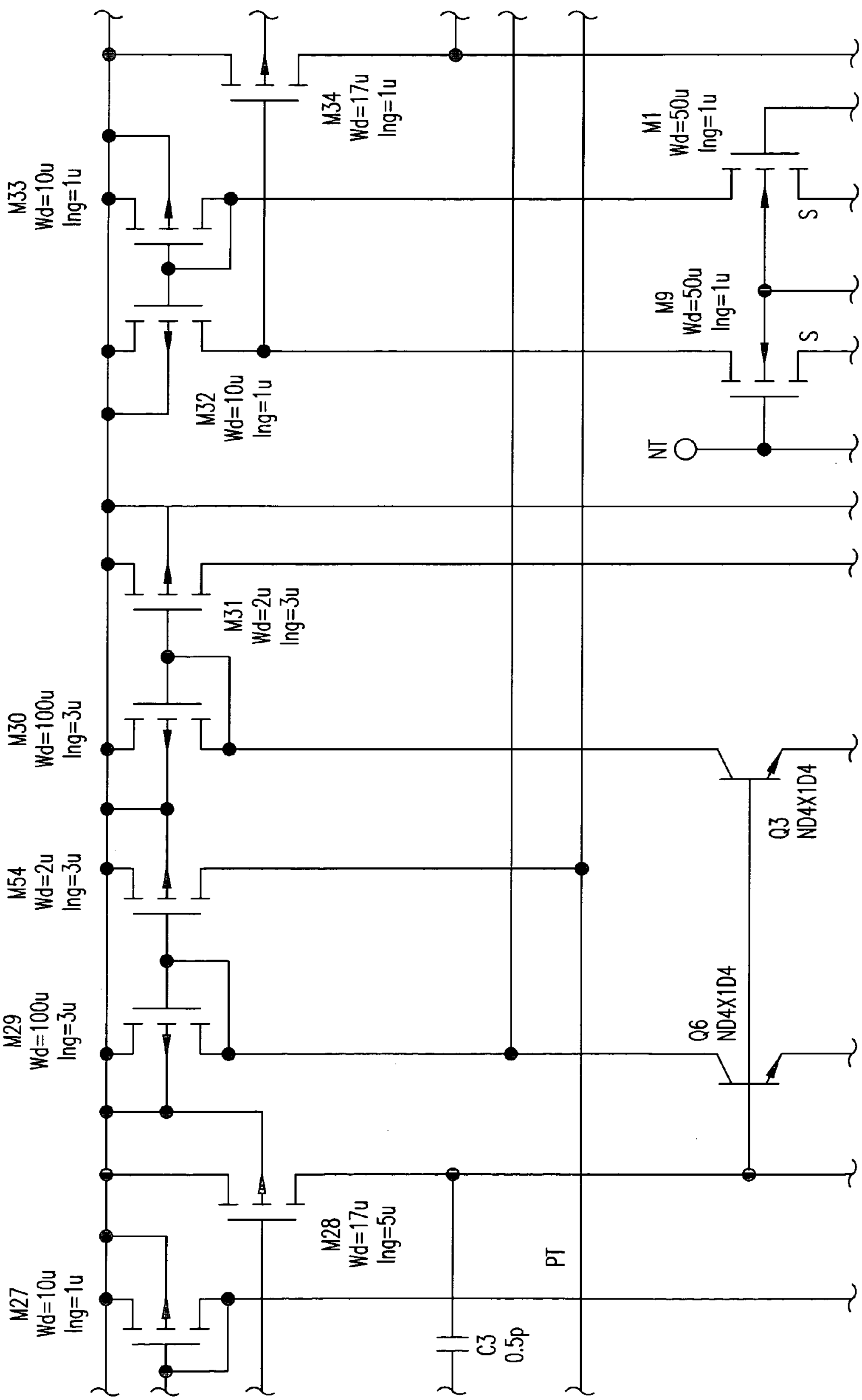
Figure 174D:
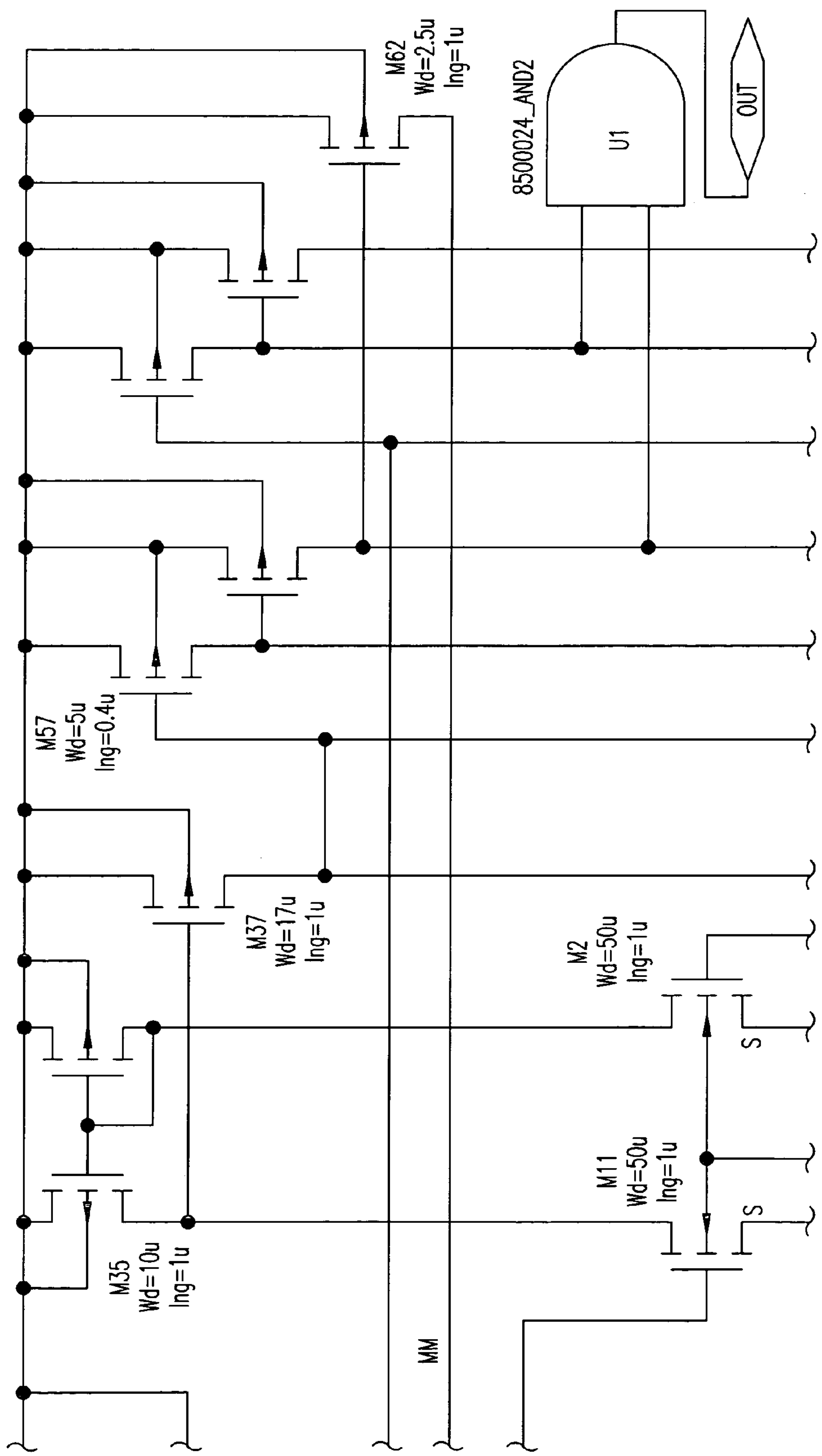
Figure 174E:
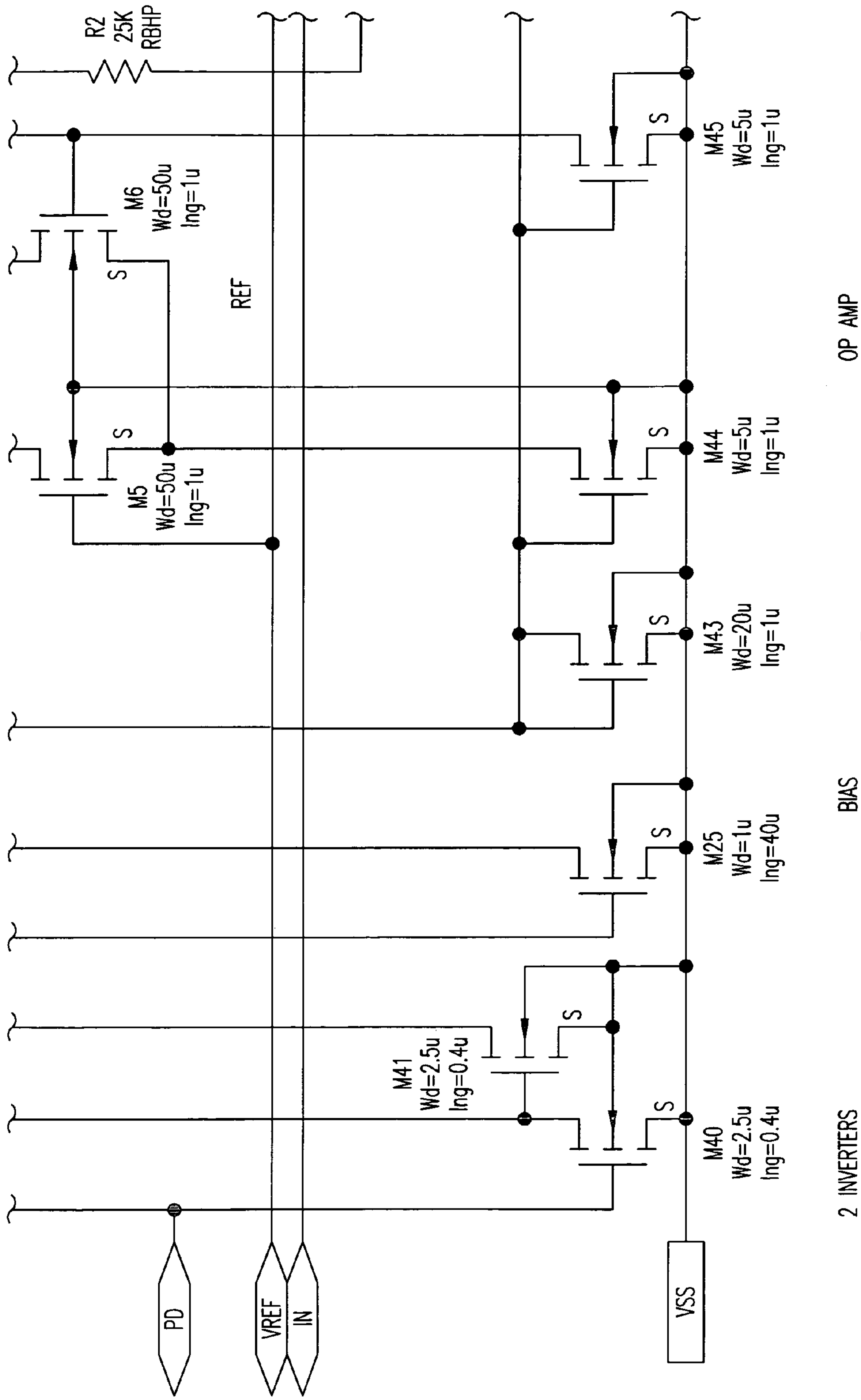
Figure 174F:
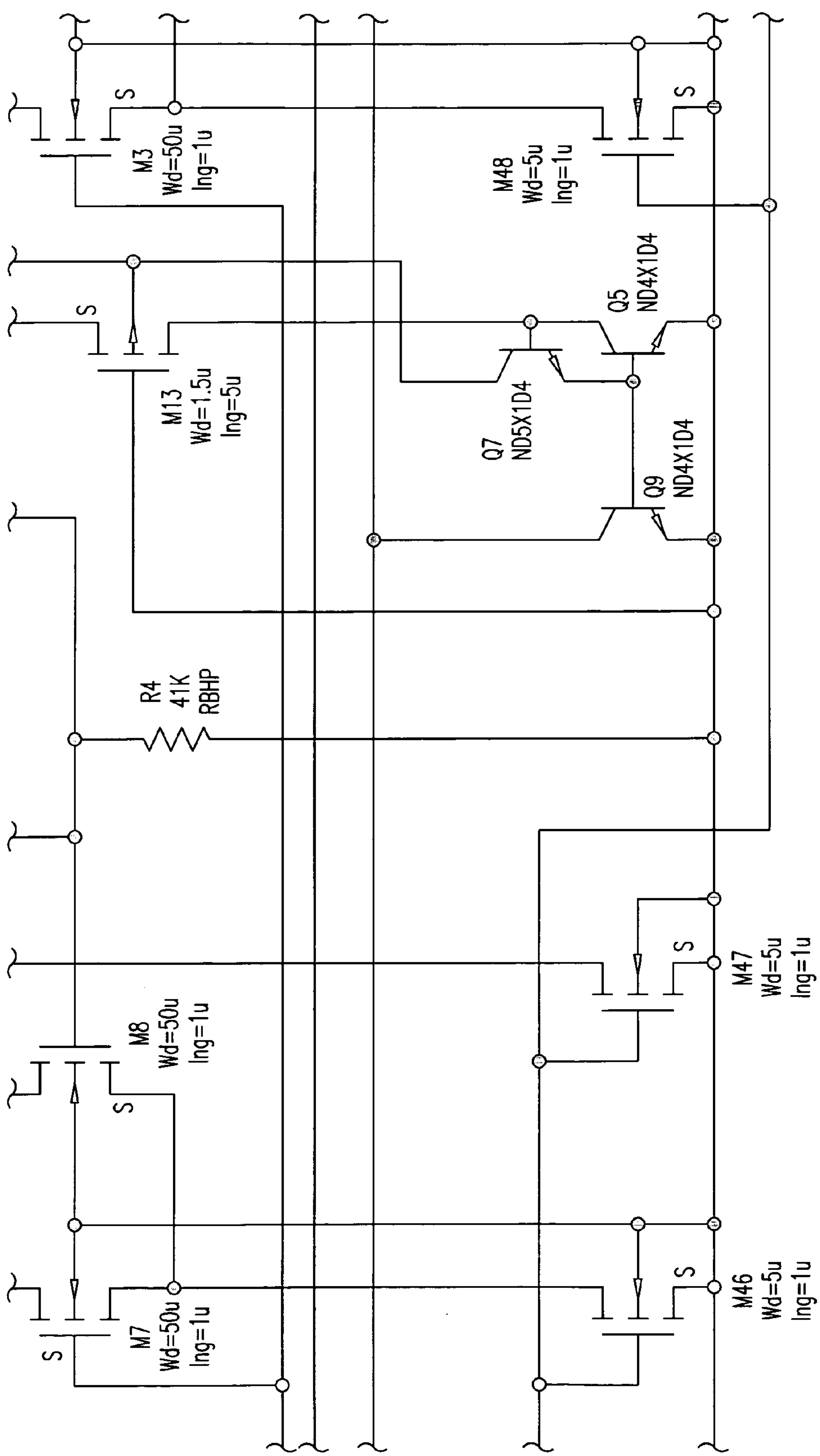
Figure 174G:
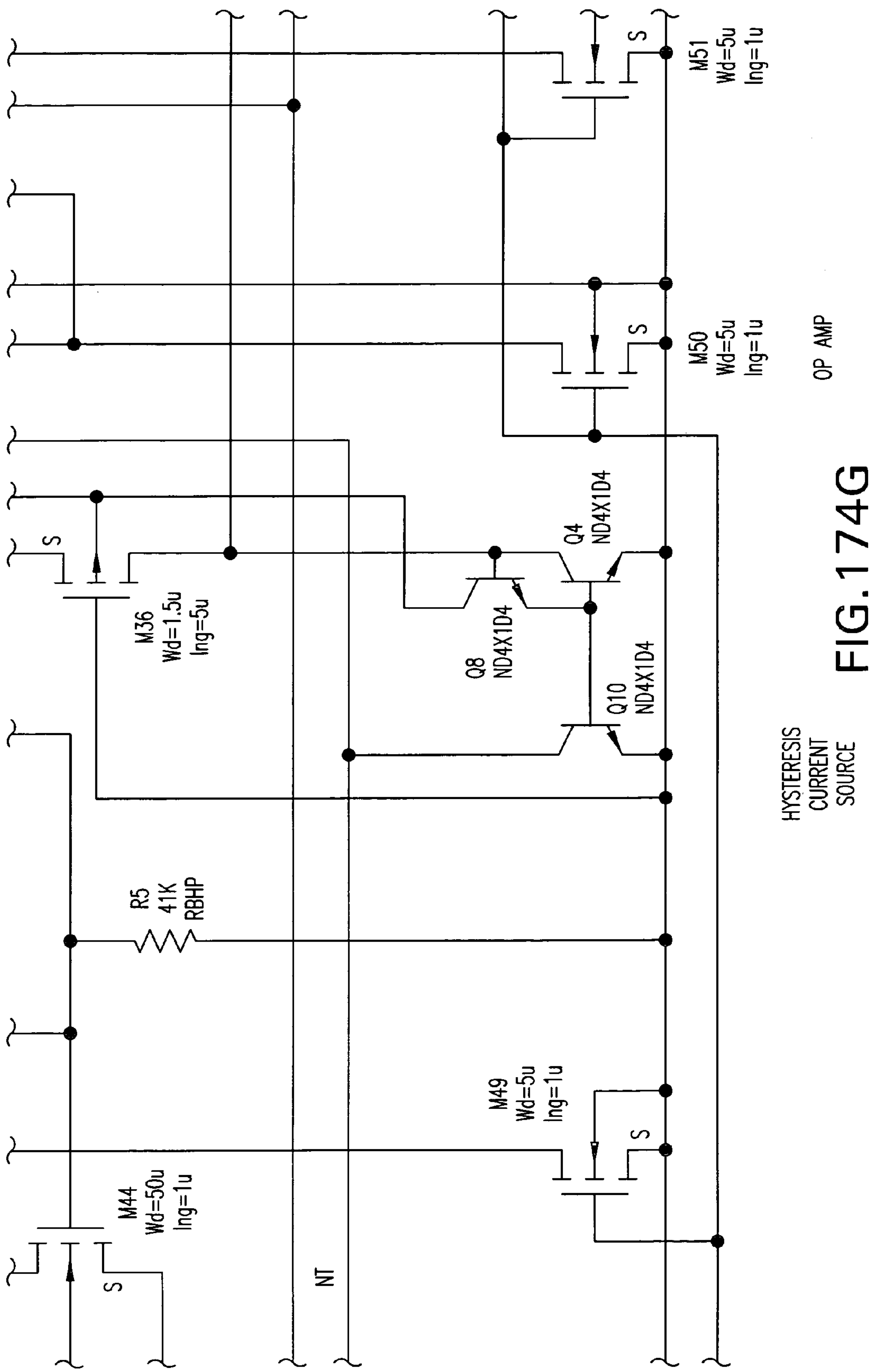
Figure 174H:
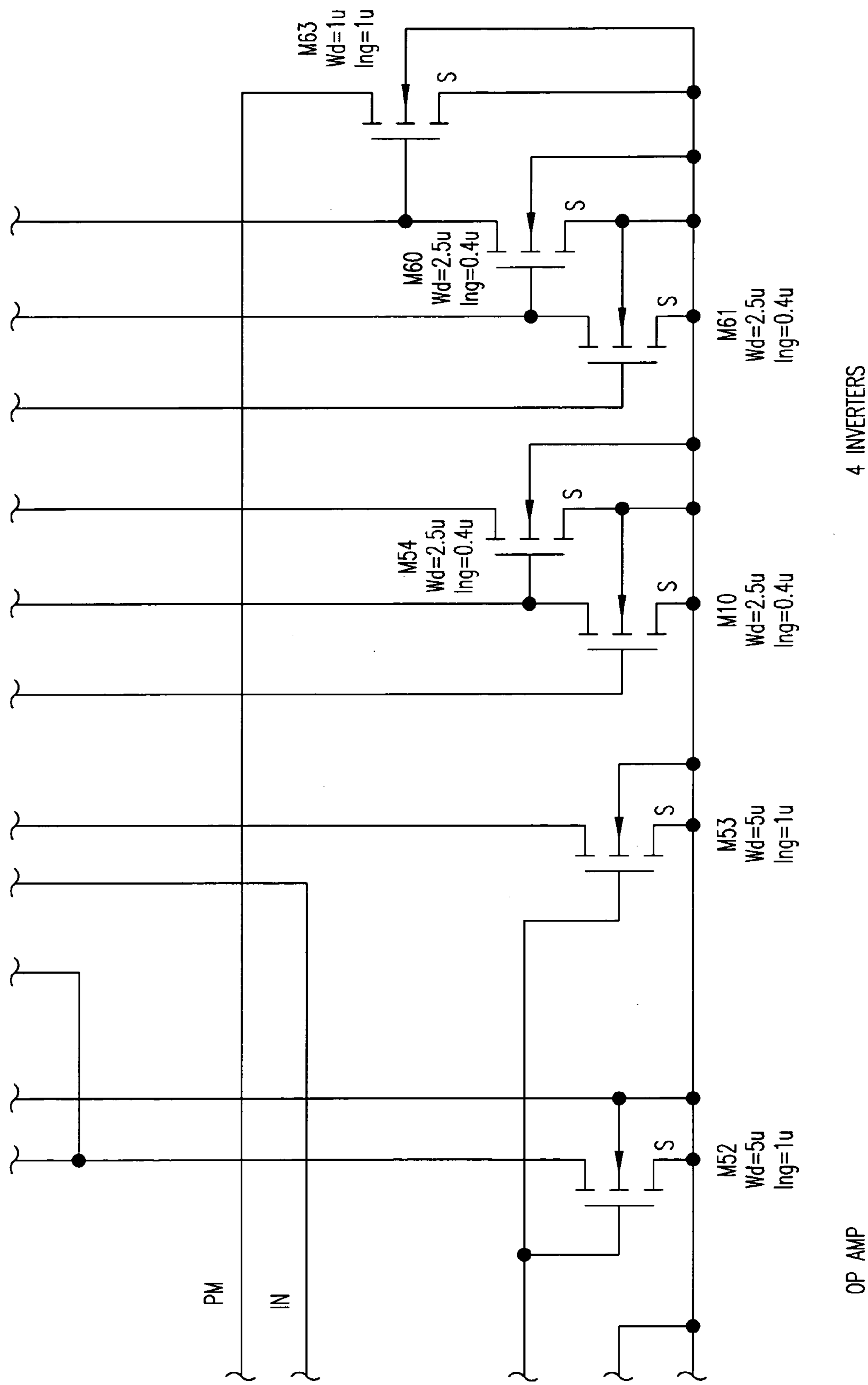
Figure 175:
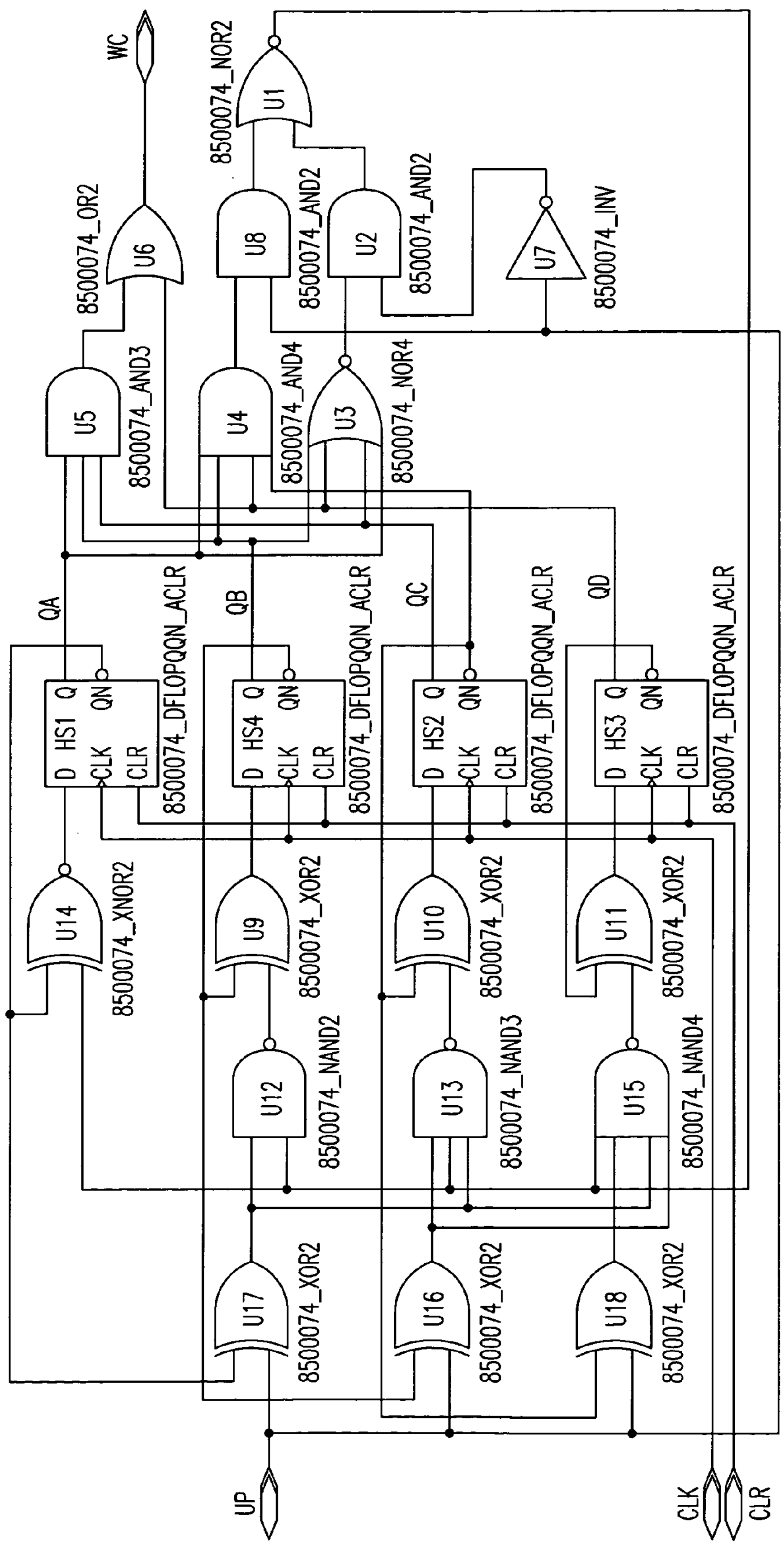
Figure 176A:
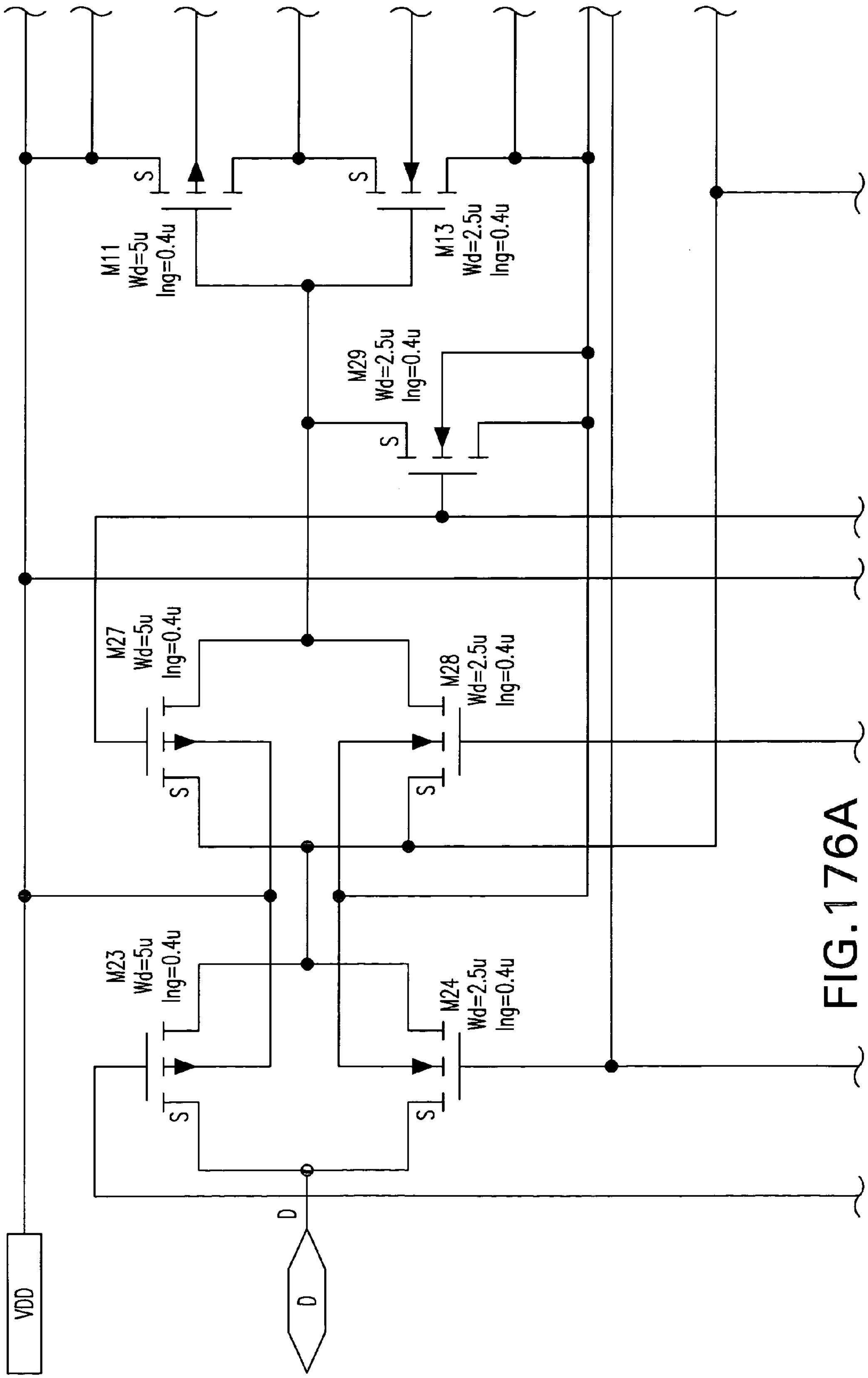
Figure 176B:
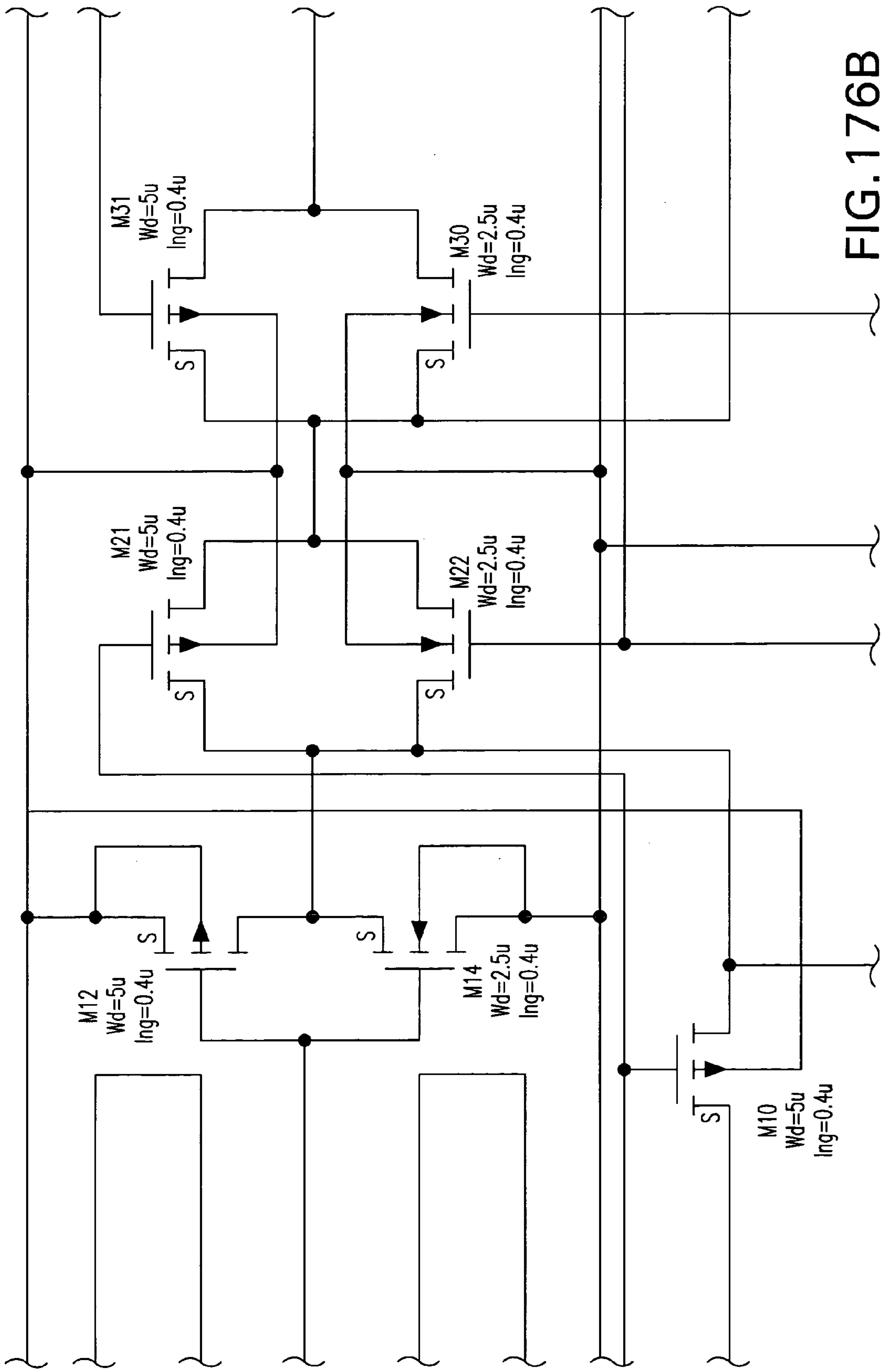
Figure 176C:
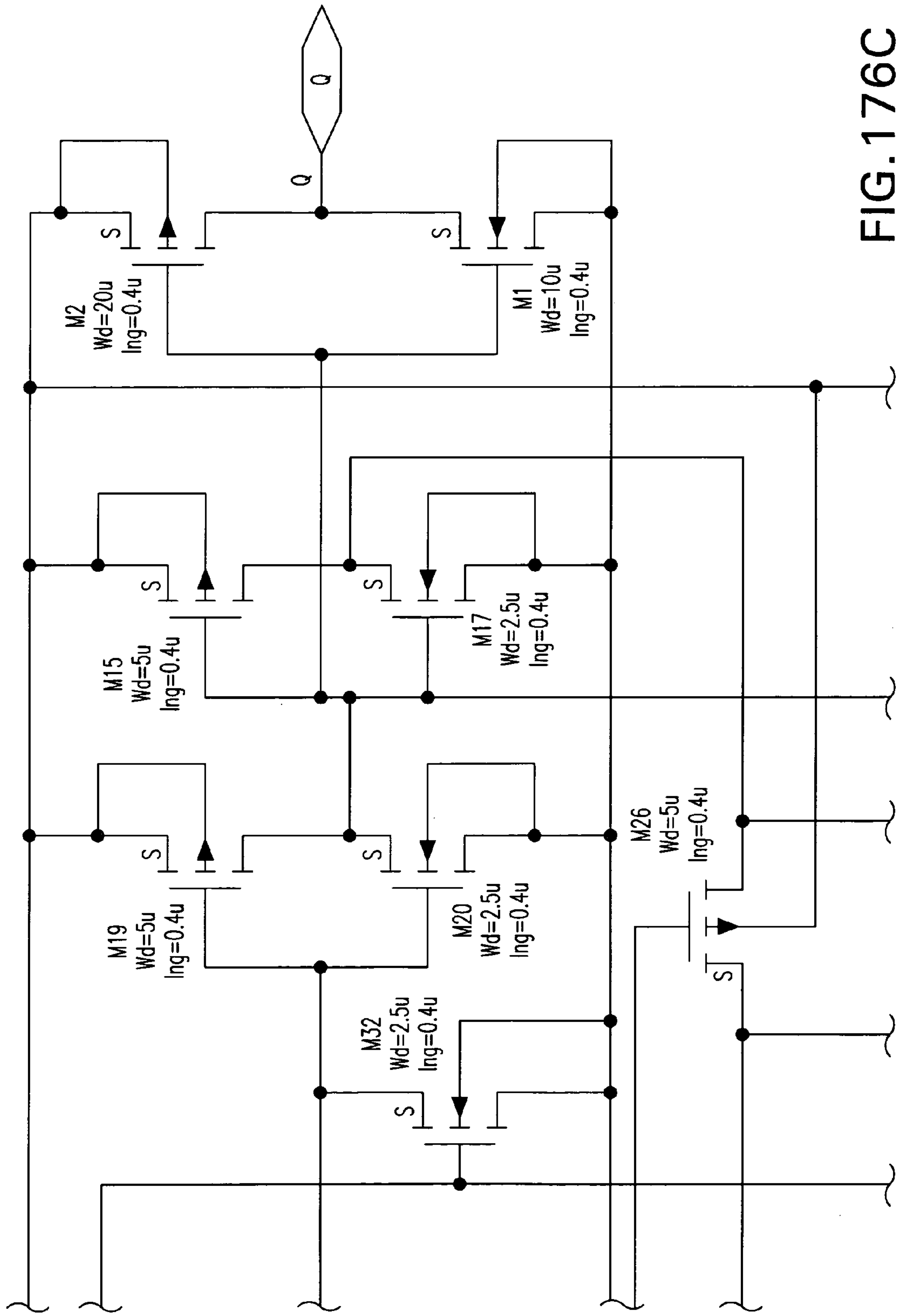
Figure 176D:
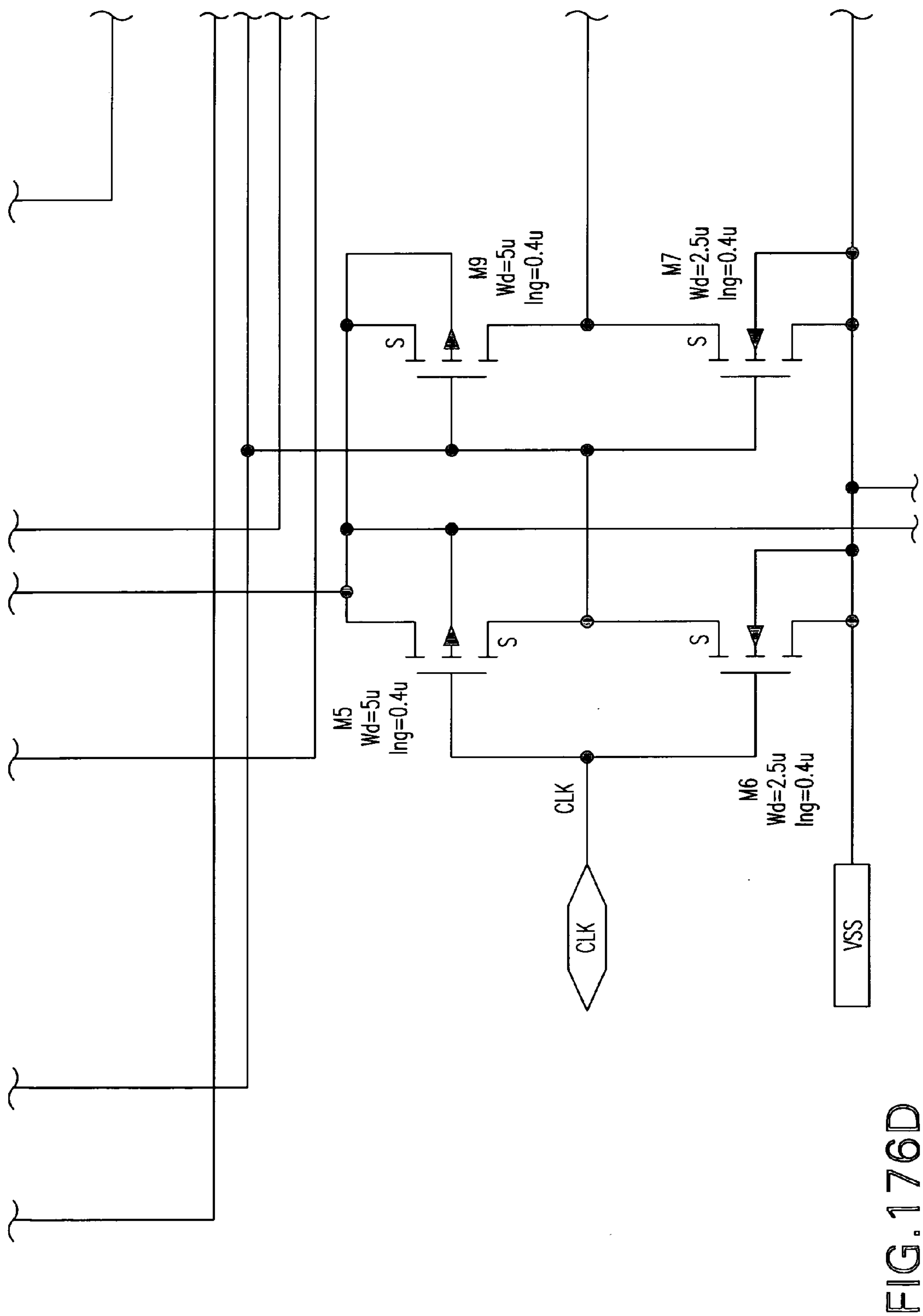
Figure 176E:
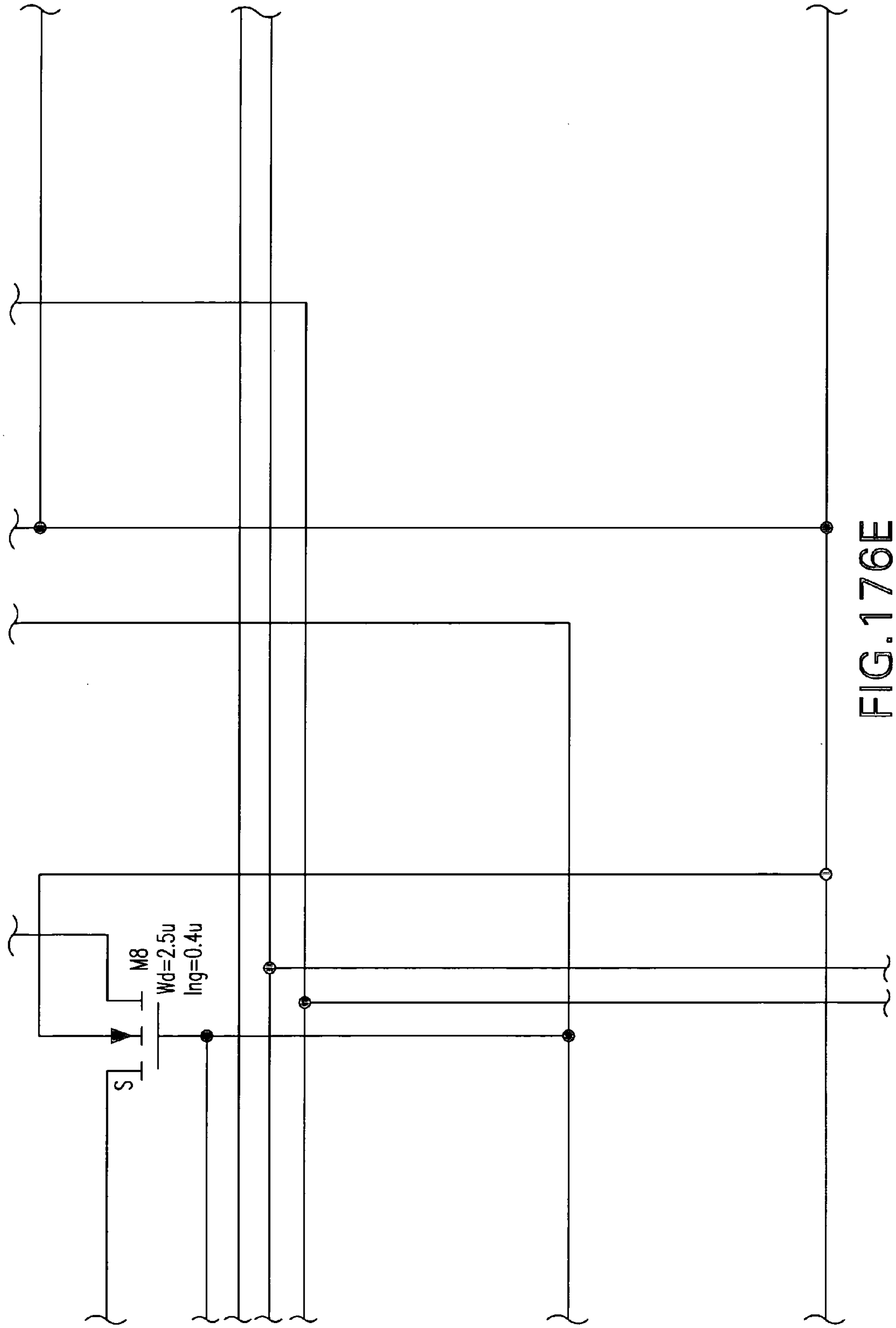
Figure 176F:
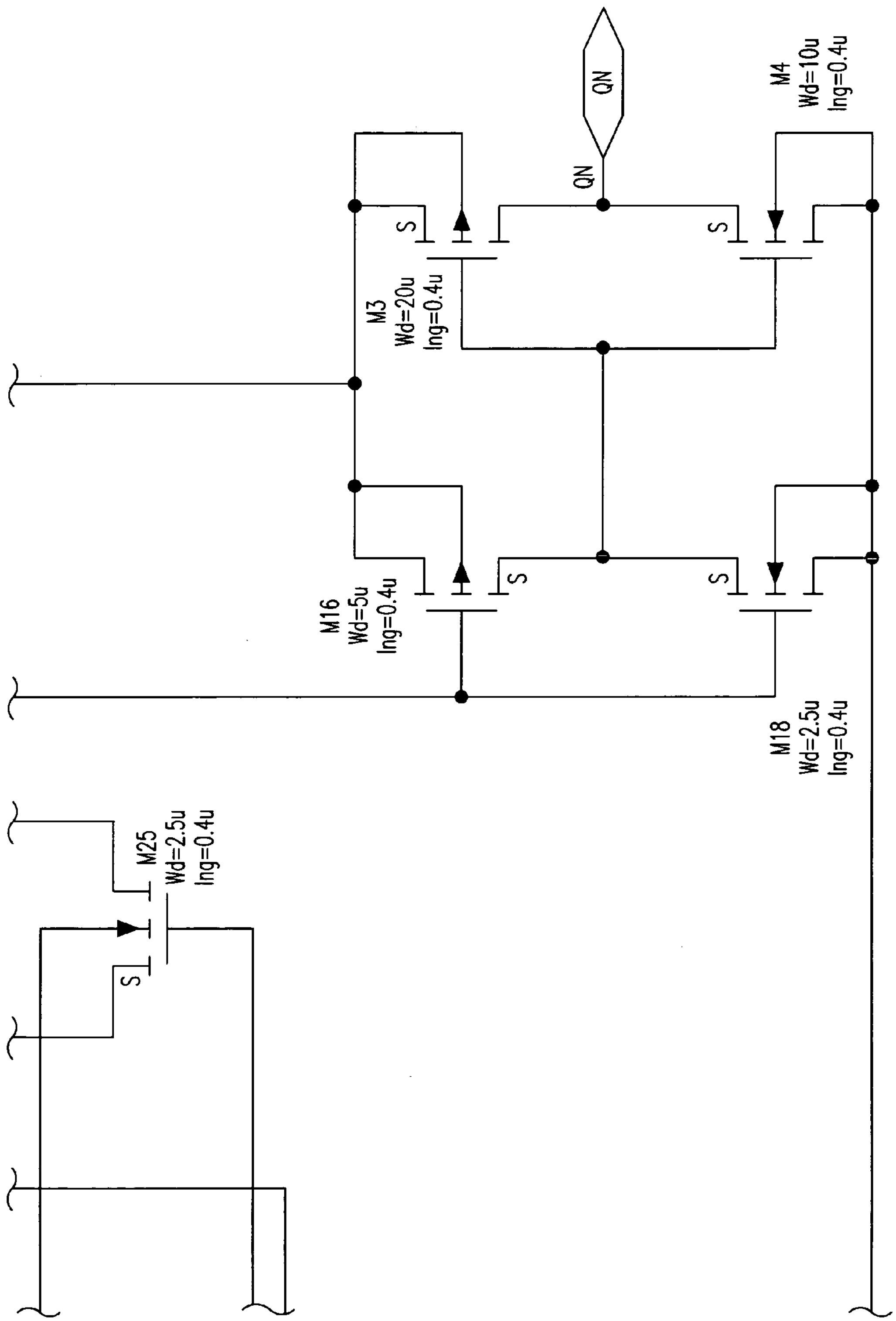
Figure 176G:
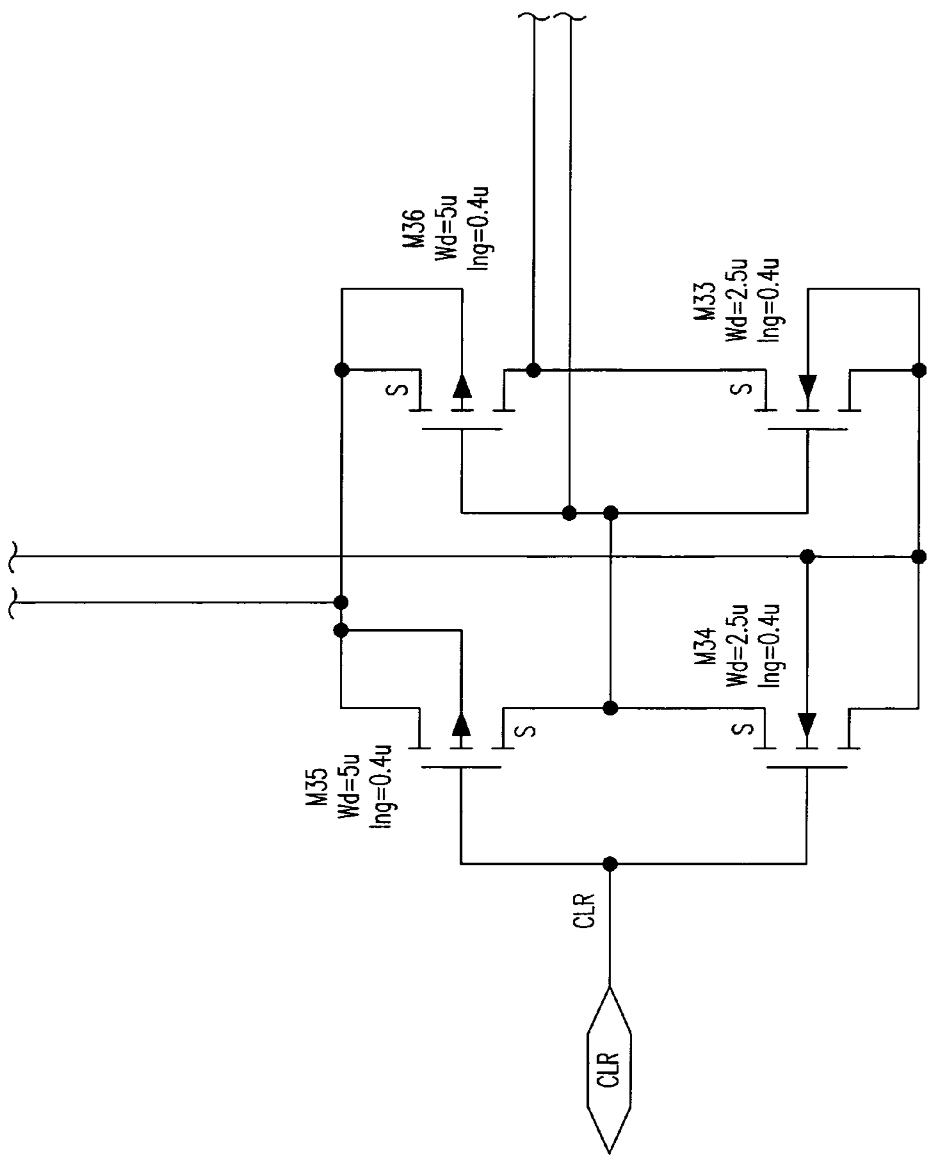
Figure 176H:
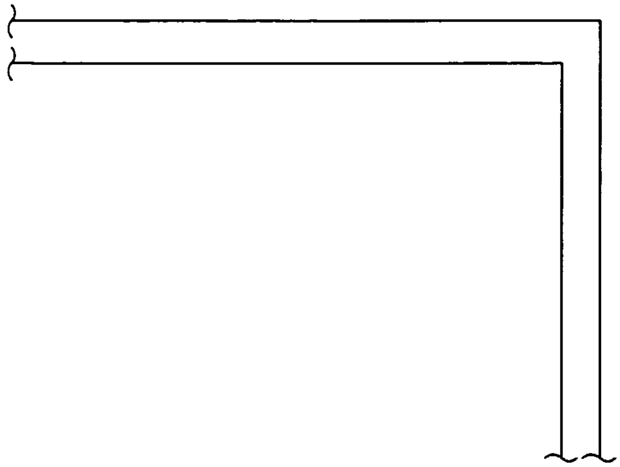
Figure 177A:
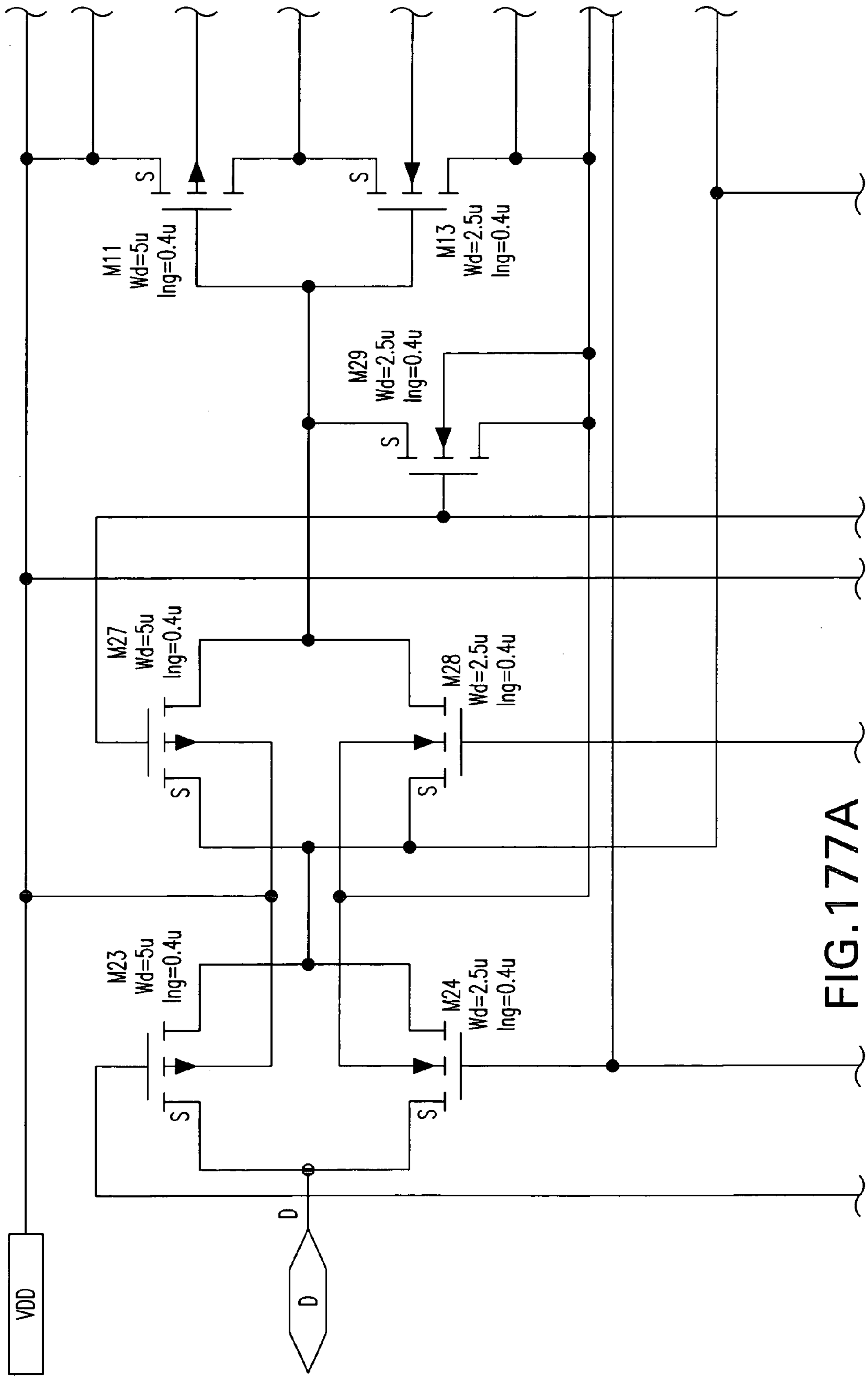
Figure 177B:
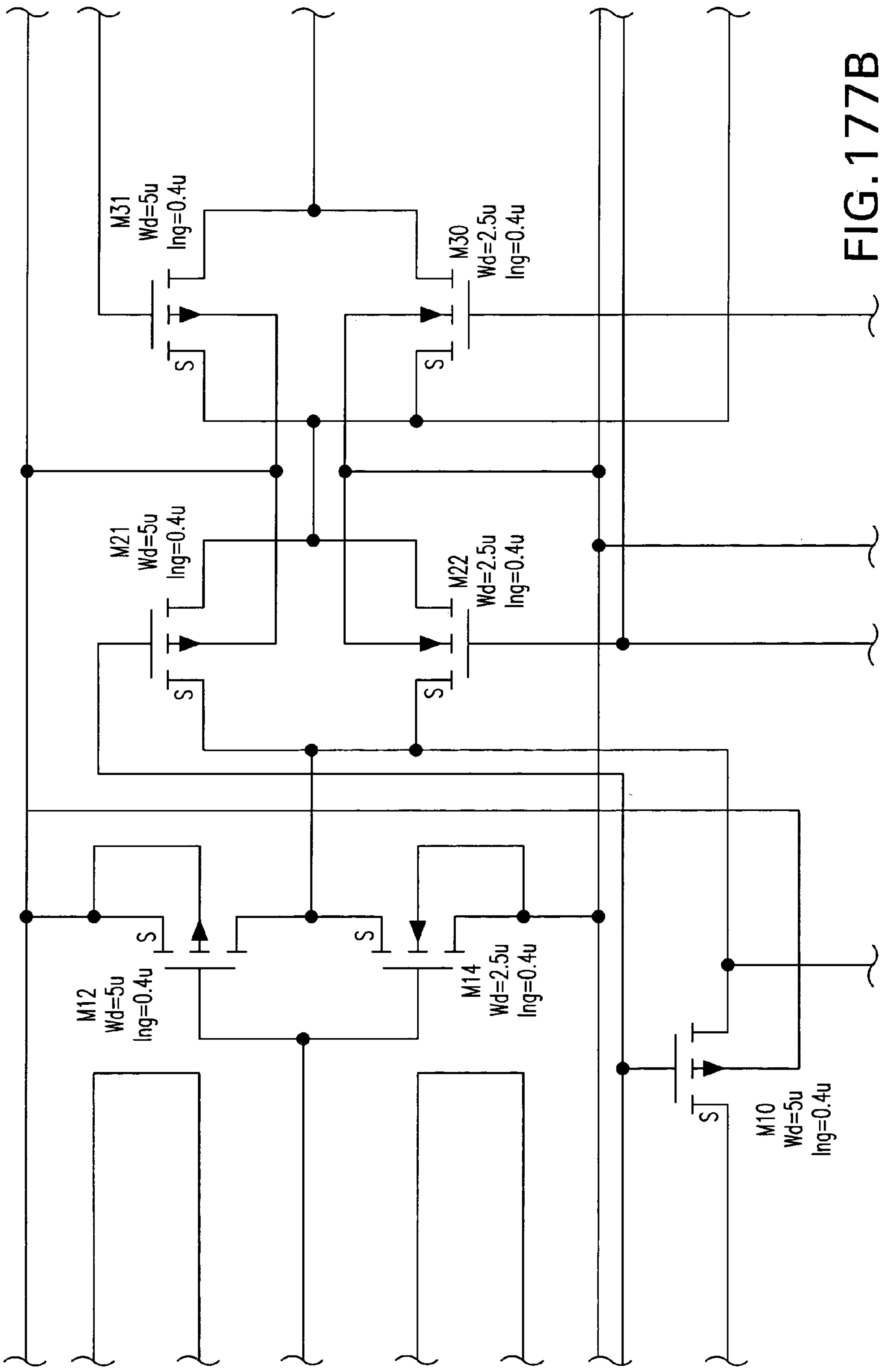
Figure 177C:
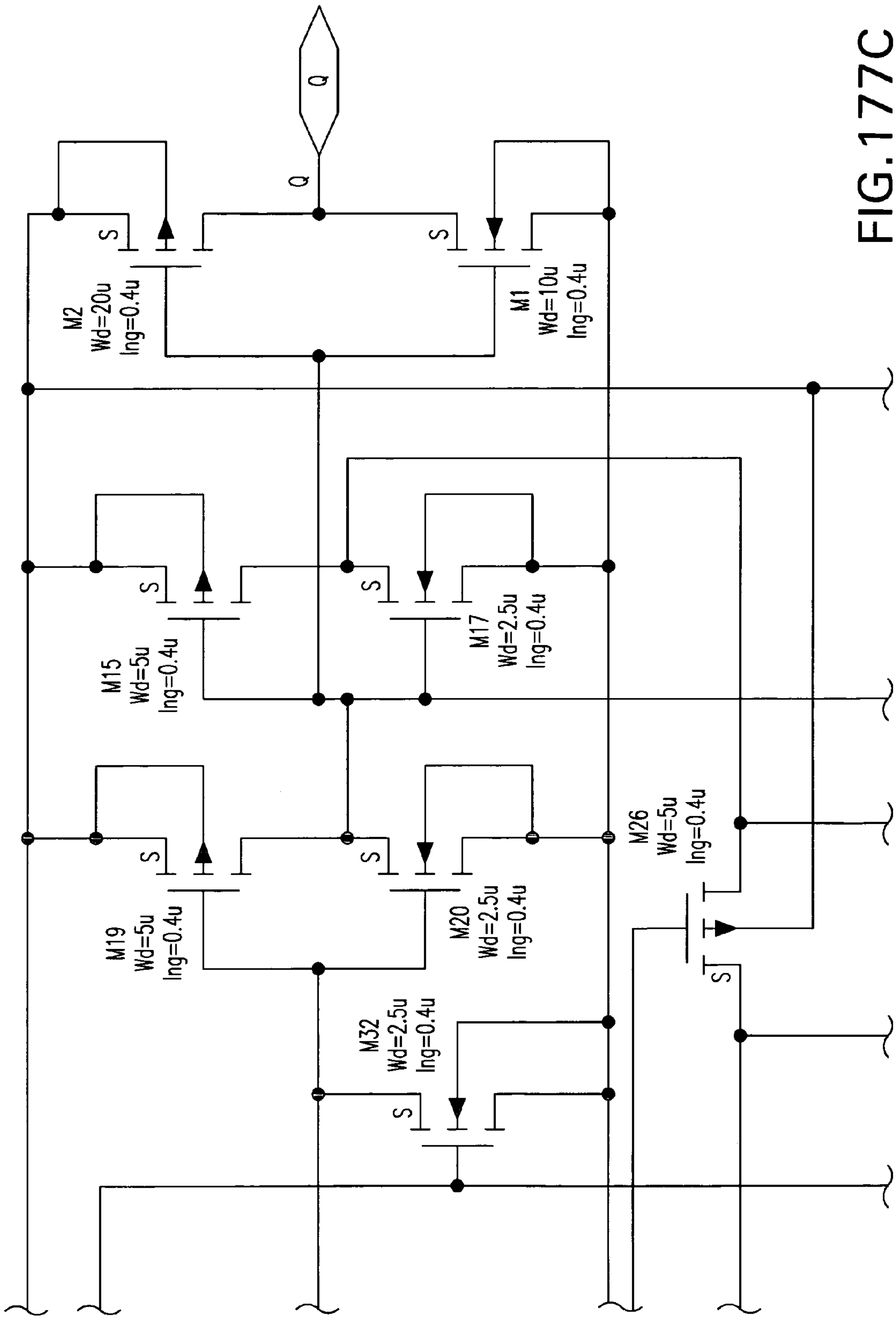
Figure 177D:
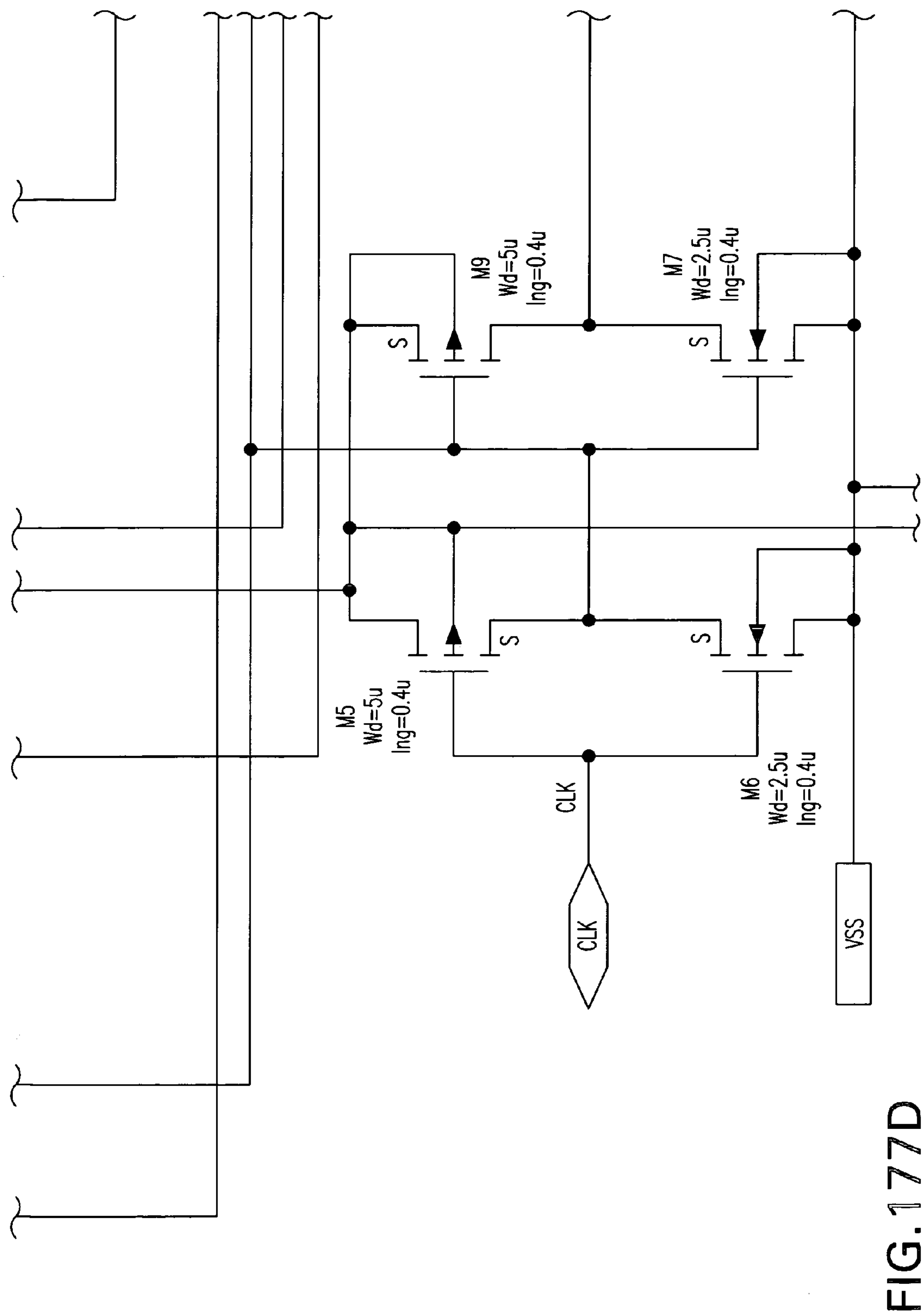
Figure 177E:
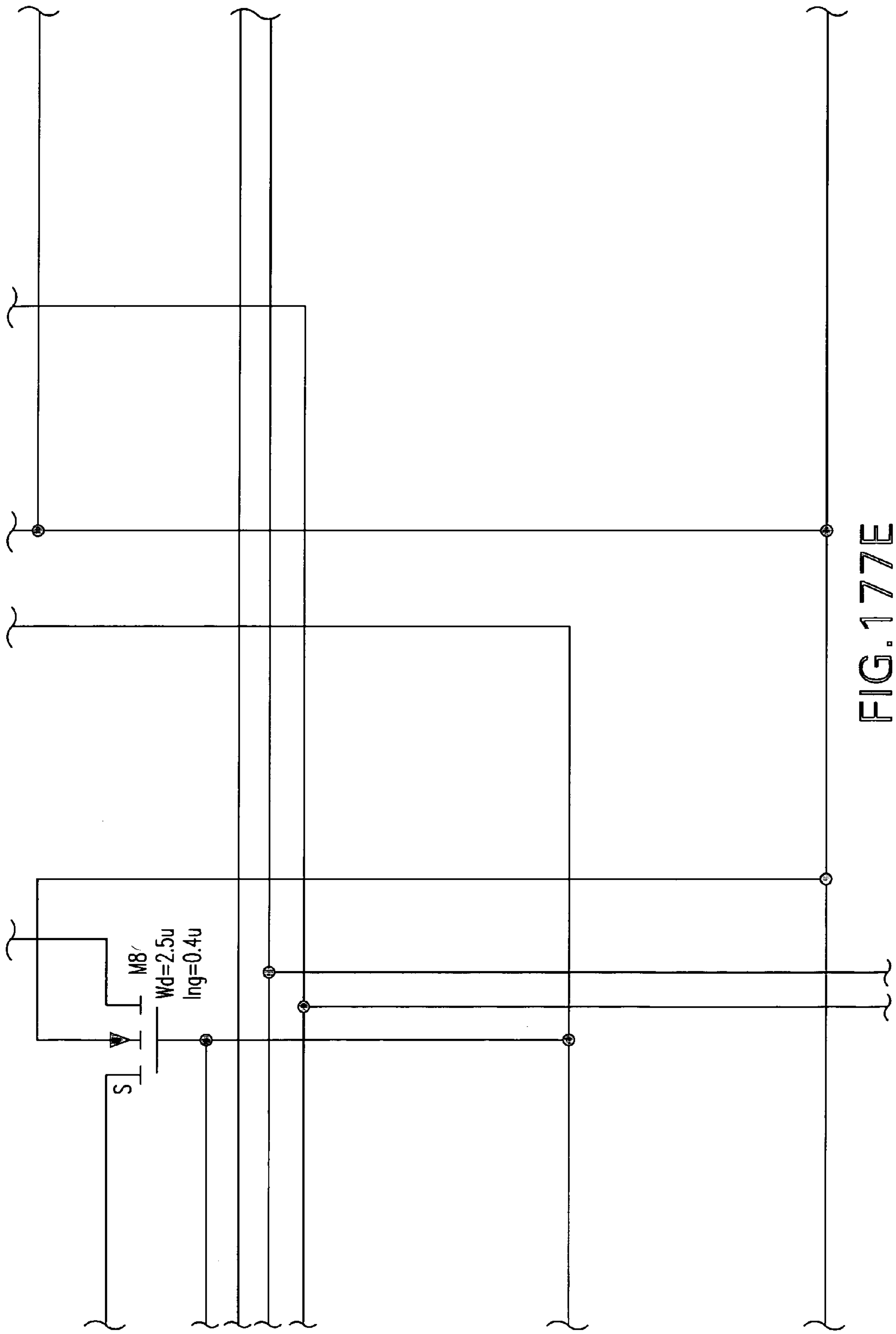
Figure 177F:
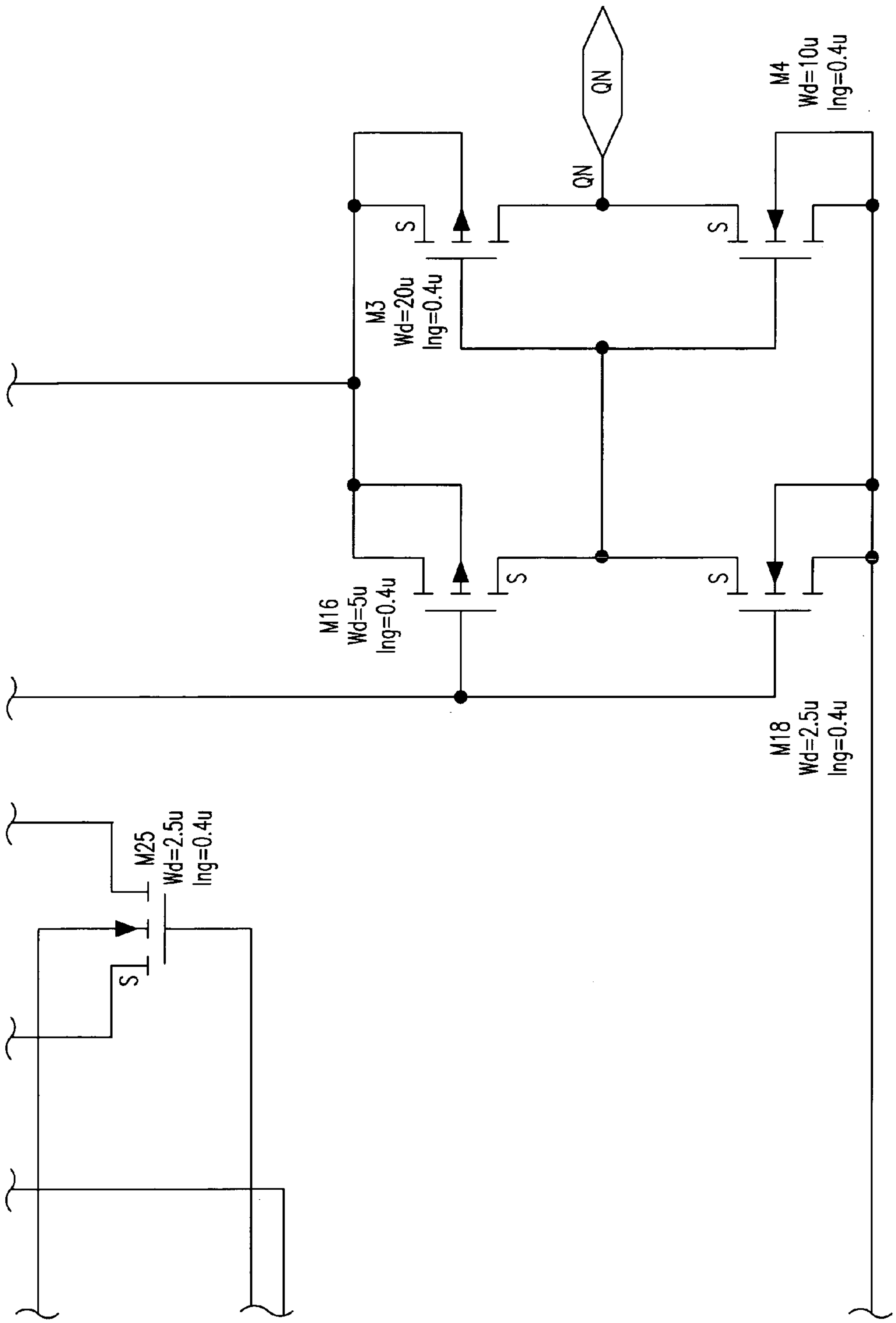
Figure 177G:
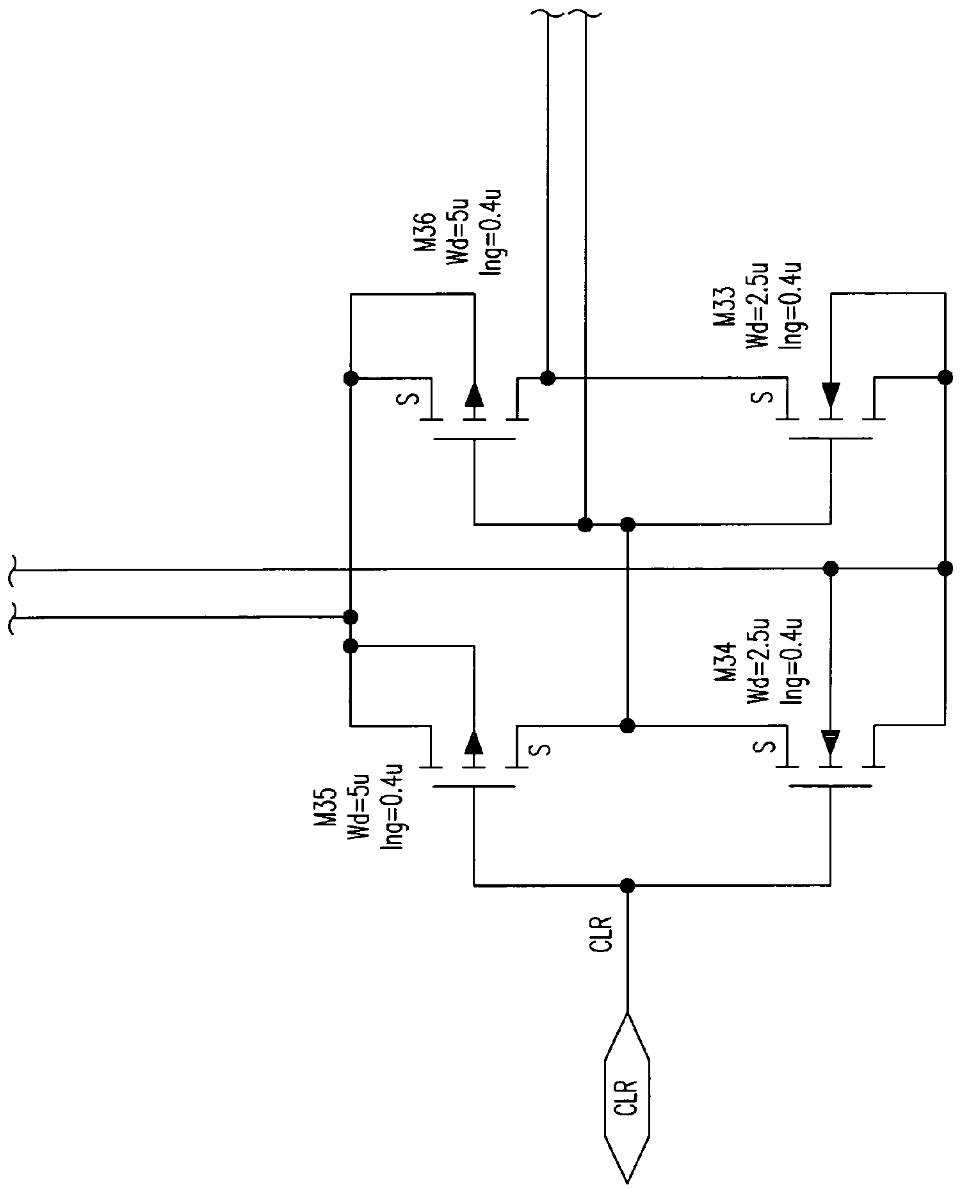
Figure 177H:
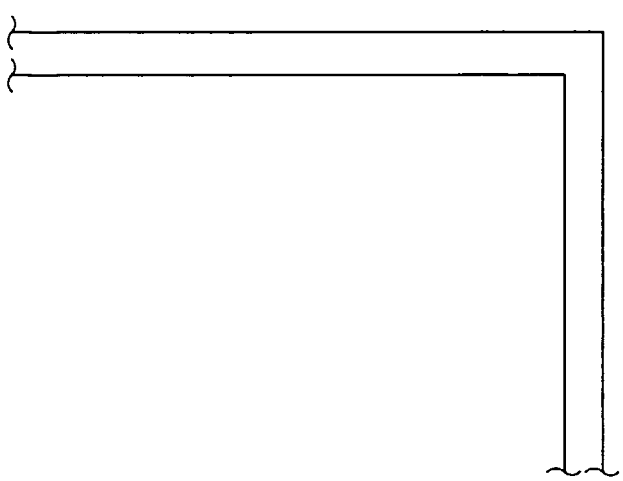
Figure 178:
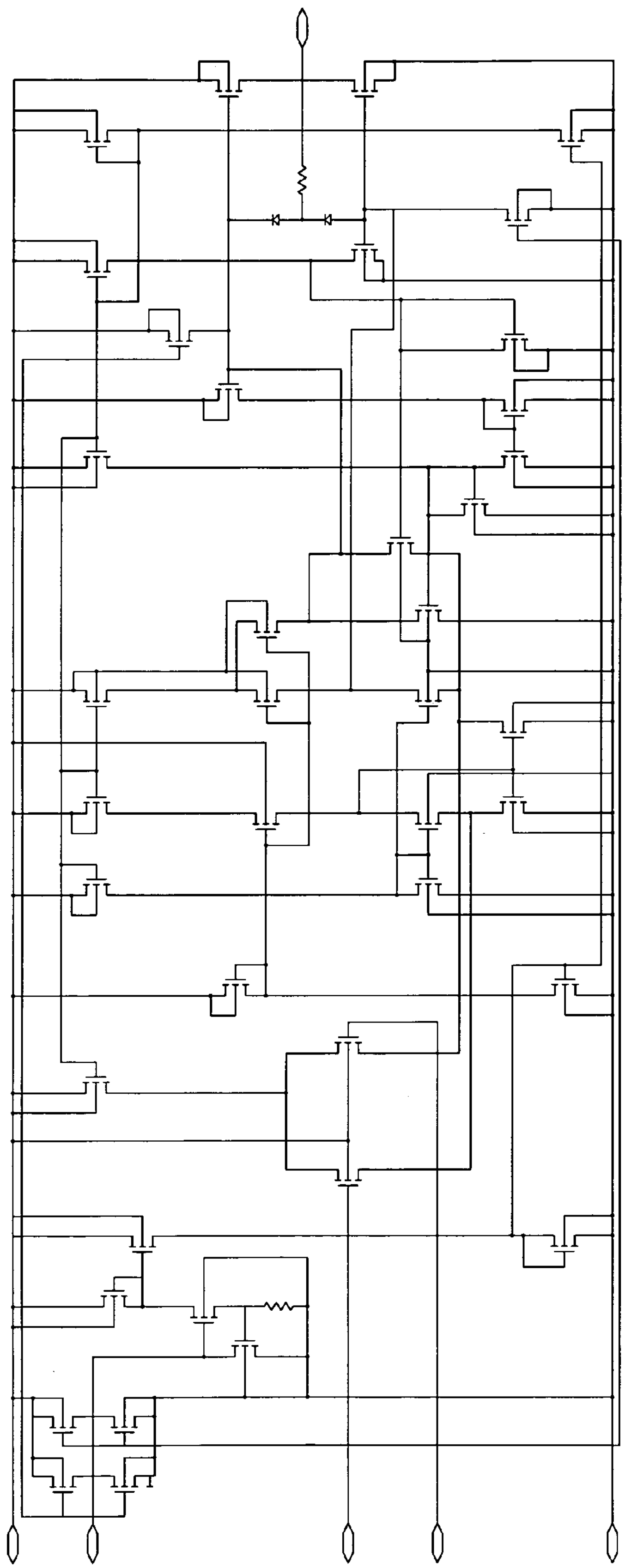
Figure 179:
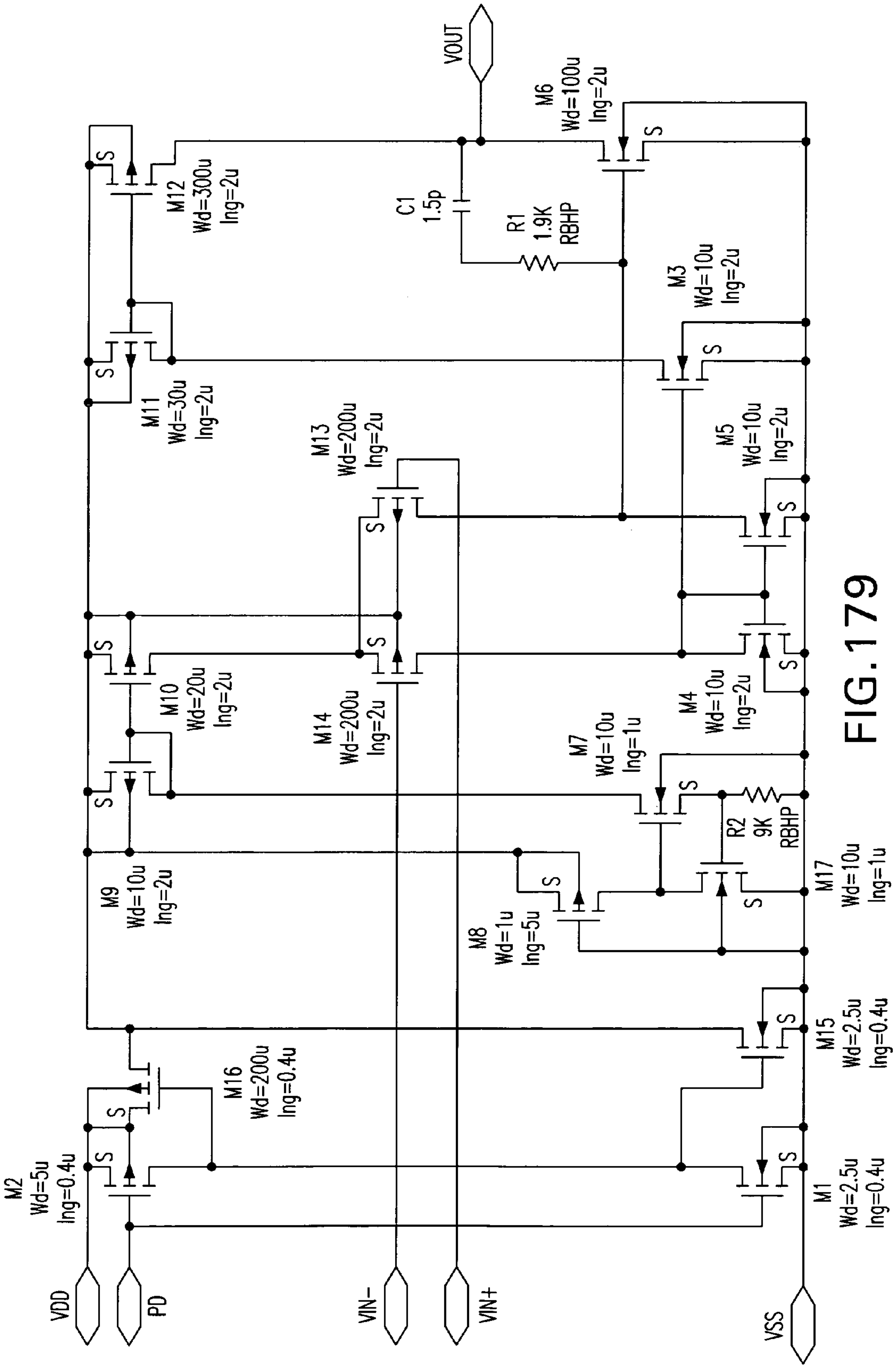
Figure 180:
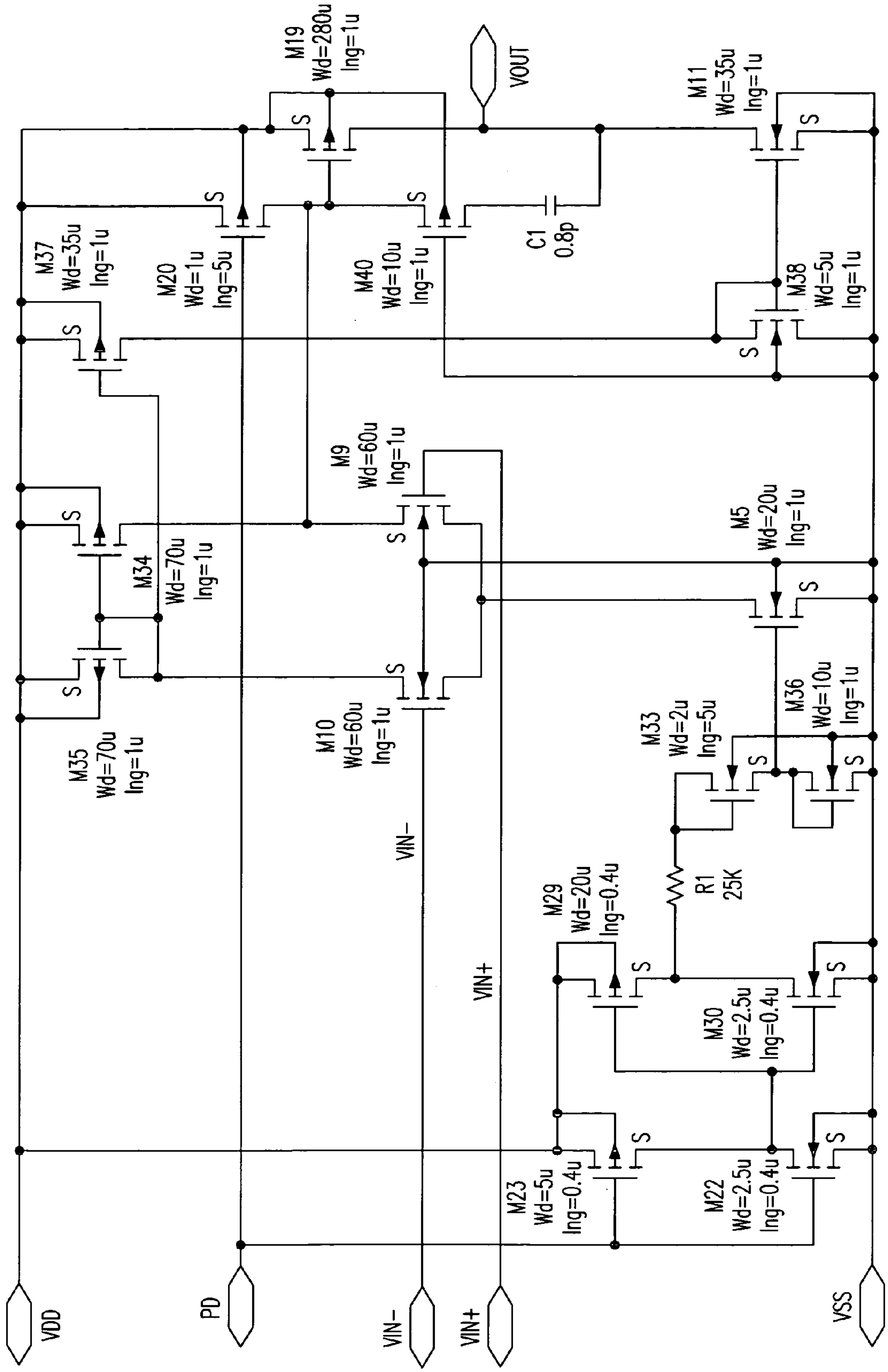
Figure 181:
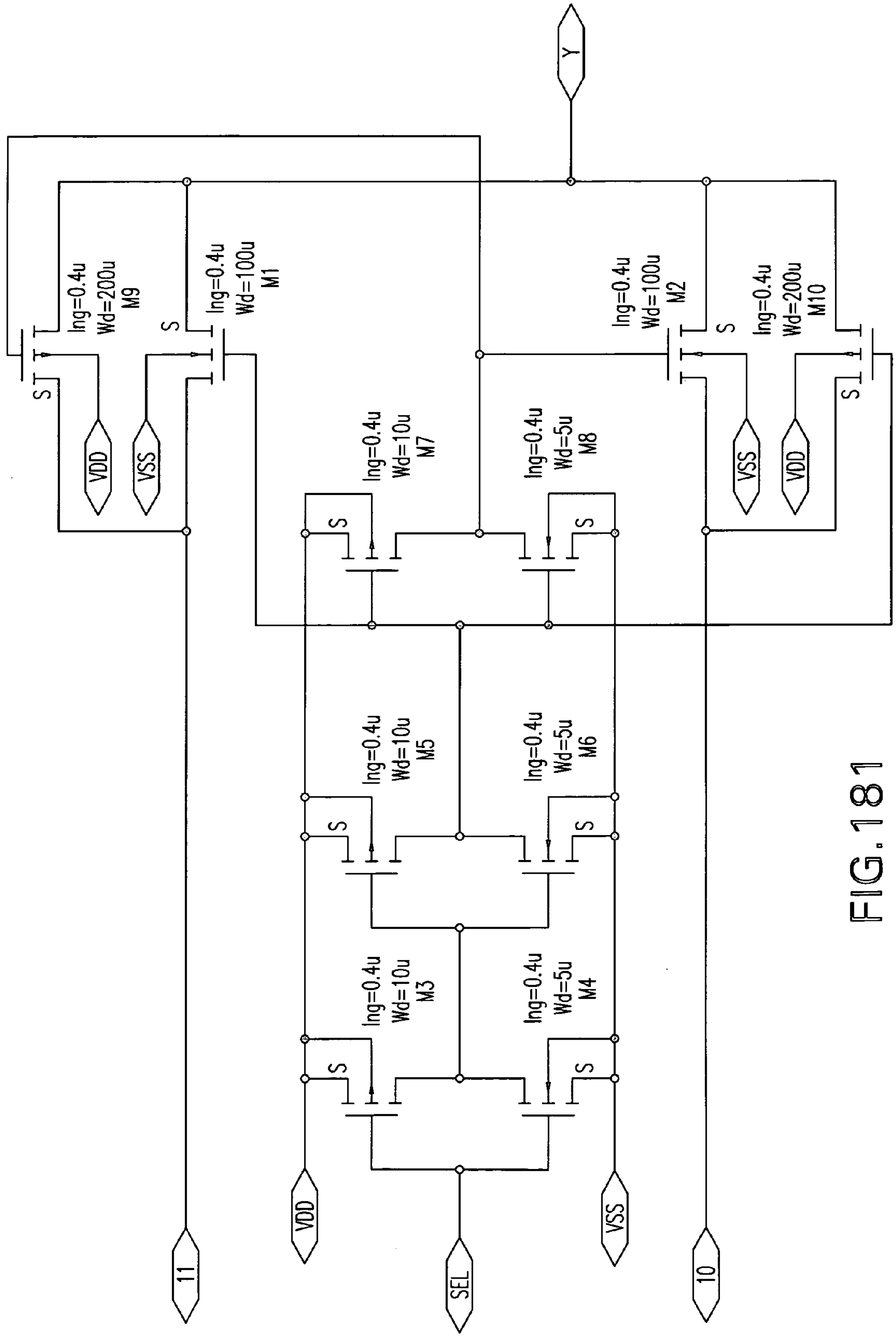
Figure 182:
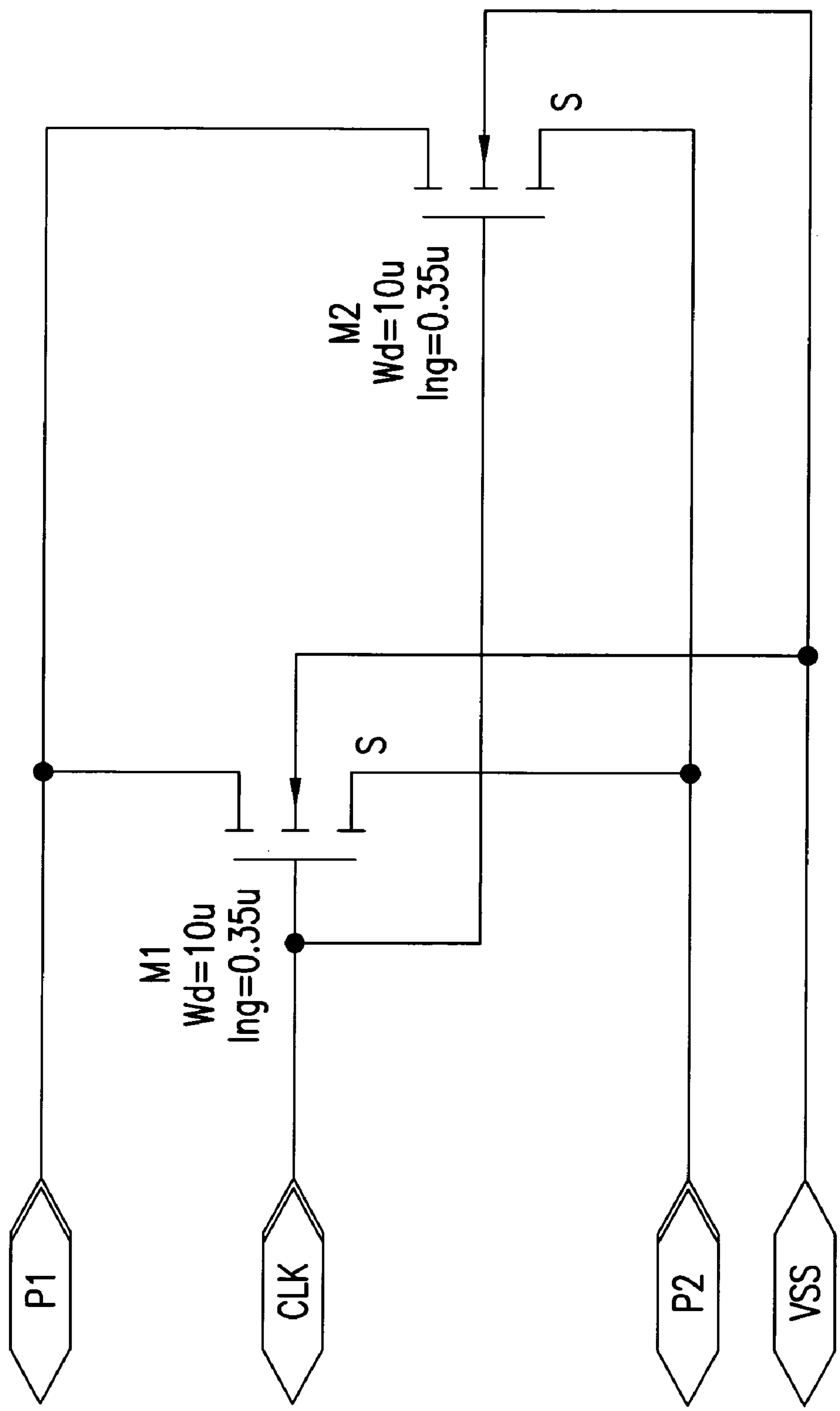
Figure 183:
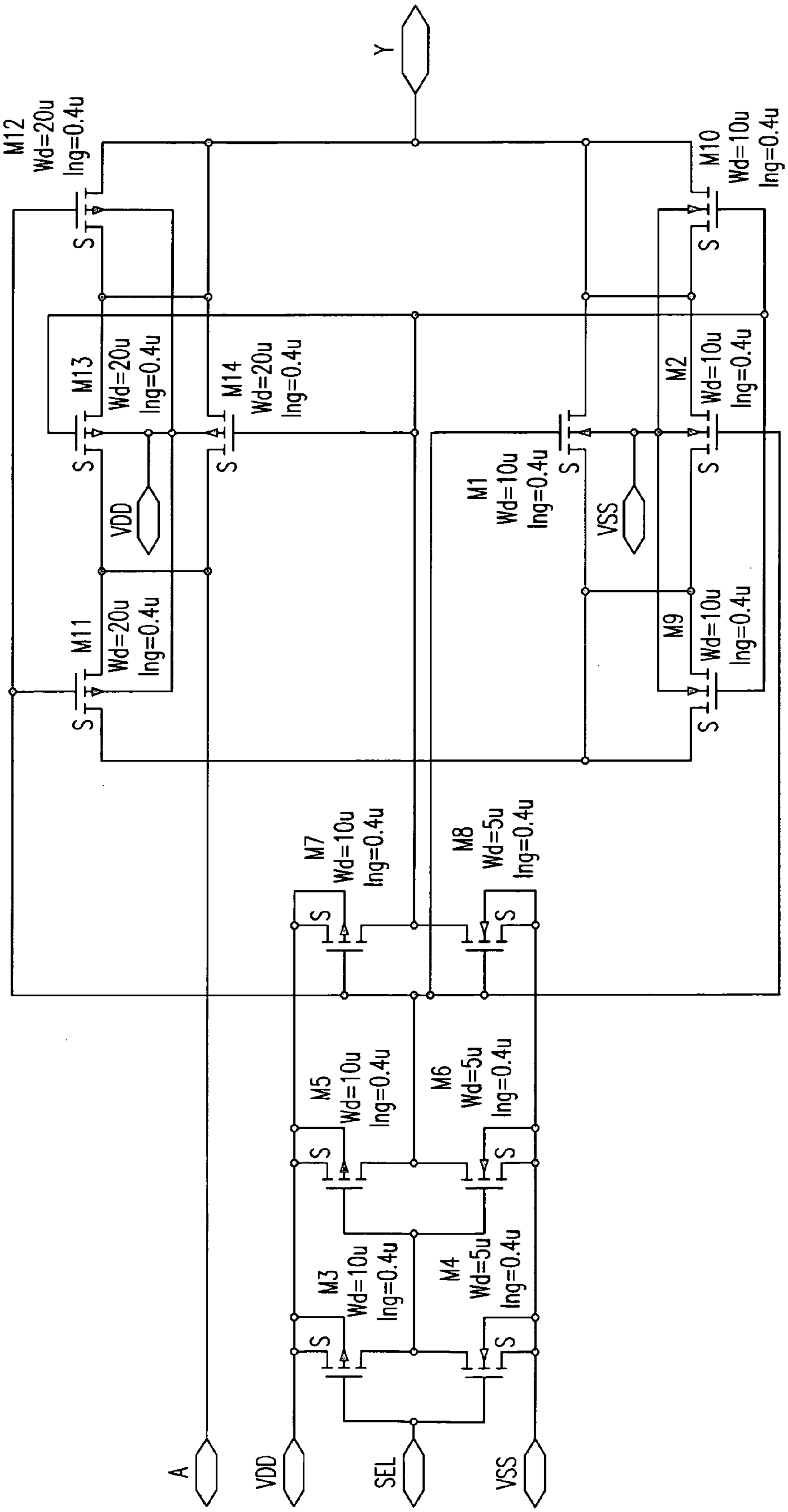
Figure 184:
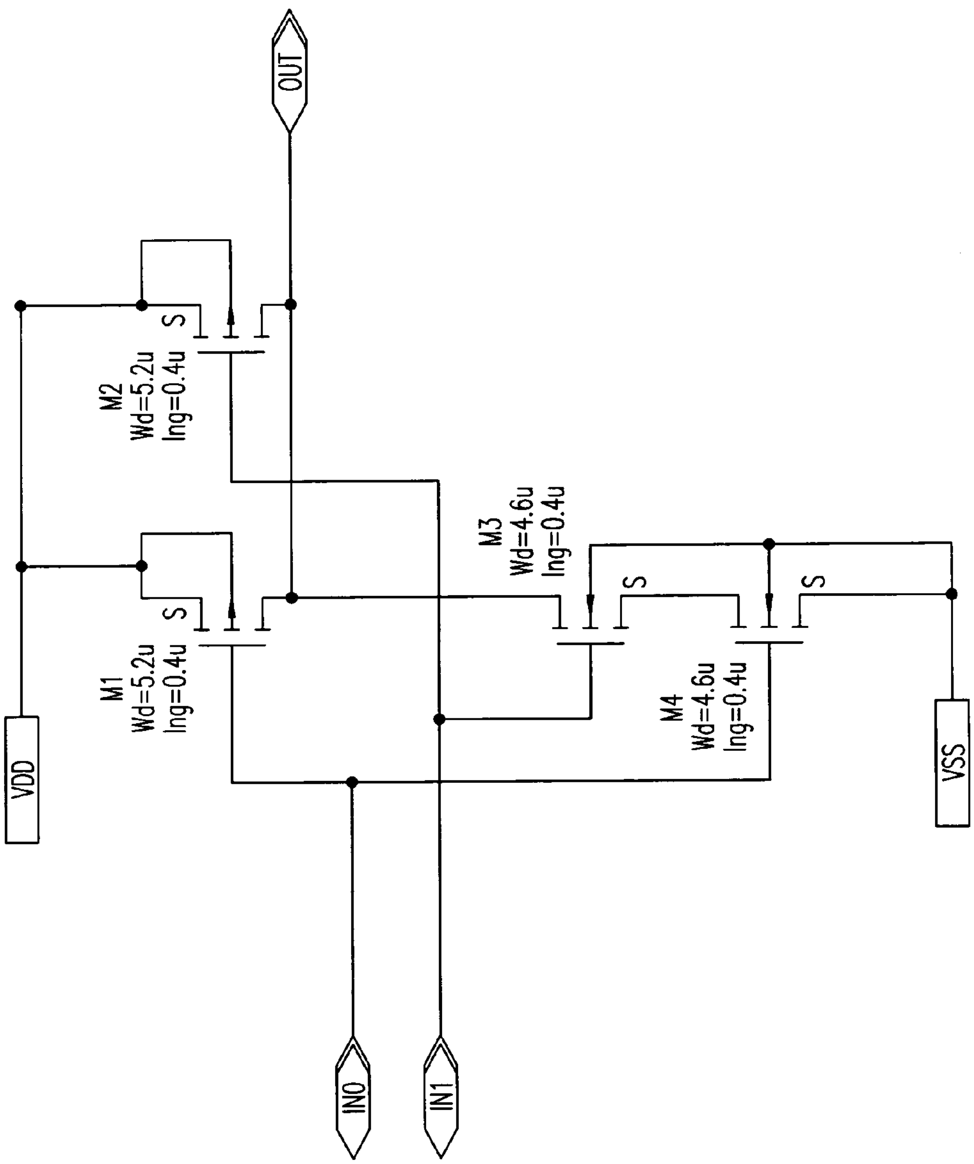
Figure 185:
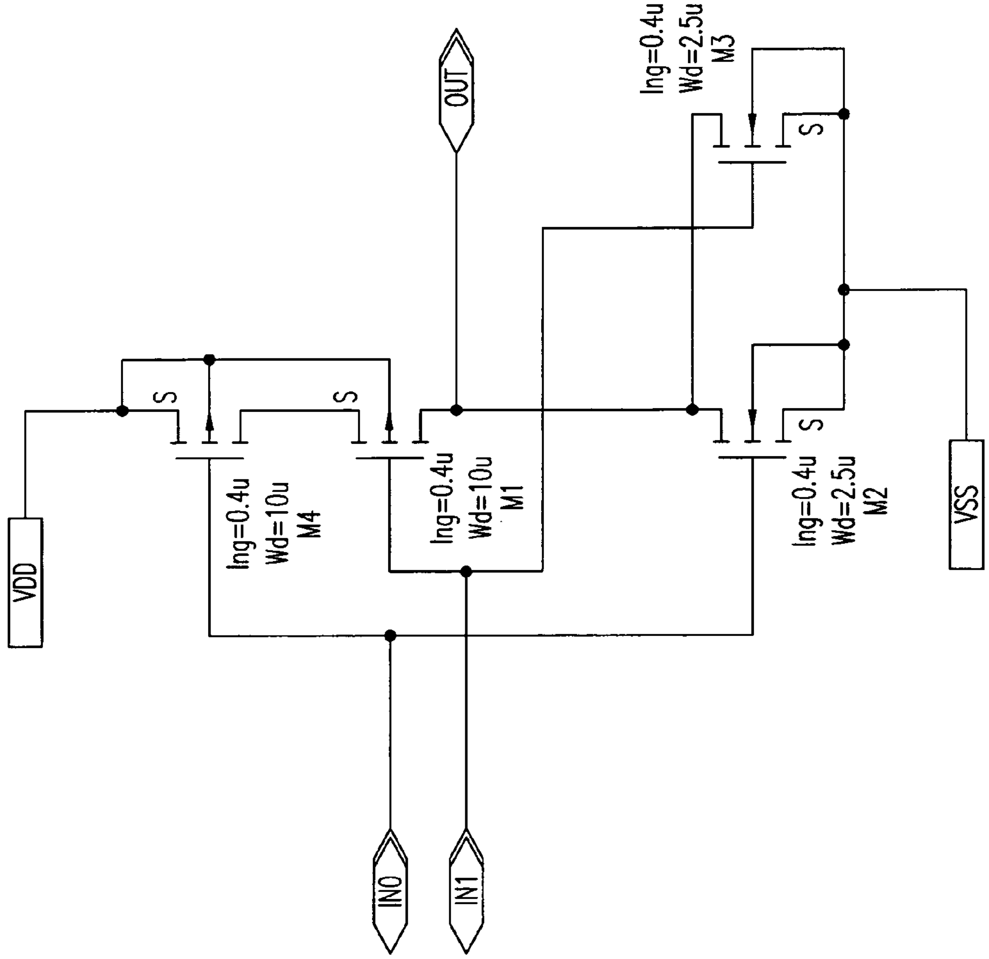
Figure 186:
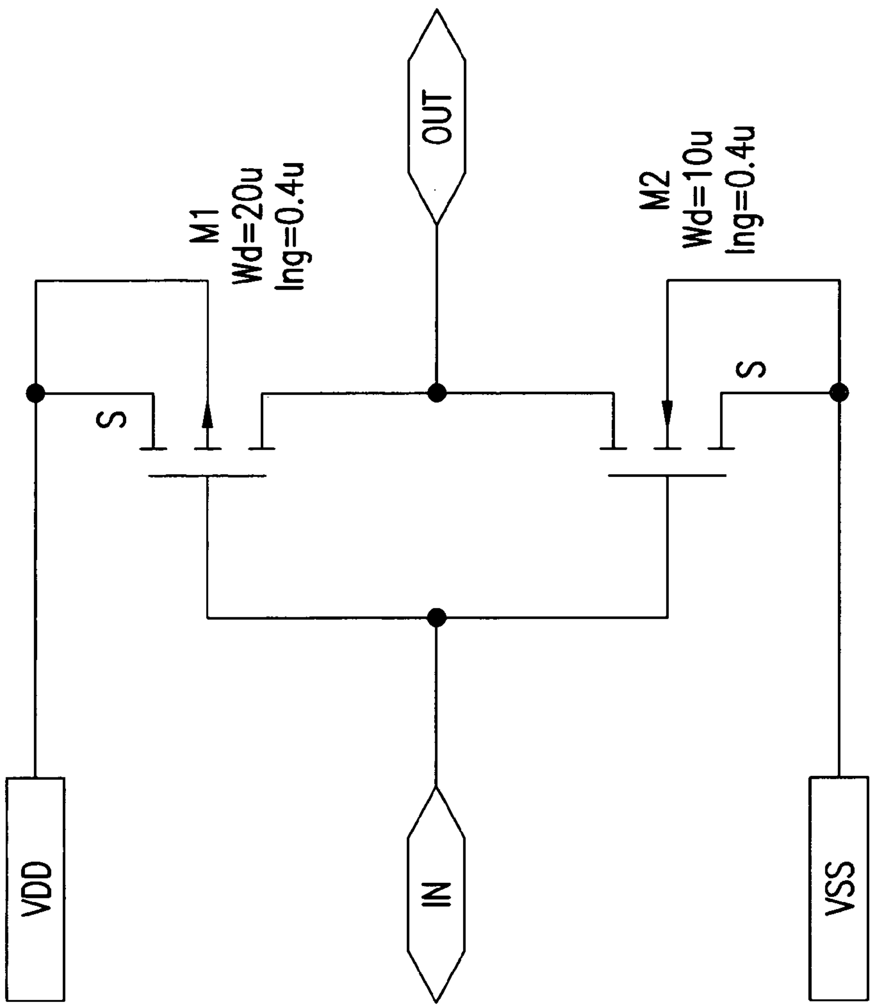
Figure 187:
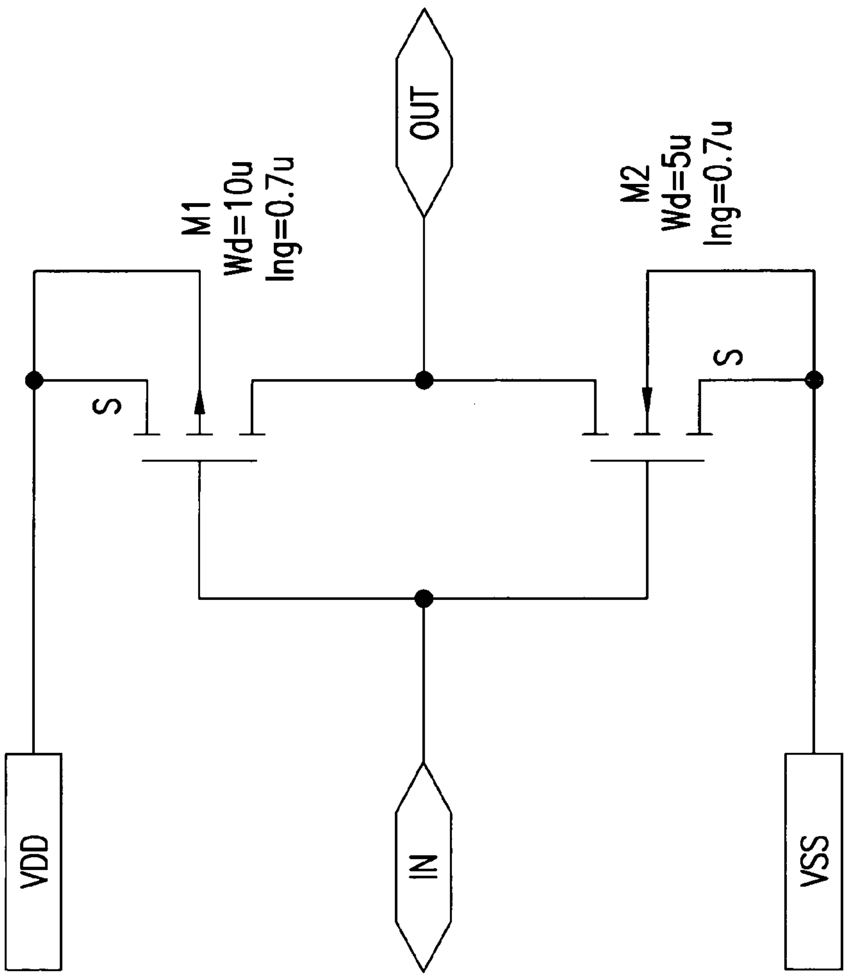
Figure 188:
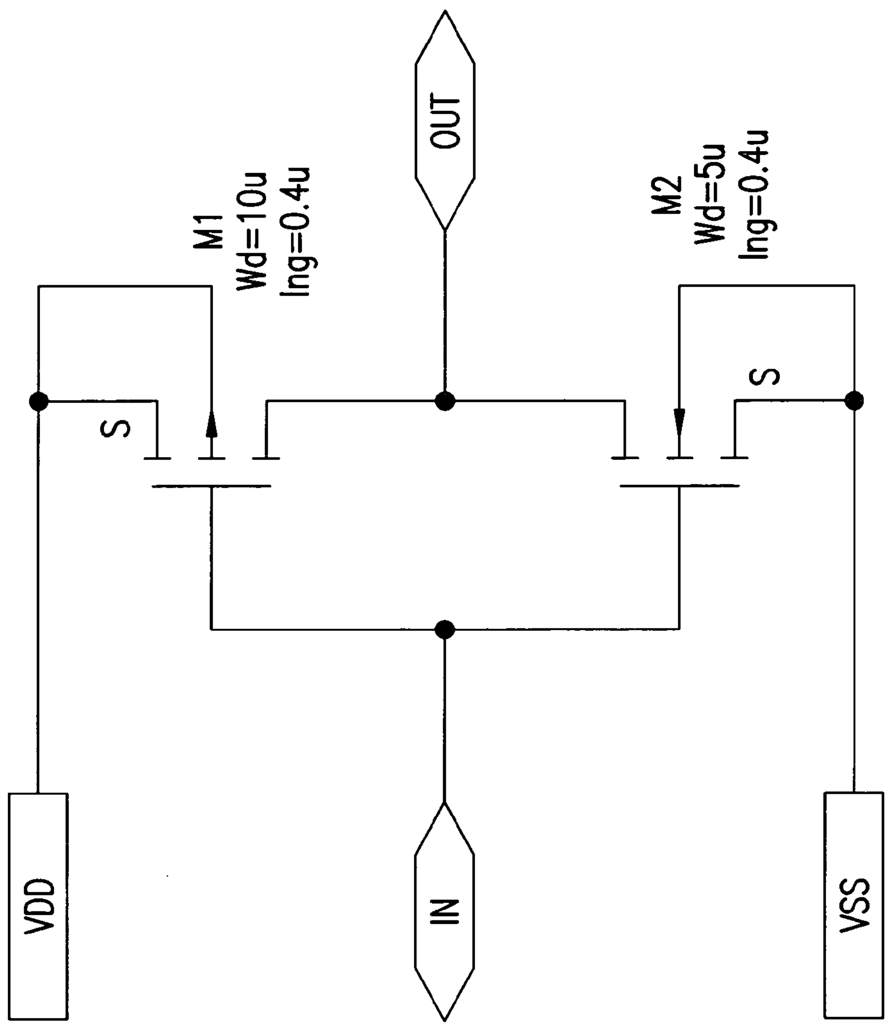
Figure 189:
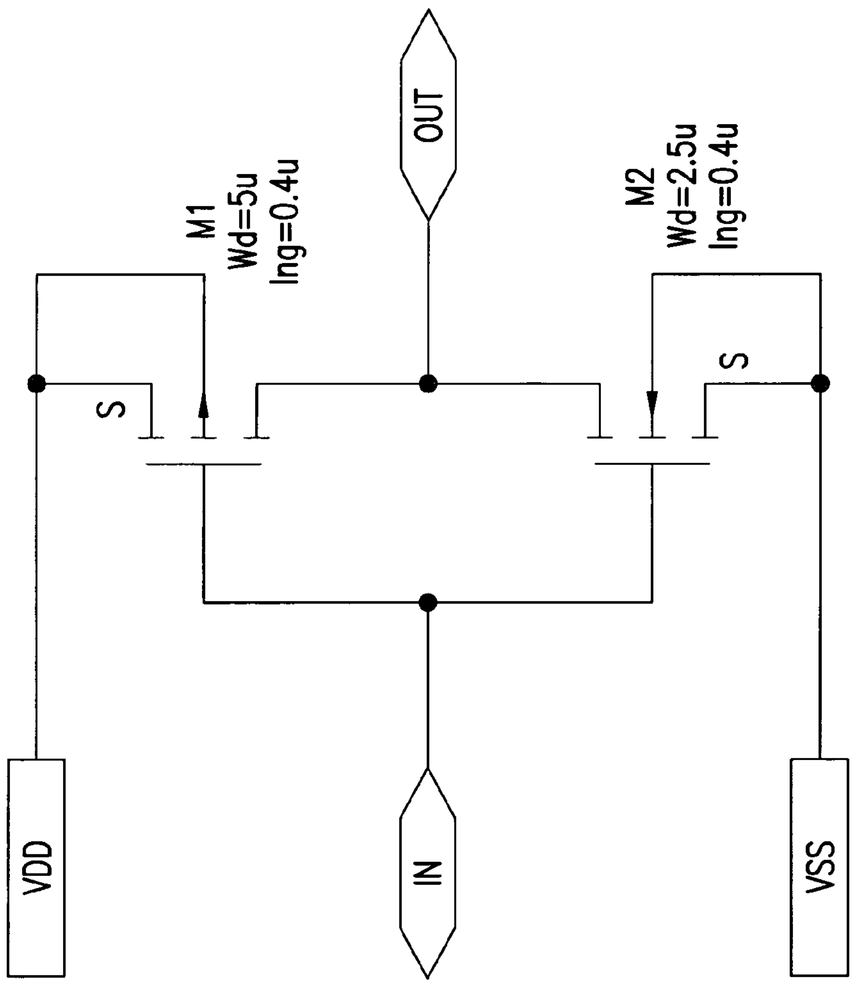
Figure 190:
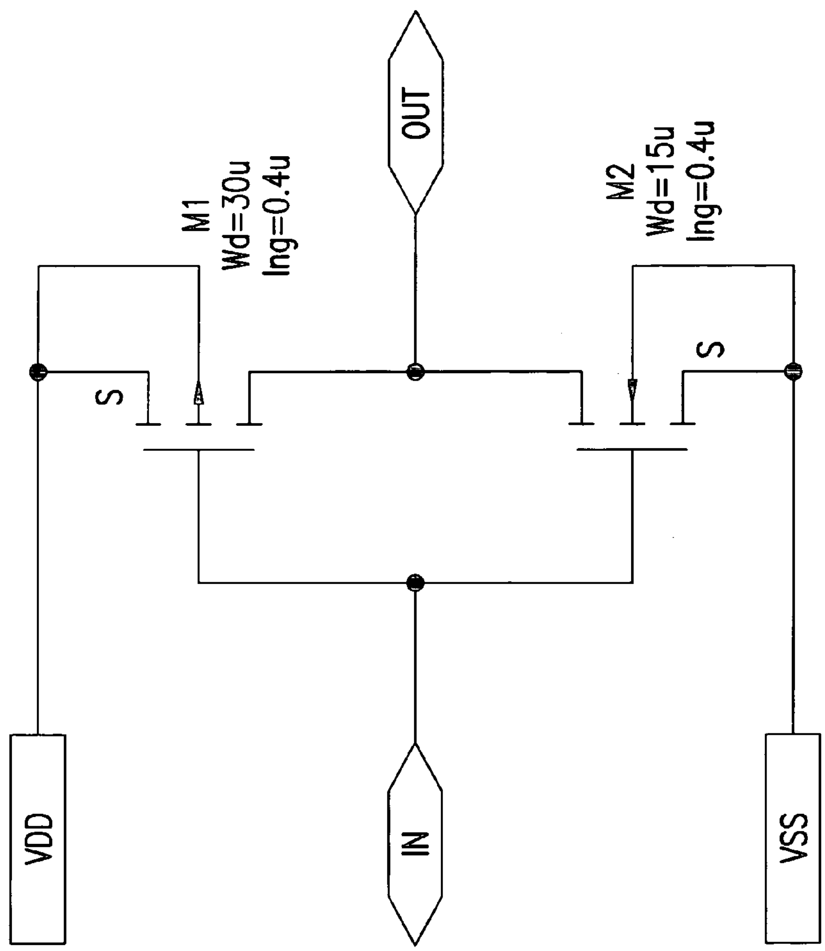
Figure 191:
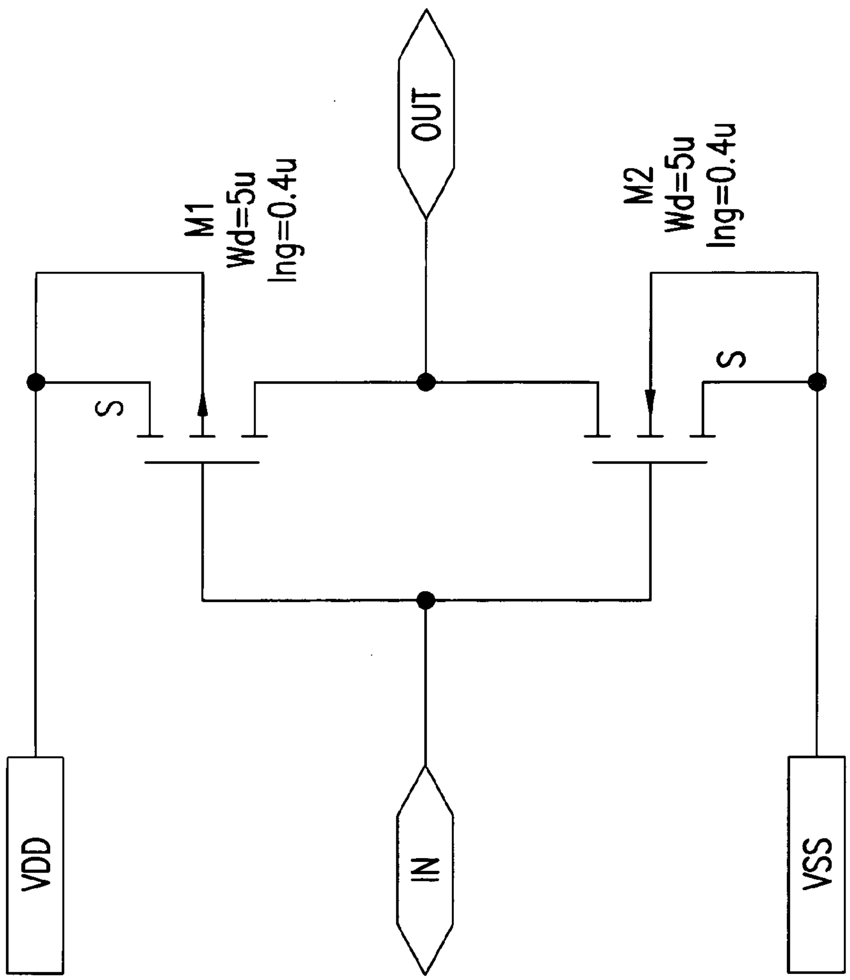
Figure 192:
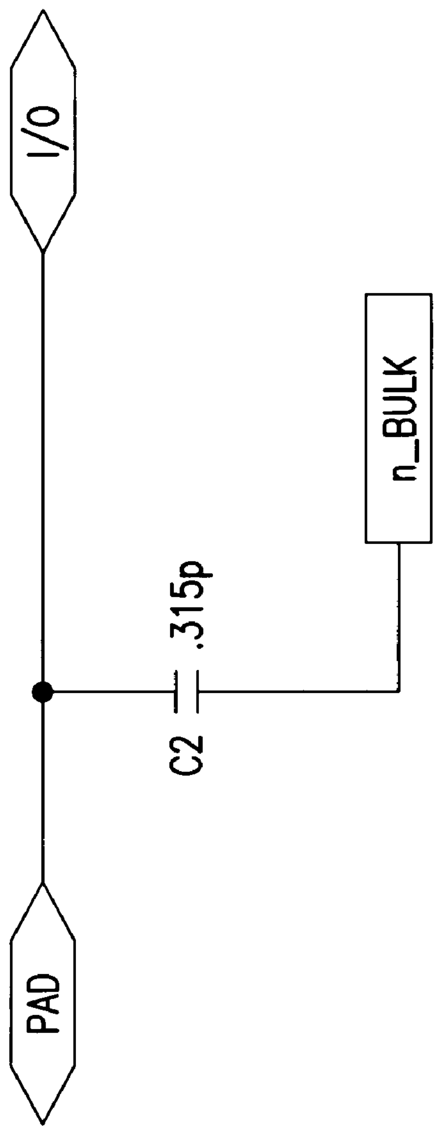
Figure 193:
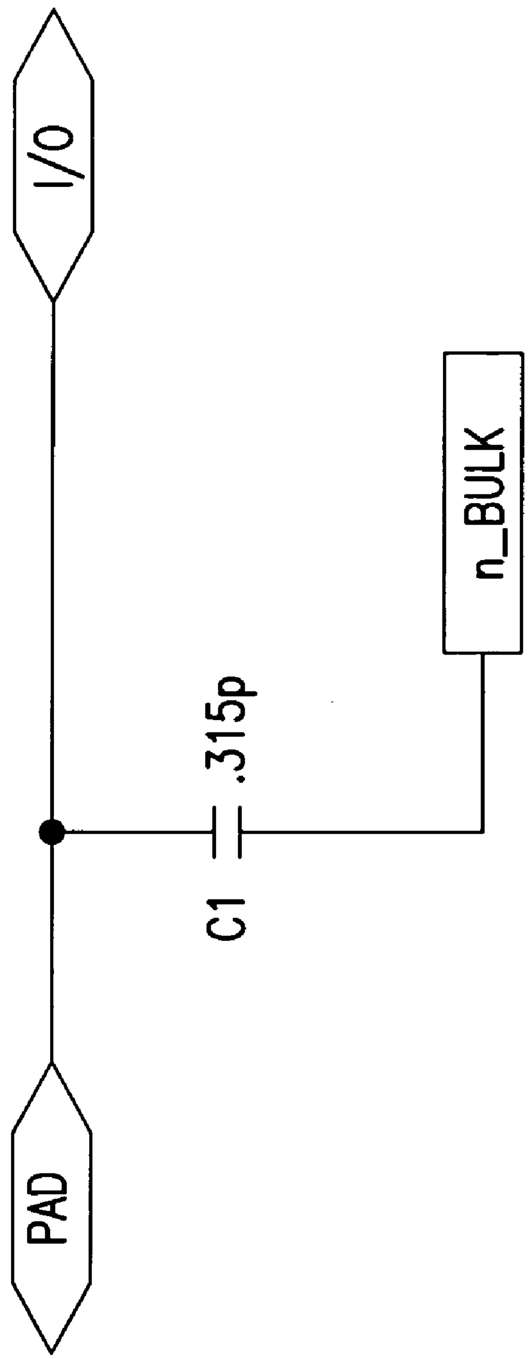
Figure 194:
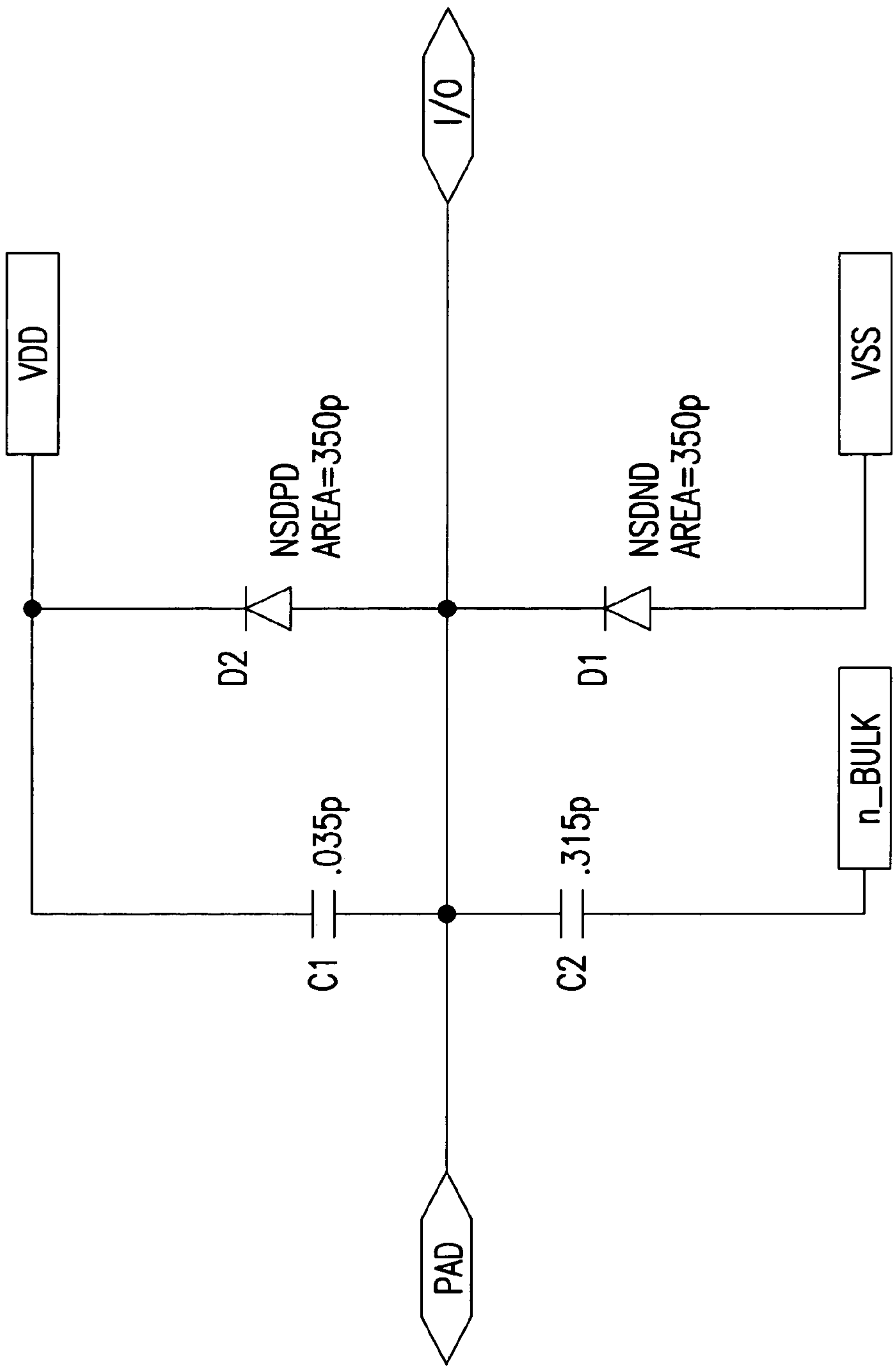
Figure 195:
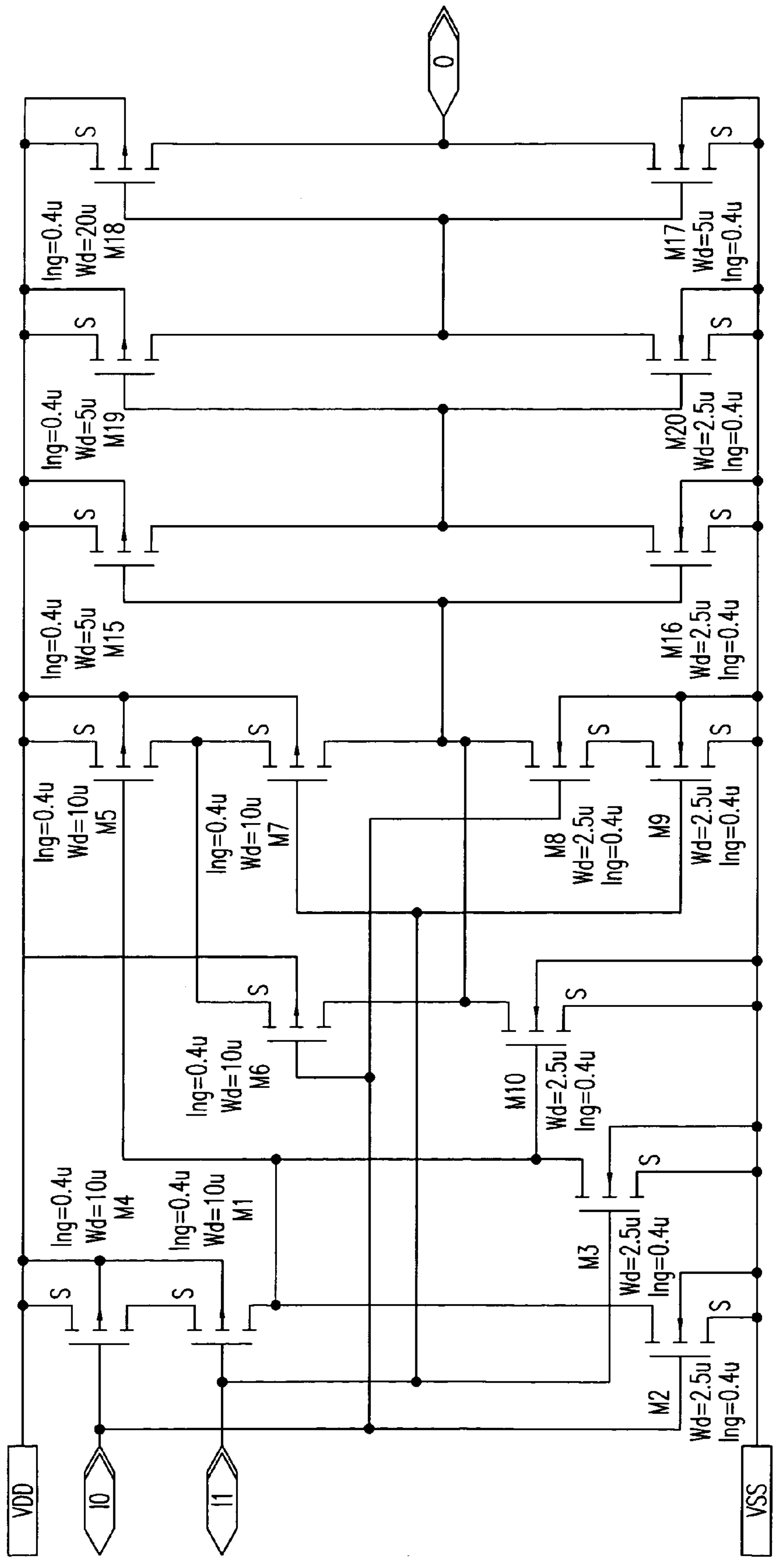
Figure 196:
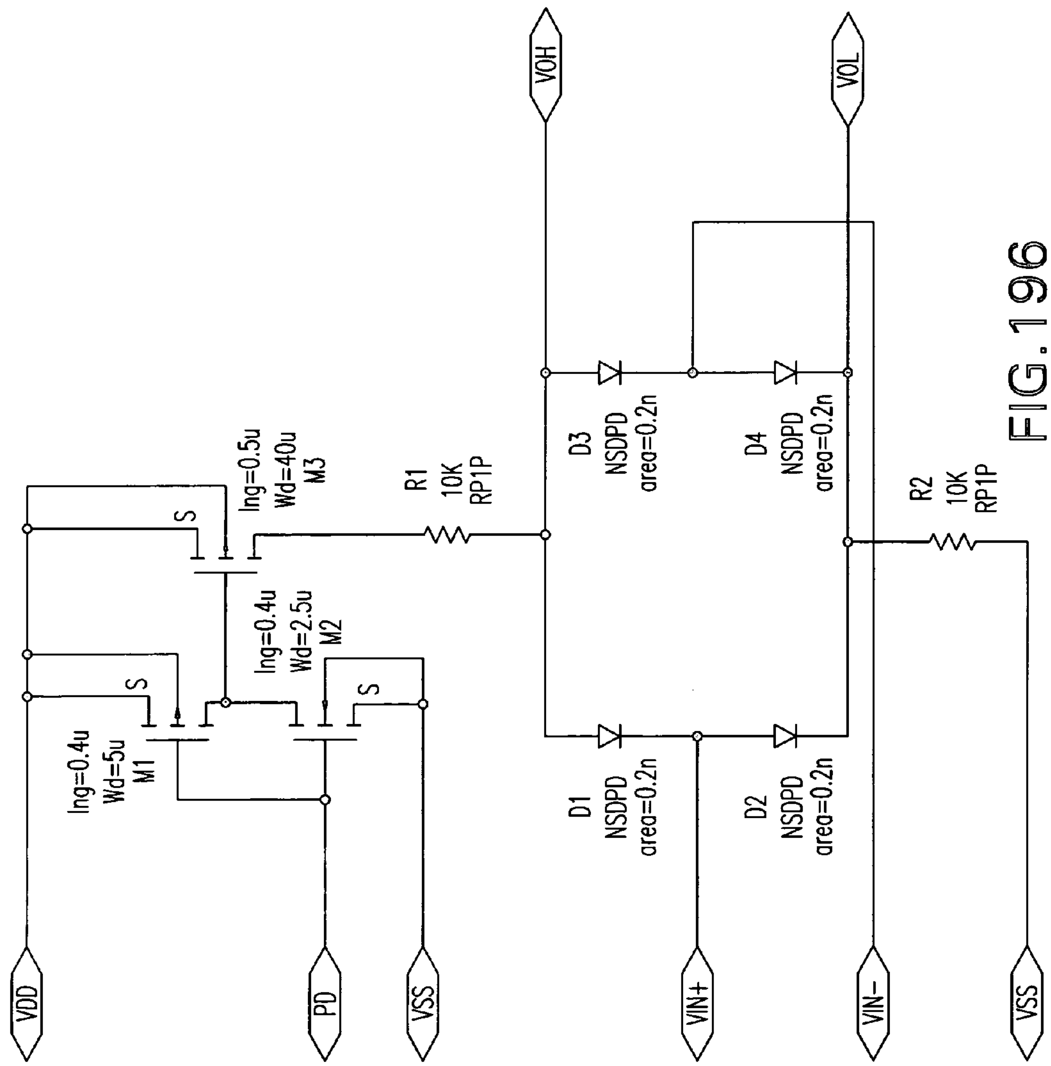
Figure 197:
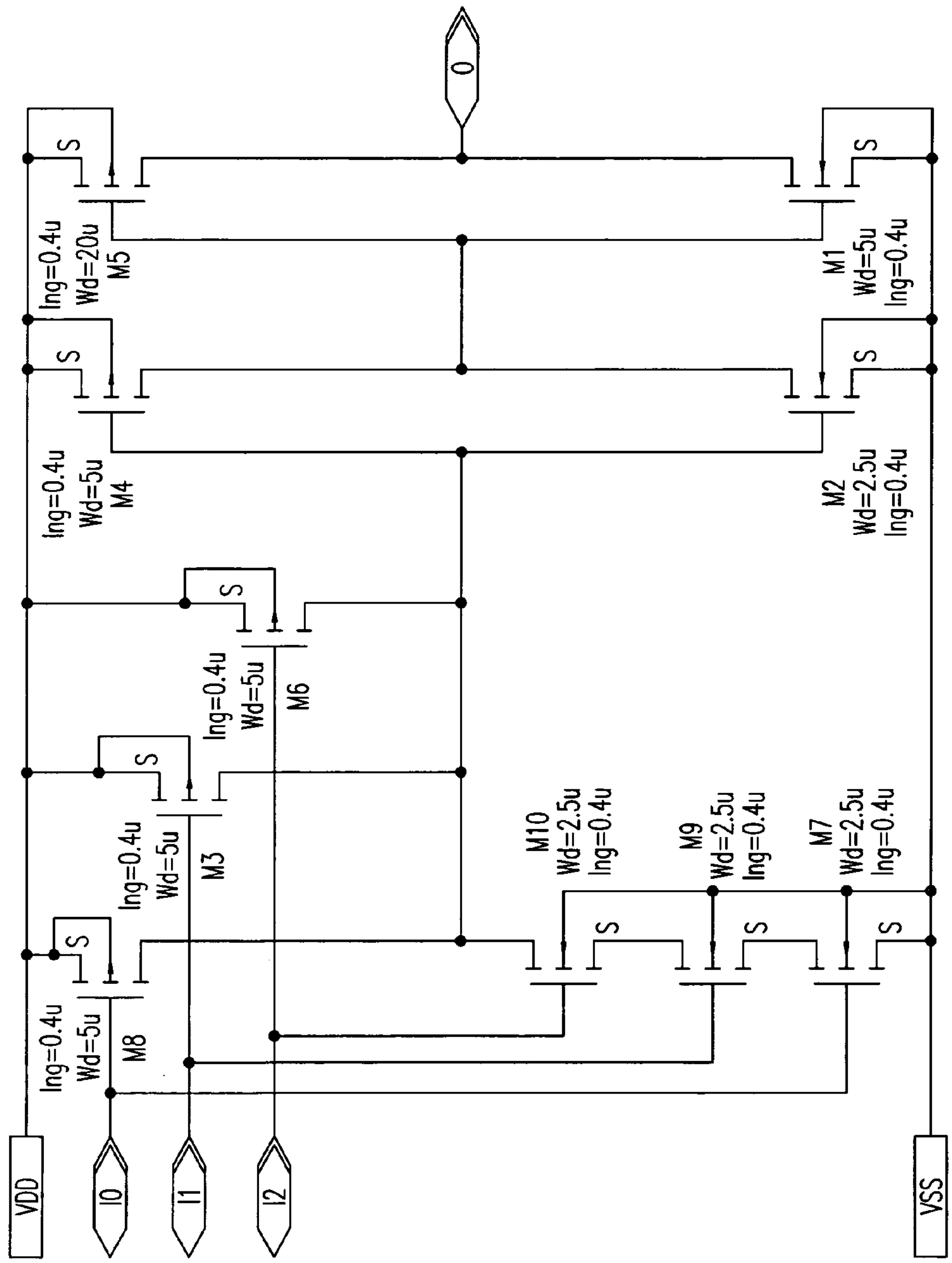
Figure 198:
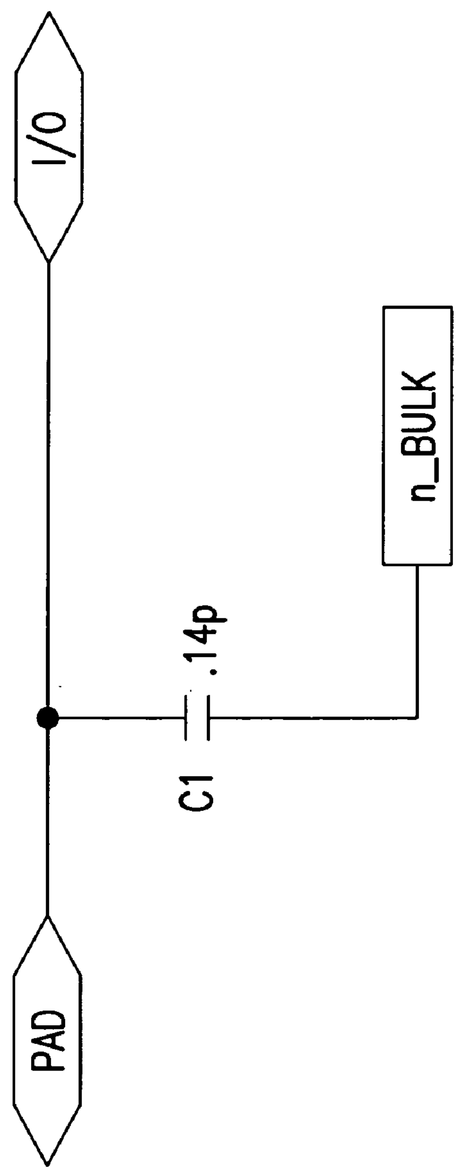
Figure 199:
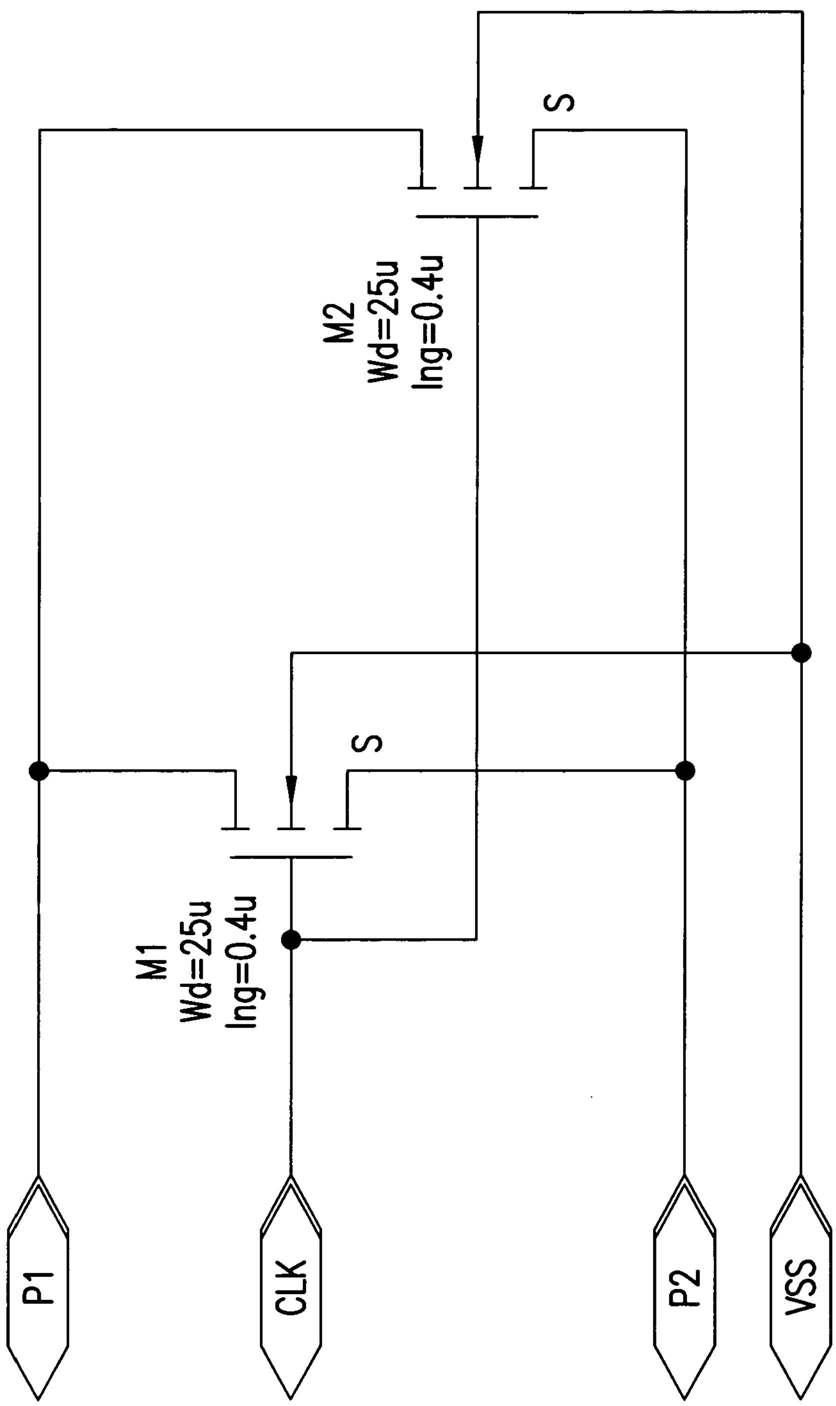
Figure 200:
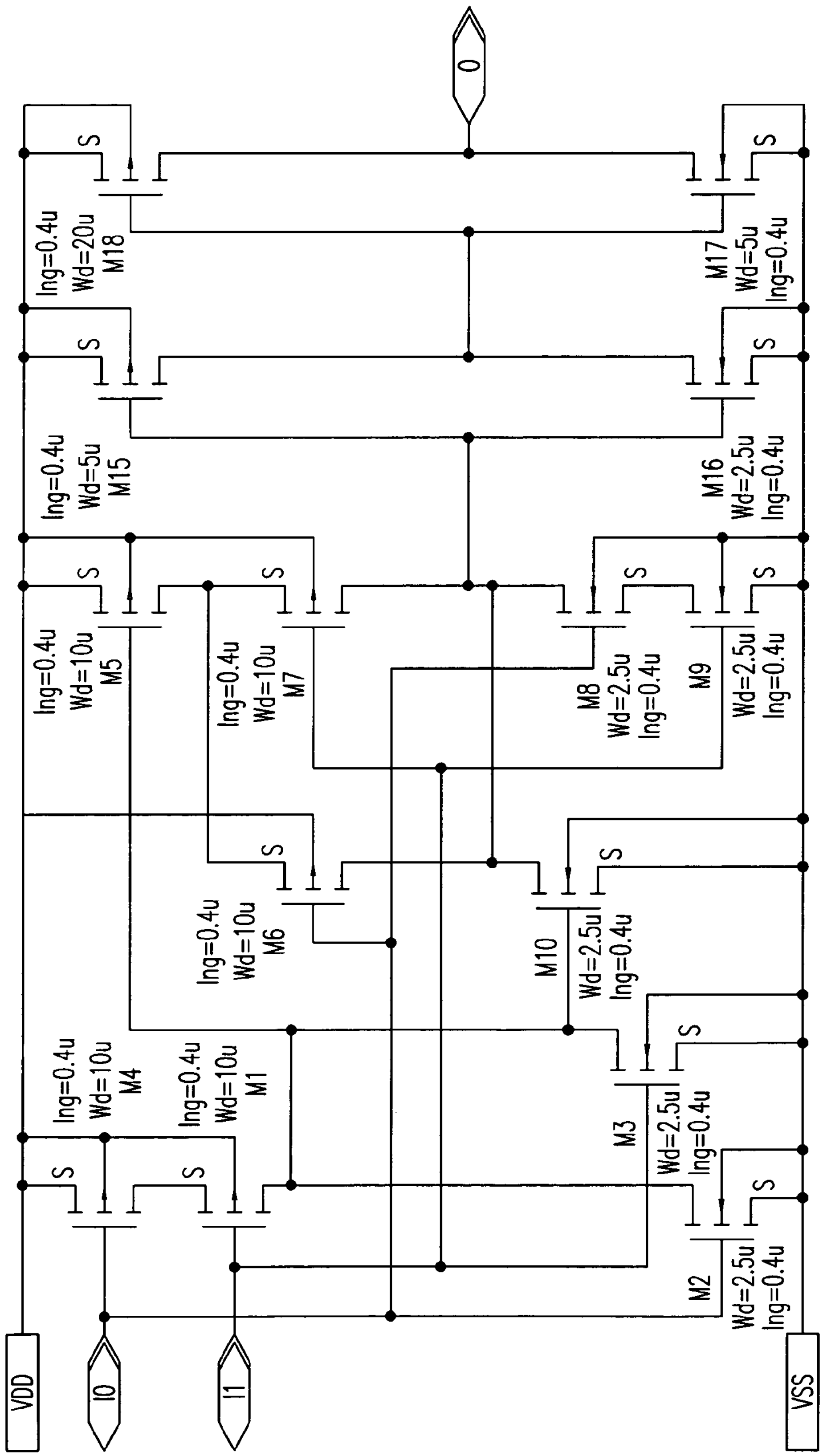
Figure 201A:
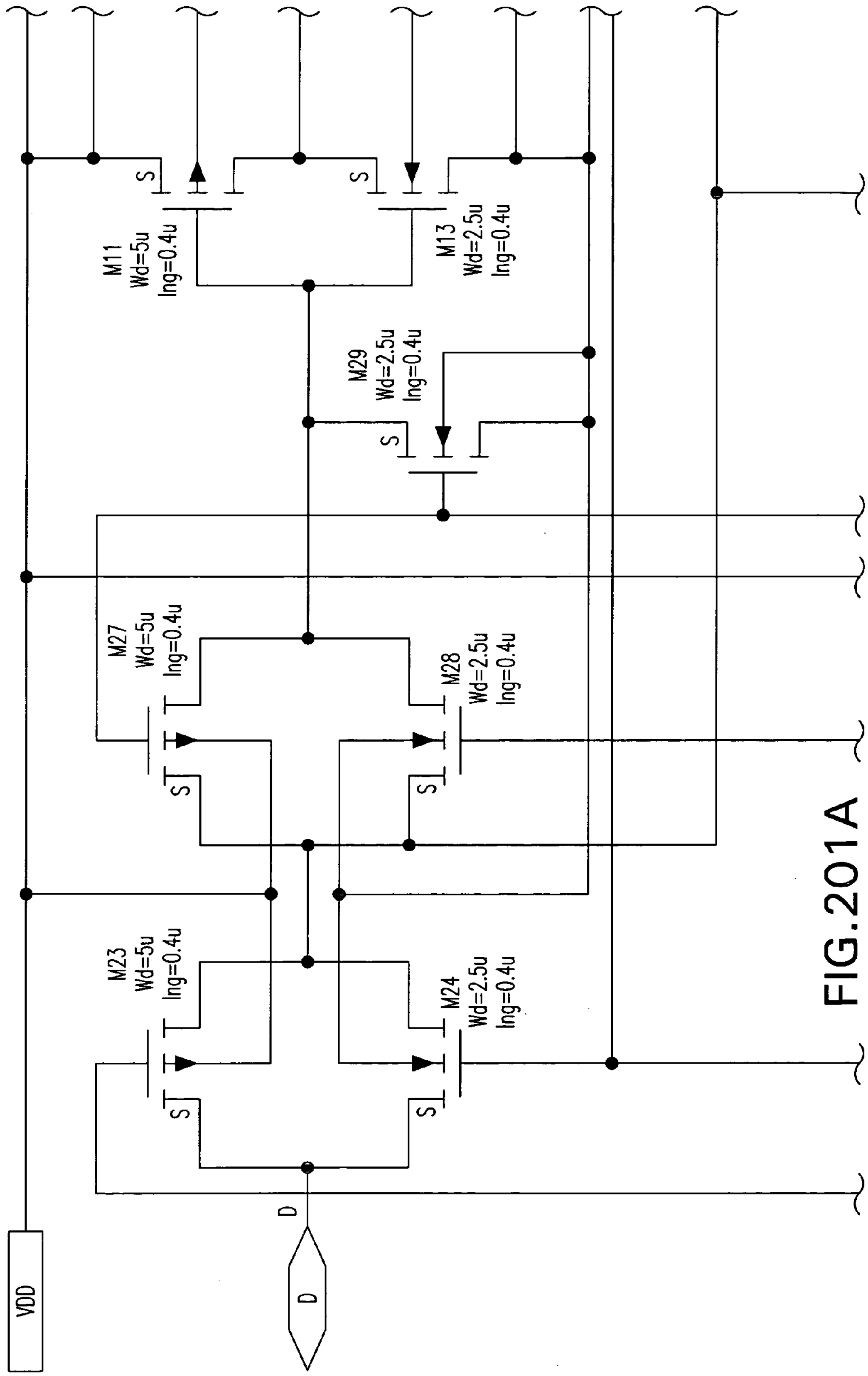
Figure 201B:
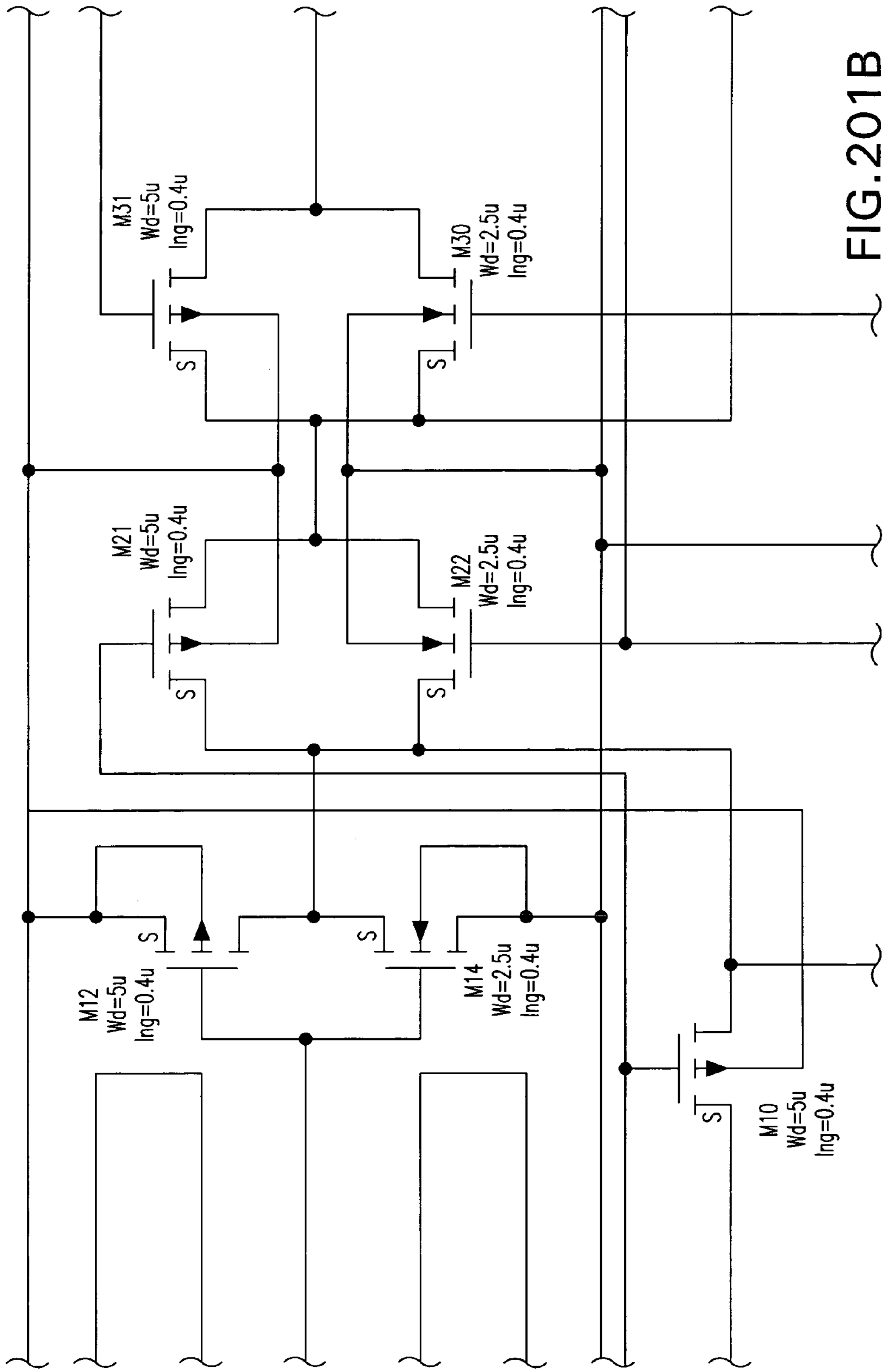
Figure 201C:
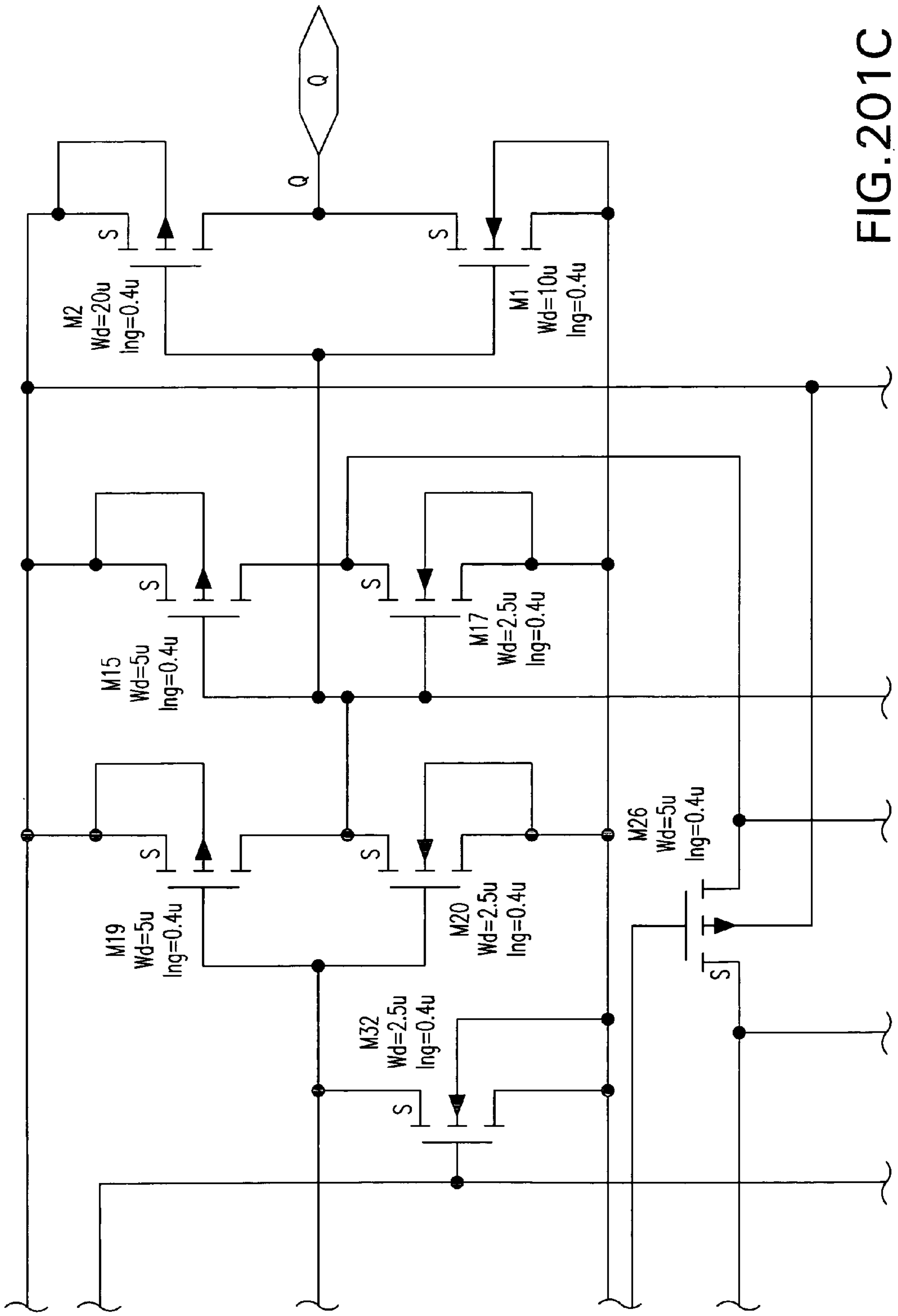
Figure 201D:
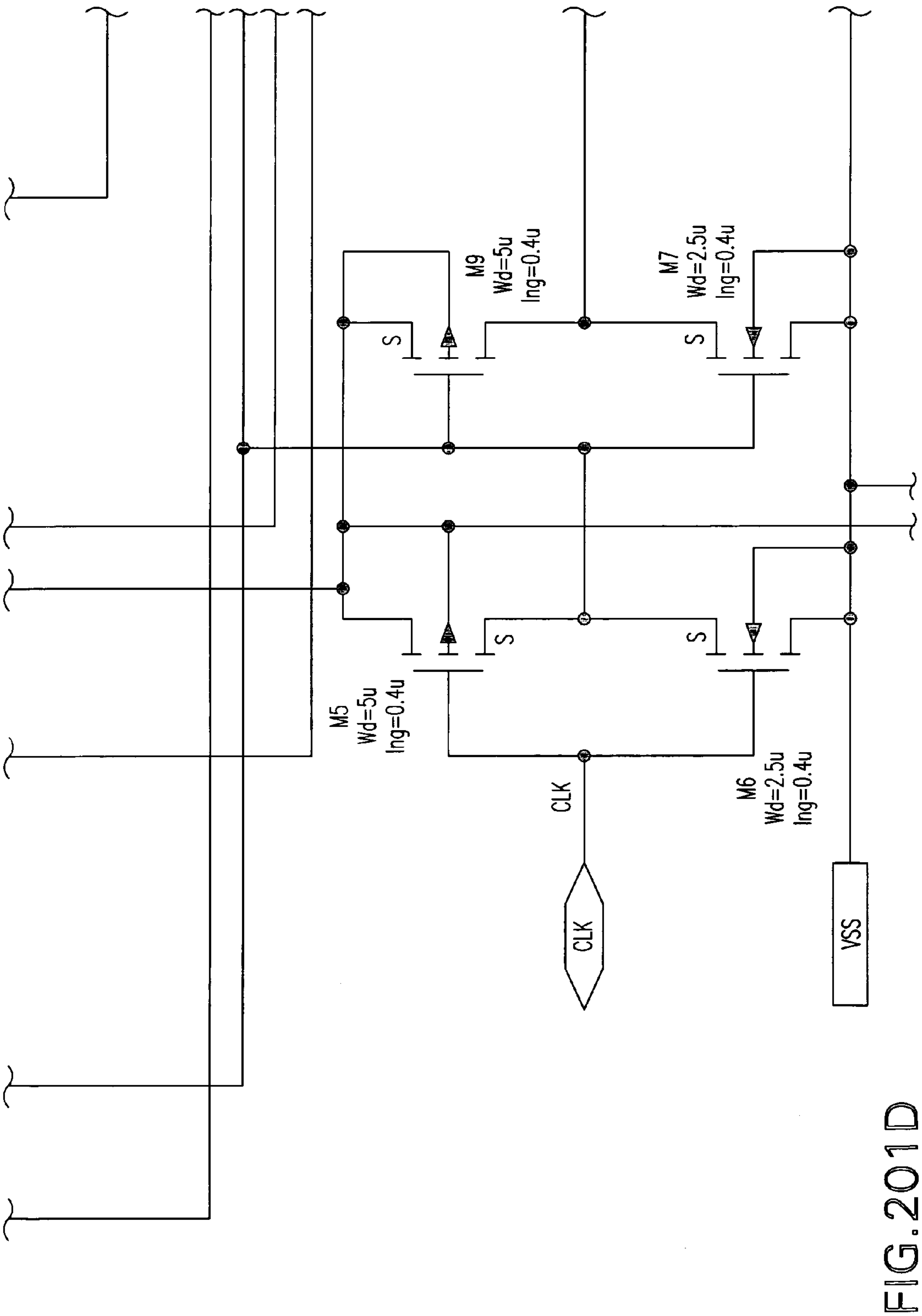
Figure 201E:
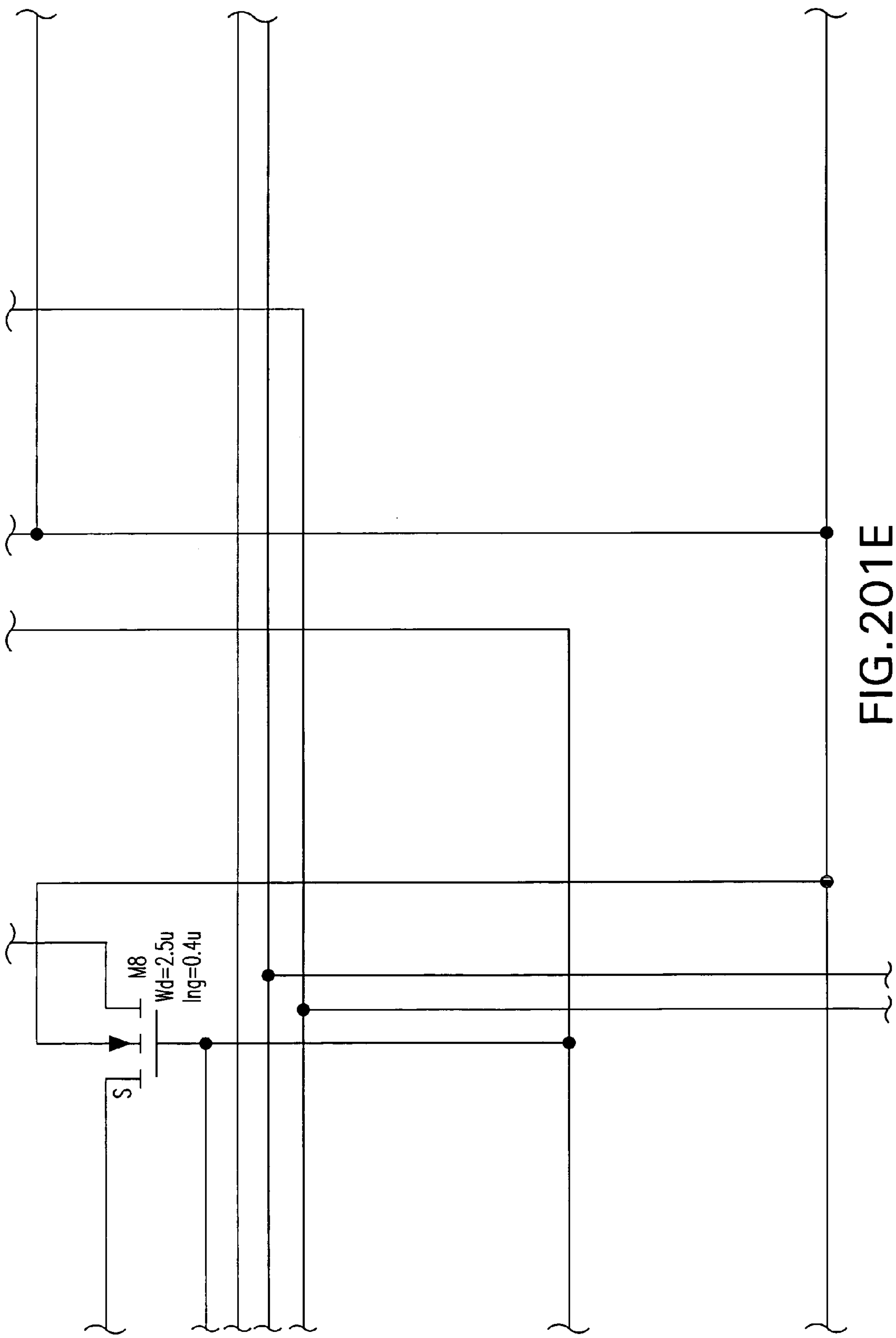
Figure 201F:
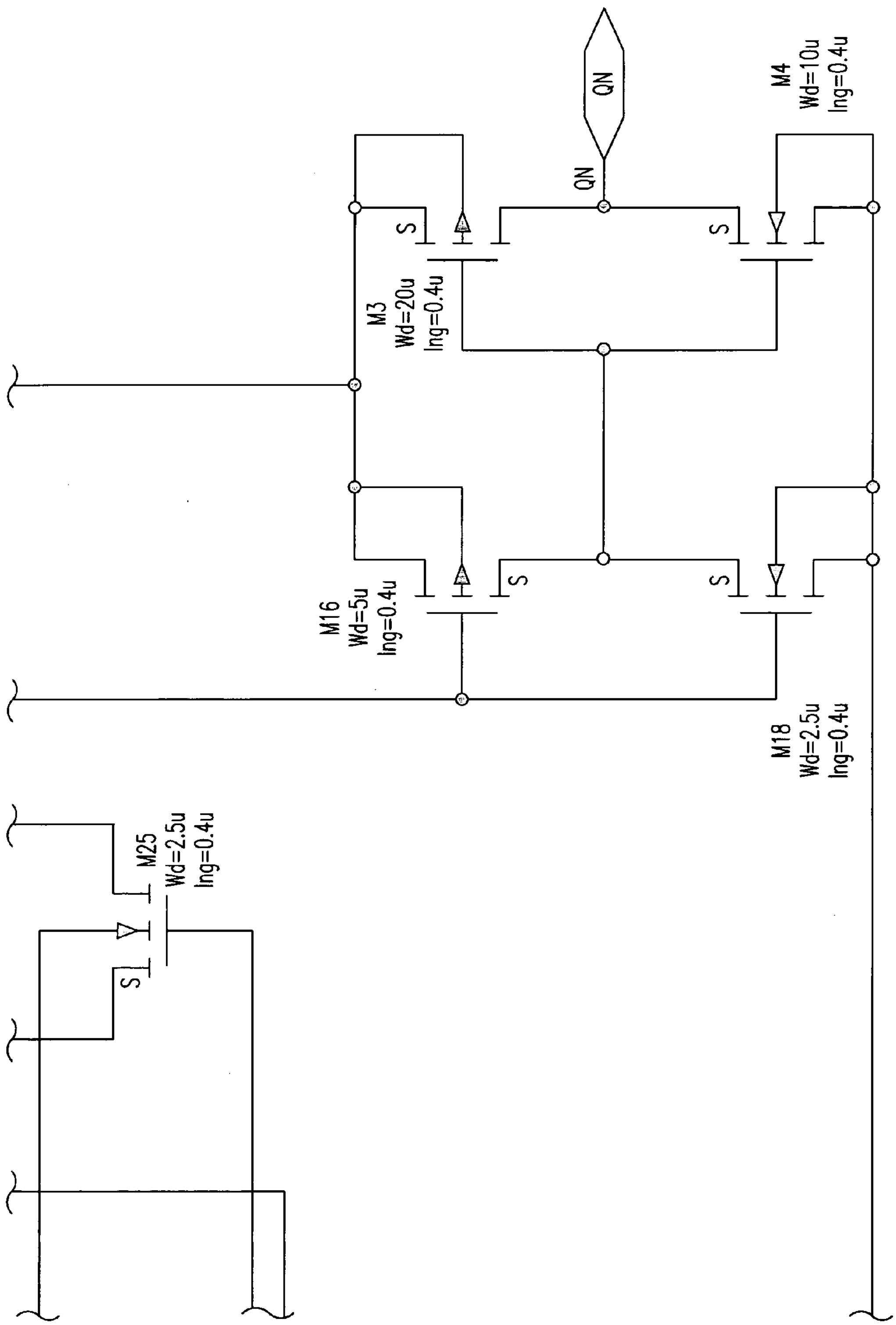
Figure 201G:
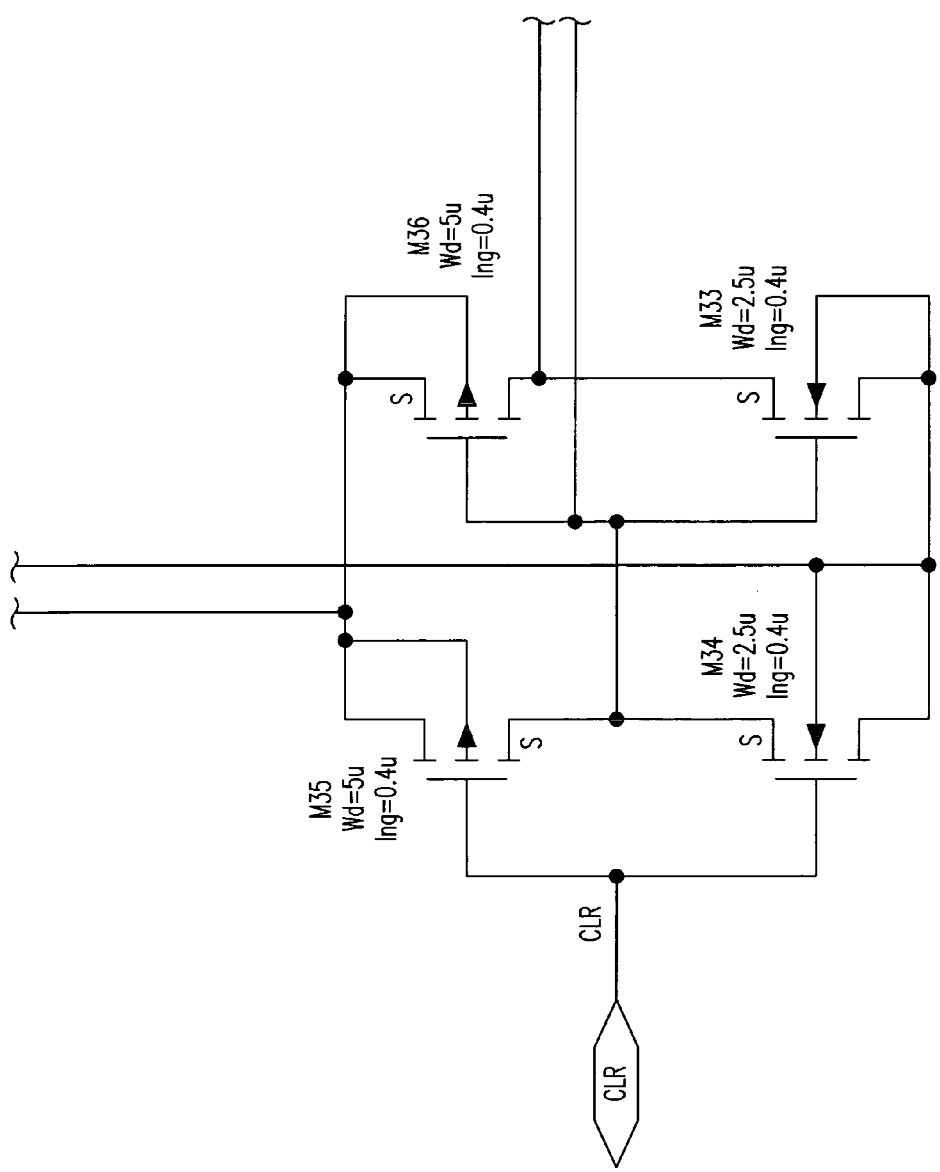
Figure 201H:
Figure 202:
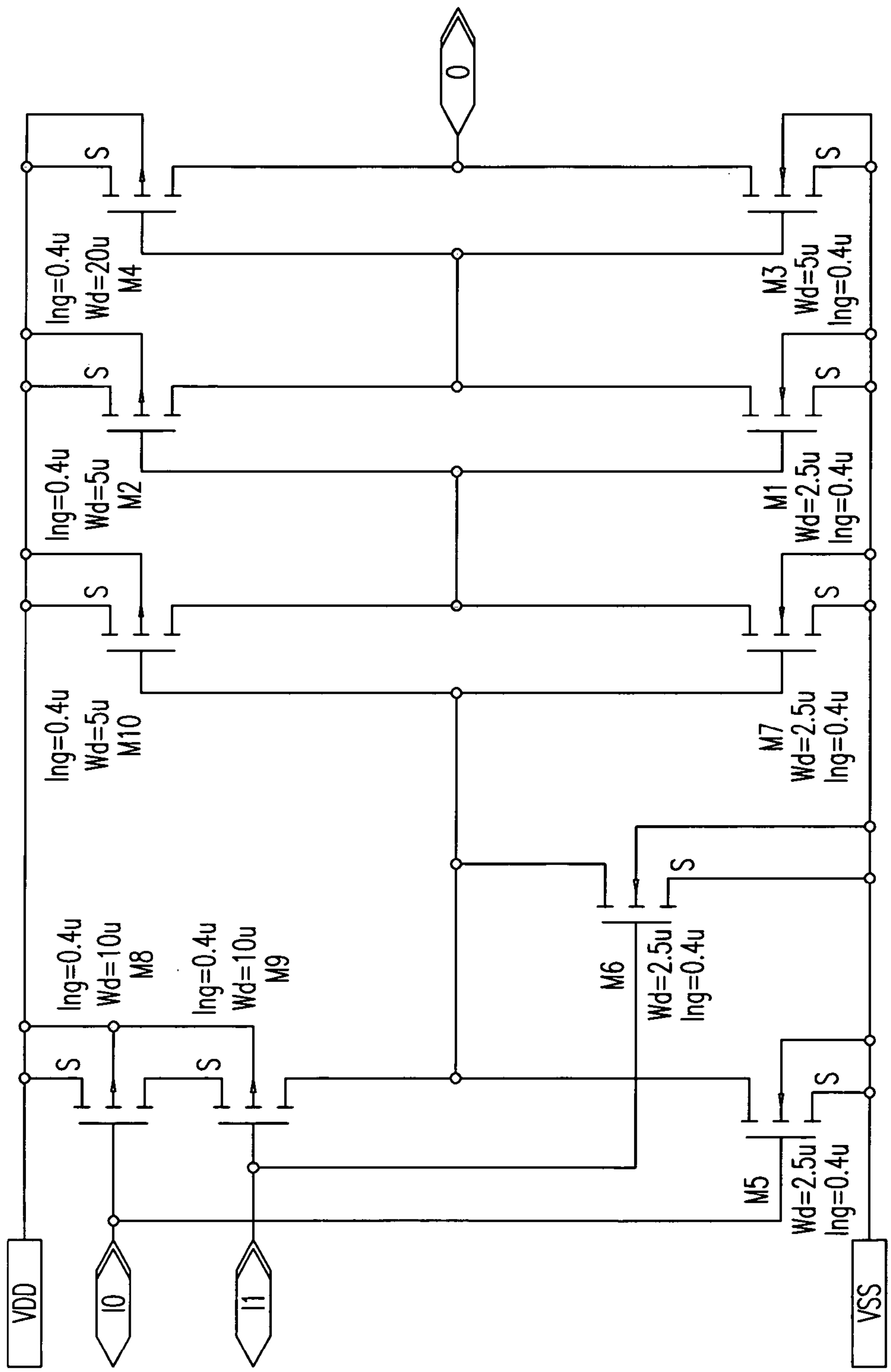
Figure 203:
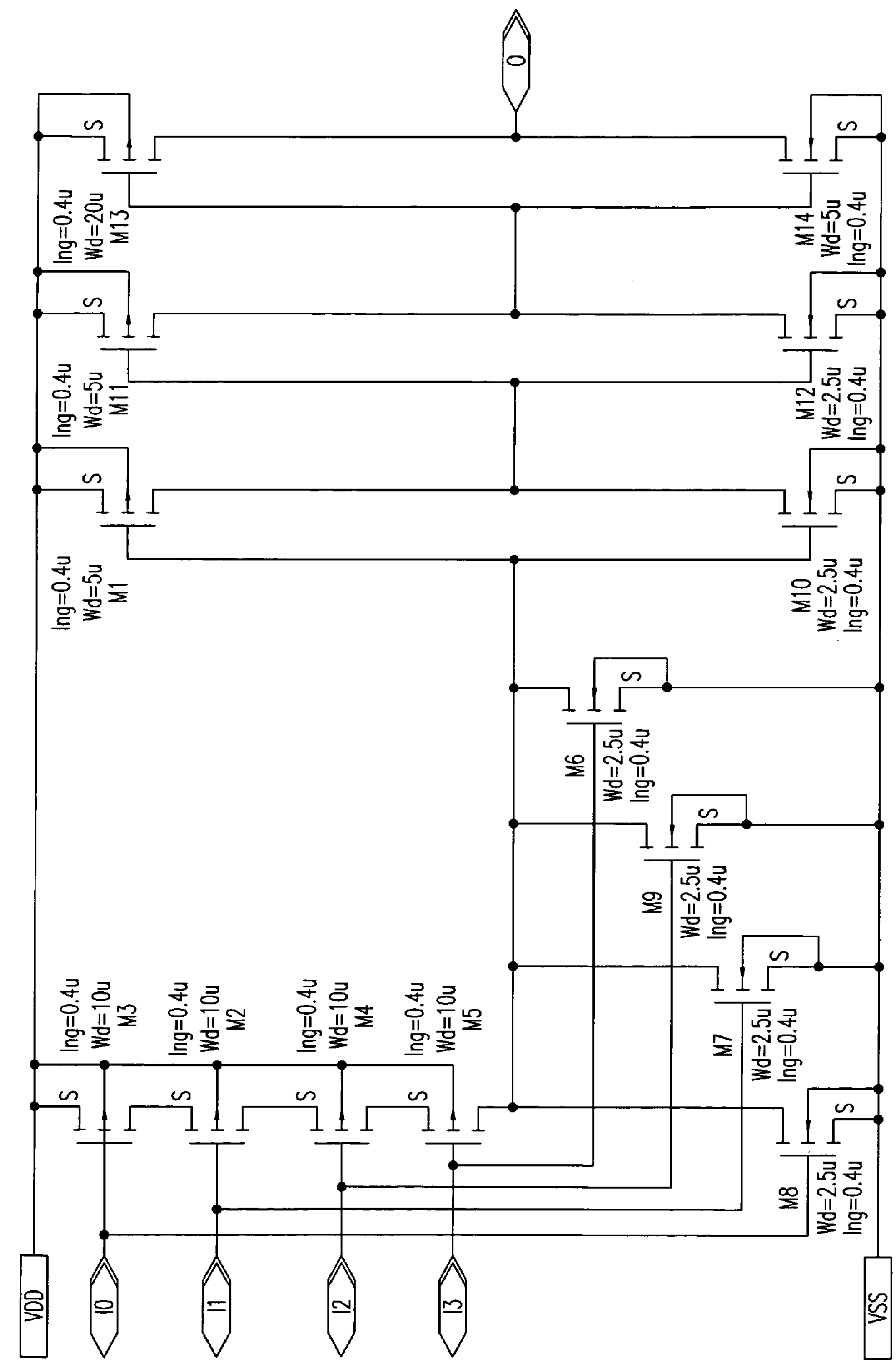
Figure 204:
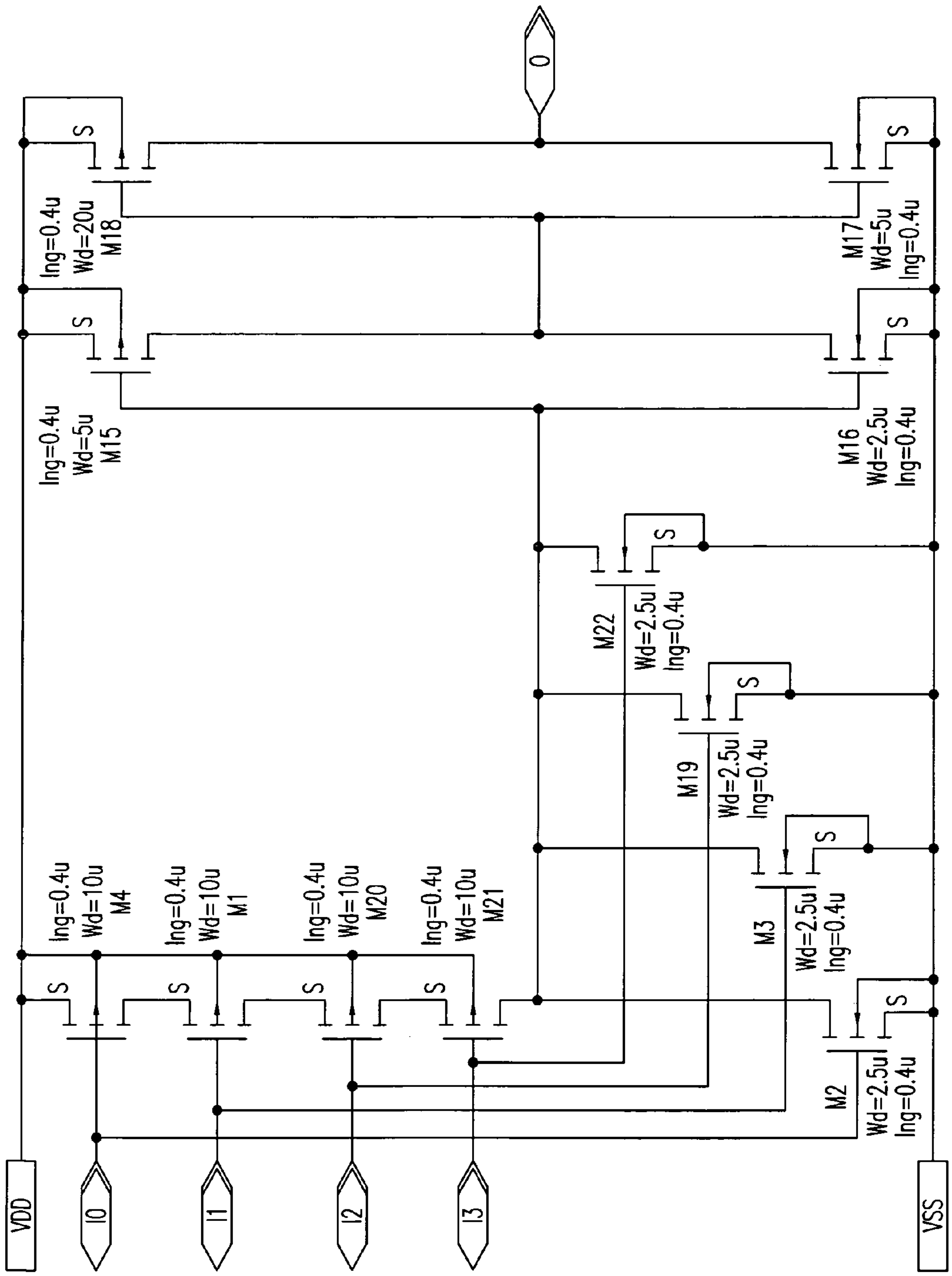
Figure 205:
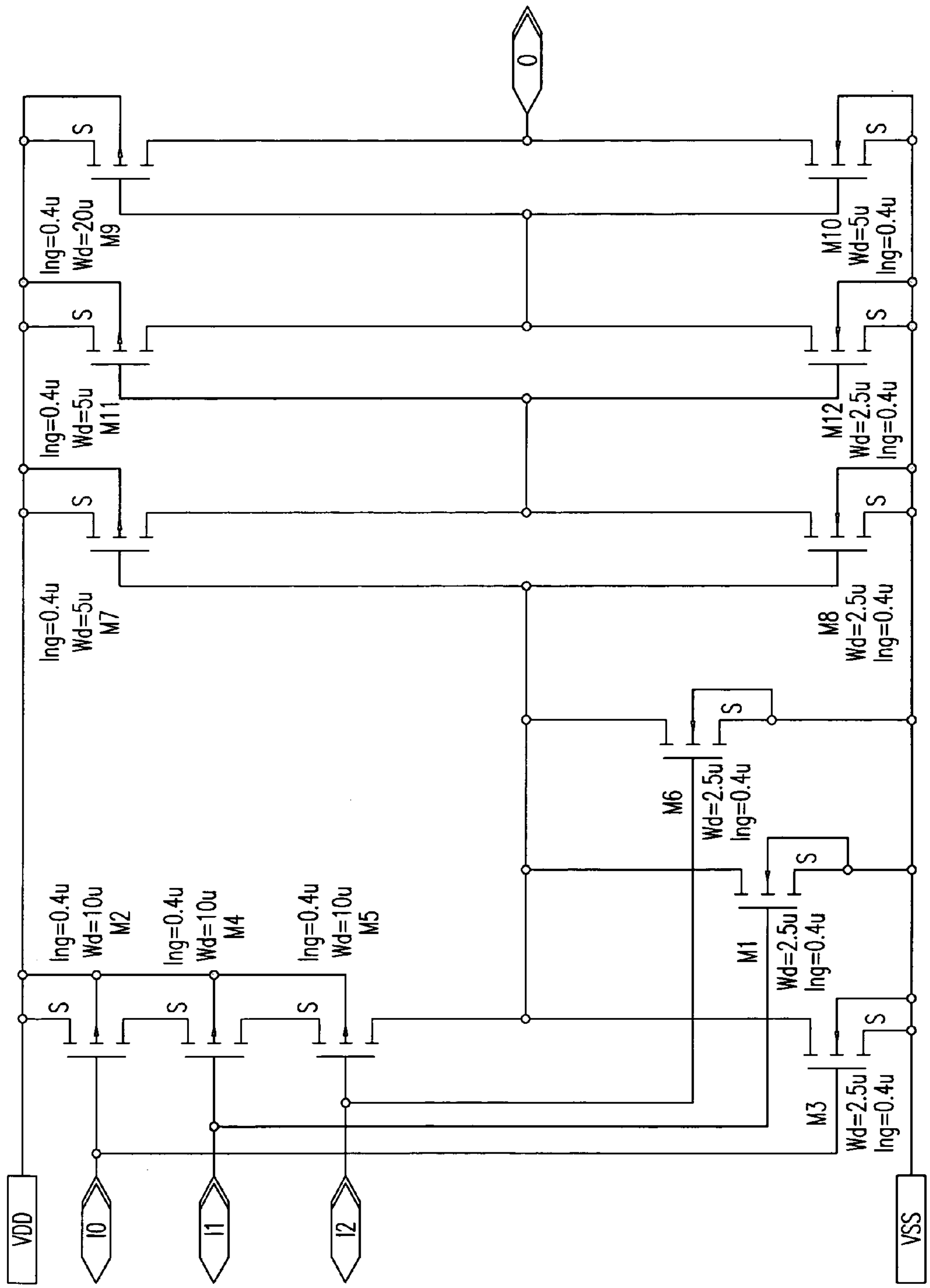
Figure 206:
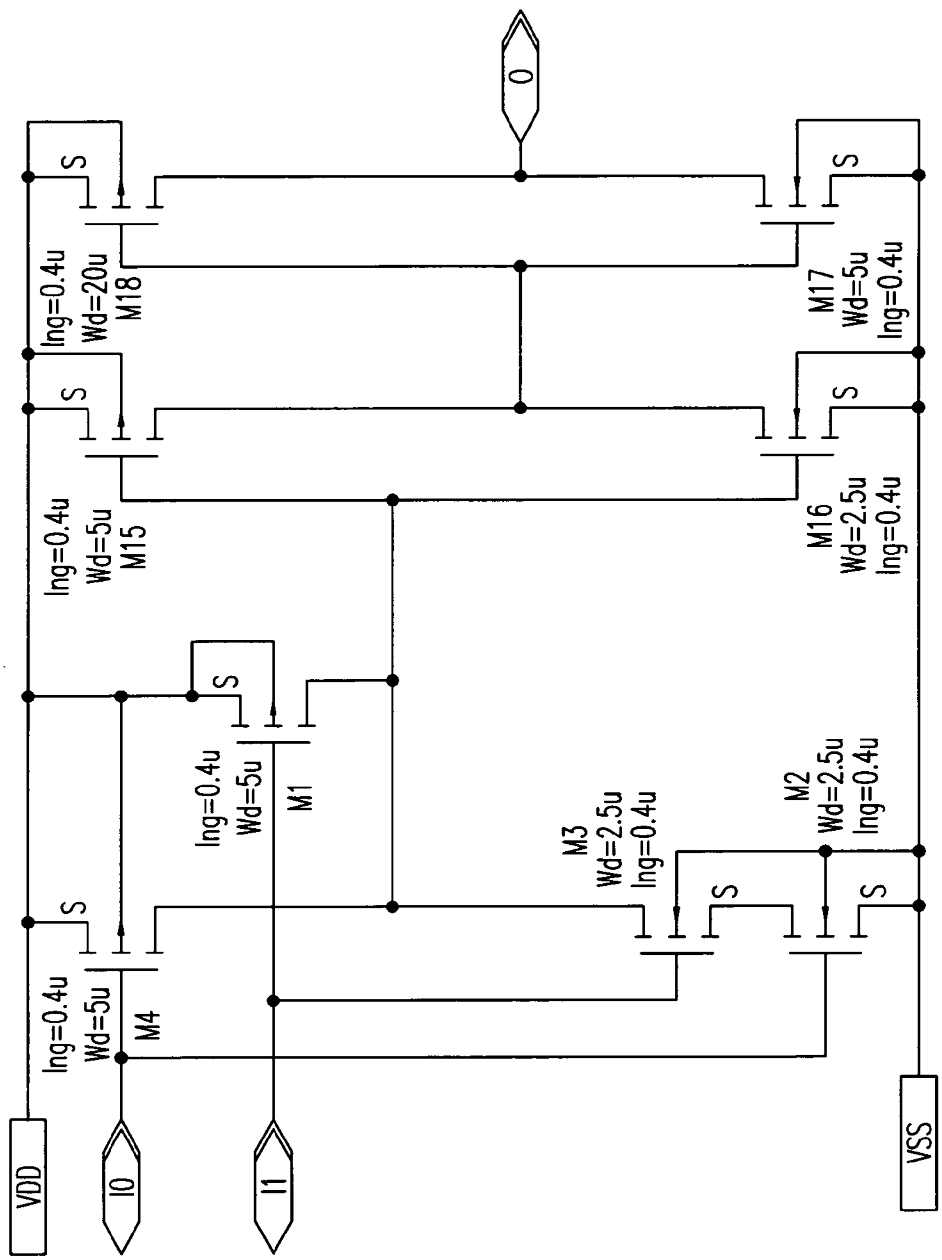
Figure 207:
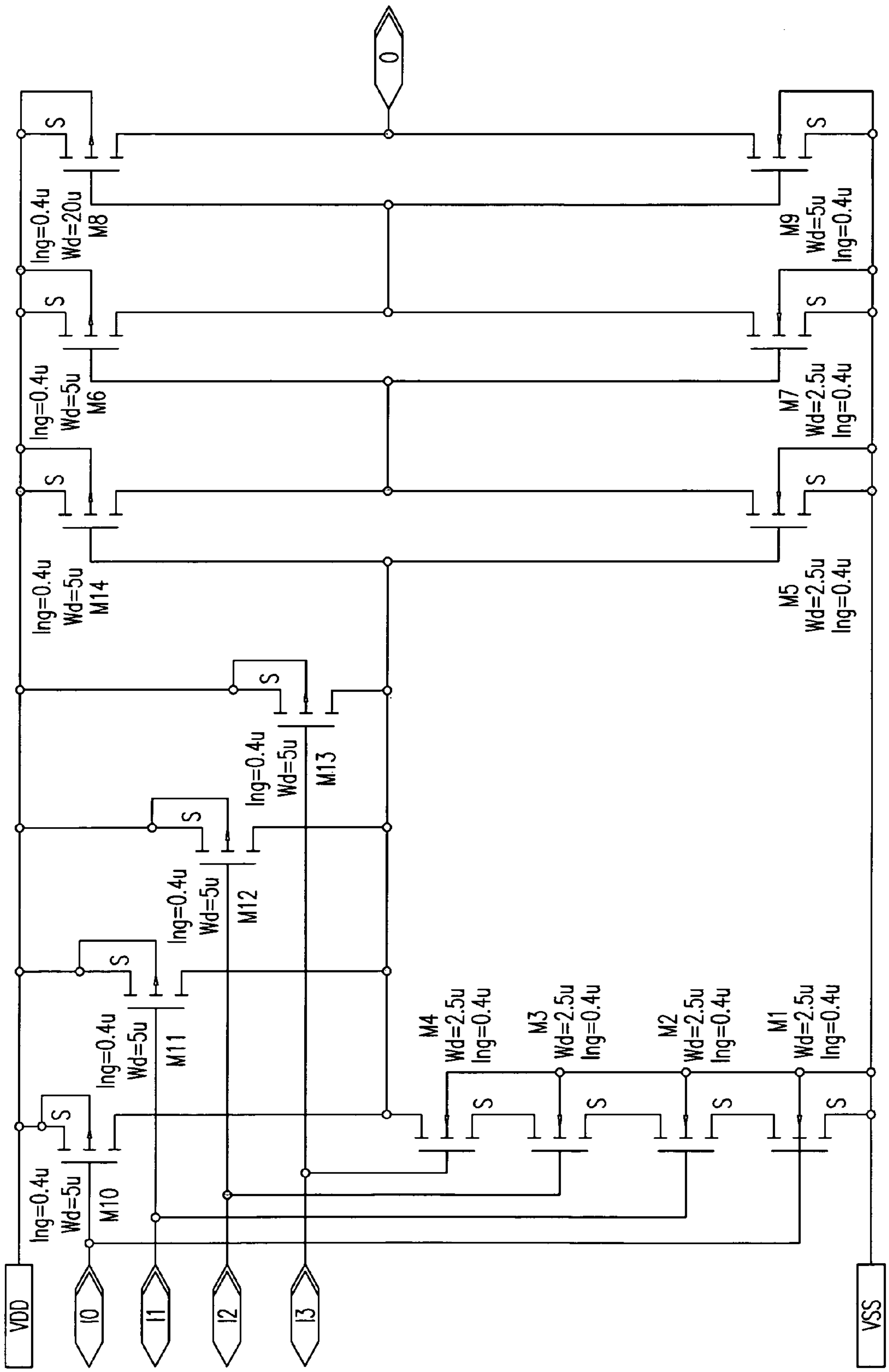
Figure 208:
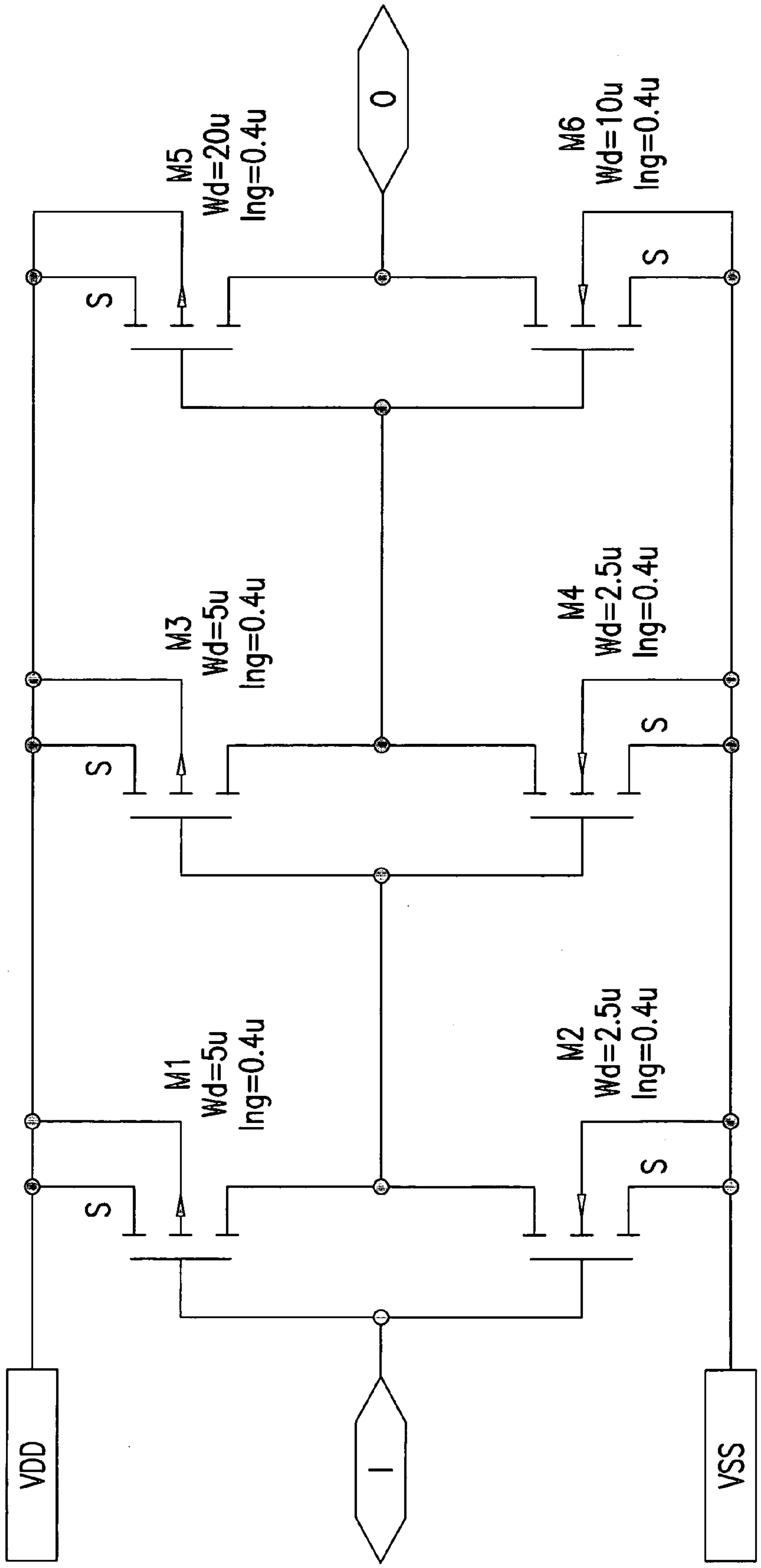
Figure 209:
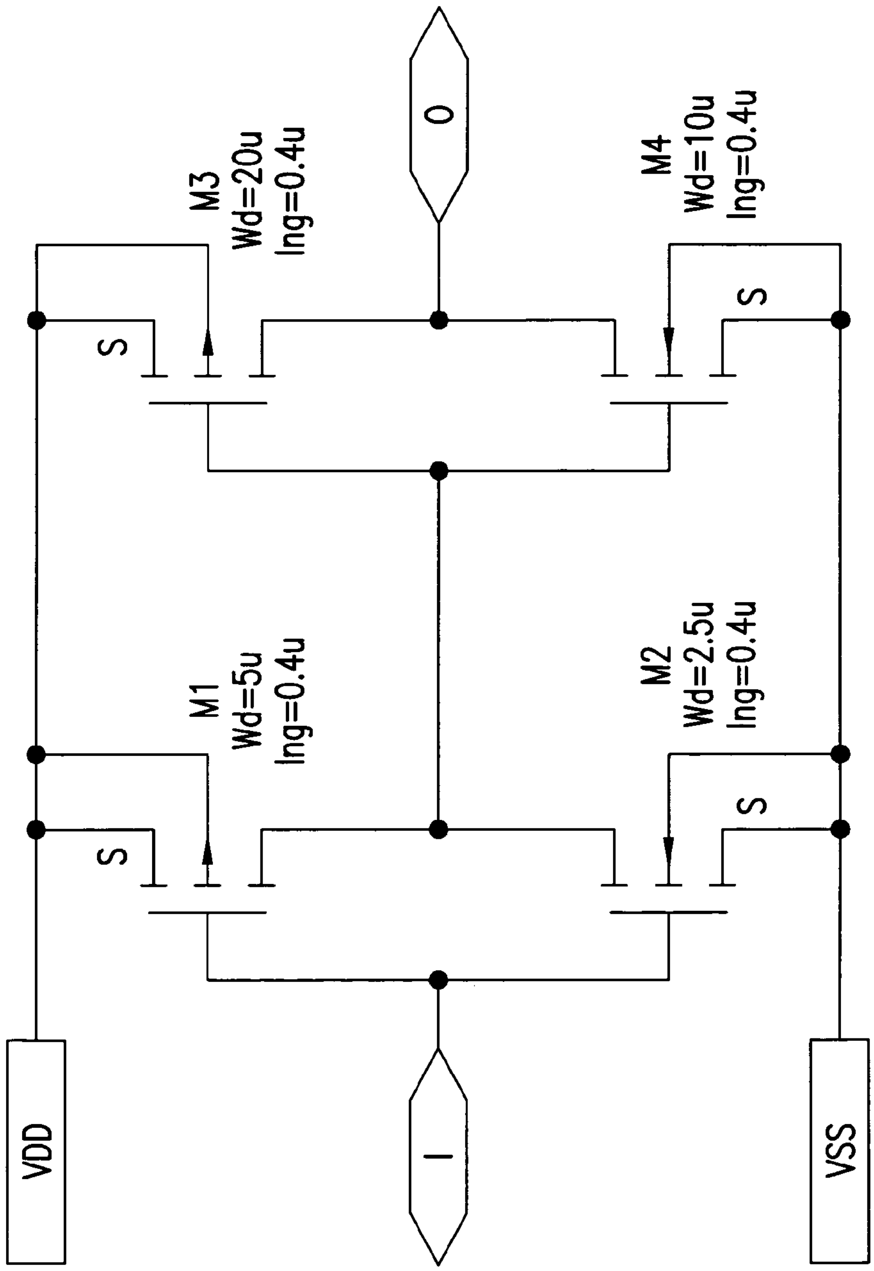
Figure 210A:
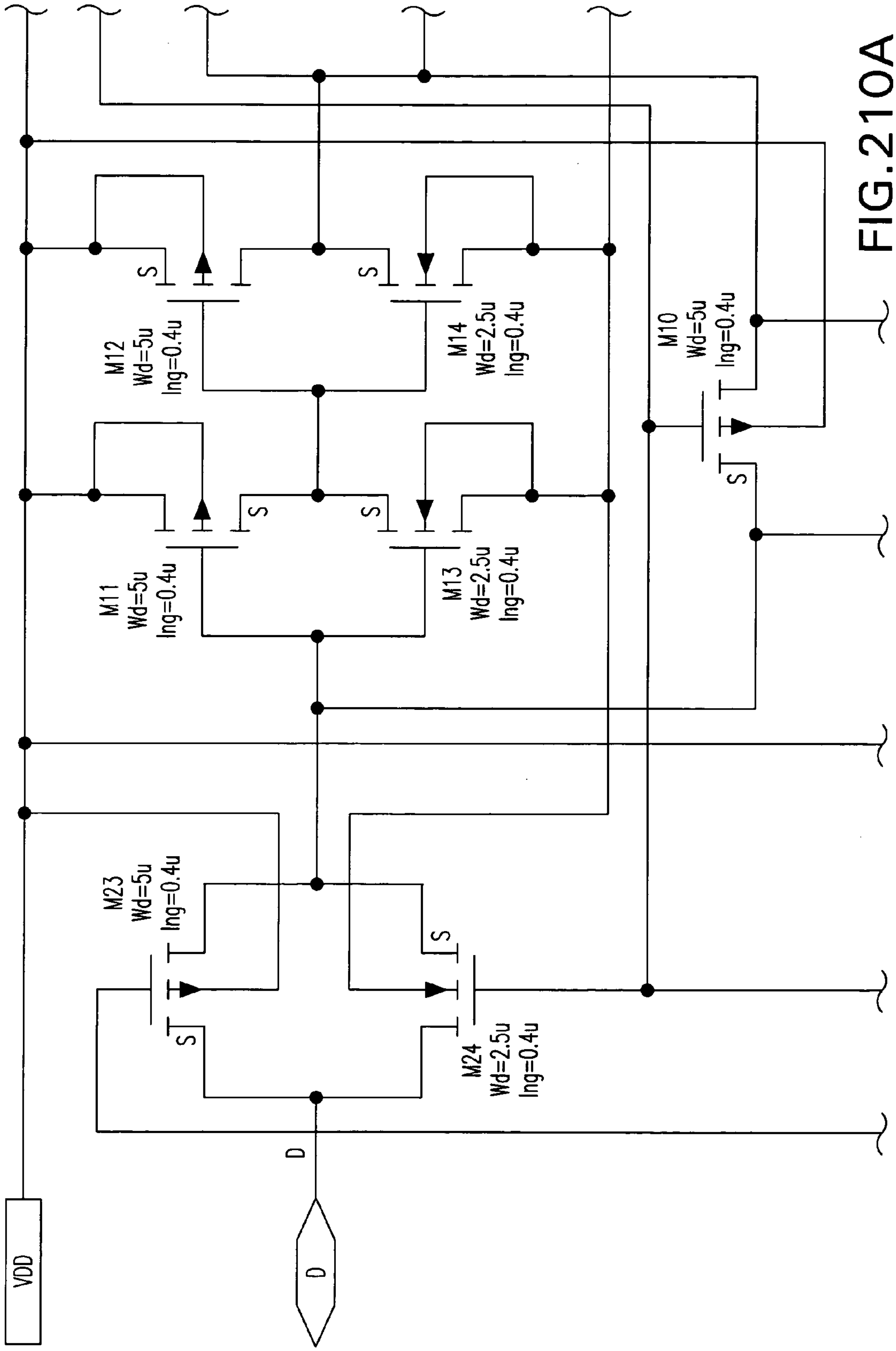
Figure 210B:
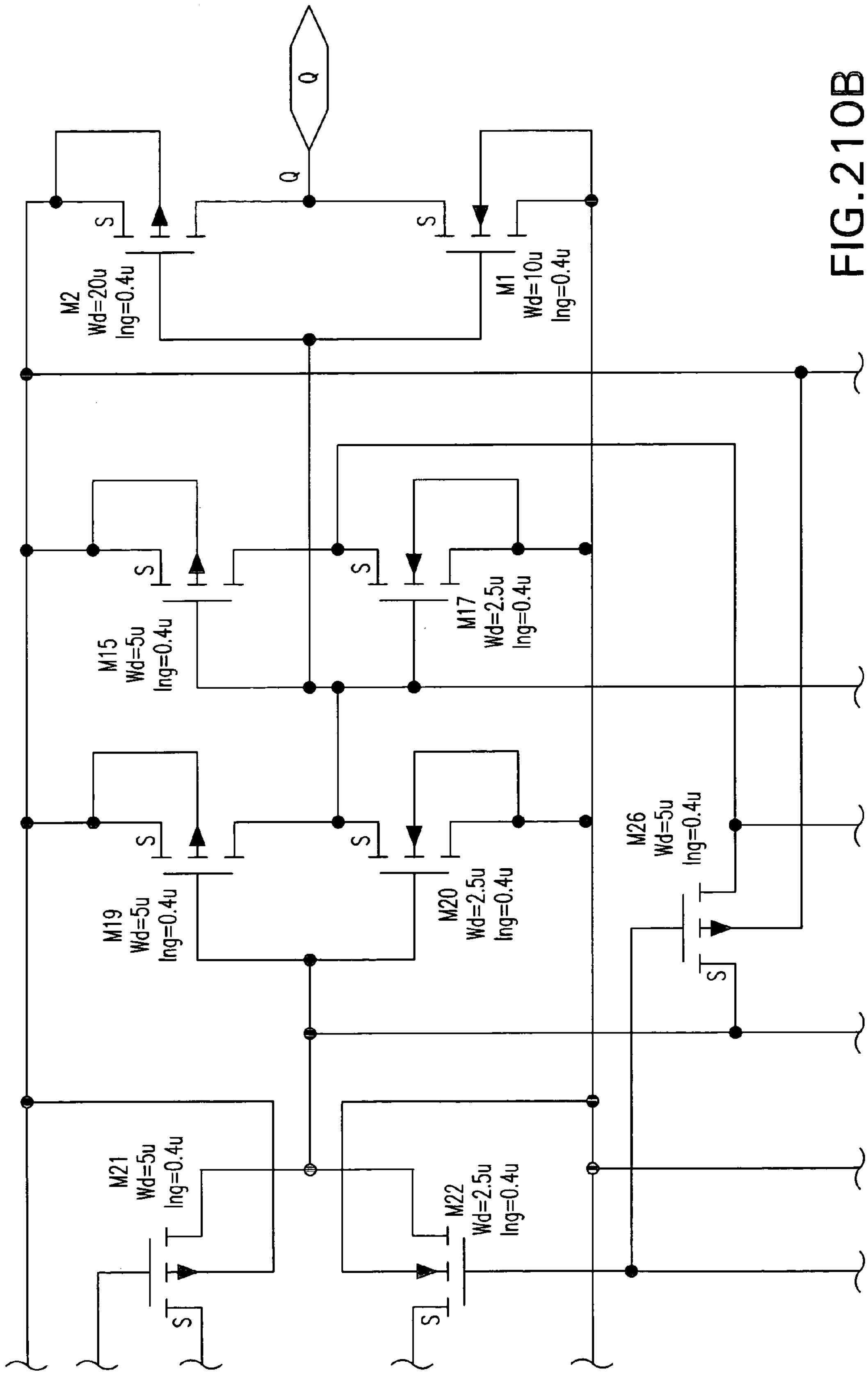
Figure 210C:
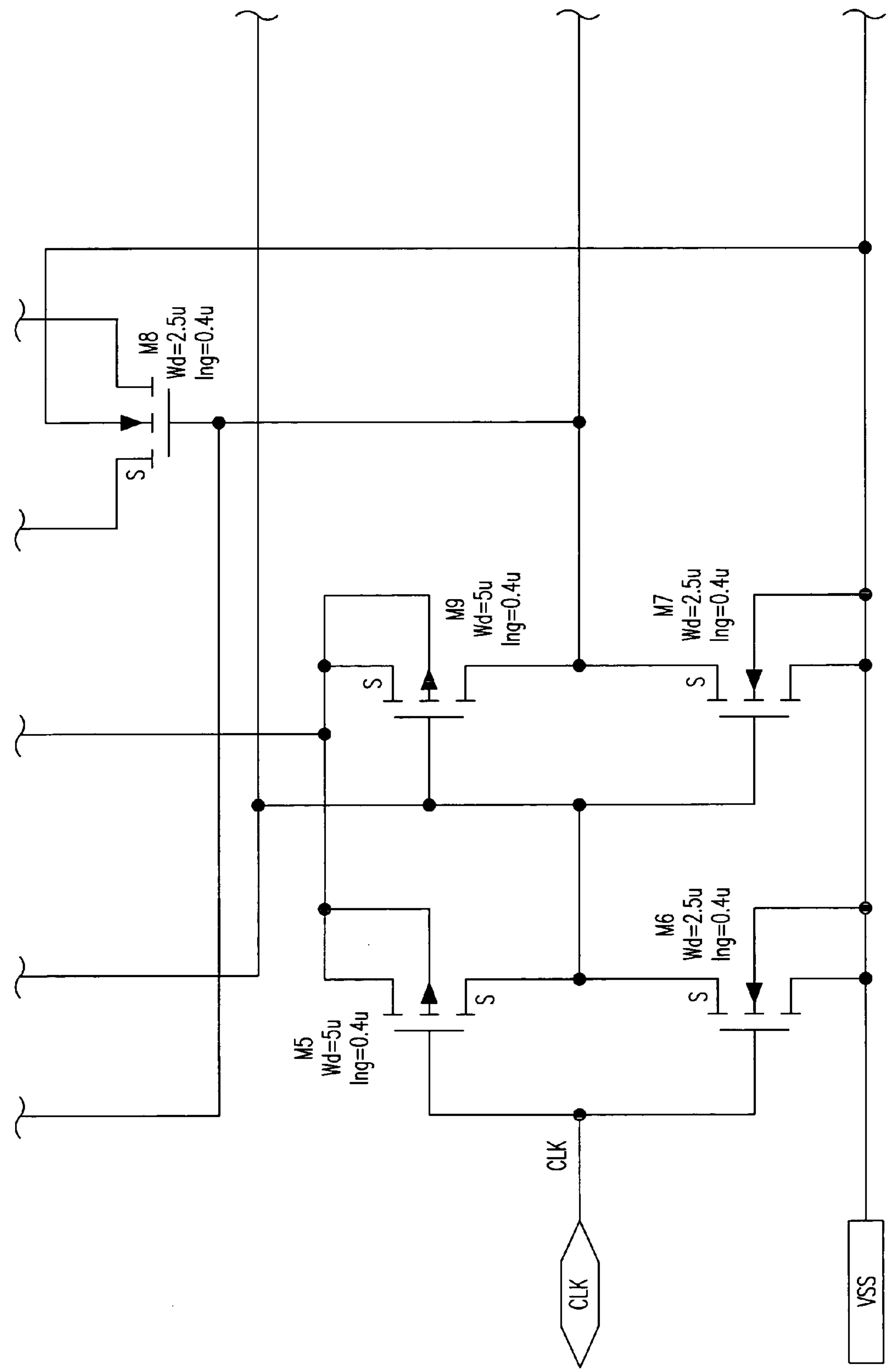
Figure 210D:
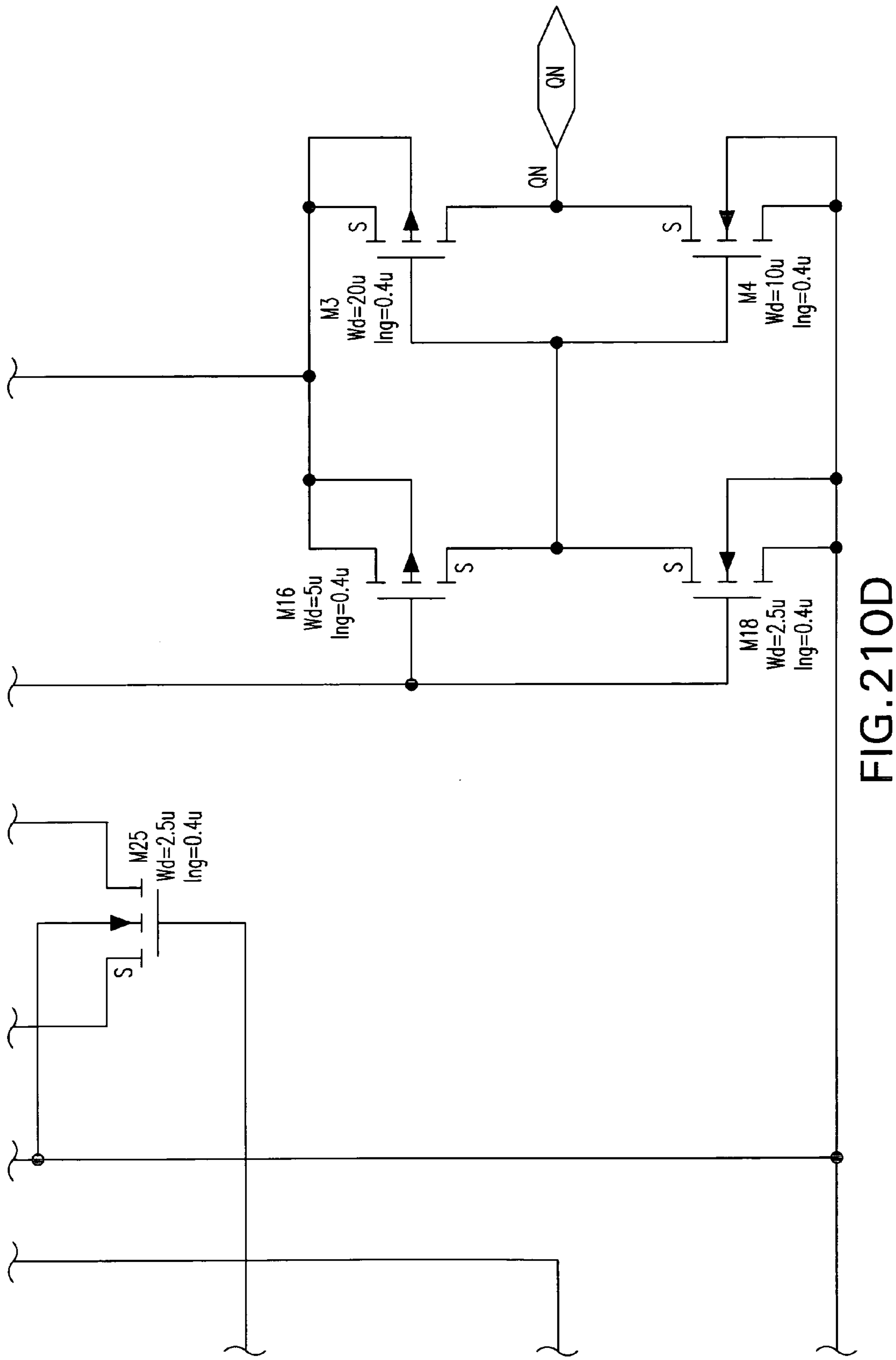
Figure 211A:
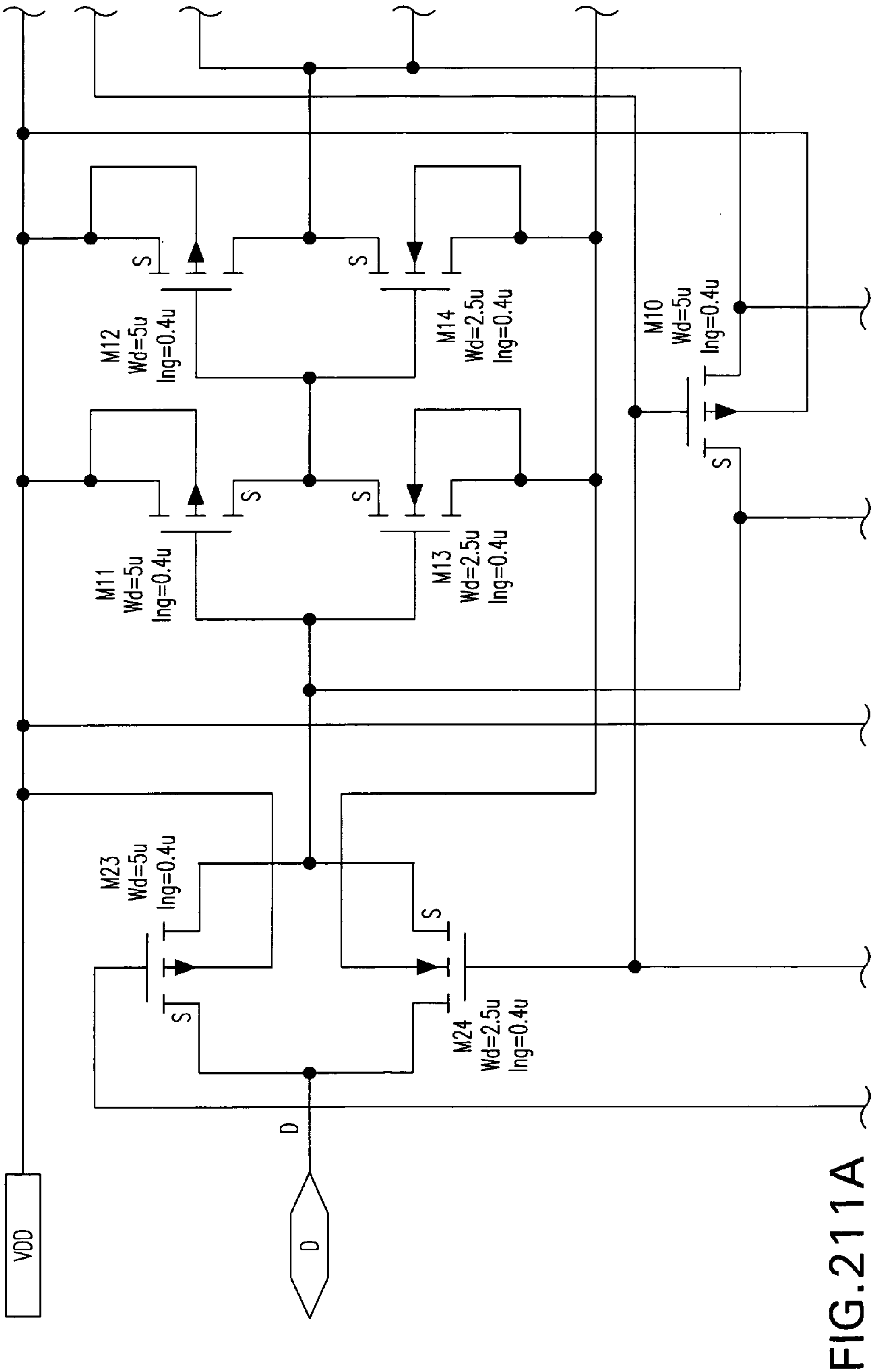
Figure 211B:
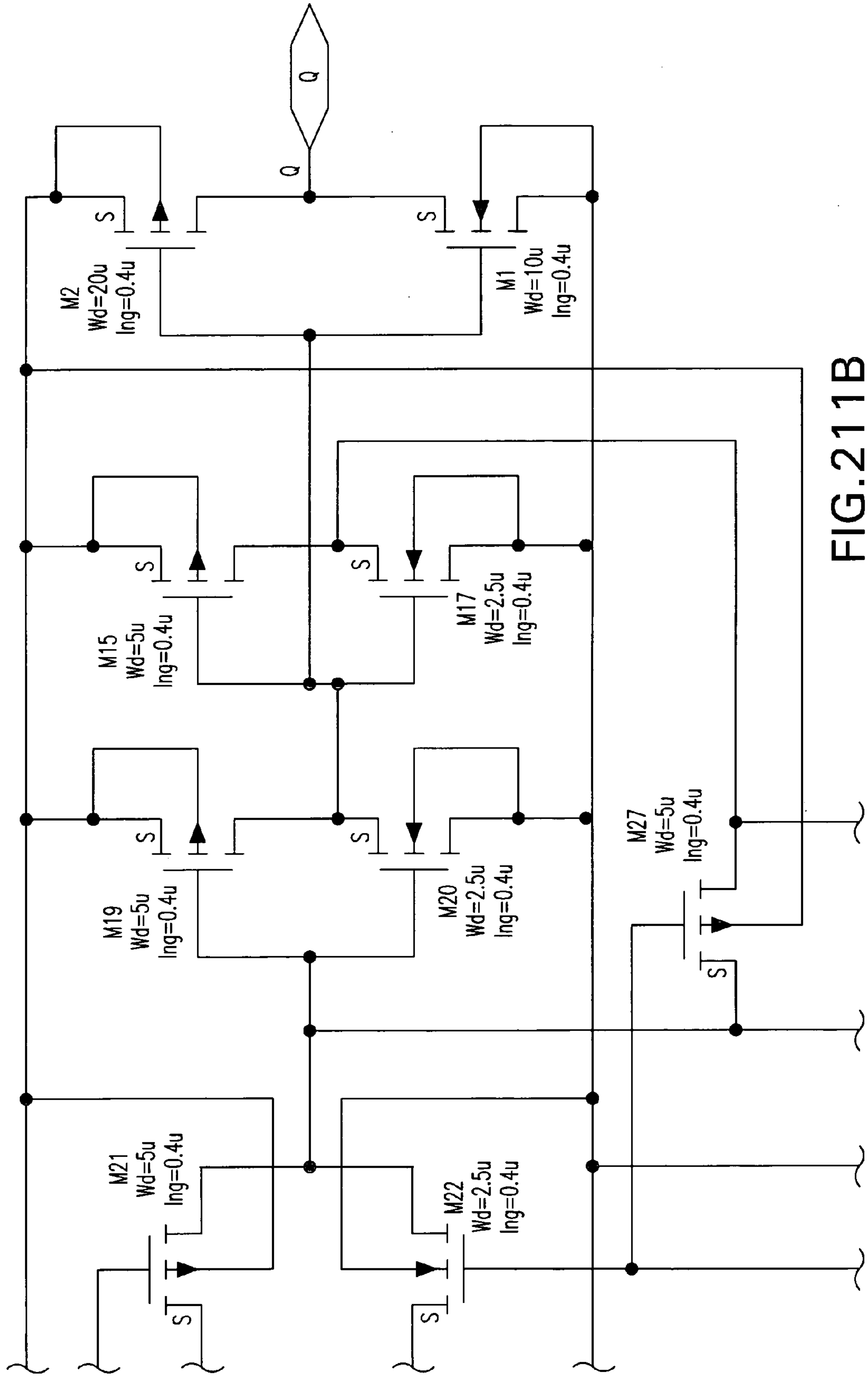
Figure 211C:
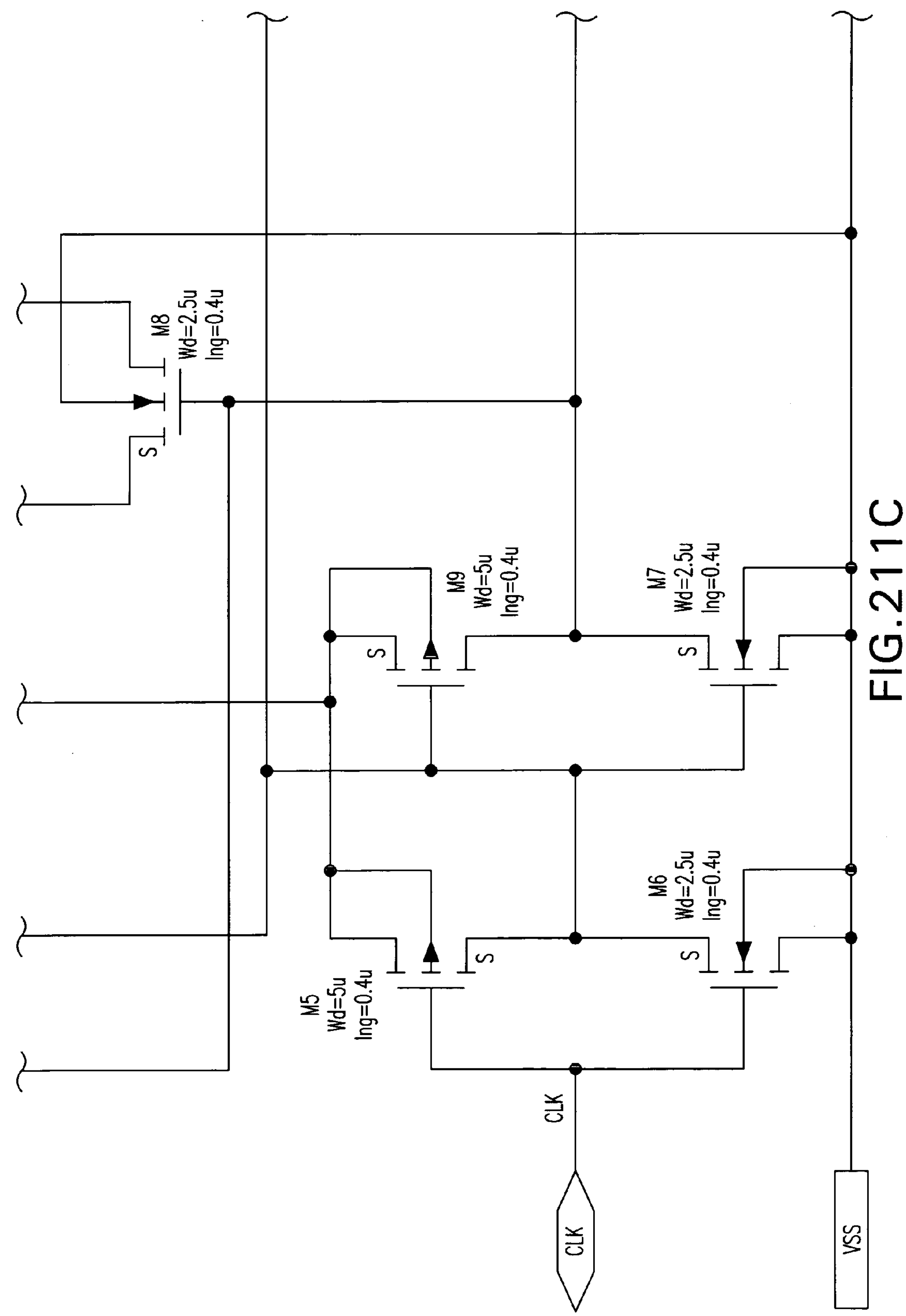
Figure 211D:
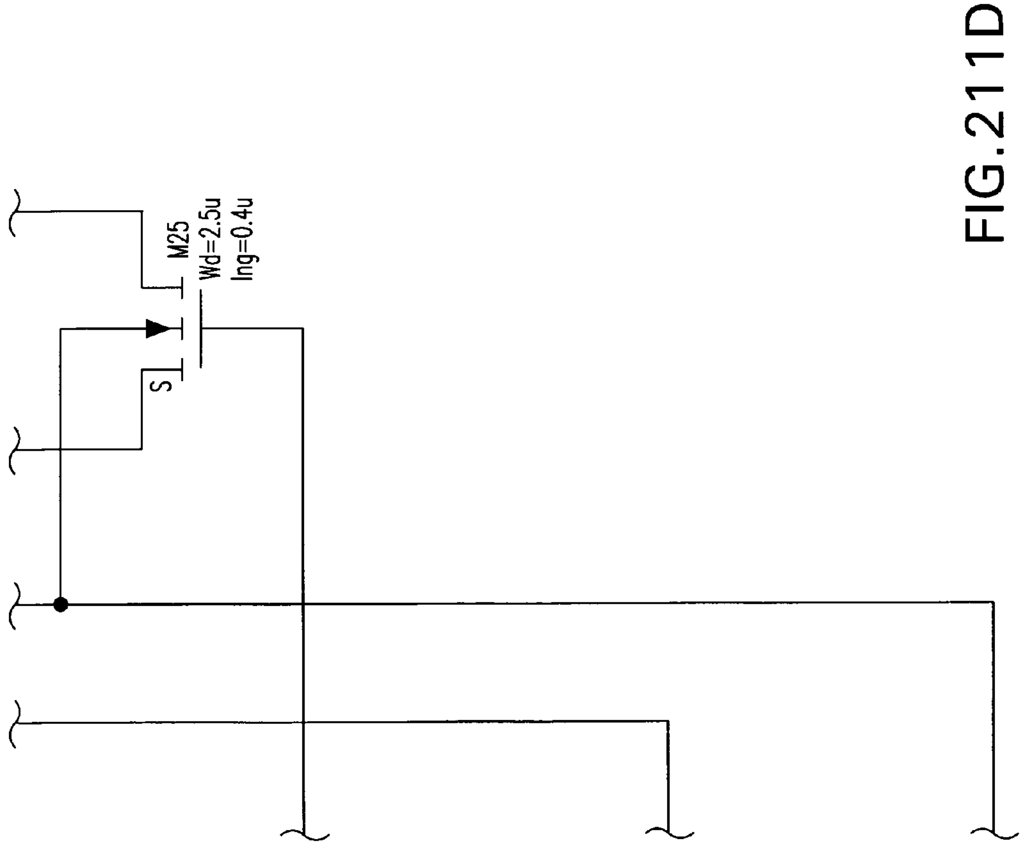
Figure 212:
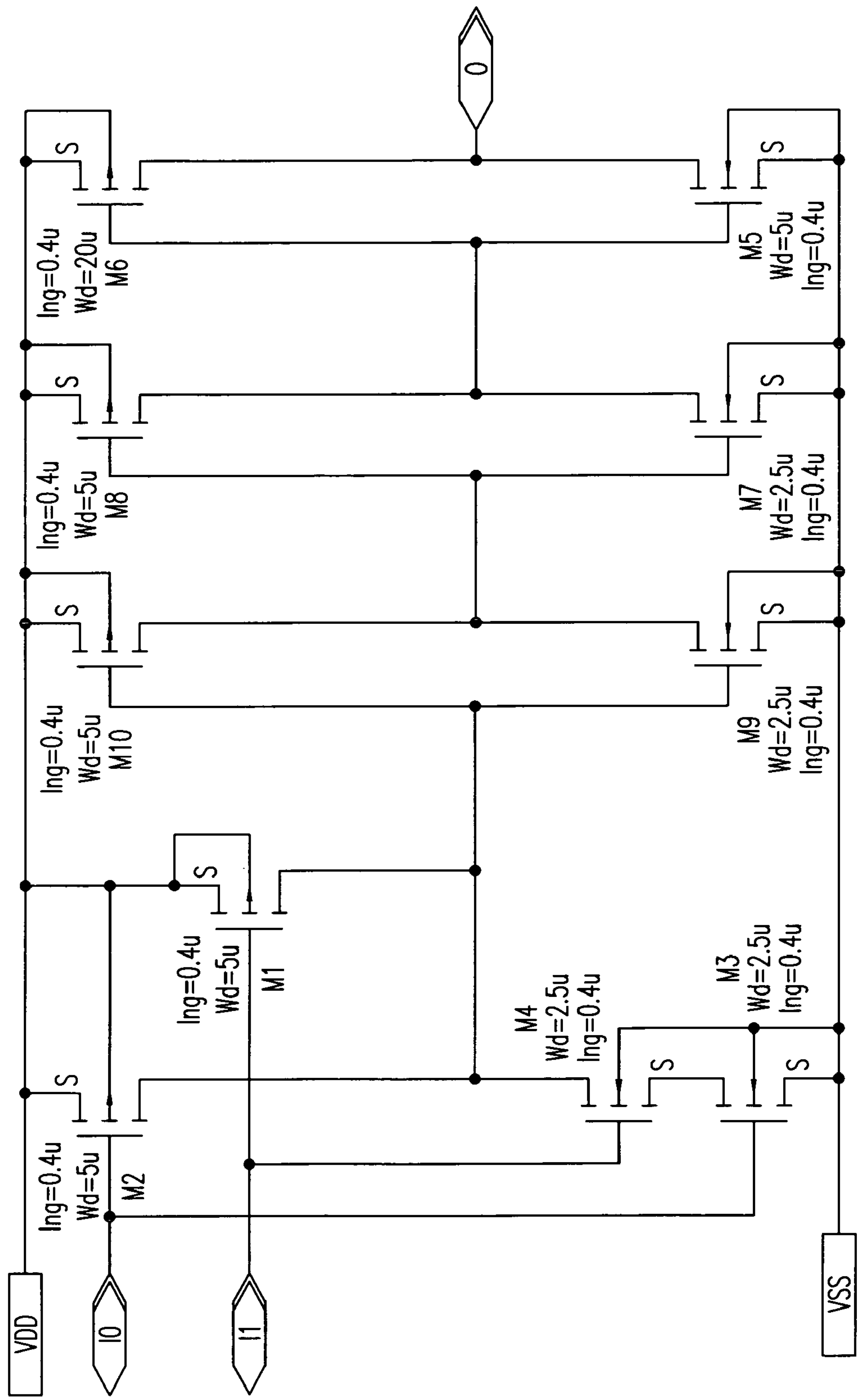

FIGS. 146–212 illustrate schematics showing an integrated circuit implementation of an exemplary embodiment of the present invention. FIG. 148 includes FIGS. 148A–D which should be referred to for references to FIG. 148 in the specification. FIG. 156 includes FIGS. 156 and 156A–V which should be referred to for references to FIG. 156 in the specification. FIG. 157 includes FIGS. 157A–F which should be referred to for references to FIG. 157 in the specification. FIG. 158 includes FIGS. 158A–D which should be referred to for references to FIG. 158 in the specification. FIG. 160 includes FIGS. 160A–D which should be referred to for references to FIG. 160 in the specification. FIG. 161 includes FIGS. 161A–D which should be referred to for references to FIG. 161 in the specification. FIG. 163 includes FIGS. 163A–D which should be referred to for references to FIG. 163 in the specification. FIG. 164 includes FIGS. 164A–F which should be referred to for references to FIG. 164 in the specification. FIG. 166 includes FIGS. 166A–F whouch should be referred to for references to FIG. 166 in the specification. FIG. 169 inlcude FIGS. 169A–D which should be referred to for references to FIG. 169 in the specification. FIG. 174 includes FIGS. 174A–H which should be referred to for references to FIG. 174 in the specification. FIG. 176 includes FIGS. 176A–H which should be referred to for references to FIG. 176 in the specification. FIG. 177 includes FIGS. 177A–H which should be referred to for references to FIG. 177 in the specification. FIG. 201 includes FIGS. 201A–H which should be referred to for references to FIG. 201 in the specification. FIG. 210 includes FIGS. 210A–D which should be referred to for references to FIG. 210 in the specification. FIG. 211 includes FIGS. 211A–D which should be referred to for references to FIG. 211 in the specification.

DETAILED DESCRIPTION OF THE PREFERRED EMBODIMENTS

Table of Contents

1. Universal Frequency Translation
2. Frequency Down-Conversion
  2.1 Charge Injection Reduction Embodiment
  2.2 Example I/Q Modulation Receiver Embodiments
    2.2.1 Example I/Q Modulation Control Signal Generator Embodiments
    2.2.2 Detailed Example I/Q Modulation Receiver Embodiment with Exemplary Waveforms
    2.2.3 Example Single Channel Receiver Embodiment
3. Frequency Up-Conversion
  3.1 Universal Transmitter with 2 UFT Modules
    3.1.1 Balanced Modulator Detailed Description
    3.1.2 Balanced Modulator Example Signal Diagrams and Mathematical Description
    3.1.3 Balanced Modulator Having a Shunt Configuration
    3.1.4 Balanced Modulator FET Configuration
    3.1.5 Universal Transmitter Configured for Carrier Insertion
  3.2 Universal Transmitter In I Q Configuration
    3.2.1 I/Q Transmitter Using Series-Type Balanced Modulator
    3.2.2. I/Q Transmitter Using Shunt-Type Balanced Modulator
    3.2.3 I/Q Transmitters Configured for Carrier Insertion
4. Enhanced Signal Reception
5. Unified Down-Conversion and Filtering
6. Example Application Embodiments of the Invention
  6.1 Data Communication
    6.1.1 Example Implementations: Interfaces, Wireless Modems, Wireless LANs, etc.
    6.1.2 Example Modifications
  6.2 Other Example Applications
  6.3 Example WLAN Implementation Embodiments
    6.3.1 Architecture
    6.3.2 Receiver
    6.3.3 Transmitter
    6.3.4 Demodulator/Modulator Facilitation Module
    6.3.5 MAC Interface
    6.3.6 Control Signal Generator—Synthesizer
    6.3.7 LNA/PA
    6.3.8 Test Results
  6.4 IEEE Standard 802.11 Background
    6.4.1 IEEE 802.11 Architecture
      6.4.1.1 The Station
      6.4.1.2 The Basic Service Set
      6.4.1.3 Extended Service Set (ESS)
      6.4.1.4 Distribution System
      6.4.1.5 IEEE 802.11 Services
        6.4.1.5.1 Station Services
        6.4.1.5.2 Distribution Services
        6.4.1.5.3 Service Interaction
  6.5 Medium Access Control Overview
    6.5.1 MAC Functionality
    6.5.2 MAC Frame Exchange Protocol
      6.5.2.1 Handling the Media
      6.5.2.2 The Hidden Node Problem
      6.5.2.3 Timing Intervals
    6.5.3 Frame Formats
      6.5.3.1 General Frame Format
    6.5.4 Control Frame Subtypes
      6.5.4.1 Request to Send
      6.5.4.2 Clear to Send
      6.5.4.3 Acknowledge
      6.5.4.4 Power Save Poll
      6.5.4.5 CF-End and CF-End+ACK
    6.5.5 Data Frame Subtypes
    6.5.6 Management Frame Subtypes
    6.5.7 Components of the Management Frame Body
    6.5.8 MAC Management
      6.5.8.1 Tools Available to Meet the Challenges
    6.5.9 MAC Management Information Base
      6.5.9.1 Station Management Attributes
      6.5.9.2 MAC Attributes
  6.6 Physical Layer (PHY)
    6.6.1 PHY Functionality
      6.6.1.1 PMD Incorporating Universal Frequency Translation Technology
    6.6.2 Direct Sequence Spread Spectrum (DSSS)PHY
      6.6.2.1 DSSS PLCP Sublayer
      6.6.2.2 Data Scrambling
      6.6.2.3 DSSS Modulation
      6.6.2.4 Barker Spreading Method
      6.6.2.5 DSSS Operating Channels and Transmit Power Requirements
      6.6.2.6 DSSS PMD Incorporating Universal Frequency Translation Technology
        6.6.2.6.1 Transmit DSSS PMD Incorporating Universal Frequency Translation
        6.6.2.6.1.1 UFU Module Transmitter Embodiments for DBPSK Modulation 6.6.2.6.1.1.1 Detailed UFU Module Embodiment
6.6.2.6.1.2 DBPSK Balanced Modulator Transmitter Embodiments
6.6.2.6.1.3 DQPSK Modulation Mode Transmitter Embodiments
6.6.2.6.1.3.1 QPSK Modulation Transmitter Using Two UFU Modules
6.6.2.6.1.3.2 QPSK Modulation Transmitter Using Balanced Modulator
6.6.2.6.2 Receiver DSSS PMD Incorporating Universal Frequency Translation
6.6.2.6.2.1 UFD Module Receiver Embodiments for DBPSK Demodulation
6.6.2.6.2.1.1 Detailed UFD Module Block Diagram
6.6.2.6.2.2 DBPSK Single Channel Receiver Embodiments
6.6.2.6.2.3 DQPSK Modulation Mode Receiver Embodiments
0.6.6.2.6.2.3.1 QPSK Modulation Receiver Using Two UFD Modules
6.6.2.6.2.3.2 QPSK Modulation Receiver Using Balanced Demodulator
6.6.3 Frequency Hopping Spread Spectrum (FHSS) PHY
6.6.3.1 FHSS PLCP Sublayer
6.6.3.2 PSDU Data Whitening
6.6.3.3 FHSS Modulation
6.6.3.4 FHSS Channel Hopping
6.6.3.5 FHSS PMD Incorporating Universal Frequency Translation
6.6.3.5.1 Transmit FHSS PMD Incorporating Universal Frequency Translation
6.6.3.5.1.1 UFU Module Transmitter Embodiments for GFSK Modulation
6.6.3.5.1.2 GFSK Balanced Modulator Transmitter Embodiments
6.6.3.5.2 Receiver FHSS PMD Incorporating Universal Frequency Translation
6.6.3.5.2.1 UFD Module Receiver Embodiments for GFSK Demodulation
6.6.3.5.2.2 GFSK Single Channel Receiver Embodiments
6.6.4 Infrared (1R) PHY
6.6.4.1 IR PLCP Sublayer
6.6.4.2 IR PHY Modulation Method
6.6.5 Geographic Regulatory Bodies
6.6.5.1 North America
6.6.5.2 Spain
6.6.5.3 Europe
6.6.5.3 Europe
6.7 Physical Layer Extensions to IEEE 802.11
6.7.1 IEEE 802.11a —The OFDM Physical Layer
6.7.1.1 OFDM PLCP Sublayer
6.7.1.2 Data Scrambler
6.7.1.3 Convolutional Encoding
6.7.1.4 OFDM Modulation
6.7.1.5 OFDM PMD Incorporating Universal Frequency Translation Technology
6.7.1.5.1 Transmit OFDM PMD Incorporating Universal Frequency Translation
6.7.1.5.1.1 UFU Module Transmitter Embodiments for BPSK Modulation
6.7.1.5.1.2 BPSK Balanced Modulator Transmitter Embodiments
6.7.1.5.1.3 QPSK/QAM Modulation Mode Transmitter Embodiments
6.7.1.5.1.3.1 QPSK Modulation Mode Transmitter Embodiments
6.7.1.5.1.3.2 QAM Modulation Mode Transmitter Embodiments
6.7.1.5.1.3.2.1 QAM Modulation Transmitter Using Two UFU Modules
6.7.1.5.1.3.2.2 QAM Modulation Transmitter Using Balanced Modulator
6.7.1.5.2 Receiver OFDM PMD Incorporating Universal Frequency Translation
6.7.1.5.2.1 UFD Module Receiver Embodiments for BPSK Demodulation
6.7.1.5.2.2 BPSK Single Channel Receiver Embodiments
6.7.1.5.2.3 QPSK/QAM Modulation Mode Receiver Embodiments
6.7.1.5.2.3.1 QPSK/QAM Modulation Receiver Using Two UFD Modules
6.7.1.5.2.3.2 QPSK/QAM Modulation Receiver Using Balanced Demodulator
6.7.1.6 OFDM Operating Channels and Transmit Power Requirements
6.7.1.7 Geographic Regulatory Bodies
6.7.1.7.1 North America
6.7.1.8 Globalization of Spectrum at 5 GHz
6.7.2 IEEE 802.11b-2.4 High Rate DSSS PHY
6.7.2.1 HR/DSSS PHY PLCP Sublayer
6.7.2.2 High Rate Data Scrambling
6.7.2.3 IEEE 802.11 High Rate Operating Channels
6.7.2.4 IEEE 802.11 DSSS High Rate Modulation and Data Rates
6.7.2.4.1 Complementary Code Keying (CCK) Modulation
6.7.2.4.2 DSSS Packet Binary Convolutional Coding
6.7.2.4.3 Frequency Hopped Spread Spectrum (FHSS) Interoperability
6.7.2.5 HR/DSSS PMD Incorporating Universal Frequency Translation Technology
6.7.2.5.1 Transmit HR/DSSS PMD Incorporating Universal Frequency Translation
6.7.2.5.1.1 Transmitter Embodiments for CCK Modulation
6.7.2.5.1.2 Transmitter Embodiments for PBCC Modulation
6.7.2.5.2 Receiver HR/DSSS PMD Incorporating Universal Frequency Translation
6.8 System Design Considerations for IEEE 802.11 WLANs
6.8.1 The Medium
6.8.2 Multipath
6.8.3 Multipath Channel Model
6.8.4 Path Loss in a WLAN System
6.8.5 Multipath Fading
6.8.6 Es/No vs BER Performance
6.8.7 Data Rate vs Aggregate Throughput
6.8.8 WLAN Installation and Site Survey
6.8.9 Interference in the 2.4 GHz Frequency Band
6.8.10 Antenna Diversity
2=0 7. Appendix
8. Conclusions 1. Universal Frequency Translation The present invention is related to frequency translation, and applications of same. Such applications include, but are not limited to, frequency down-conversion, frequency up-conversion, enhanced signal reception, unified down-conversion and filtering, and combinations and applications of same.

Figure 1A:
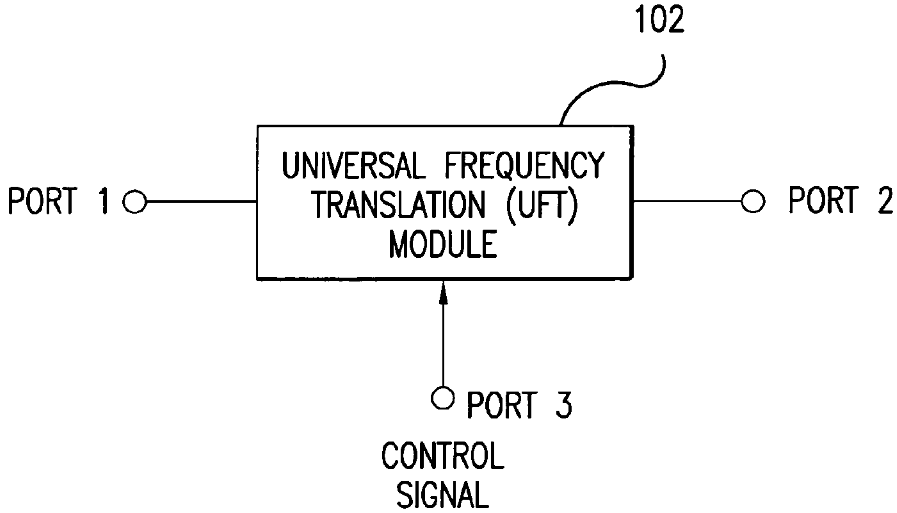
FIG. 1A is a block diagram of a universal frequency translation (UFT) module according to an embodiment of the invention.

FIG. 1A illustrates a universal frequency translation (UFT) module 102 according to embodiments of the invention. (The UFT module is also sometimes called a universal frequency translator, or a universal translator.)

As indicated by the example of FIG. 1A, some embodiments of the UFT module 102 include three ports (nodes), designated in FIG. 1A as Port 1, Port 2, and Port 3. Other UFT embodiments include other than three ports.

Generally, the UFT module 102 (perhaps in combination with other components) operates to generate an output signal from an input signal, where the frequency of the output signal differs from the frequency of the input signal. In other words, the UFT module 102 (and perhaps other components) operates to generate the output signal from the input signal by translating the frequency (and perhaps other characteristics) of the input signal to the frequency (and perhaps other characteristics) of the output signal.

Figure 1B:
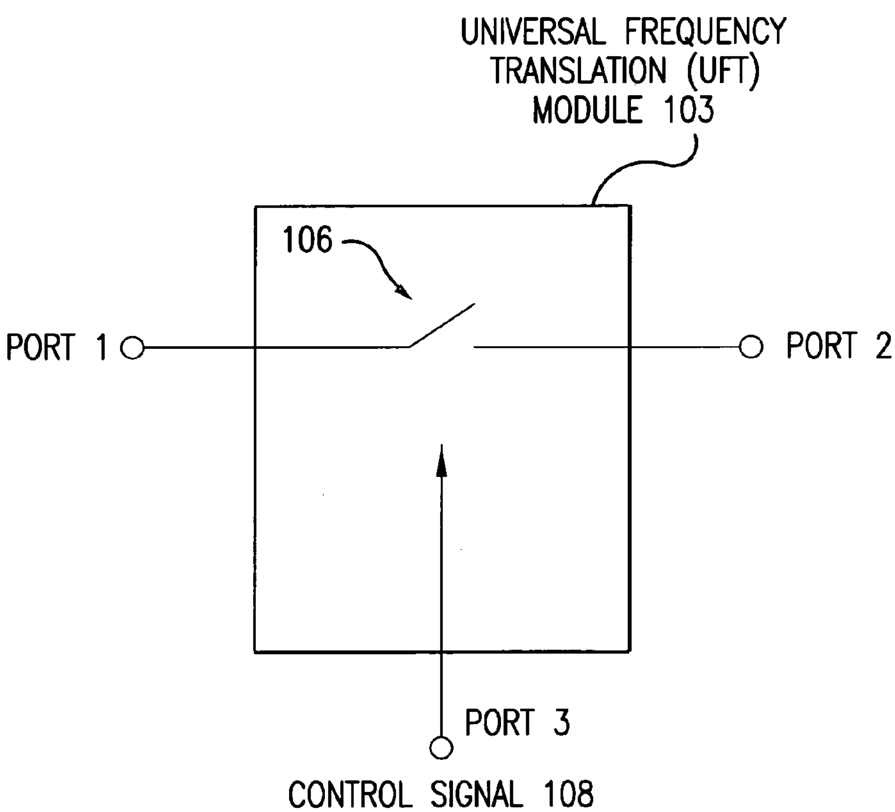
FIG. 1B is a more detailed diagram of a universal frequency translation (UFT) module according to an embodiment of the invention.

An example embodiment of the UFT module 103 is generally illustrated in FIG. 1B. Generally, the UFT module 103 includes a switch 106 controlled by a control signal 108. The switch 106 is said to be a controlled switch.

Figure 2:
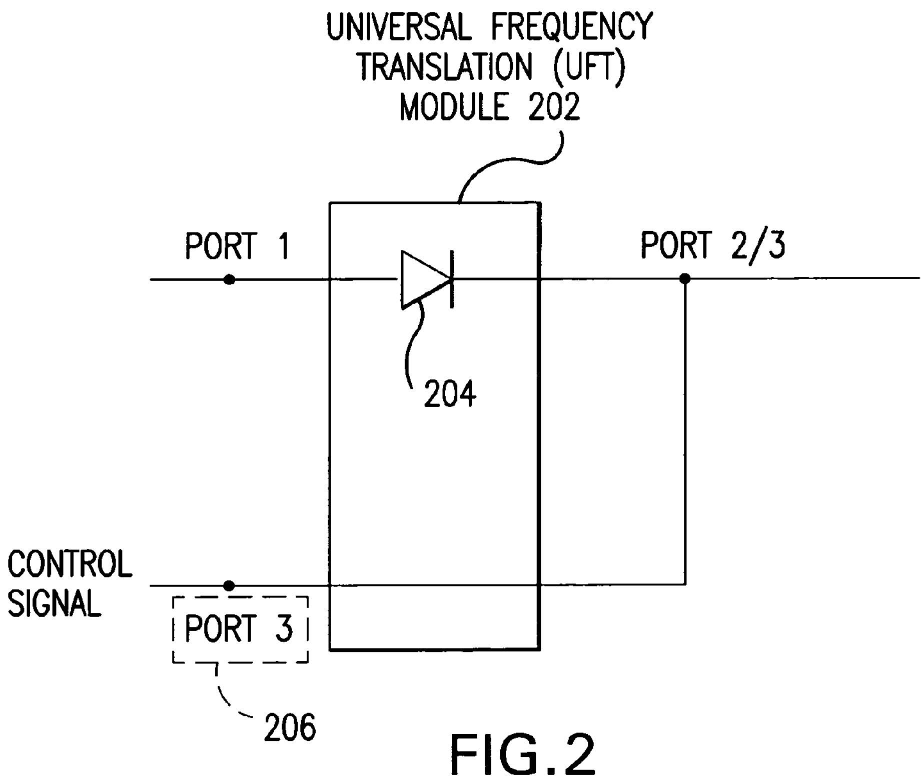
FIG. 2 is a block diagram of a universal frequency translation (UFT) module according to an alternative embodiment of the invention.

As noted above, some UFT embodiments include other than three ports. For example, and without limitation, FIG. 2 illustrates an example UFT module 202. The example UFT module 202 includes a diode 204 having two ports, designated as Port 1 and Port 2/3. This embodiment does not include a third port, as indicated by the dotted line around the "Port 3" label.

Figure 1C:
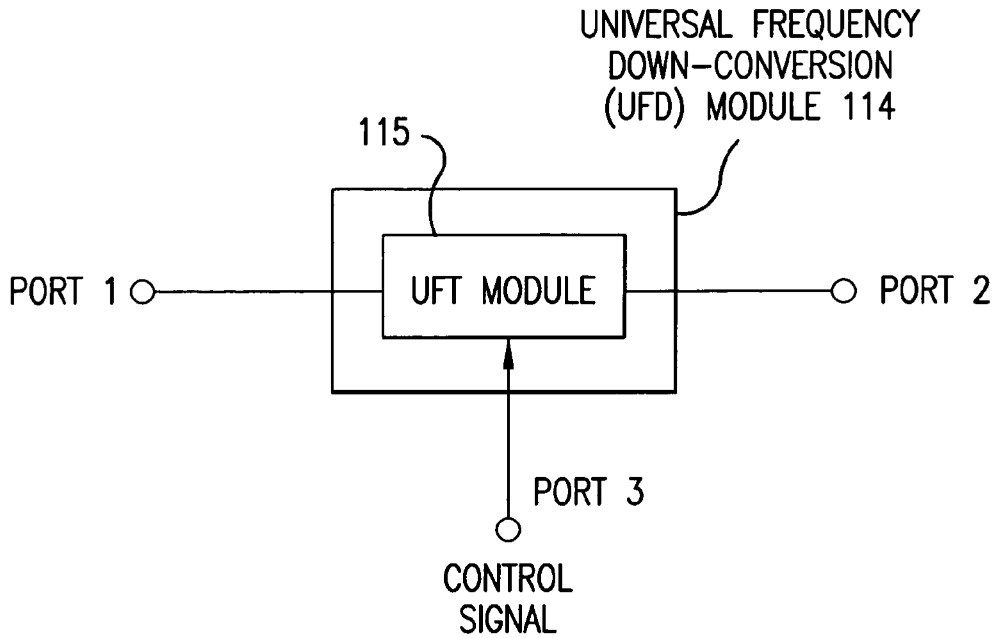
FIG. 1C illustrates a UFT module used in a universal frequency down-conversion (UFD) module according to an embodiment of the invention.

The UFT module is a very powerful and flexible device. Its flexibility is illustrated, in part, by the wide range of applications in which it can be used. Its power is illustrated, in part, by the—usefulness and performance of such applications. For example, a UFT module 115 can be used in a universal frequency down-conversion (UFD) module 114, an example of which is shown in FIG. 1C. In this capacity, the UFT module 115 frequency down-converts an input signal to an output signal.

Figure 1D:
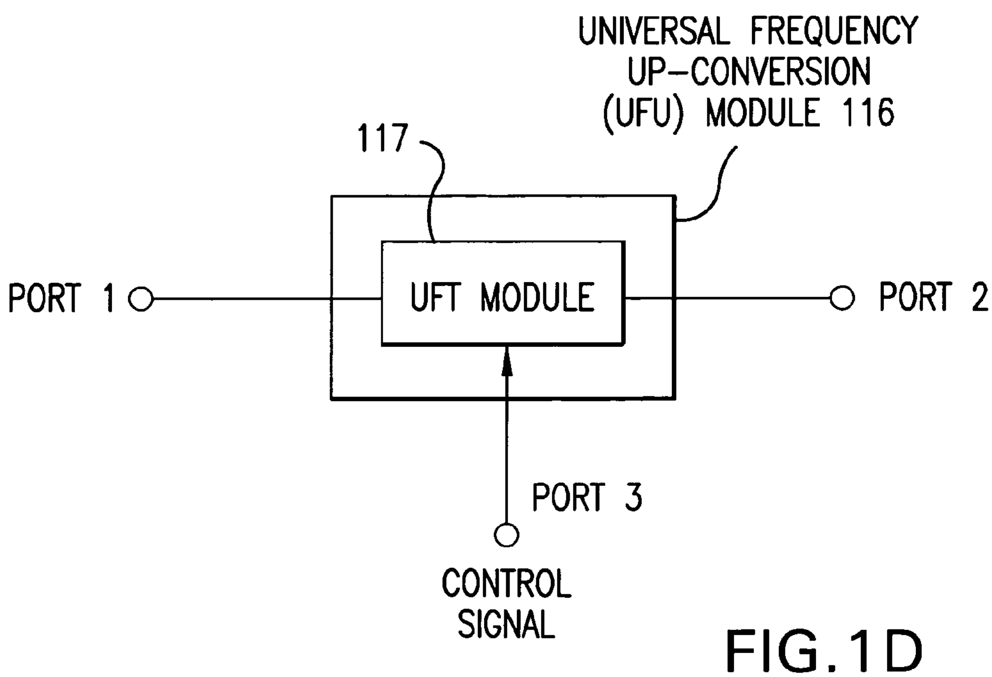
FIG. 1D illustrates a UFT module used in a universal frequency up-conversion (UFU) module according to an embodiment of the invention.

As another example, as shown in FIG. 1D, a UFT module 117 can be used in a universal frequency up-conversion (UFU) module 116. In this capacity, the UFT module 117 frequency up-converts an input signal to an output signal.

These and other applications of the UFT module are described below. Additional applications of the UFT module will be apparent to persons skilled in the relevant art(s) based on the teachings contained herein. In some applications, the UFT module is a required component. In other applications, the UFT module is an optional component.

2. Frequency Down-Conversion

The present invention is directed to systems and methods of universal frequency down-conversion, and applications of same.

In particular, the following discussion describes down-converting using a Universal Frequency Translation Module. The down-conversion of an EM signal by aliasing the EM signal at an aliasing rate is fully described in U.S. Pat. No. 6,061,551 entitled "Method and System for Down-Converting Electromagnetic Signals," filed Oct. 21, 1998, the full disclosure of which is incorporated herein by reference, as well as other applications cited above. A relevant portion of the above mentioned patent application is summarized below to describe down-converting an input signal to produce a down-converted signal that exists at a lower frequency or a baseband signal.

Figure 20A:
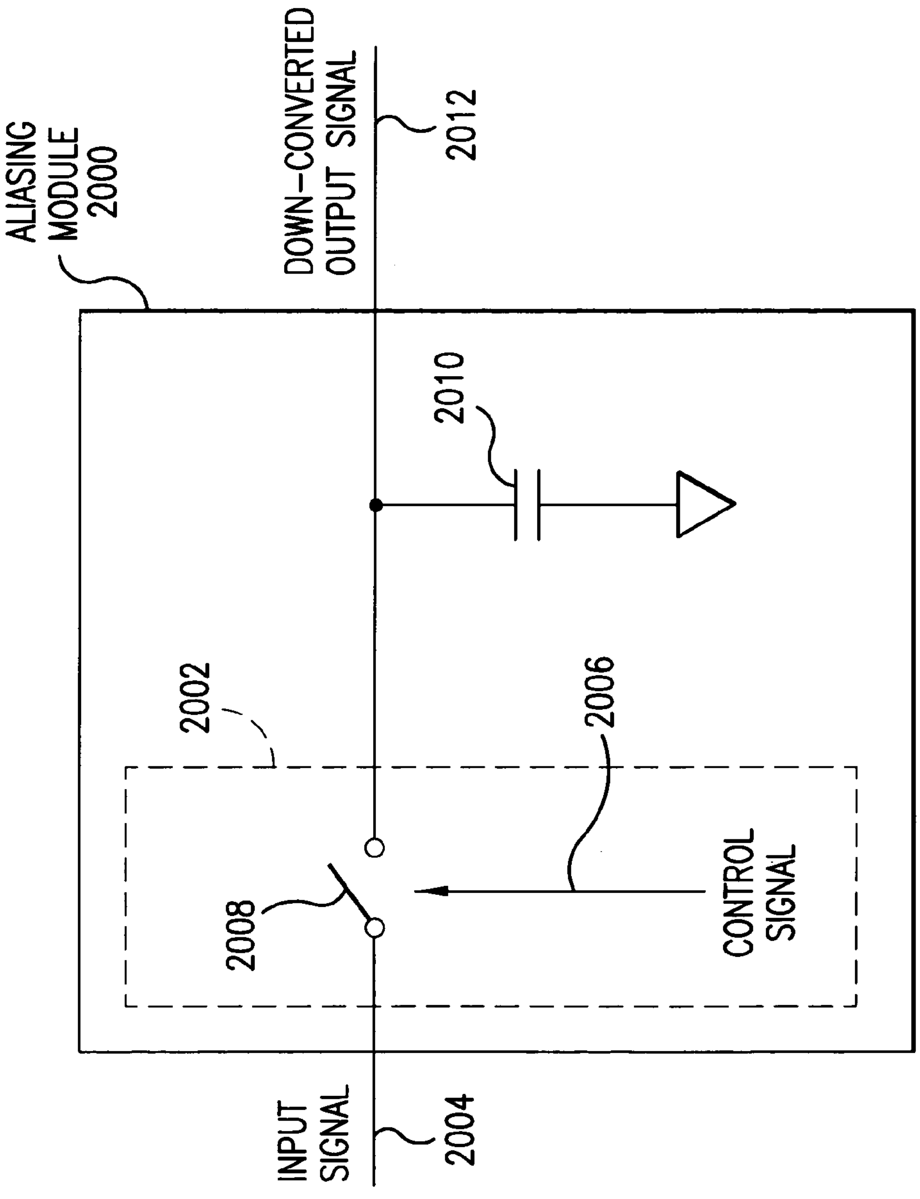
FIGS. 20A and 20G are example aliasing modules according to embodiments of the invention.
Figure 20B:
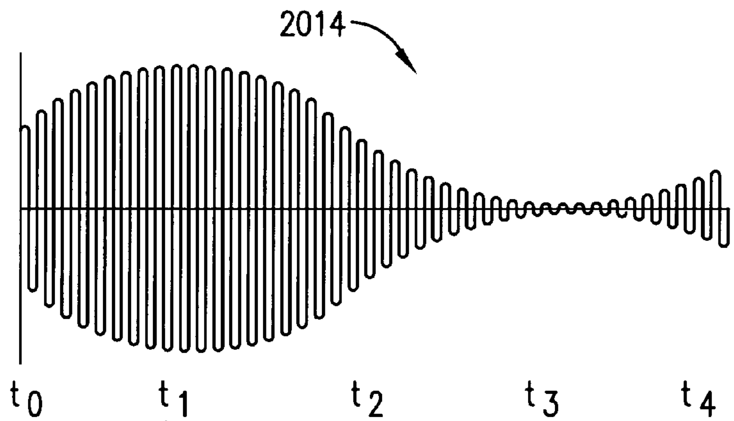
FIGS. 20B–20F are example waveforms used to describe the operation of the aliasing modules of FIGS. 20A and 20G.
Figure 20C:
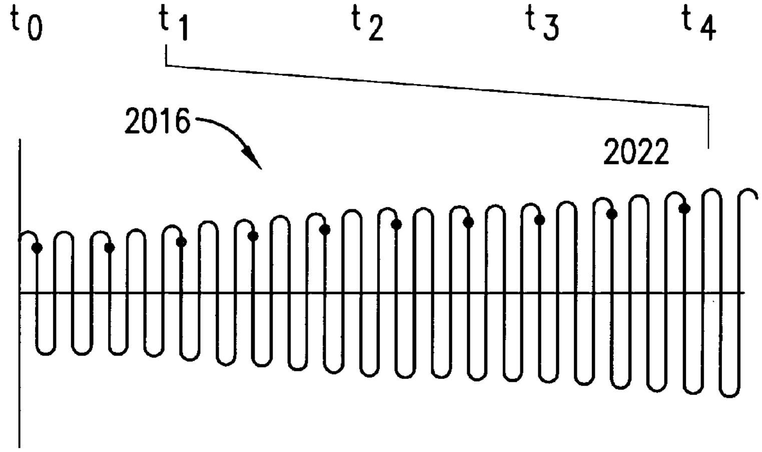

FIG. 20A illustrates an aliasing module 2000 (also called a universal frequency down-conversion module) for down-conversion using a universal frequency translation (UFT) module 2002 which down-converts an EM input signal 2004. In particular embodiments, aliasing module 2000 includes a switch 2008 and a capacitor 2010. The electronic alignment of the circuit components is flexible. That is, in one implementation, the switch 2008 is in series with input signal 2004 and capacitor 2010 is shunted to ground (although it may be other than ground in configurations such as differential mode). In a second implementation (see FIG. 20G), the capacitor 2010 is in series with the input signal 2004 and the switch 2008 is shunted to ground (although it may be other than ground in configurations such as differential mode). Aliasing module 2000 with UFT module 2002 can be easily tailored to down-convert a wide variety of electromagnetic signals using aliasing frequencies that are well below the frequencies of the EM input signal 2004.

In one implementation, aliasing module 2000 down-converts the input signal 2004 to an intermediate frequency (IF) signal. In another implementation, the aliasing module 2000 down-converts the input signal 2004 to a demodulated baseband signal. In yet another implementation, the input signal 2004 is a frequency modulated (FM) signal, and the aliasing module 2000 down-converts it to a non-FM signal, such as a phase modulated (PM) signal or an amplitude modulated (AM) signal. Each of the above implementations is described below.

In an embodiment, the control signal 2006 includes a train of pulses that repeat at an aliasing rate that is equal to, or less than, twice the frequency of the input signal 2004. In this embodiment, the control signal 2006 is referred to herein as an aliasing signal because it is below the Nyquist rate for the frequency of the input signal 2004. Preferably, the frequency of control signal 2006 is much less than the input signal 2004.

Figure 20D:
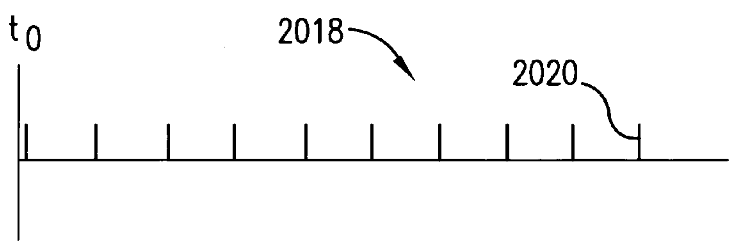
Figure 20E:
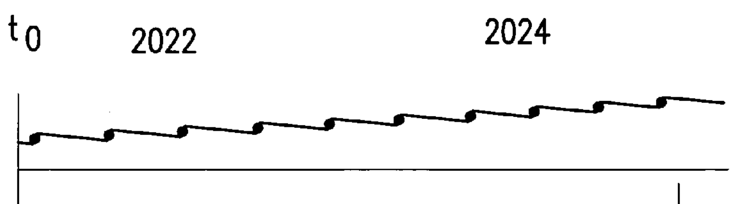

A train of pulses 2018 as shown in FIG. 20D controls the switch 2008 to alias the input signal 2004 with the control signal 2006 to generate a down-converted output signal 2012. More specifically, in an embodiment, switch 2008 closes on a first edge of each pulse 2020 of FIG. 20D and opens on a second edge of each pulse. When the switch 2008 is closed, the input signal 2004 is coupled to the capacitor 2010, and charge is transferred from the input signal to the capacitor 2010. The charge stored during successive pulses forms down-converted output signal 2012.

Exemplary waveforms are shown in FIGS. 20B–20F.

FIG. 20B illustrates an analog amplitude modulated (AM) carrier signal 2014 that is an example of input signal 2004. For illustrative purposes, in FIG. 20C, an analog AM carrier signal portion 2016 illustrates a portion of the analog AM carrier signal 2014 on an expanded time scale. The analog AM carrier signal portion 2016 illustrates the analog AM carrier signal 2014 from time $t_0$ to time $t_1$.

FIG. 20D illustrates an exemplary aliasing signal 2018 that is an example of control signal 2006. Aliasing signal 2018 is on approximately the same time scale as the analog AM carrier signal portion 2016. In the example shown in FIG. 20D, the aliasing signal 2018 includes a train of pulses 2020 having negligible apertures that tend towards zero (the invention is not limited to this embodiment, as discussed below). The pulse aperture may also be referred to as the pulse width as will be understood by those skilled in the art(s). The pulses 2020 repeat at an aliasing rate, or pulse repetition rate of aliasing signal 2018. The aliasing rate is determined as described below, and further described in U.S.

Pat. No. 6,061,551 entitled "Method and System for Down-Converting Electromagnetic Signals," filed Oct. 21, 1998.

Figure 20F:
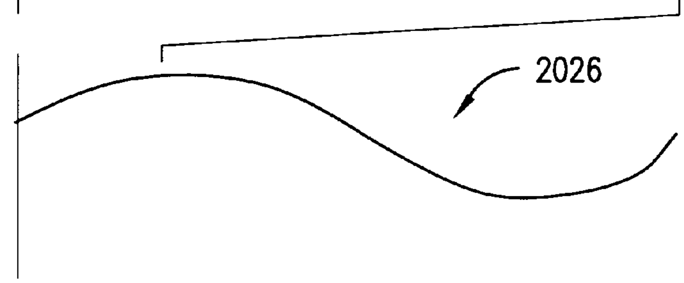
Figure 20G:
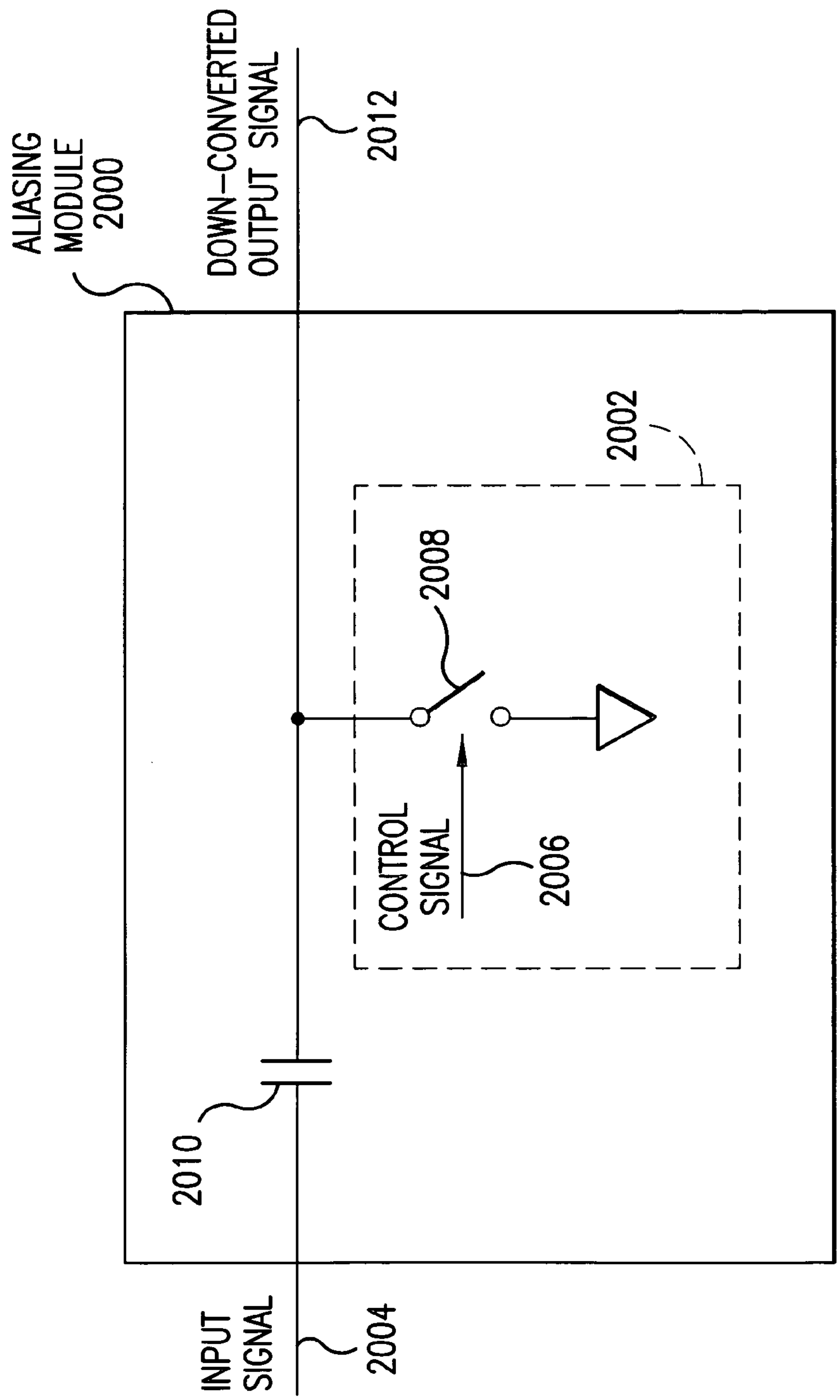

As noted above, the train of pulses 2020 (i.e., control signal 2006) control the switch 2008 to alias the analog AM carrier signal 2016 (i.e., input signal 2004) at the aliasing rate of the aliasing signal 2018. Specifically, in this embodiment, the switch 2008 closes on a first edge of each pulse and opens on a second edge of each pulse. When the switch 2008 is closed, input signal 2004 is coupled to the capacitor 2010, and charge is transferred from the input signal 2004 to the capacitor 2010. The charge transferred during a pulse is referred to herein as an under-sample. Exemplary under-samples 2022 form down-converted signal portion 2024 (FIG. 20E) that corresponds to the analog AM carrier signal portion 2016 (FIG. 20C) and the train of pulses 2020 (FIG. 20D). The charge stored during successive under-samples of AM carrier signal 2014 form the down-converted signal 2024 (FIG. 20E) that is an example of down-converted output signal 2012 (FIG. 20A). In FIG. 20F, a demodulated baseband signal 2026 represents the demodulated baseband signal 2024 after filtering on a compressed time scale. As illustrated, down-converted signal 2026 has substantially the same "amplitude envelope" as AM carrier signal 2014. Therefore, FIGS. 20B–20F illustrate down-conversion of AM carrier signal 2014.

The waveforms shown in FIGS. 20B–20F are discussed herein for illustrative purposes only, and are not limiting. Additional exemplary time domain and frequency domain drawings, and exemplary methods and systems of the invention relating thereto, are disclosed in U.S. Pat. No. 6,061,551 entitled "Method and System for Down-Converting Electromagnetic Signals," filed Oct. 21, 1998.

The aliasing rate of control signal 2006 determines whether the input signal 2004 is down-converted to an IF signal, down-converted to a demodulated baseband signal, or down-converted from an FM signal to a PM or an AM signal. Generally, relationships between the input signal 2004, the aliasing rate of the control signal 2006, and the down-converted output signal 2012 are illustrated below:

(Freq. of input signal 2004)=$n$·(Freq. of control signal 2006)±(Freq. of down-converted output signal 2012)

For the examples contained herein, only the "+" condition will be discussed. The value of n represents a harmonic or sub-harmonic of input signal 2004 (e.g., n=0.5, 1, 2, 3, . . . ).

When the aliasing rate of control signal 2006 is off-set from the frequency of input signal 2004, or off-set from a harmonic or sub-harmonic thereof, input signal 2004 is down-converted to an IF signal. This is because the under-sampling pulses occur at different phases of subsequent cycles of input signal 2004. As a result, the under-samples form a lower frequency oscillating pattern. If the input signal 2004 includes lower frequency changes, such as amplitude, frequency, phase, etc., or any combination thereof, the charge stored during associated under-samples reflects the lower frequency changes, resulting in similar changes on the down-converted IF signal. For example, to down-convert a 901 MHZ input signal to a 1 MHZ IF signal, the frequency of the control signal 2006 would be calculated as follows:

$(Freq_{input}-Freq_{IF})/n=Freq_{control}$ (901 MHZ-1 MHZ)/n=900/n

For n=0.5, 1, 2, 3, 4, etc., the frequency of the control signal 2006 would be substantially equal to 1.8 GHz, 900 MHZ, 450 MHZ, 300 MHZ, 225 MHZ, etc.

Exemplary time domain and frequency domain drawings, illustrating down-conversion of analog and digital AM, PM and FM signals to IF signals, and exemplary methods and systems thereof, are disclosed in U.S. Pat. No. 6,061,551 entitled "Method and System for Down-Converting Electromagnetic Signals," filed Oct. 21, 1998.

Alternatively, when the aliasing rate of the control signal 2006 is substantially equal to the frequency of the input signal 2004, or substantially equal to a harmonic or sub-harmonic thereof, input signal 2004 is directly down-converted to a demodulated baseband signal. This is because, without modulation, the under-sampling pulses occur at the same point of subsequent cycles of the input signal 2004. As a result, the under-samples form a constant output baseband signal. If the input signal 2004 includes lower frequency changes, such as amplitude, frequency, phase, etc., or any combination thereof, the charge stored during associated under-samples reflects the lower frequency changes, resulting in similar changes on the demodulated baseband signal. For example, to directly down-convert a 900 MHZ input signal to a demodulated baseband signal (i.e., zero IF), the frequency of the control signal 2006 would be calculated as follows:

$(Freq_{input}-Freq_{IF})/n=Freq_{control}$ (900 MHZ–0 MHZ)/$n$=900 MHZ/$n$

For n=0.5, 1, 2, 3, 4, etc., the frequency of the control signal 2006 should be substantially equal to 1.8 GHz, 900 MHZ, 450 MHZ, 300 MHZ, 225 MHZ, etc.

Exemplary time domain and frequency domain drawings, illustrating direct down-conversion of analog and digital AM and PM signals to demodulated baseband signals, and exemplary methods and systems thereof, are disclosed in the U.S. Pat. No. 6,061,551 entitled "Method and System for Down-Converting Electromagnetic Signals," filed Oct. 21, 1998.

Alternatively, to down-convert an input FM signal to a non-FM signal, a frequency within the FM bandwidth must be down-converted to baseband (i.e., zero IF). As an example, to down-convert a frequency shift keying (FSK) signal (a sub-set of FM) to a phase shift keying (PSK) signal (a subset of PM), the mid-point between a lower frequency $F_1$ and an upper frequency $F_2$ (that is, $[(F_1+F_2)\div 2]$) of the FSK signal is down-converted to zero IF. For example, to down-convert an FSK signal having $F_1$ equal to 899 MHZ and $F_2$ equal to 901 MHZ, to a PSK signal, the aliasing rate of the control signal 2006 would be calculated as follows:

$$\begin{aligned}\text{Frequency of the input} &= (F_1 + F_2) \div 2 \\ &= (899\text{ MHZ} + 901\text{ MHZ}) \div 2 = 900\text{ MHZ}\end{aligned}$$

Frequency of the down-converted signal=0 (i.e., baseband)

$(Freq_{input}-Freq_{IF})/n=Freq_{control}$ (900 MHZ–0 MHZ)/n=900 MHZ/n

For n=0.5, 1, 2, 3, etc., the frequency of the control signal 2006 should be substantially equal to 1.8 GHz, 900 MHZ, 450 MHZ, 300 MHZ, 225 MHZ, etc. The frequency of the down-converted PSK signal is substantially equal to one half the difference between the lower frequency $F_1$ and the upper frequency $F_2$.

As another example, to down-convert a FSK signal to an amplitude shift keying (ASK) signal (a subset of AM), either the lower frequency $F_1$ or the upper frequency $F_2$ of the FSK signal is down-converted to zero IF. For example, to down-convert an FSK signal having $F_1$ equal to 900 MHZ and $F_2$ equal to 901 MHZ, to an ASK signal, the aliasing rate of the control signal 2006 should be substantially equal to:

$$(900\ \text{MHZ}-0\ \text{MHZ})/n=900\ \text{MHZ}/n, \text{ or } (901\ \text{MHZ}-0\ \text{MHZ})/n=901\ \text{MHZ}/n.$$

For the former case of 900 MHZ/n, and for n=0.5, 1, 2, 3, 4, etc., the frequency of the control signal 2006 should be substantially equal to 1.8 GHz, 900 MHZ, 450 MHZ, 300 MHZ, 225 MHZ, etc. For the latter case of 901 MHZ/n, and for n=0.5, 1, 2, 3, 4, etc., the frequency of the control signal 2006 should be substantially equal to 1.802 GHz, 901 MHZ, 450.5 MHZ, 300.333 MHZ, 225.25 MHZ, etc. The frequency of the down-converted AM signal is substantially equal to the difference between the lower frequency $F_1$ and the upper frequency $F_2$ (i.e., 1 MHZ).

Exemplary time domain and frequency domain drawings, illustrating down-conversion of FM signals to non-FM signals, and exemplary methods and systems thereof, are disclosed in U.S. Pat. No. 6,061,551 entitled "Method and System for Down-Converting Electromagnetic Signals," filed Oct. 21, 1998.

In an embodiment, the pulses of the control signal 2006 have negligible apertures that tend towards zero. This makes the UFT module 2002 a high input impedance device. This configuration is useful for situations where minimal disturbance of the input signal may be desired.

In another embodiment, the pulses of the control signal 2006 have non-negligible apertures that tend away from zero. This makes the UFT module 2002 a lower input impedance device. This allows the lower input impedance of the UFT module 2002 to be substantially matched with a source impedance of the input signal 2004. This also improves the energy transfer from the input signal 2004 to the down-converted output signal 2012, and hence the efficiency and signal to noise (s/n) ratio of UFT module 2002.

Exemplary systems and methods for generating and optimizing the control signal 2006, and for otherwise improving energy transfer and s/n ratio, are disclosed in U.S. Pat. No. 6,061,551 entitled "Method and System for Down-Converting Electromagnetic Signals," filed Oct. 21, 1998.

2.1 Charge Injection Reduction Embodiment

Figure 120:
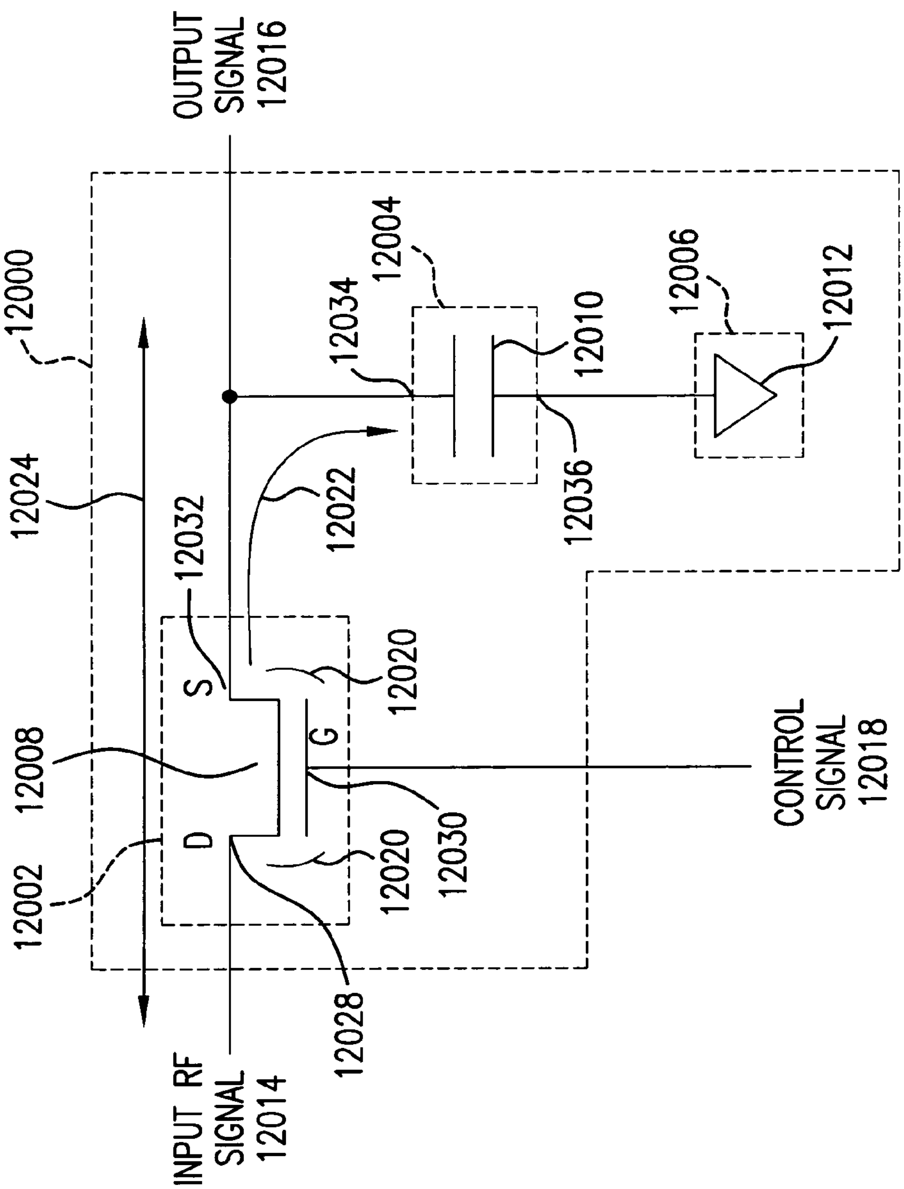
FIG. 120 illustrates some aspects of charge injection related to embodiments of the present invention.

In this section, an embodiment, according to the present invention, is provided for reducing or eliminating DC offset due at least to charge injection. FIG. 120 illustrates some aspects of charge injection related to the present invention. FIG. 120 shows a UFD module 12000 comprising a UFT module 12002, a storage device 12004, and a reference potential 12006. In an embodiment, UFT module 12002 comprises a MOSFET 12008, and storage device 12004 comprises a capacitor 12010, although the invention is not limited to this example.

An input RF signal 12014 is received by a first terminal 12028 of MOSFET 12008. A control signal 12018 is received by a second terminal 12030 of MOSFET 12008. A third terminal 12032 of MOSFET 12008 is coupled to a first terminal 12034 of storage device 12004. A second terminal 12036 of storage device 12004 is coupled to reference potential 12006 such as a ground 12012, or some other potential. In an embodiment, MOSFET 12008 contained within UFT module 12002 opens and closes as a function of control signal 12018. As a result of the opening and closing of this switch, a down-converted signal, referred to as output signal 12016, results.

A well known phenomenon called charge injection may occur in such a switching environment. As control signal 12018 applies a pulse waveform to the gate of MOSFET 12008, MOSFET 12008 is caused to open and close. During this operation, charge allowed to flow along a DC path 12024 may build on the gate-to-drain and/or gate-to-source junctions of MOSFET 12008, as indicated on FIG. 120 as charge buildup 12020 (note that the source and drain terminals of MOSFET 12008 are essentially interchangeable). Charge buildup 12020 may leak from MOSFET 12008 through leakage path 12022, and become stored on capacitor 12010. This charge that becomes stored on capacitor 12010 may cause a change in the voltage across capacitor 12010. This voltage change may accordingly appear on output signal 12016 as a potentially non-negligible DC offset voltage. This non-negligible DC offset voltage on output signal 12016 may lead to difficulties in recovering the baseband information content of output signal 12016. Hence, it would be advantageous to reduce or prevent this potential generation of DC offset voltage caused by this interaction of control signal 12018 with UFD module 12000.

Figure 121:
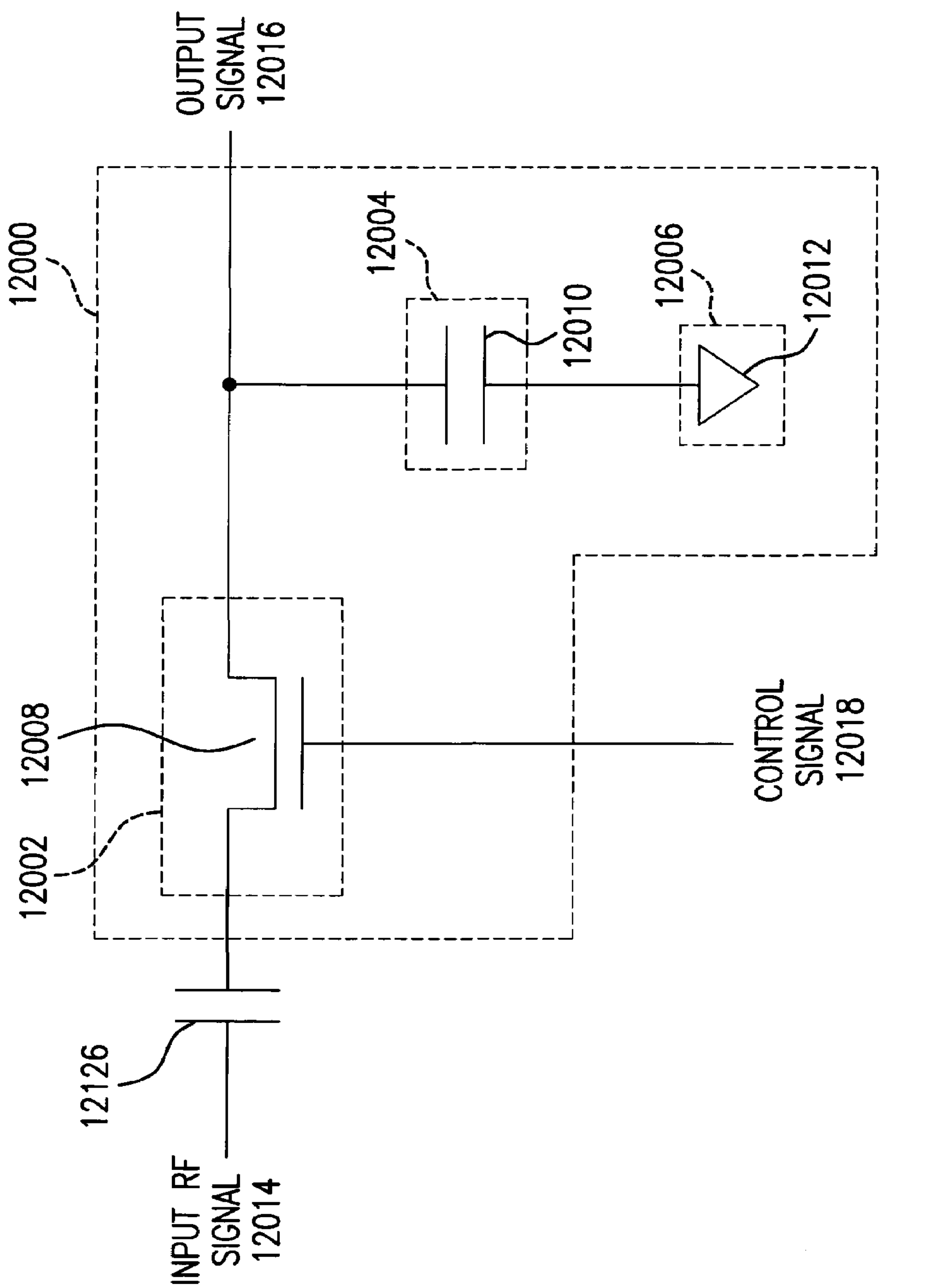
FIG. 121 illustrates an exemplary circuit configuration for reducing DC offset voltage caused by charge injection, according to an embodiment of the present invention.

FIG. 121 illustrates an exemplary circuit configuration for reducing unwanted DC offset voltage caused by charge injection, according to an embodiment of the present invention.

FIG. 121 shows UFD module 12000 of FIG. 120, with a capacitor 12126 coupled between input RF signal 12014 and UFD module 12000. Capacitor 12126 is preferably a small valued capacitor, such as, but not limited to, 10 pF. The value for capacitor 12126 will vary depending upon the application, and accordingly its characteristics are implementation and application specific. Capacitor 12126 prevents DC current from flowing along the path shown as DC path 12024 in FIG. 120, and thus reduces or prevents the flow of charge to, and build up of charge on capacitor 12010. This in turn reduces or prevents a DC offset voltage resulting from the above described charge injection from appearing on output signal 12016. Hence, the baseband information content of output signal 12016 may be more accurately ascertained.

Figure 122:
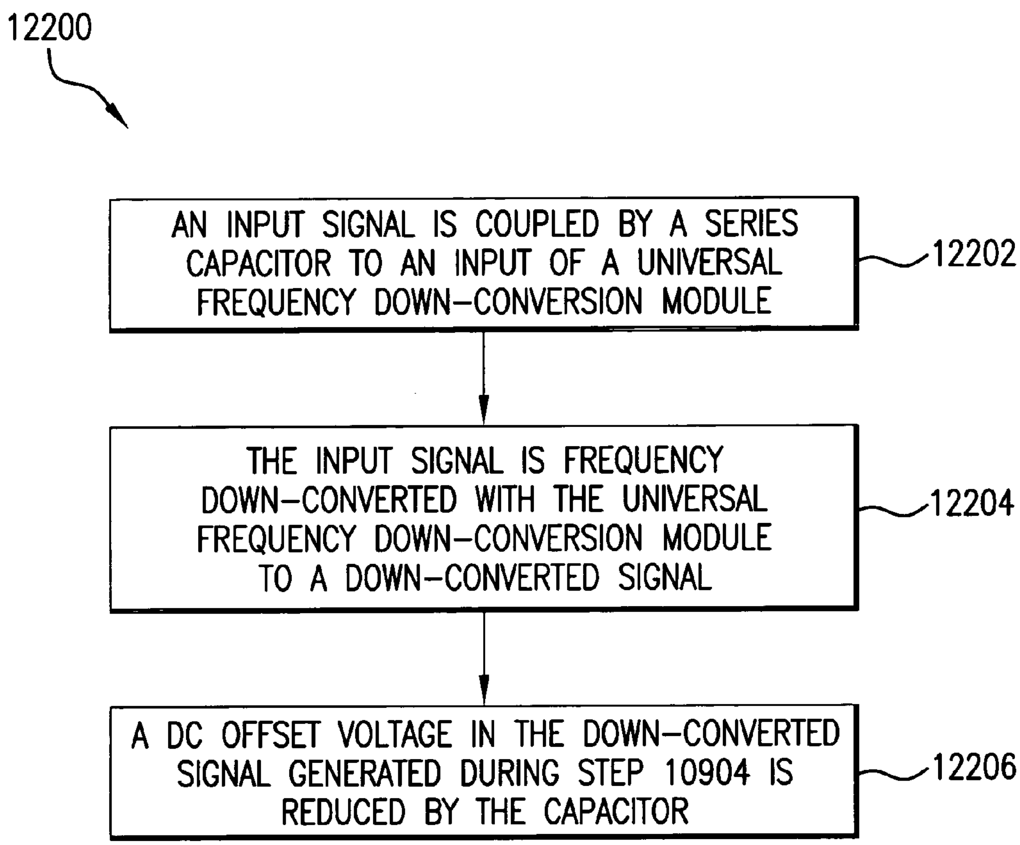
FIG. 122 depicts a flowchart that illustrates operational steps for down-converting an input signal and reducing a DC offset voltage, according to an embodiment of the present invention.

FIG. 122 depicts a flowchart 12200 that illustrates operational steps corresponding to FIG. 121, for down-converting an input signal and reducing a DC offset voltage, according to an embodiment of the present invention. The invention is not limited to this operational description. Rather, it will be apparent to persons skilled in the relevant art(s) from the teachings herein that other operational control flows are within the scope and spirit of the present invention. It is noted that the ordering of steps is flexible, and not limited to that shown in the flowcharts, and described herein. In the following discussion, the steps in FIG. 122 will be described.

In step 12202, an input signal is coupled by a series capacitor to an input of a universal frequency down-conversion module.

In step 12204, the input signal is frequency down-converted with the universal frequency down-conversion module to a down-converted signal. The input signal is down-converted according to a control signal. The control signal under-samples the input signal.

In step 12206, a DC offset voltage in the down-converted signal generated during step 12204 is reduced. In an embodiment, the DC offset voltage is generated at least by charge injection effects due to interaction of the control signal with the universal frequency down-conversion module, as further described above.

It should be understood that the above examples are provided for illustrative purposes only. The invention is not limited to this embodiment. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

2.2 Example I/Q Modulation Receiver Embodiments

Figure 103:
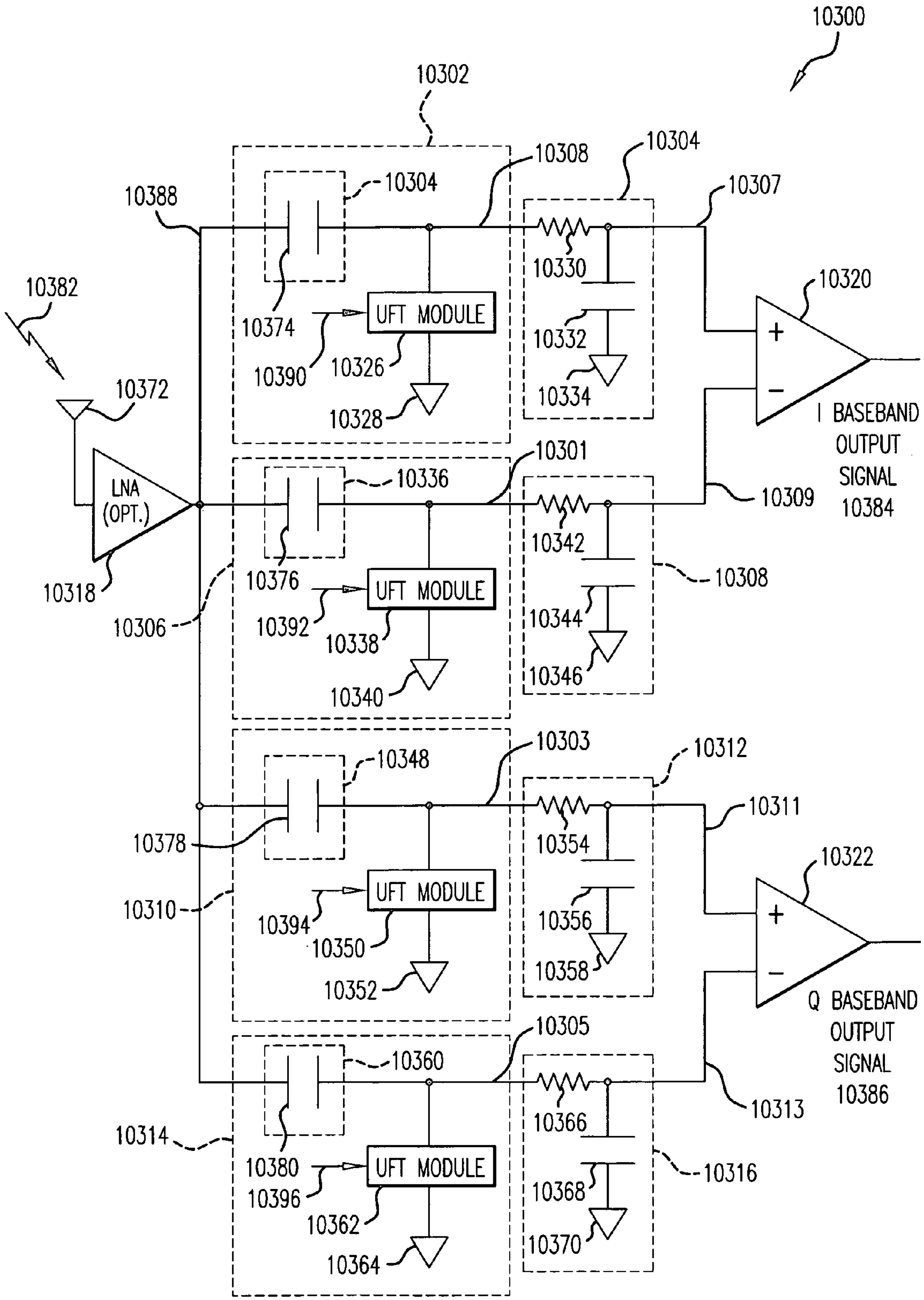
FIG. 103 illustrates an exemplary I/Q modulation receiver, according to an embodiment of the present invention.

FIG. 103 illustrates an exemplary I/Q modulation receiver 10300, according to an embodiment of the present invention. I/Q modulation receiver 10300 has additional advantages of reducing or eliminating unwanted DC offsets and circuit re-radiation.

I/Q modulation receiver 10300 comprises a first UFD module 10302, a first optional filter 10304, a second UFD module 10306, a second optional filter 10308, a third UFD module 10310, a third optional filter 10312, a fourth UFD module 10314, a fourth filter 10316, an optional LNA 10318, a first differential amplifier 10320, a second differential amplifier 10322, and an antenna 10372.

I/Q modulation receiver 10300 receives, down-converts, and demodulates a I/Q modulated RF input signal 10382 to an I baseband output signal 10384, and a Q baseband output signal 10386. I/Q modulated RF input signal comprises a first information signal and a second information signal that are I/Q modulated onto an RF carrier signal. I baseband output signal 10384 comprises the first baseband information signal. Q baseband output signal 10386 comprises the second baseband information signal.

Antenna 10372 receives I/Q modulated RF input signal 10382. I/Q modulated RF input signal 10382 is output by antenna 10372 and received by optional LNA 10318. When present, LNA 10318 amplifies I/Q modulated RF input signal 10382, and outputs amplified I/Q signal 10388.

First UFD module 10302 receives amplified I/Q signal 10388. First UFD module 10302 down-converts the I-phase signal portion of amplified input I/Q signal 10388 according to an I control signal 10390. First UFD module 10302 outputs an I output signal 10398.

In an embodiment, first UFD module 10302 comprises a first storage module 10324, a first UFT module 10326, and a first voltage reference 10328. In an embodiment, a switch contained within first UFT module 10326 opens and closes as a function of I control signal 10390. As a result of the opening and closing of this switch, which respectively couples and de-couples first storage module 10324 to and from first voltage reference 10328, a down-converted signal, referred to as I output signal 10398, results. First voltage reference 10328 may be any reference voltage, and is preferably ground. I output signal 10398 is stored by first storage module 10324.

In a preferred embodiment, first storage module 10324 comprises a first capacitor 10374. In addition to storing I output signal 10398, first capacitor 10374 reduces or prevents a DC offset voltage resulting from above described charge injection from appearing on I output signal 10398, in a similar fashion to that of capacitor 12126 shown in FIG. 121. Refer to Section 2.1 above for further discussion on reducing or eliminating charge injection with a series capacitor such as capacitor 12126.

I output signal 10398 is received by optional first filter 10304. When present, first filter 10304 is a high pass filter to at least filter I output signal 10398 to remove any carrier signal "bleed through". In a preferred embodiment, when present, first filter 10304 comprises a first resistor 10330, a first filter capacitor 10332, and a first filter voltage reference 10334. Preferably, first resistor 10330 is coupled between I output signal 10398 and a filtered I output signal 10307, and first filter capacitor 10332 is coupled between filtered I output signal 10307 and first filter voltage reference 10334. Alternately, first filter 10304 may comprise any other applicable filter configuration as would be understood by persons skilled in the relevant art(s). First filter 10304 outputs filtered I output signal 10307.

Second UFD module 10306 receives amplified I/Q signal 10388. Second UFD module 10306 down-converts the inverted I-phase signal portion of amplified input I/Q signal 10388 according to an inverted I control signal 10392. Second UFD module 10306 outputs an inverted I output signal 10301.

In an embodiment, second UFD module 10306 comprises a second storage module 10336, a second UFT module 10338, and a second voltage reference 10340. In an embodiment, a switch contained within second UFT module 10338 opens and closes as a function of inverted I control signal 10392. As a result of the opening and closing of this switch, which respectively couples and de-couples second storage module 10336 to and from second voltage reference 10340, a down-converted signal, referred to as inverted I output signal 10301, results. Second voltage reference 10340 may be any reference voltage, and is preferably ground. Inverted I output signal 10301 is stored by second storage module 10336.

In a preferred embodiment, second storage module 10336 comprises a second capacitor 10376. In addition to storing inverted I output signal 10301, second capacitor 10376 reduces or prevents a DC offset voltage resulting from above described charge injection from appearing on inverted I output signal 10301, in a similar fashion to that of capacitor 12126 shown in FIG. 121. Refer to Section 2.1 above for further discussion on reducing or eliminating charge injection with a series capacitor such as capacitor 12126.

Inverted I output signal 10301 is received by optional second filter 10308. When present, second filter 10308 is a high pass filter to at least filter inverted I output signal 10301 to remove any carrier signal "bleed through". In a preferred embodiment, when present, second filter 10308 comprises a second resistor 10342, a second filter capacitor 10344, and a second filter voltage reference 10346. Preferably, second resistor 10342 is coupled between inverted I output signal 10301 and a filtered inverted I output signal 10309, and second filter capacitor 10344 is coupled between filtered inverted I output signal 10309 and second filter voltage reference 10346. Alternately, second filter 10308 may comprise any other applicable filter configuration as would be understood by persons skilled in the relevant art(s). Second filter 10308 outputs filtered inverted I output signal 10309.

First differential amplifier 10320 receives filtered I output signal 10307 at its non-inverting input and receives filtered inverted I output signal 10309 at its inverting input. First differential amplifier 10320 subtracts filtered inverted I output signal 10309 from filtered I output signal 10307, amplifies the result, and outputs I baseband output signal 10384. Other suitable subtractor and/or amplification modules may be substituted for first differential amplifier 10320, and second differential amplifier 10322, as would be understood by persons skilled in the relevant art(s) from the teachings herein. Because filtered inverted I output signal 10309 is substantially equal to an inverted version of filtered I output signal 10307, I baseband output signal 10384 is substantially equal to filtered I output signal 10309, with its amplitude doubled. Furthermore, filtered I output signal 10307 and filtered inverted I output signal 10309 may comprise substantially equal noise and DC offset contributions of the same polarity from prior down-conversion circuitry, including first UFD module 10302 and second UFD module 10306, respectively. When first differential amplifier 10320 subtracts filtered inverted I output signal 10309 from filtered I output signal 10307, these noise and DC offset contributions substantially cancel each other.

Third UFD module 10310 receives amplified I/Q signal 10388. Third UFD module 10310 down-converts the Q-phase signal portion of amplified input I/Q signal 10388 according to an Q control signal 10394. Third UFD module 10310 outputs an Q output signal 10303.

In an embodiment, third UFD module 10310 comprises a third storage module 10348, a third UFT module 10350, and a third voltage reference 10352. In an embodiment, a switch contained within third UFT module 10350 opens and closes as a function of Q control signal 10394. As a result of the opening and closing of this switch, which respectively couples and de-couples third storage module 10348 to and from third voltage reference 10352, a down-converted signal, referred to as Q output signal 10303, results. Third voltage reference 10352 may be any reference voltage, and is preferably ground. Q output signal 10303 is stored by third storage module 10348.

In a preferred embodiment, third storage module 10348 comprises a third capacitor 10378. In addition to storing Q output signal 10303, third capacitor 10378 reduces or prevents a DC offset voltage resulting from above described charge injection from appearing on Q output signal 10303, in a similar fashion to that of capacitor 12126 shown in FIG. 121. Refer to Section 2.1 above for further discussion on reducing or eliminating charge injection with a series capacitor such as capacitor 12126.

Q output signal 10303 is received by optional third filter 10312. When present, third filter 10312 is a high pass filter to at least filter Q output signal 10303 to remove any carrier signal "bleed through". In a preferred embodiment, when present, third filter 10312 comprises a third resistor 10354, a third filter capacitor 10358, and a third filter voltage reference 10358. Preferably, third resistor 10354 is coupled between Q output signal 10303 and a filtered Q output signal 10311, and third filter capacitor 10356 is coupled between filtered Q output signal 10311 and third filter voltage reference 10358. Alternately, third filter 10312 may comprise any other applicable filter configuration as would be understood by persons skilled in the relevant art(s). Third filter 10312 outputs filtered Q output signal 10311.

Fourth UFD module 10314 receives amplified I/Q signal 10388. Fourth UFD module 10314 down-converts the inverted Q-phase signal portion of amplified input I/Q signal 10388 according to an inverted Q control signal 10396. Fourth UFD module 10314 outputs an inverted Q output signal 10305.

In an embodiment, fourth UFD module 10314 comprises a fourth storage module 10360, a fourth UFT module 10362, and a fourth voltage reference 10364. In an embodiment, a switch contained within fourth UFT module 10362 opens and closes as a function of inverted Q control signal 10396. As a result of the opening and closing of this switch, which respectively couples and de-couples fourth storage module 10360 to and from fourth voltage reference 10364, a down-converted signal, referred to as inverted Q output signal 10305, results. Fourth voltage reference 10364 may be any reference voltage, and is preferably ground. Inverted Q output signal 10305 is stored by fourth storage module 10360.

In a preferred embodiment, fourth storage module 10360 comprises a fourth capacitor 10380. In addition to storing inverted Q output signal 10305, fourth capacitor 10380 reduces or prevents a DC offset voltage resulting from above described charge injection from appearing on inverted Q output signal 10305, in a similar fashion to that of capacitor 12126 shown in FIG. 121. Refer to Section 2.1 above for further discussion on reducing or eliminating charge injection with a series capacitor such as capacitor 12126.

Inverted Q output signal 10305 is received by optional fourth filter 10316. When present, fourth filter 10316 is a high pass filter to at least filter inverted Q output signal 10305 to remove any carrier signal "bleed through". In a preferred embodiment, when present, fourth filter 10316 comprises a fourth resistor 10366, a fourth filter capacitor 10368, and a fourth filter voltage reference 10370. Preferably, fourth resistor 10366 is coupled between inverted Q output signal 10305 and a filtered inverted Q output signal 10313, and fourth filter capacitor 10368 is coupled between filtered inverted Q output signal 10313 and fourth filter voltage reference 10370. Alternately, fourth filter 10316 may comprise any other applicable filter configuration as would be understood by persons skilled in the relevant art(s). Fourth filter 10316 outputs filtered inverted Q output signal 10313.

Second differential amplifier 10322 receives filtered Q output signal 10311 at its non-inverting input and receives filtered inverted Q output signal 10313 at its inverting input. Second differential amplifier 10322 subtracts filtered inverted Q output signal 10313 from filtered Q output signal 10311, amplifies the result, and outputs Q baseband output signal 10386. Because filtered inverted Q output signal 10313 is substantially equal to an inverted version of filtered Q output signal 10311, Q baseband output signal 10386 is substantially equal to filtered Q output signal 10313, with its amplitude doubled. Furthermore, filtered Q output signal 10311 and filtered inverted Q output signal 10313 may comprise substantially equal noise and DC offset contributions of the same polarity from prior down-conversion circuitry, including third UFD module 10310 and fourth UFD module 10314, respectively. When second differential amplifier 10322 subtracts filtered inverted Q output signal 10313 from filtered Q output signal 10311, these noise and DC offset contributions substantially cancel each other.

Figure 123:
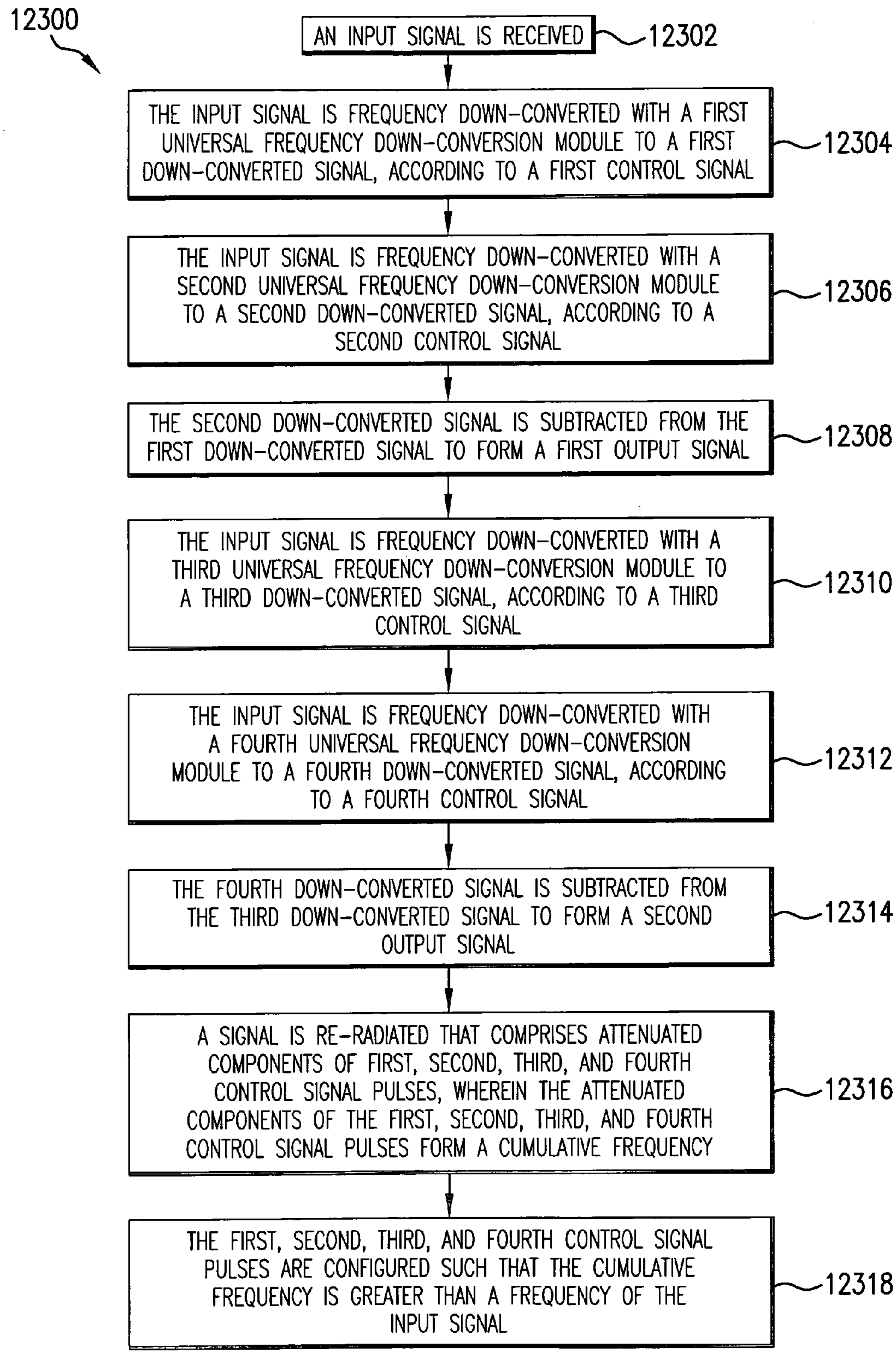
FIG. 123 depicts a flowchart that illustrates operational steps for down-converting a RF I/Q modulated signal and reducing DC offset voltages, according to an embodiment of the present invention.

FIG. 123 depicts a flowchart 12300 that illustrates operational steps corresponding to FIG. 103, for down-converting a RF I/Q modulated signal and reducing DC offset voltages, according to an embodiment of the present invention. The invention is not limited to this operational description. Rather, it will be apparent to persons skilled in the relevant art(s) from the teachings herein that other operational control flows are within the scope and spirit of the present invention. In the following discussion, the steps in FIG. 123 will be described.

In step 12302, an input signal is received, wherein the input signal comprises an RF I/Q modulated signal.

In step 12304, the input signal is frequency down-converted with a first universal frequency down-conversion module to a first down-converted signal, according to a first control signal. In an embodiment, the input signal is frequency down-converted to a non-inverted I-phase signal portion of the RF I/Q modulated signal. For instance, in an embodiment, a first phase of the in-phase signal portion of the RF I/Q modulated signal is under-sampled. In an embodiment, the RF I/Q modulated signal may be under-sampled every 3.0 cycles of a frequency of the RF I/Q modulated signal by the first control signal. Furthermore, in embodiments, a first DC offset voltage in the first down-converted signal is reduced by a capacitor of the first universal frequency down-conversion module.

In step 12306, the input signal is frequency down-converted with a second universal frequency down-conversion module to a second down-converted signal, according to a second control signal. In an embodiment, the input signal is frequency down-converted to an inverted Q-phase signal portion of the RF I/Q modulated signal. For instance, in an embodiment, a second phase of the in-phase signal portion of the RF I/Q modulated signal is under-sampled, wherein the second phase of the in-phase signal portion is of an opposite phase to the first phase under-sampled of the in-phase signal portion. The RF I/Q modulated signal may be sampled 1.5 cycles of a frequency of the RF I/Q modulated signal after under-sampling the RF I/Q modulated signal in step 12304, for example. Furthermore, in embodiments, a second DC offset voltage in the second down-converted signal is reduced by a capacitor of the second universal frequency down-conversion module.

In step 12308, the second down-converted signal is subtracted from the first down-converted signal to form a first output signal. In embodiments, a first DC offset voltage in the first down-converted signal and a second DC offset voltage in the second down-converted signal cancel one another.

In step 12310, the input signal is frequency down-converted with a third universal frequency down-conversion module to a third down-converted signal, according to a third control signal. In an embodiment, the input signal is frequency down-converted to a non-inverted Q-phase signal portion of the RF I/Q modulated signal. For instance, in an embodiment, a third phase of the quadrature-phase signal portion of the RF I/Q modulated signal is under-sampled. The RF I/Q modulated signal may be under-sampled 0.75 cycles of the frequency of the RF I/Q modulated signal after under-sampling of the RF I/Q modulated signal occurs in step 12304, for example. Furthermore, in embodiments, a third DC offset voltage in the third down-converted signal is reduced by a capacitor of the third universal frequency down-conversion module.

In step 12312, the input signal is frequency down-converted with a fourth universal frequency down-conversion module to a fourth down-converted signal, according to a fourth control signal. In an embodiment, the input signal is frequency down-converted to an inverted I-phase signal portion of the RF I/Q modulated signal. For instance, in an embodiment, a fourth phase of the quadrature-phase signal portion of the RF I/Q modulated signal is under-sampled, wherein the fourth phase of the quadrature-phase signal portion is of an opposite phase to the third phase under-sampled of the quadrature-phase signal portion. In an embodiment, the RF I/Q modulated signal may be sampled 1.5 cycles of the frequency of the RF I/Q modulated signal after under-sampling of the RF I/Q modulated signal occurs in step 12304, for example. Furthermore, in embodiments, a fourth DC offset voltage in the fourth down-converted signal is reduced by a capacitor of fourth universal frequency down-conversion module.

In step 12314, the fourth down-converted signal is subtracted from the third down-converted signal to form a second output signal. In embodiments, a third DC offset voltage in the third down-converted signal and a fourth DC offset voltage in the fourth down-converted signal cancel one another.

In step 12316, a signal is re-radiated that comprises attenuated components of first, second, third, and fourth control signal pulses, wherein the attenuated components of the first, second, third, and fourth control signal pulses form a cumulative frequency, as discussed above.

In step 12318, the first, second, third, and fourth control signal pulses are configured such that the cumulative frequency is greater than a frequency of the input signal, as discussed above.

2.2.1 Example I/Q Modulation Control Signal Generator Embodiments

Figure 104:
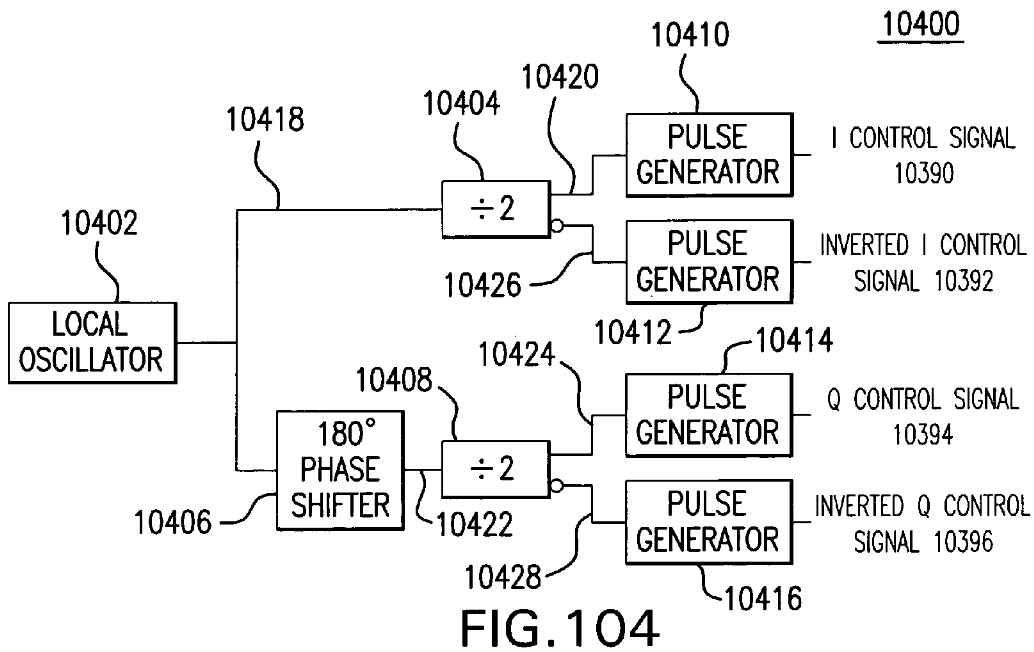
FIG. 104 illustrates a I/Q modulation control signal generator, according to an embodiment of the present invention.

FIG. 104 illustrates an exemplary block diagram for I/Q modulation control signal generator 10400, according to an embodiment of the present invention. I/Q modulation control signal generator 10400 generates I control signal 10390, inverted I control signal 10392, Q control signal 10394, and inverted Q control signal 10396 used by I/Q modulation receiver 10300 of FIG. 103. I control signal 10390 and inverted I control signal 10392 operate to down-convert the I-phase portion of an input I/Q modulated RF signal. Q control signal 10394 and inverted Q control signal 10396 act to down-convert the Q-phase portion of the input I/Q modulated RF signal. Furthermore, I/Q modulation control signal generator 10400 has the advantage of generating control signals in a manner such that resulting collective circuit re-radiation is radiated at one or more frequencies outside of the frequency range of interest. For instance, potential circuit re-radiation is radiated at a frequency substantially greater than that of the input RF carrier signal frequency.

I/Q modulation control signal generator 10400 comprises a local oscillator 10402, a first divide-by-two module 10404, a 180 degree phase shifter 10406, a second divide-by-two module 10408, a first pulse generator 10410, a second pulse generator 10412, a third pulse generator 10414, and a fourth pulse generator 10416.

Figure 105:
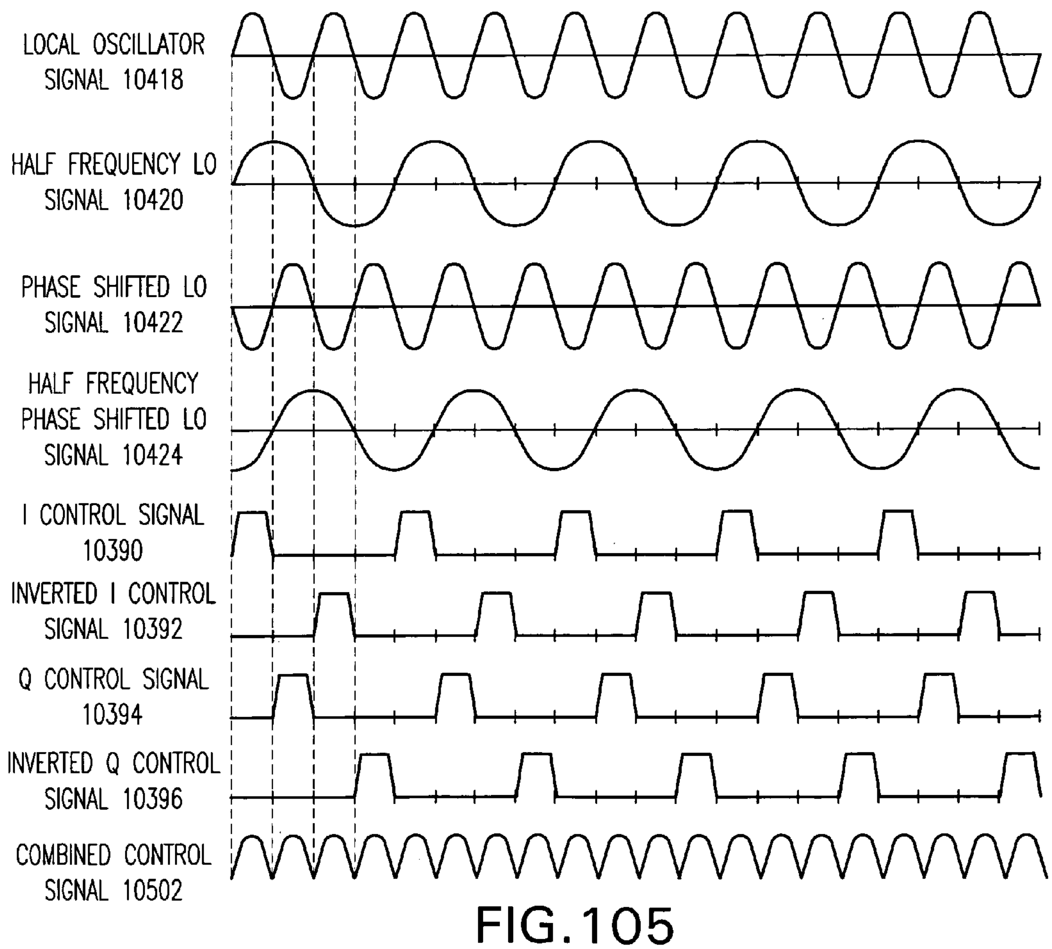
FIG. 105 illustrates example waveforms related to the I/Q modulation control signal generator of FIG. 104.

Local oscillator 10402 outputs an oscillating signal 10418. FIG. 105 shows an exemplary oscillating signal 10418.

First divide-by-two module 10404 receives oscillating signal 10418, divides oscillating signal 10418 by two, and outputs a half frequency LO signal 10420 and a half frequency inverted LO signal 10426. FIG. 105 shows an exemplary half frequency LO signal 10420. Half frequency inverted LO signal 10426 is an inverted version of half frequency LO signal 10420. First divide-by-two module 10404 may be implemented in circuit logic, hardware, software, or any combination thereof, as would be known by persons skilled in the relevant art(s).

180 degree phase shifter 10406 receives oscillating signal 10418, shifts the phase of oscillating signal 10418 by 180 degrees, and outputs phase-shifted LO signal 10422. 180 degree phase shifter 10406 may be implemented in circuit logic, hardware, software, or any combination thereof, as would be known by persons skilled in the relevant art(s). In alternative embodiments, other amounts of phase shift may be used.

Second divide-by two module 10408 receives phase-shifted LO signal 10422, divides phase-shifted LO signal 10422 by two, and outputs a half frequency phase-shifted LO signal 10424 and a half frequency inverted phase-shifted LO signal 10428. FIG. 105 shows an exemplary half frequency phase-shifted LO signal 10424. Half frequency inverted phase-shifted LO signal 10428 is an inverted version of half frequency phase-shifted LO signal 10424. Second divide-by-two module 10408 may be implemented in circuit logic, hardware, software, or any combination thereof, as would be known by persons skilled in the relevant art(s).

First pulse generator 10410 receives half frequency LO signal 10420, generates an output pulse whenever a rising edge is received on half frequency LO signal 10420, and outputs I control signal 10390. FIG. 105 shows an exemplary I control signal 10390.

Second pulse generator 10412 receives half frequency inverted LO signal 10426, generates an output pulse whenever a rising edge is received on half frequency inverted LO signal 10426, and outputs inverted I control signal 10392. FIG. 105 shows an exemplary inverted I control signal 10392.

Third pulse generator 10414 receives half frequency phase-shifted LO signal 10424, generates an output pulse whenever a rising edge is received on half frequency phase-shifted LO signal 10424, and outputs Q control signal 10394. FIG. 105 shows an exemplary Q control signal 10394.

Fourth pulse generator 10416 receives half frequency inverted phase-shifted LO signal 10428, generates an output pulse whenever a rising edge is received on half frequency inverted phase-shifted LO signal 10428, and outputs inverted Q control signal 10396. FIG. 105 shows an exemplary inverted Q control signal 10396.

In a preferred embodiment, control signals 10390, 10392, 10394 and 10396 output pulses having a width equal to one-half of a period of I/Q modulated RF input signal 10382. The invention, however, is not limited to these pulse widths, and control signals 10390, 10392, 10394, and 10396 may comprise pulse widths of any fraction of, or multiple and fraction of, a period of I/Q modulated RF input signal 10382.

First, second, third, and fourth pulse generators 10410, 10412, 10414, and 10416 may be implemented in circuit logic, hardware, software, or any combination thereof, as would be known by persons skilled in the relevant art(s).

As shown in FIG. 105, control signals 10390, 10392, 10394, and 10396 comprise pulses that are non-overlapping. Furthermore, in this example, pulses appear on these signals in the following order: I control signal 10390, Q control signal 10394, inverted I control signal 10392, and inverted Q control signal 10396. Potential circuit re-radiation from I/Q modulation receiver 10300 may comprise frequency components from a combination of these control signals.

Figure 106:
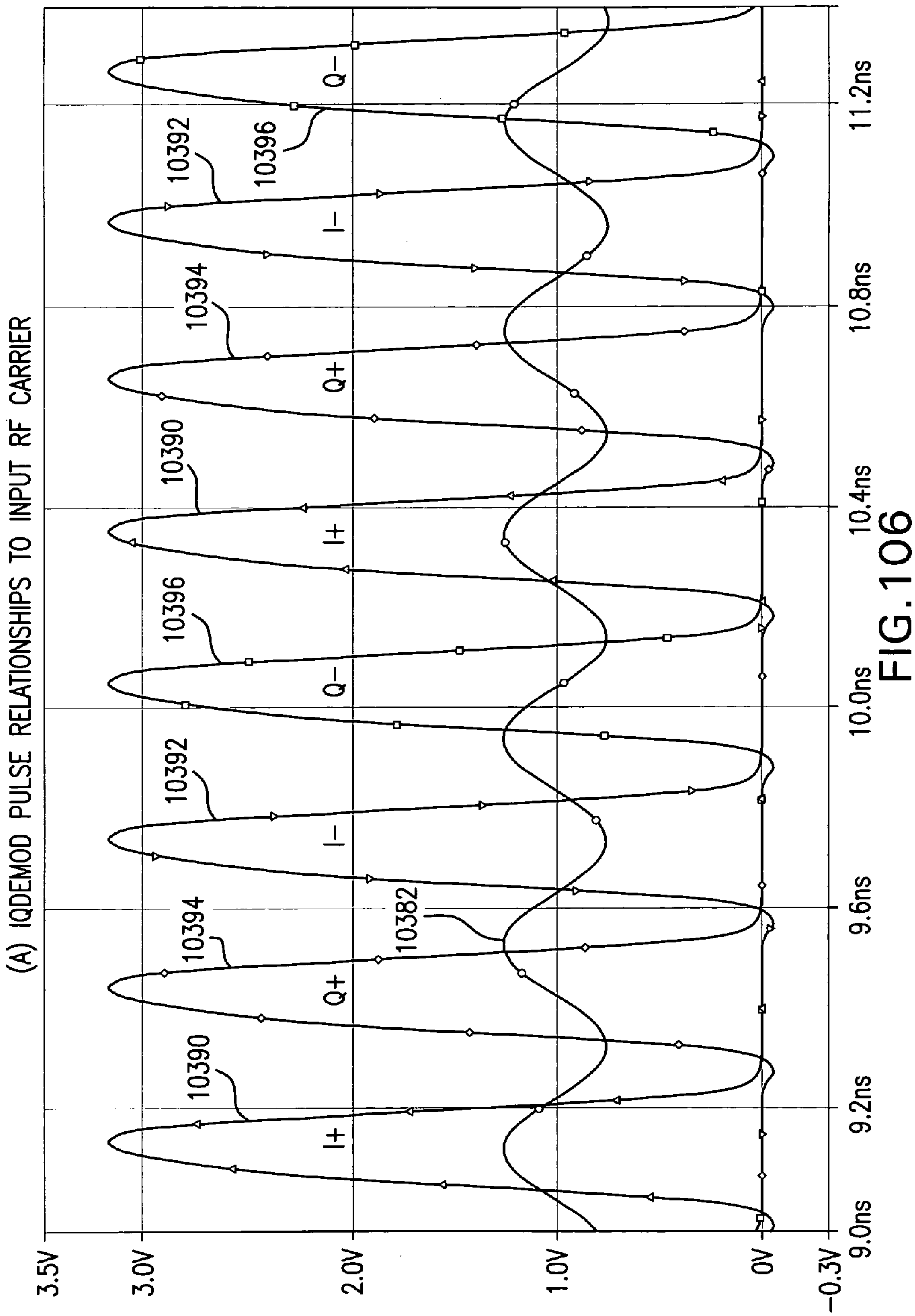
FIG. 106 illustrates example control signal waveforms overlaid upon an input RF signal.

For example, FIG. 106 shows an overlay of pulses from 1 control signal 10390, Q control signal 10394, inverted I control signal 10392, and inverted Q control signal 10396. When pulses from these control signals leak to through first, second, third, and fourth UFD modules 10302, 10306, 10310, and 10314 of to antenna 10382 (shown in FIG. 103), they may be radiated from I/Q modulation receiver 10300, with a combined waveform that appears to have a primary frequency equal to four times the frequency of any single one of control signals 10390, 10392, 10394, and 10396. FIG. 105 shows an example combined control signal 10502.

FIG. 106 also shows an example I/Q modulation RF input signal 10382 overlaid upon control signals 10390, 10392, 10394, and 10396. As shown in FIG. 106, pulses on I control signal 10390 overlay and act to down-convert a positive I-phase portion of I/Q modulation RF input signal 10382. Pulses on inverted I control signal 10392 overlay and act to down-convert a negative I-phase portion of I/Q modulation RF input signal 10382. Pulses on Q control signal 10394 overlay and act to down-convert a rising Q-phase portion of I/Q modulation RF input signal 10382. Pulses on inverted Q control signal 10396 overlay and act to down-convert a falling Q-phase portion of I/Q modulation RF input signal 10382.

As FIG. 106 further shows in this example, the frequency ratio between the combination of control signals 10390, 10392, 10394, and 10396 and I/Q modulation RF input signal 10382 is 4:3. Because the frequency of the potentially re-radiated signal, combined control signal 10502, is substantially different from that of the signal being down-converted, I/Q modulation RF input signal 10382, it does not interfere with signal down-conversion as it is out of the frequency band of interest, and hence may be filtered out. In this manner, I/Q modulation receiver 10300 reduces problems due to circuit re-radiation. As will be understood by persons skilled in the relevant art(s) from the teachings herein, frequency ratios other than 4:3 may be implemented to achieve similar reduction of problems of circuit re-radiation.

It should be understood that the above control signal generator circuit example is provided for illustrative purposes only. The invention is not limited to these embodiments. Alternative embodiments (including equivalents, extensions, variations, deviations, etc., of the embodiments described herein) for I/Q modulation control signal generator 10400 will be apparent to persons skilled in the relevant art(s) from the teachings herein, and are within the scope of the present invention.

Figure 107:
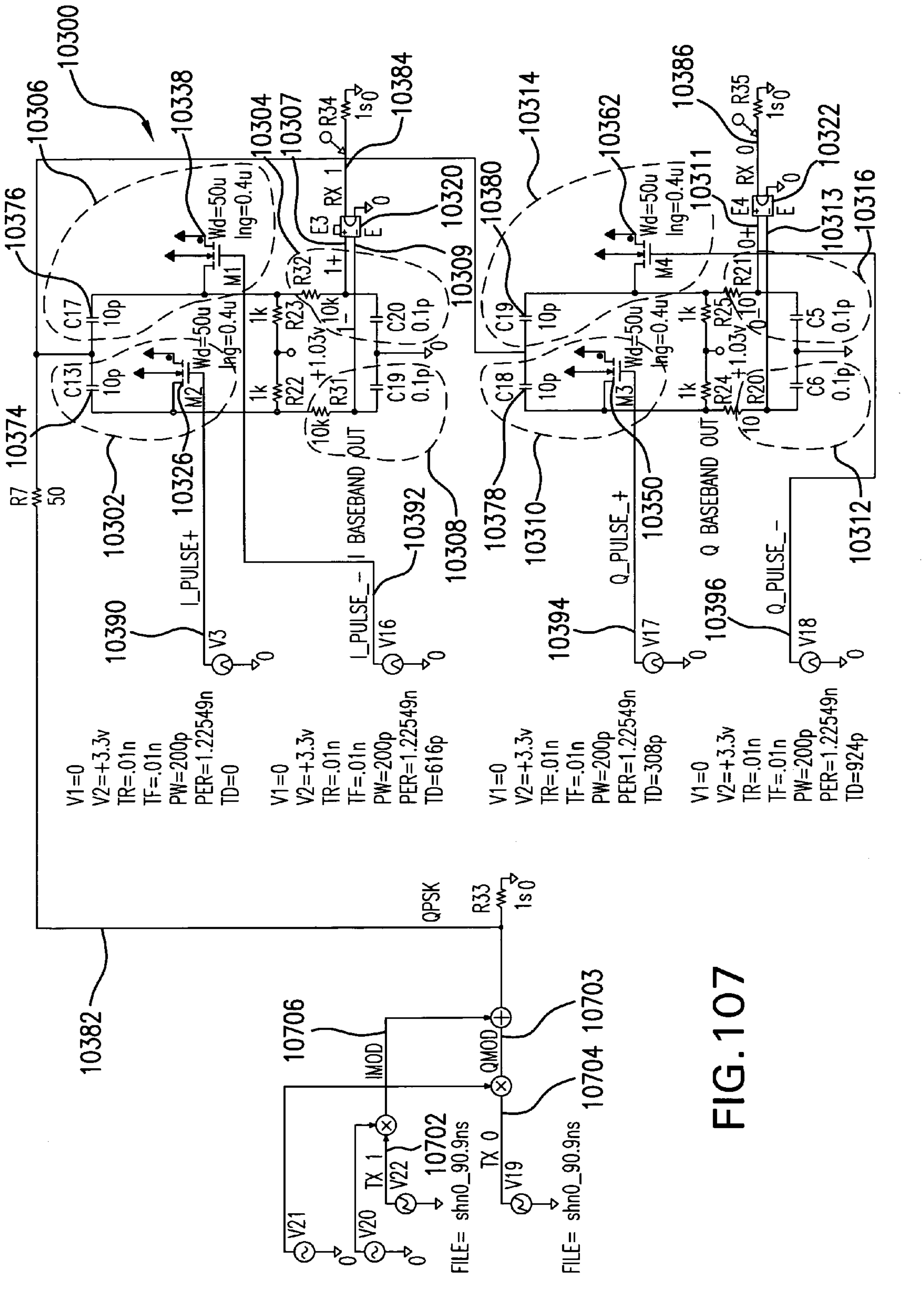
FIG. 107 illustrates a I/Q modulation receiver circuit diagram, according to an embodiment of the present invention.

2.2.2 Detailed Example I/Q Modulation Receiver Embodiment with Exemplary Waveforms FIG. 107 illustrates a more detailed example circuit implementation of I/Q modulation receiver 10300, according to an embodiment of the present invention. FIGS. 108–118 show waveforms related to an example implementation of I/Q modulation receiver 10300 of FIG. 107.

Figure 108:
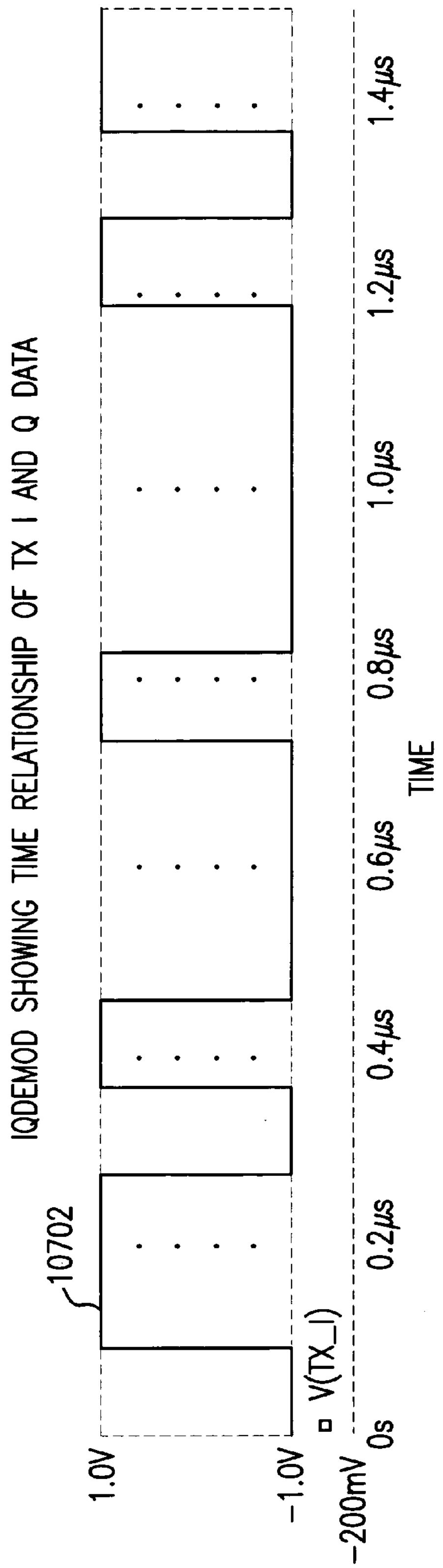
FIGS. 108–118 illustrate example waveforms related to the receiver of FIG. 107.
Figure 109:
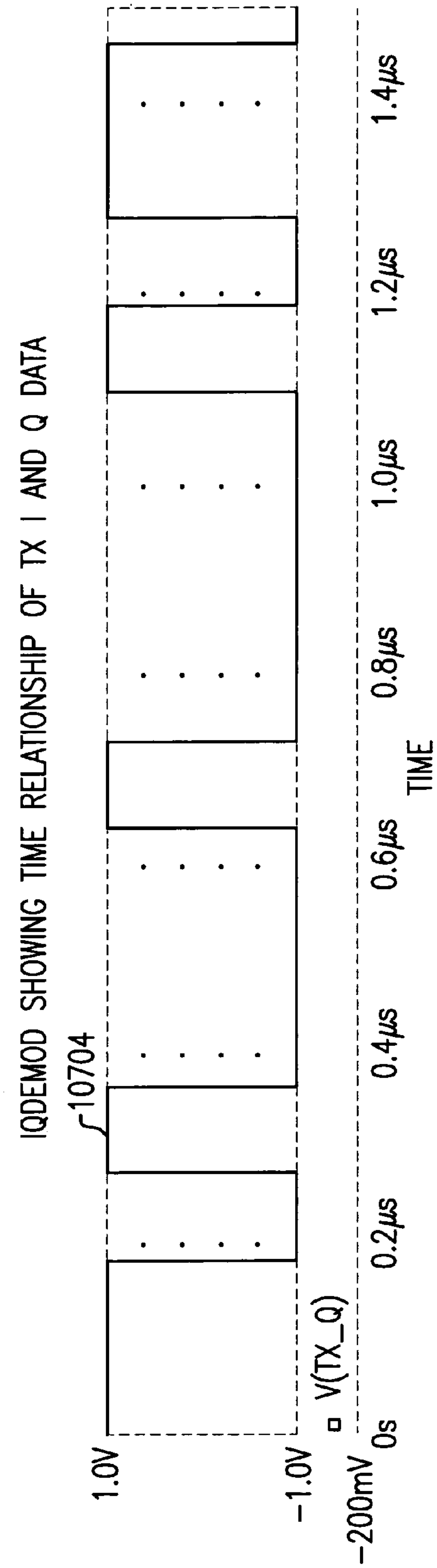

FIGS. 108 and 109 show first and second input data signals 10702 and 10704 to be I/Q modulated with a RF carrier signal frequency as the I-phase and Q-phase information signals, respectively.

Figure 111:
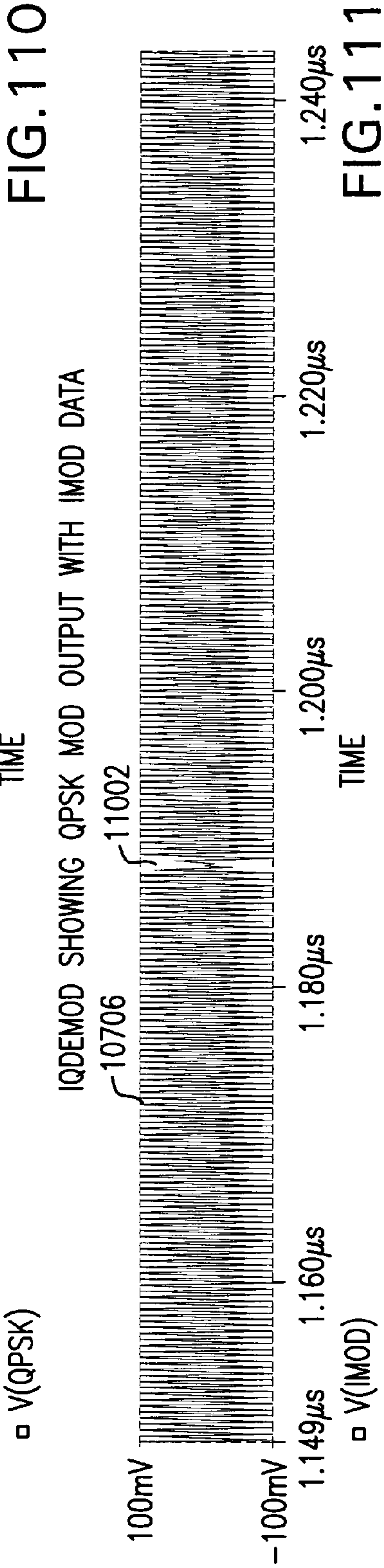
Figure 112:
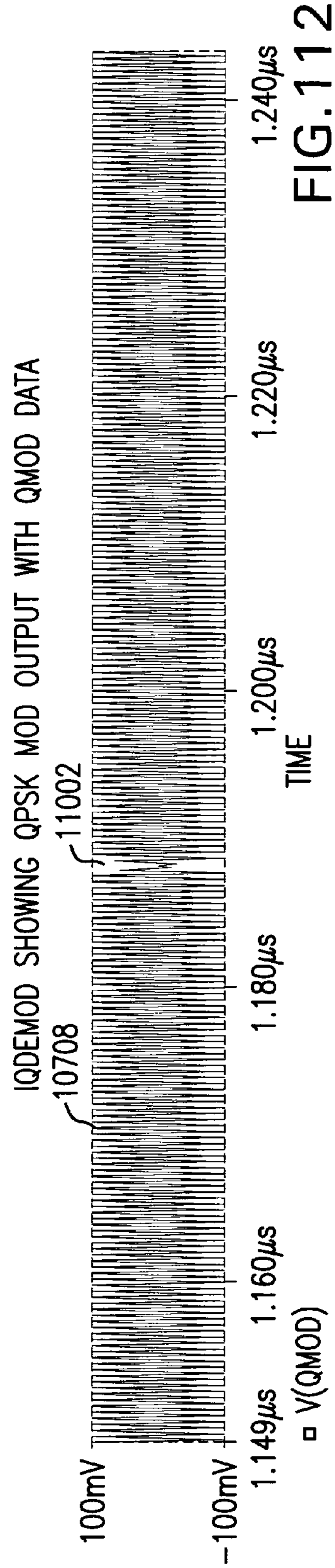

FIGS. 111 and 112 show the signals of FIGS. 108 and 109 after modulation with a RF carrier signal frequency, respectively, as I-modulated signal 10706 and Q-modulated signal 10708.

Figure 110:
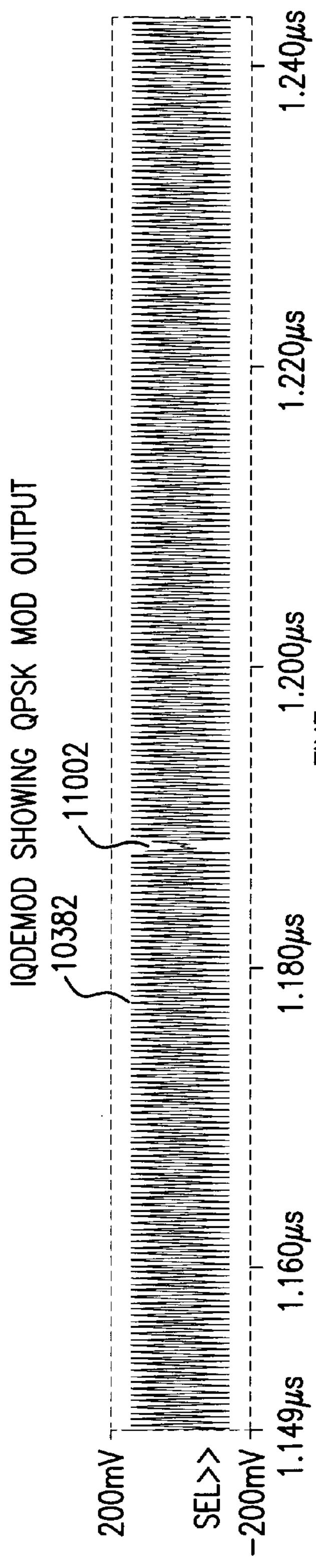

FIG. 110 shows an I/Q modulation RF input signal 10382 formed from I-modulated signal 10706 and Q-modulated signal 10708 of FIGS. 111 and 112, respectively.

Figures 115, 116, 117, 118:
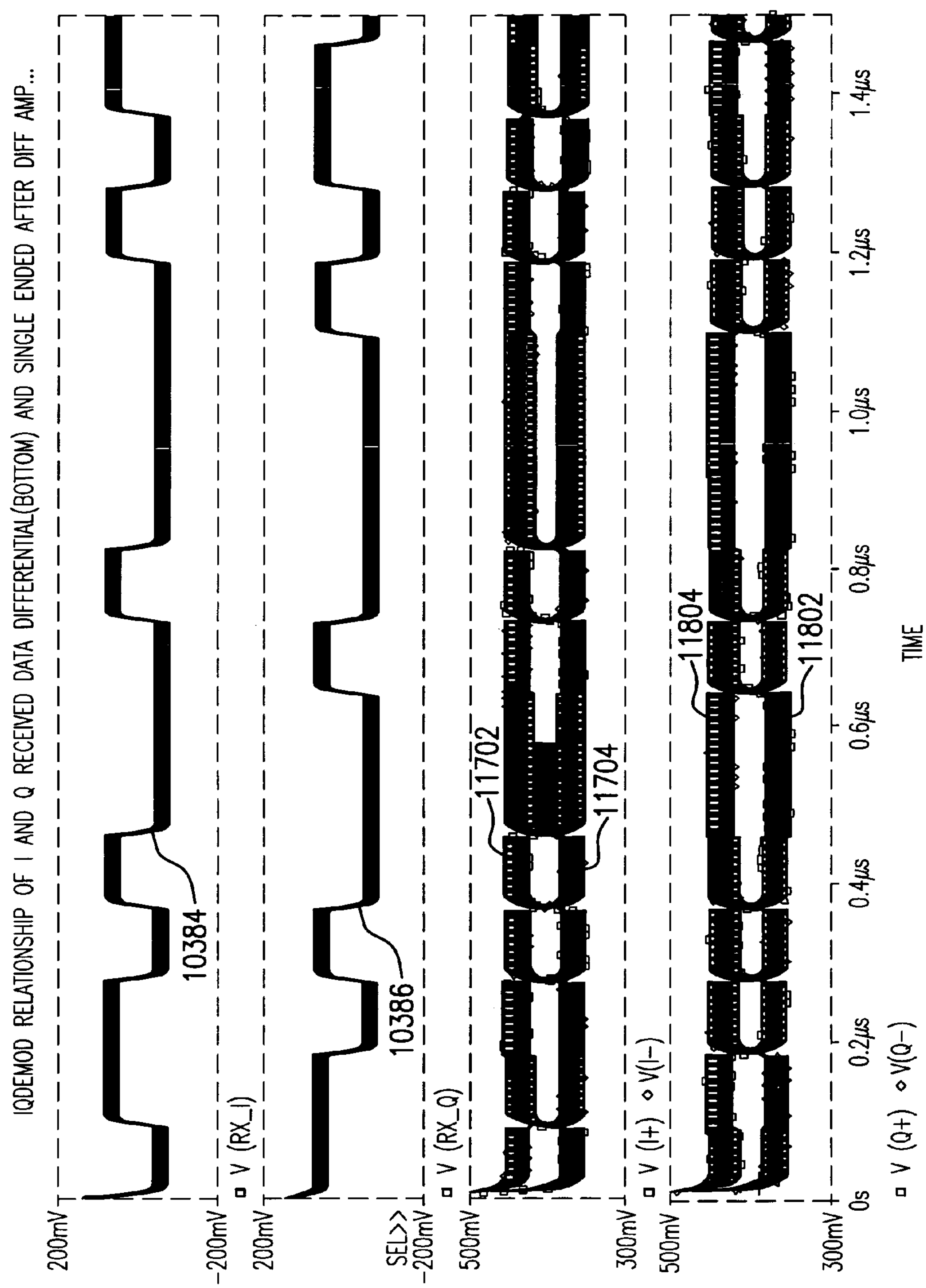

FIG. 117 shows an overlaid view of filtered I output signal 11702 and filtered inverted I output signal 11704.

FIG. 118 shows an overlaid view of filtered Q output signal 11802 and filtered inverted Q output signal 11804.

Figure 113:
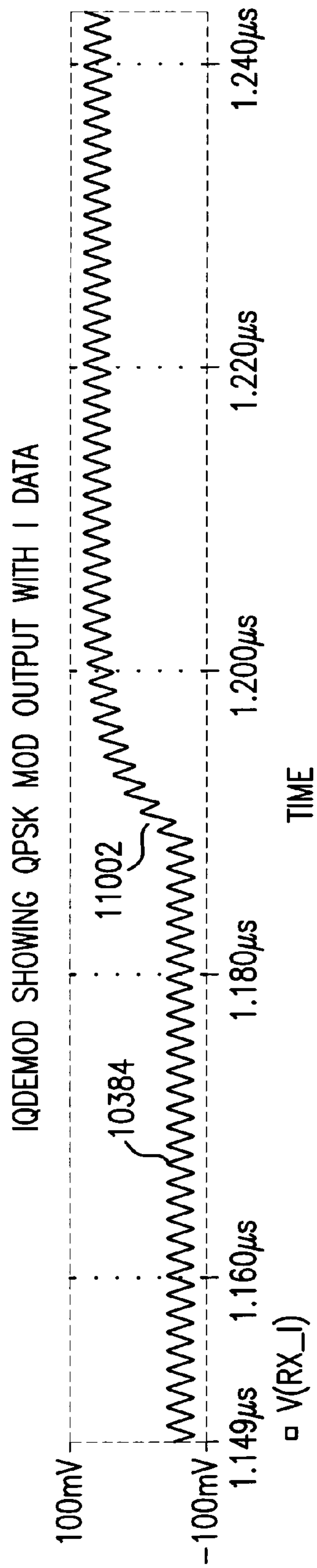
Figure 114:
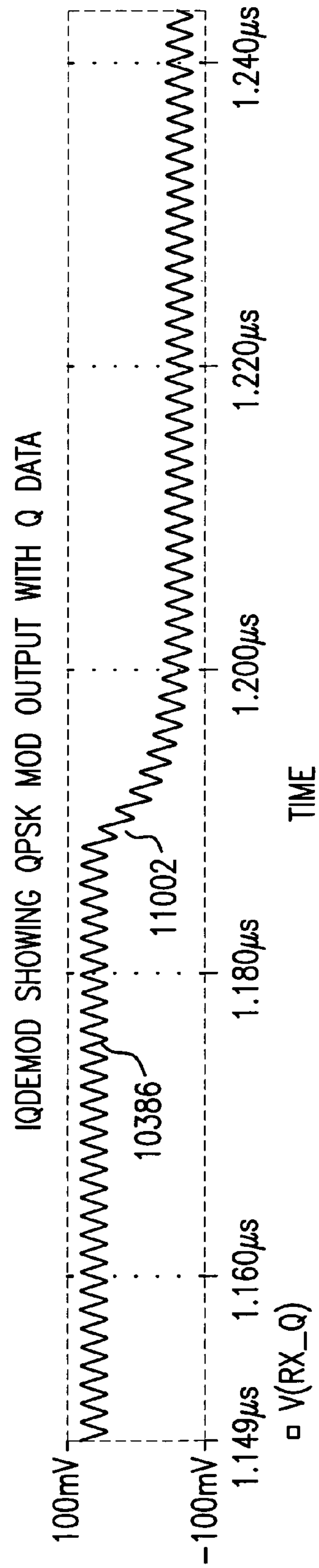

FIGS. 113 and 114 show I baseband output signal 10384 and Q baseband output signal 10386, respectfully. A data transition 11002 is indicated in both I baseband output signal 10384 and Q baseband output signal 10386. The corresponding data transition 11002 is indicated in I-modulated signal 10706 of FIG. 111, Q-modulated signal 10708 of FIG. 112, and I/Q modulation RF input signal 10382 of FIG. 110.

FIGS. 115 and 116 show I baseband output signal 10384 and Q baseband output signal 10386 over a wider time interval.

2.2.3 Example Single Channel Receiver Embodiment

Figure 119:
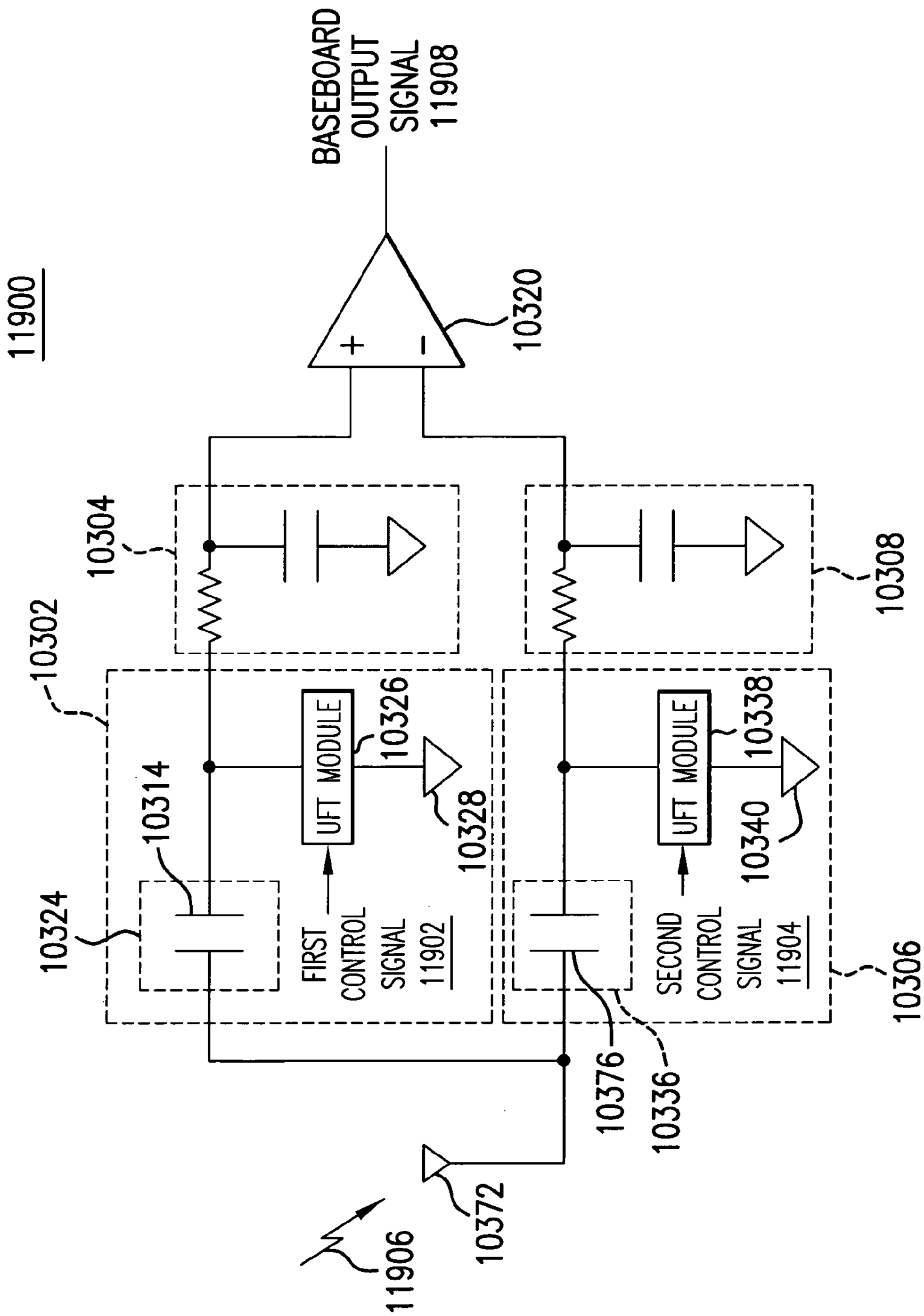
FIG. 119 illustrates a single channel receiver, according to an embodiment of the present invention.

FIG. 119 illustrates an exemplary single channel receiver 11900, corresponding to either the I or Q channel of I/Q modulation receiver 10300, according to an embodiment of the present invention. Single channel receiver 11900 can down-convert an input RF signal 11906 modulated according to AM, PM, FM, and other modulation schemes. Refer to Section 2.2 above for further description on the operation of single channel receiver 11900.

3. Frequency Up-Conversion

The present invention is directed to systems and methods of frequency up-conversion, and applications of same.

Figure 3:
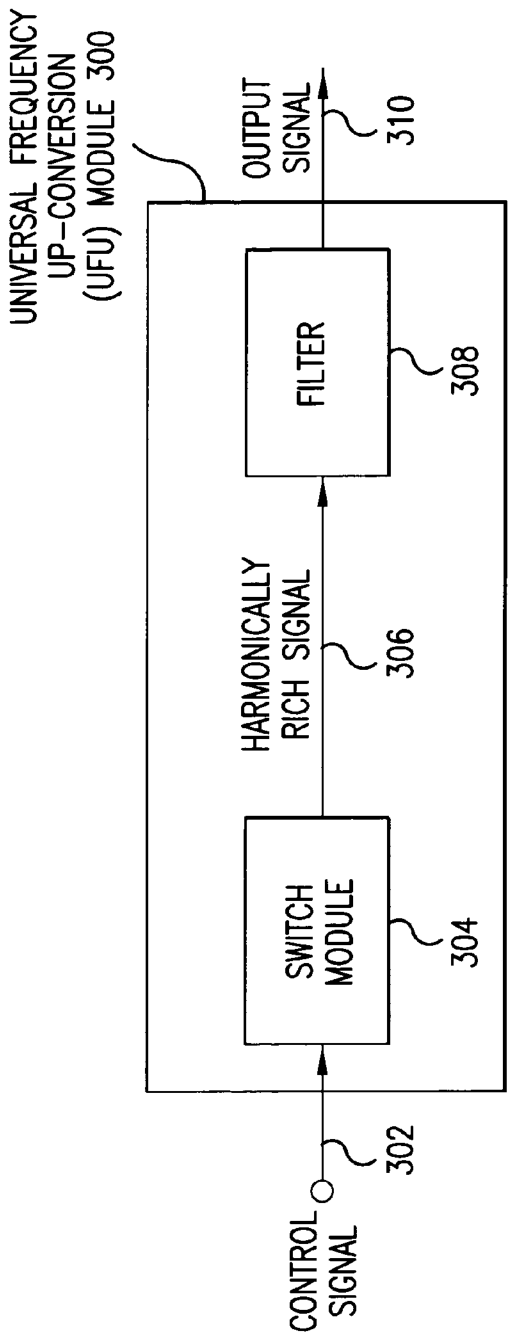
FIG. 3 is a block diagram of a universal frequency up-conversion (UFU) module according to an embodiment of the invention.

An example frequency up-conversion system 300 is illustrated in FIG. 3. The frequency up-conversion system 300 is now described.

Figures 6A, 6B, 6C, 6D:
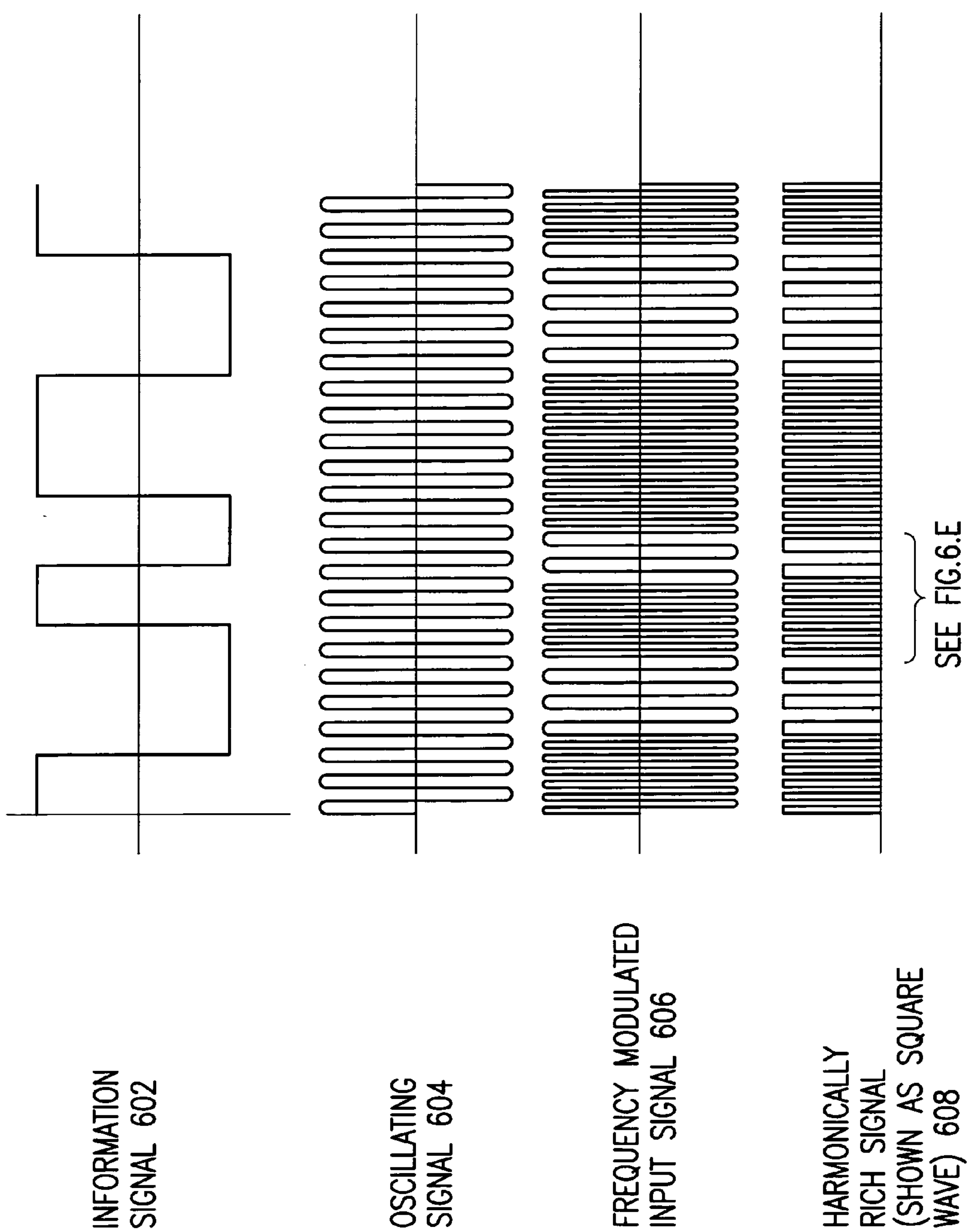
FIGS. 6A–6I illustrate example waveforms used to describe the operation of the UFU module.

An input signal 302 (designated as "Control Signal" in FIG. 3) is accepted by a switch module 304. For purposes of example only, assume that the input signal 302 is a FM input signal 606, an example of which is shown in FIG. 6C. FM input signal 606 may have been generated by modulating information signal 602 onto oscillating signal 604 (FIGS. 6A and 6B). It should be understood that the invention is not limited to this embodiment. The information signal 602 can be analog, digital, or any combination thereof, and any modulation scheme can be used.

The output of switch module 304 is a harmonically rich signal 306, shown for example in FIG. 6D as a harmonically rich signal 608. The harmonically rich signal 608 has a continuous and periodic waveform.

Figures 6E, 6F, 6G:
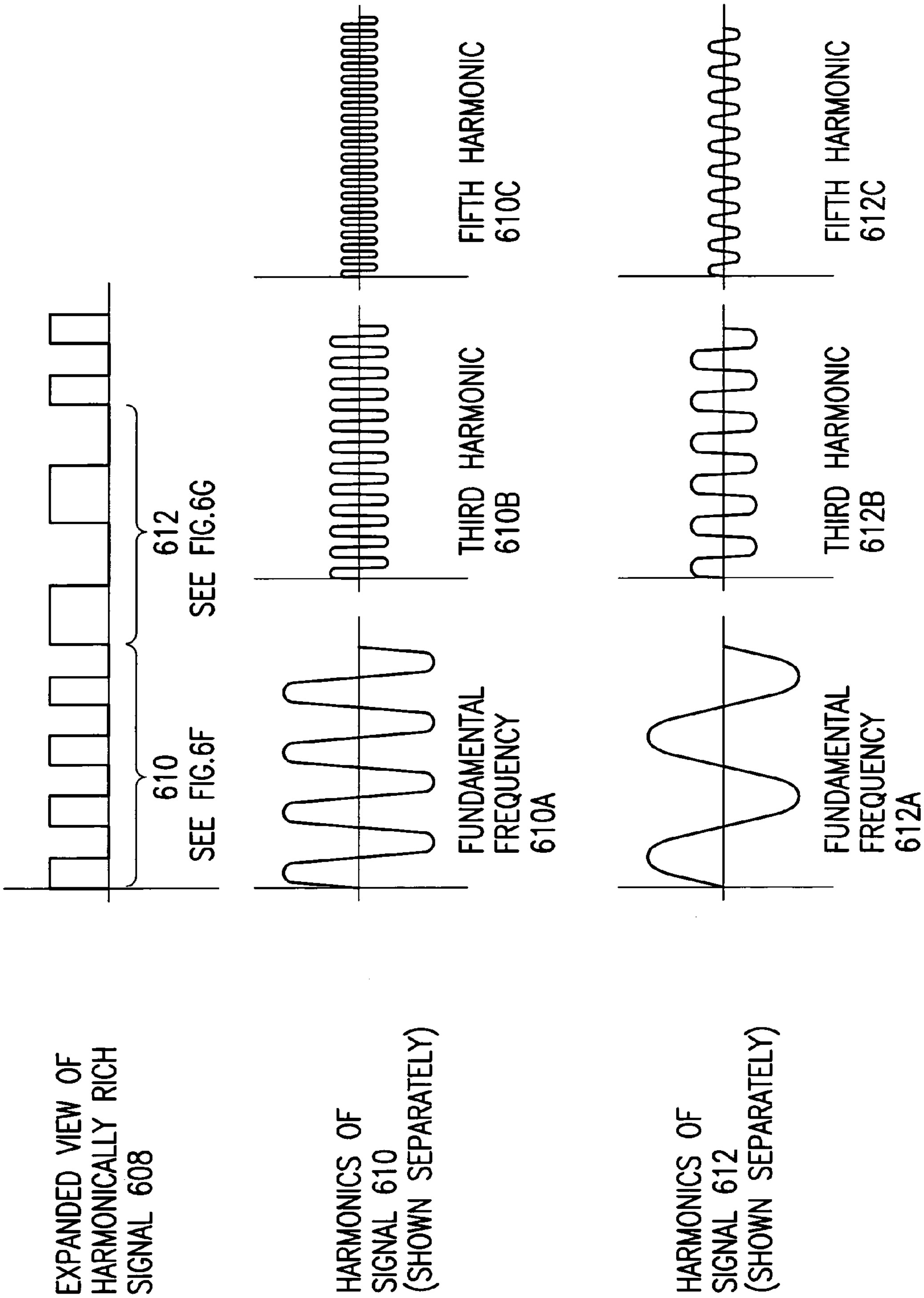

FIG. 6E is an expanded view of two sections of harmonically rich signal 608, section 610 and section 612. The harmonically rich signal 608 may be a rectangular wave, such as a square wave or a pulse (although, the invention is not limited to this embodiment). For ease of discussion, the term "rectangular wavefomm" is used to refer to waveforms that are substantially rectangular. In a similar manner, the term "square wave" refers to those waveforms that are substantially square and it is not the intent of the present invention that a perfect square wave be generated or needed.

Figure 6H:
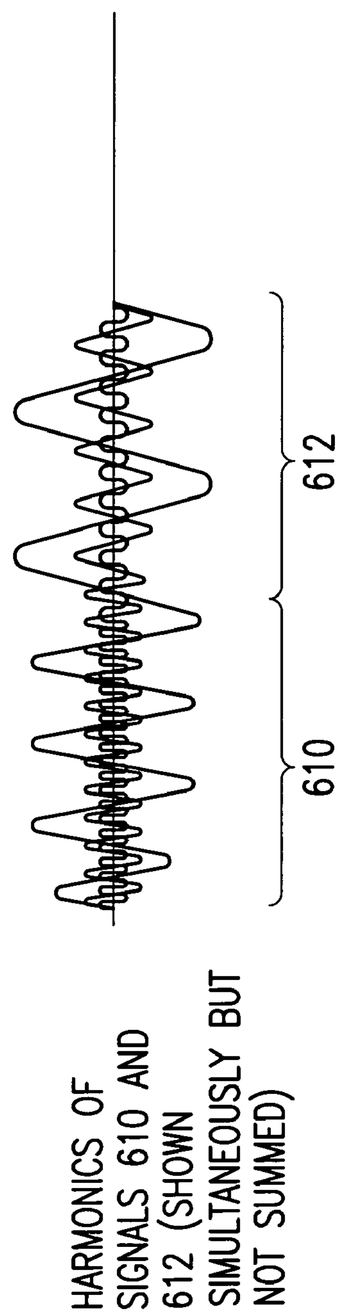

Harmonically rich signal 608 is comprised of a plurality of sinusoidal waves whose frequencies are integer multiples of the fundamental frequency of the waveform of the harmonically rich signal 608. These sinusoidal waves are referred to as the harmonics of the underlying waveform, and the fundamental frequency is referred to as the first harmonic. FIG. 6F and FIG. 6G show separately the sinusoidal components making up the first, third, and fifth harmonics of section 610 and section 612. (Note that in theory there may be an infinite number of harmonics; in this example, because harmonically rich signal 608 is shown as a square wave, there are only odd harmonics). Three harmonics are shown simultaneously (but not summed) in FIG. 6H.

The relative amplitudes of the harmonics are generally a function of the relative widths of the pulses of harmonically rich signal 306 and the period of the fundamental frequency, and can be determined by doing a Fourier analysis of harmonically rich signal 306. According to an embodiment of the invention, the input signal 606 may be shaped to ensure that the amplitude of the desired harmonic is sufficient for its intended use (e.g., transmission).

Figure 6I:
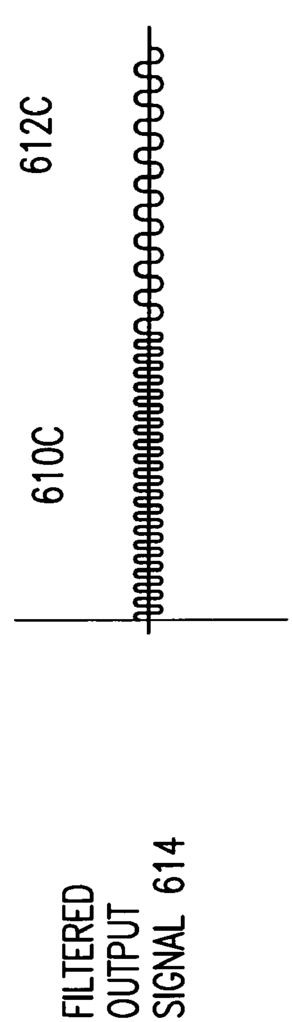

A filter 308 filters out any undesired frequencies (harmonics), and outputs an electromagnetic (EM) signal at the desired harmonic frequency or frequencies as an output signal 310, shown for example as a filtered output signal 614 in FIG. 6I.

Figure 4:
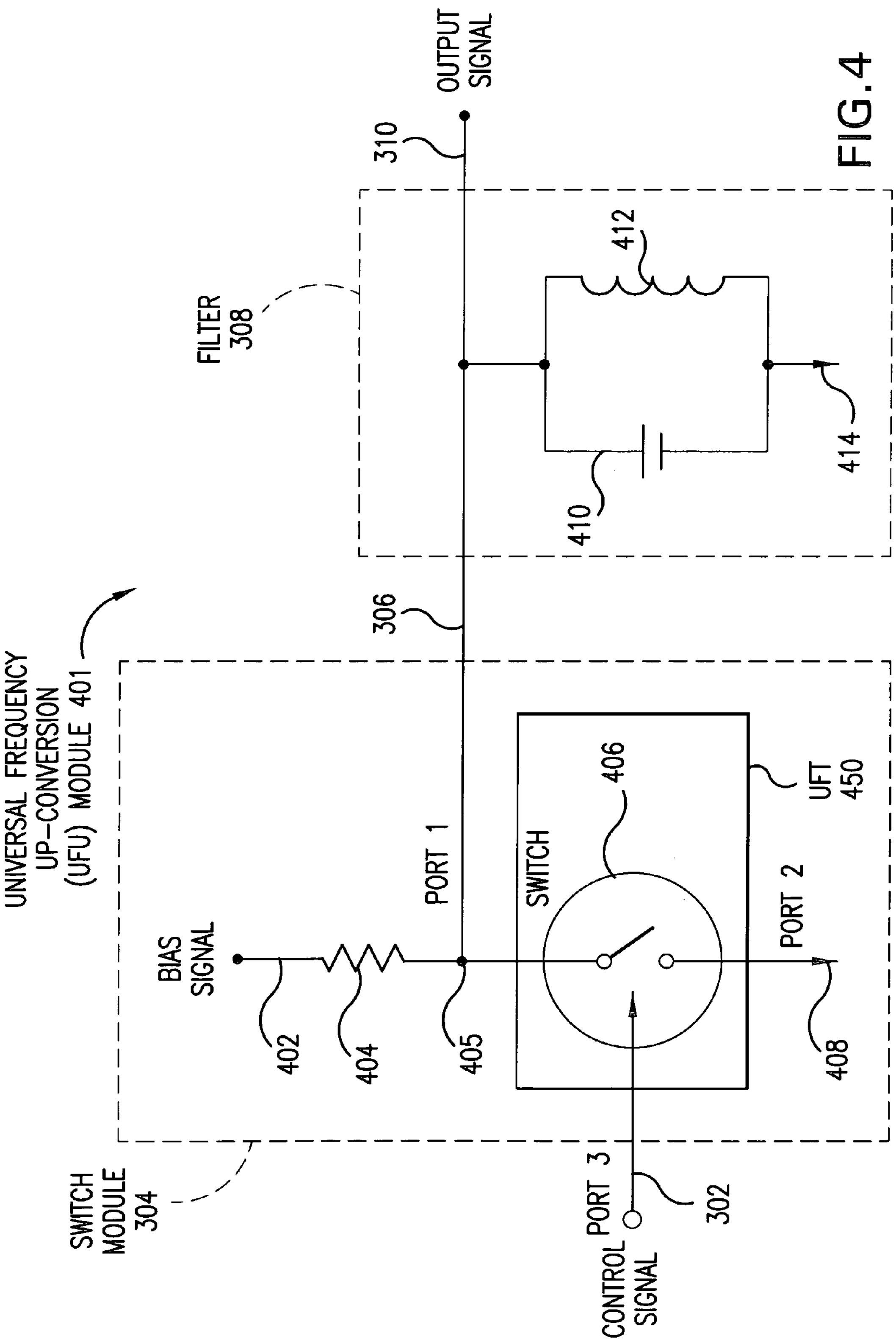
FIG. 4 is a more detailed diagram of a universal frequency up-conversion (UFU) module according to an embodiment of the invention.

FIG. 4 illustrates an example universal frequency up-conversion (UFU) module 401. The UFU module 401 includes an example switch module 304, which comprises a bias signal 402, a resistor or impedance 404, a universal frequency translator (UFT) 450, and a ground 408. The UFT 450 includes a switch 406. The input signal 302 (designated as "Control Signal" in FIG. 4) controls the switch 406 in the UFT 450, and causes it to close and open. Harmonically rich signal 306 is generated at a node 405 located between the resistor or impedance 404 and the switch 406.

Also in FIG. 4, it can be seen that an example filter 308 is comprised of a capacitor 410 and an inductor 412 shunted to a ground 414. The filter is designed to filter out the undesired harmonics of harmonically rich signal 306.

The invention is not limited to the UFU embodiment shown in FIG. 4.

Figure 5:
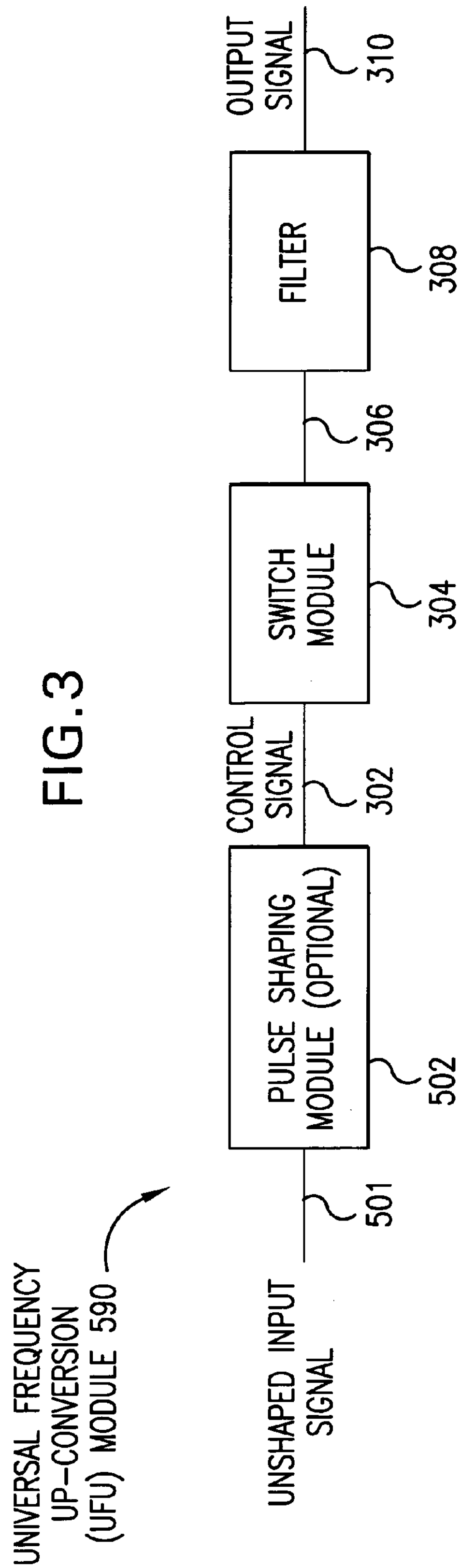
FIG. 5 is a block diagram of a universal frequency up-conversion (UFU) module according to an alternative embodiment of the invention.

For example, in an alternate embodiment shown in FIG. 5, an unshaped input signal 501 is routed to a pulse shaping module 502. The pulse shaping module 502 modifies the unshaped input signal 501 to generate a (modified) input signal 302 (designated as the "Control Signal" in FIG. 5). The input signal 302 is routed to the switch module 304, which operates in the manner described above. Also, the filter 308 of FIG. 5 operates in the manner described above. The purpose of the pulse shaping module 502 is to define the pulse width of the input signal 302. Recall that the input signal 302 controls the opening and closing of the switch 406 in switch module 304. During such operation, the pulse width of the input signal 302 establishes the pulse width of the harmonically rich signal 306. As stated above, the relative amplitudes of the harmonics of the harmonically rich signal 306 are a function of at least the pulse width of the harmonically rich signal 306. As such, the pulse width of the input signal 302 contributes to setting the relative amplitudes of the harmonics of harmonically rich signal 306.

Further details of up-conversion as described in this section are presented in U.S. Pat. No. 6,091,940 entitled "Method and System for Frequency Up-Conversion," filed Oct. 21, 1998, incorporated herein by reference in its entirety.

3.1 Universal Transmitter with 2 UFT Modules

Figure 71A:
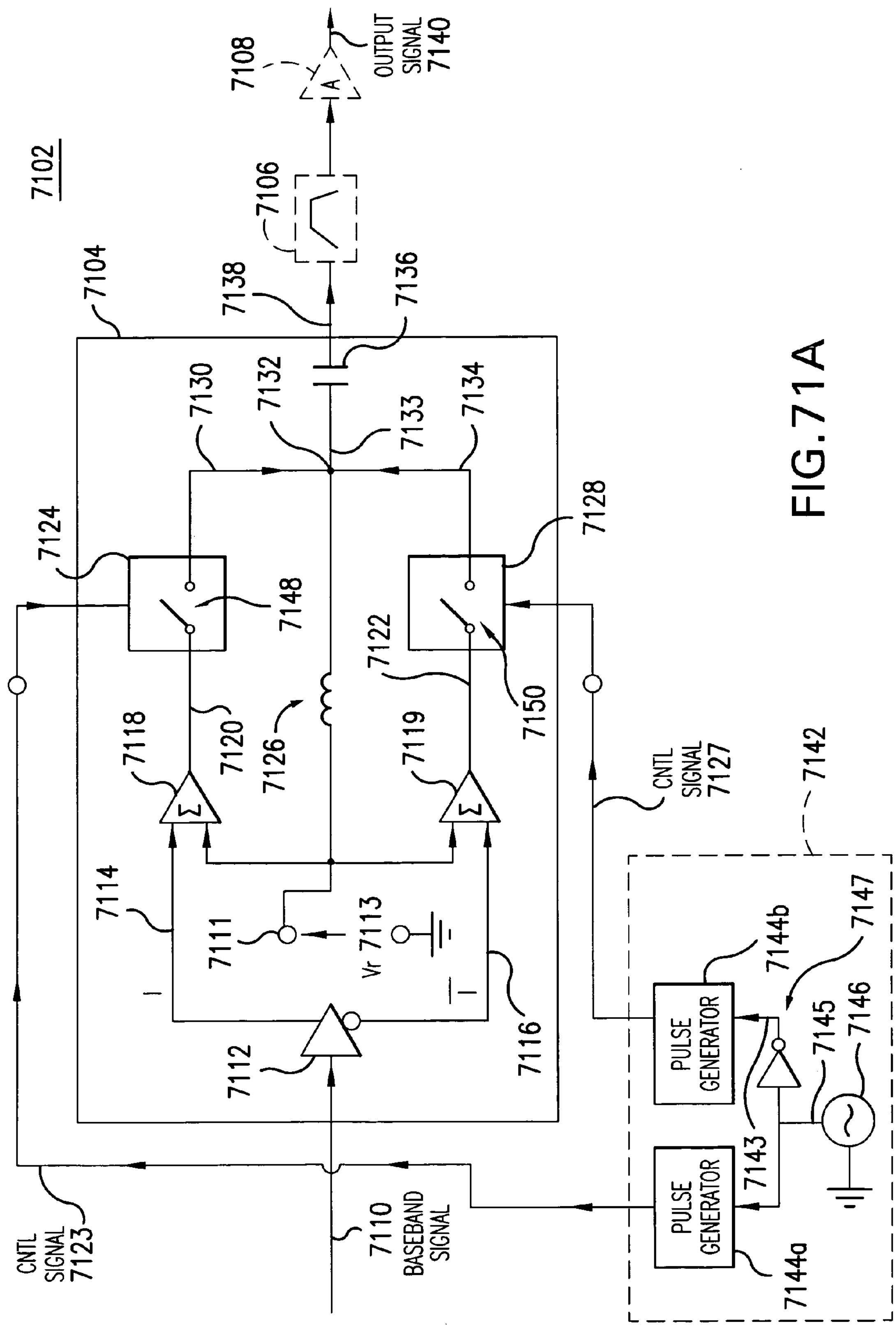
FIG. 71A illustrates a transmitter according to embodiments of the present invention.
Figure 84:
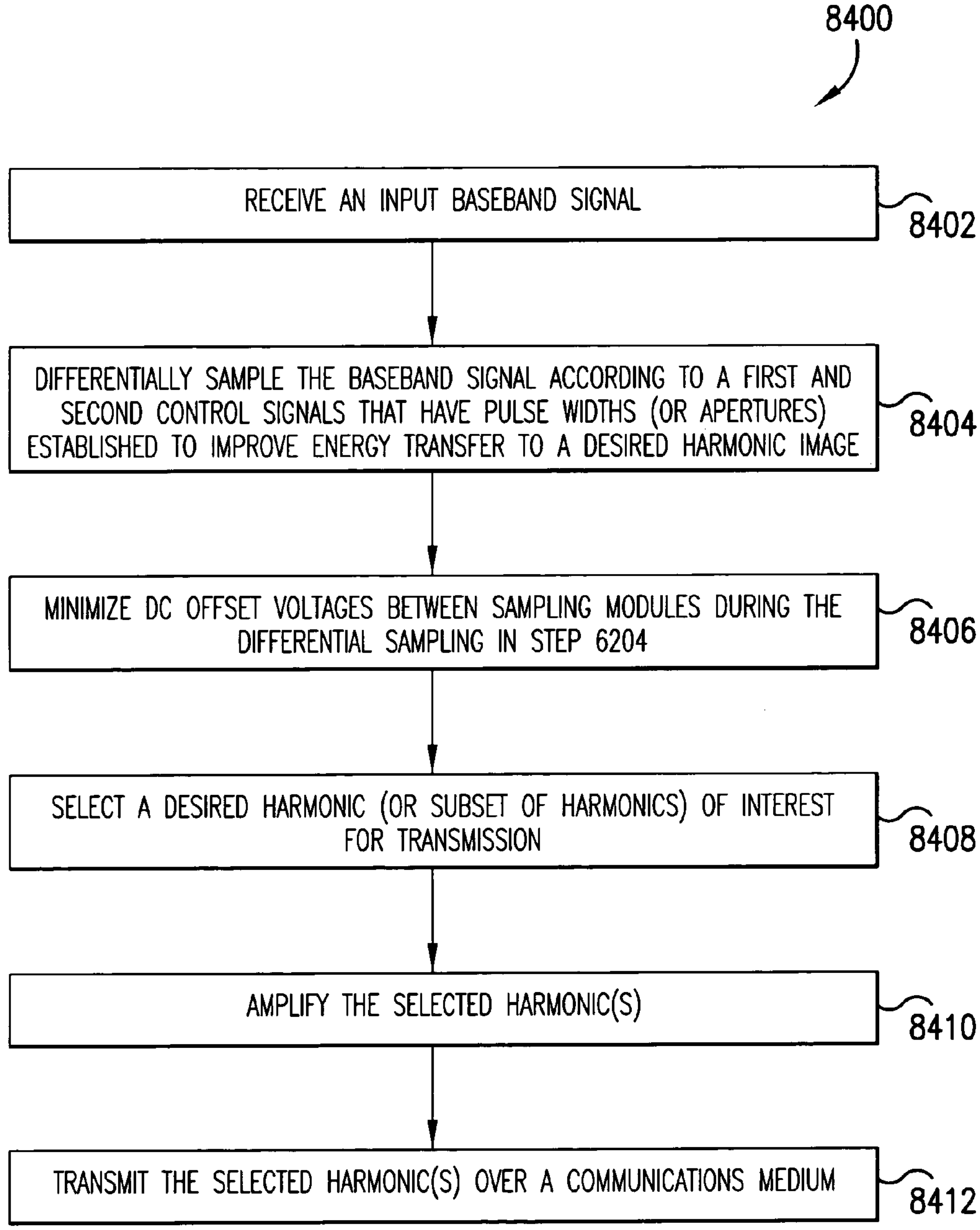
FIG. 84 shows a flowchart describing operation of the universal transmitter of FIG. 71A, according to an exemplary embodiment of the present invention.

FIG. 71A illustrates a transmitter 7102 according to embodiments of the present invention. Transmitter 7102 includes a balanced modulator/up-converter 7104, a control signal generator 7142, an optional filter 7106, and an optional amplifier 7108. Transmitter 7102 up-converts a baseband signal 7110 to produce an output signal 7140 that is conditioned for wireless or wire line transmission. In doing so, the balanced modulator 7104 receives the baseband signal 7110 and samples the baseband signal in a differential and balanced fashion to generate a harmonically rich signal 7138. The harmonically rich signal 7138 includes multiple harmonic images, where each image contains the baseband information in the baseband signal 7110. The optional bandpass filter 7106 may be included to select a harmonic of interest (or a subset of harmonics) in the signal 7138 for transmission. The optional amplifier 7108 may be included to amplify the selected harmonic prior to transmission. The universal transmitter is further described at a high level by the flowchart 8400 that is shown in FIG. 84. A more detailed structural and operational description of the balanced modulator follows thereafter.

Referring to flowchart 8400, in step 8402, the balanced modulator 7104 receives the baseband signal 7110.

In step 8404, the balanced modulator 7104 samples the baseband signal in a differential and balanced fashion according to a first and second control signals that are phase shifted with respect to each other. The resulting harmonically rich signal 7138 includes multiple harmonic images that repeat at harmonics of the sampling frequency, where each image contains the necessary amplitude and frequency information to reconstruct the baseband signal 7110.

In embodiments of the invention, the control signals include pulses having pulse widths (or apertures) that are established to improve energy transfer to a desired harmonic of the harmonically rich signal 7138. In further embodiments of the invention, DC offset voltages are minimized between sampling modules as indicated in step 8406, thereby minimizing carrier insertion in the harmonic images of the harmonically rich signal 7138.

In step 8408, the optional bandpass filter 7106 selects the desired harmonic of interest (or a subset of harmonics) in from the harmonically rich signal 7138 for transmission.

In step 8410, the optional amplifier 7108 amplifies the selected harmonic(s) prior to transmission.

In step 8412, the selected harmonic(s) is transmitted over a communications medium.

3.1.1 Balanced Modulator Detailed Description

Figure 85:
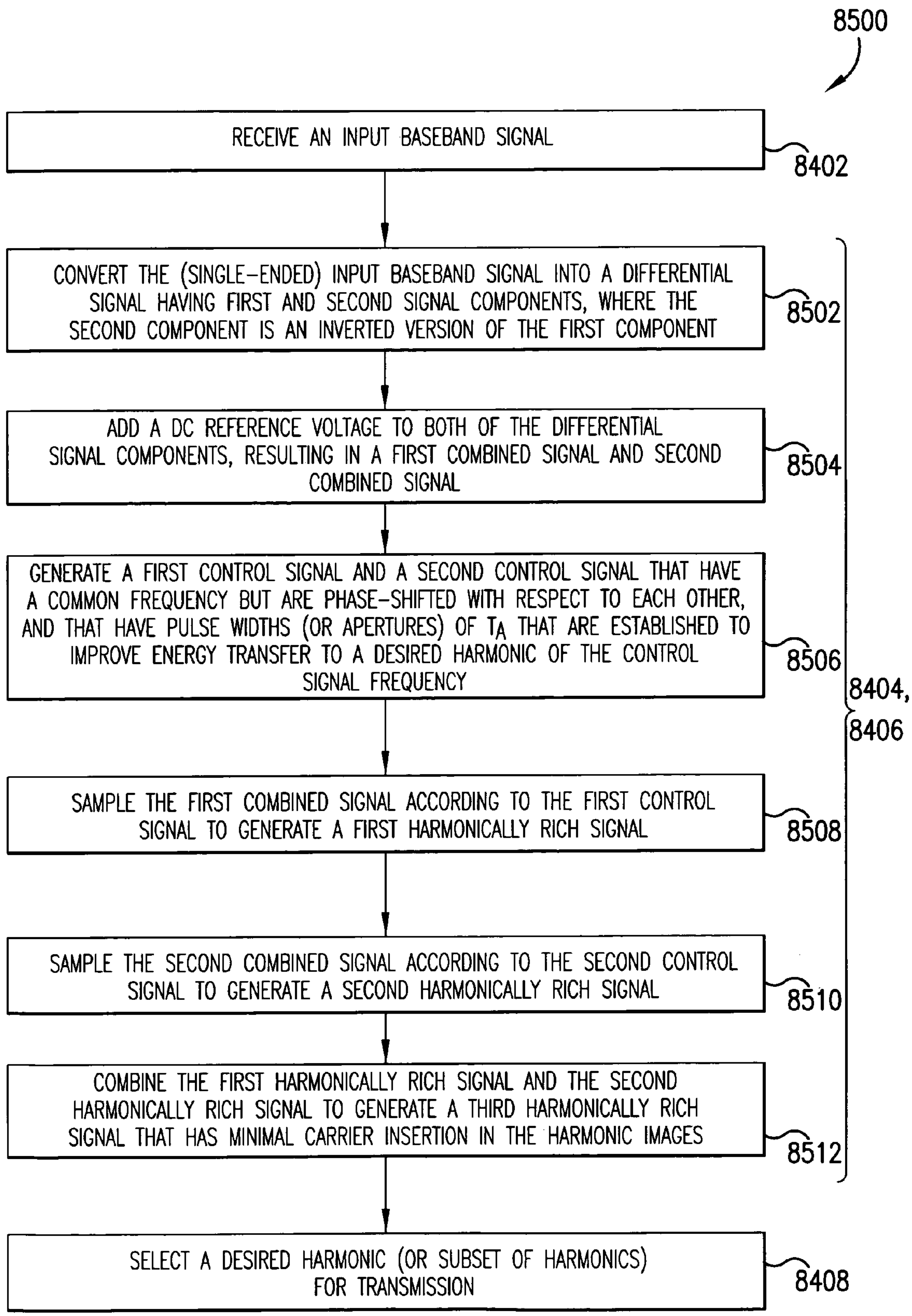
FIG. 85 illustrates a flowchart describing operation of the balanced modulator of FIG. 71A, according to an exemplary embodiment of the present invention.

Referring to the example embodiment shown in FIG. 71A, the balanced modulator 7104 includes the following components: a buffer/inverter 7112; summer amplifiers 7118, 7119; UFT modules 7124 and 7128 having controlled switches 7148 and 7150, respectively; an inductor 7126; a blocking capacitor 7136; and a DC terminal 7111. As stated above, the balanced modulator 7104 differentially samples the baseband signal 7110 to generate a harmonically rich signal 7138. More specifically, the UFT modules 7124 and 7128 sample the baseband signal in differential fashion according to control signals 7123 and 7127, respectively. A DC reference voltage 7113 is applied to terminal 7111 and is uniformly distributed to the UFT modules 7124 and 7128. The distributed DC voltage 7113 prevents any DC offset voltages from developing between the UFT modules, which can lead to carrier insertion in the harmonically rich signal 7138. The operation of the balanced modulator 7104 is discussed in greater detail with reference to flowchart 8500 (FIG. 85), as follows.

In step 8402, the buffer/inverter 7112 receives the input baseband signal 7110 and generates input signal 7114 and inverted input signal 7116. Input signal 7114 is substantially similar to signal 7110, and inverted signal 7116 is an inverted version of signal 7114. As such, the buffer/inverter 7112 converts the (single-ended) baseband signal 7110 into differential input signals 7114 and 7116 that will be sampled by the UFT modules. Buffer/inverter 7112 can be implemented using known operational amplifier (op amp) circuits, as will be understood by those skilled in the arts, although the invention is not limited to this example.

In step 8504, the summer amplifier 7118 sums the DC reference voltage 7113 applied to terminal 7111 with the input signal 7114, to generate a combined signal 7120. Likewise, the summer amplifier 7119 sums the DC reference voltage 7113 with the inverted input signal 7116 to generate a combined signal 7122. Summer amplifiers 7118 and 7119 can be implemented using known op amp summer circuits, and can be designed to have a specified gain or attenuation, including unity gain, although the invention is not limited to this example. The DC reference voltage 7113 is also distributed to the outputs of both UFT modules 7124 and 7128 through the inductor 7126 as is shown.

Figure 72A:
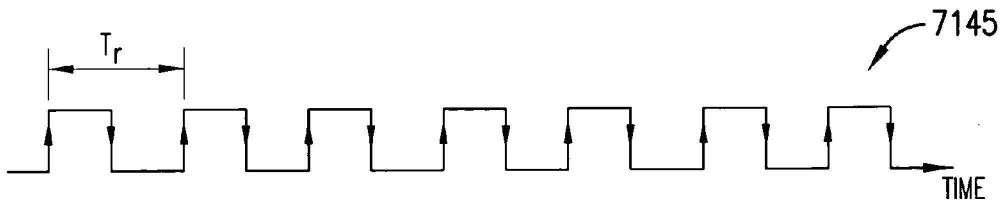
FIG. 72A illustrates an exemplary clock signal.
Figure 72B:
FIGS. 72B–72C illustrates exemplary control signals, according to embodiments of the present invention.
Figure 72C:

In step 8506, the control signal generator 7142 generates control signals 7123 and 7127 that are shown by way of example in FIG. 72B and FIG. 72C, respectively. As illustrated, both control signals 7123 and 7127 have the same period $T_S$ as a master clock signal 7145 (FIG. 72A), but have a pulse width (or aperture) of $T_A$. In the example, control signal 7123 triggers on the rising pulse edge of the master clock signal 7145, and control signal 7127 triggers on the falling pulse edge of the master clock signal 7145. Therefore, control signals 7123 and 7127 are shifted in time by 180 degrees relative to each other. In embodiments of invention, the master clock signal 7145 (and therefore the control signals 7123 and 7127) have a frequency that is a sub-harmonic of the desired output signal 7140. The invention is not limited to the example of FIGS. 72A–72C.

In one embodiment, the control signal generator 7142 includes an oscillator 7146, pulse generators **7144*a* and 7144*b*, and an inverter 7147 as shown. In operation, the oscillator 7146 generates the master clock signal 7145, which is illustrated in FIG. 72A as a periodic square wave having pulses with a period of $T_S$. Other clock signals could be used including but not limited to sinusoidal waves, as will be understood by those skilled in the relevant art(s). Pulse generator 7144*a* receives the master clock signal 7145 and triggers on the rising pulse edge, to generate the control signal 7123. Inverter 7147 inverts the clock signal 7145 to generate an inverted clock signal 7143. The pulse generator 7144*b* receives the inverted clock signal 7143 and triggers on the rising pulse edge (which is the falling edge of clock signal 7145), to generate the control signal 7127**.

Figure 89A:
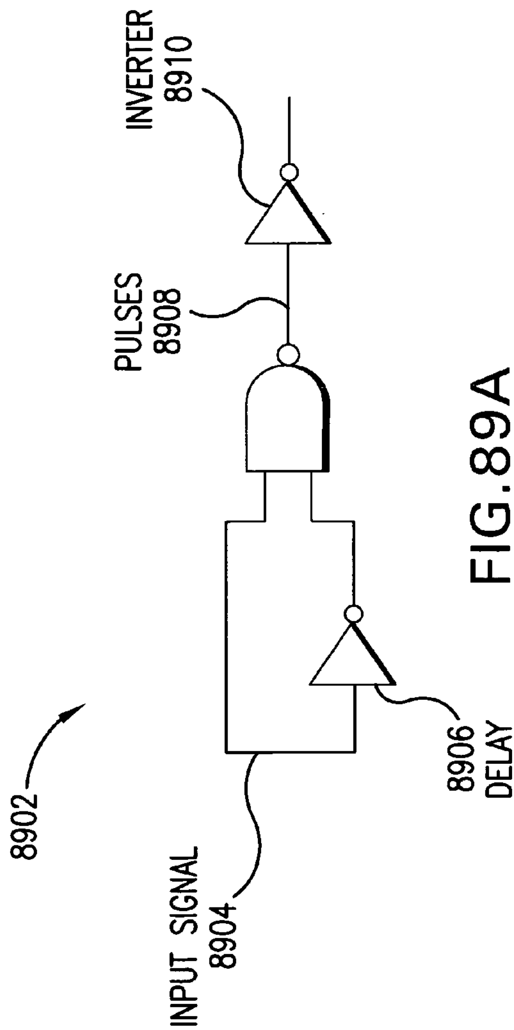
FIGS. 89A–89E illustrate example embodiments for a pulse generator.
Figure 89B:
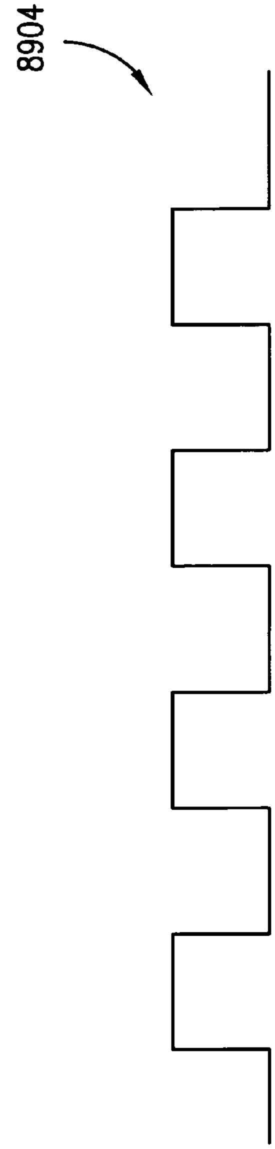
Figure 89C:
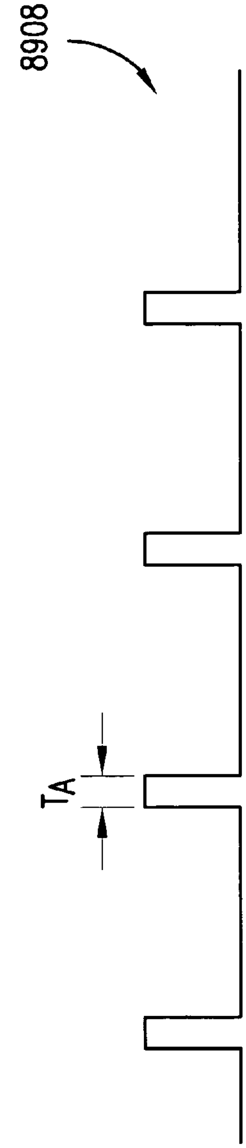
Figure 89D:
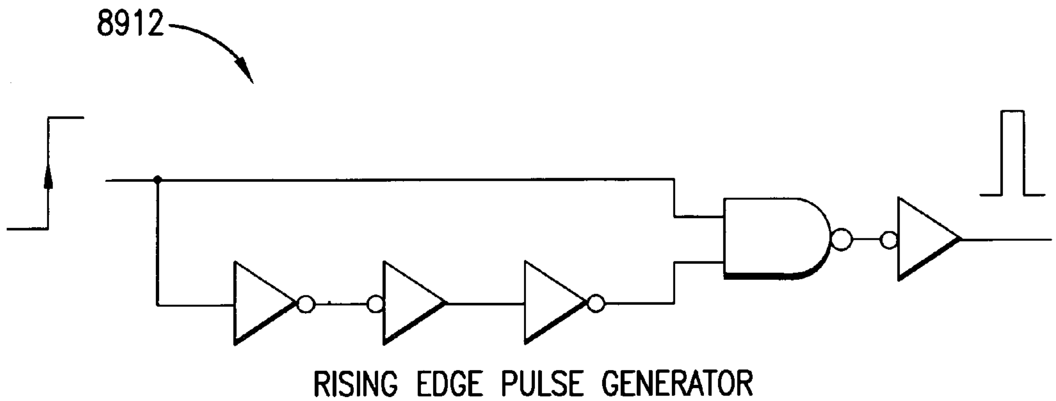
Figure 89E:
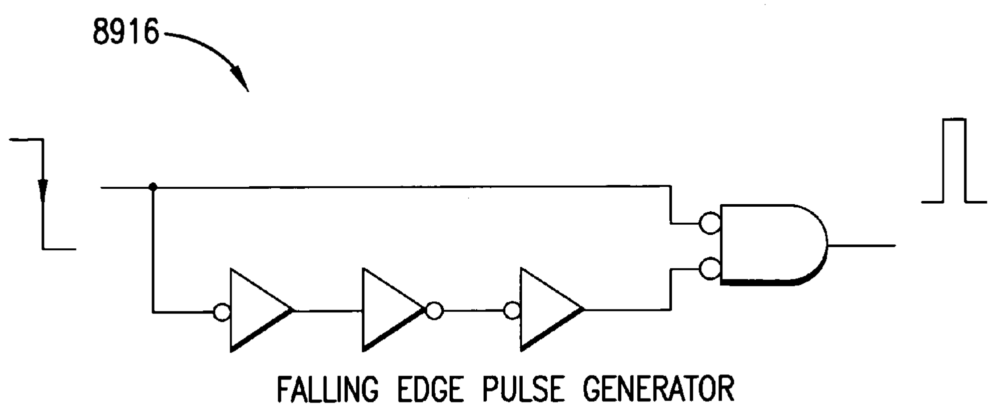
Figure 90:
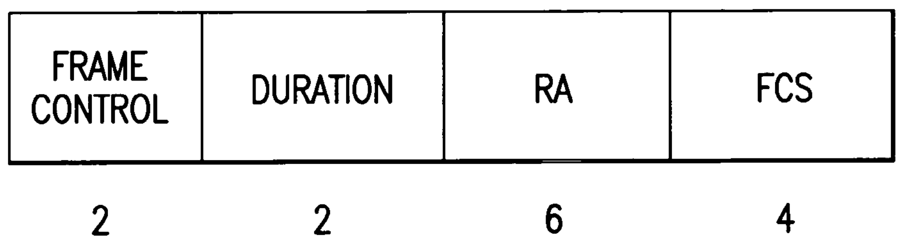
FIG. 90 illustrates an example clear to send frame.
Figure 91:
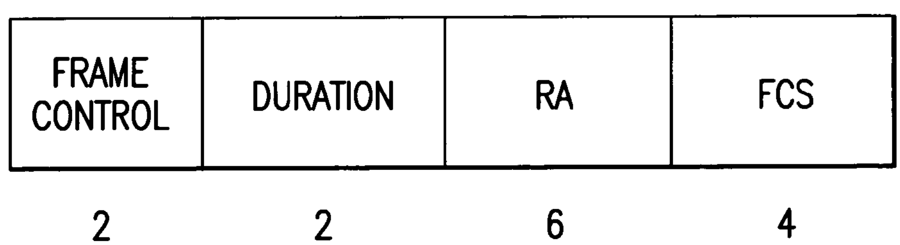
FIG. 91 illustrates an example acknowledge (ACK) frame.
Figure 92:
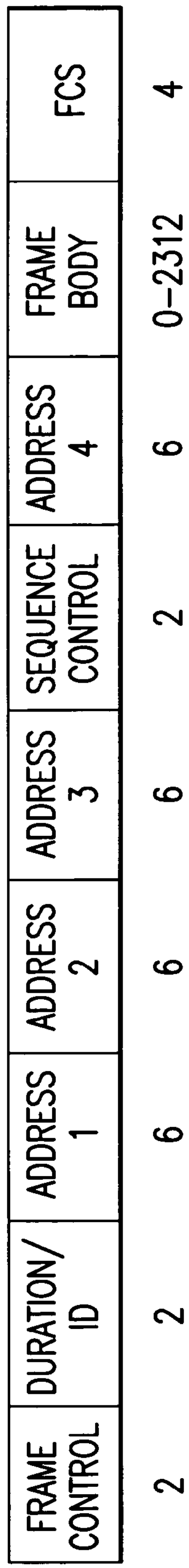
FIG. 92 illustrates an example data frame.
Figure 93:
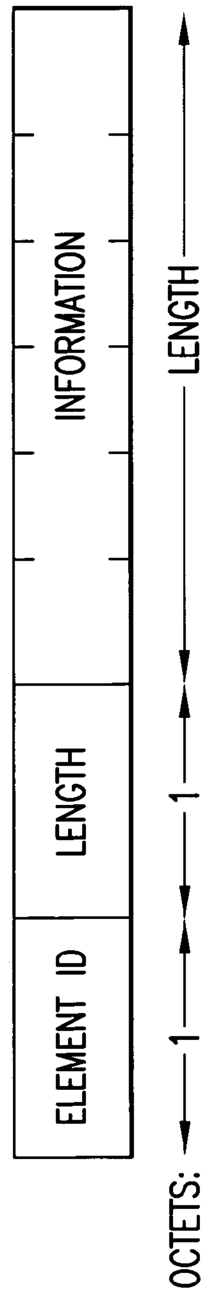
FIG. 93 illustrates an example information element.

FIGS. 89A–E illustrate example embodiments for the pulse generator 7144. FIG. 89A illustrates a pulse generator 8902. The pulse generator 8902 generates pulses 8908 having pulse width TA from an input signal 8904. Example input signals 8904 and pulses 8908 are depicted in FIGS. 89B and 89C, respectively. The input signal 8904 can be any type of periodic signal, including, but not limited to, a sinusoid, a square wave, a saw-tooth wave etc. The pulse width (or aperture) TA of the pulses 8908 is determined by delay 8906 of the pulse generator 8902. The pulse generator 8902 also includes an optional inverter 8910, which is optionally added for polarity considerations as understood by those skilled in the arts. The example logic and implementation shown for the pulse generator 8902 is provided for illustrative purposes only, and is not limiting. The actual logic employed can take many forms. Additional examples of pulse generation logic are shown in FIGS. 89D and 89E. FIG. 89D illustrates a rising edge pulse generator 8912 that triggers on the rising edge of input signal 8904. FIG. 89E illustrates a falling edge pulse generator 8916 that triggers on the falling edge of the input signal 8904.

Figure 71B:
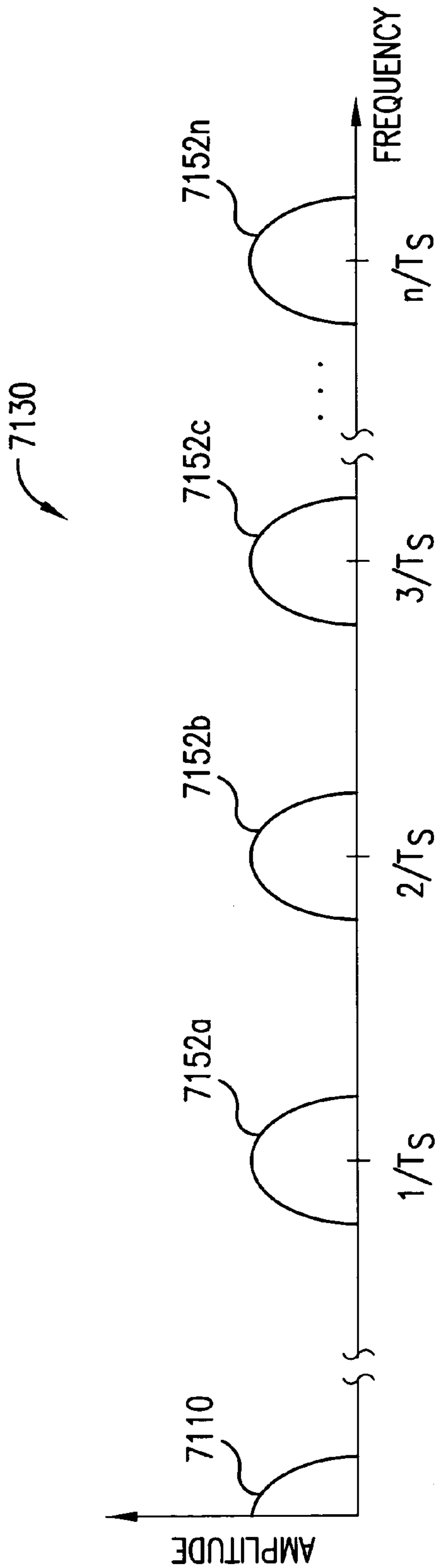
FIG. 71B illustrates an exemplary frequency spectrum for a harmonically rich signal having harmonic images, according to an embodiment of the present invention.

In step 8508, the UFT module 7124 samples the combined signal 7120 according to the control signal 7123 to generate harmonically rich signal 7130. More specifically, the switch 7148 closes during the pulse widths $T_A$ of the control signal 7123 to sample the combined signal 7120 resulting in the harmonically rich signal 7130. FIG. 71B illustrates an exemplary frequency spectrum for the harmonically rich signal 7130 having harmonic images **7152*a–n*. The images 7152 repeat at harmonics of the sampling frequency $1/T_S$, at infinitum, where each image 7152 contains the necessary amplitude, frequency, and phase information to reconstruct the baseband signal 7110. As discussed further below, the relative amplitude of the frequency images is generally a function of the harmonic number and the pulse width $T_A$. As such, the relative amplitude of a particular harmonic 7152 can be increased (or decreased) by adjusting the pulse width $T_A$ of the control signal 7123. In general, shorter pulse widths of $T_A$ shift more energy into the higher frequency harmonics, and longer pulse widths of $T_A$ shift energy into the lower frequency harmonics. The generation of harmonically rich signals by sampling an input signal according to a controlled aperture have been described earlier in this application in the section titled, "Frequency Up-conversion Using Universal Frequency Translation", and is illustrated by FIGS. 3–6**. A more detailed discussion of frequency up-conversion using a switch with a controlled sampling aperture is discussed in U.S. Pat. No. 6,091,940 entitled "Method and System for Frequency Up-Conversion," filed Oct. 21, 1998, and incorporated herein by reference.

In step 8510, the UFT module 7128 samples the combined signal 7122 according to the control signal 7127 to generate harmonically rich signal 7134. More specifically, the switch 7150 closes during the pulse widths $T_A$ of the control signal 7127 to sample the combined signal 7122 resulting in the harmonically rich signal 7134. The harmonically rich signal 7134 includes multiple frequency images of baseband signal 7110 that repeat at harmonics of the sampling frequency ($1/T_S$), similar to that for the harmonically rich signal 7130. However, the images in the signal 7134 are phase-shifted compared to those in signal 7130 because of the inversion of signal 7116 compared to signal 7114, and because of the relative phase shift between the control signals 7123 and 7127.

Figure 71C:
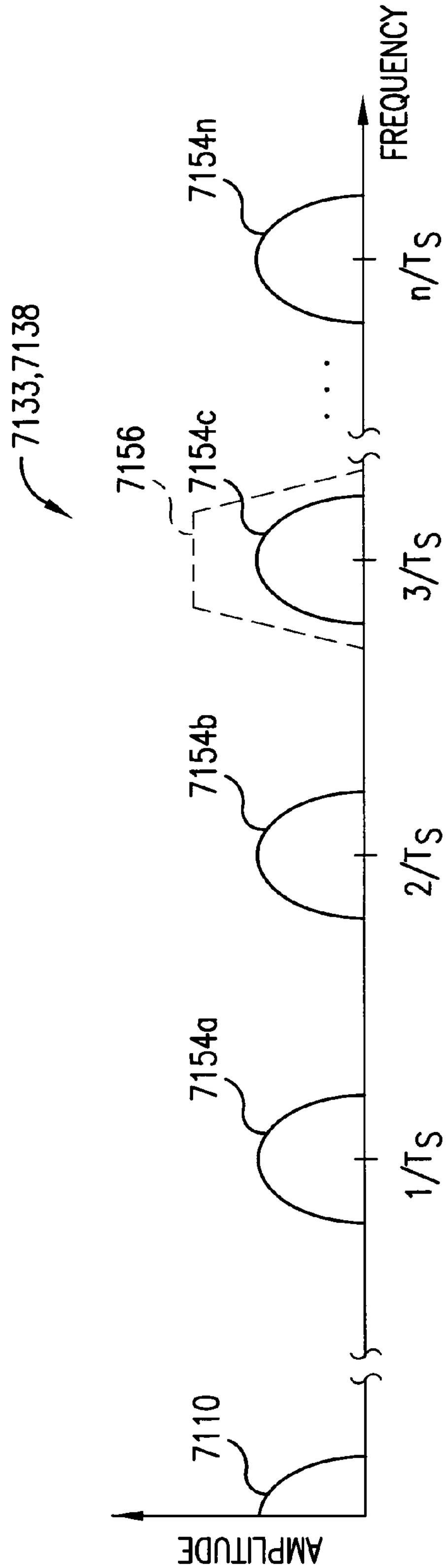
FIG. 71C illustrates an exemplary frequency spectrum for a harmonically rich signal that has multiple images that repeat at harmonics of the sampling frequency $1/T_S$, according to an embodiment of the present invention.

In step 8512, the node 7132 sums the harmonically rich signals 7130 and 7134 to generate harmonically rich signal 7133. FIG. 71C illustrates an exemplary frequency spectrum for the harmonically rich signal 7133 that has multiple images 7154*a–n* that repeat at harmonics of the sampling frequency $1/T_S$. Each image 7154 includes the necessary amplitude, frequency and phase information to reconstruct the baseband signal 7110. The capacitor 7136 operates as a DC blocking capacitor and substantially passes the harmonics in the harmonically rich signal 7133 to generate harmonically rich signal 7138 at the output of the modulator 7104.

In step 8408, the optional filter 7106 can be used to select a desired harmonic image for transmission. This is represented for example by a passband 7156 that selects the harmonic image 7154*c* for transmission in FIG. 71C.

An advantage of the modulator 7104 is that it is fully balanced, which substantially minimizes (or eliminates) any DC voltage offset between the two UFT modules 7124 and 7128. DC offset is minimized because the reference voltage 7113 contributes a consistent DC component to the input signals 7120 and 7122 through the summing amplifiers 7118 and 7119, respectively. Furthermore, the reference voltage 7113 is also directly coupled to the outputs of the UFT modules 7124 and 7128 through the inductor 7126 and the node 7132. The result of controlling the DC offset between the UFT modules is that carrier insertion is minimized in the harmonic images of the harmonically rich signal 7138. As discussed above, carrier insertion is substantially wasted energy because the information for a modulated signal is carried in the sidebands of the modulated signal and not in the carrier. Therefore, it is often desirable to minimize the energy at the carrier frequency by controlling the relative DC offset.

Figure 72D:
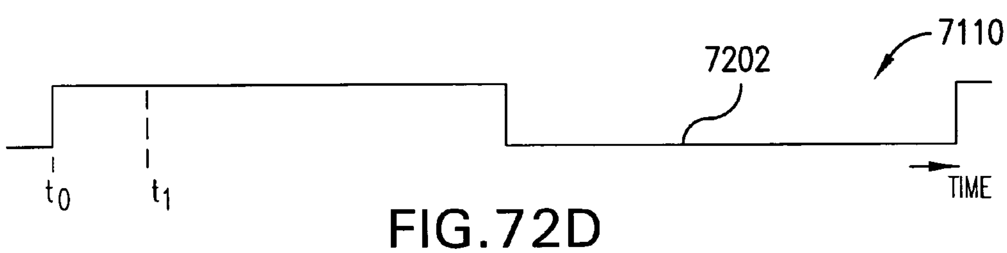
FIGS. 72D–72I illustrate various example signal diagrams (vs. time) that are representative of an embodiment of the invention.
Figure 72E:
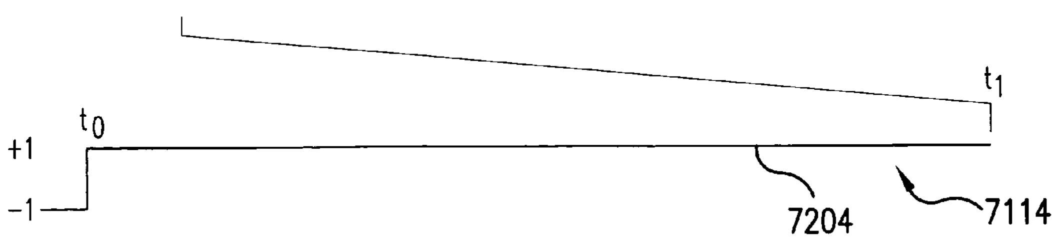
Figure 72F:
Figure 72G:

3.1.2 Balanced Modulator Example Signal Diagrams and Mathematical Description In order to further describe the invention, FIGS. 72D–72I illustrate various example signal diagrams (vs. time) that are representative of the invention. These signal diagrams are meant for example purposes only and are not meant to be limiting. FIG. 72D illustrates a signal 7202 that is representative of the input baseband signal 7110 (FIG. 71A). FIG. 72E illustrates a step function 7204 that is an expanded portion of the signal 7202 from time $t_0$ to $t_1$, and represents signal 7114 at the output of the buffer/inverter 7112. Similarly, FIG. 72F illustrates a signal 7206 that is an inverted version of the signal 7204, and represents the signal 7116 at the inverted output of buffer/inverter 7112. For analysis purposes, a step function is a good approximation for a portion of a single bit of data (for the baseband signal 7110) because the clock rates of the control signals 7123 and 7127 are significantly higher than the data rates of the baseband signal 7110. For example, if the data rate is in the KHz frequency range, then the clock rate will preferably be in MHZ frequency range in order to generate an output signal in the GHz frequency range.

Figure 72H:
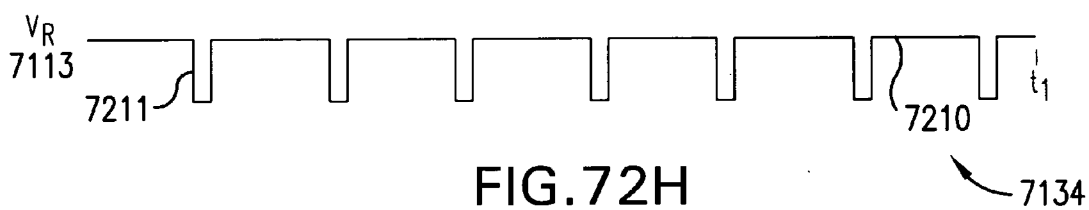

Still referring to FIGS. 72D–I, FIG. 72G illustrates a signal 7208 that an example of the harmonically rich signal 7130 when the step function 7204 is sampled according to the control signal 7123 in FIG. 72B. The signal 7208 includes positive pulses 7209 as referenced to the DC voltage 7113. Likewise, FIG. 72H illustrates a signal 7210 that is an example of the harmonically rich signal 7134 when the step function 7206 is sampled according to the control signal 7127. The signal 7210 includes negative pulses 7211 as referenced to the DC voltage 7113, which are time-shifted relative to positive pulses 7209 in signal 7208.

Figure 72I:
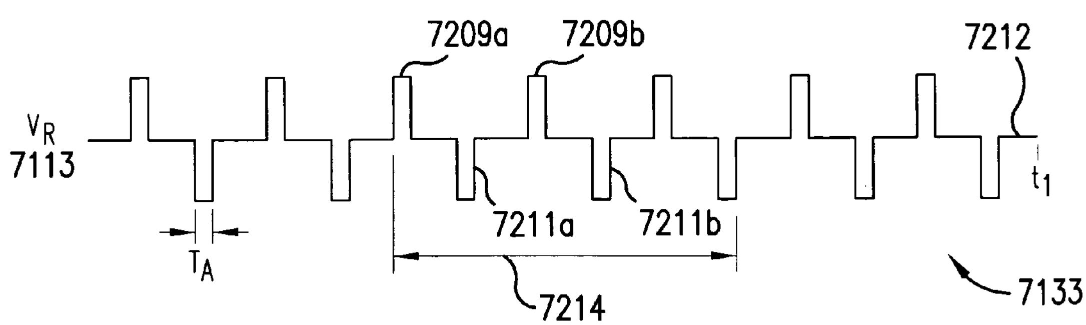

Still referring to FIGS. 72D–I, the FIG. 72I illustrates a signal 7212 that is the combination of signal 7208 (FIG. 72G) and the signal 7210 (FIG. 72H), and is an example of the harmonically rich signal 7133 at the output of the summing node 7132. As illustrated, the signal 7212 spends approximately as much time above the DC reference voltage 7113 as below the DC reference voltage 7113 over a limited time period. For example, over a time period 7214, the energy in the positive pulses 7209*a–b* is canceled out by the energy in the negative pulses 7211*a–b*. This is indicative of minimal (or zero) DC offset between the UFT modules 7124 and 7128, which results in minimal carrier insertion during the sampling process.

Still referring to FIG. 72I, the time axis of the signal 7212 can be phased in such a manner to represent the waveform as an odd function. For such an arrangement, the Fourier series is readily calculated to obtain:

$$I_C(t) = \sum_{n=1}^{\infty}\left(\frac{4\sin\left(\frac{n\pi T_A}{T_s}\right)\cdot\sin\left(\frac{n\pi}{2}\right)}{n\pi}\right)\cdot\sin\left(\frac{2n\pi t}{T_s}\right). \quad \text{Equation 1}$$

where:

$T_S$=period of the master clock 7145

$T_A$=pulse width of the control signals 7123 and 7127 n=harmonic number

As shown by Equation 1, the relative amplitude of the frequency images is generally a function of the harmonic number n, and the ratio of $T_A/T_S$. As indicated, the $T_A/T_S$ ratio represents the ratio of the pulse width of the control signals relative to the period of the sub-harmonic master clock. The $T_A/T_S$ ratio can be optimized in order to maximize the amplitude of the frequency image at a given harmonic. For example, if a passband waveform is desired to be created at 5× the frequency of the sub-harmonic clock, then a baseline power for that harmonic extraction may be calculated for the fifth harmonic (n=5) as:

$$I_C(t) = \left(\frac{4\sin\left(\frac{5\pi T_A}{T_s}\right)}{5\pi}\right)\cdot\sin(5\omega_s t). \quad \text{Equation 2}$$

As shown by Equation 2, $I_C(t)$ for the harmonic is a sinusoidal function having an amplitude that is proportional to the $\sin(5\pi T_A/T_S)$. The signal amplitude can be maximized by setting $T_A=(1/10\cdot T_S)$ so that $\sin(5\pi T_A/T_S)=\sin(\pi/2)=1$. Doing so results in the equation:

$$I_c(t)\,|_{n=5} = \frac{4}{5\pi}(\sin(5\omega_s t)).$$ Equation 3

This component is a frequency at 5× of the sampling frequency of sub-harmonic clock, and can be extracted from the Fourier series via a bandpass filter (such as bandpass filter 7106) that is centered around $5f_s$. The extracted frequency component can then be optionally amplified by the amplifier 7108 prior to transmission on a wireless or wireline communications channel or channels.

Equation 3 can be extended to reflect the inclusion of a message signal as illustrated by equation 4 below:

$$m(t)\cdot I_c(t)\,|_{\substack{n=5\\ \theta=\theta(t)}} = \frac{4\cdot m(t)}{5\pi}(\sin(5\omega_s t + 5\theta(t))).$$ Equation 4

Equation 4 illustrates that a message signal can be carried in harmonically rich signals 7133 such that both amplitude and phase can be modulated. In other words, m(t) is modulated for amplitude and θ(t) is modulated for phase. In such cases, it should be noted that θ(t) is augmented modulo n while the amplitude modulation m(t) is simply scaled. Therefore, complex waveforms may be reconstructed from their Fourier series with multiple aperture UFT combinations.

As discussed above, the signal amplitude for the 5th harmonic was maximized by setting the sampling aperture width $T_{A}=\frac{1}{10}T_S$, where $T_S$ is the period of the master clock signal. This can be restated and generalized as setting $T_{A}=\frac{1}{2}$ the period (or π radians) at the harmonic of interest. In other words, the signal amplitude of any harmonic n can be maximized by sampling the input waveform with a sampling aperture of $T_A=\frac{1}{2}$ the period of the harmonic of interest (n). Based on this discussion, it is apparent that varying the aperture changes the harmonic and amplitude content of the output waveform. For example, if the sub-harmonic clock has a frequency of 200 MHZ, then the fifth harmonic is at 1 Ghz. The amplitude of the fifth harmonic is maximized by setting the aperture width $T_A$=500 picoseconds, which equates to ½ the period (or π radians) at 1 Ghz.

Figure 72J:
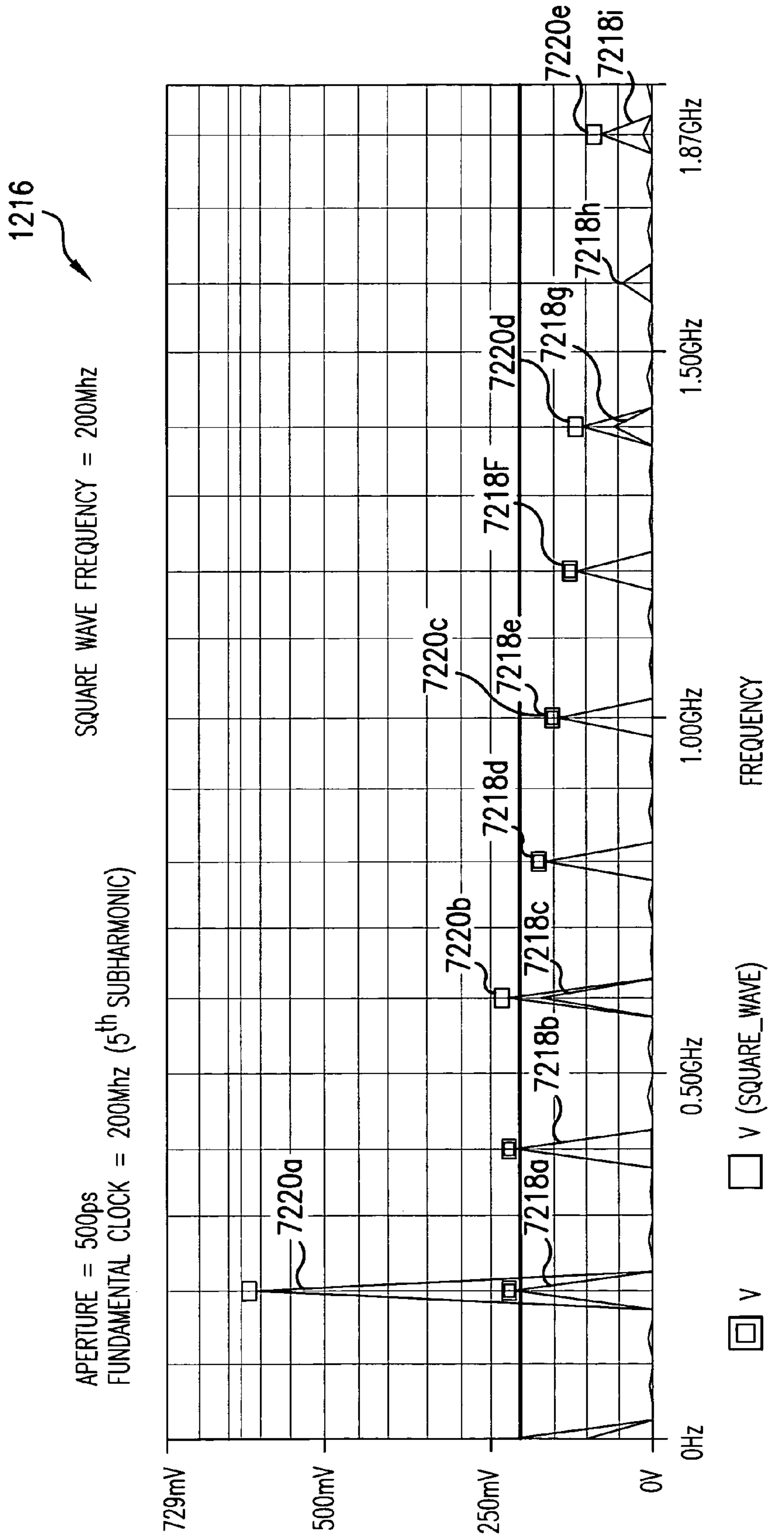
FIG. 72J depicts a frequency plot that graphically illustrates the effect of varying the sampling aperture of the control signals on the harmonically rich signal given a 200 MHZ harmonic clock, according to embodiments of the present invention.

FIG. 72J depicts a frequency plot 7216 that graphically illustrates the effect of varying the sampling aperture of the control signals on the harmonically rich signal 7133 given a 200 MHZ harmonic clock. The frequency plot 7216 compares two frequency spectrums 7218 and 7220 for different control signal apertures given a 200 MHZ clock. More specifically, the frequency spectrum 7218 is an example spectrum for signal 7133 given the 200 MHZ clock with the aperture $T_A$=500 psec (where 500 psec is π radians at the 5th harmonic of 1 GHz). Similarly, the frequency spectrum 7220 is an example spectrum for signal 7133 given a 200 MHZ clock that is a square wave (so $T_A$=5000 psec). The spectrum 7218 includes multiple harmonics 7218*a–i*, and the frequency spectrum 7220 includes multiple harmonics 7220*a–e*. [It is noted that spectrum 7220 includes only the odd harmonics as predicted by Fourier analysis for a square wave.] At 1 Ghz (which is the 5th harmonic), the signal amplitude of the two frequency spectrums 7218*e* and 7220*c* are approximately equal. However, at 200 MHZ, the frequency spectrum 7218*a* has a much lower amplitude than the frequency spectrum 7220*a*, and therefore the frequency spectrum 7218 is more efficient than the frequency spectrum 7220, assuming the desired harmonic is the 5th harmonic. In other words, assuming 1 GHz is the desired harmonic, the frequency spectrum 7218 wastes less energy at the 200 MHZ fundamental than does the frequency spectrum 7218.

3.1.3 Balanced Modulator Having a Shunt Configuration

Figure 79A:
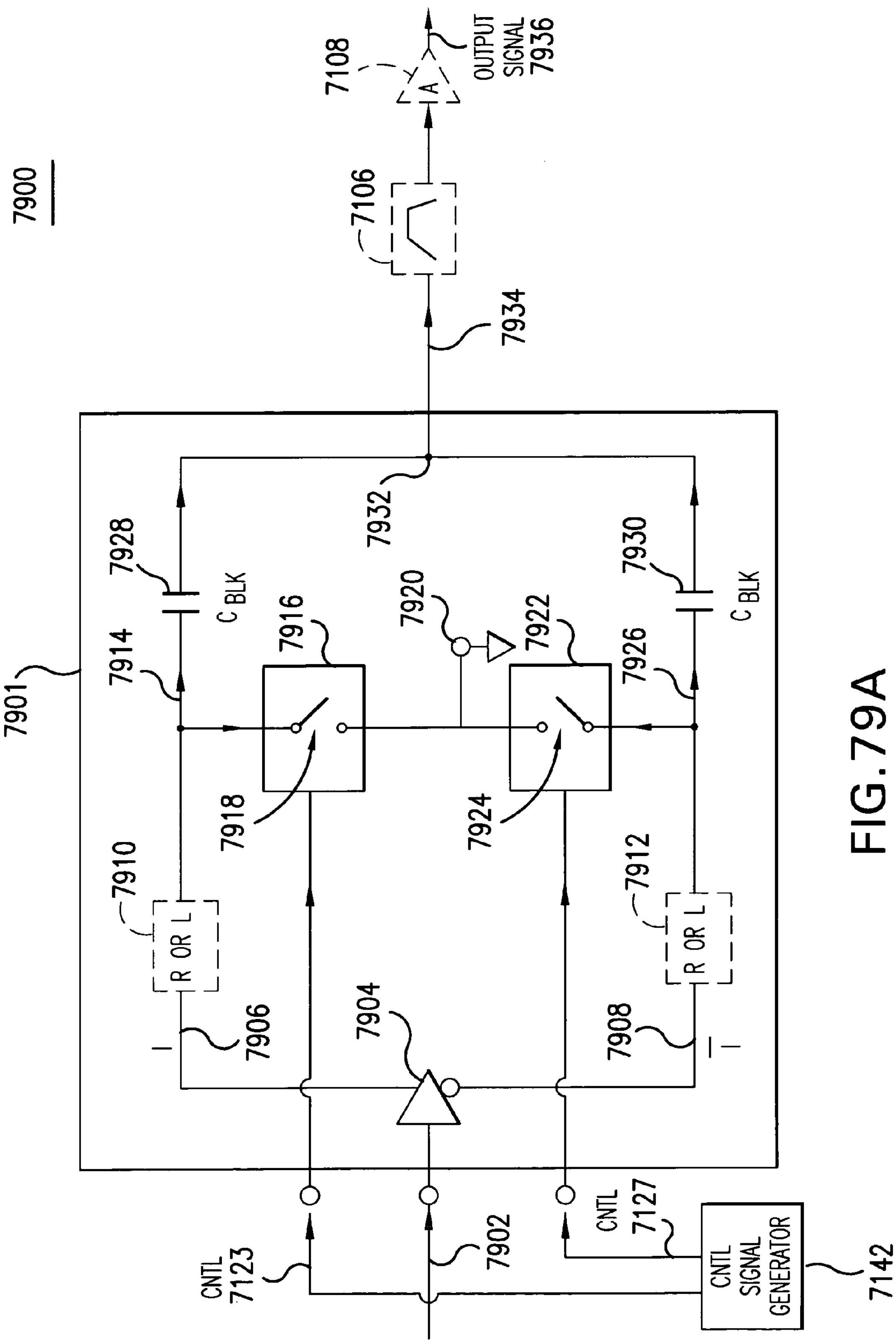
FIG. 79A illustrates a universal transmitter that is a second embodiment of a universal transmitter having two balanced UFT modules in a shunt configuration, according to an embodiment of the present invention.

FIG. 79A illustrates a universal transmitter 7900 that is a second embodiment of a universal transmitter having two balanced UFT modules in a shunt configuration. (In contrast, the balanced modulator 7104 can be described as having a series configuration based on the orientation of the UFT modules.) Transmitter 7900 includes a balanced modulator 7901, the control signal generator 7142, the optional bandpass filter 7106, and the optional amplifier 7108. The transmitter 7900 up-converts a baseband signal 7902 to produce an output signal 7936 that is conditioned for wireless or wire line transmission. In doing so, the balanced modulator 7901 receives the baseband signal 7902 and shunts the baseband signal to ground in a differential and balanced fashion to generate a harmonically rich signal 7934. The harmonically rich signal 7934 includes multiple harmonic images, where each image contains the baseband information in the baseband signal 7902. In other words, each harmonic image includes the necessary amplitude, frequency, and phase information to reconstruct the baseband signal 7902. The optional bandpass filter 7106 may be included to select a harmonic of interest (or a subset of harmonics) in the signal 7934 for transmission. The optional amplifier 7108 may be included to amplify the selected harmonic prior to transmission, resulting in the output signal 7936.

Figure 86:
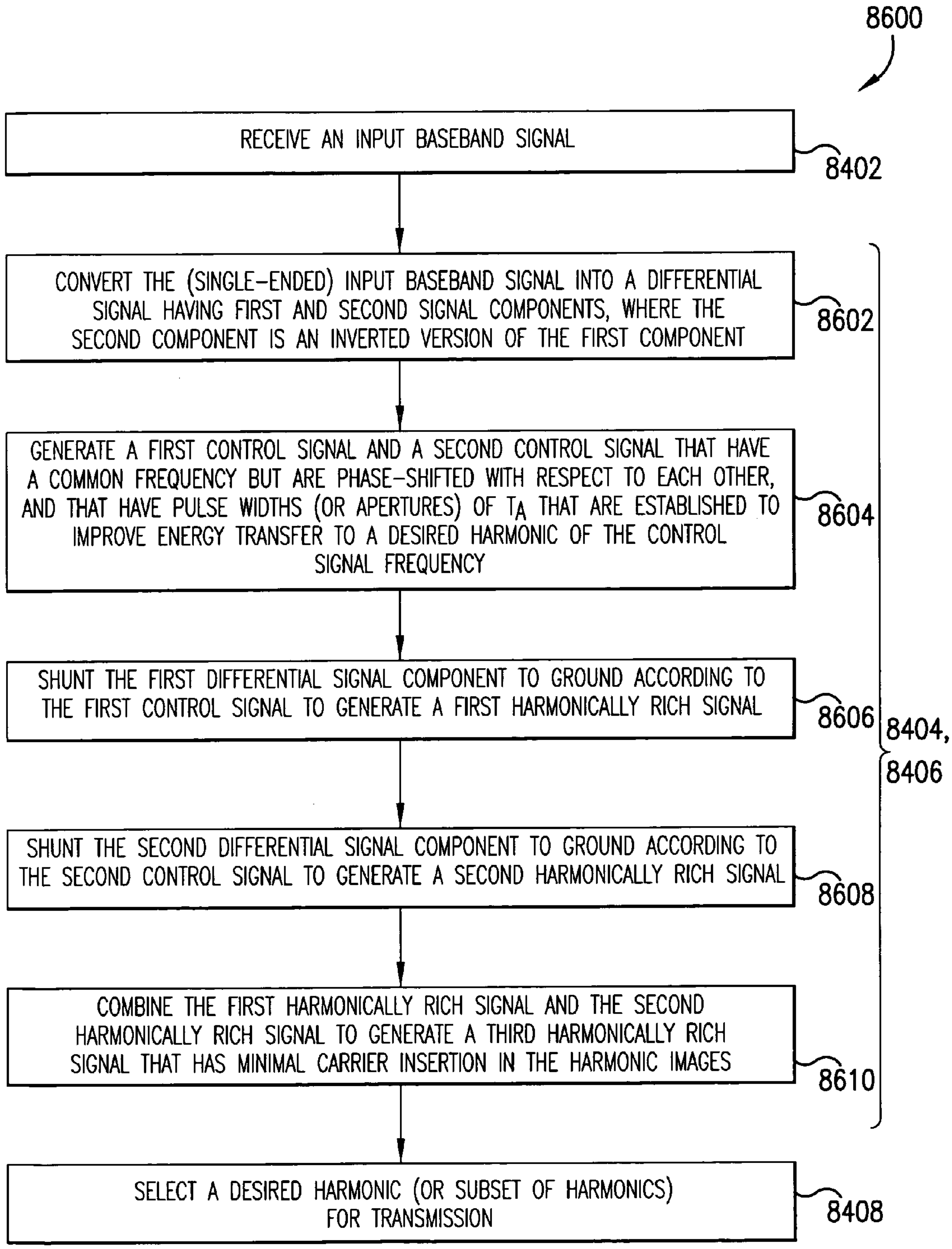
FIG. 86 illustrates a flowchart describing operation of the balanced modulator of FIG. 79A, according to an exemplary embodiment of the present invention.

The balanced modulator 7901 includes the following components: a buffer/inverter 7904; optional impedances 7910, 7912; UFT modules 7916 and 7922 having controlled switches 7918 and 7924, respectively; blocking capacitors 7928 and 7930; and a terminal 7920 that is tied to ground. As stated above, the balanced modulator 7901 differentially shunts the baseband signal 7902 to ground, resulting in a harmonically rich signal 7934. More specifically, the UFT modules 7916 and 7922 alternately shunts the baseband signal to terminal 7920 according to control signals 7123 and 7127, respectively. Terminal 7920 is tied to ground and prevents any DC offset voltages from developing between the UFT modules 7916 and 7922. As described above, a DC offset voltage can lead to undesired carrier insertion. The operation of the balanced modulator 7901 is described in greater detail according to the flowchart 8600 (FIG. 86) as follows.

In step 8402, the buffer/inverter 7904 receives the input baseband signal 7902 and generates I signal 7906 and inverted I signal 7908. I signal 7906 is substantially similar to the baseband signal 7902, and the inverted I signal 7908 is an inverted version of signal 7902. As such, the buffer/inverter 7904 converts the (single-ended) baseband signal 7902 into differential signals 7906 and 7908 that are sampled by the UFT modules. Buffer/inverter 7904 can be implemented using known operational amplifier (op amp) circuits, as will be understood by those skilled in the arts, although the invention is not limited to this example.

In step 8604, the control signal generator 7142 generates control signals 7123 and 7127 from the master clock signal 7145. Examples of the master clock signal 7145, control signal 7123, and control signal 7127 are shown in FIGS. 72A–C, respectively. As illustrated, both control signals 7123 and 7127 have the same period $T_S$ as a master clock signal 7145, but have a pulse width (or aperture) of TA. Control signal 7123 triggers on the rising pulse edge of the master clock signal 7145, and control signal 7127 triggers on the falling pulse edge of the master clock signal 7145.

Therefore, control signals 7123 and 7127 are shifted in time by 180 degrees relative to each other. A specific embodiment of the control signal generator 7142 is illustrated in FIG. 71A, and was discussed in detail above.

Figure 79B:
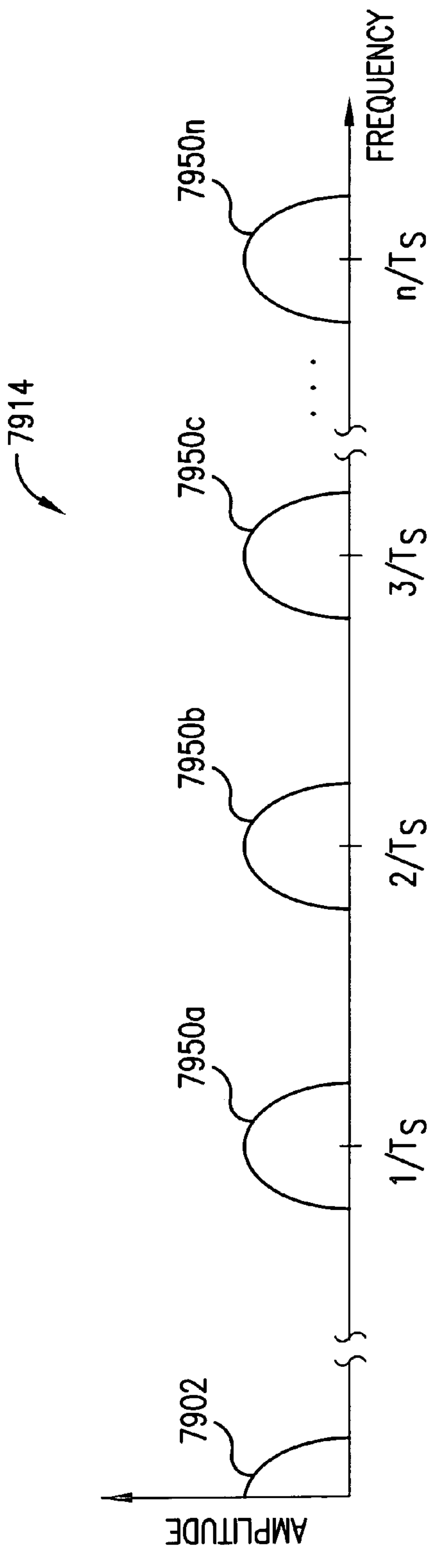
FIG. 79B illustrates an exemplary frequency spectrum for a harmonically rich signal having harmonic images, according to an embodiment of the present invention.

In step 8606, the UFT module 7916 shunts the signal 7906 to ground according to the control signal 7123, to generate a harmonically rich signal 7914. More specifically, the switch 7918 closes and shorts the signal 7906 to ground (at terminal 7920) during the aperture width TA of the control signal 7123, to generate the harmonically rich signal 7914. FIG. 79B illustrates an exemplary frequency spectrum for the harmonically rich signal 7918 having harmonic images 7950*a–n*. The images 7950 repeat at harmonics of the sampling frequency $1/T_S$, at infinitum, where each image 7950 contains the necessary amplitude, frequency, and phase information to reconstruct the baseband signal 7902. The generation of harmonically rich signals by sampling an input signal according to a controlled aperture have been described earlier in this application in the section titled, "Frequency Up-conversion Using Universal Frequency Translation", and is illustrated by FIGS. 3–6. A more detailed discussion of frequency up-conversion using a switch with a controlled sampling aperture is discussed in U.S. Pat. No. 6,091,940 entitled "Method and System for Frequency Up-Conversion," filed Oct. 21, 1998, and incorporated herein by reference.

The relative amplitude of the frequency images 7950 are generally a function of the harmonic number and the pulse width $T_A$. As such, the relative amplitude of a particular harmonic 7950 can be increased (or decreased) by adjusting the pulse width $T_A$ of the control signal 7123. In general, shorter pulse widths of $T_A$ shift more energy into the higher frequency harmonics, and longer pulse widths of $T_A$ shift energy into the lower frequency harmonics, as described by equations 1–4 above. Additionally, the relative amplitude of a particular harmonic 7950 can also be adjusted by adding/tuning an optional impedance 7910. Impedance 7910 operates as a filter that emphasizes a particular harmonic in the harmonically rich signal 7914.

In step 8608, the UFT module 7922 shunts the inverted signal 7908 to ground according to the control signal 7127, to generate a harmonically rich signal 7926. More specifically, the switch 7924 closes during the pulse widths $T_A$ and shorts the inverted I signal 7908 to ground (at terminal 7920), to generate the harmonically rich signal 7926. At any given time, only one of input signals 7906 or 7908 is shorted to ground because the pulses in the control signals 7123 and 7127 are phase shifted with respect to each other, as shown in FIGS. 72B and 72C.

The harmonically rich signal 7926 includes multiple frequency images of baseband signal 7902 that repeat at harmonics of the sampling frequency $(1/T_S)$, similar to that for the harmonically rich signal 7914. However, the images in the signal 7926 are phase-shifted compared to those in signal 7914 because of the inversion of the signal 7908 compared to the signal 7906, and because of the relative phase shift between the control signals 7123 and 7127. The optional impedance 7912 can be included to emphasis a particular harmonic of interest, and is similar to the impedance 7910 above.

Figure 79C:
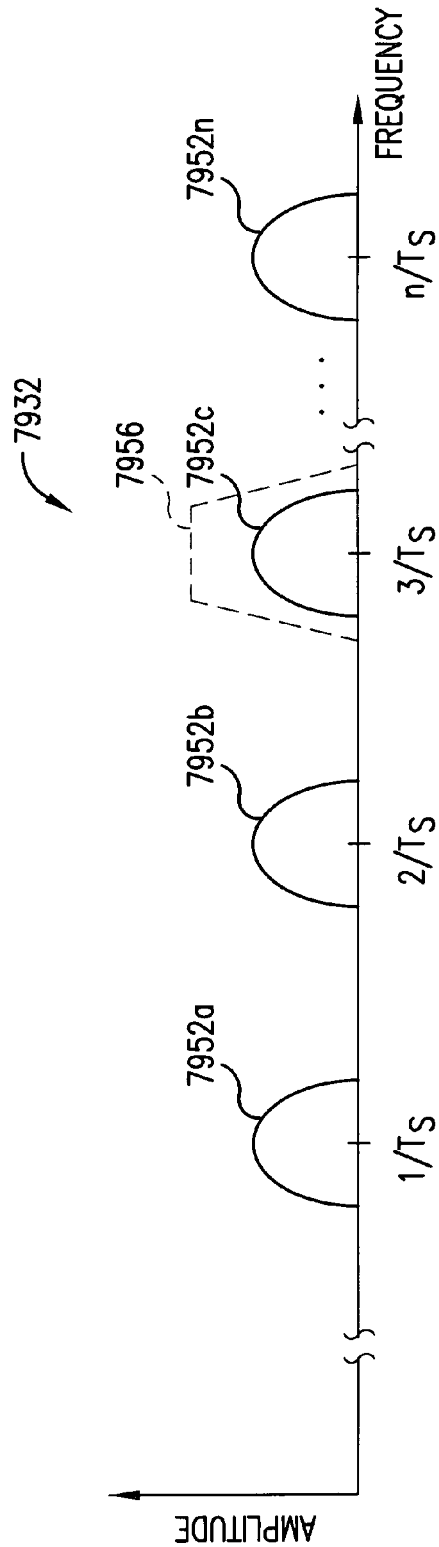
FIG. 79C illustrates an exemplary frequency spectrum for a harmonically rich signal that has multiple images that repeat at harmonics of the sampling frequency $1/T_S$, according to an embodiment of the present invention.

In step 8610, the node 7932 sums the harmonically rich signals 7914 and 7926 to generate the harmonically rich signal 7934. The capacitors 7928 and 7930 operate as blocking capacitors that substantially pass the respective harmonically rich signals 7914 and 7926 to the node 7932. (The capacitor values may be chosen to substantially block baseband frequency components as well.) FIG. 79C illustrates an exemplary frequency spectrum for the harmonically rich signal 7934 that has multiple images 7952*a–n* that repeat at harmonics of the sampling frequency $1/T_S$. Each image 7952 includes the necessary amplitude, frequency, and phase information to reconstruct the baseband signal 7902. The optional filter 7106 can be used to select the harmonic image of interest for transmission. This is represented by a passband 7956 that selects the harmonic image 7932*c* for transmission.

An advantage of the modulator 7901 is that it is fully balanced, which substantially minimizes (or eliminates) any DC voltage offset between the two UFT modules 7912 and 7914. DC offset is minimized because the UFT modules 7916 and 7922 are both connected to ground at terminal 7920. The result of controlling the DC offset between the UFT modules is that carrier insertion is minimized in the harmonic images of the harmonically rich signal 7934. As discussed above, carrier insertion is substantially wasted energy because the information for a modulated signal is carried in the sidebands of the modulated signal and not in the carrier. Therefore, it is often desirable to minimize the energy at the carrier frequency by controlling the relative DC offset.

3.1.4 Balanced Modulator FET Configuration

Figure 71D:
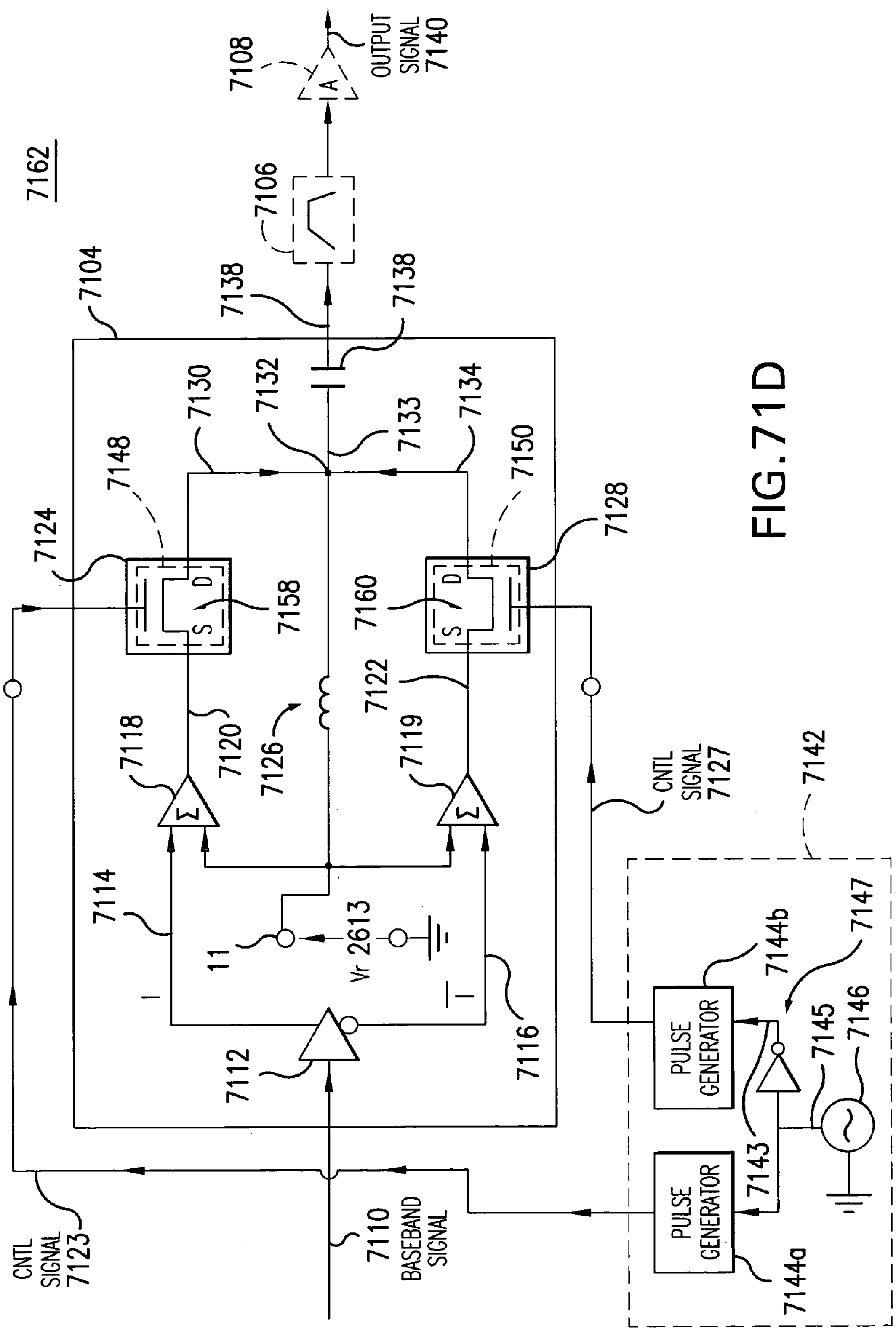
FIG. 71D illustrates an example embodiment of the modulator of FIG. 71B where the controlled switches in the UFT modules are field effect transistors (FET), according to an embodiment of the present invention.
Figure 79D:
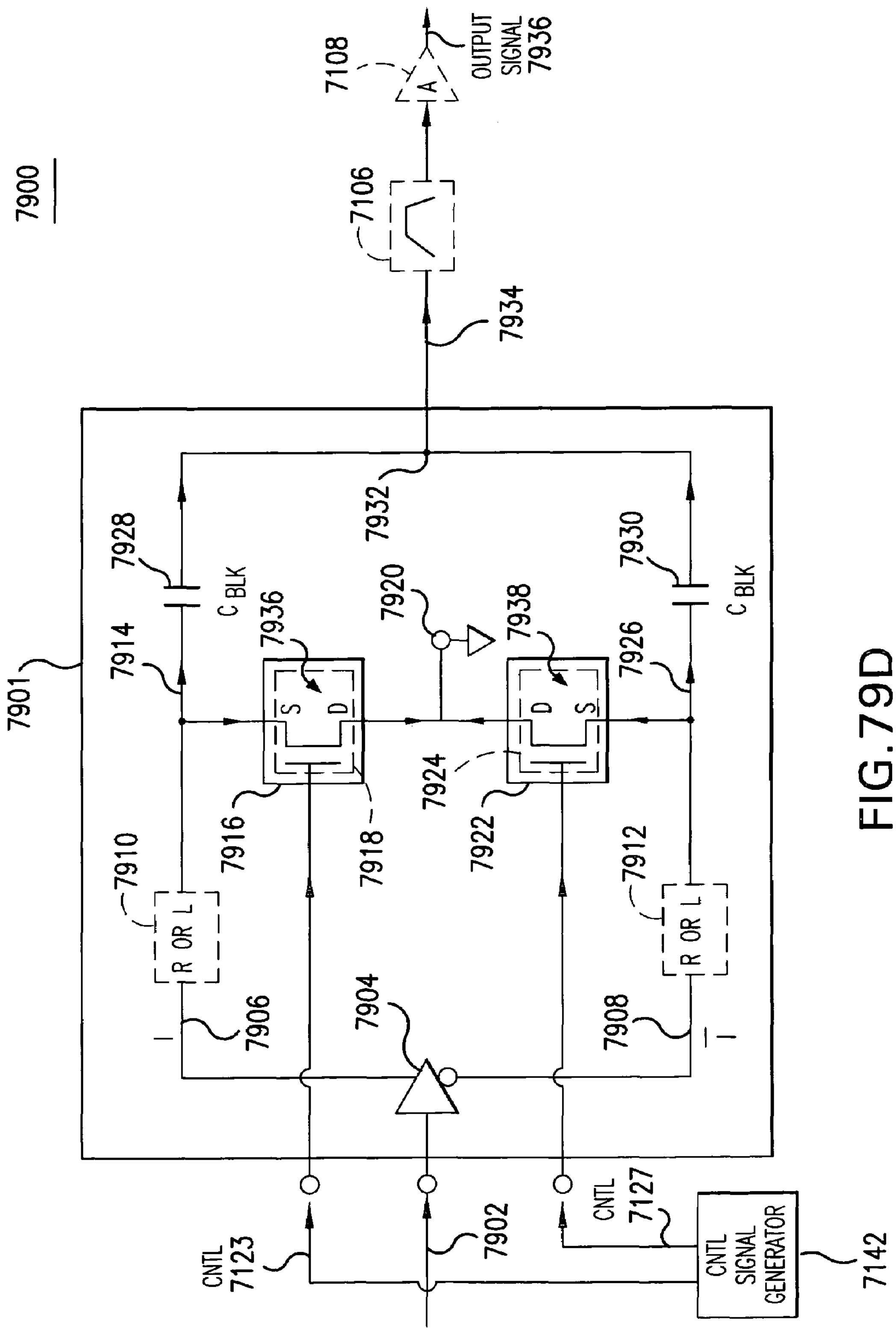
FIG. 79D illustrates an embodiment of the modulator of FIG. 79A, where the controlled switches in the UFT modules are field effect transistors (FET), according to the present invention.

As described above, the balanced modulators 7104 and 7901 utilize two balanced UFT modules to sample the input baseband signals to generate harmonically rich signals that contain the up-converted baseband information. More specifically, the UFT modules include controlled switches that sample the baseband signal in a balanced and differential fashion. FIGS. 71D and 79D illustrate embodiments of the controlled switch in the UFT module.

FIG. 71D illustrates an example transmitter 7162, according to an embodiment of the present invention. Transmitter 7162 comprises modulator 7104 (FIG. 71B) where the controlled switches in the UFT modules are field effect transistors (FET). More specifically, the controlled switches 7148 and 7128 are embodied as FET 7158 and FET 7160, respectively. The FET 7158 and 7160 are oriented so that their gates are controlled by the control signals 7123 and 7127, so that the control signals control the FET conductance. For the FET 7158, the combined baseband signal 7120 is received at the source of the FET 7158 and is sampled according to the control signal 7123 to produce the harmonically rich signal 7130 at the drain of the FET 7158. Likewise, the combined baseband signal 7122 is received at the source of the FET 7160 and is sampled according to the control signal 7127 to produce the harmonically rich signal 7134 at the drain of FET 7160. The source and drain orientation that is illustrated is not limiting, as the source and drains can be switched for most FETs. In other words, the combined baseband signal can be received at the drain of the FETs, and the harmonically rich signals can be taken from the source of the FETs, as will be understood by those skilled in the relevant arts.

FIG. 79D illustrates an embodiment of the modulator 7900 (FIG. 79A) where the controlled switches in the UFT modules are field effect transistors (FET). More specifically, the controlled switches 7918 and 7924 are embodied as FET 7936 and FET 7938, respectively. The FETs 7936 and 7938 are oriented so that their gates are controlled by the control signals 7123 and 7127, respectively, so that the control signals determine FET conductance. For the FET 7936, the baseband signal 7906 is received at the source of the FET 7936 and shunted to ground according to the control signal 7123, to produce the harmonically rich signal 7914. Likewise, the baseband signal 7908 is received at the source of the FET 7938 and is shunted to grounding according to the control signal 7127, to produce the harmonically rich signal 7926. The source and drain orientation that is illustrated is not limiting, as the source and drains can be switched for most FETs, as will be understood by those skilled in the relevant arts.

3.1.5 Universal Transmitter Configured for Carrier Insertion

As discussed above, the transmitters 7102 and 7900 have a balanced configuration that substantially eliminates any DC offset and results in minimal carrier insertion in the output signal 7140. Minimal carrier insertion is generally desired for most applications because the carrier signal carries no information and reduces the overall transmitter efficiency. However, some applications require the received signal to have sufficient carrier energy for the receiver to extract the carrier for coherent demodulation. In support thereof, the present invention can be configured to provide the necessary carrier insertion by implementing a DC offset between the two sampling UFT modules.

Figure 73A:
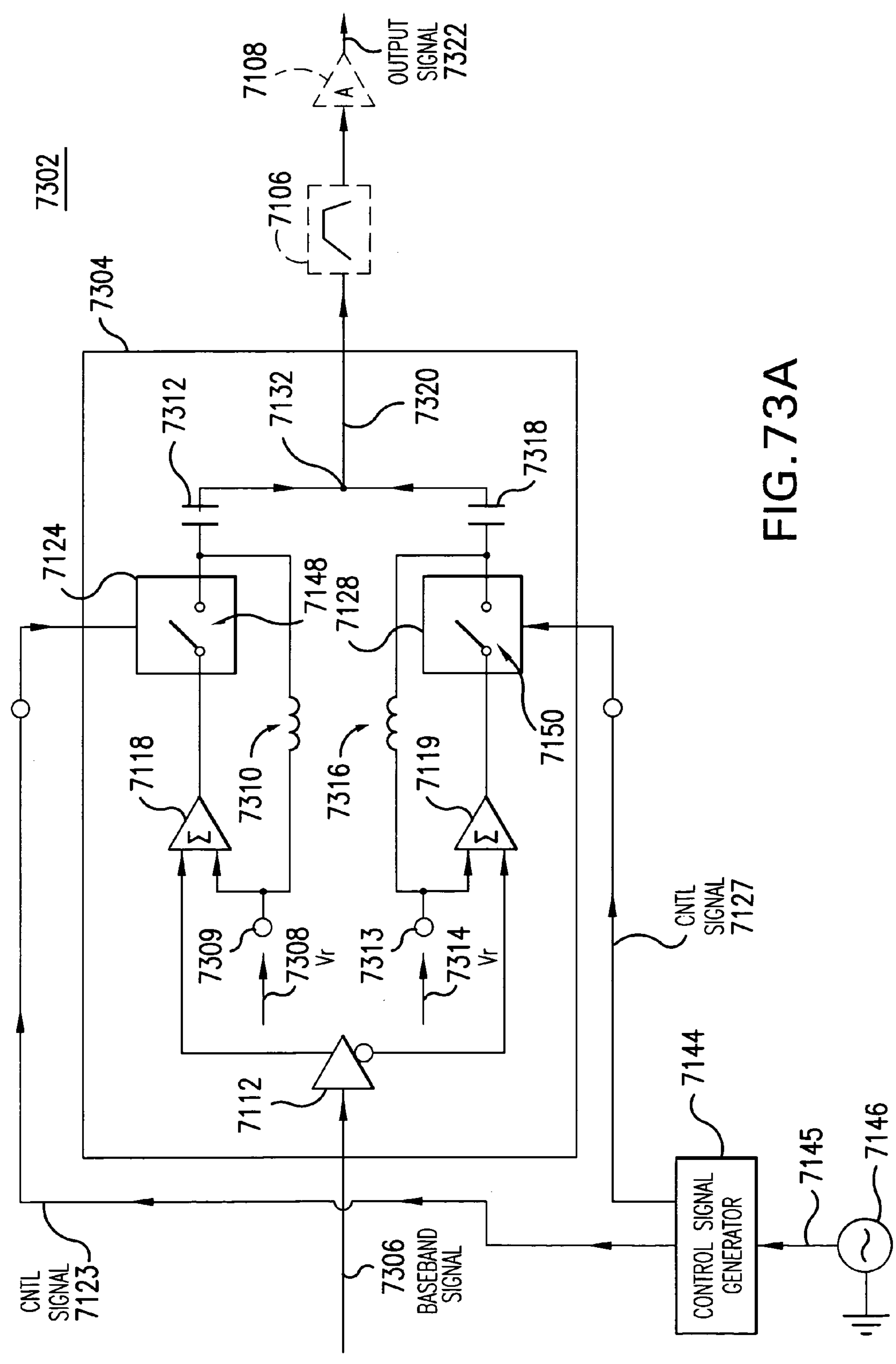
FIG. 73A illustrates a transmitter that up-converts a baseband signal to an output signal having carrier insertion, according to an embodiment of the present invention.

FIG. 73A illustrates a transmitter 7302 that up-converts a baseband signal 7306 to an output signal 7322 having carrier insertion. As is shown, the transmitter 7302 is similar to the transmitter 7102 (FIG. 71A) with the exception that the up-converter/modulator 7304 is configured to accept two DC references voltages. In contrast, modulator 7104 was configured to accept only one DC reference voltage. More specifically, the modulator 7304 includes a terminal 7309 to accept a DC reference voltage 7308, and a terminal 7313 to accept a DC reference voltage 7314. Vr 7308 appears at the UFT module 7124 though summer amplifier 7118 and the inductor 7310. Vr 7314 appears at UFT module 7128 through the summer amplifier 7119 and the inductor 7316. Capacitors 7312 and 7318 operate as blocking capacitors. If Vr 7308 is different from Vr 7314 then a DC offset voltage will be exist between UFT module 7124 and UFT module 7128, which will be up-converted at the carrier frequency in the harmonically rich signal 7320. More specifically, each harmonic image in the harmonically rich signal 7320 will include a carrier signal as depicted in FIG. 73B.

Figure 73B:
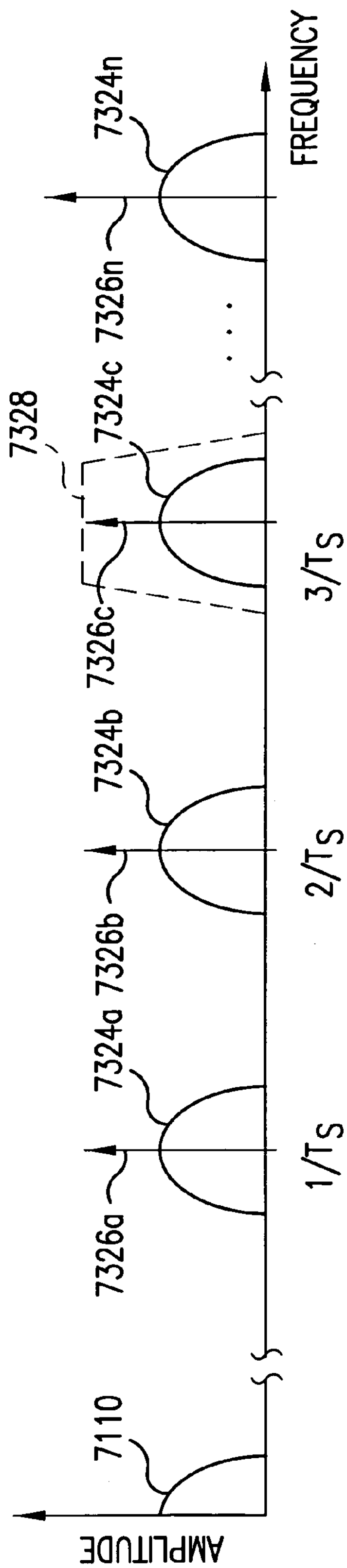
FIG. 73B illustrates an exemplary frequency spectrum for a harmonically rich signal that has multiple harmonic images, according to an embodiment of the present invention.

FIG. 73B illustrates an exemplary frequency spectrum for the harmonically rich signal 7320 that has multiple harmonic images 7324*a–n*. In addition to carrying the baseband information in the sidebands, each harmonic image 7324 also includes a carrier signal 7326 that exists at respective harmonic of the sampling frequency $1/T_S$. The amplitude of the carrier signal increases with increasing DC offset voltage. Therefore, as the difference between Vr 7308 and Vr 7314 widens, the amplitude of each carrier signal 7326 increases. Likewise, as the difference between Vr 7308 and Vr 7314 shrinks, the amplitude of each carrier signal 7326 shrinks. As with transmitter 7302, the optional bandpass filter 7106 can be included to select a desired harmonic image for transmission. This is represented by passband 7328 in FIG. 73B.

3.2 Universal Transmitter In I/Q Configuration:

As described above, the balanced modulators 7104 and 7901 up-convert a baseband signal to a harmonically rich signal having multiple harmonic images of the baseband information. By combining two balanced modulators, I/Q configurations can be formed for up-converting I and Q baseband signals. In doing so, either the (series type) balanced modulator 7104 or the (shunt type) balanced modulator can be utilized. I/Q modulators having both series and shunt configurations are described below.

3.2.1 IQ Transmitter Using Series-Type Balanced Modulator

Figure 74:
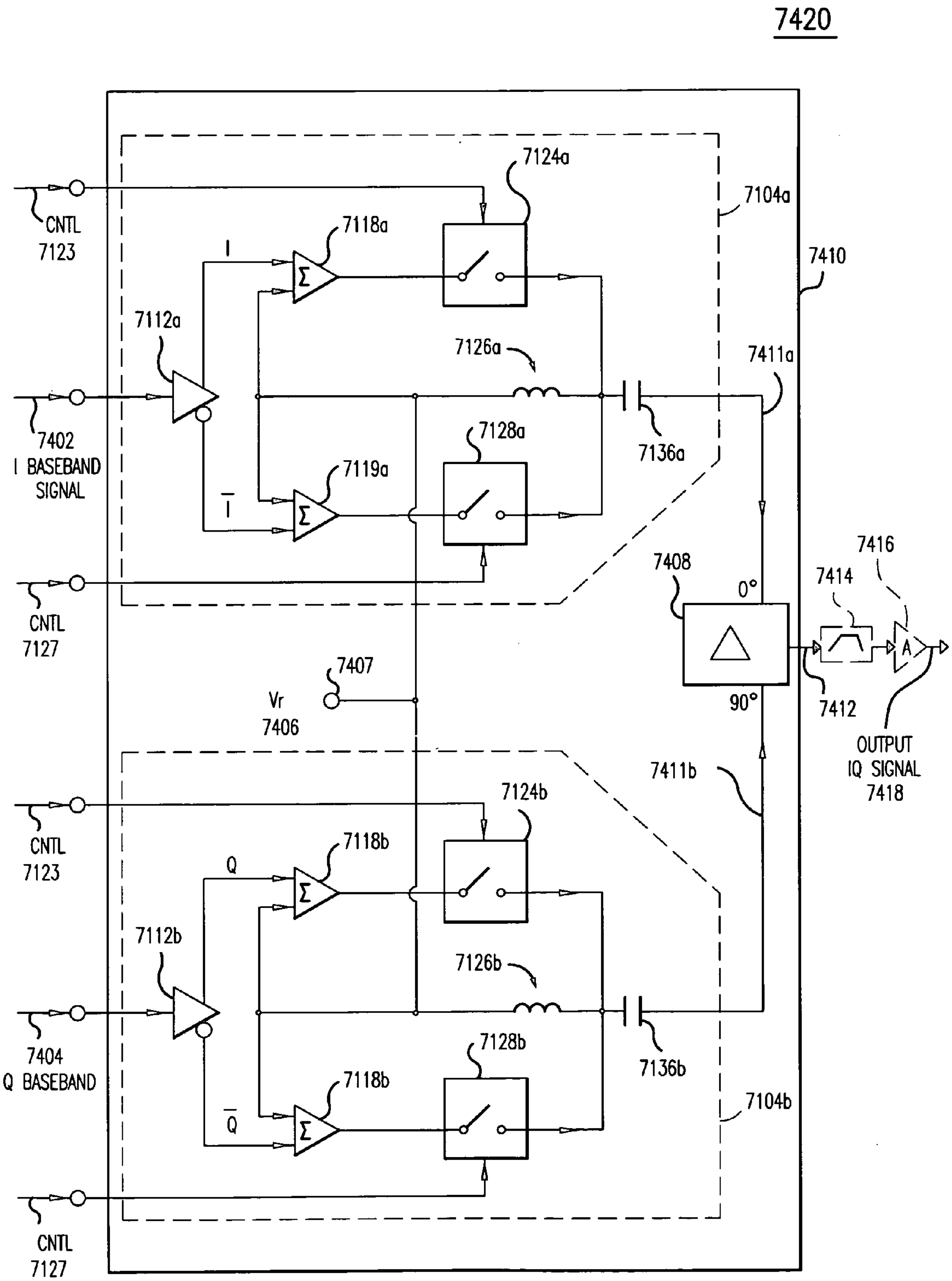
FIG. 74 illustrates an I/Q transmitter with an in-phase (I) and quadrature (O) configuration according to embodiments of the invention.

FIG. 74 illustrates an I/Q transmitter 7420 with an in-phase (I) and quadrature (O) configuration according to embodiments of the invention. The transmitter 7420 includes an I/Q balanced modulator 7410, an optional filter 7414, and an optional amplifier 7416. The transmitter 7420 is useful for transmitting complex I Q waveforms and does so in a balanced manner to control DC offset and carrier insertion. In doing so, the modulator 7410 receives an I baseband signal 7402 and a Q baseband signal 7404 and up-converts these signals to generate a combined harmonically rich signal 7412. The harmonically rich signal 7412 includes multiple harmonics images, where each image contains the baseband information in the I signal 7402 and the Q signal 7404. The optional bandpass filter 7414 may be included to select a harmonic of interest (or subset of harmonics) from the signal 7412 for transmission. The optional amplifier 7416 may be included to amplify the selected harmonic prior to transmission, to generate the I/Q output signal 7418.

Figure 87:
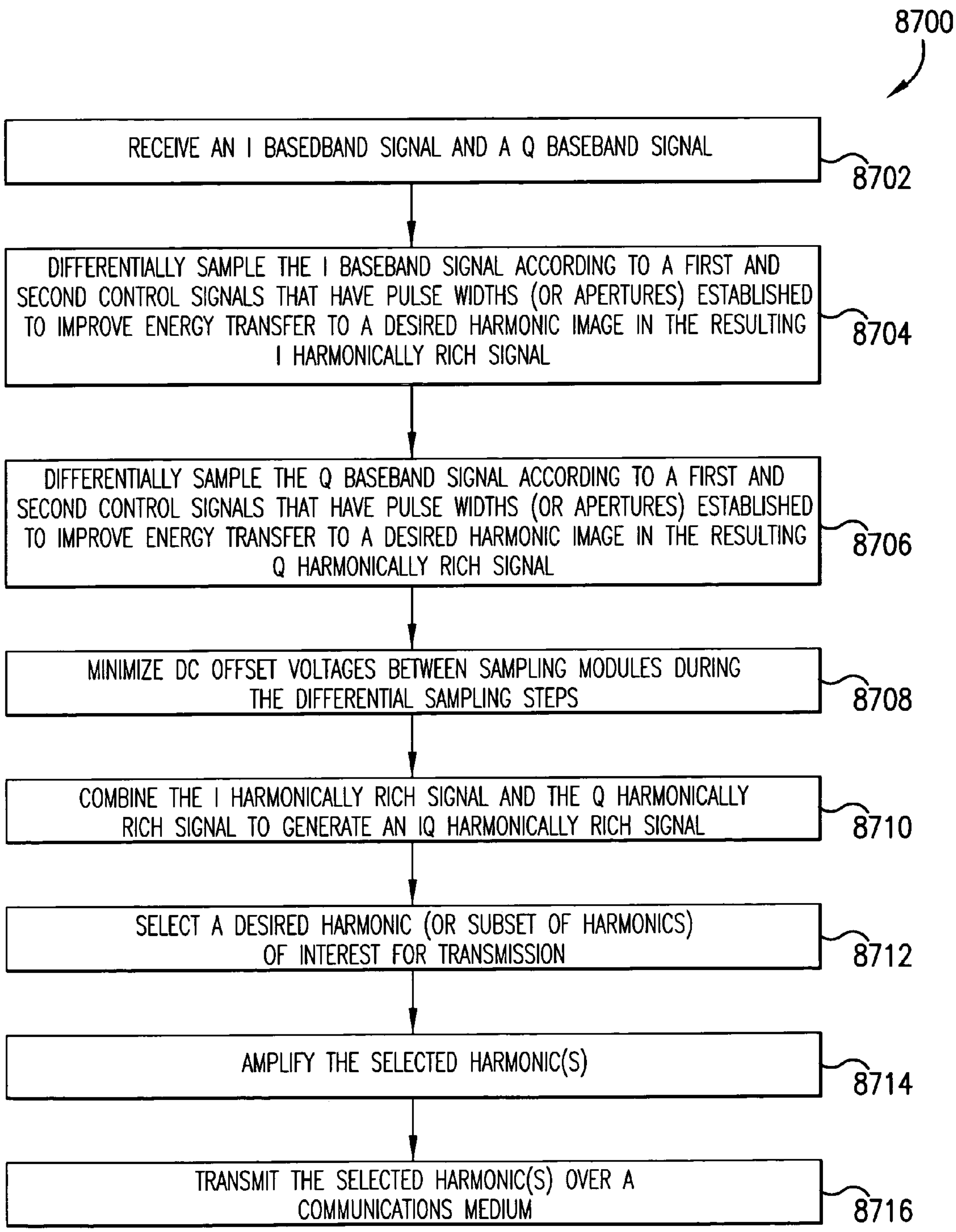
FIG. 87 illustrates a flowchart describing operation of the balanced modulator and other components of FIG. 74, according to an exemplary embodiment of the present invention.

As stated above, the balanced I/Q modulator 7410 up-converts the I baseband signal 7402 and the Q baseband signal 7404 in a balanced manner to generate the combined harmonically rich signal 7412 that carriers the I and Q baseband information. To do so, in an embodiment, the modulator 7410 utilizes two balanced modulators 7104 from FIG. 71A, a signal combiner 7408, and a DC terminal 7407. The operation of the balanced modulator 7410 and other circuits in the transmitter is described according to the flowchart 8700 in FIG. 87, as follows. It is again noted that the ordering of steps in flowcharts is flexible, and not limited to the particular embodiments discussed herein.

In step 8702, the I/Q modulator 7410 receives the I baseband signal 7402 and the Q baseband signal 7404.

In step 8704, the I balanced modulator 7104*a* samples the I baseband signal 7402 in a differential fashion using the control signals 7123 and 7127 to generate a harmonically rich signal 7411*a*. The harmonically rich signal 7411*a* contains multiple harmonic images of the I baseband information, similar to the harmonically rich signal 7130 in FIG. 711B.

In step 8706, the balanced modulator 7104*b* samples the Q baseband signal 7404 in a differential fashion using control signals 7123 and 7127 to generate harmonically rich signal 7411*b*, where the harmonically rich signal 7411*b* contains multiple harmonic images of the Q baseband signal 7404. The operation of the balanced modulator 7104 and the generation of harmonically rich signals was fully described above and illustrated in FIGS. 71A–C, to which the reader is referred for further details.

In step 8708, the DC terminal 7407 receives a DC voltage 7406 that is distributed to both modulators 7104*a* and 7104*b*. The DC voltage 7406 is distributed to both the input and output of both UFT modules 7124 and 7128 in each modulator 7104. This minimizes (or prevents) DC offset voltages from developing between the four UFT modules, and thereby minimizes or prevents any carrier insertion during the sampling steps 8704 and 8706.

Figure 75A:
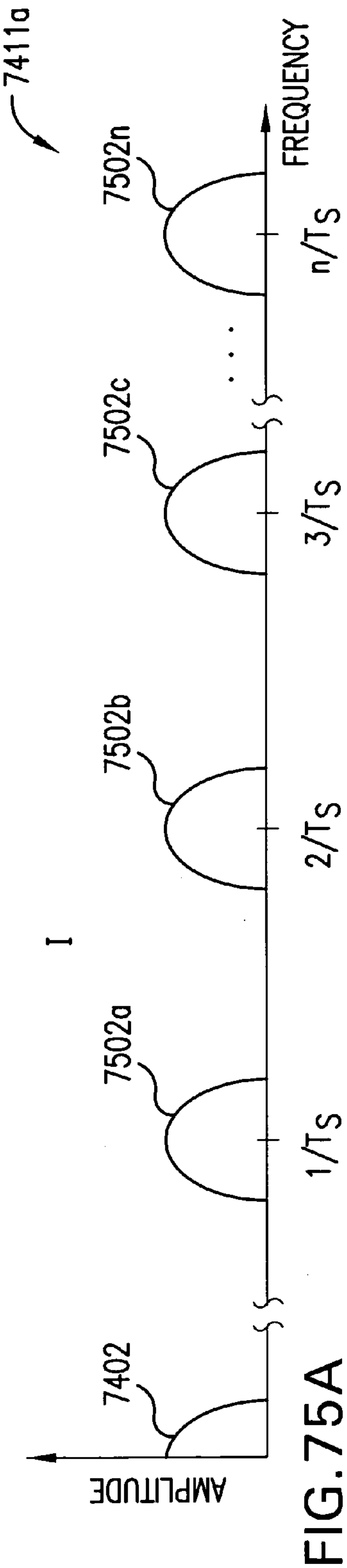
FIG. 75A depicts an exemplary frequency spectrum for the harmonically rich signal having harmonic images, according to an embodiment of the present invention.
Figure 75B:
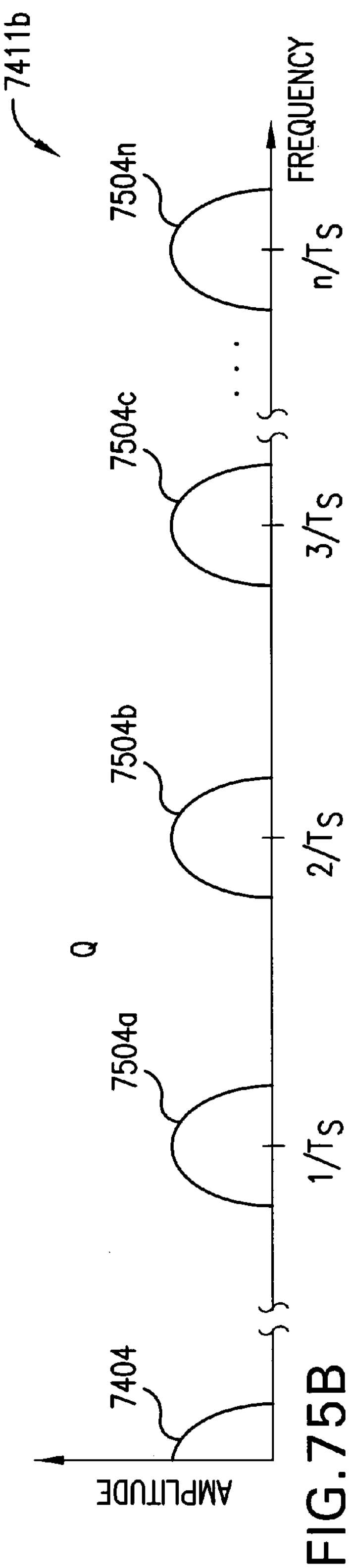
FIG. 75B depicts an exemplary frequency spectrum for a harmonically rich signal having harmonic images, according to an embodiment of the present invention.
Figure 75C:
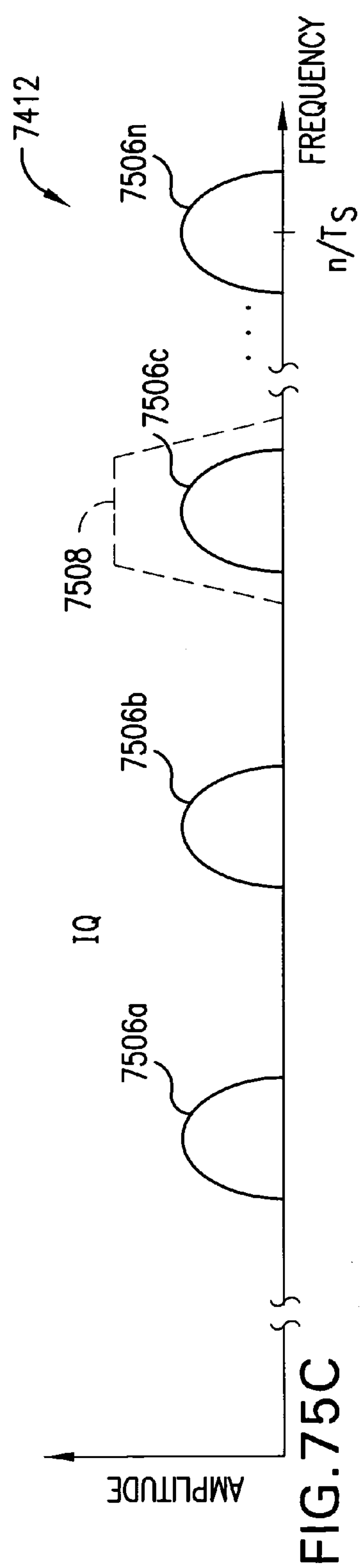
FIG. 75C illustrates an exemplary frequency spectrum for combined harmonically rich signal having images, according to an embodiment of the present invention.

In step 8710, the 90 degree signal combiner 7408 combines the harmonically rich signals 7411*a* and 7411*b* to generate I/Q harmonically rich signal 7412. This is further illustrated in FIGS. 75A–C. FIG. 75A depicts an exemplary frequency spectrum for the harmonically rich signal 7411*a* having harmonic images 7502*a–n*. The images 7502 repeat at harmonics of the sampling frequency $1/T_S$, where each image 7502 contains the necessary amplitude and frequency information to reconstruct the I baseband signal 7402. Likewise, FIG. 75B depicts an exemplary frequency spectrum for the harmonically rich signal 7411*b* having harmonic images 7504*a–n*. The harmonic images 7504*a–n* also repeat at harmonics of the sampling frequency $1/T_S$, where each image 7504 contains the necessary amplitude, frequency, and phase information to reconstruct the Q baseband signal 7404. FIG. 75C illustrates an exemplary frequency spectrum for the combined harmonically rich signal 7412 having images 7506. Each image 7506 carries the I baseband information and the Q baseband information from the corresponding images 7502 and 7504, respectively, without substantially increasing the frequency bandwidth occupied by each harmonic 7506. This can occur because the signal combiner 7408 phase shifts the Q signal 7411*b* by 90 degrees relative to the I signal 7411*a*. The result is that the images 7502*a–n* and 7504*a–n* effectively share the signal bandwidth do to their orthogonal relationship. For example, the images 7502*a* and 7504*a* effectively share the frequency spectrum that is represented by the image 7506*a*.

In step 8712, the optional filter 7414 can be included to select a harmonic of interest, as represented by the passband 7508 selecting the image 7506*c* in FIG. 75*c*.

In step 8714, the optional amplifier 7416 can be included to amplify the harmonic (or harmonics) of interest prior to transmission.

In step 8716, the selected harmonic (or harmonics) is transmitted over a communications medium.

Figure 76A:
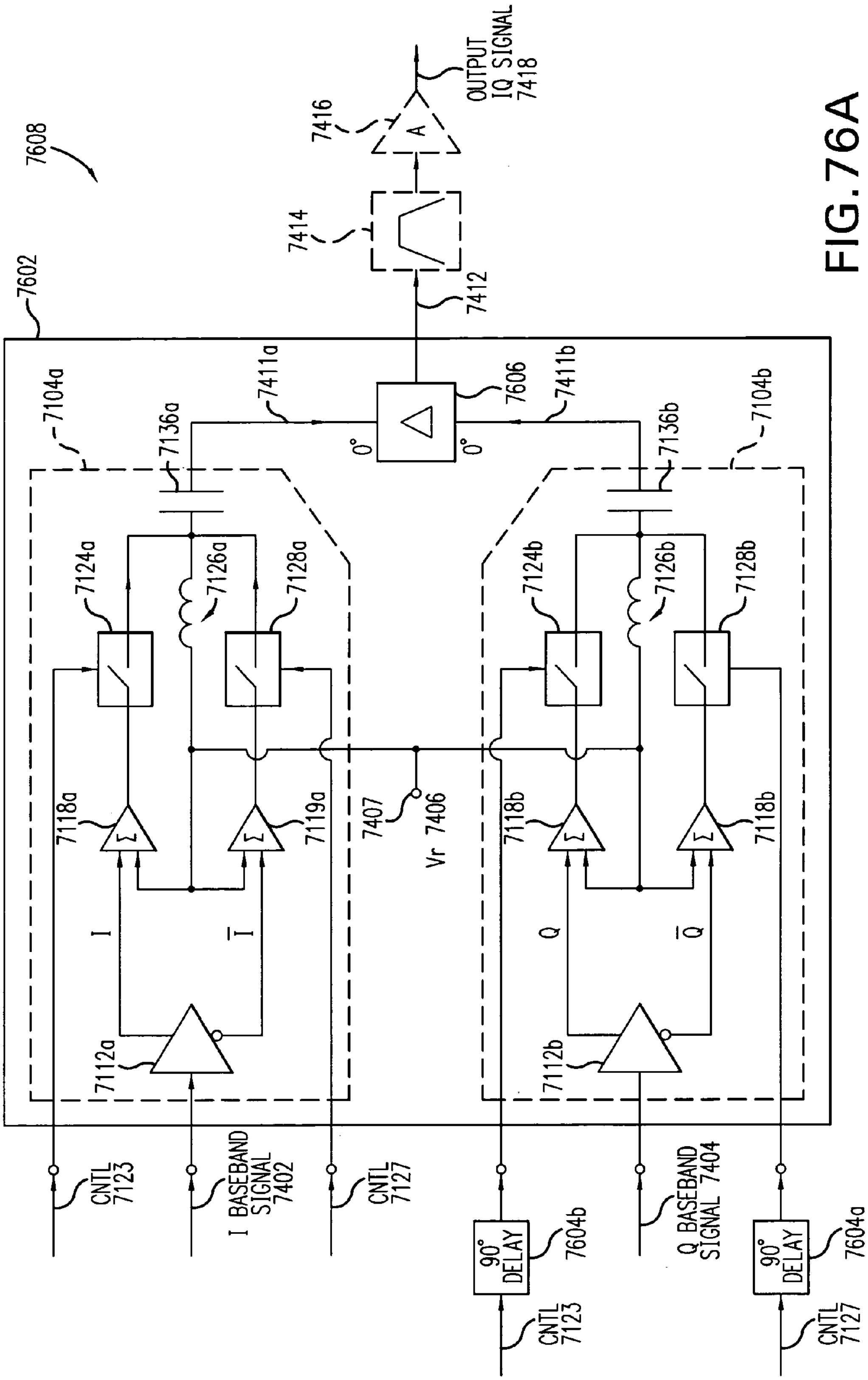
FIG. 76A illustrates a transmitter that is a second embodiment for an I Q transmitter having a balanced configuration, according to an embodiment of the present invention.

FIG. 76A illustrates a transmitter 7608 that is a second embodiment for an I Q transmitter having a balanced configuration. Transmitter 7608 is similar to the transmitter 7420 except that the 90 degree phase shift between the I and Q channels is achieved by phase shifting the control signals instead of using a 90 degree signal combiner to combine the harmonically rich signals. More specifically, delays 7604*a* and 7604*b* delay the control signals 7123 and 7127 for the Q channel modulator 7104*b* by 90 degrees relative the control signals for the I channel modulator 7104*a*. As a result, the Q modulator 7104*b* samples the Q baseband signal 7404 with 90 degree delay relative to the sampling of the I baseband signal 7402 by the I channel modulator 7104*a*. Therefore, the Q harmonically rich signal 7411*b* is phase shifted by 90 degrees relative to the I harmonically rich signal. Since the phase shift is achieved using the control signals, an in-phase signal combiner 7606 combines the harmonically rich signals 7411*a* and 7411*b*, to generate the harmonically rich signal 7412. It is noted that other embodiments may employ phase shifts other than 90 degrees.

Figure 76B:
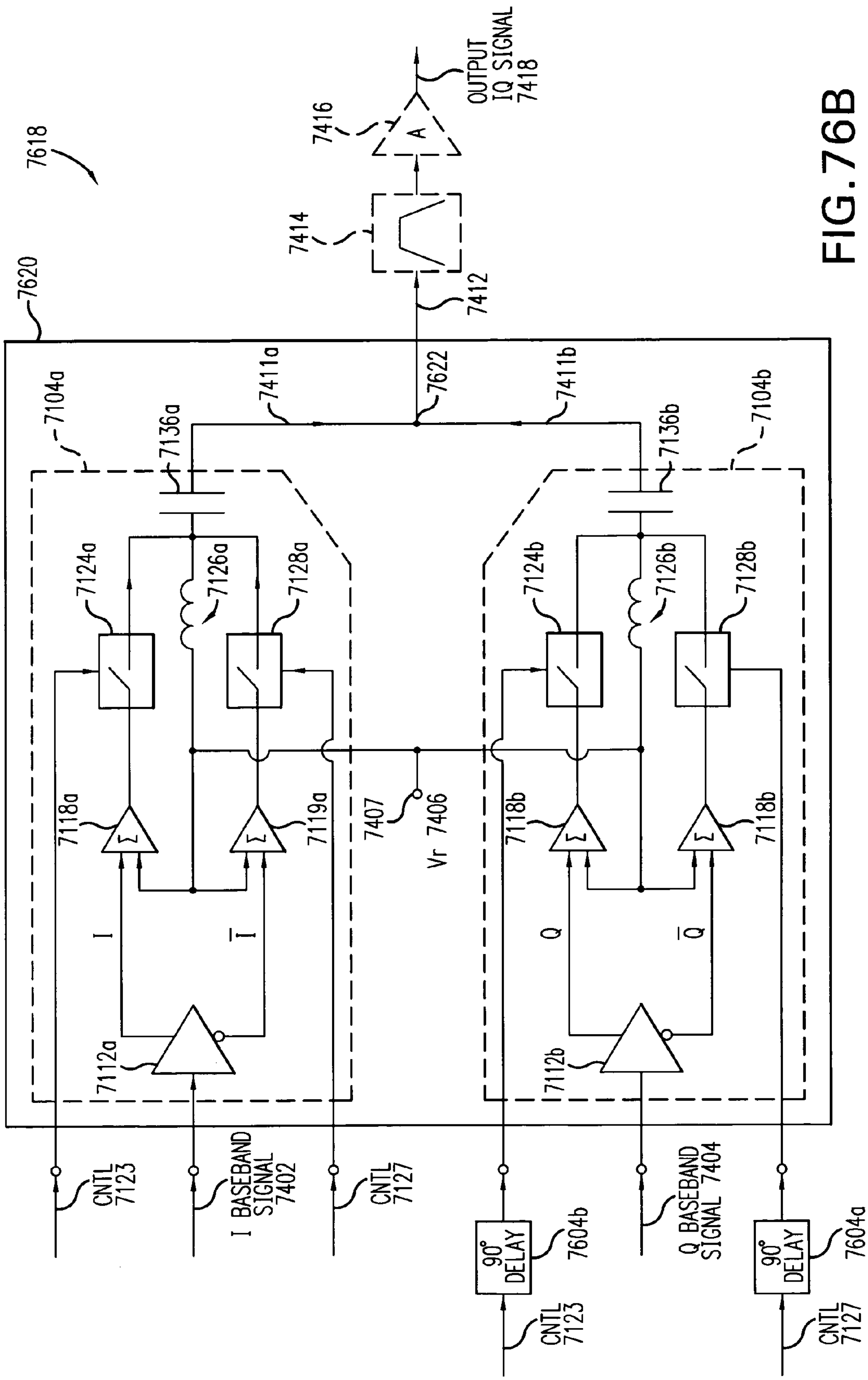
FIG. 76B illustrates a transmitter, according to an embodiment of the present invention.

FIG. 76B illustrates a transmitter 7618 that is similar to transmitter 7608 in FIG. 76A. The difference being that the transmitter 7618 has a modulator 7620 that utilizes a summing node 7622 to sum the signals 7411*a* and 7411*b* instead of the in-phase signal combiner 7606 that is used in modulator 7602 of transmitter 7608.

3.2.2. I/Q Transmitter Using Shunt-Type Balanced Modulator

Figure 80:
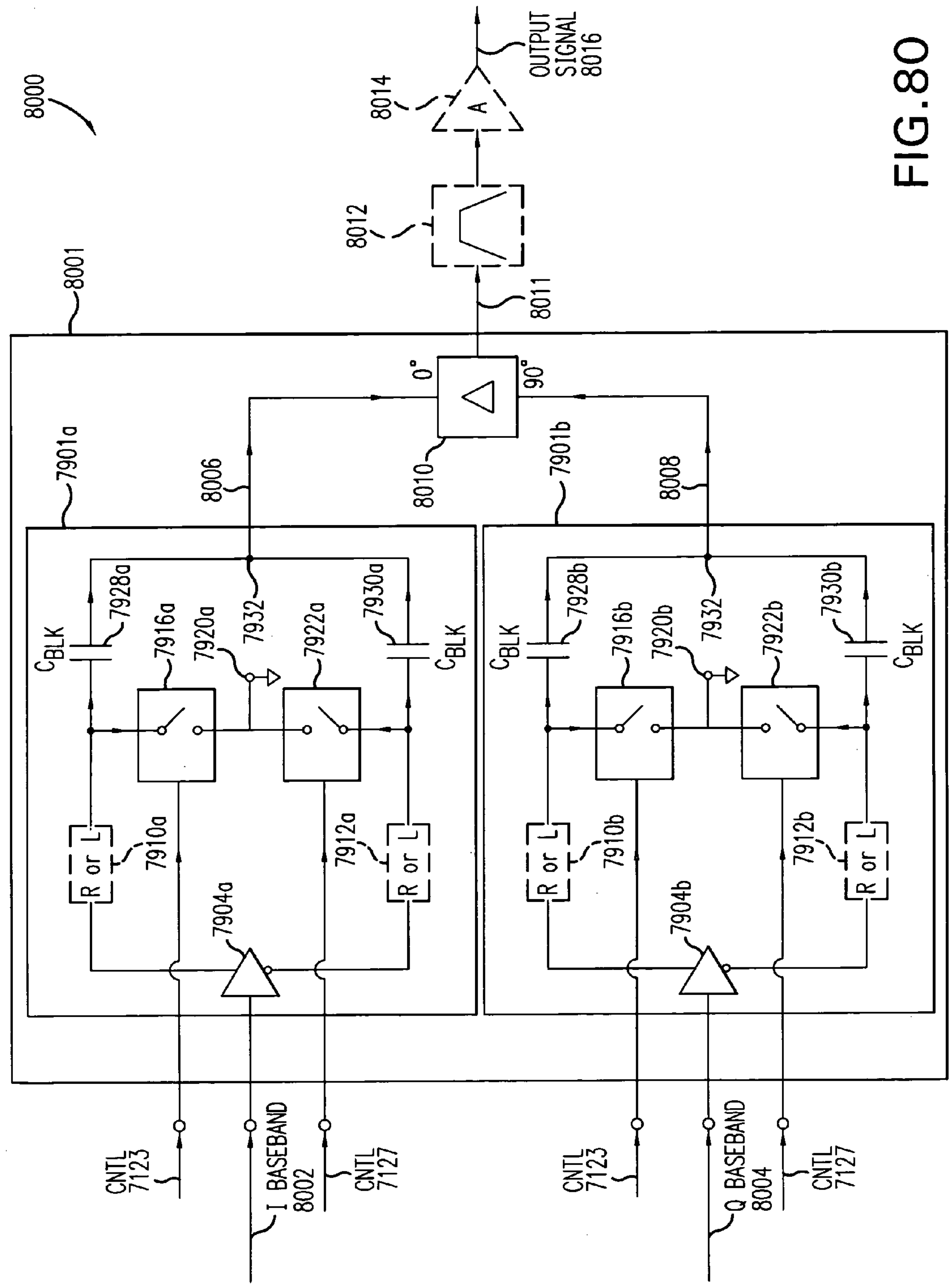
FIG. 80 illustrates an I/Q transmitter embodiment, according to the present invention.

FIG. 80 illustrates an I/Q transmitter 8000 that is another I/Q transmitter embodiment according to the present invention. The transmitter 8000 includes an I/Q balanced modulator 8001, an optional filter 8012, and an optional amplifier 8014. During operation, the modulator 8001 up-converts an I baseband signal 8002 and a Q baseband signal 8004 to generate a combined harmonically rich signal 8011. The harmonically rich signal 8011 includes multiple harmonics images, where each image contains the baseband information in the I signal 8002 and the Q signal 8004. The optional bandpass filter 8012 may be included to select a harmonic of interest (or subset of harmonics) from the harmonically rich signal 8011 for transmission. The optional amplifier 8014 may be included to amplify the selected harmonic prior to transmission, to generate the I/Q output signal 8016.

Figure 88:
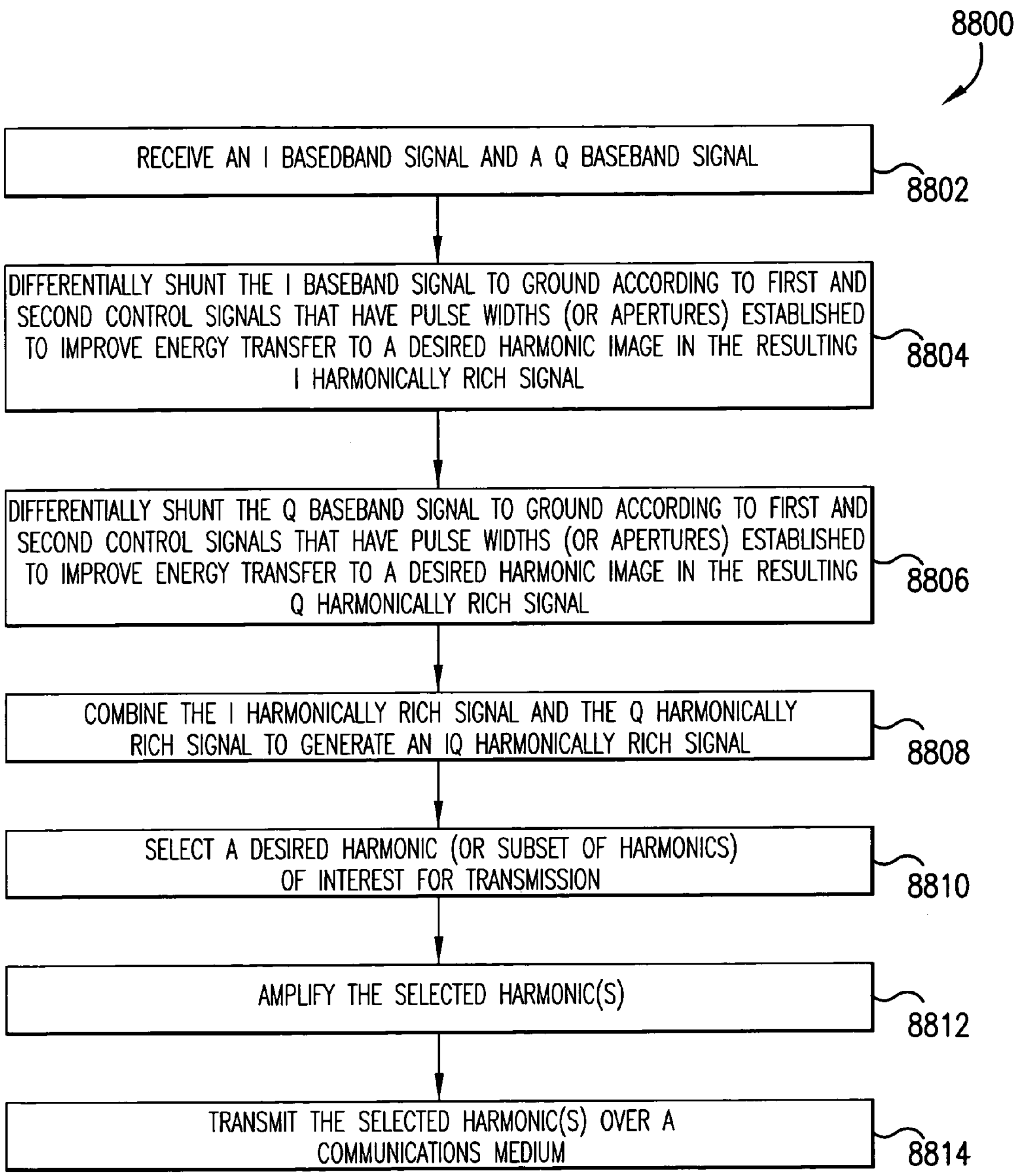
FIG. 88 illustrates a flowchart describing operation of the I/Q modulator of FIG. 80, according to an exemplary embodiment of the present invention.

The I/Q modulator 8001 includes two balanced modulators 7901 from FIG. 79A, and a 90 degree signal combiner 8010 as shown. The operation of the I/Q modulator 8001 is described in reference to the flowchart 8800 (FIG. 88), as follows. The order of the steps in flowchart 8800 is not limiting.

In step 8802, the balanced modulator 8001 receives the I baseband signal 8002 and the Q baseband signal 8004.

In step 8804, the balanced modulator 7901*a* differentially shunts the I baseband signal 8002 to ground according the control signals 7123 and 7127, to generate a harmonically rich signal 8006. More specifically, the UFT modules 7916*a* and 7922*a* alternately shunt the I baseband signal and an inverted version of the I baseband signal to ground according to the control signals 7123 and 7127, respectively. The operation of the balanced modulator 7901 and the generation of harmonically rich signals was fully described above and is illustrated in FIGS. 79A–C, to which the reader is referred for further details. As such, the harmonically rich signal 8006 contains multiple harmonic images of the I baseband information as described above.

In step 8806, the balanced modulator 7901*b* differentially shunts the Q baseband signal 8004 to ground according to control signals 7123 and 7127, to generate harmonically rich signal 8008. More specifically, the UFT modules 7916*b* and 7922*b* alternately shunt the Q baseband signal and an inverted version of the Q baseband signal to ground, according to the control signals 7123 and 7127, respectively. As such, the harmonically rich signal 8008 contains multiple harmonic images that contain the Q baseband information.

Figures 81A, 81B, 81C:
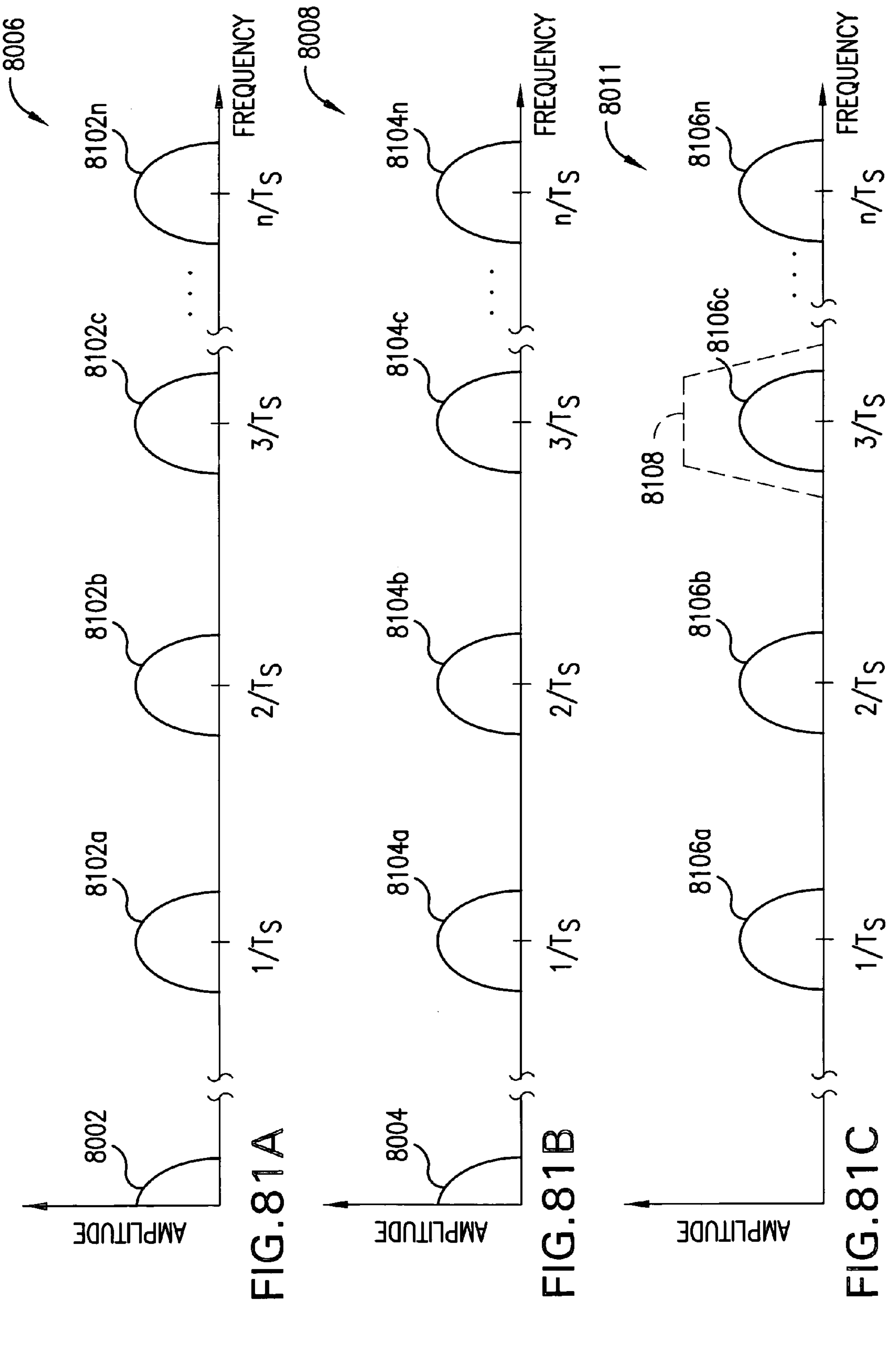
FIG. 81A depicts an exemplary frequency spectrum for a harmonically rich signal having harmonic images, according to an embodiment of the present invention.
FIG. 81B depicts an exemplary frequency spectrum for a harmonically rich signal having harmonic images, according to an embodiment of the present invention.
FIG. 81C illustrates an exemplary frequency spectrum for an I/Q harmonically rich signal having images, according to an embodiment of the present invention, according to an embodiment of the present invention.

In step 8808, the 90 degree signal combiner 8010 combines the harmonically rich signals 8006 and 8008 to generate I/Q harmonically rich signal 8011. This is further illustrated in FIGS. 81A–C. FIG. 81A depicts an exemplary frequency spectrum for the harmonically rich signal 8006 having harmonic images 8102*a–n*. The harmonic images 8102 repeat at harmonics of the sampling frequency $1/T_S$, where each image 8102 contains the necessary amplitude, frequency, and phase information to reconstruct the I baseband signal 8002. Likewise, FIG. 81B depicts an exemplary frequency spectrum for the harmonically rich signal 8008 having harmonic images 8104*a–n*. The harmonic images 8104*a–n* also repeat at harmonics of the sampling frequency $1/T_S$, where each image 8104 contains the necessary amplitude, frequency, and phase information to reconstruct the Q baseband signal 8004. FIG. 81C illustrates an exemplary frequency spectrum for the I/Q harmonically rich signal 8011 having images 8106*a–n*. Each image 8106 carries the I baseband information and the Q baseband information from the corresponding images 8102 and 8104, respectively, without substantially increasing the frequency bandwidth occupied by each image 8106. This can occur because the signal combiner 8010 phase shifts the Q signal 8008 by 90 degrees relative to the I signal 8006.

In step 8810, the optional filter 8012 may be included to select a harmonic of interest, as represented by the passband 8108 selecting the image 8106*c* in FIG. 81C.

In step 8812, the optional amplifier 8014 can be included to amplify the selected harmonic image 8106 prior to transmission.

In step 8814, the selected harmonic (or harmonics) is transmitted over a communications medium.

Figure 82:
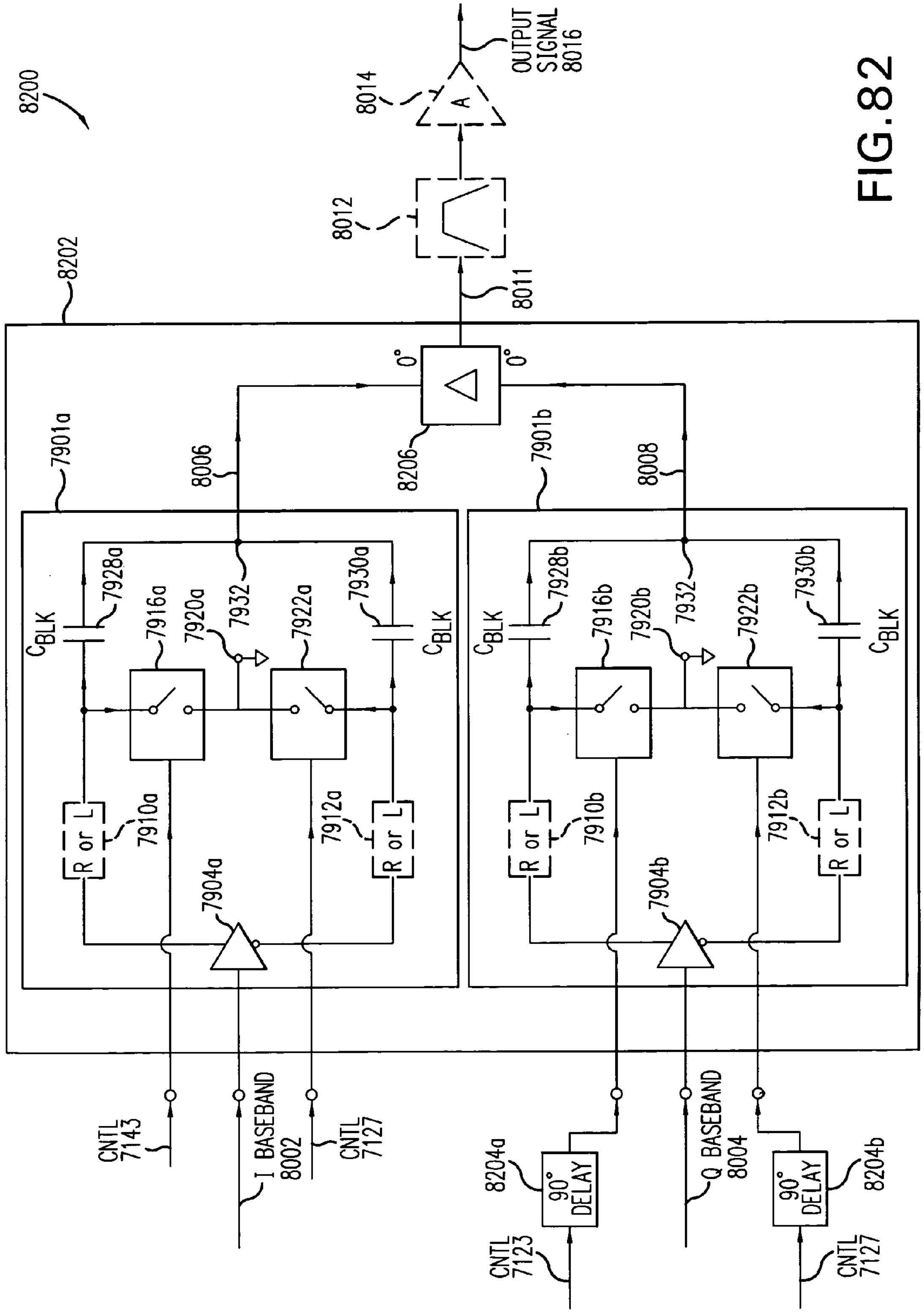
FIG. 82 illustrates an I/Q transmitter having a balanced configuration, according to an embodiment of the present invention.

FIG. 82 illustrates a transmitter 8200 that is another embodiment for an I Q transmitter having a balanced configuration. Transmitter 8200 is similar to the transmitter 8000 except that the 90 degree phase shift between the I and Q channels is achieved by phase shifting the control signals instead of using a 90 degree signal combiner to combine the harmonically rich signals. More specifically, delays 8204*a* and 8204*b* delay the control signals 7123 and 7127 for the Q channel modulator 7901*b* by 90 degrees relative the control signals for the I channel modulator 7901*a*. As a result, the Q modulator 7901*b* samples the Q baseband signal 8004 with a 90 degree delay relative to the sampling of the I baseband signal 8002 by the I channel modulator 7901*a*. Therefore, the Q harmonically rich signal 8008 is phase shifted by 90 degrees relative to the I harmonically rich signal 8006. Since the phase shift is achieved using the control signals, an in-phase signal combiner 8206 combines the harmonically rich signals 8006 and 8008, to generate the harmonically rich signal 8011.

Figure 83:
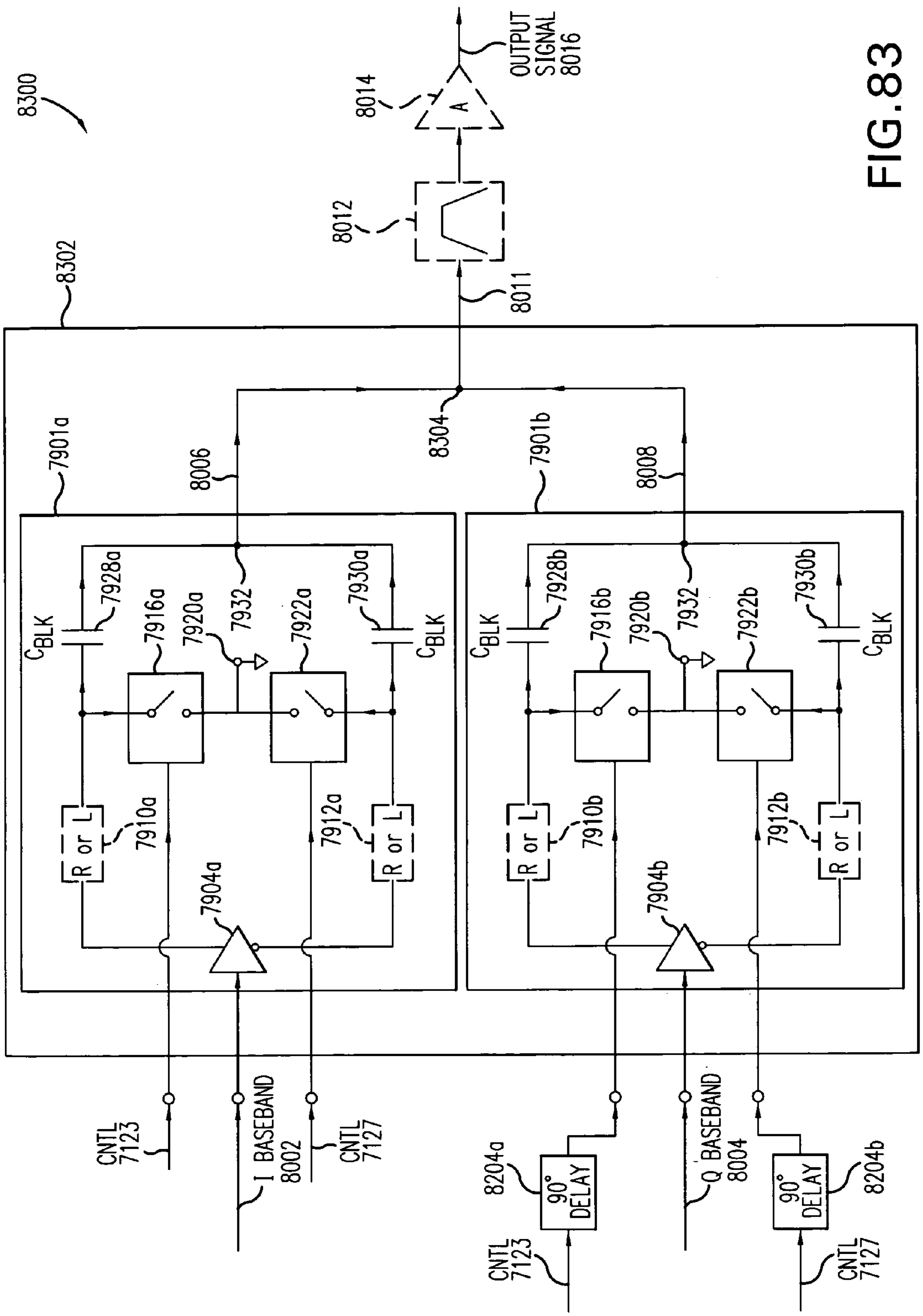
FIG. 83 illustrates a transmitter, according to an embodiment of the present invention.

FIG. 83 illustrates a transmitter 8300 that is similar to transmitter 8200 in FIG. 82. The difference being that the transmitter 8300 has a balanced modulator 8302 that utilizes a summing node 8304 to sum the I harmonically rich signal 8006 and the Q harmonically rich signal 8008 instead of the in-phase signal combiner 8206 that is used in the modulator 8202 of transmitter 8200. The 90 degree phase shift between the I and Q channels is implemented by delaying the Q clock signals using 90 degree delays 8204, as shown.

3.2.3 I/Q Transmitters Configured for Carrier Insertion

Figure 77:
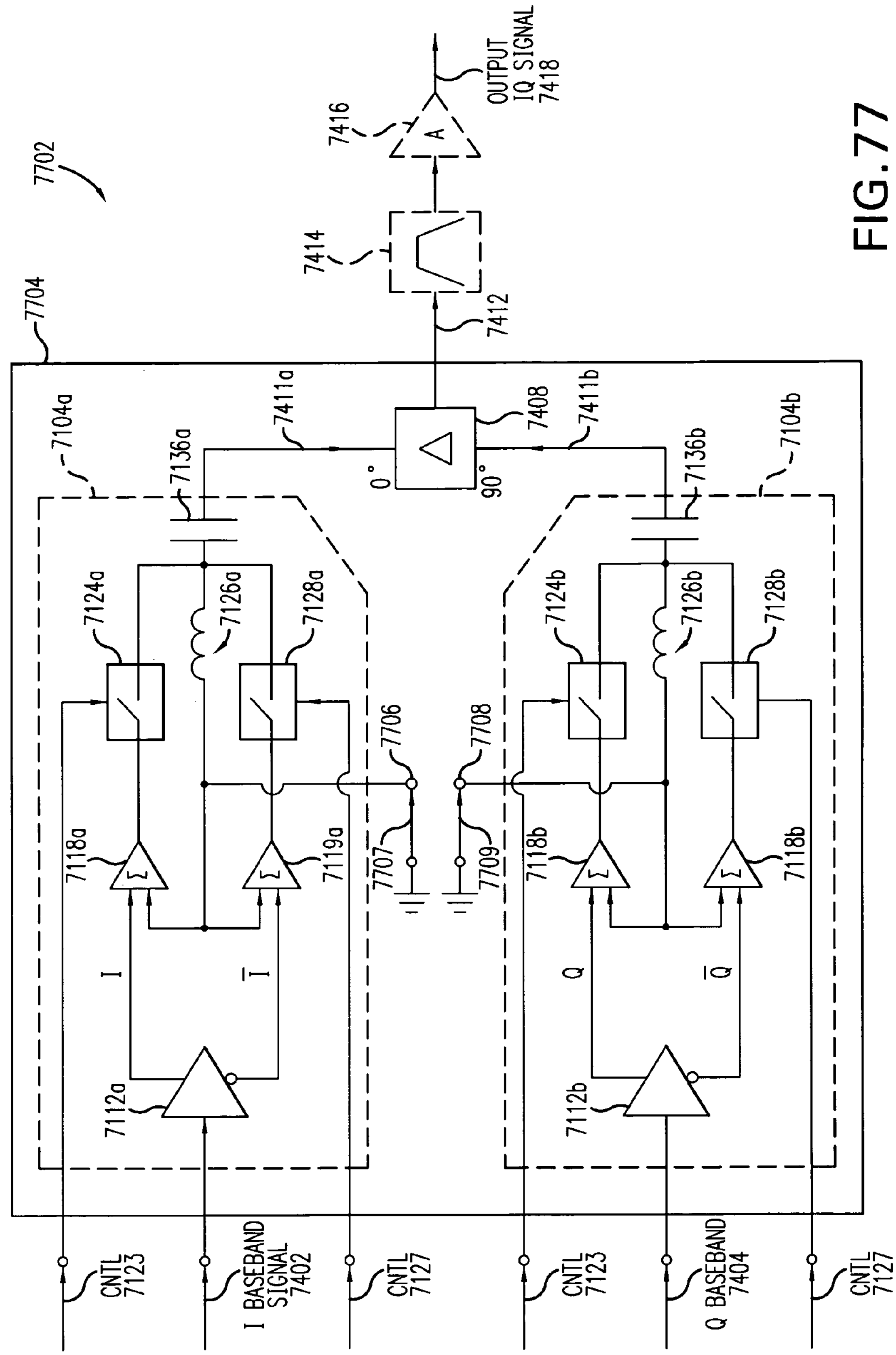
FIG. 77 illustrates a transmitter to provide any necessary carrier insertion by implementing a DC offset between the two sets of sampling UFT modules, according to an embodiment of the present invention.

The transmitters 7420 (FIG. 74) and 7608 (FIG. 76A) have a balanced configuration that substantially eliminates any DC offset and results in minimal carrier insertion in the I/Q output signal 7418. Minimal carrier insertion is generally desired for most applications because the carrier signal carries no information and reduces the overall transmitter efficiency. However, some applications require the received signal to have sufficient carrier energy for the receiver to extract the carrier for coherent demodulation. In support thereof, FIG. 77 illustrates a transmitter 7702 to provide any necessary carrier insertion by implementing a DC offset between the two sets of sampling UFT modules.

Transmitter 7702 is similar to the transmitter 7420 with the exception that a modulator 7704 in transmitter 7702 is configured to accept two DC reference voltages so that the I channel modulator 7104*a* can be biased separately from the Q channel modulator 7104*b*. More specifically, modulator 7704 includes a terminal 7706 to accept a DC voltage reference 7707, and a terminal 7708 to accept a DC voltage reference 7709. Voltage 7707 biases the UFT modules 7124*a* and 7128*a* in the I channel modulator 7104*a*. Likewise, voltage 7709 biases the UFT modules 7124*b* and 7128*b* in the Q channel modulator 7104*b*. When voltage 7707 is different from voltage 7709, then a DC offset will appear between the I channel modulator 7104*a* and the Q channel modulator 7104*b*, which results in carrier insertion in the I/Q harmonically rich signal 7412. The relative amplitude of the carrier frequency energy increases in proportion to the amount of DC offset.

Figure 78:
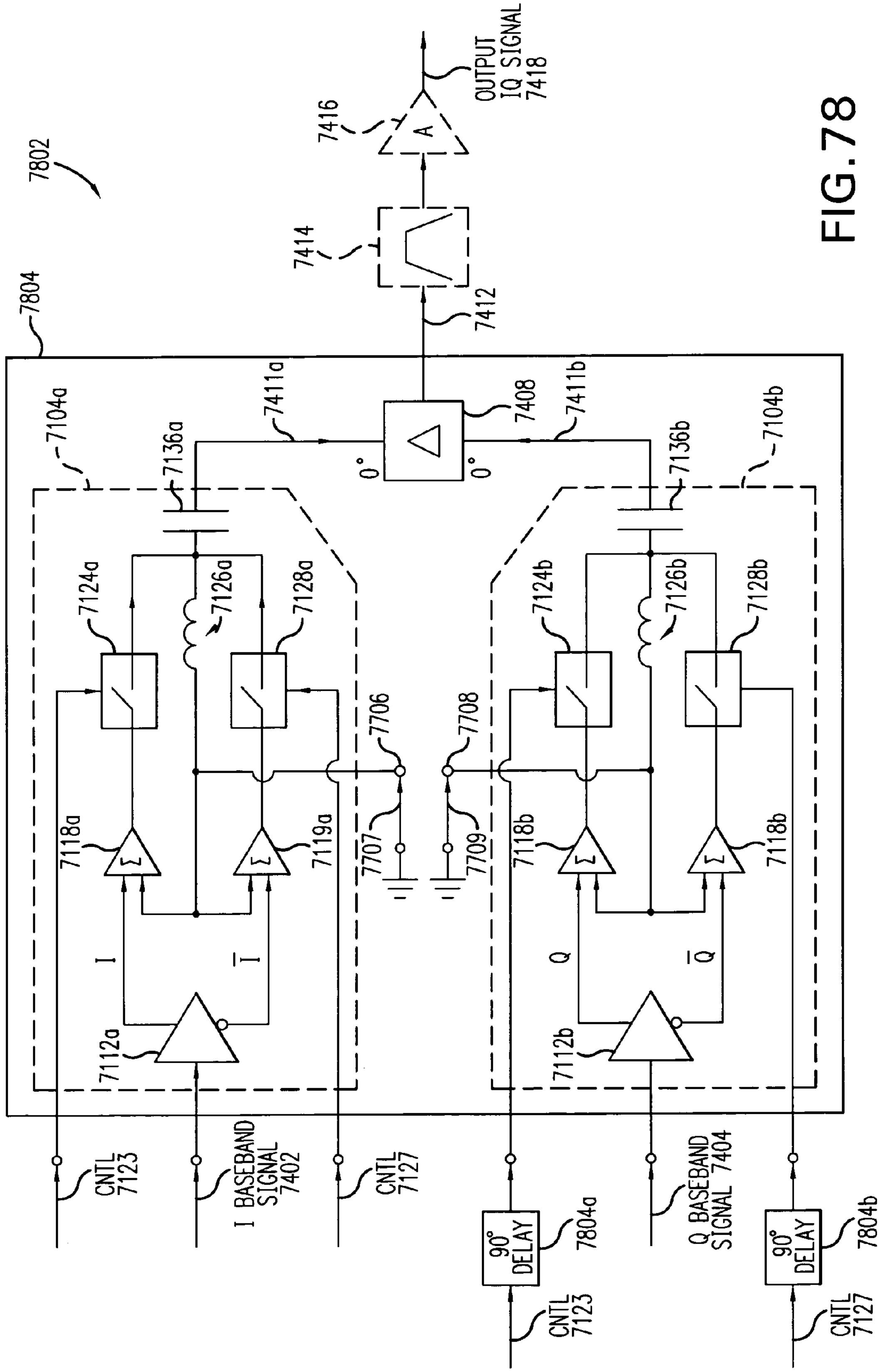
FIG. 78 illustrates a transmitter that is a second embodiment of an I/Q transmitter having two DC terminals to cause DC offset, and therefore carrier insertion, according to an embodiment of the present invention.

FIG. 78 illustrates a transmitter 7802 that is a second embodiment of an I/Q transmitter having two DC terminals to cause DC offset, and therefore carrier insertion. Transmitter 7802 is similar to transmitter 7702 except that the 90 degree phase shift between the I and Q channels is achieved by phase shifting the control signals, similar to that done in transmitter 7608. More specifically, delays 7804*a* and 7804*b* phase shift the control signals 7123 and 7127 for the Q channel modulator 7104*b* relative to those of the I channel modulator 7104*a*. As a result, the Q modulator 7104*b* samples the Q baseband signal 7404 with 90 degree delay relative to the sampling of the I baseband signal 7402 by the I channel modulator 7104*a*. Therefore, the Q harmonically rich signal 7411*b* is phase shifted by 90 degrees relative to the I harmonically rich signal, which is then combined by the in-phase combiner 7806.

4. Enhanced Signal Reception

The present invention is directed to systems and methods of enhanced signal reception (ESR), and applications of same.

Figure 21:
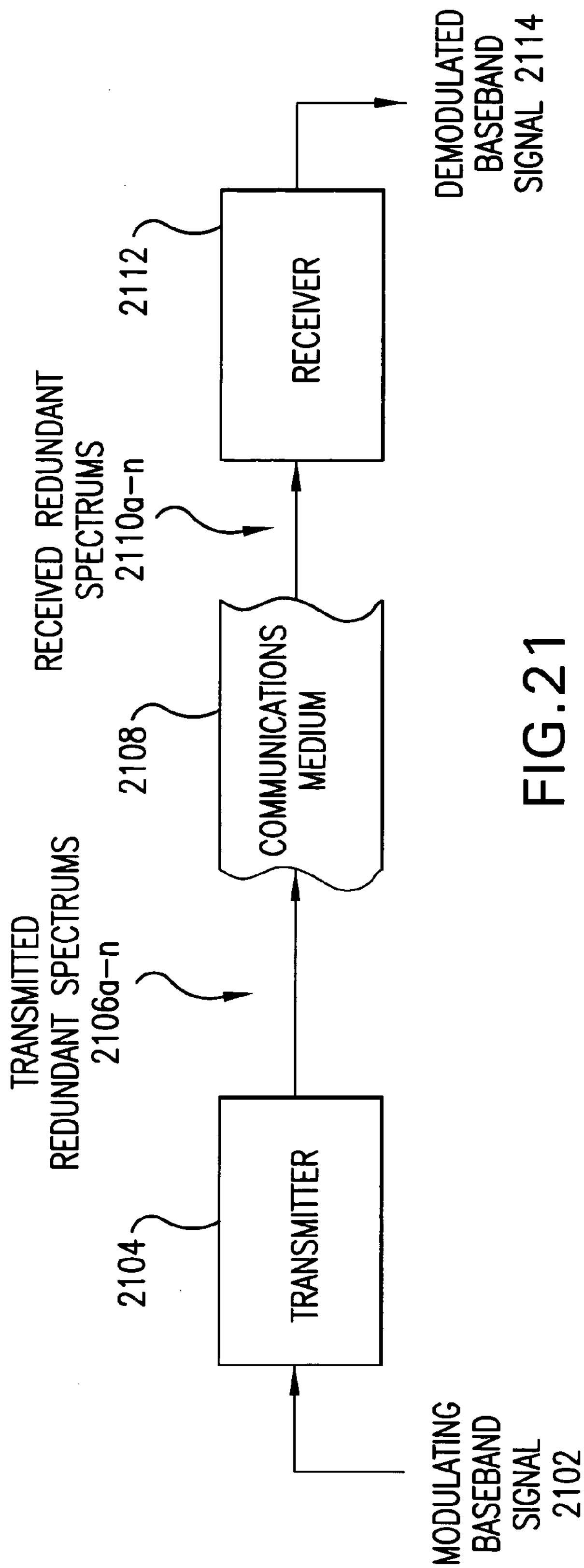
FIG. 21 illustrates an enhanced signal reception system according to an embodiment of the invention.

Referring to FIG. 21, transmitter 2104 accepts a modulating baseband signal 2102 and generates (transmitted) redundant spectrums 2106*a–n*, which are sent over communications medium 2108. Receiver 2112 recovers a demodulated baseband signal 2114 from (received) redundant spectrums 2110*a–n*. Demodulated baseband signal 2114 is representative of the modulating baseband signal 2102, where the level of similarity between the modulating baseband signal 2114 and the modulating baseband signal 2102 is application dependent.

Figures 22A, 22B, 22C, 22D:
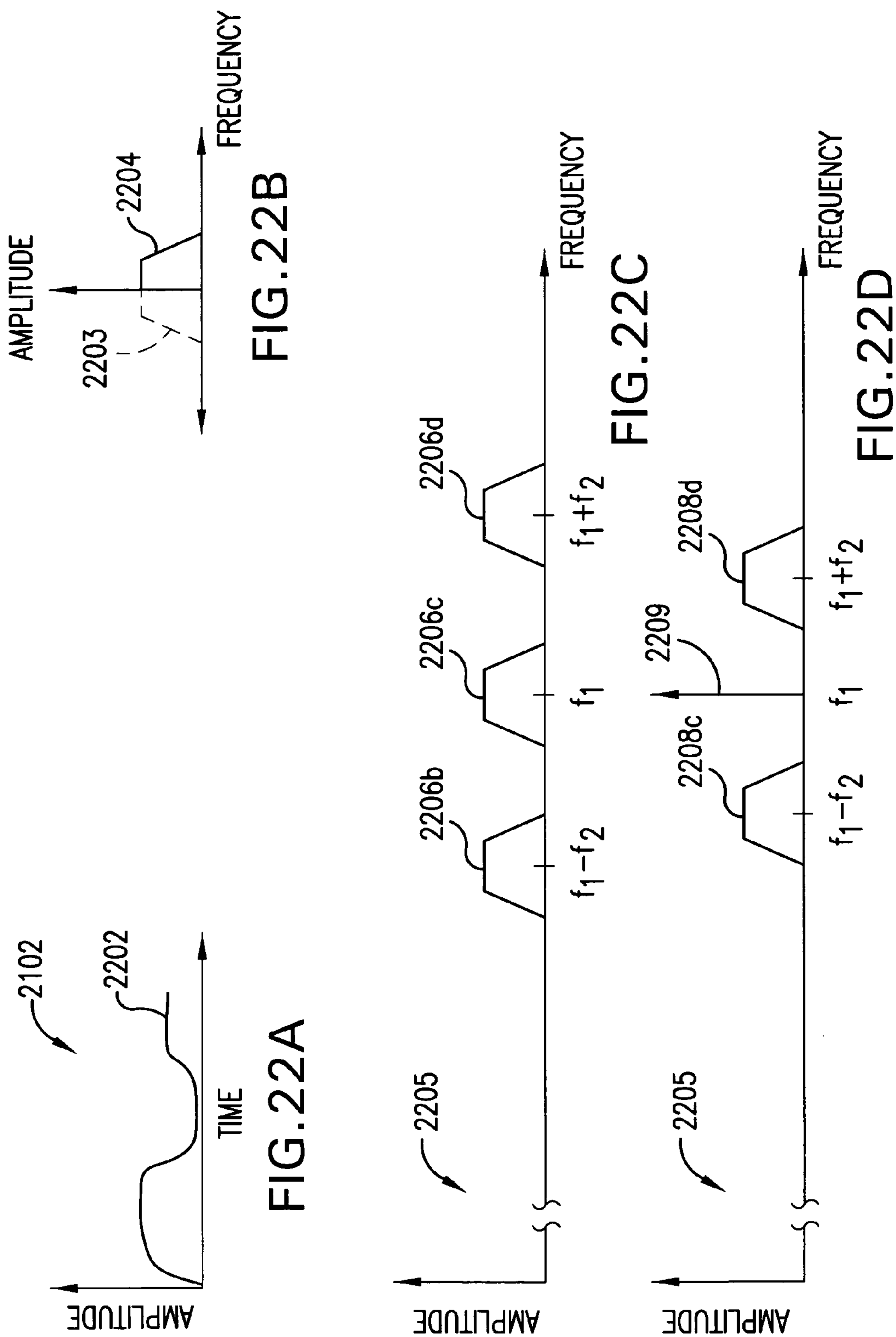
FIGS. 22A–22F are example waveforms used to describe the system of FIG. 21.

Modulating baseband signal 2102 is preferably any information signal desired for transmission and/or reception. An example modulating baseband signal 2202 is illustrated in FIG. 22A, and has an associated modulating baseband spectrum 2204 and image spectrum 2203 that are illustrated in FIG. 22B. Modulating baseband signal 2202 is illustrated as an analog signal in FIG. 22*a*, but could also be a digital signal, or combination thereof. Modulating baseband signal 2202 could be a voltage (or current) characterization of any number of real world occurrences, including for example and without limitation, the voltage (or current) representation for a voice signal.

Each transmitted redundant spectrum 2106*a–n* contains the necessary information to substantially reconstruct the modulating baseband signal 2102. In other words, each redundant spectrum 2106*a–n* contains the necessary amplitude, phase, and frequency information to reconstruct the modulating baseband signal 2102.

FIG. 22C illustrates example transmitted redundant spectrums 2206*b–d*. Transmitted redundant spectrums 2206*b–d* are illustrated to contain three redundant spectrums for illustration purposes only. Any number of redundant spectrums could be generated and transmitted as will be explained in following discussions.

Transmitted redundant spectrums 2206*b–d* are centered at $f_1$, with a frequency spacing $f_2$ between adjacent spectrums. Frequencies $f_1$ and $f_2$ are dynamically adjustable in real-time as will be shown below. FIG. 22D illustrates an alternate embodiment, where redundant spectrums 2208*c,d* are centered on unmodulated oscillating signal 2209 at $f_1$ (Hz). Oscillating signal 2209 may be suppressed if desired using, for example, phasing techniques or filtering techniques. Transmitted redundant spectrums are preferably above baseband frequencies as is represented by break 2205 in the frequency axis of FIGS. 22C and 22D.

Figure 22E:
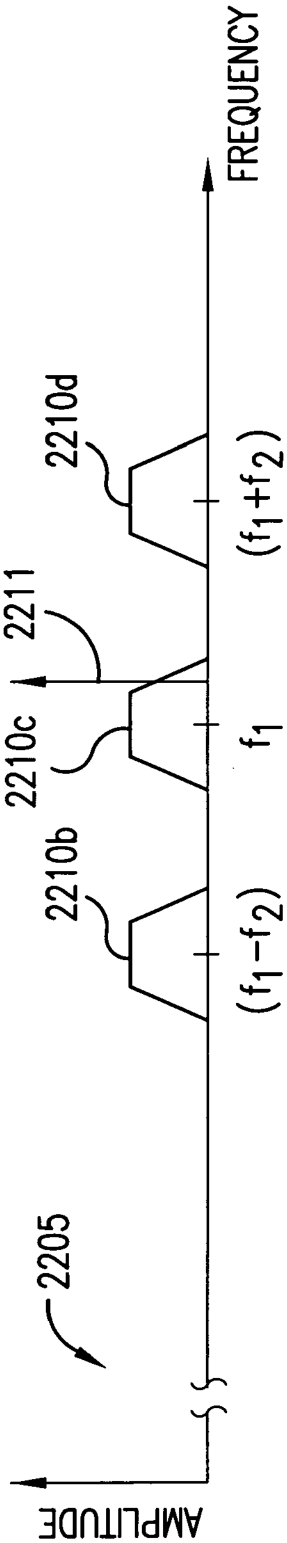

Received redundant spectrums 2110*a–n* are substantially similar to transmitted redundant spectrums 2106*a–n*, except for the changes introduced by the communications medium 2108. Such changes can include but are not limited to signal attenuation, and signal interference. FIG. 22E illustrates example received redundant spectrums 2210*b–d*. Received redundant spectrums 2210*b–d* are substantially similar to transmitted redundant spectrums 2206*b–d*, except that redundant spectrum 2210*c* includes an undesired jamming signal spectrum 2211 in order to illustrate some advantages of the present invention. Jamming signal spectrum 2211 is a frequency spectrum associated with a jamming signal. For purposes of this invention, a "jamming signal" refers to any unwanted signal, regardless of origin, that may interfere with the proper reception and reconstruction of an intended signal. Furthermore, the jamming signal is not limited to tones as depicted by spectrum 2211, and can have any spectral shape, as will be understood by those skilled in the art(s).

Figure 22F:
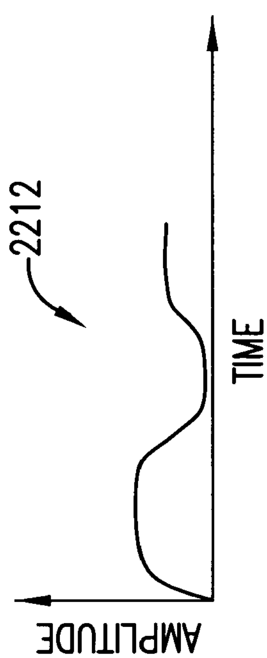

As stated above, demodulated baseband signal 2114 is extracted from one or more of received redundant spectrums 2210*b*–*d*. FIG. 22F illustrates example demodulated baseband signal 2212 that is, in this example, substantially similar to modulating baseband signal 2202 (FIG. 22A); where in practice, the degree of similarity is application dependent.

An advantage of the present invention should now be apparent. The recovery of modulating baseband signal 2202 can be accomplished by receiver 2112 in spite of the fact that high strength jamming signal(s) (e.g. jamming signal spectrum 2211) exist on the communications medium. The intended baseband signal can be recovered because multiple redundant spectrums are transmitted, where each redundant spectrum carries the necessary information to reconstruct the baseband signal. At the destination, the redundant spectrums are isolated from each other so that the baseband signal can be recovered even if one or more of the redundant spectrums are corrupted by a jamming signal.

Figure 23A:
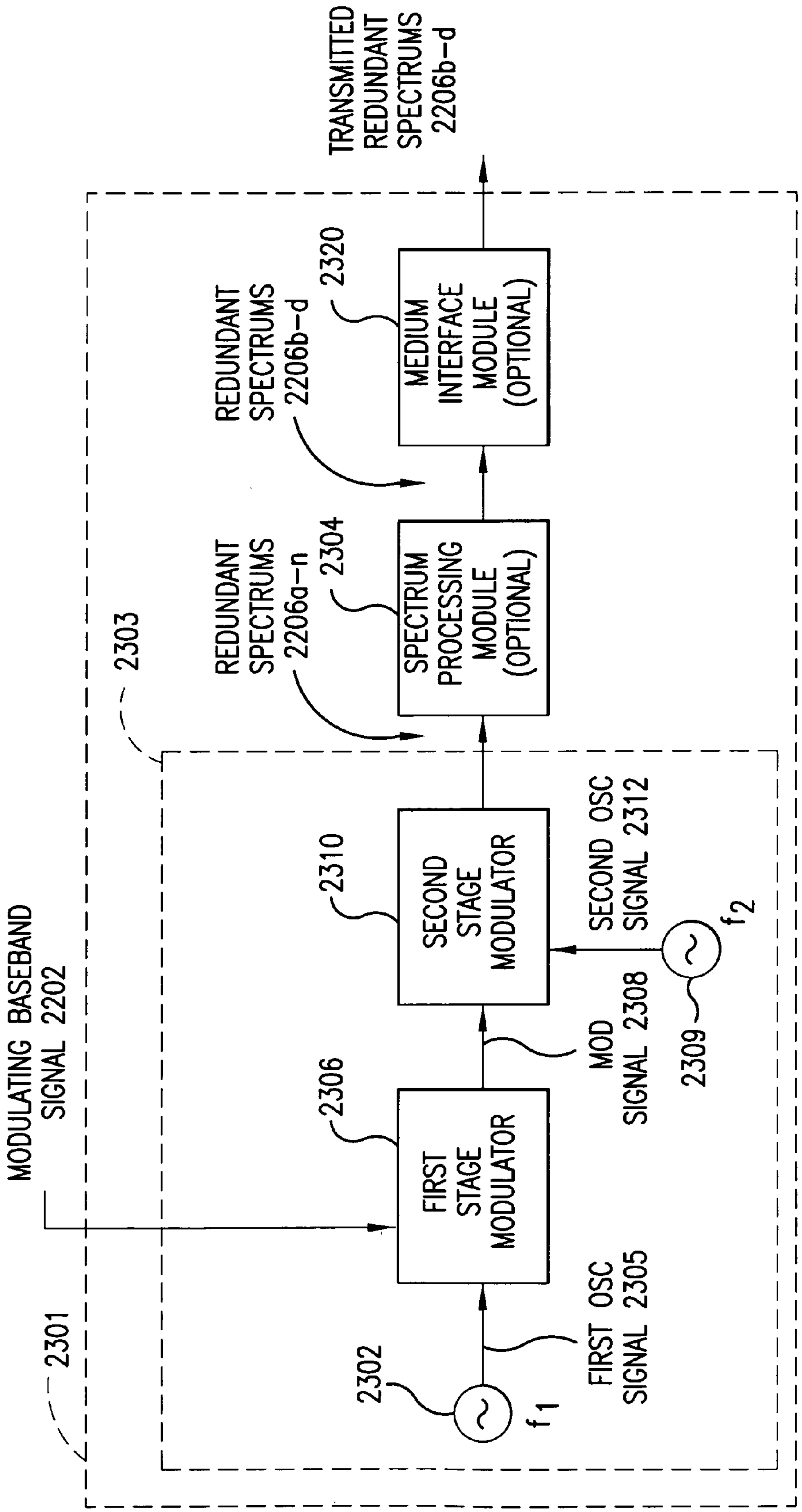
FIG. 23A illustrates an example transmitter in an enhanced signal reception system according to an embodiment of the invention.

Transmitter 2104 will now be explored in greater detail. FIG. 23A illustrates transmitter 2301, which is one embodiment of transmitter 2104 that generates redundant spectrums configured similar to redundant spectrums 2206*b*–*d*. Transmitter 2301 includes generator 2303, optional spectrum processing module 2304, and optional medium interface module 2320. Generator 2303 includes: first oscillator 2302, second oscillator 2309, first stage modulator 2306, and second stage modulator 2310.

Figure 23B:
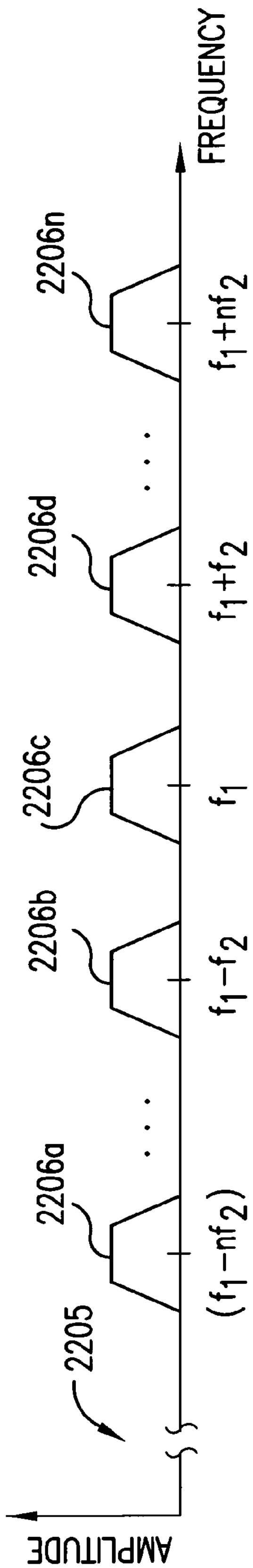
FIGS. 23B and 23C are example waveforms used to further describe the enhanced signal reception system according to an embodiment of the invention.

Transmitter 2301 operates as follows. First oscillator 2302 and second oscillator 2309 generate a first oscillating signal 2305 and second oscillating signal 2312, respectively. First stage modulator 2306 modulates first oscillating signal 2305 with modulating baseband signal 2202, resulting in modulated signal 2308. First stage modulator 2306 may implement any type of modulation including but not limited to: amplitude modulation, frequency modulation, phase modulation, combinations thereof, or any other type of modulation. Second stage modulator 2310 modulates modulated signal 2308 with second oscillating signal 2312, resulting in multiple redundant spectrums 2206*a*–*n* shown in FIG. 23B. Second stage modulator 2310 is preferably a phase modulator, or a frequency modulator, although other types of modulation may be implemented including but not limited to amplitude modulation. Each redundant spectrum 2206*a*–*n* contains the necessary amplitude, phase, and frequency information to substantially reconstruct the modulating baseband signal 2202.

Redundant spectrums 2206*a*–*n* are substantially centered around $f_1$, which is the characteristic frequency of first oscillating signal 2305. Also, each redundant spectrum 2206*a*–*n* (except for 2206*c*) is offset from $f_1$ by approximately a multiple of $f_2$ (Hz), where $f_2$ is the frequency of the second oscillating signal 2312. Thus, each redundant spectrum 2206*a*–*n* is offset from an adjacent redundant spectrum by $f_2$ (Hz). This allows the spacing between adjacent redundant spectrums to be adjusted (or tuned) by changing $f_2$ that is associated with second oscillator 2309. Adjusting the spacing between adjacent redundant spectrums allows for dynamic real-time tuning of the bandwidth occupied by redundant spectrums 2206*a*–*n*.

In one embodiment, the number of redundant spectrums 2206*a*–*n* generated by transmitter 2301 is arbitrary and may be unlimited as indicated by the "a–n" designation for redundant spectrums 2206*a*–*n*. However, a typical communications medium will have a physical and/or administrative limitations (i.e. FCC regulations) that restrict the number of redundant spectrums that can be practically transmitted over the communications medium. Also, there may be other reasons to limit the number of redundant spectrums transmitted. Therefore, preferably, the transmitter 2301 will include an optional spectrum processing module 2304 to process the redundant spectrums 2206*a*–*n* prior to transmission over communications medium 2108.

Figure 23C:
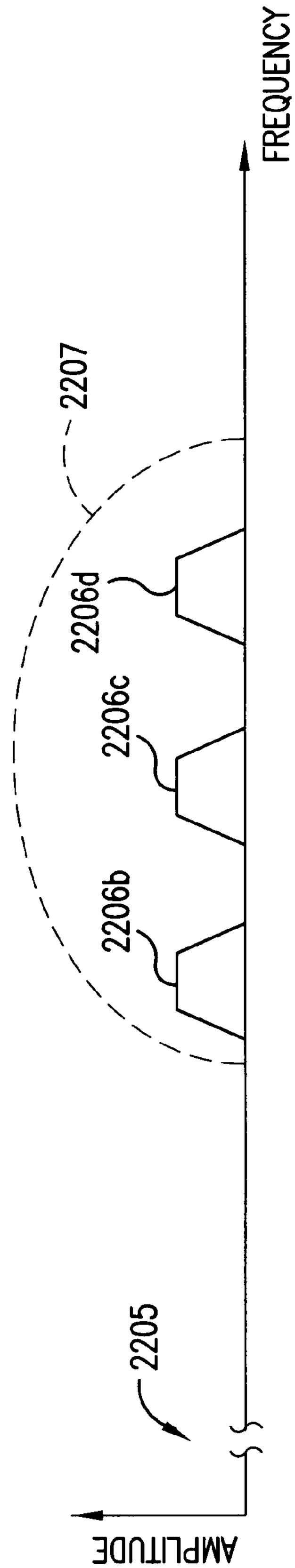

In one embodiment, spectrum processing module 2304 includes a filter with a passband 2207 (FIG. 23C) to select redundant spectrums 2206*b*–*d* for transmission. This will substantially limit the frequency bandwidth occupied by the redundant spectrums to the passband 2207. In one embodiment, spectrum processing module 2304 also up converts redundant spectrums and/or amplifies redundant spectrums prior to transmission over the communications medium 2108. Finally, medium interface module 2320 transmits redundant spectrums over the communications medium 2108. In one embodiment, communications medium 2108 is an over-the-air link and medium interface module 2320 is an antenna. Other embodiments for communications medium 2108 and medium interface module 2320 will be understood based on the teachings contained herein.

Figure 23D:
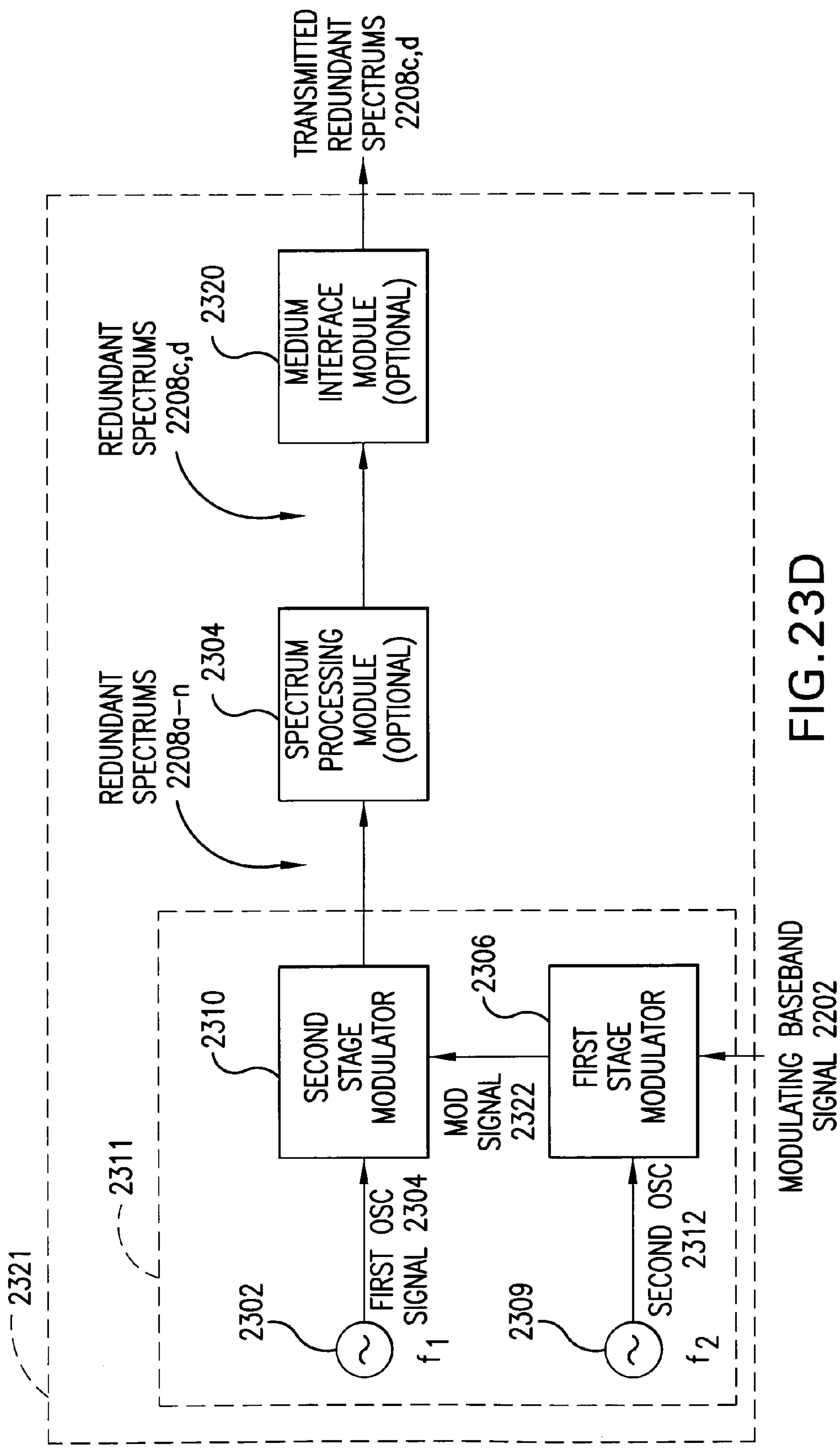
FIG. 23D illustrates another example transmitter in an enhanced signal reception system according to an embodiment of the invention.

FIG. 23D illustrates transmitter 2321, which is one embodiment of transmitter 2104 that generates redundant spectrums configured similar to redundant spectrums 2208*c*–*d* and unmodulated spectrum 2209. Transmitter 2321 includes generator 2311, spectrum processing module 2304, and (optional) medium interface module 2320. Generator 2311 includes: first oscillator 2302, second oscillator 2309, first stage modulator 2306, and second stage modulator 2310.

Figure 23E:
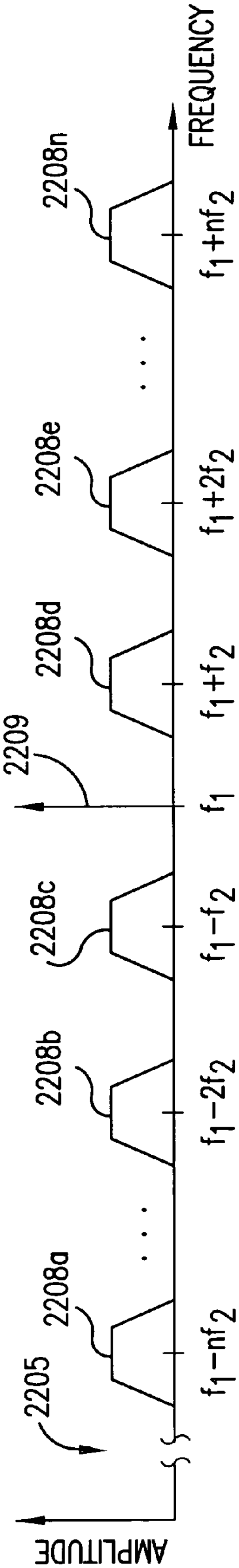
FIGS. 23E and 23F are example waveforms used to further describe the enhanced signal reception system according to an embodiment of the invention.
Figure 23F:
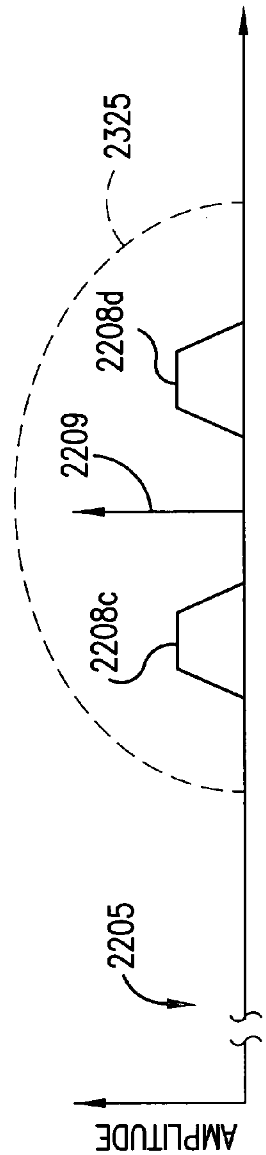

As shown in FIG. 23D, many of the components in transmitter 2321 are similar to those in transmitter 2301. However, in this embodiment, modulating baseband signal 2202 modulates second oscillating signal 2312. Transmitter 2321 operates as follows. First stage modulator 2306 modulates second oscillating signal 2312 with modulating baseband signal 2202, resulting in modulated signal 2322. As described earlier, first stage modulator 2306 can effect any type of modulation including but not limited to: amplitude modulation frequency modulation, combinations thereof, or any other type of modulation. Second stage modulator 2310 modulates first oscillating signal 2304 with modulated signal 2322, resulting in redundant spectrums 2208*a*–*n*, as shown in FIG. 23E. Second stage modulator 2310 is preferably a phase or frequency modulator, although other modulators could used including but not limited to an amplitude modulator.

Redundant spectrums 2208*a*–*n* are centered on unmodulated spectrum 2209 (at f, Hz), and adjacent spectrums are separated by $f_2$ Hz. The number of redundant spectrums 2208*a*–*n* generated by generator 2311 is arbitrary and unlimited, similar to spectrums 2206*a*–*n* discussed above. Therefore, optional spectrum processing module 2304 may also include a filter with passband 2325 to select, for example, spectrums 2208*c,d* for transmission over communications medium 2108. In addition, optional spectrum processing module 2304 may also include a filter (such as a bandstop filter) to attenuate unmodulated spectrum 2209. Alternatively, unmodulated spectrum 2209 may be attenuated by using phasing techniques during redundant spectrum generation. Finally, (optional) medium interface module 2320 transmits redundant spectrums 2208*c,d* over communications medium 2108.

Figure 24A:
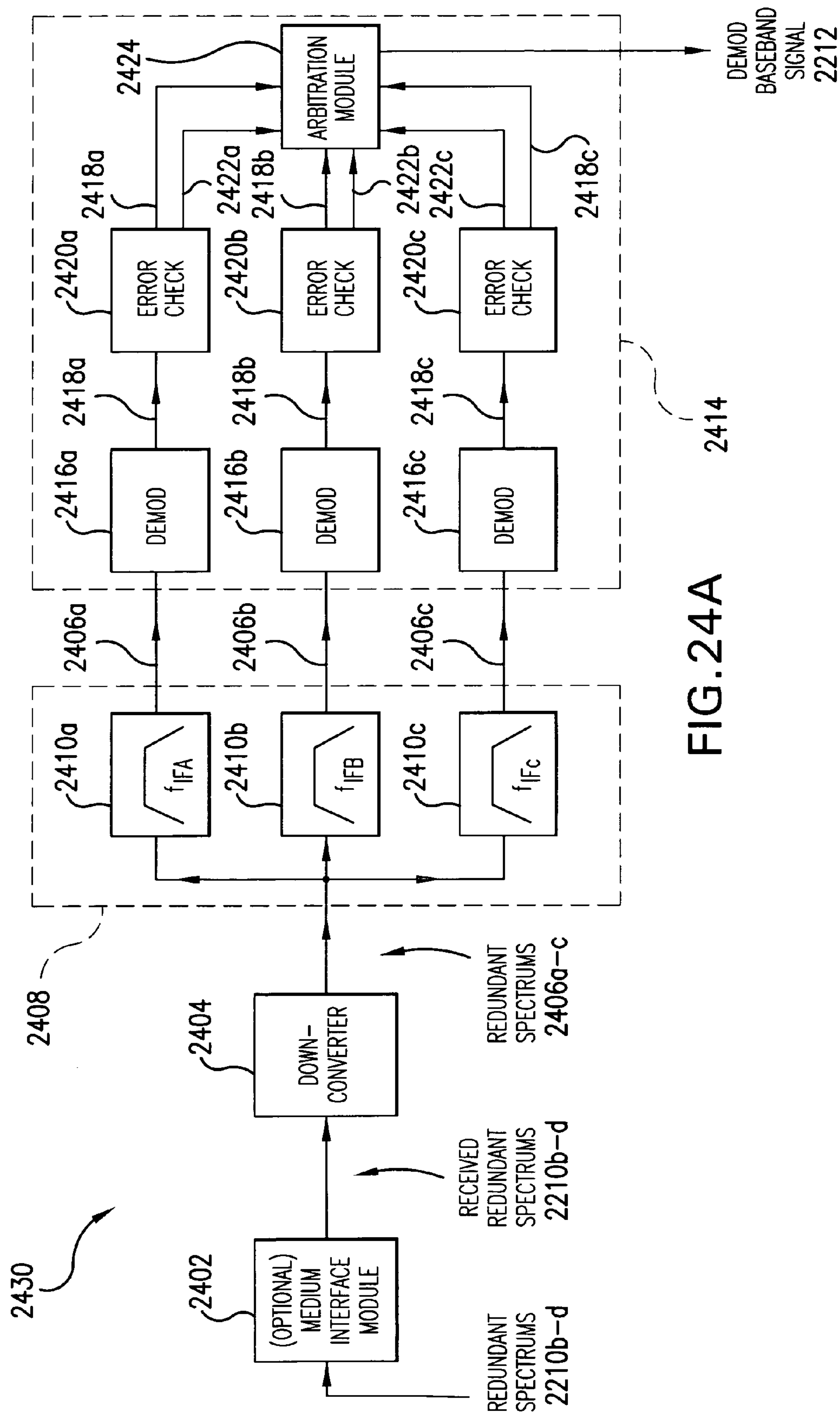
FIG. 24A illustrates an example receiver in an enhanced signal reception system according to an embodiment of the invention.

Receiver 2112 will now be explored in greater detail to illustrate recovery of a demodulated baseband signal from received redundant spectrums. FIG. 24A illustrates receiver 2430, which is one embodiment of receiver 2112. Receiver 2430 includes optional medium interface module 2402, down-converter 2404, spectrum isolation module 2408, and data extraction module 2414. Spectrum isolation module 2408 includes filters 2410*a–c*. Data extraction module 2414 includes demodulators 2416*a–c*, error check modules 2420*a–c*, and arbitration module 2424. Receiver 2430 will be discussed in relation to the signal diagrams in FIGS. 24B–24J.

Figure 24B:
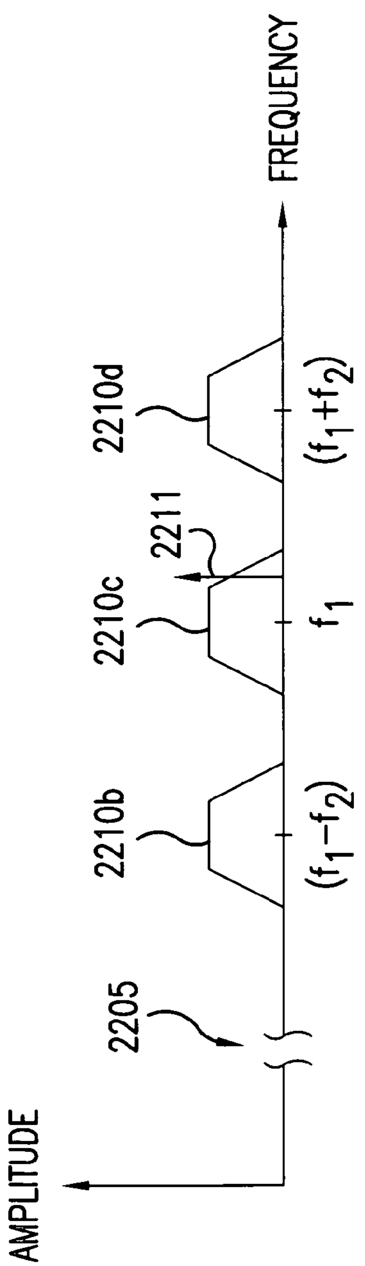
FIGS. 24B–24J are example waveforms used to further describe the enhanced signal reception system according to an embodiment of the invention.
Figure 24C:
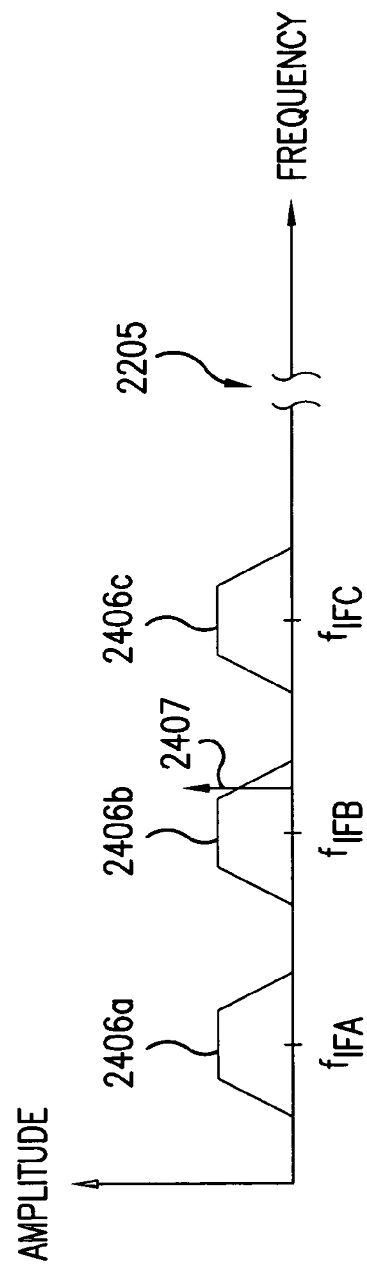
Figure 24D:
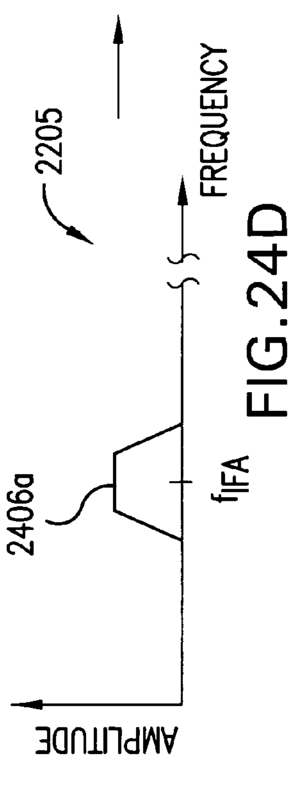
Figure 24E:
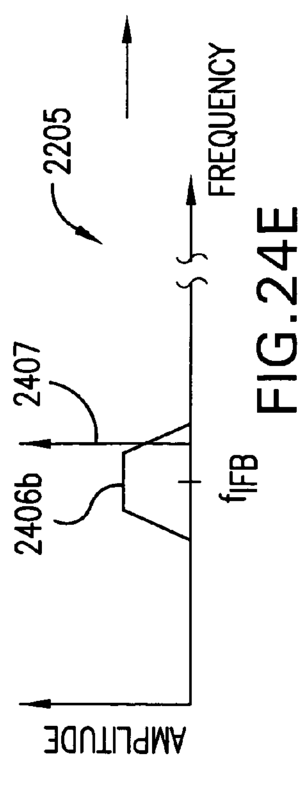
Figure 24F:
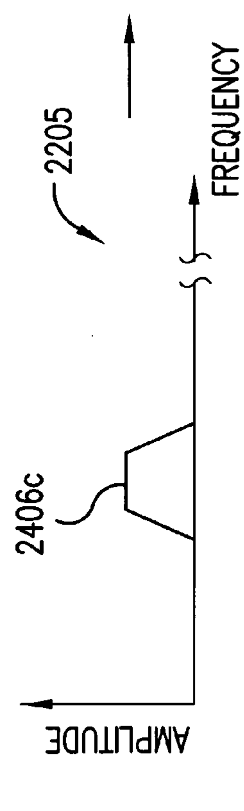
Figure 24G:
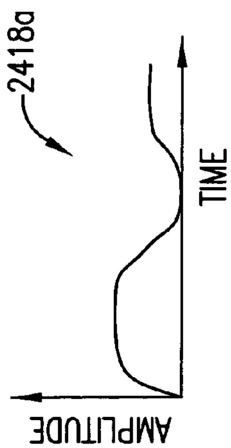

In one embodiment, optional medium interface module 2402 receives redundant spectrums 2210*b–d* (FIG. 22E, and FIG. 24B). Each redundant spectrum 2210*b–d* includes the necessary amplitude, phase, and frequency information to substantially reconstruct the modulating baseband signal used to generated the redundant spectrums. However, in the present example, spectrum 2210*c* also contains jamming signal 2211, which may interfere with the recovery of a baseband signal from spectrum 2210*c*. Down-converter 2404 down-converts received redundant spectrums 2210*b–d* to lower intermediate frequencies, resulting in redundant spectrums 2406*a–c* (FIG. 24C). Jamming signal 2211 is also down-converted to jamming signal 2407, as it is contained within redundant spectrum 2406*b*. Spectrum isolation module 2408 includes filters 2410*a–c* that isolate redundant spectrums 2406*a–c* from each other (FIGS. 24D–24F, respectively). Demodulators 2416*a–c* independently demodulate spectrums 2406*a–c*, resulting in demodulated baseband signals 2418*a–c*, respectively (FIGS. 24G-241). Error check modules 2420*a–c* analyze demodulate baseband signal 2418*a–c* to detect any errors. In one embodiment, each error check module 2420*a–c* sets an error flag 2422*a–c* whenever an error is detected in a demodulated baseband signal. Arbitration module 2424 accepts the demodulated baseband signals and associated error flags, and selects a substantially error-free demodulated baseband signal (FIG. 24J). In one embodiment, the substantially error-free demodulated baseband signal will be substantially similar to the modulating baseband signal used to generate the received redundant spectrums, where the degree of similarity is application dependent.

Figure 24H:
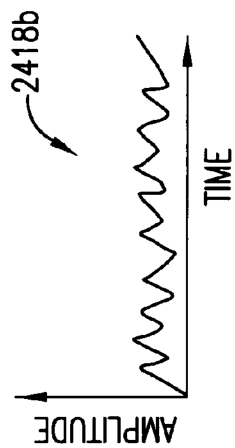
Figure 24I:
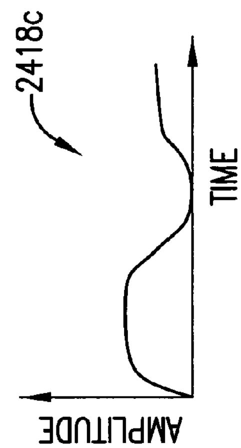
Figure 24J:
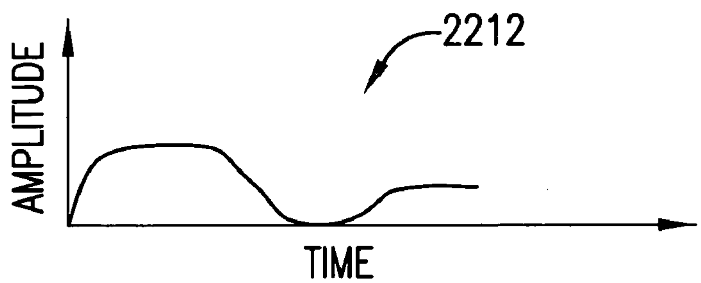

Referring to FIGS. 24G–I, arbitration module 2424 will select either demodulated baseband signal 2418*a* or 2418*c*, because error check module 2420*b* will set the error flag 2422*b* that is associated with demodulated baseband signal 2418*b*.

The error detection schemes implemented by the error detection modules include but are not limited to: cyclic redundancy check (CRC) and parity check for digital signals, and various error detections schemes for analog signal.

Further details of enhanced signal reception as described in this section are presented in U.S. Pat. No. 6,061,555 "Method and System for Ensuring Reception of a Communications Signal," filed Oct. 21, 1998, incorporated herein by reference in its entirety.

5. Unified Down-Conversion and Filtering

The present invention is directed to systems and methods of unified down-conversion and filtering (UDF), and applications of same.

In particular, the present invention includes a unified down-converting and filtering (UDF) module that performs frequency selectivity and frequency translation in a unified (i.e., integrated) manner. By operating in this manner, the invention achieves high frequency selectivity prior to frequency translation (the invention is not limited to this embodiment). The invention achieves high frequency selectivity at substantially any frequency, including but not limited to RF (radio frequency) and greater frequencies. It should be understood that the invention is not limited to this example of RF and greater frequencies. The invention is intended, adapted, and capable of working with lower than radio frequencies.

Figure 17:
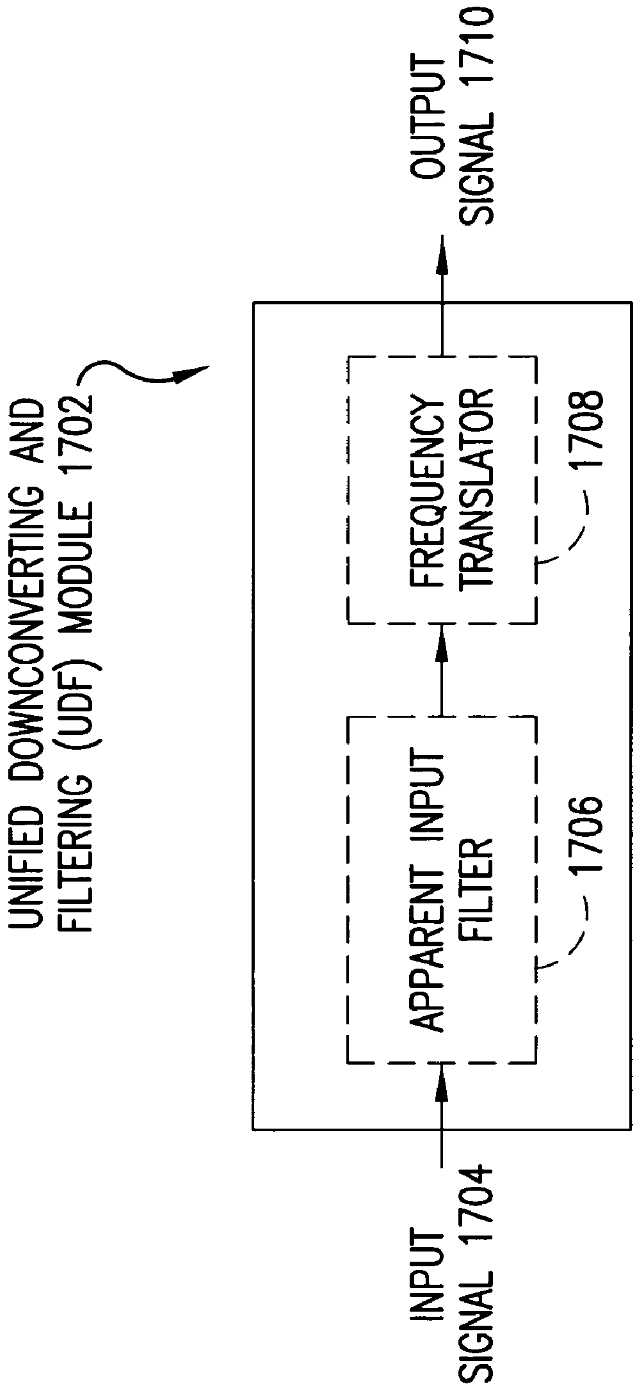
FIG. 17 illustrates a unified down-converting and filtering (UDF) module according to an embodiment of the invention.

FIG. 17 is a conceptual block diagram of a UDF module 1702 according to an embodiment of the present invention. The UDF module 1702 performs at least frequency translation and frequency selectivity.

The effect achieved by the UDF module 1702 is to perform the frequency selectivity operation prior to the performance of the frequency translation operation. Thus, the UDF module 1702 effectively performs input filtering.

According to embodiments of the present invention, such input filtering involves a relatively narrow bandwidth. For example, such input filtering may represent channel select filtering, where the filter bandwidth may be, for example, 50 KHz to 150 KHz. It should be understood, however, that the invention is not limited to these frequencies. The invention is intended, adapted, and capable of achieving filter bandwidths of less than and greater than these values.

In embodiments of the invention, input signals 1704 received by the UDF module 1702 are at radio frequencies. The UDF module 1702 effectively operates to input filter these RF input signals 1704. Specifically, in these embodiments, the UDF module 1702 effectively performs input, channel select filtering of the RF input signal 1704. Accordingly, the invention achieves high selectivity at high frequencies.

The UDF module 1702 effectively performs various types of filtering, including but not limited to bandpass filtering, low pass filtering, high pass filtering, notch filtering, all pass filtering, band stop filtering, etc., and combinations thereof.

Conceptually, the UDF module 1702 includes a frequency translator 1708. The frequency translator 1708 conceptually represents that portion of the UDF module 1702 that performs frequency translation (down conversion).

The UDF module 1702 also conceptually includes an apparent input filter 1706 (also sometimes called an input filtering emulator). Conceptually, the apparent input filter 1706 represents that portion of the UDF module 1702 that performs input filtering.

In practice, the input filtering operation performed by the UDF module 1702 is integrated with the frequency translation operation. The input filtering operation can be viewed as being performed concurrently with the frequency translation operation. This is a reason why the input filter 1706 is herein referred to as an "apparent" input filter 1706.

The UDF module 1702 of the present invention includes a number of advantages. For example, high selectivity at high frequencies is realizable using the UDF module 1702. This feature of the invention is evident by the high Q factors that are attainable. For example, and without limitation, the UDF module 1702 can be designed with a filter center frequency $f_C$ on the order of 900 MHZ, and a filter bandwidth on the order of 50 KHz. This represents a Q of 18,000 (Q is equal to the center frequency divided by the bandwidth).

It should be understood that the invention is not limited to filters with high Q factors. The filters contemplated by the present invention may have lesser or greater $Q_S$, depending on the application, design, and/or implementation. Also, the scope of the invention includes filters where Q factor as discussed herein is not applicable.

The invention exhibits additional advantages. For example, the filtering center frequency $f_C$ of the UDF module 1702 can be electrically adjusted, either statically or dynamically.

Also, the UDF module 1702 can be designed to amplify input signals.

Further, the UDF module 1702 can be implemented without large resistors, capacitors, or inductors. Also, the UDF module 1702 does not require that tight tolerances be maintained on the values of its individual components, i.e., its resistors, capacitors, inductors, etc. As a result, the architecture of the UDF module 1702 is friendly to integrated circuit design techniques and processes.

The features and advantages exhibited by the UDF module 1702 are achieved at least in part by adopting a new technological paradigm with respect to frequency selectivity and translation. Specifically, according to the present invention, the UDF module 1702 performs the frequency selectivity operation and the frequency translation operation as a single, unified (integrated) operation. According to the invention, operations relating to frequency translation also contribute to the performance of frequency selectivity, and vice versa.

According to embodiments of the present invention, the UDF module generates an output signal from an input signal using samples/instances of the input signal and samples/instances of the output signal.

More particularly, first, the input signal is under-sampled. This input sample includes information (such as amplitude, phase, etc.) representative of the input signal existing at the time the sample was taken.

As described further below, the effect of repetitively performing this step is to translate the frequency (that is, down-convert) of the input signal to a desired lower frequency, such as an intermediate frequency (IF) or baseband.

Next, the input sample is held (that is, delayed).

Then, one or more delayed input samples (some of which may have been scaled) are combined with one or more delayed instances of the output signal (some of which may have been scaled) to generate a current instance of the output signal.

Thus, according to a preferred embodiment of the invention, the output signal is generated from prior samples/instances of the input signal and/or the output signal. (It is noted that, in some embodiments of the invention, current samples/instances of the input signal and/or the output signal may be used to generate current instances of the output signal.). By operating in this manner, the UDF module preferably performs input filtering and frequency down-conversion in a unified manner.

Figure 19:
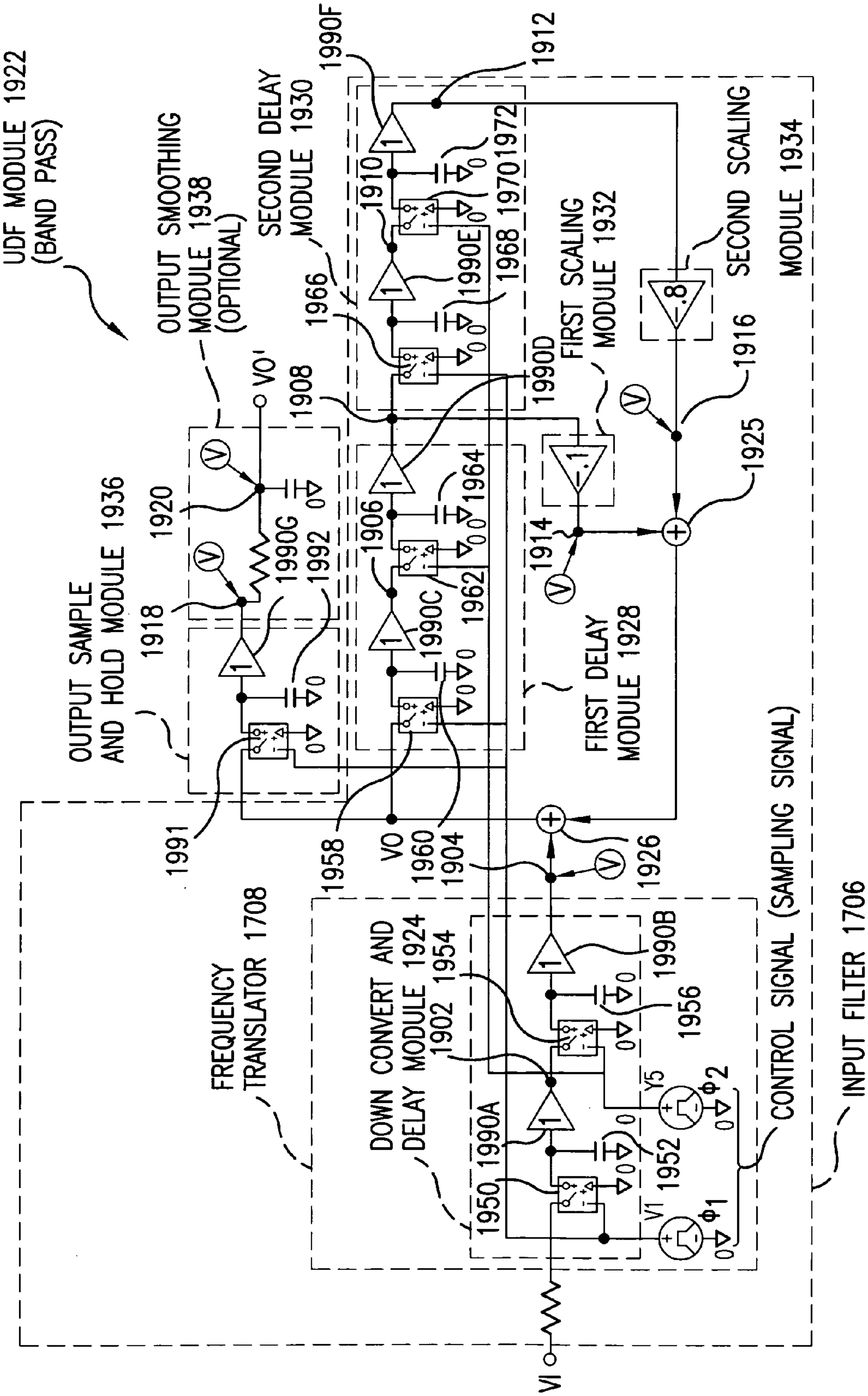
FIG. 19 is a detailed diagram of an example UDF module according to an embodiment of the invention.

FIG. 19 illustrates an example implementation of the unified down-converting and filtering (UDF) module 1922. The UDF module 1922 performs the frequency translation operation and the frequency selectivity operation in an integrated, unified manner as described above, and as further described below.

In the example of FIG. 19, the frequency selectivity operation performed by the UDF module 1922 comprises a band-pass filtering operation according to EQ. 1, below, which is an example representation of a band-pass filtering transfer function.

$$VO=\alpha_1 z^{-1} VI-\beta_1 z^{-1} VO-\beta_0 z^{-2} VO \qquad \text{EQ. 1}$$

It should be noted, however, that the invention is not limited to band-pass filtering. Instead, the invention effectively performs various types of filtering, including but not limited to bandpass filtering, low pass filtering, high pass filtering, notch filtering, all pass filtering, band stop filtering, etc., and combinations thereof. As will be appreciated, there are many representations of any given filter type. The invention is applicable to these filter representations. Thus, EQ. 1 is referred to herein for illustrative purposes only, and is not limiting.

The UDF module 1922 includes a down-convert and delay module 1924, first and second delay modules 1928 and 1930, first and second scaling modules 1932 and 1934, an output sample and hold module 1936, and an (optional) output smoothing module 1938. Other embodiments of the UDF module will have these components in different configurations, and/or a subset of these components, and/or additional components. For example, and without limitation, in the configuration shown in FIG. 19, the output smoothing module 1938 is optional.

As further described below, in the example of FIG. 19, the down-convert and delay module 1924 and the first and second delay modules 1928 and 1930 include switches that are controlled by a clock having two phases, $\phi_1$ and $\phi_2$. $\phi_1$ and $\phi_2$ preferably have the same frequency, and are non-overlapping (alternatively, a plurality such as two clock signals having these characteristics could be used). As used herein, the term "non-overlapping" is defined as two or more signals where only one of the signals is active at any given time. In some embodiments, signals are "active" when they are high. In other embodiments, signals are active when they are low.

Preferably, each of these switches closes on a rising edge of $\phi_1$ or $\phi_2$, and opens on the next corresponding falling edge of $\phi_1$ or $\phi_2$. However, the invention is not limited to this example. As will be apparent to persons skilled in the relevant art(s), other clock conventions can be used to control the switches.

In the example of FIG. 19, it is assumed that $\alpha_1$ is equal to one. Thus, the output of the down-convert and delay module 1924 is not scaled. As evident from the embodiments described above, however, the invention is not limited to this example.

The example UDF module 1922 has a filter center frequency of 900.2 MHZ and a filter bandwidth of 570 KHz. The pass band of the UDF module 1922 is on the order of 899.915 MHZ to 900.485 MHZ. The Q factor of the UDF module 1922 is approximately 1879 (i.e., 900.2 MHZ divided by 570 KHz).

The operation of the UDF module 1922 shall now be described with reference to a Table 1802 (FIG. 18) that indicates example values at nodes in the UDF module 1922 at a number of consecutive time increments. It is assumed in Table 1802 that the UDF module 1922 begins operating at time t−1. As indicated below, the UDF module 1922 reaches steady state a few time units after operation begins. The number of time units necessary for a given UDF module to reach steady state depends on the configuration of the UDF module, and will be apparent to persons skilled in the relevant art(s) based on the teachings contained herein.

At the rising edge of $\phi_1$ at time t−1, a switch 1950 in the down-convert and delay module 1924 closes. This allows a capacitor 1952 to charge to the current value of an input signal, $VI_{t-1}$, such that node 1902 is at $VI_{t-1}$. This is indicated by cell 1804 in FIG. 18. In effect, the combination of the switch 1950 and the capacitor 1952 in the down-convert and delay module 1924 operates to translate the frequency of the input signal VI to a desired lower frequency, such as IF or baseband. Thus, the value stored in the capacitor 1952 represents an instance of a down-converted image of the input signal VI.

The manner in which the down-convert and delay module 1924 performs frequency down-conversion is further described elsewhere in this application, and is additionally described in U.S. Pat. No. 6,061,551 entitled "Method and System for Down-Converting Electromagnetic Signals," filed Oct. 21, 1998, which is herein incorporated by reference in its entirety.

Also at the rising edge of $\phi_1$ at time t−1, a switch 1958 in the first delay module 1928 closes, allowing a capacitor 1960 to charge to $VO_{t-1}$, such that node 1906 is at $VO_{t-1}$. This is indicated by cell 1806 in Table 1802. (In practice, $VO_{t-1}$, is undefined at this point. However, for ease of understanding, $VO_{t-1}$ shall continue to be used for purposes of explanation.)

Also at the rising edge of $\phi_1$ at time t−1, a switch 1966 in the second delay module 1930 closes, allowing a capacitor 1968 to charge to a value stored in a capacitor 1964. At this time, however, the value in capacitor 1964 is undefined, so the value in capacitor 1968 is undefined. This is indicated by cell 1807 in table 1802.

At the rising edge of $\phi_2$ at time t−1, a switch 1954 in the down-convert and delay module 1924 closes, allowing a capacitor 1956 to charge to the level of the capacitor 1952. Accordingly, the capacitor 1956 charges to $VI_{t-1}$, such that node 1904 is at $VI_{t-1}$. This is indicated by cell 1810 in Table 1802.

The UDF module 1922 may optionally include a unity gain module 1990A between capacitors 1952 and 1956. The unity gain module 1990A operates as a current source to enable capacitor 1956 to charge without draining the charge from capacitor 1952. For a similar reason, the UDF module 1922 may include other unity gain modules 1990B–1990G. It should be understood that, for many embodiments and applications of the invention, these unity gain modules 1990A–1990G are optional. The structure and operation of the unity gain modules 1990 will be apparent to persons skilled in the relevant art(s).

Also at the rising edge of $\phi_2$ at time t−1, a switch 1962 in the first delay module 1928 closes, allowing a capacitor 1964 to charge to the level of the capacitor 1960. Accordingly, the capacitor 1964 charges to $VO_{t-1}$, such that node 1908 is at $VO_{t-1}$. This is indicated by cell 1814 in Table 1802.

Also at the rising edge of $\phi_2$ at time t−1, a switch 1970 in the second delay module 1930 closes, allowing a capacitor 1972 to charge to a value stored in a capacitor 1968. At this time, however, the value in capacitor 1968 is undefined, so the value in capacitor 1972 is undefined. This is indicated by cell 1815 in table 1802.

At time t, at the rising edge of $\phi_1$, the switch 1950 in the down-convert and delay module 1924 closes. This allows the capacitor 1952 to charge to $VI_t$, such that node 1902 is at $VI_t$. This is indicated in cell 1816 of Table 1802.

Also at the rising edge of $\phi_1$ at time t, the switch 1958 in the first delay module 1928 closes, thereby allowing the capacitor 1960 to charge to $VO_t$. Accordingly, node 1906 is at $VO_t$. This is indicated in cell 1820 in Table 1802.

Further at the rising edge of $\phi_1$ at time t, the switch 1966 in the second delay module 1930 closes, allowing a capacitor 1968 to charge to the level of the capacitor 1964. Therefore, the capacitor 1968 charges to $VO_{t-1}$, such that node 1910 is at $VO_{t-1}$. This is indicated by cell 1824 in Table 1802.

At the rising edge of $\phi_2$ at time t, the switch 1954 in the down-convert and delay module 1924 closes, allowing the capacitor 1956 to charge to the level of the capacitor 1952. Accordingly, the capacitor 1956 charges to $VI_t$, such that node 1904 is at $VI_t$. This is indicated by cell 1828 in Table 1802.

Also at the rising edge of $\phi_2$ at time t, the switch 1962 in the first delay module 1928 closes, allowing the capacitor 1964 to charge to the level in the capacitor 1960. Therefore, the capacitor 1964 charges to $VO_t$, such that node 1908 is at $VO_t$. This is indicated by cell 1832 in Table 1802.

Further at the rising edge of $\phi_2$ at time t, the switch 1970 in the second delay module 1930 closes, allowing the capacitor 1972 in the second delay module 1930 to charge to the level of the capacitor 1968 in the second delay module 1930. Therefore, the capacitor 1972 charges to $VO_{t-1}$, such that node 1912 is at $VO_{t-1}$. This is indicated in cell 1836 of FIG. 18.

At time t+1, at the rising edge of $\phi_1$, the switch 1950 in the down-convert and delay module 1924 closes, allowing the capacitor 1952 to charge to $VI_{t+1}$. Therefore, node 1902 is at $VI_{t+1}$, as indicated by cell 1838 of Table 1802.

Also at the rising edge of $\phi_1$ at time t+1, the switch 1958 in the first delay module 1928 closes, allowing the capacitor 1960 to charge to $VO_{t+1}$. Accordingly, node 1906 is at $VO_{t+1}$, as indicated by cell 1842 in Table 1802.

Further at the rising edge of $\phi_1$ at time t+1, the switch 1966 in the second delay module 1930 closes, allowing the capacitor 1968 to charge to the level of the capacitor 1964. Accordingly, the capacitor 1968 charges to $VO_t$, as indicated by cell 1846 of Table 1802.

In the example of FIG. 19, the first scaling module 1932 scales the value at node 1908 (i.e., the output of the first delay module 1928) by a scaling factor of −0.1. Accordingly, the value present at node 1914 at time t+1 is $-0.1*VO_t$. Similarly, the second scaling module 1934 scales the value present at node 1912 (i.e., the output of the second scaling module 1930) by a scaling factor of −0.8. Accordingly, the value present at node 1916 is $-0.8*VO_{t-1}$ at time t+1.

At time t+1, the values at the inputs of the summer 1926 are: $VI_t$ at node 1904, $-0.1*VO_t$ at node 1914, and $-0.8*VO_{t-1}$ at node 1916 (in the example of FIG. 19, the values at nodes 1914 and 1916 are summed by a second summer 1925, and this sum is presented to the summer 1926). Accordingly, at time t+1, the summer generates a signal equal to $VI_t-0.1*VO_t-0.8*VO_{t-1}$.

At the rising edge of $\phi_1$ at time t+1, a switch 1991 in the output sample and hold module 1936 closes, thereby allowing a capacitor 1992 to charge to $VO_{t+1}$. Accordingly, the capacitor 1992 charges to $VO_{t+1}$, which is equal to the sum generated by the adder 1926. As just noted, this value is equal to: $VI_t-0.1*VO_t-0.8*VO_{t-1}$. This is indicated in cell 1850 of Table 1802. This value is presented to the optional output smoothing module 1938, which smooths the signal to thereby generate the instance of the output signal $VO_{t+1}$. It is apparent from inspection that this value of $VO_{t+1}$ is consistent with the band pass filter transfer function of EQ. 1.

Further details of unified down-conversion and filtering as described in this section are presented in U.S. Pat. No. 6,049,706 "Integrated Frequency Translation And Selectivity," filed Oct. 21, 1998, incorporated herein by reference in its entirety.

6. Example Application Embodiments of the Invention

As noted above, the UFT module of the present invention is a very powerful and flexible device. Its flexibility is illustrated, in part, by the wide range of applications in which it can be used. Its power is illustrated, in part, by the usefulness and performance of such applications.

Example applications of the UFT module were described above. In particular, frequency down-conversion, frequency up-conversion, enhanced signal reception, and unified down-conversion and filtering applications of the UFT module were summarized above, and are further described below. These applications of the UFT module are discussed herein for illustrative purposes. The invention is not limited to these example applications. Additional applications of the UFT module will be apparent to persons skilled in the relevant art(s), based on the teachings contained herein.

Figure 7:
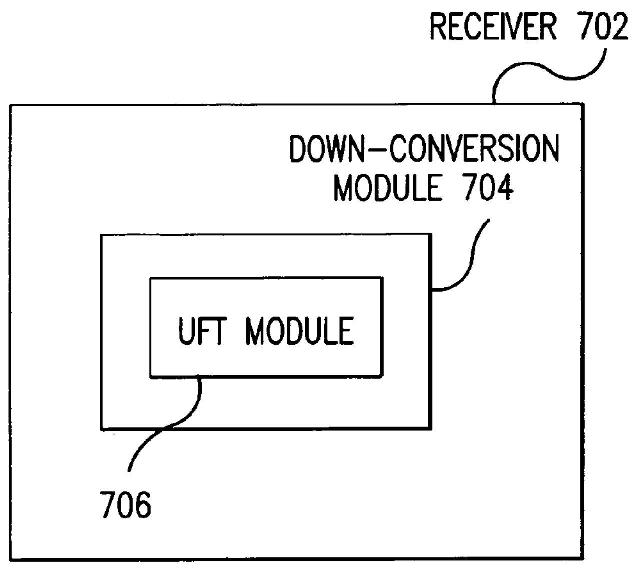
FIG. 7 illustrates a UFT module used in a receiver according to an embodiment of the invention.

For example, the present invention can be used in applications that involve frequency down-conversion. This is shown in FIG. 1C, for example, where an example UFT module 115 is used in a down-conversion module 114. In this capacity, the UFT module 115 frequency down-converts an input signal to an output signal. This is also shown in FIG. 7, for example, where an example UFT module 706 is part of a down-conversion module 704, which is part of a receiver 702.

Figure 8:
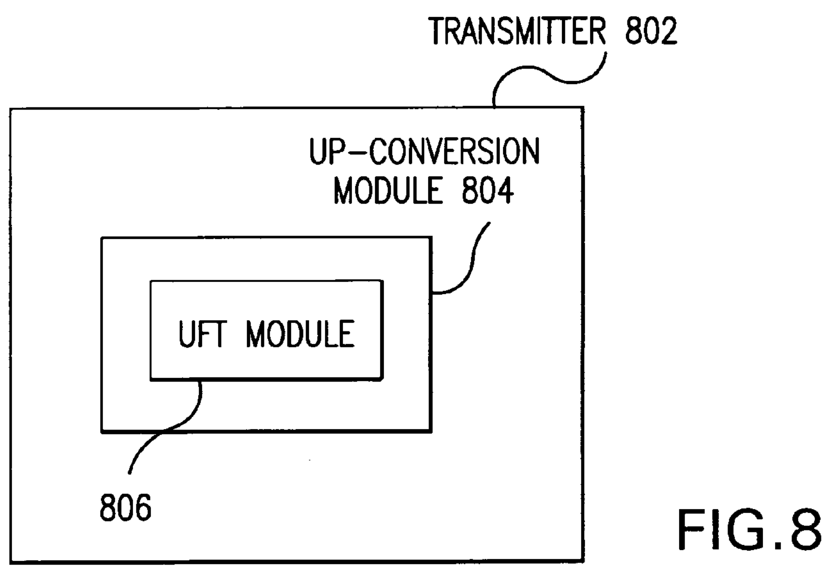
FIG. 8 illustrates a UFT module used in a transmitter according to an embodiment of the invention.

The present invention can be used in applications that involve frequency up-conversion. This is shown in FIG. 1D, for example, where an example UFT module 117 is used in a frequency up-conversion module 116. In this capacity, the UFT module 117 frequency up-converts an input signal to an output signal. This is also shown in FIG. 8, for example, where an example UFT module 806 is part of up-conversion module 804, which is part of a transmitter 802.

Figure 9:
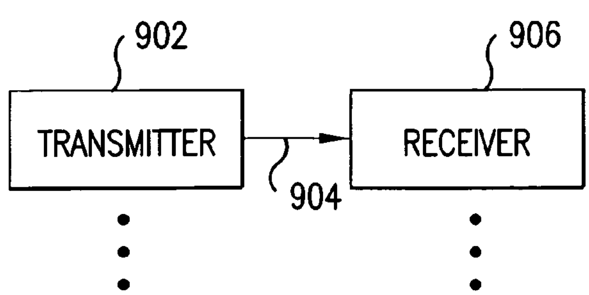
FIG. 9 illustrates an environment comprising a transmitter and a receiver, each of which may be implemented using a UFT module of the invention.

The present invention can be used in environments having one or more transmitters 902 and one or more receivers 906, as illustrated in FIG. 9. In such environments, one or more of the transmitters 902 may be implemented using a UFT module, as shown for example in FIG. 8. Also, one or more of the receivers 906 may be implemented using a UFT module, as shown for example in FIG. 7.

Figure 10:
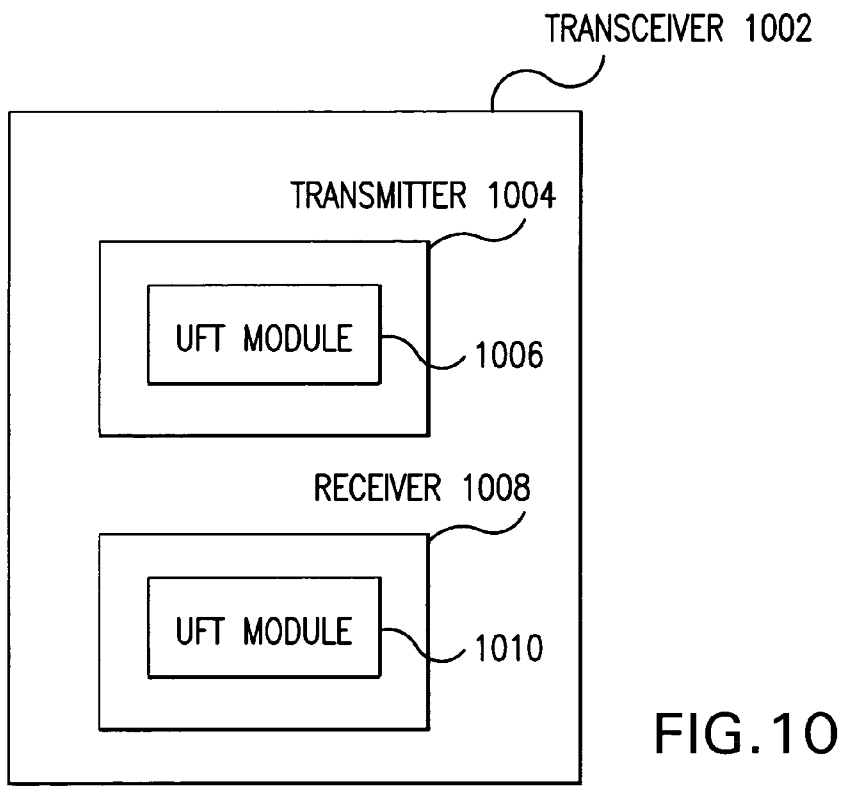
FIG. 10 illustrates a transceiver according to an embodiment of the invention.

The invention can be used to implement a transceiver. An example transceiver 1002 is illustrated in FIG. 10. The transceiver 1002 includes a transmitter 1004 and a receiver 1008. Either the transmitter 1004 or the receiver 1008 can be implemented using a UFT module. Alternatively, the transmitter 1004 can be implemented using a UFT module 1006, and the receiver 1008 can be implemented using a UFT module 1010. This embodiment is shown in FIG. 10.

Figure 11:
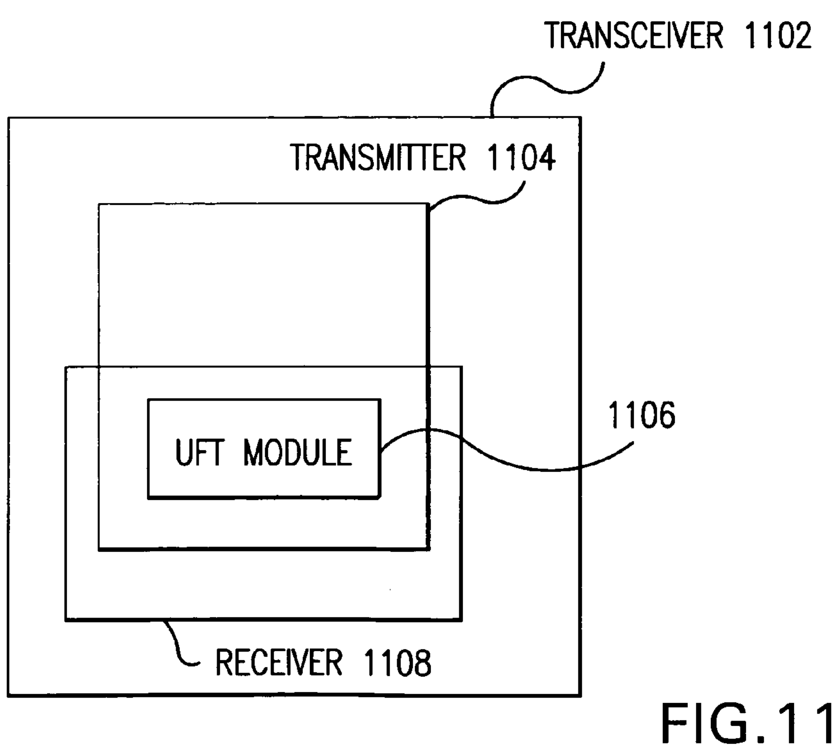
FIG. 11 illustrates a transceiver according to an alternative embodiment of the invention.

Another transceiver embodiment according to the invention is shown in FIG. 11. In this transceiver 1102, the transmitter 1104 and the receiver 1108 are implemented using a single UFT module 1106. In other words, the transmitter 1104 and the receiver 1108 share a UFT module 1106.

Figure 12:
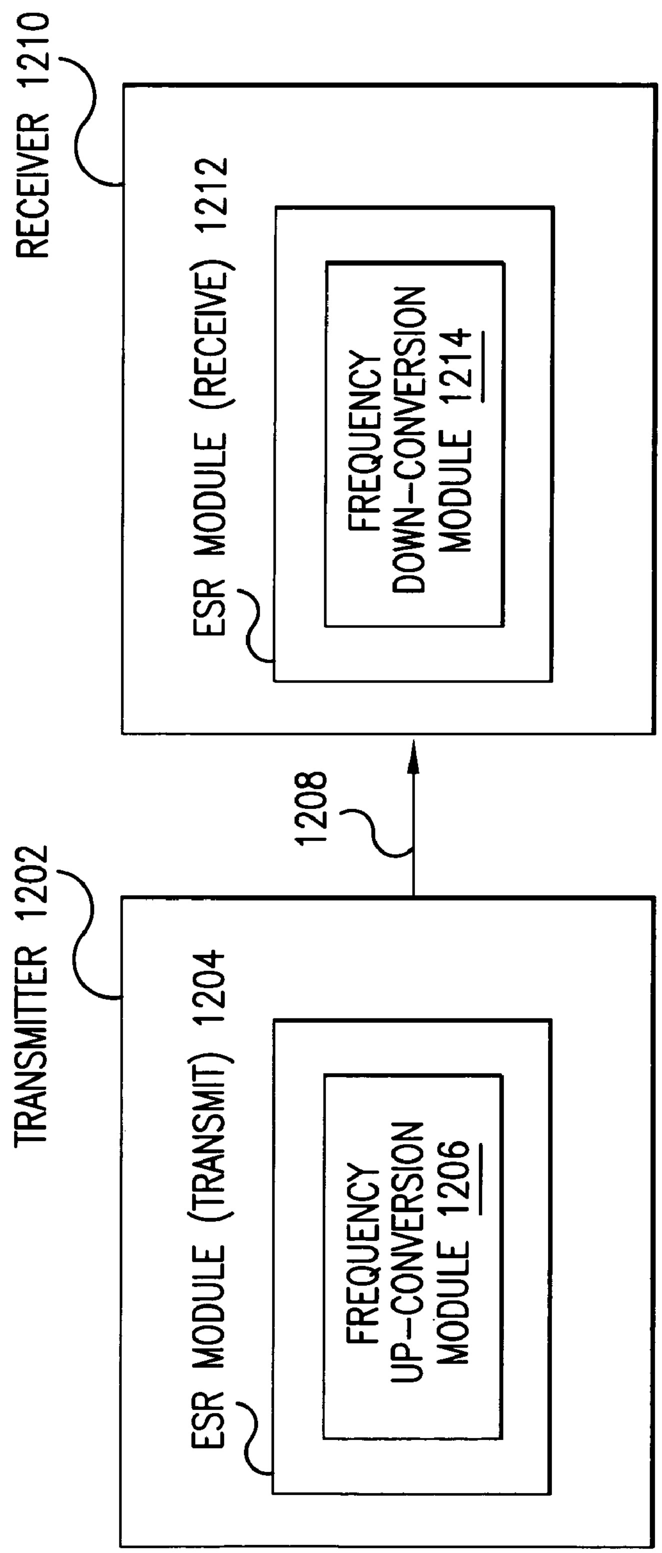
FIG. 12 illustrates an environment comprising a transmitter and a receiver, each of which may be implemented using enhanced signal reception (ESR) components of the invention.

As described elsewhere in this application, the invention is directed to methods and systems for enhanced signal reception (ESR). Various ESR embodiments include an ESR module (transmit) in a transmitter 1202, and an ESR module (receive) in a receiver 1210. An example ESR embodiment configured in this manner is illustrated in FIG. 12.

The ESR module (transmit) 1204 includes a frequency up-conversion module 1206. Some embodiments of this frequency up-conversion module 1206 may be implemented using a UFT module, such as that shown in FIG. 1D.

The ESR module (receive) 1212 includes a frequency down-conversion module 1214. Some embodiments of this frequency down-conversion module 1214 may be implemented using a UFT module, such as that shown in FIG. 1C.

Figure 13:
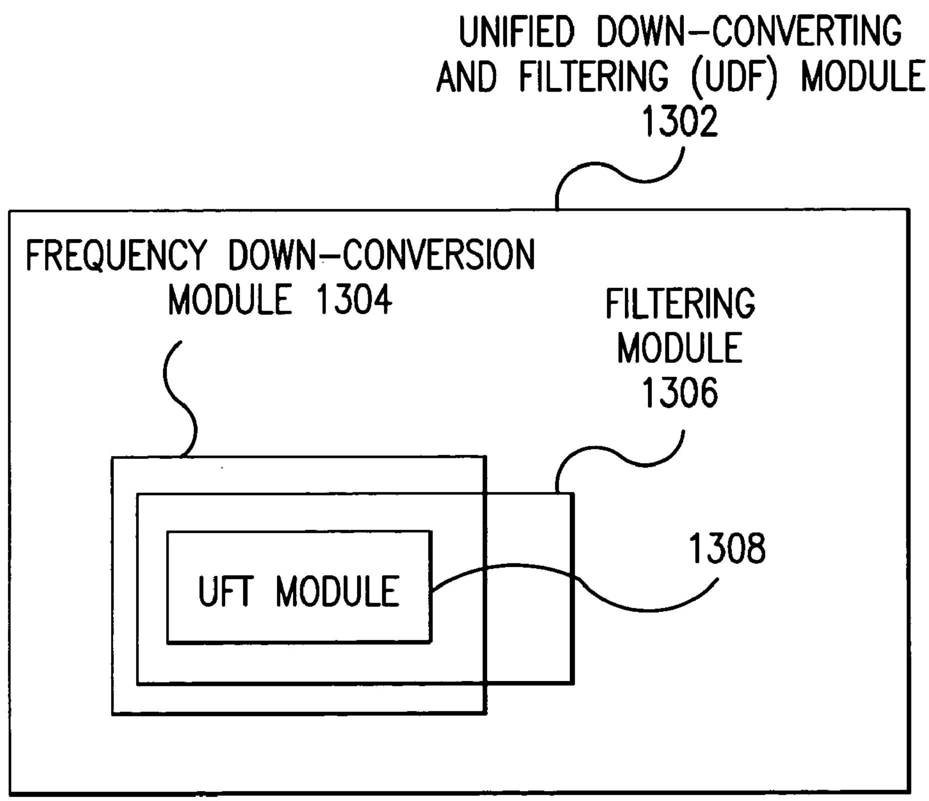
FIG. 13 illustrates a UFT module used in a unified down-conversion and filtering (UDF) module according to an embodiment of the invention.

As described elsewhere in this application, the invention is directed to methods and systems for unified down-conversion and filtering (UDF). An example unified down-conversion and filtering module 1302 is illustrated in FIG. 13. The unified down-conversion and filtering module 1302 includes a frequency down-conversion module 1304 and a filtering module 1306. According to the invention, the frequency down-conversion module 1304 and the filtering module 1306 are implemented using a UFT module 1308, as indicated in FIG. 13.

Figure 15A:
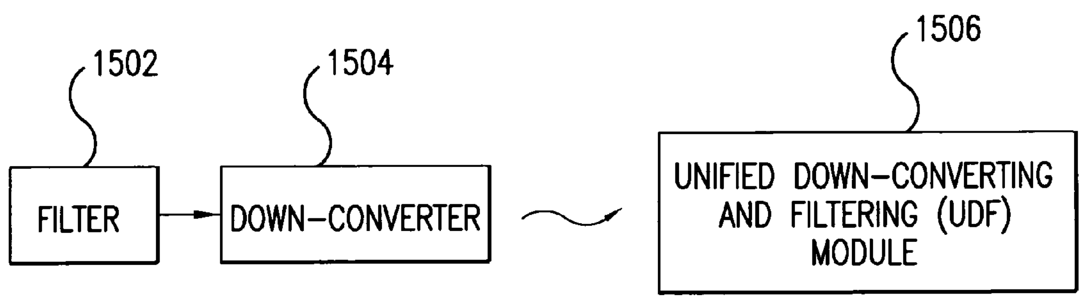
FIGS. 15A–15F illustrate example applications of the UDF module according to embodiments of the invention.
Figure 15B:
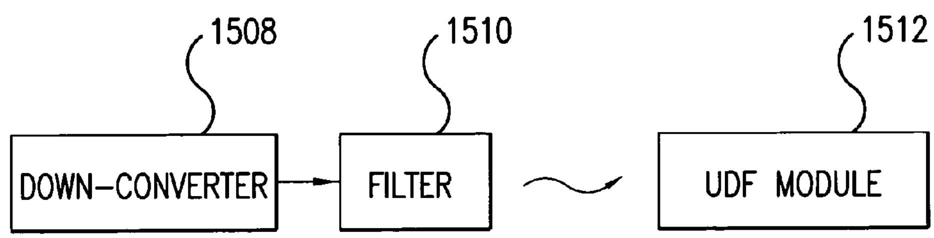
Figure 15C:
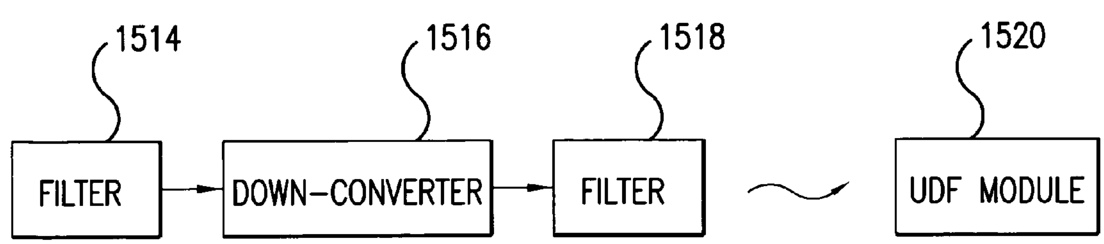
Figure 15D:
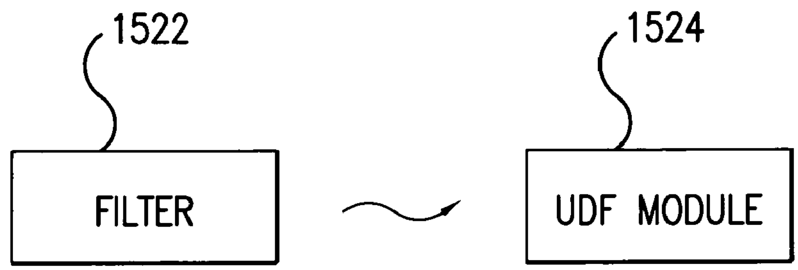
Figure 15E:
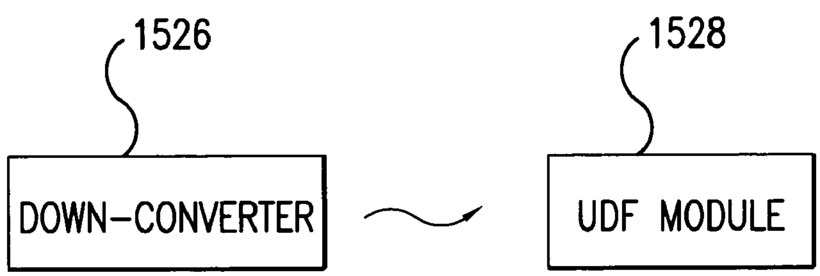
Figure 15F:
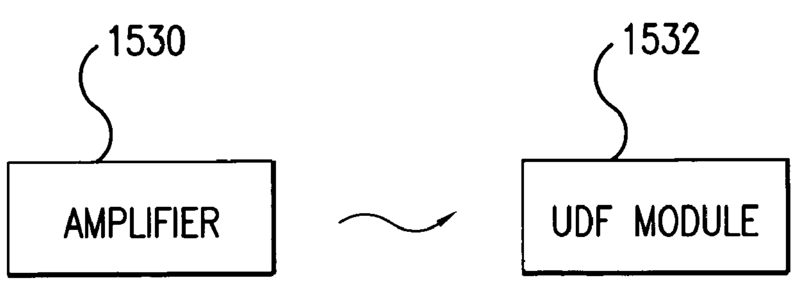

Unified down-conversion and filtering according to the invention is useful in applications involving filtering and/or frequency down-conversion. This is depicted, for example, in FIGS. 15A–15F. FIGS. 15A–15C indicate that unified down-conversion and filtering according to the invention is useful in applications where filtering precedes, follows, or both precedes and follows frequency down-conversion. FIG. 15D indicates that a unified down-conversion and filtering module 1524 according to the invention can be utilized as a filter 1522 (i.e., where the extent of frequency down-conversion by the down-converter in the unified down-conversion and filtering module 1524 is minimized). FIG. 15E indicates that a unified down-conversion and filtering module 1528 according to the invention can be utilized as a down-converter 1526 (i.e., where the filter in the unified down-conversion and filtering module 1528 passes substantially all frequencies). FIG. 15F illustrates that the unified down-conversion and filtering module 1532 can be used as an amplifier. It is noted that one or more UDF modules can be used in applications that involve at least one or more of filtering, frequency translation, and amplification.

Figure 14:
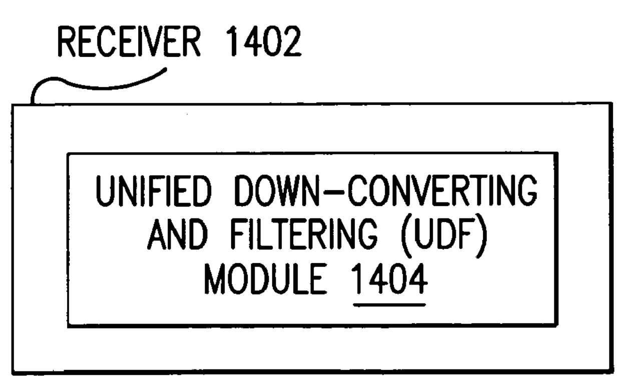
FIG. 14 illustrates an example receiver implemented using a UDF module according to an embodiment of the invention.

For example, receivers, which typically perform filtering, down-conversion, and filtering operations, can be implemented using one or more unified down-conversion and filtering modules. This is illustrated, for example, in FIG. 14.

Figure 16:
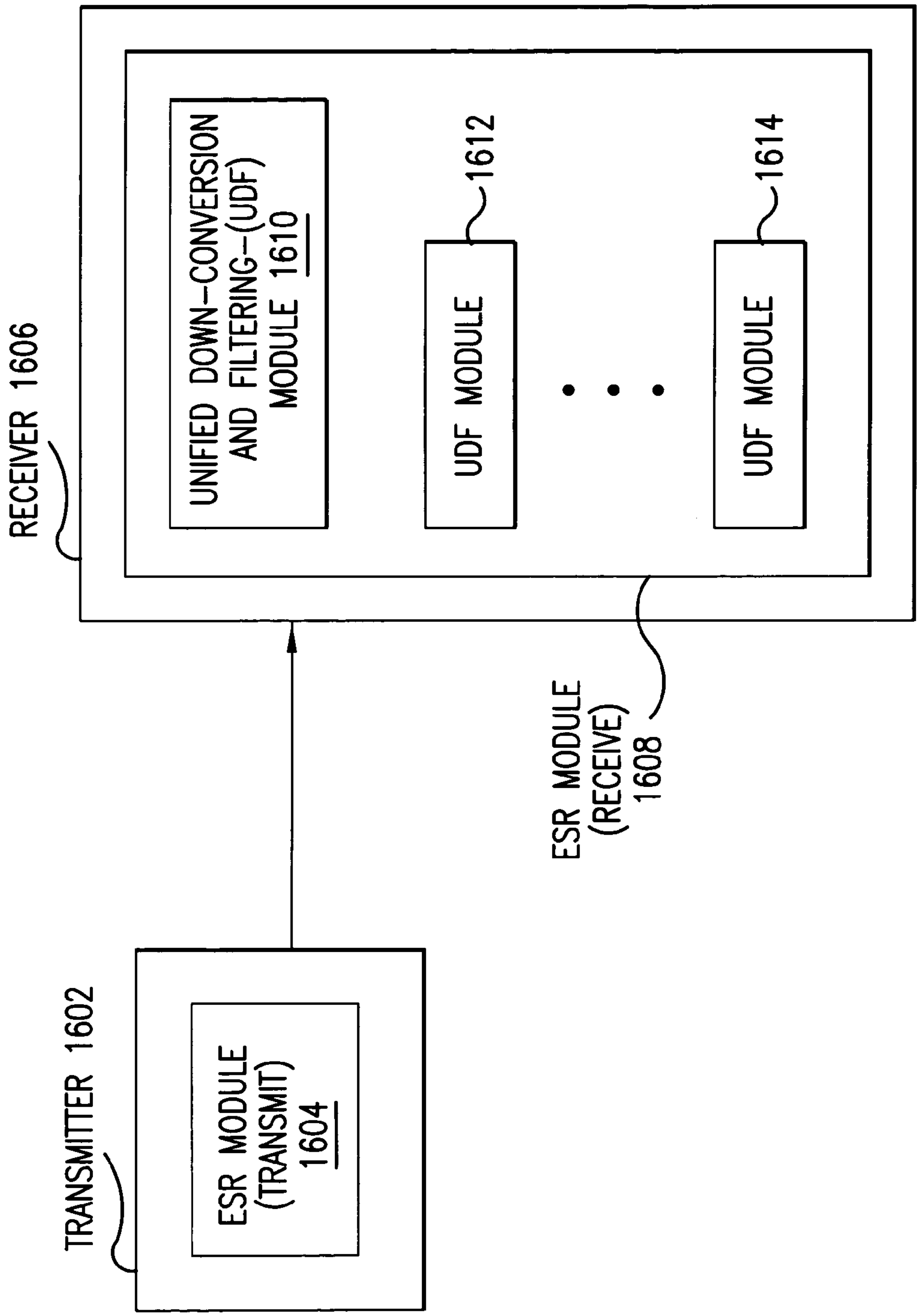
FIG. 16 illustrates an environment comprising a transmitter and a receiver, each of which may be implemented using enhanced signal reception (ESR) components of the invention, wherein the receiver may be further implemented using one or more UFD modules of the invention.

The methods and systems of unified down-conversion and filtering of the invention have many other applications. For example, as discussed herein, the enhanced signal reception (ESR) module (receive) operates to down-convert a signal containing a plurality of spectrums. The ESR module (receive) also operates to isolate the spectrums in the down-converted signal, where such isolation is implemented via filtering in some embodiments. According to embodiments of the invention, the ESR module (receive) is implemented using one or more unified down-conversion and filtering (UDF) modules. This is illustrated, for example, in FIG. 16. In the example of FIG. 16, one or more of the UDF modules 1610, 1612, 1614 operates to down-convert a received signal. The UDF modules 1610, 1612, 1614 also operate to filter the down-converted signal so as to isolate the spectrum(s) contained therein. As noted above, the UDF modules 1610, 1612, 1614 are implemented using the universal frequency translation (UFT) modules of the invention.

The invention is not limited to the applications of the UFT module described above. For example, and without limitation, subsets of the applications (methods and/or structures) described herein (and others that would be apparent to persons skilled in the relevant art(s) based on the herein teachings) can be associated to form useful combinations.

For example, transmitters and receivers are two applications of the UFT module. FIG. 10 illustrates a transceiver 1002 that is formed by combining these two applications of the UFT module, i.e., by combining a transmitter 1004 with a receiver 1008.

Also, ESR (enhanced signal reception) and unified down-conversion and filtering are two other applications of the UFT module. FIG. 16 illustrates an example where ESR and unified down-conversion and filtering are combined to form a modified enhanced signal reception system.

The invention is not limited to the example applications of the UFT module discussed herein. Also, the invention is not limited to the example combinations of applications of the UFT module discussed herein. These examples were provided for illustrative purposes only, and are not limiting. Other applications and combinations of such applications will be apparent to persons skilled in the relevant art(s) based on the teachings contained herein. Such applications and combinations include, for example and without limitation, applications/combinations comprising and/or involving one or more of: (1) frequency translation; (2) frequency down-conversion; (3) frequency up-conversion; (4) receiving; (5) transmitting; (6) filtering; and/or (7) signal transmission and reception in environments containing potentially jamming signals.

Additional example applications are described below.

6.1 Data Communication

The invention is directed to data communication among data processing devices. For example, and without limitation, the invention is directed to computer networks such as, for example, local area networks (LANs), wide area networks (WANs), including wireless LANs (WLANs) and wireless WANs, modulator/demodulators (modems), including wireless modems, short range networks, such as Bluetooth, etc., and combinations thereof.

Figure 25:
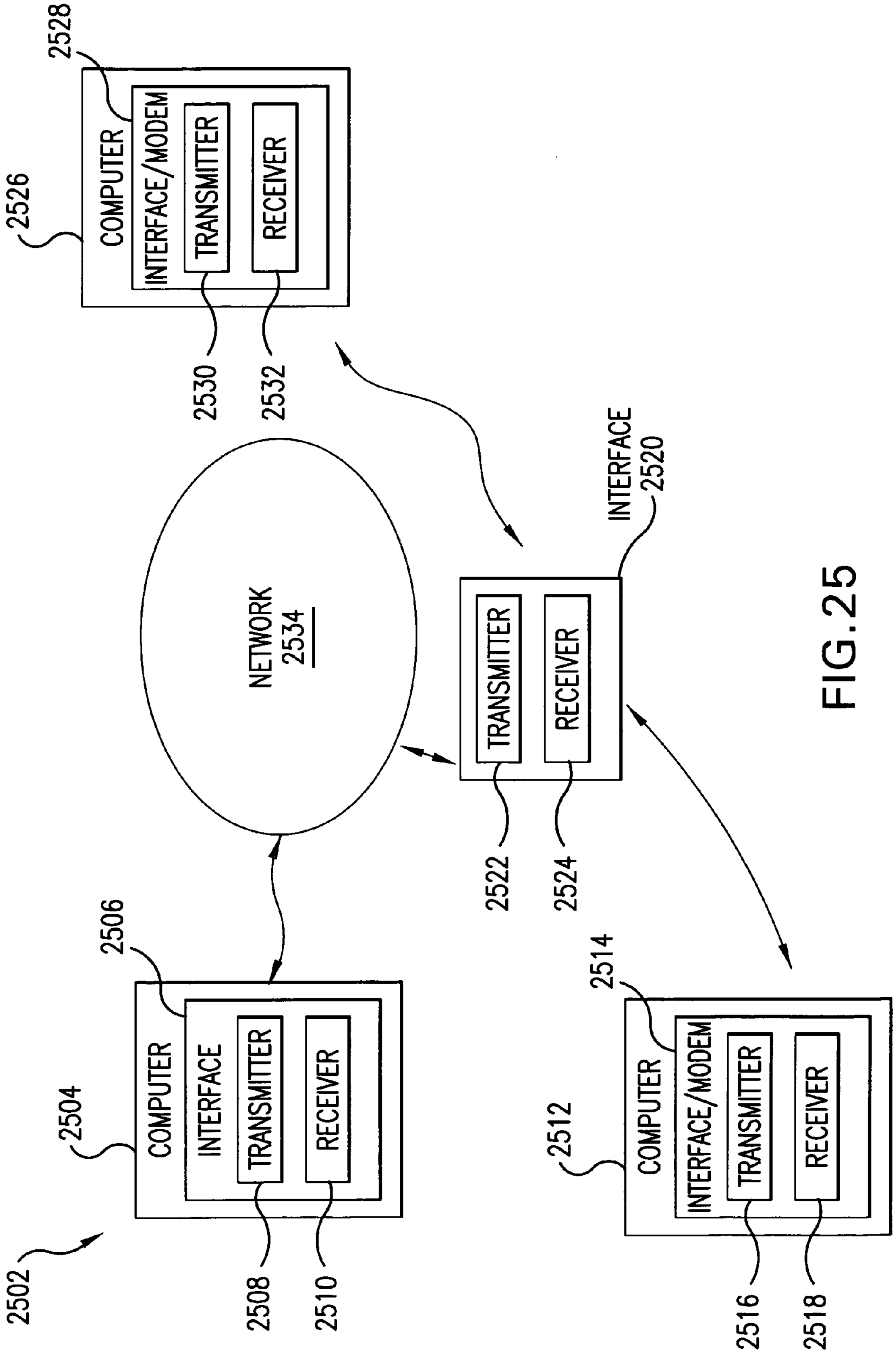
FIG. 25 illustrates a block diagram of an example computer network.

FIG. 25 illustrates an example environment 2502 wherein computers 2504, 2512, and 2526 communicate with one another via a computer network 2534. In the example of FIG. 25, computer 2504 is communicating with the network 2534 via a wired link, whereas computers 2512 and 2526 are communicating with the network 2534 via wireless links.

In the teachings contained herein, for illustrative purposes, a link may be designated as being a wired link or a wireless link. Such designations are for example purposes only, and are not limiting. A link designated as being wireless may alternatively be wired. Similarly, a link designated as being wired may alternatively be wireless. This is applicable throughout the entire application.

The computers 2504, 2512 and 2526 each include an interface 2506, 2514, and 2528, respectively, for communicating with the network 2534. The interfaces 2506, 2514, and 2528 include transmitters 2508, 2516, and 2530 respectively. Also, the interfaces 2506, 2514 and 2528 include receivers 2510, 2518, and 2532 respectively. In embodiments of the invention, the transmitters 2508, 2516 and 2530 are implemented using UFT modules for performing frequency up-conversion operations (see, for example, FIG. 8). In embodiments, the receivers 2510, 2518 and 2532 are implemented using UFT modules for performing frequency down-conversion operations (see, for example, FIG. 7).

As noted above, the computers 2512 and 2526 interact with the network 2534 via wireless links. In embodiments of the invention, the interfaces 2514, 2528 in computers 2512, 2526 represent modulator/demodulators (modems).

In embodiments, the network 2534 includes an interface or modem 2520 for communicating with the modems 2514, 2528 in the computers 2512, 2526. In embodiments, the interface 2520 includes a transmitter 2522, and a receiver 2524. Either or both of the transmitter 2522, and the receiver 2524 are implemented using UFT modules for performing frequency translation operations (see, for example, FIGS. 7 and 8).

In alternative embodiments, one or more of the interfaces 2506, 2514, 2520, and 2528 are implemented using transceivers that employ one or more UFT modules for performing frequency translation operations (see, for example, FIGS. 10 and 11).

Figure 26:
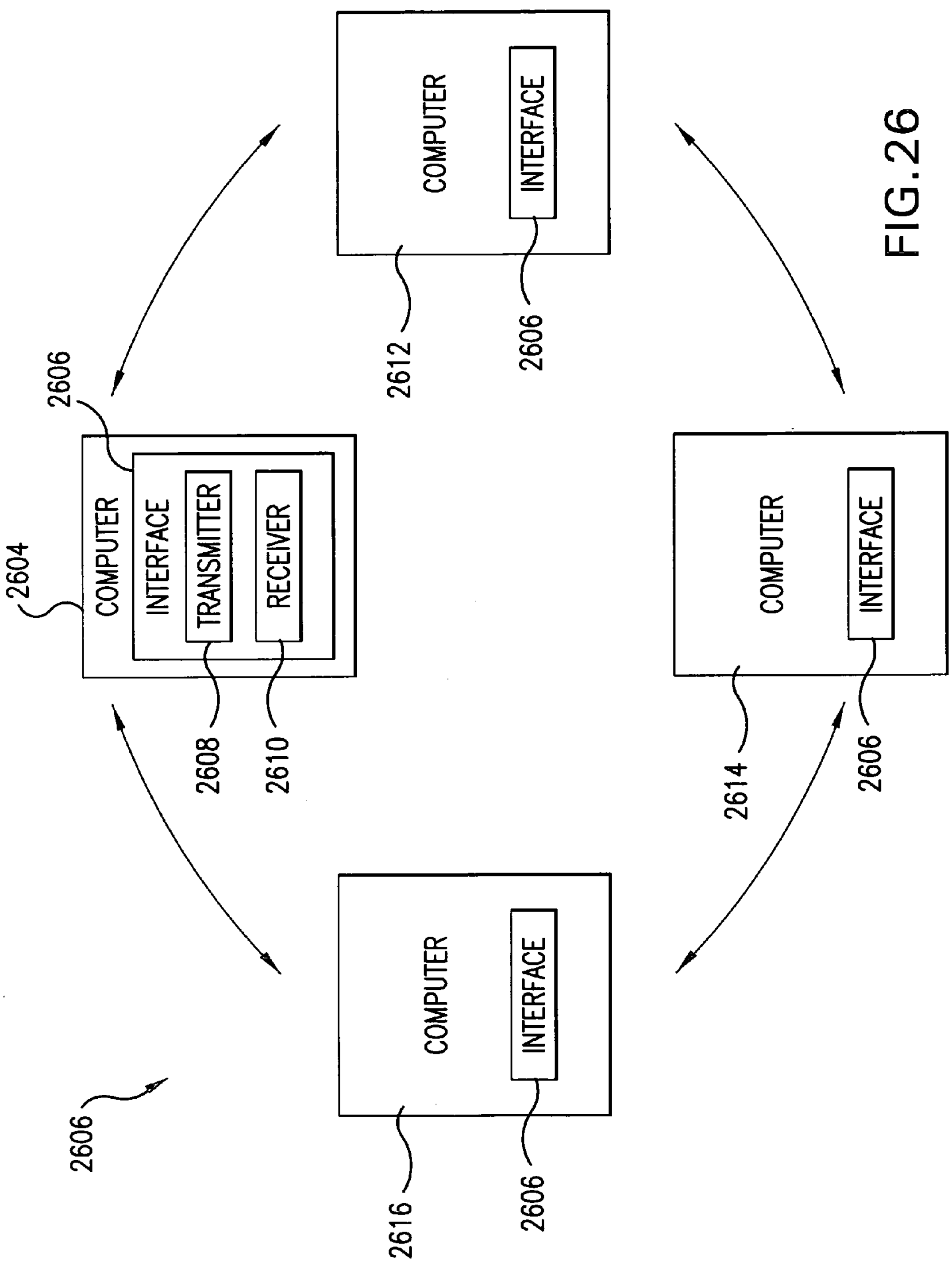
FIG. 26 illustrates a block diagram of an example computer network.

FIG. 26 illustrates another example data communication embodiment 2602. Each of a plurality of computers 2604, 2612, 2614 and 2616 includes an interface, such as an interface 2606 shown in the computer 2604. It should be understood that the other computers 2612, 2614, 2616 also include an interface such as an interface 2606. The computers 2604, 2612, 2614 and 2616 communicate with each other via interfaces 2606 and wireless or wired links, thereby collectively representing a data communication network.

The interfaces 2606 may represent any computer interface or port, such as but not limited to a high speed internal interface, a wireless serial port, a wireless PS2 port, a wireless USB port, PCMCIA port, etc.

The interface 2606 includes a transmitter 2608 and a receiver 2610. In embodiments of the invention, either or both of the transmitter 2608 and the receiver 2610 are implemented using UFT modules for frequency up-conversion and down-conversion (see, for example, FIGS. 7 and 8). Alternatively, the interfaces 2806 can be implemented using a transceiver having one or more UFT modules for performing frequency translation operations (see, for example, FIGS. 10 and 11).

Figure 33:
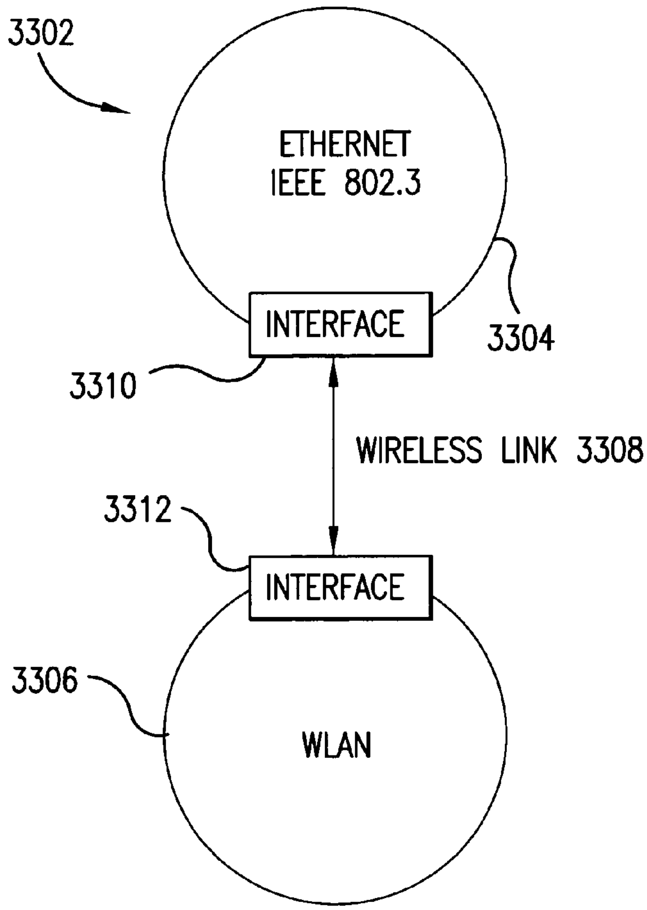
FIGS. 33–38 illustrate example environments encompassed by embodiments of the invention.

FIGS. 33–38 illustrate other scenarios envisioned and encompassed by the invention. FIG. 33 illustrates a data processing environment 3302 wherein a wired network, such as an Ethernet network 3304, is linked to another network, such as a WLAN 3306, via a wireless link 3308. The wireless link 3308 is established via interfaces 3310, 3312 which are preferably implemented using universal frequency translation modules.

Figure 34:
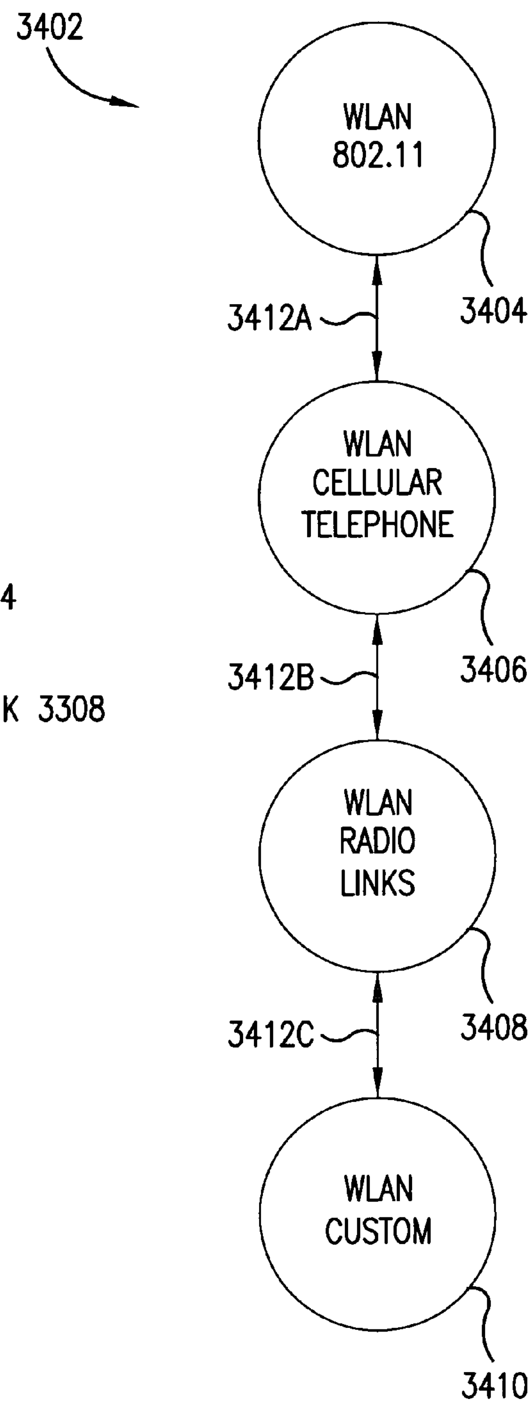

The invention includes multiple networks linked together. The invention also envisions wireless networks conforming to any known or custom standard or specification. This is shown in FIG. 34, for example, where any combination of WLANs conforming to any WLAN standard or configuration, such as IEEE 802.11 (described in further detail elsewhere herein), any cellular telephone standard or specification, any WAN standard, any short range wireless standard, any type of radio links, any custom standard or specification, etc., can be implemented using the universal frequency translation technology described herein. Also, any combination of these networks may be coupled together. It is noted that the invention is not limited to the embodiment shown in FIG. 34.

Figure 35:
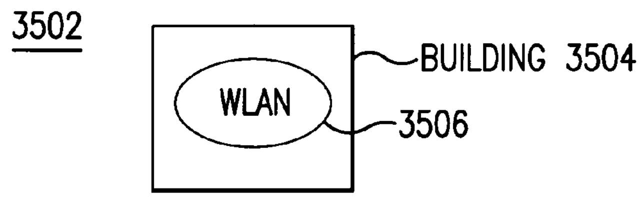
Figure 36:
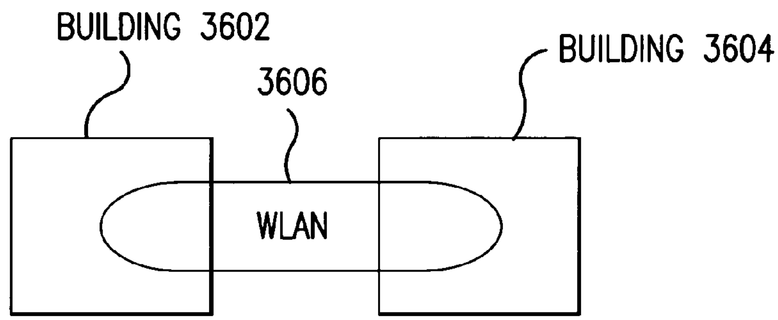
Figure 37:
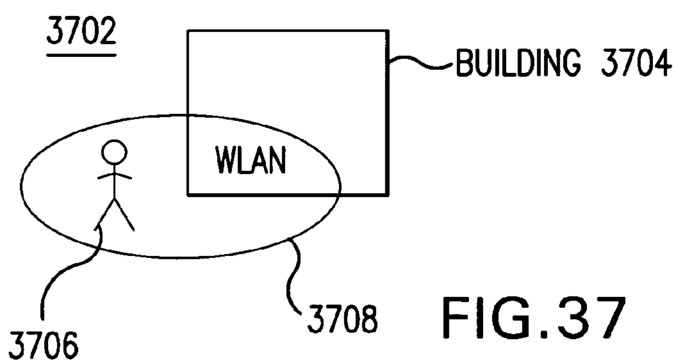
Figure 38:

The invention supports WLANs and/or other communication networks (and combinations thereof) that are located in one or multiple buildings, as shown in FIGS. 35 and 36. The invention also supports WLANs and/or other communication networks (and combinations thereof) that are located in an area including and external to one or more buildings, as shown in FIG. 37. In fact, the invention is directed to networks that cover any defined geographical area, as shown in FIG. 38. In the embodiments described above, wireless links are preferably established using interfaces as described herein.

6.1.1. Example Implementations: Interfaces, Wireless Modems, Wireless LANs, etc.

The present invention is now described as implemented in an interface, such as but not limited to a wireless modem, which can be utilized to implement a wireless local area network (WLAN) or wireless wide area network (WWAN), for example. In an embodiment, the present invention is implemented in a WLAN to support IEEE WLAN Standard 802.11, but this embodiment is mentioned for illustrative purposes only. The invention is not limited to this standard or the WLAN embodiment and described herein.

Conventional wireless modems are described in, for example, U.S. Pat. No. 5,764,693, titled, "Wireless Radio Modem with Minimal Inter-Device RF Interference," incorporated herein by reference in its entirety. The present invention replaces a substantial portion of conventional wireless modems with one or more universal frequency translators (UFTs). The resultant improved wireless modem consumes less power than conventional wireless modems and is easier and less expensive to design and build. A wireless modem in accordance with the present invention can be implemented in a PC-MCIA card or within a main housing of a computer, or on one or more chips, in any data processing or communication device (desk top, handheld, etc.) for example. The invention is not limited to these examples.

Figure 27:
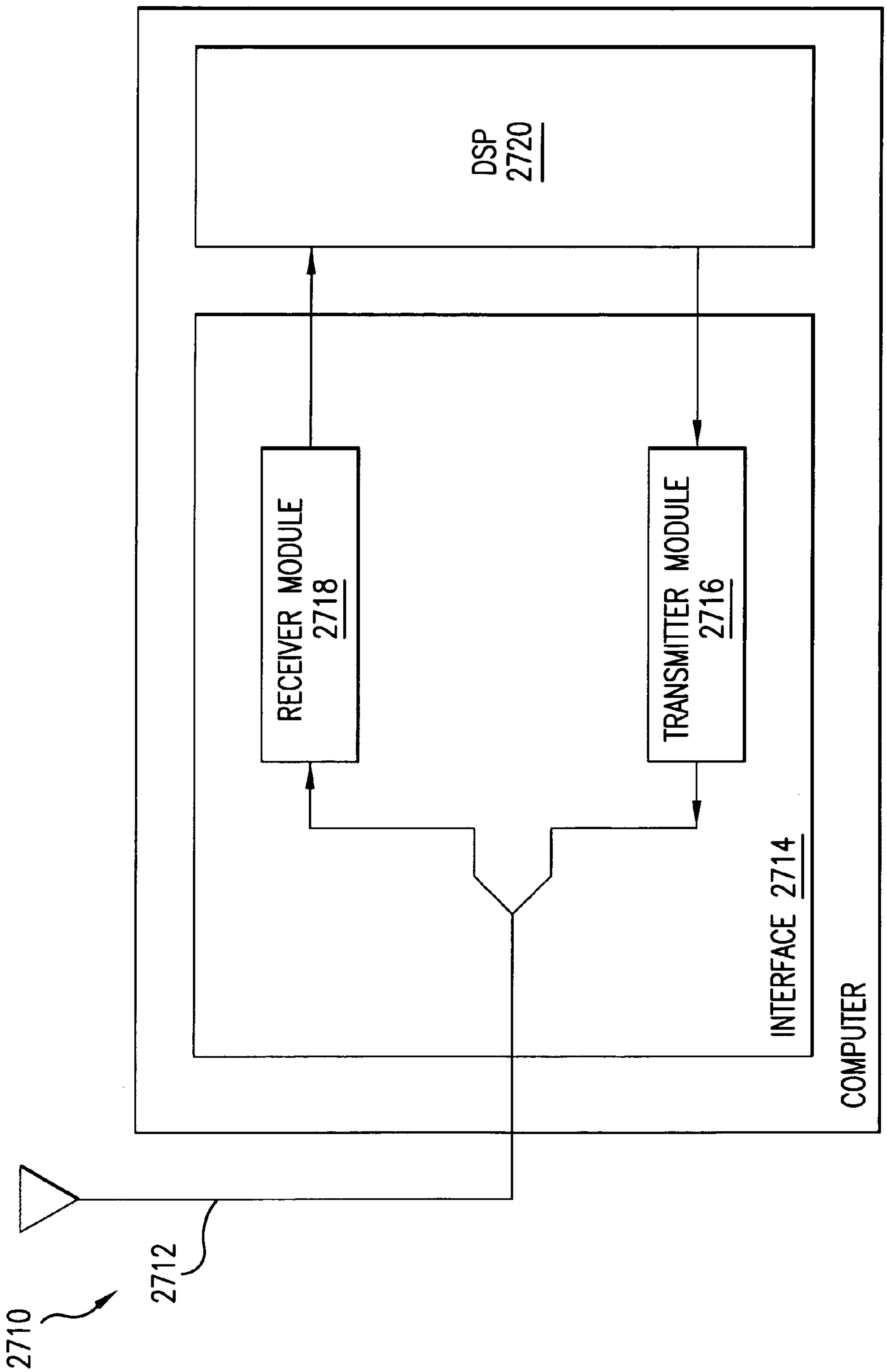
FIG. 27 illustrates a block diagram of an example wireless interface.

FIG. 27 illustrates an example block diagram of a device 2710, which can be wirelessly coupled to a LAN, as illustrated for example in FIGS. 25 and 26. The device 2710 includes an interface 2714 and an antenna 2712. The interface 2714 includes a transmitter module 2716 that receives information from a digital signal processor (DSP) 2720, and modulates and up-converts the information for transmission from the antenna 2712. The interface 2714 also includes a receiver module 2718 that receives modulated carrier signals via the antenna 2712. The receiver module 2718 down-converts and demodulates the modulated carrier signals to baseband information, and provides the baseband information to the DSP 2720. The DSP 2720 can include a central processing unit (CPU) and other components of the device 2710. Conventionally, the interface 2714 is implemented with heterodyne components. The device can be any data processing or communication device, or other device where communication with external devices is desired.

Figure 28:
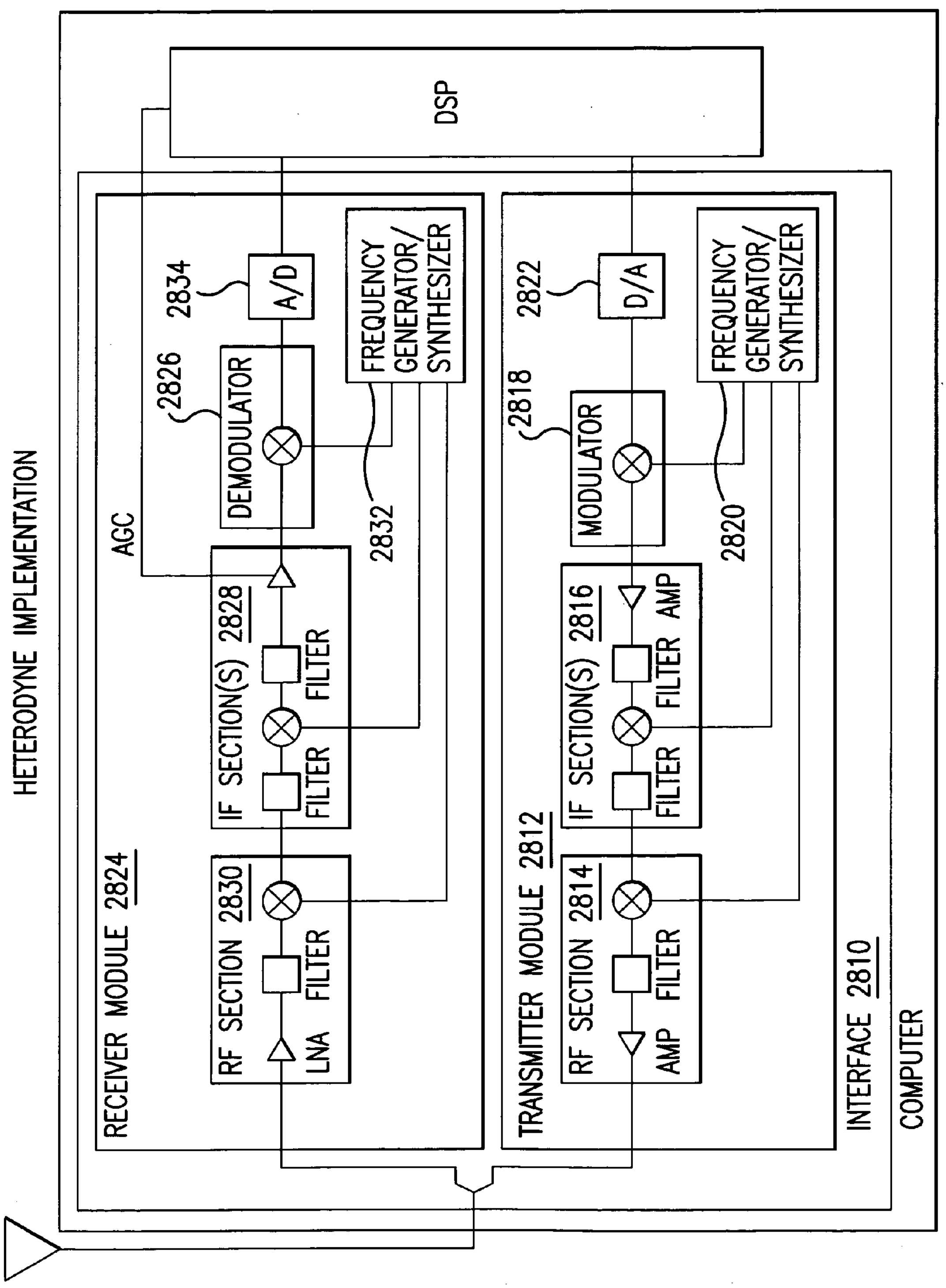
FIG. 28 illustrates an example heterodyne implementation of the wireless interface illustrated in FIG. 27.

FIG. 28 illustrates an example interface 2810 implemented with heterodyne components. The interface 2810 includes a transmitter module 2812 and a receiver module 2824. The receiver module 2824 includes an RF section 2830, one or more IF sections 2828, a demodulator section 2826, an optional analog to digital (A/D) converter 2834, and a frequency generator/synthesizer 2832. The transmitter module 2812 includes an optional digital to analog (D/A) converter 2822, a modulator section 2818, one or more IF sections 2816, an RF section 2814, and a frequency generator/synthesizer 2820. Operation of the interface 2810 will be apparent to one skilled in the relevant art(s), based on the description herein.

Figure 29:
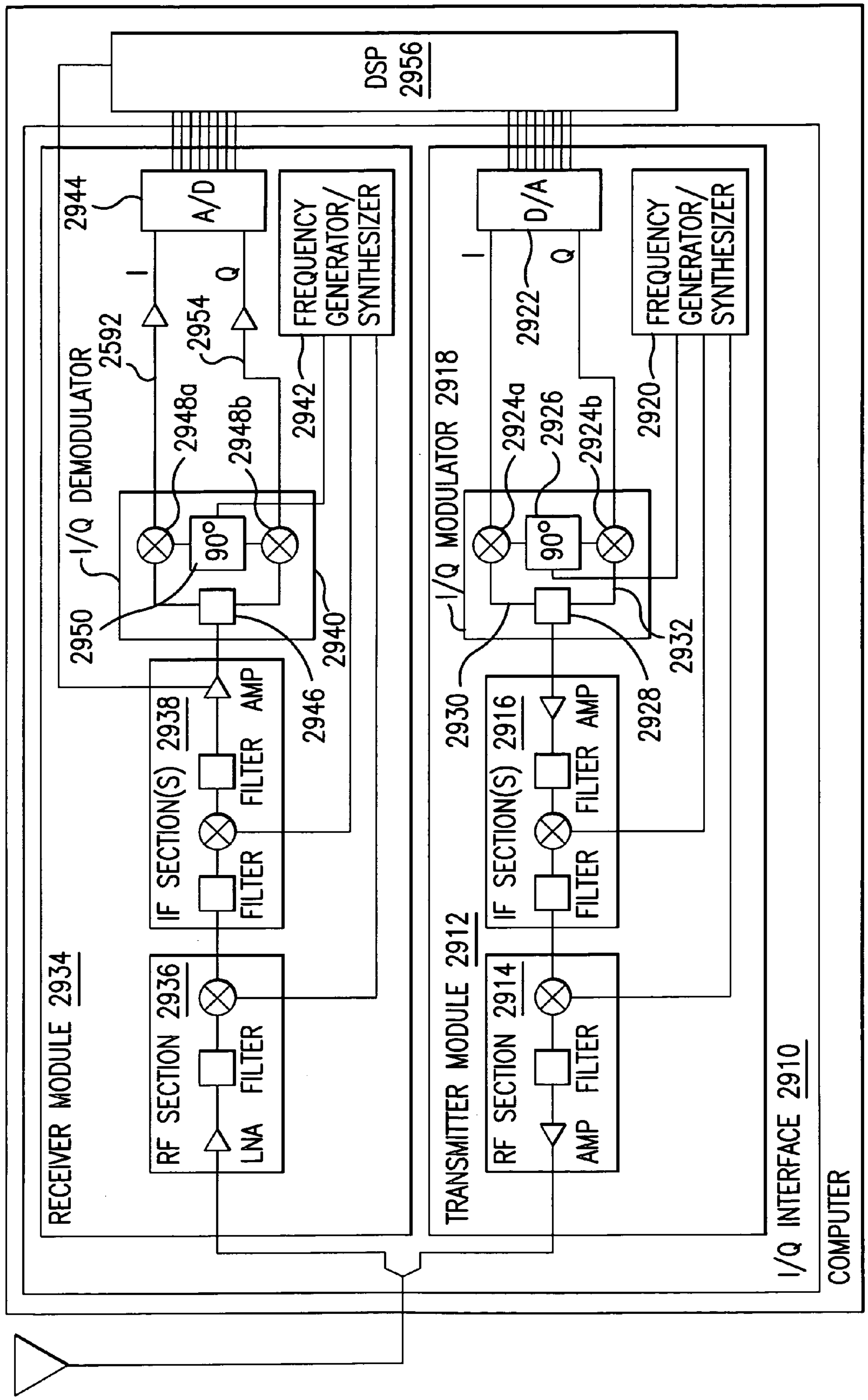
FIG. 29 illustrates an example in-phase/quadrature-phase (I/Q) heterodyne implementation of the interface illustrated in FIG. 27.

FIG. 29 illustrates an example in-phase/quadrature-phase (I/Q) interface 2910 implemented with heterodyne components. I/Q implementations allow two channels of information to be communicated on a carrier signal and thus can be utilized to increase data transmission.

The interface 2910 includes a transmitter module 2912 and a receiver module 2934. The receiver module 2934 includes an RF section 2936, one or more IF sections 2938, an I/Q demodulator section 2940, an optional A/D converter 2944, and a frequency generator/synthesizer 2942. The I/Q demodulator section 2940 includes a signal splitter 2946, mixers 2948, and a phase shifter 2950. The signal splitter 2946 provides a received signal to the mixers 2948. The phase shifter 2950 operates the mixers 2948 ninety degrees out of phase with one another to generate I and Q information channels 2952 and 2954, respectively, which are provided to a DSP 2956 through the optional A/D converter 2944.

The transmitter module 2912 includes an optional D/A converter 2922, an I/Q modulator section 2918, one or more IF sections 2916, an RF section 2914, and a frequency generator/synthesizer 2920. The I/Q modulator section 2918 includes mixers 2924, a phase shifter 2926, and a signal combiner 2928. The phase shifter 2926 operates the mixers 2924 ninety degrees out of phase with one another to generate I and Q modulated information signals 2930 and 2932, respectively, which are combined by the signal combiner 2928. The IF section(s) 2916 and RF section 2914 up-convert the combined I and Q modulated information signals 2930 and 2932 to RF for transmission by the antenna, in a manner well known in the relevant art(s).

Heterodyne implementations, such as those illustrated in FIGS. 28 and 29, are expensive and difficult to design, manufacture and tune. In accordance with the present invention, therefore, the interface 2714 (FIG. 27) is preferably implemented with one or more universal frequency translation (UFT) modules, such as the UFT module 102 (FIG. 1A or other embodiments described herein, or equivalents thereof). Thus previously described benefits of the present invention are obtained in wireless modems, WLANs, or even wired devices, etc.

Figure 30:
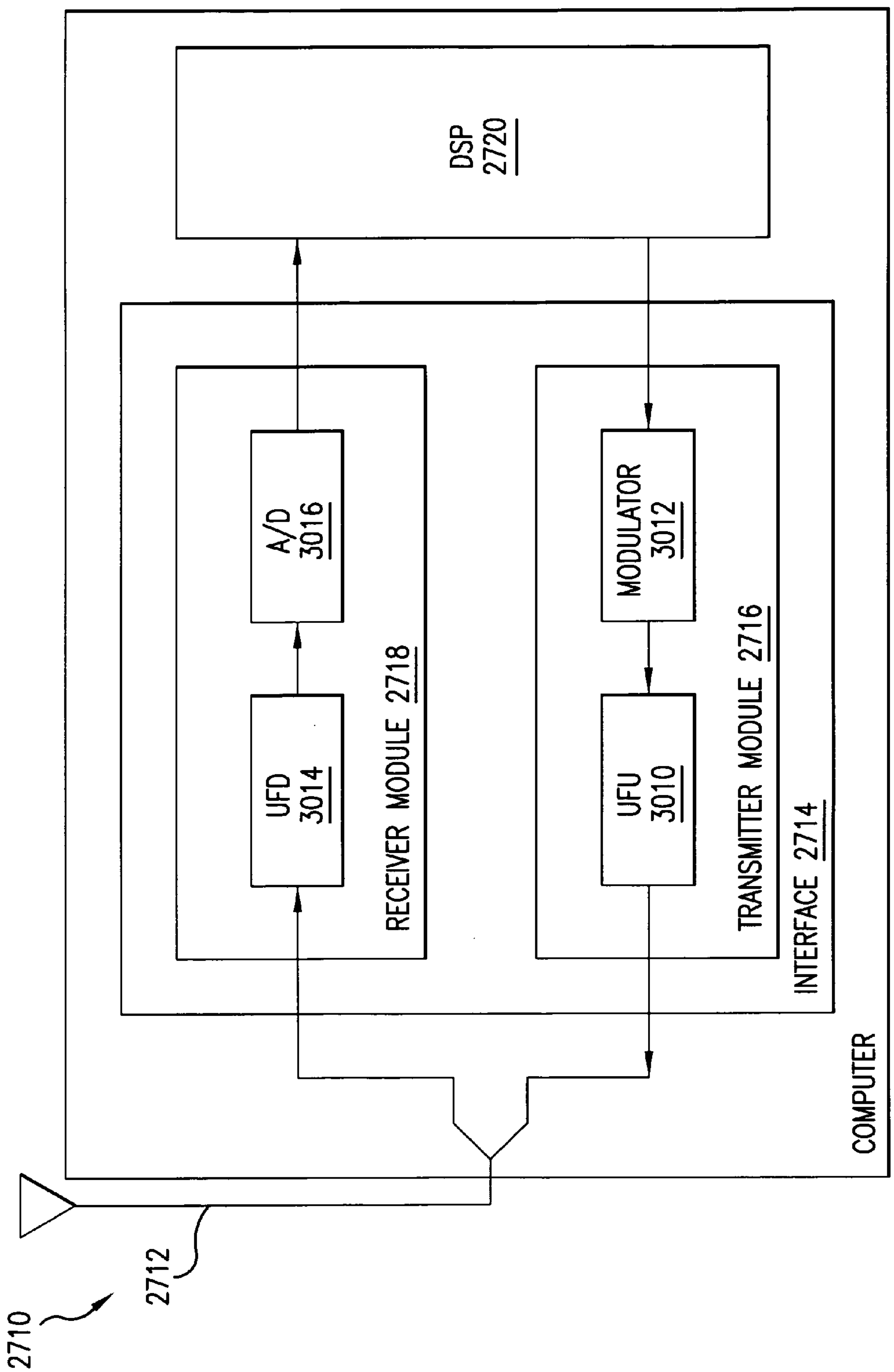
FIG. 30 illustrates an example high level block diagram of the interface illustrated in FIG. 27, in accordance with an embodiment of the present invention.

FIG. 30 illustrates an example block diagram embodiment of the interface 2714 that is associated with a computer or any other data processing or communication device. In FIG. 30, the receiver module 2718 includes a universal frequency down-converter (UFD) module 3014 and an optional analog to digital (A/D) converter 3016, which converts an analog output from the UFD 3014 to a digital format for the DSP 2720. The transmitter module 2716 includes an optional modulator 3012 and a universal frequency up-converter (UFU) module 3010. The optional modulator 3012 can be a variety of types of modulators, including conventional modulators. Alternatively, the UFU module 3010 includes modulator functionality. The example implementation of FIG. 30 operates substantially as described above and in U.S. Pat. No. 6,061,551 entitled "Method and System for Down-Converting Electromagnetic Signals," filed Oct. 21, 1998, and U.S. Pat. No. 6,091,940 entitled "Method and System for Frequency Up-Conversion," filed Oct. 21, 1998.

Figure 31:
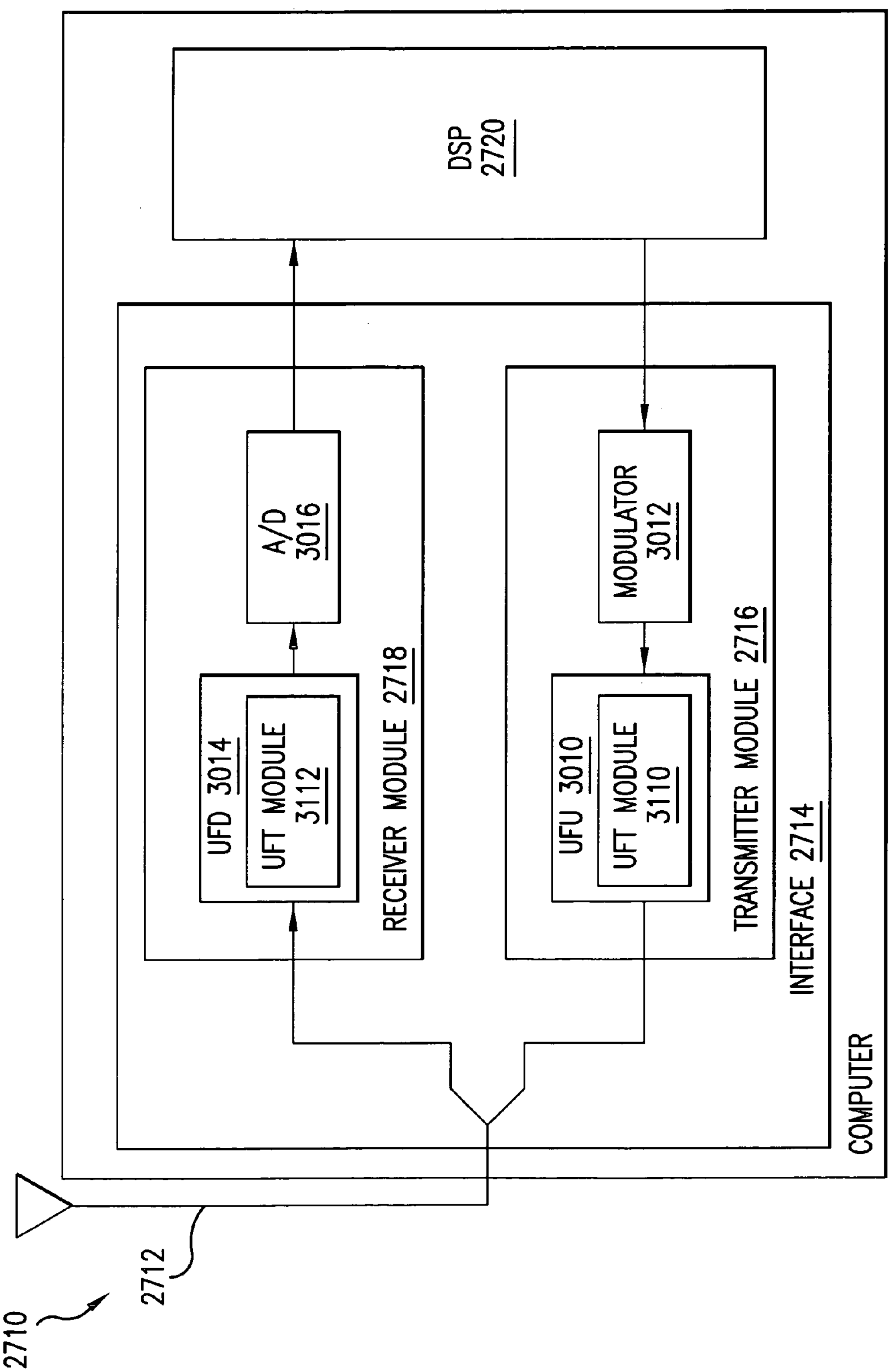
FIG. 31 illustrates a example block diagram of the interface illustrated in FIG. 29, in accordance with an embodiment of the invention.

FIG. 31 illustrates an example implementation of the interface 2714 illustrated in FIG. 30, wherein the receiver UFD 3014 includes a UFT module 3112, and the transmitter UFU 3010 includes a universal frequency translation (UFT) module 3110. This example implementation operates substantially as described above and in U.S. Pat. No. 6,061,551 entitled "Method and System for Down-Converting Electromagnetic Signals," filed Oct. 21, 1998, and U.S. Pat. No. 6,091,940 entitled "Method and System for Frequency Up-Conversion," filed Oct. 21, 1998.

Figure 32:
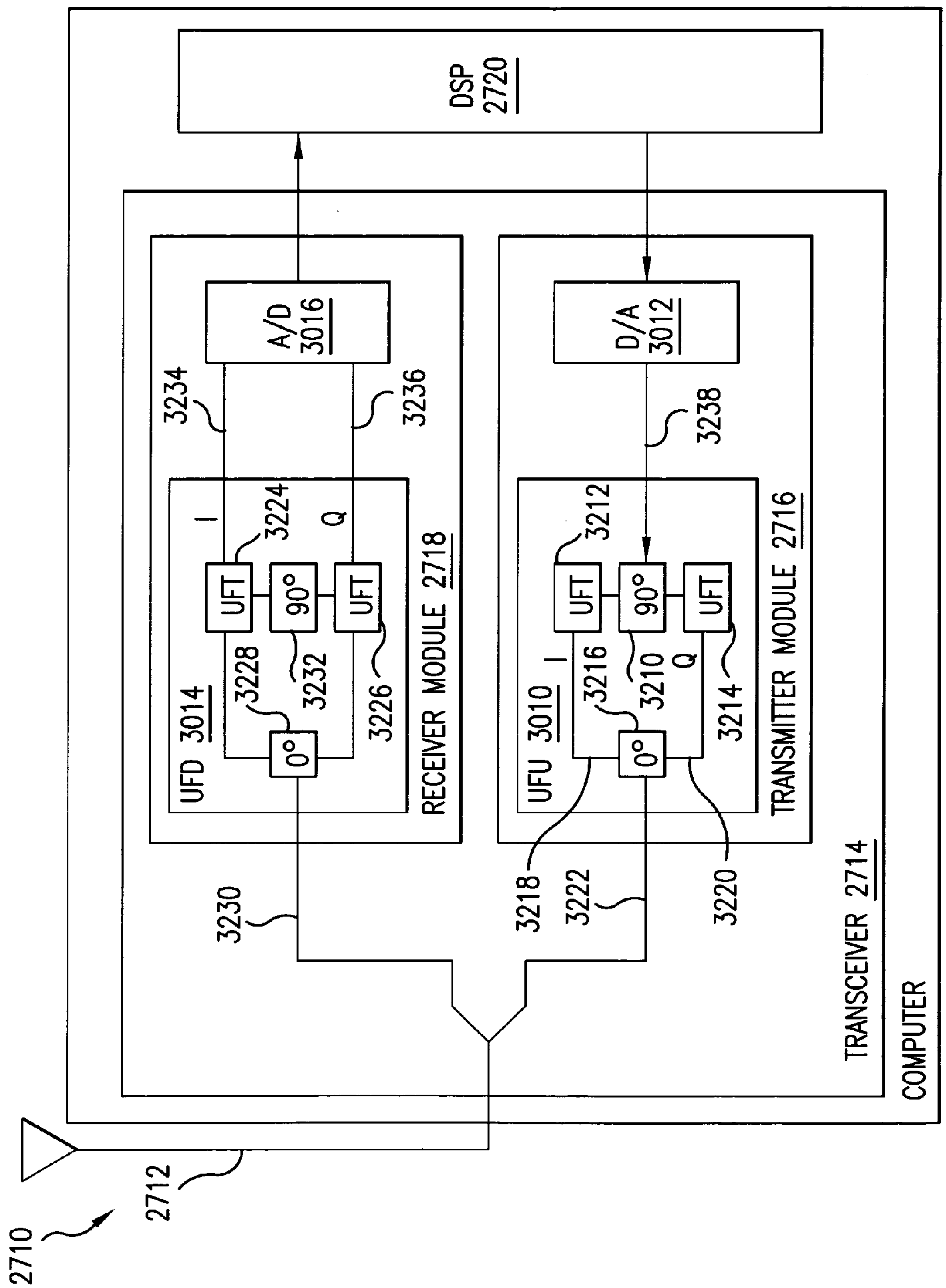
FIG. 32 illustrates an example I/Q implementation of the interface illustrated in FIG. 31.

FIG. 32 illustrates an example I/Q implementation of the interface module 2710. Other I/Q implementations are also contemplated and are within the scope of the present invention.

In the example of FIG. 32, the receiver UFD module 3014 includes a signal divider 3228 that provides a received I/Q modulated carrier signal 3230 between a third UFT module 3224 and a fourth UFT module 3226. A phase shifter 3232, illustrated here as a 90 degree phase shifter, controls the third and fourth UFT modules 3224 and 3226 to operate 90 degrees out of phase with one another. As a result, the third and fourth UFT modules 3224 and 3226 down-convert and demodulate the received I/Q modulated carrier signal 3230, and output I and Q channels 3234 and 3236, respectively, which are provided to the DSP 2720 through the optional A/D converter 3016.

In the example of FIG. 32, the transmitter UFU module 3010 includes first and second UFT modules 3212 and 3214 and a phase shifter 3210, which is illustrated here as a 90 degree phase shifter. The phase shifter 3210 receives a lower frequency modulated carrier signal 3238 from the modulator 3012. The phase shifter 3210 controls the first and second UFT modules 3212 and 3214 to operate 90 degrees out of phase with one another. The first and second UFT modules 3212 and 3214 up-convert the lower frequency modulated carrier signal 3238, which are output as higher frequency modulated I and Q carrier channels 3218 and 3220, respectively. A signal combiner 3216 combines the higher frequency modulated I and Q carrier channels 3218 and 3220 into a single higher frequency modulated I/Q carrier signal 3222 for transmitting by the antenna 2712.

The example implementations of the interfaces described above, and variations thereof, can also be used to implement network interfaces, such as the network interface 2520 illustrated in FIG. 25.

More generally, the invention is directed to WLAN client devices and WLAN infrastructure devices. "WLAN Client Devices" refers to, for example, any data processing and/or communication devices in which wired or wireless communication functionality is desired, such as but not limited to computers, personal data assistants (PDAs), automatic identification data collection devices (such as bar code scanners/readers, electronic article surveillance readers, and radio frequency identification readers), telephones, network devices, etc., and combinations thereof. "WLAN Infrastructure Devices" refers to, for example, Access Points and other devices used to provide the ability for WLAN Client Devices (as well as potentially other devices) to connect to wired and/or wireless networks and/or to provide the network functionality of a WLAN. "WLAN" refers to, for example, a Wireless Local Area Network that is implemented according to and that operates within WLAN standards and/or specifications, such as but not limited to IEEE 802.11, IEEE 802.11 a, IEEE 802.11b, HomeRF, Proxim Range LAN, Proxim Range LAN2, Symbol Spectrum 1, Symbol Spectrum 24 as it existed prior to adoption of IEEE 802.11, HiperLAN1, or HiperLAN2. WLAN client devices and/or WLAN infrastructure devices may operate in a multimode capacity. For example, a device may include WLAN and WAN functionality. Another device may include WLAN and short range communication (such as but not limited to Blue Tooth) functionality. Another device may include WLAN and WAN and short range communication functionality. It is noted that the above definitions and examples are provided for illustrative purposes, and are not limiting. Equivalents to that described above will be apparent to persons skilled in the relevant art(s) based on the teachings contained herein.

6.1.2 Example Modifications

The RF modem applications, WLAN applications, etc., described herein, can be modified by incorporating one or more of the enhanced signal reception (ESR) techniques described herein. Use of ESR embodiments with the network embodiments described herein will be apparent to persons skilled in the relevant art(s) based on the teachings contained herein.

The RF modem applications, WLAN applications, etc., described herein can be enhanced by incorporating one or more of the unified down-conversion and filtering (UDF) techniques described herein. Use of UDF embodiments with the network embodiments described herein will be apparent to persons skilled in the relevant art(s) based on the teachings contained herein.

6.2. Other Example Applications

The application embodiments described above are provided for purposes of illustration. These applications and embodiments are not intended to limit the invention. Alternate and additional applications and embodiments, differing slightly or substantially from those described herein, will be apparent to persons skilled in the relevant art(s) based on the teachings contained herein. For example, such alternate and additional applications and embodiments include combinations of those described above. Such combinations will be apparent to persons skilled in the relevant art(s) based on the herein teachings.

6.3. Example WLAN Implementation Embodiments 6.3.1. Architecture

Figure 39:
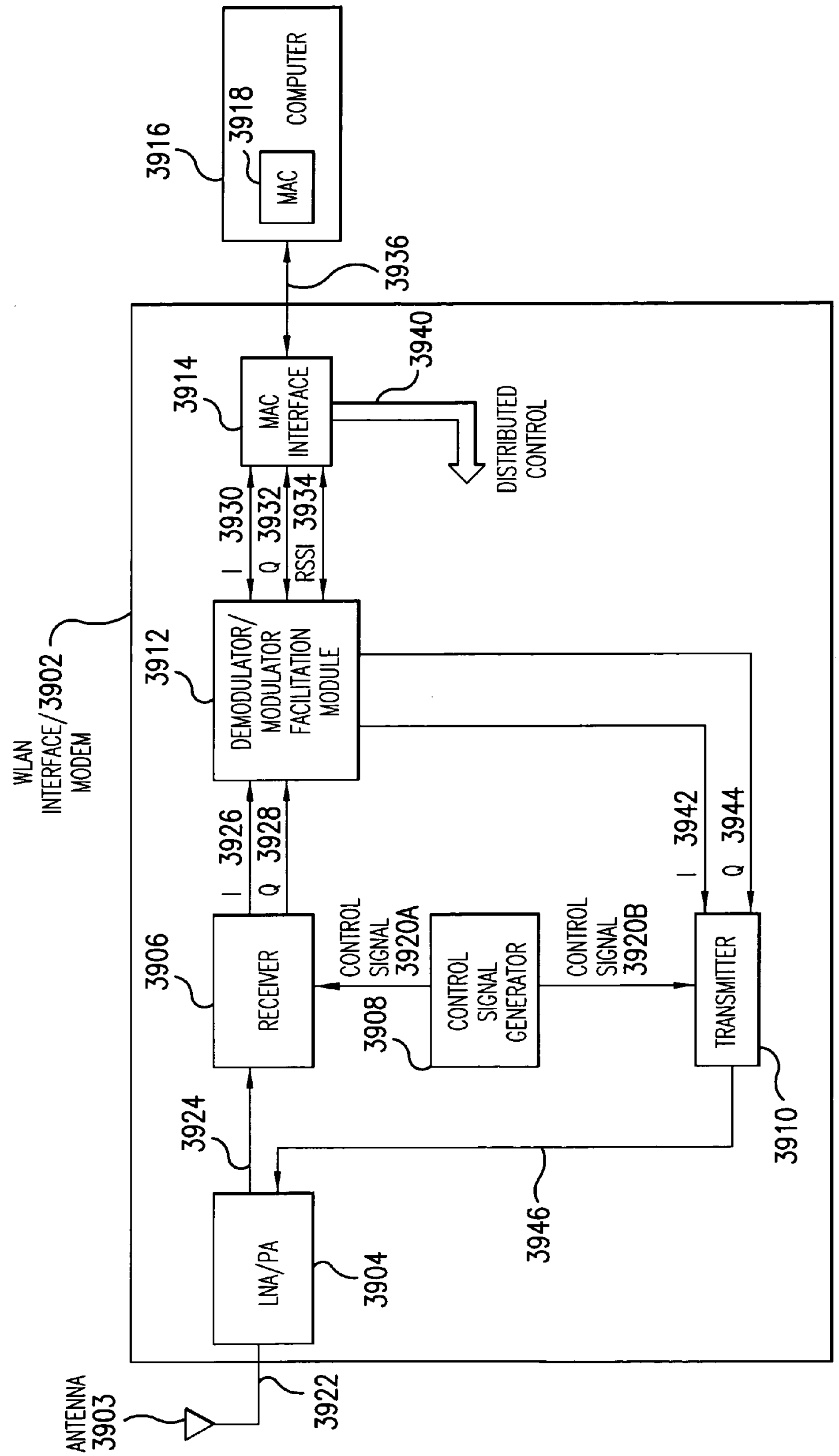
FIG. 39 illustrates a block diagram of a WLAN interface according to an embodiment of the invention.

FIG. 39 is a block diagram of a WLAN interface 3902 (also referred to as a WLAN modem herein) according to an embodiment of the invention. The WLAN interface/modem 3902 includes an antenna 3903, a low noise amplifier or power amplifier (LNA/PA) 3904, a receiver 3906, a transmitter 3910, a control signal generator 3908, a demodulator/modulator facilitation module 3912, and a media access controller (MAC) interface 3914. The MAC interface 3914 couples the WLAN interface/modem 3902 to a computer 3916 or other data processing or communication device. The computer 3916 preferably includes a MAC 3918.

The WLAN interface/modem 3902 represents a transmit and receive application that utilizes the universal frequency translation technology described herein. It also represents a zero IF (or direct-to-data) WLAN architecture.

The WLAN interface/modem 3902 also represents a vector modulator and a vector demodulator using the universal frequency translation (UFT) technology described herein. Use of the UFT technology enhances the flexibility of the WLAN application (i.e., makes it universal).

In the embodiment shown in FIG. 39, the WLAN interface/modem 3902 is compliant with WLAN standard IEEE 802.11. However, the invention is not limited to this standard. The invention is applicable to any communication standard or specification, as will be appreciated by persons skilled in the relevant art(s) based on the teachings contained herein. Any modifications to the invention to operate with other standards or specifications will be apparent to persons skilled in the relevant art(s) based on the teachings contained herein.

In the embodiment shown in FIG. 39, the WLAN interface/modem 3902 provides half duplex communication. However, the invention is not limited to this communication mode. The invention is applicable and directed to other communication modes, as will be appreciated by persons skilled in the relevant art(s) based on the teachings contained herein.

In the embodiment shown in FIG. 39, the modulation/demodulation performed by the WLAN interface/modem 3902 is preferably direct sequence spread spectrum QPSK (quadrature phase shift keying) with differential encoding. However, the invention is not limited to this modulation/demodulation mode. The invention is applicable and directed to other modulation and demodulation modes, such as but not limited to those described herein, as well as frequency hopping according to IEEE 802.11, OFDM (orthogonal frequency division multiplexing), as well as others. These modulation/demodulation modes will be appreciated by persons skilled in the relevant art(s) based on the teachings contained herein.

The operation of the WLAN interface/modem 3902 when receiving shall now be described.

Signals 3922 received by the antenna 3903 are amplified by the LNA/PA 3904. The amplified signals 3924 are down-converted and demodulated by the receiver 3906. The receiver 3906 outputs I signal 3926 and Q signal 3928.

Figure 40:
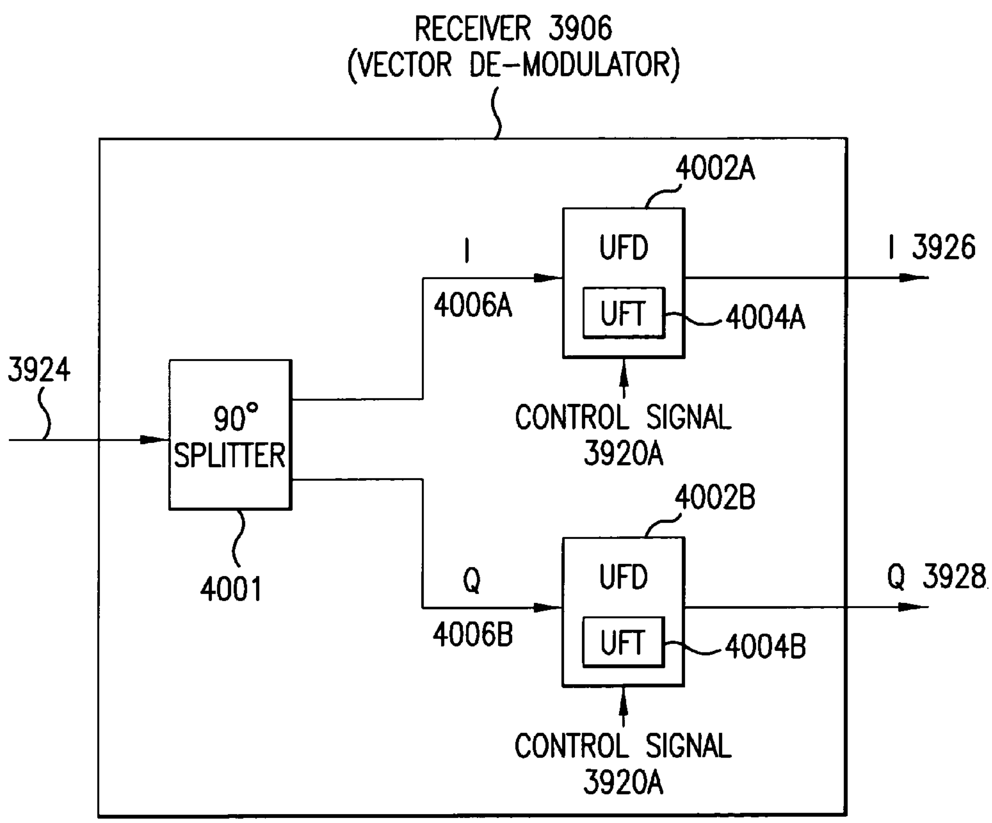
FIG. 40 illustrates a WLAN receiver according to an embodiment of the invention.

FIG. 40 illustrates an example receiver 3906 according to an embodiment of the invention. It is noted that the receiver 3906 shown in FIG. 40 represents a vector modulator. In an embodiment, the "receiving" function performed by the WLAN interface/modem 3902 can be considered to be all processing performed by the WLAN interface/modem 3902 from the LNA/PA 3904 to generation of baseband information.

Signal 3924 is split by a 90 degree splitter 4001 to produce an I signal 4006A and Q signal 4006B that are preferably 90 degrees apart in phase. I and Q signals 4006A, 4006B are down-converted by UFD (universal frequency down-conversion) modules 4002A, 4002B. The UDF modules 4002A, 4002B output down-converted I and Q signals 3926, 3928. The UFD modules 4002A, 4002B each includes at least one UFT (universal frequency translation) module 4004A. UFD and UFT modules are described above.

The demodulator/modulator facilitation module 3912 receives the I and Q signals 3926, 3928. The demodulator/modulator facilitation module 3912 optionally amplifies and filters the I and Q signals 3926, 3928. The demodulator/modulator facilitation module 3912 also optionally performs automatic gain control (AGC) functions. The AGC function is coupled with the universal frequency translation technology described herein. The demodulator/modulator facilitation module 3912 outputs processed I and Q signals 3930, 3932.

The MAC interface 3914 receives the processed I and Q signals 3930, 3932. The MAC interface 3914 preferably includes a baseband processor. The MAC interface 3914 preferably performs functions such as combining the I and Q signals 3930, 3932, and arranging the data according to the protocol/file formal being used. Other functions performed by the MAC interface 3914 and the baseband processor contained therein will be apparent to persons skilled in the relevant art(s) based on the teachings contained herein. The MAC interface 3914 outputs the baseband information signal, which is received and processed by the computer 3916 in an implementation and application specific manner.

In the example embodiment of FIG. 39, the demodulation function is distributed among the receiver 3906, the demodulator/modulator facilitation module 3912, and a baseband processor contained in the MAC interface 3914. The functions collectively performed by these components include, but are not limited to, de-spreading the information, differentially decoding the information, tracking the carrier phase, de-scrambling, recreating the data clock, and combining the I and Q signals. The invention is not limited to this arrangement. These demodulation-type functions can be centralized in a single component, or distributed in other ways.

The operation of the WLAN interface/modem 3902 when transmitting shall now be described.

A baseband information signal 3936 is received by the MAC interface 3914 from the computer 3916. The MAC interface 3914 preferably performs functions such as splitting the baseband information signal to form I and Q signals 3930, 3932, and arranging the data according to the protocol/file formal being used. Other functions performed by the MAC interface 3914 and the baseband processor contained therein will be apparent to persons skilled in the relevant art(s) based on the teachings contained herein.

The demodulator/modulator facilitation module 3912 filters and amplifies the I and Q signals 3930, 3932. The demodulator/modulator facilitation module 3912 outputs processed I and Q signals 3942, 3944. Preferably, at least some filtering and/or amplifying components in the demodulator/modulator facilitation module 3912 are used for both the transmit and receive paths.

The transmitter 3910 up-converts the processed I and Q signals 3942, 3944, and combines the up-converted I and Q signals. This up-converted/combined signal is amplified by the LNA/PA 3904, and then transmitted via the antenna 3903.

Figure 41:
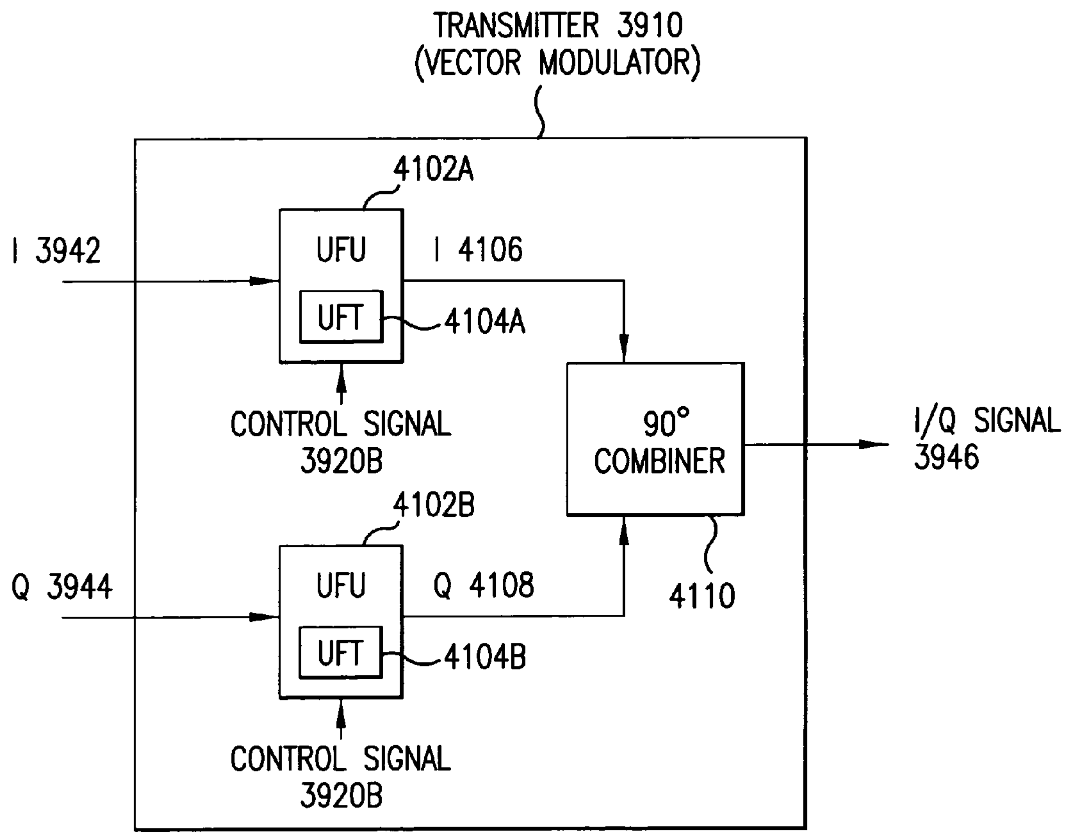
FIG. 41 illustrates a WLAN transmitter according to an embodiment of the invention.

FIG. 41 illustrates an example transmitter 3910 according to an embodiment of the invention. The device in FIG. 41 can also be called a vector modulator. The "transmit" function performed by the WLAN interface/modem 3902 can be considered to be all processing performed by the WLAN interface/modem 3902 from receipt of baseband information through the LNA/PA 3904.

I and Q signals 3942, 3944 are received by UFU (universal frequency up-conversion) modules 4102A, 4102B. The UFU modules 4102A, 4102B each includes at least one UFT module 4104A, 4104B. The UFU modules 4102A, 4102B up-convert I and Q signals 3942, 3944. The UFU modules 4102A, 4102B output up-converted I and Q signals 4106, 4108. The 90 degree combiner 4110 effectively phase shifts either the I signal 4106 or the Q signal 4108 by 90 degrees, and then combines the phase shifted signal with the unshifted signal to generate a combined, up-converted I/Q signal 3946.

In the example embodiment of FIG. 39, the modulation function is distributed among the transmitter 3910, the demodulator/modulator facilitation module 3912, and a baseband processor contained in the MAC interface 3914. The functions collectively performed by these components include, but are not limited to, differentially encoding data, splitting the baseband information signal into I and Q signals, scrambling data, and data spreading. The invention is not limited to this arrangement. These modulation-type functions can be centralized in a single component, or distributed in other ways.

The components in the WLAN interface/modem 3902 are preferably controlled by the MAC interface 3914 in operation with the MAC 3918 in the computer 3916. This is represented by the distributed control arrow 3940 in FIG. 39. Such control includes setting the frequency, data rate, whether receiving or transmitting, and other communication characteristics/modes that will be apparent to persons skilled in the relevant art(s) based on the teachings contained herein.

Figure 42A:
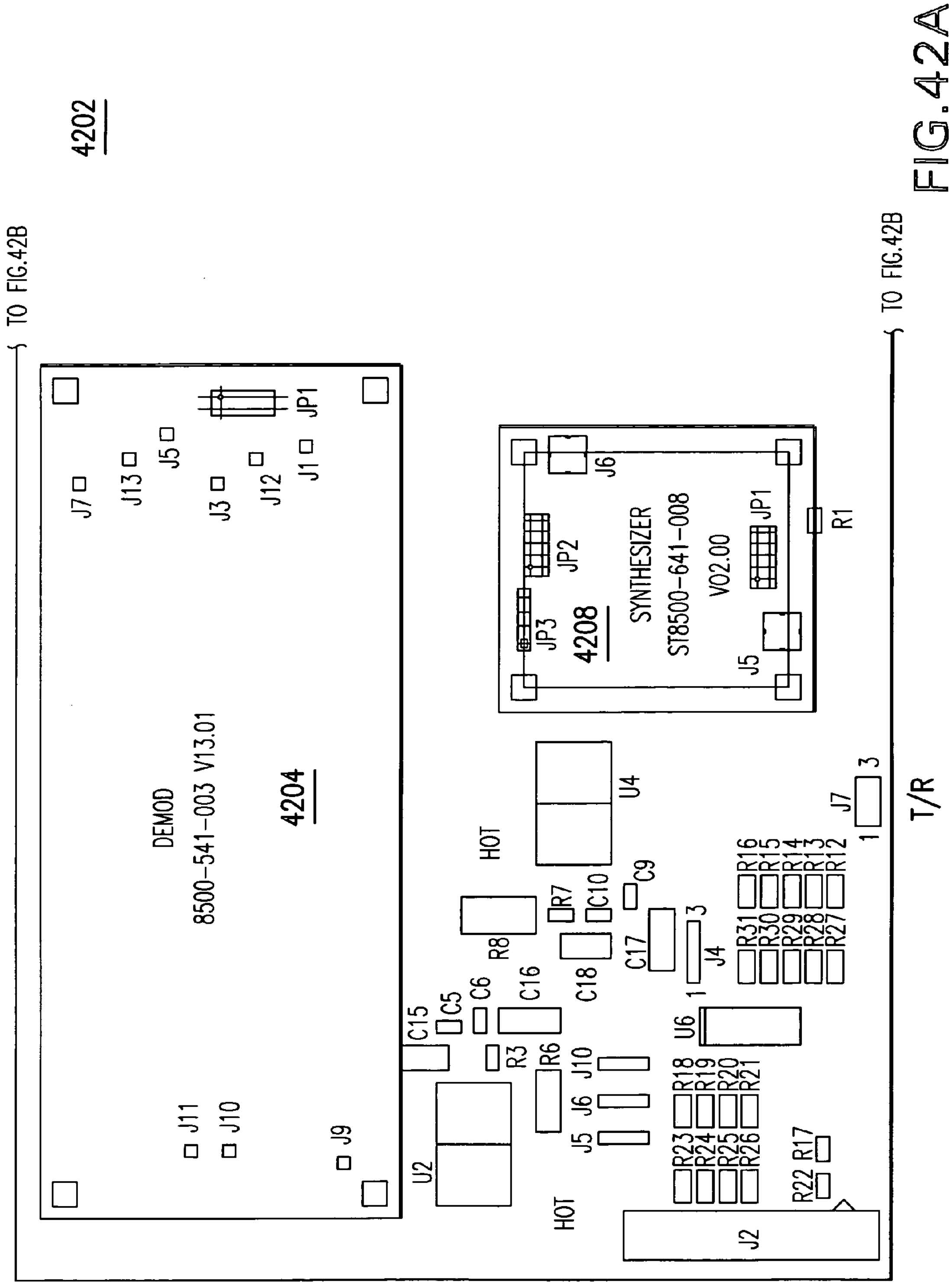
FIGS. 42–44 are example implementations of a WLAN interface.
Figure 42B:
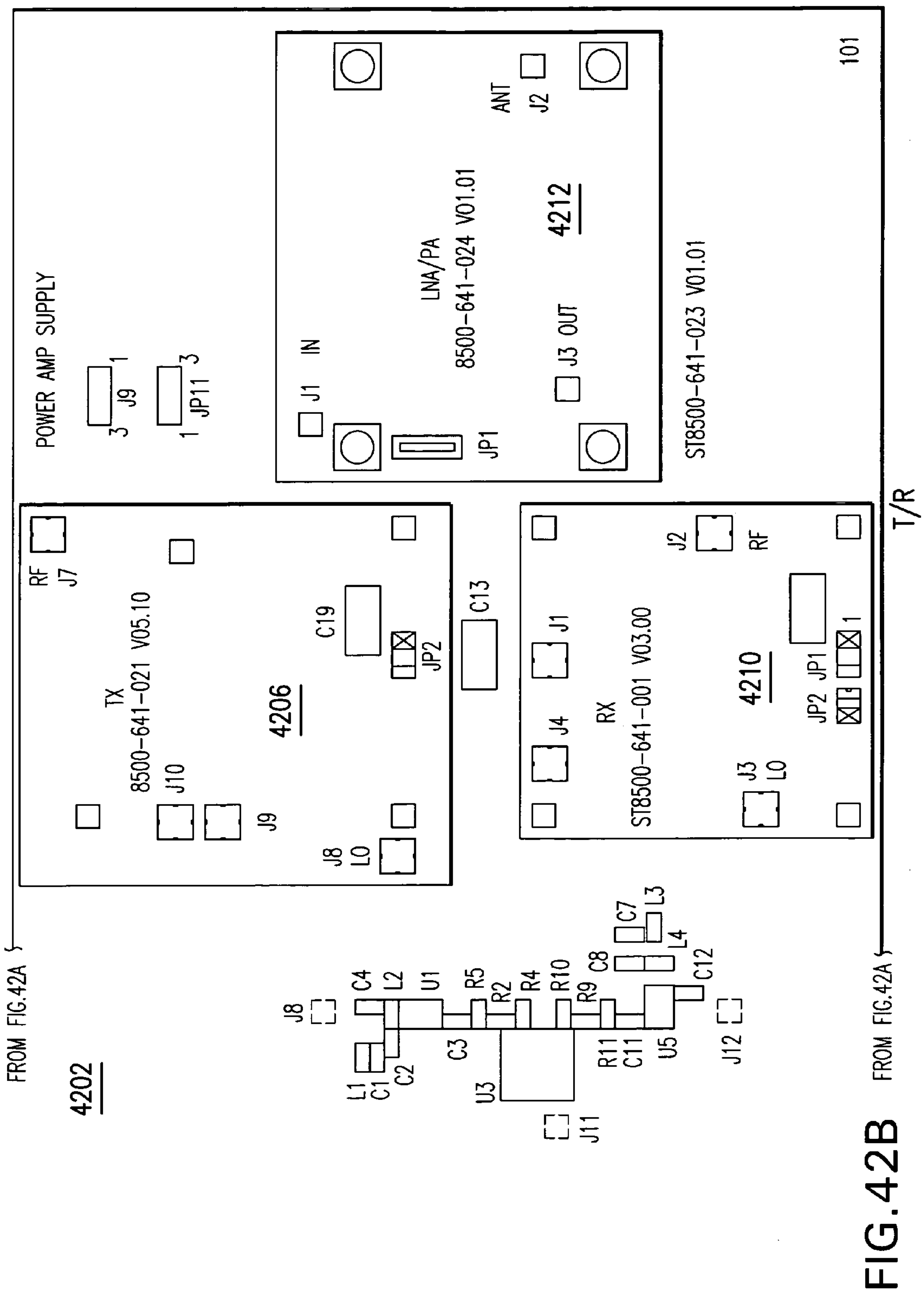

FIG. 42 illustrates an example implementation of the WLAN interface/modem 3902. It is noted that in this implementation example, the MAC interface 3914 is located on a different board.

Figure 62:
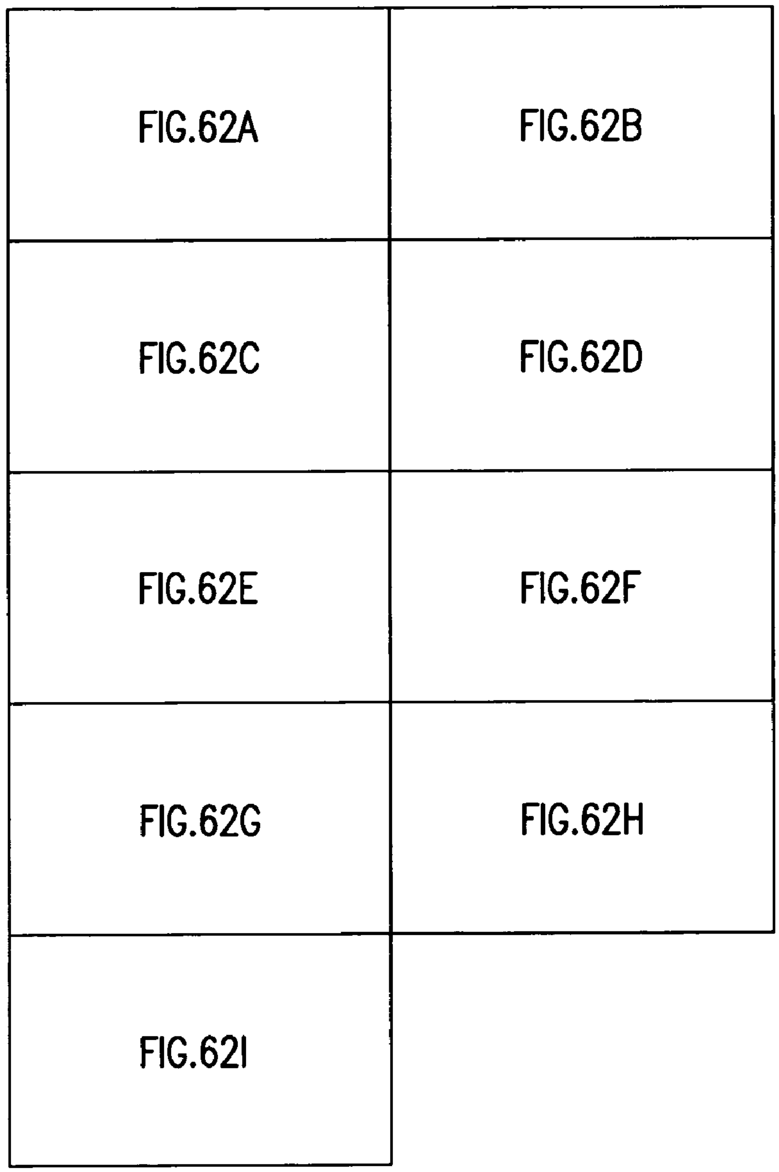
Figure 62A:
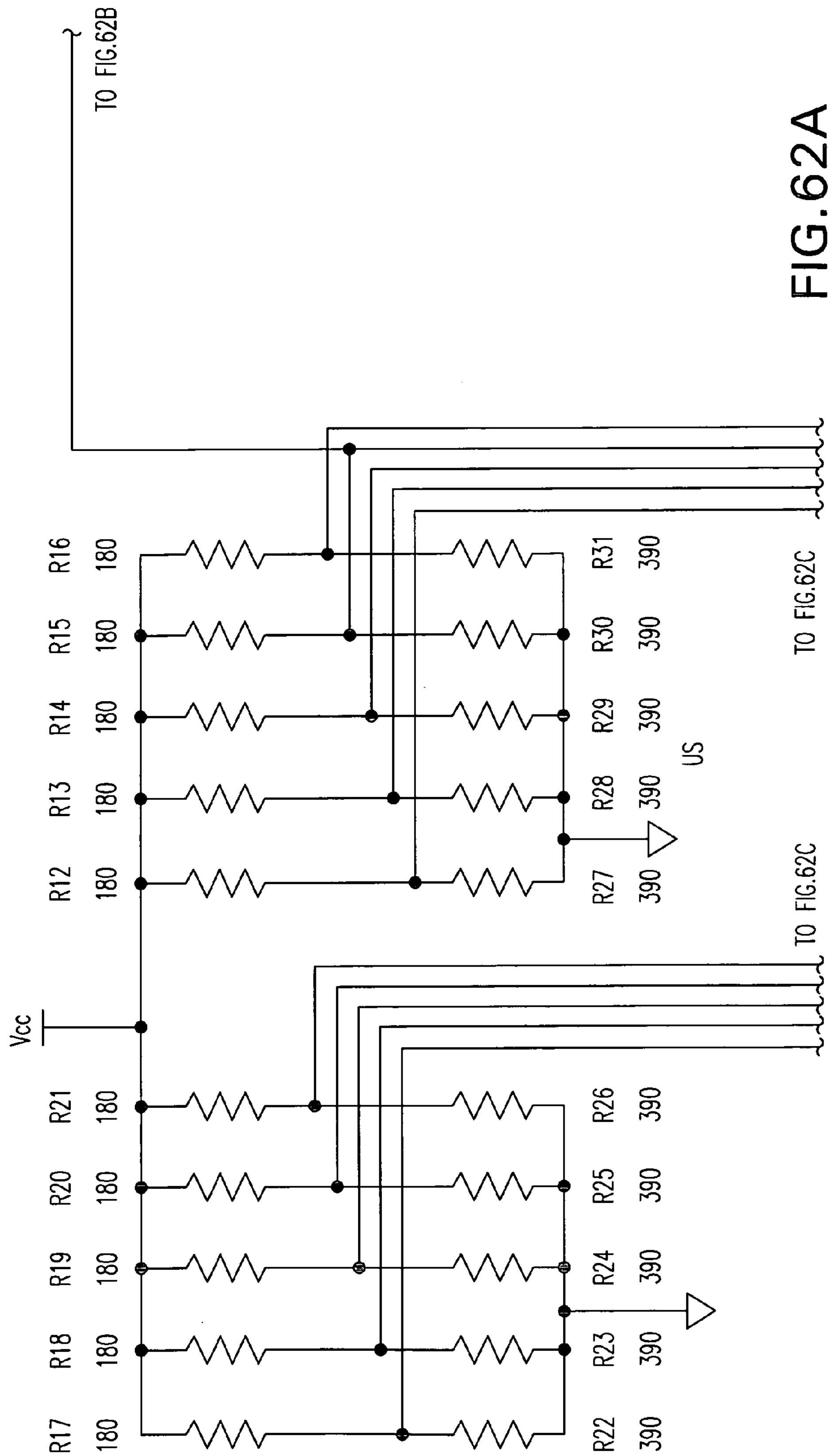
Figure 62B:
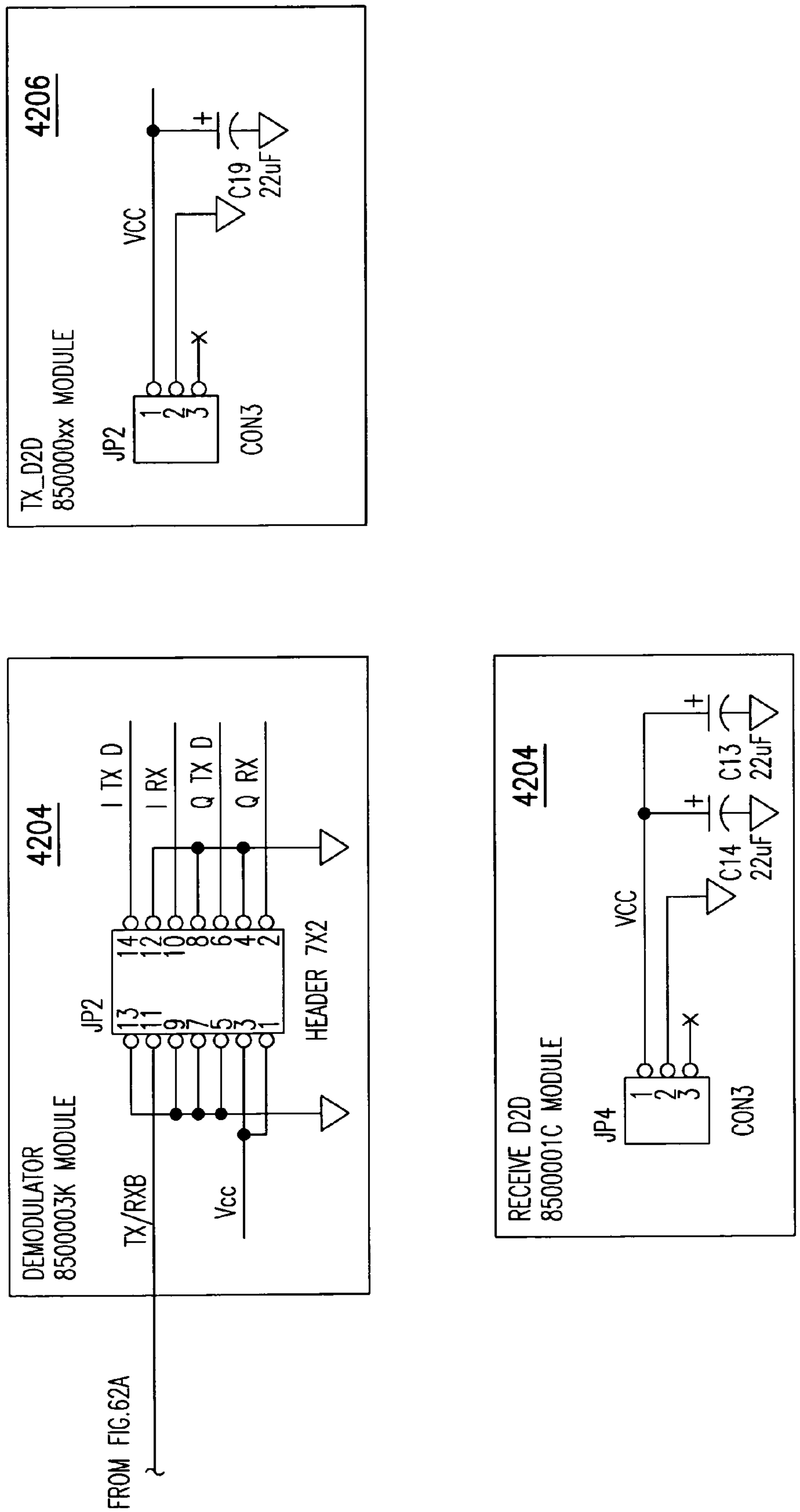
Figure 62C:
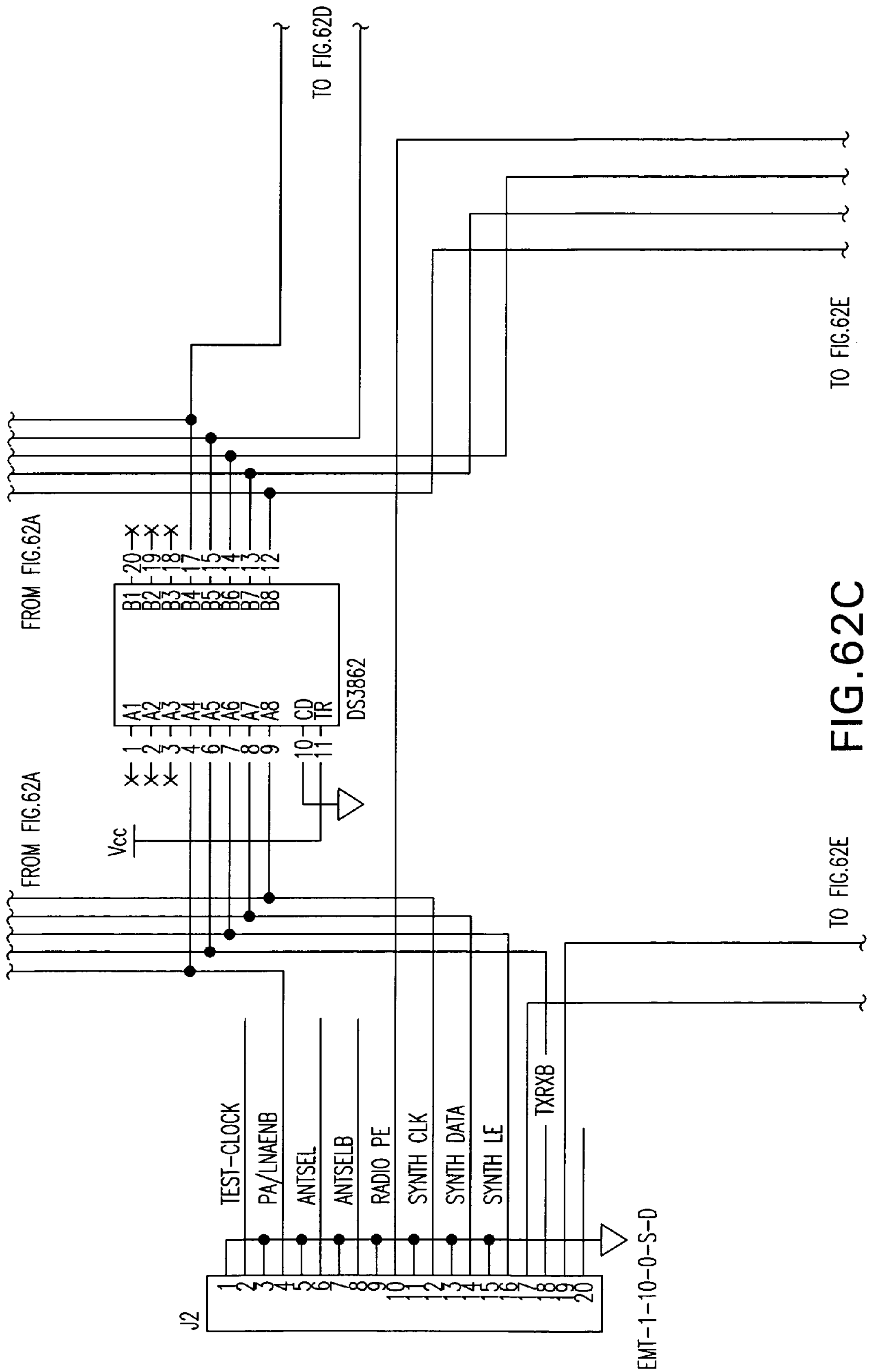
Figure 62D:
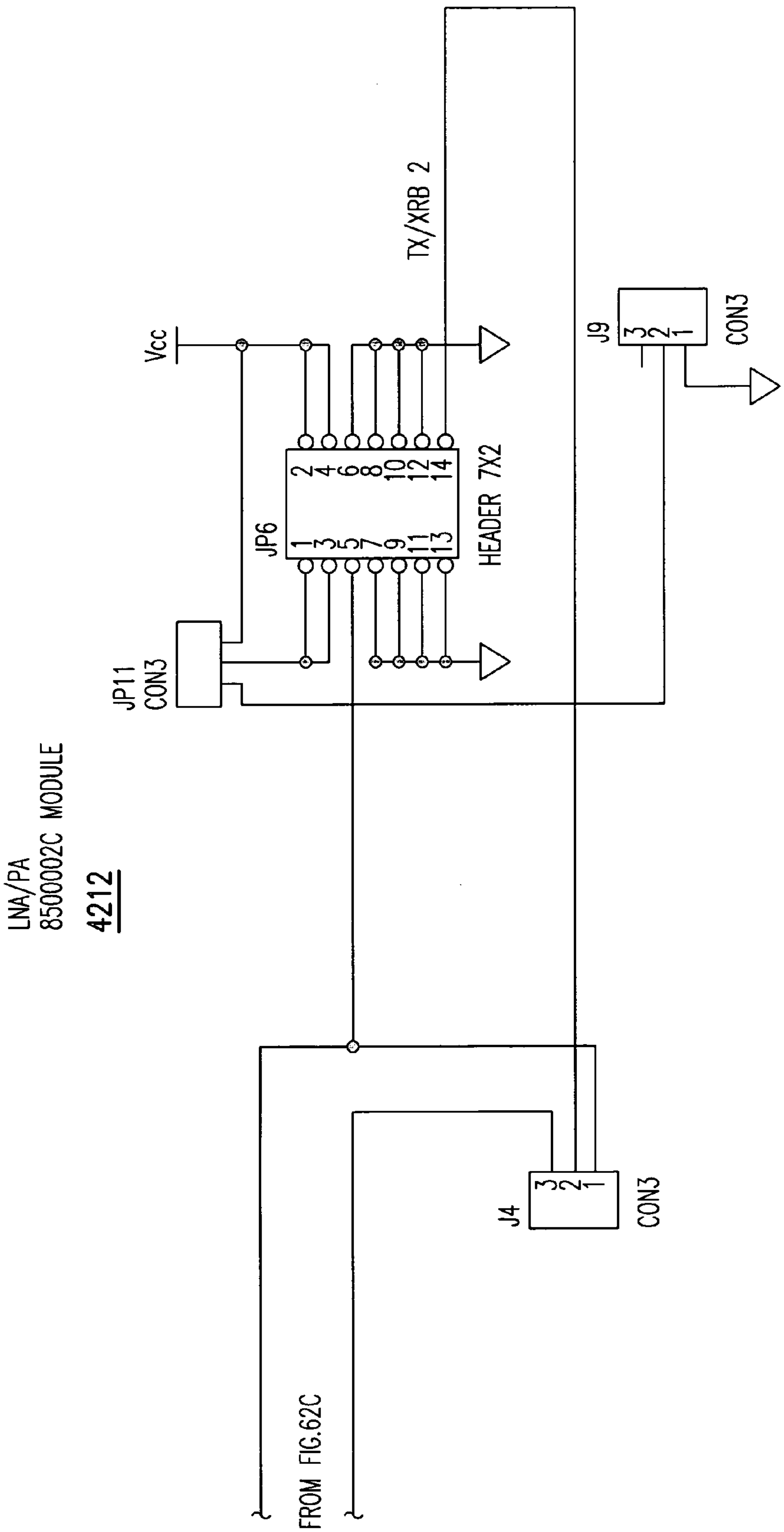
Figure 62E:
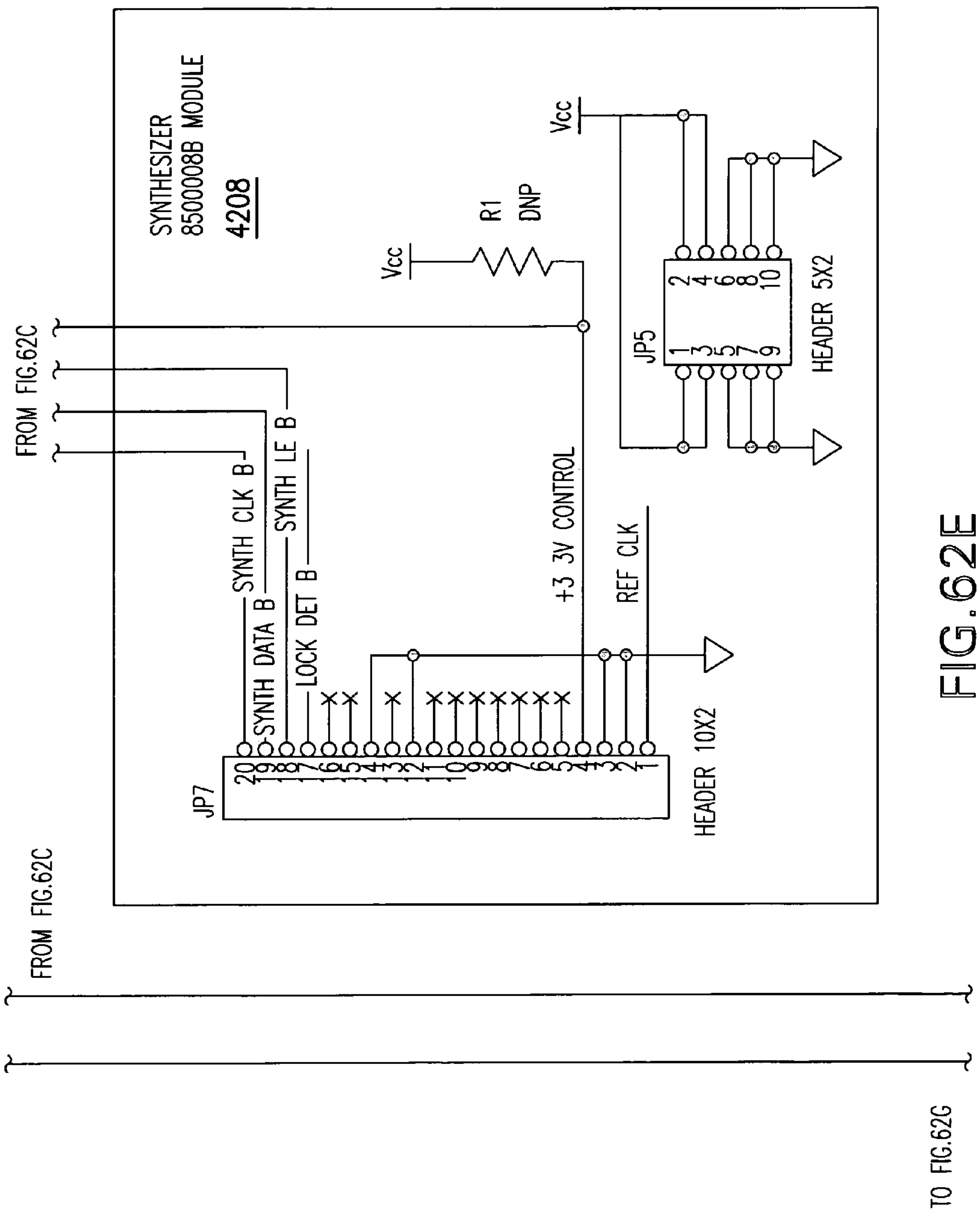
Figure 62F:
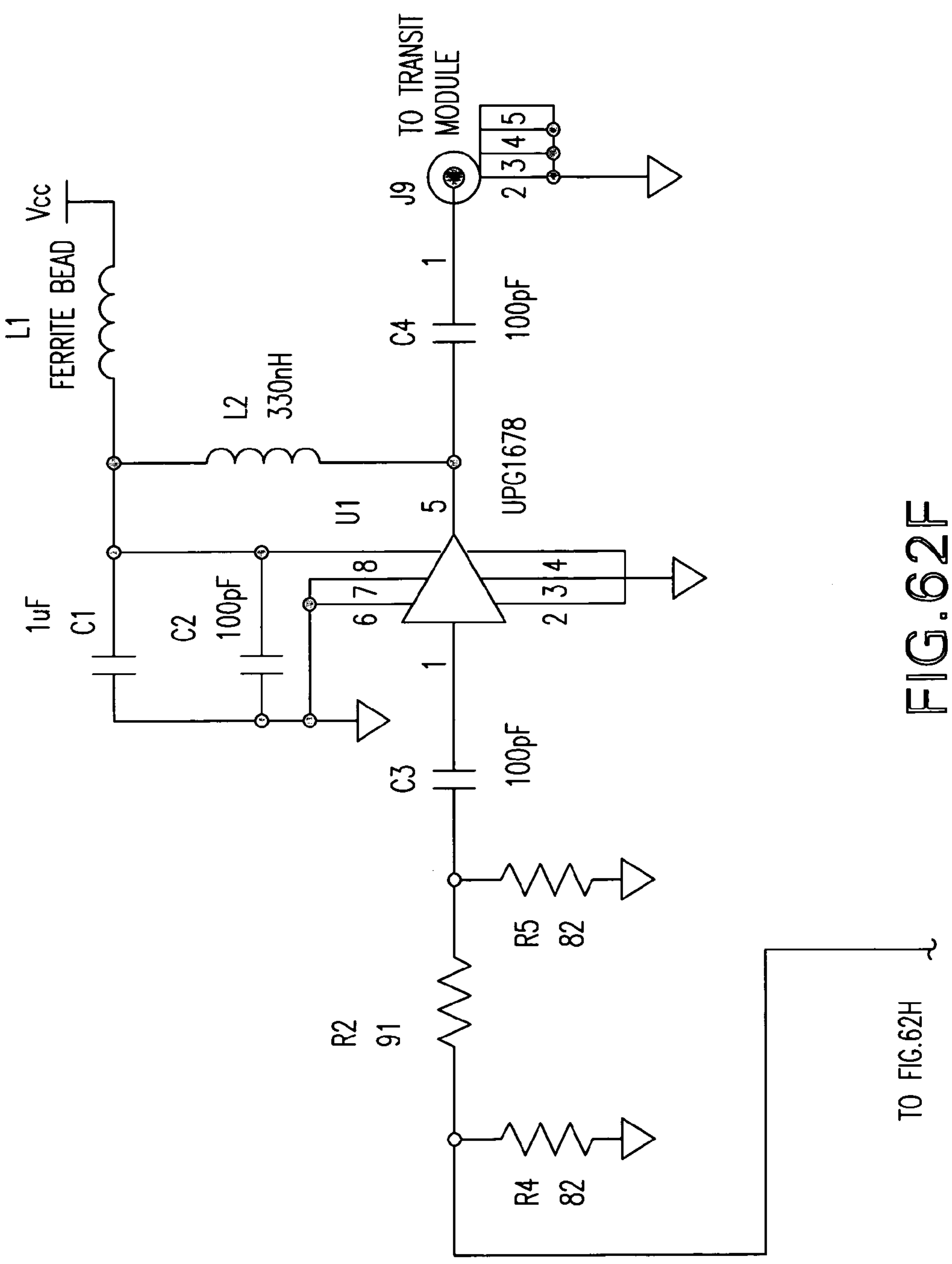
Figure 62G:
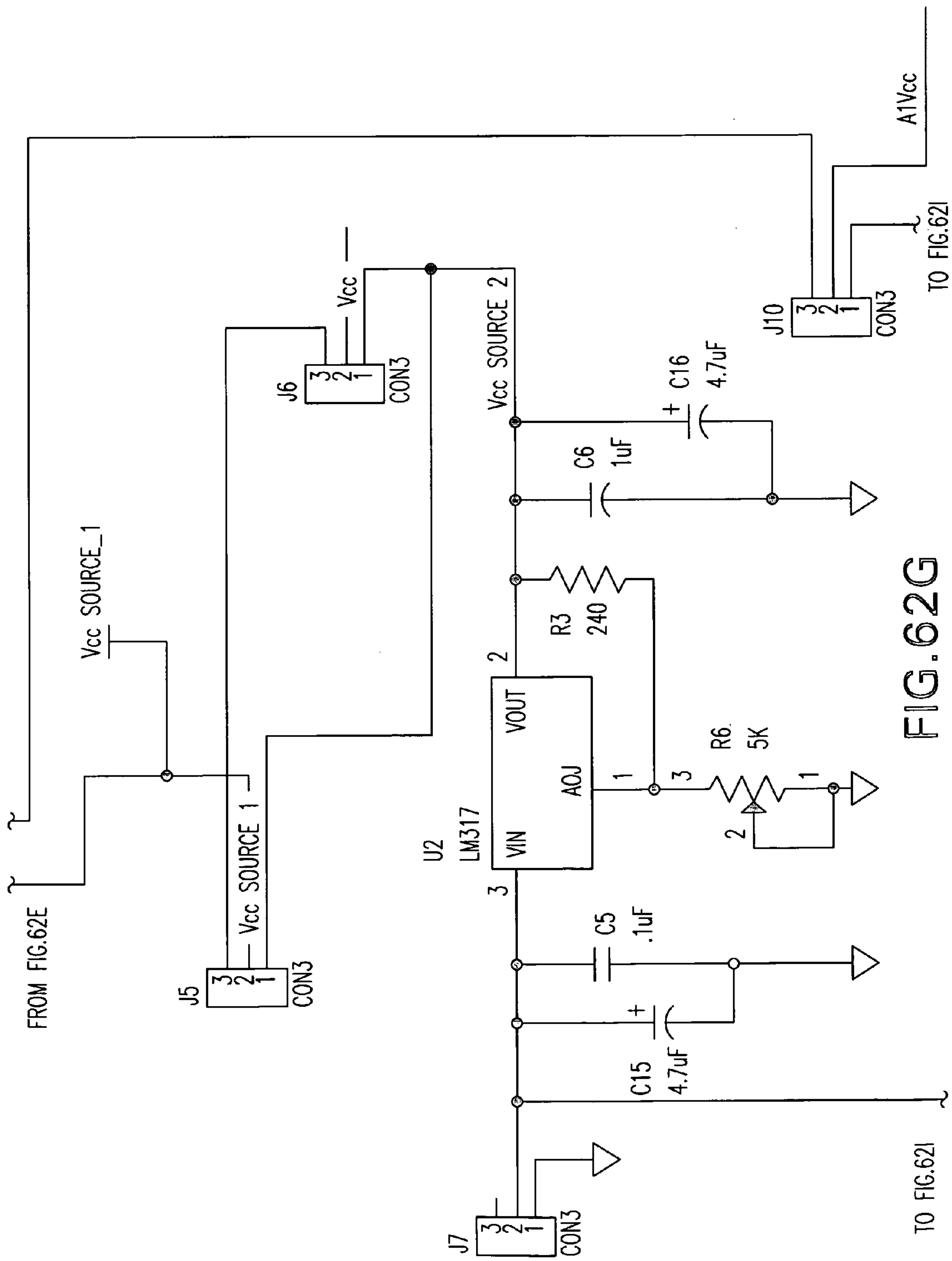
Figure 62H:
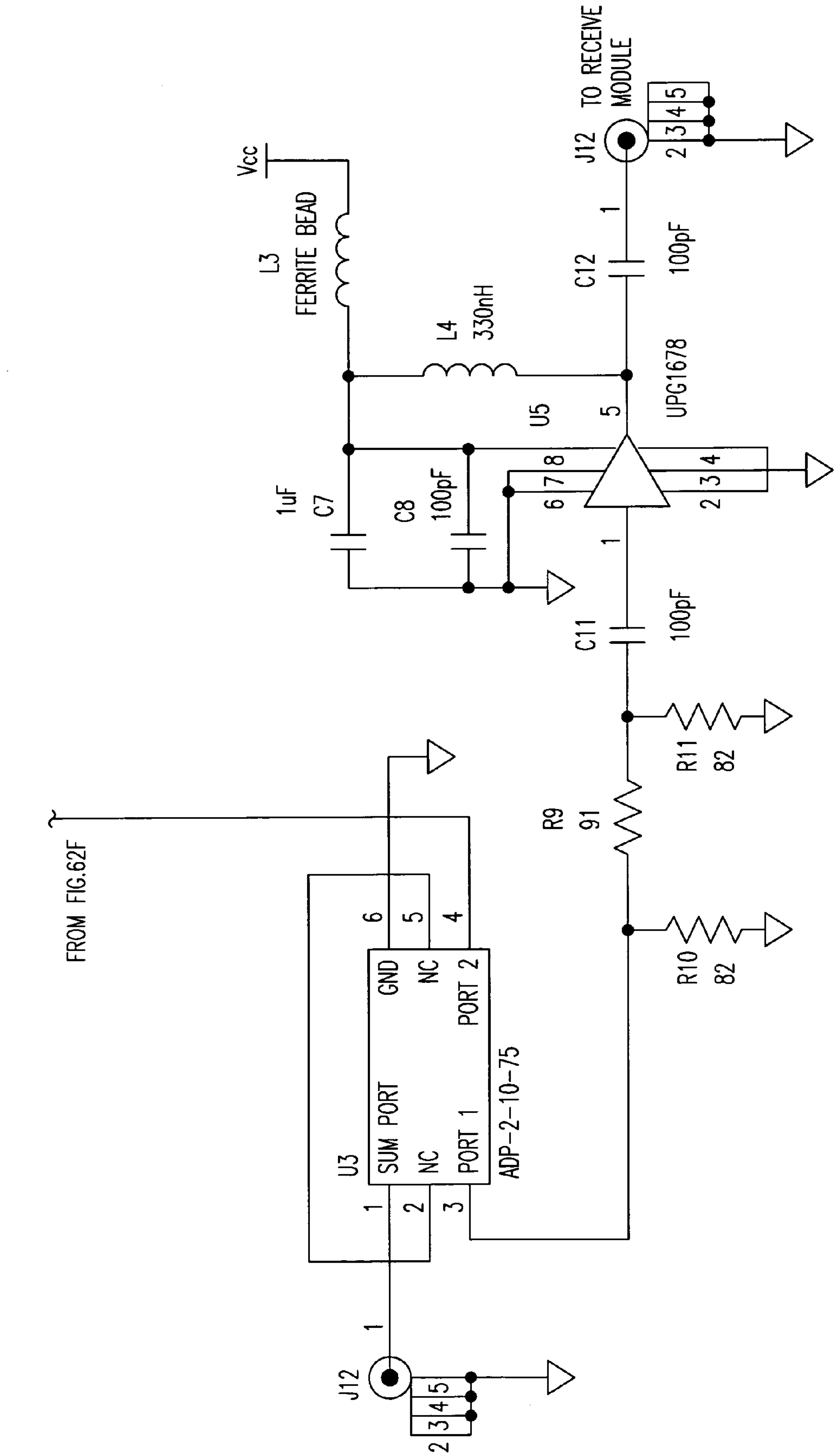
Figure 62I:
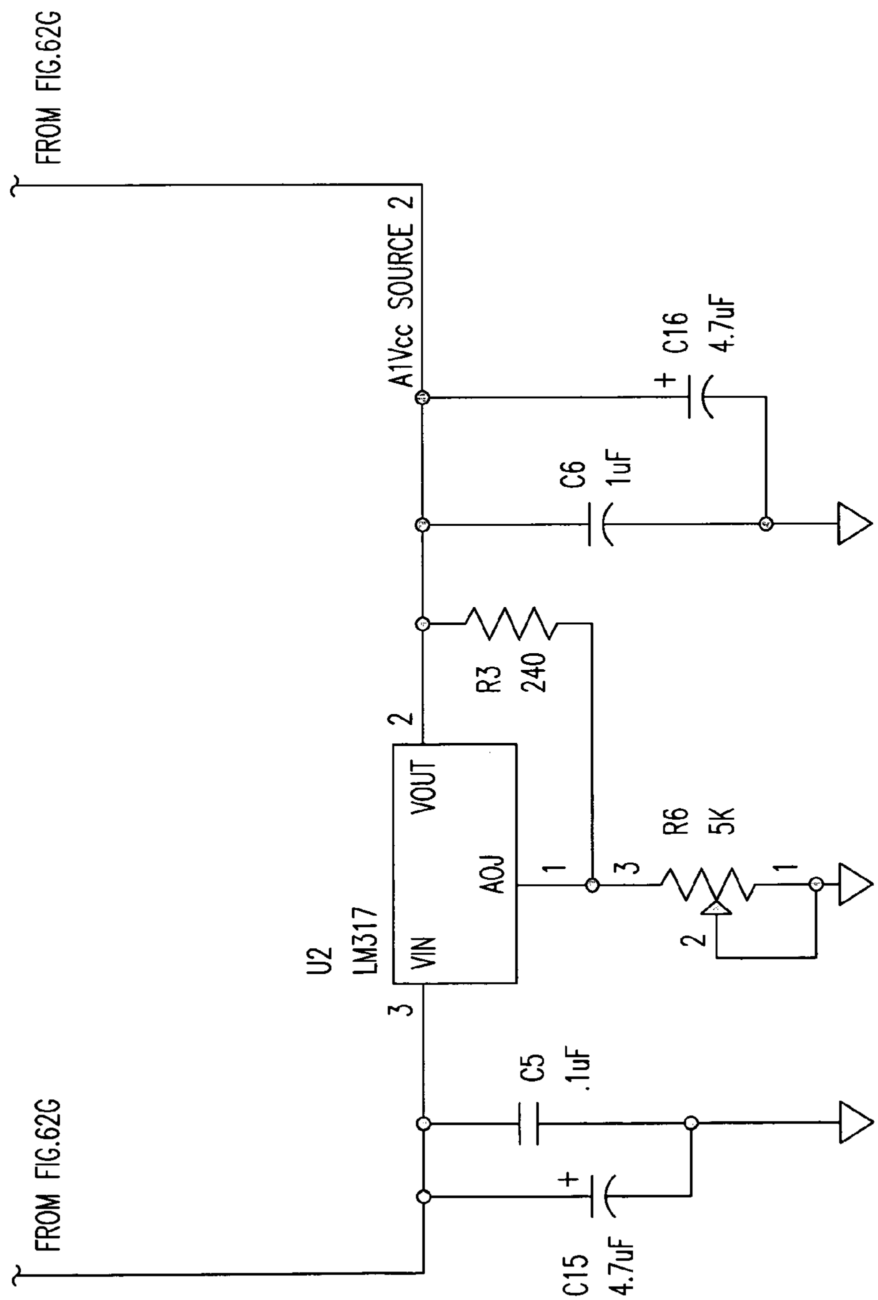

FIG. 62 is an example motherboard corresponding to FIG. 42. FIG. 63 is an example bill-of-materials (BOM) list for the motherboard of FIG. 62. This and other implementations are provided herein for example purposes only. Other implementations will be apparent to persons skilled in the relevant art(s), and the invention is directed to such other implementations.

Figure 102:
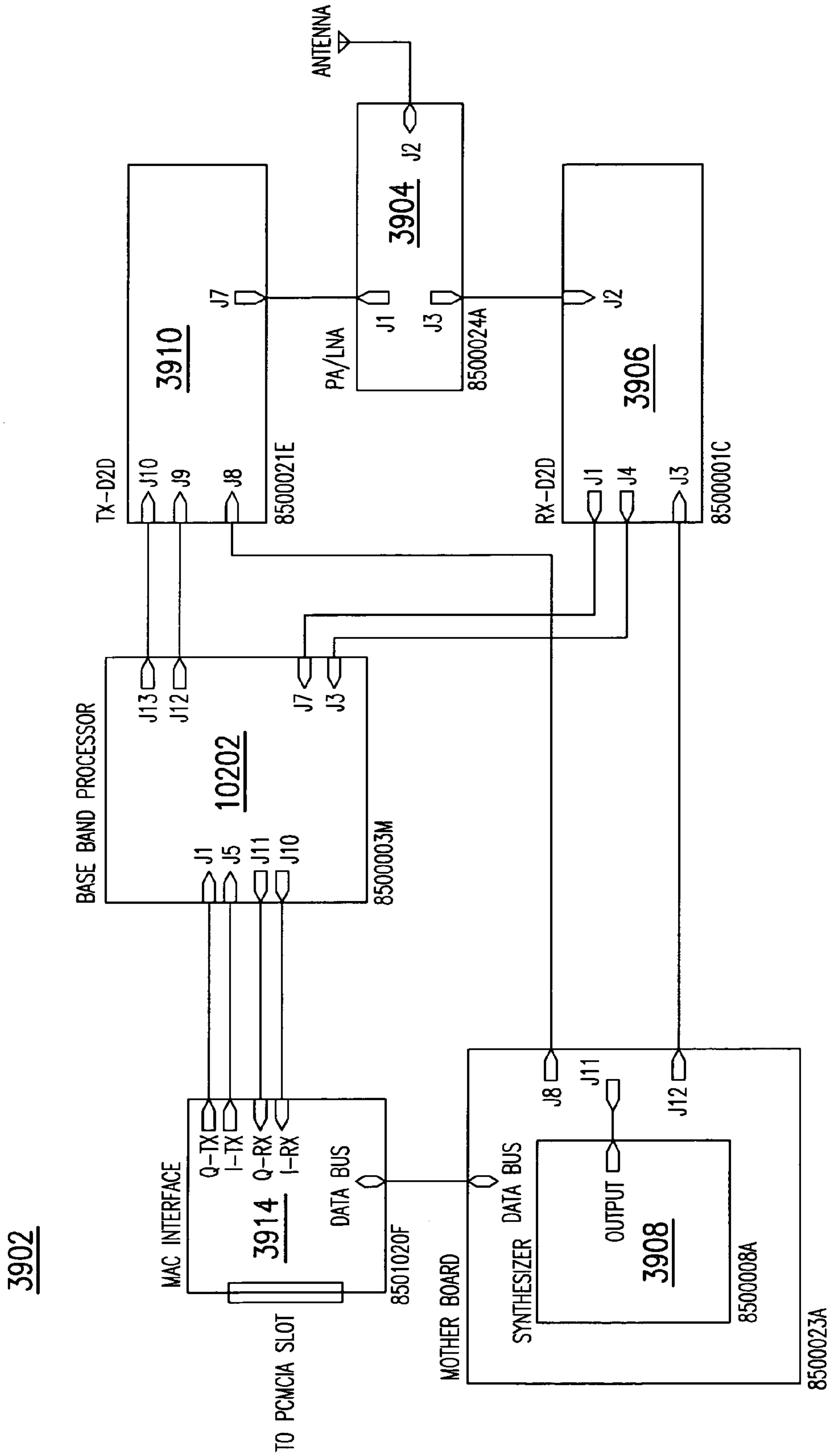
FIG. 102 is an example PCMCIA test bed assembly for a WLAN interface according to an embodiment of the invention.

FIG. 102 illustrates an alternate example PCMCIA test bed assembly for a WLAN interface/modem 3902 according to an embodiment of the invention. In this embodiment, the baseband processor 10202 is separate from the MAC interface 3914.

Figure 43A:
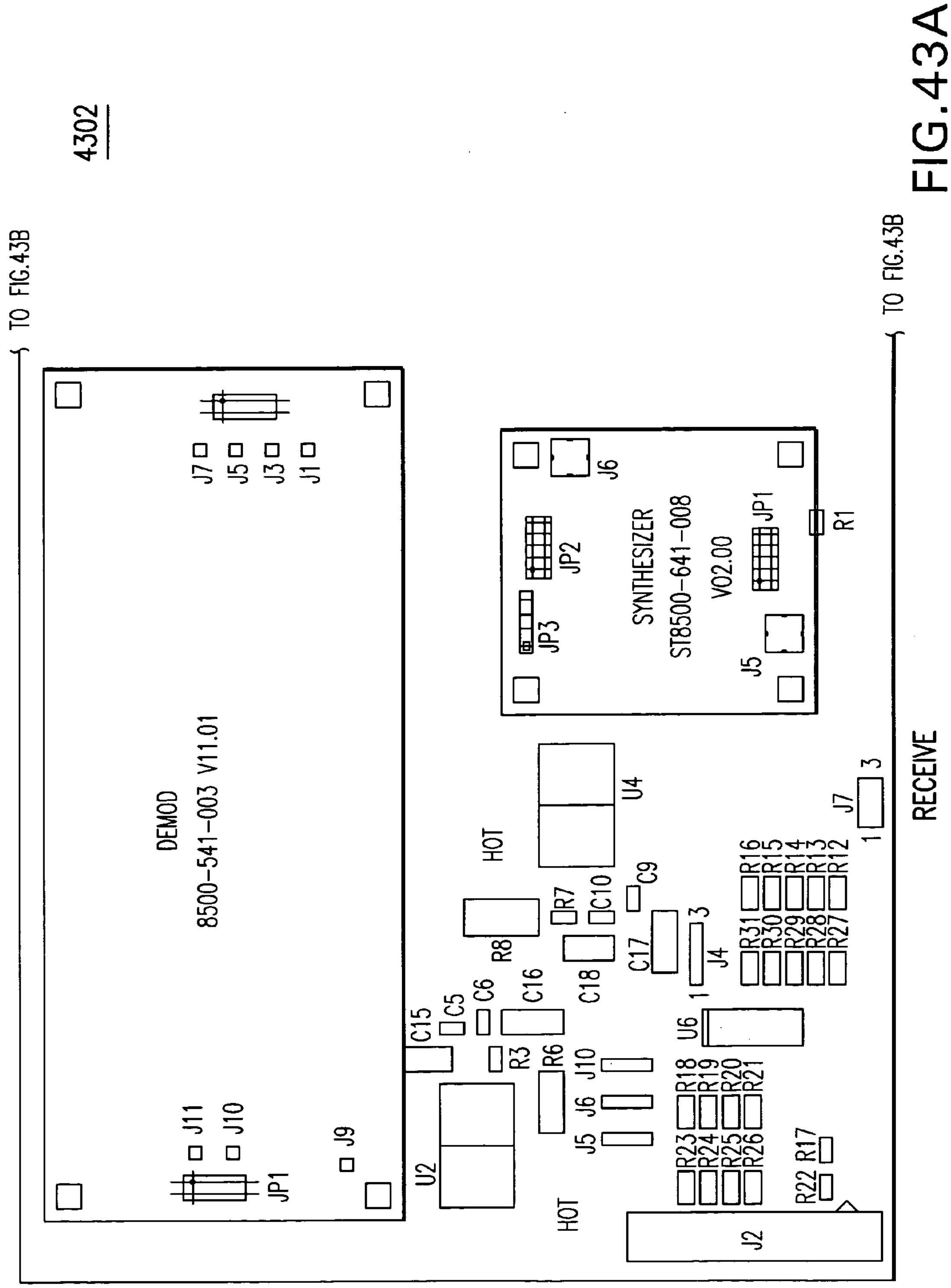
Figure 43B:
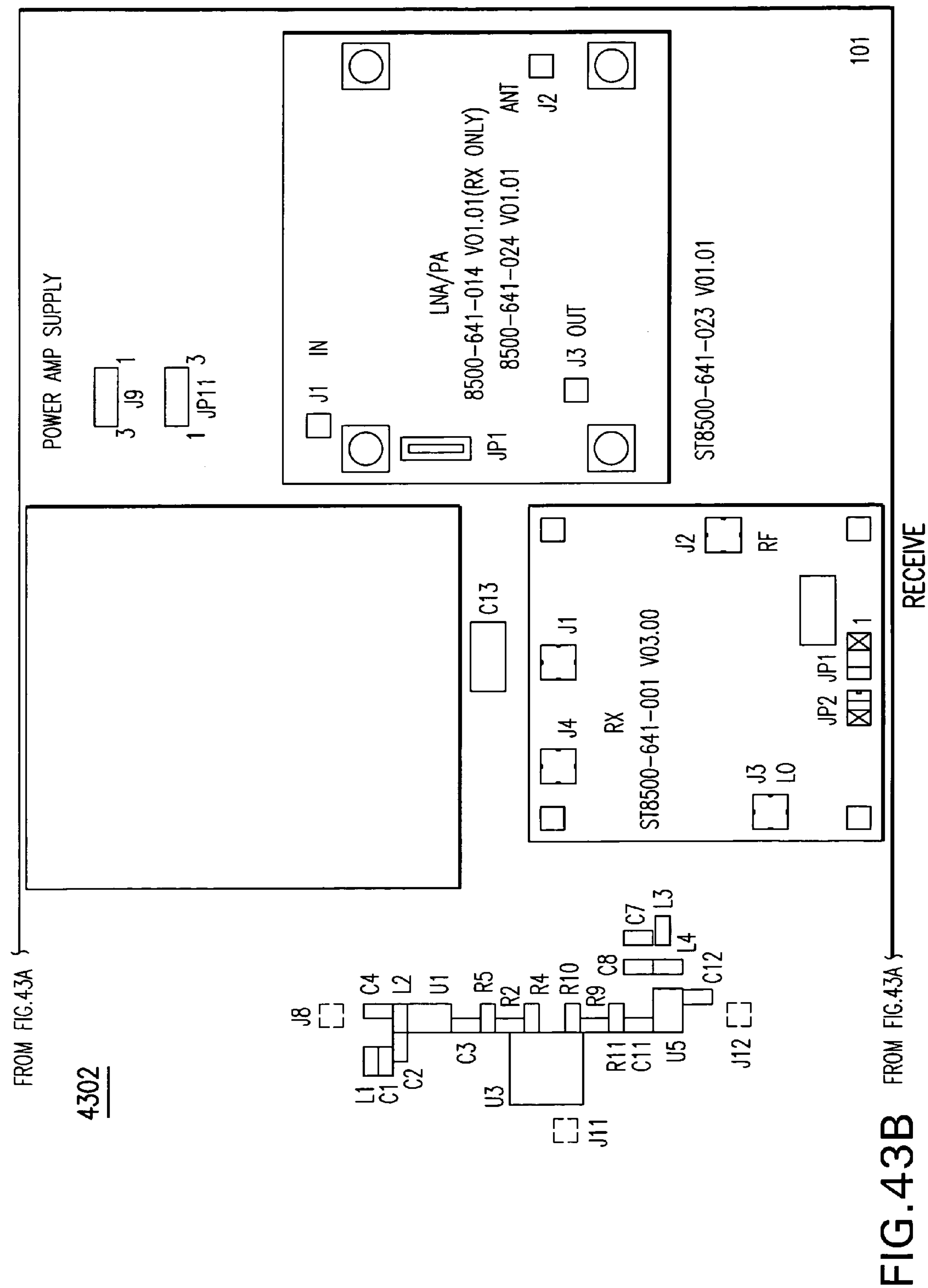
Figure 44A:
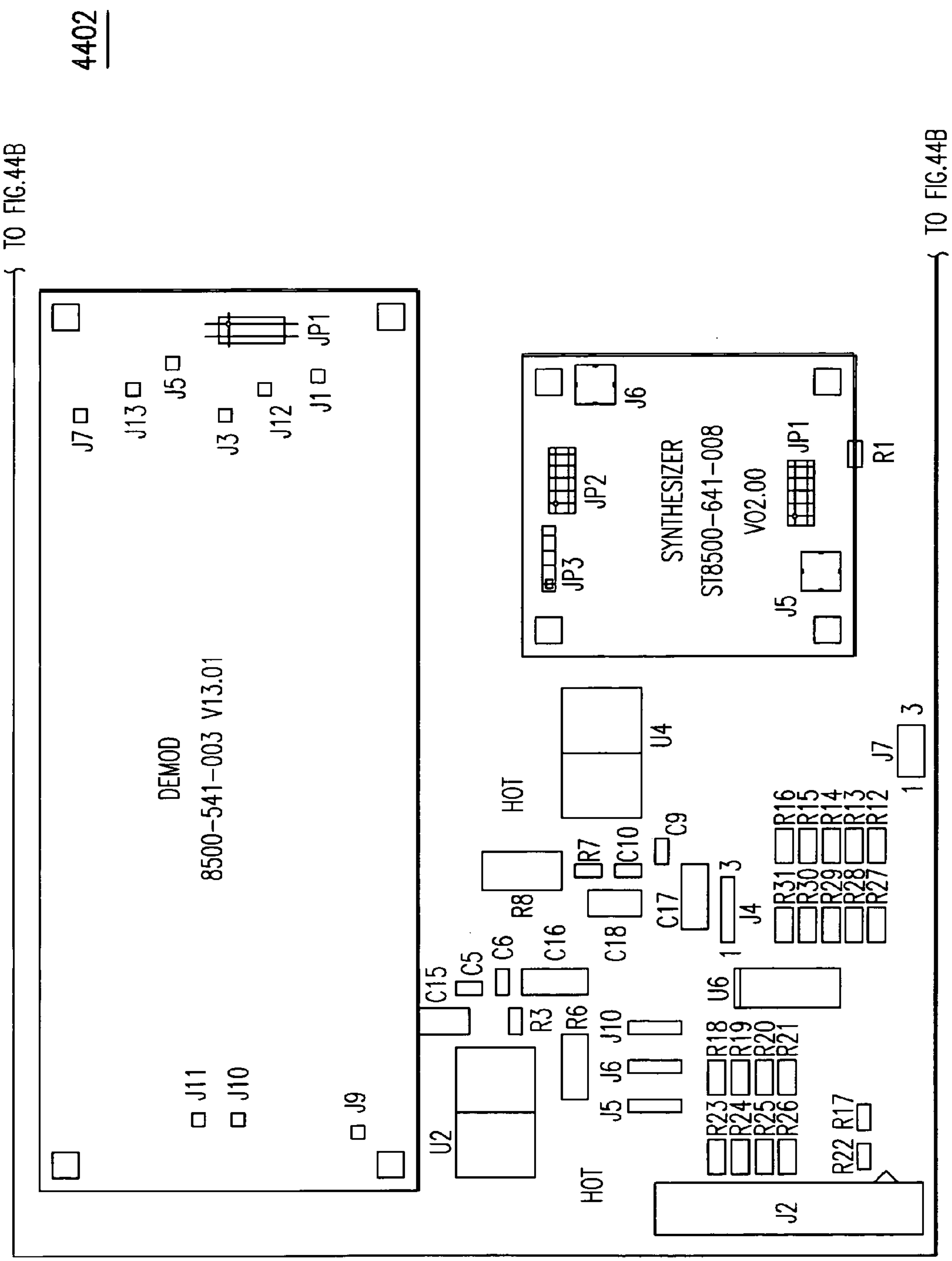
Figure 44B:
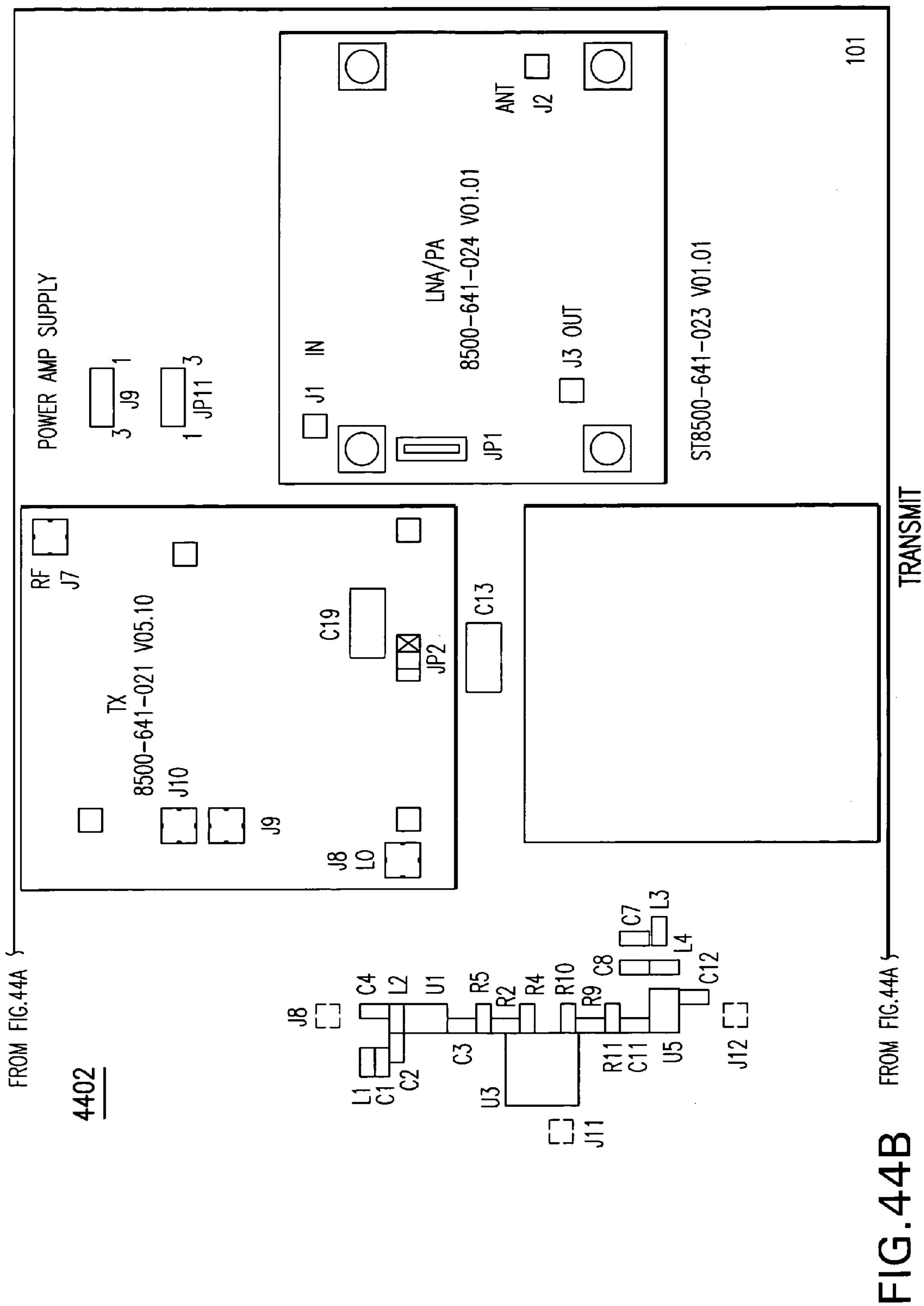

In some applications, it is desired to separate the receive path and the transmit path. FIG. 43 illustrates an example receive implementation, and FIG. 44 illustrates an example transmit implementation.

6.3.2. Receiver

Figure 53A:
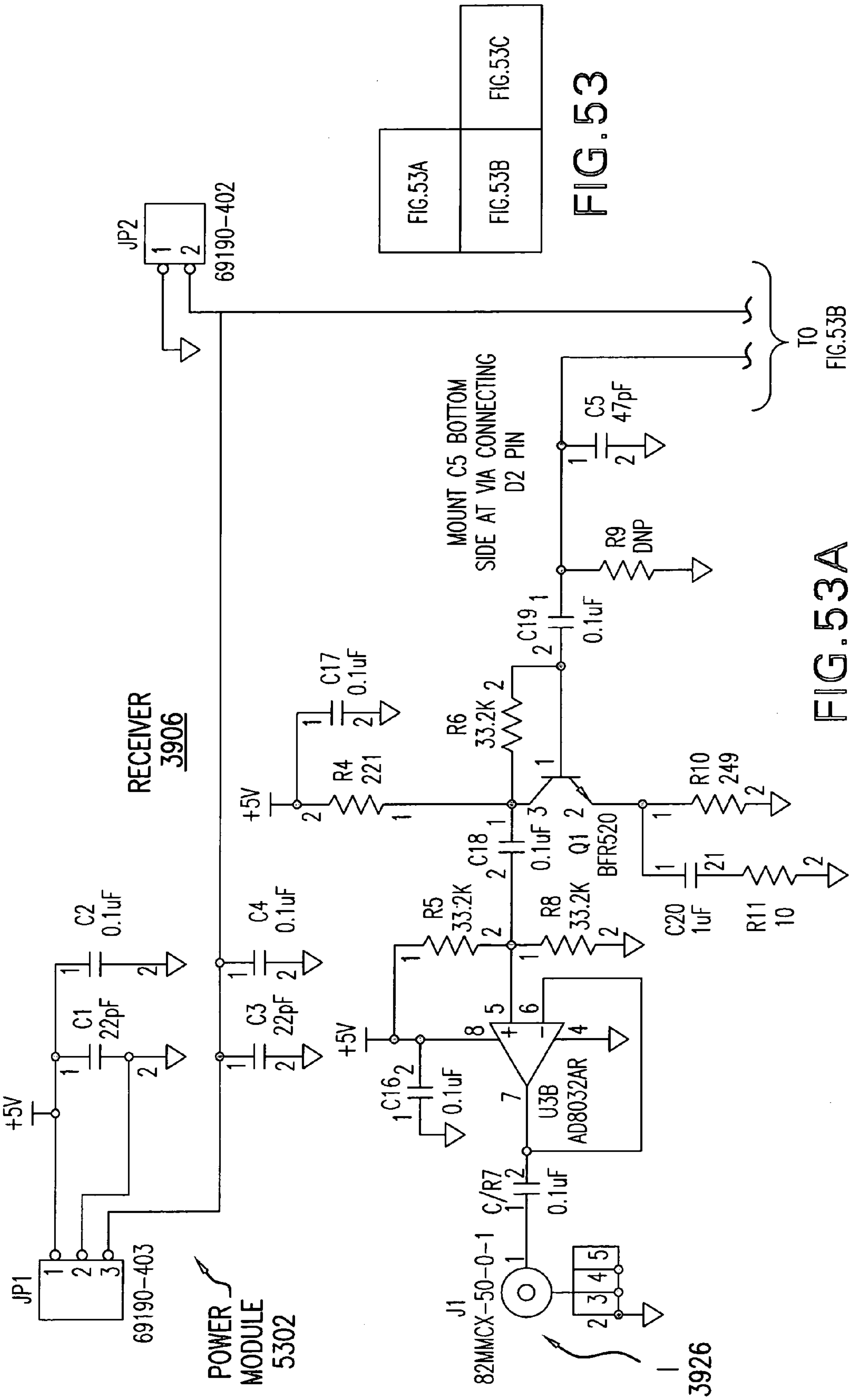
Figure 53B:
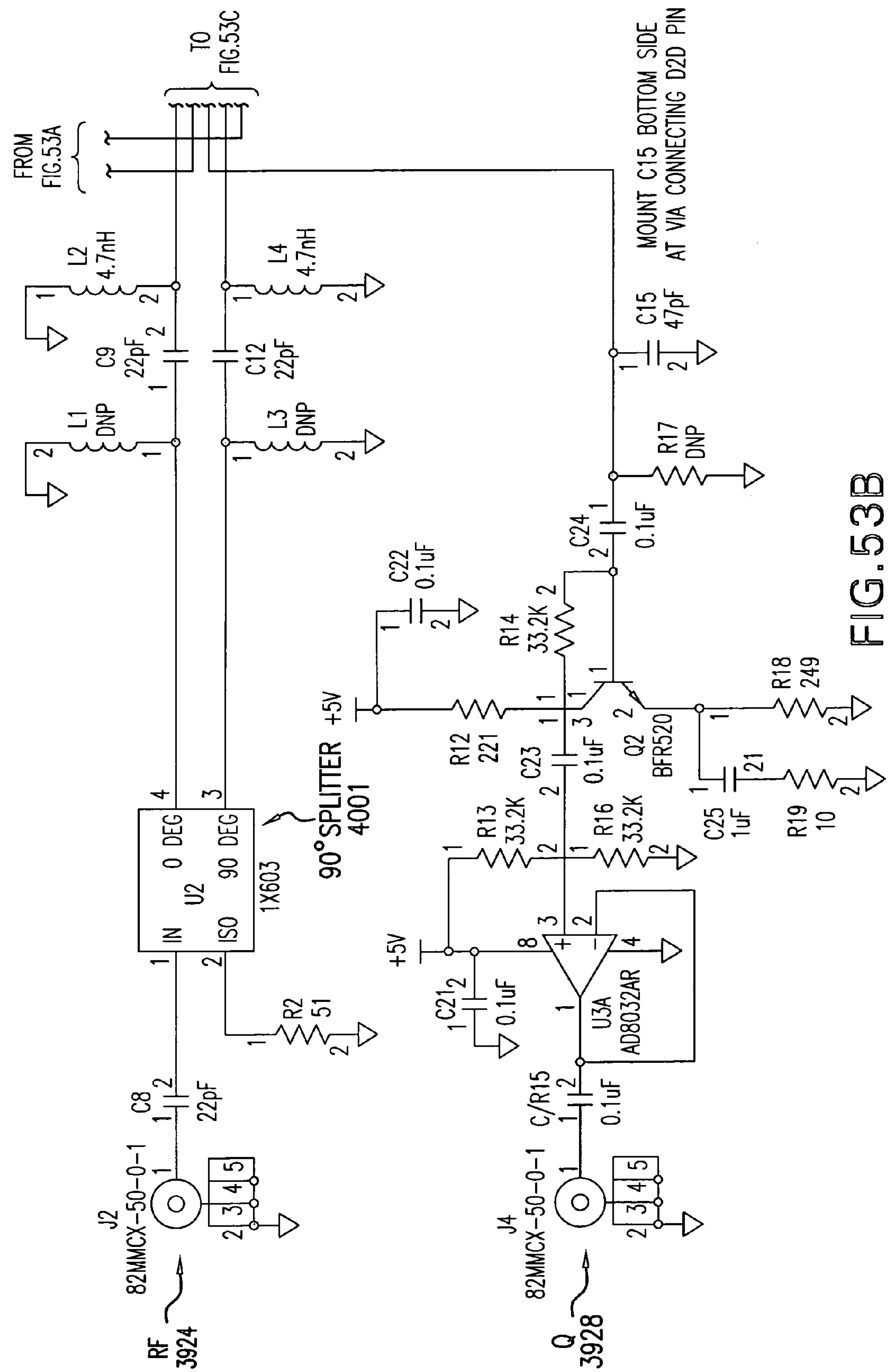
Figure 53C:
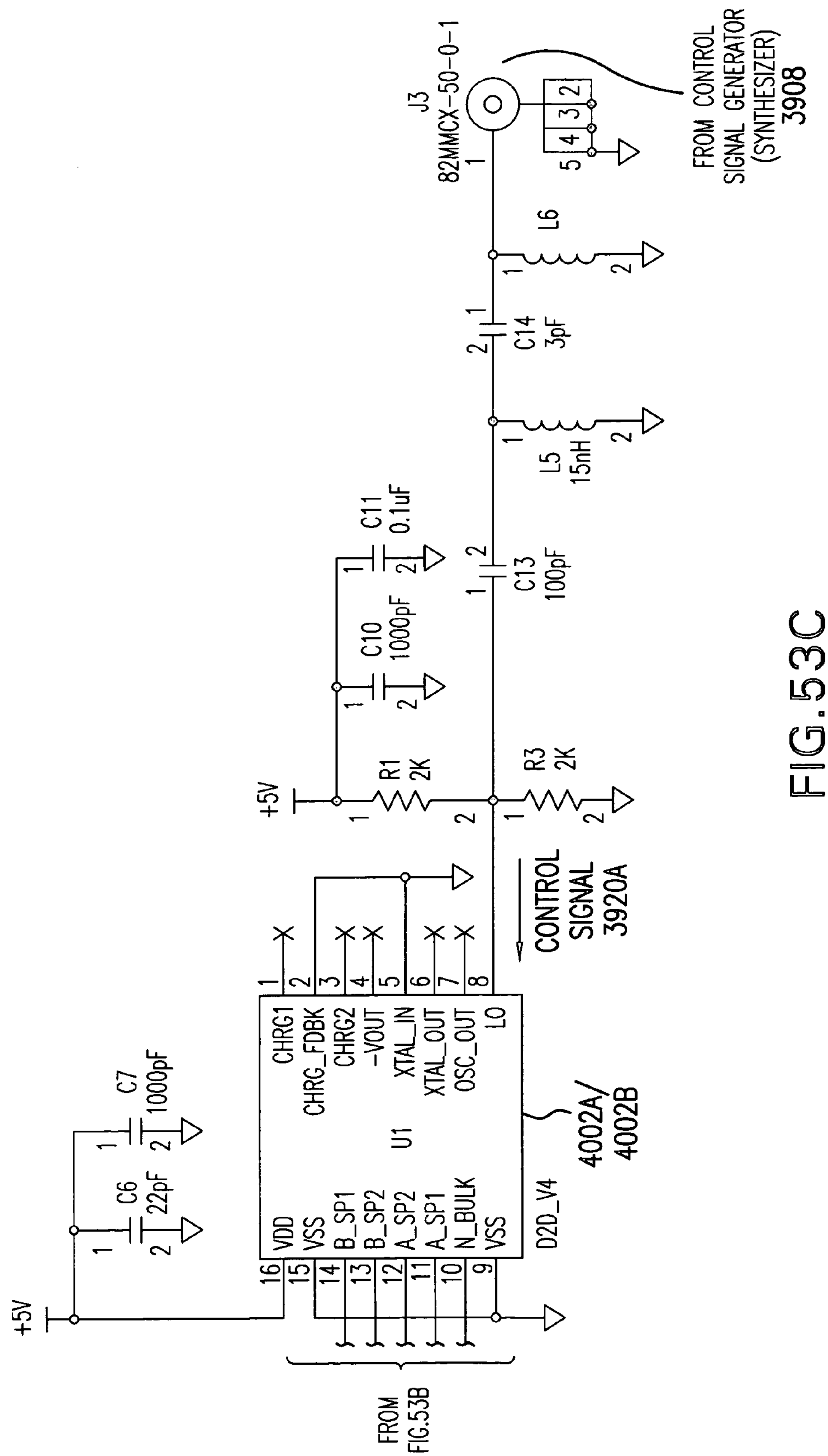

An example implementation of the receiver 3906 (vector demodulator) is shown in FIG. 53. An example BOM list for the receiver 3906 of FIG. 53 is shown in FIG. 54. It is noted that the invention is not limited to this example.

6.3.3. Transmitter

An example implementation of the transmitter 3910 (vector modulator) is shown in FIGS. 57–60. The data conditioning interfaces 5802 in FIG. 58 effectively pre-process the I and Q signals 3942, 3944 before being received by the UFU modules 4102. An example BOM list for the transmitter 3910 of FIGS. 57–60 is shown in FIGS. 61A and 61B. It is noted that the invention is not limited to this example.

6.3.4. Demodulator/Modulator Facilitation Module

Figure 47:
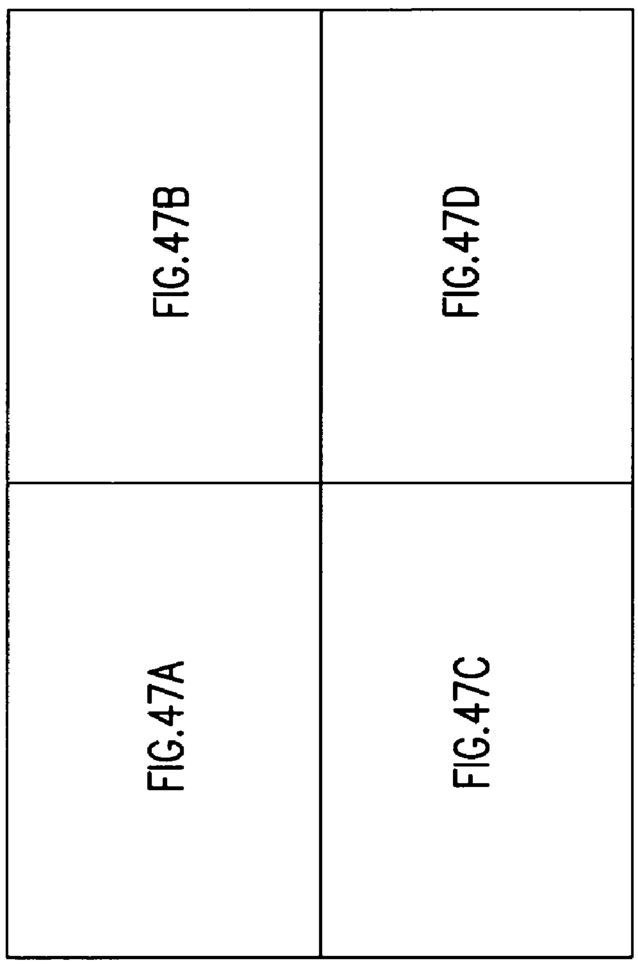
Figure 47A:
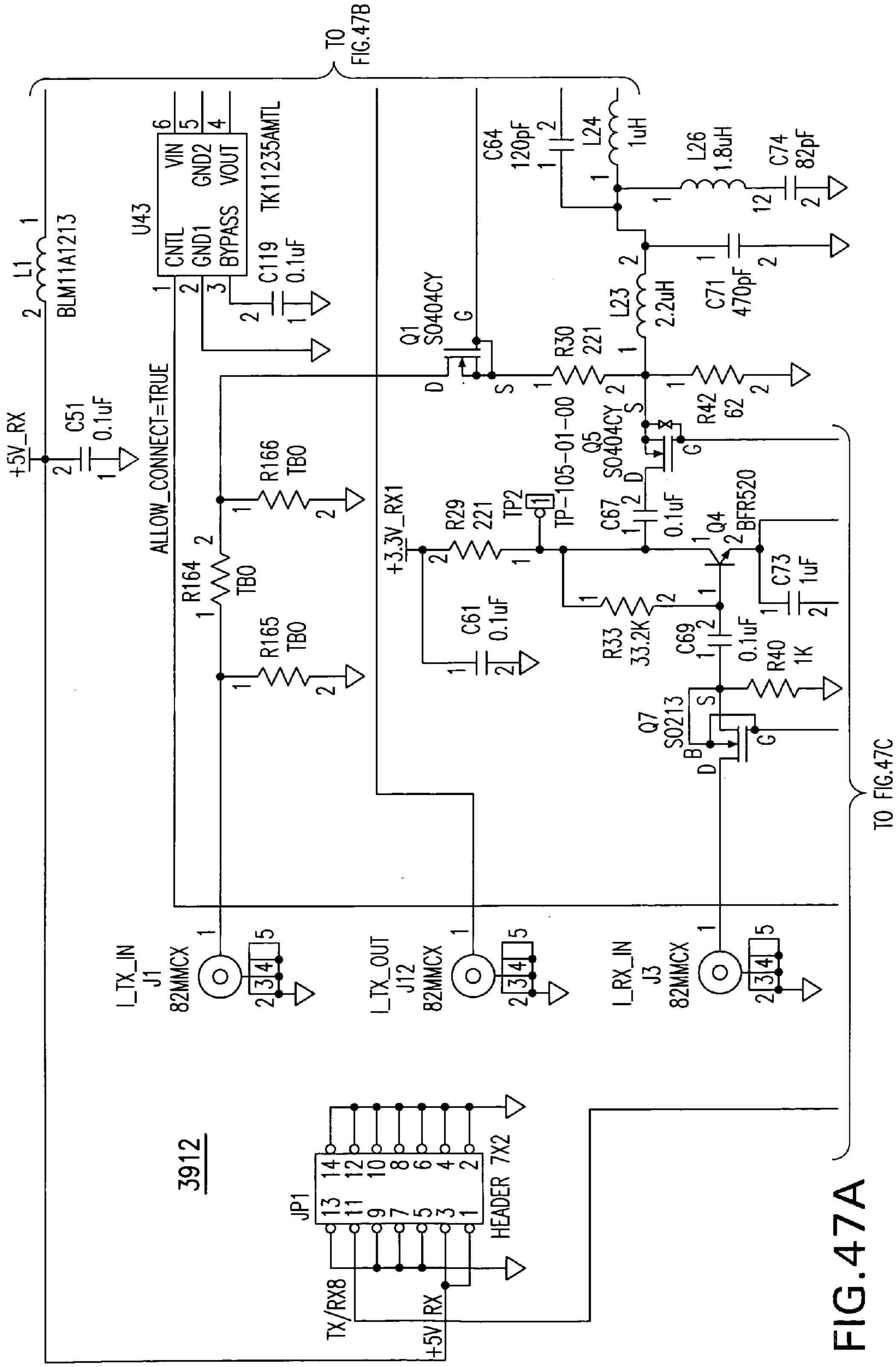
Figure 47B:
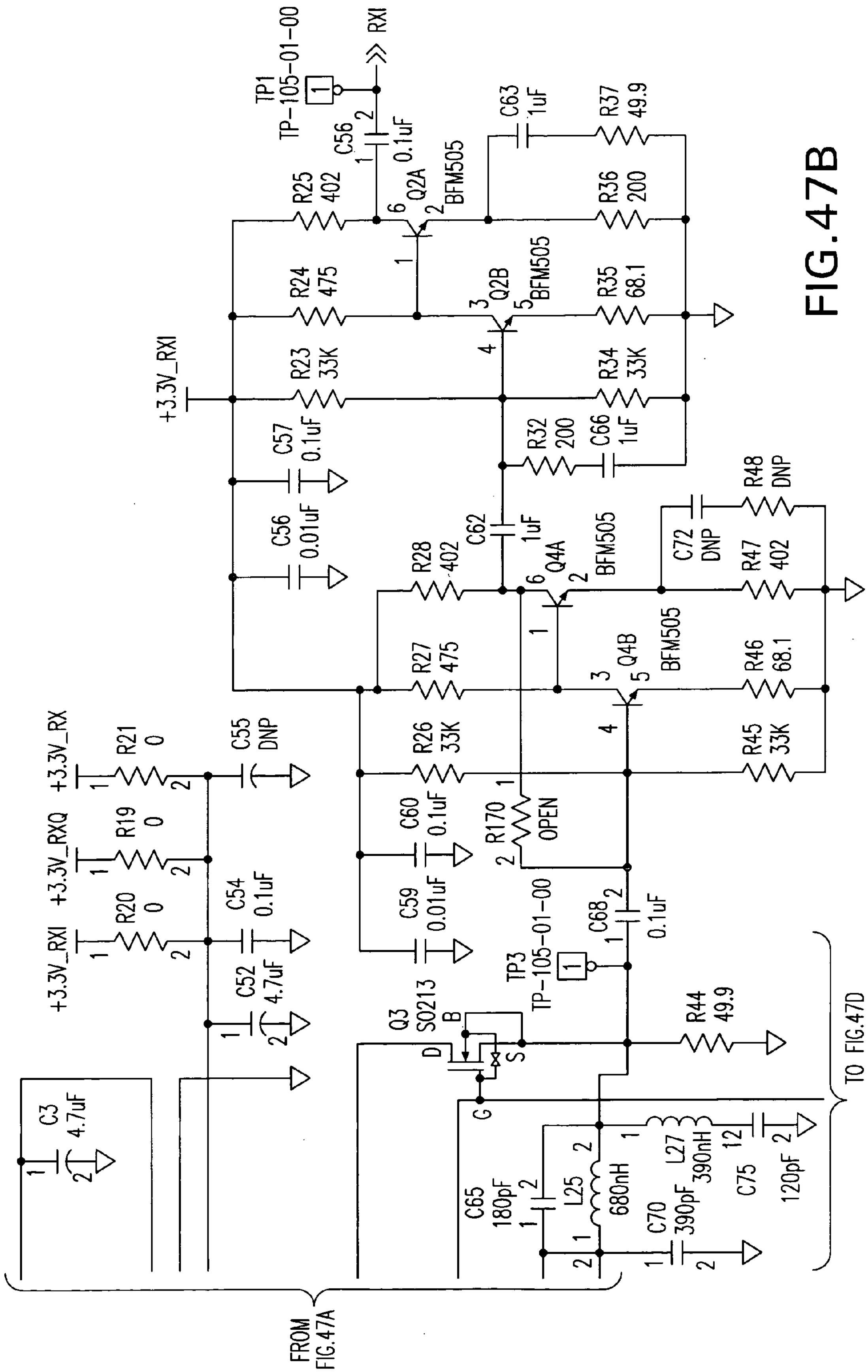
Figure 47C:
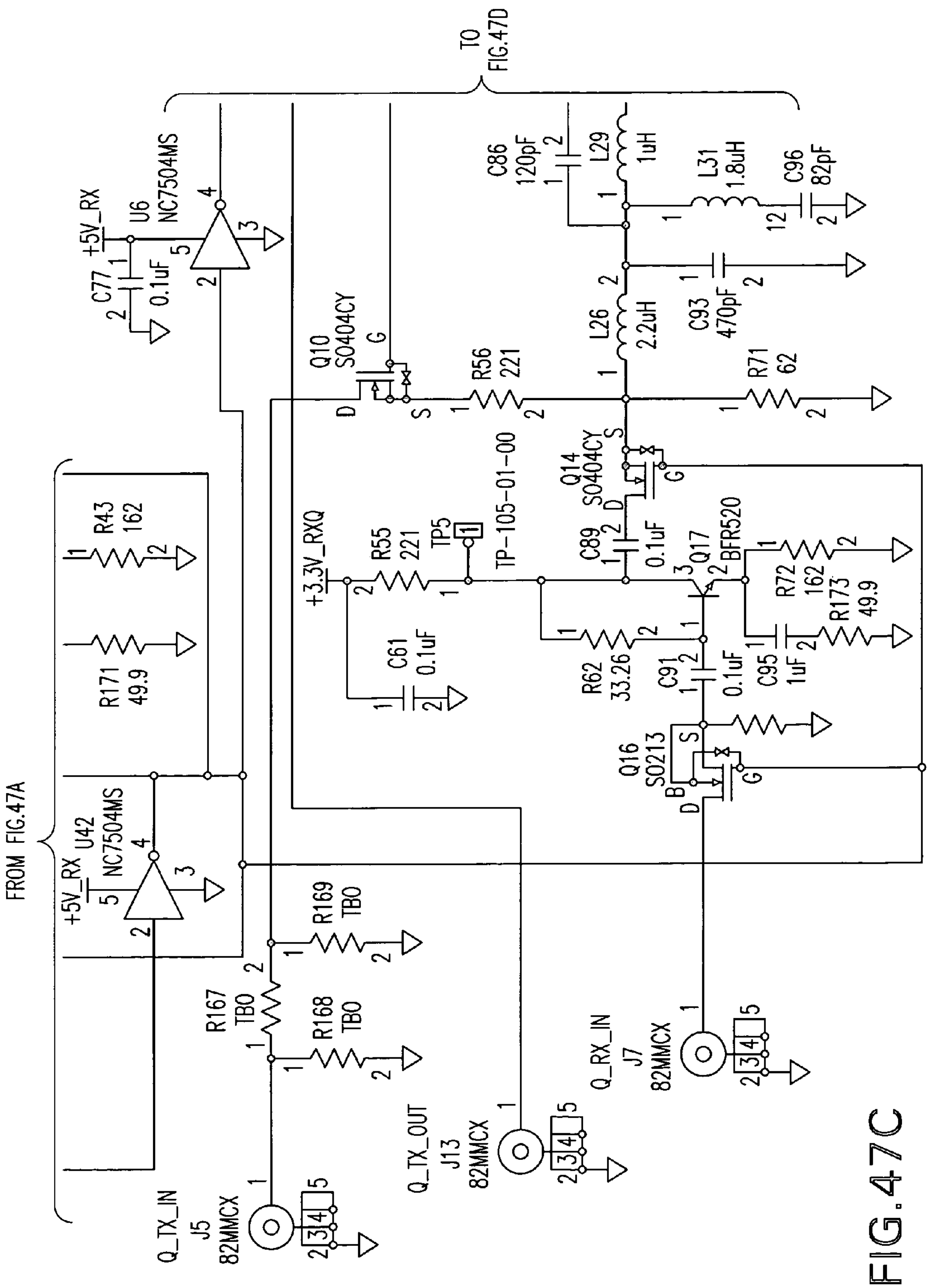
Figure 47D:
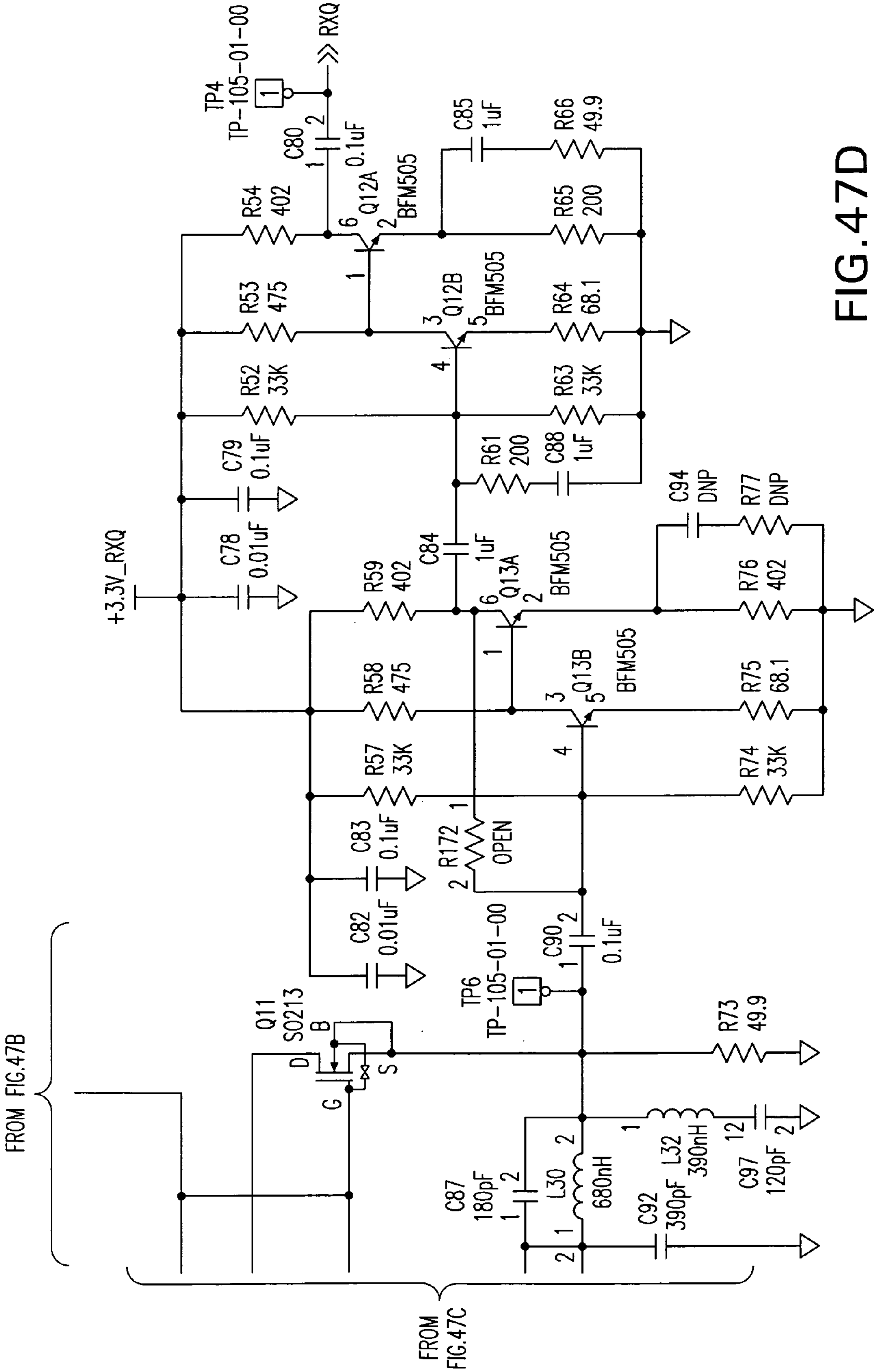
Figure 48A:
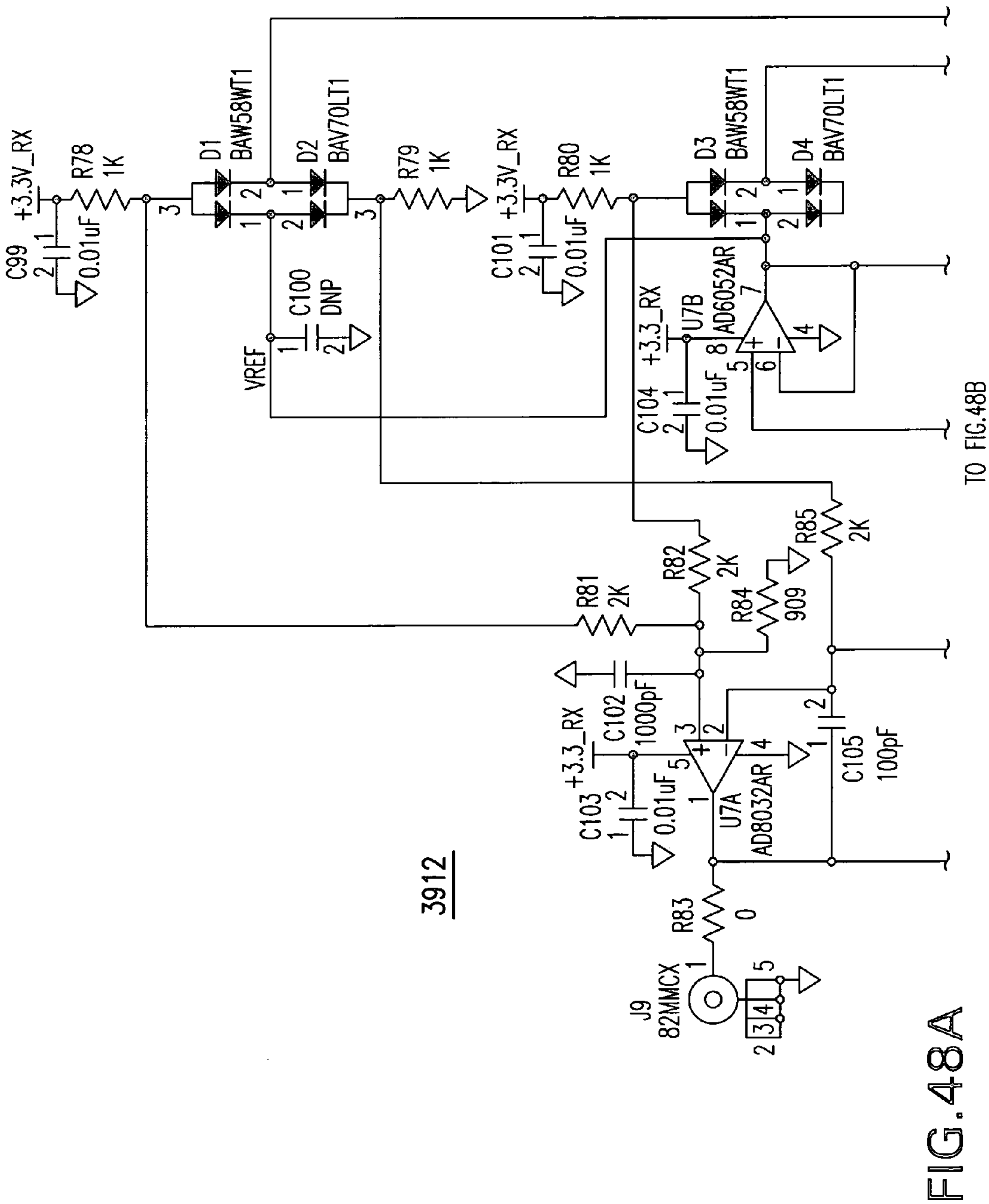
Figure 48B:
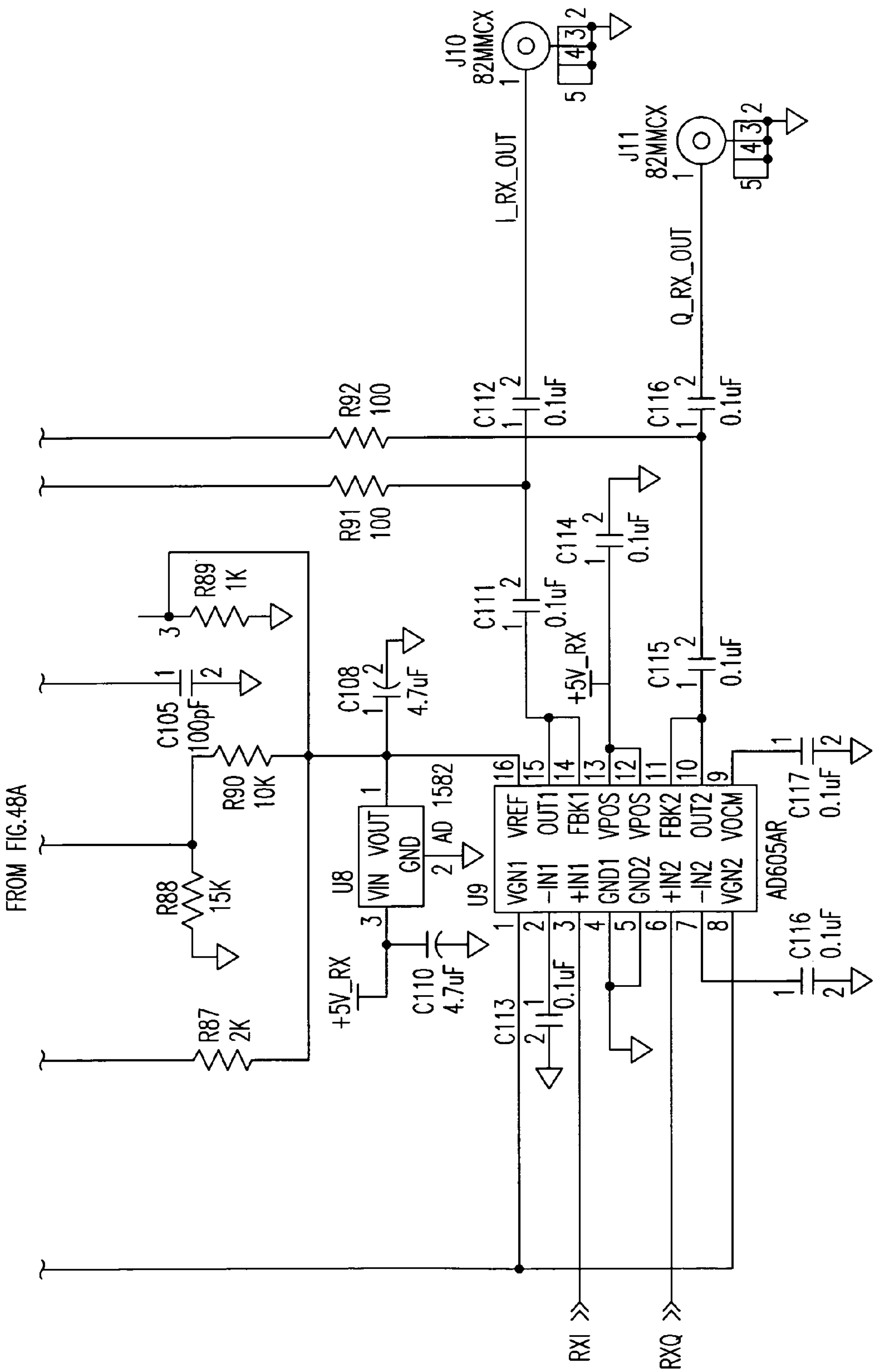

An example demodulator/modulator facilitation module 3912 is shown in FIGS. 47 and 48. A corresponding BOM list is shown in FIGS. 49A–C.

Figure 50:
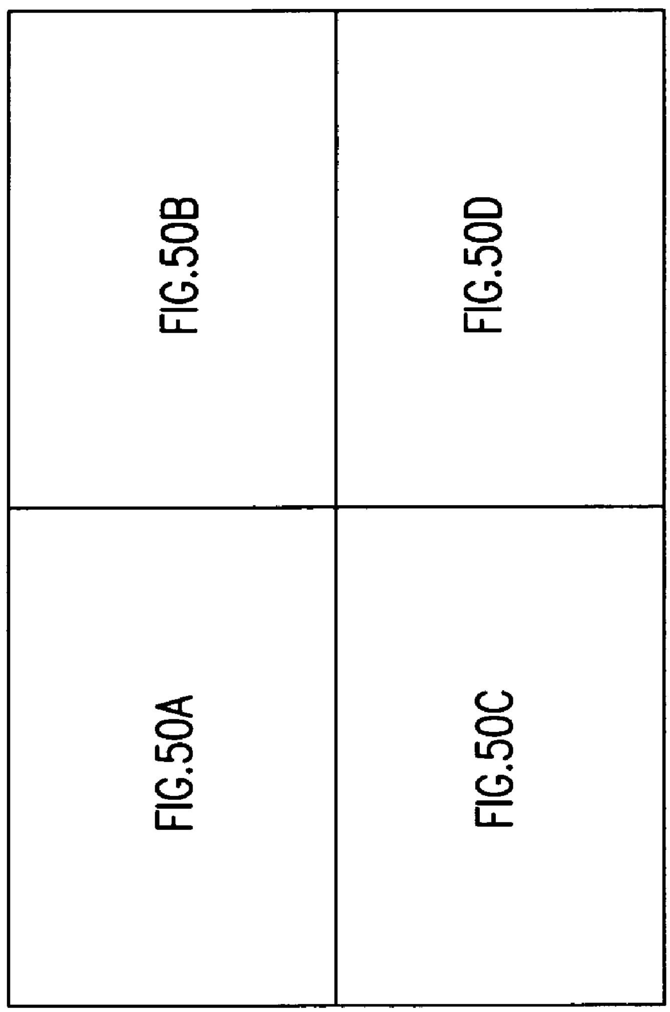
Figure 50A:
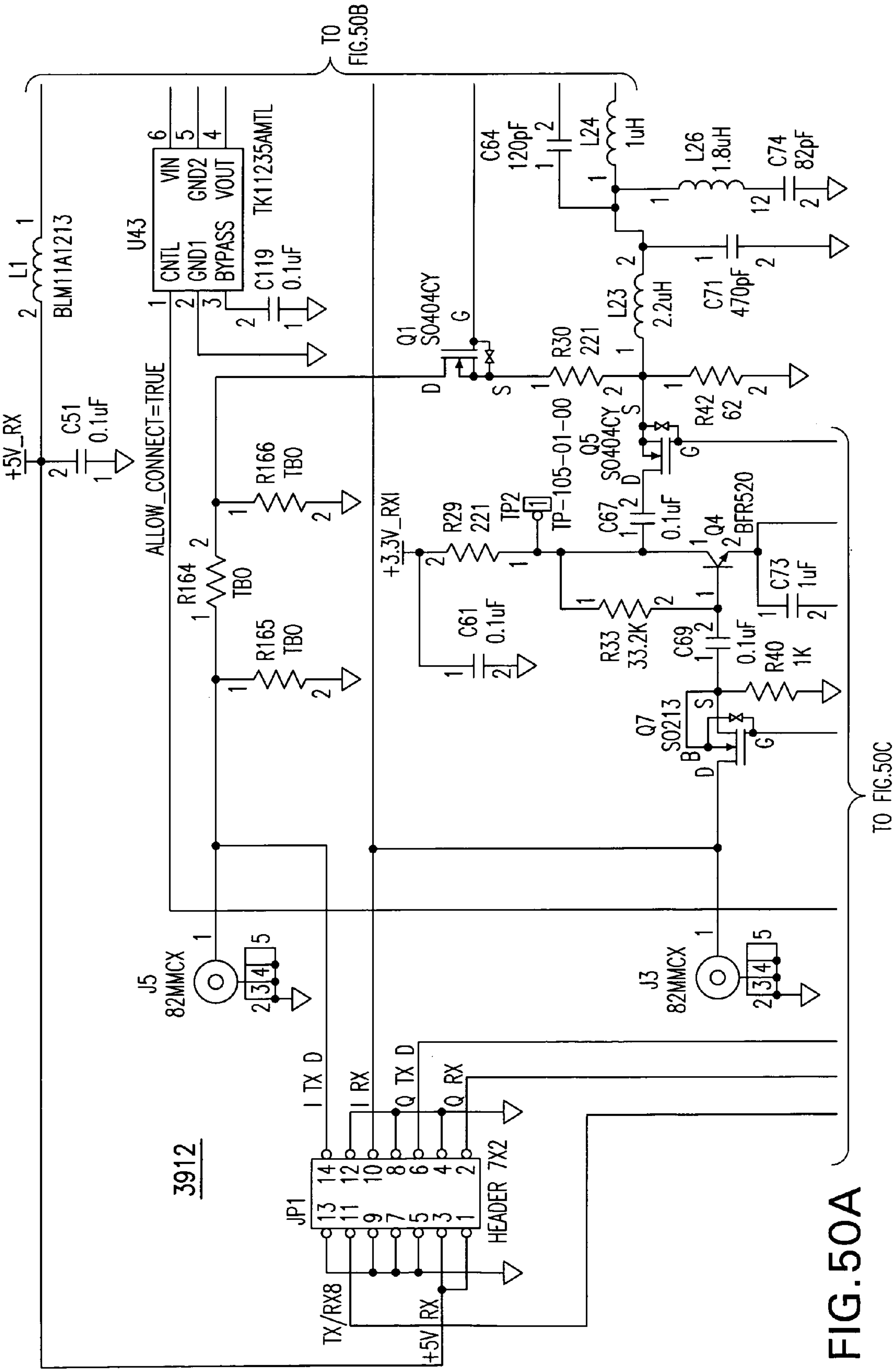
Figure 50B:
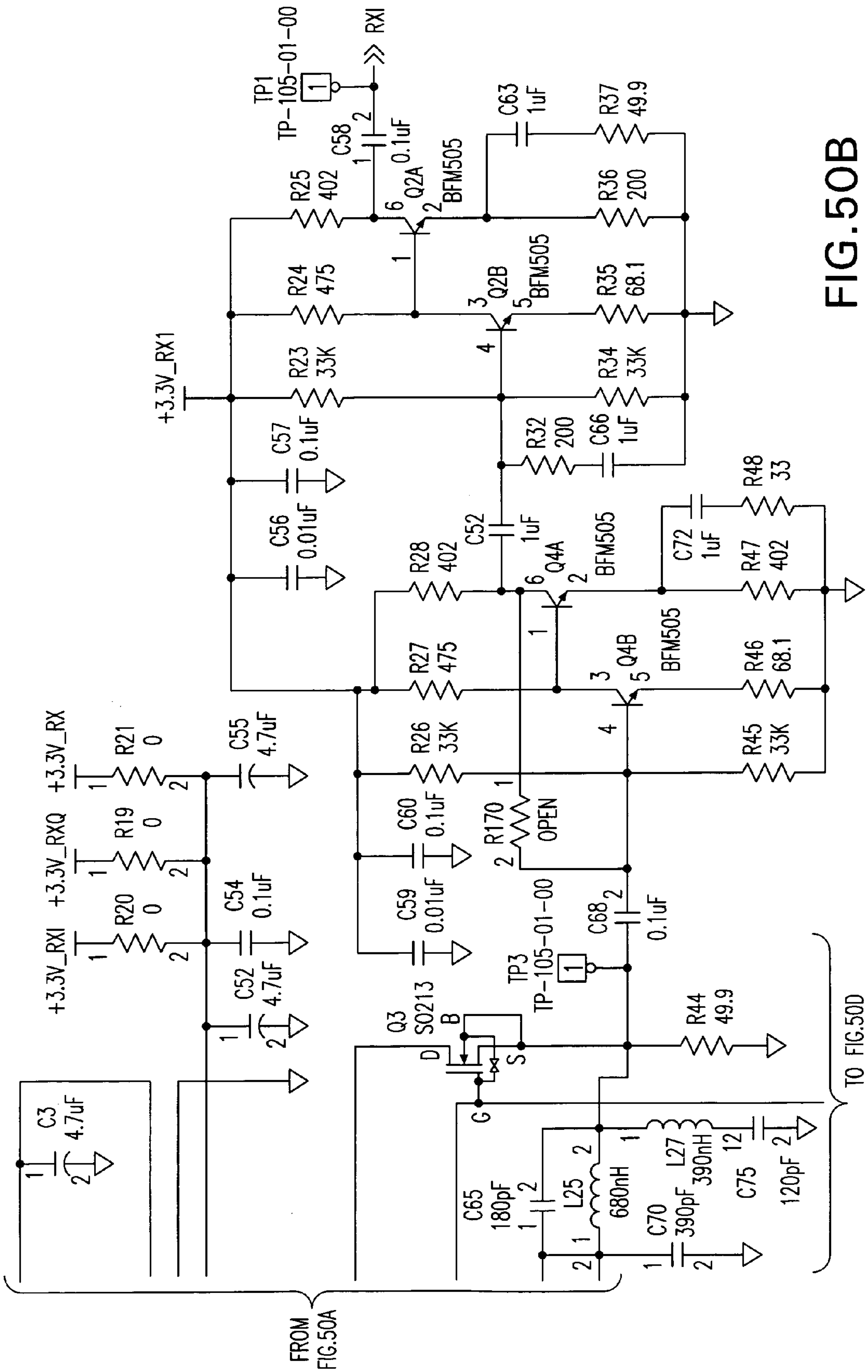
Figure 50C:
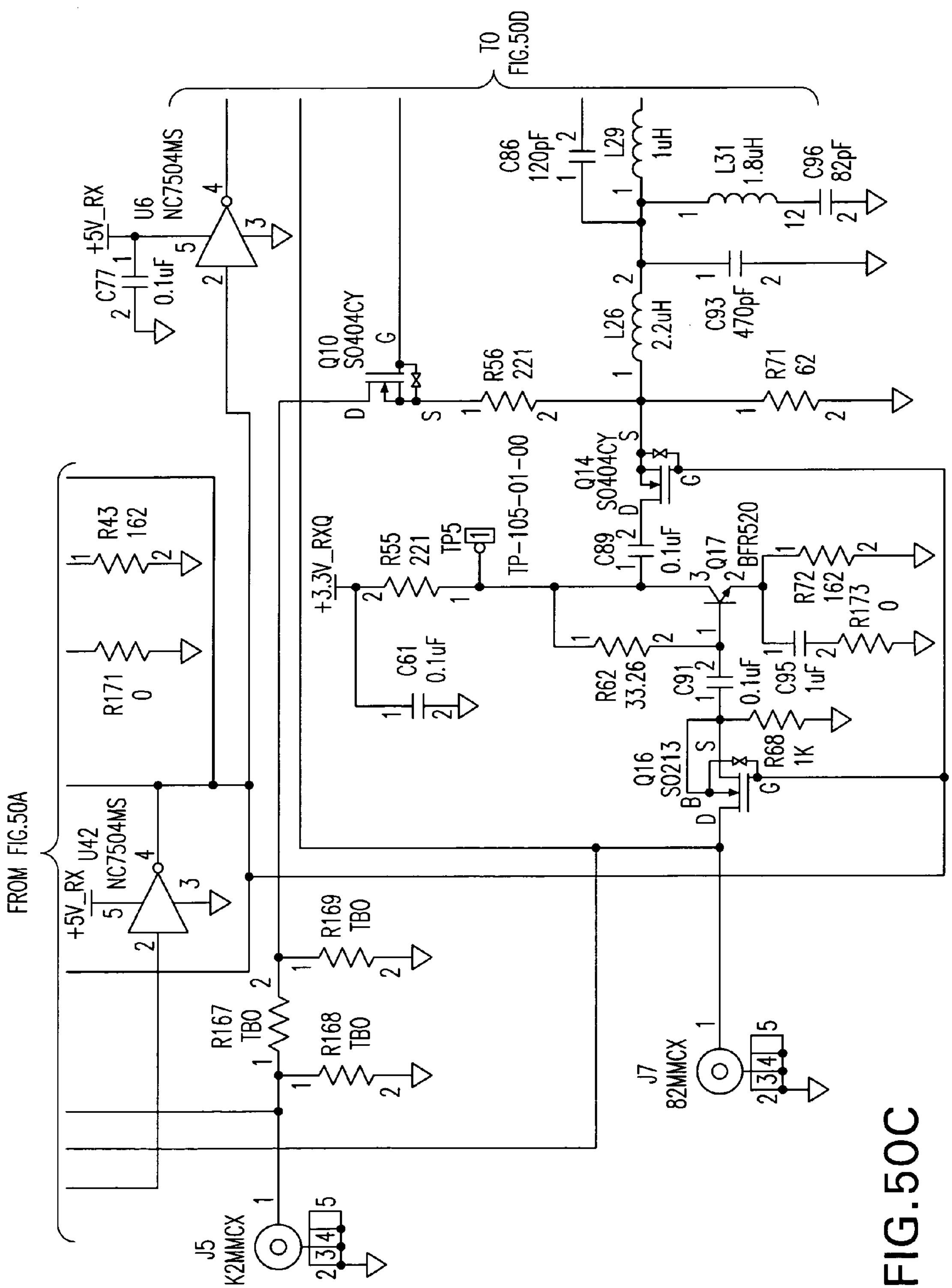
Figure 50D:
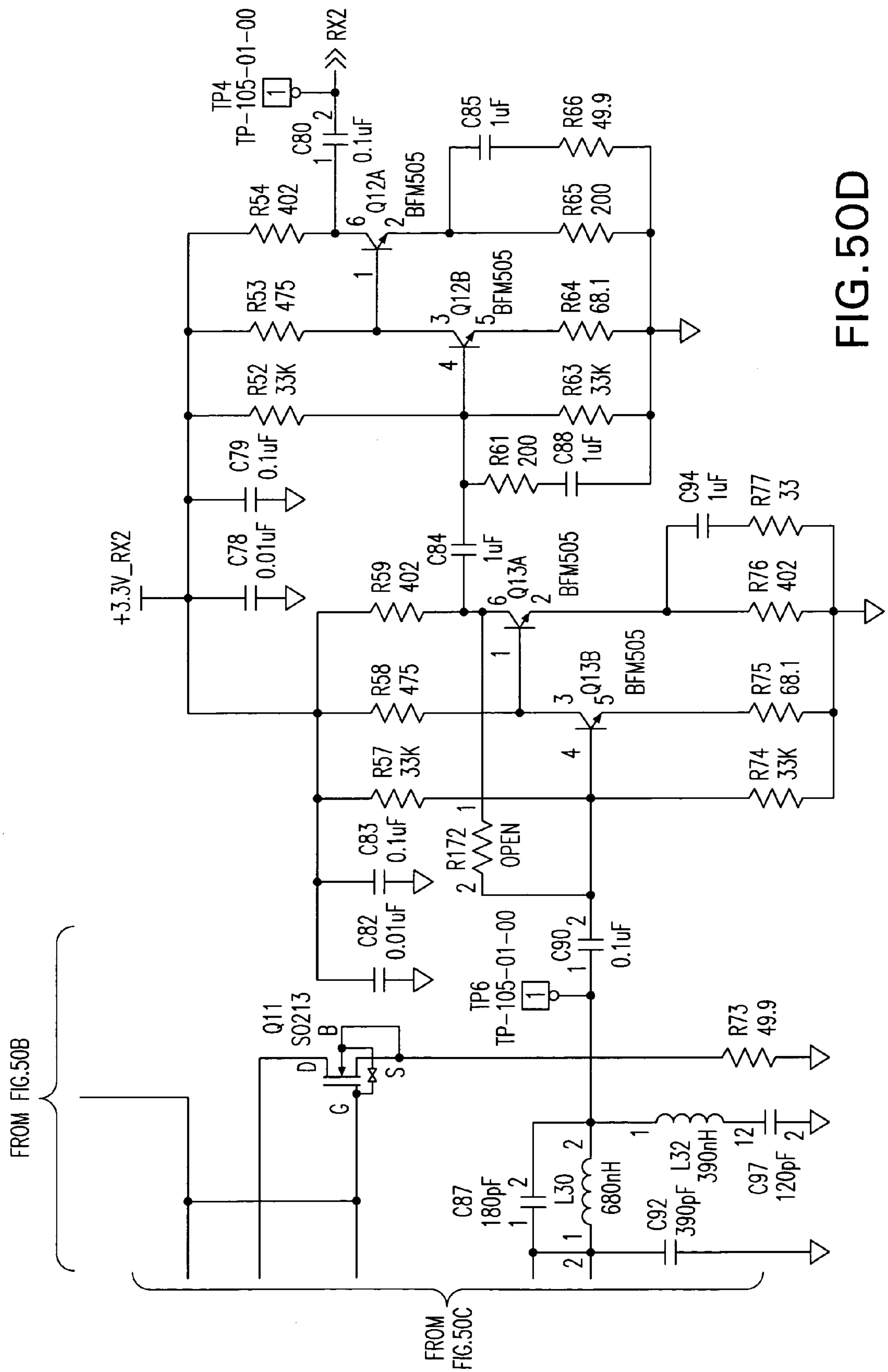
Figure 51A:
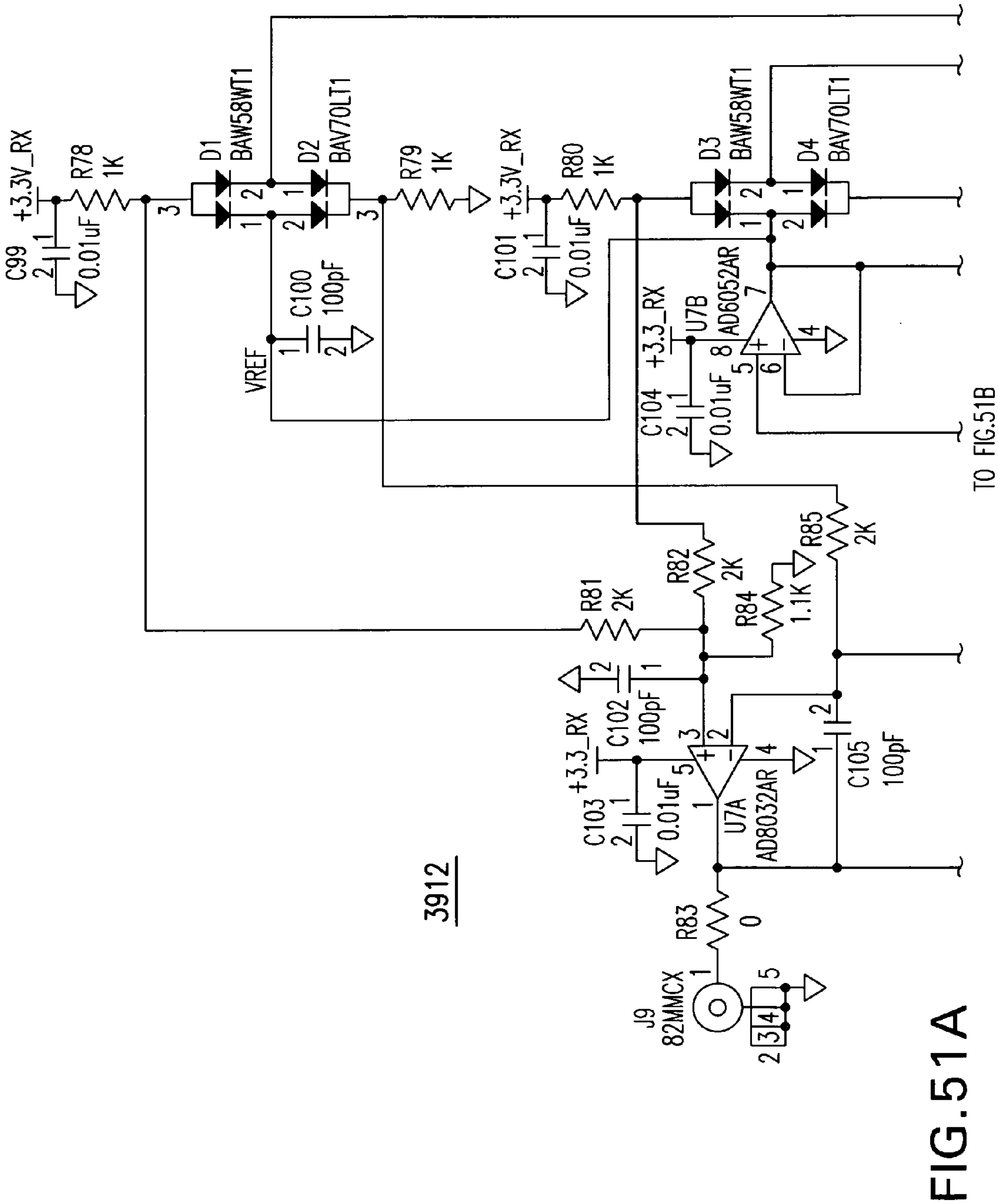
Figure 51B:
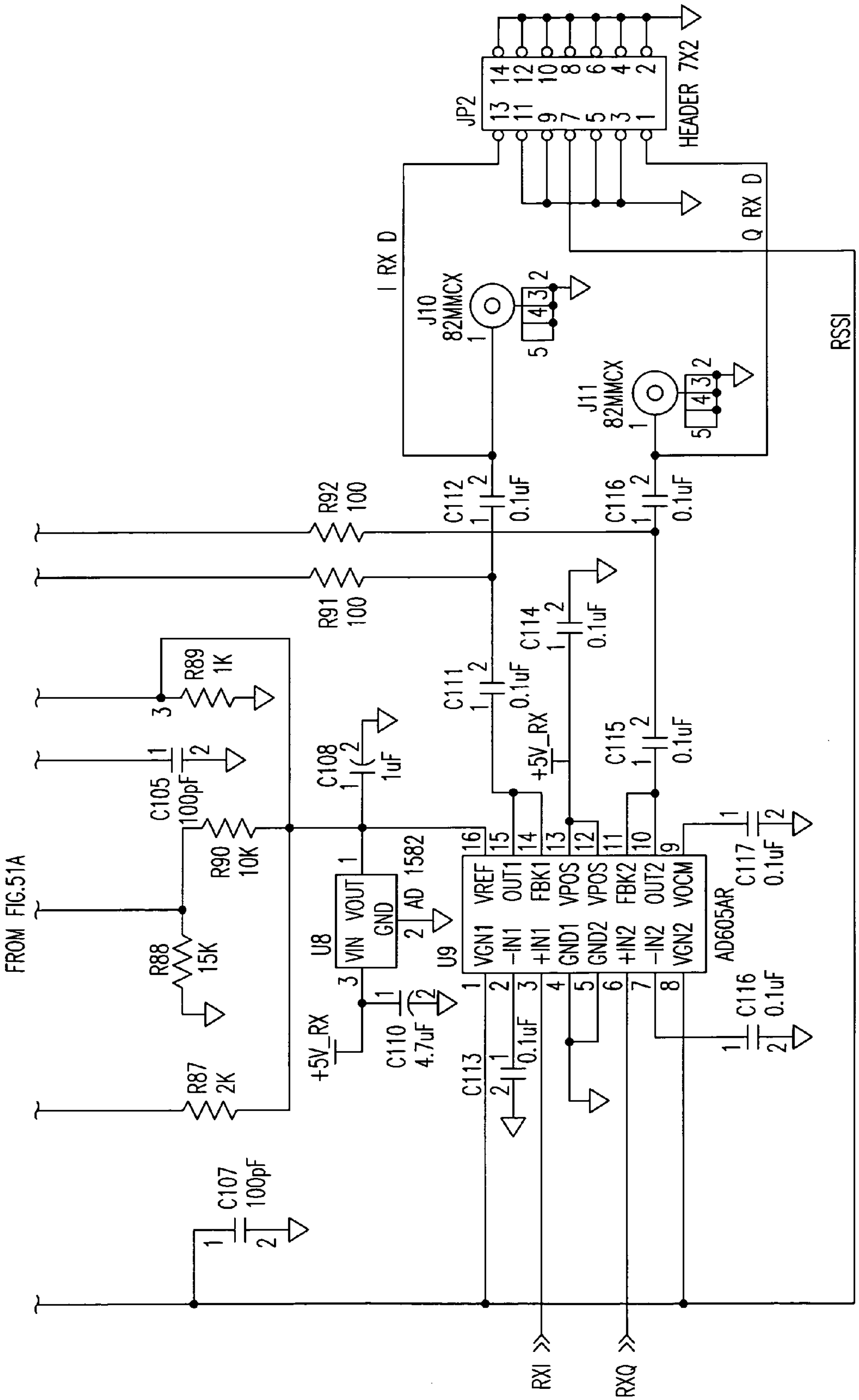

An alternate example demodulator/modulator facilitation module 3912 is shown in FIGS. 50 and 51. A corresponding BOM list is shown in FIGS. 52A and 52B. It is noted that the invention is not limited to this example.

6.3.5. MAC Interface

Figure 45:
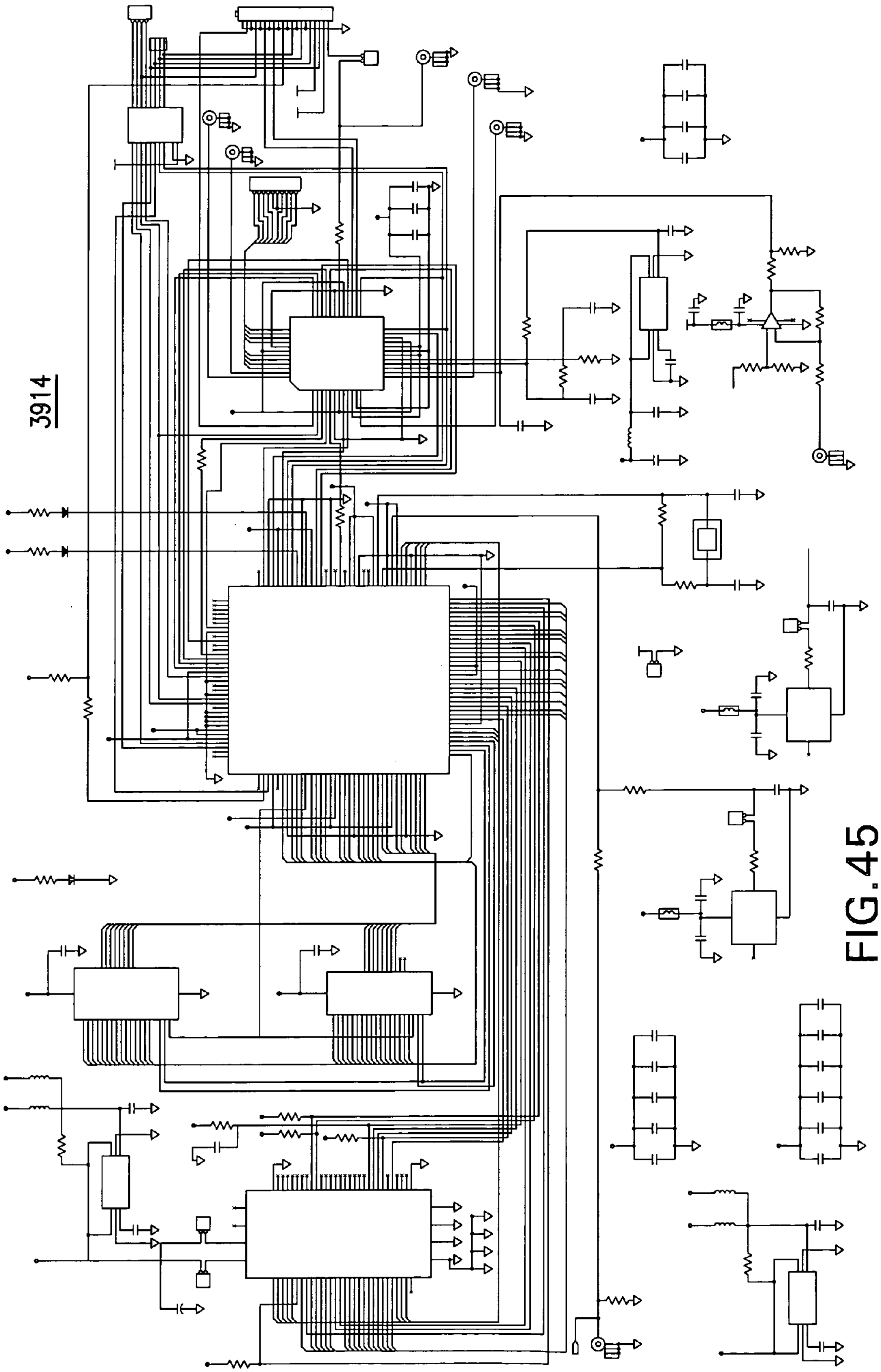

An example MAC interface 3914 is shown in FIG. 45. A corresponding BOM list is shown in FIGS. 46A–C. It is noted that the invention is not limited to this example.

6.3.6. Control Signal Generator—Synthesizer

Figure 55:
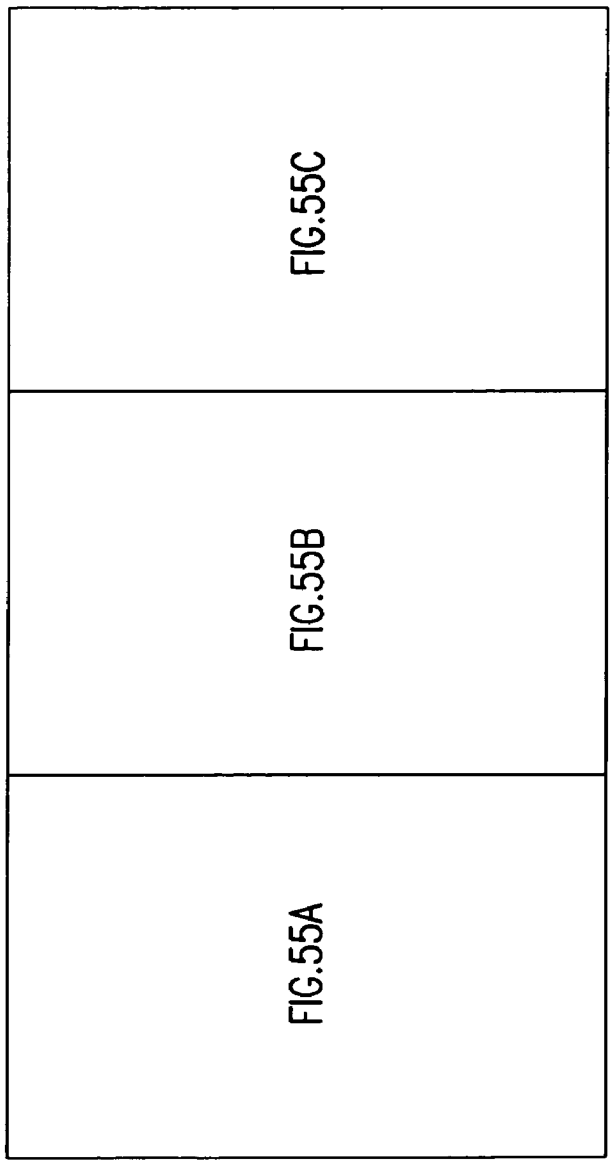
Figure 55A:
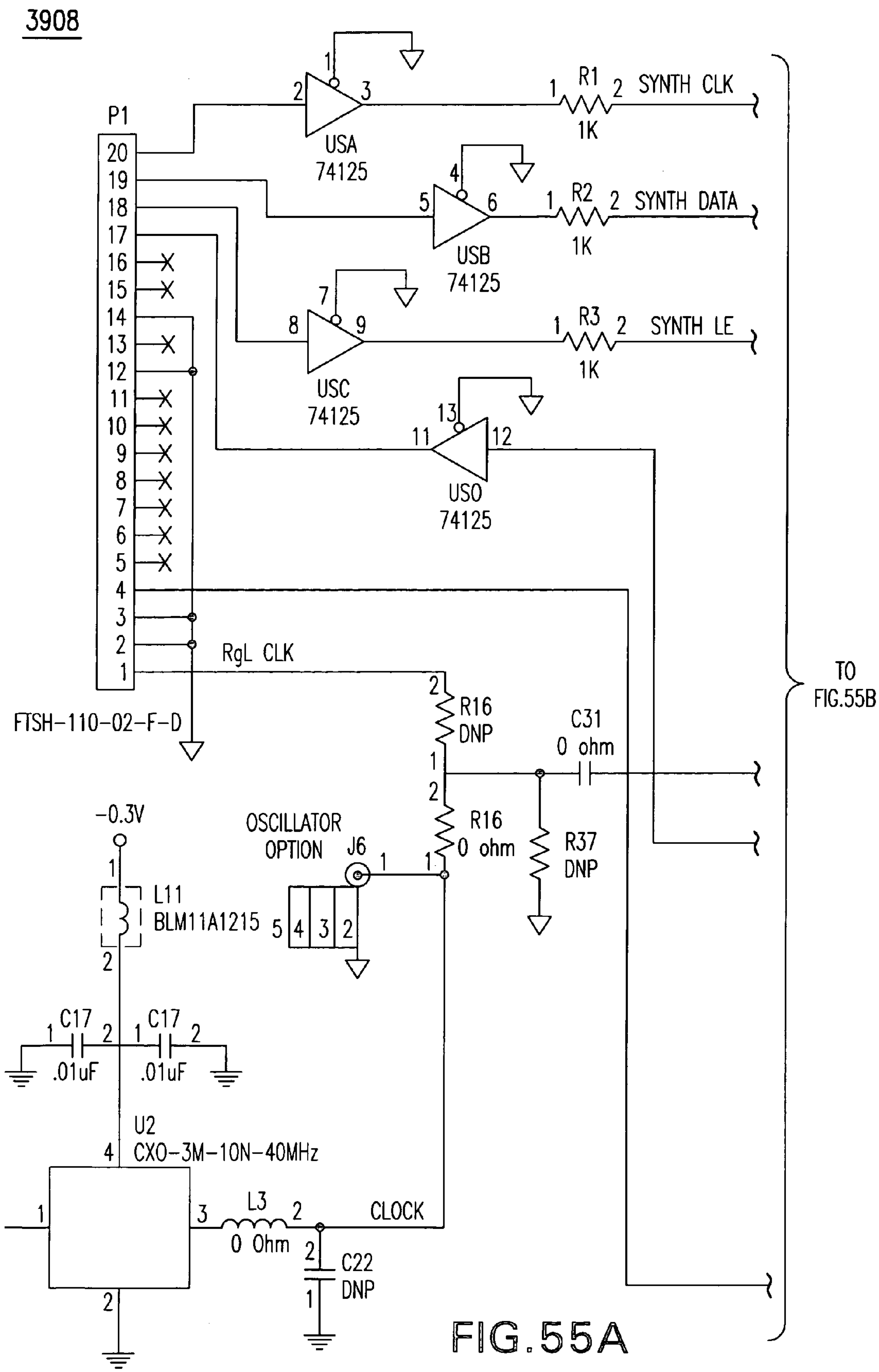
Figure 55B:
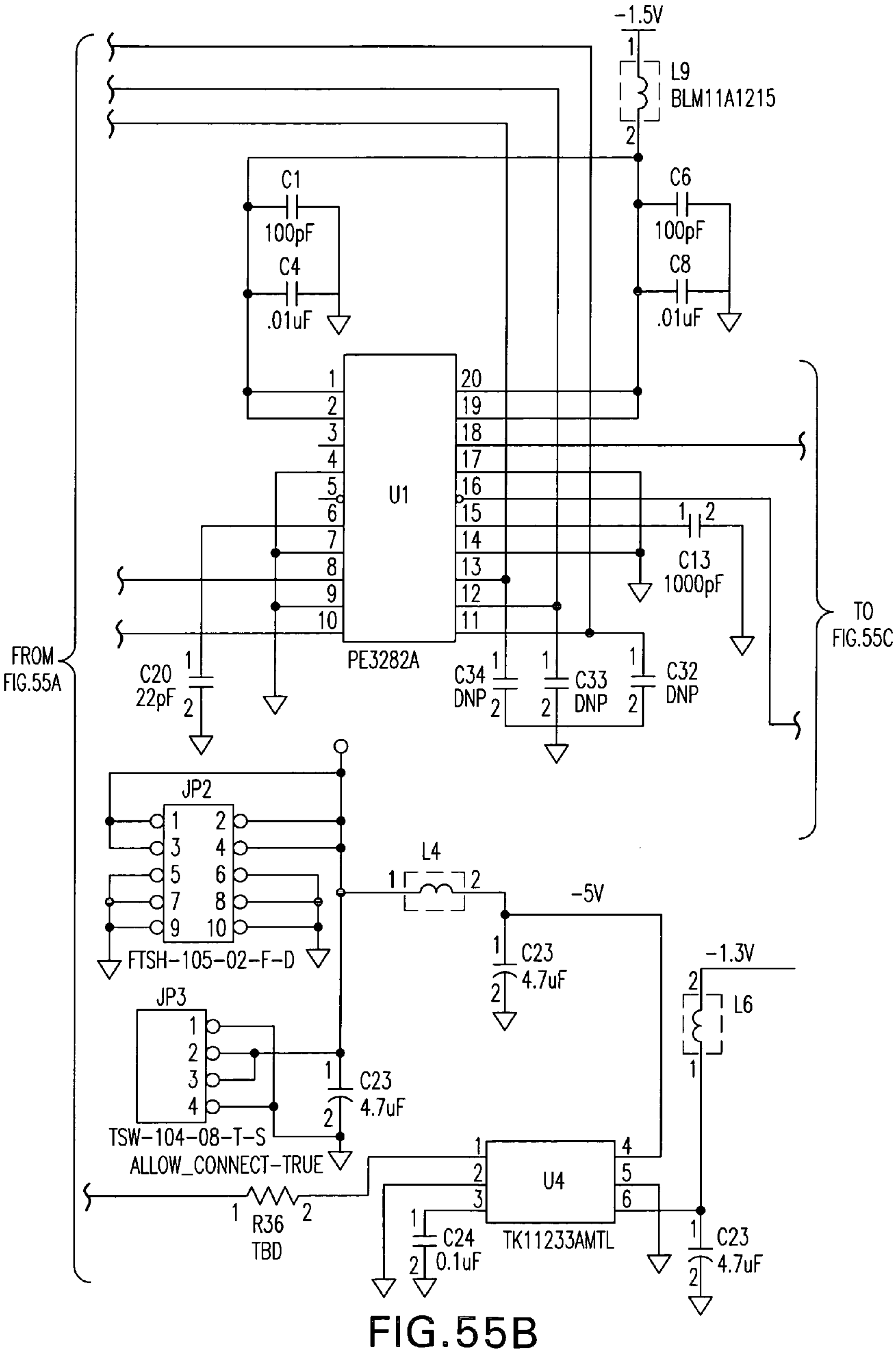
Figure 55C:
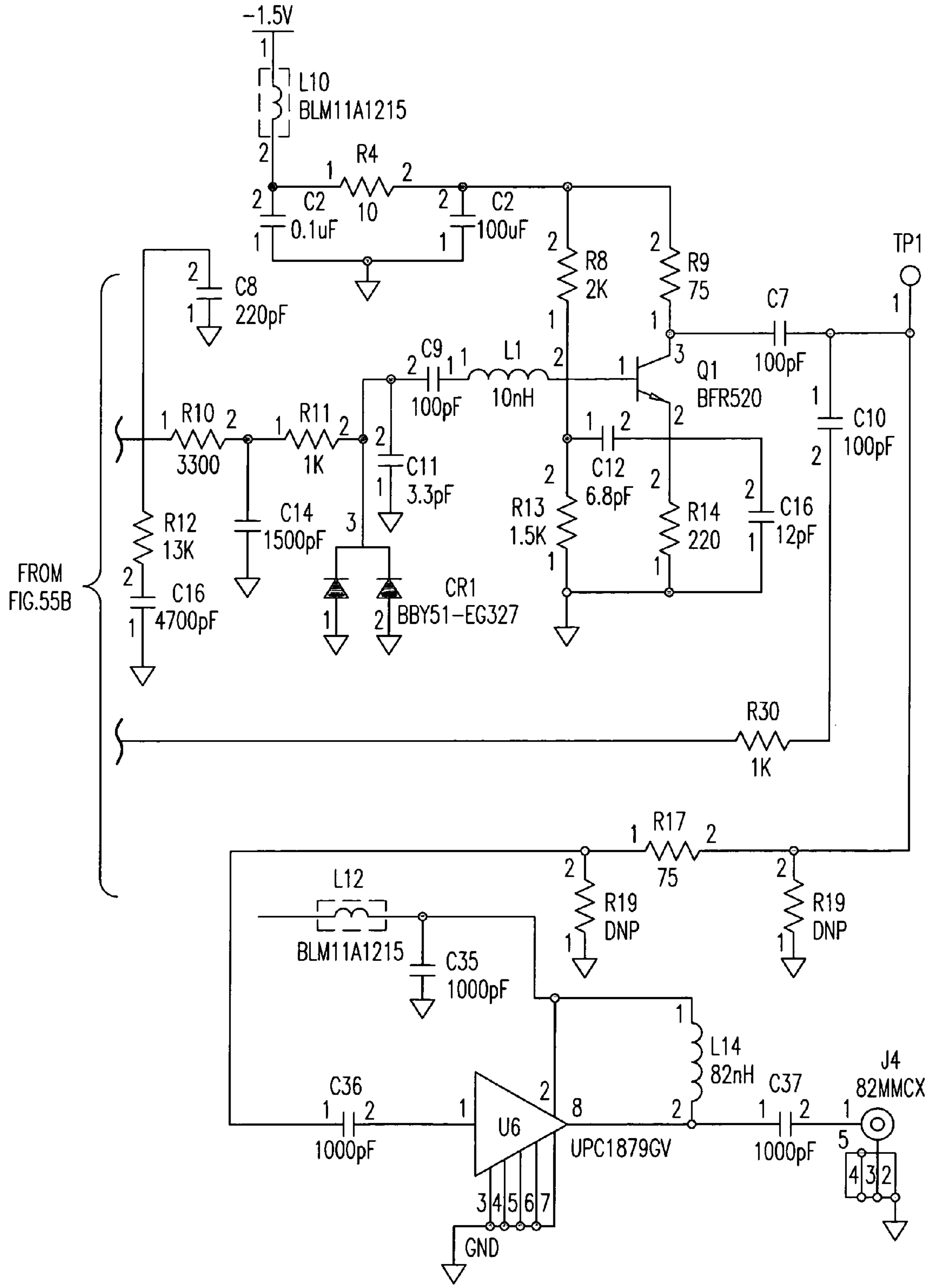
Figure 57:
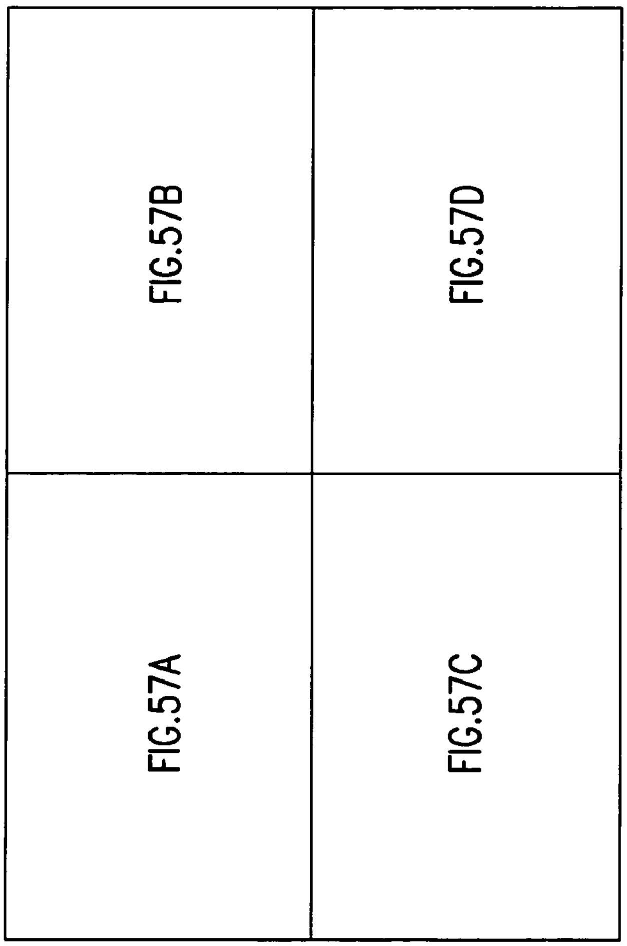
Figure 57A:
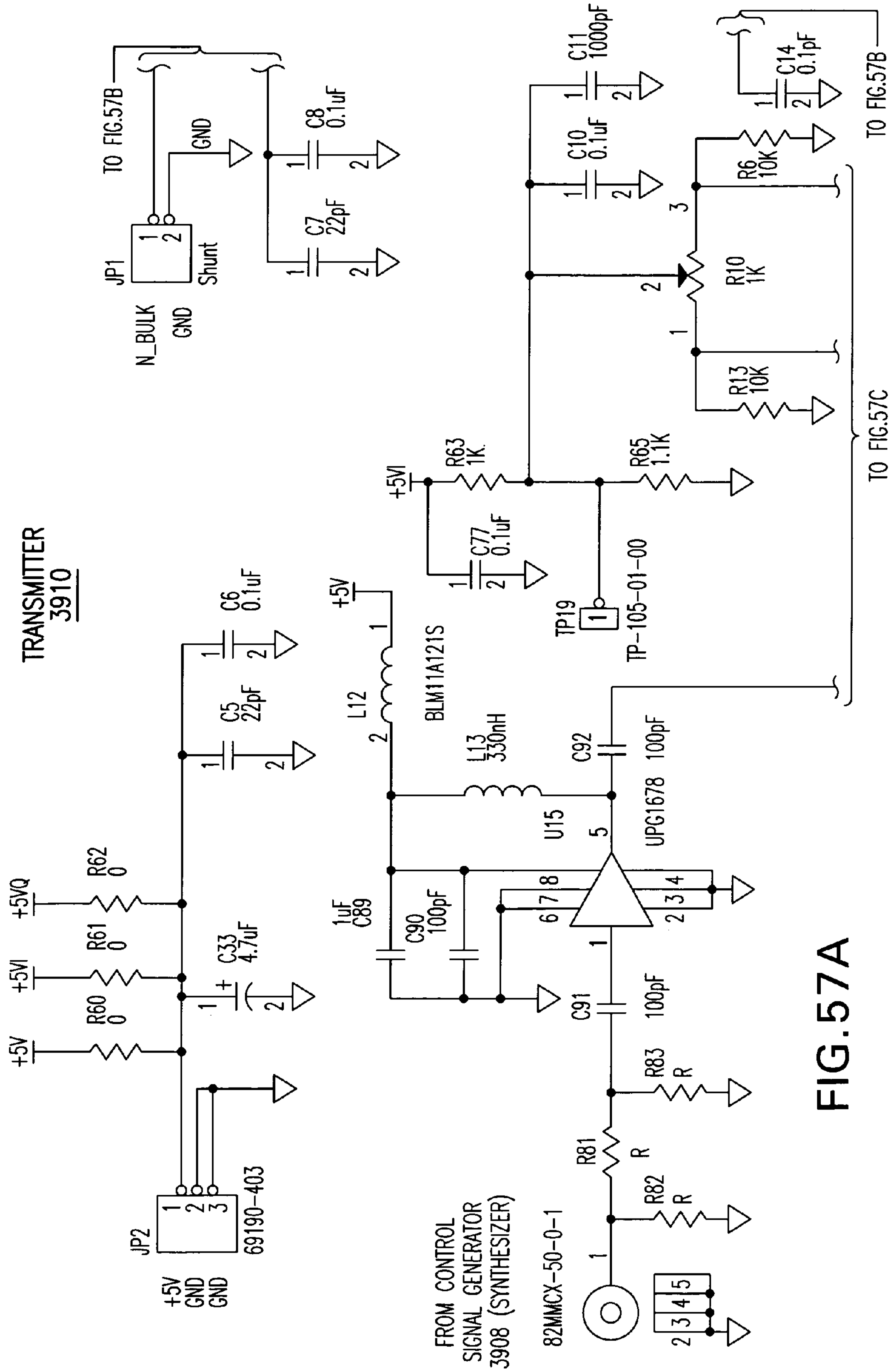
Figure 57B:
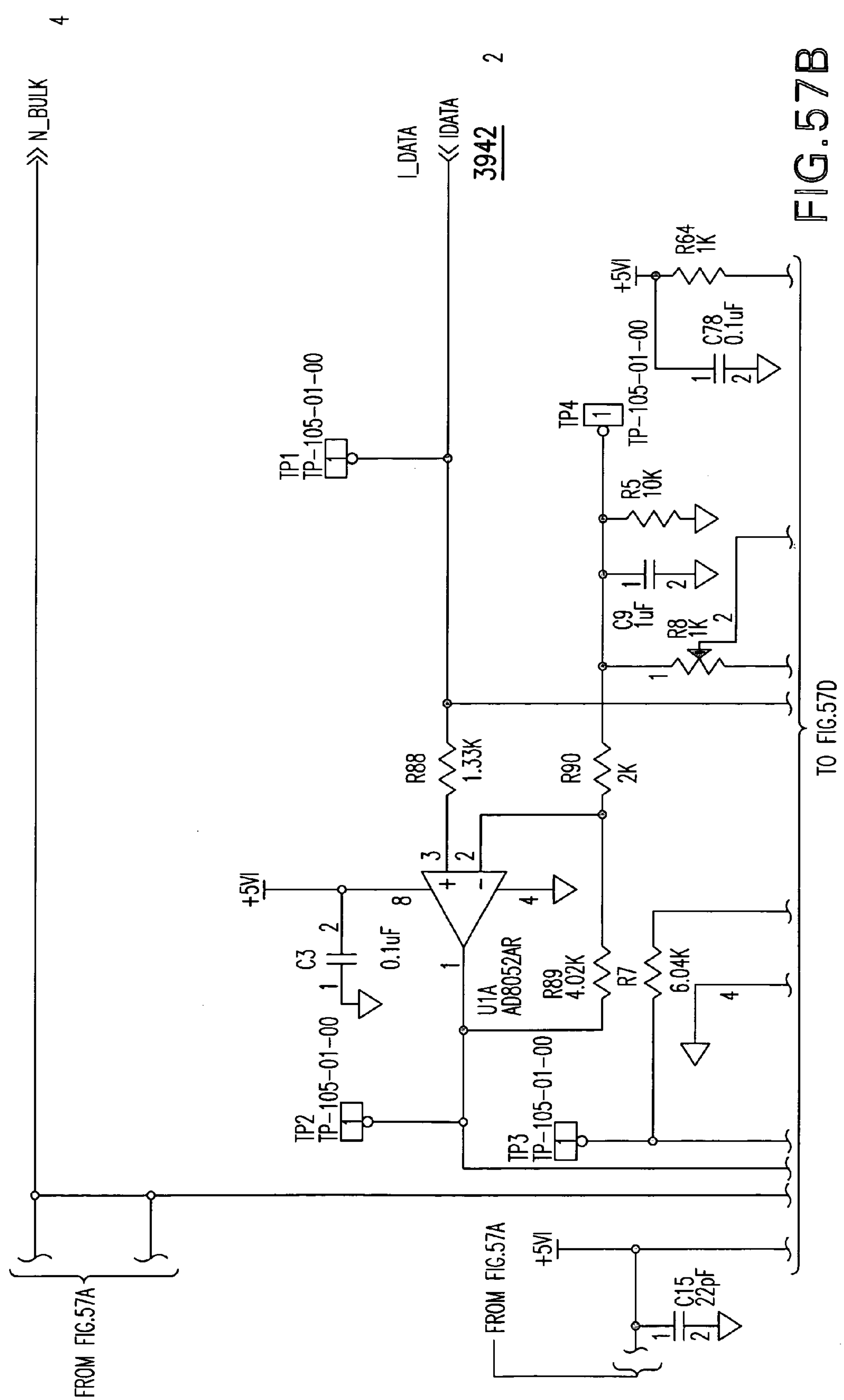
Figure 57C:
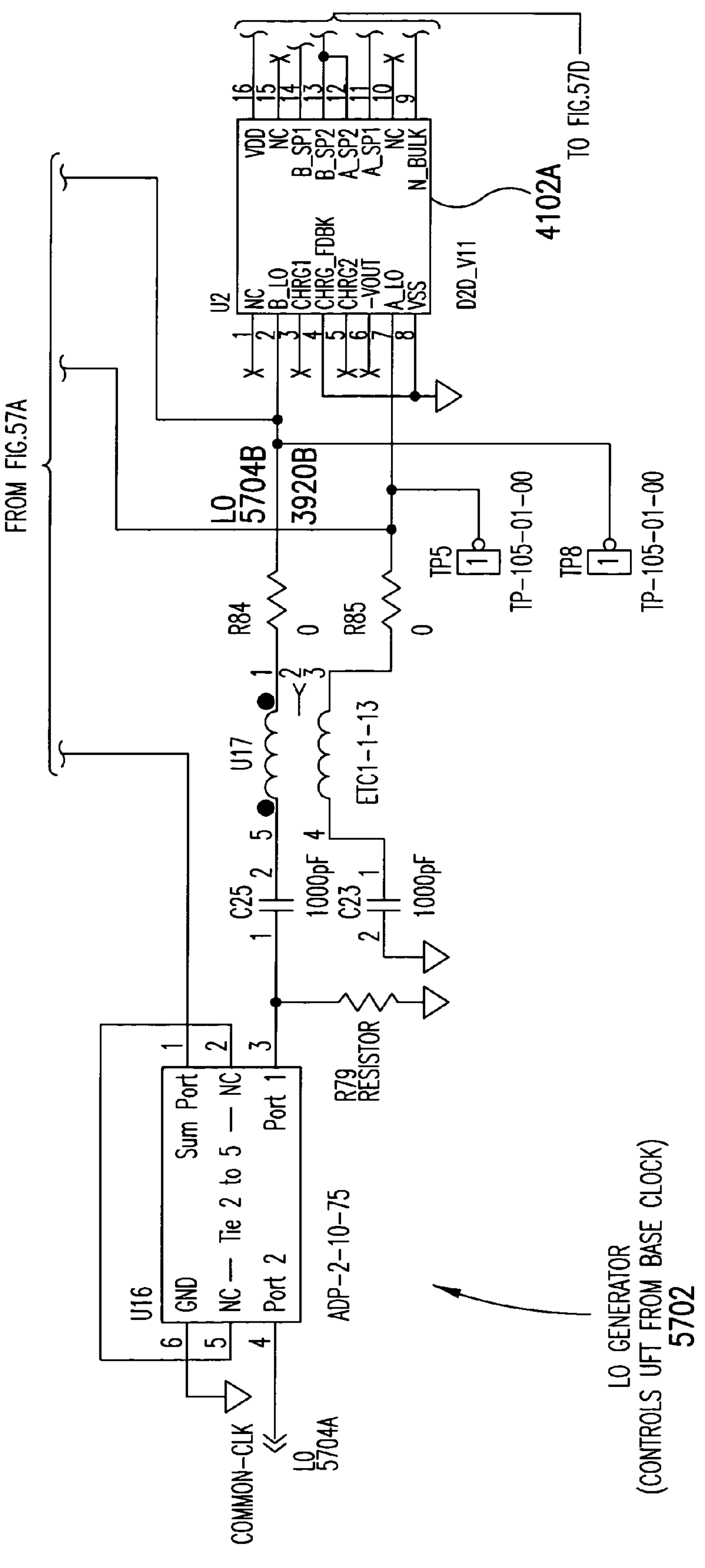
Figure 57D:
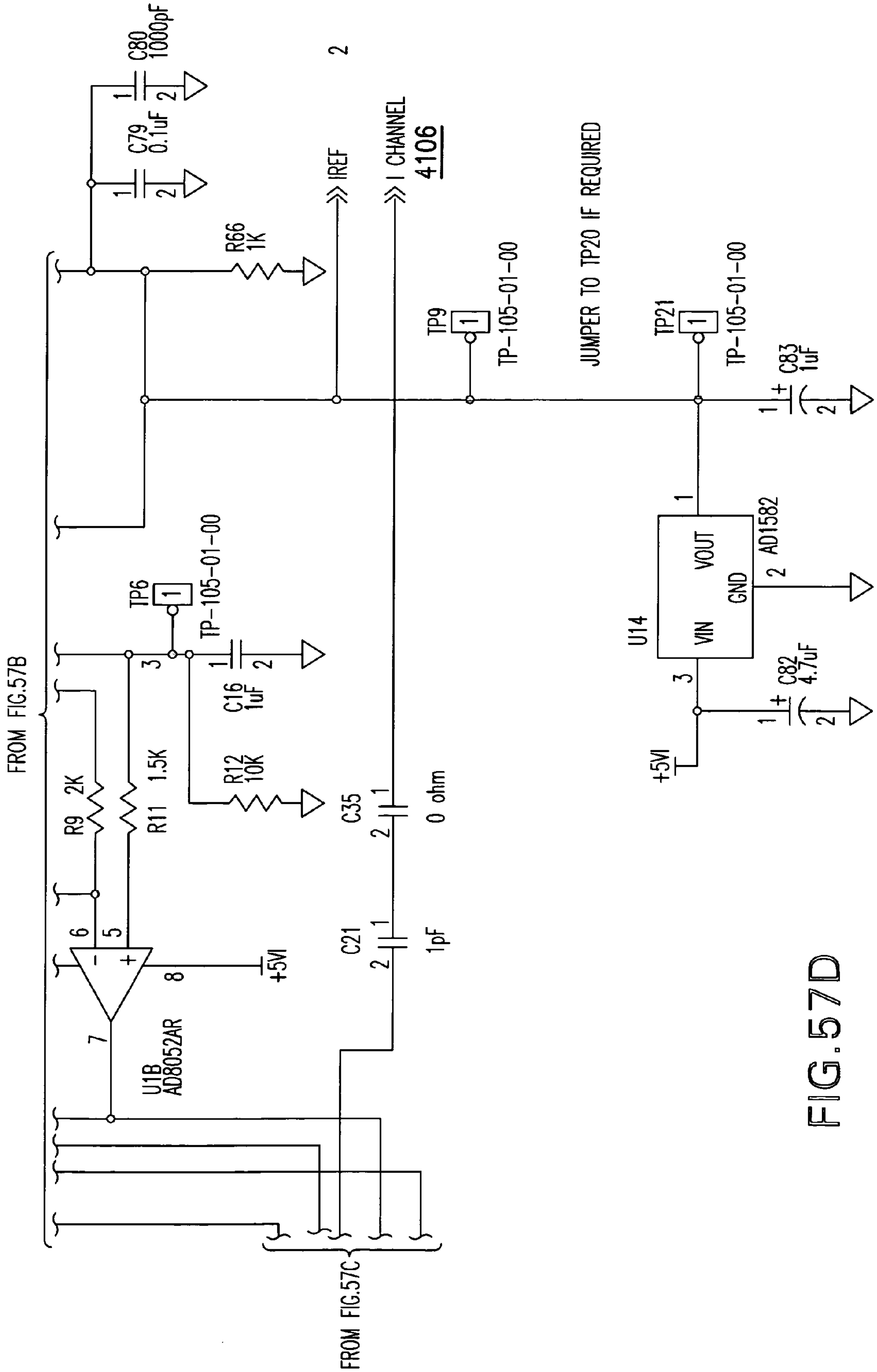
Figure 58:
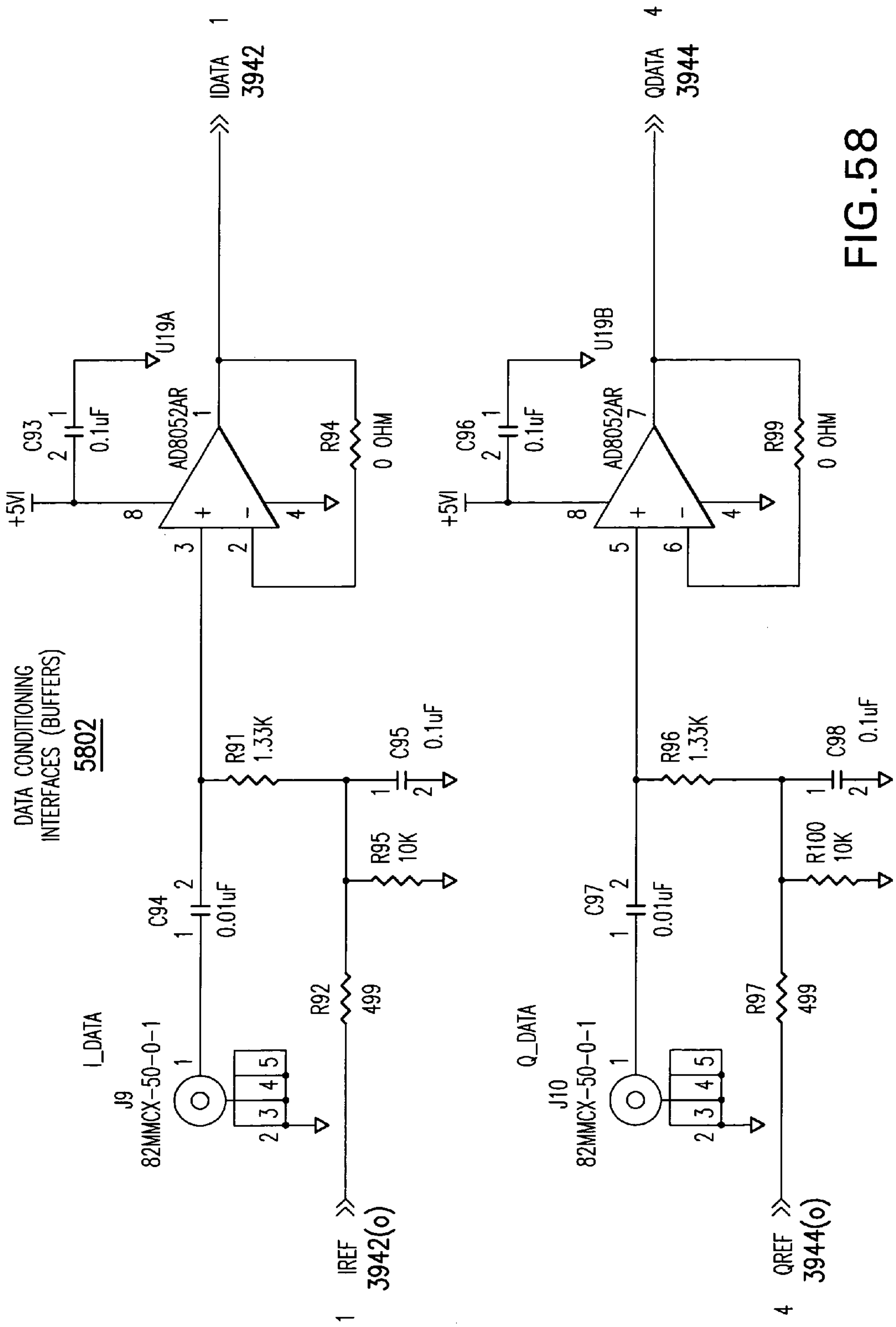
Figure 59:
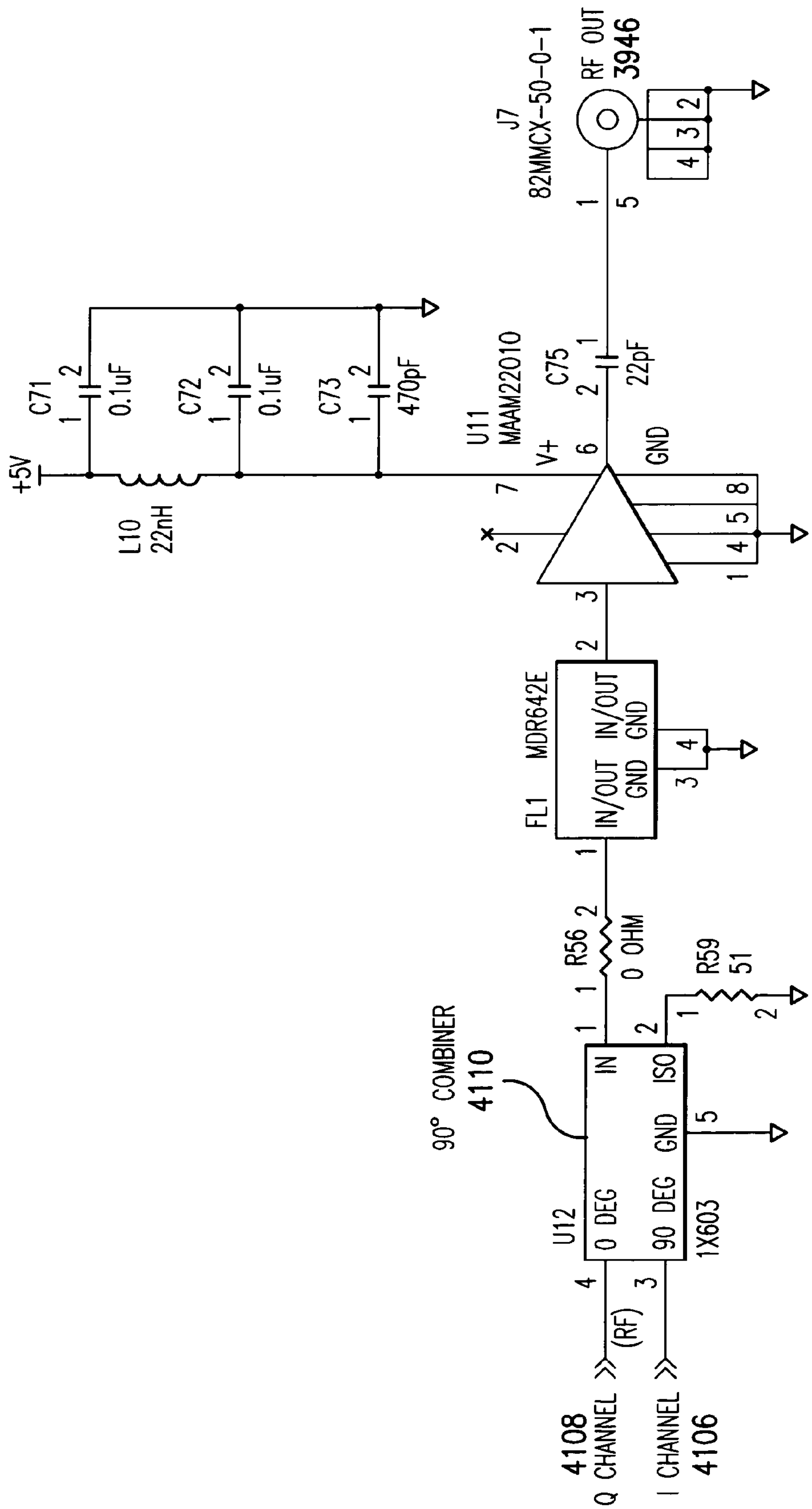
Figure 60:
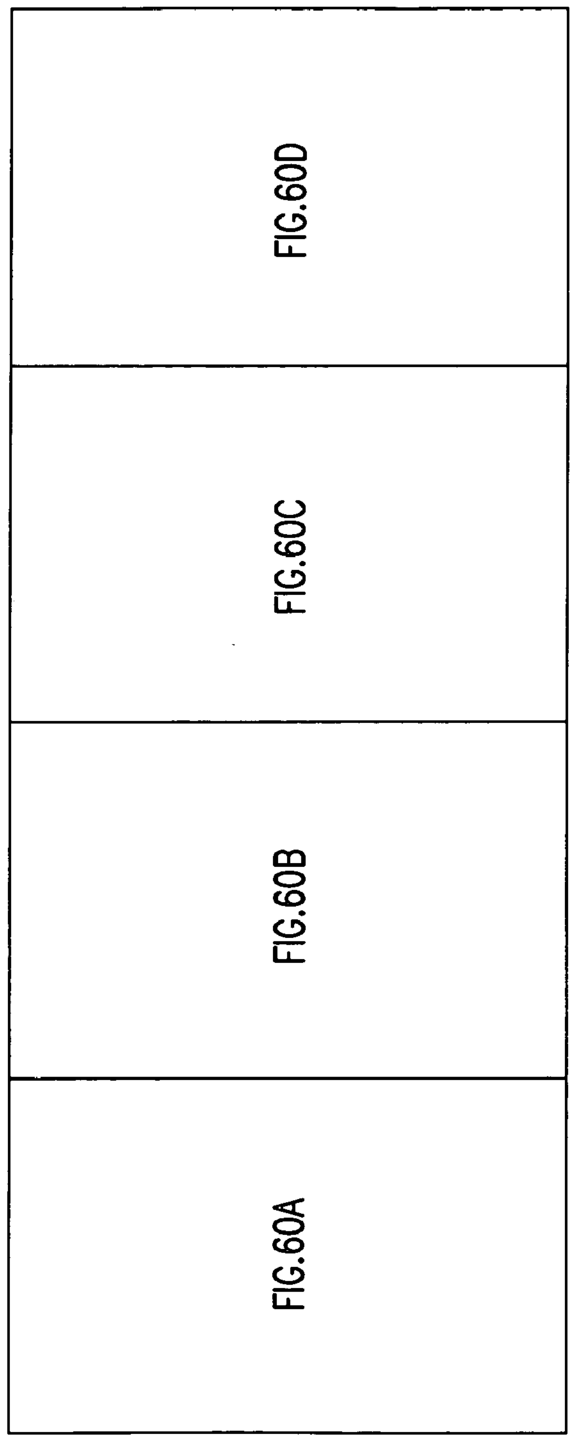
Figure 60A:
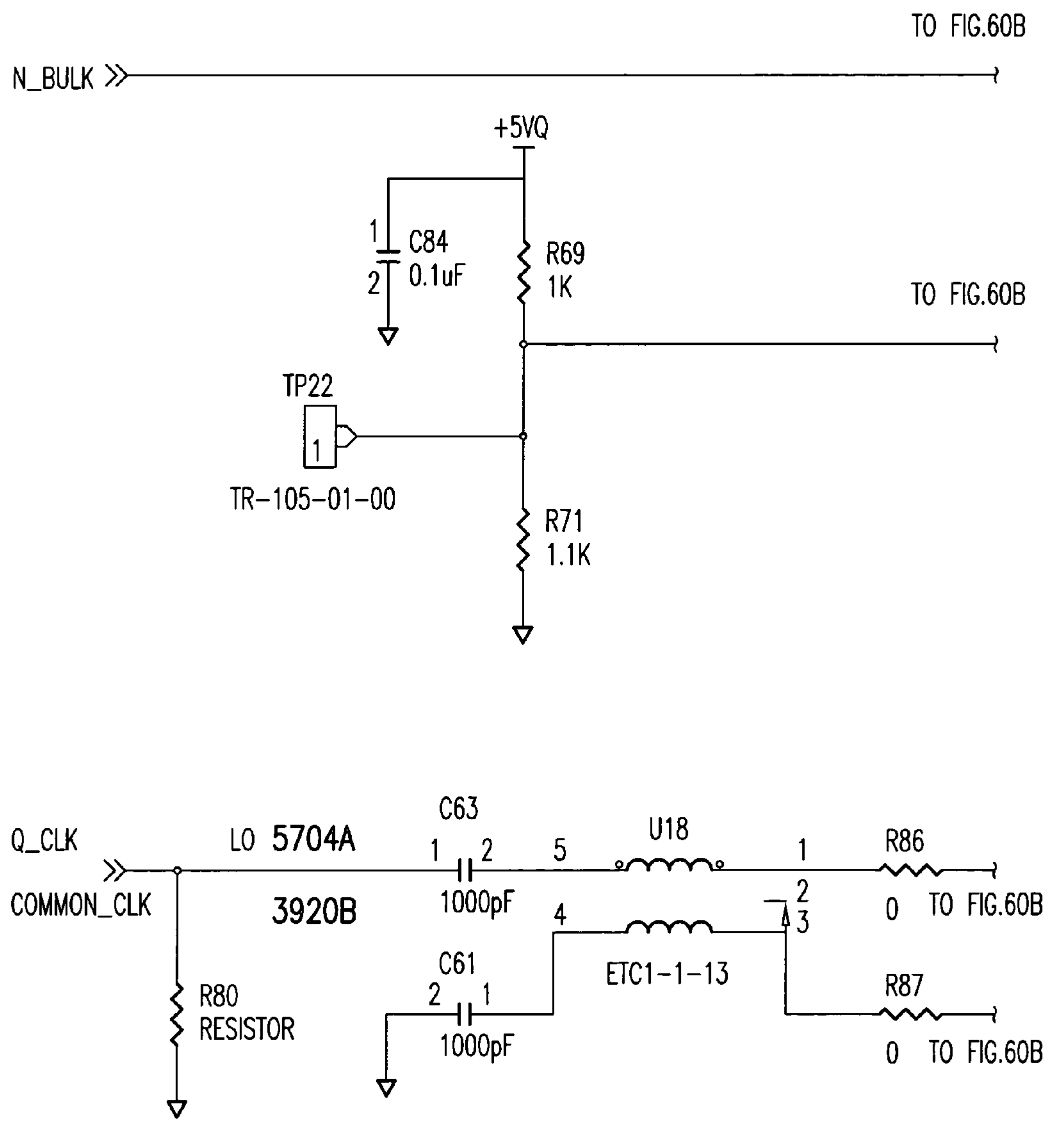
Figure 60B:
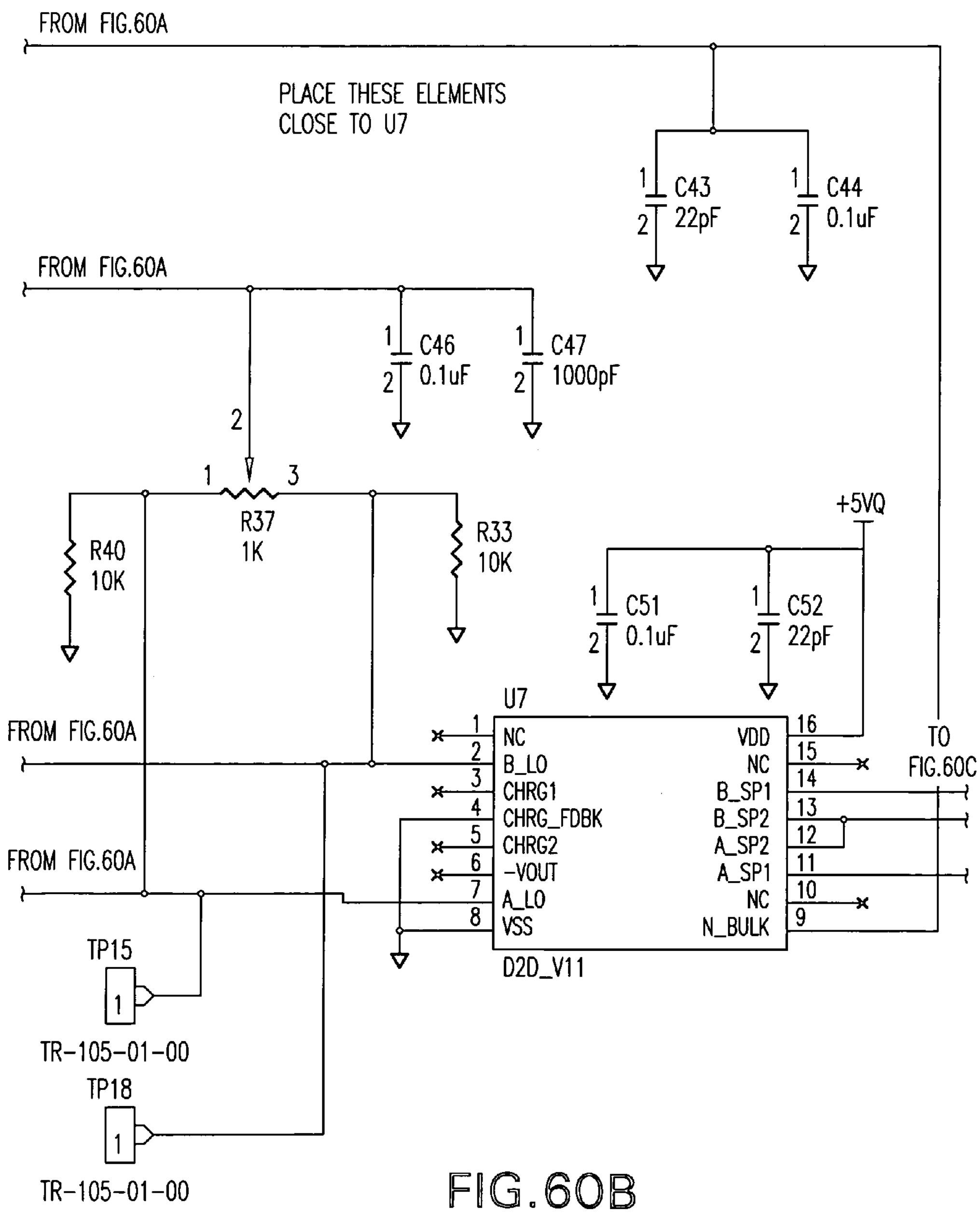
Figure 60C:
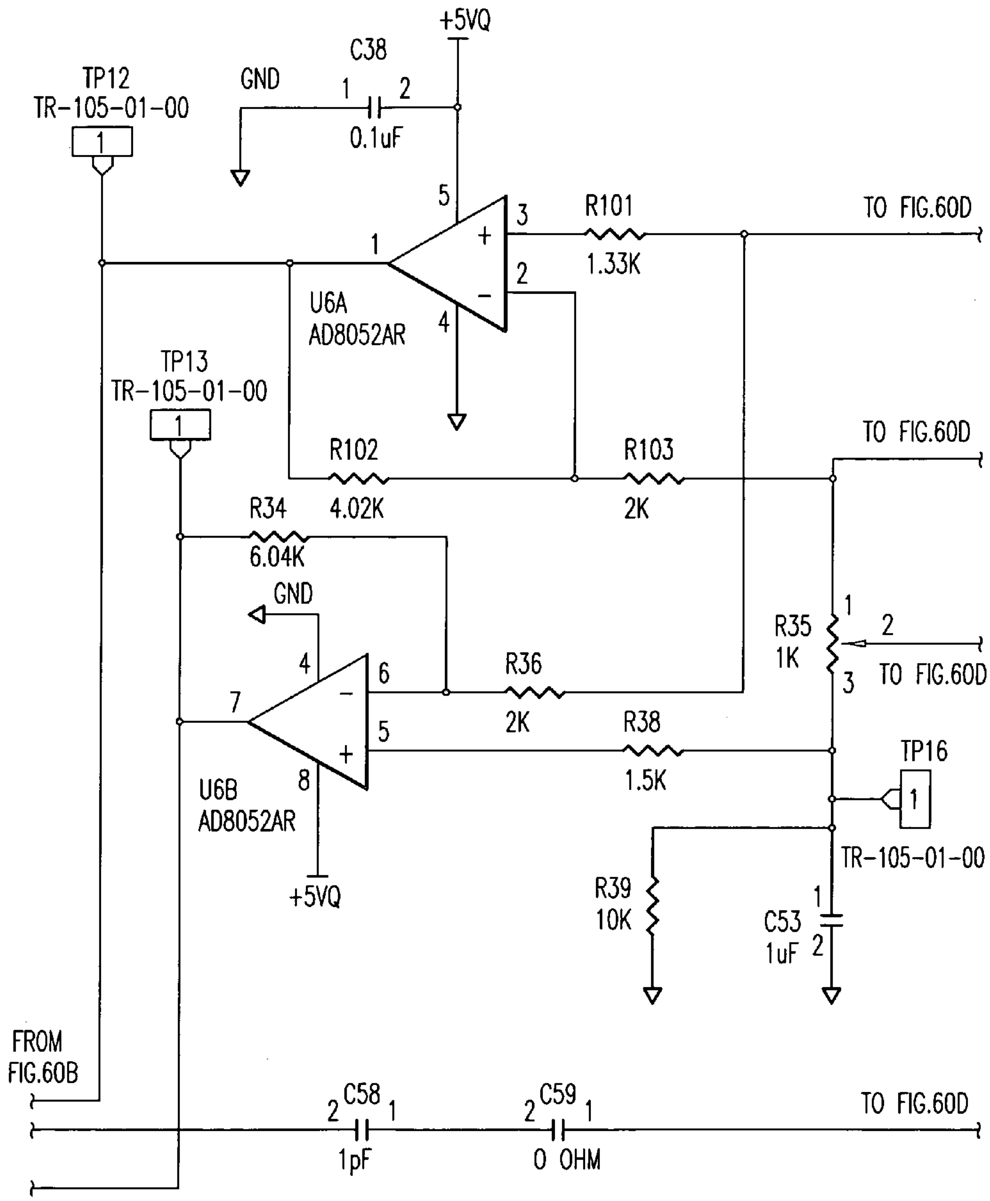
Figure 60D:
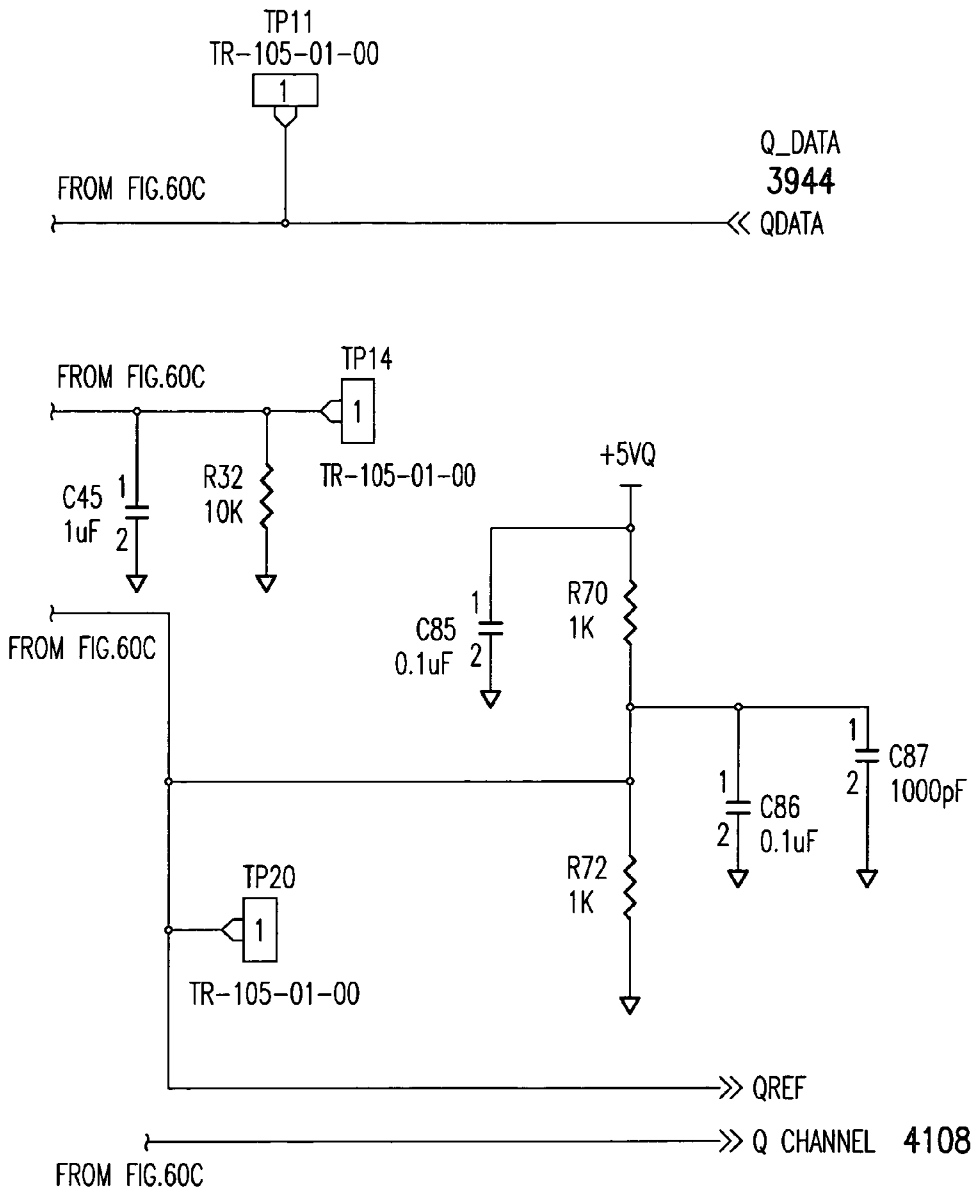

In an embodiment, the control signal generator 3908 is preferably implemented using a synthesizer. An example synthesizer is shown in FIG. 55. A corresponding BOM list is shown in FIGS. 56A and 56B. It is noted that the invention is not limited to this example.

6.3.7. LNA/PA

Figure 64:
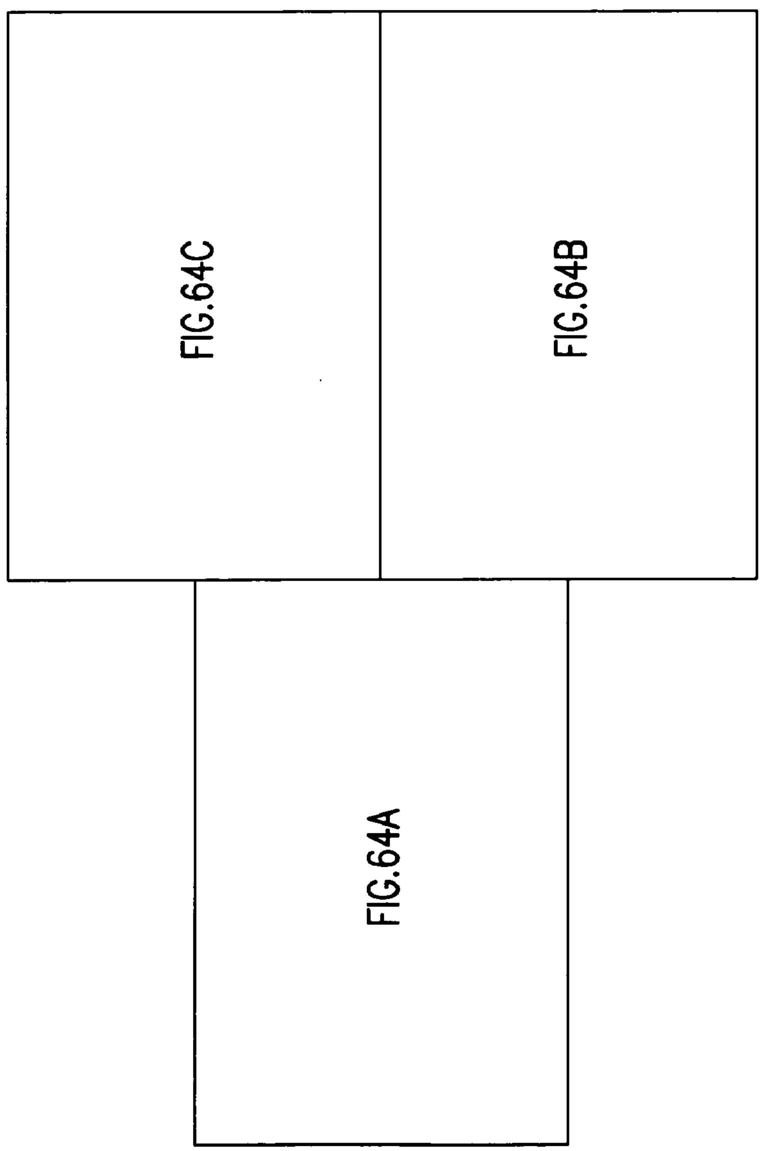
Figure 64A:
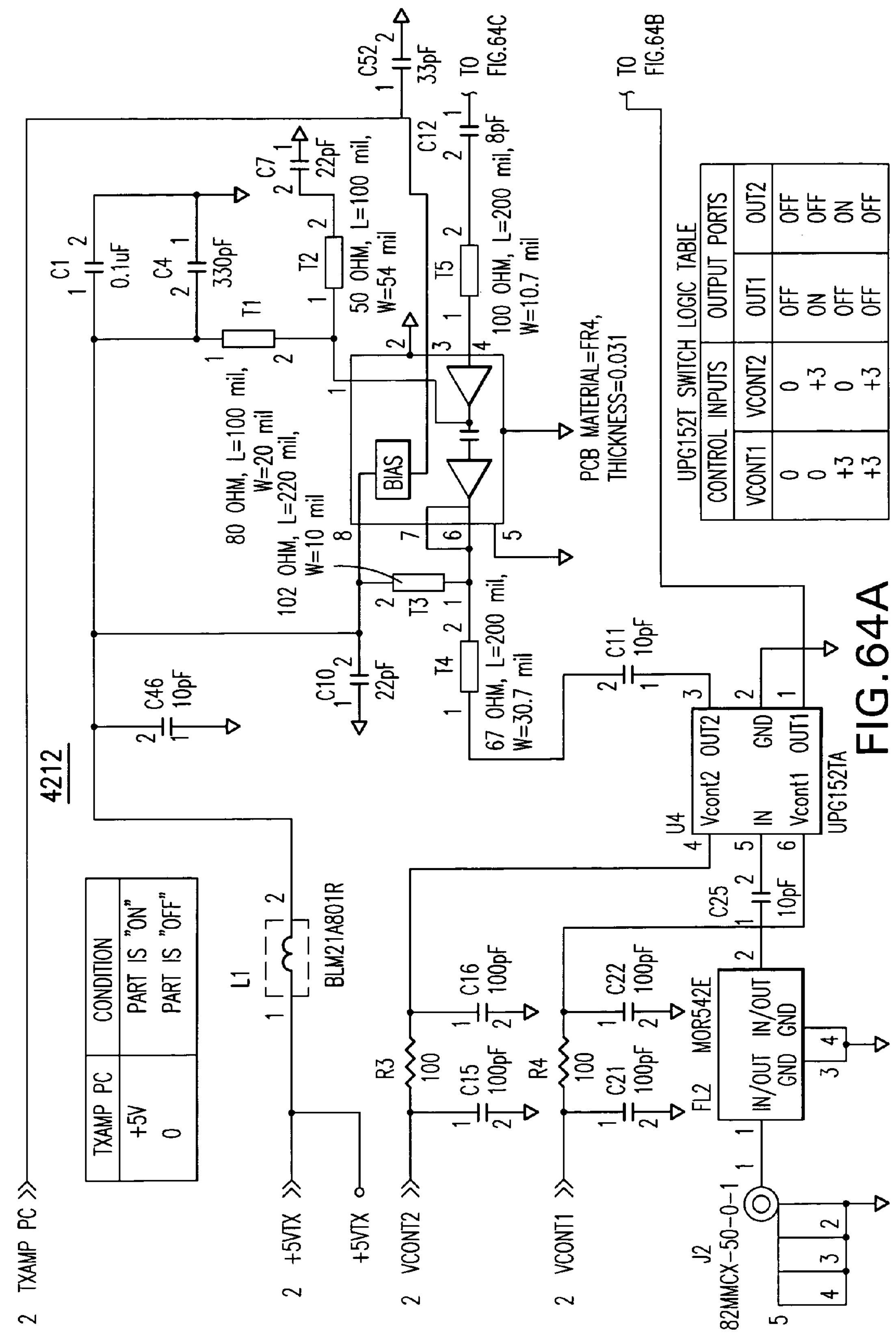
Figure 64B:
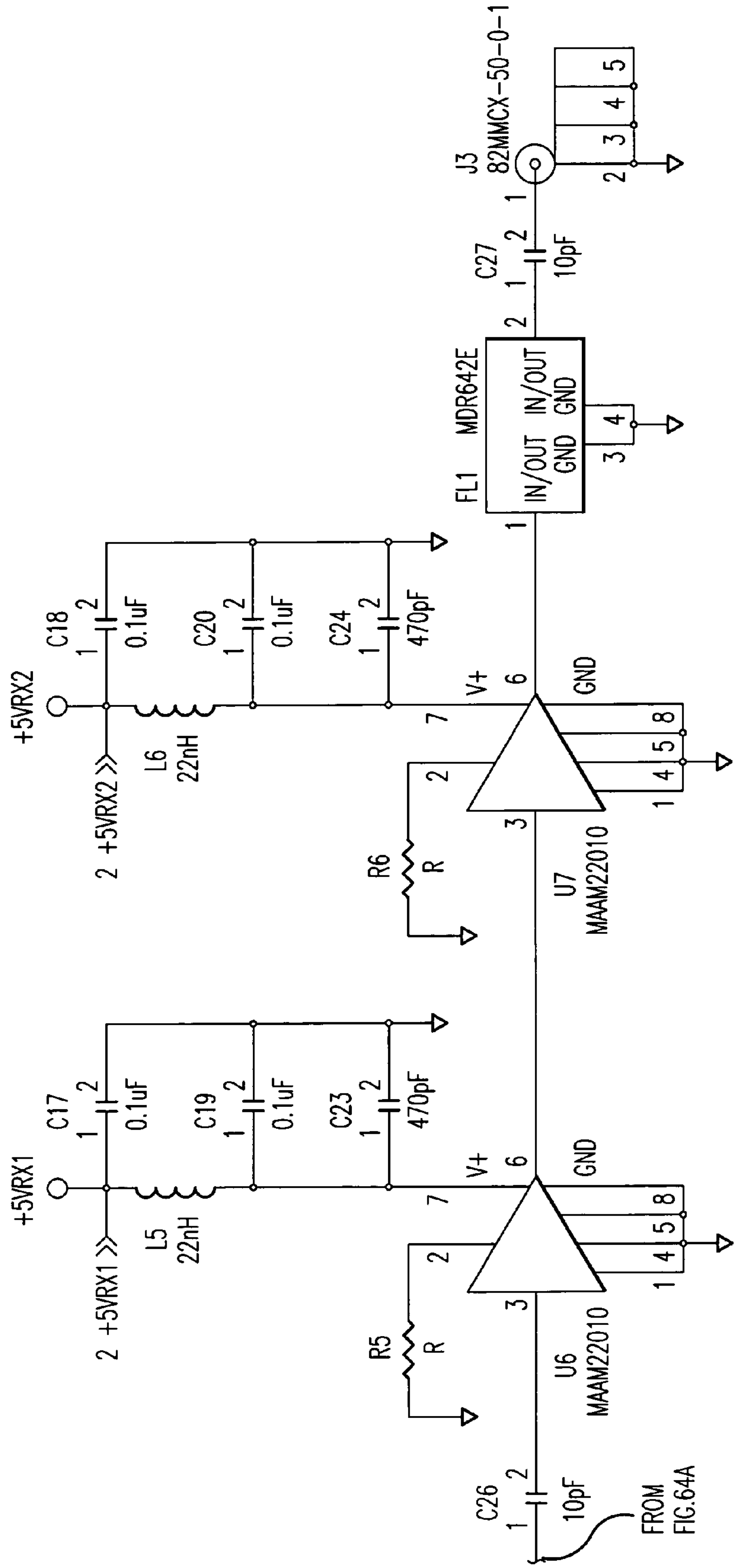
Figure 64C:
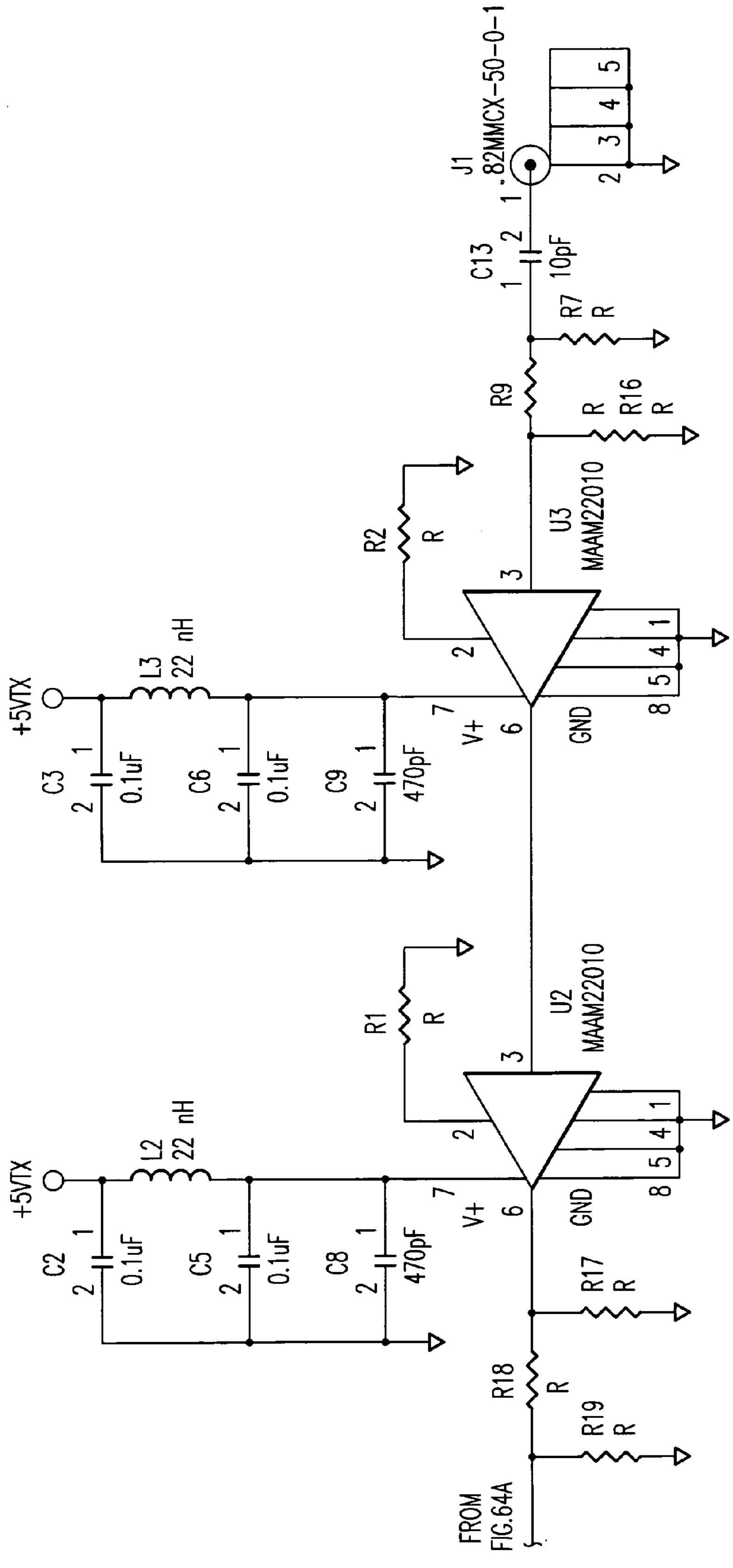
Figure 65:
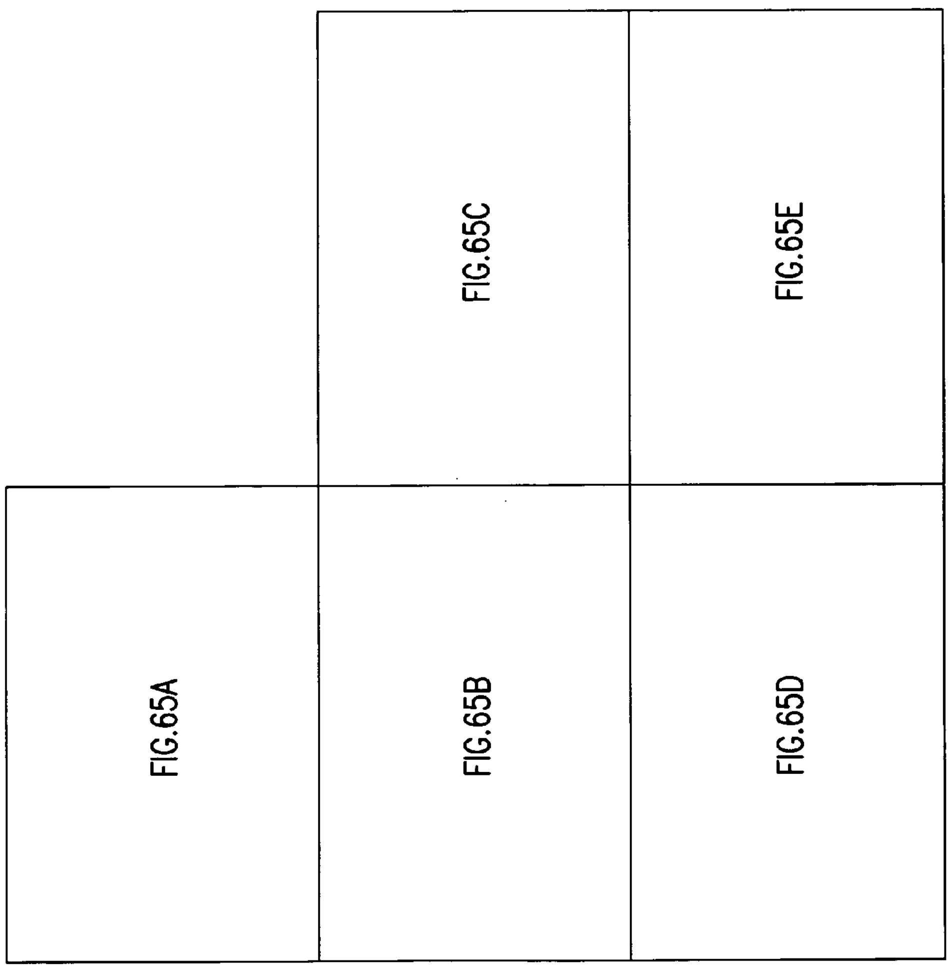
Figure 65A:
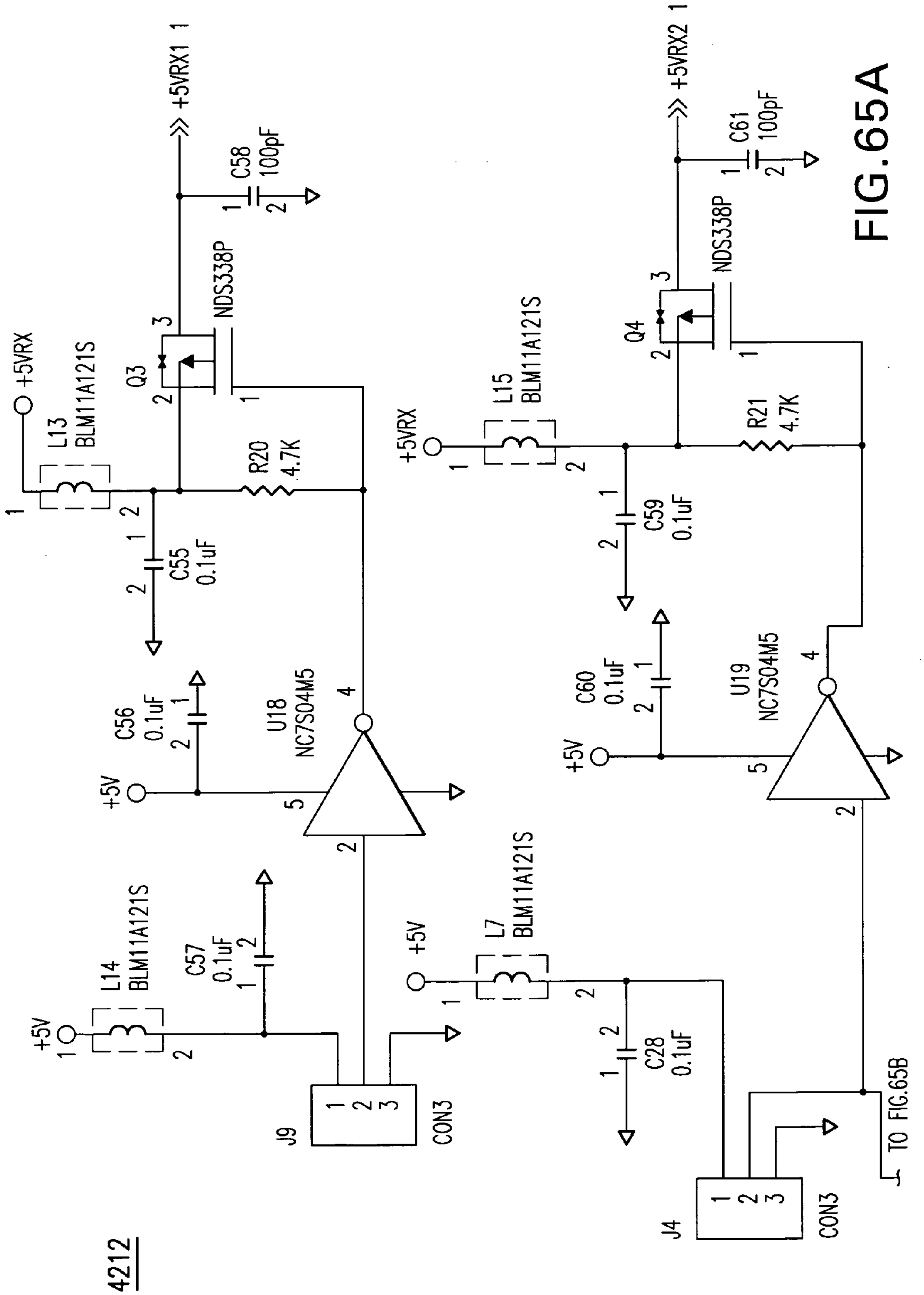
Figure 65B:
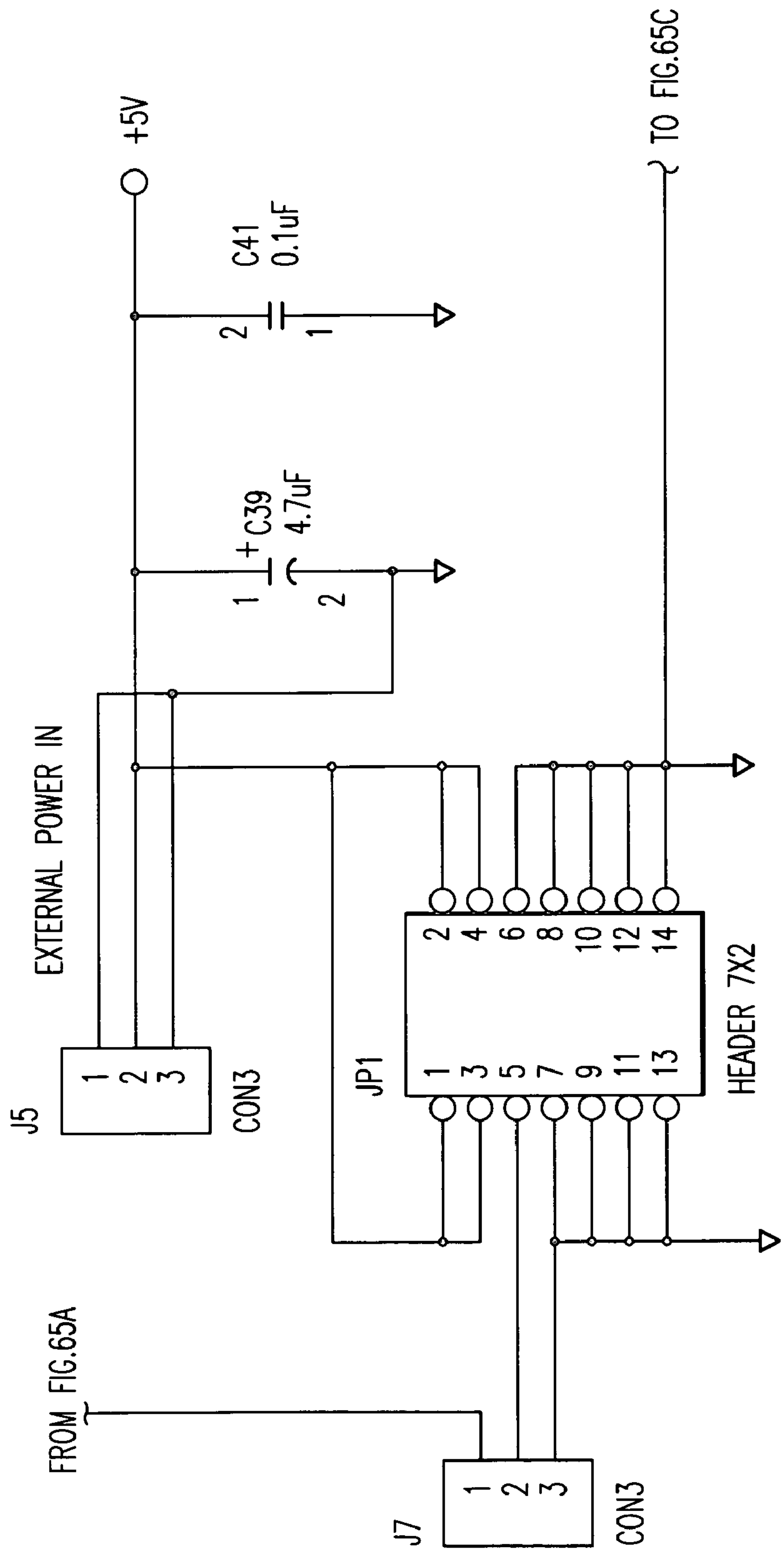
Figure 65C:
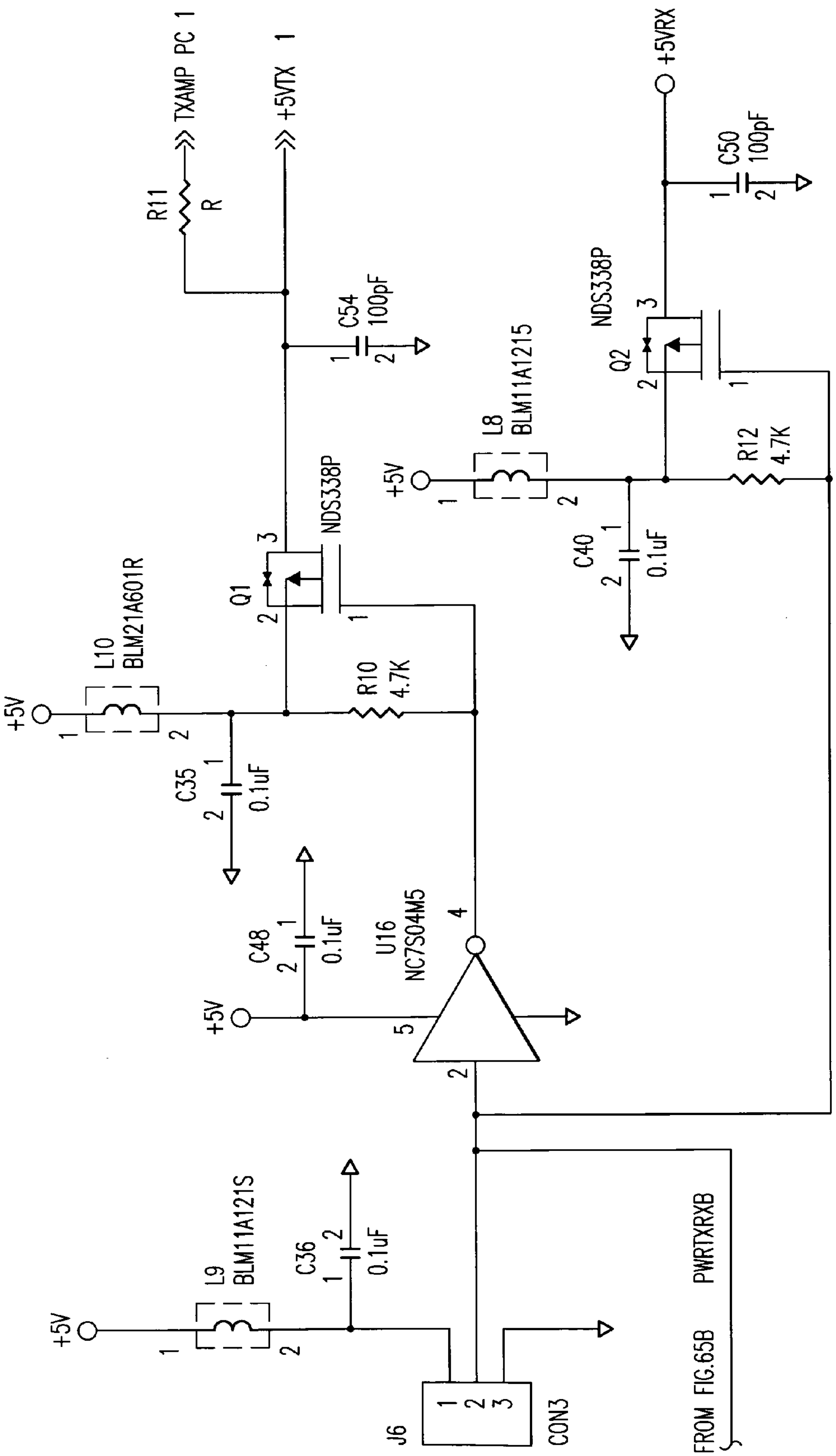
Figure 65D:
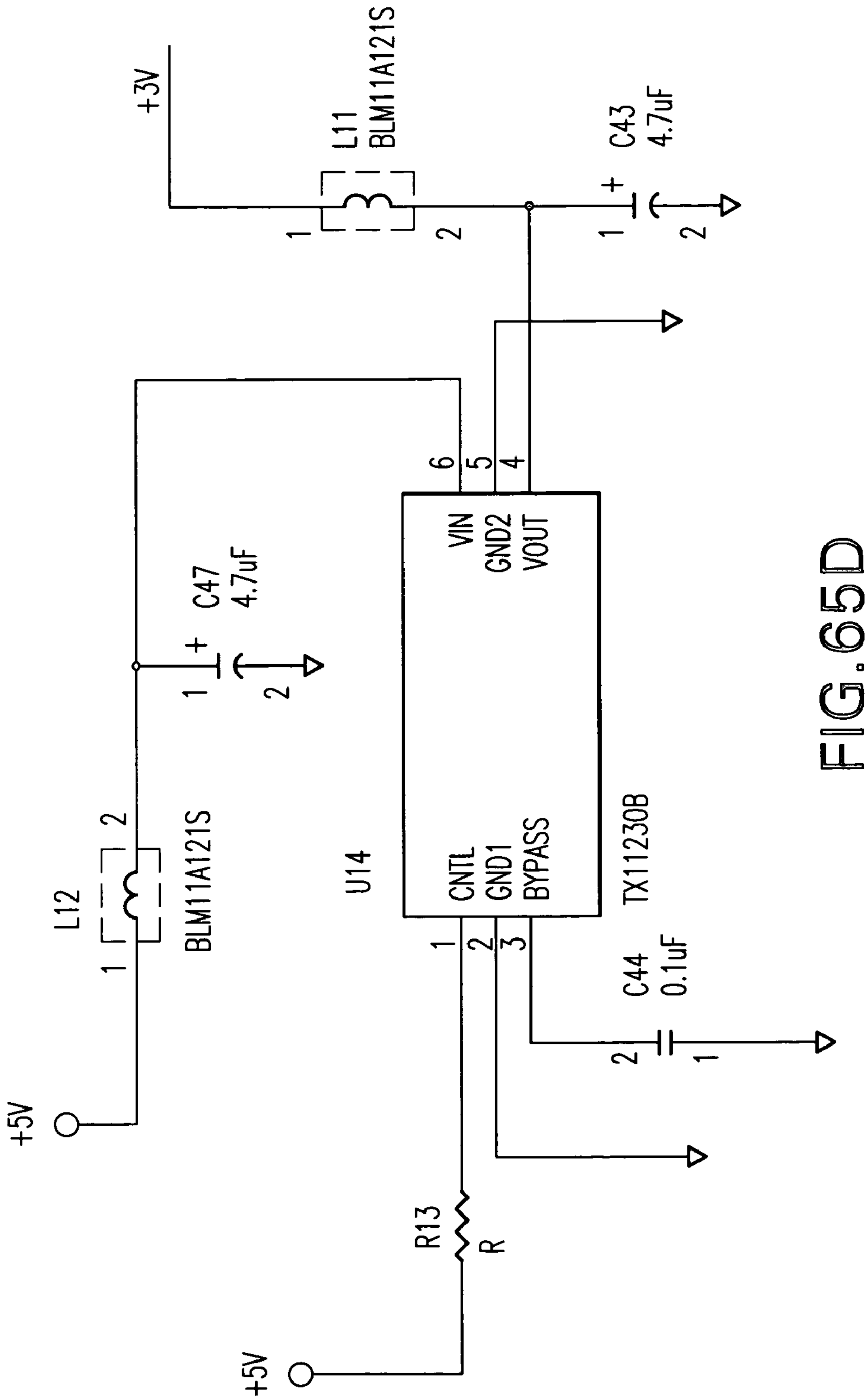
Figure 65E:
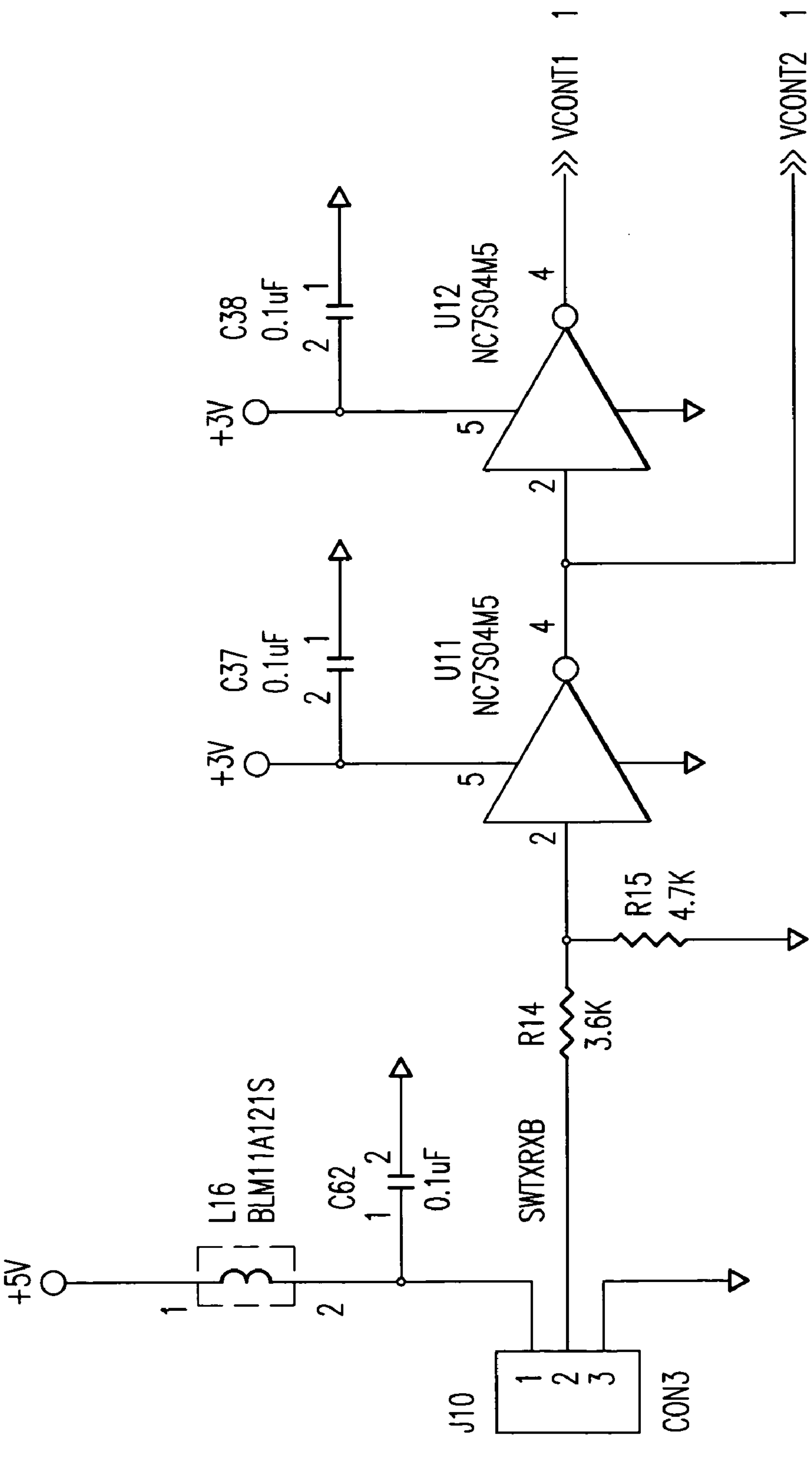

An example LNA/PA 3904 is shown in FIGS. 64 and 65. A corresponding BOM list is shown in FIG. 66. It is noted that the invention is not limited to this example.

6.3.8. Test Results

Test results relating to the operation of the WLAN interface/modem 3902 are shown in FIGS. 67–70, 90–94, and 151–169. FIGS. 95–100 relate to IIP2 and IIP3, and FIG. 101 relates to power consumption. It is noted that the invention is not limited to this example.

6.4 IEEE Standard 802.11 Background

Embodiments of the present invention shall now be described in greater detail. It is noted that these embodiments are described herein for illustrative purposes only. The invention is not limited to these embodiments. Other embodiments will be apparent to persons skilled in the relevant art(s) based on the teachings contained herein.

IEEE Std 802.11-1997 defines a medium access control (MAC) sublayer, MAC management protocols and services, and three physical (PHY) layers. The three PHY layers are an infrared (1R) baseband PHY, a frequency hopping spread spectrum (FHSS) radio in the 2.4 GHz band, and a direct sequence spread spectrum (DSSS) radio in the 2.4 GHz band. All three physical layers describe both 1 and 2 Mbps operation. The universal frequency translation techniques of the present invention are applicable to these physical layers.

Two further PHY layers are IEEE Std 802.11a and IEEE Std 802.11b. IEEE Std 802.11a is an orthogonal frequency domain multiplexing (OFDM) radio in the UNII bands, delivering up to 54 Mbps data rates. The second, IEEE Std 802.11b, is an extension to the DSSS PHY in the 2.4 GHz band, delivering up to 11 Mbps data rates. The present invention is also applicable to these physical layers.

The IEEE 802.11 standard describes a WLAN that delivers services similar to those found in wired networks, including high throughput, highly reliable data delivery, and continuous network connections. In addition, IEEE 802.11 describes a WLAN that allows transparent mobility and built-in power saving operations to the network user. The subsections that follow describe the architecture of the IEEE 802.11 network, concepts related to supporting the architecture, and applications of universal frequency translation in the IEEE 802.11 network architecture.

Further details on designing, configuring, and operating WLANs and WLAN stations according to IEEE Standard 802.11 are provided in a number of publicly available documents, such as Bob O'Hara & Al Petrick, "IEEE 802.11 Handbook: A Designer's Companion" (1999) (hereinafter IEEE 802.11 Handbook), which is incorporated herein by reference in its entirety.

6.4.1 IEEE 802.11 Architecture

An IEEE 802.11 WLAN provides a network where most decision making is distributed to mobile stations. This provides several advantages, including being tolerant of faults in WLAN equipment and eliminating bottlenecks that may be present in a centralized architecture. The IEEE 802.11 WLAN architecture is very flexible, supporting small, transient networks and large semipermanent or permanent networks. Deep power-saving modes of operation are built into the architecture, along with protocols to prolong the battery life of mobile equipment without losing network connectivity. These advantages of the IEEE 802.11 WLAN architecture may be enhanced by the incorporation of universal frequency translation technology of the present invention. An IEEE 802.11 architecture environment may comprise several components. These may include: the station, the access point (AP), the wireless medium, the basic service set, the distribution system (DS), and the Extended Service Set. The architecture may also include station services and distribution services.

The IEEE 802.11 WLAN architecture also embeds a level of indirection that has not been present in previous LANs. This level of indirection, transparent to protocol users of the IEEE 802.11 WLAN, allows a mobile station to roam throughout a WLAN while appearing to be stationary to protocols above the MAC that have no concept of mobility. This ability allows all of the existing network protocols to run over a WLAN without any special considerations.

6.4.1.1 The Station

The station connects to the wireless medium. The station includes a MAC and a PHY. In embodiments, the station may be referred to as the network adapter or network interface card (NIC), as known to persons skilled in the relevant art(s) from the teachings herein.

The station may be mobile, portable, or stationary. Every station supports station services. These services include authentication, de-authentication, privacy, and delivery of the data (MAC service data unit or MSDU in the standard). Station services are further described elsewhere herein. Embodiments of WLAN stations incorporating universal frequency translation technology of the present invention are presented further below.

6.4.1.2 The Basic Service Set

A basic service set (BSS) is a set of stations that communicate with one another. When all stations in a BSS are mobile stations, and there is no connection to a wired network, the BSS may be referred to as an independent BSS (IBSS). An IBSS is an entire network. Only those stations communicating with each other in the IBSS are part of the LAN. An IBSS may be a short-lived network, with a small number of stations, that is created for a particular purpose.

Figure 124:
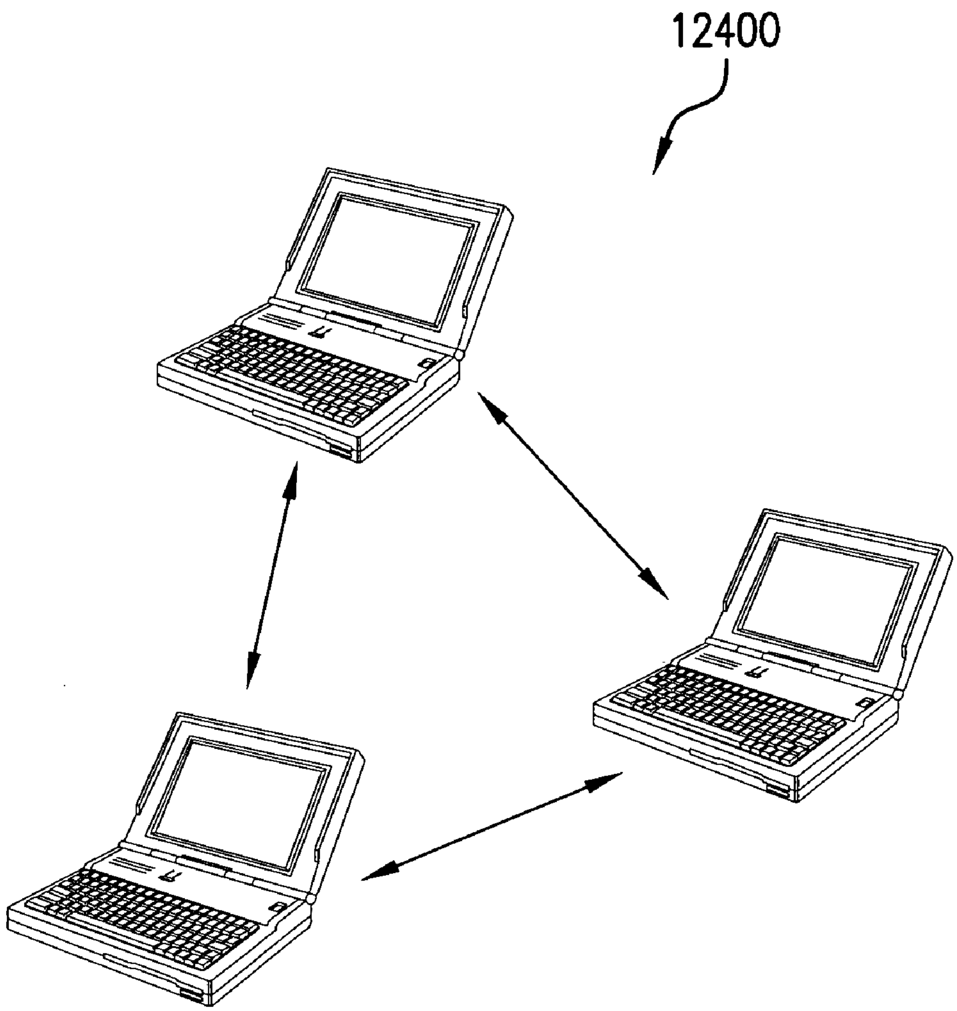
FIG. 124 illustrates an example IBSS with mobile stations that must be in direct communication range to communicate with each other.

Mobile stations within an IBSS communicate directly with one another. Not every mobile station within an IBSS may be able to communicate with every other mobile station, but they are all part of the same IBSS. There is no relay function in an IBSS. Thus, if one mobile station must communicate with another, they must be in direct communication range. FIG. 124 illustrates an IBSS 12400 with mobile stations that must be in direct communication range to communicate with each other.

When a BSS includes an access point (AP), the BSS is no longer independent. It may then be referred to as an infrastructure BSS, or simply a BSS. An AP is a station that also provides distribution services. Distribution services are further described elsewhere herein.

Figure 101A:
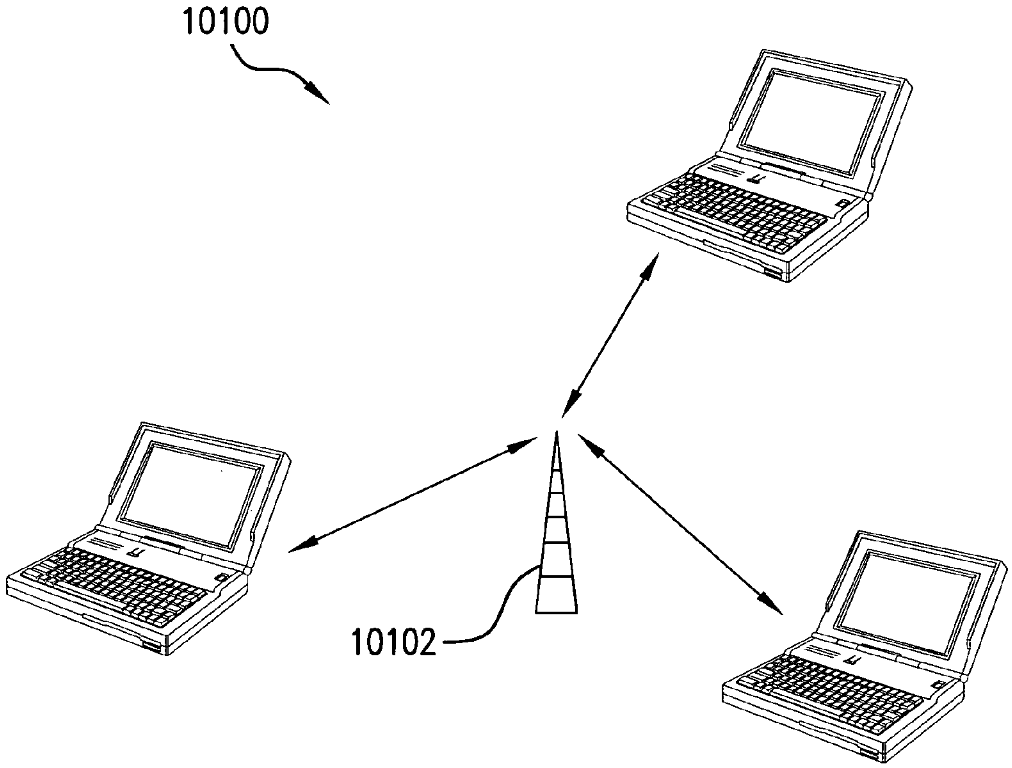
FIG. 101A illustrates an IBSS with mobile stations that communicate through an AP.
Figure 101B:
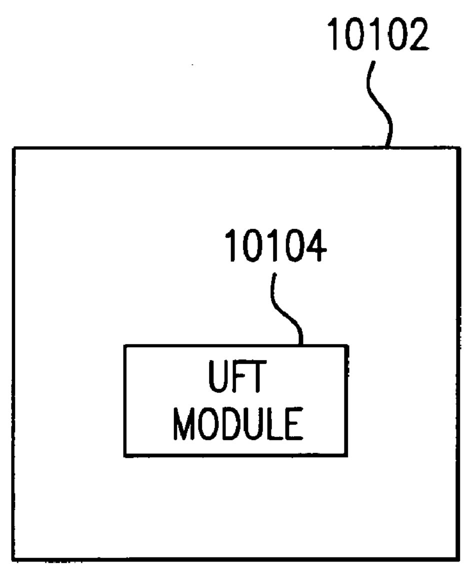
FIG. 101B illustrates an AP 10102 that includes a universal frequency translation module.

In an infrastructure BSS, all mobile stations communicate with the AP. The AP provides both a connection to a wired LAN, if one exists, and a local relay function for the BSS. For example, if one mobile station in a BSS must communicate with another mobile station within the BSS, the communication is sent first to the AP, and then from the AP to the other mobile station. Hence, communications that both originate and end in the same BSS may consume twice the bandwidth as direct communications from one mobile station to another. FIG. 101A illustrates an IBSS 10100 with mobile stations that communicate through an AP 10102. A benefit provided by an AP is the buffering of traffic for a mobile station while that station is operating in a very low power state. Protocols and mechanisms supporting power saving by mobile stations are further described elsewhere herein. An AP may incorporate universal frequency translation technology to provide for the AP's relay communication function. FIG. 101B illustrates an AP 10102 that includes a universal frequency translation module 10204, according to an embodiment of the present invention. The embodiments presented herein for receiving and transmitting WLAN signals by WLAN stations are applicable to APs.

6.4.1.3 Extended Service Set (ESS)

Figure 125:
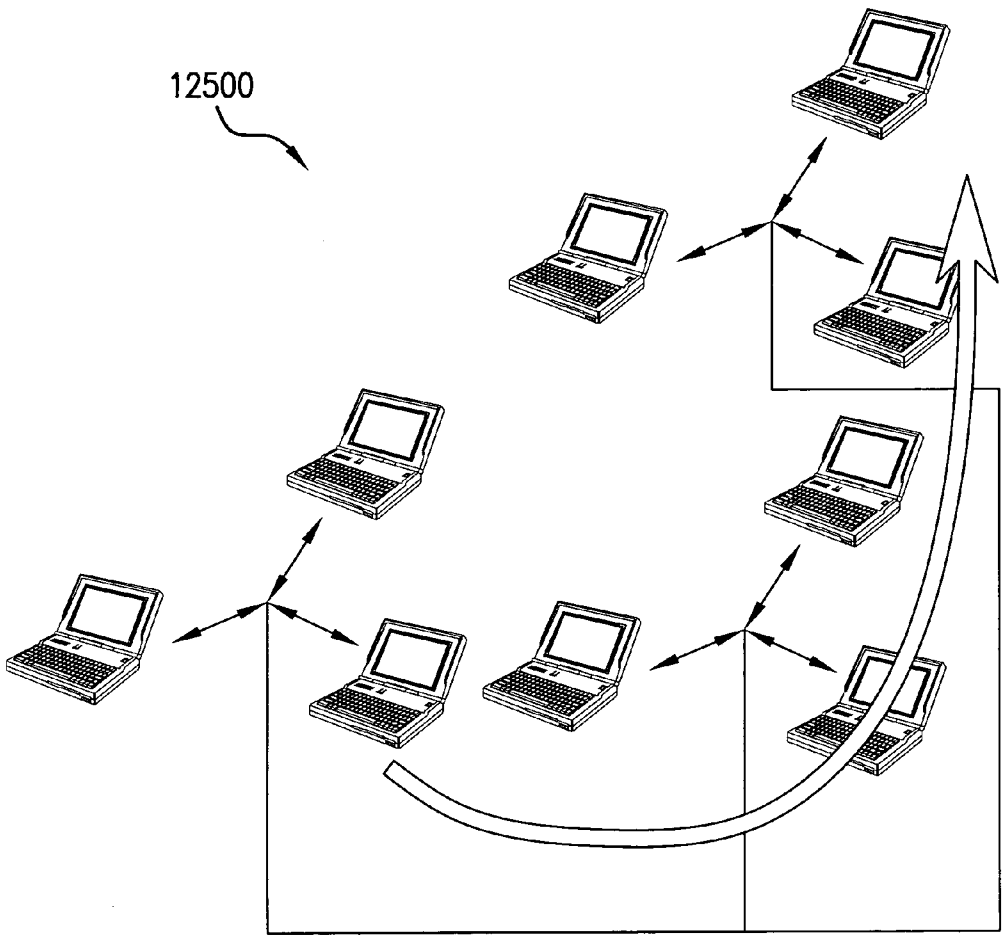
FIG. 125 illustrates an exemplary ESS.

A benefit provided by a WLAN is the mobility it provides to its users. This mobility is not confined to a single BSS. IEEE 802.11 extends the range of mobility to any arbitrary range through an extended service set (ESS). An ESS is a set of two or more infrastructure BSSs. In an ESS, APs communicate among themselves to forward traffic from one BSS to another, and to facilitate the movement of mobile stations from one BSS to another. The APs perform this communication via an abstract medium called the distribution system (DS). The DS is a backbone of the WLAN and may be constructed of either wired or wireless networks. The DS is a thin layer in each AP that determines whether communications received from the BSS are to be relayed back to a destination in the BSS, forwarded on the DS to another AP, or sent into the wired network infrastructure to a destination not in the ESS. Communications received by an AP from the DS are transmitted to the BSS to be received by the particular destination mobile station. To network equipment outside of the ESS, the ESS and all of its mobile stations appears to be a single MAC-layer network where all stations are physically stationary. Thus, the ESS hides the mobility of the mobile stations from everything outside the ESS. The IEEE 802.11 architecture provides this level of indirection, allowing existing network protocols that have no concept of mobility to operate correctly with a WLAN where mobility exists. FIG. 125 illustrates an exemplary ESS 12500.

6.4.1.4 Distribution System

The distribution system (DS) allows an AP to communicate with another AP. The APs may exchange frames for stations in their BSSs, forward frames to follow mobile stations from one BSS to another, and exchange frames with wired networks, if any. As set forth by IEEE 802.11, the DS is not necessarily a network. The standard does not place any restrictions on how the DS is implemented, only on the services it must provide. Thus, the DS may be a wired network, for example, such as IEEE 802.3, or it may be an application specific box that interconnects the AP, and provides the required distribution services.

6.4.1.5 IEEE 802.11 Services

There are nine services defined by the IEEE 802.11 architecture. These services may be divided into two groups: station services and distribution services. Station services comprise authentication, de-authentication, privacy, and delivery of the data. Distribution services comprise association, disassociation, re-association, distribution, and integration.

6.4.1.5.1 Station Services

Four station services—authentication, de-authentication, privacy, and data delivery-provide a IEEE 802.11 WLAN with functions similar to those expected of a wired network. The physical network cable connection of a wired network is similar to the authentication and de-authentication services, where use of the network is limited to authorized users. The authentication service is used to prove the identity of one station to another. Without this proof of identity, the station is not allowed to use the WLAN for data delivery. The de-authentication service is used to eliminate a previously authorized user from any further use of the network. Thus, once a station is de-authenticated (for example, when an employee resigns) that station can no longer access the services of the IEEE 802.11 WLAN.

The privacy service of IEEE 802.11 is designed to provide an equivalent level of protection for data traversing the WLAN as is provided by a wired network that exists in an office building with restricted physical access to the network plant. This service protects the data only as it traverses the wireless medium. It is not designed to provide complete protection of data between applications running over a mixed network environment that happens to include an IEEE 802.11 WLAN.

Finally, the data delivery service of an IEEE 802.11 WLAN is similar to that provided by all other IEEE 802.11 LANs. The data delivery service provides reliable delivery of data frames from a MAC in a first station to a MAC in one or more further stations, with minimal duplication and minimal reordering.

6.4.1.5.2 Distribution Services

Five distribution services—association, re-association, disassociation, distribution, and integration—provide services necessary to allow mobile stations to roam freely within an ESS, and to allow an IEEE 802.11 WLAN to connect with a wired LAN infrastructure. The distribution services comprise a thin layer above the MAC and below the logical link control (LLC) sublayer. The distribution services may be invoked to determine how to forward frames within an IEEE 802.11 WLAN, and to determine how to deliver frames from a IEEE 802.11 WLAN to network destinations outside of the WLAN.

The association service is used to make a logical connection between a mobile station and an AP. This logical connection allows for the DS to know where and how to deliver data to the mobile station. The logical connection allows the AP to accept data frames from the mobile station and to allocate resources to support the mobile station. Typically, the association service is invoked once, when the mobile station enters the WLAN for the first time, such as after the application of power, or when rediscovering the WLAN after being out of touch for a time.

The re-association service is similar to the association service, with a difference that it includes information about the AP with which a mobile station has been previously associated. A mobile station may use the re-association service repeatedly as it moves throughout an ESS. For instance, the mobile station may lose contact with an AP with which it is associated, and may need to become associated with a new AP. Through the re-association service, a mobile station provides information to an AP to which it will become associated. This information allows the AP to contact the AP previously associated with the mobile station. The previously associated AP may be contacted to obtain frames that may be waiting there for delivery to the mobile station, as well as other information that may be relevant.

The disassociation service may be used to force a mobile station to disassociate. An AP may inform one or more mobile stations that the AP can no longer provide the logical connection to the WLAN. This may be due to the available resources in the AP being exceeded, the AP shutting down, or other reasons. When the mobile station becomes disassociated, it may begin a new association by invoking the association service.

A mobile station may also use the disassociation service. When a mobile station is aware that it will no longer require the services of an AP, it may invoke the disassociation service to notify the AP that the logical connection to the WLAN is not required. For example, this may occur when the mobile station is being shut down, or when the IEEE 802.11 adapter card is being ejected. Once the mobile station is disassociated, an AP may recover any resources dedicated to the mobile station for other uses.

When determining how to deliver the frames it receives, an AP uses the distribution service. When a mobile station sends a frame to an AP for delivery to another station, the AP invokes the distribution service to determine where to send the frame. It must be determined if the frame should be sent back into its own BSS for delivery to a mobile station associated with the AP, if the frame should be sent into the DS for delivery to another mobile station associated with a different AP, or if the frame should be sent to a network destination outside the IEEE 802.11 WLAN. The distribution service determines whether the frame is sent to another AP or to a portal.

The integration service couples the IEEE 802.11 WLAN to other LANs, including possibly one or more wired LANs, or other IEEE 802.11 WLANs. A portal performs the integration service. The portal is an abstract architectural concept and may physically reside as a thin layer in some or all APs, or may be a separate network component entirely. The integration service translates IEEE 802.11 frames into frames that may traverse another network. The integration service also translates frames from other network types to frames that may be delivered by an IEEE 802.11 WLAN.

6.4.1.5.3 Service Interaction

The IEEE 802.11 standard states that each station must maintain two variables that are dependent on the authentication/de-authentication services and the association/re-association/disassociation services. The two variables are authentication state and association state. While the standard describes these variables as being enumerated types, they are typically available internal to an implementation, and may be implemented as Boolean truth-values. The variables may be used in a simple state machine that determines the order in which certain services may be invoked and when a station may begin using the data delivery service. The variables must exist in enough instances to allow the station to maintain a unique copy for each station with which it communicates. A station may be authenticated with many different stations simultaneously. However, a station may be associated with only one other station at a time.

Figure 126:
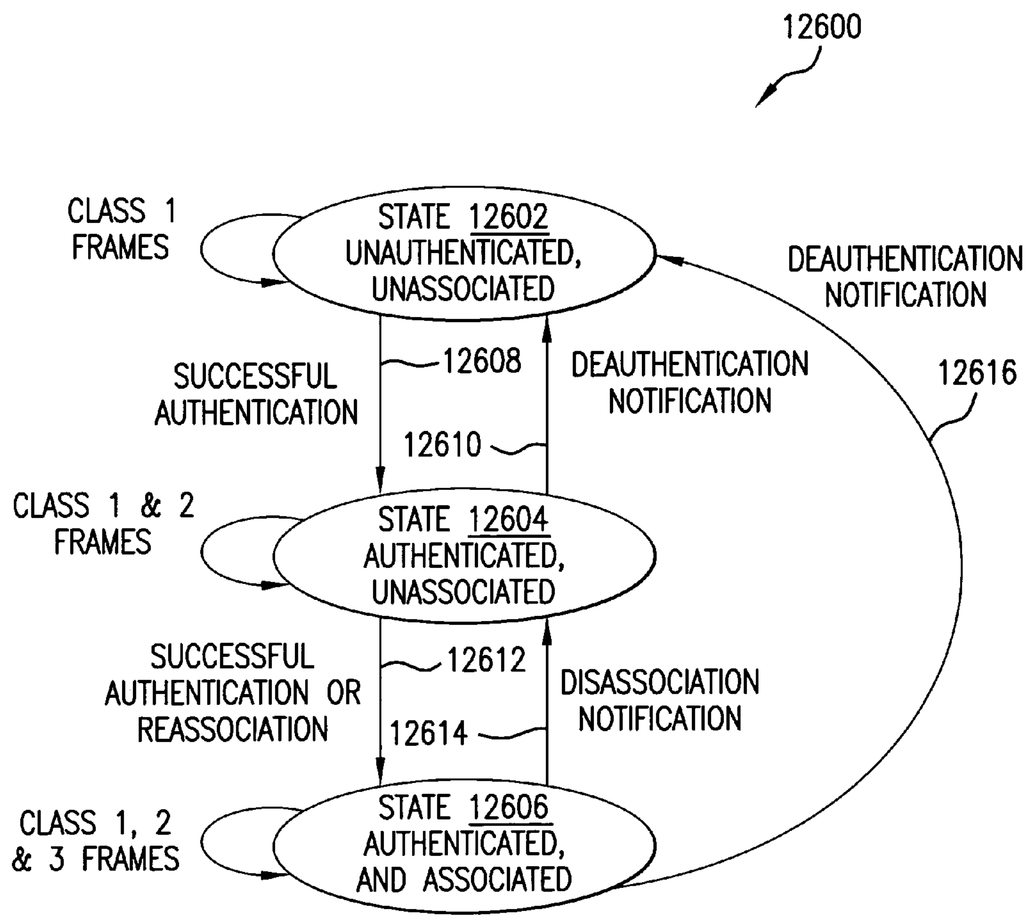
FIG. 126 illustrates a state diagram showing the relationship between state variables and services.

FIG. 126 illustrates a state diagram 12600 showing the relationship between state variables and services. A station begins operation in a first state, state 12602, where both authentication state and association state are false, indicating that the station is neither authenticated nor associated. In state 12602, a station may use a very limited number of frame types, which are more fully described below. The allowable frame types provide the capability for a station in state 12602 to find an IEEE 802.11 WLAN, an ESS, and its APs, to complete the required frame handshake protocols, and to implement the authentication service. If a station is not successful in becoming authenticated, it will remain in state 12602. If a station becomes authenticated, authentication state is set to true, and the station will make a transition to a state 12604. This transition is shown in FIG. 126 as transition 12608.

If a station is part of an IBSS, it may implement the data service in state 12602. This is because neither authentication nor association are used in an IBSS, leaving no mechanism for a station in an IBSS to leave state 12602.

In the second state, state 12604, the station has been authenticated. This is indicated by the authentication state being true. In state 12604, however, the station has not yet associated. In state 12604, additional frame types are allowed, beyond those allowed in state 12602. The additional frame types provide the capability for a station in state 12604 to implement the association, re-association, and disassociation services. If a station is not successful in becoming associated, it will remain in state 12604, unless it receives a de-authentication notification. If it receives a de-authentication notification, it will return to state 12602 via a transition 12610, and authentication state will be made false. If a station becomes associated, setting association state to true, it will travel along a transition 12612 to a state 12606.

In the third state, state 12606, the station has been both authenticated and associated, indicated by both authentication state and association state being true. In this state, all frame types are allowed and the station may use the data delivery service. A station will remain in state 12606 until receiving either a disassociation notification or a de-authentication notification, or until it re-associates with another station. If a station receives a disassociation notification, it will travel along a transition 12614 to state 12604 and set association state to false. If a station receives a de-authentication notification, it will travel along a transition 12616 to state 12602 and set both authentication state and association states to false.

A station must react to frames it receives in each of the states, even those frames that are disallowed for a particular state. A station will send a de-authentication notification to any station with which it is not authenticated if it receives frames that are not allowed in state 12602. A station will send a disassociation notification to any station with which it is authenticated, but not associated, if it receives frames not allowed in state 12604. These notifications will force the station that sent the disallowed frames to make a transition to the proper state, allowing it to proceed properly toward state 12606.

A station may make many transitions between states of state diagram 12600 shown in FIG. 126 as it roams through an ESS. Because a station may be authenticated with many stations at once, it may be in state 12604 with relation to those stations. However, a station may be in state 12606 with relation to a different station. When a station re-associates with another station, the station with which it was previously associated must be moved back to state 12604, setting the value of associated state for that station to false.

Figure 127:
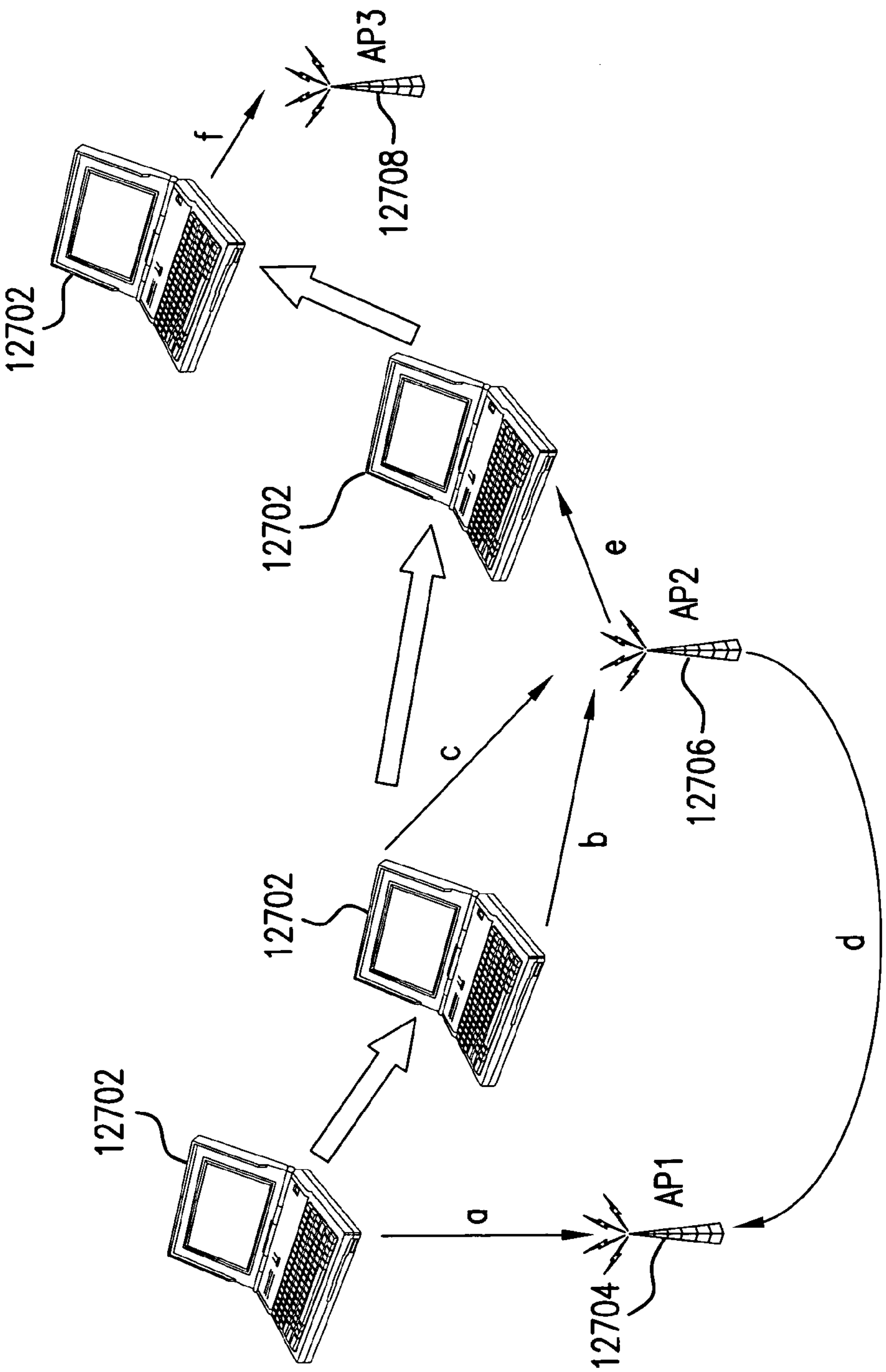

FIG. 127 illustrates a station 12702 moving between APs. As the station 12702 finds a first AP, AP 12704, it will authenticate and associate (a). As station 12702 moves, it may pre-authenticate with a second AP, AP 12706 (b). When the station 12702 determines that its association with AP 12704 is no longer desirable, it may re-associate with AP 12706 (c). The re-association with AP 12706 causes AP 12706 to notify AP 12704 of the new location of station 12702, terminating the previous association of station 12702 with AP 12704 (d). At some point, AP 12706 may be taken out of service. If this occurs, AP 12706 disassociates the stations that were associated with it (e). This would require station 12702 to find another access point, AP 12708, and to authenticate and associate, in order to continue using the wireless LAN (f).

The architecture and services of IEEE 802.11 allow a WLAN to appear similar to wired LANs. The architecture divides the functionality of the WLAN into non-overlapping functional blocks. The services described by IEEE 802.11 provide the user of IEEE 802.11 with the functionality of a wired LAN and the additional benefits of mobility.

6.5 Medium Access Control Overview

The IEEE 802.11 medium access control (MAC) supplies the functionality required to provide a reliable delivery mechanism for user data over potentially noisy, unreliable wireless media. The MAC does this while also providing advanced LAN services, equal to or beyond those of wired LANs.

6.5.1 MAC Functionality

A first function of the MAC is to provide a reliable data delivery service to users of the MAC. Through a frame exchange protocol at the MAC level, the IEEE 802.11 MAC improves on the reliability of data delivery over wireless media, as compared to earlier WLANs.

A second function of the IEEE 802.11 MAC is to control access to the shared wireless medium. It performs this function through two different access mechanisms: the basic access mechanism, known as the distributed coordination function, and a centrally controlled access mechanism, known as the point coordination function.

A third function of the IEEE 802.11 MAC is to protect the data that it delivers. Because a WLAN generally is not limited to a particular physical area, the IEEE 802.11 MAC provides a privacy service, called Wired Equivalent Privacy (WEP), which encrypts the data sent over the wireless medium. The level of encryption chosen may approximate the level of protection that data may have on a wired LAN that does not allow a physical connection to LAN wiring without authorization.

6.5.2 MAC Frame Exchange Protocol

Because the media used by the IEEE 802.11 WLAN are often very noisy and unreliable, the IEEE 802.11 MAC implements a frame exchange protocol to allow the source of a frame to determine when the frame has been successfully received at the destination. This frame exchange protocol adds some overhead beyond that of other MAC protocols, like IEEE 802.3, because it is not sufficient to simply transmit a frame and expect that the destination has received it correctly on wireless media. In addition, every station in a WLAN cannot necessarily communicate directly with every other station in the WLAN. This leads to a situation known as the hidden node problem. The MAC frame exchange protocol is also designed to address this problem of WLANs. The frame exchange protocol requires the participation of all stations in the WLAN. For this reason, every station decodes and reacts to information in the MAC header of every frame it receives.

6.5.2.1 Handling the Media

The minimal MAC frame exchange protocol consists of two frames: a frame sent from the source to the destination, and an acknowledgment from the destination that the frame was received correctly. The frame and its acknowledgment are an atomic unit of the MAC protocol. As such, they cannot be interrupted by the transmission from any other station.

The destination may not send an acknowledgment because of errors in the original frame, or because the acknowledgment itself was corrupted. If the source does not receive the acknowledgment, the source will attempt to transmit the frame again, according to the rules of the basic access mechanism described below. This retransmission of frames by the source effectively reduces the inherent error rate of the medium, with the cost of additional bandwidth consumption. Without this mechanism for retransmission, the users of the MAC, i.e., higher layer protocols, would be left to determine that their packets had been lost through higher layer timeouts or other means. Since higher layer timeouts are often measured in seconds, it is much more efficient to deal with this issue at the MAC layer.

6.5.2.2 The Hidden Node Problem

A WLAN may suffer from a problem that does not occur on a wired LAN. The problem is one of "hidden nodes." This is a result of the fact that every WLAN station cannot be expected to communicate directly with every other WLAN station. The following example illustrates this problem.

Figure 67:
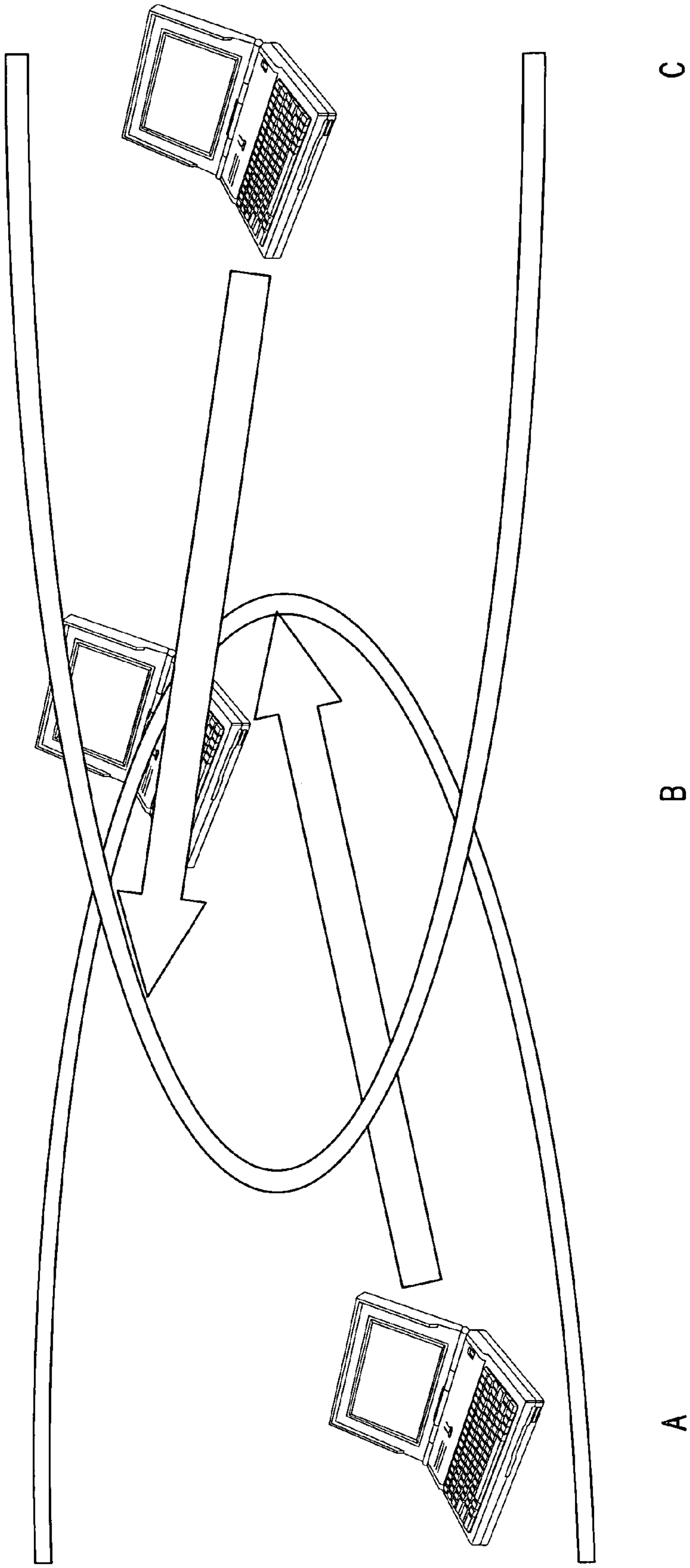
FIGS. 67–68 illustrate example WLAN station configurations with hidden nodes.
Figure 68:
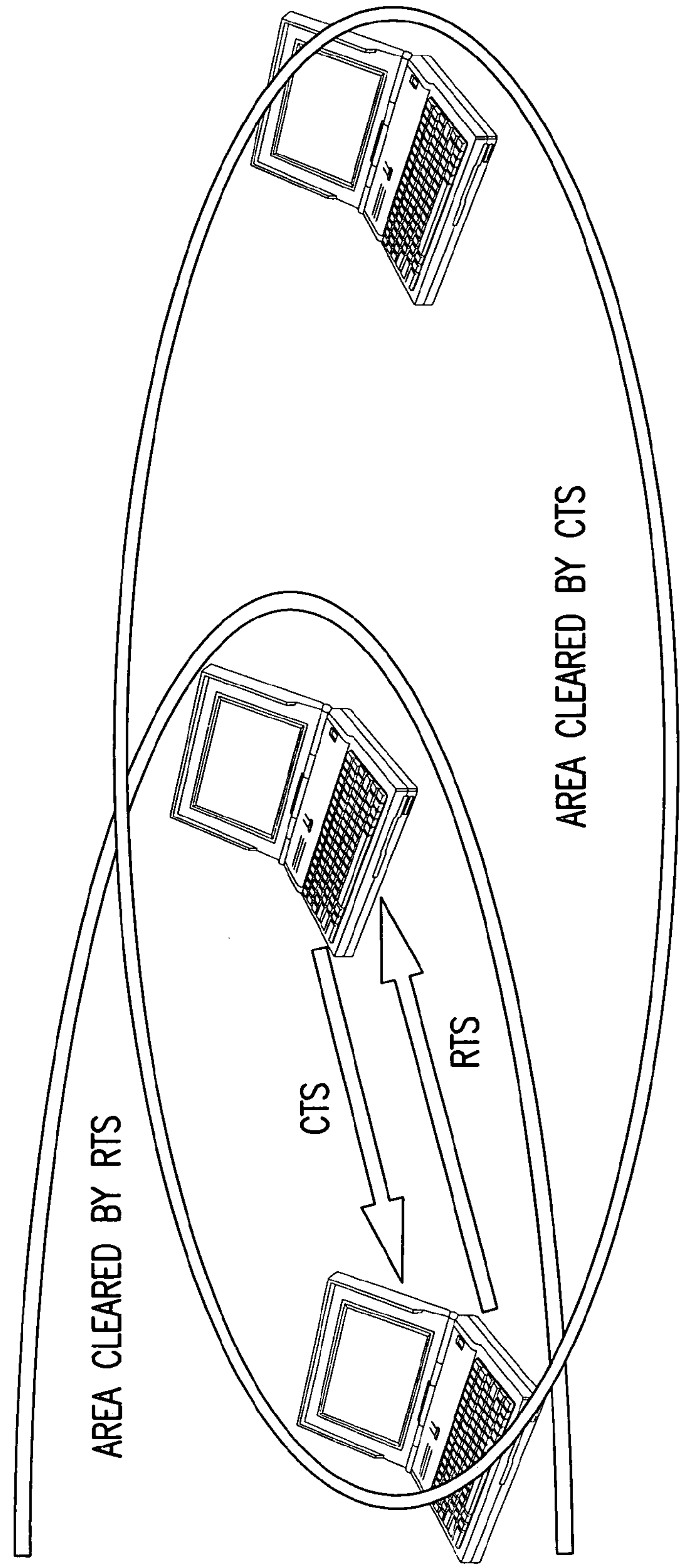

In this example, there are three stations, A, B, and C, arranged as shown in FIG. 67. Station A can communicate only with station B. Station B can communicate with stations A and C. Station C can communicate only with station B. If a simple "transmit and hope" protocol were to be used when station A was sending a frame to station B, the frame could be corrupted by a transmission begun by station C. Station C would be completely unaware of the ongoing transmission from station A to station B.

The IEEE 802.11 MAC frame exchange protocol addresses this problem by adding two additional frames to the minimal frame exchange protocol described so far. The two frames are a request to send frame and a clear to send frame. The source sends a request to send to the destination. The destination returns a clear to send to the source. Each of these frames contain information that allows other stations receiving them to be notified of the upcoming frame transmission and to delay any transmissions of their own. The request to send and clear to send frames serve to announce to all stations in the neighborhood of both the source and destination the impending transmission from the source to the destination. When the source receives the clear to send from the destination, the real frame that the source wants delivered to the destination is sent. If that frame is correctly received at the destination, the destination will return an acknowledgment, completing the frame exchange protocol. Depending on the configuration of a station and its determination of local conditions, a station may choose when to use the request to send and clear to send frames. See FIG. 68.

The four frames in this exchange are also an atomic unit of the MAC protocol. They cannot be interrupted by the transmissions of other stations. If this frame exchange fails at any point, the state of the exchange and the information carried in each of the frames allows the stations that have received these frames to recover and regain control of the medium in a minimal amount of time. A station in the neighborhood of the source station receiving the request to send frame will delay any transmissions of its own until it receives the frame announced by the request to send. If the announced frame is not detected, the station may use the medium. Similarly, a station in the neighborhood of the destination station receiving the clear to send frame will delay any transmissions of its own until it receives the acknowledgment frame. If the acknowledgment frame is not detected, the station may use the medium.

In the source station, a failure of the frame exchange protocol causes the frame to be retransmitted. This is treated as a collision, and the rules for scheduling the retransmission are described in the section on the basic access mechanism, below. To prevent the MAC from being monopolized attempting to deliver a single frame, there are retry counters and timers to limit the lifetime of a frame.

While this four-way frame exchange protocol is a required function of the MAC, it may be disabled by an attribute in the management information base (MIB). The value of the dot11RTSThreshold attribute defines the length of a frame that is required to be preceded by the request to send and clear to send frames. All frames of a length greater than the threshold will be sent with the four-way frame exchange. Frames of a length less than or equal to the threshold will not be preceded by the request to send and clear to send. This allows a network designer to tune the operation of the IEEE 802.11 WLAN for the particular environment in which it is deployed. In an environment with low demand for bandwidth or where the stations are concentrated in an area where all are able to receive the transmissions of every station, the threshold may be set so that the request to send and clear to send are never used. As long as stations are not contending with each other, the request to send and clear to send frames will most often be consuming bandwidth for no measurable gain. This is the default setting for the threshold. In an environment where there is a significant demand for the bandwidth available in the WLAN or where the stations are distributed such that some may not hear the transmission of others, the threshold may be set lower, causing long frames to use the request to send and clear to send frame exchange. The value to which the threshold should be set is arrived at by comparing the bandwidth lost to the additional overhead of the protocol to the bandwidth lost from transmissions being corrupted by hidden nodes. A typical value for the threshold is 128. However, the value chosen is dependent on the data rate and should be calculated for the particular data rate in use. It is rarely necessary to change the value of dot11RTSThreshold from the default value in an AP. By definition, an AP is heard by all stations in its BSS and will never be a hidden node. The only situation that may warrant changing the value for the RTS threshold in an AP is when APs are co-located and sharing a channel.

Timing intervals are described in the following subsection. Refer to Chapter 3 of the IEEE 802.11 Handbook for further details on MAC frame exchange protocol.

6.5.2.3 Timing Intervals

The decision by a station that the medium in not carrying a transmission when the station is listening before beginning its own transmission is based on timing intervals. The IEEE 802.11 MAC recognizes five timing intervals. There are two basic intervals determined by the PHY: the short interframe space (SIFS) and the slot time. Three additional intervals are built from the two basic intervals: the priority interframe space (PIFS), the distributed interframe space (DIFS), and the extended interframe space (EIFS). The SIFS is the shortest interval, followed by the slot time, which is slightly longer. The PIFS is equal to SIFS plus one slot time. The DIFS is equal to the SIFS plus two slot times. The EIFS is much larger than any of the other intervals. It is used when a frame that contains errors is received by the MAC, allowing the possibility from the MAC frame exchanges to complete correctly before another transmission is allowed. Through these five timing intervals, both the distributed coordination function (DCF) and point coordination function (PCF) are implemented.

6.5.3 Frame Formats

The IEEE 802.11 MAC accepts MSDUs from higher layers in the protocol stack for the purpose of reliably sending those MSDUs to the equivalent layer of the protocol stack in another station. To accomplish this task, the MAC adds information to the MSDU in the form of headers and trailers to create a MAC protocol data unit (MPDU). The MPDU is then passed to the physical layer to be sent over the wireless medium to the other stations. In addition, the MAC may fragment MSDUs into several frames, increasing the probability of each individual frame being delivered successfully. A discussion of fragmentation follows the description of frame formats in this chapter.

The header and trailer information, combined with the information received as the MSDU, is referred to as the MAC frame. This frame contains, among other things, addressing information, IEEE 802.11-specific protocol information, information for setting the NAV, and a frame check sequence for verifying the integrity of the frame. Further details of the frame format are presented in the following sections.

6.5.3.1 General Frame Format

Figure 69:
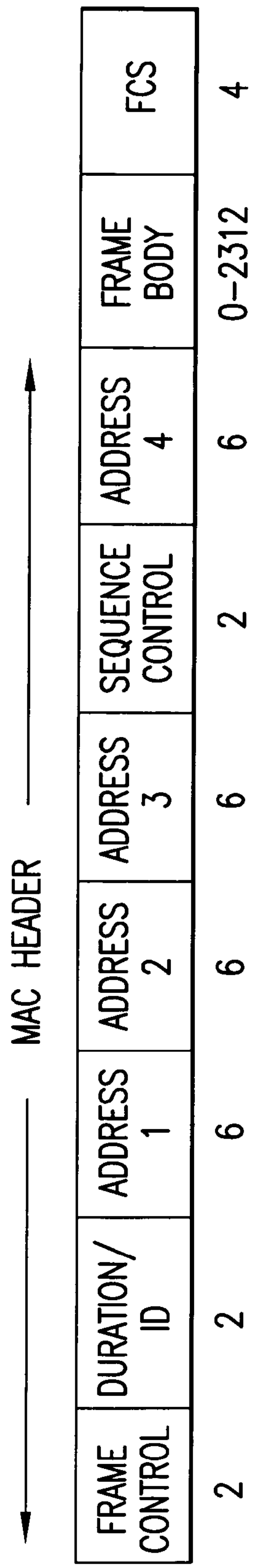
FIG. 69 illustrates a general IEEE 802.11 frame format.
Figure 70:
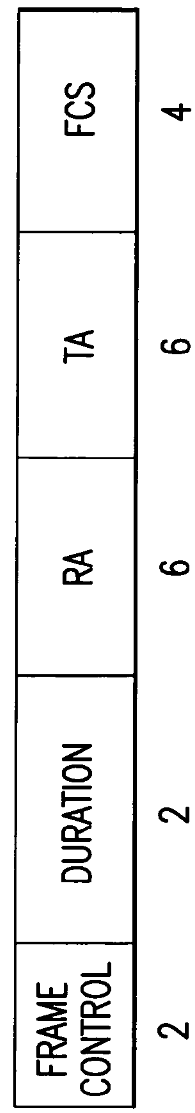
FIG. 70 illustrates a request to send frame.

The general IEEE 802.11 frame format is shown in FIG. 69. This frame format is quite a bit more complex than that for most other LAN protocols. The frame begins with a MAC header. The start of the header is the frame control field. A field that contains the duration information for the NAV or a short identifier follows it. Three addressing fields follow that field. The next field contains frame sequence information. The final field of the MAC header is the fourth address field. It may appear that the MAC header is very long. However, not all of these fields are used in all frames.

Following the MAC header is the frame body. The frame body contains the MSDU from the higher layer protocols. The final field in the MAC frame is the frame check sequence.

Refer to Chapter 3 of the IEEE 802.11 Handbook for further details on each of the general frame format fields, and their use in particular frame types.

6.5.4 Control Frame Subtypes

There are six control frame subtypes: request to send (RTS), clear to send (CTS), acknowledge (ACK), power save poll (PS-Poll), contention-free end (CF-End), and contention-free end plus ACK (CF-End+ACK). A description of these frames follows.

6.5.4.1 Request to Send

The request to send (RTS) frame is 20 bytes in length. It comprises the frame control field, the duration/ID field, two address fields and the frame check sequence field. The purpose of this frame is to transmit the duration information to those stations in the neighborhood of the transmitter, in order that the stations receiving the RTS frame will update their NAV to prevent transmissions from colliding with the data or management frame that is expected to follow. The RTS is also the first frame in a four-way frame exchange handshake between the transmitter and the receiver. See FIG. 70.

The RA identifies the individual MAC that is the immediate intended recipient of the frame. In an RTS frame, the RA is always an individual address. The TA identifies the source of the transmission. It is used by the station addressed by the RA to form the clear to send (CTS) frame that is the response to the RTS. The duration information conveyed by this frame is a measure of the amount of time required to complete the four-way frame exchange. The value of the duration is the length of time to transmit a CTS, the data or management frame, the acknowledge (ACK) frame, and the two SIFS intervals between the CTS and the data or management frame and between the data or management frame and the ACK. The duration is measured in microseconds. Fractional microseconds are always rounded up to the next larger integer value.

6.5.4.2 Clear to Send

The clear to send (CTS) frame is 14 bytes in length. It comprises the frame control field, the duration/ID field, one address field, and the frame check sequence field. The purpose of this frame is to transmit the duration information to those stations in the neighborhood of the station intended to receive the expected data or management frame, in order that the stations receiving the CTS frame will update their NAV to prevent transmissions from colliding with the data or management frame that is expected to follow. The CTS is the second frame in a four-way frame exchange handshake between the transmitter and the receiver. See FIG. 90.

The RA identifies the individual MAC address of the station to which the CTS is sent. In the CTS frame, the RA is always an individual address.

The RA value is taken directly from the TA of the preceding RTS frame. The duration information conveyed by this frame is a measure of the time required to complete the four-way frame exchange handshake. The value of the duration is the length of time to send the subsequent data or management frame, the acknowledge frame, and one SIFS interval. The duration value is calculated by subtracting the length of time to transmit a CTS and one SIFS interval from the duration that was received in the WFS frame. The duration is measured in microseconds. Fractional microseconds are always rounded up to the next larger integer value.

6.5.4.3 Acknowledge

The acknowledge (ACK) frame is 14 bytes in length. It comprises the frame control field, the duration/ID field, one address field and the frame check sequence field. The purpose of this frame is two-fold. First, the ACK frame transmits an acknowledgment to the sender of the immediately previous data, management, or PS-Poll frame that the frame was received correctly. This informs the sender of the frame of the frame's receipt and eliminates the requirement for retransmission by the sender. Second, the ACK frame is used to transmit the duration information for a fragment burst to those stations in the neighborhood of the station intended to receive the fragments. In this case, it performs exactly as the CTS frame. The ACK frame is the fourth frame in the four-way frame exchange handshake between transmitter and receiver. See FIG. 91.

The RA identifies the individual MAC address of the station to which the ACK is sent. In the ACK frame, the RA is always an individual address. The RA value is taken directly from the address 2 field of the immediately preceding data, management, or PS-Poll frame.

The value of the duration information is zero, if the ACK is an acknowledgment of a PS-Poll frame or is an acknowledgment of a management or data frame where the more fragments subfield of the frame control field is zero. The value of the duration information is the time to transmit the subsequent data or management frame, an ACK frame, and two SIFS intervals, if the acknowledgment is of a data or management frame where the more fragments subfield of the frame control field is one. In the latter case, the duration may be calculated by subtracting the length of time to transmit the ACK frame and one SIFS interval from the duration value received in the immediately preceding data or management frame. The duration value is measured in microseconds. Fractional microseconds are always rounded up to the next integer value.

6.5.4.4 Power Save Poll

The power save poll (PS-Poll) frame is 20 bytes in length. It comprises the frame control field, the duration/ID field, two address fields, and the frame check sequence field. The purpose of this frame is to request that an AP deliver a frame that has been buffered for a mobile station while it was in a power saving mode.

The BSSID identifies the AP to which this frame is directed. This BSSID should be the same BSSID as that to which the sending station has previously associated. The BSSID in the PS-Poll frame is always an individual address. The TA is the MAC address of the mobile station that is sending the PS-Poll frame. The duration/ID value is the AID value that was given to the mobile station upon association with the BSS. Even though this frame does not include any explicit duration information, every mobile station receiving a PS-Poll frame will update its NAV with a value which is the length of time to transmit an ACK frame and a single SIFS interval. This action allows the ACK frame that follows the PS-Poll to be sent by the AP with a very small probability. that it will collide with frames from mobile stations.

For the AP response to this frame, refer to Chapter 4 of the IEEE 802.11 Handbook.

6.5.4.5 CF-End and CF-End+ACK

The CF-End and CF-End+ACK frames are 20 bytes in length. Each frame comprises the frame control field, the duration/ID field, two address fields, and the frame check sequence field. The purpose of these frames is to conclude a CFP and to release stations from the restriction imposed during a CFP, preventing competition for access to the medium. Additionally, the CF-End+ACK frame is used to acknowledge the last transmission received by the PC. This frame is sent by the PC as the last frame in the CFP.

The RA is the broadcast group address, as this frame is intended to be received by every station in the BSS. The BSSID is the MAC address of the AP, where the PC resides. The duration value is zero, ensuring that the NAVs of all stations receiving this frame will be reset to zero.

6.5.5 Data Frame Subtypes

There are eight data frame subtypes in two groups. The first group is simple data, data with contention-free acknowledgment (CF-ACK), data with CF-Poll, and data with CF-ACK and CF-Poll. The second group is null function, CF-ACK, CF-Poll, and CF-ACK+CF-Poll. The first group of data frames carry a nonzero number of data bytes. The second group of data frames carry no data bytes at all.

The data frame is variable in length. The minimum length of the data frame is 29 bytes. The maximum length of the frame is 2346 bytes. The data frame carries the MSDU requested to be delivered by the upper layer protocols. It comprises the frame control field, the duration/ID field, up to four address fields, the sequence control field, the frame body field and the frame check sequence field. See FIG. 92 for a data frame. Refer to Chapter 3 of the IEEE 802.11 Handbook for further details on the data frame.

6.5.6 Management Frame Subtypes

IEEE 802.11 is different from many of the other IEEE 802 standards because it includes very extensive management capabilities defined at the MAC level. One of the four MAC frame types is dedicated to management frames. There are 11 distinct management frame types. All management frames include: frame control, duration, address 1, 2, and 3, sequence control, framebody and frame check sequence (FCS) fields.

The frame body of a management frame carries information in both fixed fields and in variable length information elements that are dependent on subtype. The information element is a flexible data structure that contains an information element identifier, a length, and the content of the information element. Information elements occur in the frame body in order of increasing identifiers. This arrangement and the data structure itself allow for the flexible extension of the management frames to include new functionality without affecting older implementations. This can be done because older implementations will be able to understand the older elements and will ignore elements with new identifiers. Because the length of the element is part of the data structure, an older implementation can skip over newer elements without needing to understand the content of the element. See FIG. 93 for an information element. Refer to Chapter 3 of the IEEE 802.11 Handbook for further details on the fixed fields and information elements.

6.5.7 Components of the Management Frame Body

The components of the management frame body comprise fixed fields and variable length information elements. Refer to Chapter 3 of the IEEE 802.11 Handbook for further details on these fixed fields and information elements.

6.5.8 MAC Management

IEEE 802.11 is the first LAN standard by the IEEE 802 committee that includes significant management capabilities. This is because an IEEE 802.11 WLAN must deal with an environment that is measurably more complex than those of the wired LAN standards of IEEE 802. A major challenge for the IEEE 802.11 WLAN is that the medium is not a wire. This leads to many difficulties that IEEE 802.11 must overcome in order to offer the same reliable service expected of an IEEE 802 LAN.

Because the media over which the IEEE 802.11 WLAN operate are not wires, the media are shared by other users that have no concept of data communication or sharing the media. An example of this type of user is the common microwave oven. The microwave oven operates in the 2.4 GHz ISM band because one excitation frequency of the water molecule lies in this band. Another user in this same band is the radio frequency ID (RFID) tag. RFID tags are usually small, cheap, unpowered devices that receive their power from a microwave beam and then return a unique identifier. RFID tags are used to track retail inventory, identify rail cars, and many other uses. An unfortunate consequence of these devices sharing the band with WLANs is that some of this microwave energy leaks from the oven and is purposely broadcast for RFID tags, thus, interfering with the operation of the WLAN.

There are also other WLANs than IEEE 802.11 that share the media. This would be somewhat equivalent to attempting to run IEEE 802.3, IEEE 802.5, IEEE 802.12, and fiber distributed data interference (FDDI) on the same twisted pair cable, simultaneously. These other WLAN users of the media are often uncoordinated with IEEE 802.11 and, in most cases, do not provide for any mechanism to share the media at all. Finally, there are other IEEE 802.11 WLANs sharing the media.

These other users of the media result in a first challenge for the IEEE 802.11 WLAN, an intermittent connection to the media and other stations of the IEEE 802.11 WLAN. Much of the management specified in IEEE 802.11 is to deal with the intermittent nature of the media.

A second challenge to be dealt with by an IEEE 802.11 WLAN is that anyone can "connect" to the WLAN, simply by erecting the proper antenna. This leads to the need to identify the stations connecting to the WLAN, in order to allow only authorized stations to use the WLAN, and to the need to protect the information sent over the WLAN from improper interception.

A third challenge to be dealt with by an IEEE 802.11 WLAN is mobility. Once the wires are removed from a LAN, the natural thing to do is to pick up the equipment connected to the LAN and move it around, taking it from an office to a conference room or to another building. Thus, IEEE 802.11 equipment is not always in the same place from one moment to the next. Even if the equipment were to remain in a fixed location, the nature of the wireless media may make it appear as if the equipment has moved. Dealing with mobility while making all of the expected LAN services available is a problem to be solved by MAC management.

One final challenge to be dealt with by an IEEE 802.11 WLAN is power management. A consequence of doing away with wired media and enabling the equipment to be mobile is that much of the equipment will be run on batteries. Conserving the energy stored in the batteries to allow the equipment to operate for as long as possible must be built into the WLAN protocol and controlled by MAC management.

6.5.8.1 Tools Available to Meet the Challenges

The IEEE 802.11 standard defines a number of MAC management capabilities that are designed to meet the challenges of operating a reliable WLAN. These tools are: authentication, association, address filtering, privacy, power management, and synchronization. Refer to Chapter 3 of the IEEE 802.11 Handbook for further details on each of these tools.

6.5.9 MAC Management Information Base

The IEEE 802.11 management information base (MIB) is an SMNPv2 managed object that contains a number of configuration controls, option selectors, counters, and status indicators that allow an external management agent to determine the status and configuration of an IEEE 802.11 station, as well as to probe its performance and tune its operation. The MIB in a station comprises two major sections, one for the MAC and one for the PHY. The PHY section is subdivided into pieces that are specific to each PHY layer. In the MIB definition, there is also a compliance section that describes the required portions of the MIB and those parts that are optional. All of the attributes are arranged in tables, coordinating the attributes that are related to a single function.

The MAC MIB comprises two sections: the station management attributes and the MAC attributes. The station management attributes are associated with the configuration of options in the MAC and the operation of MAC management. The MAC attributes are associated with the operation of the MAC and its performance.

6.5.9.1 Station Management Attributes

The station management attributes configure and control the operation of the options of the IEEE 802.11 MAC, as well as assist in the management of the station. Refer to Chapter 3 of the IEEE 802.11 Handbook for further details on these attributes.

6.5.9.2 MAC Attributes

The MAC attributes tune the performance of the MAC protocol, monitor the performance of the MAC, identify the multicast addresses that the MAC will receive, and provide identification of the MAC implementation. Refer to Chapter 3 of the IEEE 802.11 Handbook for further details on these attributes.

6.6 Physical Layer (PHY)

Embodiments of the PHY are provided in the following sections for receiving, transmitting, modulating, and/or demodulating WLAN signals, according to the present invention. These embodiments are applicable to WLAN stations, APs, and further WLAN related communications components. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

6.6.1 PHY Functionality

Figure 128A:
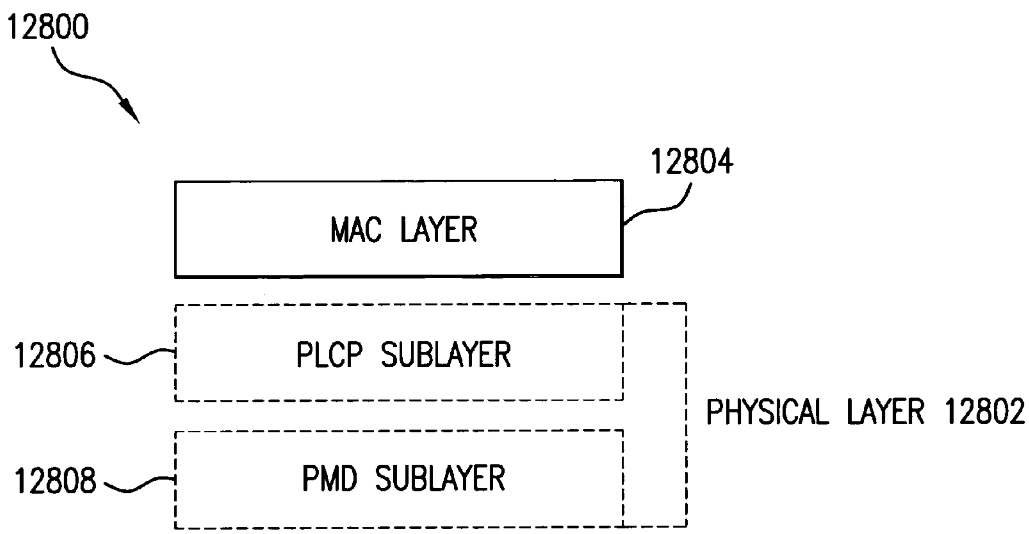

At the bottom of the OSI stack is the PHY. FIG. 128A illustrates an OSI model 12800 including the PHY layer 12802. The PHY 12802 is an interface between the MAC 12804 and wireless media. The PHY 12802 transmits and receives data frames over the shared wireless media. The PHY 12802 provides three levels of functionality. First, the PHY layer 12802 provides a frame exchange between the MAC 12804 and PHY 12802 under the control of a physical layer convergence procedure (PLCP) sublayer 12806. Second, the PHY 12802 uses signal carrier and spread spectrum modulation to transmit data frames over the media under the control of a physical medium dependent (PMD) sublayer 12808. Third, the PHY 12802 provides a carrier sense indication back to the MAC 12804 to verify activity on the media.

The PHY layers are unique in terms of modulation type, coexist with the other PHYs, and operate with the MAC described above. The specifications for IEEE 802.11 were selected to meet the radio frequency (RF) emissions guidelines specified by the Federal Communications Commission (FCC), European Telecommunications Standards Institute (ETSI), and Ministry of Telecommunications (MKK). The following sections provide an overview of the specifications for each type of PHY layer.

6.6.1.1 PMD Incorporating Universal Frequency Translation Technology

Figure 128B:
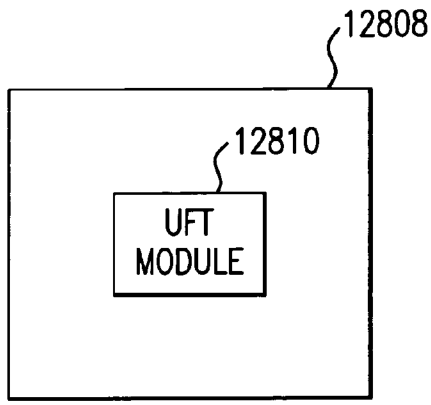

In the PHY layers of embodiments of the present invention, the PMD sublayer 12808 incorporates universal frequency translation technology to provide for frequency translation of transmitted and received WLAN communication signals. Universal frequency translation technology may be incorporated in transmitters, receivers, and transceivers in PMD sublayer 12808. As shown in FIG. 128B, PMD sublayer 12808 comprises one or more UFT modules 12810 in an embodiment. UFT module 12810 may be configured to provide for signal frequency up-conversion or down-conversion. One or more UFT modules 12810 may provide for carrier signal modulation with an information signal, and/or de-modulation, according a variety of modulation schemes. These modulation schemes include but are not limited to amplitude modulation (AM), frequency modulation (FM), or phase modulation (PM), including ASK, FSK, GFSK (Gaussian frequency shift keying), PSK, and DBPSK (differential binary phase shift keying), and combinations thereof. PMD sublayer 12808 may comprise one or more UFT modules for frequency translation of one or more signals. For example, two or more UFT modules may be configured to provide for, or assist in, I/Q modulation or demodulation of signals according to a variety of I/Q modulation schemes, including quadrature amplitude modulation (QAM), differential quadrature phase shift keying (DQPSK), quadrature phase shift keying (QPSK), complementary code keying (CCK), and packet binary convolutional coding (PBCC) modulation schemes. Systems and methods for handling these modulation schemes are further described herein. The UFT module of the present invention may be configured to accommodate further modulation schemes described elsewhere herein or otherwise known to persons skilled in the relevant art(s).

Figure 128C:
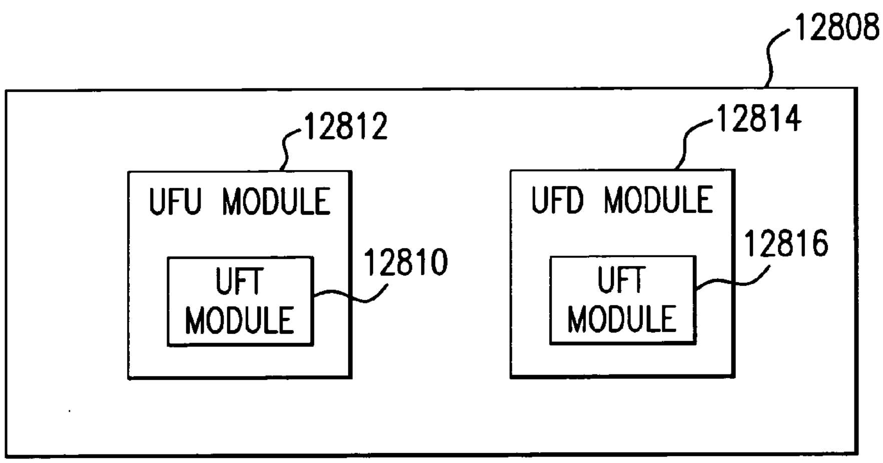

As shown in FIG. 128C, PMD sublayer 12808 may include one or more UFU modules 12812. UFU module 12812 comprises at least one UFT module 12810. Numerous embodiments for frequency up-converting and/or modulating signals via UFU module 12812 in PMD sublayer 12808 will be known to persons skilled in the relevant art(s) from the teachings herein, and are within the scope of the invention.

As shown in FIG. 128C, PMD sublayer 12808 may include one or more UFD modules 12814. UFD module 12814 comprises at least one UFT module 12816. Numerous embodiments for frequency down-converting and/or demodulating signals via UFD module 12814 in PMD sublayer 12808 will be known to persons skilled in the relevant art(s) from the teachings herein, and are within the scope of the invention.

Figure 128D:
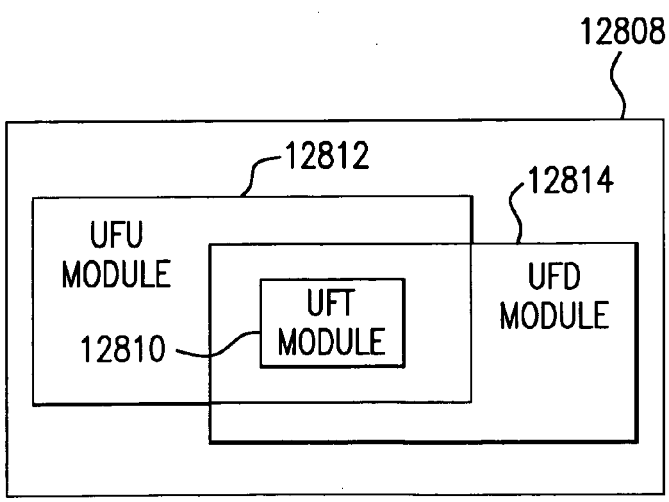

As shown in FIG. 128D, PMD sublayer 12808 includes one or more UFU modules 12812 and one or more UFD modules 12814, which share one or more UFT modules 12812. UFU module 12812 and UFD module 12814 may share UFT module 12812, and/or share other components. Numerous embodiments for frequency up-converting signals and down-converting signals via UFU module 12812 and UFD module 12814 when sharing components will be known to persons skilled in the relevant art(s) from the teachings herein, and are within the scope of the invention.

Frequency translation via universal frequency translation technology is described in further detail below, in regards to a variety of IEEE Std. 802.11 PHY layers.

6.6.2 Direct Sequence Spread Spectrum (DSSS) PHY

A DSSS PHY is one of the three PHY layers supported in the standard. The DSSS PHY uses the 2.4 GHz frequency band as the RF transmission media. Data transmission over the media is controlled by the DSSS PMD sublayer as directed by the DSSS PLCP sublayer. The DSSS PMD receives binary bits of information from the PLCP protocol data unit (PPDU) and transforms them into RF signals for the wireless media by using carrier modulation and DSSS techniques. FIG. 129A illustrates an exemplary DSSS PMD transmitter 12900. FIG. 129B illustrates an exemplary DSSS PMD receiver 12902. The DSSS PHY of the present invention may incorporate universal frequency translation technology for WLAN signal up-conversion, down-conversion, modulation, and de-modulation, as described in subsequent sub-sections.

6.6.2.1 DSSS PLCP Sublayer

A PLCP protocol data unit (PPDU) is unique to the DSSS PHY layer. FIG. 130 illustrates a PPDU frame 13002. PPDU frame 13002 includes a PLCP preamble 13004, PLCP header 13006, and MAC protocol data unit (MPDU) 13008. The receiver 12902 uses the PLCP preamble 13004 to acquire the incoming signal and synchronize the demodulator. The PLCP header 13006 includes information about the MPDU 13008 from the sending DSSS PHY. The PLCP preamble 13004 and PLCP header 13006 are typically transmitted at 1 Mbps, and the MPDU 13008 can be sent at 1 Mbps or 2 Mbps. The segments of the PPDU frame 13002 illustrated in FIG. 130 are described below:

SYNC: This field is 128 bits (symbols) in length and contains a string of 1's which are scrambled prior to transmission. The receiver uses this field to acquire the incoming signal and synchronize the receiver's carrier tracking and timing prior to receiving the start of frame delimiter (SFD).

Start of frame delimiter (SFD): This field contains information marking the start of a PPDU frame. The SFD specified is common for all IEEE 802.11 DSSS radios and uses the following hexadecimal word: F3A0hex.

Signal: The signal field defines which type of modulation must be used to receive the incoming MPDU. The binary value in this field is equal to the data rate multiplied by 100 kbit/s. In the June 1997 version of IEEE 802.11, two rates are supported: OAh for 1 Mbps DBPSK, and 14hex for 2 Mbps DQPSK.

Service: The service field is reserved for future use. The default value is 00h.

Length: The length field is an unsigned 16-bit integer that indicates the number of microseconds necessary to transmit the MPDU. The MAC layer uses this field to determine the end of a PPDU frame.

CRC: The CRC field contains the results of a calculated frame check sequence from the sending station. The calculation is performed prior to data scrambling. The CCITT CRC-16 error detection algorithm is used to protect the signal, service and length fields. The CRC-16 algorithm is represented by the following polynomial: $G(x)=x^{16}+x^{12}+x^5+1$. The receiver performs the calculation on the incoming signal, service, and length fields and compares the results against the transmitted value. If an error is detected, the receiver's MAC makes the decision whether incoming PPDU should be terminated.

Embedded at the end of the MPDU portion of the PPDU is a field called FCS. This field contains a 32-bit CRC, which protects the information in the PLCP service data unit (PSDU). The DSSS PHY does not determine whether errors are present in the MPDU. The MAC makes that determination in a manner similar to the method used by the PHY layer.

6.6.2.2 Data Scrambling

Information bits transmitted by the DSSS PMD may be scrambled using a self-synchronizing 7-bit polynomial. The scrambling polynomial for the DSSS PHY may be: $G(z)=z^{-7}+z^{-4}+1$. Scrambling is used to randomize the data in the SYNC field of the PLCP and data patterns which contain long strings of binary 1s or 0s. The receiver can descramble the information bits without prior knowledge from the sending station.

6.6.2.3 DSSS Modulation

In the June 1997 version of IEEE 802.11, the DSSS PMD uses differential phase shift keying (DPSK) as the modulation to transmit the PPDU. Two types of DPSK are specified. The DSSS PMD transmits the PLCP preamble and PLCP header at 1 Mbps using differential binary phase shift keying (DBPSK). The MPDU is sent at either 1 Mbps DBPSK or 2 Mbps differential quadrature phase shift keying (DQPSK), depending upon the content in the signal field of the PLCP header.

DPSK is a modulation technique which uses a balanced in-phase/quadrature (I/Q) modulator to generate a RF carrier. The RF carrier is phase modulated with symbols mapped from the binary bits in the PPDU. The symbols contain PPDU information. At the receiving station, data recovery for DPSK is based on the phase differences between two consecutive symbols from the sending station. DPSK is non-coherent, meaning that a clock reference is not needed to recover the data. For 1 Mbps DBPSK, 1 and 0 binary bits in the PPDU constitute phase shifts of 180 degrees and the signal information is contained on the I-phase arm, as shown in constellation pattern 13102 of FIG. 131. For 2 Mbps DQPSK, two binary bits are combined from the PPDU, generating the following I/Q symbol pairs (00, 01, 11, 10). The phase shifts occur at 90 degrees for DQPSK, as shown in constellation pattern 13104 in FIG. 131. DQPSK is substantially similar to transmitting two 1 Mbps DBPSK signals, one on the I-phase, the other on the Q-phase. DBPSK is more tolerant to intersymbol interference caused by noise and multipath over the media; therefore DBPSK is generally used for the PLCP preamble.

For IEEE 802.11-compliant DSSS products, the rotation of DBPSK and DQPSK modulated symbols spinning about the I/Q constellation is counterclockwise. This is noteworthy because it is common to develop DSSS WLAN products that rotate in the opposite direction. This rotation is illustrated in FIG. 131.

6.6.2.4 Barker Spreading Method

The DSSS PHY layer is one of the two 2.4 GHz RF PHY layers to choose from in the IEEE 802.11 standard. Direct Sequence is the spreading method used. An 11-bit Barker word may be used as the spreading sequence. Every station in an IEEE 802.11 network uses the same 11-bit sequence. A Barker word sequence is classified as a short sequence, and is known to have very good correlation properties.

Barker word (11-bits)+1, −1, +1, +1, −1, +1, +1, +1, −1, −1, −1

Figure 132B:
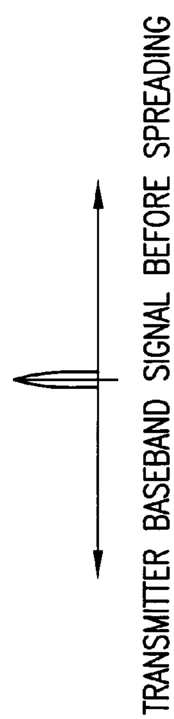
Figure 132C:
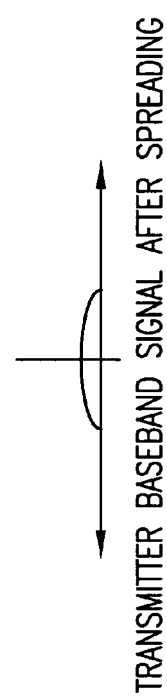
Figure 132D:
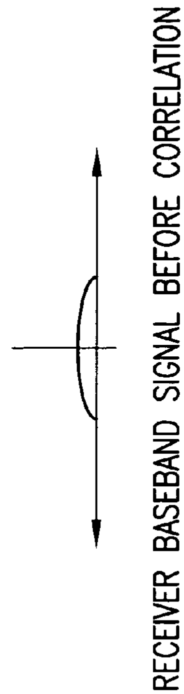
Figure 132E:
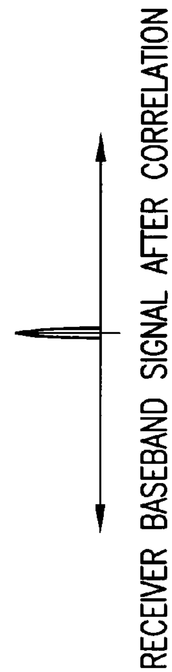

In a transmitter, the 11-bit Barker word may be applied to a modulo-2 adder (XOR function) together with each of the information bits in the (scrambled) PPDU, as shown in FIG. 132A. The PPDU is clocked at the information rate, for example, 1 Mbps, and the 11-Barker word is clocked at 11 Mbps (the chipping clock rate). The XOR function combines the signals by performing a modulo-2 addition on each PPDU bit with each Barker word bit (sometimes referred to as a chip). The output of the modulo-2 adder is a signal with a data rate that is 10×higher than the information rate. The result in the frequency domain is a signal that is spread over a wider bandwidth than the information signal, at a reduced RF power level. FIG. 132B illustrates an exemplary transmitter baseband signal before spreading 13202. FIG. 132C illustrates an exemplary transmitter baseband signal after spreading. At the receiver, the DSSS signal is convolved with the 11-bit Barker word and correlated. The correlation operation recovers the PPDU information bits at the transmitted information rate, and the undesired interfering in-band signals are spread out-of-band. FIG. 132D illustrates an exemplary receiver baseband signal before correlation. FIG. 132E illustrates an exemplary receiver baseband signal after correlation. The spreading and despreading of narrowband to a wideband signal is commonly referred to as processing gain, and is measured in decibels (0). Processing gain is the ratio of the DSSS signal rate to the PPDU information rate. The FCC and MKK specify the minimum requirement for processing gain as 10 dB in North America and Japan.

The Barker word used in IEEE 802.11 is different from the spreading codes used in code division multiple access (CDMA) and global positioning system (GPS). CDMA and GPS use orthogonal spreading codes, which allow multiple users to operate on the same channel frequency. CDMA codes can have longer sequences and have richer correlation properties.

6.6.2.5 DSSS Operating Channels and Transmit Power Requirements

Each DSSS PHY channel occupies 22 MHZ of bandwidth, and the spectral shape of the channel represents a filtered SinX/X function, as shown in FIG. 133. The DS channel transmit mask in IEEE 802.11 specifies that spectral products be filtered to −30 dBr from the center frequency and all other products be filtered to −50 dBr. This allows for three non-interfering channels spaced 25 MHZ apart in the 2.4 GHz frequency band. For example, the channel arrangement for North America is illustrated in FIG. 134. With this channel arrangement, a user can configure multiple DSSS networks to operate simultaneously in the same area.

In IEEE 802.11 fourteen center frequency channels are defined for operation across the 2.4 GHz frequency band (see Table 1). In North America, twelve channels are allowed, ranging from 2.412 GHz to 2.462 GHz. In most of Europe, thirteen channels are allowed, ranging from 2.412 GHz to 2.472 GHz. In Japan, one channel frequency is reserved at 2.483 Ghz.

TABLE 1

| Channel Number | Frequency GHz | North America | Europe | Spain | France | Japan-MKK |
|---|---|---|---|---|---|---|
| 1 | 2.412 | X | X | | | |
| 2 | 2.417 | X | X | | | |
| 3 | 2.422 | X | X | | | |
| 4 | 2.427 | X | X | | | |
| 5 | 2.432 | X | X | | | |
| 6 | 2.437 | X | X | | | |
| 7 | 2.442 | X | X | | | |
| 8 | 2.447 | X | X | | | |
| 9 | 2.452 | X | X | | | |
| 10 | 2.457 | X | X | X | X | |
| 11 | 2.462 | X | X | X | X | |
| 12 | 2.467 | | X | | X | |
| 13 | 2.472 | | X | | X | |
| 14 | 2.483 | | | | | X |

In addition to frequency and bandwidth allocations, transmit power is a key parameter that is regulated worldwide. The maximum allowable radiated emissions for the DSSS PHY varies from region to region, as illustrated in Table 2. The transmit power is directly related to the range that a particular IEEE 802.11 DSSS PHY implementation can achieve. 100 mW is the nominal RF transmit power level for many of the IEEE 802.11 DSSS PHY wireless products on the market today.

TABLE 2

| | |
|---|---|
| 1000 mW | North America |
| 100 mW | Europe |
| 10 mW/MHZ | Japan |

6.6.20.6 DSSS PMD Incorporating Universal Frequency Translation Technology

In embodiments, the DSSS PMD may incorporate universal frequency translation technology to provide for modulation/de-modulation and frequency translation of WLAN station signals. For instance, the DSSS PMD may comprise one or more UFT modules, such as UFT module 128310 of FIG. 128B, that provide for these functions. Furthermore, the DSSS PMD may comprise one or more UFU modules such as UFU module 12812 of FIG. 128C, and/or one or more UFD modules such as UFD module 12814 of FIG. 128C, to provide for modulation/de-modulation and frequency translation of WLAN station signals. The DSSS PMD of the present invention, using techniques of universal frequency translation, transmits and receives signals modulated according to DBPSK and DQPSK modulation schemes. Further specifications for these transmitted and received signals are provided above.

Embodiments for DSSS PMD transmitters and receivers incorporating universal frequency translation technology are provided below. Alternate embodiments (including equivalents, extensions, variations, deviations, etc., of the embodiments described herein) will be apparent to persons skilled in the relevant art(s) based on the teachings contained herein. For example, the DSSS PMD as described in this section can be achieved using any number of structural implementations, including hardware, firmware, software, or any combination thereof. The invention is intended and adapted to include such alternate embodiments.

6.6.2.6.1 Transmit DSSS PMD Incorporating Universal Frequency Translation

As shown in FIG. 129A, transmit DSSS PMD 12900 comprises a scrambler 12904, a spreader 12906, a transmit mask filter 12908, a DPSK modulation transmitter 12910, and an antenna 12912. The structure and operation of transmit DSSS PMD 12900 will be further described as follows, and is further described elsewhere herein.

Scrambler 12904 receives a PPDU signal 12914. In embodiments, PPDU signal 12914 comprises one or more whole PPDU frames and/or portions of PPDU frames. For example, in DSSS PMD embodiments transmitting according to DBPSK modulation, PPDU signal 12914 may comprise a PLCP preamble, a PLCP header, and/or an MPDU. In DSSS PMD embodiments transmitting according to DQPSK modulation, PPDU signal 12914 may comprise an MPDU. In alternate embodiments, the DSSS PMD PLCP preamble, PLCP header, and MPDU may be modulated according to any of the modulation schemes described herein.

Scrambler 12904 scrambles the PPDU signal 12914, and outputs a scrambled PPDU signal 12916. The design and use of a scrambler 12904 is well known to those skilled in the relevant art(s). A suitable scrambler 12904 may be designed and implemented in software, firmware, hardware, and any combination thereof, or it may be purchased “off the shelf.”

Spreader 12906 receives scrambled PPDU signal 12916. Spreader 12906 spreads the frequency spectrum of scrambled PPDU signal 12916, and outputs spread signal 12920. Spreader 12906 as shown in FIG. 129A is implemented as a modulo −2 adder, but other implementations are within the scope of the present invention. The design and use of a spreader 12906 is well known to those skilled in the relevant art(s). A suitable spreader 12906 may be designed and implemented in software, firmware, hardware, and any combination thereof, or it may be purchased “off the shelf.”

Transmit mask filter 12908 receives spread signal 12920. Transmit mask filter 12908 filters spread signal 12920, and outputs filtered signal 12922. The design and use of a transmit mask filter 12908 is well known to those skilled in the relevant art(s). A suitable transmit mask filter 12908 may be designed and implemented in software, firmware, hardware, and any combination thereof, or it may be purchased “off the shelf.”

DPSK modulation transmitter 12910 receives filtered signal 12922. DPSK modulation transmitter 12910 modulates an oscillating signal with filtered signal 12922 according to DBPSK modulation or DQPSK modulation, and frequency up-converts filtered signal 12922. DPSK modulation transmitter 12910 outputs transmitted modulated signal 12924, which is transmitted by antenna 12912.

The transmit DSSS PMD 12900 of FIG. 129A may incorporate universal frequency translation technology to provide for modulation and frequency up-conversion of WLAN station signals. FIG. 129C illustrates an exemplary embodiment of the DPSK modulation transmitter 12910 of FIG. 129A. Transmitter 12910 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Transmitter 12910 of FIG. 129C comprises at least one UFT module 12810. UFT module 12810 provides for modulation and frequency up-conversion of WLAN station signals to be transmitted. As described above, transmit DSSS PMD 12900 transmits the PLCP preamble and PLCP header at 1 Mbps using DBPSK, and the MPDU is sent at either 1 Mbps DBPSK or at 2 Mbps DQPSK, depending on the content in the signal field of the PLCP header. Numerous embodiments for transmitter 12910 will be known to persons skilled in the relevant art(s) from the teachings herein, and are within the scope of the invention. Embodiments for transmitter 12910 incorporating UFT module 12810 are further described below and elsewhere herein.

6.6.2.6.1.1 UFU Module Transmitter Embodiments for DBPSK Modulation

FIG. 129D illustrates in greater detail an exemplary embodiment of transmitter 12910 of FIG. 129A. Transmitter 12910 comprises a DBPSK modulator 12946, a UFU module 12812, and an optional amplifier 12948.

DBPSK modulator 12946 of transmitter 12910 receives a filtered signal 12922. DBPSK modulator 12946 modulates filtered signal 12922, according to differential binary phase shift keying (DBPSK) modulation. For example, DBPSK modulator 12946 may DBPSK modulate an oscillating signal using filtered signal 12922. DBPSK modulation is well known to persons skilled in the relevant art(s). DBPSK modulator 12946 outputs modulated signal 12950. The design and use of a DBPSK modulator 12946 is well known to those skilled in the relevant art(s). A suitable DBPSK modulator 12946 may be designed and implemented in software, firmware, hardware, and any combination thereof, or it may be purchased "off the shelf."

Modulated signal 12950 is received by UFU module 12812. UFU module 12812 includes at least one UFT module 12810. UFU module 12812 frequency up-converts modulated signal 12950, and outputs UFU module output signal 12952. Various structures and methods for operation of UFU module 12812 are described more fully elsewhere herein. The following subsection provides a structural and operational description of an embodiment of UFU module 12812.

When present, optional amplifier 12948 amplifies UFU module output signal 12952, outputting transmitted modulated signal 12924. Transmitted modulated signal 12924 comprises a DBPSK modulated signal.

Phase modulation techniques and other modulation techniques are more fully described in U.S. Pat. No. 6,091,940 entitled "Method and System for Frequency Up-Conversion," filed Oct. 21, 1998, the full disclosure of which is incorporated herein by reference in its entirety.

6.6.2.6.1.1 Detailed UFU Module Embodiment

FIG. 129E illustrates a more detailed exemplary circuit diagram of an embodiment of UFU module 12812. UFU module 12812 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

UFU module 12812 comprises a pulse-shaping circuit 12954, a first reference potential 12956, a filter 12958, a second reference potential 12960, a resistor 12962, and a UFT module 12810.

In FIG. 129E, pulse shaping circuit 12954 receives modulated signal 12950. Pulse shaping circuit 12954 outputs control signal 12964, which is preferably comprised of a string of pulses. Control signal 12964 controls UFT module 12810, which preferably comprises a switch. Various embodiments for UFT module 12810 are described above. One terminal of UFT module 12810 is coupled to a first reference potential 12960. The second terminal of UFT module 12810 is coupled through resistor 12962 to a second reference potential 12956. In a PM or PSK modulation embodiment, second reference potential 12956 is preferably a constant voltage level.

The output of UFT module 12810 is a harmonically rich signal 12966. Harmonically rich signal 12966 has a fundamental frequency and phase substantially proportional to control signal 12964, and an amplitude substantially proportional to the amplitude of second reference potential 12956. Each of the harmonics of harmonically rich signal 12966 also have phase proportional to control signal 12964, and in a PM or PSK embodiment are thus considered to be PM or PSK modulated.

Harmonically rich signal 12966 is received by filter 12958. Filter 12958 preferably has a high Q. Filter 12958 preferably selects the harmonic of harmonically rich signal 12966 that is at the approximate frequency desired for transmission. Filter 12958 removes the undesired frequencies that exist as harmonic components of harmonically rich signal 12966. Filter 12958 outputs UFU module output signal 12952.

Further details pertaining to UFU module 12812 are provided in U.S. Pat. No. 6,091,940 entitled "Method and System for Frequency Up-Conversion," filed Oct. 21, 1998, which is incorporated herein by reference in its entirety.

6.6.2.6.1.2 DBPSK Balanced Modulator Transmitter Embodiments

Balanced modulator transmitter configurations are presented in Section 3.1. These transmitter configurations may be applied in transmitter 12910 to modulate and frequency up-convert WLAN station signals according to DBPSK modulation techniques. The balanced modulator transmitter configurations presented above and applicable to transmitter 12910 include transmitter 7102 of FIG. 71A, transmitter 7162 of FIG. 71D, transmitter 7302 of FIG. 73A, and transmitter 7900 of FIG. 79A. Refer to Section 3.1 above for detailed description of these transmitters. Further details pertaining to balanced modulator transmitters are provided in co-pending U.S. patent application entitled "Method, System, and Apparatus for Balanced Frequency Up-Conversion of a Baseband Signal," Ser. No. 09/525,615, which is incorporated herein by reference in its entirety.

FIG. 129F illustrates balanced modulator embodiments for transmitter 12910, according to the present invention. Transmitter 12910 comprises a DBPSK modulator 1295 68 and a transmitter 7102, 7162, 7302, 7900. The design and use of a DBPSK modulator 12968 is well known to those skilled in the relevant art(s). A suitable DBPSK modulator 12968 may be designed and implemented in software, firmware, hardware, and any combination thereof, or it may be purchased "offthe shelf."

DBPSK modulator 12968 receives filtered signal 12922. DBPSK modulator 12968 produces an oscillating signal modulated with filtered signal 12922 according to DBPSK modulation. DBPSK modulator 12968 outputs DBPSK modulated signal 12970.

Transmitter 7102, 7162, 7302, 7900 receives DBPSK modulated signal 12970. DBPSK modulated signal 12970 of FIG. 129F corresponds to baseband signal 7110 of FIGS. 71A and 71D, baseband signal 7306 of FIG. 73A, and baseband signal 7902 of FIG. 79A. Transmitter 7102, 7162, 7302, 7900 may be one of transmitter 7102 of FIG. 71A, transmitter 7162 of FIG. 71D, transmitter 7302 of FIG. 73A, and transmitter 7900 of FIG. 79A, and other balanced modulator transmitter of the present invention described herein. The one of transmitters 7102, 7162, 7302, 7900 selected for a particular implementation of transmitter 12910 will depend on the particular application. Transmitter 7102, 7162, 7302, 7900 frequency up-converts DBPSK modulated signal 12970, and outputs transmitted modulated signal 12924. Transmitted modulated signal 12924 of FIG. 129F corresponds to output signal 7140 of FIGS. 71A and 71D, output signal 7322 of FIG. 73A, and output signal 7936 of FIG. 79A. Transmitted modulated signal 12924 comprises a DBPSK modulated information signal.

6.6.2.6.1.3 DQPSK Modulation Mode Transmitter Embodiments

Quadrature Phase-Shift Keying (QPSK) is a well known I/Q modulation technique for modulating digital signals using four phase states to code two digital bits per phase shift. An in-phase signal ("I") is modulated such that its phase varies as a function of one of the information signals, and a quadrature-phase signal ("Q") is modulated such that its phase varies as a function of the other information signal. The two modulated signals are combined to form an "QPSK" modulated signal and transmitted. In this manner, for instance, two separate information signals could be transmitted in a single signal simultaneously.

Embodiments are provided below for implementing QPSK transmitters and receivers that may be implemented in WLAN stations, according to embodiment of the present invention. For example, the QPSK transmitters described below may be implemented in transmit DSSS PMD sublayer 12900 to transmit DQPSK modulated WLAN signals. These transmitter embodiments are described herein for purposes of illustration, and not limitation. Alternate transmitter embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

In FIG. 129G, a QPSK modulation mode embodiment is presented. In this embodiment, two information signals are accepted. An in-phase signal ("I") is modulated such that its phase varies as a function of one of the information signals, and a quadrature-phase signal ("Q") is modulated such that its phase varies as a function of the other information signal. The two modulated signals are combined to form an "I/Q" modulated signal and transmitted. In this manner, for instance, two separate information signals could be transmitted in a single signal simultaneously. Other uses for this type of modulation would be apparent to persons skilled in the relevant art(s).

FIG. 129G illustrates an exemplary block diagram of a transmitter 12910 operating in an I/Q modulation mode. Transmitter 12910 comprises a signal separator 12972 and a QPSK modulation transmitter 12978.

Signal separator 12972 separates filtered signal 12922 into two signals: first information signal 12974 and second information signal 12976. When filtered signal 12922 is a bused signal, signal separator 12972 may merely be a location on the bus where filtered signal 12922 is separated into separate buses or data signals, for instance. Signal separator 12972 may alternatively comprise logic and memory for receiving and storing filtered signal 12922, and logically dividing it into the two signals. A suitable signal separator 12972 may be designed and implemented in software, firmware, hardware, and any combination thereof.

QPSK modulation transmitter 12978 comprises at least one UFT module 12810. QPSK modulation transmitter 12978 provides QPSK modulation to first information signal 12974 and second information signal 12976, outputting transmitted modulated signal 12924. Numerous embodiments for QPSK modulation transmitter 12978 will be recognized by persons skilled in the relevant art(s) from the teachings herein, and are within the scope of the invention. Various embodiments for QPSK modulation transmitter 12978 are provided in the following subsections.

6.6.2.6.1.3.1 QPSK Modulation Transmitter Using Two UFU Modules

FIG. 129H illustrates a more detailed circuit block diagram for QPSK modulation transmitter 12978. QPSK modulation transmitter 12978 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

QPSK modulation transmitter 12978 comprises a first UFU module 12982, a second UFU module 12984, an oscillator 12988, a phase shifter 12990, a summer 12992, a first UFT module 12986, a second UFT module 12973, a first DBPSK modulator 12909, a second DBPSK modulator 12980, and a filter 12994.

Oscillator 12988 generates an "I"-oscillating signal 12996.

A first information signal 12974 is input to first DBPSK modulator 12909. The "I"-oscillating signal 12996 is modulated by first information signal 12974 in the first DBPSK modulator 12909, thereby producing an "I"-modulated signal 12901.

First UFU module 12982 inputs "I"-modulated signal 12901, and generates a harmonically rich "I" signal 12903 with a continuous and periodic wave form.

The phase of "I"-oscillating signal 12996 is shifted by phase shifter 12990 to create "Q"-oscillating signal 12998. Phase shifter 12990 preferably shifts the phase of "I"-oscillating signal 12996 by 90 degrees.

A second information signal 12976 is input to second DBPSK modulator 12980. "Q"-oscillating signal 12998 is modulated by second information signal 12976 in second DBPSK modulator 12980, thereby producing a "Q" modulated signal. The design and use of a first and second DBPSK modulator 12909 and 12980 is well known to those skilled in the relevant art(s). A suitable first and second DBPSK modulator 12909 and 12980 may be designed and implemented in software, firmware, hardware, and any combination thereof, or may be purchased "off the shelf."

Second UFU module 12984 inputs "Q" modulated signal 12975, and generates a harmonically rich "Q" signal 12905, with a continuous and periodic waveform.

Harmonically rich "I" signal 12903 and harmonically rich "Q" signal 12905 are preferably rectangular waves, such as square waves or pulses (although the invention is not limited to this embodiment), and are comprised of pluralities of sinusoidal waves whose frequencies are integer multiples of the fundamental frequency of the waveforms. These sinusoidal waves are referred to as the harmonics of the underlying waveforms, and a Fourier analysis will determine the amplitude of each harmonic.

Harmonically rich "I" signal 12903 and harmonically rich "Q" signal 12905 are combined by summer 12992 to create harmonically rich "I/Q" signal 12907. Summers are well known to persons skilled in the relevant art(s).

Filter 12994 filters out the undesired harmonic frequencies, and outputs an transmitted modulated signal 12924 at the desired harmonic frequency or frequencies.

It will be apparent to persons skilled in the relevant art(s) that an alternative embodiment exists wherein the harmonically rich "I" signal 12903 and the harmonically rich "Q" signal 12905 may be filtered before they are summed, and further, another alternative embodiment exists wherein "I"-modulated signal 12901 and "Q"-modulated signal 12975 may be summed to create a QPSK-modulated signal before being routed to a switch module. Other QPSK modulation embodiments will be apparent to persons skilled in the relevant art(s) based upon the teachings herein, and are within the scope of the present invention. Further details pertaining to an I/Q modulation mode transmitter are provided in U.S. Pat. No. 6,091,940 entitled "Method and System for Frequency Up-Conversion," filed Oct. 21, 1998, which is incorporated herein by reference in its entirety.

6.6.2.6.1.3.2 QPSK Modulation Transmitter Using Balanced Modulator

I/Q balanced modulator transmitter configurations are presented in Section 3.2. These transmitter configurations may be applied in transmitter 12910 to modulate and frequency up-convert WLAN station signals according to DQPSK modulation techniques. The I/Q balanced modulator transmitter configurations presented above and applicable to transmitter 12910 include I/Q transmitter 7420 of FIG. 74, I/Q transmitter 7608 of FIG. 76A, I/Q transmitter 7618 of FIG. 76B, I/Q transmitter 7702 of FIG. 77, I/Q transmitter 7802 of FIG. 78, I/Q transmitter 8000 of FIG. 80, I/Q transmitter 8200 of FIG. 82, and I/Q transmitter 8300 of FIG. 83. Refer to Section 3.2 above for detailed description of these transmitters. Further details pertaining to I/Q balanced modulator transmitters are provided in co-pending U.S. patent application entitled "Method, System, and Apparatus for Balanced Frequency Up-Conversion of a Baseband Signal," Ser. No. 09/525,615, which is incorporated herein by reference in its entirety.

FIG. 1291 illustrates I/Q balanced modulator embodiments for QPSK modulation transmitter 12978, according to the present invention. QPSK modulation transmitter 12978 comprises a first DBPSK modulator 12911, a second DBPSK modulator 12913, a pulse generator 7144, and an I/Q transmitter 7402, 7608, 7618, 7702, 7802, 8000, 8200, 8300. Further I/Q balanced modulator embodiments for QPSK modulation transmitter 12978 will be apparent to persons skilled in the relevant art(s) based upon the teachings herein, and are within the scope of the present invention.

First DBPSK modulator 12911 receives I phase information signal 12974. First DBPSK modulator 12911 produces an oscillating signal modulated with I phase information signal 12976 according to DBPSK modulation. First DBPSK modulator 12911 outputs first DBPSK modulated signal 12977.

Second DBPSK modulator 12913 receives Q phase information signal 12976. Second DBPSK modulator 12913 produces an oscillating signal modulated with Q phase information signal 12976 according to DBPSK modulation. Second DBPSK modulator 12913 outputs second DBPSK modulated signal 12979. The design and use of a first and second DBPSK modulator 12911 and 12913 is well known to those skilled in the relevant art(s). Suitable first and second DBPSK modulators 12911 and 12913 may be designed and implemented in software, firmware, hardware, and any combination thereof, or may be purchased "off the shelf."

Pulse generator 7144 generates control signals 7123 and 7127 as described elsewhere herein. I/Q transmitter 7402, 7608, 7618, 7702, 7802, 8000, 8200, 8300 receives first DBPSK modulated signal 12977, second DBPSK modulated signal 12979, and control signals 7123 and 7127. First DBPSK modulated signal 12977 of FIG. 129I corresponds to I baseband signal 7402 of FIGS. 74, 76A, 76B, 77, and 78, and I baseband signal 8002 of FIGS. 80, 82, and 83. I/Q transmitter 7402, 7608, 7618, 7702, 7802, 8000, 8200, 8300 may be one of I/Q transmitter 7420 of FIG. 74, I/Q transmitter 7608 of FIG. 76A, I/Q transmitter 7618 of FIG. 76B, I/Q transmitter 7702 of FIG. 77, I/Q transmitter 7802 of FIG. 78, I/Q transmitter 8000 of FIG. 80, I/Q transmitter 8200 of FIG. 82, and I/Q transmitter 8300 of FIG. 83, and other I/Q balanced modulator transmitter of the present invention described herein. The one of I/Q transmitters 7402, 7608, 7618, 7702, 7802, 8000, 8200, 8300 selected for a particular implementation of transmitter 12910 will depend on the particular application. I/Q transmitter 7402, 7608, 7618, 7702, 7802, 8000, 8200, 8300 combines and frequency up-converts first and second DBPSK modulated signals 12977 and 12979, and outputs transmitted modulated signal 12924. Transmitted modulated signal 12924 of FIG. 129I corresponds to output signal 7148 of FIGS. 74, 76A, 76B, 77, and 78, and output signal 8016 of FIGS. 80, 82, and 83. Transmitted modulated signal 12924 comprises a DQPSK modulated information signal.

6.6.2.6.2 Receiver DSSS PMD Incorporating Universal Frequency Translation

As shown in FIG. 129B, receiver DSSS PMD 12902 comprises an antenna 12926, a de-spread correlator 12928, a DPSK modulation receiver 12930, a de-scrambler 12932, a timing clock recovery module 12934. The structure and operation of receiver DSSS PMD 12902 will be further described as follows, and is further described elsewhere herein.

Antenna 12926 receives a transmitted modulated signal 12924. Transmitted modulated signal 12924 comprises an RF carrier signal modulated with an information signal according to DBPSK and/or DQPSK modulation techniques.

De-spread correlator 12928 receives transmitted modulated signal 12924 from antenna 12926, and receives an 11-bit Barker word. De-spread correlator 12928 convolves the received signal with the 11-bit Barker word and correlates it, and outputs a de-spread signal 12938. The design and use of a conventional de-spread correlator 12928 is well known to those skilled in the relevant art(s). A suitable conventional de-spread correlator 12928 may be designed and implemented in software, firmware, hardware, and any combination thereof, or it may be purchased "off the shelf."

DPSK modulation receiver 12930 receives de-spread signal 12938. DPSK modulation receiver 12930 demodulates and down-converts de-spread signal 12938, and outputs demodulated signal 12940.

De-scrambler 12932 receives demodulated signal 12940. De-scrambler 12932 de-scrambles demodulated signal 12940, and outputs PPDU signal 12942. PPDU signal 12942 comprises one or more PPDU frames and/or PPDU frame portions, such as a PLCP preamble, PLCP header, and MPDU. The design and use of a de-scrambler 12932 is well known to those skilled in the relevant art(s). A suitable de-scrambler 12932 may be designed and implemented in software, firmware, hardware, and any combination thereof, or it may be purchased "off the shelf."

Timing clock recovery module 12924 is coupled to de-spread correlator 12928 and/or DBPSK/DQPSK de-modulator 12930. Timing clock recovery module 12924 may be used to recover clocking/timing information from the received signal. Timing clock recovery module 12924 may output a data clock signal 12944, and may pass clocking/timing information back to de-spread correlator 12928 and/or DPSK modulation receiver 12930. The design and use of a timing clock recovery module 12924 is well known to those skilled in the relevant art(s). A suitable scrambler 12924 may be designed and implemented in software, firmware, hardware, and any combination thereof, or it may be purchased "off the shelf."

Alternate embodiments for receiver DSSS PMD 12902 will be apparent to persons skilled in the relevant art(s) based on the teachings contained herein. For example, the positions of DPSK modulation receiver 12930 and de-spread correlator 12928 may be reversed. FIG. 129L illustrates a receiver DSSS PMD 12915 wherein DPSK modulation receiver 12930 receives transmitted modulated signal 12924, demodulates and down-converts transmitted modulated signal 12924, and outputs a demodulated signal that is received by de-spread correlator 12928. De-spread correlator 12928 convolves the received demodulated signal with the 11-bit Barker word and correlates it, and outputs a de-spread signal to de-scrambler 12932. The invention is intended and adapted to include such alternate embodiments.

The receiver DSSS PMD 12902 of FIG. 129B may incorporate universal frequency translation technology to provide for demodulation and frequency down-conversion of received WLAN station signals. FIG. 129J illustrates an exemplary embodiment of the DPSK modulation receiver 12930 of FIG. 129B. Receiver 12930 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Receiver 12930 of FIG. 129J comprises at least one UFT module 12810. UFT module 12810 provides for demodulation and frequency down-conversion of received WLAN station signals. As described above, receiver DSSS PMD 12902 demodulates the DBPSK-modulated PLCP preamble and PLCP header, and demodulates the DBPSK- or DQPSK-modulated MPDU. Numerous embodiments for receiver 12930 will be known to persons skilled in the relevant art(s) from the teachings herein, and are within the scope of the invention. Embodiments for receiver 12930 incorporating UFT module 12810 are further described below and elsewhere herein.

In a further embodiment, de-spread correlator 12928 comprises a UFT module. The UFT module may be used to convolve the received signal with the 11-bit Barker word, by coding a control signal received by the UFT module with the 11-bit Barker word. FIG. 129K illustrates a further embodiment of the present invention, where de-spread correlator 12928 and receiver 12930 share a UFT module 12810, to unify convolution of the received signal and down-conversion/demodulation of the received signal. Alternate embodiments for receiver DSSS PMD 12902 will be apparent to persons skilled in the relevant art(s) based on the teachings contained herein.

6.6.2.6.2.1 UFD Module Receiver Embodiments for DBPSK Demodulation

FIG. 129M illustrates an embodiment of the DPSK modulation receiver 12930 of FIG. 129B. DPSK modulation receiver 12930 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

DPSK modulation receiver 12930 comprises a UFD module 12814, an optional amplifier 12917, and an optional filter 12919. UFD module 12814 comprises at least one UFT module 12810.

UFD module 12814 inputs de-spread signal 12938. De-spread signal 12938 comprises an oscillating signal modulated by an information signal according to DBPSK modulation techniques. UFD module 12814 frequency down-converts and demodulates de-spread signal 12938 to UFD module output signal 12921.

UFD module output signal 12921 is optionally amplified by optional amplifier 12917 and optionally filtered by optional filter 12919, and a down-converted baseband signal 2516 results. The amplifying and filtering functions may instead be provided for in optional signal conditioning module 2504, when present.

Received signals of a variety of modulation types may be down-converted directly to a baseband signal by DPSK modulation receiver 12930 of FIG. 129B. These modulation types include, but are not limited to phase modulation (PM), phase shift keying (PSK) including DBPSK, amplitude modulation (AM), amplitude shift keying (ASK), and combinations thereof.

In embodiments, UFD module 12814 frequency down-converts de-spread signal 12938 to a baseband signal. In alternative embodiments, UFD module 12814 down-converts de-spread signal 12938 to an intermediate frequency.

FIG. 129N illustrates an alternative embodiment of DPSK modulation receiver 12930 comprising a UFD module 12814 that down-converts de-spread signal 12938 to an intermediate frequency. DPSK modulation receiver 12930 of FIG. 129N comprises an intermediate frequency (IF) down-converter 12923. IF down-converter 12923 may comprise a UFD module and/or a UFT module, or may comprise a conventional down-converter. In this embodiment, UFD module output signal 12921 is output by UFD module 12814 at an intermediate frequency. This is an offset frequency, not at baseband. IF down-converter 12923 inputs UFD module output signal 12921, and frequency down-converts it to baseband signal 12925.

Baseband signal 12925 is optionally amplified by optional amplifier 12917 and optionally filtered by optional filter 12919, and a demodulated signal 12940 results.

DPSK modulation receiver 12930 may further comprise a third stage 1F down-converter, and subsequent IF down-converters, as would be required or preferred by some applications. It will be apparent to persons skilled in the relevant art(s) how to design and configure such further IF down-converters from the teachings contained herein. Such implementations are within the scope of the present invention.

6.6.2.6.2.1.1 Detailed UFD Module Block Diagram

FIG. 129O illustrates an embodiment of UFD module 12814 in greater detail. This embodiment is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

UFD module 12814 comprises a storage device 12931, an oscillator 12927, a pulse-shaping circuit 2806, a reference potential 2808, and a UFT module 12810. As described above, many embodiments exist for UFD module 12814. For instance, in embodiments, oscillator 12927, or both oscillator 12927 and pulse-shaping circuit 12929, may be external to UFD module 12814.

Oscillator 12927 outputs oscillating signal 12935, which is input by pulse-shaping circuit 12929. The output of pulse-shaping circuit 12929 is a control signal 12937, which preferably comprises a string of pulses. Pulse-shaping circuit 12929 controls the pulse width of control signal 12937.

In an embodiment where de-spread correlator 12928 comprises a UFT module, the string of pulses of the corresponding control signal are coded according to the 11 bit-Barker word.

In embodiments, UFT module 12810 comprises a switch. Other embodiments for UFT module 12810 are within the scope of the present invention, such as those described above. One terminal of UFT module 12810 is coupled to a de-spread signal 12938, and a second terminal of UFT module 12810 is coupled to a first terminal of storage device 12931. A second terminal of storage device 12931 is coupled to a reference potential 2808 such as a ground, or some other potential. In a preferred embodiment, storage device 12931 is a capacitor. In an embodiment, the switch contained within UFT module 12810 opens and closes as a function of control signal 12937. As a result of the opening and closing of this switch, a down-converted signal, referred to as UFD module output signal 12921, results. Additional details pertaining to UFD module 12814 are contained in U.S. Pat. No. 6,061,551 entitled "Method and System for Down-Converting Electromagnetic Signals," filed Oct. 21, 1998, which is incorporated herein by reference in its entirety.

6.6.2.6.2.2 DBPSK Single Channel Receiver Embodiments

Single channel balanced receiver configurations are presented in Section 2.2.3. These receiver configurations may be applied in receiver 12930 to demodulate and frequency down-convert WLAN station signals according to DBPSK demodulation techniques. The single channel balanced receiver configurations presented above and applicable to receiver 12930 include receiver 11900 of FIG. 119. Refer to Section 2.2 above for detailed description of these receivers. Further details pertaining to balanced modulator receivers are provided in co-pending U.S. patent application entitled "DC Offset, Re-radiation, and I/Q Solutions Using Universal Frequency Translation Technology," Ser. No. 09/526,041, which is incorporated herein by reference in its entirety.

FIG. 129P illustrates a single channel balanced demodulator embodiment for receiver 12930, according to the present invention. Receiver 12930 comprises a single channel receiver 11900. Further single channel balanced demodulator embodiments for receiver 12930 will be apparent to persons skilled in the relevant art(s) based upon the teachings herein, and are within the scope of the present invention.

Receiver 11900 receives de-spread signal 12938. De-spread signal 12938 of FIG. 129P corresponds to input RF signal 11906 of FIG. 119. Receiver 11900 frequency down-converts and demodulates de-spread signal 12938, and outputs demodulated signal 12940. Demodulated signal 12940 of FIG. 129P corresponds to baseband output signal 11908 of FIG. 119. Demodulated signal 12940 comprises an information signal.

6.6.2.6.2.3 DQPSK Modulation Mode Receiver Embodiments

FIG. 129Q illustrates an exemplary DQPSK modulation mode embodiment of a DPSK modulation receiver 12930, according to the present invention. This DQPSK modulation mode embodiment is described herein for purposes of illustration, and not limitation. Alternate DQPSK modulation mode embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

Receiver 12930 comprises a QPSK modulation receiver 12939. QPSK modulation receiver 12939 down-converts and demodulates an input signal that is modulated according to QPSK modulation techniques. QPSK modulation receiver 12939 down-converts and demodulates a received input signal to two baseband information signals. QPSK modulation receiver 12939 comprises at least one UFT module 12810. QPSK modulation receiver 12939 provides for QPSK demodulation to de-spread signal 12938, outputting demodulated signal 12940. Numerous embodiments for QPSK modulation receiver 12939 will be recognized by persons skilled in the relevant art(s) from the teachings herein, and are within the scope of the invention. Various embodiments for QPSK modulation receiver 12939 are provided in the following subsections.

6.6.2.6.2.3.1 QPSK Modulation Receiver Using Two UFD Modules

FIG. 129R illustrates a more detailed circuit block diagram for QPSK modulation receiver 12939. QPSK modulation receiver 12939 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Receiver 12930 comprises an oscillator 12949, a first UFD module 12941, a second UFD module 12943, a first UFT module 12945, a second UFT module 12947, a phase shifter 12951, a first optional amplifier 12953, a first filter 12955, a second optional amplifier 12957, and a second filter 12959.

Oscillator 12949 provides an oscillating signal used by both first UFD module 12941 and second UFD module 12943 via the phase shifter 12951. Oscillator 12949 generates an "I" oscillating signal 12961.

"I" oscillating signal 12961 is input to first UFD module 12941. First UFD module 12941 comprises at least one UFT module 12945. In an embodiment, first UFD module 12941 is structured similarly to UFD module 12814 of FIG. 129O, with oscillator 12949 substituting for oscillator 12927, and "I" oscillating signal 12961 substituting for oscillating signal 12935. First UFD module 12941 frequency down-converts and demodulates de-spread signal 12938 to down-converted "I" signal 12965 according to "I" oscillating signal 12961. Down-converted "I" signal 12965 may be an information signal with two possible states or voltage levels (QPSK). In further embodiments, down-converted "I" signal 12965 may be an information signal with more than two possible states or voltage levels (QAM).

Phase shifter 12951 receives "I" oscillating signal 12961, and outputs "Q" oscillating signal 12963, which is a replica of "I" oscillating signal 12961 shifted preferably by 90°.

Second UFD module 12943 inputs "Q" oscillating signal 12963. Second UFD module 12943 comprises at least one UFT module 12947. In an embodiment, second UFD module 12943 is structured similarly to UFD module 12814 of FIG. 1290 with "Q" oscillating signal 12963 substituting for oscillating signal 12935. Second UFD module 12943 frequency down-converts and demodulates de-spread signal 12938 to down-converted "Q" signal 12967 according to "Q" oscillating signal 12963. Down-converted "Q" signal 12967 may be an information signal with two possible states or voltage levels (QPSK). In further embodiments, down-converted "Q" signal 12967 may be an information signal with more than two possible states or voltage levels (QAM).

Down-converted "I" signal 12965 is optionally amplified by first optional amplifier 12953 and optionally filtered by first optional filter 12955, and a first information output signal 12969 is output.

Down-converted "Q" signal 12967 is optionally amplified by second optional amplifier 12957 and optionally filtered by second optional filter 12959, and a second information output signal 12971 is output.

In the embodiment depicted in FIG. 129R, first information output signal 12969 and second information output signal 12971 comprise demodulated signal 12940 of FIG. 129Q.

Alternate configurations for QPSK modulation receiver 12939 will be apparent to persons skilled in the relevant art(s) from the teachings herein. For instance, an alternate embodiment exists wherein phase shifter 12951 is coupled between de-spread signal 12938 and UFD module 12943, instead of the configuration described above. This and other such QPSK modulation mode receiver embodiments will be apparent to persons skilled in the relevant art(s) based upon the teachings herein, and are within the scope of the present invention.

6.6.2.6.2.3.2 QPSK Modulation Receiver Using Balanced Demodulator

I/Q balanced demodulator receiver configurations are presented in Section 2.2. These receiver configurations may be applied in receiver 12930 to demodulate and frequency down-convert WLAN station signals according to DQPSK demodulation techniques. The I/Q balanced demodulator receiver configurations presented above and applicable to receiver 12930 includes I/Q modulation receiver 10300 of FIG. 103. Refer to Section 2.2 above for detailed description of this receiver. Further details pertaining to I/Q balanced demodulator receivers are provided in co-pending U.S. patent application entitled "DC Offset, Re-radiation, and I/Q Solutions Using Universal Frequency Translation Technology," Ser. No. 09/526,041, which is incorporated herein by reference in its entirety.

FIG. 129S illustrates I/Q balanced demodulator embodiments for QPSK modulation receiver 12939, according to the present invention. QPSK modulation receiver 12939 comprises a control signal generator 12981 and an I/Q modulation receiver 10300 of FIG. 103. Further I/Q balanced demodulator embodiments for QPSK modulation receiver 12939 will be apparent to persons skilled in the relevant art(s) based upon the teachings herein, and are within the scope of the present invention.

Control signal generator 12981 generates control signals 10390, 10392, 10394 and 10396 as described elsewhere herein. Control signal generator 12981 may comprise a variety of control signal/pulse generator configurations as described elsewhere herein, including control signal generator 10400 of FIG. 104.

I/Q modulation receiver 10300 receives de-spread signal 12938 and control signals 10390, 10392, 10394 and 10396. De-spread signal 12938 corresponds to I/Q modulated RF input signal 10382 of FIG. 103. I/Q modulation receiver 10300 demodulates and frequency down-converts de-spread signal 12938, and outputs I baseband output signal 10384 and Q baseband output signal 10386, which form demodulated signal 12940. Demodulated signal 12940 comprises I baseband output signal 10384 and Q baseband output signal 10386.

6.6.3 Frequency Hopping Spread Spectrum (FHSS) PHY

As with the DSSS PHY, the FHSS PHY is one of the three PHY layers supported in the standard and uses the 2.4 GHz spectrum as the transmission media. Data transmission over the media is controlled by the FHSS PMD sublayer as directed by the FHSS PLCP sublayer. The FHSS PMD takes the binary bits of information from the whitened PSDU and transforms them into RF signals for the wireless media by using carrier modulation and FHSS techniques. FIGS. 135A and 135B illustrate block diagrams showing basic elements of the FHSS PMD transmitter and receiver, respectively. Details of each are expanded upon in the subsequent section. The FHSS PHY of the present invention may incorporate universal frequency translation technology for WLAN signal up-conversion, down-conversion, modulation, and demodulation, as described in subsequent sub-sections.

6.6.3.1 FHSS PLCP Sublayer

The PLCP preamble 13602, PLCP header 13604, and PLCP service data unit (PSDU) 13606 make up the PLCP protocol data unit (PPDU) 13600, as shown in FIG. 136. The PLCP preamble 13602 and PLCP header 13604 are unique to the FHSS PHY. The PLCP preamble 13602 is used to acquire the incoming signal and synchronize the receiver's demodulator. The PLCP header 13604 contains information about PSDU 13600 from the sending FHSS PHY. The PLCP preamble 13602 and PLCP header 13604 are transmitted at 1 Mbps (the basic rate).

SYNC: This field contains a string of alternating 0s and 1s, and is used by the receiver to synchronize the receiver's packet timing and correct for frequency offsets.

SFD: This field contains information marking the start of a PSDU frame. A common SFD is specified for all IEEE 802.11 FHSS radios using the following bit pattern: 0000110010111101. The left most bit is transmitted first.

PLW: This field specifies the length of the PSDU in octets and is used by the MAC to detect the end of a PPDU frame.

PLCP signaling field (PSF): The PSF identifies the data rate of the whitened PSDU 13606, ranging from 1 Mbps to 4.5 Mbps in increments of 0.5 Mbps. Refer to Table 3 for the PSF bits corresponding to various data rates. The PLCP preamble 13602 and header 13604 are transmitted at the basic rate, 1 Mbps. The optional data rate for the whitened PSDU 13606 is 2 Mbps.

TABLE 3

| Bits 1–3 | Data Rates - Mbps |
|---|---|
| 000 | 1.0 |
| 001 | 1.5 |
| 010 | 2.0 |
| 011 | 2.5 |
| 100 | 3.0 |
| 101 | 3.5 |
| 110 | 4.0 |
| 111 | 4.5 |

Header check error: This field contains the results of a calculated frame check sequence from the sending station. The calculation is performed prior to data whitening. The CCITT CRC-16 error detection algorithm is used to protect the PSF and PLW fields. The CRC-16 algorithm is represented by the following polynomial: $G(x)=x^{16}+x^{12}+x^{5}+1$. The receiver performs the calculation on the incoming PSF and PLW fields, and compares the results against the transmitted field. If an error is detected, the receiver's MAC determines if the incoming PPDU 13600 should be terminated.

Embedded at the end of the PSDU portion of the PPDU 13606 is a field called FCS. This field contains a 32-bit CRC, which protects the information in the PSDU. The FHSS PHY does not determine if errors are present in the PSDU. The MAC makes that determination, similar to the method used by the PHY.

6.6.3.2 PSDU Data Whitening

Data whitening is applied to the PSDU before transmission to minimize DC bias on the data if long strings of Is or 0s are contained in the PSDU. The PHY stuffs a special symbol every 4 octets of the PSDU in a PPDU frame. A 127-bit sequence generator using the polynomial $S(x)=x^7+x^4+1$ and a 32/33 bias-suppression encoding algorithm are used to randomize and whiten the data.

6.6.3.3 FHSS Modulation

In the June 1997 version of IEEE 802.11, the FHSS PMD uses two-level Gaussian frequency shift key (GFSK) modulation to transmit the PSDU 13606 at the basic rate of 1 Mbps. The PLCP preamble 13602 and PLCP header 13604 are transmitted at 1 Mbps. However, four-level GFSK is an optional modulation method defined in the standard that enables the whitened PSDU 13606 to be transmitted at a higher rate. The value contained in the PSF field of the PLCP header 13604 is used to determine the data rate of the PSDU 13606.

GFSK is a modulation technique used by the FHSS PMD, which deviates (shifts) the frequency either side of the carrier hop frequency depending on whether the binary symbol from the PSDU is a 1 or 0. A bandwidth bit period (Bt)=0.5 is used. The changes in the frequency represent symbols containing PSDU information. For two-level GFSK, a binary 1 represents the upper deviation frequency from the hopped carrier, and a binary 0 represents the lower deviation frequency. The deviation frequency shall be greater than 110 KHz for IEEE 802.11 FHSS radios. The carrier frequency deviation is given by:

Binary 1=$F_c+f_d$ Carrier hopped frequency plus the upper deviated frequency Binary 0=$F_c-f_d$ Carrier hopped frequency minus the lower deviated frequency Four-level GFSK is similar to two-level GFSK, and is used to achieve a data rate of 2 Mbps in the same occupied frequency bandwidth. The modulator combines two binary bits from the whitened PSDU 13606 and encodes them into symbol pairs (10, 11, 01, 00). The symbol pairs generate four frequency deviations from the hopped carrier frequency, two upper and two lower. The symbol pairs are transmitted at 1 Mbps, and for each bit sent, the resulting data rate is 2 Mbps.

6.6.3.4 FHSS Channel Hopping

A set of hop sequences is defined in IEEE 802.11 for use in the 2.4 GHz frequency band. Hop channels are evenly spaced across the band over a span of 83.5 MHZ. During the development of the IEEE 802.11, the hop sequences listed in the standard were pre-approved for operation in North America, Europe, and Japan. The required number of hop channels is dependent upon the geographic location. In North America and Europe (excluding Spain and France) the number of hop channels is 79. The number of hop channels for Spain is 23 and for France is 35. In Japan, the required number of hop channels is 23. The hopped center channels are spaced uniformly across the 2.4 GHz frequency band occupying a bandwidth of 1 MHZ. In North America and Europe (excluding Spain and France) the hopped channels operate from 2.402 GHz to 2.480 GHz. For Japan, the hopped channels operate from 2.473 GHz to 2.495 GHz. In Spain, the hopped channels operate from 2.447 GHz to 2.473 GHz. For France, the hopped channels operate from 2.448 GHz to 2.482 GHz. Channel 2 is the first hopped channel located at a center frequency of 2.402 GHz, and channel 95 is the last hopped frequency channel in the 2.4 GHz band centered at 2.495 GHz.

Channel hopping is controlled by the FHSS PMD. The FHSS PMD transmits the whitened PSDU 13606 by hopping from channel to channel in a pseudorandom fashion using one of the hopping sequences. The hop rate is set by the regulatory bodies in the country of operation. In the US, FHSS radios must hop a minimum of 2.5 hops per second for a minimum hop distance of 6 MHZ. This is in accordance with the rules specified by the FCC rules under Part 15.

The hopping sequences for IEEE 802.11 are grouped in hopping sets for worldwide operation: Set 1, Set 2, and Set 3. The sequences are selected when a FHSS BSS is configured for a WLAN. The hopping sets are designed to minimize interference between neighboring FHSS radios in a set. The following hop sets are valid IEEE 802.11 hopping sequence numbers.

Operation in North America and most of Europe:

Set 1: (0, 3, 6, 9, 12, 15, 18, 21, 24, 27, 30, 33, 36, 39, 42, 45, 48, 51, 54, 57, 60, 63, 66, 69, 72, 75)

Set 2: (1, 4, 7, 10, 13, 16, 19, 22, 25, 28, 31, 34, 37, 40, 43, 46, 49, 52, 55, 58, 61, 64, 67, 70, 73, 76)

Set 3: (2, 5, 8, 11, 14, 17, 20, 23, 26, 29, 32, 35, 38, 41, 44, 47, 50, 53, 56, 59, 62, 65, 68, 72, 74, 77)

Operation in Spain:

Set 1: (0, 3, 6, 9, 12, 15, 18, 21, 24)

Set 2: (1, 4, 7, 10, 13, 16, 19, 22, 25)

Set 3: (2, 5, 8, 11, 14, 17, 20, 23, 26)

Operation in France:

Set 1: (0, 3, 6, 9, 12, 15, 18, 21, 24, 27, 30)

Set 2: (1, 4, 7, 10, 13, 16, 19, 22, 25, 28, 31)

Set 3: (2, 5, 8, 11, 14, 17, 20, 23, 26, 29, 32)

Operation in Japan:

Set 1: (6, 9, 12, 15)

Set 2: (7, 10, 13, 16)

Set 3: (8, 11, 14, 17)

6.6.3.5 FHSS PMD Incorporating Universal Frequency Translation

In embodiments, the FHSS PMD may incorporate universal frequency translation technology to provide for modulation/de-modulation and frequency translation of WLAN station signals. For instance, the FHSS PMD may comprise one or more UFT modules, such as UFT module 12810 of FIG. 128B, that provide for these functions. Furthermore, the FHSS PMD may comprise one or more UFU modules such as UFU module 12812 of FIG. 128C, and/or one or more UFD modules such as UFD module 12814 of FIG. 128C, to provide for modulation/de-modulation and frequency translation of WLAN station signals. The FHSS PMD of the present invention, using techniques of universal frequency translation, transmits and receives signals modulated according to 2-level and 4-level GFSK modulation schemes. Further specifications for these transmitted and received signals are provided above.

Embodiments for FHSS PMD transmitters and receivers incorporating universal frequency translation technology are provided below. Alternate embodiments (including equivalents, extensions, variations, deviations, etc., of the embodiments described herein) will be apparent to persons skilled in the relevant art(s) based on the teachings contained herein. For example, the FHSS PMD as described in this section can be achieved using any number of structural implementations, including hardware, firmware, software, or any combination thereof. The invention is intended and adapted to include such alternate embodiments.

6.6.3.5.1 Transmit FHSS PMD Incorporating Universal Frequency Translation

As shown in FIG. 129A, transmit FHSS PMD 13500 comprises a data whitener 13504, a symbol mapping module 13506, a transmit Gaussian shaping filter 13508, a GFSK modulation transmitter 13510, and an antenna 13512. The structure and operation of transmit FHSS PMD 13500 will be further described as follows, and is further described elsewhere herein.

Data whitener 13504 receives a PSDU signal 13514. In embodiments, PSDU signal 13514 may comprise one or more PSDU frames to be modulated according to 2-level or 4-level GFSK modulation. In alternate embodiments, transmit FHSS PMD 13500 may receive a signal comprising the PLCP preamble and/or PLCP header, which may be modulated according to 2-level GFSK modulation. Alternatively, the FHSS PMD PSDU frame, PLCP preamble, and PLCP header may be modulated according to any of the modulation schemes described herein.

Data whitener 13504 whitens the PSDU signal 13514, and outputs a whitened PSDU signal 13516. Data whitener 13504 is present in 1 Mbps embodiments when necessary. The design and use of a data whitener 13504 is well known to those skilled in the relevant art(s). A suitable data whitener 13504 may be designed and implemented in software, firmware, hardware, and any combination thereof, or it may be purchased “off the shelf.”

Symbol mapping module 13506 receives optionally whitened PSDU signal 13516. Symbol mapping module 13506 symbol maps whitened PSDU signal 13516, and outputs mapped signal 13518. The design and use of a symbol mapping module 13506 is well known to those skilled in the relevant art(s). A suitable symbol mapping module 13506 may be designed and implemented in software, firmware, hardware, and any combination thereof, or it may be purchased “off the shelf.”

Transmit Gaussian shaping filter 13508 receives mapped signal 13518. Transmit Gaussian shaping filter 13508 filters mapped signal 13518, and outputs filtered signal 13520. The design and use of a transmit Gaussian shaping filter 13508 is well known to those skilled in the relevant art(s). A suitable transmit Gaussian shaping filter 13508 may be designed and implemented in software, firmware, hardware, and any combination thereof, or it may be purchased “off the shelf.”

GFSK modulation transmitter 13510 receives filtered signal 13520. GFSK modulation transmitter 13510 modulates an oscillating signal with filtered signal 13520 according to 2-level or 4-level GFSK, and frequency up-converts filtered signal 13520. GFSK modulation transmitter 13510 outputs transmitted modulated signal 13522, which is transmitted by antenna 13512.

The transmit FHSS PMD of FIG. 135A may incorporate universal frequency translation technology to provide for modulation and frequency up-conversion of WLAN station signals. FIG. 135C illustrates an exemplary embodiment of the GFSK modulation transmitter 13510 of FIG. 135A. Transmitter 13510 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Transmitter 13510 of FIG. 135C comprises at least one UFT module 12810. UFT module 12810 provides for modulation and frequency up-conversion of WLAN station signals to be transmitted. As described above, transmit FHSS PMD 13500 transmits the PLCP preamble and PLCP header at 1 Mbps using 2-level GFSK, and the PSDU is sent at either 1 Mbps 2-level GFSK or at 2 Mbps 4-level GFSK, depending on the content in the PSF field of the PLCP header. Numerous embodiments for transmitter 13510 will be known to persons skilled in the relevant art(s) from the teachings herein, and are within the scope of the invention. Embodiments for transmitter 13510 incorporating UFT module 12810 are further described below and elsewhere herein.

6.6.3.5.1.1 UFU Module Transmitter Embodiments for GFSK Modulation

FIG. 135D illustrates in greater detail an exemplary embodiment of transmitter 13510 of FIG. 135A. Transmitter 13510 comprises a GFSK modulator 13538, a UFU module 12812, and an optional amplifier 13540.

GFSK modulator 13538 of transmitter 13510 receives a filtered signal 13520. GFSK modulator 13538 modulates filtered signal 13520, according to Gaussian frequency shift keying (GFSK) modulation. For example, GFSK modulator 13538 may frequency modulate an oscillating signal using filtered signal 13520. GFSK modulator 13538 outputs modulated signal 13542. The design and use of a GFSK modulator 13538 is well known to those skilled in the relevant art(s). A suitable GFSK modulator 13538 may be designed and implemented in software, firmware, hardware, and any combination thereof, or it may be purchased “off the shelf.”

Modulated signal 13542 is received by UFU module 12812. UFU module 12812 includes at least one UFT module 12810. UFU module 12812 frequency up-converts modulated signal 13542, and outputs UFU module output signal 13544. Various structures and methods for operation of UFU module 12812 are described more fully elsewhere herein. For example, Section 6.6.2.6.1.1.1 provides an exemplary structural and operational description of an embodiment of UFU module 12812 in FIG. 129E, where in the present GFSK embodiment, modulated signal 13542 is input to pulse shaping circuit 12954. Hence, each of the harmonics of harmonically rich signal 12966 have frequency proportional to control signal 12964, and in a GFSK embodiment are thus considered to be GFSK modulated.

When present, optional amplifier 13540 amplifies UFU module output signal 13544, outputting transmitted modulated signal 13522. Transmitted modulated signal 13522 comprises a GFSK modulated signal.

Further embodiments for up-converting FSK modulated signals are described in U.S. Pat. No. 6,091,940 entitled "Method and System for Frequency Up-Conversion," filed Oct. 21, 1998, the full disclosure of which is incorporated herein by reference in its entirety.

6.6.3.5.1.2 GFSK Balanced Modulator Transmitter Embodiments

Balanced modulator transmitter configurations are presented in Section 3.1. These transmitter configurations may be applied in transmitter 13510 of FIG. 135A to modulate and frequency up-convert WLAN station signals according to GFSK modulation techniques. The balanced modulator transmitter configurations presented above and applicable to transmitter 13510 include transmitter 7102 of FIG. 71A, transmitter 7162 of FIG. 71D, transmitter 7302 of FIG. 73A, and transmitter 7900 of FIG. 79A. Refer to Section 3.1 above for detailed description of these transmitters. Further details pertaining to balanced modulator transmitters are provided in co-pending U.S. patent application entitled "Method, System, and Apparatus for Balanced Frequency Up-Conversion of a Baseband Signal," Ser. No. 09/525,615, which is incorporated herein by reference in its entirety.

FIG. 135E illustrates balanced modulator embodiments for transmitter 13510, according to the present invention. Transmitter 13510 comprises a GFSK modulator 13546 and a transmitter 7102, 7162, 7302, 7900. Further balanced modulator embodiments for transmitter 13510 will be apparent to persons skilled in the relevant art(s) based upon the teachings herein, and are within the scope of the present invention.

GFSK modulator 13546 receives filtered signal 13520. GFSK modulator 13546 produces an oscillating signal modulated with filtered signal 13520 according to GFSK modulation. GFSK modulator 13546 outputs GFSK modulated signal 13548. The design and use of a GFSK modulator 13546 is well known to those skilled in the relevant art(s). A suitable GFSK modulator 13546 may be designed and implemented in software, firmware, hardware, and any combination thereof, or it may be purchased "off the shelf."

Transmitter 7102, 7162, 7302, 7900 receives GFSK modulated signal 13548. GFSK modulated signal 13548 of FIG. 135E corresponds to baseband signal 7110 of FIGS. 71A and 71D, baseband signal 7306 of FIG. 73A, and baseband signal 7902 of FIG. 79A. Transmitter 7102, 7162, 7302, 7900 may be one of transmitter 7102 of FIG. 71A, transmitter 7162 of FIG. 71D, transmitter 7302 of FIG. 73A, and transmitter 7900 of FIG. 79A, and other balanced modulator transmitter of the present invention described herein. The one of transmitters 7102, 7162, 7302, 7900 selected for a particular implementation of transmitter 13510 will depend on the particular application. Transmitter 7102, 7162, 7302, 7900 frequency up-converts GFSK modulated signal 13548, and outputs transmitted modulated signal 13522. Transmitted modulated signal 13522 of FIG. 135E corresponds to output signal 7140 of FIGS. 71A and 71D, output signal 7322 of FIG. 73A, and output signal 7936 of FIG. 79A. Transmitted modulated signal 13522 comprises a GFSK modulated information signal.

6.6.3.5.2 Receiver FHSS PMD Incorporating Universal Frequency Translation

As shown in FIG. 135B, receiver FHSS PMD 13502 comprises an antenna 13530, a GFSK modulation receiver 13524, a data de-whitener 13526, a hop timing recovery module 13528. The structure and operation of receiver FHSS PMD 13502 will be further described as follows, and is further described elsewhere herein.

Antenna 13530 receives a transmitted modulated signal 13522. Transmitted modulated signal 13522 comprises an RF carrier signal modulated with an information signal according to 2-level or 4-level GFSK modulation techniques.

GFSK modulation receiver 13524 receives transmitted modulated signal 13522 from antenna 13530. GFSK modulation receiver 13524 demodulates and down-converts transmitted modulated signal 13522, and outputs demodulated signal 13532. Demodulated signal 13532 comprises one or more PPDU frames and/or PPDU frame portions, such as a PLCP preamble, PLCP header, and PSDU.

Data de-whitener 13526 receives demodulated signal 13532. Data de-whitener 13526 de-whitens demodulated signal 13532, and outputs PSDU signal 13534. PSDU signal 13534 comprises one or more PSDU frames. Data de-whitener 13526 is present in 2-level GFSK embodiments when necessary. The design and use of a data de-whitener 13526 is well known to those skilled in the relevant art(s). A suitable data de-whitener 13526 may be designed and implemented in software, firmware, hardware, and any combination thereof, or it may be purchased "off the shelf."

Hop timing recovery module 13528 is coupled to GFSK modulation receiver 13524. Hop timing recovery module 13528 may be used to recover hop timing/clocking information from the received signal. Hop timing recovery module 13528 may output a data clock signal 13536, and may pass hop timing/clocking information back to GFSK modulation receiver 13524. The design and use of a hop timing recovery module 13528 is well known to those skilled in the relevant art(s). A suitable hop timing recovery module 13528 may be designed and implemented in software, firmware, hardware, and any combination thereof.

Alternate embodiments for receiver FHSS PMD 13502 will be apparent to persons skilled in the relevant art(s) based on the teachings contained herein. The invention is intended and adapted to include such alternate embodiments.

The receiver FHSS PMD 13502 of FIG. 135B may incorporate universal frequency translation technology to provide for demodulation and frequency down-conversion of received WLAN station signals. FIG. 135F illustrates an exemplary embodiment of the GFSK modulation receiver 13524. Receiver 13524 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Receiver 13524 of FIG. 135F comprises at least one UFT module 12810. UFT module 12810 provides for demodulation and frequency down-conversion of received WLAN station signals. As described above, receiver FHSS PMD 13502 demodulates the 2-level GFSK-modulated PLCP preamble and PLCP header, and demodulates the 2-level or 4-level GFSK-modulated PSDU. Numerous embodiments for receiver 13524 will be known to persons skilled in the relevant art(s) from the teachings herein, and are within the scope of the invention. Embodiments for receiver 13524 incorporating UFT module 12810 are further described below and elsewhere herein.

6.6.3.5.2.1 UFD Module Receiver Embodiments for GFSK Demodulation

Various embodiments for receiver 13524 exist, where receiver 13524 comprises one or more UFD modules, and are described elsewhere herein. For instance, receiver 13524 may comprise a UFD module 12814, as shown in FIGS. 128C and 128D. These embodiments are adaptable to demodulation of GFSK modulated signals such as transmitted modulated signal 13522.

For example, Section 6.6.2.6.2.1 provides exemplary structural and operational description of embodiments comprising a UFD module 12814 for signal down-conversion and demodulation. The configurations shown in FIGS. 129M and 129N for receiver 12930 are adaptable to receiver 13524 for down-conversion of GFSK modulated WLAN signals. Receiver 135242 may be configured as shown for receiver 12930 in FIGS. 129M and 129N to down-convert and demodulate transmitted modulated signal 13522. As described above, transmitted modulated signal 13522 is modulated according to GFSK.

In the demodulator configurations of FIGS. 129M and 129N, transmitted modulated signal 13522 is input to UFD module 12814. UFD module 12814 frequency down-converts and demodulates transmitted modulated signal 13522 to UFD module output signal 12921. In the embodiment shown in FIG. 129M, UFD module 12814 frequency down-converts transmitted modulated signal 13522 to a baseband signal. In the embodiment shown in FIG. 129N, UFD module 12814 down-converts transmitted modulated signal 13522 to an intermediate frequency. Demodulated signal 12940 of FIGS. 129M and 129N corresponds to demodulated signal 13532 of FIG. 135B. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Various structures and methods for operation of UFD module 12814 are described more fully elsewhere herein. For example, Section 6.6.2.6.2.1.1 provides an exemplary structural and operational description of an embodiment of UFD module 12814, shown in FIG. 1290, where in a GFSK embodiment, transmitted modulated signal 13522 is input to UFT module 12810.

6.6.3.5.2.2 GFSK Single Channel Receiver Embodiments

Single channel balanced receiver configurations are presented in Section 2.2.3. These receiver configurations may be applied in receiver 13524 to demodulate and frequency down-convert WLAN station signals according to GFSK demodulation techniques. The single channel balanced receiver configurations presented above and applicable to receiver 13524 include receiver 11900 of FIG. 119. Refer to Section 2.2 above for detailed description of these receivers. Further details pertaining to balanced modulator receivers are provided in co-pending U.S. patent application entitled "DC Offset, Re-radiation, and I/Q Solutions Using Universal Frequency Translation Technology," Ser. No. 09/526,041, which is incorporated herein by reference in its entirety.

FIG. 135G illustrates a single channel balanced demodulator embodiment for receiver 13524, according to the present invention. Receiver 13524 comprises a single channel receiver 11900. Further single channel balanced demodulator embodiments for receiver 13524 will be apparent to persons skilled in the relevant art(s) based upon the teachings herein, and are within the scope of the present invention.

Receiver 11900 receives transmitted modulated signal 13522. Transmitted modulated signal 13522 of FIG. 135G corresponds to input RF signal 11906 of FIG. 119. Receiver 11900 frequency down-converts and demodulates transmitted modulated signal 13522, and outputs demodulated signal 13532. Demodulated signal 13532 of FIG. 135G corresponds to baseband output signal 11908 of FIG. 119. Demodulated signal 13532 comprises an information signal.

6.6.4 Infrared (IR) PHY

As stated previously, the infrared (IR) PHY is one of the three PHY layers supported in the IEEE 802.11 standard. The IR PHY differs from DSSS and FHSS in using near-visible light as the transmission media. IR communication relies on light energy, which may be reflected by objects and travels by line-of-sight. IR PHY operation is generally restricted to indoor environments. The IR PHY signal typically does not pass through walls, as can the DSSS and FHSS radio signals. Data transmission over the media is controlled by the IR PMD sublayer as directed by the IR PLCP sublayer. The IR PMD takes the binary bits of information from the PSDU and transforms them into light energy emissions for the wireless media by using carrier modulation. FIG. 137 illustrates a block diagram of an exemplary IR PMD sublayer 13700. IR PMD sublayer 13700 comprises a transmitter 13702 and a receiver 13704. Further details of each are provided in subsequent subsections.

6.6.4.1 IR PLCP Sublayer

A PLCP preamble 13802, PLCP header 13804, and PSDU 13806 make up a PPDU 13600, as shown in FIG. 138. The PLCP preamble 13802 and PLCP header 13804 are unique to the IR PHY. The PLCP preamble 13802 is used to acquire the incoming signal and synchronize the receiver prior to the arrival of the PSDU 13806. The PLCP header 13804 contains information about the PSDU 13806 from the sending IR PHY. The PLCP preamble 13802 and PLCP header 13804 are transmitted at 1 Mbps, and the PSDU 13806 can be sent at 1 Mbps or 2 Mbps.

SYNC: This field contains a sequence of alternating pulse presence and absence in consecutive time slots. The SYNC field is used by the IR PHY to perform signal acquisition and clock recovery. The standard specifies 57 time slots as the minimum and 73 time slots as the maximum.

SFD: This field contains information that marks the start of a PPDU frame. A common SFD is specified for all IEEE 802.11 IR implementations. The SFD is represented by the following bit pattern: 1001

Data rate: This field defines the data rate at which the PPDU 13600 is transmitted. There are two rates to choose from: 000 corresponding to 1 Mbps (the basic rate), and 001 corresponding to 2 Mbps (the enhanced access rate). The PLCP preamble 13802 and PLCP header 13804 are sent at the basic rate 1 Mbps.

DC level: This field contains information that allows the IR PHY to stabilize the DC level after receiving the preamble and data rate fields. The supported data rates use the following bit patterns:

1 Mbps: 00000000100000000000000000100000000

2 Mbps: 00100010001000100010001000100010

Length: This field contains an unsigned 16-bit integer that indicates the number of microseconds to transmit the PSDU 13806. The MAC layer may use this field to detect the end of a frame.

Frame check sequence: This field contains the calculated 16-bit CRC result from the sending station. The CCITT CRC-16 error detection algorithm is used to protect the length field. The CRC-16 algorithm is represented by the following polynomial: $G(x)=x^{16}+x^{12}+x^{5}+1$. The receiver performs the calculation on the incoming Length field and compares the results against the transmitted field. If an error is detected, the receiver's MAC determines whether the incoming PSDU 13806 should be terminated.

Embedded at the end of the PSDU 13806 of the PPDU 13600 is a field called FCS. This field contains a 32-bit CRC, which is used to protect the information in the PSDU 13806. The IR PHY does not determine whether errors are present in the PSDU 13806. The MAC makes this determination in a manner similar to that used by the PHY layer.

6.6.4.2 IR PHY Modulation Method

The IR PHY transmits binary data at 1 and 2 Mbps using a modulation scheme known as pulse position modulation (PPM). PPM is used in IR systems to reduce the optical power required to be provided by the LED infrared source. The specific data rate is dependent upon the type of PPM. The modulation for 1 Mbps operation is 16-PPM. The modulation for 2 Mbps is 4-PPM. PPM keeps the amplitude and pulse width constant, and varies the position of the pulse in time. Each pulse position represents a different symbol in time.

For 16-PPM, each group of data bits of the PSDU is mapped to one of the 16-PPM symbols for 1 Mbps operation. Notice in Table 4 a "1" bit in the 16-PPM symbol represents data bit position. The order of bit transmission is left to right. The data bits are arranged (gray coded) to reduce the possibility of multiple bit errors due to intersymbol interference in the media.

TABLE 4

| Data Bits | 16-PPM Symbols |
|---|---|
| 0000 | 0000000000000001 |
| 0001 | 0000000000000010 |
| 0011 | 0000000000000100 |
| 0010 | 0000000000001000 |
| 0110 | 0000000000010000 |
| 0111 | 0000000000100000 |
| 0101 | 0000000001000000 |
| 0100 | 0000000010000000 |
| 1100 | 0000000100000000 |
| 1101 | 0000001000000000 |
| 1111 | 0000010000000000 |
| 1110 | 0000100000000000 |
| 1010 | 0001000000000000 |
| 1011 | 0010000000000000 |
| 1001 | 0100000000000000 |
| 1000 | 1000000000000000 |

For 4-PPM, two data bits are paired in the PSDU to form a 4-bit symbol map as shown in Table 5. The order of bit transmission is left to right.

TABLE 5

| Data Bits | 4-PPM Symbol |
|---|---|
| 00 | 0001 |
| 01 | 0010 |
| 11 | 0100 |
| 10 | 1000 |

6.6.5 Geographic Regulatory Bodies

WLAN IEEE 802.11-compliant DSSS and FHSS radios operating in the 2.4 GHz frequency band must comply with local geographical regulatory domains before operating in this spectrum. These products are subject to certification. The technical requirements in the IEEE 802.11 standard were developed to comply with the regulatory agencies of North America, Europe, and Japan. The regulatory agencies in these regions set emission requirements for WLANs to minimize the amount of interference a radio can generate or receive from another in the same proximity. The regulatory requirements do not affect the interoperability of IEEE 802.11-compliant products. It is the responsibility of product developers to investigate and comply with the regulatory agencies. In some situations, additional certifications are necessary for regions within Europe, or outside of Japan or North America. Listed below are agencies defined by IEEE 802.11.

6.6.5.1 North America

Approval Standards: Industry Canada

Documents: GL36

Approval Authorities: Federal Communications Commission, (FCC)

USA Documents: CFR 47, Part 15 Sections 15.205, 15.209, 15.247

Approval Authority: Industry Canada, FCC (USA)

6.6.5.2 Spain

Approval Standards: Supplemento Del Numero 164 Del Boletin Oficial

Del Estado (Published 10, July 91, Revised 25 June 93)

Documents: ETS 300–328, ETS 300–339

Approval Authority: Cuadro Nacional De Atribucion De Frecuesias 6.6.5.3 Europe

Approval Standards: European Telecommunications Standards Institute

Documents: ETS 300–328, ETS 300–339

Approval Authority: National Type Approval Authorities 6.7 Physical Layer Extensions to IEEE 802.11

In October 1997, the IEEE 802 Executive Committee approved two projects for higher rate physical layer (PHY) extensions to the IEEE 802.11 standard. The first extension, IEEE 802.11a, defines requirements for a PHY operating in the 5.0 GHz U-NII frequency, with data rates ranging from 6 Mbps to 54 Mbps. The second extension, IEEE 802.11b, defines a set of PHY specifications operating in the 2.4 GHz ISM frequency band at rates up to 11 Mbps. Both PHY extensions are defined to operate with the existing MAC. The following sections provide further detail of the two extensions.

6.7.1 IEEE 802.11a —The OFDM Physical Layer

The IEEE 802.11a PHY is one of the physical layer (PHY) extensions of IEEE 802.11 and is referred to as the orthogonal frequency division multiplexing (OFDM) PHY. The OFDM PHY provides the capability to transmit PSDU frames at multiple data rates up to 54 Mbps for WLAN networks where transmission of multimedia content is a consideration. The OFDM PHY defined for IEEE 802.11a is similar to the OFDM PHY specification of ETSI-HIPERLAN (High Performance Radio Local Area Network) II. The OFDM PHY of the present invention may incorporate universal frequency translation technology for WLAN signal up-conversion, down-conversion, modulation, and demodulation, as described in subsequent sub-sections.

In the OSI structure, the PHY's PLCP sublayer and PMD sublayer are unique to the OFDM PHY. The following sections provide further detail of the PLCP header, data rates, and modulations defined in IEEE 802.11a.

6.7.1.1 OFDM PLCP Sublayer

The PPDU 13900 is unique to the OFDM PHY. The PPDU 13900 consists of a PLCP preamble 13902, a signal field 13904, and a data field 13906, as shown in FIG. 139. The receiver uses the PLCP preamble 13902 to acquire the incoming OFDM signal and synchronize the demodulator. The PLCP header 13908 contains information about the PSDU 13910 from the sending OFDM PHY. The PLCP preamble 13902 and the signal field 13904 are transmitted at 6 Mbps, binary phase shift keying (BPSK)-OFDM modulated using convolutional encoding rate R=½.

PLCP preamble: This field is used to acquire the incoming signal, and to train and synchronize the receiver. The PLCP preamble 13902 consists of twelve symbols, including ten short symbols and two long symbols. The short symbols are used to train the receiver's AGC, and to obtain a coarse estimate of the carrier frequency and the channel. The long symbols are used to fine-tune the frequency and channel estimates. Twelve subcarriers are used for the short symbols and 53 for the long symbols. The training of an OFDM is accomplished in 16 μs. The PLCP preamble 13902 is BPSK-OFDM modulated at 6 Mbps.

Signal: The signal 13904 is a 24-bit field, which includes information about the rate and length of the PSDU 13910. The signal field 13904 is convolutional encoded rate ½, BPSK-OFDM modulated. Four bits (R1–R4) are used to encode the rate, eleven bits are defined for the length, one bit is reserved, one bit is a parity bit, and six bits form a "0" tail. The rate bits (R1–R4) are defined in Table 6. The mandatory data rates for IEEE 802.11a-compliant systems are 6 Mbps, 12 Mbps, and 24 Mbps.

TABLE 6

| Rate | Modulation | Coding Rate | Signal bits (R1–R4) |
|---|---|---|---|
| 6 Mbps | BPSK | R = ½ | 1101 |
| 9 Mbps | BPSK | R = ¾ | 1111 |
| 12 Mbps | QPSK | R = ½ | 0101 |
| 18 Mbps | QPSK | R = ¾ | 0111 |
| 24 Mbps | 16QAM | R = ½ | 1001 |
| 36 Mbps (optional) | 16QAM | R = ¾ | 1011 |
| 48 Mbps (optional) | 64QAM | R = ⅔ | 0001 |
| 54 Mbps (optional) | 64QAM | R = ¾ | 0011 |

Length: The length field includes an unsigned 12-bit integer that indicates the number of octets in the PSDU 13910.

Data: The data field contains the service field, the PSDU 13910, tails bits 13912, and pad bits 13914. A total of six tail bits containing 0s are appended to the PPDU 13900 to ensure that the convolutional encoder is brought back to a zero state. The equation for determining the number of bits in the data field 13906, the number of tail bits 13912, the number of OFDM symbols, and the number pad bits 13914 is defined in IEEE 802.11a. The data portion of the packet is transmitted at the data rate indicated in the signal field 13904.

6.7.1.2 Data Scrambler

Bits transmitted by the OFDM PMD in the data portion are scrambled using a frame-synchronous 127-bit sequence generator. The scrambling is used to randomize the service, PSDU 13910, pad bit 13914, and data patterns, which may contain long strings of binary 1s or 0s. The tail bits 13912 are not scrambled. The scrambling polynomial for the OFDM PHY is: $S(x)=x^{-7}+x^{-4}+1$. The initial state of the scrambler is randomly chosen. Prior to scrambling the PPDU frame 13900, the seven least significant bits of the service field are reset to 0 in order to estimate the initial state of the scrambler in the receiver.

6.7.1.3 Convolutional Encoding

All information contained in the service field, PSDU 13910, tail field 13912, and pad field 13914 are encoded using a convolutional encoding rate R=½, ⅔, or % corresponding to the desired data rate. Convolutional encoding is generated using the following polynomials; $g_0=133_8$ *and* $g_1=171_8$ of rate R=½. Puncture codes are used for the higher data rates. Industry standard algorithms, such as the Viterbi algorithm, are recommended for decoding.

6.7.1.4 OFDM Modulation

In July 1998, the IEEE 802.11 Working Group adopted OFDM modulation as the basis for IEEE 802.11a. This OFDM method is similar to the modulation technique adopted in Europe by the ETSI-HIPERLAN II 5 GHz radio PHY specification. The basic principal of operation first divides a high-speed binary signal to be transmitted into a number of lower data rate subcarriers. There are 48 data subcarriers and 4 carrier pilot subcarriers for a total of 52 nonzero subcarriers defined in IEEE 802.11a. Each lower data rate bit stream is used to modulate a separate subcarrier from one of the channels in the 5 GHz band. Intersymbol interference is generally not a concern for a lower speed carrier. However, the subchannels may be subjected to frequency selective fading. Therefore, bit interleaving and convolutional encoding is used to improve the bit error rate performance. The scheme uses integer multiples of the first subcarrier, which are orthogonal to each other. This technique is known as orthogonal frequency division multiplexing (OFDM). Prior to transmission, the PPDU is encoded using a convolutional coded rate R=½, and the bits are reordered and bit interleaved for the desired data rate. Each bit is then mapped into a complex number according to the modulation type, and subdivided into 48 data subcarriers and 4 pilot subcarriers. The subcarriers are combined using an inverse fast Fourier transform (FFT) and transmitted. At the receiver, the carrier is converted back to a multi-carrier lower data rate form using an FFT. The lower data rate subcarriers are combined to form the high rate PPDU. Exemplary block diagrams of an IEEE 802.11a OFDM PMD transmitter and receiver are illustrated in FIGS. 140A and 140B, respectively.

6.7.1.5 OFDM PMD Incorporating Universal Frequency Translation Technology

In embodiments, the OFDM PMD may incorporate universal frequency translation technology to provide for modulation/de-modulation and frequency translation of WLAN station signals. For instance, the OFDM PMD may comprise one or more UFT modules, such as UFT module 12810 of FIG. 128B, that provide for these functions. Furthermore, the OFDM PMD may comprise one or more UFU modules such as UFU module 12812 of FIG. 128C, and/or one or more UFD modules such as UFD module 12814 of FIG. 128C, to provide for modulation/de-modulation and frequency translation of WLAN station signals. The OFDM PMD of the present invention, using techniques of universal frequency translation, transmits and receives signals modulated according to BPSK, QPSK, 16-QAM, and 64-QAM modulation schemes. Further specifications for these transmitted and received signals are provided above.

Embodiments for OFDM PMD transmitters and receivers incorporating universal frequency translation technology are provided below. Alternate embodiments (including equivalents, extensions, variations, deviations, etc., of the embodiments described herein) will be apparent to persons skilled in the relevant art(s) based on the teachings contained herein. For example, the OFDM PMD as described in this section can be achieved using any number of structural implementations, including hardware, firmware, software, or any combination thereof. The invention is intended and adapted to include such alternate embodiments.

6.7.1.5.1 Transmit OFDM PMD Incorporating Universal Frequency Translation

As shown in FIG. 129A, transmit OFDM PMD 14000 comprises a convolutional encoder 14004, a bit interleaving and mapping module 14006, an inverse FFT module 14008, a symbol shaping module 14002, a PSK/QAM modulation transmitter 14012, and an antenna 14024. The structure and operation of transmit OFDM PMD 14000 will be further described as follows, and is further described elsewhere herein.

Convolutional encoder 14004 receives a PPDU signal 14014. In embodiments, PPDU signal 14014 may comprise one or more PPDU frames, and/or PPDU frame portions, to be modulated according to PSK or QAM modulation schemes. For instance, PPDU signal 14014 may comprise the PLCP preamble and/or signal field, which may be modulated according to BPSK modulation. Furthermore, PPDU signal 14014 may comprise one or more data fields, which may be modulated according to BPSK, QPSK, 16-QAM, and 64-QAM. Alternatively, the OFDM PMD PLCP preamble, signal field, and data fields may be modulated according to any of the modulation schemes described herein.

Convolutional encoder 14004 encodes the PPDU signal 14014, and outputs an encoded PPDU signal 14016. The design and use of a convolutional encoder 14004 is well known to those skilled in the relevant art(s). A suitable convolutional encoder 14004 may be designed and implemented in software, firmware, hardware, and any combination thereof, or it may be purchased “off the shelf.”

Bit interleaving and mapping module 14006 receives encoded PPDU signal 14016. Bit interleaving and mapping module 14006 maps encoded PPDU signal 14016, and outputs mapped signal 14018. The design and use of a bit interleaving and mapping module 14006 is well known to those skilled in the relevant art(s). A bit interleaving and mapping module 14006 may be designed and implemented in software, firmware, hardware, and any combination thereof.

Inverse FFT module 14008 receives mapped signal 14018. Inverse FFT module 14008 performs an inverse FFT upon mapped signal 14018, and outputs IFFT signal 14020. The design and use of an inverse FFT module 14008 is well known to those skilled in the relevant art(s). A suitable inverse FFT module 14008 may be designed and implemented in software, firmware, hardware, and any combination thereof, or it may be purchased “off the shelf”

Symbol shaping module 14010 receives IFFT signal 14020. Symbol shaping module shapes IFFT signal 14020, and outputs shaped signal 14022. The design and use of a symbol shaping module 14010 is well known to those skilled in the relevant art(s). A suitable symbol shaping module 14010 may be designed and implemented in software, firmware, hardware, and any combination thereof.

PSK/QAM modulation transmitter 14012 receives shaped signal 14022. PSK/QAM modulation transmitter 14012 modulates one or more oscillating signals with shaped signal 14022 according to BPSK, QPSK, or QAM modulation techniques, and frequency up-converts shaped signal 14022. PSK/QAM modulation transmitter 14012 outputs transmitted modulated signal 14026, which is transmitted by antenna 14024.

The transmit OFDM PMD of FIG. 140A may incorporate universal frequency translation technology to provide for modulation and frequency up-conversion of WLAN station signals. For example, OFDM PMD 14000 may use universal frequency translation technology to modulate signals according to BPSK, QPSK, and QAM modulation techniques. FIG. 140C illustrates an exemplary embodiment of the PSK/QAM modulation transmitter 14012 of FIG. 140A. Transmitter 14012 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Transmitter 14012 of FIG. 140C comprises at least one UFT module 12810. UFT module 12810 provides for modulation and frequency up-conversion of WLAN station signals to be transmitted. As described above, transmit OFDM PMD 14000 transmits the PLCP preamble and signal field at 6 Mbps using BPSK, and the data fields are sent at the rates and modulation schemes shown in Table 6 above, depending on the content in the signal field. Numerous embodiments for transmitter 14012 will be known to persons skilled in the relevant art(s) from the teachings herein, and are within the scope of the invention. Embodiments for transmitter 14012 incorporating UFT module 12810 are further described below and elsewhere herein.

6.7.1.5.1.1 UFU Module Transmitter Embodiments for BPSK Modulation

FIG. 140D illustrates in greater detail an exemplary embodiment of transmitter 14012 of FIG. 140A. Transmitter 14012 comprises a PSK modulator 14001, a UFU module 12812, and an optional amplifier 14003.

PSK modulator 14001 of transmitter 14012 receives a shaped signal 14022. PSK modulator 14001 modulates shaped signal 14022, according to binary phase shift keying (BPSK) modulation. For example, PSK modulator 14001 may frequency modulate an oscillating signal using filtered signal 14022. PSK modulators are well known to persons skilled in the relevant art(s). PSK modulator 14001 outputs modulated signal 14005. The design and use of a PSK modulator 14001 is well known to those skilled in the relevant art(s). A suitable PSK modulator 14001 may be designed and implemented in software, firmware, hardware, and any combination thereof, or it may be purchased “off the shelf.”

Modulated signal 14005 is received by UFU module 12812. UFU module 12812 includes at least one UFT module 12810. UFU module 12812 frequency up-converts modulated signal 14005, and outputs UFU module output signal 14007. Various structures and methods for operation of UFU module 12812 are described more fully elsewhere herein. For example, Section 6.6.2.6.1.1.1 provides an exemplary structural and operational description of an embodiment of UFU module 12812 in FIG. 129E, where in the present PSK embodiment, modulated signal 14005 is input to pulse shaping circuit 12954. Hence, each of the harmonics of harmonically rich signal 12966 have frequency proportional to control signal 12964, and in a PSK embodiment are thus considered to be PSK modulated.

When present, optional amplifier 14003 amplifies UFU module output signal 14007, outputting transmitted modulated signal 14026. Transmitted modulated signal 14026 comprises a BPSK modulated signal.

Further embodiments for up-converting PSK modulated signals are described in U.S. Pat. No. 6,091,940 entitled "Method and System for Frequency Up-Conversion," filed Oct. 21, 1998, the full disclosure of which is incorporated herein by reference in its entirety.

6.7.1.5.1.2 BPSK Balanced Modulator Transmitter Embodiments

Balanced modulator transmitter configurations are presented in Section 3.1. These transmitter configurations may be applied in transmitter 14012 of FIG. 140A to modulate and frequency up-convert WLAN station signals according to PSK modulation techniques. The balanced modulator transmitter configurations presented above and applicable to transmitter 14012 include transmitter 7102 of FIG. 71A, transmitter 7162 of FIG. 71D, transmitter 7302 of FIG. 73A, and transmitter 7900 of FIG. 79A. Refer to Section 3.1 above for detailed description of these transmitters. Further details pertaining to balanced modulator transmitters are provided in co-pending U.S. patent application entitled "Method, System, and Apparatus for Balanced Frequency Up-Conversion of a Baseband Signal," Ser. No. 09/525,615, which is incorporated herein by reference in its entirety.

FIG. 140E illustrates balanced modulator embodiments for transmitter 14012, according to the present invention. Transmitter 14012 comprises a PSK modulator 14009 and a transmitter 7102, 7162, 7302, 7900. Further balanced modulator embodiments for transmitter 14012 will be apparent to persons skilled in the relevant art(s) based upon the teachings herein, and are within the scope of the present invention.

PSK modulator 14009 receives shaped signal 14022. PSK modulator 14009 produces an oscillating signal modulated with shaped signal 14022 according to PSK modulation. PSK modulator 14009 outputs PSK modulated signal 14011. The design and use of a PSK modulator 14009 is well known to those skilled in the relevant art(s). A suitable PSK modulator 14009 may be designed and implemented in software, firmware, hardware, and any combination thereof, or it may be purchased "off the shelf."

Transmitter 7102, 7162, 7302, 7900 receives PSK modulated signal 14011. PSK modulated signal 14011 of FIG. 140E corresponds to baseband signal 7110 of FIGS. 71A and 71D, baseband signal 7306 of FIG. 73A, and baseband signal 7902 of FIG. 79A. Transmitter 7102, 7162, 7302, 7900 may be one of transmitter 7102 of FIG. 71A, transmitter 7162 of FIG. 71D, transmitter 7302 of FIG. 73A, and transmitter 7900 of FIG. 79A, and other balanced modulator transmitter of the present invention described herein. The one of transmitters 7102, 7162, 7302, 7900 selected for a particular implementation of transmitter 14012 will depend on the particular application. Transmitter 7102, 7162, 7302, 7900 frequency up-converts PSK modulated signal 14011, and outputs transmitted modulated signal 14026. Transmitted modulated signal 14026 of FIG. 140E corresponds to output signal 7140 of FIGS. 71A and 71D, output signal 7322 of FIG. 73A, and output signal 7936 of FIG. 79A. Transmitted modulated signal 14026 comprises a BPSK modulated information signal.

6.7.1.5.1.3 QPSK/QAM Modulation Mode Transmitter Embodiments

Embodiments are provided below for implementing QPSK and QAM modulation transmitters and receivers that may be implemented in WLAN stations, according to embodiment of the present invention. For example, the QPSK and QAM modulation transmitters described below may be implemented in transmit OFDM PMD sublayer 14000 to transmit QPSK and QAM modulated WLAN signals. These transmitter embodiments are described herein for purposes of illustration, and not limitation. Alternate transmitter embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

6.7.1.5.1.3.1 QPSK Modulation Mode Transmitter Embodiments

FIGS. 129G–129I illustrate exemplary DQPSK modulation transmitter configurations related to transmitter 12910 of FIG. 129A, according to embodiments of the invention. The DQPSK modulation transmitter configurations of FIGS. 129G–129I are adaptable to providing for QPSK modulation in transmitter 14012 of FIG. 140A, according to further embodiments of the present invention. For instance, referring to FIG. 129G, in a QPSK modulation embodiment, DQPSK modulation transmitter 12978 may be adapted to a QPSK modulation transmitter. As a result, transmitted modulated signal 12924 is a QPSK modulated signal. Referring to FIG. 129H, in a QPSK modulation embodiment, first and second DBPSK modulators 12909 and 12980 may be adapted to first and second BPSK modulators, respectively. As a result, first and second DBPSK modulated signals 12901 and 12975 are BPSK modulated signals. Referring to FIG. 129I, in a QPSK modulation embodiment, first and second DBPSK modulators 12911 and 12913 are adapted to first and second BPSK modulators, respectively. As a result, first and second DBPSK modulated signals 12977 and 12979 are BPSK modulated signals.

Hence, the DQPSK modulation transmitter configurations of FIGS. 129G–129I may be referred to for exemplary QPSK modulation embodiments of transmitter 14012. Refer to Section 6.6.2.6.1.3 for further description of the structure and operation of the DQPSK modulation transmitter configurations of FIGS. 129G–129I. Alternate QPSK modulation transmitter embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

6.7.1.5.1.3.2 QAM Modulation Mode Transmitter Embodiments

Quadrature Amplitude Modulation (QAM) is a well known technique for modulating digital signals using both amplitude and phase coding. Multiple signals may be transmitted using quadrature carriers. An in-phase signal ("I") is modulated such that its amplitude varies discretely as a function of one of the information signals, and a quadrature-phase signal ("Q") is modulated such that its amplitude varies discretely as a function of the other information signal. The two modulated signals are combined to form an "QAM" modulated signal and transmitted. In this manner, for instance, two separate information signals could be transmitted in a single signal simultaneously. For determining the number of possible discrete levels, M-QAM utilizes a signal structure where each data signal may take on the square-root of M different possible levels. In 64-QAM, each information signal is modulated with the carrier signal in 3 bit segments. Hence, 6 bits are transmitted per symbol. In 16-QAM, each information signal is modulated with the carrier signal in 2 bit segments. Hence, 4 bits are transmitted per symbol.

Embodiments are provided below for implementing QAM transmitters and receivers that may be implemented in IEEE Std. 802.11 WLAN implementations, according to embodiments of the present invention.

FIG. 140F illustrates an exemplary block diagram of a transmitter 14012 operating in a QAM modulation mode, according to an embodiment of the present invention. Transmitter 14012 of FIG. 140F comprises a signal separator 14048 and a QAM transmitter 14050.

Signal separator 14048 receives shaped signal 14022 and outputs I information signal 14052 and Q information signal 14054. When shaped signal 14022 is a bused signal, signal separator 14048 may merely be a location on the bus where shaped signal 14022 is diverges into separate buses or data signals, for instance. Signal separator 14048 may alternatively comprise logic and memory for receiving and storing shaped signal 14022, and logically dividing it into the two signals. A suitable signal separator 14048 may be designed and implemented in software, firmware, hardware, and any combination thereof, or it may be purchased "off the shelf" QAM transmitter 14050 receives I information signal 14052 and Q information signal 14054. QAM transmitter 14050 provides QAM modulation to I information signal 14052 and Q information signal 14054, outputting transmitted modulated signal 14026. Methods and structures related to QAM transmitter 14012, including methods and structures related to QAM transmitter 14050, are described in more detail in the following sections.

QAM transmitter 14050 comprises at least one UFT module 12810. Numerous embodiments for QAM transmitter 14050 will be recognized by persons skilled in the relevant art(s) from the teachings herein, and are within the scope of the invention. In embodiments, UFT module 12810 frequency up-converts an input signal to an RF signal. Methods and structures related to UFT module 12810 are described more fully in the following sections.

6.7.1.5.1.3.2.1 QAM Modulation Transmitter Using Two UFU Modules

FIG. 140G illustrates a more detailed circuit block diagram for QAM transmitter 14050. QAM transmitter 14050 up-converts and modulates an input signal according to QAM modulation techniques. QAM transmitter 14050 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

QAM transmitter 14050 comprises a first digital-to-analog (D/A) converter 14019, a second D/A converter 14021, a first UFU module 14056, a second UFU module 14058, an oscillator 14060, a phase shifter 14062, a summer 14064, and a filter 14066.

First D/A converter 14019 receives I phase information signal 14052. First D/A converter 14019 outputs an I phase n-level signal 14023 with an amplitude that varies according to the value of I phase information signal 14052. For example, in a 64-QAM embodiment, n is equal to 8. I phase information signal 14052 is a digital signal that first D/A converter 14019 converts to an analog signal, in 3 bit segments. Each 3 bit segment of I phase information signal 14052 is converted to an analog signal with 8 possible discrete levels, such as ±a, +3a, +5a, and +7a, wherein "a" is equal to any applicable voltage value, such as 0.5 V. Other voltage values are within the scope of the present invention. In a 16-QAM embodiment, n is equal to 4. I phase information signal 14052 is converted to I phase n-level signal 14023 in 2 bit segments. Each 2 bit segment of I phase information signal 14052 is converted to an analog signal with 4 possible discrete levels. Other m-QAM types are within the scope of the present invention.

Second D/A converter 14021 receives Q phase information signal 14054. Second D/A converter 14021 outputs an Q phase n-level signal 14025 with an amplitude that varies according to the value of Q phase information signal 14054. For example, in a 64-QAM embodiment, n is equal to 8. Q phase information signal 14054 is a digital signal that second D/A converter 14021 converts to an analog signal, in 3 bit segments. Each 3 bit segment of Q phase information signal 14054 is converted to an analog signal with 8 possible discrete levels, such as ±a, ±3a, ±5a, and ±7a, wherein "a" is equal to any applicable voltage value, such as 0.5 V. Other voltage values are within the scope of the present invention. In a 16-QAM embodiment, n is equal to 4. Q phase information signal 14054 is converted to Q phase n-level signal 14025 in 2 bit segments. Each 2 bit segment of Q information signal 14054 is converted to an analog signal with 4 possible discrete levels. Other m-QAM types are within the scope of the present invention.

The design and use of first and second D/A converters 14019 and 14021 are well known to those skilled in the relevant art(s). Suitable first and second D/A converters 14019 and 14021 may be designed and implemented in software, firmware, hardware, and any combination thereof, or may be purchased "off the shelf." First and second D/A converters 14019 and 14021 may not be required if I phase information signal 14052 and Q phase information signal 14054 are already n-level signals due to operation of a prior stage of PSK/QAM modulation transmitter 14012.

Oscillator 14060 generates an "I"-oscillating signal 14084.

I phase n-level signal 14023 is input to first UFU module 14056. First UFU module 14056 comprises a first UFT module 14068, a first resistor 14067, and a first voltage reference 14080. I phase n-level signal 14023 is preferably a first data signal with multiple discrete voltage values. The "I"-oscillating signal 14084 is modulated by I phase n-level signal 14023 in first UFU module 14056, thereby producing an "I"-modulated signal 14088. First UFT module 14068 comprises a first switch 14072. As first switch 14072 opens and closes, it gates I phase n-level signal 14023. The result of the gating is a harmonically rich "I" signal 14088 having a fundamental frequency substantially proportional to "I"-oscillating signal 14084 and an amplitude substantially proportional to the amplitude of I phase n-level signal 14023. Each of the harmonics of the harmonically rich "I" signal also have amplitudes proportional to the I phase n-level signal 14023, and are thus considered to be amplitude modulated.

The phase of "I"-oscillating signal 14084 is shifted by phase shifter 14062 to create "Q"-oscillating signal 14086. Phase shifter 14062 preferably shifts the phase of "I"-oscillating signal 14084 by 90 degrees.

Q phase n-level signal 14025 is input to second UFU module 14058. Second UFU module 14058 comprises a second UFT module 14070, a second resistor 14078, and a second voltage reference 14082. Q phase n-level signal 14025 is preferably a second data signal with multiple discrete voltage values similar to those of I phase n-level signal 14023. "Q"-oscillating signal 14086 is modulated by Q phase n-level signal 14025 in second UFU module 14056, thereby producing an "Q"-modulated signal 14090. Second UFT module 14070 comprises a second switch 14074. As second switch 14074 opens and closes, it gates Q phase n-level signal 14025. The result of the gating is a harmonically rich "Q" signal 14090 having a fundamental frequency substantially proportional to "Q"-oscillating signal 14086 and an amplitude substantially proportional to the amplitude of Q phase n-level signal 14025. Each of the harmonics of the harmonically rich "Q" signal also have amplitudes proportional to the Q phase n-level signal 14025, and are thus considered to be amplitude modulated.

Harmonically rich "I" signal 14088 and harmonically rich "Q" signal 14090 are preferably rectangular waves, such as square waves or pulses (although the invention is not limited to this embodiment), and are comprised of pluralities of sinusoidal waves whose frequencies are integer multiples of the fundamental frequency of the waveforms. These sinusoidal waves are referred to as the harmonics of the underlying waveforms, and a Fourier analysis will determine the amplitude of each harmonic.

Harmonically rich "I" signal 14088 and harmonically rich "Q" signal 14090 are combined by summer 14064 to create harmonically rich "QAM" signal 14092. Summers are well known to persons skilled in the relevant art(s).

Filter 14066 filters out the undesired harmonic frequencies, and outputs a transmitted modulated signal 14026 at the desired harmonic frequency or frequencies.

It will be apparent to persons skilled in the relevant art(s) that an alternative embodiment exists wherein the harmonically rich "I" signal 14088 and the harmonically rich "Q" signal 14090 may be filtered before they are summed. Other "QAM"-modulation embodiments will be apparent to persons skilled in the relevant art(s) based upon the teachings herein, and are within the scope of the present invention.

6.7.1.5.1.3.2.2 QAM Modulation Transmitter Using Balanced Modulator

I/Q balanced modulator transmitter configurations are presented in Section 3.2. These transmitter configurations may be applied in transmitter 14012 to modulate and frequency up-convert WLAN station signals according to QAM modulation techniques. The I/Q balanced modulator transmitter configurations presented above and applicable to transmitter 14012 include I/Q transmitter 7420 of FIG. 74, I/Q transmitter 7608 of FIG. 76A, I/Q transmitter 7618 of FIG. 76B, I/Q transmitter 7702 of FIG. 77, I/Q transmitter 7802 of FIG. 78, I/Q transmitter 8000 of FIG. 80, I/Q transmitter 8200 of FIG. 82, and I/Q transmitter 8300 of FIG. 83. Refer to Section 3.2 above for detailed description of these transmitters. Further details pertaining to I/Q balanced modulator transmitters are provided in co-pending U.S. patent application entitled "Method, System, and Apparatus for Balanced Frequency Up-Conversion of a Baseband Signal," Ser. No. 09/525,615, which is incorporated herein by reference in its entirety.

FIG. 140H illustrates I/Q balanced modulator embodiments for QAM modulation transmitter 14050, according to the present invention. QAM modulation transmitter 14050 comprises a first amplitude modulator 14094, a second amplitude modulator 14096, a pulse generator 7144, and an I/Q transmitter 7402, 7608, 7618, 7702, 7802, 8000, 8200, 8300. Further I/Q balanced modulator embodiments for QAM modulation transmitter 14050 will be apparent to persons skilled in the relevant art(s) based upon the teachings herein, and are within the scope of the present invention.

For instance, QAM transmitter 14050 may comprise D/A converters such as first and second D/A converters 14019 and 14021 shown in FIG. 140G to convert I phase information signal 14052 and Q phase information signal 14054 to n-level signals, if required.

First amplitude modulator 14094 receives I phase information signal 14052. First amplitude modulator 14094 produces a signal amplitude modulated with I phase information signal 14052. First amplitude modulator 14094 outputs first amplitude modulated signal 14013.

Second amplitude modulator 14096 receives Q phase information signal 14054. Second amplitude modulator 14015 produces a signal amplitude modulated with Q phase information signal 14054. Second amplitude modulator 14096 outputs second amplitude modulated signal 14015. The design and use of a first and second amplitude modulator 14094 and 14096 is well known to those skilled in the relevant art(s). Suitable first and second amplitude modulators 14094 and 14096 may be designed and implemented in software, firmware, hardware, and any combination thereof, or may be purchased "off the shelf."

Pulse generator 7144 generates control signals 7123 and 7127 as described elsewhere herein.

I/Q transmitter 7402, 7608, 7618, 7702, 7802, 8000, 8200, 8300 receives first amplitude modulated signal 14013, second amplitude modulated signal 14015, and control signals 7123 and 7127. First amplitude modulated signal 14013 of FIG. 140H corresponds to I baseband signal 7402 of FIGS. 74, 76A, 76B, 77, and 78, and I baseband signal 8002 of FIGS. 80, 82, and 83. I/Q transmitter 7402, 7608, 7618, 7702, 7802, 8000, 8200, 8300 may be one of I/Q transmitter 7420 of FIG. 74, I/Q transmitter 7608 of FIG. 76A, I/Q transmitter 7618 of FIG. 76B, I/Q transmitter 7702 of FIG. 77, I/Q transmitter 7802 of FIG. 78, I/Q transmitter 8000 of FIG. 80, I/Q transmitter 8200 of FIG. 82, and I/Q transmitter 8300 of FIG. 83, and other I/Q balanced modulator transmitter of the present invention described herein. The one of I/Q transmitters 7402, 7608, 7618, 7702, 7802, 8000, 8200, 8300 selected for a particular implementation of transmitter 14012 will depend on the particular application. I/Q transmitter 7402, 7608, 7618, 7702, 7802, 8000, 8200, 8300 combines and frequency up-converts first and second amplitude modulated signals 14013 and 14015, and outputs transmitted modulated signal 14026. Transmitted modulated signal 14026 of FIG. 140H corresponds to output signal 7148 of FIGS. 74, 76A, 76B, 77, and 78, and output signal 8016 of FIGS. 80, 82, and 83. Transmitted modulated signal 14026 comprises a QAM modulated information signal.

6.7.1.5.2 Receiver OFDM PMD Incorporating Universal Frequency Translation

As shown in FIG. 140B, receiver OFDM PM 14002 comprises an antenna 14038, a PSK/QAM modulation receiver 14028, a FFT module 14030, a bit de-interleaving and de-mapping module 14032, a convolutional code decoder 14034, and an AFC and clock recovery module 14036. The structure and operation of receiver OFDM PMD 14002 will be further described as follows, and is further described elsewhere herein.

Antenna 14038 receives a transmitted modulated signal 14026. Transmitted modulated signal 14026 comprises an RF carrier signal modulated with an information signal according to QAM modulation techniques.

PSK/QAM modulation receiver 14028 receives transmitted modulated signal 14026. PSK/QAM modulation receiver 14028 demodulates and down-converts transmitted modulated signal 14026, and outputs demodulated signal 14040.

FFT module 14030 receives demodulated signal 14040. FFT module 14030 performs an FFT on demodulated signal 14040, and outputs FFT output signal 14042. The design and use of a FFT module 14030 is well known to those skilled in the relevant art(s). A FFT module 14030 may be designed and implemented in software, firmware, hardware, and any combination thereof, or it may be purchased "off the shelf."

Bit de-interleaving and de-mapping module 14032 receives FFT output signal 14042. Bit de-interleaving and de-mapping module 14032 de-interleaves and de-maps FFT output signal 14042, and outputs de-mapped signal 14044. The design and use of a bit de-interleaving and de-mapping module 14032 is well known to those skilled in the relevant art(s). A suitable bit de-interleaving and de-mapping module 14032 may be designed and implemented in software, firmware, hardware, and any combination thereof.

Convolutional code decoder 14034 receives de-mapped signal 14044. Convolutional code decoder 14034 decodes de-mapped signal 14044, and outputs PPDU signal 14046. PPDU signal 14034 comprises one or more PPDU frames and/or PPDU frame portions, such as a PLCP preamble, signal field, and data field. The design and use of a convolutional code decoder 14034 is well known to those skilled in the relevant art(s). A suitable convolutional code decoder 14034 may be designed and implemented in software, firmware, hardware, and any combination thereof, or it may be purchased "off the shelf."

AFC and clock recovery module 14036 is coupled to PSK/QAM de-modulator 14028. AFC and clock recovery module 14036 may be used to recover clocking/timing information from the received signal. AFC and clock recovery module 14036 may output a data clock signal, and may pass clocking/timing information back to PSK/QAM de-modulator 14028. The design and use of an AFC and clock recovery module 14036 is well known to those skilled in the relevant art(s). A suitable AFC and clock recovery module 14036 may be designed and implemented in software, firmware, hardware, and any combination thereof.

Alternate embodiments for receiver OFDM PMD 14002 will be apparent to persons skilled in the relevant art(s) based on the teachings contained herein. The invention is intended and adapted to include such alternate embodiments.

The receiver OFDM PMD 14002 of FIG. 140B may incorporate universal frequency translation technology to provide for demodulation and frequency down-conversion of received WLAN station signals. FIG. 1401 illustrates an exemplary embodiment of the PSK/QAM modulation receiver 14028 of FIG. 140B. Receiver 14028 is described herein for purposes of illustration, and not limitation. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Receiver 14028 of FIG. 1401 comprises at least one UFT module 12810. UFT module 12810 provides for demodulation and frequency down-conversion of received WLAN station signals. As described above, receiver OFDM PMD 14002 demodulates the BPSK-modulated PLCP preamble and signal field, and demodulates the BPSK-, QPSK-, 16-QAM-, or 64-QAM-modulated data field. Numerous embodiments for receiver 14028 will be known to persons skilled in the relevant art(s) from the teachings herein, and are within the scope of the invention. Embodiments for receiver 14028 incorporating UFT module 12810 are further described below and elsewhere herein.

6.7.1.5.2.1 UFD Module Receiver Embodiments for BPSK Demodulation

Various embodiments for receiver 14028 exist, where receiver 14028 comprises one or more UFD modules, and are described elsewhere herein. For instance, receiver 14028 may comprise a UFD module 12814, as shown in FIGS. 128C and 128D. These embodiments are adaptable to demodulation of BPSK modulated signals such as transmitted modulated signal 14026.

For example, Section 6.6.2.6.2.1 provides exemplary structural and operational description of embodiments comprising a UFD module 12814 for signal down-conversion and demodulation. The configurations shown in FIGS. 129M and 129N for receiver 12930 are adaptable to receiver 14028 for down-conversion of BPSK modulated WLAN signals. Receiver 14028 may be configured as shown for receiver 12930 in FIGS. 129M and 129N to down-convert and demodulate transmitted modulated signal 14040. As described above, transmitted modulated signal 14040 is modulated according to BPSK.

In the demodulator configurations of FIGS. 129M and 129N, transmitted modulated signal 14040 is input to UFD module 12814. UFD module 12814 frequency down-converts and demodulates transmitted modulated signal 14040 to UFD module output signal 12921. In the embodiment shown in FIG. 129M, UFD module 12814 frequency down-converts transmitted modulated signal 14040 to a baseband signal. In the embodiment shown in FIG. 129N, UFD module 12814 down-converts transmitted modulated signal 14040 to an intermediate frequency. Demodulated signal 12940 of FIGS. 129M and 129N corresponds to demodulated signal 14040 of FIG. 140B. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

Various structures and methods for operation of UFD module 12814 are described more fully elsewhere herein. For example, Section 6.6.2.6.2.1.1 provides an exemplary structural and operational description of an embodiment of UFD module 12814, shown in FIG. 1290, where in a BPSK embodiment, transmitted modulated signal 14040 is input to UFT module 12810.

6.7.1.5.2.2 BPSK Single Channel Receiver Embodiments

Single channel balanced receiver configurations are presented in Section 2.2.3. These receiver configurations may be applied in receiver 14028 to demodulate and frequency down-convert WLAN station signals according to BPSK demodulation techniques. The single channel balanced receiver configurations presented above and applicable to receiver 14028 include receiver 11900 of FIG. 119. Refer to Section 2.2 above for detailed description of these receivers. Further details pertaining to balanced modulator receivers are provided in co-pending U.S. patent application entitled "DC Offset, Re-radiation, and I/Q Solutions Using Universal Frequency Translation Technology," Ser. No. 09/526,041, which is incorporated herein by reference in its entirety.

FIG. 140J illustrates a single channel balanced demodulator embodiment for receiver 14028, according to the present invention. Receiver 14028 comprises a single channel receiver 11900. Further single channel balanced demodulator embodiments for receiver 14028 will be apparent to persons skilled in the relevant art(s) based upon the teachings herein, and are within the scope of the present invention.

Receiver 11900 receives transmitted modulated signal 14026. Transmitted modulated signal 14026 of FIG. 140J corresponds to input RF signal 11906 of FIG. 119. Receiver 11900 frequency down-converts and demodulates transmitted modulated signal 14026, and outputs demodulated signal 14040. Demodulated signal 14040 of FIG. 140J corresponds to baseband output signal 11908 of FIG. 119. Demodulated signal 14040 comprises an information signal.

6.7.1.5.2.3 QPS/QAM Modulation Mode Receiver Embodiments

FIG. 140K illustrates an exemplary QPSK and QAM modulation mode embodiment of receiver 14028, according to the present invention. This QPSK/QAM modulation mode receiver embodiment is described herein for purposes of illustration, and not limitation. Alternate QPSK and QAM modulation mode receiver embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

Receiver 14028 comprises a QPSK/QAM modulation receiver 14098. QPSK/QAM modulation receiver 14098 down-converts and demodulates an input signal that is modulated according to QPSK or QAM modulation techniques. QPSK/QAM modulation receiver 14098 down-converts and demodulates a received input signal to two baseband information signals. QPSK/QAM modulation receiver 14098 comprises at least one UFT module 12810. QPSK/QAM modulation receiver 14098 provides for QPSK and QAM demodulation to transmitted modulated signal 14026, outputting demodulated signal 14040. Numerous embodiments for QPSK/QAM modulation receiver 14098 will be recognized by persons skilled in the relevant art(s) from the teachings herein, and are within the scope of the invention. Various embodiments for QPSK/QAM modulation receiver 14098 are provided in the following subsections.

6.7.1.5.2.3.1 QPSK/QAM Modulation Receiver Using Two UFD Modules

QPSK modulation receiver 12939 shown in FIG. 129R is adaptable to down-converting and demodulating QPSK and QAM modulated signals. Accordingly, the configuration of QPSK modulation receiver 12939 may be applied to QPSK/QAM modulation receiver 14098. The structure and operation of QPSK modulation receiver 12939 is further described as follows, as applied to a QPSK and QAM modulation environment of QPSK/QAM modulation receiver 14098.

Receiver 12930 comprises an oscillator 12949, a first UFD module 12941, a second UFD module 12943, a first UFT module 12945, a second UFT module 12947, a phase shifter 12951, a first optional amplifier 12953, a first filter 12955, a second optional amplifier 12957, and a second filter 12959.

De-spread signal 12938 of FIG. 129R corresponds to transmitted modulated signal 14026 of FIG. 140K. As described above, transmitted modulated signal 14026 may comprise a QPSK or QAM modulated signal. Transmitted modulated signal 14026 is received by first UFD module 12941 and second UFD module 12943.

Oscillator 12949 provides an oscillating signal used by both first UFD module 12941 and second UFD module 12943 via the phase shifter 12951. Oscillator 12949 generates an “I” oscillating signal 12961.

“I” oscillating signal 12961 is input to first UFD module 12941. First UFD module 12941 comprises at least one UFT module 12945. In an embodiment, first UFD module 12941 is structured similarly to UFD module 12814 of FIG. 129O, with oscillator 12949 substituting for oscillator 12927, and “I” oscillating signal 12961 substituting for oscillating signal 12935. First UFD module 12941 frequency down-converts and demodulates de-spread signal 12938 to down-converted “I” signal 12965 according to “I” oscillating signal 12961. In a QPSK modulation embodiment, down-converted “I” signal 12965 may be an information signal with two possible states or voltage levels. In a QAM modulation embodiment, down-converted “I” signal 12965 may be an information signal with more than two possible states or voltage levels. For instance, in 16-QAM, down-converted “I” signal 12965 may have 4 states or levels, and in 64-QAM, may have 8 states or levels.

Phase shifter 12951 receives “I” oscillating signal 12961, and outputs “Q” oscillating signal 12963, which is a replica of “I” oscillating signal 12961 shifted preferably by 90°.

Second UFD module 12943 inputs “Q” oscillating signal 12963. Second UFD module 12943 comprises at least one UFT module 12947. In an embodiment, second UFD module 12943 is structured similarly to UFD module 12814 of FIG. 1290 with “Q” oscillating signal 12963 substituting for oscillating signal 12935. Second UFD module 12943 frequency down-converts and demodulates de-spread signal 12938 to down-converted “Q” signal 12967 according to “Q” oscillating signal 12963. In a QPSK modulation embodiment, down-converted “Q” signal 12967 may be an information signal with two possible states or voltage levels. In a QAM modulation embodiment, down-converted “Q” signal 12967 may be an information signal with more than two possible states or voltage levels. For instance, in 16-QAM, down-converted “Q” signal 12967 may have 4 states or levels, and in 64-QAM, may have 8 states or levels.

Down-converted “I” signal 12965 is optionally amplified by first optional amplifier 12953 and optionally filtered by first optional filter 12955, and a first information output signal 12969 is output.

Down-converted “Q” signal 12967 is optionally amplified by second optional amplifier 12957 and optionally filtered by second optional filter 12959, and a second information output signal 12971 is output.

In an embodiment of QPSK/QAM modulation receiver 14098, first information output signal 12969 and second information output signal 12971 depicted in FIG. 129R comprise demodulated signal 14040 of FIG. 140K.

Alternate configurations for QPSK/QAM modulation receiver 14028 will be apparent to persons skilled in the relevant art(s) from the teachings herein. For instance, an alternate embodiment exists wherein phase shifter 12951 is coupled between transmitted modulated signal 14026 (de-spread signal 12938 of FIG. 129R) and UFD module 12943, instead of the configuration described above. This and other such QPSK/QAM modulation mode receiver embodiments will be apparent to persons skilled in the relevant art(s) based upon the teachings herein, and are within the scope of the present invention.

6.7.1.5.2.3.2 QPSK/QAM Modulation Receiver Using Balanced Demodulator

I/Q balanced demodulator receiver configurations are presented in Section 2.2. These receiver configurations may be applied in demodulator 14098 to demodulate and frequency down-convert WLAN station signals according to QPSK and QAM demodulation techniques. The I/Q balanced demodulator receiver configurations presented above and applicable to receiver 14028 include I/Q modulation receiver 10300 of FIG. 103. Refer to Section 2.2 above for detailed description of this receiver. Further details pertaining to I/Q balanced demodulator receivers are provided in co-pending U.S. patent application entitled "DC Offset, Re-radiation, and I/Q Solutions Using Universal Frequency Translation Technology," Ser. No. 09/526,041, which is incorporated herein by reference in its entirety.

FIG. 140L illustrates I/Q balanced demodulator embodiments for QPSK/QAM modulation receiver 14098 of FIG. 104K, according to the present invention. QPSK/QAM modulation receiver 14098 comprises a control signal generator 14017 and an I/Q modulation receiver 10300 of FIG. 103. Further I/Q balanced demodulator embodiments for QPSK/QAM modulation receiver 14098 will be apparent to persons skilled in the relevant art(s) based upon the teachings herein, and are within the scope of the present invention.

Control signal generator 14017 generates control signals 10390, 10392, 10394 and 10396 as described elsewhere herein. Control signal generator 14017 may comprise a variety of control signal/pulse generator configurations as described elsewhere herein, including control signal generator 10400 of FIG. 104.

I/Q modulation receiver 10300 receives transmitted modulated signal 14026 and control signals 10390, 10392, 10394 and 10396. Transmitted modulated signal 14026 corresponds to I/Q modulated RF input signal 10382 of FIG. 103. I/Q modulation receiver 10300 demodulates and frequency down-converts transmitted modulated signal 14026, and outputs I baseband output signal 10384 and Q baseband output signal 10386, which form demodulated signal 14040. Demodulated signal 14040 comprises I baseband output signal 10384 and Q baseband output signal 10386.

6.7.1.6 OFDM Operating Channels and Transmit Power Requirements

The 5 GHz U-NII frequency band is segmented into three 100 MHZ bands for operation in the United States. The lower band ranges from 5.15–5.25 GHz, the middle band ranges from 5.25–5.35 GHz and the upper band ranges from 5.725–5.825 GHz. The lower and middle bands accommodate 8 channels in a total bandwidth of 200 MHZ and the upper band accommodates 4 channels in a 100 MHZ bandwidth. The frequency channels center frequencies are spaced 20 MHZ apart. The outermost channels of the lower and middle bands are centered 30 MHZ from the outer edges. In the upper band, the outermost channel centers are 20 MHZ from the outer edges. The channel frequencies and numbering defined in IEEE 802.11a start at 5 GHz, and each channel is spaced 5 GHz apart. A set of channel frequencies for each of the U-NII bands is defined in Table 7.

TABLE 7

| Regulatory Domain | Frequency Band | Channel Number | Center Frequencies |
|---|---|---|---|
| USA | U-NII lower band 5.15–5.25 GHz | 36 | 5.180 GHz |
| | | 40 | 5.220 GHz |
| | | 44 | 5.220 GHz |
| | | 48 | 5.240 GHz |
| USA | U-NII middle band 5.25–5.35 GHz | 52 | 5.260 GHz |
| | | 56 | 5.280 GHz |
| | | 60 | 5.300 GHz |
| | | 64 | 5.320 GHz |

TABLE 7-continued

| Regulatory Domain | Frequency Band | Channel Number | Center Frequencies |
|---|---|---|---|
| USA | U-NII upper band 5.725–5.825 GHz | 149 | 5.745 GHz |
| | | 153 | 5.765 GHz |
| | | 157 | 5.785 GHz |
| | | 161 | 5.805 GHz |

In addition to frequency and channel allocations, transmit power is a key parameter regulated in the 5 GHz U-NII frequency band. Three transmit RF power levels are specified: 40 mW, 200 mW and 800 mW, as illustrated in Table 8. The upper band defines RF transmit power levels suitable for bridging applications. The lower band specifies a transmit power level suitable for short-range indoor home and small office environments.

TABLE 8

| Frequency Band | Maximum Transmit Power with 6 dBi Antenna Gain |
|---|---|
| 5.150–5.250 GHz | 40 mW (2.5 mW/MHZ) |
| 5.250–5.350 GHz | 200 mW (12.5 mW/MHZ) |
| 5.725–5.825 GHz | 800 mW (50 mW/MHZ) |

6.7.1.7 Geographic Regulatory Bodies

WLAN IEEE 802.11 a-compliant OFDM radios operating in the 5 GHz UNII frequency band must comply with the local geographical regulatory domains regarding this spectrum. Such products may be subject to certification. For example, regulatory agencies may set emission standards for WLANs in order to minimize the amount of interference a radio may generate or may receive from a nearby radio. The regulatory requirements do not affect the interoperability of IEEE 802.11a compliant products. In the United States, the FCC has responsibility for the allocation of 5 GHz U-UNII bands.

6.7.1.7.1 North America

Geographic Area: USA

Approval Standards: Federal Communications Commission (FCC) Documents: CFR47, Part 15; Sections 15.205, 15.209, and subpart E;

Sections 15.401–15.407

Approval Authorities: Federal Communications Commission (FCC)

6.7.1.8 Globalization of Spectrum at 5 GHz

IEEE 802.11, ETSI's HIPERLAN II, and Japan's Mobile Multimedia Access Communication Promotion Council (MMAC-PC) have pursued available spectrum allocations in the 5 GHz band. In Europe, the 5.15–5.35 GHz frequency band is reserved for HIPERLAN II devices. ETSI-HIPERLAN II and IEEE 802.11 may potentially share the lower 5 GHz band, drawing on the extreme similarity of the PHY layers of both projects. In Japan, the Wireless Ethernet Working Group of the MMAC-PC recommends using the 802.11a standard at the time the 5.15–5.25 GHz band becomes available in Japan.

6.7.2 IEEE 802.11b-2.4 High Rate DSSS PHY

The IEEE 802.11b PHY extension of IEEE 802.11 is referred to as high rate direct sequence spread spectrum (HR/DSSS). The HR/DSSS PHY provides two functions: First, the HR/DSSS extends the PSDU data rates to 5.5

Mbps and 11 Mbps using an enhanced modulation technique. Second, the HR/DSSS PHY provides a rate shift mechanism, which allows 11 Mbps networks to fall back to 1 and 2 Mbps and interoperate with the legacy IEEE 802.112.4 GHz RF PHY layers. The OSI structure and operation of the PHY's PLCP sublayer and PMD sublayer for HR/DSSS is similar to the existing IEEE 802.11 DSSS PHY described herein. The following sections give an overview of the PLCP header, data rates, and modulations defined in IEEE 802.11b. The HR/DSSS PHY of the present invention may incorporate universal frequency translation technology for WLAN signal up-conversion, down-conversion, modulation, and de-modulation, as described in subsequent sub-sections.

6.7.2.1 HR/DSSS PHY PLCP Sublayer

A PPDU frame consists of the PLCP preamble, PLCP header, and the PSDU. As with IEEE 802.11 DSSS, the PMD uses the PLCP preamble to acquire the incoming signal and synchronize the receiver's demodulator. The HR/DSSS PHY defines two PLCP preambles, long and short. FIG. 141A illustrates a PPDU with a long PLCP preamble 14102. FIG. 141B illustrates a PPDU with a short preamble 14104. The long preamble 14102 uses the same PLCP preamble and header as used by the IEEE 802.11 DSSS PHY, and sends the information at 1 Mbps using DBPSK and Barker word direct sequence spreading. The PSDU is transmitted at 1, 2, 5.5, and 11 Mbps as determined by the content in the signal field. The long preamble 14102 is backwards compatible with existing IEEE 802.11 DSSS PHY and defined to interoperate with existing IEEE 802.11 wireless networks operating at 1 and 2 Mbps.

The short preamble 14104 uses a 56-bit SYNC field to acquire the incoming signal, and transmits the preamble at 1 Mbps using DBPSK modulation and Barker word spreading. The PLCP header transmits at 2 Mbps using DQPSK and Barker word spreading (see FIG. 141). In this case, the PSDU is transmitted at 2, 5.5, or 11 Mbps as determined by the content in the signal field. The short preamble 14104 is an option in IEEE 802.11b and is useful for those networks where throughput efficiency and interoperability with existing IEEE 802.11 DSSS radios in not necessary. Because the short preamble radio may only interoperate with itself, a short preamble radio must support the long preamble 14102 to be IEEE 802.11b compliant.

SYNC: The receiver uses this field to acquire the incoming signal and synchronize the receiver's carrier tracking and timing prior to receiving the start of frame delimiter (SFD). The long preamble SYNC field is 128 bits in length, and contains a string of scrambled 1s. The scrambler seed bit pattern used to initialize the scrambler for the long preamble is 01101100. The short preamble SYNC field is 56 bits in length, and contains a string of scrambled 0s. The scrambler seed bit pattern used to initialize the scrambler for short preamble operation is 00011010. The short preamble SYNC field may be used for networks where minimizing overhead and maximizing PSDU throughput is a consideration.

SFD: This field contains information marking the start of a PPDU frame. The SFD specified is common for all IEEE 802.11 DSSS and IEEE 802.11b long preamble radios. The following hexadecimal word is used: F3A0hex transmitted LSB first. For short preamble radios, the following hexadecimal word is used: 05CFhex transmitted LSB first.

Signal: The signal field defines which type of modulation must be used to receive the incoming PSDU. The binary value in this field is equal to the data rate multiplied by 100 kbit/s. The Mbps data rate is used for long and short preamble implementations. The bit patterns in this field and the respective data rates are shown in Table 9.

TABLE 9

| Signal Field | Data Rate |
|---|---|
| 00001010 | 1 Mbps (long preamble only) |
| 00010100 | 2 Mbps |
| 00111110 | 5.5 Mbps |
| 01101110 | 11 Mbps |

Service: The service field uses 3 bits of the reserved 8 bits for IEEE 802.11b. Data bit (b2) determines whether the transmit frequency and symbol clocks use the same local oscillator. Data bit (b3) indicates whether complimentary code keying (CCK) or packet binary convolutional coding (PBCC) is used and data bit (b7) is a bit extension used in conjunction with the length field to calculate the duration of the PSDU in microseconds. This field is used for the long and short preamble frames.

Length: The length field is an unsigned 16-bit integer that indicates the number of microseconds necessary to transmit the PSDU. For any data rate over 8 Mbps, bit-7 of the service field is used with the length field to determine the time in microseconds from the number of octets contained in the length field. A calculation is defined in IEEE 802.11b for determining the length in microseconds for CCK and PBCC as applied to both preambles. The MAC layer uses this field to determine the end of a PPDU frame.

CRC: The CRC field contains the results of a calculated frame check sequence from the sending station. The calculation is performed prior to data scrambling for the long and short preamble. A CCITT CRC-16 error detection algorithm is used to protect the signal, service, and length fields. The CRC-16 algorithm is represented by the following polynomial: $G(x)=x^{16}+x^{12}+x^{5}+1$. The receiver performs the calculation on the incoming Signal, Service and Length fields, and compares the results against the transmitted value. If an error is detected, the receiver's MAC makes the decision whether incoming PSDU should be terminated.

6.7.2.2 High Rate Data Scrambling

All information bits transmitted by the DSSS PMD are scrambled using a self-synchronizing 7-bit polynomial. The scrambling polynomial for the DSSS PHY is: $G(z)=z^{-7}+z^{-4}+1$. Scrambling is used to randomize the long and short preamble data in the SYNC field of the PLCP and for data patterns which contain long strings of binary 1s or 0s. The receiver can descramble the information bits without prior knowledge from the sending station. The scrambler initialization bit patterns are represented as (00011010) for the short preamble and (01101100) for the long preamble.

6.7.2.3 IEEE 802.11 High Rate Operating Channels

The HR/DSSS PHY uses the same frequency channels as defined for the IEEE 802.11 direct sequence PHY. The channel center frequencies are spaced 25 MHZ apart to allow multiple WLAN systems to operate simultaneously in the same area without interfering with each other. An example of a typical channel arrangement for non-interfering channels for North America is illustrated in FIG. 142. In Europe, the channels 1 (2.412 GHz), 7 (2.442 GHz), and 13 (2.472 GHz) are used to form three non-interfering networks.

6.7.2.4 IEEE 802.11 DSSS High Rate Modulation and Data Rates

There are four modulation formats and data rates defined in IEEE 802.11b. The data rates include the basic rate, the extended rate, and enhanced rate. The basic rate is defined as 1 Mbps modulated with DBPSK, and the extended rate is defined as 2 Mbps DQPSK modulated. The 1'-bit Barker word is used as the spreading format for the basic and extended rate as described for the DSSS PHY herein. The enhanced rate is defined to operate at 5.5 Mbps and 11 Mbps using CCK modulation and packet binary convolutional coding (PBCC). PBCC is an option in the standard for networks requiring enhanced performance. Frequency agility is further option defined in IEEE 802.11b. As with the 1 and 2 Mbps DSSS PHY, this option enables existing IEEE 802.11 FHSS 1 Mbps networks to be interoperable with 11 Mbps CCK high rate networks. The PBCC and frequency agility option are further described below.

6.7.2.4.1 Complementary Code Keying (CCK) Modulation

In July of 1998, the IEEE 802.11 Working Group adopted CCK as the basis for the high rate extension to deliver PSDU frames at speeds of 5.5 Mbps and 11 Mbps. CCK was adopted because it provides for interoperability with existing IEEE 802.111 and 2 Mbps systems by maintaining the same bandwidth and incorporating the existing DSSS PHY PLCP preamble and header.

CCK is a variation on M-ary orthogonal keying modulation and is based on an in-phase (I) and quadrature (O) architecture using complex symbols. CCK allows for multichannel operation in the 2.4 GHz band by using the existing 1 and 2 Mbps DSSS channelization scheme. CCK uses 8 complex chips in each spreading code word. Each chip can assume one of four phases (QPSK). CCK uses 64 base spreading code words out of a possible set of 65536 (i.e., $65536\text{-}4^3$). Base spreading codes were chosen with beneficial autocorrelation and crosscorrelation properties. The CCK modulator chooses one of M unique for transmission of the scrambled PSDU. CCK uses one vector from a set of 64 complex quadrature phase shift keying (QPSK) vectors for the symbol and thereby modulates 6 bits (one of 64) on each spreading code symbol. An exemplary block diagram for a CCK modulator is shown in FIG. 143. Each spreading code is 8 complex chips in length. CCK uses a complex set of Walsh/Hadamard functions known as complementary codes. Refer to IEEE 802.11b for the equation used to derive the set of code words. There are four phase terms in the CCK equation. One of the terms modulates all of the chips, and is used for the QPSK rotation of entire code vector. The others modulate every odd chip, every odd pair of chips and every odd quad of chips. To minimize DC offsets, the 4th and 7th terms in the equation are rotated by 180 degrees with a cover sequence. As with the IEEE 802.11 DSSS PHY, the phase rotation for CCK is counterclockwise. To insure that the modulation has the same bandwidth as the legacy IEEE 802.11 DSSS PHY, the chipping rate is kept at 11 Mbps while the symbol rate is increased to 1.375 Mbps. The spreading rate remains constant while the data rate changes, and the CCK spectrum is the same as the legacy IEEE 802.11 waveform.

For 5.5 Mbps transmission, the scrambled binary bits of the PSDU are grouped into 4-bit nibbles, where two of the bits select the spreading function while the remaining two bits QPSK modulate the symbol, as illustrated in FIG. 144A. The spreading sequence DQPSK modulates the carrier by driving the I and Q modulators. For 11 Mbps operation, the incoming scrambled PSDU binary bits are grouped into 2 and 6 bits, as illustrated in FIG. 144B. The 6 bits are used to select (one of 64) complex vectors of 8 chips in length for the symbol and the other 2 bits DQPSK modulate the entire symbol. The transmit waveform is the same, and the chipping rate is maintained at 11 Mbps.

6.7.2.4.2 DSSS Packet Binary Convolutional Coding

Packet binary convolutional coding (PBCC) is an optional coding scheme defined in IEEE 802.11b. The coding option uses a 64-state binary convolutional code (BCC), rate R=½ code, and a cover sequence. An exemplary PBCC modulator is illustrated in FIG. 145A. The HR/DSSS PMD uses PBCC to transmit the PPDU. To ensure that the PPDU frame is properly decoded at the receiver, the memory of the BCC encoder 14502 is cleared at the beginning and at the end of a frame. A cover sequence is used to map the QPSK symbols. The cover sequence is initialized with a 16-bit pattern (0011001110001011) to produce a 256-bit cover sequence, which selects the QPSK symbols. Binary phase shift keying (BPSK) is used for 5.5 Mbps, and QPSK for 11 Mbps. For QPSK, each pair of output bits from the BCC is used to generate one symbol. For BPSK, each pair of bits produces two symbols. The result is one bit per symbol for QPSK and ±2 bit per symbol for BPSK. Refer to IEEE 802.11b for the equation used for the cover sequence generator 14504.

6.7.2.4.3 Frequency Hopped Spread Spectrum (FHSS) Interoperability

A channel agility option is defined in IEEE 802.11b which allows IEEE 802.11 FHSS 1 and 2 Mbps networks to interoperate with HR/DSSS 11 Mbps WLANs. Both non-overlapping and overlapping high rate channels are supported. The non-overlapping channels allow WLAN systems to operate simultaneously in the same area without interfering with each other. In North America, channels 1, 6, and 11 are specified for non-overlapping networks, and in Europe (excluding France and Spain) channels 1, 7, and 13 are specified as such. Two sets of hopping sequences are defined for worldwide operation. For more details on the hop patterns, refer to IEEE 802.11b.

6.7.2.5 HR/DSSS PMD Incorporating Universal Frequency Translation Technology

In embodiments, the HR/DSSS PMD may incorporate universal frequency translation technology to provide for modulation/de-modulation and frequency translation of WLAN station signals. For instance, the HR/DSSS PMD may comprise one or more UFT modules, such as UFT module 12810 of FIG. 128B, that provide for these functions. Furthermore, the HR/DSSS PMD may comprise one or more UFU modules such as UFU module 12812 of FIG. 128C, and/or one or more UFD modules such as UFD module 12814 of FIG. 128C, to provide for modulation/demodulation and frequency translation of WLAN station signals. The HR/DSSS PMD of the present invention, using techniques of universal frequency translation, transmits and receives signals modulated according to DBPSK, DQPSK, CCK, and PBCC modulation schemes. Further specifications for these transmitted and received signals are provided above.

Embodiments for HR/DSSS PMD transmitters and receivers incorporating universal frequency translation technology are provided below. Alternate embodiments (including equivalents, extensions, variations, deviations, etc., of the embodiments described herein) will be apparent to persons skilled in the relevant art(s) based on the teachings contained herein. For example, the HR/DSSS PMD as described in this section can be achieved using any number of structural implementations, including hardware, firmware, software, or any combination thereof. The invention is intended and adapted to include such alternate embodiments.

6.7.2.5.1 Transmit HR/DSSS PMD Incorporating Universal Frequency Translation

FIG. 143A illustrates a transmit HR/DSSS PMD 14300, according to an embodiment of the present invention. Transmit HR/DSSS PMD 14300 of the present invention comprises at least one UFT module 12810 for frequency translation/modulation/demodulation of WLAN station signals.

As described above, the transmit HR/DSSS PMD 14300 transmits WLAN signals according to DBPSK, DQPSK, CCK, and PBCC modulation schemes. For instance, in the case of a long preamble, transmit HR/DSSS PMD 14300 transmits the PLCP preamble and PLCP header at 1 Mbps according to DBPSK, and the PSDU is sent at either 1 Mbps DBPSK, 2 Mbps DQPSK, or 5.5 or 11 Mbps CCK or PBCC, depending on the content in the signal field and service field. In the case of a short preamble, transmit HR/DSSS PMD 14300 transmits the PLCP preamble at 1 Mbps using DBPSK, the PLCP header at 2 Mbps using DQPSK, and the PSDU is sent at either 2, 5.5, or 11 Mbps, depending on the content in the signal field.

Transmission of WLAN signals according to DBPSK and DQPSK modulation schemes are described in detail in Section 6.6.2.6.1 above in reference to transmit DSSS PMD 12900. The structure and operation of transmit DSSS PMD 12900 is applicable to transmit HR/DSSS PMD 14300, and is hence considered incorporated in transmit HR/DSSS PMD 14300. Refer to Section 6.6.2.6.1 above for detailed description of transmission of DBPSK and DQPSK modulated signals by transmit HR/DSSS PMD 14300. The transmission of CCK and PBCC modulated signal is described below.

6.7.2.5.1.1 Transmitter Embodiments for CCK Modulation

As shown in FIG. 143B, transmit HR/DSSS PMD 14300 comprises a CCK modulator 14324, according to embodiments of the present invention. CCK modulator 14324 modulates WLAN station signals according to CCK modulation techniques. CCK modulator 14324 comprises a scrambler 14302, a data multiplexer 14304, a complex code selector module 14306, and a DQPSK modulation transmitter 14308. The structure and operation of transmit HR/DSSS PMD 14300 in a CCK modulation mode will be described as follows, and is further described elsewhere herein.

Scrambler 14302 receives a PSDU signal 14310. In embodiments, PSDU signal 14310 may comprise one or more PPDU frames, and/or PPDU frame portions, such as the PSDU, to be modulated according to CCK modulation. Alternatively, the HR/DSSS PMD PSDU may be modulated according to any of the modulation schemes described herein.

Scrambler 14302 scrambles the PSDU signal 14310, and outputs a scrambled PSDU signal 14312. The design and use of a scrambler 14302 is well known to those skilled in the relevant art(s). A suitable scrambler 14302 may be designed and implemented in software, firmware, hardware, and any combination thereof, or it may be purchased "off the shelf."

Data multiplexor 14304 receives scrambled PSDU signal 14312. Data multiplexor 14304 multiplexes scrambled PSDU signal 14312, and outputs first multiplexed output signal 14314 and second multiplexed output signal 14316. In a 5.5 Mbps embodiment, first multiplexed output signal 14314 is 2 bits wide. In an 11 Mbps embodiment, first multiplexed signal 14314 is 6 bits wide. Second multiplexed output signal 14316 is 2 bits wide. The design and use of a data multiplexor 14304 is well known to those skilled in the relevant art(s). A suitable data multiplexor 14304 may be designed and implemented in software, firmware, hardware, and any combination thereof, or it may be purchased "off the shelf."

Complex code selector module 14306 receives first multiplexed output signal 14314. Complex code selector module 14306 selects a spreading code using first multiplexed output signal 14314. In a 5.5 Mbps embodiment, the spreading code is selected from 4 possible code words. In an 11 Mbps embodiment, the spreading code is selected from 64 possible code words. Complex code selector module 14306 outputs spreading code 14318. The design and use of a complex code selector module 14306 is well known to those skilled in the relevant art(s). A suitable complex code selector module 14306 may be designed and implemented in software, firmware, hardware, and any combination thereof.

DQPSK modulation transmitter 14308 receives second multiplexed signal 14316 and spreading code 14318. DQPSK modulation transmitter 14308 modulates spreading code 14318 with second multiplexed signal 14316 according to the technique of DQPSK modulation.

In an embodiment, DQPSK modulator operates similarly to modulator 12978 of FIG. 129I, and comprises a transmitter such as I/Q transmitter 7402, 7608, 7618, 7702, 7802, 8000, 8200, 8300, which combines and frequency up-converts these signals to a transmitted modulated signal. The resulting transmitted modulated signal may be transmitted by an antenna. Also refer to the DQPSK modulation transmitter configurations of FIGS. 129G–129I for further configurations for providing DQPSK modulation in transmitter 14308 of FIG. 143B.

In an alternate embodiment, DQPSK modulation transmitter 14308 outputs I data 14320 and Q data 14320, as shown in FIG. 1291, which are input to a transmitter such as I/Q transmitter 7402, 7608, 7618, 7702, 7802, 8000, 8200, 8300. I/Q transmitter 7402, 7608, 7618, 7702, 7802, 8000, 8200, 8300 combines and frequency up-converts these signals to a transmitted modulated signal, which may be transmitted by an antenna. Alternate embodiments for CCK modulator 14324 (including equivalents, extensions, variations, deviations, etc., of the embodiments described herein) will be apparent to persons skilled in the relevant art(s) based on the teachings contained herein. The invention is intended and adapted to include such alternate embodiments.

6.7.2.5.1.2 Transmitter Embodiments for PBCC Modulation

As shown in FIG. 145A, transmit HR/DSSS PMD 14300 comprises a PBCC modulator 14500, according to embodiments of the present invention. PBCC modulator 14500 modulates WLAN station signals according to PBCC modulation techniques. PBCC modulator 14500 comprises a binary convolutional code encoder 14502, a cover code sequence generator 14504, a scrambler 14506, a QPSK cover code map module 14508, and a QPSK modulation transmitter 14510. The structure and operation of transmit HR/DSSS PMD 14300 in a PBCC modulation mode will be described as follows, and is further described elsewhere herein.

Scrambler 14506 receives PPDU signal 14512. In embodiments, PPDU signal 14512 may comprise one or more PPDU frames, and/or PPDU frame portions, such as the PSDU, the PLCP preamble, and the PLCP header, to be modulated according to PBCC modulation. Alternatively, the HR/DSSS PMD PPDU may be modulated according to any of the modulation schemes described herein.

Scrambler 14506 scrambles PPDU signal 14512, and outputs scrambled PPDU signal 14512. The design and use of a scrambler 14506 is well known to those skilled in the relevant art(s). A suitable scrambler 14506 may be designed and implemented in software, firmware, hardware, and any combination thereof, or it may be purchased "off the shelf."

Binary convolutional code encoder 14502 receives scrambled PPDU signal 14512. Binary convolutional code encoder 14502 encodes scrambled PPDU signal 14512, and outputs encoded signal 14512. The design and use of a binary convolutional code encoder 14502 is well known to those skilled in the relevant art(s). A suitable binary convolutional code encoder 14502 may be designed and implemented in software, firmware, hardware, and any combination thereof.

Cover code sequence generator 14504 receives 16-bit cover code seed 14520. Cover code sequence generator 14504 generates cover code sequence 14518. The design and use of a cover code sequence generator 14504 is well known to those skilled in the relevant art(s). A suitable cover code sequence generator 14504 may be designed and implemented in software, firmware, hardware, and any combination thereof QPSK cover code map module 14508 receives encoded signal 14512 and cover code sequence 14518. QPSK cover code map module 14508 maps encoded signal 14512 via cover sequence 14518, and outputs mapped I signal 14522 and mapped Q signal 14524. A suitable QPSK cover code map module 14508 may be designed and implemented in software, firmware, hardware, and any combination thereof, as would be understood by persons skilled in the relevant art(s) from the teachings herein.

QPSK modulation transmitter 14510 receives mapped I signal 14522 and mapped Q signal 14524. QPSK modulation transmitter 14510 modulates mapped I signal 14522 and mapped Q signal 14524 according to QPSK modulation, and outputs modulated output signal 14526. FIGS. 129G–129I illustrate exemplary DQPSK modulation transmitter configurations related to transmitter 12910 of FIG. 129A, according to embodiments of the invention. The DQPSK modulation transmitter configurations of FIGS. 129G–129I are adaptable to providing for QPSK modulation in transmitter 14510 of FIG. 145A, according to further embodiments of the present invention. For instance, referring to FIG. 129G, in a QPSK modulation embodiment, DQPSK modulation transmitter 12978 may be adapted to a QPSK modulation transmitter. As a result, transmitted modulated signal 12924 is a QPSK modulated signal. Referring to FIG. 129H, in a QPSK modulation embodiment, first and second DBPSK modulators 12909 and 12980 may be adapted to first and second BPSK modulators, respectively. As a result, first and second DBPSK modulated signals 12901 and 12975 are BPSK modulated signals. Referring to FIG. 1291, in a QPSK modulation embodiment, first and second DBPSK modulators 12911 and 12913 are adapted to first and second BPSK modulators, respectively. As a result, first and second DBPSK modulated signals 12977 and 12979 are BPSK modulated signals.

Hence, the DQPSK modulation transmitter configurations of FIGS. 129G–129I may be referred to for exemplary QPSK modulation embodiments of QPSK modulation transmitter 14510. Refer to Section 6.6.2.6.1.3 for further description of the structure and operation of the DQPSK modulation transmitter configurations of FIGS. 129G–129I. Alternate QPSK modulation transmitter embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

6.7.2.5.2 Receiver HR/DSSS PMD Incorporating Universal Frequency Translation

FIG. 145B illustrates a receiver HR/DSSS PMD 14528, according to an embodiment of the present invention. Receiver HR/DSSS PMD 14528 of the present invention comprises at least one UFT module 12810 for frequency translation/modulation/demodulation of WLAN station signals.

As described above, receiver HR/DSSS PMD 14528 receives and demodulates WLAN signals modulated according to DBPSK, DQPSK, CCK, and PBCC modulation schemes. For example, receiver HR/DSSS PMD 14528 of the present invention demodulates the DBPSK-modulated PLCP preamble, the DBPSK- or DQPSK-modulated PLCP header, and demodulates the DBPSK-, DQPSK-, CCK-, or PBCC-modulated PSDU.

Receivers for receiving WLAN signals modulated according to DBPSK and DQPSK modulation schemes are described in detail in Section 6.6.2.6.2 above in reference to receiver DSSS PMD 12902. The structure and operation of receiver DSSS PMD 12902 is applicable to receiver HR/DSSS PMD 14528, and is hence considered incorporated in receiver HR/DSSS PMD 14528. Refer to Section 6.6.2.6.2 above for detailed description of the reception of DBPSK and DQPSK modulated signals by receiver HR/DSSS PMD 14528.

As shown in FIG. 145C, receiver HR/DSSS PMD 14528 comprises a CCK demodulator 14530, according to embodiments of the present invention. CCK demodulator 14530 comprises at least one UFT module 12810. CCK demodulator 14530 demodulates CCK modulated WLAN station signals. As described above, CCK modulated WLAN station signals are generated in part by techniques including DQPSK/QPSK modulation. In embodiments, CCK demodulator 14530 incorporates the structure and operation of QPSK modulation receiver 12939 described above in Section 6.6.2.6.2 in regards to demodulation of DQPSK modulated signals. In further embodiments, CCK demodulator 14530 incorporates the structure and operation of QPSK/QAM modulation receiver 14098 described above in Section 6.7.1.5.2 in regards to demodulation of QPSK modulated signals. Refer to Sections 6.6.2.6.2 and 6.7.1.5.2 above for detailed description of the reception of DQPSK and QPSK modulated signals by receiver HR/DSSS PMD 14528.

As shown in FIG. 145D, receiver HR/DSSS PMD 14528 comprises a PBCC demodulator 14532, according to embodiments of the present invention. PBCC demodulator 14532 comprises at least one UFT module 12810. PBCC demodulator 14532 demodulates PBCC modulated WLAN station signals. As described above, PBCC modulated WLAN station signals are generated in part by techniques including DQPSK/QPSK modulation. In embodiments, PBCC demodulator 14532 incorporates the structure and operation of QPSK modulation receiver 12939 described above in Section 6.6.2.6.2 in regards to demodulation of DQPSK modulated signals. In further embodiments, PBCC demodulator 14532 incorporates the structure and operation of QPSK/QAM modulation receiver 14098 described above in Section 6.7.1.5.2 in regards to demodulation of QPSK modulated signals. Refer to Sections 6.6.2.6.2 and 6.7.1.5.2 above for detailed description of the reception of DQPSK and QPSK modulated signals by receiver HR/DSSS PMD 14528.

Alternate embodiments for receiver HR/DSSS PMD 14528 will be apparent to persons skilled in the relevant art(s) based on the teachings contained herein. The invention is intended and adapted to include such alternate embodiments.

6.8 System Design Considerations for IEEE 802.11 WLANs

The IEEE 802.11 WLAN standard provides a number of physical layer options in terms of data rates, modulation types, and spreading spectrum techniques. Selecting the correct physical layer and MAC technologies for an application requires careful planning and detailed systems analysis for developing the optimal WLAN implementation. The following sections focus on a few key considerations when implementing a compliant IEEE 802.11 interoperable WLAN system.

6.8.1 The Medium

A difference between a "wired" and a RF WLAN is the radio communications link. While a radio communications link provides the freedom to move without the constraints of wires, the wired media has the luxury of a controlled propagation media. Wireless RF media may be difficult to control because the dynamics of the propagated signals over the media are constantly changing. IEEE 802.11 WLANs may suffer from this difficulty because the 2.4 GHz bands are shared with unlicensed users. Radio system designers need to have a thorough understanding of the RF medium to properly design 2.4 GHz and 5 GHz IEEE 802.11 WLAN systems, especially for networks operating at data rates greater than 2 Mbps. The RF communication media for home, enterprise, and manufacturing environments may be different. Multipath and path loss are issues to consider when designing an IEEE 802.11 WLAN system.

6.8.2 Multipath

Figure 94:
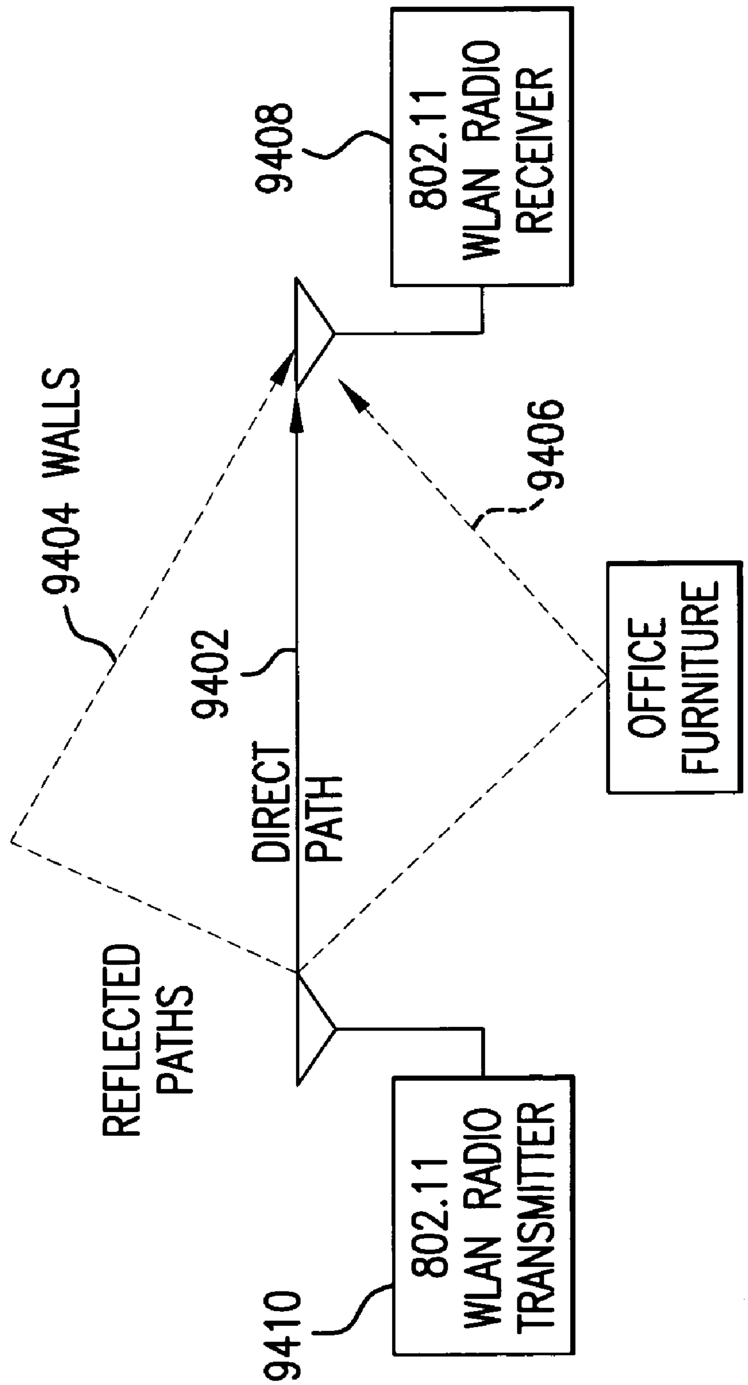
FIG. 94 illustrates an example of the occurrence of multipath.

Multipath is a performance concern for indoor IEEE 802.11 WLAN systems. Multipath may occur when the direct path 9402 of a transmitted signal is combined with paths 9404 and 9406 of a reflected signal, resulting in a corrupted signal at the receiver 9408, as shown in FIG. 94. The delay of a reflected signal is measured in nanoseconds (nsec), and is commonly known as delay spread. Delay spread is the parameter used to signify multipath. The amount of delay spread varies for indoor, home, office, and manufacturing environments, as shown in Table 10. Surfaces of furniture, elevator shafts, walls, factory machinery, metal constructed buildings, and other objects may contribute to the amount of delay spread in a given environment.

TABLE 10

| Environment | Delay Spread |
|---|---|
| Home | <50 nsec |
| Office | ~100 nsec |
| Manufacturing floor | 200–300 nsec |

Figure 95:
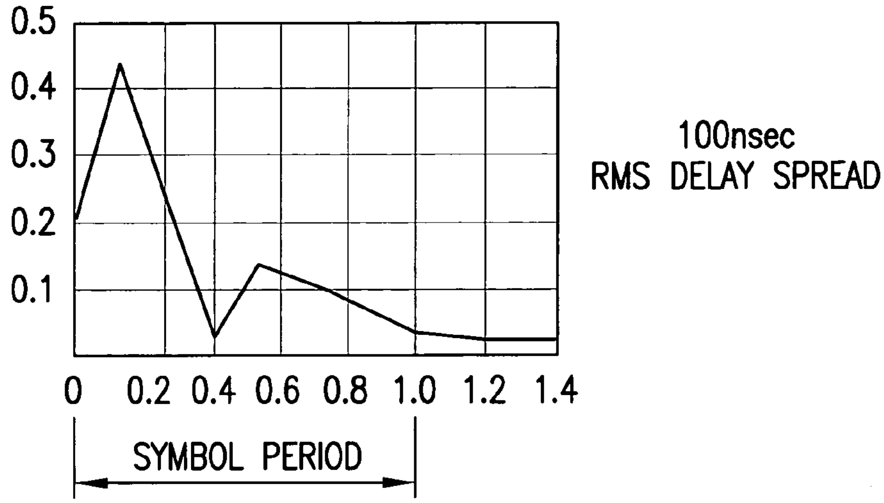
FIG. 95 illustrates an example graph showing delay spread versus symbol period.

The channel impulse response is a way to illustrate the amount of multipath dispersion. For example, the amount of delay spread in an office environment may be approximately 100 nsec, as shown in FIG. 95. Typically, energy reflected by wall surfaces causes the impulse response to have energy on the leading edge before the peak. The leading energy is called the precursor energy. The amount of precursor energy differs from one environment to the next. The processing required to correct for the precursor energy is more complex than is required for the trailing edge energy. The symbol period on the x-axis of the graph in FIG. 95 is equal to the length of the 8 chip CCK code word. The 11 chip barker code is only 3 chips longer.

RAKE processing and equalization are two methods used to process and resolve delay spread. A RAKE receiver is a well-known architecture used to remove delay spreads on the order of 100 nsec. The RAKE is structured as a bank of correlators (fingers) with weighed delays, and a combiner. Equalization is an alternate architecture that may be used to correct delay spreads greater than 100 nsec. Multipath causes the signals from the previous symbol to interfere with the signals of the next. This is known as intersymbol interference (ISI). As with ISI, interchip interference (ICI) results when the signals of the previous chip interfere with the signals of the next chip. ISI and ICI are issues for higher data rate systems because the symbol and chip periods are shorter. This is the case for IEEE 802.11a and IEEE 802.11b. Equalization may correct for ISI and ICI. An equalizer is a multi-tapped delay line, which subtracts a delayed and attenuated signal from the actual received signal. However, for environments where delay spreads are greater than 200 nsec, more complex signal processing may be necessary. RAKE processing combined with ISI and ICI equalization is commonly implemented to resolve multipath dispersions of this magnitude.

6.8.3 Multipath Channel Model

Figure 96:
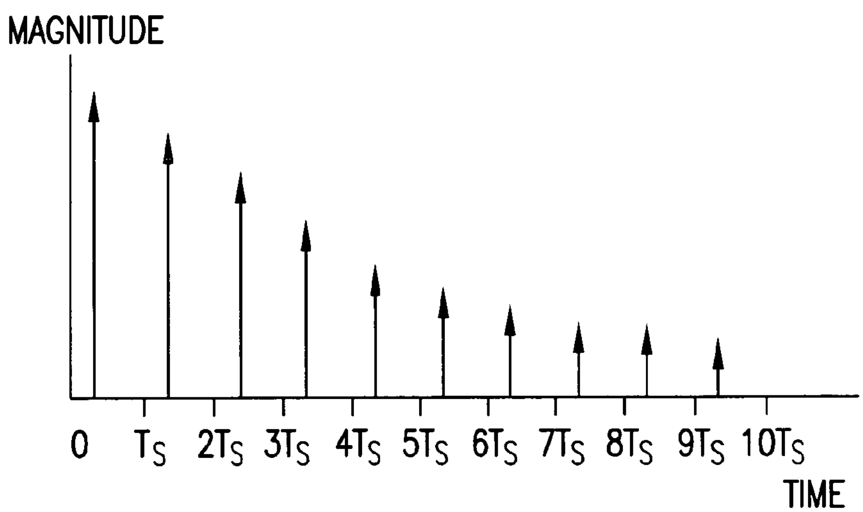
FIG. 96 illustrates an exemplary channel impulse response.

In an environment where performance measurements of the same radio are used, in the same location, the results may not agree. This may be due to the changing position of people in the room and slight changes in the environment, which can produce significant changes in the signal power at the radio receiver. A consistent channel model is required to allow comparison of different WLAN systems and to provide consistent results. The IEEE 802.11 Working Group adopted the following channel model as the baseline for predicting multipath for modulations used in IEEE 802.11a (5 GHz) and IEEE 802.11b (2.4 GHz). This model is useful for software simulations predicting performance results for a given implementation. The channel impulse response illustrated in FIG. 96 is composed of complex samples with random uniformly distributed phase and Rayleigh distributed magnitude with average power decaying exponentially.

The mathematical model for the channel is provided as follows:

$$h_k = N\left(0, \frac{1}{2}\sigma_k^2\right) + jN\left(0, \frac{1}{2}\sigma_k^2\right)$$

$$\sigma_k^2 = \sigma_0^2 e^{-kT_s/T_{RMS}}$$

$$\sigma_0^2 = 1 - e^{-T_s/T_{RMS}}$$

Where $$N\left(0, \frac{1}{2}\sigma_k^2\right)$$

is a zero mean Gaussian random variable with variance $$\frac{1}{2}\sigma_k^2$$

produced by generating an N(0, 1) and multiplying it by $$\sigma_k / \sqrt{2}, \text{ and } \sigma_0^2 = 1 - e^{-T_s/T_{RMS}}$$

is chosen so that the condition $$\sigma_k^2 = 1$$

I is satisfied to ensure same average received power.

Let $T_S$ be the sampling period, and let $T_{RMS}$ be the delay spread of the channel. The performance assessment shall be no longer than the smaller of 1/(signal bandwidth) or $T_{RMS}/2$. The number of samples to be taken in the impulse response should ensure sufficient decay of the impulse response tail, e.g. $k_{max}=10\times T_{RMS}/T_S$.

6.8.4 Path Loss in a WLAN System

Figure 97:
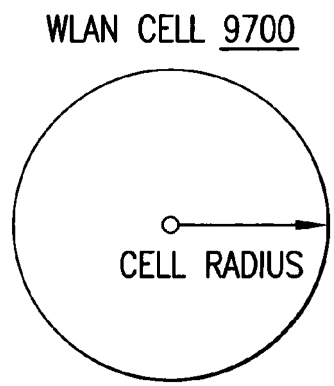
FIG. 97 illustrates an exemplary WLAN cell.
Figure 98:
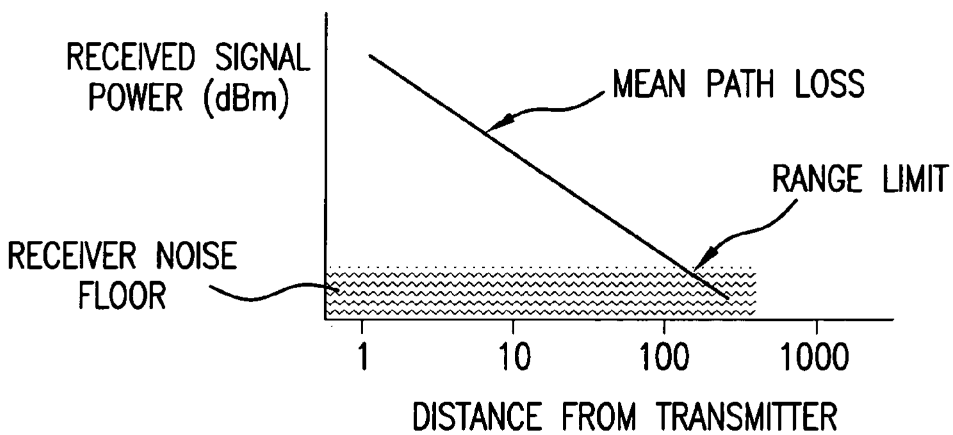
FIG. 98 illustrates an example graph and equations related to path loss.

Another key consideration is the issue of operating range relative to path loss. This consideration plays an important role in determining the size of overlapping WLAN cells and distribution of APs. Path loss calculations are equally important for determining a radio's receiver sensitivity, transmitting power level, and signal to noise ratio (SNR) requirements. As a radio transmits signals to other receivers in a given area, the signal is attenuated as a square of the distance (D). The distance D is the radius of a WLAN cell 9700, as shown in FIG. 97. FIG. 98 illustrates a graph and equations related to path loss. The wavelength (lambda) is the ratio between the speed of light and the signal frequency. As the receiver moves away from the transmitter, the receiver's signal power decays until it reaches the receiver's noise floor, at which time the bit error rate becomes unacceptable. For indoor applications beyond 20 feet, propagation losses increase at about 30 dB per 100 feet. This may occur because of a combination of attenuation by walls, ceilings, and furniture. Each wall constructed with sheet rock and wood typically attenuates the signal by 6 dB, while walls constructed with cement block attenuate the signal by 4 dB. However, additional losses may occur depending on the fading characteristics of the operating environment, which is further described in the following section. The same path loss principles apply for all frequency bands. However, as the operating frequency increases from 2.4 GHz to 5 GHz, for example, an additional path loss of 5–10 dB occurs. This results in a smaller cell radius, and may require additional overlapping cells and APs to guarantee operation in the same area as a system operating at 2.4 GHz.

6.8.5 Multipath Fading

Another key consideration is the path loss due to multipath fading. Multipath fading occurs when the reflected signal paths refract off people, furniture, windows, and walls, and scatter the transmitted signal. For example, moving the receiver away from the transmitter by a small distance, even just a few inches, may produce an additional loss of signal power on the order of 20 dB or more. Multipath fading is viewed as two separate factors, and is described as probability distribution functions. The first factor is a characteristic known as log normal fading. These are coefficient products which result when the signal reflects off surfaces and propagates to the receiver. As the signal coefficient products propagate to the receiver, they are summed together with the direct path where they may cancel each other, possibly causing significant attention of the transmitted signal. This is the second factor, known as Rayleigh fading. As previously discussed herein, RAKE architectures and equalization may be used to correct for these effects.

6.8.6 Es/No vs BER Performance

Figure 99:
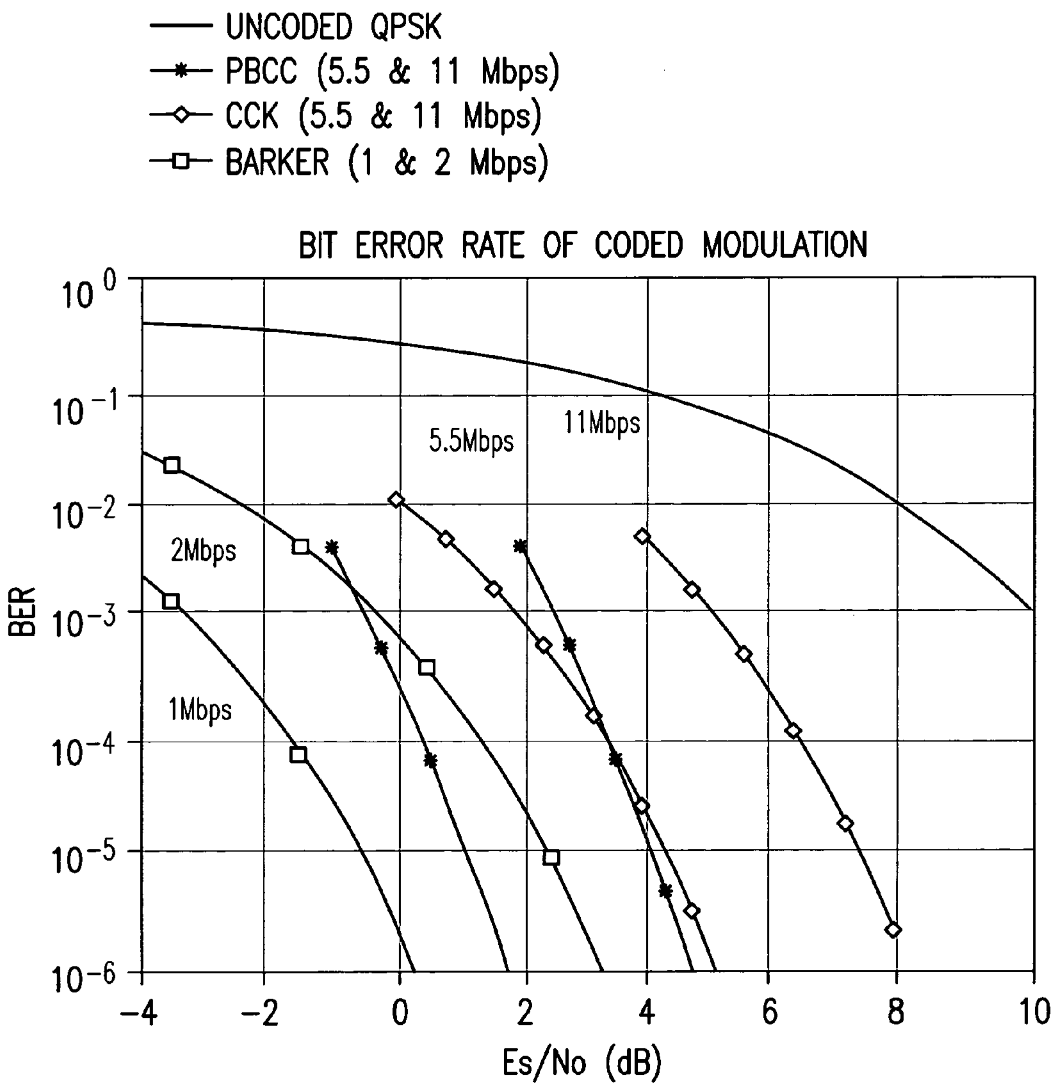
FIG. 99 illustrates an example graph providing a comparison of the theoretical Es/No vs Bit Error Rate (BER) curves for uncoded QPSK, PBCC 5.5–11 Mbps, CCK 5.5–11 Mbps, and Barker 1 and 2 Mbps.

System performance tradeoffs are often made in the decision process when selecting a modulation type and data rate. System tradeoffs in terms of receiver sensitivity, range, and transmit power become very important for developing low cost implementations, especially for higher rate 2.4 GHz IEEE 802.11b systems. FIG. 99 illustrates a graph providing a comparison of the theoretical Es/No vs Bit Error Rate (BER) curves for uncoded QPSK, PBCC 5.5–11 Mbps, CCK 5.5–11 Mbps, and Barker 1 and 2 Mbps. The theoretical curves include additive white Gaussian (AWG) noise in the channel. These curves are provided as a guide to assess the performance for a complete system implementing CCK and PBCC. However, to obtain a better understanding of the overall systems performance, other factors such as multipath, signal fading, carrier phase noise, noise figure, and other implementation losses should be considered in the link budget as part of the systems analysis.

6.8.7 Data Rate vs Aggregate Throughput

The IEEE 802.11 standard defines data rate in terms of symbol rate, or available bit rate. The PPDU data is modulated and transmitted over the RF or IR medium at this rate. This rate is often confused with the aggregate data throughput. The aggregate data rate takes into account overhead associated with protocol frame structure, collisions, and implementation processing delays. The implementation processing delays are associated with frames processed by mobile stations and APs. Simulations may be run in software to estimate the aggregate throughput of the protocol and benchmarked against compliant IEEE 802.11 WLAN systems. However, calculating the aggregate throughput can be complex because there are a number of detailed variables to consider. The protocol overhead includes parameters such as RTS, CTS, ACK frames, (SIF, DIFs, PIFs) interframe space timing, beacon periods and random back-off periods, estimated collisions, PPDU frame size, and RF propagation delays. An useful estimate of the average aggregate throughput of an IEEE 802.11 wireless network is 75% of the data rate for DCF operation, and 85% of the data rate for PCF operation.

6.8.8 WLAN Installation and Site Survey

Many installations begin with a site survey. A site survey may serve a number of purposes. First, the survey may be used to determine the maximum operating range between an AP (fixed location) and mobile stations for a specified transmit RF power level. Second, a survey may help to identify holes in coverage due to multipath, interference sources, and neighboring existing WLAN installations. Third, a survey may be used in cell planning of overlapping BSAs, and for layout of APs, to provide them with hard-wired access to existing wired Ethernet LAN infrastructures.

Many equipment manufactures have tests built into their products to conduct such surveys. PC laptops having IEEE 802.11 WLAN adaptor cards, with embedded software tools, are commonly used. In some cases, a spectrum analyzer with special directional antennas may be used to measure path loss through walls and other obstructions, and to pinpoint and identify interference sources. Some of the tests include bit error rate (BER) and packet error rate (PER), and link quality measurements as a function of range. Typically, the tests are recorded using a pair of WLAN adaptors; the first WLAN adaptor is set up in a fixed location, and the second WLAN adaptor is set up as a mobile station. Each environment is different, and the number of APs required for a given installation generally depends upon the presence of holes in the coverage area due to multipath, and signal attenuation through walls, ceilings, and floors. However, on average, for indoor operation, the maximum operating distance between a mobile station and an AP operating at a 2.4 GHz frequency, transmitting at an RF transmit power of +20 dBm (100 mW) at data rates of 1 and 2 Mbps, is approximately 400 feet, and is approximately 100 feet at 11 Mbps.

6.8.9 Interference in the 2.4 GHz Frequency Band

A microwave oven used in household and commercial kitchens is frequently the main interference source in the 2.4 GHz unlicensed frequency band. The magnetron tubes used in microwave ovens radiate a continuous-wave-like (CWlike) interference that sweeps over tens of megahertz (MHZ) of the 2.4–2.483 GHz band during the positive half cycle of ac line voltage. A microwave oven's EIRP has a maximum generally ranging between 16 and 33 dBm. The power cycle frequency is 50 Hz 20 msec or 60 Hz 16 msec, depending upon the geographical location. In North America, the ac line frequency is 60 Hz, and a microwave oven's magnetron pulses on for 8 msec and off for 8 msec. The maximum packet length defined in the IEEE 802.11 protocol was designed to operate between the 8 msec pulses of microwave energy.

Other sources of interference include neighboring in-band radios. Two types of interference are considered here: The first type is co-channel interference, which is induced by radios from adjacent cells that are on the same channel frequency. Proper cell planning of the channel frequency and hopping patterns, and careful layout of the APs can minimize this interference. The second type of interference is due to systems such as neighboring DSSS and FHSS WLAN networks. Three mechanisms are built into the standard to assist in minimizing the amount of interference. The first mechanism is the clear channel assessment, where the MAC layer protocol provides a method of collision avoidance. The second mechanism is processing gain, which provides some protection from FHSS radios, whose spectrum appears as narrowband interferers. The third mechanism is hop patterns. There is sufficient frequency spacing between pseudo-random hops to minimize the interference due to neighboring DSSS channels. To some degree, legacy 2.4 GHz IEEE 802.11—compliant FHSS and DSSS systems and IEEE 802.11b high-rate WLAN systems may coexist. However, careful cell planning will assist in minimizing the amount of interference a system will experience, especially at the outer fringe of the cell.

6.8.10 Antenna Diversity

Figure 100:
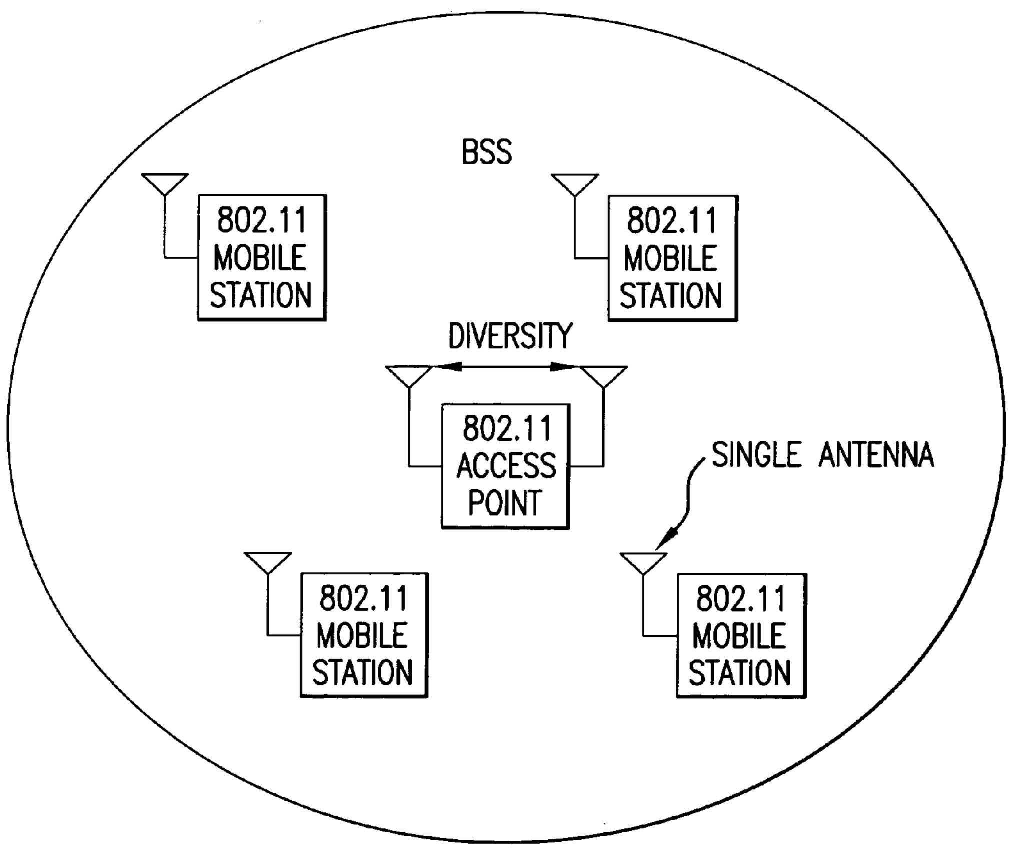
FIG. 100 illustrates antenna diversity at the access point (AP).

Historically antenna diversity has been an effective low-cost alternative solution used to combat and mitigate the effects of multipath and delay spread in WLAN radio receivers. It is relatively easy to implement in the mobile stations and APs, and does not require the signal processing hardware used in other diversity techniques. The objective of antenna diversity is to space the antennas apart from each other to minimize the effects of the uncorrelated multipath at the receiver. By spacing the antennas far apart, the receiver may select and demodulate the larger of the two signals. For 2.4 GHz IEEE 802.11 implementations, the bit length of the preamble sync fields was selected based on these criteria. The antennas are typically spaced anywhere from 0.251 to several lambdas (wavelengths) apart. The amount of separation depends upon the amount of delay-spread tolerance required for the system to operate in a given operating environment. Adding antenna diversity may improve the packet error rate (PER) performance of a wireless link by 2 to 1, as well as improve the availability of the link. There are a number of 2.4 GHz antennas available with different configurations. Patch antennas are commonly used in the mobile client PCMCIA implementations, due at least in part to cost and size constraints. On the other hand, omni-directional antennas may be used at the AP because they provide reasonably optimal antenna coverage. Although antenna diversity is an option in the standard, at a minimum, antenna diversity should always be considered at the AP, as shown in FIG. 100. This form of diversity will assist in minimizing the risk of packet loss due to multipath and interference, and help to ensure reasonably optimal throughput performance in a system.

7. Appendix

The attached Appendix contained in FIGS. 146 to 212, which forms part of this patent application, includes schematics of an integrated circuit implementation example of the present invention. This example embodiment is provided solely for illustrative purposes, and is not limiting. Other embodiments will be apparent to persons skilled in the relevant art(s) based on the teachings herein.

8. Conclusions

Example implementations of the systems and components of the invention have been described herein. As noted elsewhere, these example implementations have been described for illustrative purposes only, and are not limiting. Other implementation embodiments are possible and covered by the invention, such as but not limited to software and software/hardware implementations of the systems and components of the invention. Such implementation embodiments will be apparent to persons skilled in the relevant art(s) based on the teachings contained herein. For example, various WLAN components have been described herein as being implemented using various UFT, UFU, and/or UFD, etc., embodiments. These embodiments have been described for illustrative purposes only, and are not limiting. Such WLAN components can alternatively be implements using other frequency translation embodiments described herein, and/or using equivalents thereof, as will be apparent to persons skilled in the relevant arts based on the teachings contained herein.

Thus, while various application embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, wherein said frequency down-conversion module comprises a switch module and a storage element, wherein a first node of said switch module is coupled to a first node of said storage element, wherein said storage element comprises a capacitor, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer.

2. The WLAN device of claim 1, wherein said first frequency down-conversion module receives said input RF signal, wherein said first frequency down-conversion module down-converts said input RF signal according to a first control signal and outputs a first down-converted signal;

wherein said receiver further comprises:

a second frequency down-conversion module that receives said input RF signal, wherein said second frequency down-conversion module down-converts said input RF signal according to a second control signal and outputs a second down-converted signal; and an adder module that adds said second down-converted signal and said first down-converted signal and outputs a down-converted demodulated signal.

3. The WLAN device of claim 2, wherein said first control signal comprises a first control pulse and said second control signal comprises a second control pulse, wherein said second control pulse is delayed relative to said first control pulse by 0.5+n cycles of said input RF signal, wherein n may be any integer greater than or equal to 1.

4. The WLAN device of claim 3, wherein said first frequency down-conversion module under-samples said input RF signal according to said first control signal, and said second frequency down-conversion module under-samples said input RF signal according to said second control signal.

5. The WLAN device of claim 2, wherein said second frequency down-conversion modules comprises a second switch module and a second storage element, wherein a first node of said second switch module is coupled to a node of said second storage element.

6. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a first frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said first frequency down-conversion module receives said input RF signal, wherein said first frequency down-conversion module down-converts said input RF signal according to a first control signal and outputs a first down-converted signal, wherein said receiver further comprises:

a second frequency down-conversion module that receives said input RF signal, wherein said second frequency down-conversion module down-converts said input RF signal according to a second control signal and outputs a second down-converted signal; and an adder module that adds said second down-converted signal and said first down-converted signal and outputs a down-converted demodulated signal, wherein said first and said second frequency down-conversion modules each comprise a switch module and a storage element, wherein a first node of said each switch module is coupled to a node of the corresponding said each storage element, wherein said each storage element comprises a capacitor, wherein said each capacitor corresponding to said first and said second frequency down-conversion modules reduces a DC offset voltage in said first down-converted signal to produce a first reduced DC offset voltage and said second down-converted signal to produce a second reduced DC offset voltage, wherein said first and said second DC offset voltages are at least due to charge injection effects in said first and said second frequency down-conversion modules, respectively.

7. The WLAN device of claim 2, wherein said adder module comprises a differential amplifier.

8. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a first frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said first frequency down-conversion module receives said input RF signal, wherein said first frequency down-conversion module down-converts said input RF signal according to a first control signal and outputs a first down-converted signal;

wherein said receiver further comprises:

a second frequency down-conversion module that receives said input RF signal, wherein said second frequency down-conversion module down-converts said input RF signal according to a second control signal and outputs a second down-converted signal;

a first adder module that adds said second down-converted signal and said first down-converted signal and outputs an I-phase demodulated signal;

a third frequency down-conversion module that receives said input RF signal, wherein said third UFD frequency down-conversion module down-converts said input RF signal according to a third control signal and outputs a third down-converted signal;

a fourth frequency down-conversion module that receives said input RF signal, wherein said fourth frequency down-conversion module down-converts said input RF signal according to a fourth control signal and outputs a fourth down-converted signal; and a second adder module that adds said fourth down-converted signal and said third down-converted signal and outputs a Q-phase demodulated signal.

9. The WLAN device of claim 8, wherein said first adder and said second adder each comprise a differential amplifier.

10. The WLAN device of claim 8, further comprising a low-noise amplifier that amplifies said input RF signal.

11. The WLAN device of claim 8, wherein a control signal pulse of said second control signal occurs 1.5 cycles of a frequency of said input RF signal after the occurrence of a control signal pulse of said first control signal;

wherein a control signal pulse of said fourth control signal occurs 1.5 cycles of said frequency of said input RF signal after the occurrence of a control signal pulse of said third control signal; and wherein said third control signal pulse occurs 0.75 cycles of said frequency of said input RF signal after the occurrence of said first control signal pulse.

12. The WLAN device of claim 11, wherein a re-radiated signal comprises attenuated components of said control signal pulses of said first, second, third, and fourth control signals to form a cumulative frequency, wherein a ratio of said cumulative frequency of said re-radiated signal to said frequency of said input RF signal is substantially equal to 4:3.

13. The WLAN device of claim 8, wherein said first control signal comprises a first control signal pulse, said second control signal comprises a second control signal pulse, said third control signal comprises a third control signal pulse, and said fourth control signal comprises a fourth control signal pulse;

wherein a potentially re-radiated signal comprises attenuated components of said first, second, third, and fourth control signal pulses to form a cumulative frequency; and wherein said cumulative frequency of said potentially re-radiated signal is chosen to be greater than a frequency of said input RF signal.

14. The WLAN device of claim 8, wherein a first DC offset voltage in said first down-converted signal due to said first frequency down-conversion module and a second DC offset voltage in said second down-converted signal due to said second frequency down-conversion module substantially cancel from said I-phase demodulated signal in said first adder; and wherein a third DC offset voltage in said third down-converted signal due to said third frequency down-conversion module and a fourth DC offset voltage in said fourth down-converted signal due to said fourth frequency down-conversion module substantially cancel from said Q-phase demodulated signal in said second adder.

15. The WLAN device of claim 8, wherein said first frequency down-conversion module under-samples said input RF signal according to said first control signal, said second frequency down-conversion module under-samples said input RF signal according to said second control signal, said third frequency down-conversion module under-samples said input RF signal according to said third control signal, and said fourth frequency down-conversion module under-samples said input RF signal according to said fourth control signal.

16. The WLAN device of claim 8, wherein said first, said second, said third, and said fourth frequency down-conversion modules each comprise a switch and a storage element, wherein a first node of said each switch is coupled to a node of the corresponding said each storage element.

17. The WLAN device of claim 16, wherein said each storage element comprises a capacitor.

18. The WLAN device of claim 17, wherein said each capacitor corresponding to said first, said second, said third, and said fourth frequency down-conversion modules reduces a DC offset voltage in said first down-converted signal, said second down-converted signal, said third down-converted signal, and said fourth down-converted signal at least due to charge injection effects in said first, said second, said third, and said fourth frequency down-conversion modules, respectively.

19. The WLAN device of claim 8, further comprising a control signal generator that outputs said first, said second, said third, and said fourth control signal.

20. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said transmitter receives an information signal, wherein said information signal comprises an I baseband signal and a Q baseband signal, wherein said transmitter comprises:

(1) a first modulator that receives said I baseband signal and outputs a modulated I phase signal;

(2) a second modulator that receives said Q baseband signal and outputs a modulated Q phase signal;

(3) first differential sampling means for sampling said modulated I phase signal according to a first control signal and a second control signal, to generate an I harmonically rich signal, wherein said second control signal is phase shifted relative to said first control signal;

(4) second differential sampling means for sampling said modulated Q phase signal according to said first control signal and said second control signal, to generate a Q harmonically rich signal;

(5) means for combining said I harmonically rich signal and said Q harmonically rich signal, to generate an I/Q harmonically rich signal, said I/Q harmonically rich signal having multiple harmonic images that contain amplitude and frequency information for reconstruction of the I and Q phase signals;

wherein said first and second control signals have a period of $T_S$ so that said harmonic images repeat at multiples of $1/T_S$;

wherein said first and second control signal comprise pulses that operate to improve energy transfer to a desired harmonic image in said corresponding I and Q harmonically rich signals; and wherein said output RF signal comprises said I/Q harmonically rich signal.

21. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal, and a physical layer convergence procedure sublayer coupled to said physical medium dependent sublayer, wherein said physical layer convergence procedure sublayer controls frame exchange between said medium access control layer and said physical layer, wherein said transmitter receives an information signal, wherein said transmitter comprises:

a modulator that receives said information signal and outputs a modulated signal;

a buffer/inverter, for receiving said modulated signal and generating an inverted modulated signal;

a first controlled switch, coupled to an output of said buffer/inverter, said first controlled switch shunting said modulated signal to ground according to a first control signal, and resulting in a first harmonically rich signal;

a second controlled switch coupled to a second output of said buffer/inverter, said second controlled switch shunting said inverted modulated signal to ground according to a second control signal, and resulting in a second harmonically rich signal;

a combiner, coupled to an output of said first controlled switch and an output of said second controlled switch, said combiner combining said first harmonically rich signal and said second harmonically rich signal, resulting in a third harmonically rich signal;

wherein said first control signal and said second control signal comprise pulses that operate to improve energy transfer to a desired harmonic in said third harmonically rich signal;

wherein said first control signal and said second control signal are phase shifted with respect to each other; and wherein said output RF signal comprises said third harmonically rich signal.

22. The WLAN device of claim 21, wherein:

said first controlled switch comprises a first field effect transistor (FET), a gate of said first FET coupled to said first control signal, a source of said first FET receiving said modulated signal and outputting said first harmonically rich signal, and a drain of said first FET coupled to ground; and said second controlled switch comprises a second field effect transistor (FET), a gate of said second FET coupled to said second control signal, a source of said second FET receiving said inverted modulated signal and outputting said second harmonically rich signal, and a drain of said second FET coupled to ground.

23. The WLAN device of claim 22, wherein said first FET and said second FET alternately shunt said modulated signal and said inverted modulated signal to ground, respectively, according to said first control signal and said second control signal, to generate said harmonically rich signals.

24. The WLAN device of claim 1, wherein said physical layer comprises a direct sequence spread spectrum (DSSS) physical layer, wherein said input RF signal comprises a differential binary phase shift keying modulated signal or a differential quadrature phase shift keying modulated signal.

25. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a direct sequence spread spectrum (DSSS) physical layer, wherein said input RF signal comprises a differential binary phase shift keying modulated signal or a differential quadrature phase shift keying modulated signal, wherein said receiver comprises a differential phase shift keying modulation receiver, wherein said differential phase shift keying modulation receiver receives said input RF signal and outputs a down-converted demodulated signal, and wherein said physical medium dependent sublayer further comprises:

a de-spread correlator that receives said down-converted demodulated signal and receives an 11-bit Barker word, wherein said de-spread correlator outputs a de-spread signal; and a de-scrambler that receives said de-spread signal and outputs at least a portion of at least one PPDU frame.

26. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal, and a physical layer convergence procedure sublayer coupled to said physical medium dependent sublayer, wherein said physical layer convergence procedure sublayer controls frame exchange between said medium access control layer and said physical layer, wherein said physical layer comprises a direct sequence spread spectrum (DSSS) physical layer, wherein said input RF signal comprises a differential binary phase shift keying modulated signal or a differential quadrature phase shift keying modulated signal, wherein said receiver comprises a differential phase shift keying modulation receiver, and wherein said physical medium dependent sublayer further comprises:

a de-spread correlator that receives said input RF signal and receives an 11-bit Barker word, wherein said de-spread correlator outputs a de-spread signal; and a de-scrambler;

wherein said differential phase shift keying modulation receiver receives said de-spread signal and outputs a down-converted demodulated signal; and wherein said de-scrambler receives said down-converted demodulated signal and outputs at least a portion of at least one PPDU frame.

27. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a direct sequence spread spectrum (DSSS) physical layer, wherein said input RF signal comprises a differential binary phase shift keying modulated signal or a differential quadrature phase shift keying modulated signal, wherein said receiver comprises a combined differential phase shift keying (DPSK) modulation receiver and de-spread correlator, wherein said combined DPSK modulation receiver and de-spreader correlator receives said input RF signal and receives an 11-bit Barker word, wherein said combined DPSK modulation receiver and de-spread correlator outputs a demodulated/de-spread signal, wherein said physical medium dependent sublayer further comprises:

a de-scrambler that receives said demodulated/de-spread signal and outputs at least a portion of at least one PPDU frame.

28. The WLAN device of claim 1, wherein said physical layer comprises a direct sequence spread spectrum (DSSS) physical layer, wherein said output RF signal comprises a differential binary phase shift keying modulated signal or a differential quadrature phase shift keying modulated signal.

29. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a direct sequence spread spectrum (DSSS) physical layer, wherein said output RF signal comprises a differential binary phase shift keying modulated signal or a differential quadrature phase shift keying modulated signal, wherein said transmitter comprises a differential phase shift keying modulation transmitter, and wherein said physical medium dependent sublayer further comprises:

a scrambler that receives at least a portion of at least one PPDU frame and outputs a scrambled at least one PPDU frame portion;

a modulo-2 adder that receives said scrambled at least one PPDU frame portion, wherein said modulo-2 adder receives an 11-bit Barker word, and wherein said scrambler outputs a spread signal; and a transmit mask filter that receives said spread signal and outputs a filtered signal; and wherein said differential phase shift keying modulation transmitter receives said filtered signal, wherein said differential phase shift keying modulation transmitter transmits said output RF signal.

30. The WLAN device of claim 1, wherein said physical layer comprises a frequency hopping spread spectrum physical layer, wherein said input RF signal comprises a 2-level or 4-level Gaussian frequency shift keying modulated signal.

31. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a frequency hopping spread spectrum physical layer, wherein said input RF signal comprises a 2-level or 4-level Gaussian frequency shift keying modulated signal, wherein said receiver comprises a Gaussian frequency shift keying modulation receiver, wherein said Gaussian frequency shift keying modulation receiver receives said input RF signal, wherein said Gaussian frequency shift keying modulation receiver outputs a demodulated signal, wherein said physical medium dependent sublayer further comprises:

a data de-whitener that receives said demodulated signal and outputs at least a portion of at least one PPDU frame.

32. The WLAN device of claim 1, wherein said physical layer comprises a frequency hopping spread spectrum physical layer, wherein said output RF signal comprises a 2-level or 4-level Gaussian frequency shift keying modulated signal.

33. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a frequency hopping spread spectrum physical layer, wherein said output RF signal comprises a 2-level or 4-level Gaussian frequency shift keying modulated signal, wherein said transmitter comprises a Gaussian frequency shift keying modulation transmitter, wherein said physical medium dependent sublayer further comprises:

a data whitener that receives at least a portion of at least one PPDU frame and outputs a whitened at least one PPDU frame portion; and a transmit Gaussian shaping filter that receives said at least one whitened at least one PPDU frame portion and outputs a filtered signal;

wherein said Gaussian frequency shift keying modulation transmitter receives said filtered signal, wherein said Gaussian frequency shift keying modulation transmitter transmits said output RF signal.

34. The WLAN device of claim 33, wherein said physical medium dependent sublayer further comprises:

a symbol mapping module that maps said whitened at least one PPDU frame portion.

35. The WLAN device of claim 34, wherein said physical layer comprises an orthogonal frequency division multiplexing physical layer, wherein said input RF signal comprises a binary phase shift keying modulated signal, a quadrature phase shift keying modulated signal, a 16-QAM modulated signal, or a 64-QAM modulated signal.

36. A wireless local area network (WLAN) device, comprising:

a medium access control layer, and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal, and a physical layer convergence procedure sublayer coupled to said physical medium dependent sublayer, wherein said physical layer convergence procedure sublayer controls frame exchange between said medium access control layer and said physical layer, wherein said receiver comprises a phase shift keying/quadrature amplitude modulation (PSK/QAM) receiver, wherein said PSK/QAM modulation receiver receives said RF input signal and outputs a demodulated signal, wherein said physical medium dependent sublayer further comprises:

a fast Fourier transform (FFT) module that receives said demodulated signal and outputs a FFT module output signal;

a bit de-interleaving and de-mapping module that receives said FFT module output signal and outputs an encoded at least one data frame; and a convolutional code decoder that receives said encoded at least one data frame and outputs at least a portion of at least one PPDU frame.

37. The WLAN device of claim 36, wherein said physical medium dependent sublayer further comprises:

a symbol shaping module that shapes said encoded signal.

38. The WLAN device of claim 1, wherein said physical layer comprises an orthogonal frequency division multiplexing physical layer, wherein said output RF signal comprises a binary phase shift keying modulated signal, a quadrature phase shift keying modulated signal, a 16-QAM modulated signal, or a 64-QAM modulated signal.

39. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises an orthogonal frequency division multiplexing physical layer, wherein said output RF signal comprises a binary phase shift keying modulated signal, a quadrature phase shift keying modulated signal, a 16-QAM modulated signal, or a 64-QAM modulated signal, wherein said transmitter comprises a phase shift keying/quadrature amplitude modulation (PSK/QAM) transmitter, wherein said physical medium dependent sublayer further comprises:

a convolutional encoder that receives at least a portion of at least a PPDU frame and outputs an encoded at least one PPDU frame portion;

a bit interleaving and mapping module that receives said encoded at least one PPDU frame portion and outputs at least one bit interleaved and mapped signal; and an inverse fast Fourier transform (IFFT) module that receives said at least one bit interleaved and mapped signal and outputs an IFFT module output signal; and wherein said PSK/QAM modulation transmitter receives said IFFT module output signal and transmits said output RF signal.

40. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a high rate direct sequence spread spectrum physical layer, wherein said transmitter comprises a phase shift keying (PSK) modulation transmitter, wherein said output RF signal comprises a packet binary convolutional coding modulated signal, wherein said physical medium dependent sublayer further comprises:

a scrambler that receives at least a portion of at least one PPDU frame and outputs a scrambled at least one PPDU frame portion;

a binary convolutional code encoder that receives said scrambled at least one PPDU frame portion and outputs an encoded signal;

a cover code sequence generator that receives a 16-bit cover code seed and outputs a cover sequence; and a PSK cover code map module that receives said cover sequence and said encoded signal, and outputs a mapped signal; and wherein said PSK modulation transmitter receives said mapped signal, wherein said PSK modulation transmitter transmits said output RF signal.

41. A wireless local area network (WLAN) device, comprising:

a medium access control layer; and a physical layer coupled to said medium access control layer, comprising:

a physical medium dependent sublayer, wherein said physical medium dependent sublayer comprises:

a receiver that receives an input radio frequency (RF) signal, wherein said receiver comprises a frequency down-conversion module, and a transmitter that transmits an output RF signal; and a physical layer convergence procedure sublayer coupled to said physical medium dependent sublayer, wherein said physical layer convergence procedure sublayer controls frame exchange between said medium access control layer and said physical layer, wherein said physical layer comprises a high rate direct sequence spread spectrum physical layer, wherein said transmitter comprises a differential quadrature phase shift keying (DQPSK) modulation transmitter, wherein said output RF signal comprises a complementary code keying modulated signal, wherein said physical medium dependent sublayer further comprises:

a scrambler that receives at least one data frame and outputs a scrambled at least one data frame;

a data multiplexer that receives said scrambled at least one data frame, wherein said data multiplexer outputs a first multiplexed data portion and a second multiplexed data portion; and a complex code selector module that receives said first multiplexed data portion and outputs a selected code; and wherein said DQPSK modulation transmitter receives said selected code and said second multiplexed data portion, wherein said DQPSK modulation transmitter transmits said output RF signal.

42. The WLAN device of claim 1, wherein said medium access control layer and said physical layer are comprised by a network adaptor or a network interface card.

43. The WLAN device of claim 1, wherein said transmitter comprises a frequency up-conversion module, wherein said frequency up-conversion module comprises a second switch module.

44. The WLAN device of claim 43, wherein said second switch module is configured to amplitude modulate, frequency modulate, or phase modulate a carrier signal with an information signal.

45. The WLAN device of claim 44, wherein said transmitter further comprises a third switch module, wherein said third and second switch modules are configured to modulate and up-convert information signals to in-phase and quadrature-phase channels.

46. The WLAN device of claim 45, wherein said information signals are modulated and up-converted according to quadrature amplitude modulation, differential quadrature phase shift keying, quadrature phase shift keying, complementary code keying, or packet binary convolutional coding modulation schemes.

47. The WLAN device of claim 1, wherein said input RF signal is an amplitude modulated, frequency modulated, or phase modulated signal, wherein said switch module is configured to demodulate said input RF signal to an information signal.

48. The WLAN device of claim 47, wherein said receiver further comprises a second switch module, wherein said first and second switch modules are configured to down-convert and demodulate in-phase and quadrature-phase components of a received signal.

49. The WLAN device of claim 48, wherein said received signal comprises a quadrature amplitude modulated, differential quadrature phase shift keying modulated, quadrature phase shift keying modulated, complementary code keying, or packet binary convolutional coding modulated signal.

50. The WLAN device of claim 1, wherein said frequency down-conversion module is tuned for at least one frequency substantially equal to one of or between 2.402 Giga Hertz and 2.495 Giga Hertz.

51. The WLAN device of claim 1, wherein the device is an access point, computer, personal data assistant (PDA), automatic identification data collection device, telephone, network device, or combination thereof.

52. The WLAN device of claim 20, wherein said first modulator and said second modulator amplitude modulate, frequency modulate, or phase modulate a carrier signal frequency with said I baseband signal and said Q baseband signal, respectively.

53. The WLAN device of claim 20, wherein said first modulator and said second modulator each comprise a digital-to-analog (D/A) converter.

54. The WLAN device of claim 21, wherein said modulator amplitude modulates, frequency modulates, or phase modulates a carrier signal frequency with said information signal.

55. The WLAN device of claim 21, wherein said modulator comprises a digital-to-analog (D/A) converter.

56. The WLAN device of claim 1, wherein a second node of said switch module is coupled to a reference potential.

57. The WLAN device of claim 1, wherein a second node of said storage element is coupled to a reference potential.

* * * * *

UNITED STATES PATENT AND TRADEMARK OFFICE

CERTIFICATE OF CORRECTION

PATENT NO. : 7,054,296 B1 
APPLICATION NO. : 09/632857
DATED : May 30, 2006
INVENTOR(S) : Sorrells et al.

It is certified that error appears in the above-identified patent and that said Letters Patent is hereby corrected as shown below:

TITLE PAGE, ITEM (56)
References Cited Section
In item (56), under "U.S. Patent Documents", a citation for U.S. Pat. 6,687,493 B1 should be listed.

TITLE PAGE, ITEM (56)
References Cited Section
In item (56), under "U.S. Patent Documents", page 3, "5,096,536" should be changed to --5,095,536--.

TITLE PAGE, ITEM (56)
References Cited Section
In item (56), under "Foreign Patent Documents", page 6, "EP 0 273 130 A3" should be changed to --EP 0 276 130 A3--.

TITLE PAGE, ITEM (56)
References Cited Section
In item (56), under "Foreign Patent Documents", page 6, "EP 0 360 351 A2" should be changed to --EP 0 380 351 A2--.

TITLE PAGE, ITEM (56)
References Cited Section
In item (56), under "Foreign Patent Documents", page 6, "EP 0 643 447 A2" should be changed to --EP 0 643 477 A2--.

TITLE PAGE, ITEM (56)
References Cited Section
In item (56), under "Foreign Patent Documents", page 6, "JP 58-114451" should be changed to --JP 56-114451--.

TITLE PAGE, ITEM (56)
References Cited Section
In item (56), under "Foreign Patent Documents", page 6, "WO 94/05077 A1" should be changed to --WO 94/05087 A1--.

TITLE PAGE, ITEM (56)
References Cited Section
In item (56), under "Foreign Patent Documents", page 6, "WO 0 795 955 A3" should be changed to --EP 0 795 955 A3--.

UNITED STATES PATENT AND TRADEMARK OFFICE

CERTIFICATE OF CORRECTION

PATENT NO. : 7,054,296 B1
APPLICATION NO. : 09/632857
DATED : May 30, 2006
INVENTOR(S) : Sorrells et al.

It is certified that error appears in the above-identified patent and that said Letters Patent is hereby corrected as shown below:

TITLE PAGE, ITEM (56)
References Cited Section
In item (56), under "Other Publications", page 7, column 2, "Michael J. Bultman" should be changed to --Copy of Declaration of Michael J. Bultman--.

TITLE PAGE, ITEM (56)
References Cited Section
In item (56), under "Other Publications", page 7, column 2, "Alex Holtz" should be changed to --Copy of Declaration of Alex Holtz--.

TITLE PAGE, ITEM (56)
References Cited Section
In item (56), under "Other Publications", page 7, column 2, "Richard C. Looke" should be changed to --Copy of Declaration of Richard C. Looke--.

TITLE PAGE, ITEM (56)
References Cited Section
In item (56), under "Other Publications", page 8, column 1, "Charley D. Moses, Jr." should be changed to -- Copy of Declaration of Charley D. Moses, Jr.--.

TITLE PAGE, ITEM (56)
References Cited Section
In item (56), under "Other Publications", page 8, column 1, "Jeffrey L. Parker" should be changed to --Copy of Declaration of Jeffrey L. Parker--.

Column 15
Lines 62-63 should be replaced with
--$(Freq_{input}\text{-}Freq_{IF})/n = Freq_{control}$
(901 MHZ-1 MHZ)/n = 900/n--.

Column 16
Lines 24-25 should be replaced with
--$(Freq_{input}\text{-}Freq_{IF})/n = Freq_{control}$
(900 MHZ-0 MHZ)/n 900 MHz/n--.

Column 16
Lines 57-58 should be replaced with
--$(Freq_{input}\text{-}Freq_{IF})/n = Freq_{control}$
(900 MHZ-0 MHZ)/n 900 MHz/n--.

UNITED STATES PATENT AND TRADEMARK OFFICE

CERTIFICATE OF CORRECTION

PATENT NO. : 7,054,296 B1
APPLICATION NO. : 09/632857
DATED : May 30, 2006
INVENTOR(S) : Sorrells et al.

It is certified that error appears in the above-identified patent and that said Letters Patent is hereby corrected as shown below:

Column 133
In line 21, “modules” should be changed to --module--.

Column 134
In line 40, “UFD” should be deleted.

Signed and Sealed this

Twenty-third Day of October, 2007

JON W. DUDAS
*Director of the United States Patent and Trademark Office*